US005289362A

United States Patent [19]

Liebl et al.

[11] Patent Number: 5,289,362

[45] Date of Patent: Feb. 22, 1994

[54] ENERGY CONTROL SYSTEM

[75] Inventors: Ronald J. Liebl, Mukwonago; Alan J. Bronikowski, South Milwaukee; Thomas C. Holdorf, Mukwonago; Lawrence J. Strojny, Oostburg; Mark W. Tellier, Milwaukee, all of Wis.

[73] Assignee: Johnson Service Company, Milwaukee, Wis.

[21] Appl. No.: 452,285

[22] Filed: Dec. 15, 1989

[51] Int. Cl.[5] .................... G06F 15/06; F25B 29/00

[52] U.S. Cl. .................... 364/140; 364/145; 364/464.04; 165/12; 236/46 R

[58] Field of Search .................... 364/140–146, 364/505, 557, 464.01, 464.04, 492, 493; 236/46 R, 91 D; 165/12-14, 24-27; 307/39, 33-38; 340/310 R, 310 A, 310 CP

[56] References Cited

U.S. PATENT DOCUMENTS

| | | | |
|---|---|---|---|
| 4,218,737 | 8/1980 | Buscher et al. | 364/493 |
| 4,357,665 | 11/1982 | Kroff | 364/493 |
| 4,386,649 | 6/1983 | Hines et al. | 364/557 |
| 4,399,510 | 8/1983 | Hicks | 364/464.04 |
| 4,449,178 | 5/1984 | Blav, Jr. et al. | 364/505 |
| 4,511,979 | 4/1985 | Amirante | 364/493 |
| 4,527,246 | 7/1985 | Masson | 364/557 |
| 4,568,934 | 2/1986 | Allgood | 364/464.04 |
| 4,656,593 | 4/1987 | Gleba et al. | 364/492 |
| 4,771,185 | 9/1988 | Feron et al. | 307/39 |
| 4,771,392 | 9/1988 | Hall | 364/557 |
| 4,803,632 | 2/1989 | Frew et al. | 364/464.04 |
| 4,819,714 | 4/1989 | Otsuka et al. | 364/557 |
| 4,881,686 | 11/1989 | Mehta | 236/46 R |
| 4,967,382 | 10/1990 | Hall | 236/46 R |
| 4,997,029 | 3/1991 | Otsuka et al. | 236/46 R |

OTHER PUBLICATIONS

Jameson Programmable Electronic Thermostat Owner's Manual, 1989.

*Primary Examiner*—Jerry Smith
*Assistant Examiner*—Thomas E. Brown
*Attorney, Agent, or Firm*—Foley & Lardner

[57] ABSTRACT

A control system for controlling a climate control device, such as an HVAC device within a premise, utilizes real time price tier data supplied by the utility company to achieve economical temperature regulation of the premise. The control system regulates temperature based on time of day data and desired temperature data supplied by the user wherein the user may program different desired temperatures depending upon the relative cost of electricity. The system also provides billing information to the user for current usage and projected usage. The control system additionally controls appliance modules and regulates operation of the hot water heater.

58 Claims, 151 Drawing Sheets

| | | LOW | MED | HIGH | CRIT |
|---|---|---|---|---|---|
| MORN | 6:00 am | 74 | 76 | 78 | 80 |
| DAY | 8:00 am | 78 | 80 | 82 | 84 |
| EVE | 5:00 pm | 74 | 76 | 78 | 80 |
| NIGHT | 10:00 pm | 78 | 80 | 82 | 84 |
| MORN | 7:00 am | 74 | 76 | 78 | 80 |
| DAY | 9:00 am | 76 | 78 | 80 | 82 |
| EVE | 5:00 pm | 74 | 76 | 78 | 80 |
| NIGHT | 12:00 pm | 78 | 80 | 82 | 84 |

Fig. 6

| | | LOW | MED | HIGH | CRIT |
|---|---|---|---|---|---|
| MORN | 6:00 am | 70 | 68 | 66 | 64 |
| DAY | 8:00 am | 62 | 60 | 58 | 56 |
| EVE | 5:00 pm | 70 | 68 | 66 | 64 |
| NIGHT | 10:00 pm | 67 | 64 | 61 | 59 |
| MORN | 7:00 am | 70 | 68 | 66 | 64 |
| DAY | 9:00 am | 66 | 64 | 62 | 60 |
| EVE | 5:00 pm | 70 | 68 | 66 | 64 |
| NIGHT | 12:00 pm | 67 | 64 | 61 | 59 |

Fig. 7

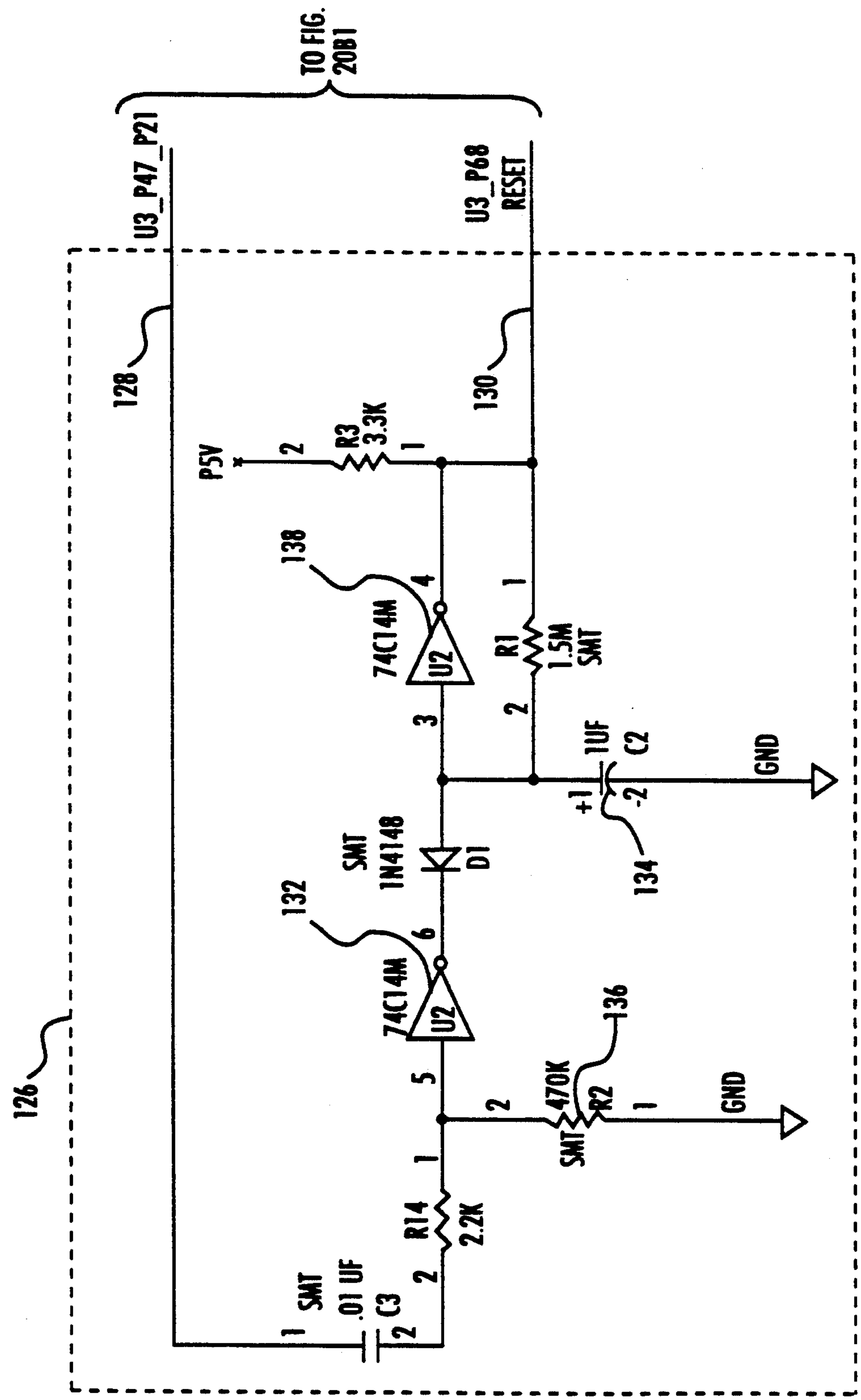
FIG. 20A1

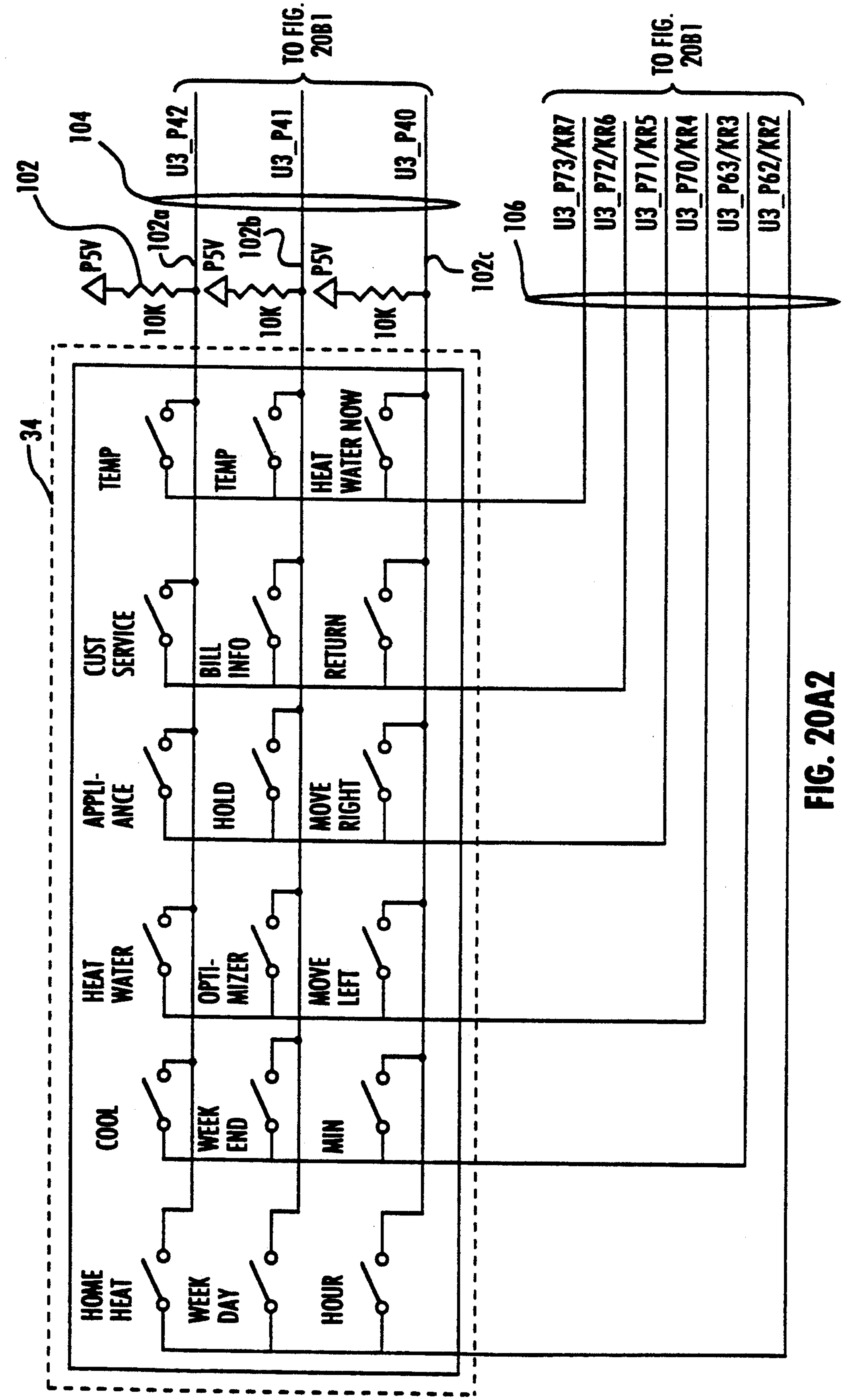
FIG. 20A2

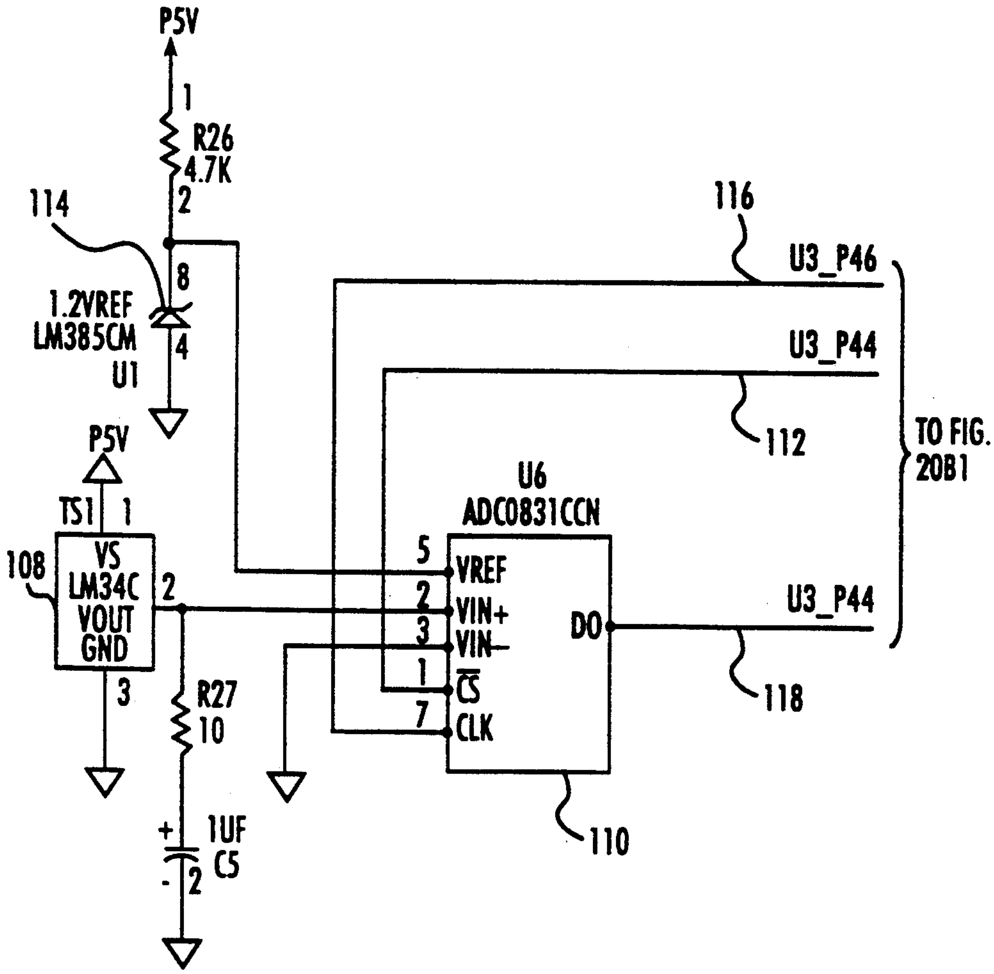
FIG. 20A3

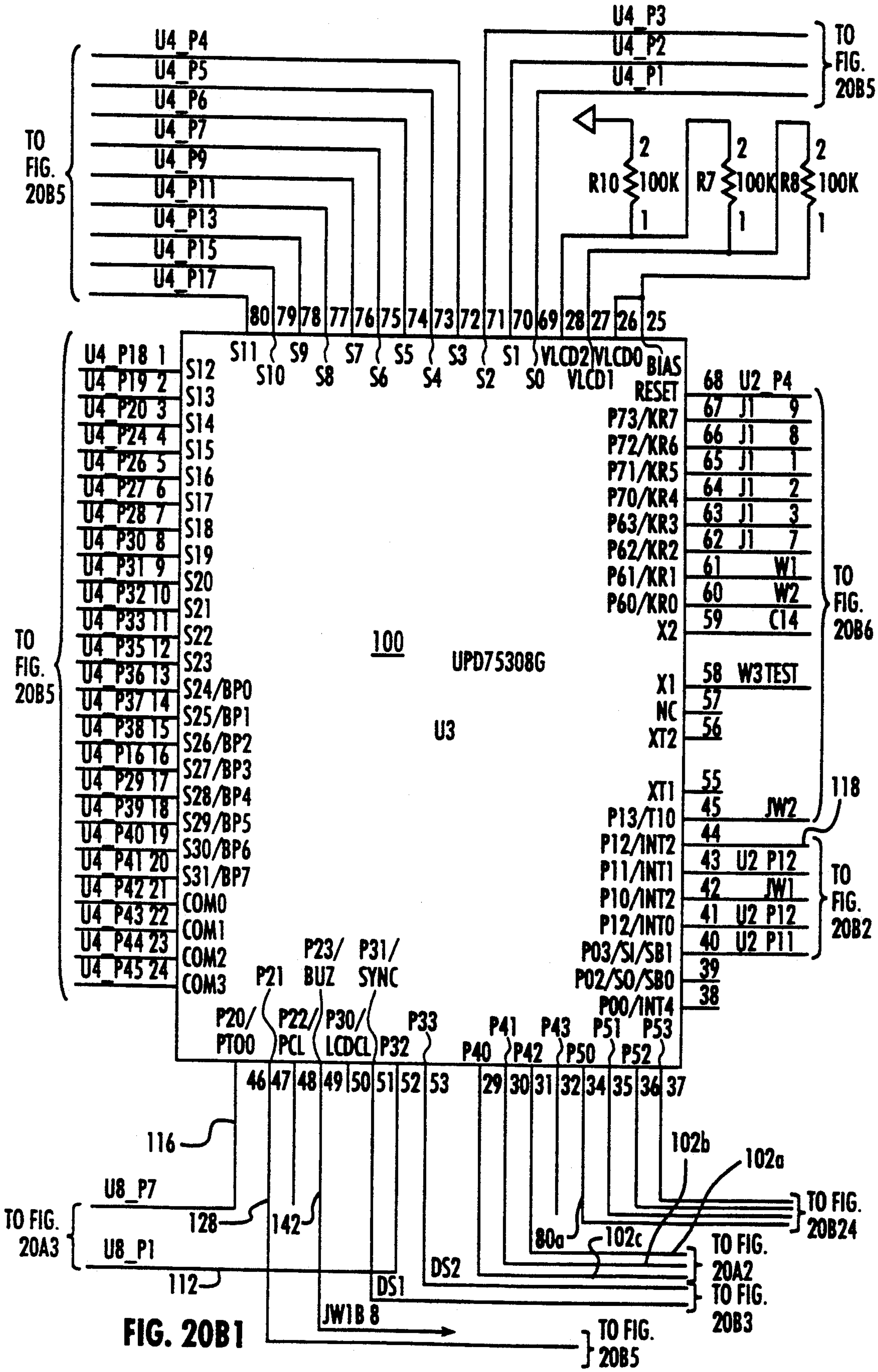
FIG. 20B1

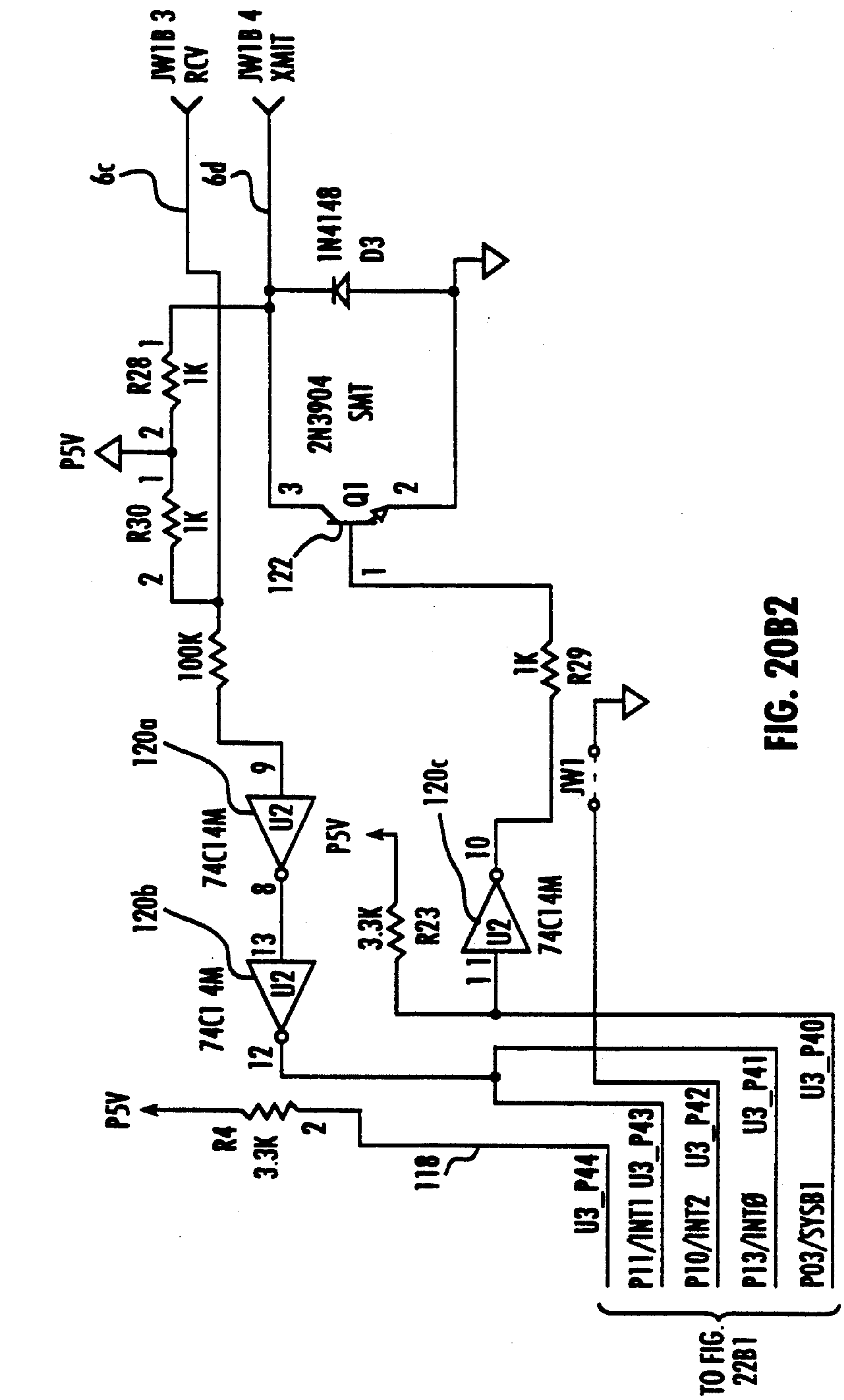
FIG. 20B2

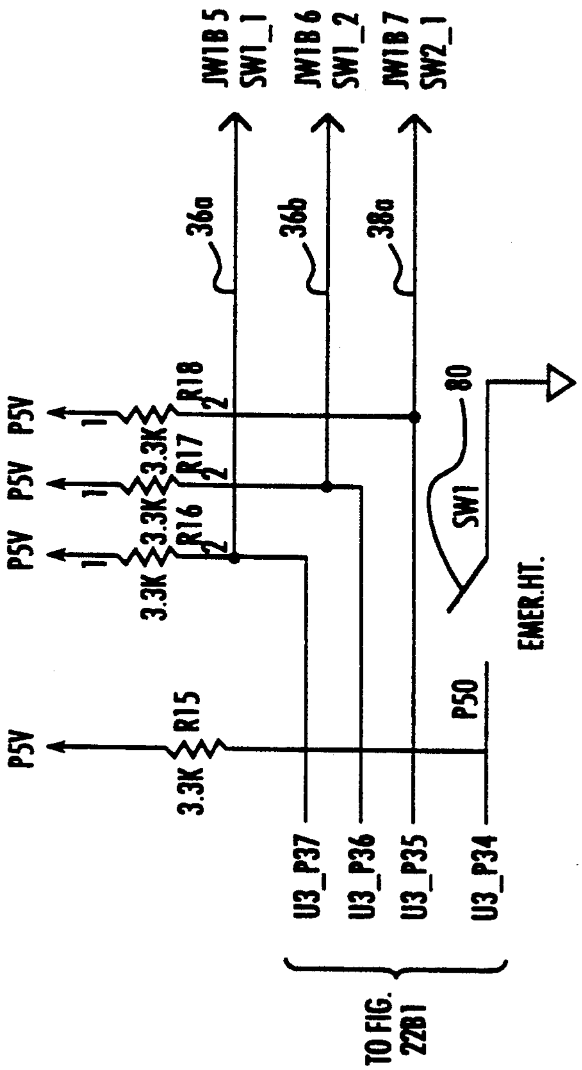
FIG. 20B4
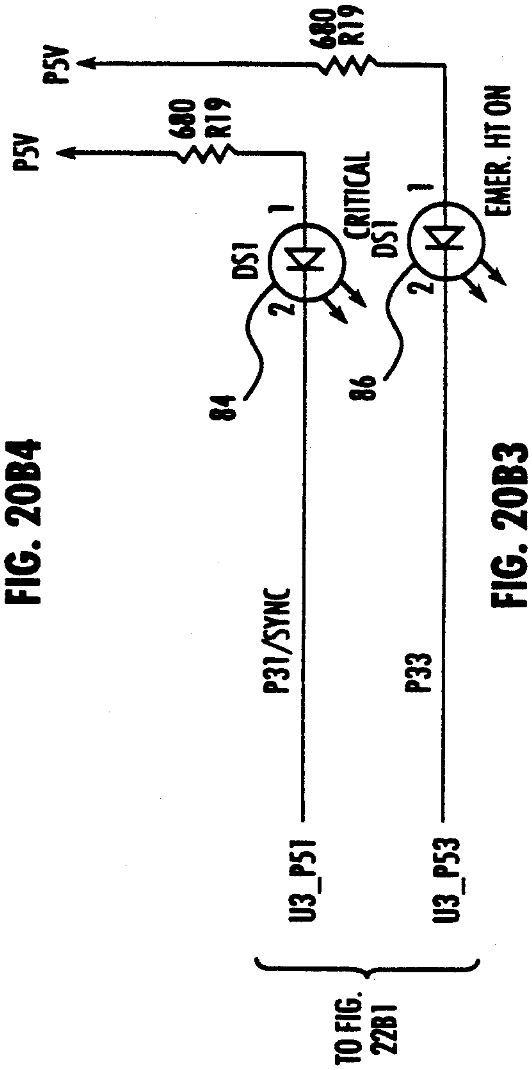
FIG. 20B3

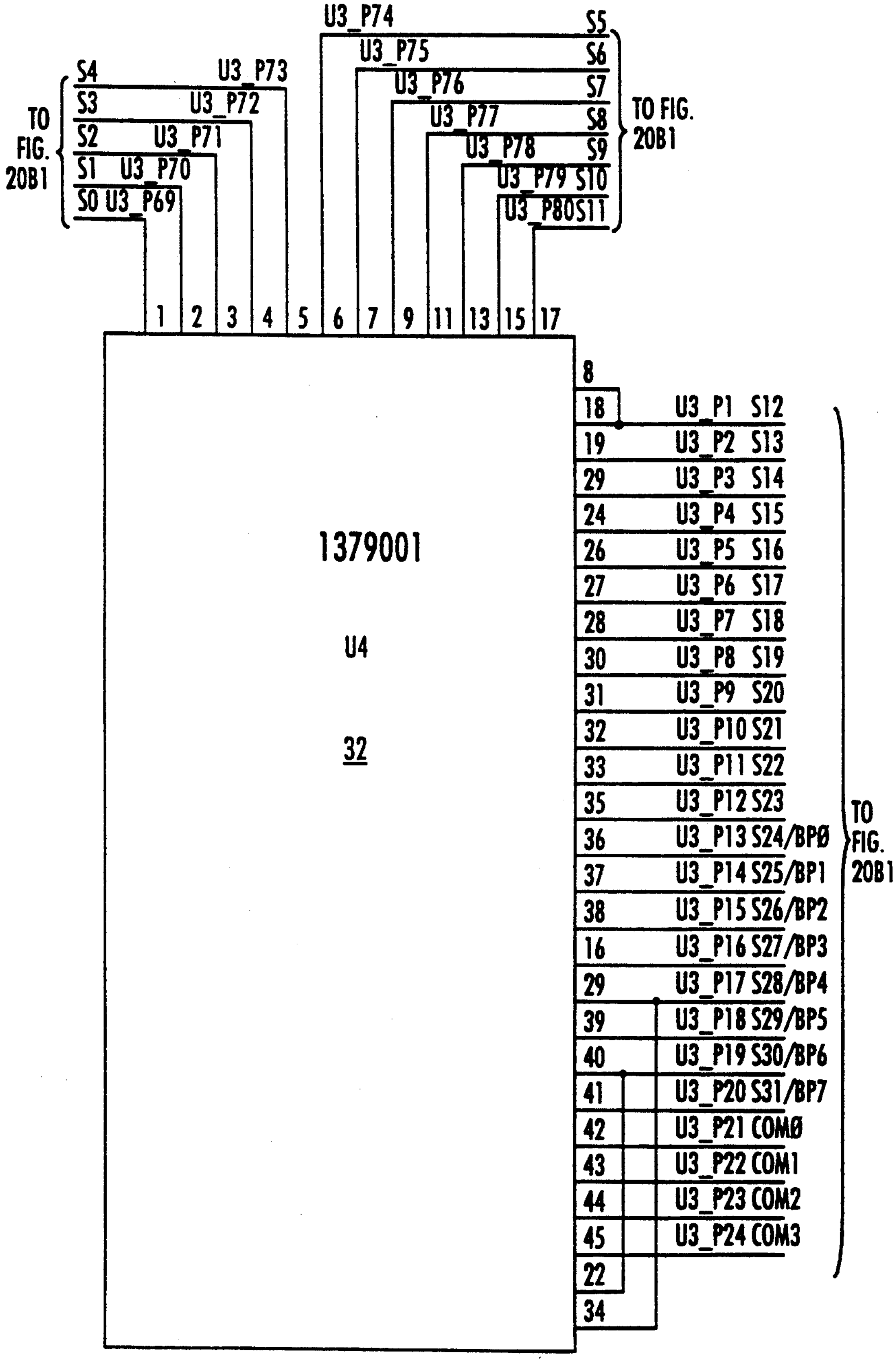
FIG. 20B5

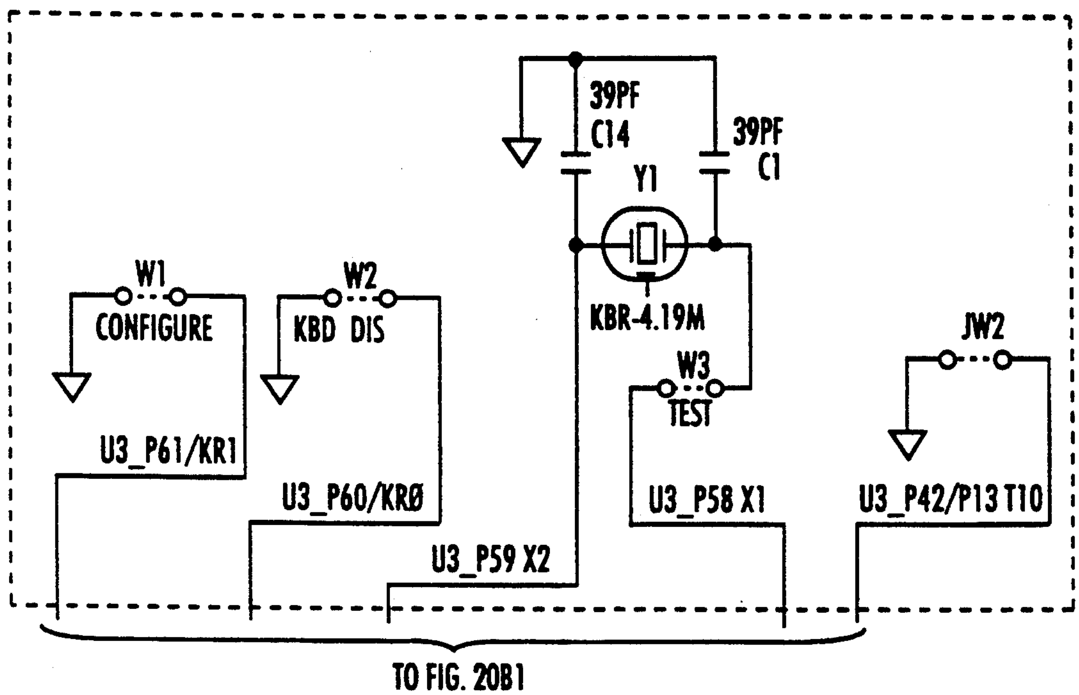
FIG. 20B6

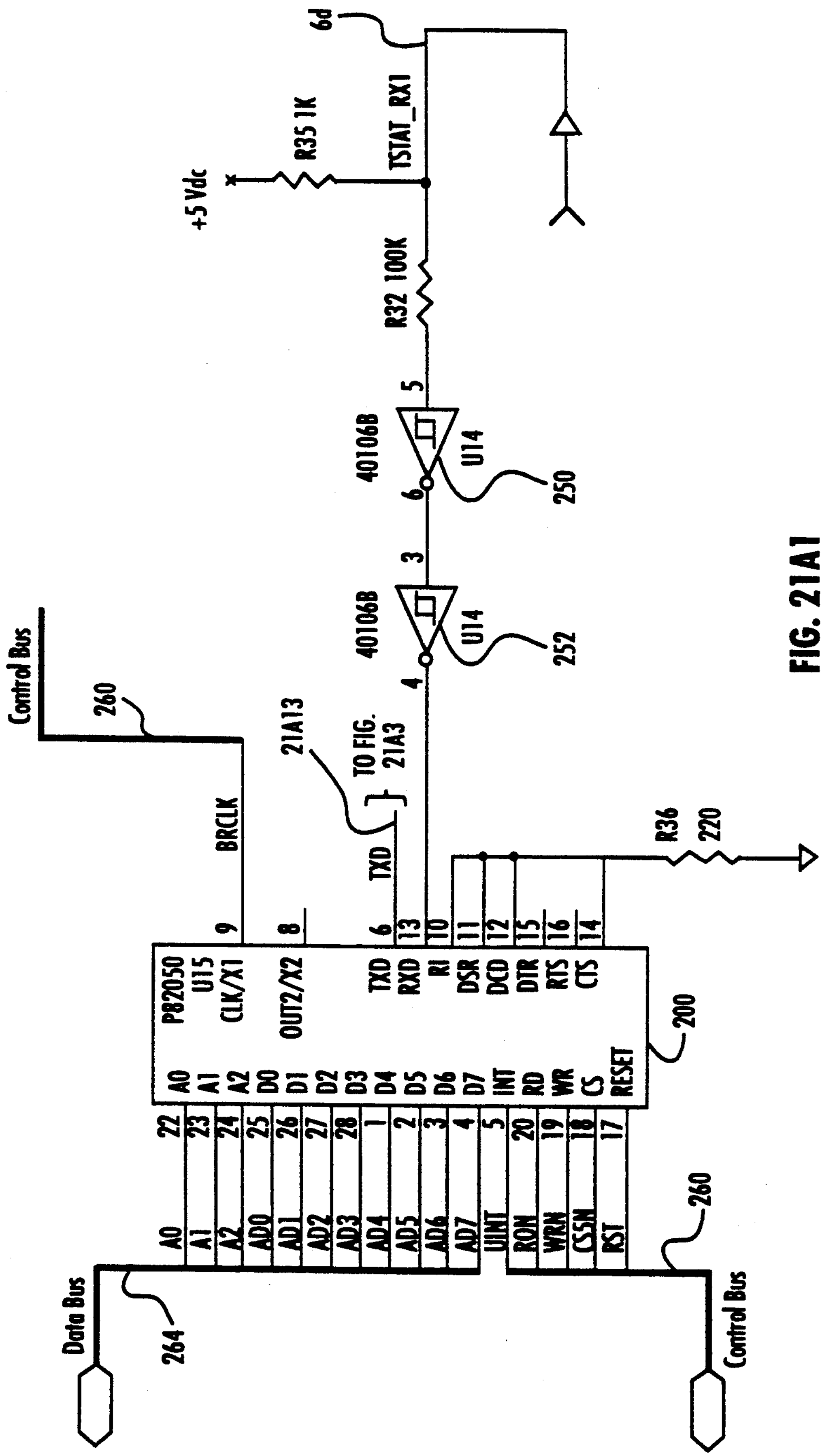
FIG. 21A1

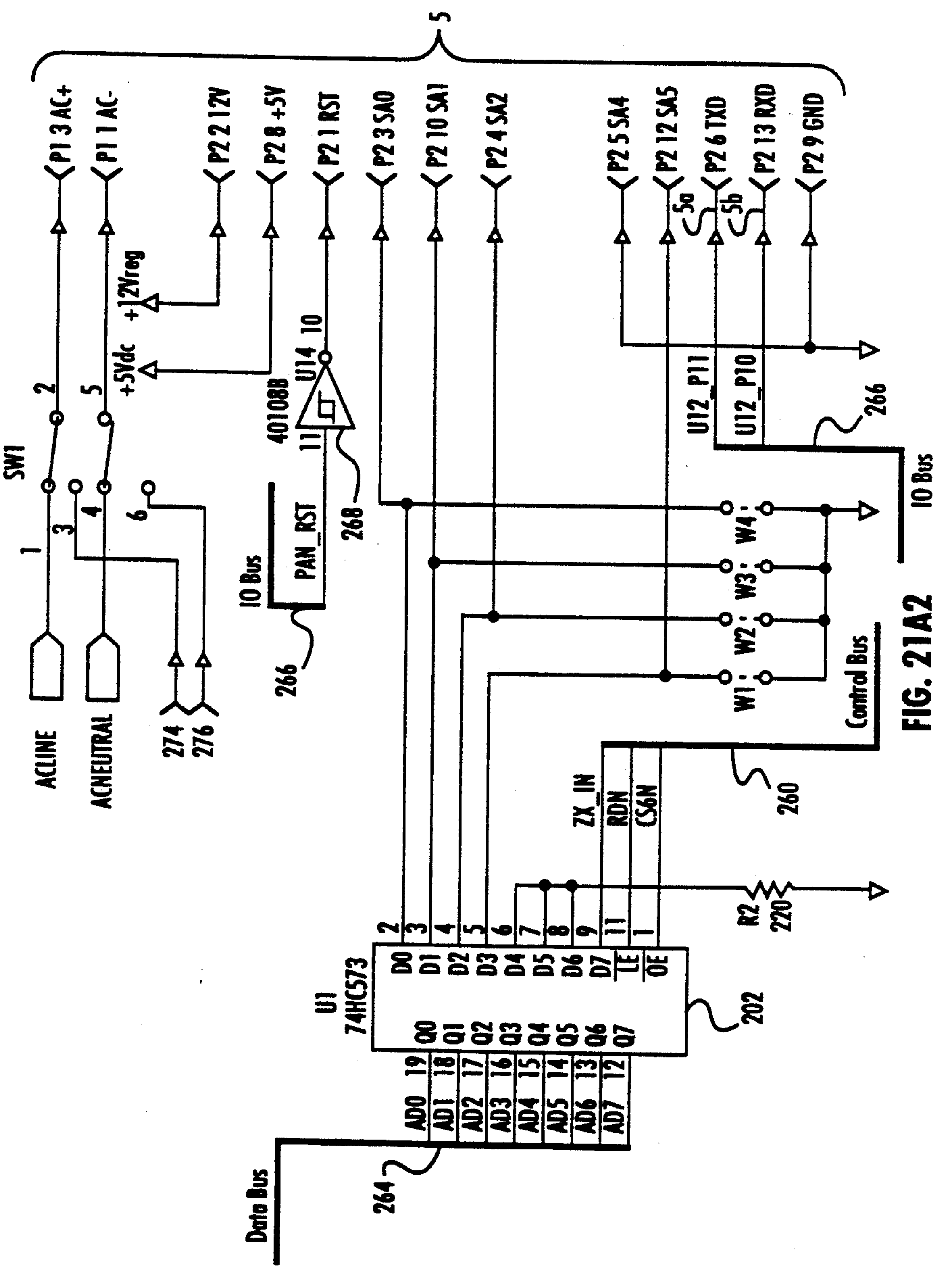
FIG. 21A2

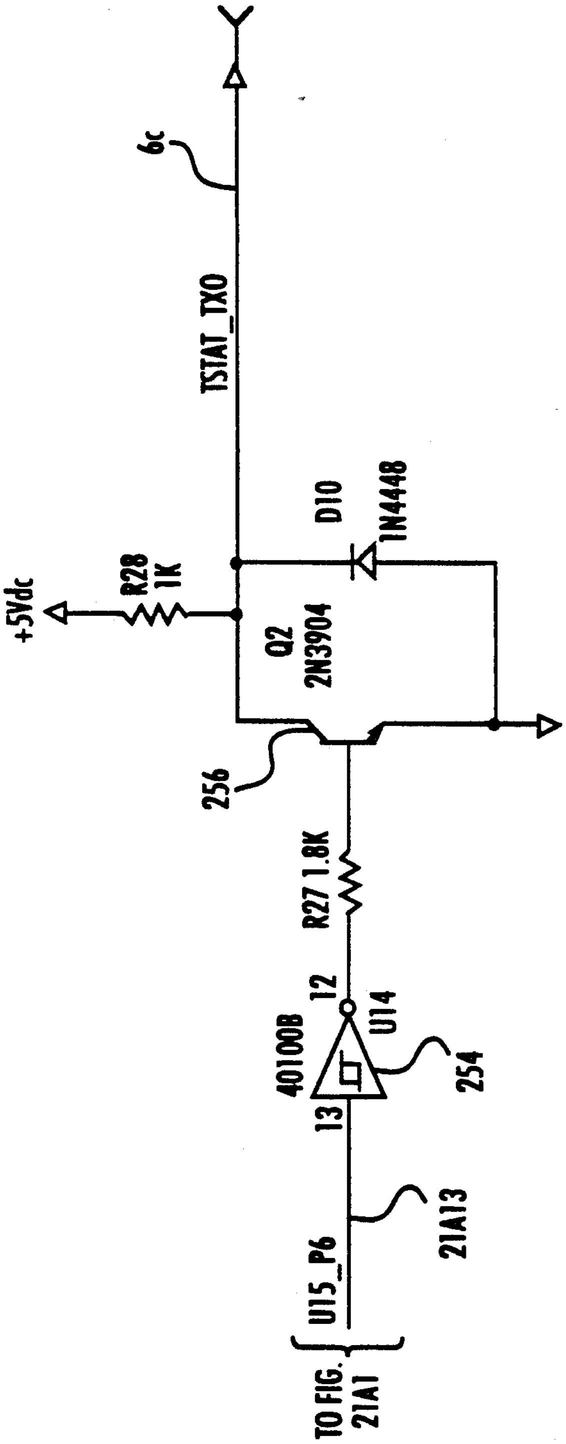
FIG. 21A3

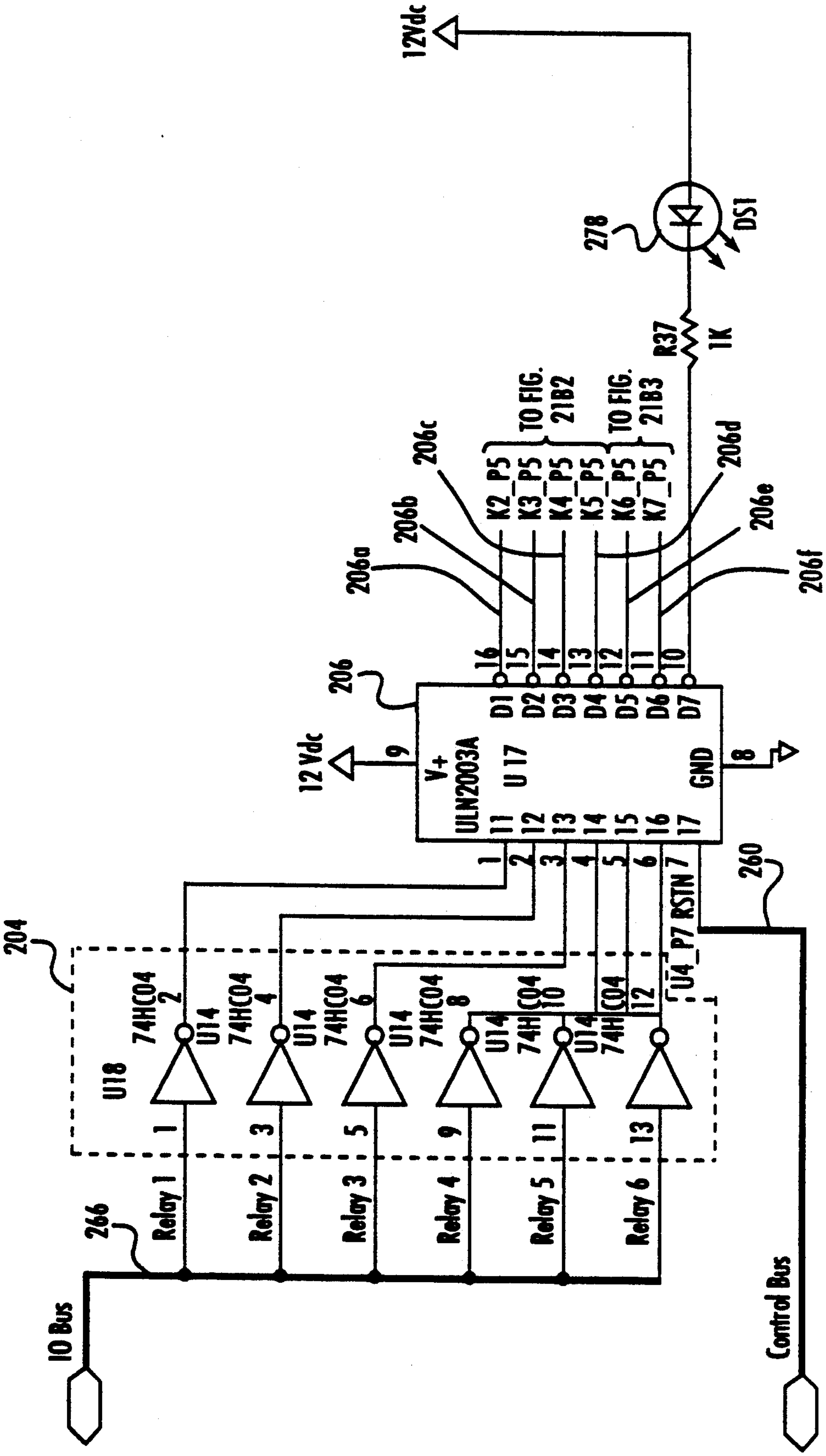
FIG. 21B1

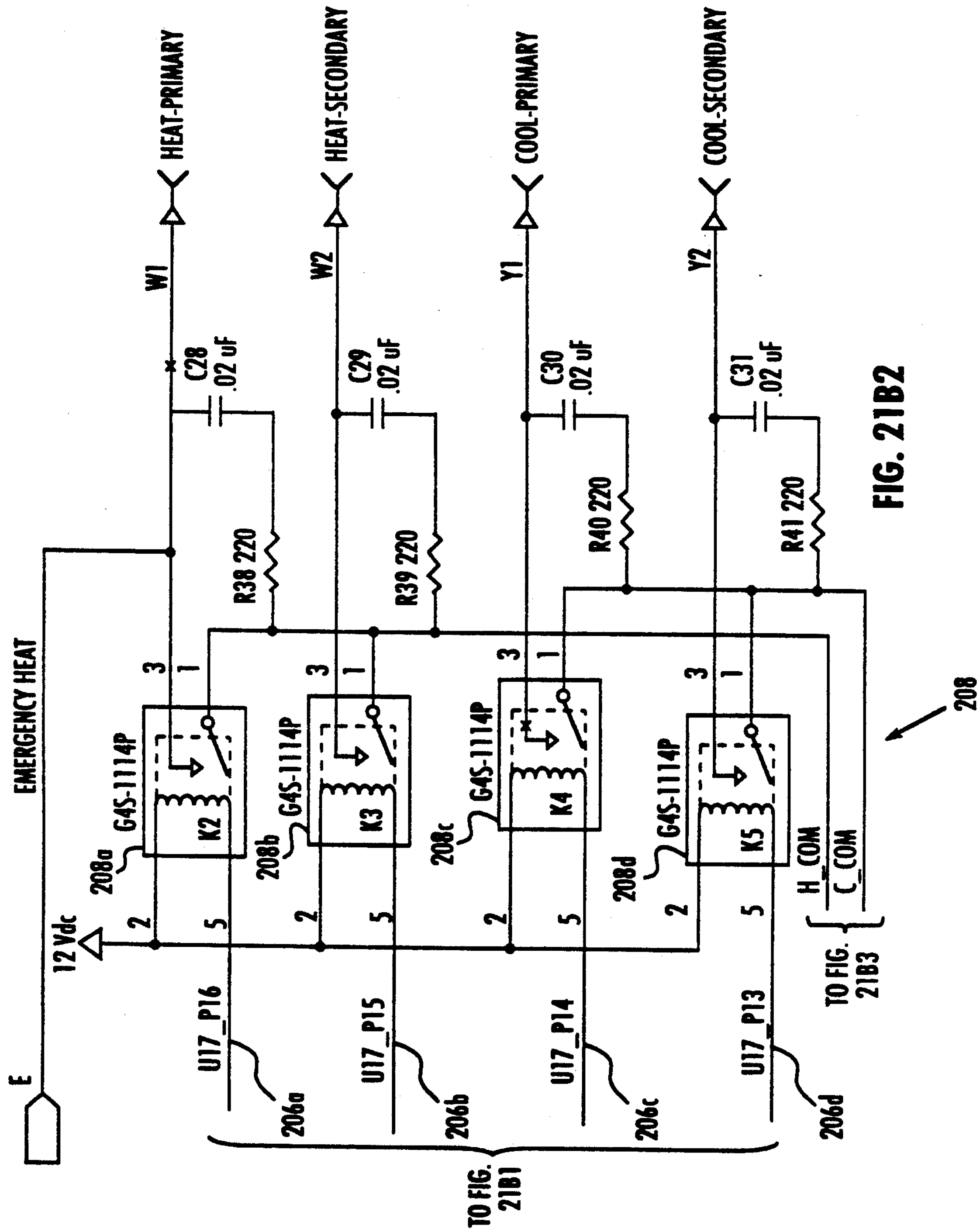
FIG. 21B2

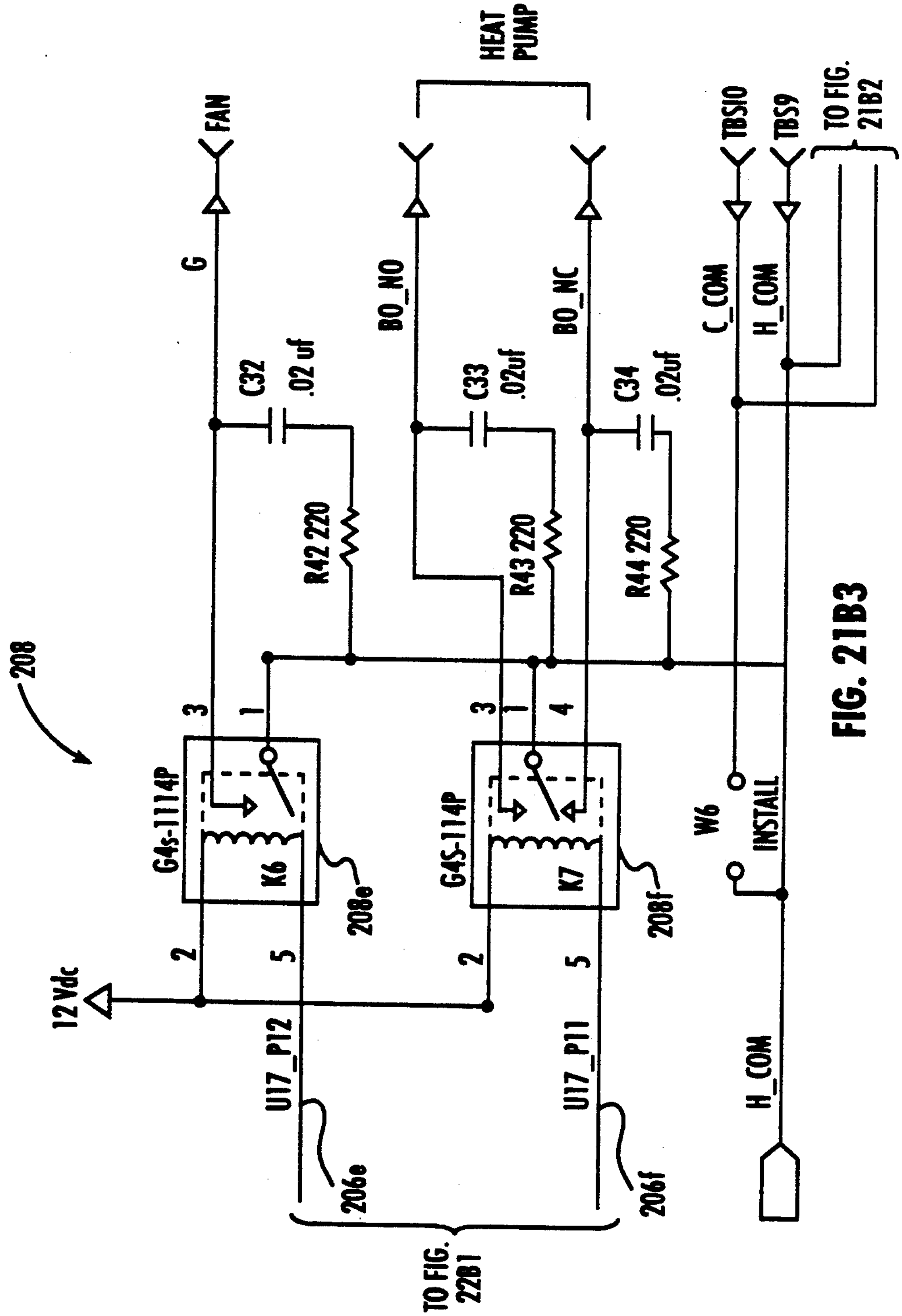
FIG. 21B3

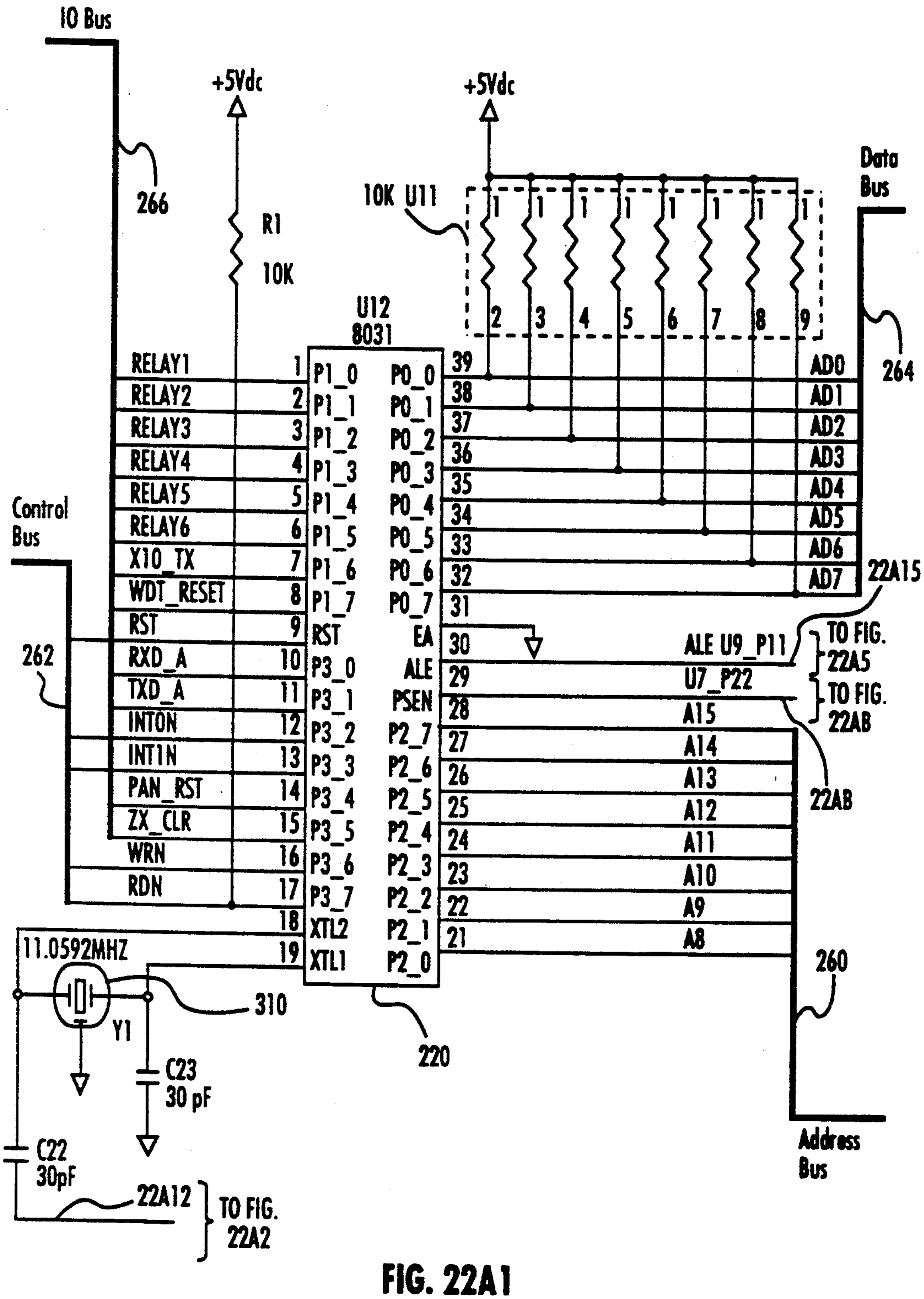
FIG. 22A1

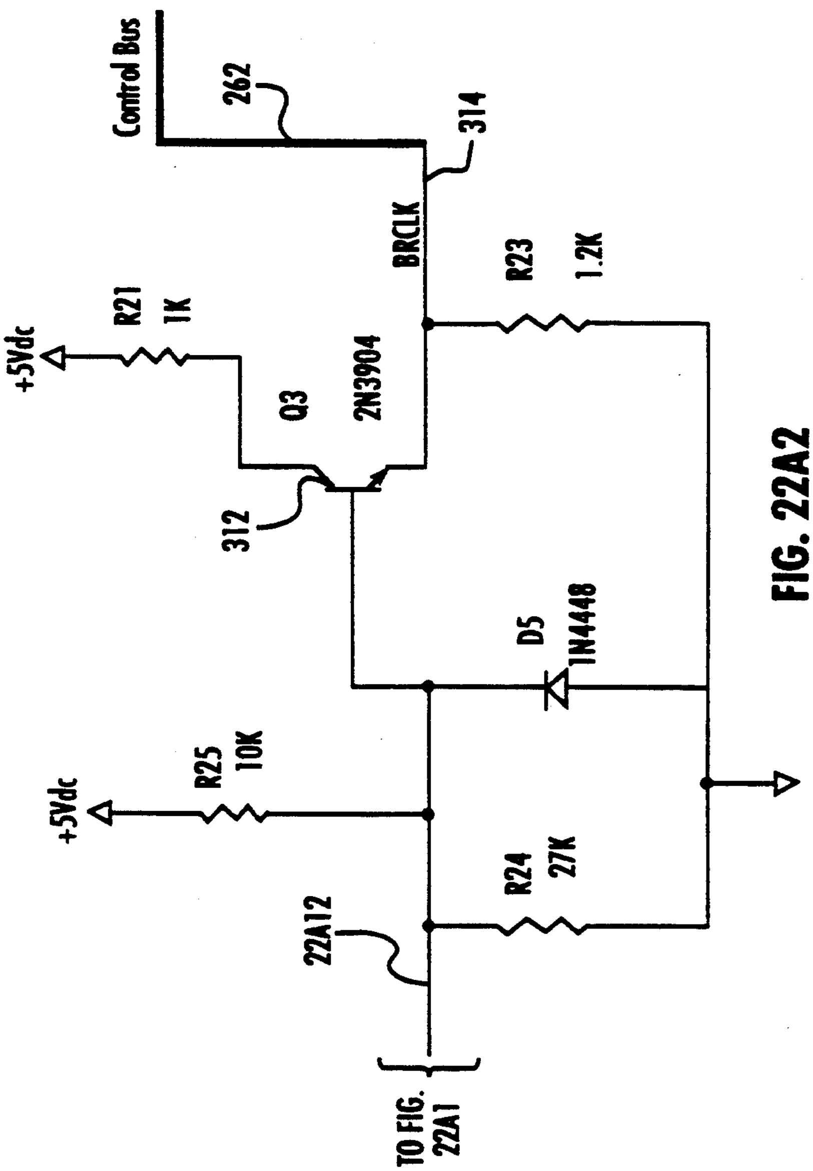
FIG. 22A2

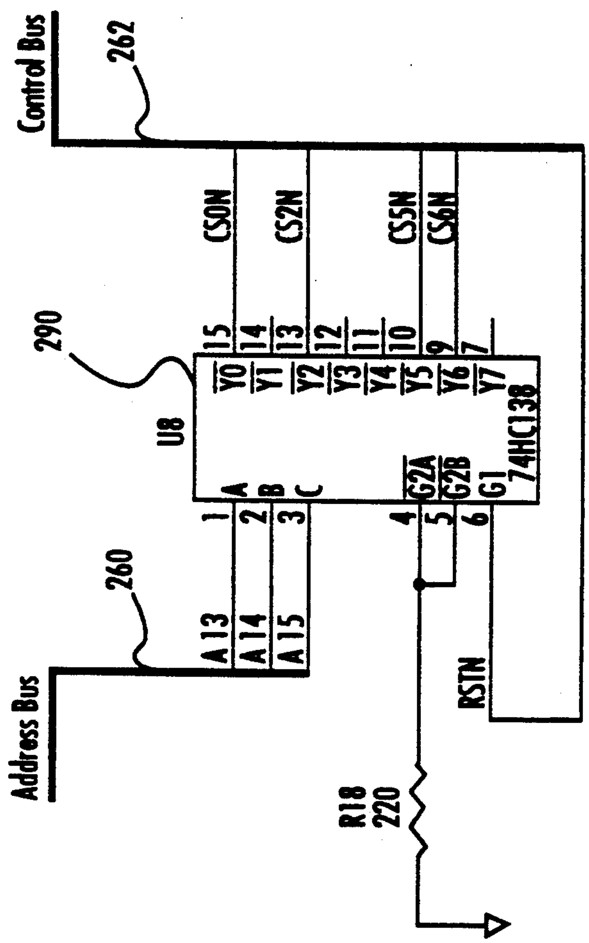
FIG. 22A3

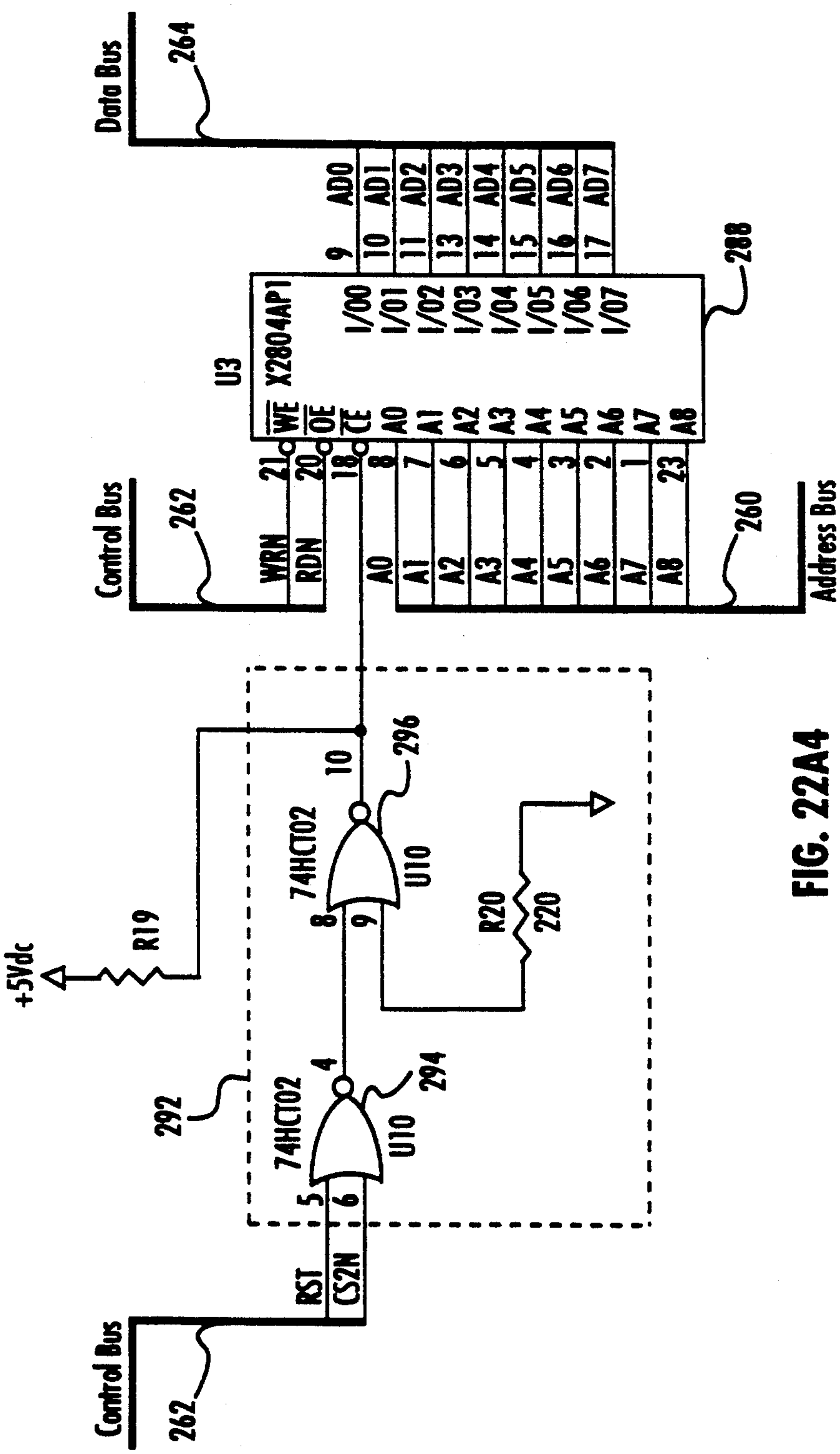
FIG. 22A4

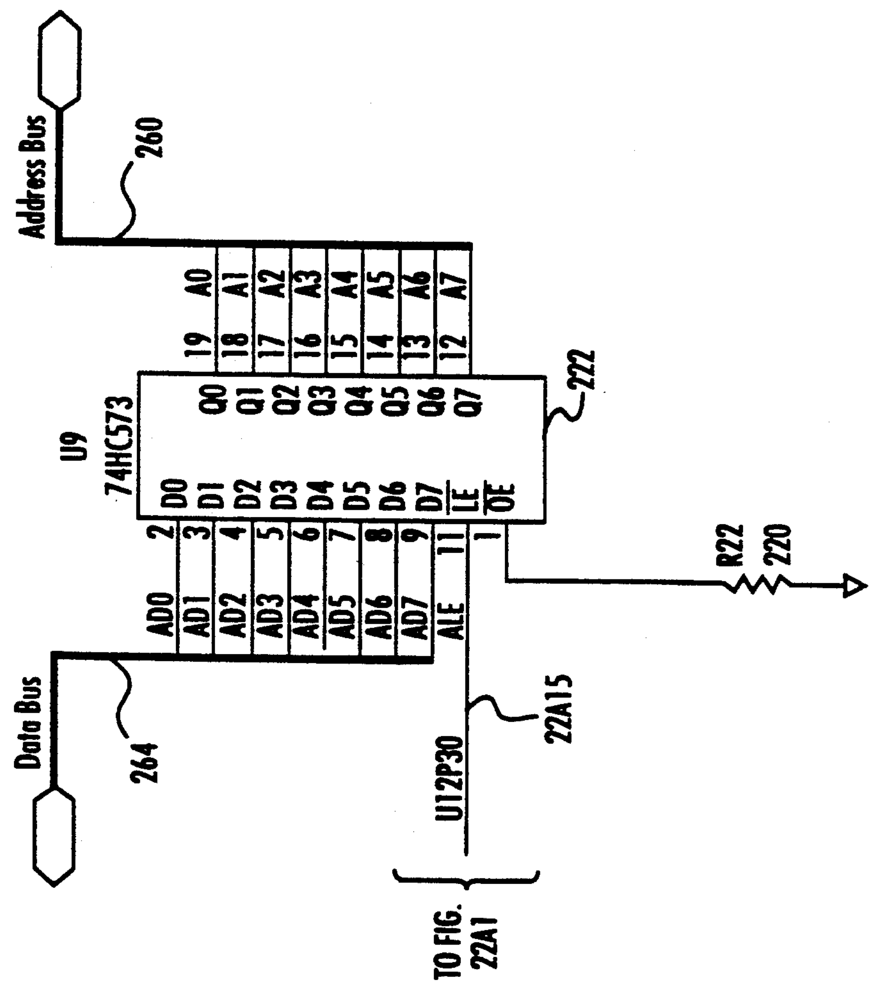
FIG. 22A5

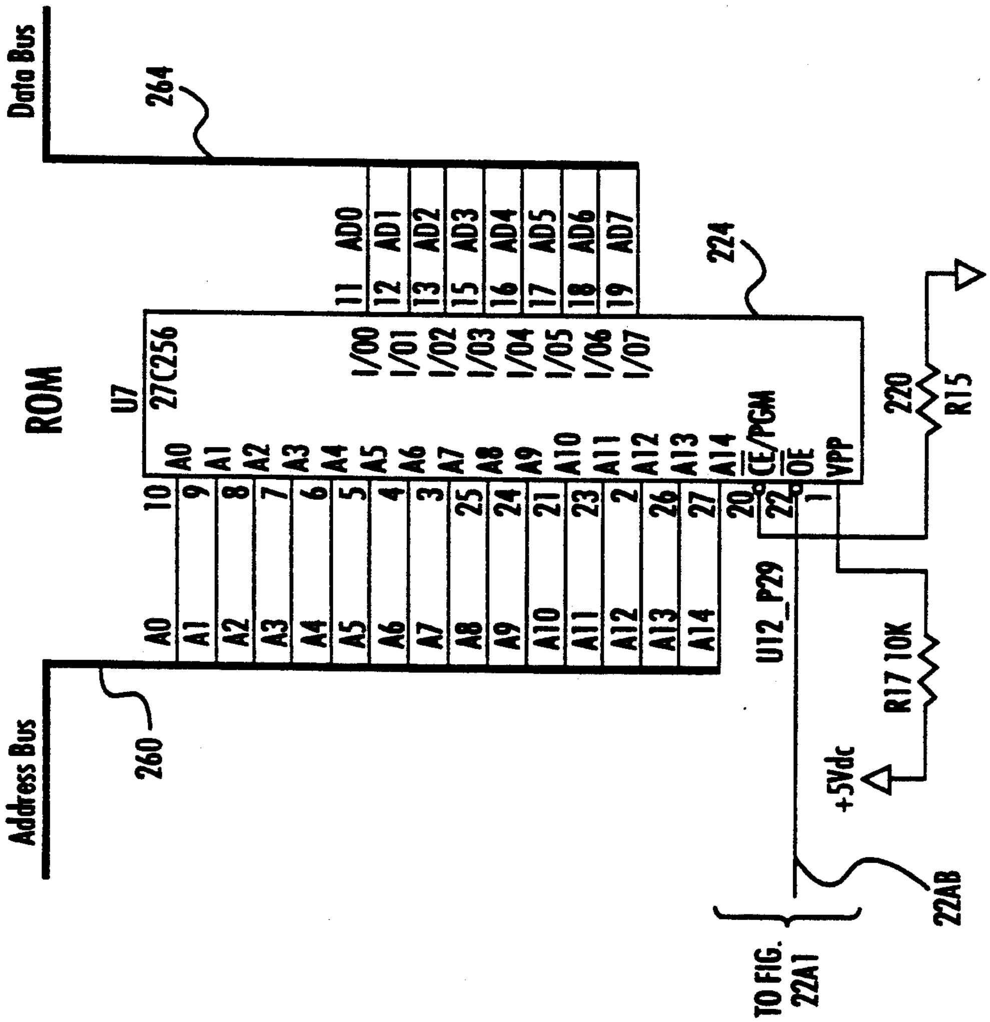
FIG. 22B1

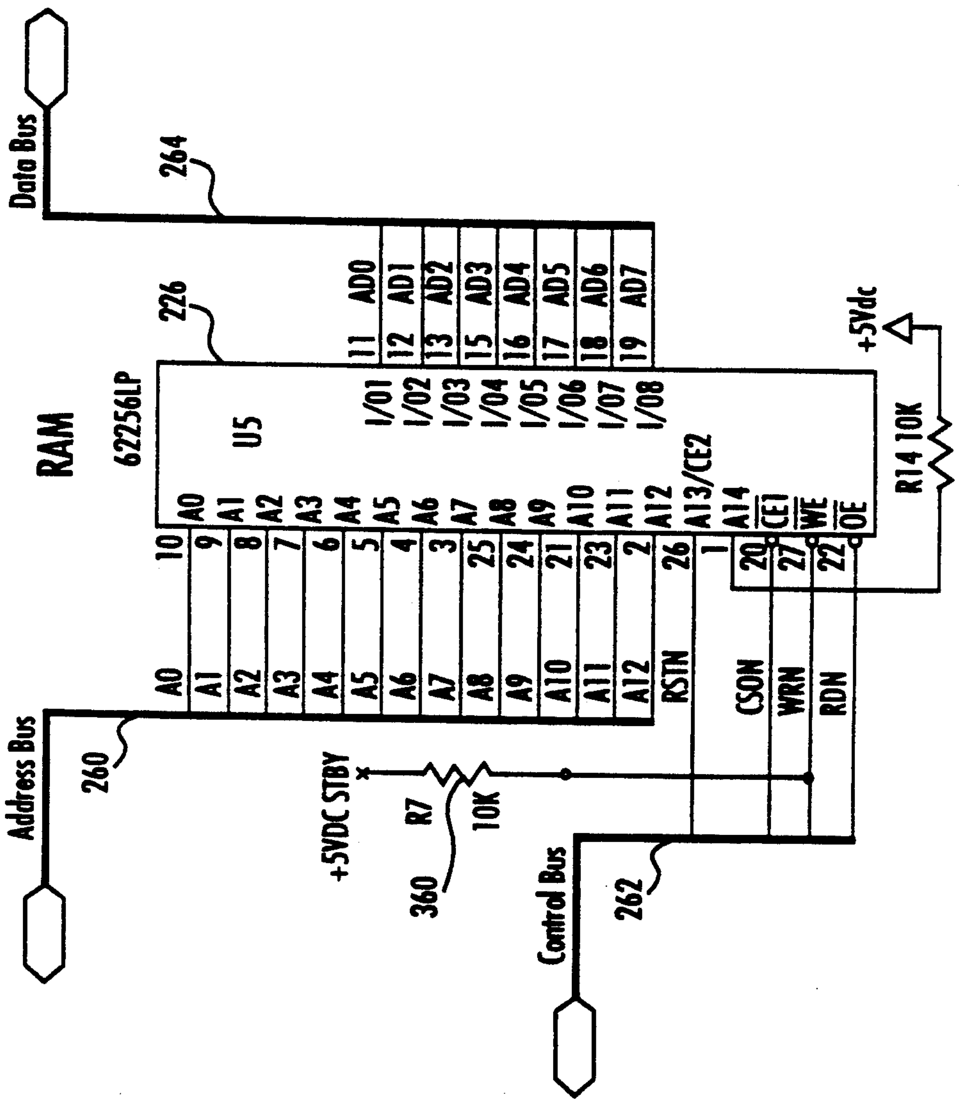
FIG. 22B2

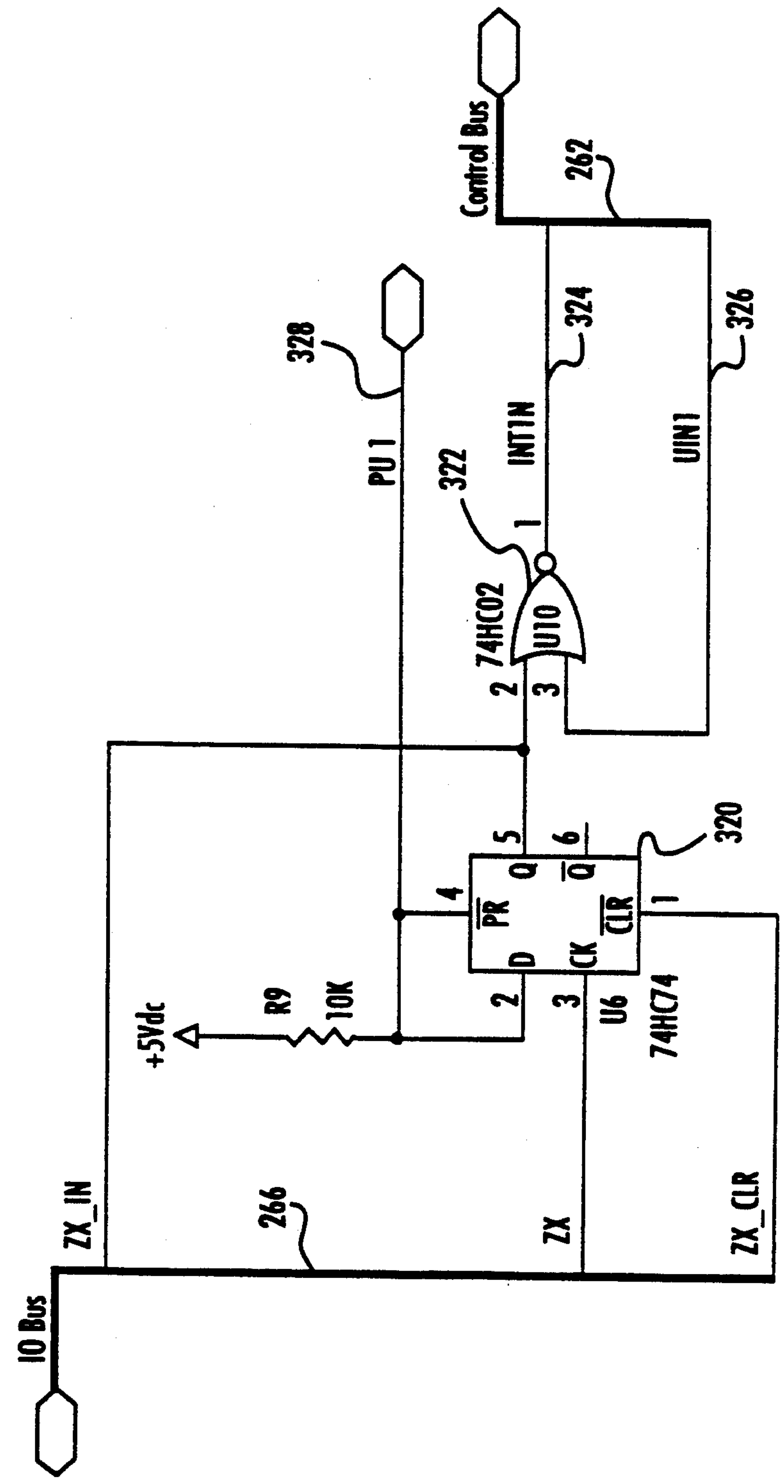
FIG. 22B3

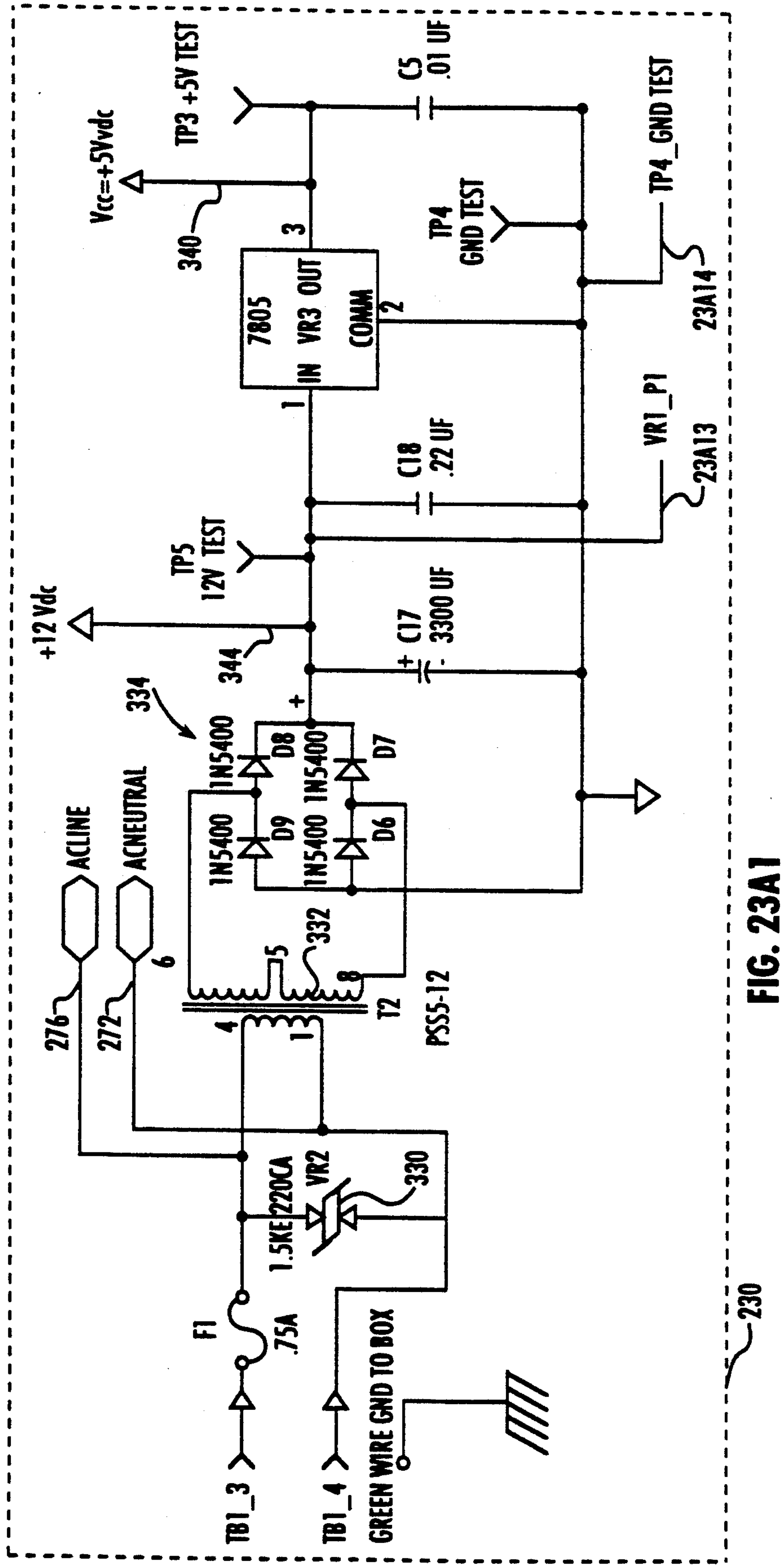
FIG. 23A1

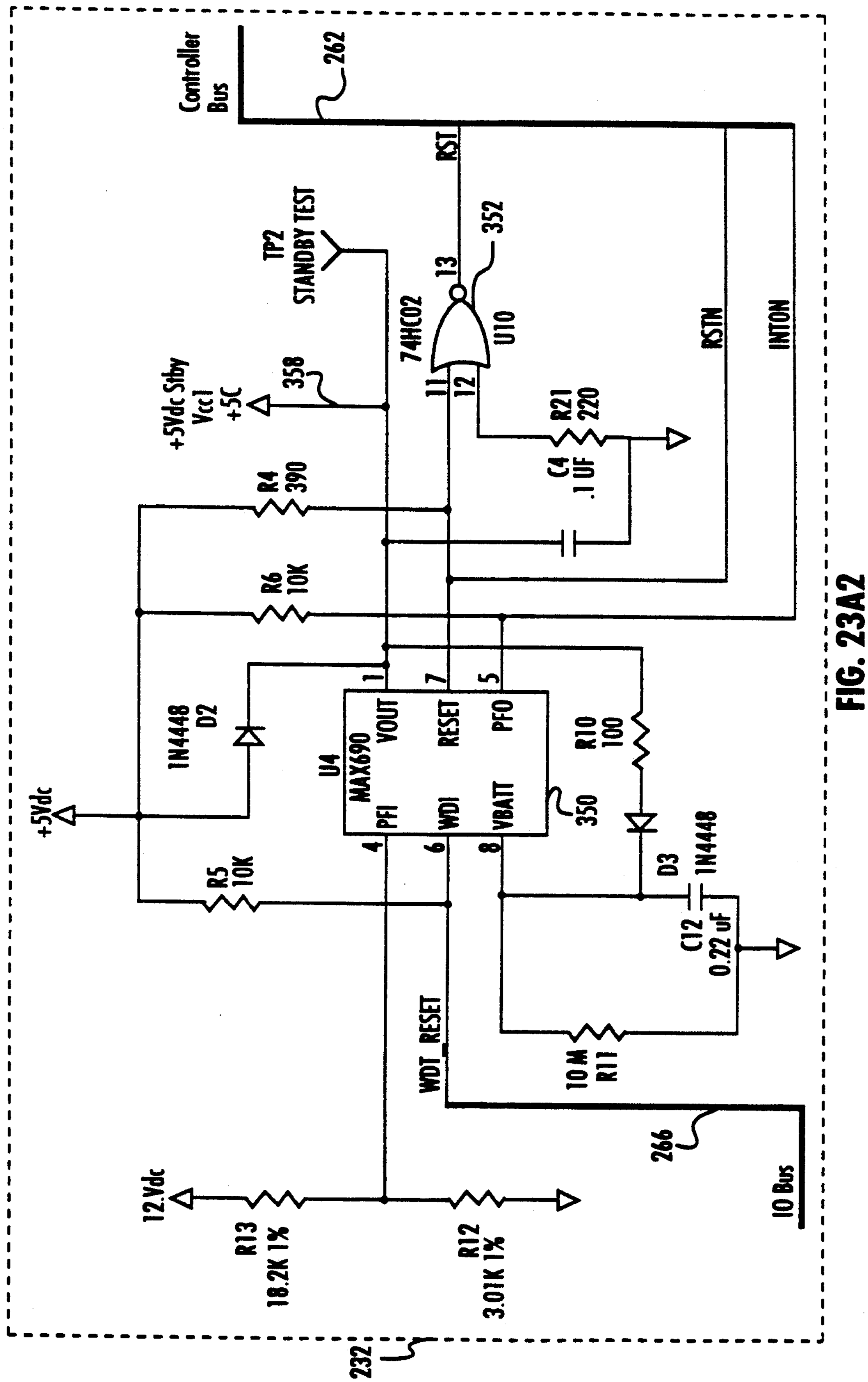
FIG. 23A2
232

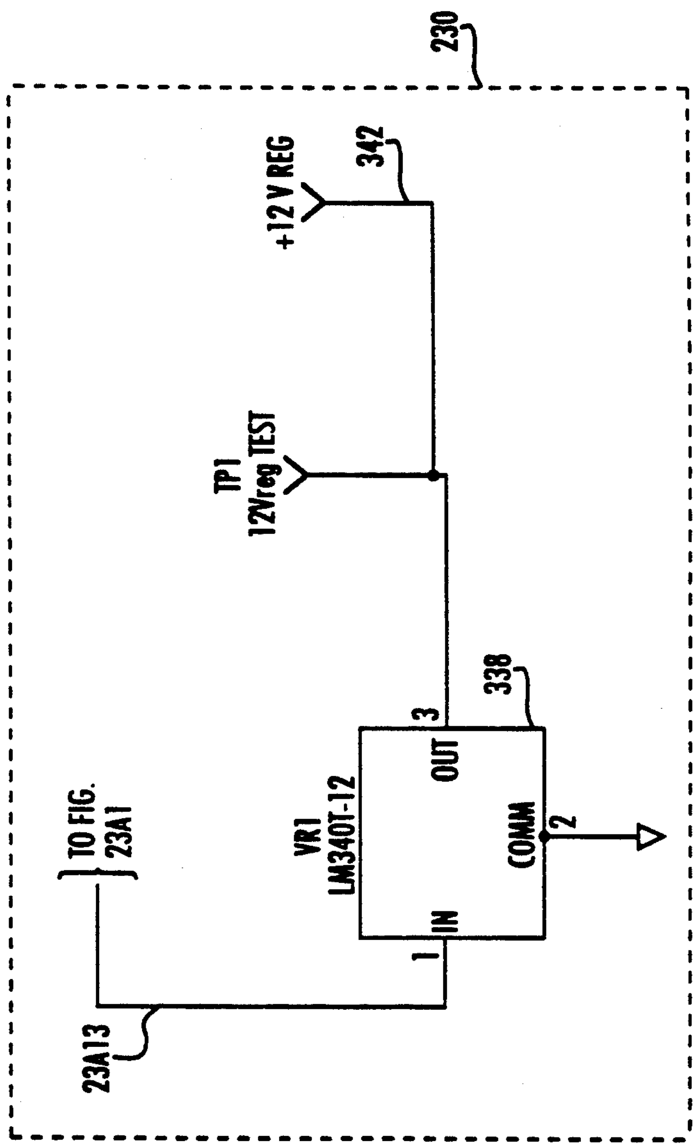
FIG. 23A3

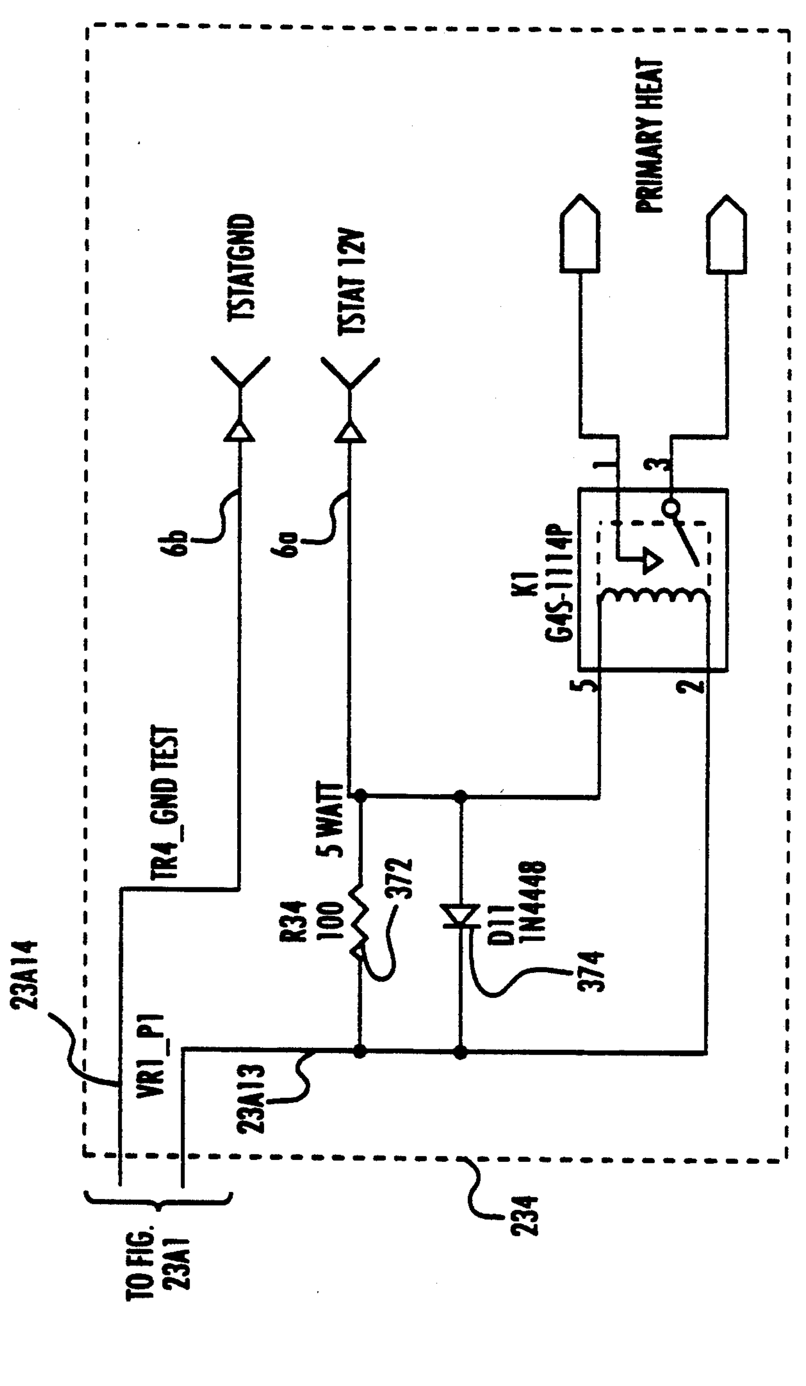
FIG. 23A4

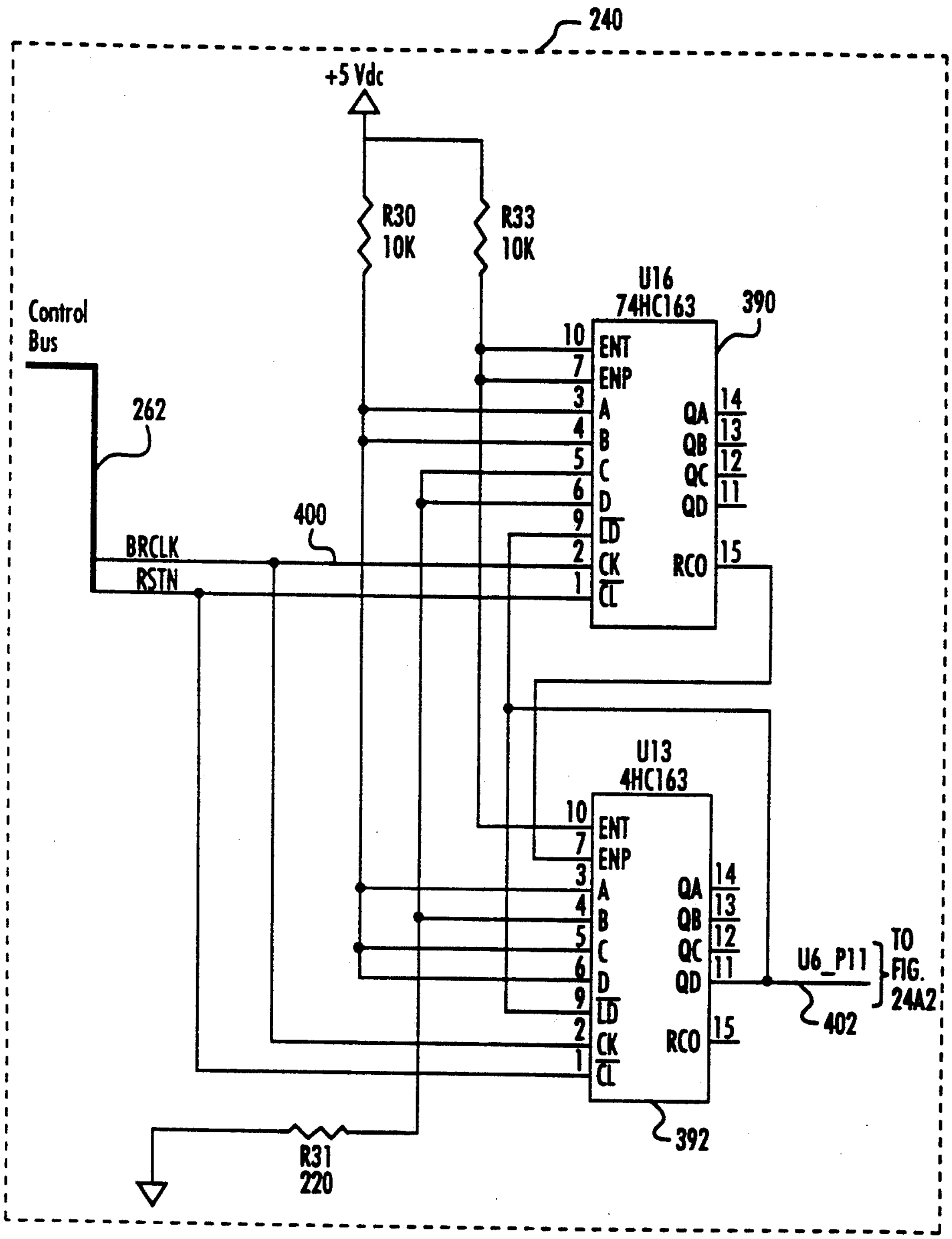
FIG. 24A1

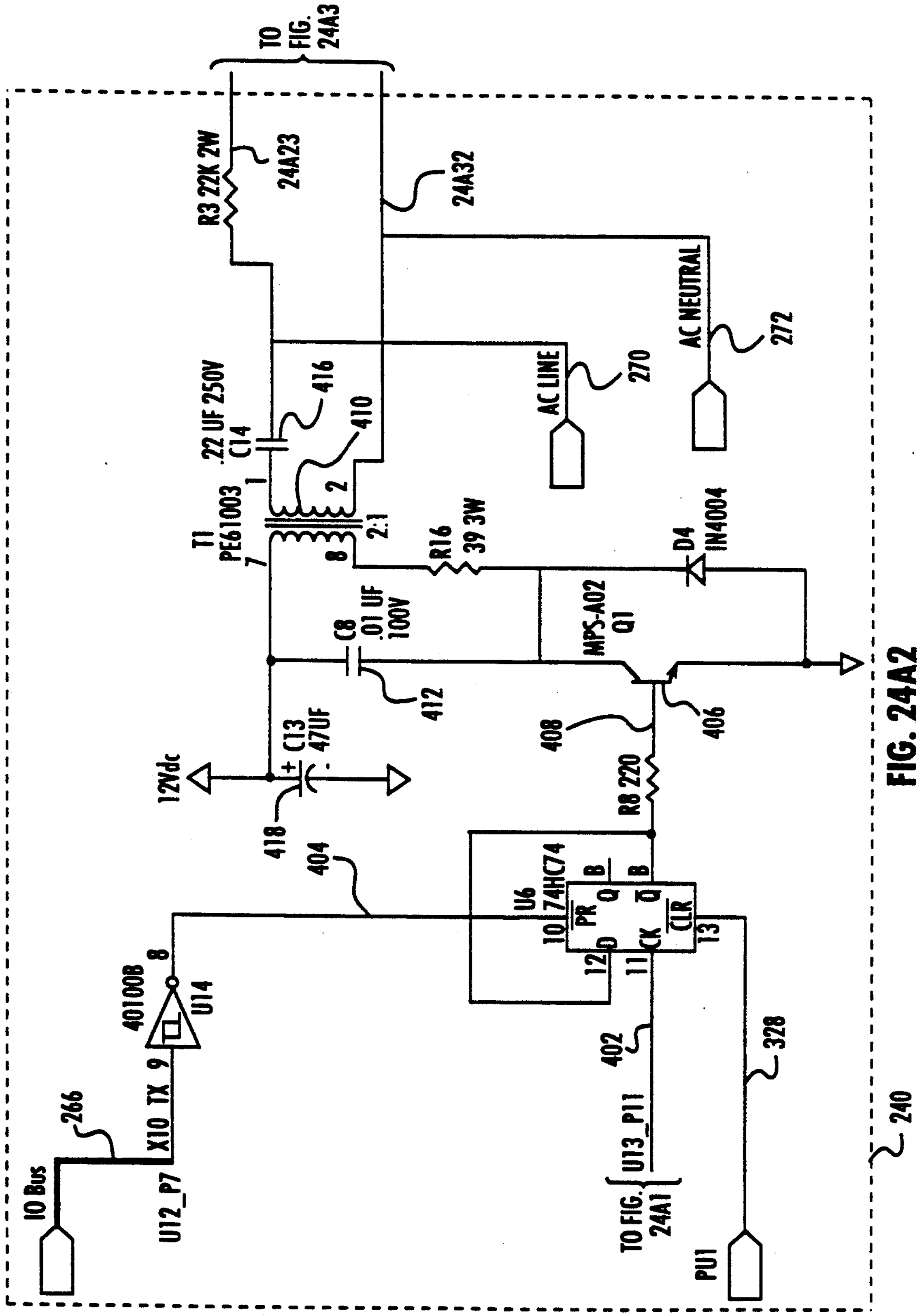
FIG. 24A2

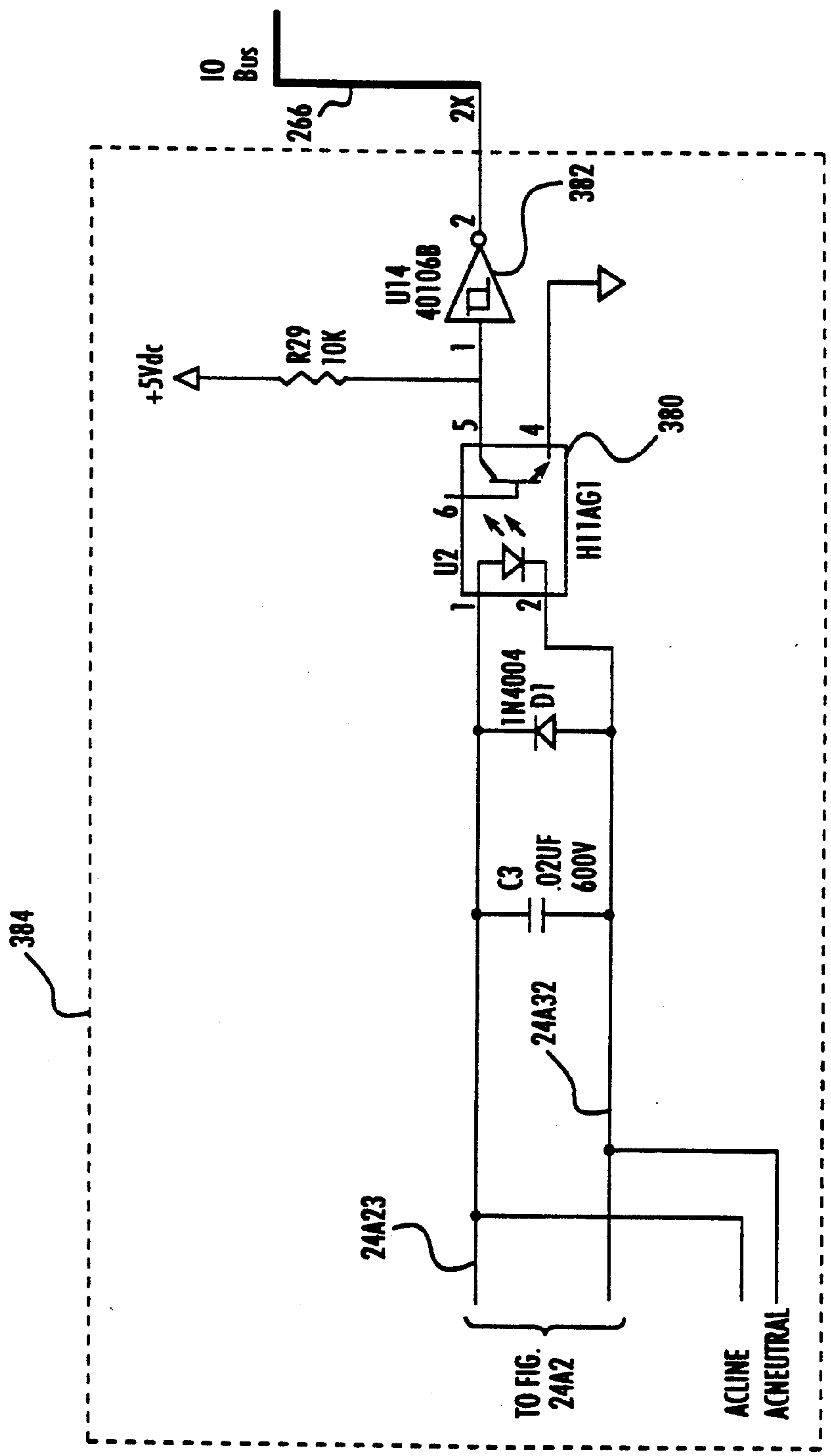
FIG. 24A3

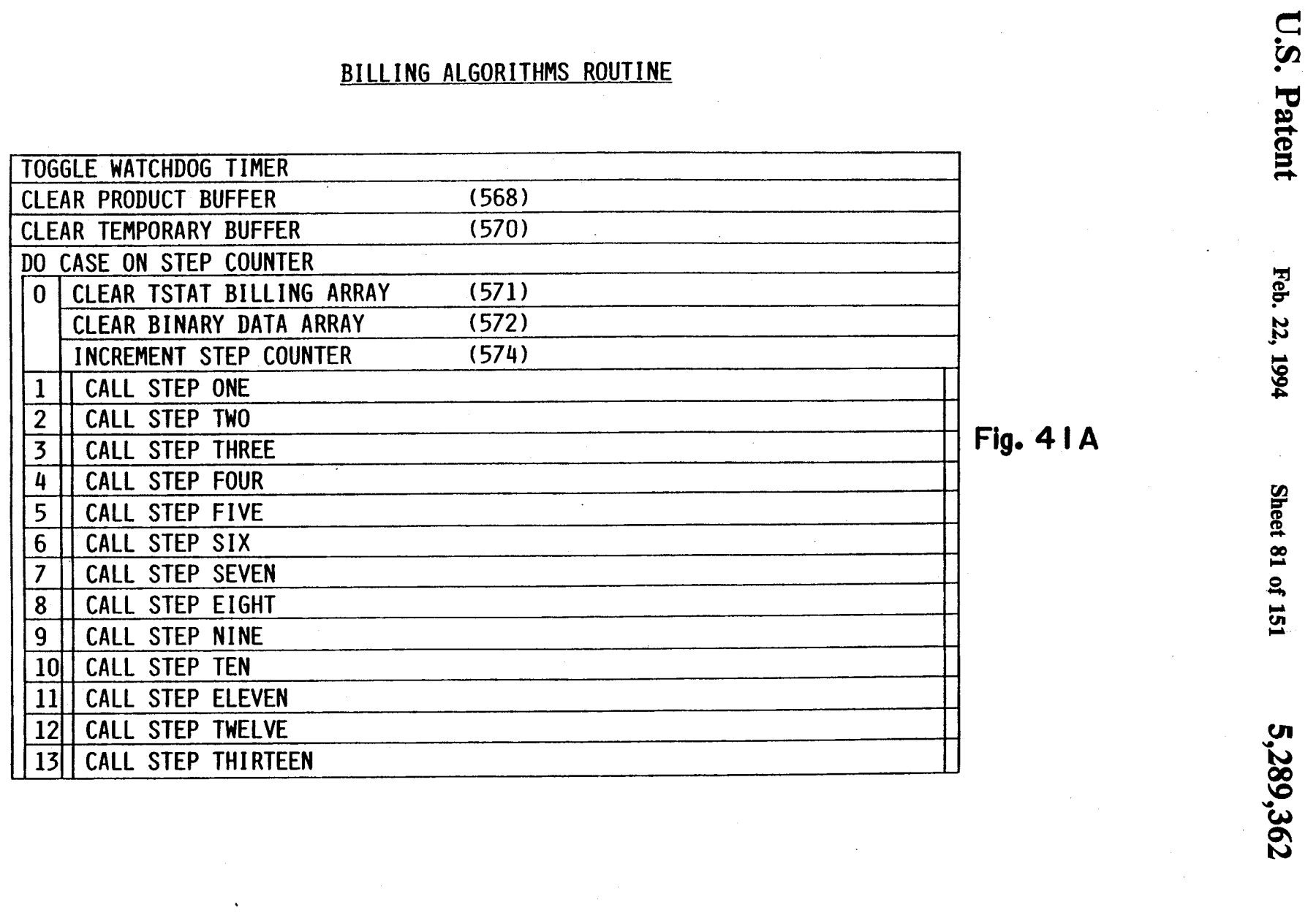

BILLING ALGORITHMS ROUTINE

| | | |
|---|---|---|
| TOGGLE WATCHDOG TIMER | | |
| CLEAR PRODUCT BUFFER | | (568) |
| CLEAR TEMPORARY BUFFER | | (570) |
| DO CASE ON STEP COUNTER | | |
| 0 | CLEAR TSTAT BILLING ARRAY | (571) |
| | CLEAR BINARY DATA ARRAY | (572) |
| | INCREMENT STEP COUNTER | (574) |
| 1 | CALL STEP ONE | |
| 2 | CALL STEP TWO | |
| 3 | CALL STEP THREE | |
| 4 | CALL STEP FOUR | |
| 5 | CALL STEP FIVE | |
| 6 | CALL STEP SIX | |
| 7 | CALL STEP SEVEN | |
| 8 | CALL STEP EIGHT | |
| 9 | CALL STEP NINE | |
| 10 | CALL STEP TEN | |
| 11 | CALL STEP ELEVEN | |
| 12 | CALL STEP TWELVE | |
| 13 | CALL STEP THIRTEEN | |

Fig. 41A

| | |
|---|---|
| MODIFY FIRST HALF OF PRICING DATA (CALL CONVERT BCD TO BIN) | (576) |
| INCREMENT STEP COUNTER | |

Fig. 41B

| | |
|---|---|
| MODIFY SECOND HALF OF PRICING DATA (CALL CONVERT BCD TO BIN) | (578) |
| INCREMENT STEP COUNTER | |

Fig. 41C

| | |
|---|---|
| MODIFY TIER USAGE DATA (CALL CONVERT BCD TO BINARY) | (580) |
| MODIFY TODAY'S TIER USAGE (CALL CONVERT BCD TO BINARY) | (582) |
| DO WHILE ALL CURRENT TIER USAGE NOT DETERMINED | (584) |
|     LOAD TODAY'S TIER USAGE AND MONTHLY TIER USAGE | |
|     CALL SUBTRACTION | |
|     STORE CURRENT TIER USAGE | |
|     ADJUST POINTER | |
| | (585) |
| INCREMENT STEP COUNTER | |

Fig. 41D

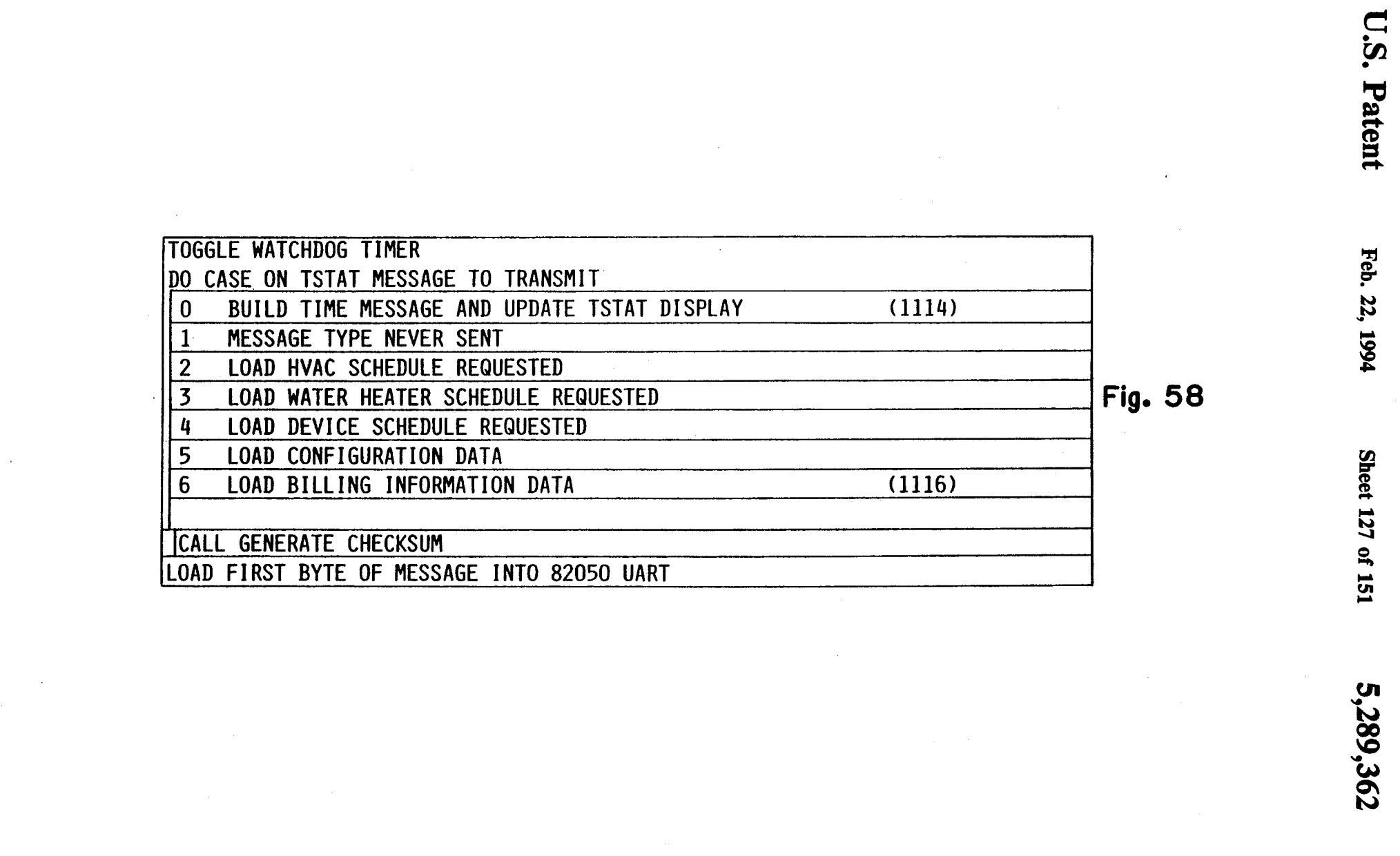

| | | |
|---|---|---|
| TOGGLE WATCHDOG TIMER | | |
| DO CASE ON TSTAT MESSAGE TO TRANSMIT | | |
| 0 | BUILD TIME MESSAGE AND UPDATE TSTAT DISPLAY | (1114) |
| 1 | MESSAGE TYPE NEVER SENT | |
| 2 | LOAD HVAC SCHEDULE REQUESTED | |
| 3 | LOAD WATER HEATER SCHEDULE REQUESTED | |
| 4 | LOAD DEVICE SCHEDULE REQUESTED | |
| 5 | LOAD CONFIGURATION DATA | |
| 6 | LOAD BILLING INFORMATION DATA | (1116) |
| | | |
| CALL GENERATE CHECKSUM | | |
| LOAD FIRST BYTE OF MESSAGE INTO 82050 UART | | |

Fig. 58

DO CASE FOR TRANSMITTING BSR CYCLE TYPE

| Cycle state | Step | Action | Ref. |
| --- | --- | --- | --- |
| 0 DO CASE FOR BSR CYCLE STATE ZERO | | | |
| | 0 | TURN OFF X.10 TRANSMITTER | (1322) |
| | | DISABLE TIMER INTERRUPT | |
| | 1 | TURN ON X.10 TRANSMITTER | |
| | | LOAD 1.000 MS TIMER | |
| | 2 | TURN OFF X.10 TRANSMITTER | |
| | | LOAD 1.778 MS TIMER | |
| | 3 | TURN ON X.10 TRANSMITTER | |
| | | LOAD 1.000 MS TIMER | |
| | 4 | TURN OFF X.10 TRANSMITTER | |
| | | LOAD 1.778 MS TIMER | |
| | 5 | TURN ON X.10 TRANSMITTER | |
| | | LOAD 1.000 MS TIMER | (1320) |
| 1 DO CASE FOR BSR CYCLE STATE ONE | | | |
| | 0 | TURN OFF X.10 TRANSMITTER | (1326) |
| | | DISABLE TIMER INTERRUPT | |
| | 1 | TURN ON X.10 TRANSMITTER | |
| | | LOAD 1.000 MS TIMER | |
| | 2 | TURN OFF X.10 TRANSMITTER | |
| | | LOAD 1.778 MS TIMER | |
| | 3 | TURN ON X.10 TRANSMITTER | |
| | | LOAD 1.000 MS TIMER | |
| | 4 | TURN OFF X.10 TRANSMITTER | |
| | | LOAD 1.778 MS TIMER | (1324) |

Fig. 64A

| | | |
|---|---|---|
| 2 DO CASE FOR BSR CYCLE STATE START | | |
| 0 | TURN OFF X.10 TRANSMITTER | (1330) |
| | DISABLE TIMER INTERRUPT | |
| 1 | TURN ON X.10 TRANSMITTER | |
| | LOAD 1.000 MS TIMER | |
| 2 | TURN OFF X.10 TRANSMITTER | |
| | LOAD 1.778 MS TIMER | |
| 3 | TURN ON X.10 TRANSMITTER | |
| | LOAD 1.000 MS TIMER | |
| 4 | TURN OFF X.10 TRANSMITTER | |
| | LOAD 1.778 MS TIMER | |
| 5 | TURN ON X.10 TRANSMITTER | |
| | LOAD 1.000 MS TIMER | |
| 6 | TURN OFF X.10 TRANSMITTER | |
| | LOAD 1.778 MS TIMER | |

Fig. 64B

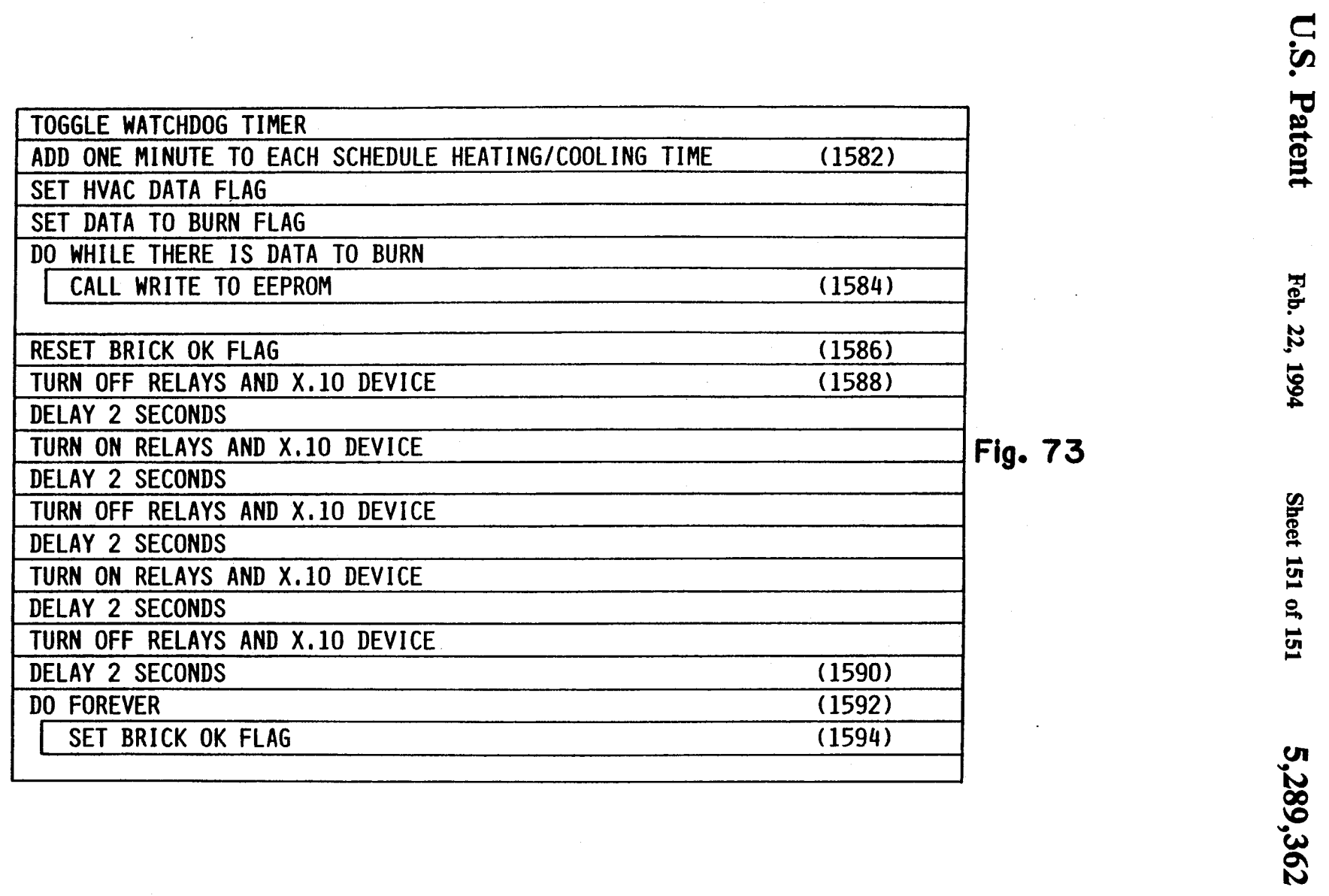

| | |
|---|---|
| TOGGLE WATCHDOG TIMER | |
| ADD ONE MINUTE TO EACH SCHEDULE HEATING/COOLING TIME | (1582) |
| SET HVAC DATA FLAG | |
| SET DATA TO BURN FLAG | |
| DO WHILE THERE IS DATA TO BURN | |
|   CALL WRITE TO EEPROM | (1584) |
| RESET BRICK OK FLAG | (1586) |
| TURN OFF RELAYS AND X.10 DEVICE | (1588) |
| DELAY 2 SECONDS | |
| TURN ON RELAYS AND X.10 DEVICE | |
| DELAY 2 SECONDS | |
| TURN OFF RELAYS AND X.10 DEVICE | |
| DELAY 2 SECONDS | |
| TURN ON RELAYS AND X.10 DEVICE | |
| DELAY 2 SECONDS | |
| TURN OFF RELAYS AND X.10 DEVICE | |
| DELAY 2 SECONDS | (1590) |
| DO FOREVER | (1592) |
|   SET BRICK OK FLAG | (1594) |

Fig. 73

ENERGY CONTROL SYSTEM

BACKGROUND OF THE INVENTION

Conventional home and small business HVAC and appliance systems operate in response to settings or demands made by the home owner or other consumer of electric energy. The user simply chooses the parameters (e.g. temperature and on-off times) for the various HVAC components and appliances. This choice is made essentially on the basis of the consumer's conception of comfort. Energy costs are a secondary factor in the choice, or are ignored.

Energy is wasted and energy costs increased by such choices. For example, the home may be heated or cooled to a particular temperature throughout the day, even though it is not used most of the time. Moreover, the home may be heated or cooled during time periods when energy cost is the highest, again even though no one is at home at the time. By way of another example, an electric hot water heater or other electrical energy using apparatus may be operated when energy costs are the highest and the operation is not necessary.

In short, presently available appliances and HVAC systems are usually activated and deactivated without consideration of the energy costs involved. There is no communication system linking the power company and the home, so that on-going or present utility rates are not known by the consumer. Accordingly, the consumer cannot select alternate, cost saving operating cycles for appliances and HVAC systems.

SUMMARY OF THE INVENTION

Accordingly, it is an object of this invention to provide an energy management system for a residential or commercial location in which the system's components automatically respond to variable electric power rates.

Another object of the invention is to provide a home utility management system in which the home owner can control the HVAC, home appliances and energy consuming devices to balance comfort and economy.

It is a further object of the invention to provide a system for the optional, direct control of consumer operated electric appliances.

A further object of the invention is to provide a home energy system operating on real time electric load and rate information.

Yet another object of the invention is to provide an operating system for home or business use in which the customer can review the present amount of energy use and its cost, as well as review the projected monthly energy bill.

It is a further object of the invention to provide an energy supply system in which the commercial supplier of electricity can selectively market energy in times of high excess capacity and deter energy use when the reserve capacity is low.

Another object of the invention is to provide an energy supply system in which a home owner's needs are met by a fully automated power supply, permitting communication between the supplier and the user and providing rate tier information and calculations.

The integrated system of the invention minimizes electric power costs by enabling a consumer to select the amount of power desired in accordance with the rate prevailing at that time. As later explained, the consumer is presented with four electric power rates, called energy cost "tiers." The consumer selects the desired temperature for heating and/or cooling at each tier, and for each of the selectable time periods, morning, day, evening, and night for both weekend and weekday.

These tiers vary have an associated energy cost as determined by the utility based upon considerations such as customer demand, weather and other factors. In the description of the invention that follows, the four cost tiers are referred to as "low", "medium", "high" and "critical" in ascending order of cost.

A consumer might, for example, set the control system for more air conditioning (a lower temperature) when the electric power rate at a particular time is low, and set a higher temperature to be operative if a higher cost tier is in effect. In the winter, a cooler interior environment can be tolerated by the consumer as an energy saving strategy when the rates are high. Conversely, lower energy rates will induce a customer to enjoy a warmer home.

The energy management system of the invention is capable of automatic operation. It constantly optimizes the relationship between comfort and energy costs. In operation, the power company, through telephonic or other communication means, informs the system at the user site as to the current cost tier in effect. While a four tier system has proven desirable, other numbers of cost tiers can be used.

The tiers may, for example, represent different energy rates for different locales. The low tier, may for instance, represent a rate of 5 cents per KWH in one locale and 3 cents per KWH elsewhere. A low tier represents the lowest power rate available to a particular consumer.

The consumer sets her/his comfort and economy choices according to the tier structure. The system automatically senses changes in the rates (communicated by the power company) and adjust the temperature in accordance with the newly communicated tier structure. Typically, a consumer might choose an air conditioning temperature setting of 70° F. at the lowest price, 72° F. at the medium price, 78° F. at a high price and 80° F., or perhaps no air conditioning at all, at the critical price.

The control system of the invention may also be programmed to schedule activation and deactivation of various appliances and devices in accordance with time of day schedules. Such settings can be made for hot water heaters, pool pumps, lights etc.

The system can also be called upon by the consumer to provide an up-to-date electric bill and the usage in each tier for the current bill. A monthly bill can be generated on the basis of the tier rates and usage since the last billing period.

The control system, thus, monitors energy rate changes and adjusts temperature, or turns appliances on and off, at predetermined times.

The control system in accordance with the invention employs an HVAC algorithm which further enhances cost savings. When the control system is within 2 to 3 hours of a scheduled change from one tier to another, the control system looks ahead to minimize energy costs. The system calculates whether or not it would be more economical to commence heating or cooling earlier than the scheduled time. The system utilizes past HVAC history to determine the time need, on average, to heat or cool the premises 1° F.

Temperatures are constantly sensed by the thermostat of the control system. Temperature indications from the thermostat may also be calculated by a smoothing algorithm. In such cases a temperature reading represents an average of the present and most recent temperatures. Such procedure serves to guard against a temperature spike being taken as the current temperature.

The control system in accordance with the invention can also employ an algorithm for controlling other electrical apparatus such as hot water heaters or appliances. This algorithm controls the apparatus to reduce costs by operating the apparatus during a low tier cost period if possible.

In accordance with the invention, there is provided a control system for controlling a climate control device such as an HVAC device within a premise. By way of example, the term premise can refer to a residential or a commercial location with one or more buildings, such as a house with a utility building or a strip mall with a group of buildings. The said climate control device is supplied with electricity via a utility at various price tiers and said utility provides real time price tier data to said control system. The control system comprises:

a) a display device for displaying
   1) time of day data,
   2) price tier identifying data for identifying price tiers representing at least the relative cost of electricity from one price tier to the next price tier, and
   3) set point temperature data corresponding to each of said price tier identifying data, b) an input device for inputting
   1) the time of day data for defining time intervals,
   2) the set point temperature data corresponding to each price tier identifying data and corresponding to each of the time of day data, the set point temperature data indicative of the desired temperature corresponding to each price tier for each time interval, c) a temperature sensing device for sensing the temperature within said premise and for producing actual temperature data indicative of said sensed temperature;

d) a clock device for maintaining a real time clock and for generating real time clock data corresponding thereto, and e) a control unit
   1) connected to said input device for receiving the time of day data and the set point temperature data,
   2) connected to the temperature sensing device for receiving the actual temperature data,
   3) connected to the clock device for receiving the real time clock data,
   4) connected to the utility for receiving the real time price tier data, and
   5) connected to the climate control device for controlling the climate control device for regulating the temperature within the premise in accordance with
      (a) the set point temperature data for a corresponding price tier identifying data and a corresponding time of day data and
      (b) the actual temperature data, the real time price tier data and the real time clock data.

In accordance with another aspect of the invention, the invention may be characterized as a method for controlling a climate control device such as an HVAC device within a premise. The climate control device is supplied with electricity via a utility at various price tiers. The method comprising the steps of:

a) providing real time price tier data from the utility to a control unit which is connected for controlling the climate control device, b) displaying to a user of the control unit
   1) time of day data,
   2) price tier identifying data for identifying price tiers representing at least the relative cost of electricity from one price tier to the next price tier, and
   3) set point temperature data corresponding to each of said price tier identifying data, c) inputting into the control unit
   1) the time of day data for defining time intervals,
   2) the set point temperature data corresponding to each price tier identifying data and corresponding to each of the time of day data, the set point temperature data indicative of the desired temperature corresponding to each price tier for each time interval, d) sensing the temperature within the premise and producing actual temperature data indicative of the sensed temperature;

e) maintaining a real time clock and generating real time clock data corresponding thereto, f) receiving in the control unit the time of day data and the set point temperature data, g) receiving in the control unit the actual temperature data, h) receiving in the control unit the real time clock data, and i) controlling the climate control device via the control unit for regulating the temperature within the premise in accordance with
   (a) the set point temperature data for a corresponding price tier identifying data and a corresponding time of day data and
   (b) the actual temperature data, the real time price tier data and the real time clock data.

In accordance with yet another aspect of the invention, the invention may be characterized as a method for controlling an apparatus having an ON/OFF status. The method includes the steps of:

establishing an apparatus schedule including a plurality of ON/OFF statuses associated with apparatus schedule times for the apparatus, wherein the schedule resides in the second means for storing information;

determining the real time;

providing the controller unit with electrical energy cost data associated with power company schedule times;

establishing energy cost limit data associated with each apparatus schedule time;

storing the energy cost limit data in the second means for storing information;

comparing the real time to the power company schedule times and the apparatus schedule times, and determining the electrical energy cost and the energy cost limit for the real time;

comparing the determined electrical energy cost to the determined energy cost limit;

comparing the real time to the apparatus schedule times and determining the scheduled ON/OFF status of the apparatus for the real time; and manipulating the ON/OFF status of the apparatus to correspond with the scheduled ON/OFF status; wherein the status of the apparatus is set to OFF when the electrical energy cost is greater than the energy cost limit.

BRIEF DESCRIPTION OF THE DRAWINGS

The invention will become clear in reference to the description of the preferred embodiments as illustrated in the drawings wherein nodes and buses are labeled and similarly labeled nodes and buses denote interconnections of the nodes and bases and interconnection of pins on electronic chips are also indicated by a chip and pin number notation and wherein:

FIG. 6 illustrates the factory set cooling schedule for operating the climate control device in accordance with the invention;

FIG. 7 illustrates the factory set heating schedule for operating the climate control device in accordance with the invention;

FIGS. 20A1–20E are schematic diagrams of the thermostat circuitry forming part of the control system of the invention wherein FIGS. 20A1, 20A2 and 20A3 are collectively referred to as FIG. 20A and wherein FIGS. 20B1, 20B2, 20B3, 20B4, 20B5, and 20B6 are collectively referred to as FIG. 20B;

FIGS. 21A1–21B3 are schematic diagrams of the I/O section of the control system in accordance with the invention wherein FIGS. 21A1, 21A2 and 21A3 are collectively referred to as FIG. 21A and FIGS. 21B1, 21B2, and 21B3 are collectively referred to as FIG. 21;

FIGS. 22A1–22B3 are schematic diagrams of the microprocessor section of the control system wherein FIGS. 22A1, 22A2, 22A3, 22A4 and 22A5 are collectively referred to as FIG. 22A and wherein FIGS. 22B1, 22B2 and 22B3 are collectively referred to as FIG. 22B;

FIGS. 23A1–A4 is a scnematic diagram of the power supply and supervisory circuit of the control system wherein FIGS. 23A1, 23A2, 23A3 and 23A4 are collectively referred to as FIG. 23;

FIG. 24A1–24A3 is a schematic diagram of the application module and zero crossing circuitry of the control system in accordance with the invention wherein FIGS. 24A1, 24A2 and 24A3 are collectively referred to as FIG. 24;

Figure 26:
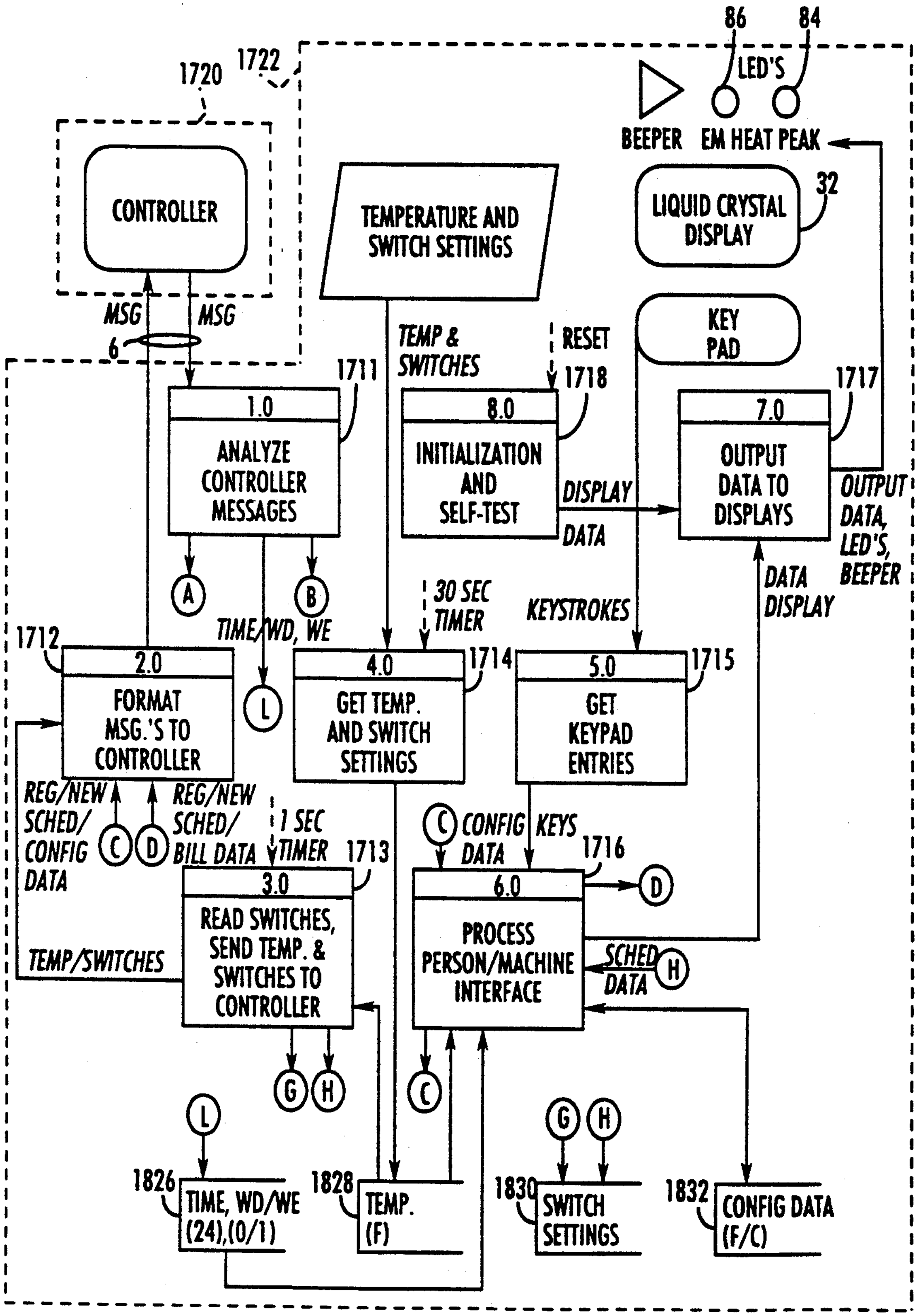
Figure 27:
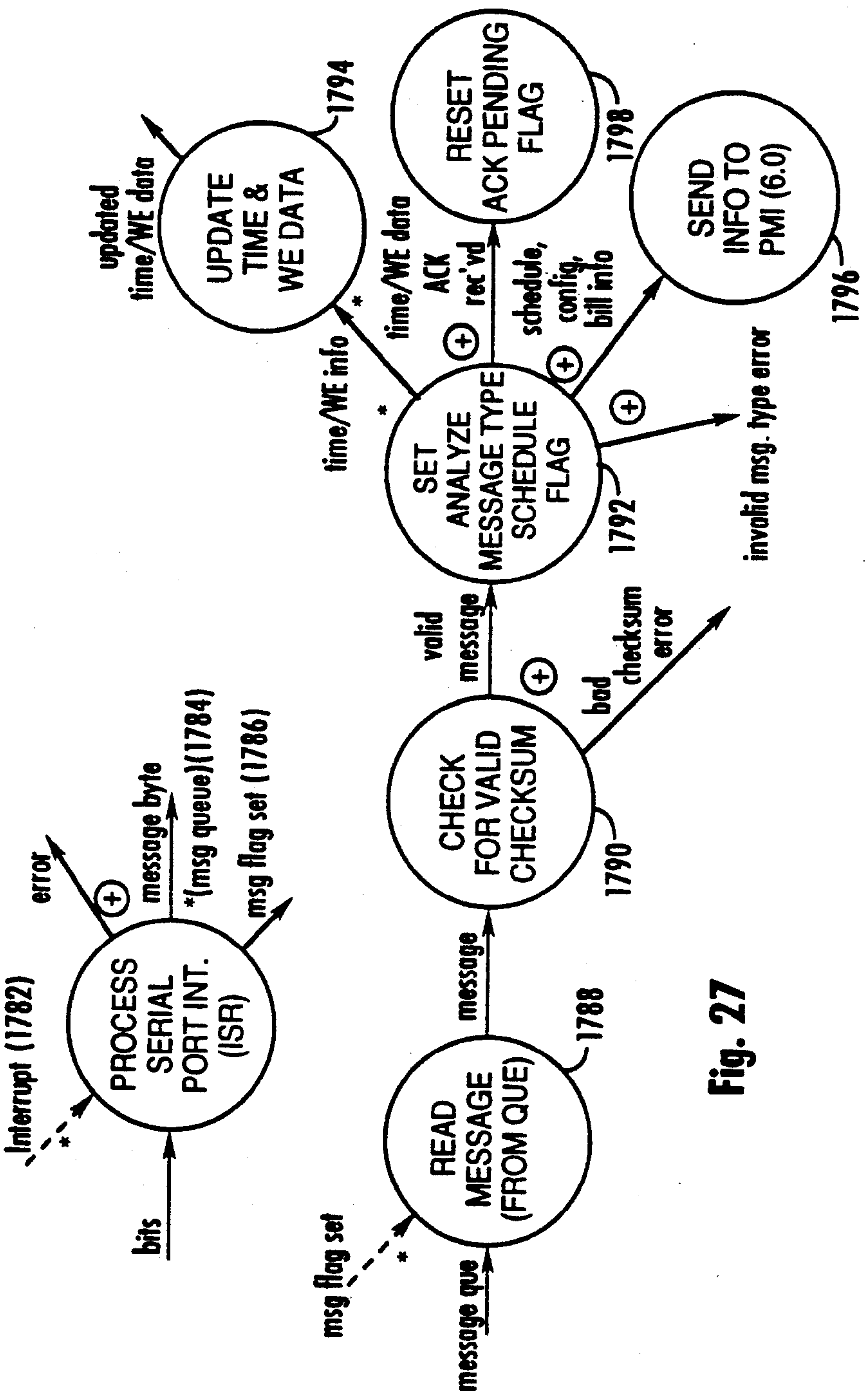
Figure 28:
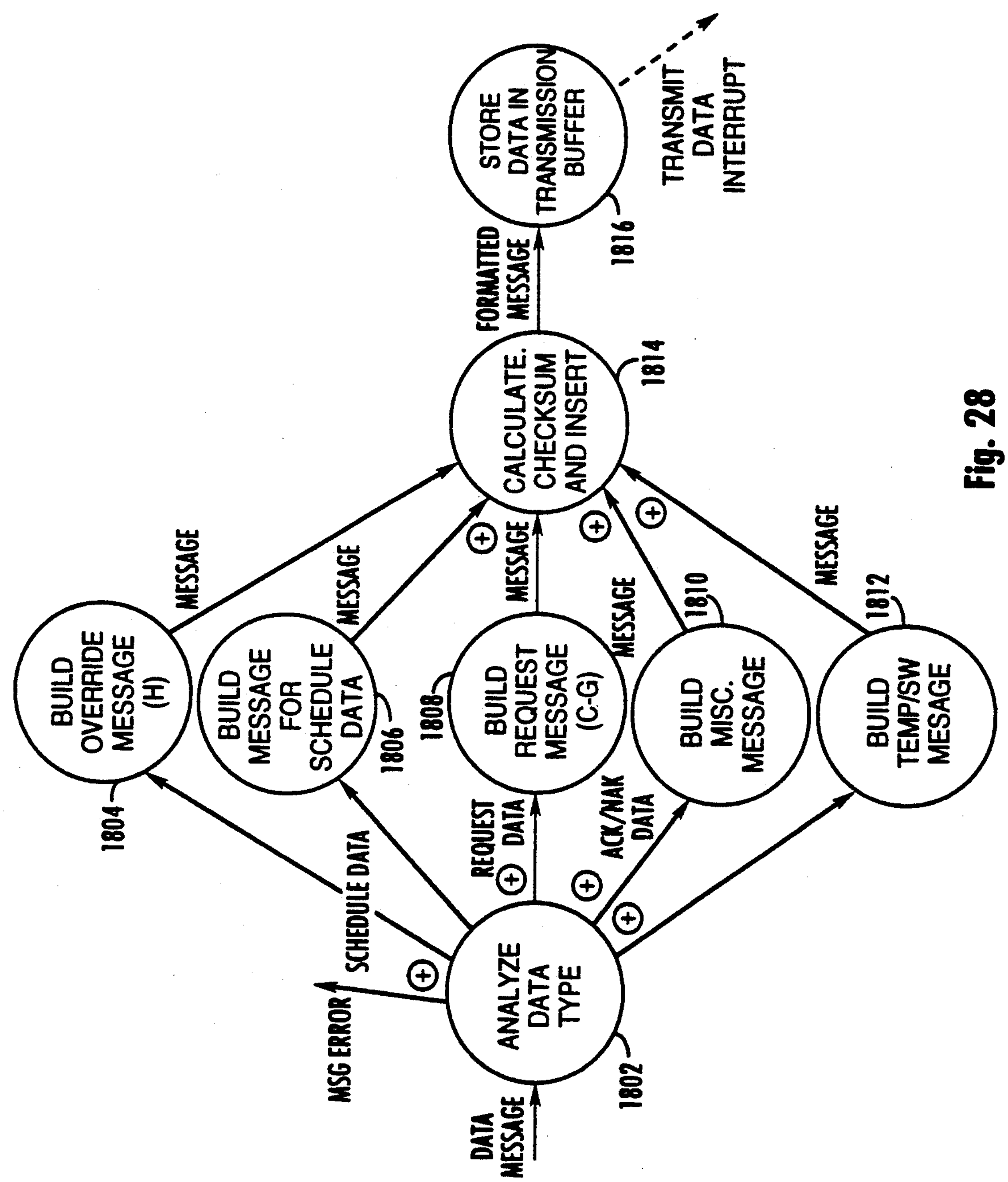
Figure 29:
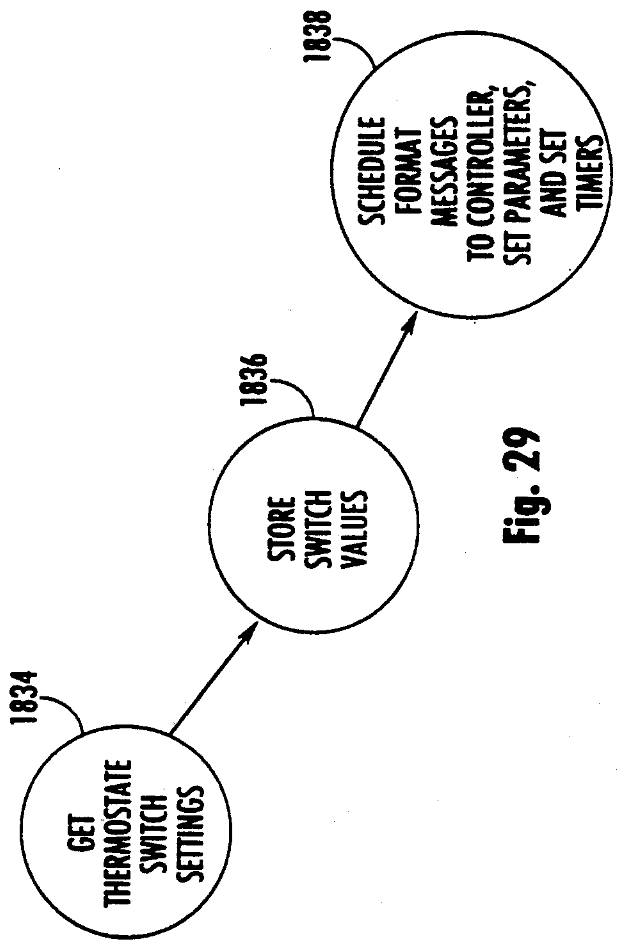
Figure 30:
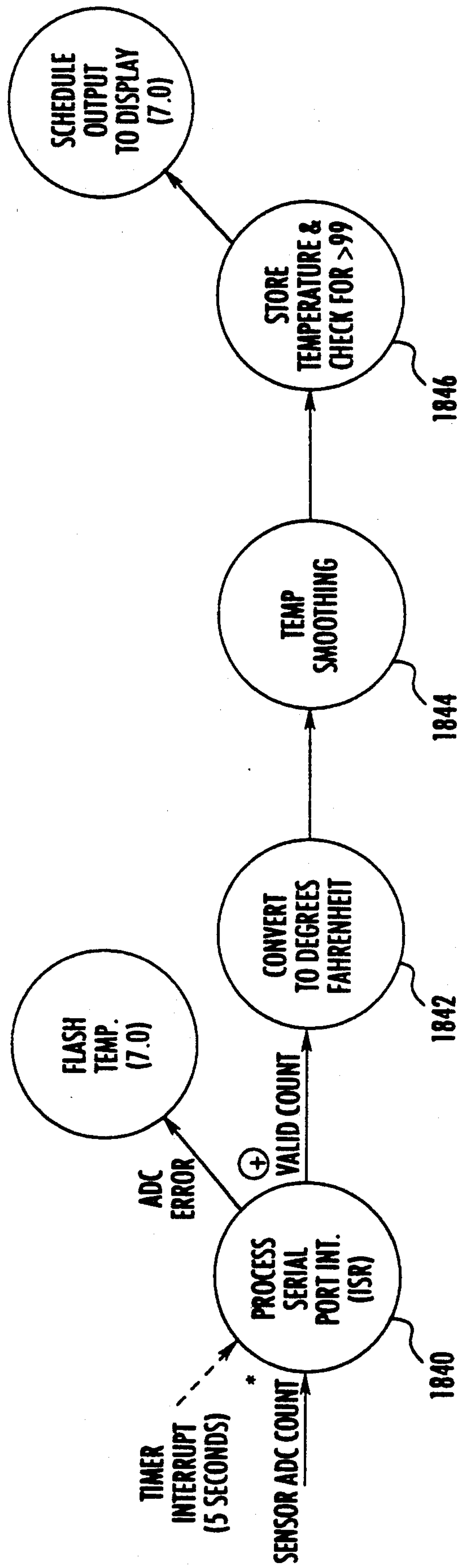
Figure 31:
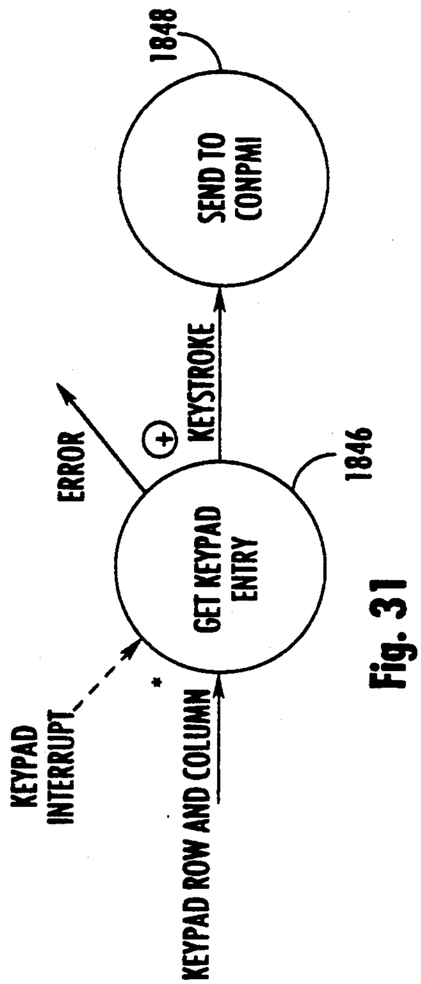
Figure 32:
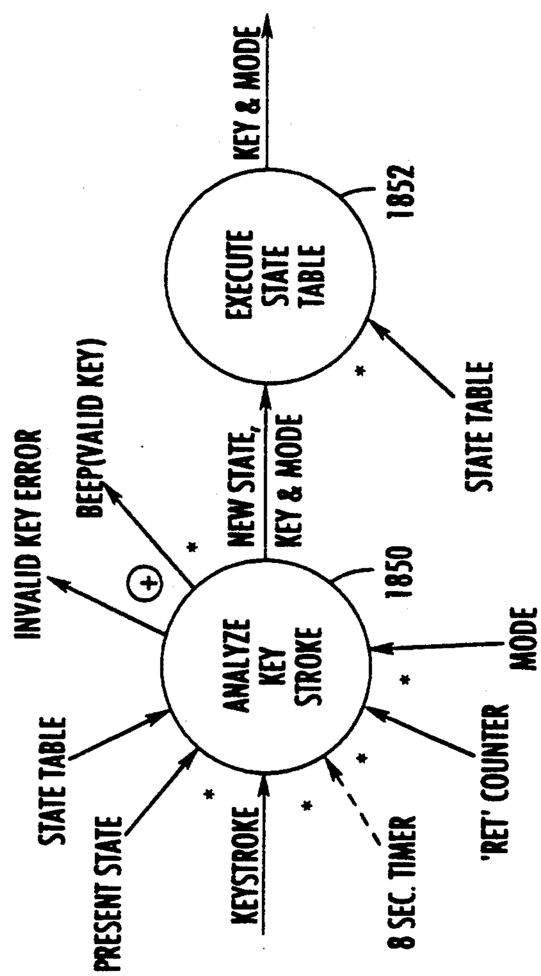
Figure 33:
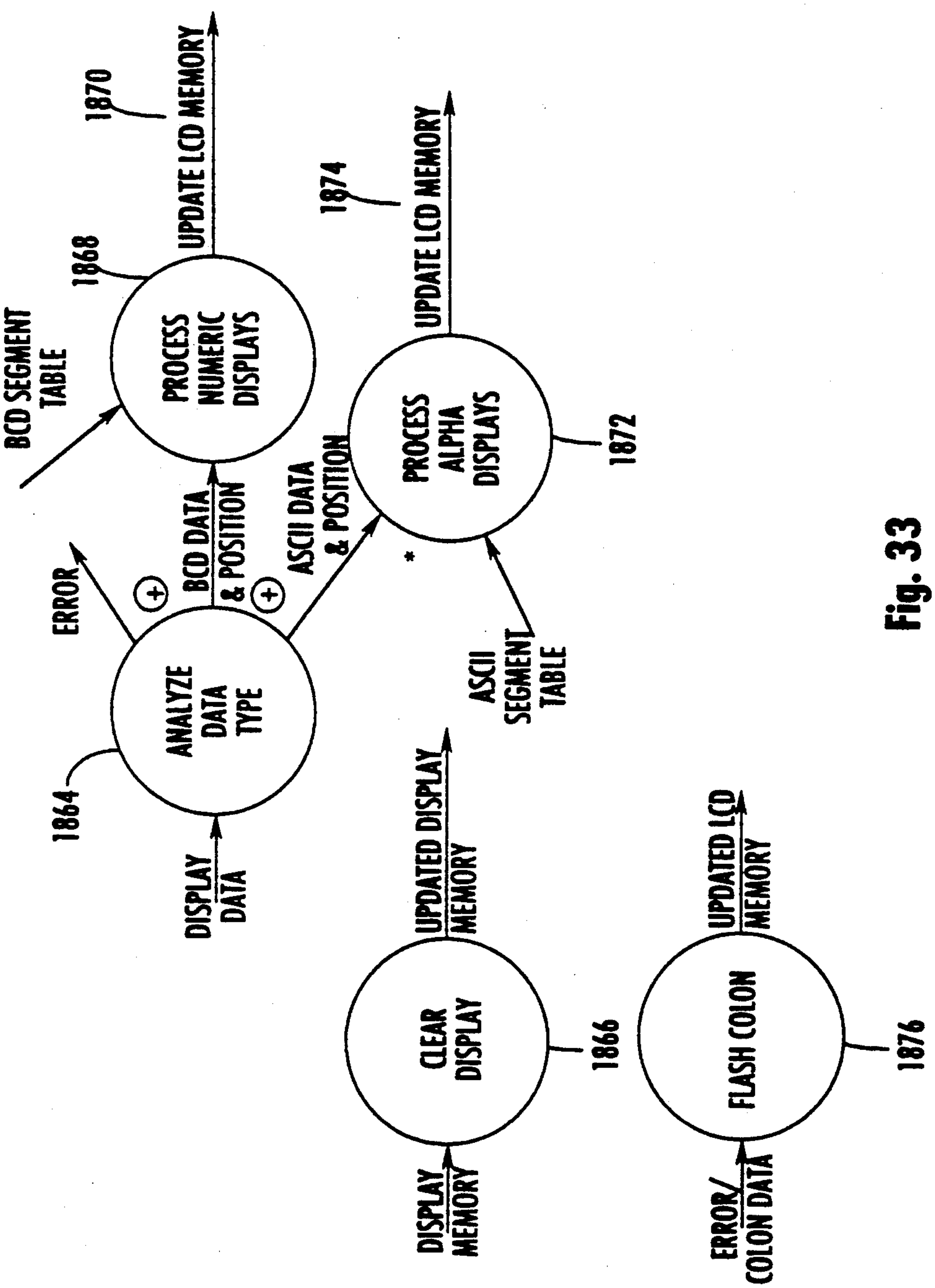
Figure 34:
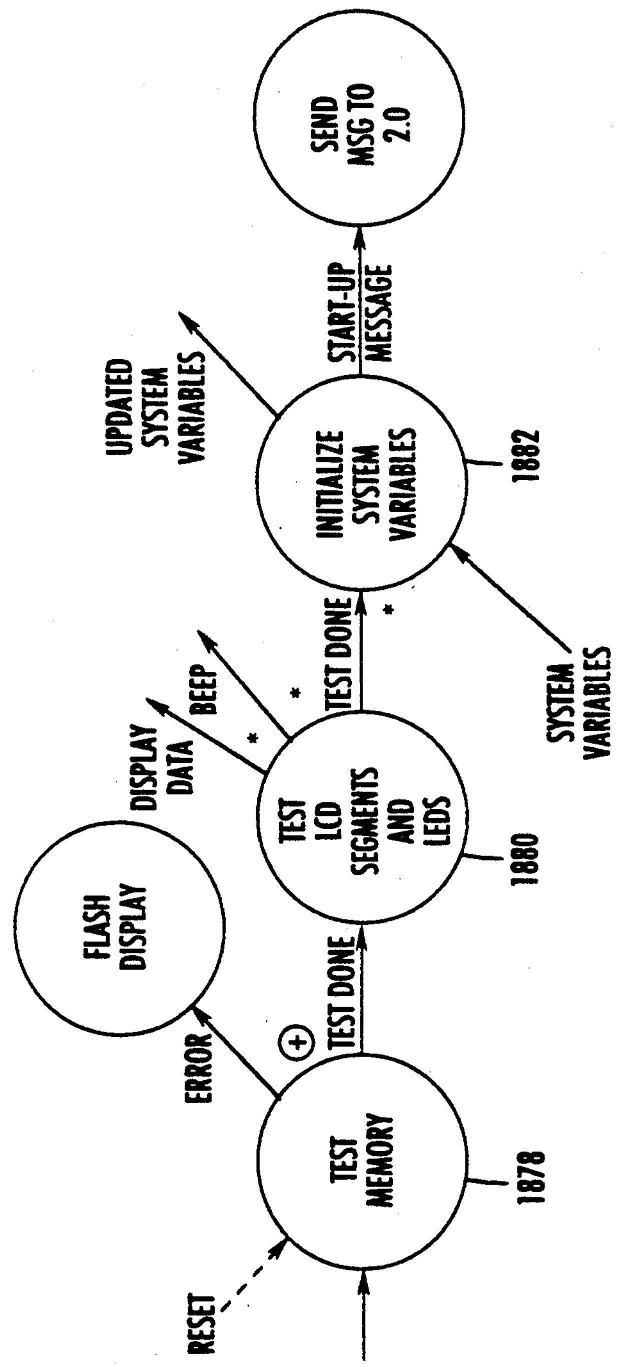
Figure 35:
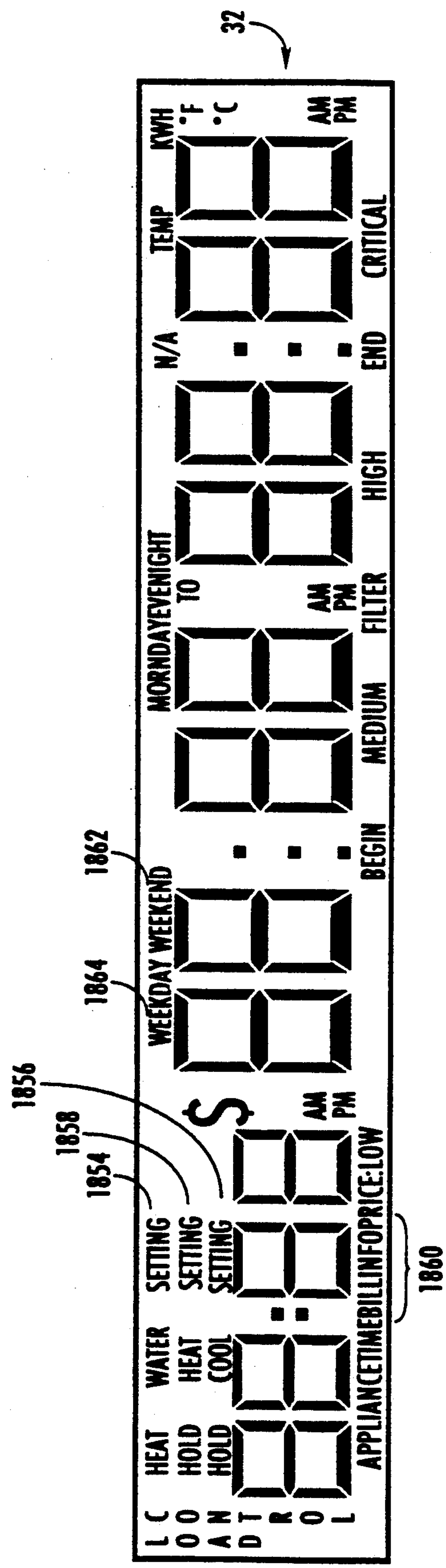
Figure 36A:
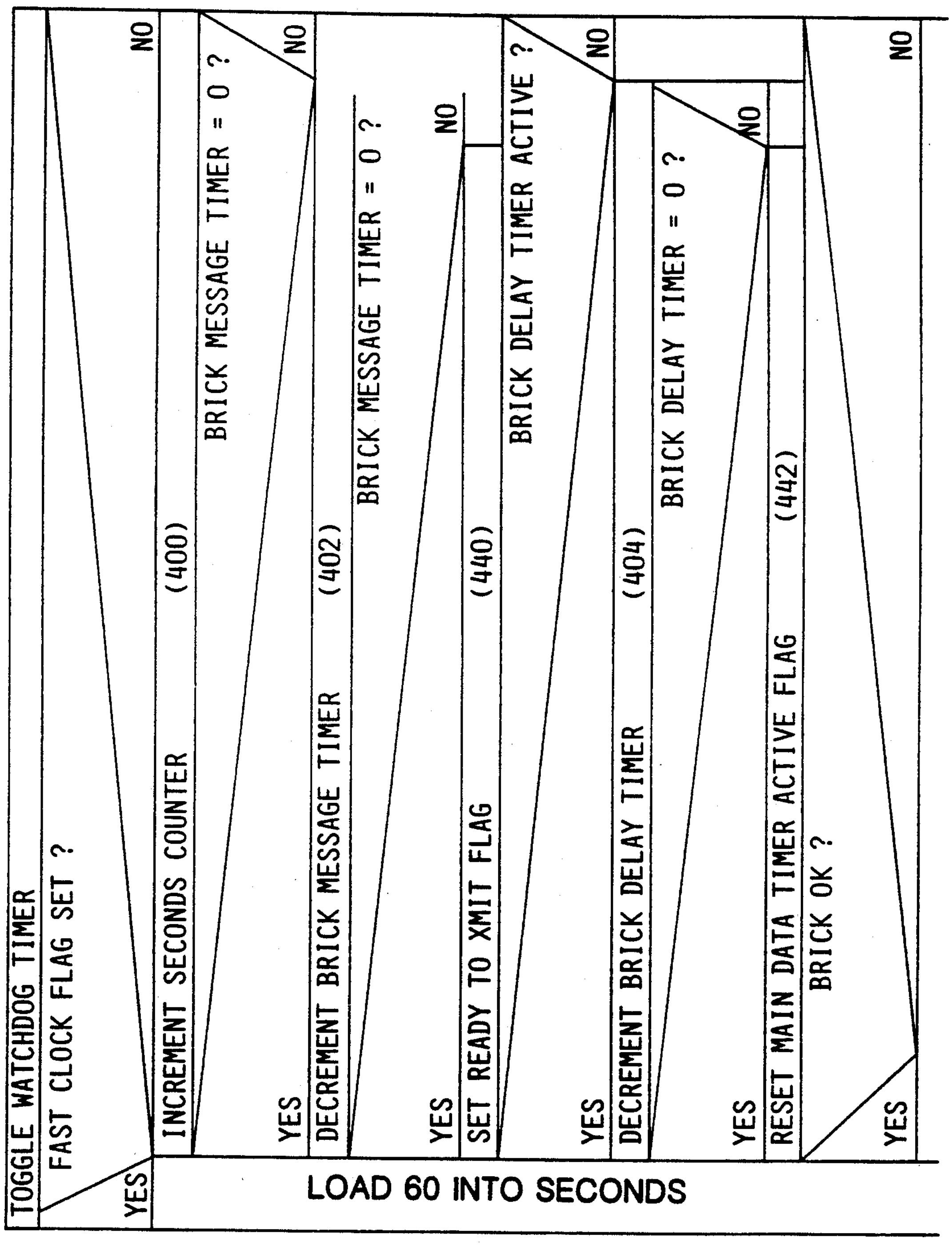
Figure 36B:
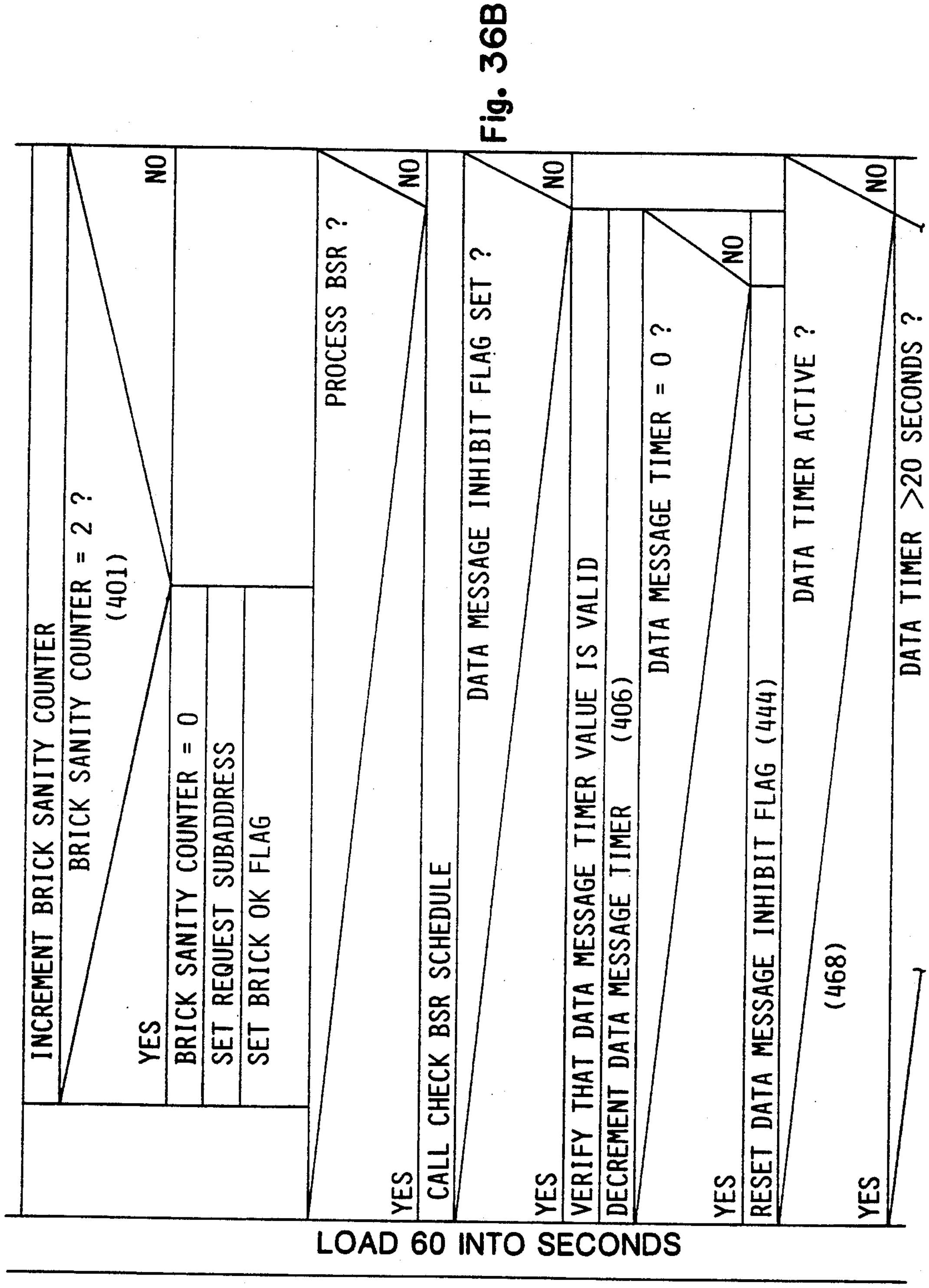
Figure 36C:
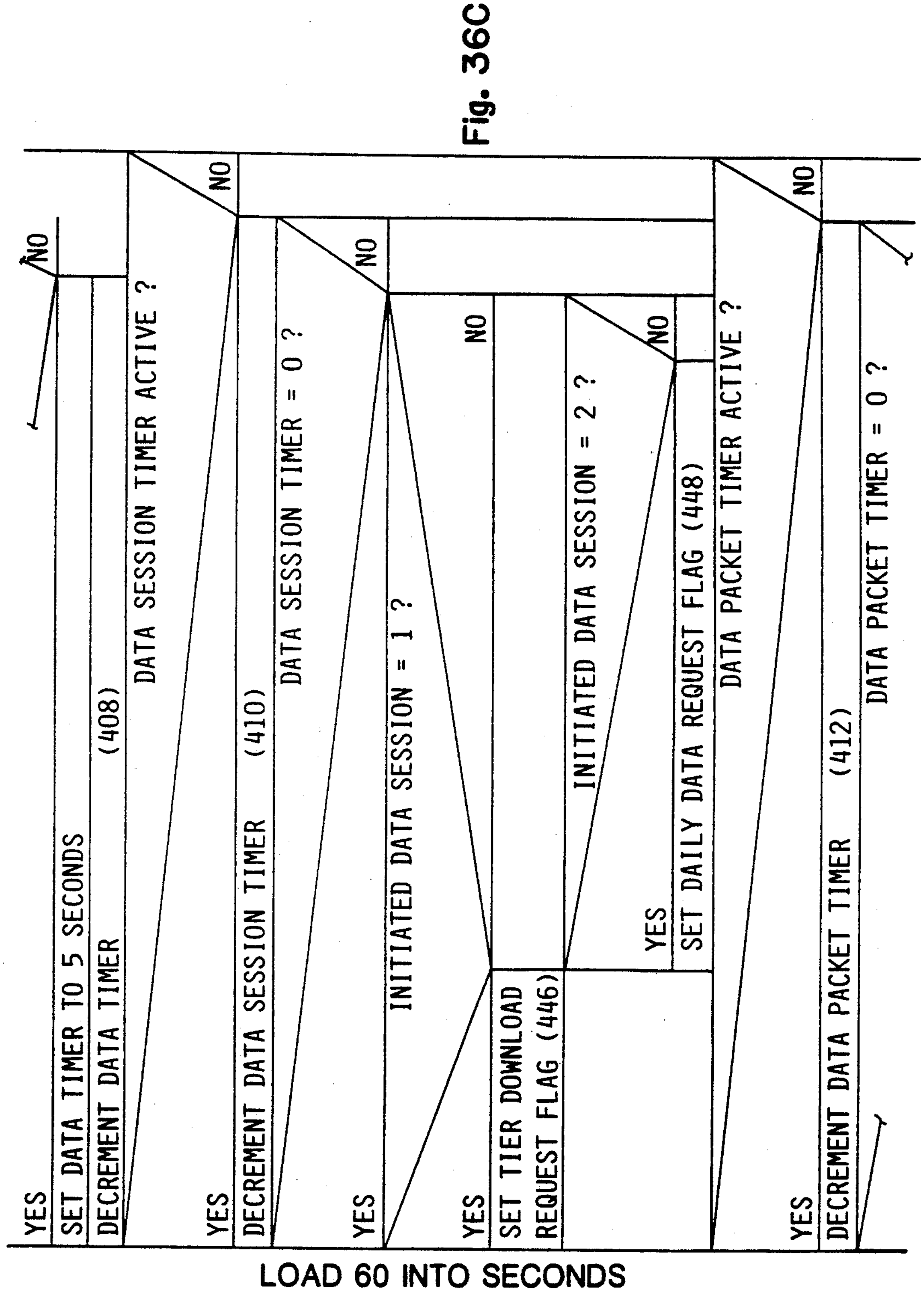
Figure 36D:
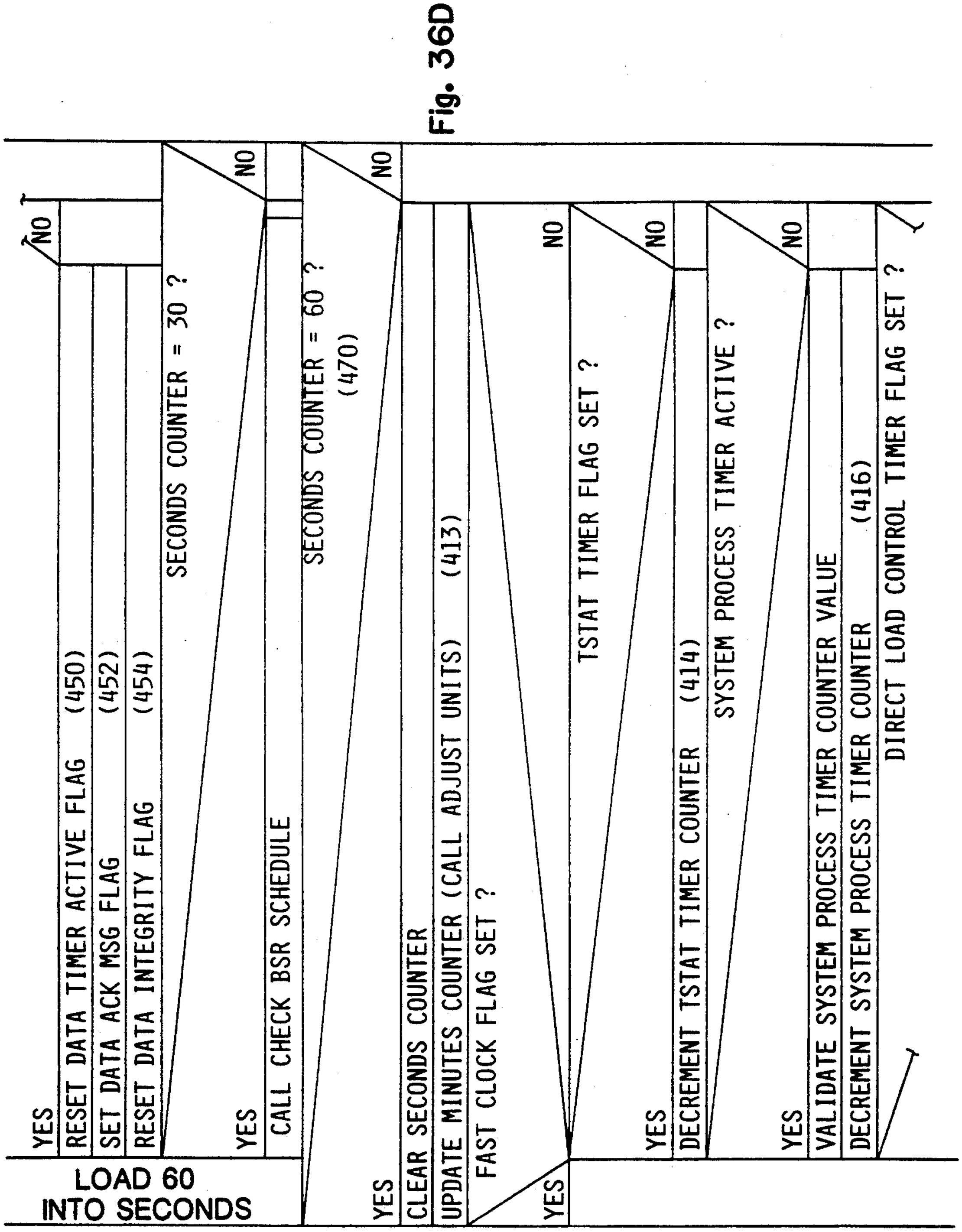
Figure 36E:
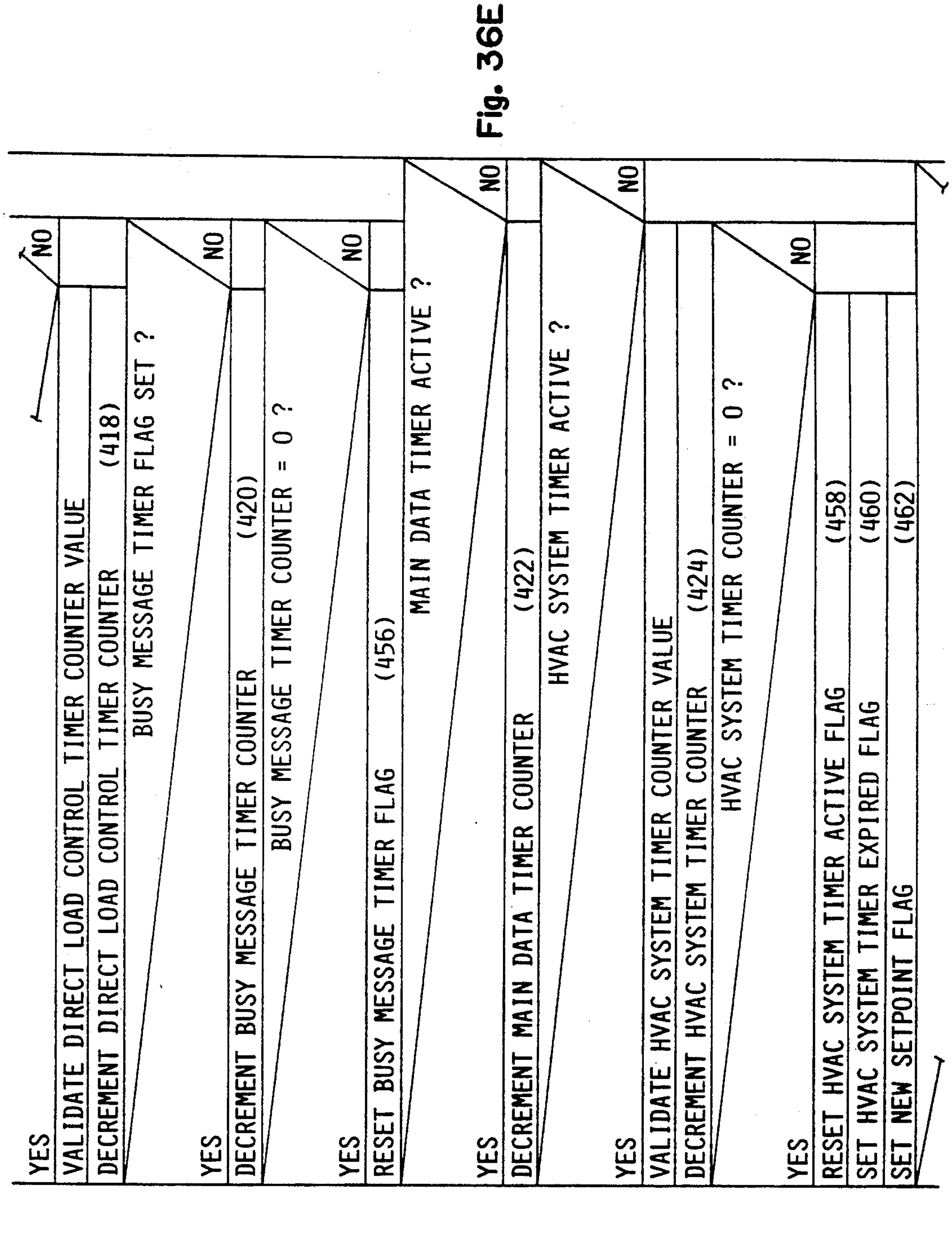
Figure 36F:
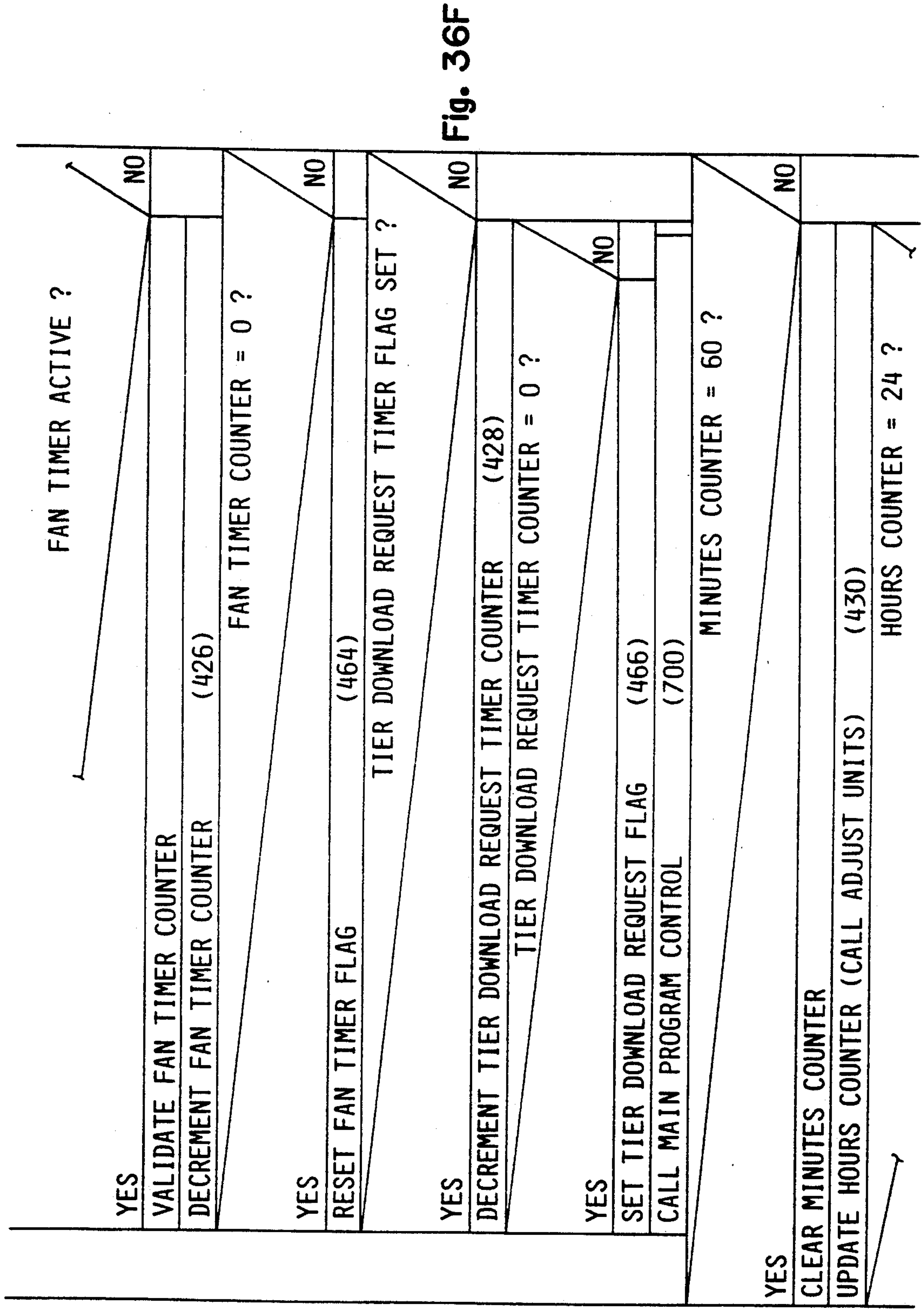
Figure 36G:
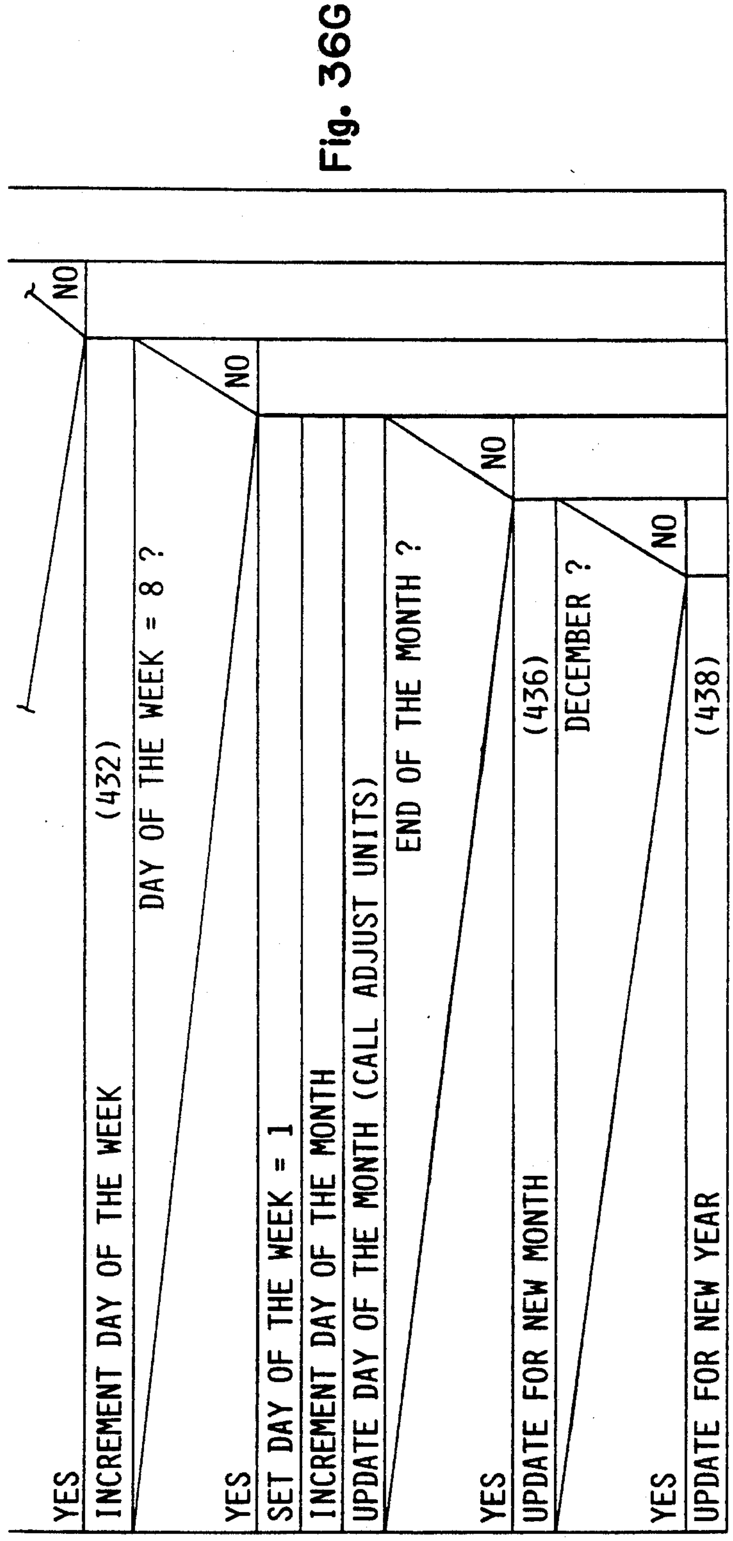
Figure 37A:
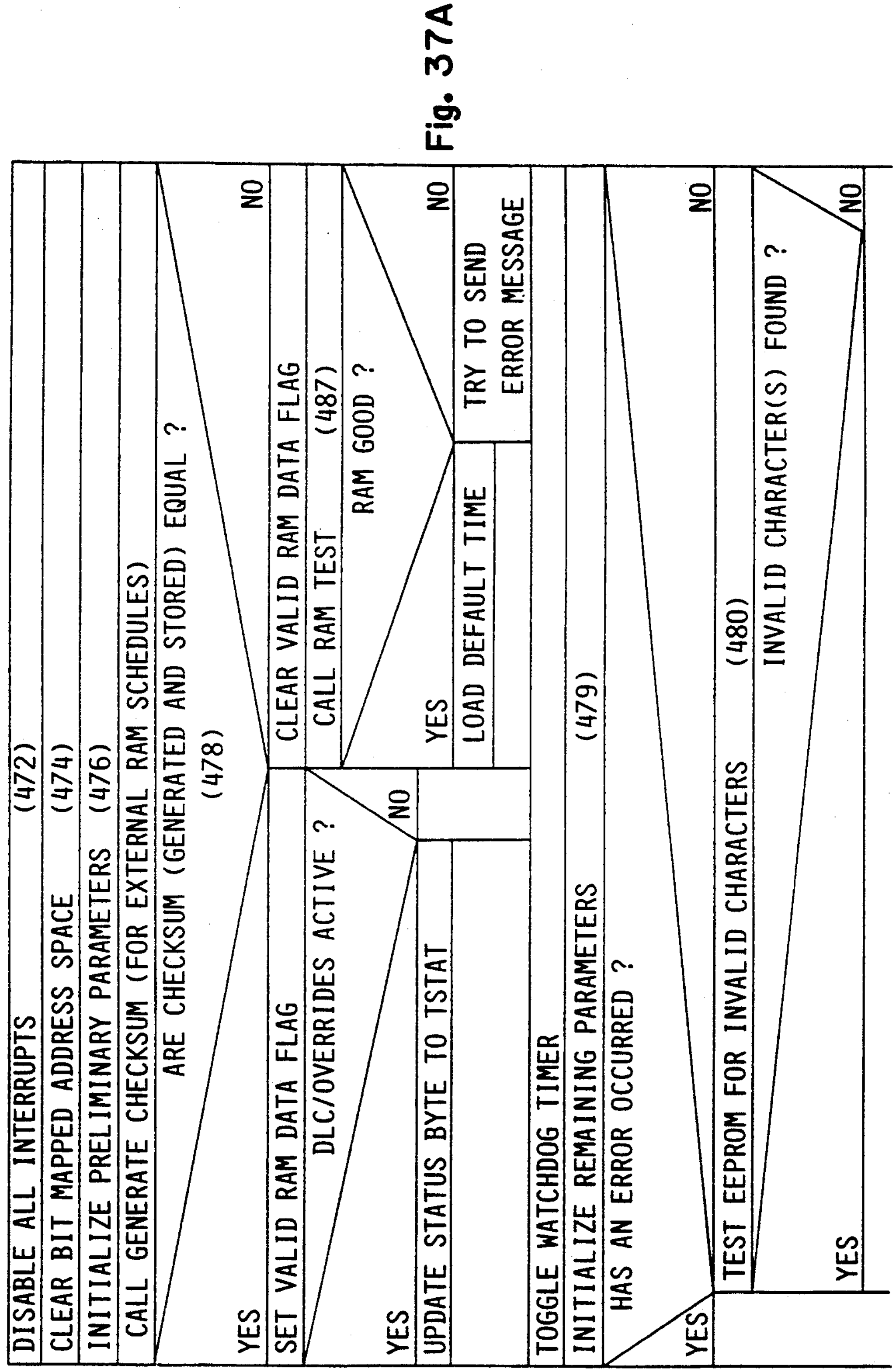
Figure 37B:
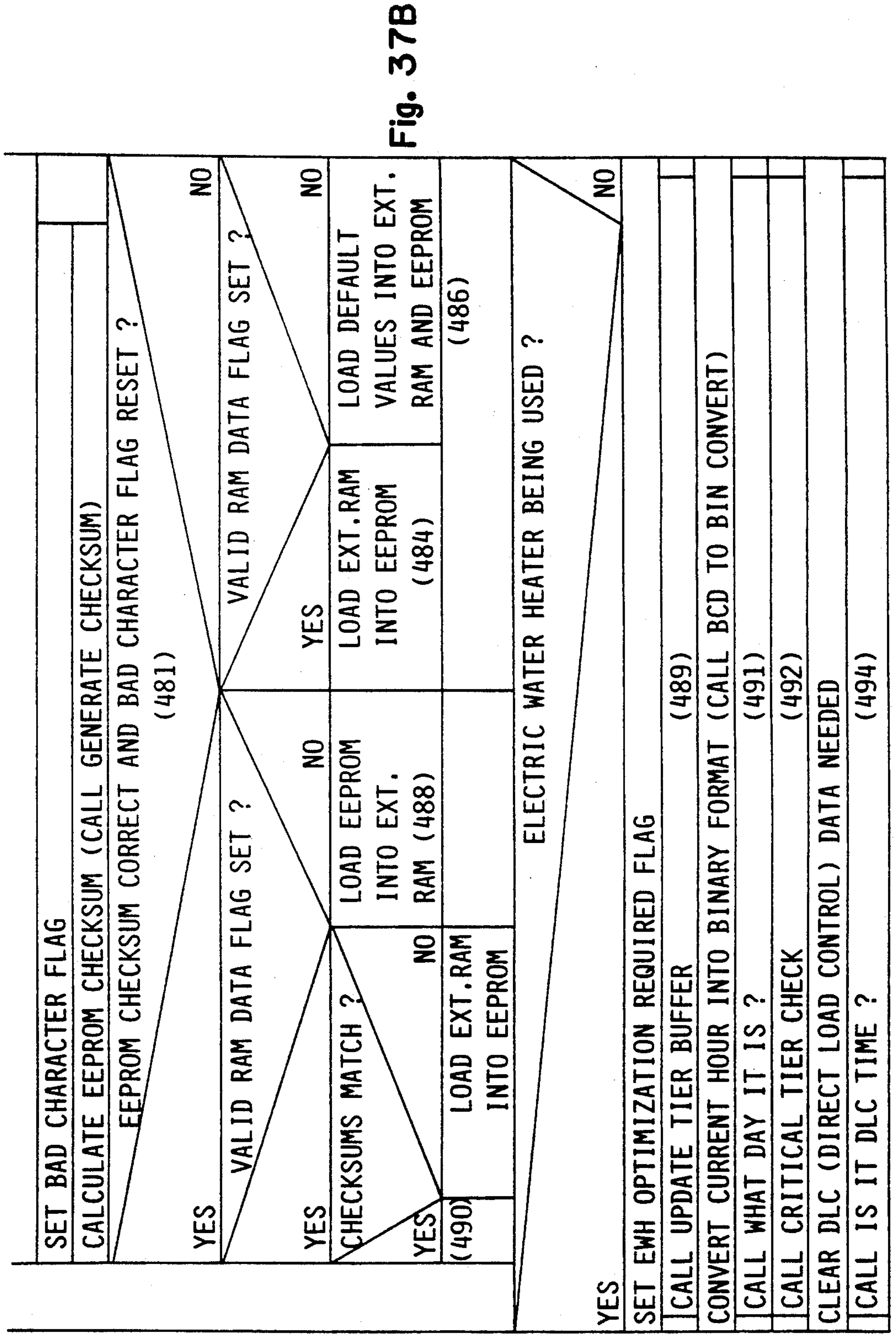
Figure 38:
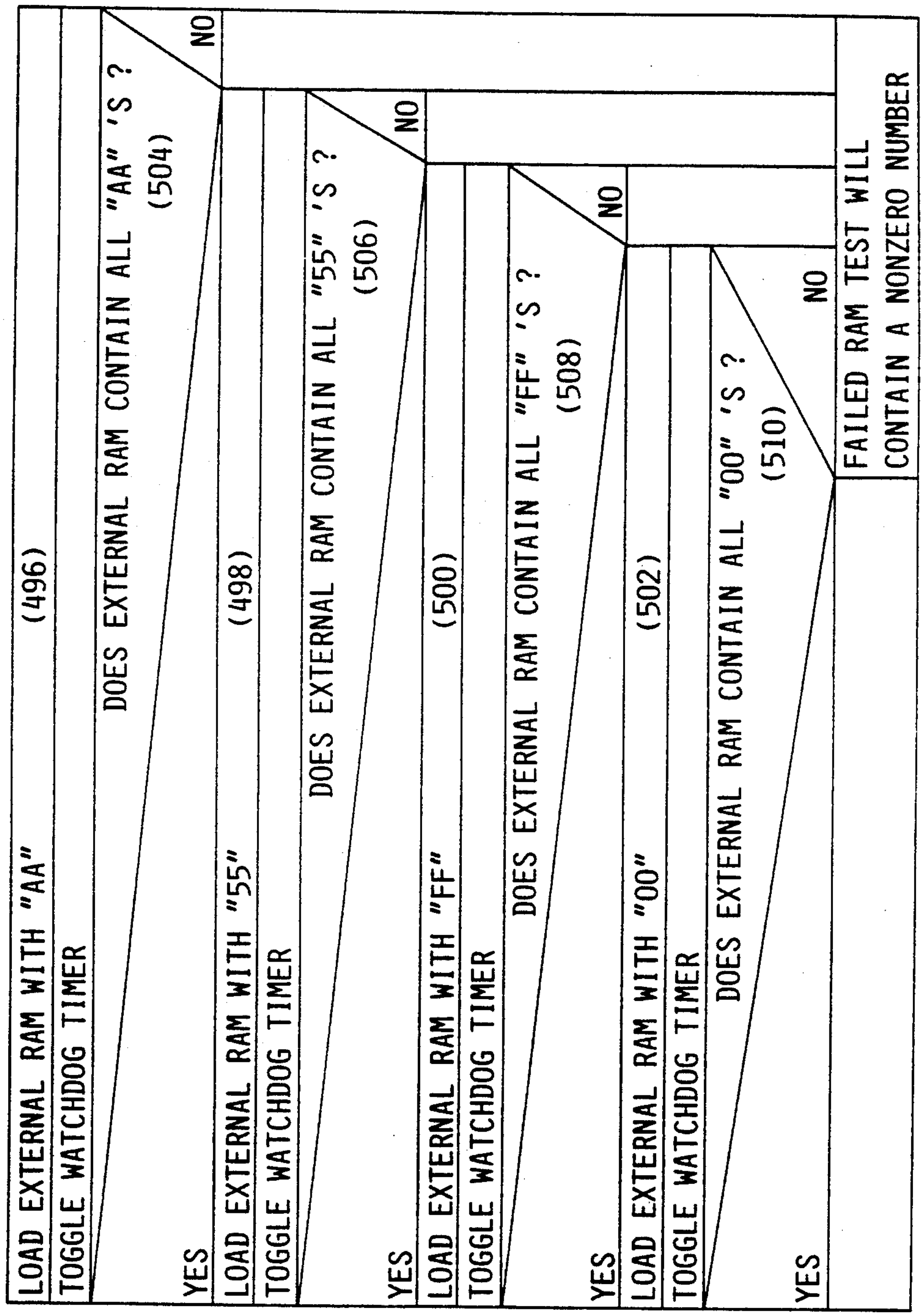
Figure 39A:
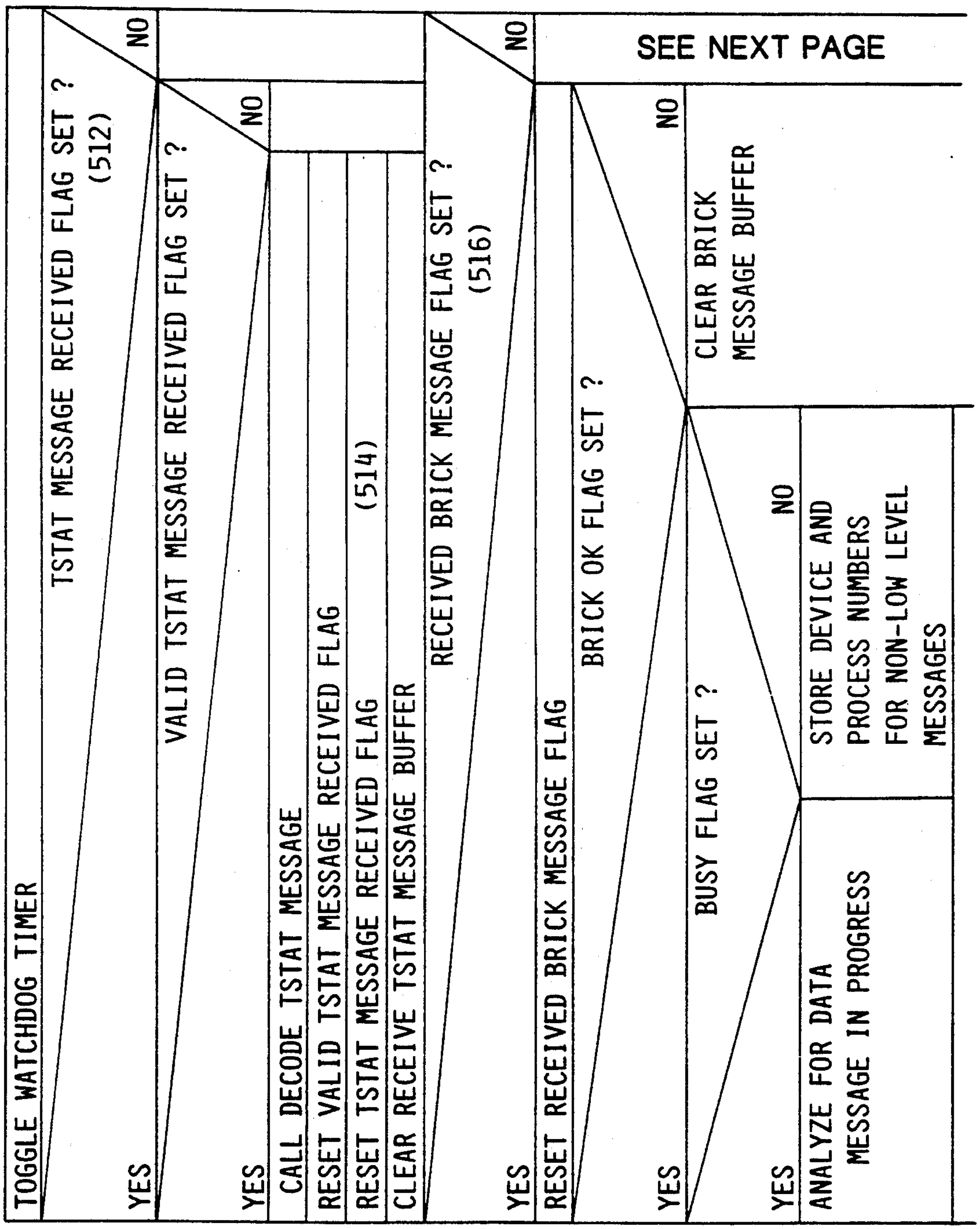
Figure 39B:
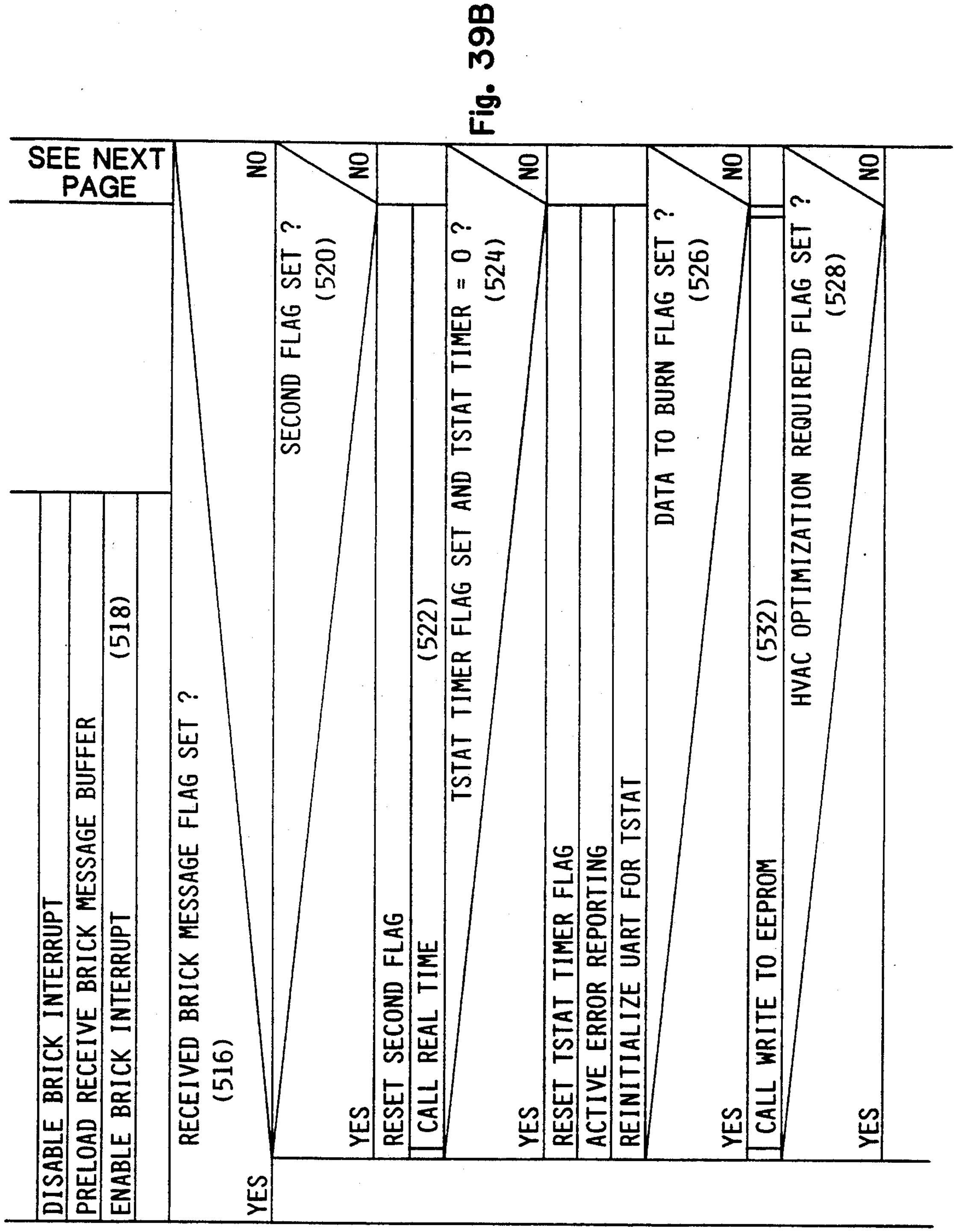
Figure 39C:
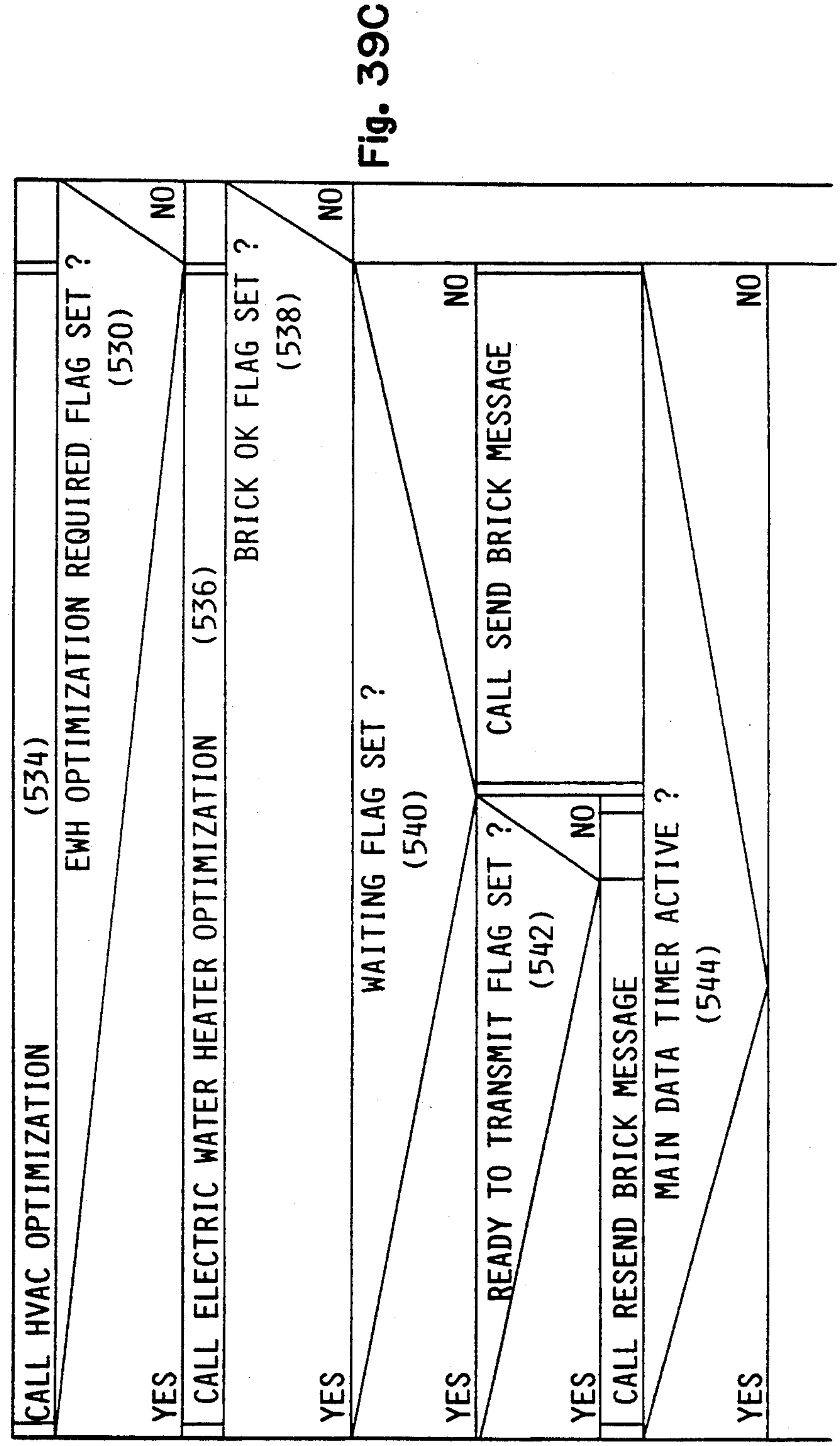
Figure 39D:
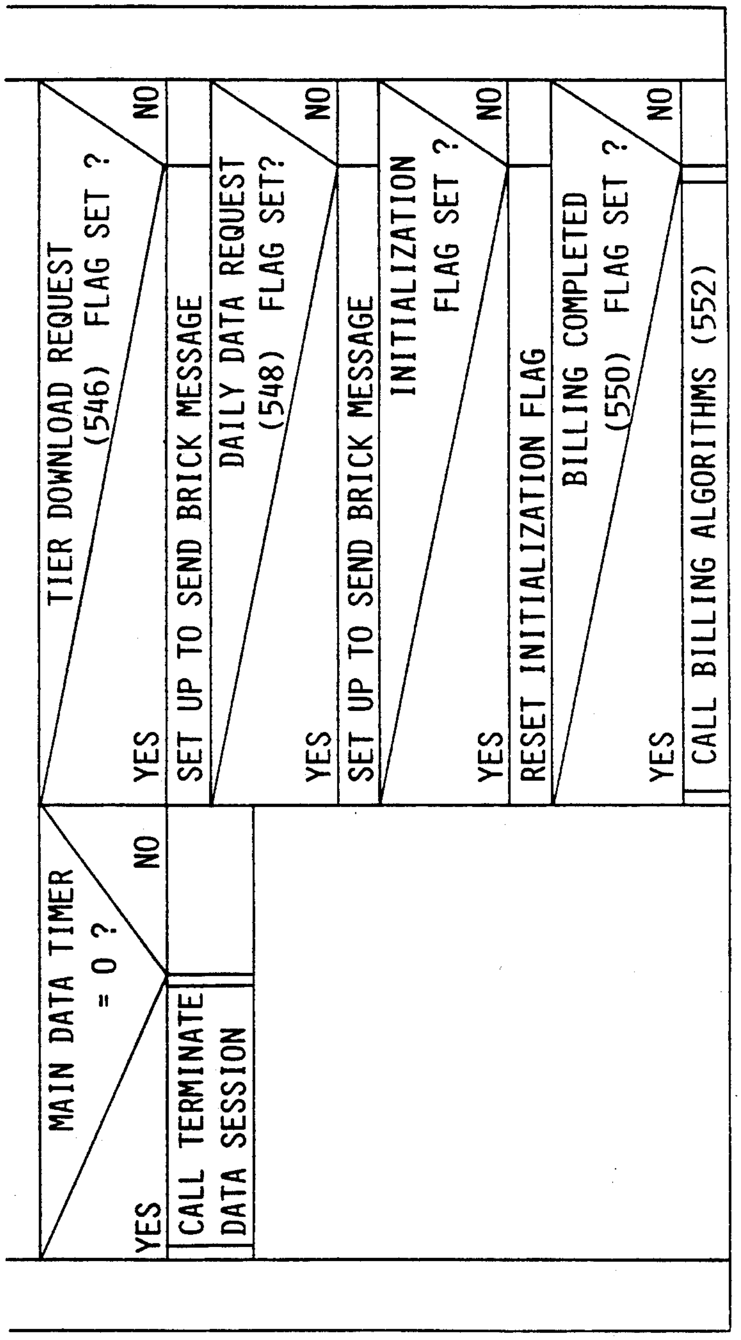
Figure 40:
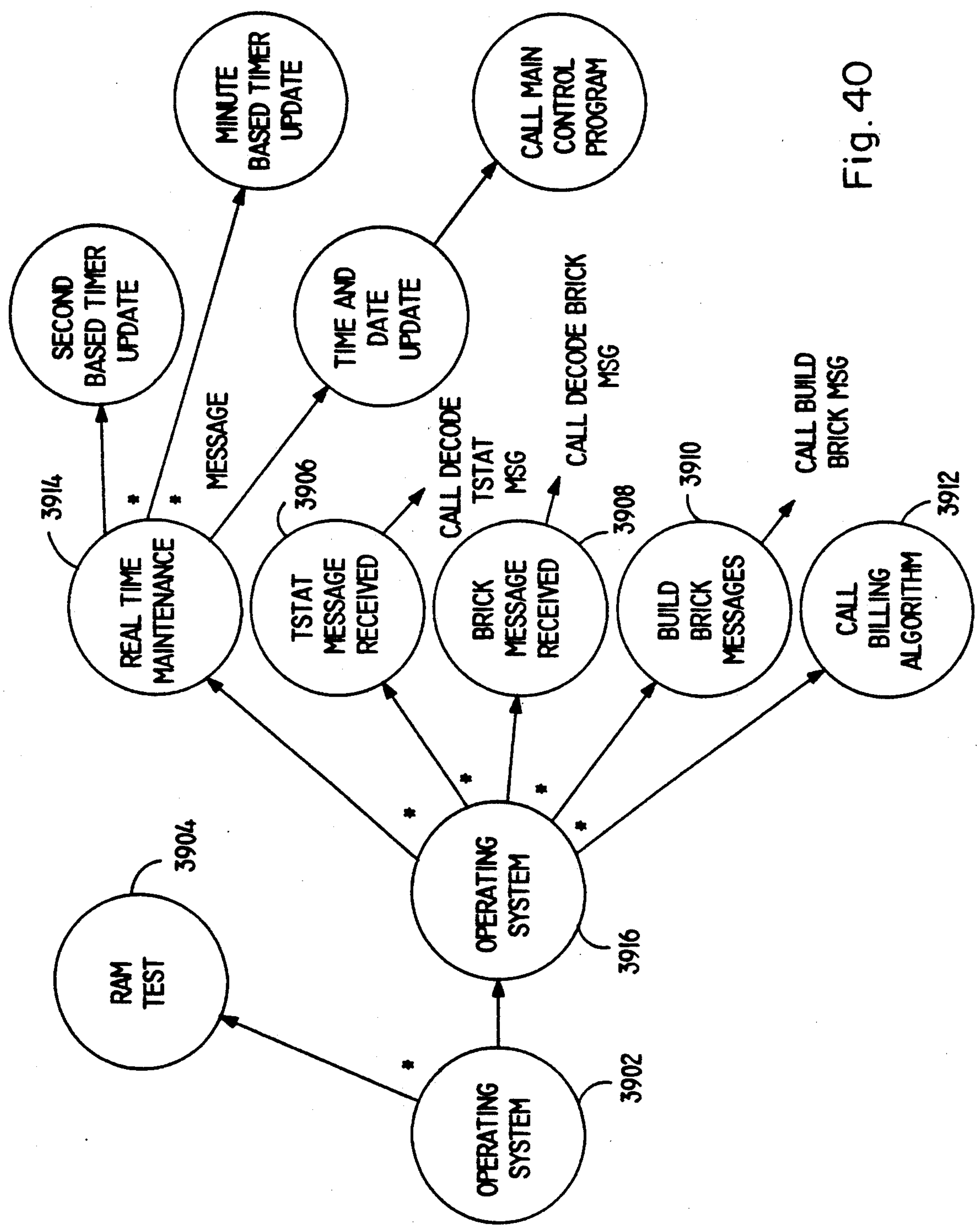
Figure 41E:
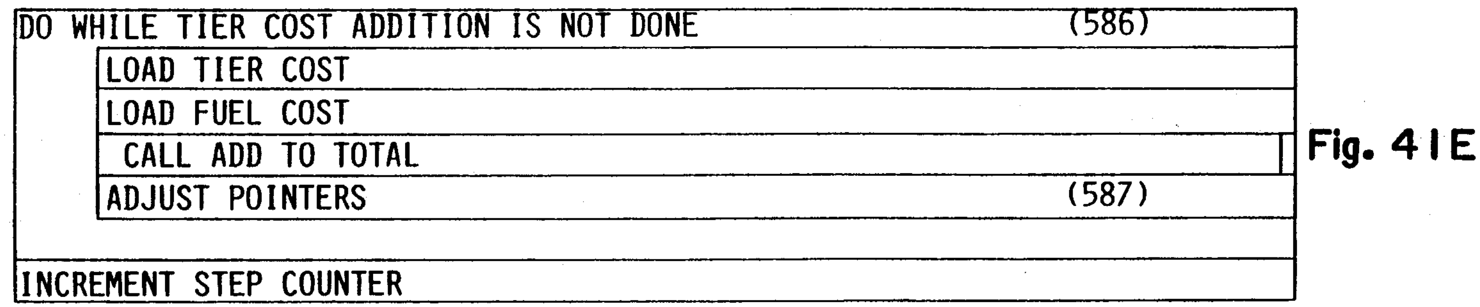
Figure 41F:
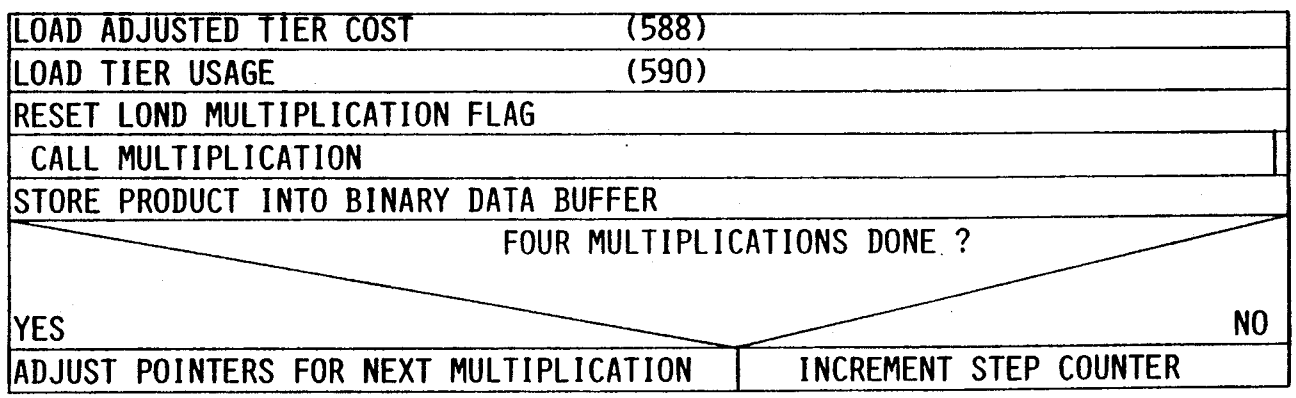
Figure 41G:
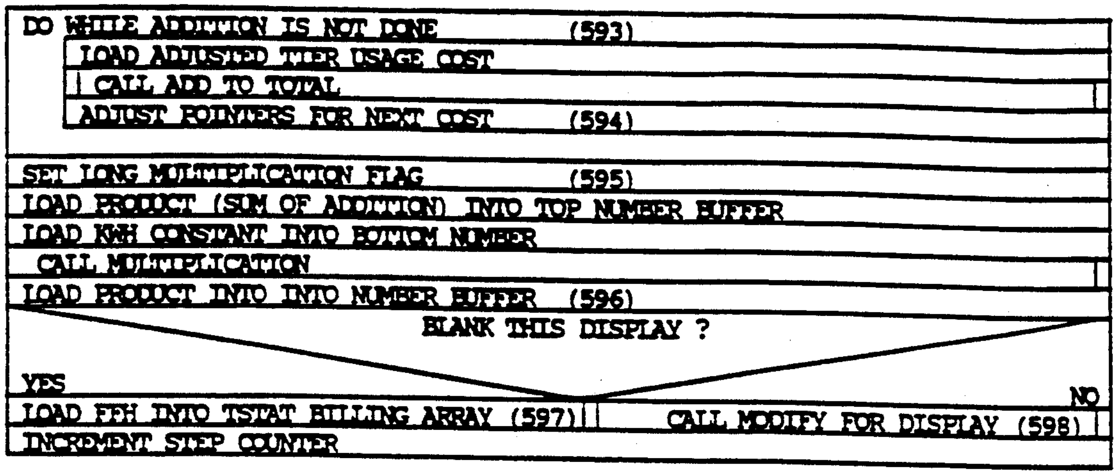
Figure 41H:
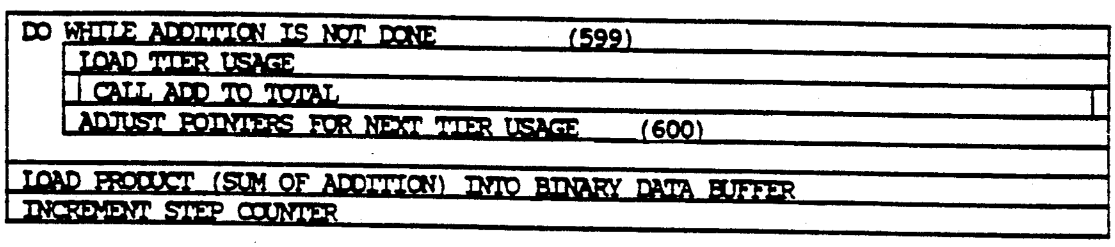
Figure 41I:
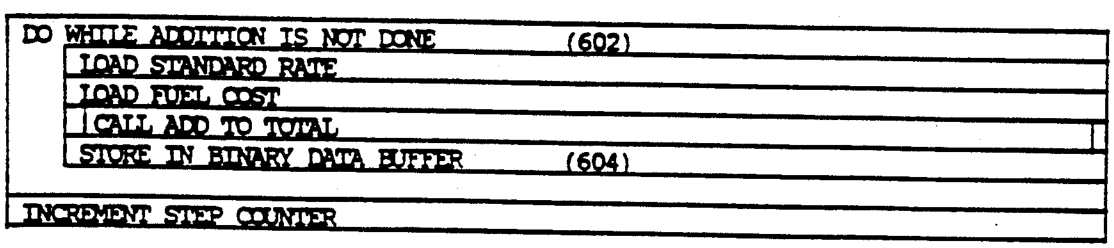
Figure 41J:
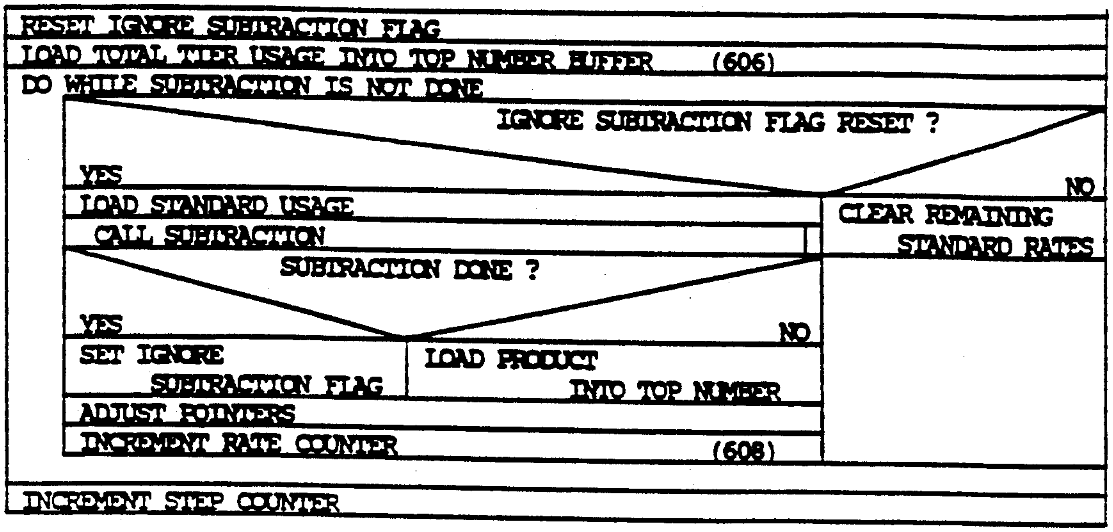
Figure 41K:
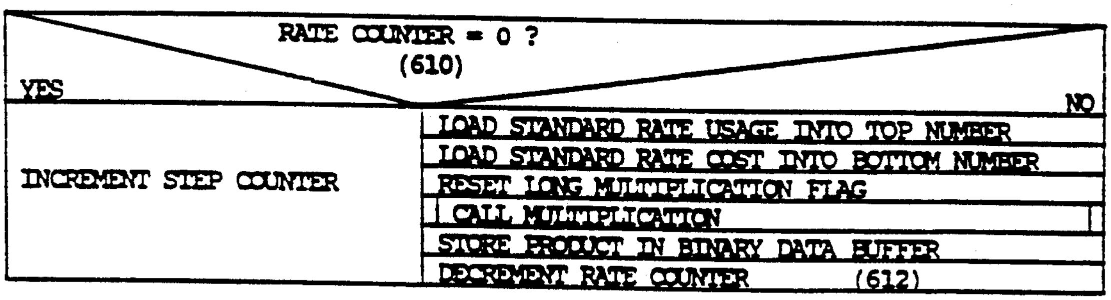
Figure 41L:
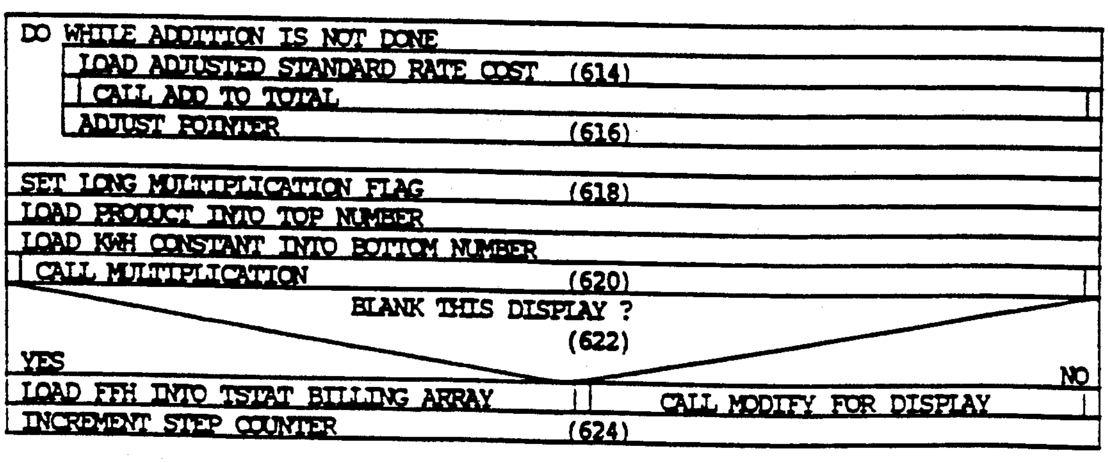
Figure 41M:
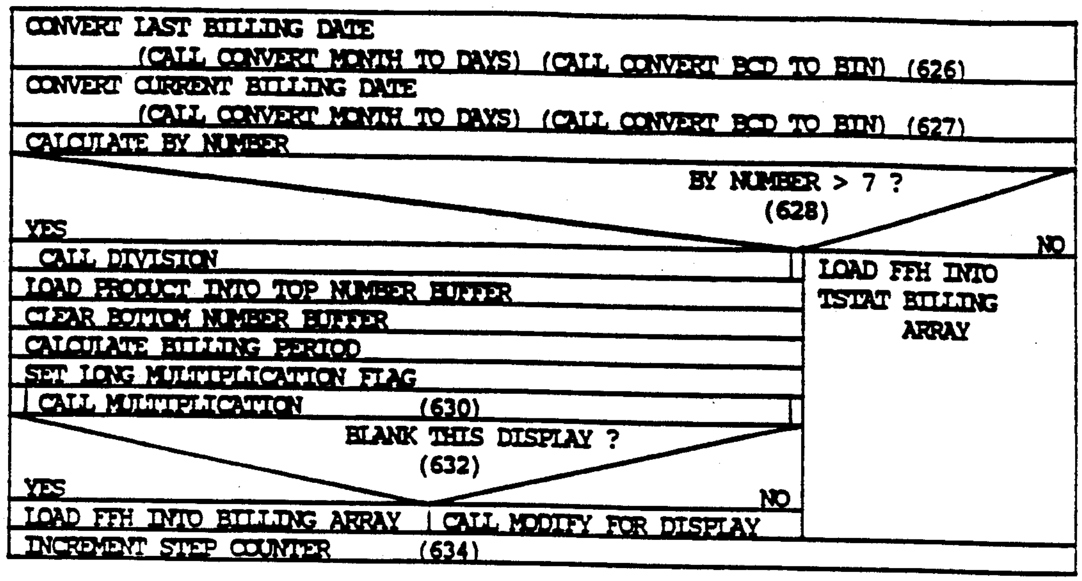
Figure 41N:
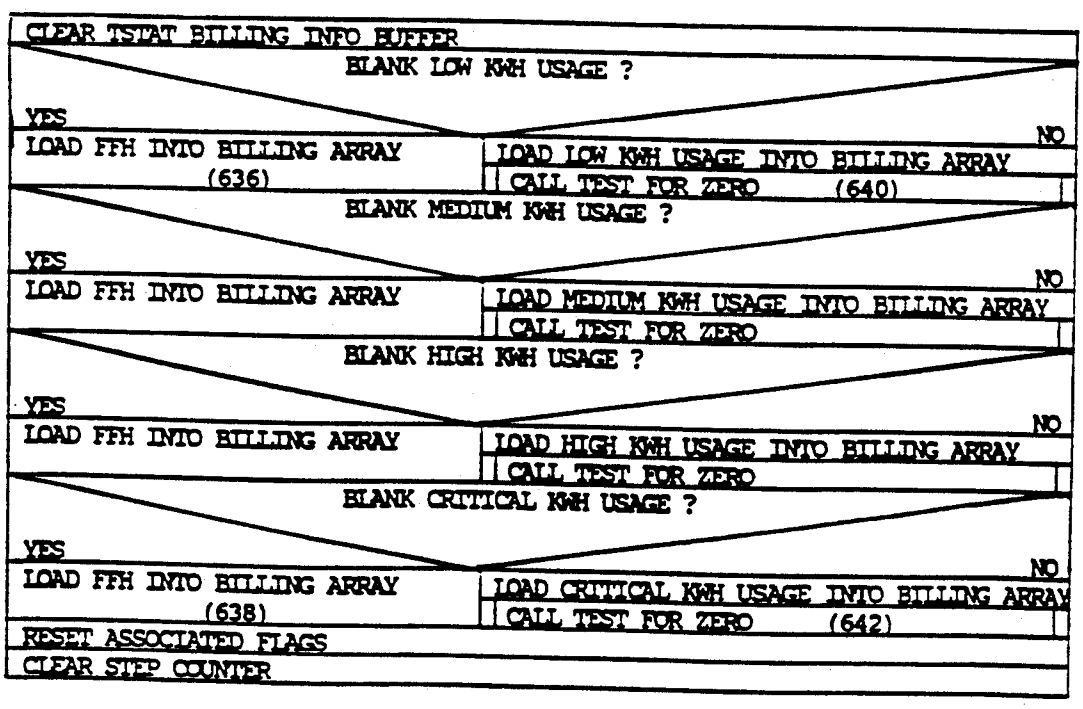
Figure 44A:
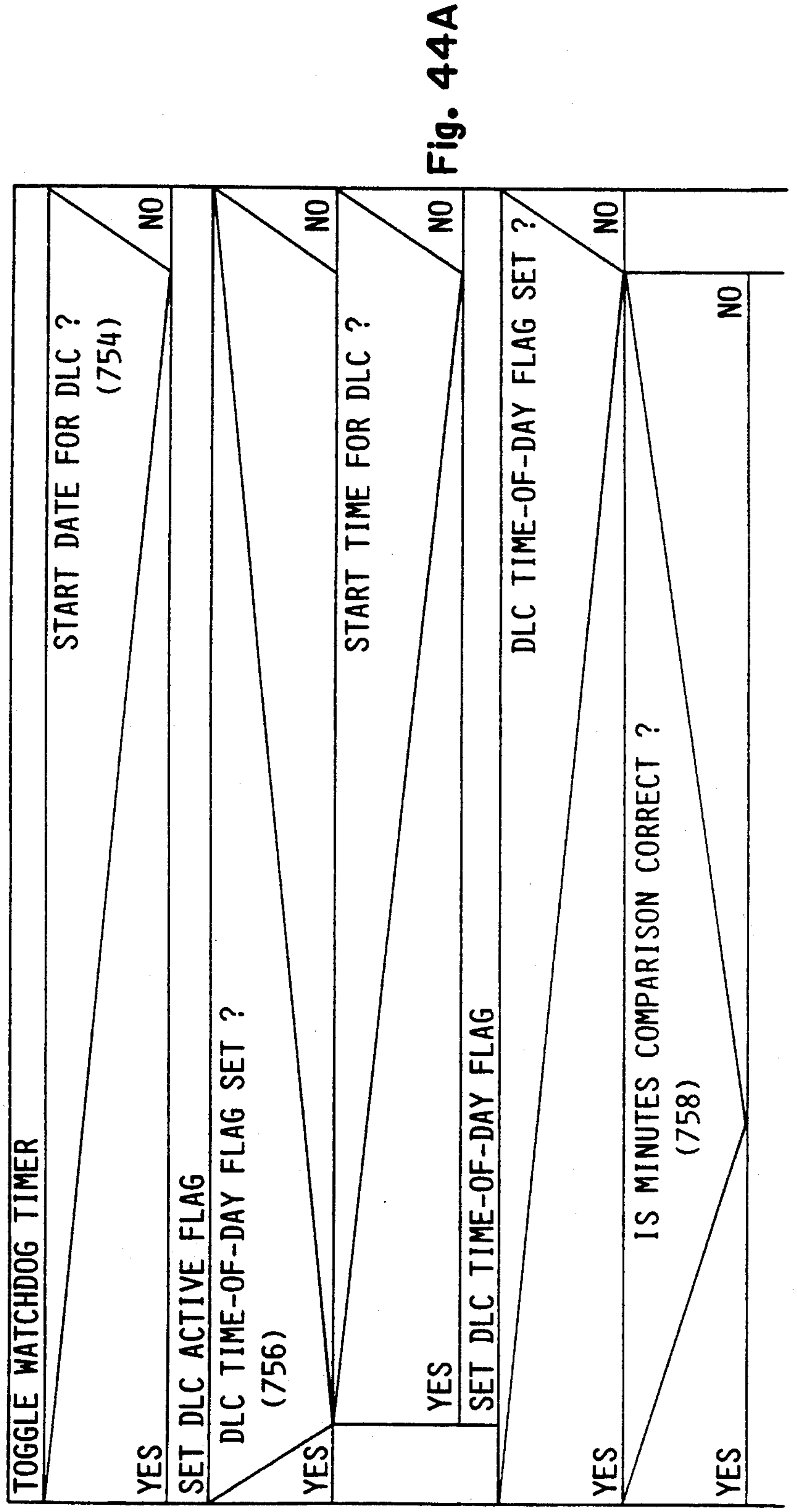
Figure 44B:
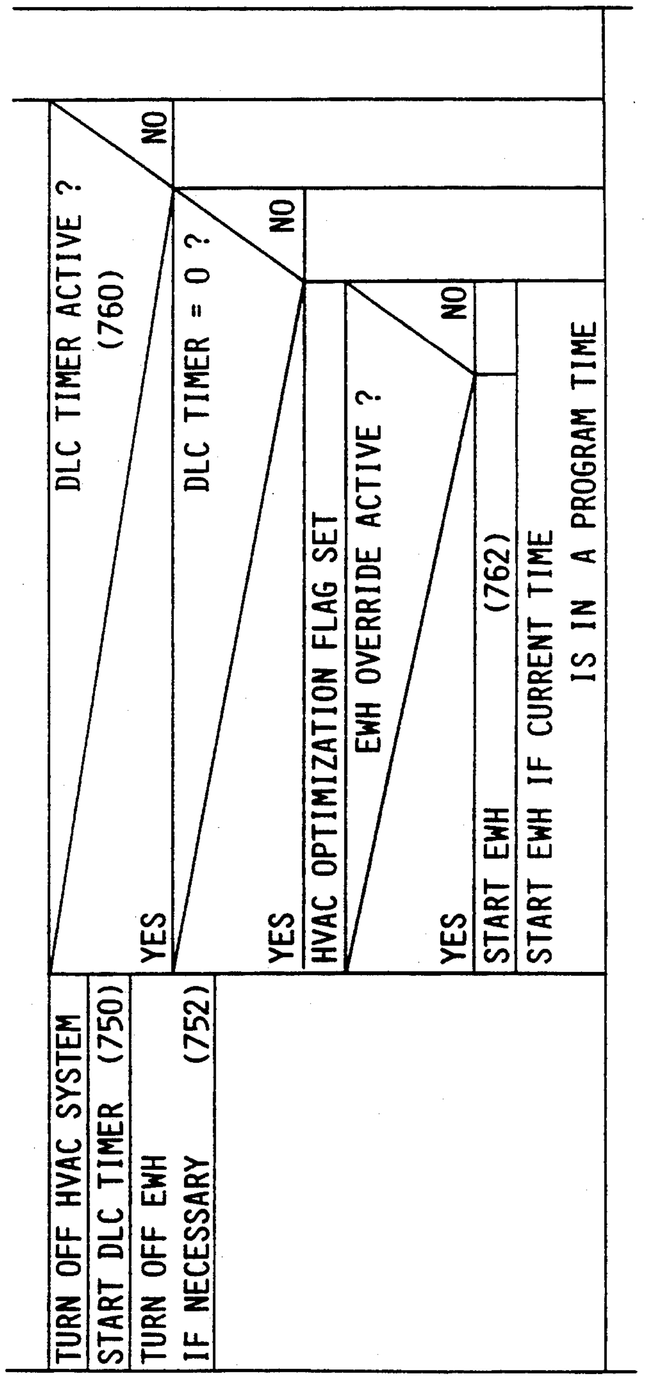
Figure 44C:
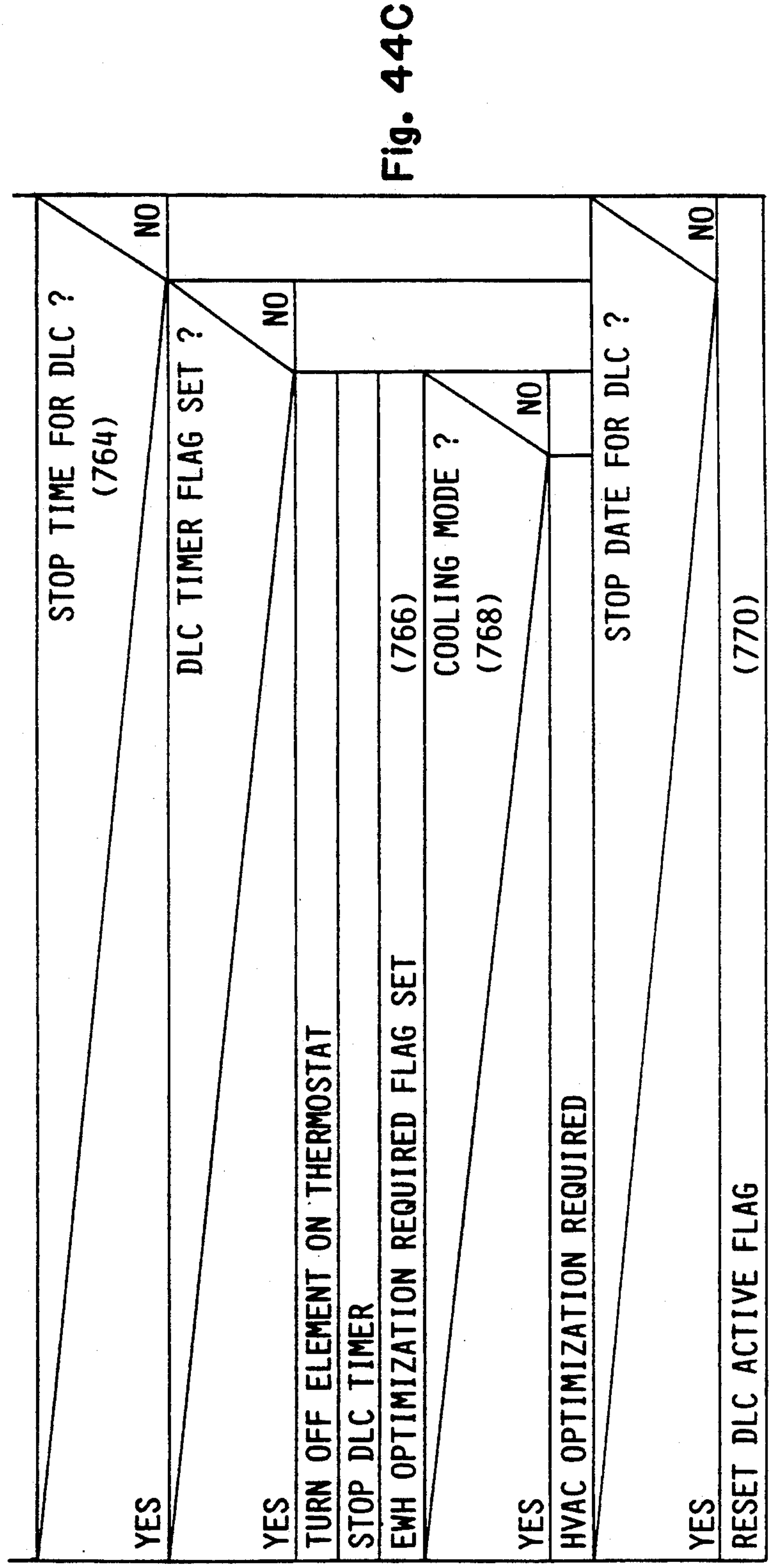
Figure 45A:
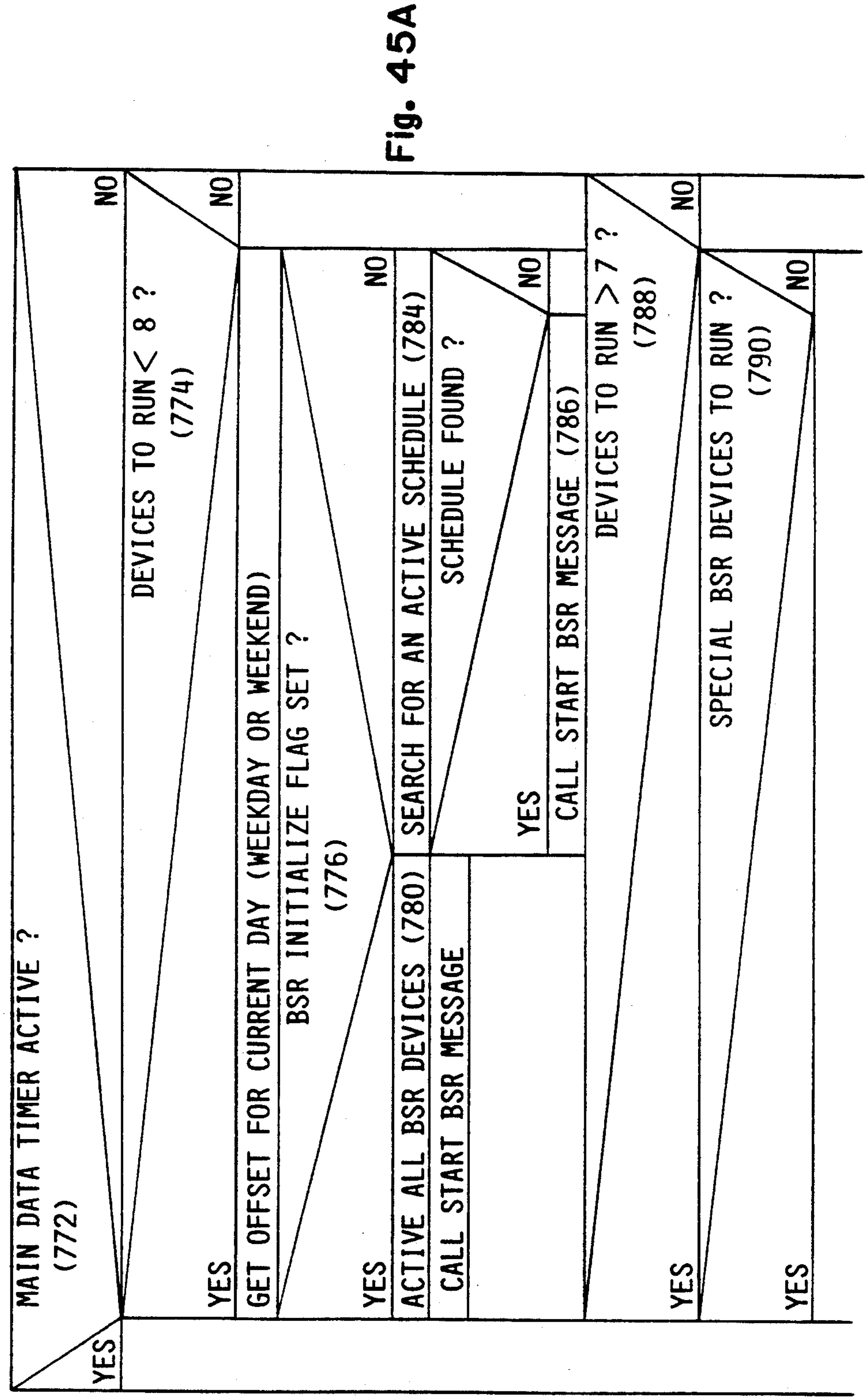
Figure 45B:
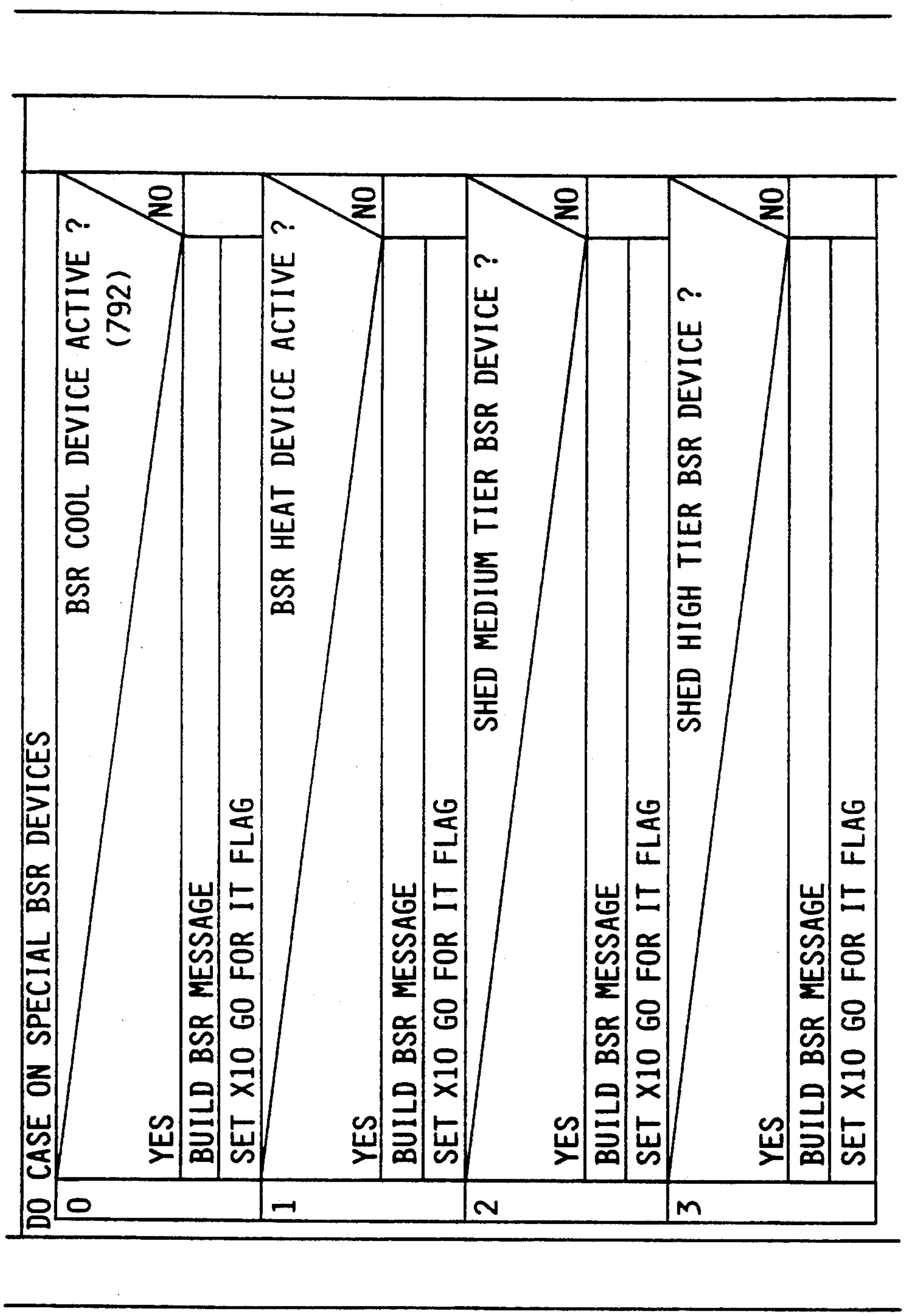
Figure 45C:
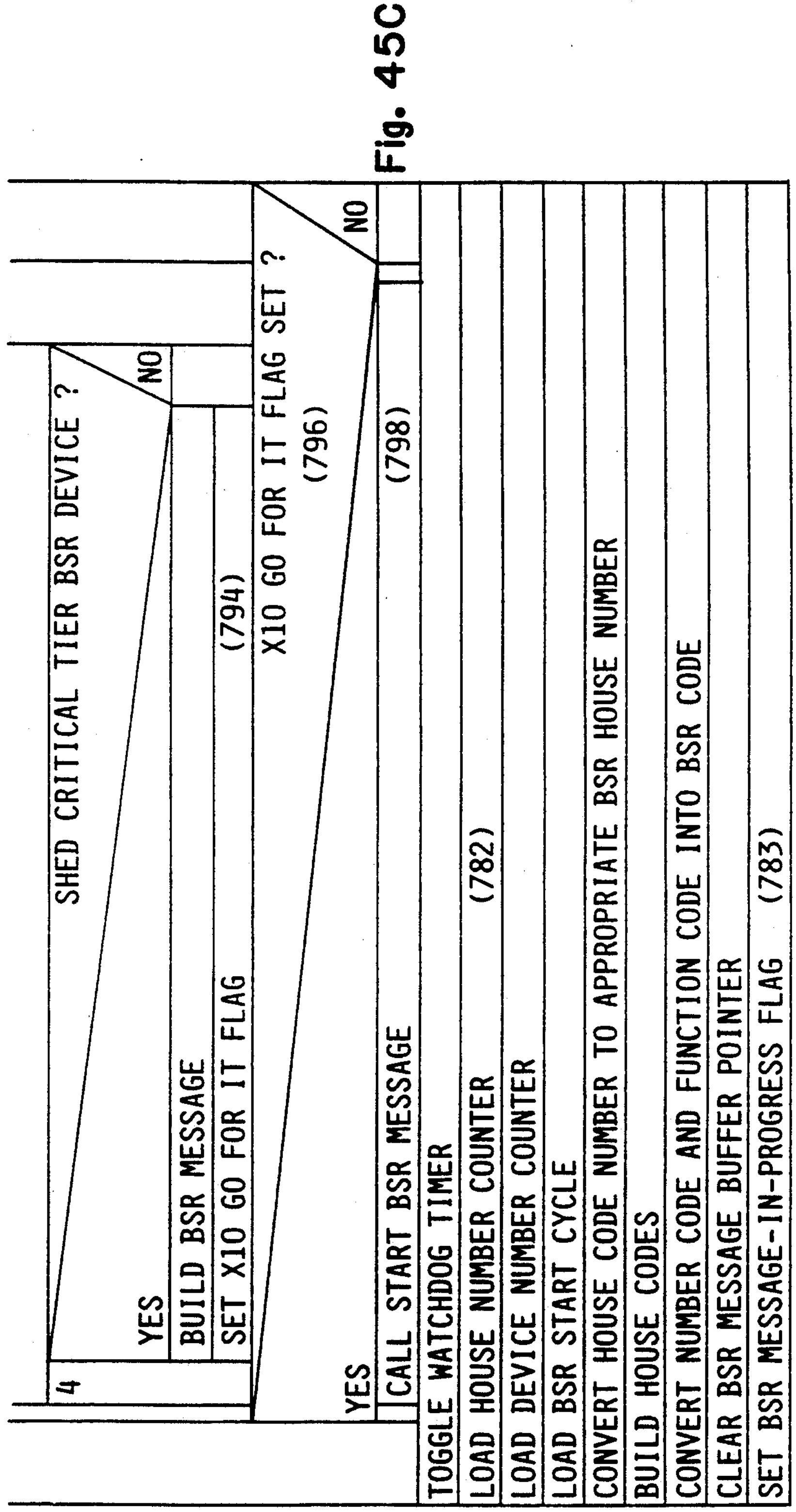
Figure 46A:
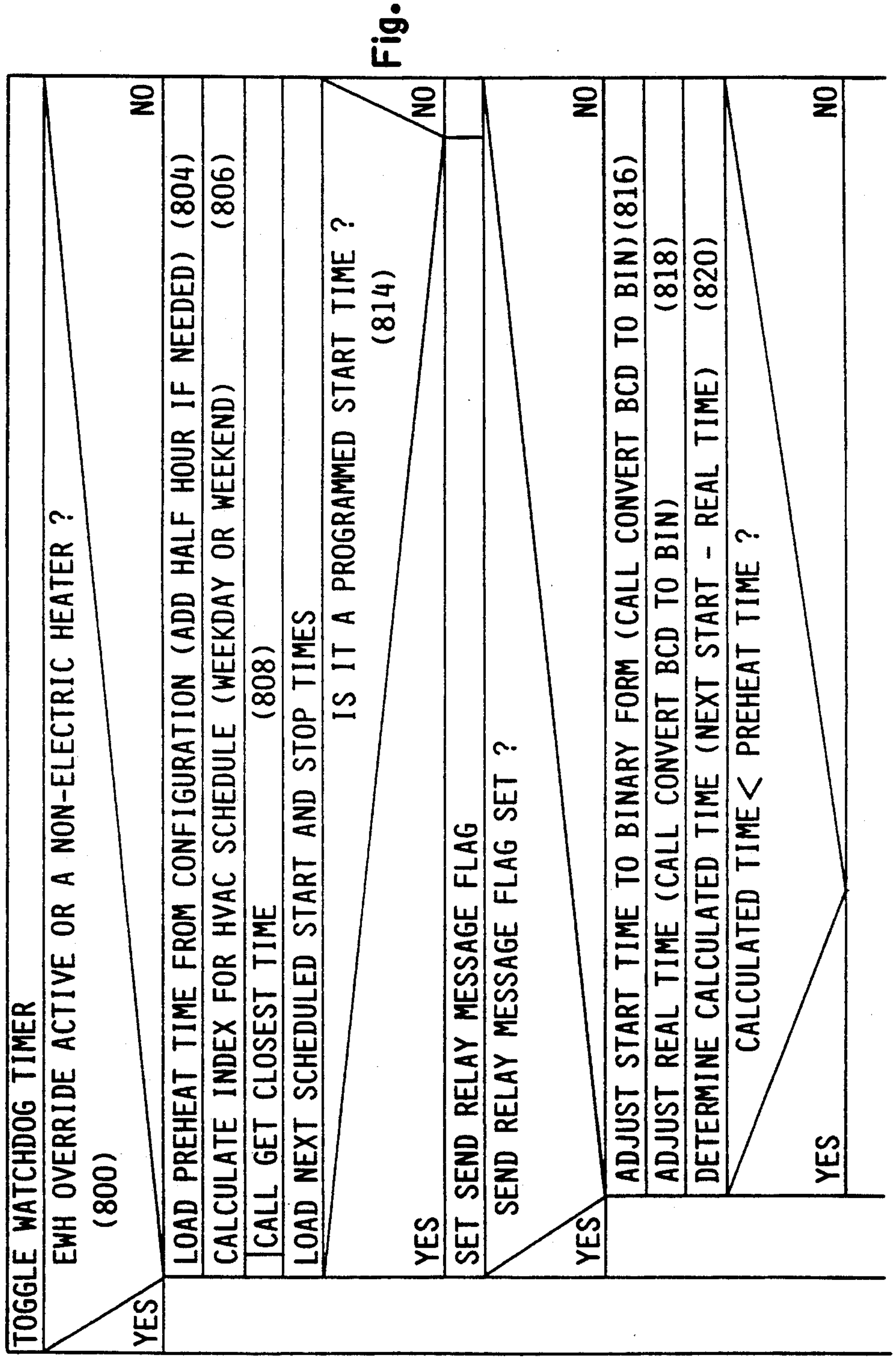
Figure 46B:
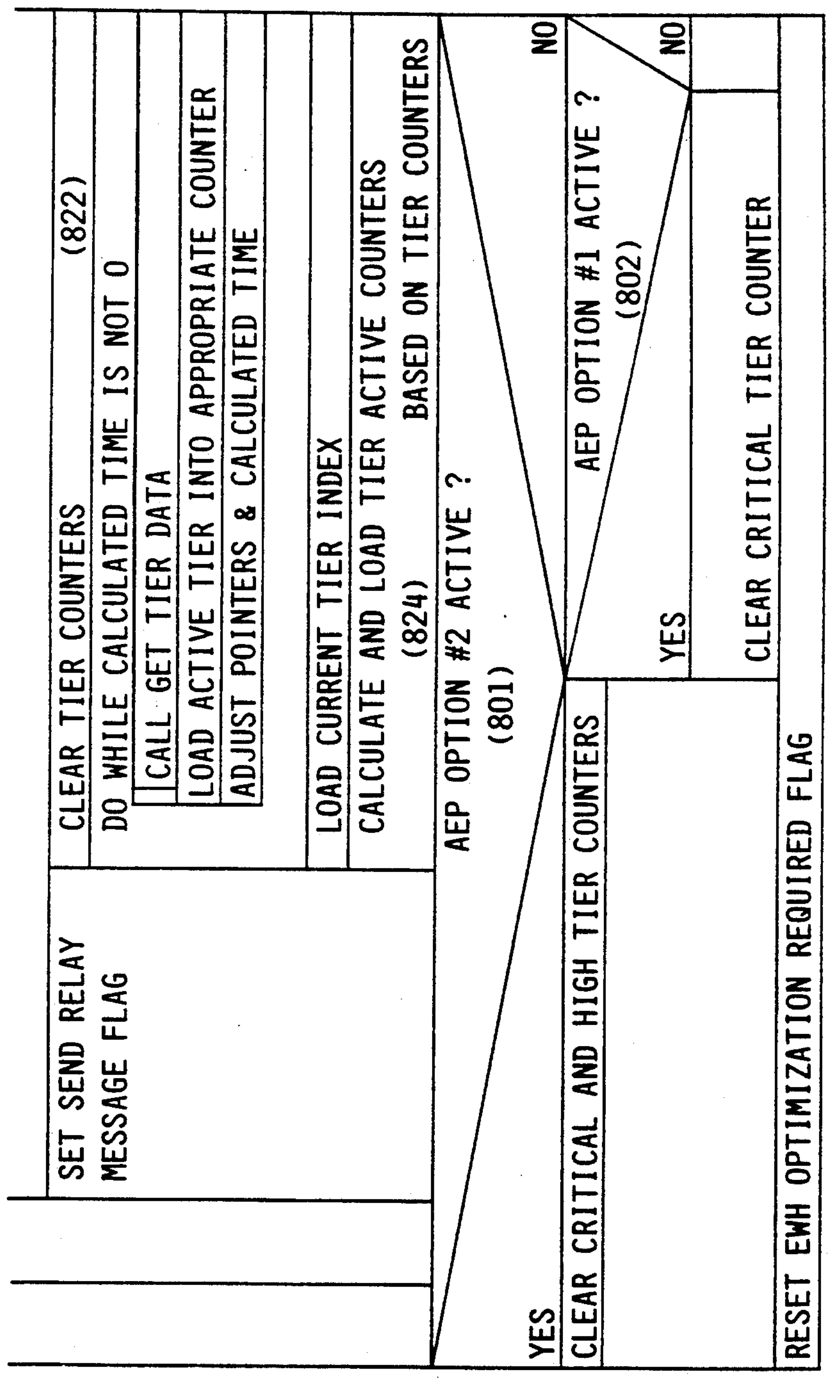
Figure 47:
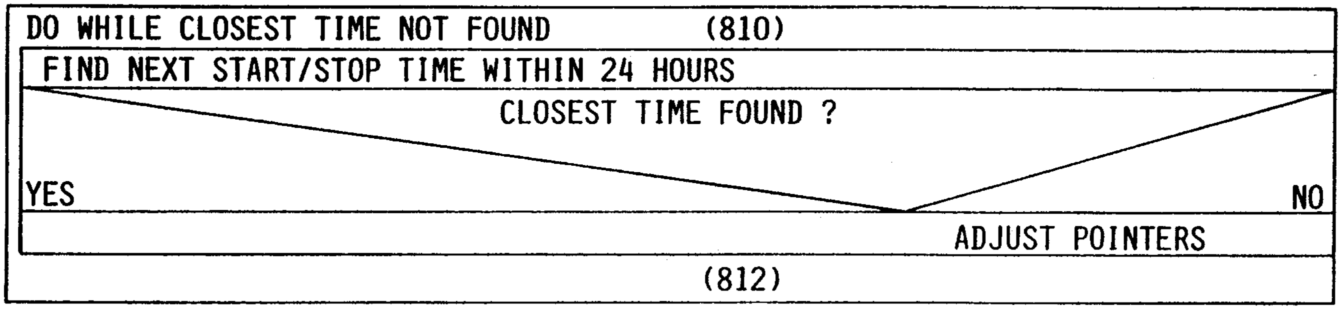
Figure 48:
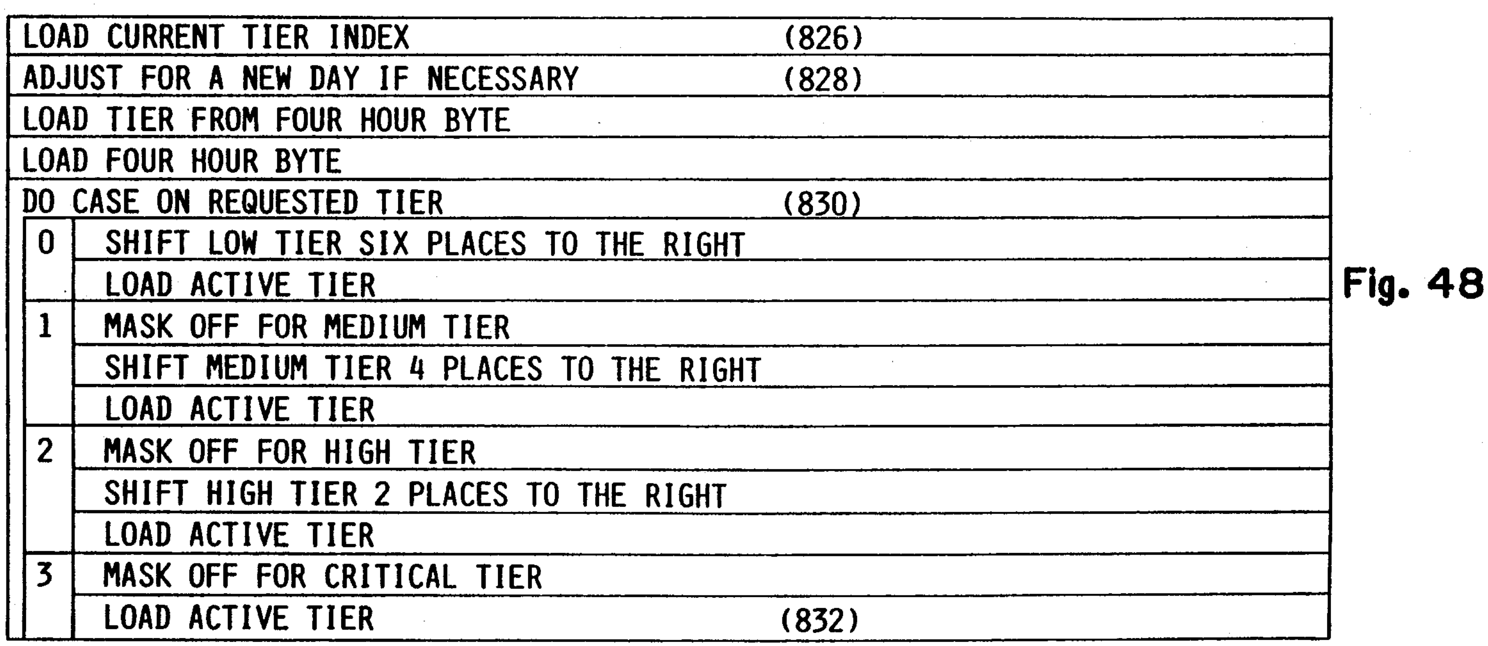
Figure 49A:
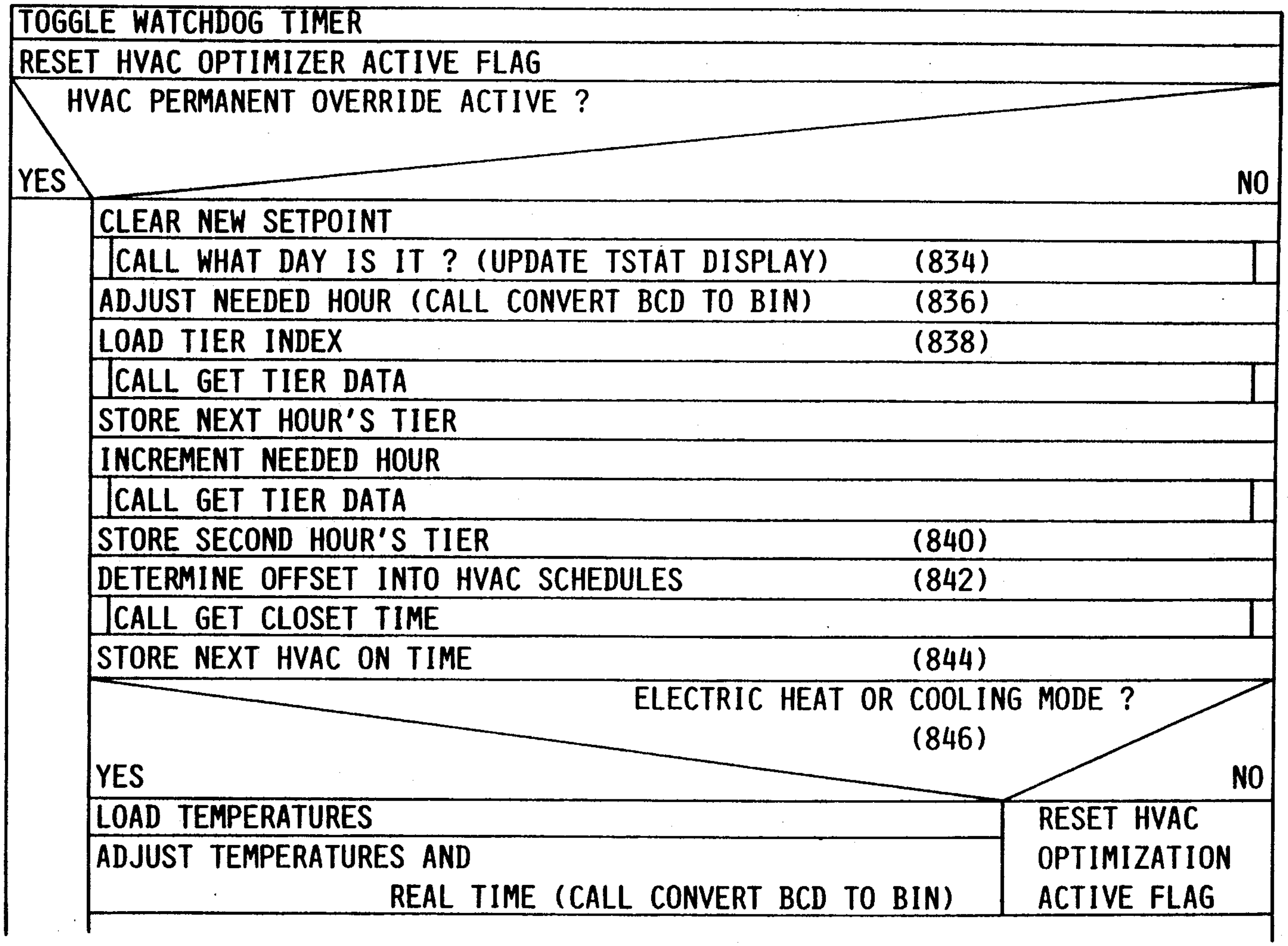
Figure 49B:
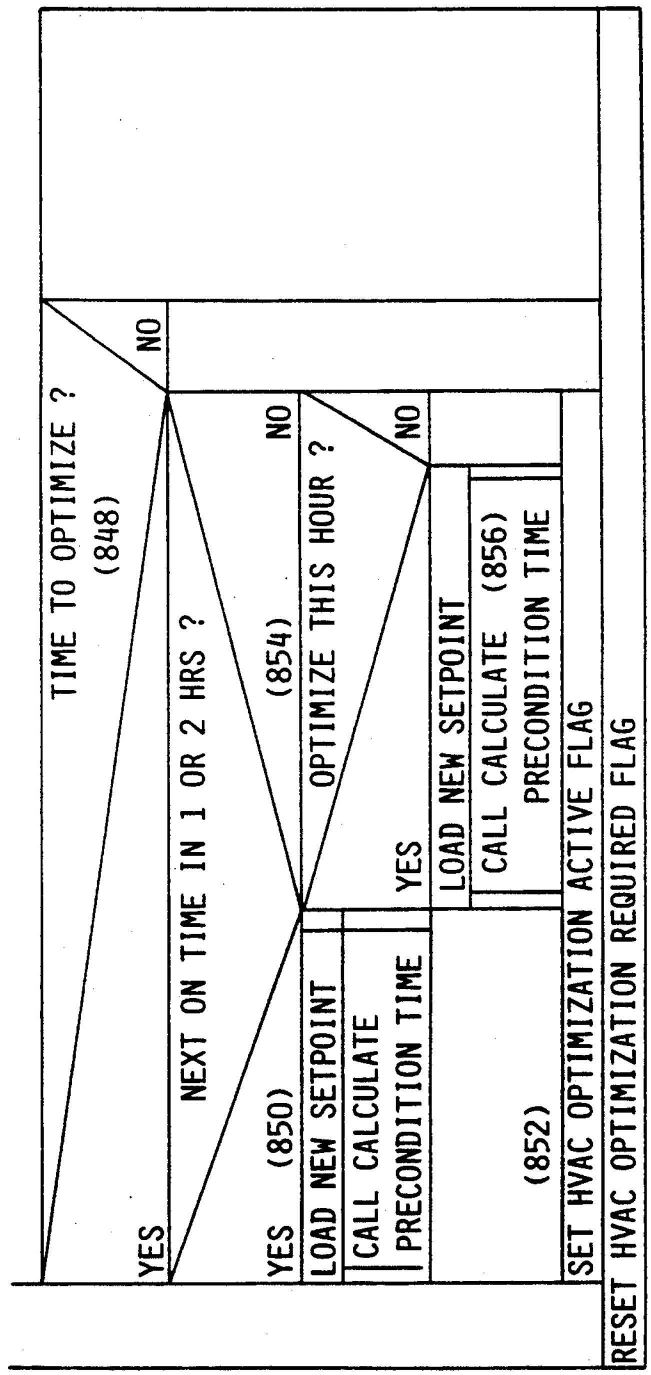
Figure 50:
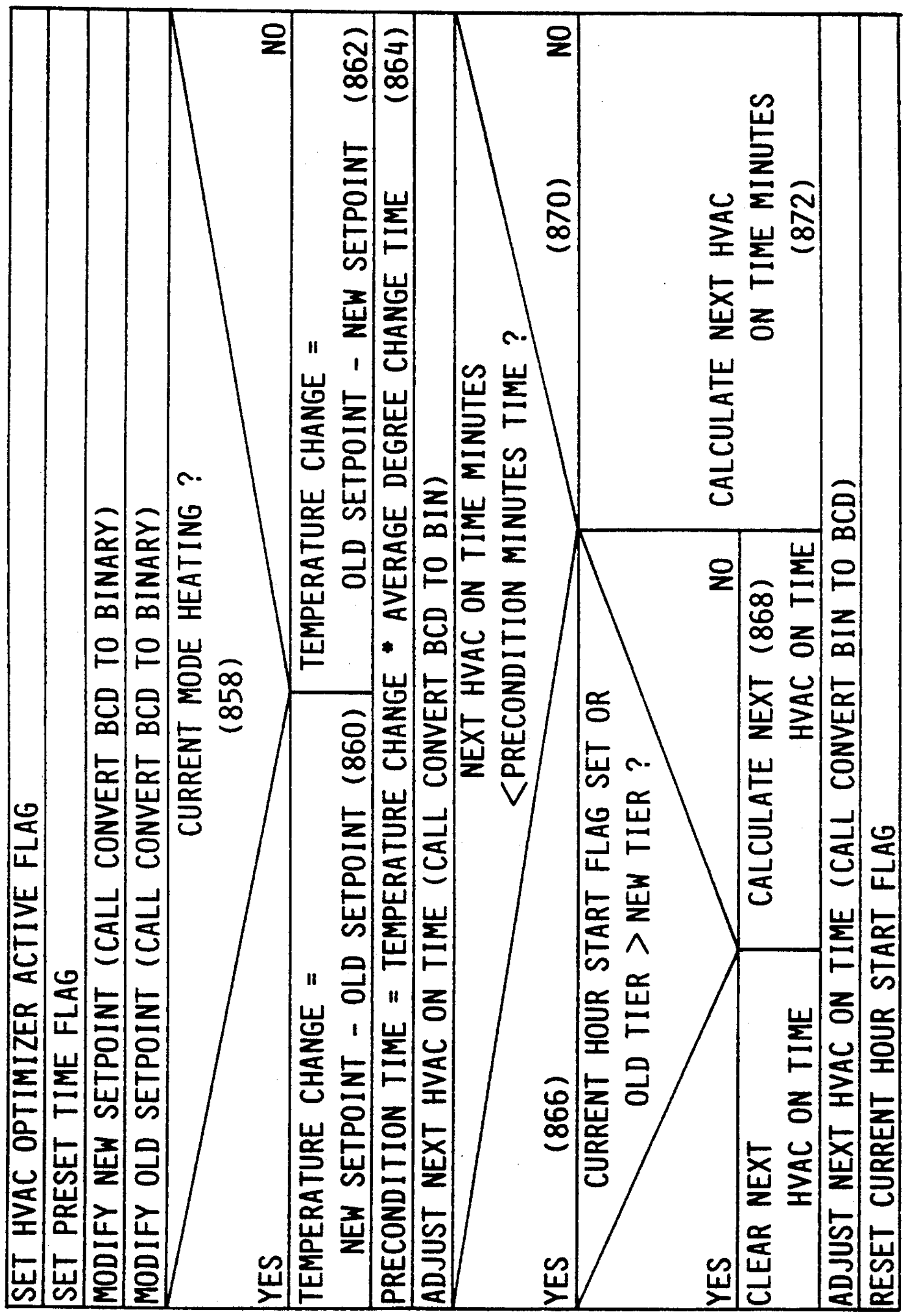
Figure 51:
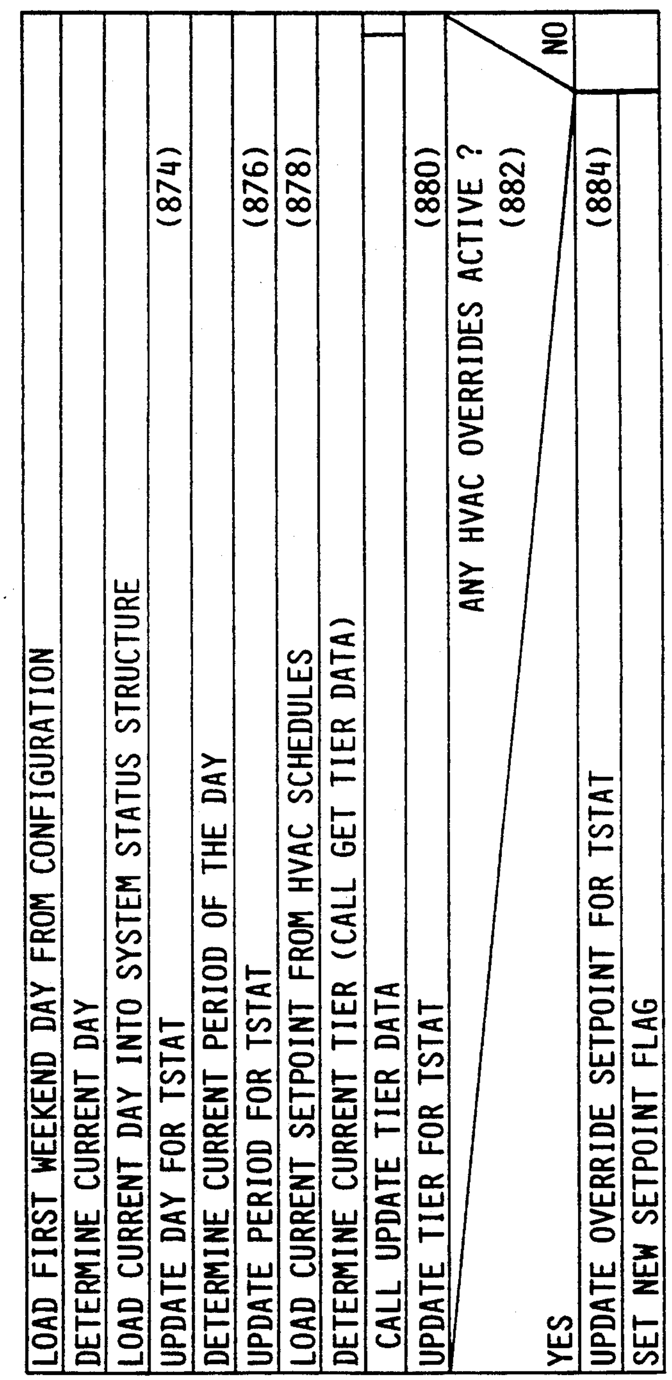
Figure 52A:
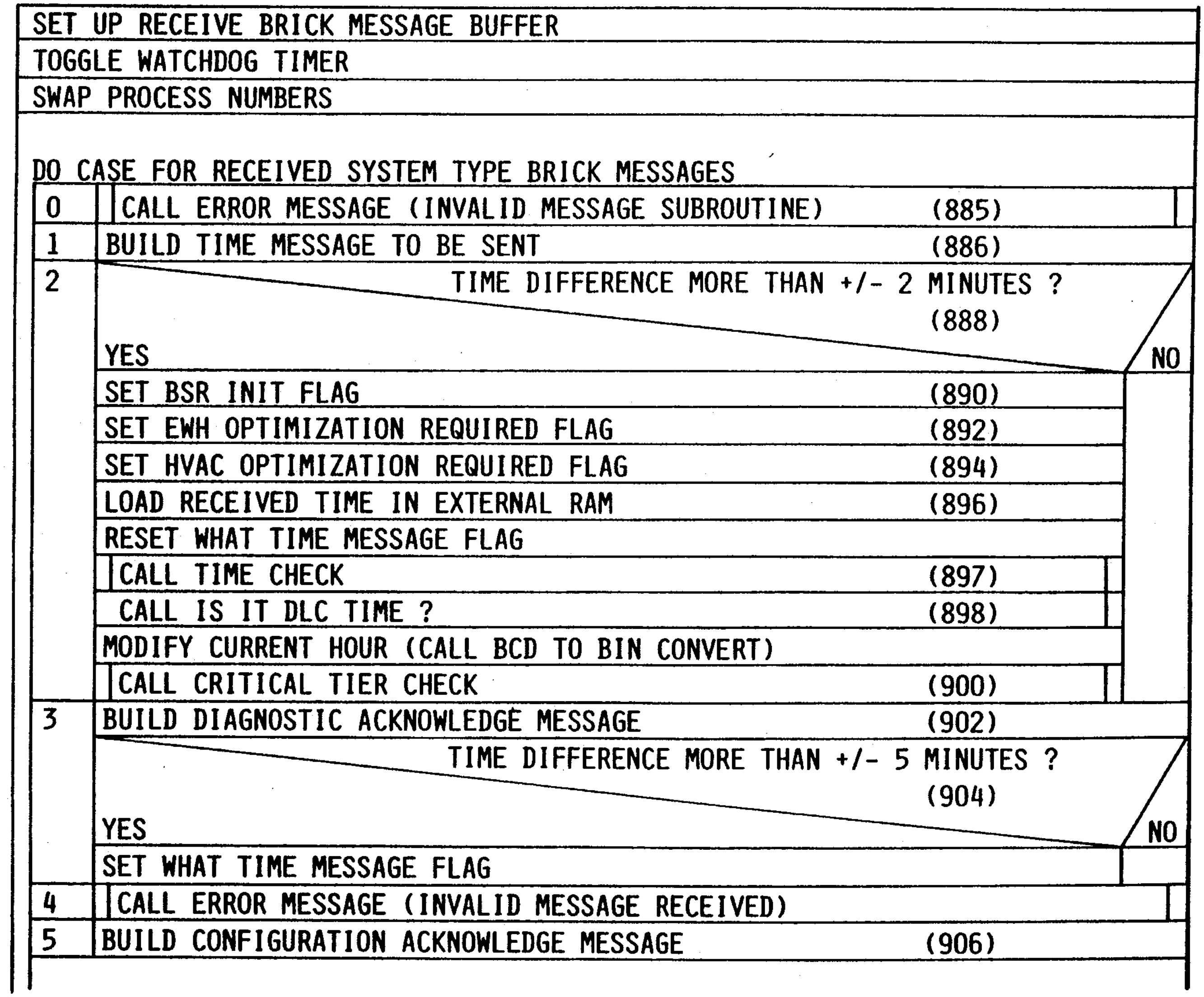
Figure 52B:
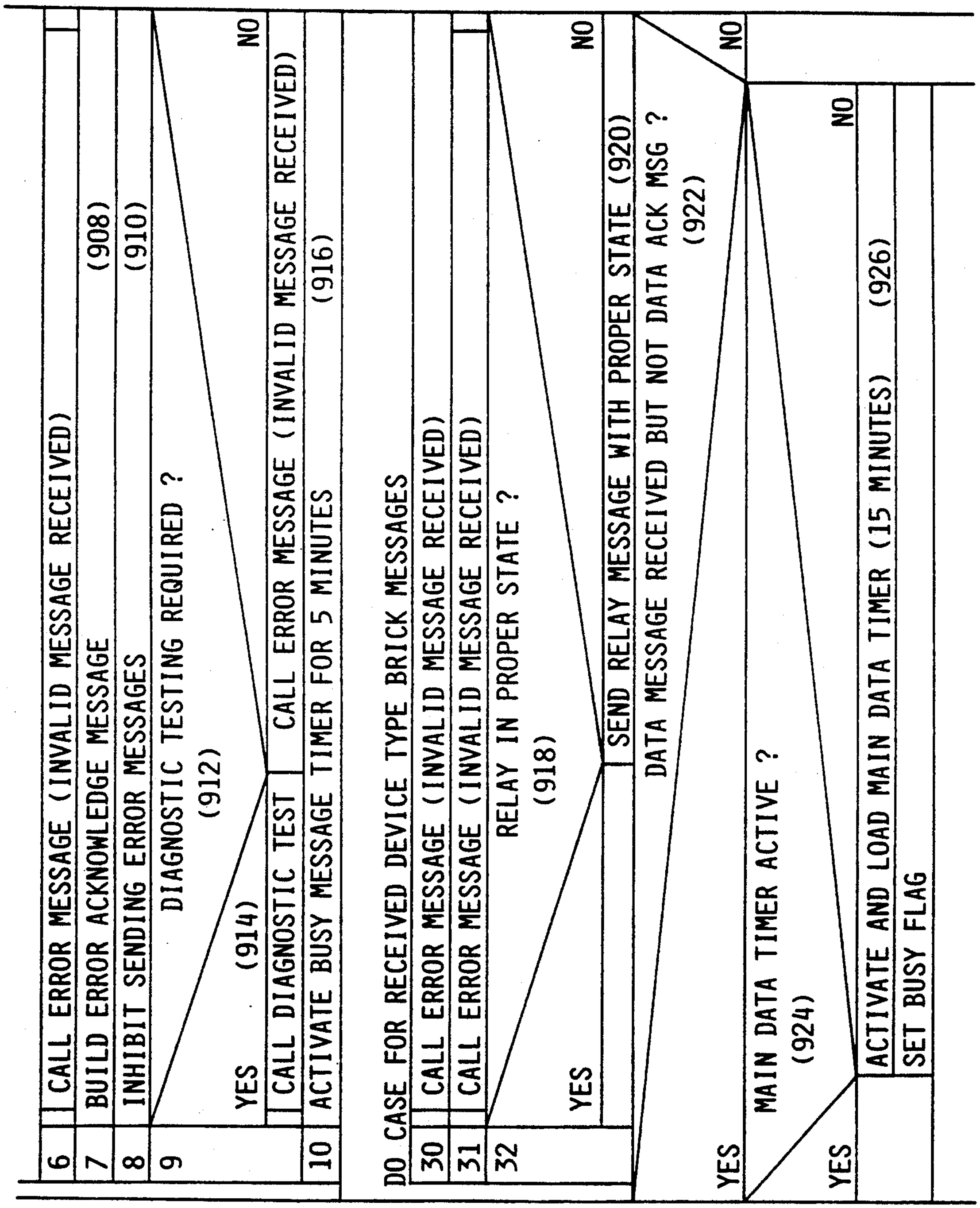
Figure 52C:
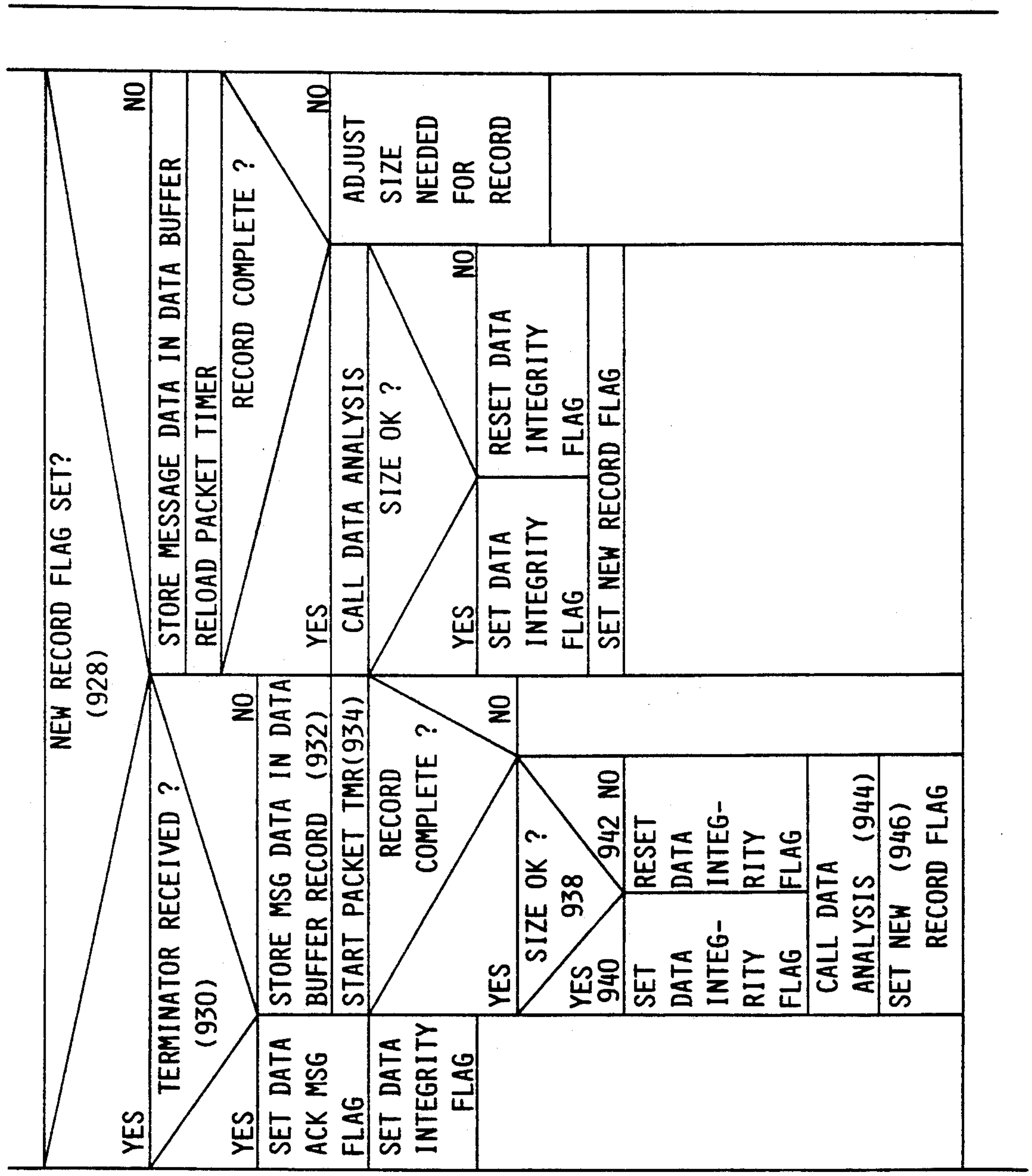
Figure 52D:
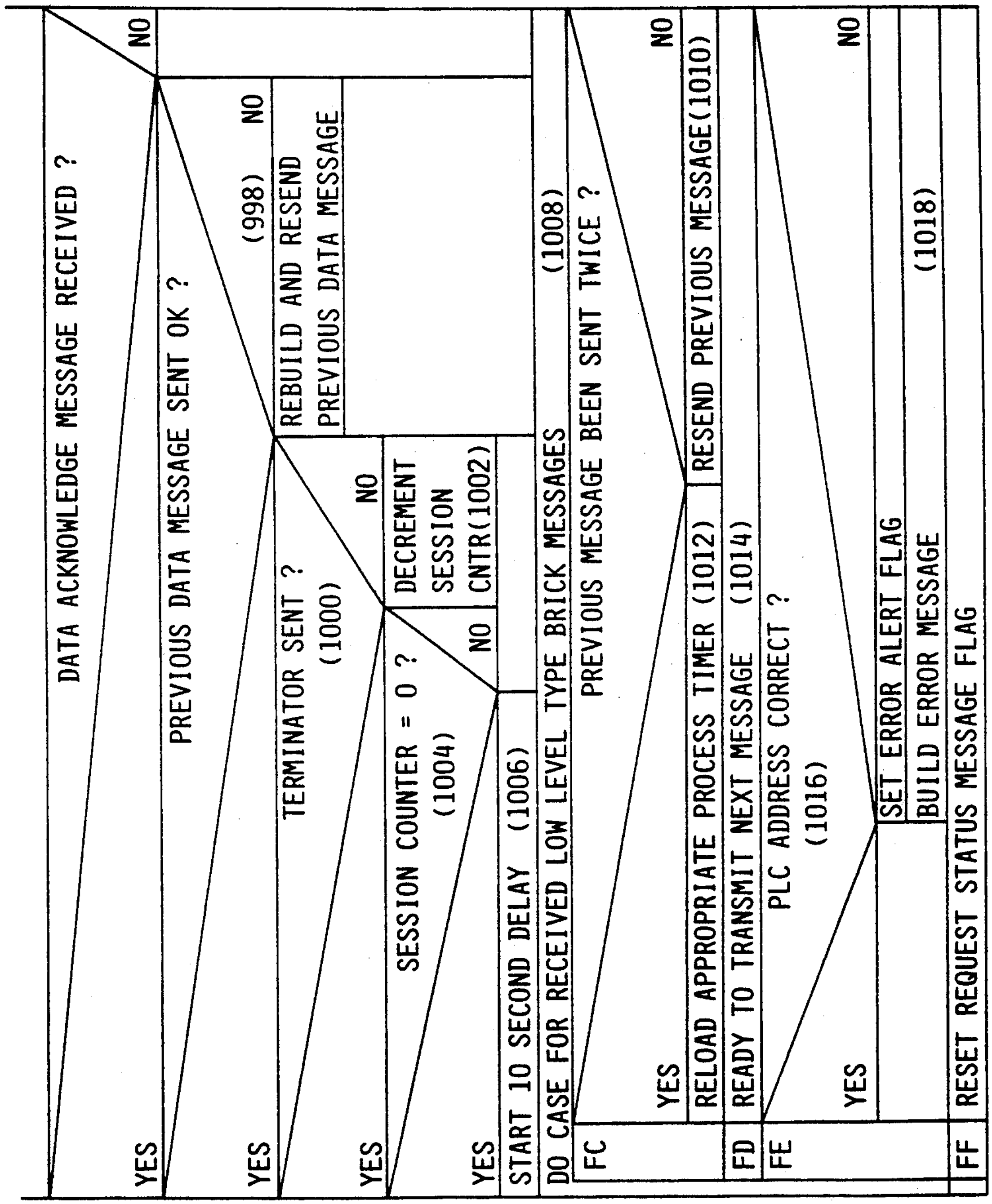
Figure 53A:
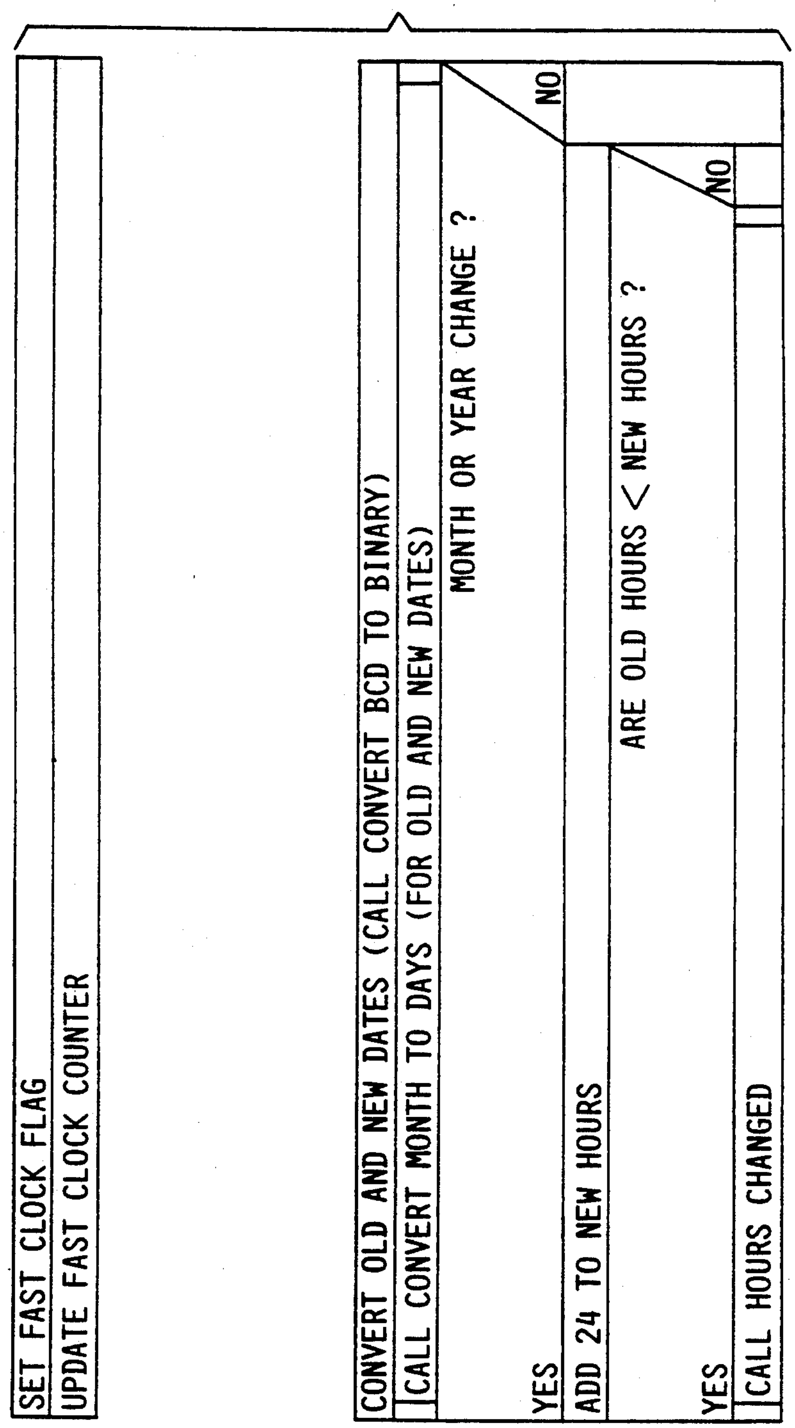
Figure 53B:
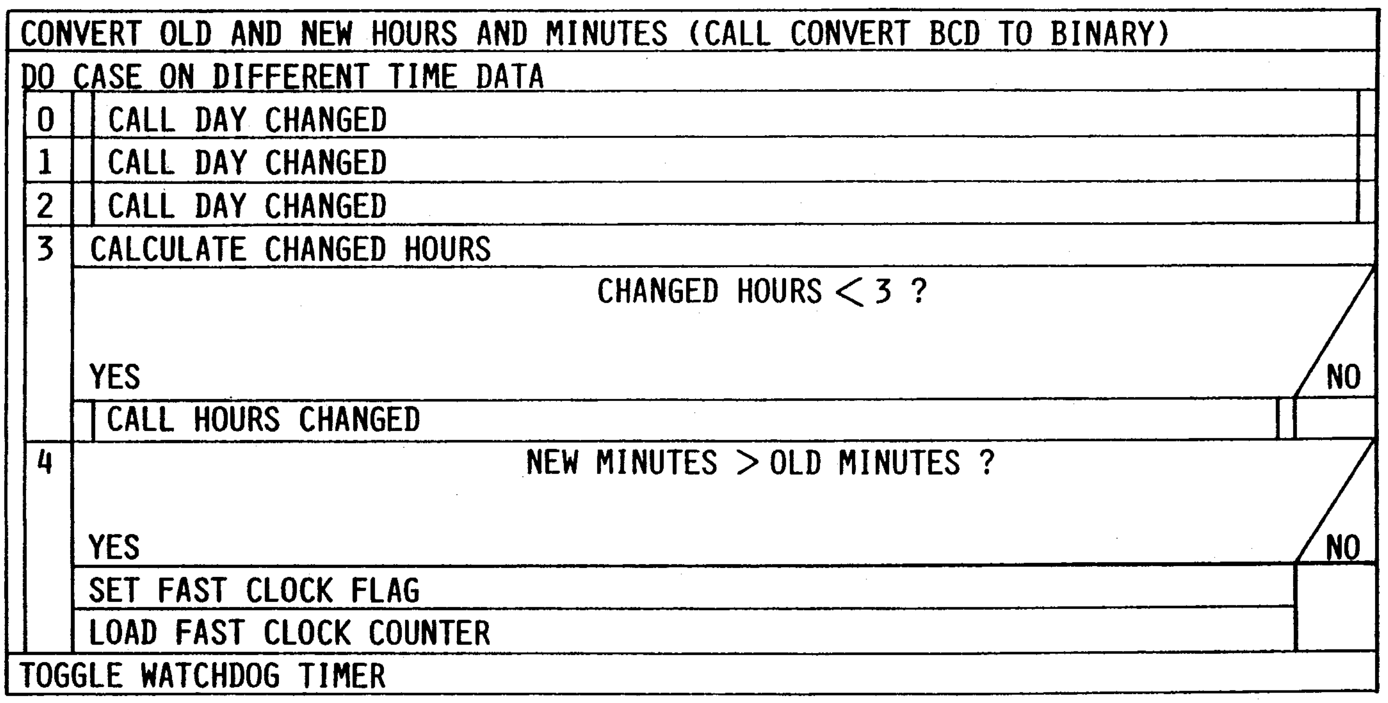
Figure 54A:
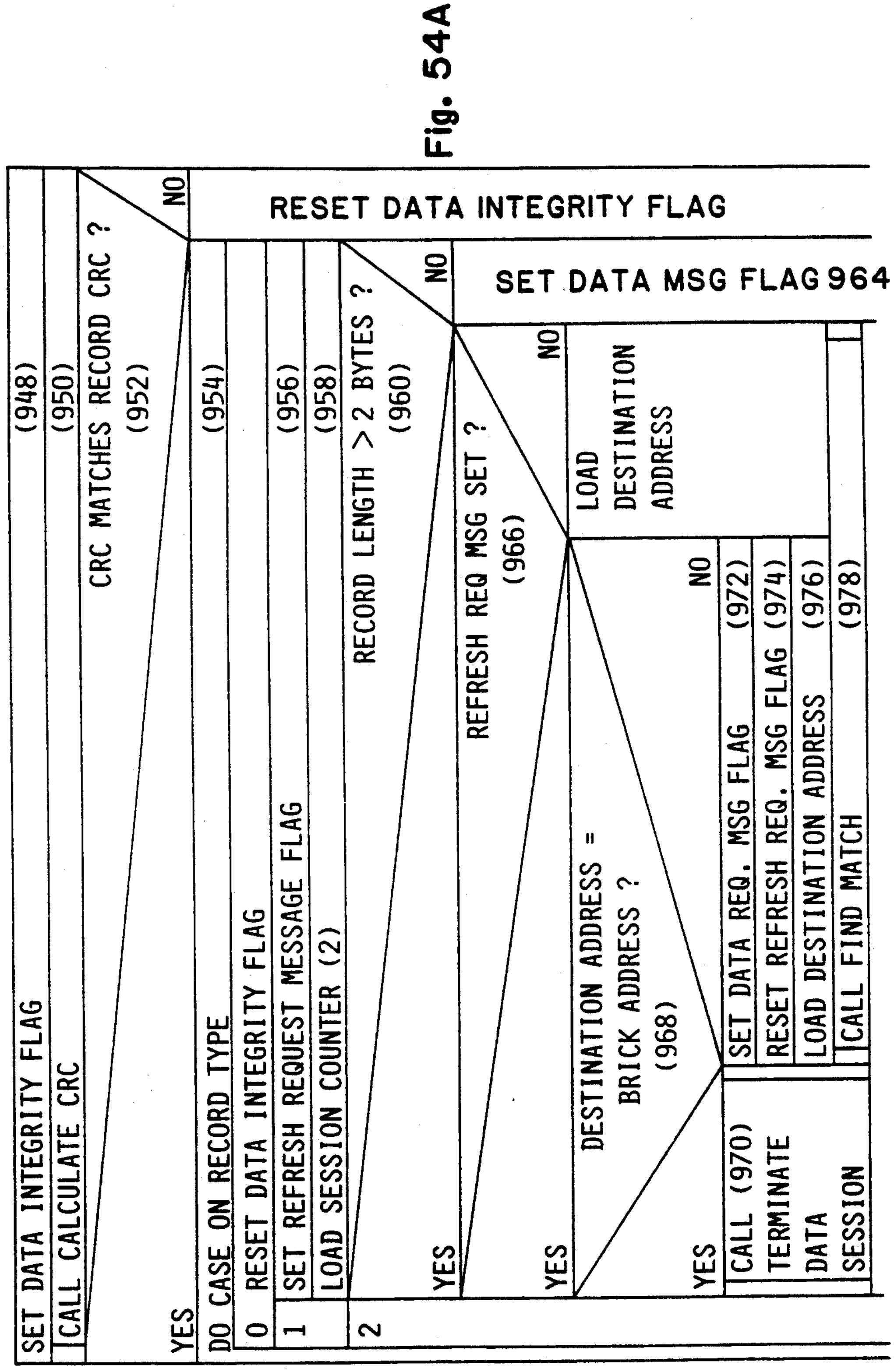
Figure 54B:
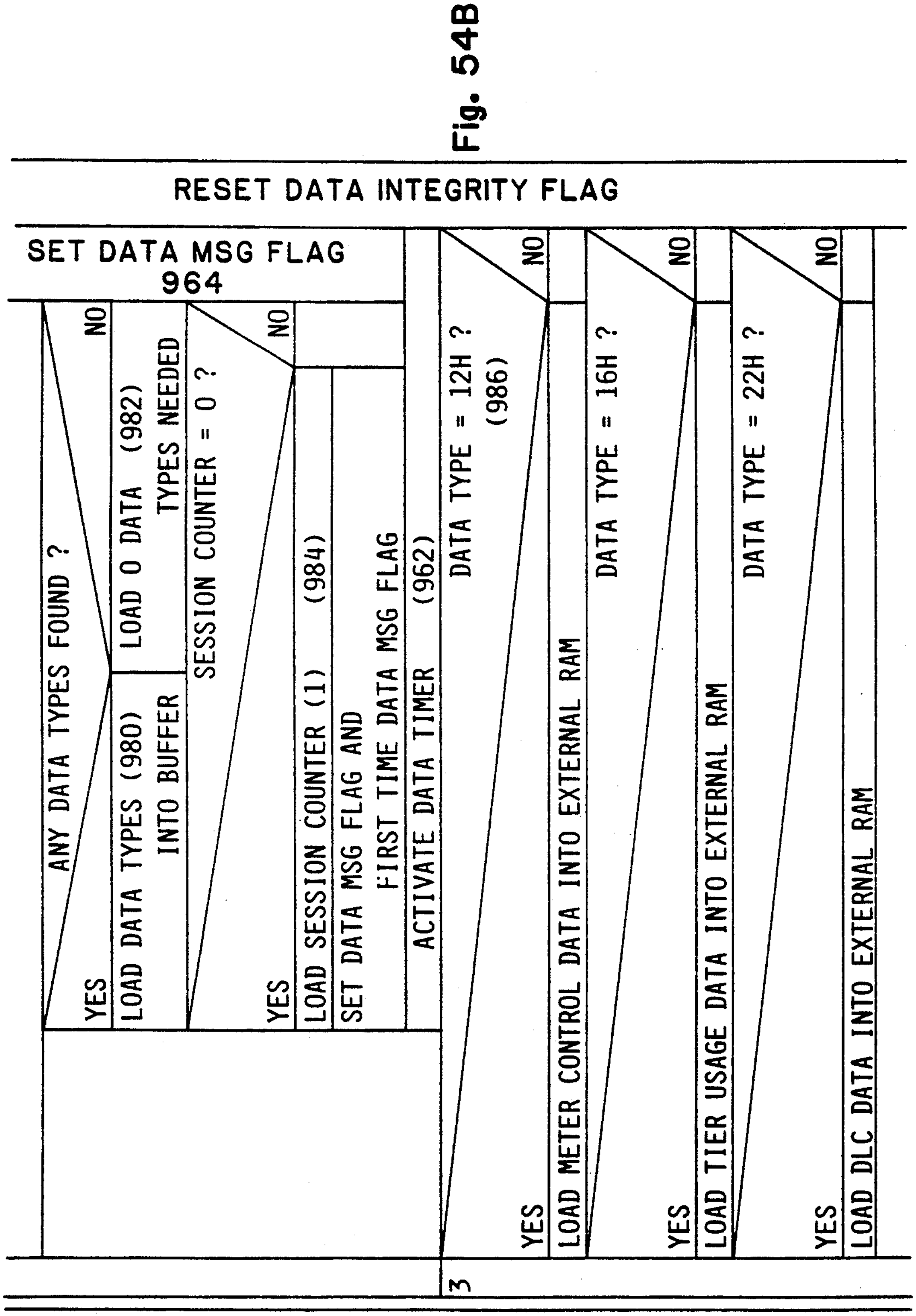
Figure 54C:
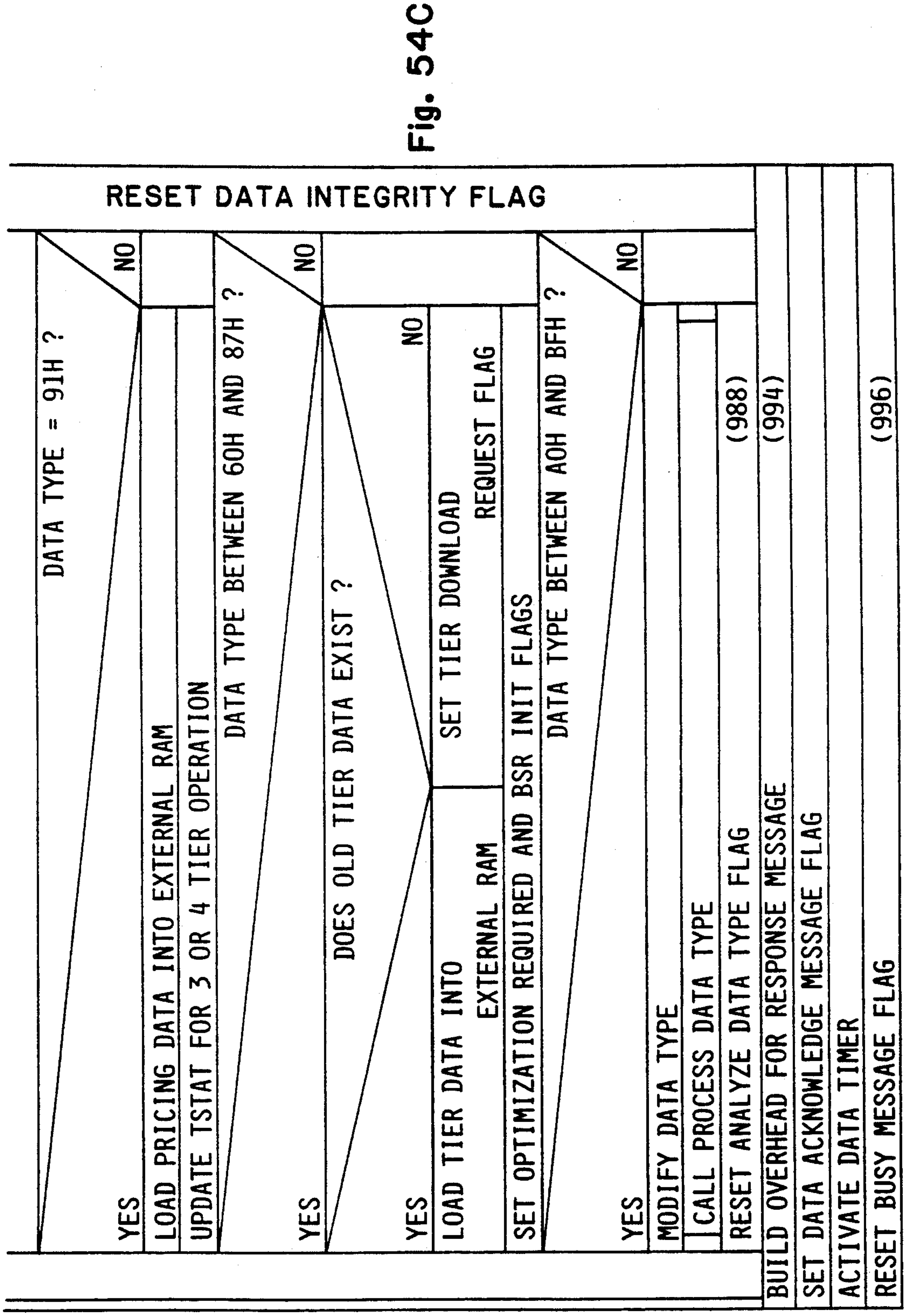
Figure 57:
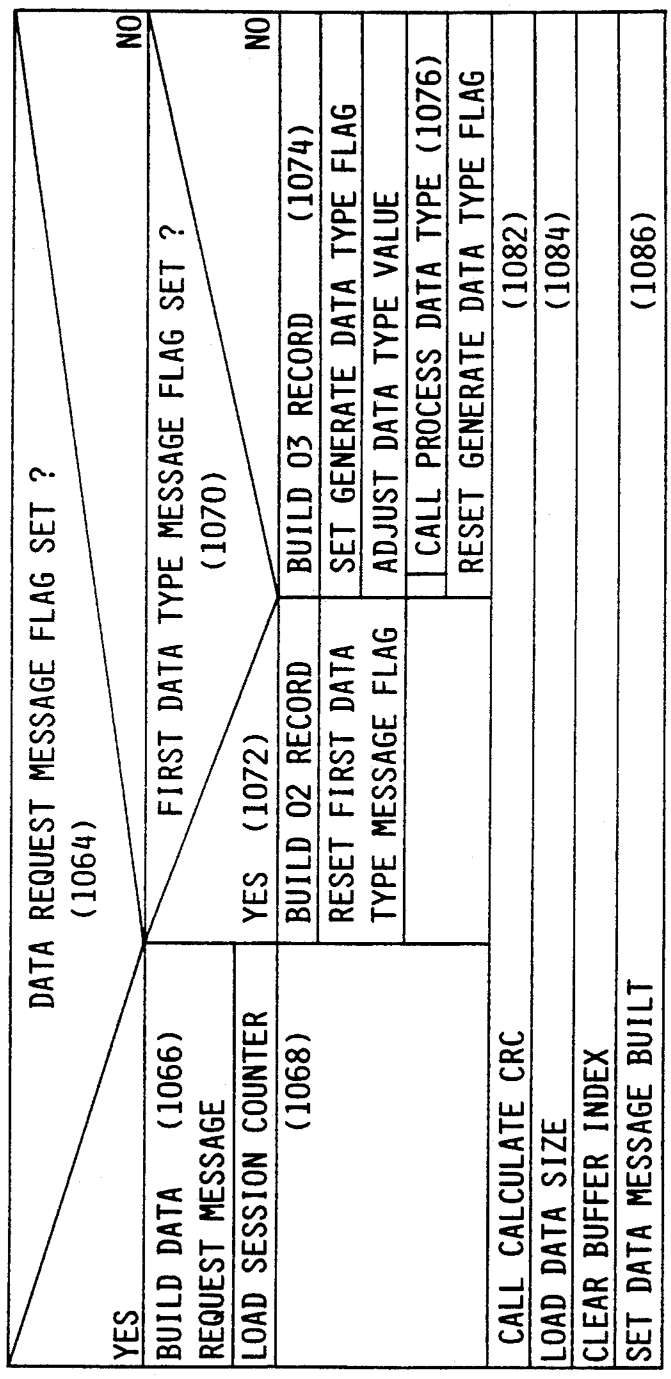

FIG. **25*a*** illustrates the flow chart for the main routine of the program for controlling the thermostat;

FIGS. **25*b* and 25*c*** illustrate the flow chart for the main routine interrupts;

FIG. 26 is a dataflow diagram representing the flow of data within the program which controls the thermostat;

FIG. 27 is a dataflow diagram representing the flow of data within the ANALYZE CONTROLLER MESSAGES portion of the program;

FIG. 28 is a dataflow diagram representing the flow of data within the FORMAT MESSAGES TO CONTROLLER portion of the program;

FIG. 29 is a dataflow diagram representing the flow of data within the GET SWITCH SETTINGS portion of the program;

FIG. 30 is a dataflow diagram representing the flow of data within the GET TEMPERATURE SETTING portion of the program;

FIG. 31 is a dataflow diagram representing the flow of data within the ANALYZE KEYPAD ENTRIES portion of the program;

FIG. 32 is a dataflow diagram representing the flow of data within the PROCESS PERSON-MACHINE INTERFACE portion of the program;

FIG. 33 is a dataflow diagram representing the flow of data within the OUTPUT DATA TO DISPLAYS portion of the program;

FIG. 34 is a dataflow diagram representing the flow of data within the INITIALIZATION AND SELF-TEST portion of the program;

FIG. 35 illustrates the layout for the LCD display segments;

FIGS. 36A–36G illustrate the N/S (Nassi/Schneiderman), diagram for the real time routine;

FIGS. 37A–37B illustrate the N/S diagram for the initialization routine;

FIG. 38 illustrates the N/S diagram for the RAM test subroutine;

FIGS. 39A–39D illustrate the N/S diagrams for the main operating loop routine;

FIG. 40 is a dataflow diagram which represents the flow of data between the main routines of the controller software;

FIGS. 41A–41N illustrate the N/S diagrams for the billing routine and thirteen associated step routines;

FIGS. 42A–42F illustrates the N/S diagrams for a group of subroutines used in steps one to thirteen;

FIGS. 43A–43G illustrate the N/S diagram for the main routine;

FIGS. 44A–44C illustrate the N/S diagram for the load control module;

FIGS. 45A–45C illustrate the N/S diagram for the BSR (X-10) device control module;

FIGS. 46A–46B illustrate the N/S diagram for the electric water heater optimization routine;

FIG. 47 illustrates the N/S diagram for the get closest time subroutine;

FIG. 48 illustrates the N/S diagram for the get tier data routine;

FIGS. 49A–49B illustrate the N/S diagram for the HVAC optimization routine;

FIG. 50 illustrates the N/S diagram for the calculate precondition time subroutine;

FIG. 51 illustrates the N/S diagram for the what day is it routine;

FIGS. 52A–52D illustrate the N/S diagram for the BRICK message decode subroutine;

FIGS. 53A–53B illustrate the N/S diagrams for the fast clock subroutine;

FIGS. 54A–54C illustrate the N/S diagrams for the data analysis routine;

FIGS. 56A–56D illustrate the N/S diagram for the send BRICK message routine;

FIG. 57 illustrates the N/S diagram for the data message generation routine.

Figure 59:
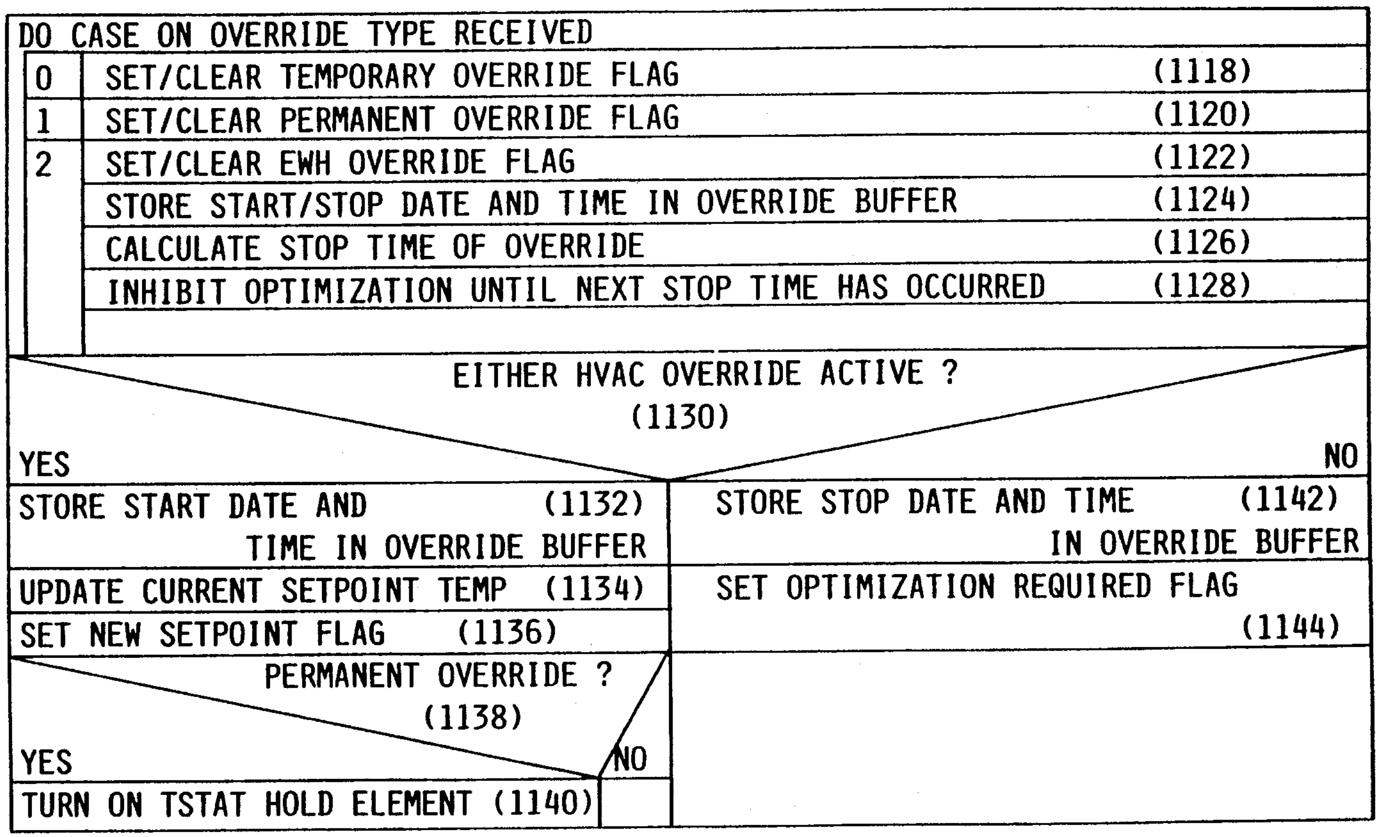
Figure 60A:
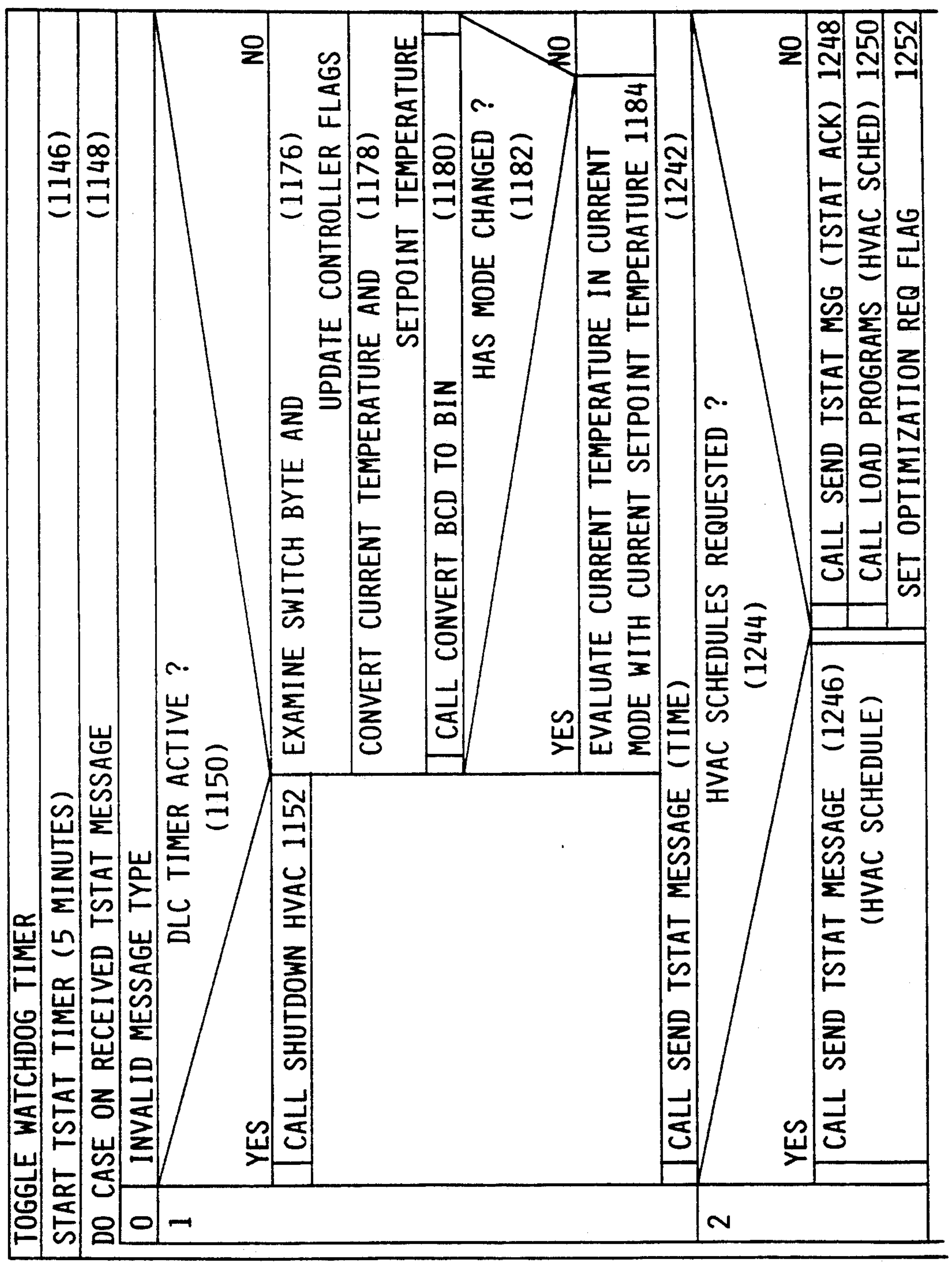
Figure 60B:
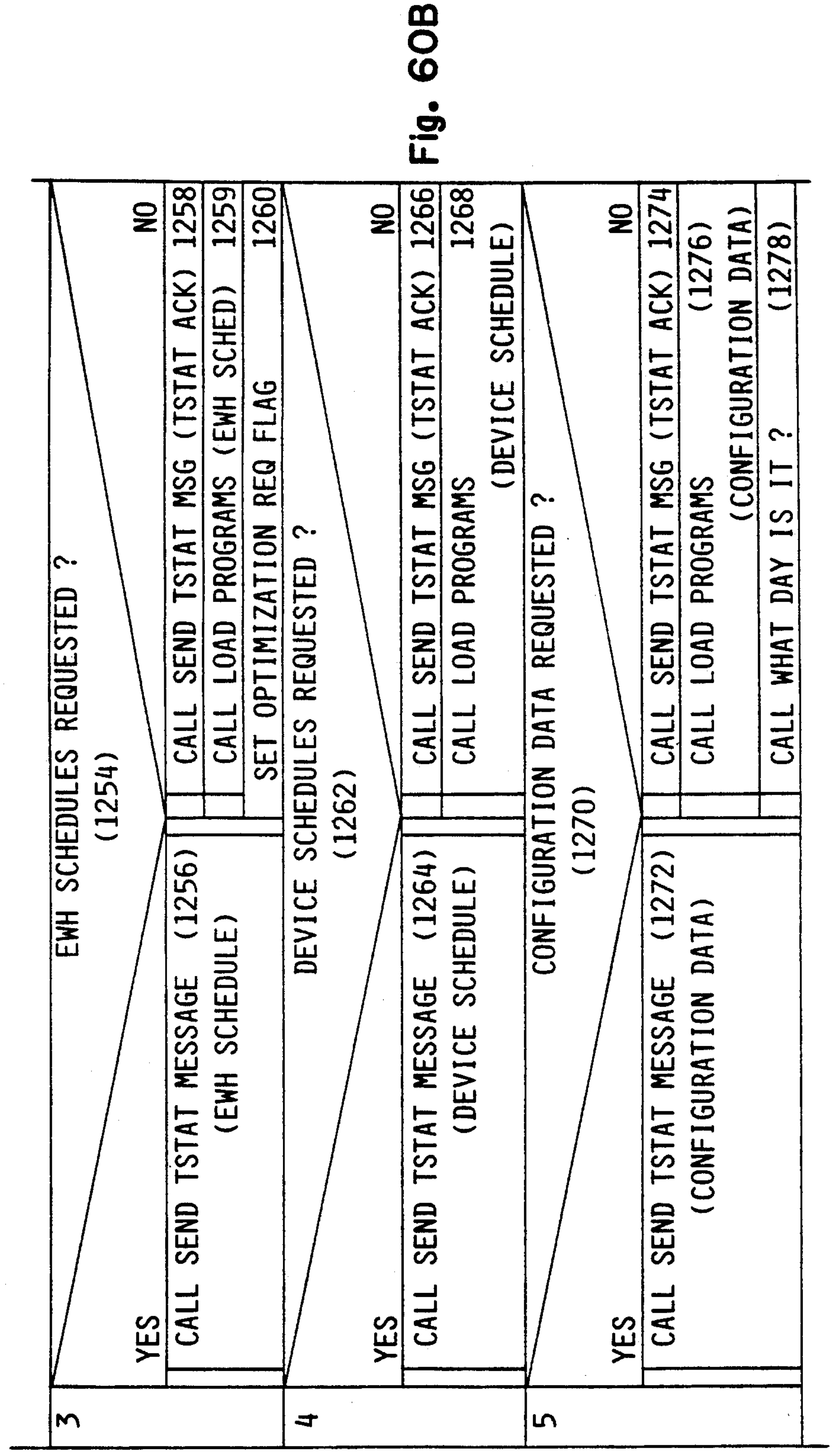
Figure 60C:
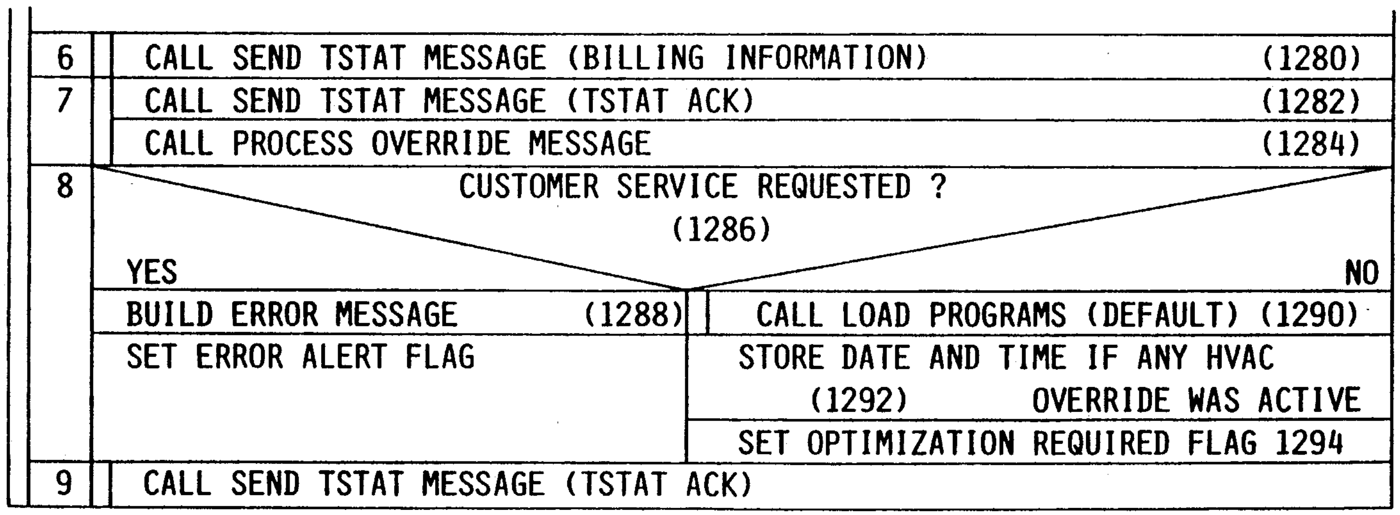
Figure 61:
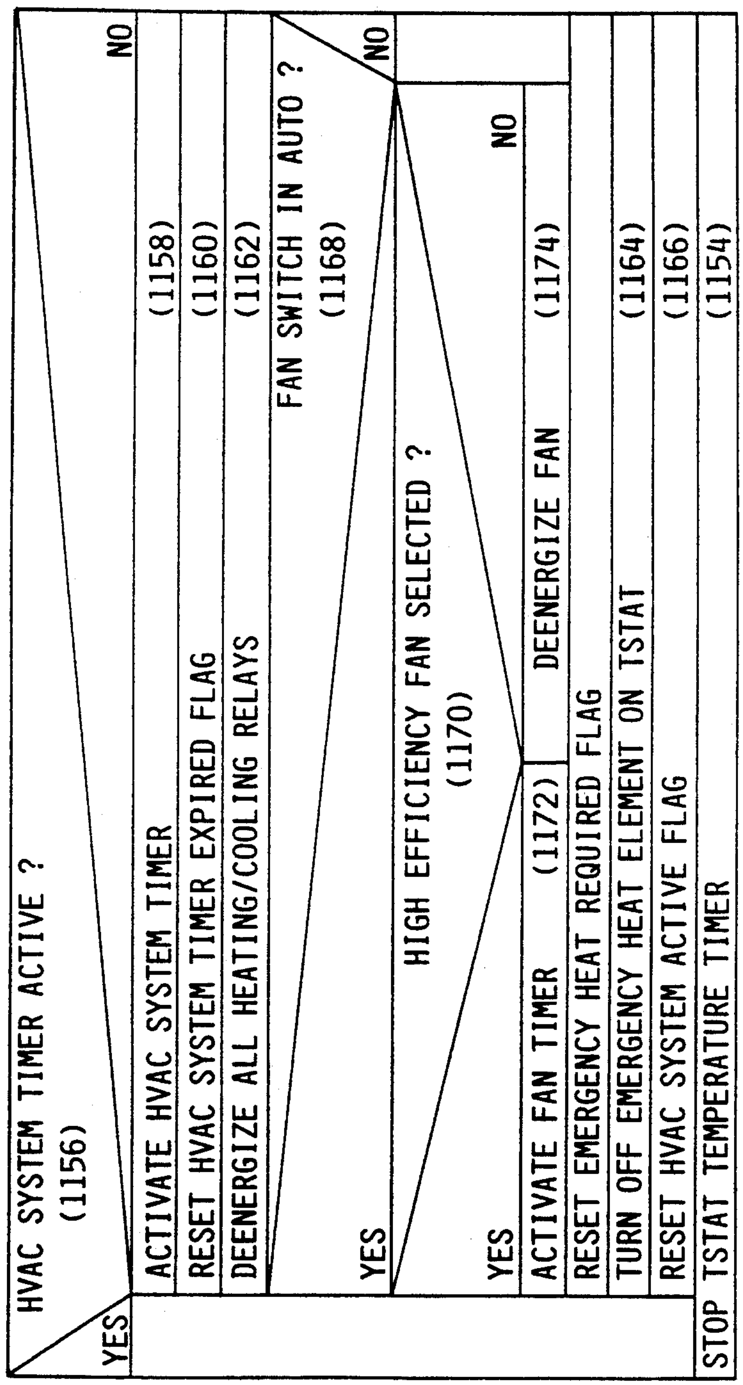
Figure 62A:
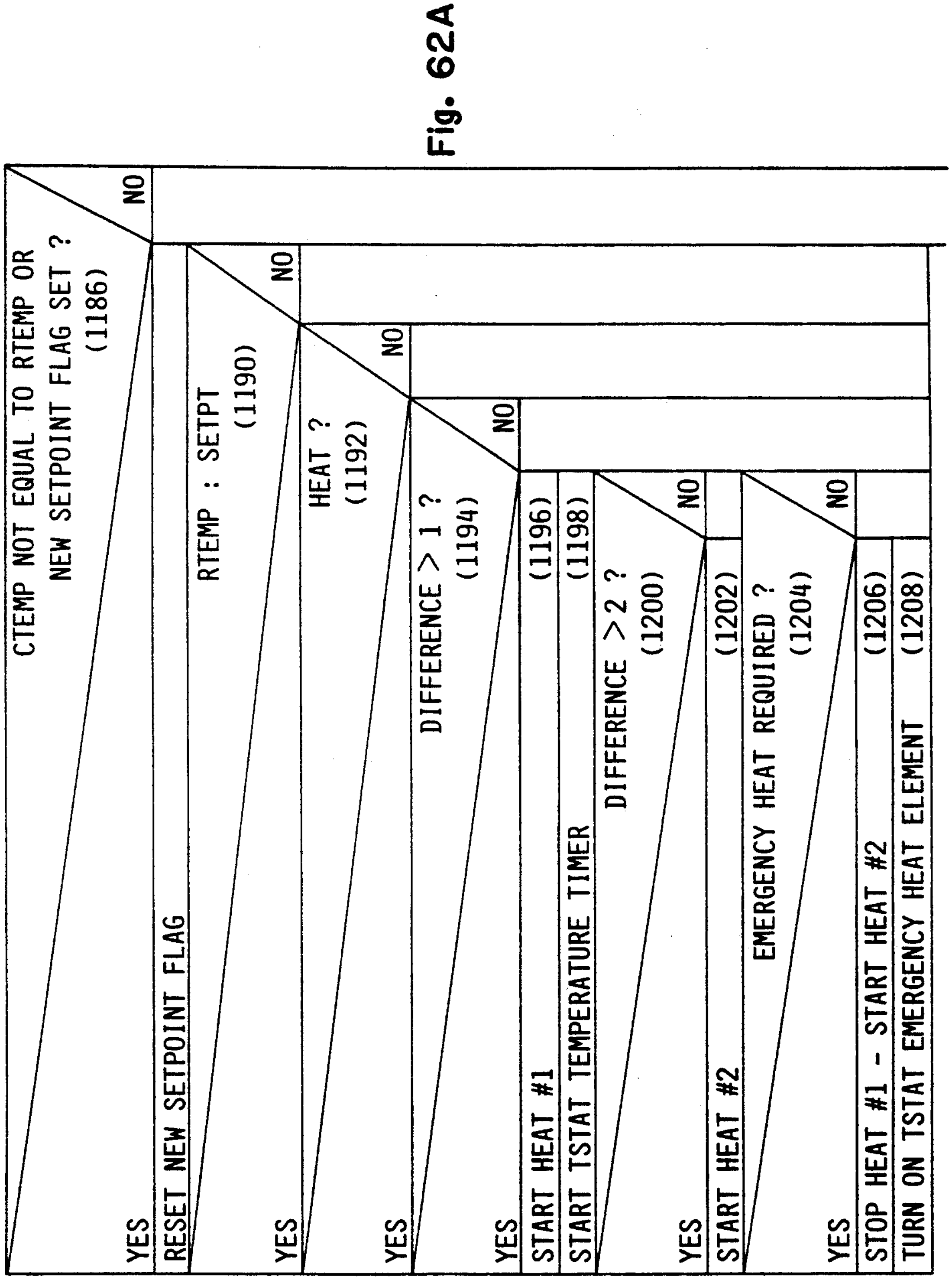
Figure 62B:
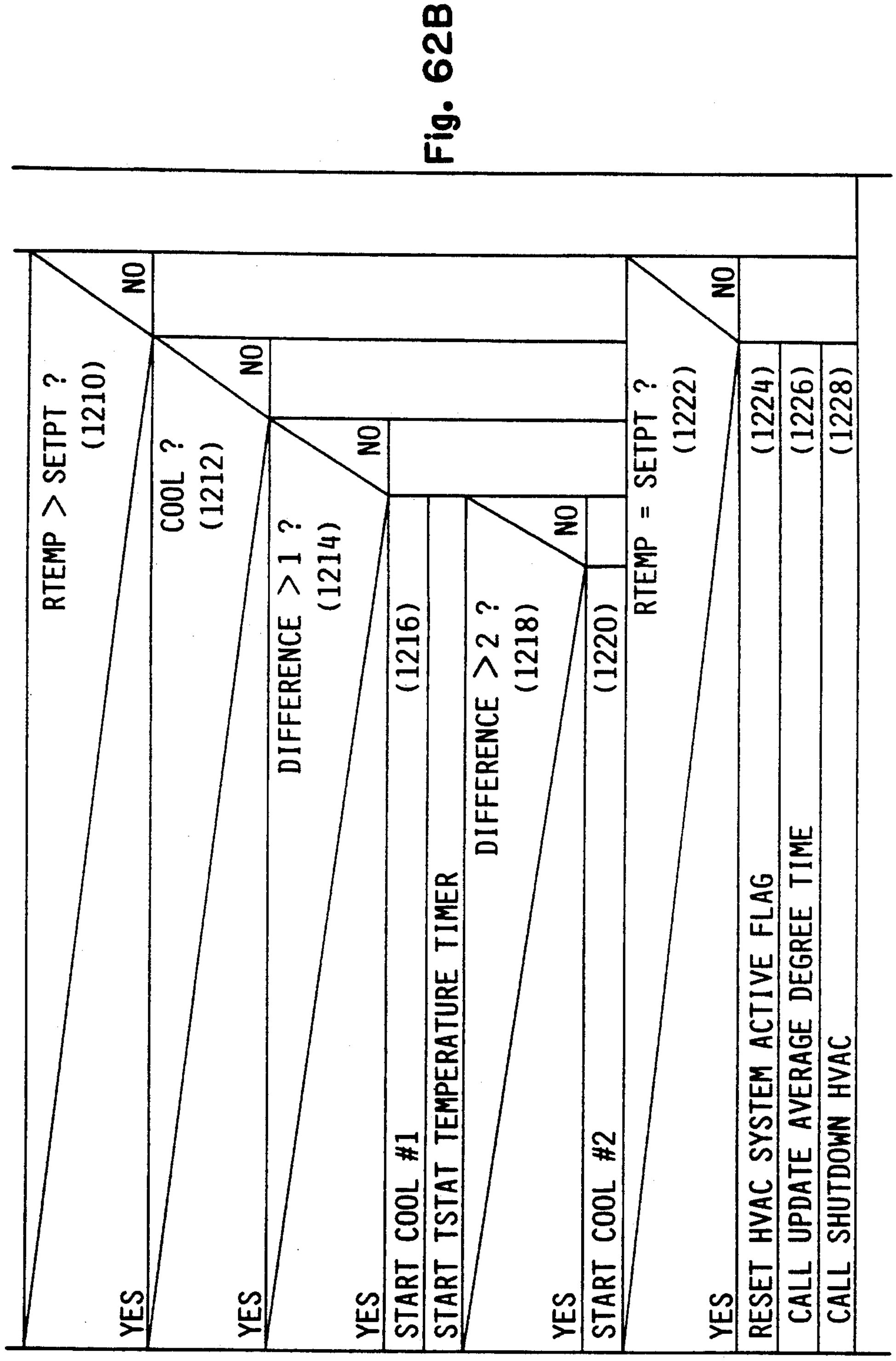
Figure 62C:
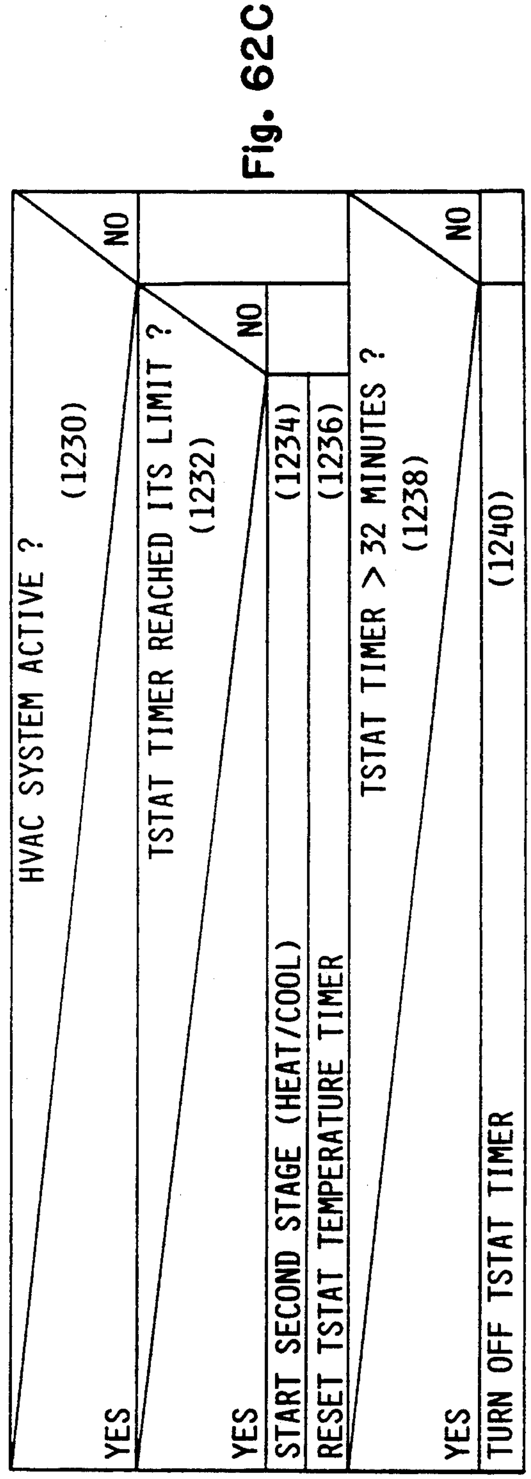
Figure 63:
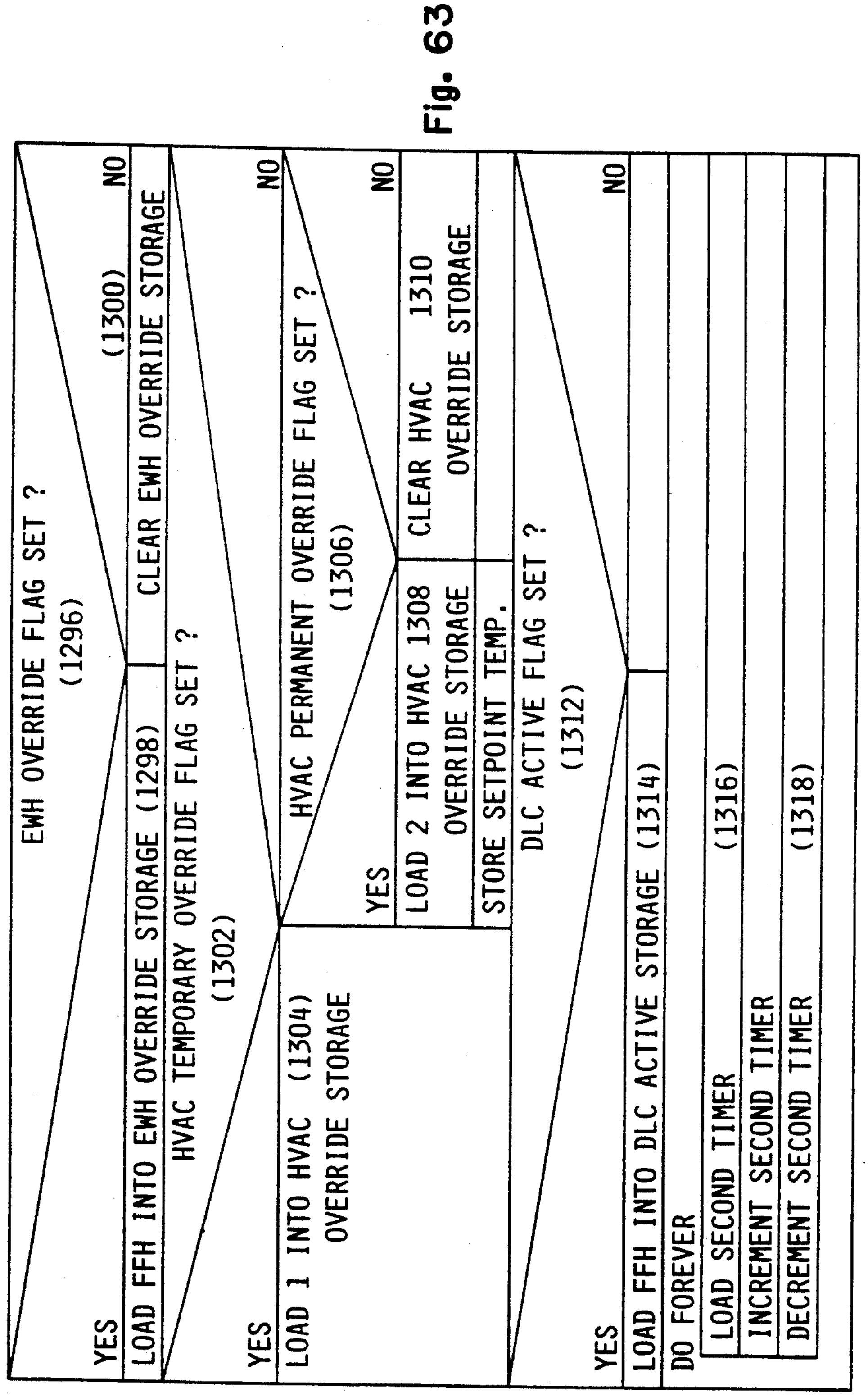
Figure 64C:
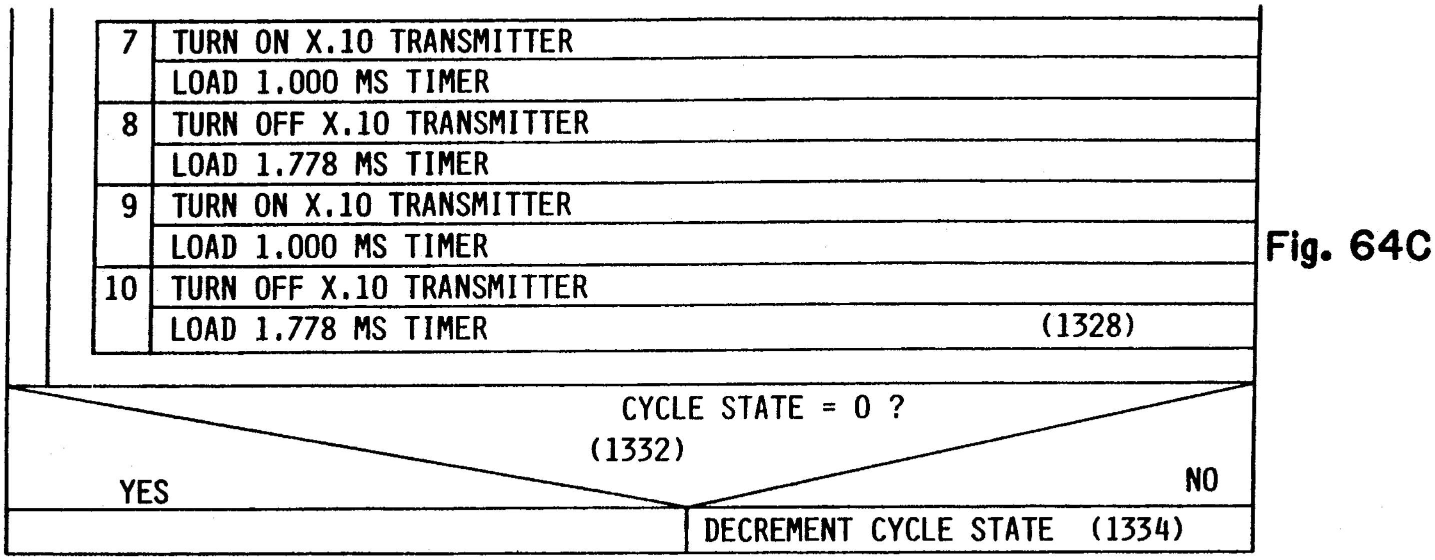
Figure 65A:
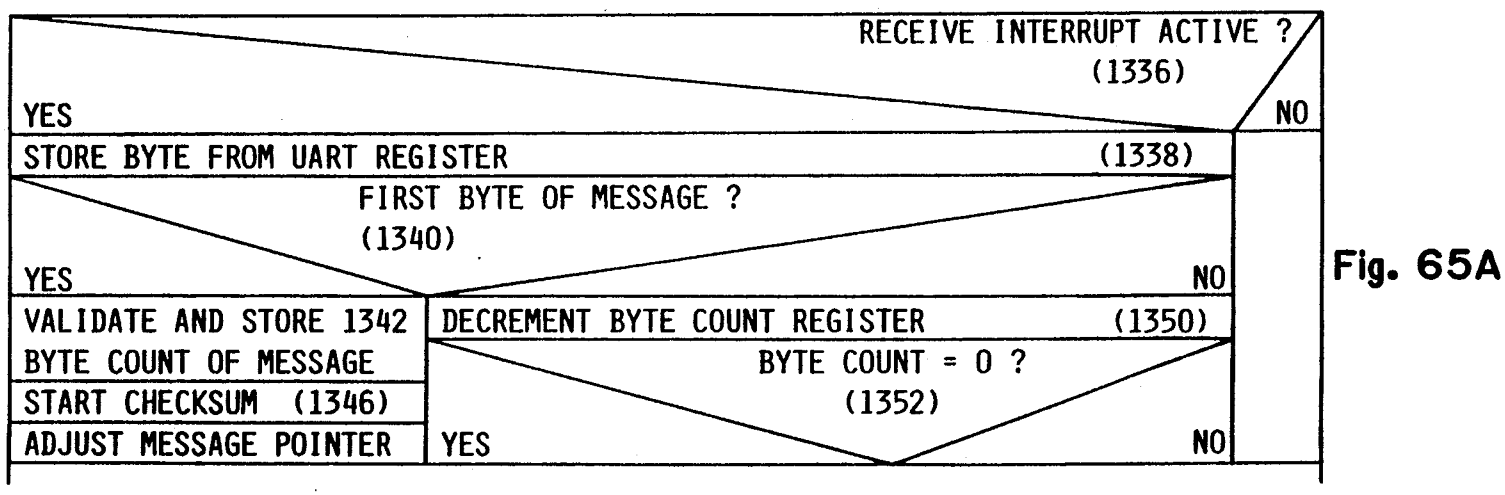
Figure 65B:
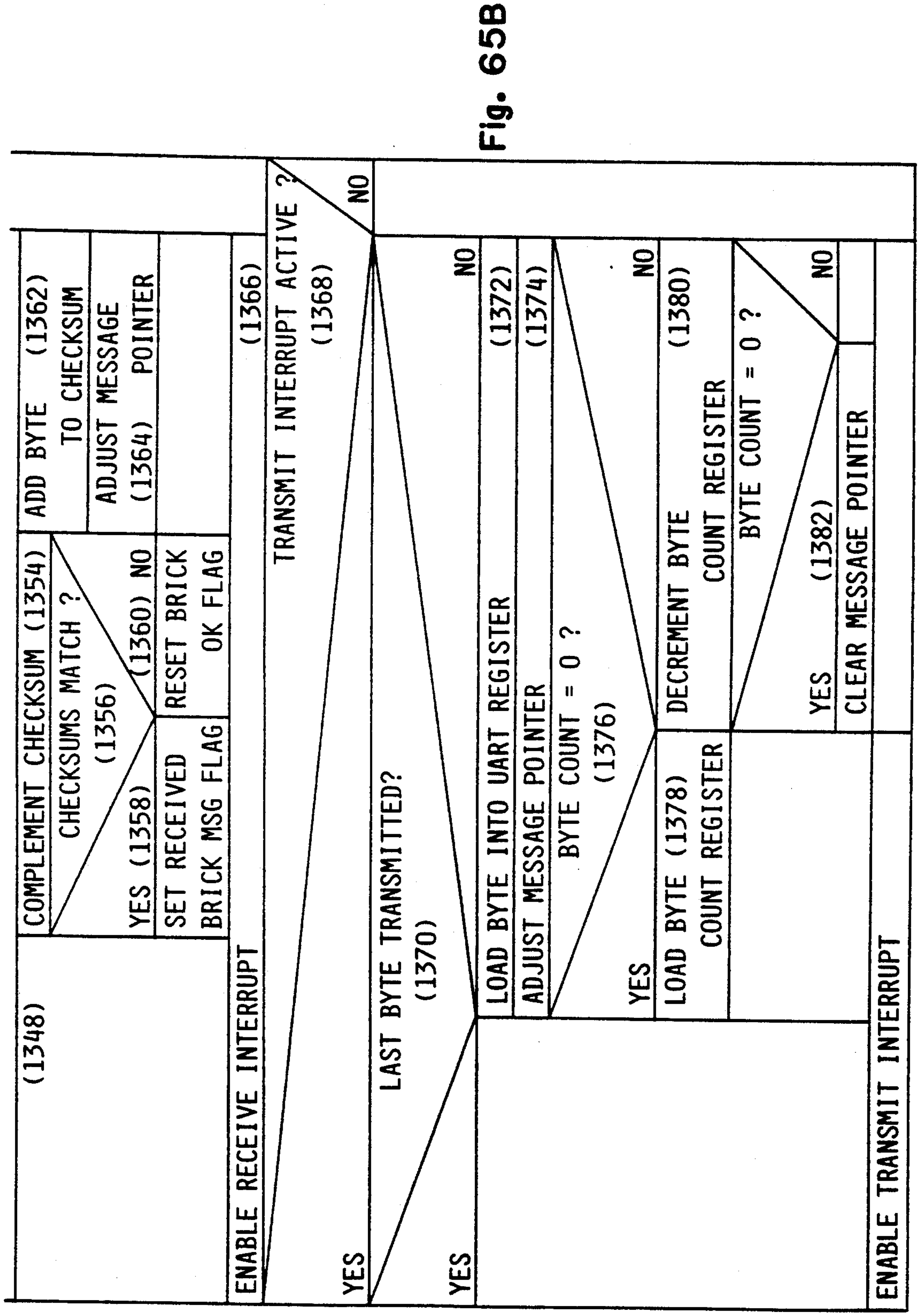
Figure 66A:
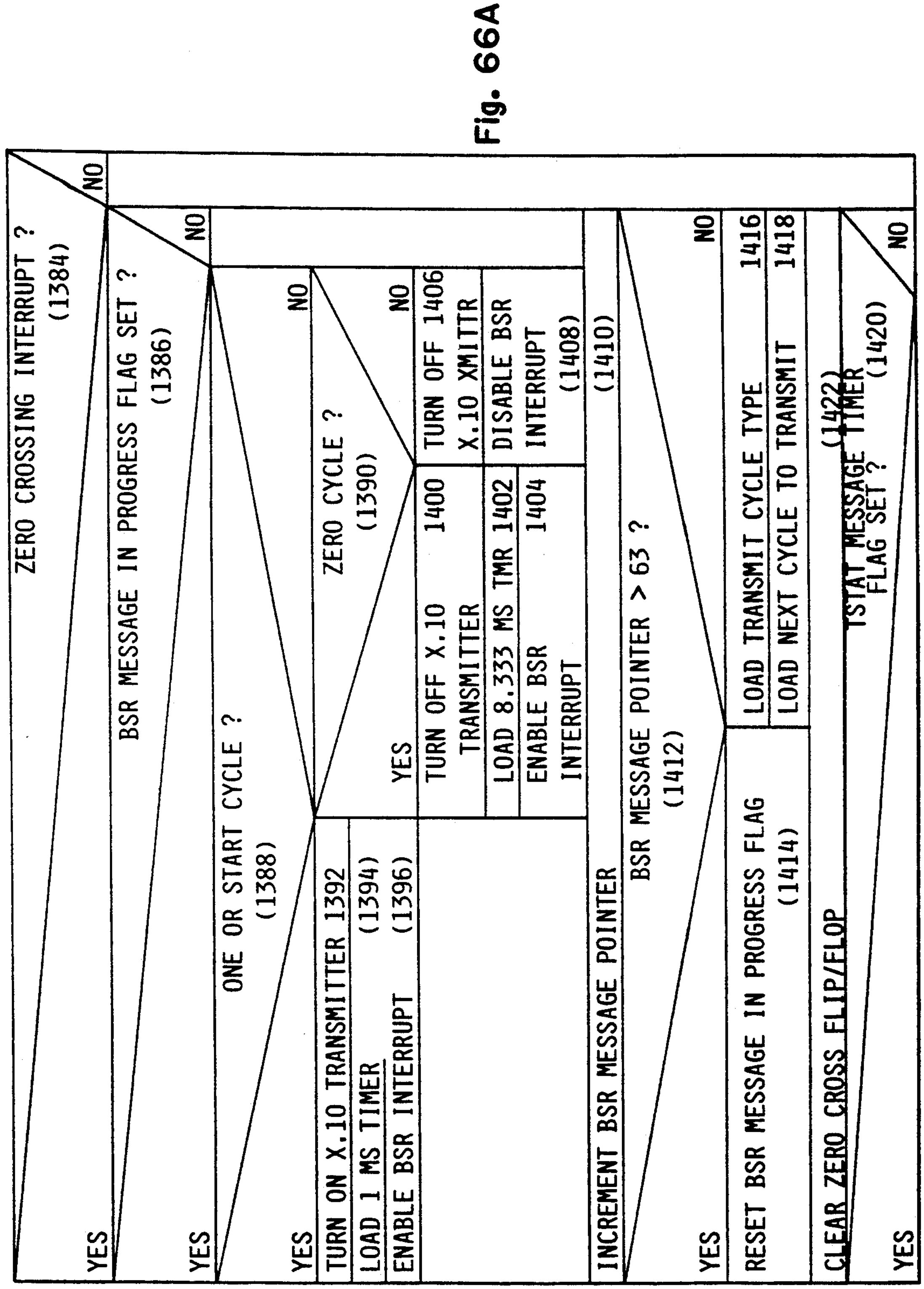
Figure 66B:
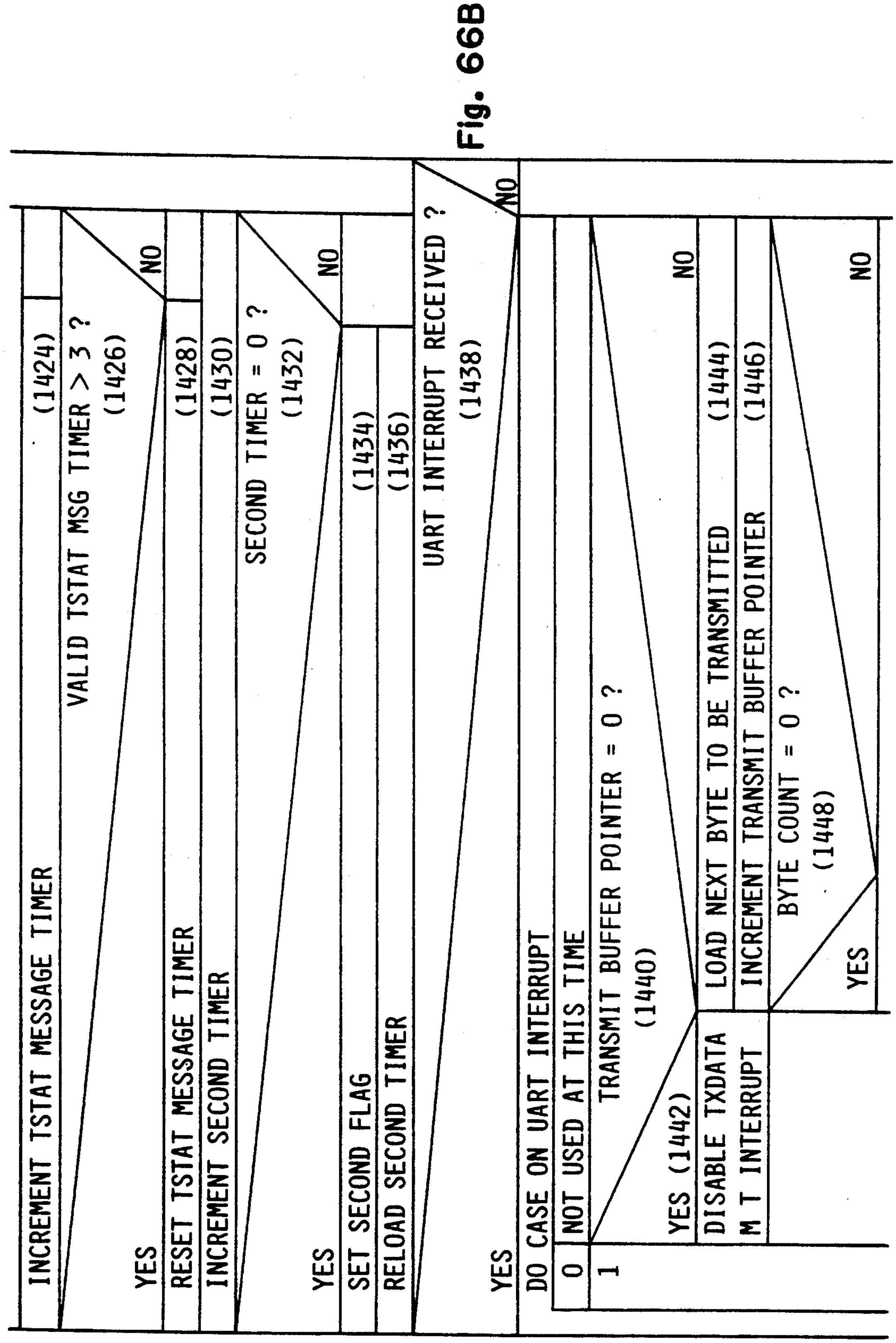
Figure 66C:
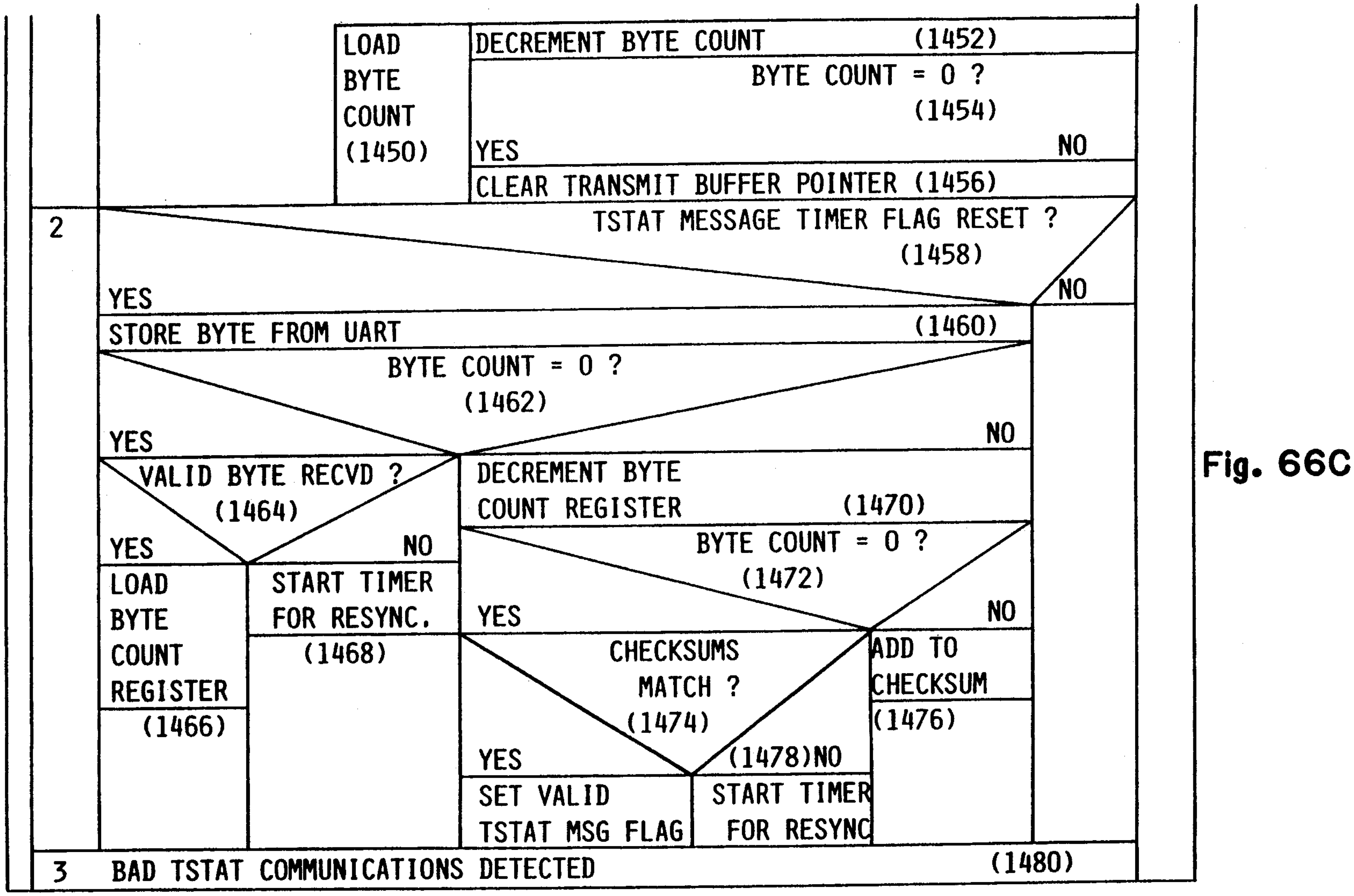
Figure 67:
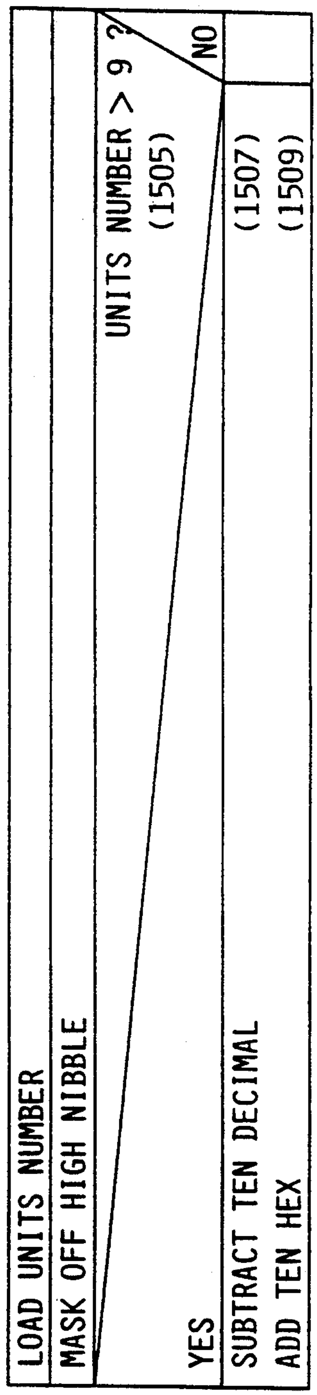
Figure 69:
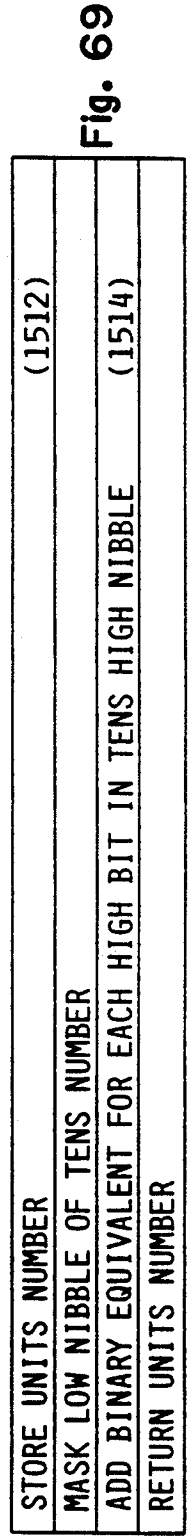
Figure 70:
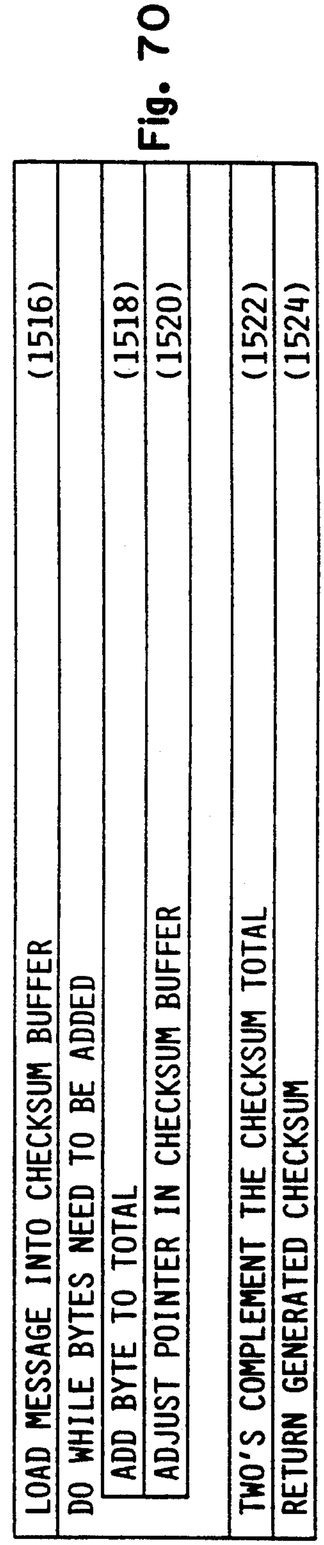
Figure 68:
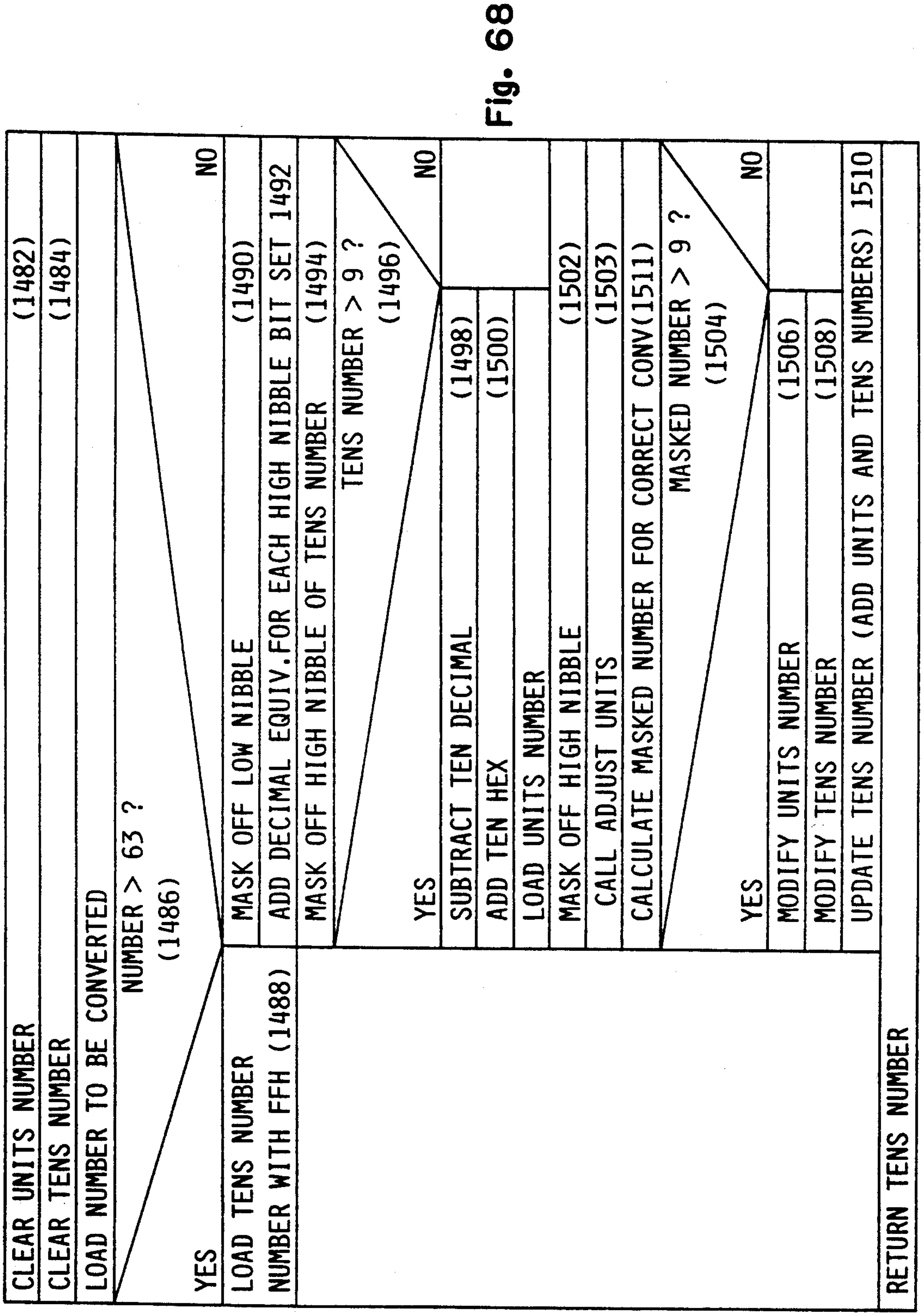
Figure 71A:
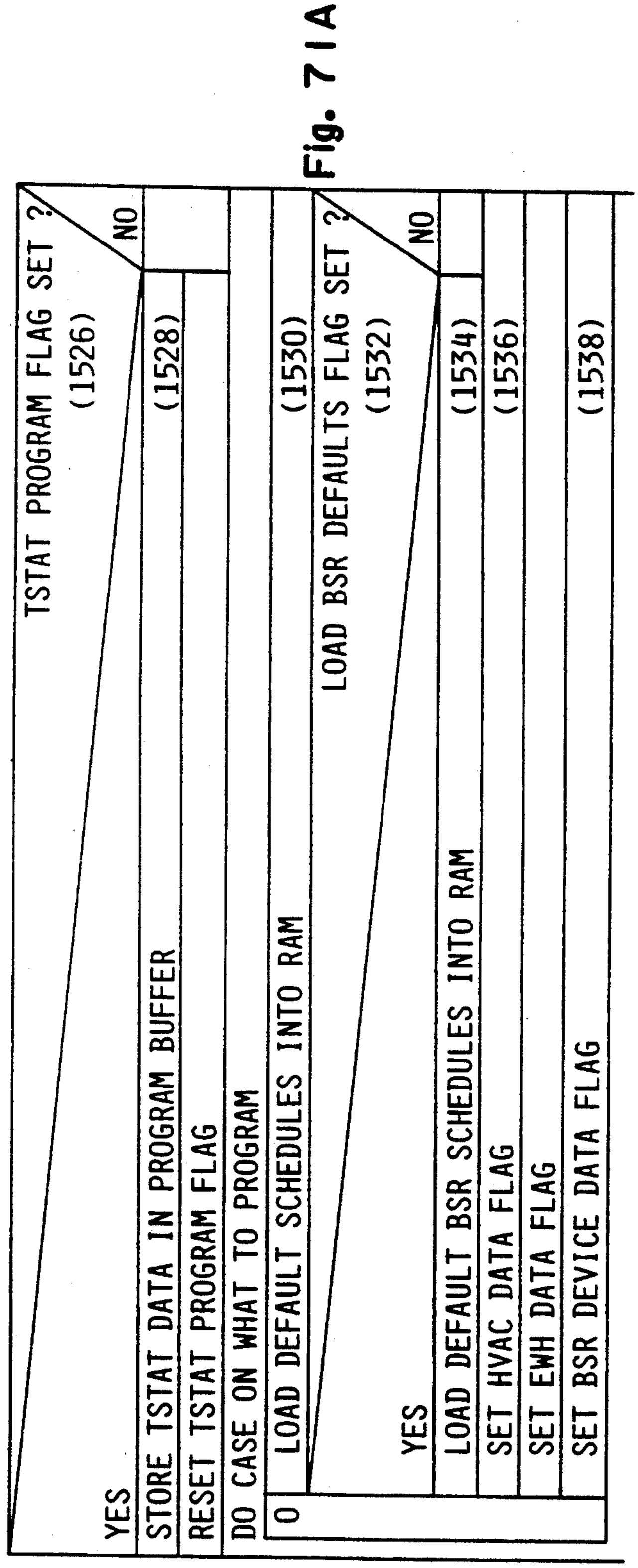
Figure 71B:
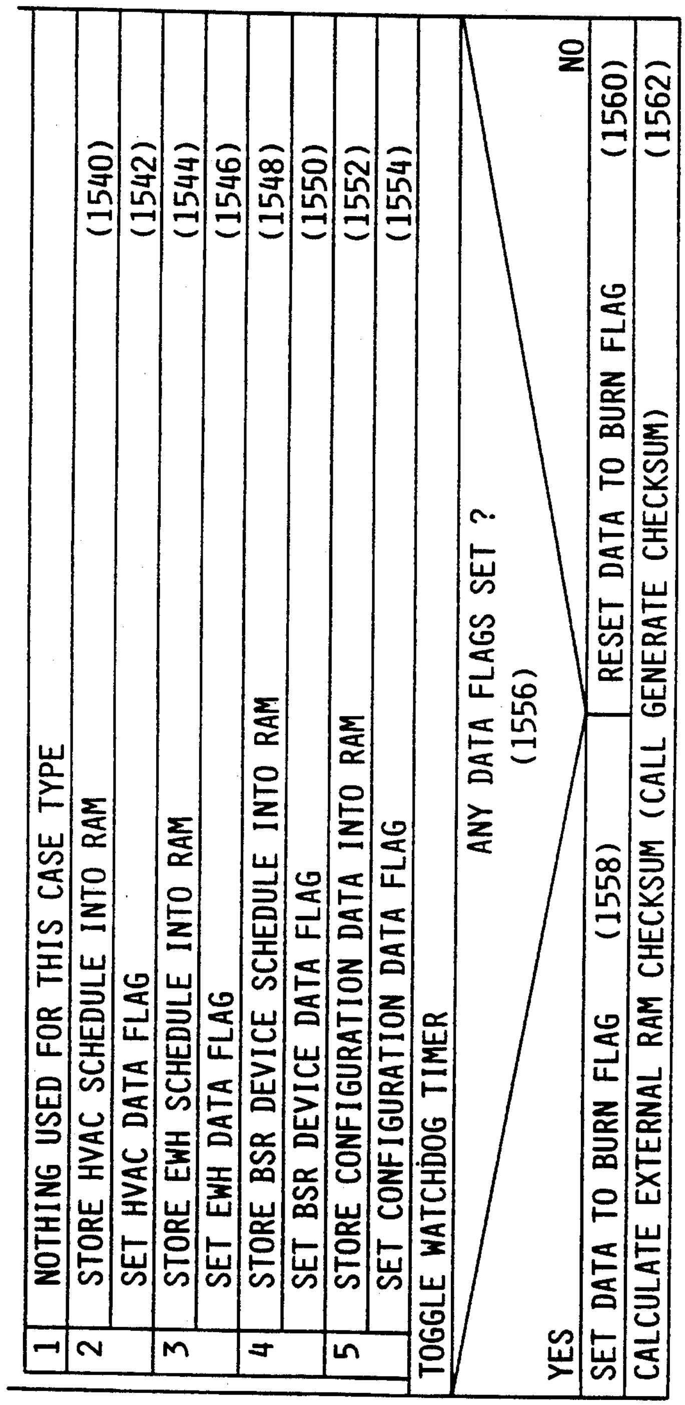
Figure 72A:
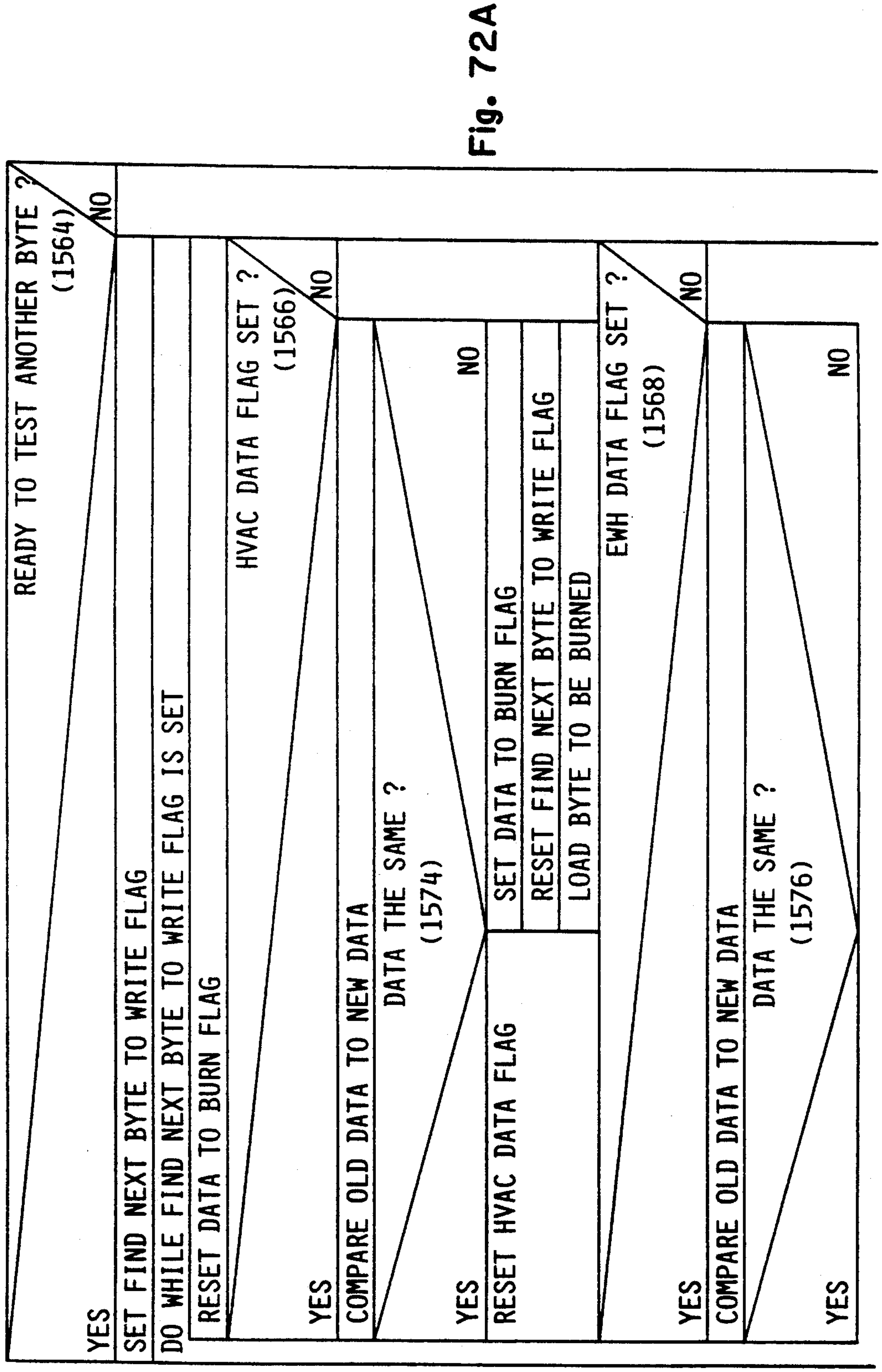
Figure 72B:
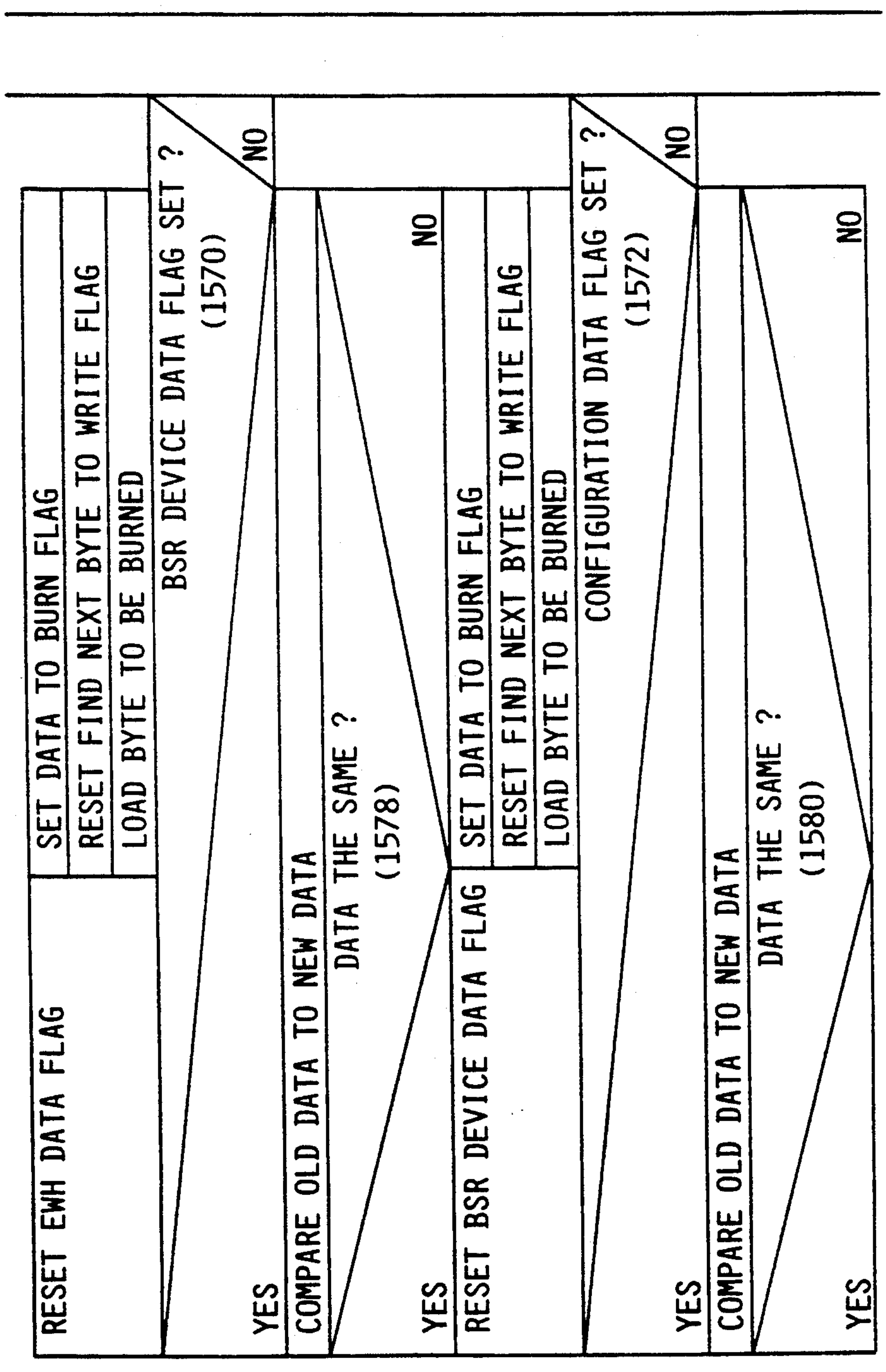
Figure 72C:
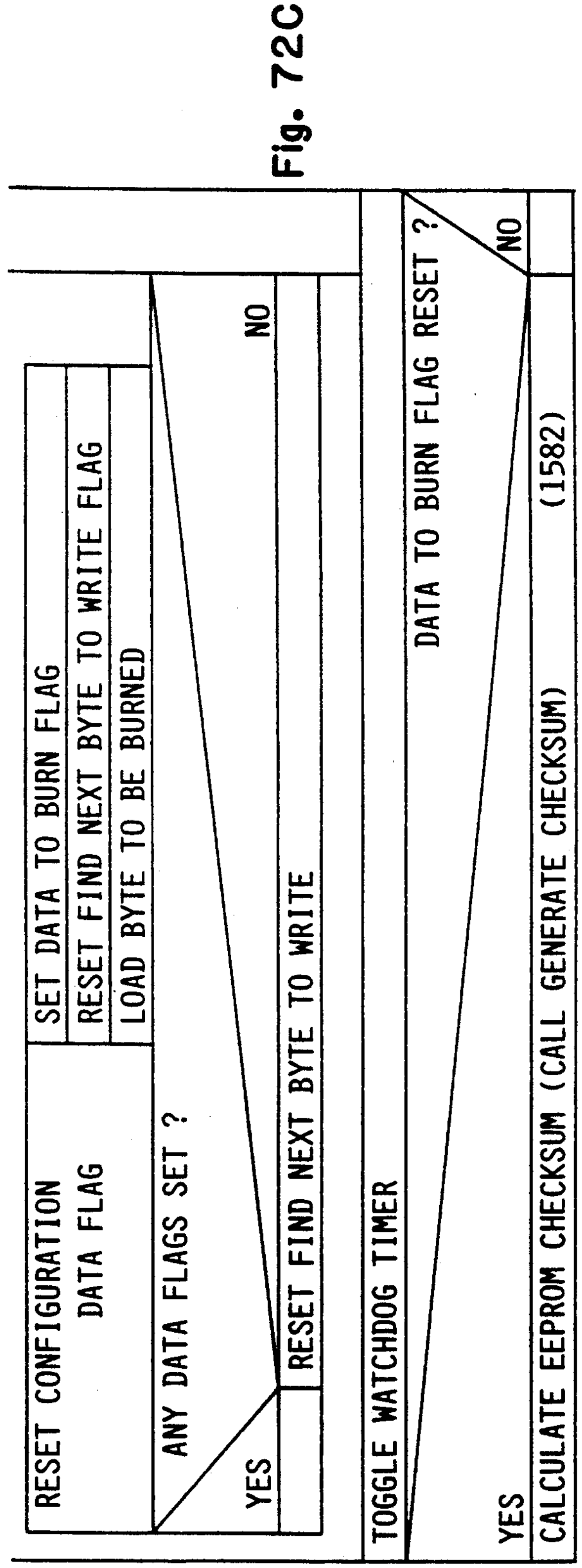

FIG. 58 illustrates the N/S diagram for the send thermostat message routine;

FIG. 59 illustrates the N/S diagram for the process override message routine;

FIGS. 60A–60C illustrate the N/S diagram for the decode tstat message routine;

FIG. 61 illustrates the N/S diagram for the shutdown HVAC routine;

FIGS. 62A–62C illustrate the N/S diagram for the supplement to the decode thermostat message;

FIG. 63 illustrates the N/S diagram for a power down interrupt service routine;

FIGS. 64A–64C illustrate the N/S diagram for the timer routine message generation;

FIGS. 65A–65B illustrate the N/S diagram for the BRICK message handling interrupt routine;

FIGS. 66A–66C illustrate the N/S diagram for the tstat/BSR interrupt routine;

FIG. 67 illustrate the N/S diagrams for the adjust units routine;

FIG. 68 illustrates the N/S diagram for the conversion of a binary number to a binary coded decimal (BCD) number;

FIG. 69 illustrates the N/S diagram for the conversion of a BCD number to a binary number;

FIG. 70 illustrates the N/S diagram for the generation of a checksum;

FIGS. 71A–71B illustrate the N/S diagram for the load program routine;

FIGS. 72A–72C illustrate the N/S diagram for the write to EEPROM routine; and

FIG. 73 illustrates the N/S diagram for the diagnostic test performed on the controller during manufacturing.

APPENDICES

Appendix A is the code listing for the program which controls the thermostat.

Appendix B is the message type list for the messages which are transferred between the controller and the thermostat.

Appendix C is the display segment listing for the display.

Appendix D is the code listing for the program which controls the controller.

DETAILED DESCRIPTION OF THE PREFERRED EMBODIMENTS

Overall System Configuration

Figure 1A:
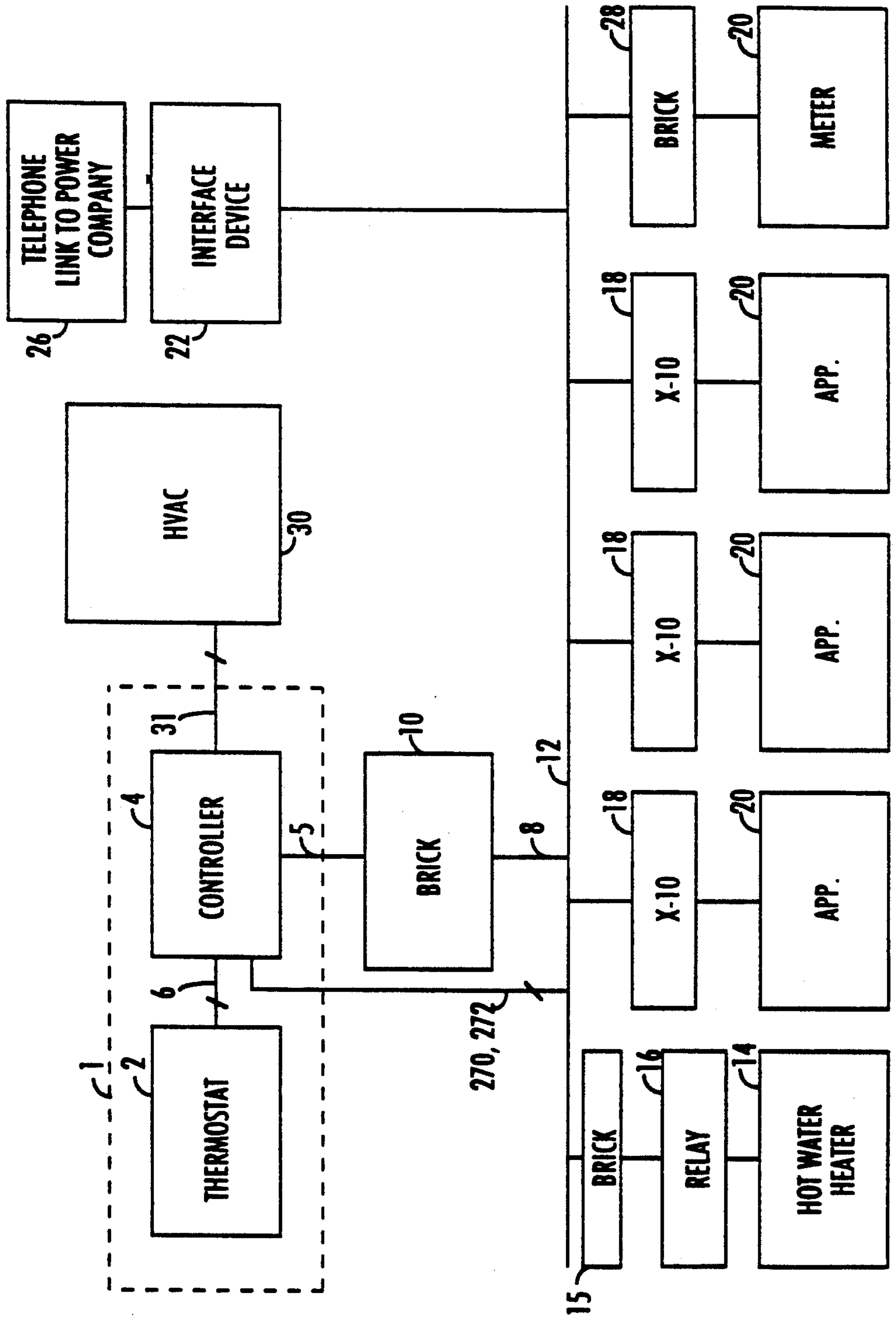
FIG. 1A is a schematic diagram of the control system of the invention located within a home or office and utilized to control an climate control device and appliances.

Referring to FIG. 1A, the control system 1 of the invention is presented in block schematic form as it is interconnected with existing HVAC devices and auxiliary apparatus to form an overall energy management system. The control system 1 is seen to comprise a thermostat 2 and a controller 4 interconnected together via lines 6. The overall energy management system, in addition to the control system 1, comprises a brick (interface device) 10 associated with the controller 4, AC power lines 12, hot water heater 14 with its associated brick 15, hot water heater relay 16, appliance modules 18 and an electric utility meter 20' with its associated brick 28. Each appliance module unit 18 is connected to an appliance 20 such as a light, pool pump, radio etc. The AC house power lines 12 are also shown connected to an interface device 22 which is in turn connected to the utility company over a telephone link 26, which can occur over the telephone line. The brick 10 is connected to the controller 4 over lines 5, and is connected to the AC lines via connection 8. Further, it is seen that the controller 4 is directly connected to the HVAC system 30 via lines 31, and directly connected to the AC power lines over lines 270,272. The HVAC 30 may include, for example, a primary and secondary heating system for the premise, a fan, heat pump valve and the like.

It is noted that the HVAC device 30 is utilized as an example of a climate control device which has as its function to control the temperature within a given premise. Temperature may be controlled by heating, cooling, and most preferably, by a combination of heating and cooling. Examples of such climate control devices include a heat pump, and air conditioner system a resistive heating device, an electrically controlled gas or coal heating unit etc. Moreover, it should be understood that the appliance modules may be utilized to control any device which may be plugged into the AC outlet anywhere throughout the premise. For example, an appliance module may be used to control an electric space heater which itself falls into the general category of a climate control device.

Bricks 10, 15, 28 may each comprise a commercially available brick manufactured by Westinghouse and ABB (Asea Brown Bovarie). The purpose of the bricks 10, 15 and 28 is to permit AC power line communication for equipment within the premise. The interface device 22 may comprise, for example a COMSET 2000 modem manufactured by Westinghouse. Interface 22 permits downloading of energy rate data for variable spot pricing and uploading of KWH consumption data for billing purposes. The appliance modules (such as brand name "X-10") are readily available from Sears or Radio Shack.

It is understood that the communication link between the utility and the controller 4 may be achieved in any number of ways and the invention is not limited to the specific means disclosed. For example, instead of the telephone system, communication may take place via a radio frequency system, a power line communication system, a fiber optic system and the like. The general purpose of the communication system is to provide the controller 4 with real time information concerning utility (e.g., electricity) cost and/or energy demand.

Thermostat 2 provides an input device to permit control of the temperature within the premise, e.g. the home or office. Different desired temperatures are preselected by the user for different periods of the day, depending on the cost tier structure in effect during each of these periods.

The control system 1 performs a number of critical functions in the operation of the overall energy management system of the premise. It automatically changes the temperature settings according to the time of day and current electricity price tier. When coupled with the appliance module units 18, the control system 1 enables the connected appliances 20 to be turned on and off at predetermined times. The heating cycle of the hot water heater 14 is also programmed by the control system 1. Further, current and projected billing information is stored in, and outputted from, the control system 1.

The controller 4 monitors the current temperature reading supplied to it by the thermostat 2 so as to maintain the desired setpoint temperature for both cooling and heating. Utilizing these temperature readings, the controller 4 controls the HVAC system 30.

The utility meter 20′ is designed to facilitate the implementation of variable spot pricing energy offerings. The meter monitors and stores KWH usage according to the energy rate in effect at each particular interval of time. The rate information is periodically sent from the power supplier for storage in the meter 20′ through the interface device 22, power line 12 and brick 28. Controller 4 may access such data via brick 10, house power line 12 and brick 28.

It should be understood that the price tier data utilized by the controller 4 and supplied thereto (indirectly via bricks 10, 28 and meter 20′) as "real time" price tier data, is not necessarily communicated by the utility in a real time sense, e.g. at the exact time needed to be implemented by the controller 4. For example, the utility may transmit a new price tier/time of day/day schedule every day, every few days or even less often, but such price tier data is coupled with time of day and day of week (or date) data so that it represents the current or "real time" price tier in effect by the utility company when the current time as measured by the clock of the controller 4 is equal to the time of day/day schedule as previously transmitted by the utility and stored in a memory device of the meter 20′.

A single phase class 200 meter 120/240V has proven satisfactory for use as the meter 20′ in the system. Such a meter is capable of tracking KWH consumption for 40 days at 15 minute intervals.

Appliance relays, such as relay 16, provide remote activation and deactivation of high amperage appliances, including electric water heaters and pool pumps. Scheduling and control signals received from the thermostat/controller (units 2 and 4) provide variable spot pricing energy optimization.

Figure 1B:
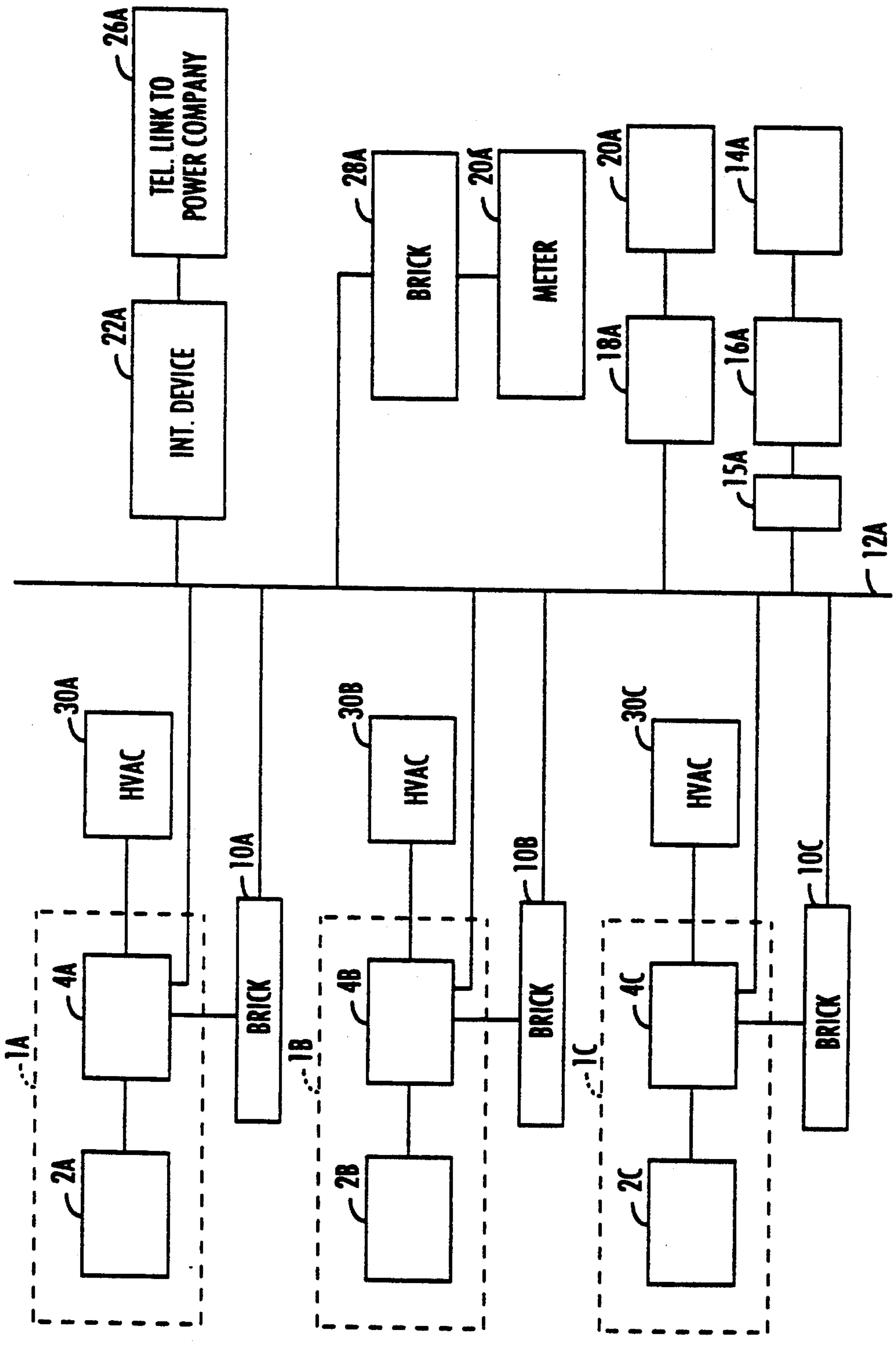
FIG. 1B is a schematic diagram of multiple control systems configured in accordance with the invention and used to control a plural zone climate control devices.

FIG. 1B illustrates another embodiment of the invention wherein the a plurality of control systems are employed to control a premise. Such an arrangement may be desirable when different HVAC systems control different zones within the premise. In FIG. 1B a prefix "a" is appended to the numbers in FIG. 1A to denote a corresponding unit or device as in FIG. 1A. Thus, FIG. 1B shows three control systems 1a–1c each comprising its own thermostat 2 (designated 2a–2c) and controller (designated 4a–4c). Moreover, controllers 4a–4c are connected to bricks 10a–10c respectively which are in turn connected to AC power line 12a. A brick 28a services utility meter 20′a and serves to provide communication with each of the bricks 10a–10c. Brick 15a services the hot water heater 14a. In an alternate arrangement, a plurality of hot water heaters 14a may be used with each connected to it own associated brick 15a. It should be understood that FIG. 1B illustrates the extension of the basic control system of FIG. 1A to encompass three control systems, although any number of such control systems may be employed depending upon the particular HVAC configuration of the premise.

Thermostat—Operational Overview

Figure 2:
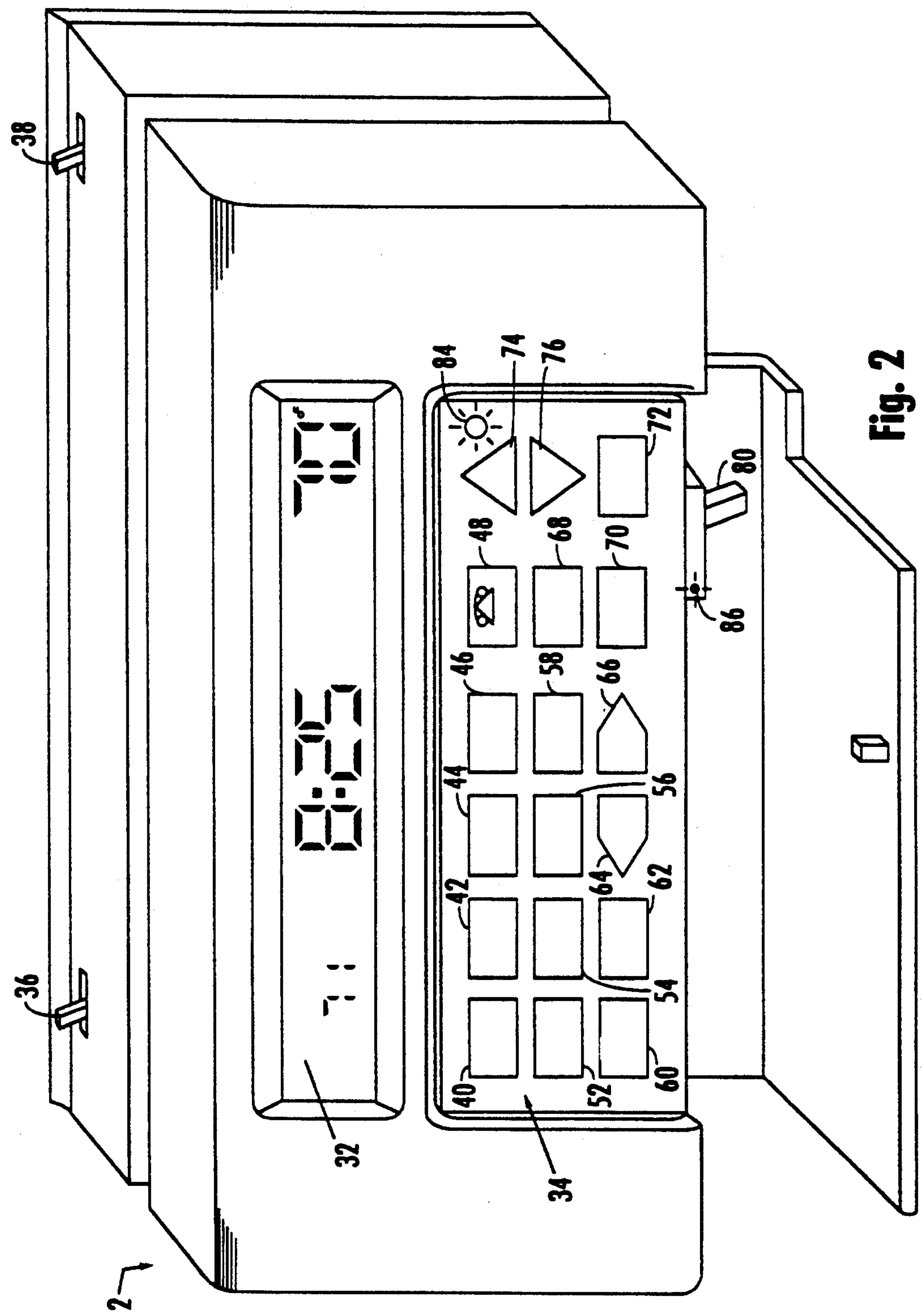
FIG. 2 is a perspective view of the thermostat included in the invention, along with a view of its display and input keypad.

The thermostat 2 used in the invention is depicted in FIG. 2. A digital display 32 displays the various parameters and times needed to set and maintain the heating and cooling cycles. A keypad 34 allows the consumer to read and change the various settings. A selection switch 36 allows the user to turn the control system off or to set it in a heating or cooling mode. A two position fan/auto switch 38 allows the user to run the HVAC fan continually or to cycle it on and off as the furnace (air conditioner or heater) cycles on and off.

The keypad 34 contains the following user depressible switches: heat switch 40, cool switch 42, heat water switch 44, appliance switch 46, customer service switch 48, weekday switch 52, weekend switch 54, optimizer switch 56, hold switch 58, hour switch 60, minute switch 62, left move switch 64, right move switch 66, bill information switch 68, return switch 70, heat water now switch 72, up switch 74, and down switch 76. A final operator controlled switch is the emergency heat switch 80 used to provide emergency heating in the event of extremely cold temperatures, for example, outside the optimum operating range of a heat pump or in the event of heat pump failure.

The function of the above switches is explained more fully below in connection with the operating modes of the thermostat. In addition to the display 32 which comprises a liquid crystal display, two LEDs are utilized, namely, LED 84 and LED 86 (FIG. 24B). LED 84 is utilized to indicate to the operator that the critical price tier is being utilized, either for heating or cooling whichever is then in effect. LED 84 also flashes for one hour before the critical price tier goes into effect. LED 86 is utilized to indicate to the operator that the emergency heat is being used. Switch 80 must be in the "on" position to activate the emergency heat function.

Figure 3:
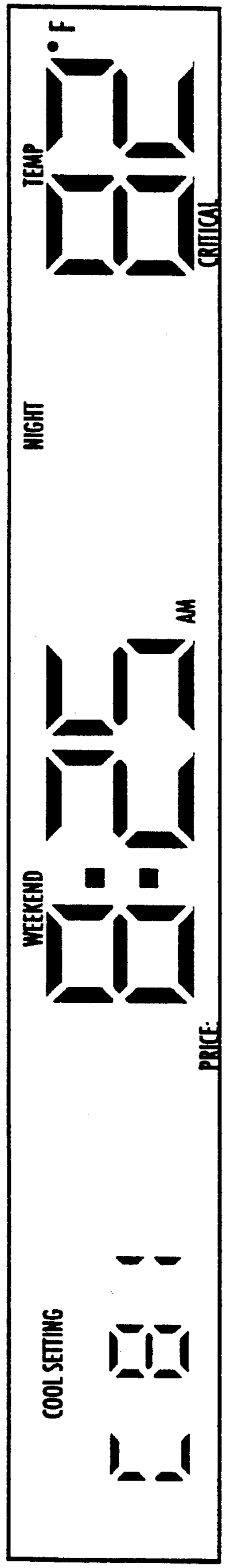
FIGS. 3 to 5 illustrate a normal time/temperature readout displays for the thermostat.
Figure 4:
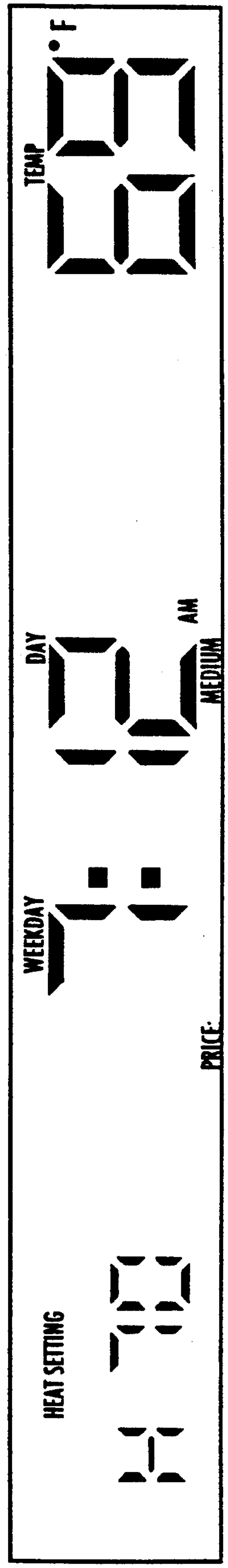
Figure 5:
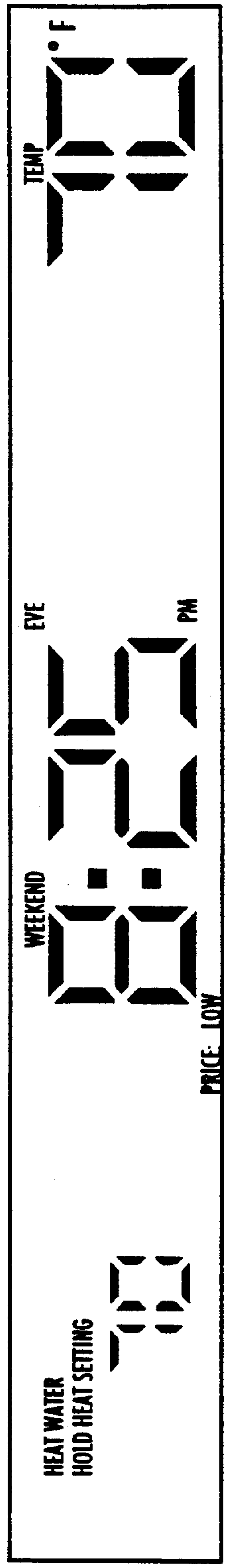

A normal display mode of the digital display 32 is illustrated in FIGS. 3–5. The normal display mode is entered whenever the operator is not entering data into the keypad 34. While details of the normal display mode depend upon the current setting, as may readily be seen in FIGS. 3–5, the normal display mode invariably displays the current time in the center of the display, the current temperature to the right of the time indication and the setpoint or desired temperature to the left of the time indication. Additionally, the display 32 indicates above the time indication whether the current time is part of the weekday or weekend schedule and further whether it is part of the morning, day, evening or night schedule. Thus, in FIG. 3, a weekend/night indication is displayed, indicating to the operator that the time period shown is presently within the weekend/night preset schedule. In FIG. 4, the weekday/day scheduling period is applicable, and in FIG. 5, the weekend/evening scheduling period is applicable.

Further, the display 32 provides an indication as to whether the control system 1 is operating in a heating or cooling mode. In FIG. 3, the indication "cooling setting" is displayed above the set temperature (81°) indicating that the selection switch 36 is placed in the "cool" switch setting; whereas in FIG. 4, the indication "heat setting" is displayed indicating that the selection switch 36 is in the "heat" position. Further, the display 32 indicates if the control system is actually calling for cooling or calling for heating. For example, in FIG. 3, the "C" displayed to the left of the setpoint temperature indicates that the thermostat is actually calling for cooling at the present time. Cooling is appropriate inasmuch as the actual current temperature "82°" is higher than the setpoint temperature "81°". In FIG. 4, the display to the left of the setpoint temperature indicates "H" meaning that the control system is calling for heat which is appropriate since the current temperature (69°) is lower than the setpoint temperature (70°). In FIG. 5, the setpoint and current temperature are equal and thus neither heating nor cooling is actually taking place at the present time. Note, that the "heat setting" indication is nevertheless displayed since this indication merely denotes the position of the selection switch 36.

In reference again to FIGS. 3–5, it may be seen that the digital display 32 further provides an indication as to the current price tier, namely, low, medium, high or critical, whichever is in effect at the current time. This price tier indication which appears on the display may be referred to as price tier identifying data. In FIG. 3 the "critical" price tier is in effect for the particular time; in FIG. 4 the "medium" price tier; and in FIG. 5 the "low" price tier.

An additional display of the hot water heating condition is shown in FIG. 5. The display "heat water" is activated if the hot water heater is presently being operated. A further display is illustrated in FIG. 5 as the "hold" indication. This indication is displayed if the operator depresses the hold switch 58 on the keypad 34. Upon depressing of the hold switch 58, the current desired temperature (70° in FIG. 5; 81° in FIG. 3) is maintained as the "set" temperature even though a different temperature may otherwise be called for when a different time schedule is entered. In this sense, the hold switch 58 is utilized to override any previously set temperatures correlated to time of day schedules.

FIG. 6 illustrates factory setting temperature levels applicable for cooling both for the weekday/weekend scheduling and for the scheduling subintervals of morning, day, evening, and night. These temperature values are preset set point temperature values stored in a memory of the controller 4. These set point temperature values are stored for each of the price tiers, low medium, high and critical. It is noted, for example, that during the day, the operator is generally expected to be home more on weekends than during weekdays so that a lower temperature setting is provided during the daytime period (between 9 a.m. and 5 p.m.) for the weekend than is provided during the weekday. As explained below, the operator may utilize the keypad 34 to enter any desired setpoint temperatures and may even redefine the start times for the four subintervals of the morning, day, evening and night. Note that the operator may not separately define start and stop times for the subintervals but only start times. Thus, the subintervals will define contiguous time intervals such that there is a defined setpoint temperature for each 24 hour period of each 7 day week.

In some cases, the operator may wish to reestablish the factory setpoints shown in FIG. 6 after other setpoint values had been input by the operator. The optimizer switch 56 may be utilized for this purpose. In actuating the optimizer switch 56, the operator depresses the switch for a period of eight seconds, after which time a double-beep sound is generated indicating that the factory set initial values are now operative. These factory set values will now replace the previously employed user input values.

Separate factory settings are provided for both heating and cooling modes. The heating mode factory set values are shown in FIG. 7. These preset set point temperature values are likewise stored in the memory of the controller 4.

It is also noted in connection with the cooling cycle as depicted in FIG. 6, that the low price tier is always set at a value lower or at most equal to the medium price tier; and the medium price tier is always set at a value lower or at most equal to the higher price tier; and the higher priced tier is always set at a value lower or at most equal to the critical price tier. Another way to state this relationship is that any given preset set point temperature data for a given cost of electricity as represented by its price tier has a value equal to or greater than the preset set point temperature value corresponding to any lower cost of electricity as represented by its price tier. For example, the weekday morning cooling temperature for the low price tier is set at 74° whereas the medium price tier is set at 76°. In general, for cooling, a given price tier is always set at a temperature lower than or at most equal to the next higher adjacent price tier. The rationale is simply that at higher pricing tiers, one would wish to cool the premise to a lesser amount in order to save energy cost.

For heating cycles as shown in FIG. 7, the temperature settings decrease from "low" to "critical" which is just the opposite as the cooling price tier structure. Thus, for heating, the critical temperature would be set at a smaller temperature or at most a temperature equal to the high price tier temperature; the high price tier temperature would be set at a value lower than or at most equal to the medium price tier temperature and the medium price tier temperature would be set to a value lower than or at most equal to the low price tier temperature. In other words, in a heating mode, the set point temperature data is stored such that any given preset set point temperature data for a given cost of electricity as represented by its price tier has a value equal to or less than the preset set point temperature value corresponding to any lower cost of electricity as represented by its price tier. The rational is similar to that in the cooling cycle, namely, for heating, the operator will want to heat the premise less and thus set a lower temperature setpoint if the cost of electricity is high.

Factory settings are also provided for the water heater. The water heating times are also divided into the weekday/weekend schedules and into morning, day, evening and night subintervals, although these latter subintervals need not be contiguous time periods and the operator may input both the start and stop times separately for each subinterval. Such an operation is to be distinguished from the heating and cooling cycles as indicated above in which only the start times may be set since contiguous subinterval periods are employed. It is noted that the heating and cooling schedules for the subintervals morning, day, evening and night are contiguous settings and only the start input time for the subinterval is actually input by the operator.

Appliance switch 46, is utilized to turn on certain appliances controlled by X-10 units 18. The on-time of each appliance may be controlled from a start period to a stop period in the four subintervals morning, day, evening, night. Separate weekday and weekend schedules are not provided for appliances. Since these appliances are only turned on and off, depending upon the time of day, no ambient temperature settings are relevant to the appliances. The same is true for the hot water heater.

Figure 8A:
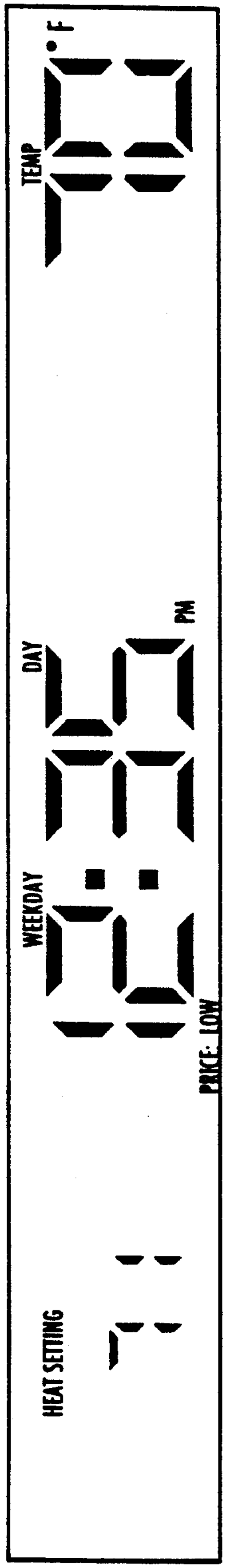
FIGS. 8A–8D illustrate the thermostat digital displays used for selecting a heating schedule.
Figure 8B:
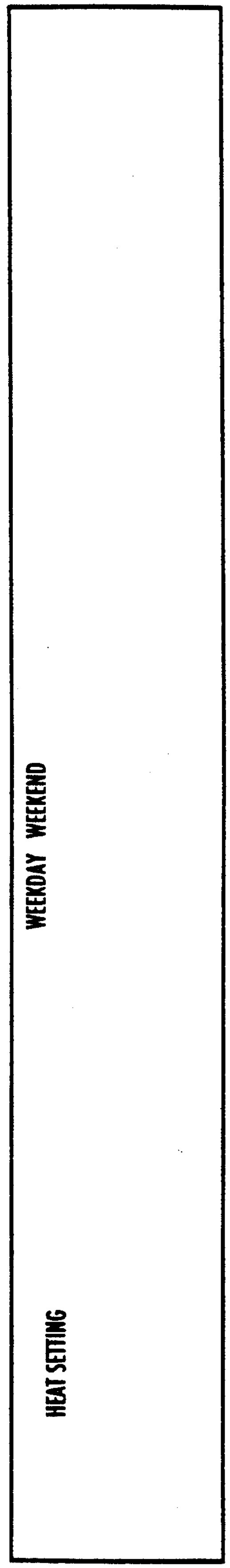

FIGS. 8A–8D illustrate the heat setting mode of operation. FIG. 8A illustrates the normal display prior to the operator depressing the heat switch 40. Upon depressing the heat switch 40, the display shifts to that shown in FIG. 8B and alternately displays the indicia "weekday" and "weekend". The operator now depresses either the weekday switch 52 or the weekend switch 54. Assuming that the operator depresses the weekday switch 52, the display changes to that illustrated in FIG. 8C, with the "70" number flashing. The top row of the display indicates the "heat setting" mode, the "weekday" time period, and the "morning" subinterval. The displayed time of 6 a.m. corresponds to the start time period for the morning subinterval schedule. The various temperatures of 70, 68, 66 and 64 correspond to the low, medium, high and critical cost tiers which would be applicable for the corresponding temperatures. Different costs tier structures are applicable for the day, evening and night settings. For example, the operator may depress the "weekday" switch 52 once again and the display changes to that shown in FIG. 8D, wherein a different set of temperature values are displayed, namely, 62, 60, 58 and 56. By successively depressing the weekday switch 52, the display successively changes to display the morning, day, evening and night subintervals (and then repeats) with the corresponding four-tier temperature values. Generally speaking, different temperature settings are input or programmed by the operator for each of the low, medium, high and critical price tiers and for each of the time subintervals, e.g., FIGS. 6 and 7.

Figure 8C:
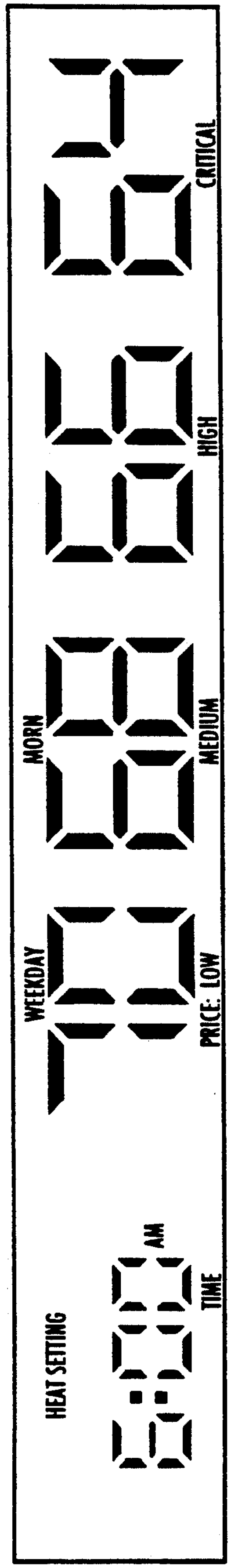

Initially, the display of FIG. 8C displays the number 70 in a flashing manner to indicate that this number may be changed by the operator if desired. Increasing or decreasing of the currently displayed temperature setpoint value may be achieved by the operator depressing the up temperature switch 74 or down temperature switch 76 respectively. In order to set a temperature for a different price tier, the operator depresses the move right switch 66, to change the flashing temperature indicia from the low price tier to the next adjacent price tier to the right, in this case the medium price tier. Upon depressing the move right switch 66, the temperature value corresponding to the medium price tier (68°) is displayed flashing, and the operator may adjust this value by actuating the up and down switches 74 and 76 respectively. At this point, the operator may modify the temperature to either the left or right of the current medium price tier by depressing the move left switch 64 or move right switch 66 respectively. In this manner, the operator may modify each of the displayed temperature values for each price tier and for each time period (weekday and weekend) including each time subinterval, e.g., morning, day, evening and night.

Figure 8D:
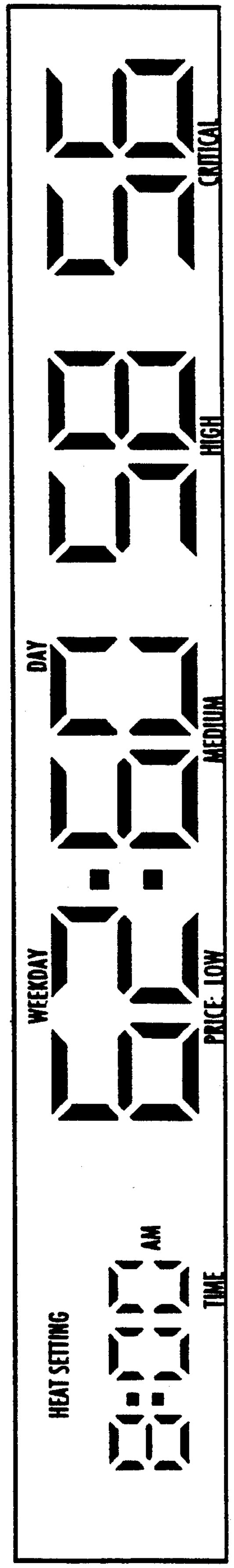

The particular time for initiating the scheduled "morning" operation in FIG. 8C and the "day" operation in FIG. 8D, may be adjusted by the operator depressing the hour switch 60 and minute switch 62. Adjustment of the time effects the start of a particular schedule. Thus, in FIG. 8D, the start time for the day schedule will begin at 8 a.m. Since the schedules are contiguous, and since the start time of the morning schedule as shown in FIG. 8C was set for 6 a.m., it should be clear that the morning schedule runs from 6 a.m. up until 8 a.m. whereas the day schedule starts at 8 a.m.

In the manner described above, the operator may set the starting times for the evening and night schedules and may also adjust the temperature values for each of the four price tiers, low, medium, high and critical. After all of the time and temperature settings have been made by the operator, the operator may depress the return switch 70 to force the display to resume to the normal mode displaying the time and temperature settings such as in FIG. 8A. If the operator fails to depress the return switch 70, the normal mode time/temperature settings will nevertheless be displayed after a timeout period of approximately 32 seconds.

The cooling mode settings may be initiated by the operator depressing the cool switch 42, and repeating the procedures indicated above with regard to the heat setting schedules. In this connection it is noted that setting up the cooling schedule, time and temperatures, can be done even if the system is presently operating in the heating mode.

Manual Override

Figure 9A:
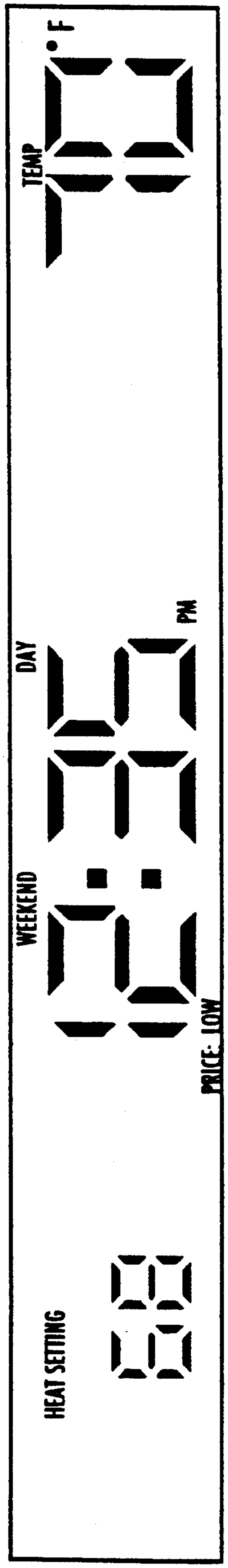
FIGS. 9A–9C illustrate the thermostat digital displays used to set the manual override of either the heating or cooling schedule.
Figure 9B:
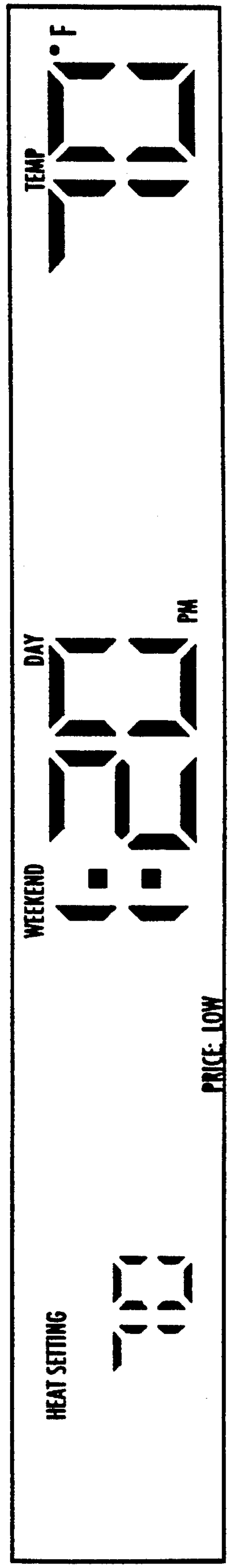

A manual override feature is also available and may be entered simply by the operator depressing one of the temperature switches 74 or 76. For example, as shown in FIG. 9A, a heat setting mode is displayed with the set temperature at 68° and the actual temperature at 70°. If the operator decides to change the target or set temperature from 68° to 70°, the operator simply depresses the temperature switch 74 two times in order to raise the set temperature by two degrees. Changing of the set period in this manner does not affect any of the previously programmed temperature settings, and the newly set override temperature will be in effect only until the next time subinterval begins. Thus, in connection with FIG. 9A, the override period will be in effect until the subinterval "evening" begins at which time the preprogrammed set temperature for the evening will be in effect.

If the operator wishes to return to the programmed setting, she/he simply presses the hold switch 58 one time, then waits one second and presses the hold switch 58 again. This operation cancels the temporary override setting of the temperature and returns the temperature set value to the preprogrammed value.

Figure 9C:
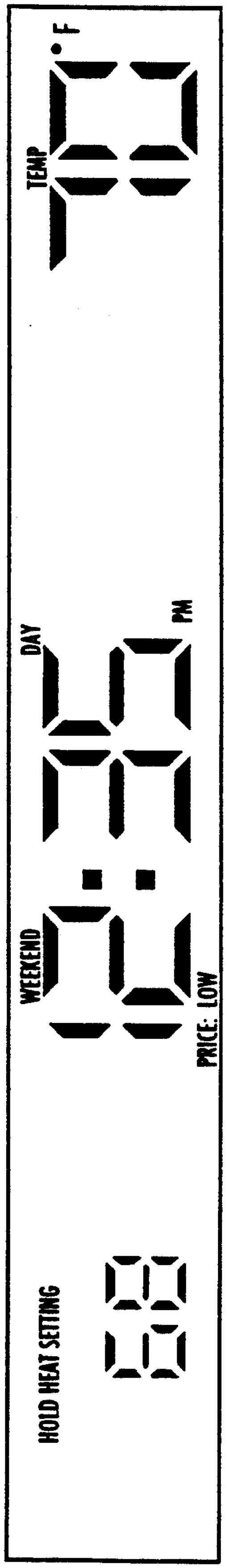

If the operator desires the override temperature to be in effect indefinitely, until it is manually released, then she/he simply adjusts the set temperature by depressing the temperature switches 74 and 76 and subsequently depressing the hold switch 58 once. This procedure will maintain the newly set temperature over all subsequent time periods (all subintervals, including transitions to/from weekday and weekend) until the hold switch is depressed again to return to the preprogrammed values. When the hold feature is in effect, the "hold" indicator is displayed as shown in FIG. 9C. In this case, FIG. 9C indicates that the operator set the hold temperature to a value of 68°. To release the held value of the override temperature, one presses the hold switch 58 until a beep is heard.

Setting Water Heater Schedules

Figure 10A:
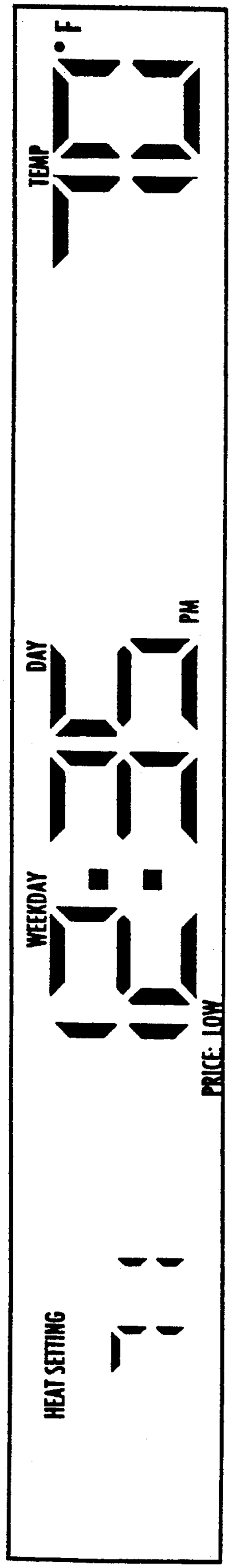
FIGS. 10A–10C illustrate the thermostat digital displays for setting the hot water heater heating schedule.
Figure 10B:
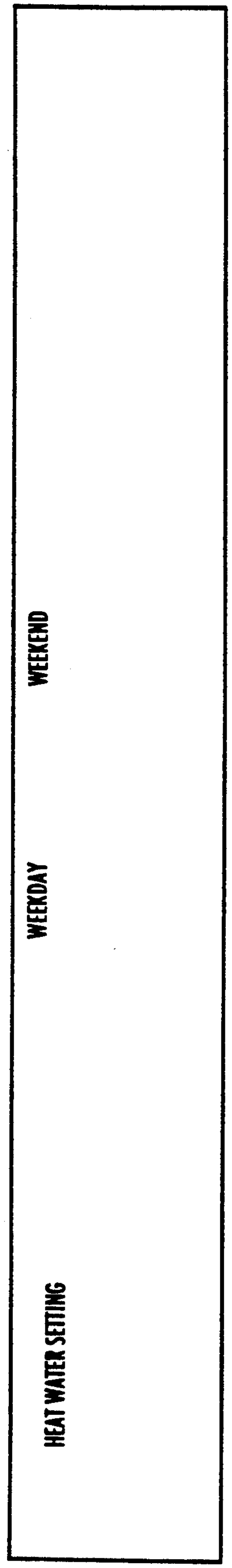
Figure 10C:
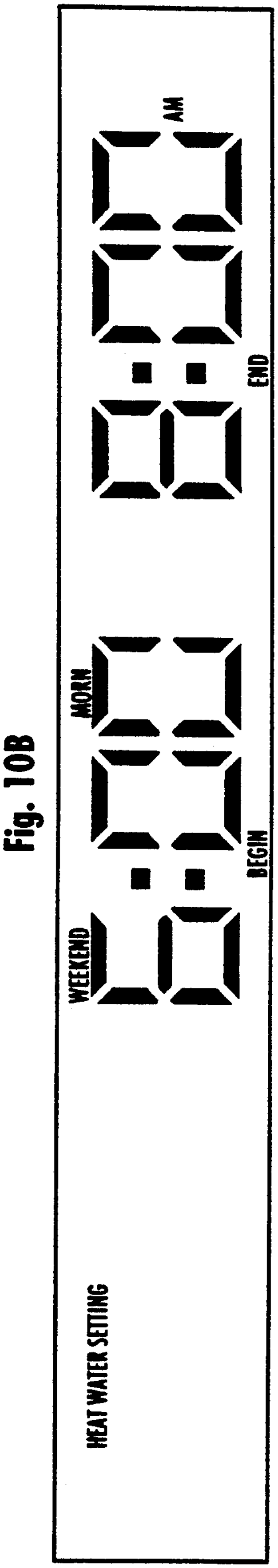

The operator may select the start and stop time of the water heater as illustrated in FIGS. 10A–C. FIG. 10A illustrates the initial time/temperature display or the "normal" display. To change a water heating time, the operator depresses the heat water switch 44 and the normal display changes to the display shown in FIG. 10B. The weekday and weekend indicia alternately flash, and the operator may select one of these by depressing either the weekday switch 52 or the weekend switch 54. Assuming that the operator wishes to change the weekend schedule, the operator depresses the weekend switch 54, and the display shifts to that as illustrated in FIG. 10C. The morning schedule is initially displayed, and the operator may move from the start to the stop time by depressing the move left switch 64 or move right switch 66. The time period which may be changed begins to flash, and the operator may affect the change by depressing the hour switch 60 and/or minute switch 62. The operator may then move to the day schedule by again pressing the weekend switch 54 and similarly affect a change in the start and stop times by depressing the move left switch 64 or move right switch 66 and subsequently depressing the hour and minute switches to change to the desired time. In a similar fashion, the night and evening times may be set.

As indicated above, the time periods during which the hot water heater is scheduled to turn on need not be contiguous time periods. During non-scheduled (on) times the hot water heater will preheat in advance of the scheduled on time so the heater will be able to provide hot water when the scheduled time begins. There are three options for governing the preheat schedule. In option 0, the hot water heater is on during all low price tiers, and if no low price tiers are available during the desired preheat time, the controller will select the most economical preheat schedule from amongst the medium, high and critical tiers. In option 1, the hot water heater is not energized during any critical price tier, and in option 2 the hot water heater is not energized during any critical or high price tiers.

During the times that the operator has scheduled the hot water to be heated, the indicator "heat water" appears on the display. During the low price unscheduled heating periods, the display "heat water" does not appear.

Again, the display may be returned to the normal time/temperature mode by depressing the return switch 70 or waiting for the timeout period to expire.

Manual Override of Water Heater Schedule

The operator may manually override the scheduled water heating times by depressing the "heat water now" switch 72. The use of this override function does not affect the programmed setting times, and will be in effect only until the water heater heats the water to the temperature indicated by the setting on the water heater itself. It should be recalled that the control system of the instant invention does not set the temperature of the water heater per se but merely controls the on and off time of the water heater which has its own temperature setting regulation.

Figure 11:
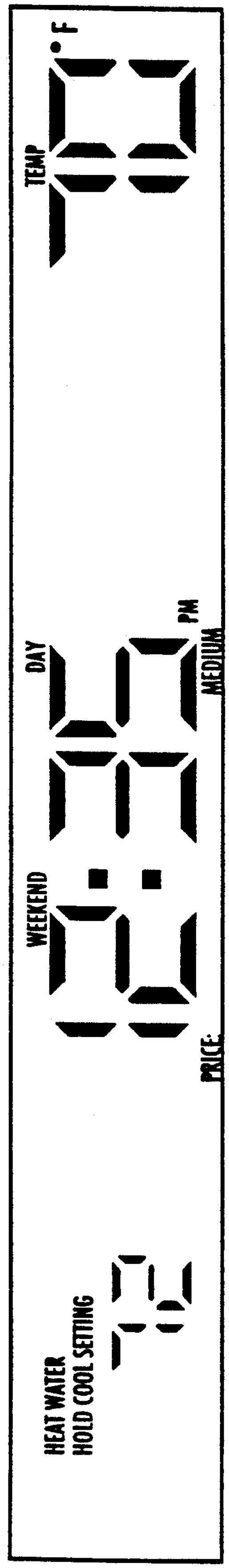
FIG. 11 illustrates the thermostat digital display for manual override of the water heating schedule.

Depressing of the "heat water now" switch 72 modifies the time temperature display to include an indication that the water heater is being turned on. A "heat water" indication is displayed in the first line of the display as indicated in FIG. 11.

It is noted that the "heat water now" switch 72 may also be utilized to turn off the water heater if it is depressed when the water heater is in the on condition.

Setting Appliance Schedules

The control system of the instant invention permits scheduling of up to eight separate appliances. For example, the operator may program a lamp to turn on at 7 p.m. and off at 11 p.m. Each appliance is utilized with an appliance module 18 (FIG. 1) which may be purchased from a local Radio Shack or Sears outlet, and is commonly known as an X-10 unit. The appliance module is plugged into the appliance and then into the house wall socket. The appliance module has two thumb-roll dials (see FIG. 15) for setting a "unit" code and a "house"-code. A "unit" code dial (1–16 settings) associates the particular appliance module and its associated appliance to a time schedule defined with a similar code on the thermostat 2. By associating the appliance unit code with the code in the thermostat 2, the thermostat knows when to let the appliance turn on and off. The "house" code dial of the appliance module is set for the same house code for all appliances.

Although the appliance module typically permits the operator to choose between 1–16 numbers, only appliance module units numbered 1–8 are actually utilized in the preferred embodiment. Module unit numbers 9–11 are not utilized and module unit numbers 12–16 are dedicated for special purposes as follows:

1. An appliance module using unit code 12 is on whenever cooling is active;
2. An appliance module using unit code 13 is on whenever heating is active;
3. An appliance module using code 14 is on whenever the price is low;
4. An appliance module using code 15 is on only when the price is either low or medium; and
5. An appliance module using unit code 16 is on only when the price is either low, medium or high.

Figure 12A:
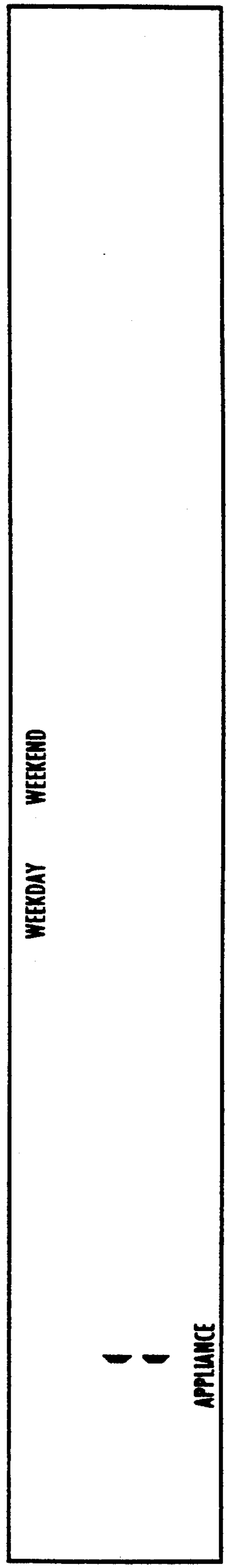
FIGS. 12A–12C illustrate the thermostat digital displays for setting the appliance operating schedules.
Figure 12B:
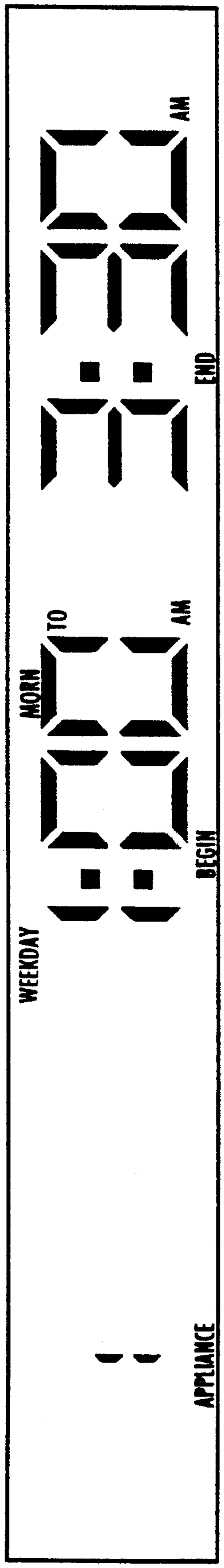

To set an appliance module, the operator depresses the appliance switch 46 and the normal display changes to that indicated in FIG. 12A. The weekday and weekend symbols alternately flash, and the operator selects the one desired by depressing the weekday switch 52 or the weekend switch 54. Assuming the operator depresses the weekday switch 52, the display changes to that indicated in FIG. 12B. The operator may now set the morning schedule time for the appliance by utilizing the hour switch 60 and minute switch 62. The morning schedule may be changed to the day, evening and night by once again depressing the weekday switch as in the previous examples (or weekend switch if one were doing the weekend schedule).

Figure 12C:
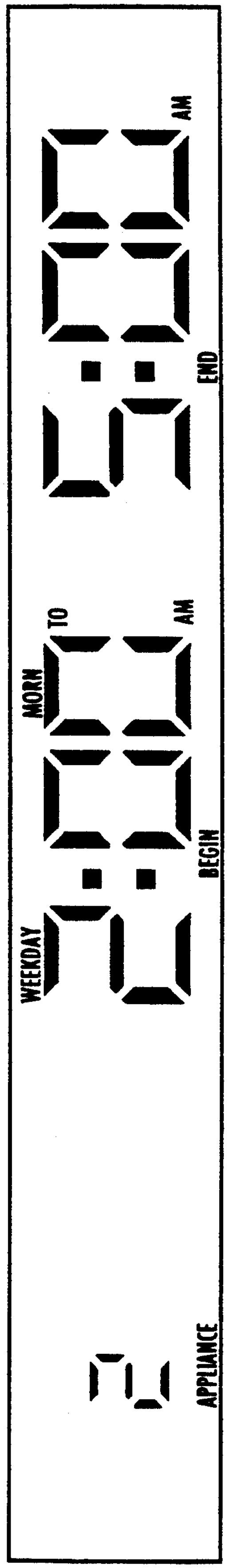

The operator may select another appliance by depressing the appliance switch 46 once again and appliance number 2 will be displayed as indicated in FIG. 12C. In this manner, eight separate appliances may be separately timed to turn on and off at the user selectable times during each of the user selectable weekday/weekend periods and subinterval periods of morning, day, evening and night.

It is noted that any appliance module which is coded for a code 1 for example, will follow the schedule sequence of appliance 1. Thus, the operator can use multiple appliance modules with the same unit code, thus permitting the operator, for example, to turn on all of the living room lights at the same time, utilizing a single appliance designation e.g. code 1.

Once the appliance settings have been made, the operator may return to the normal display by depressing the return key 70 or alternately waiting for the timeout period.

Billing Information

Figure 13A:
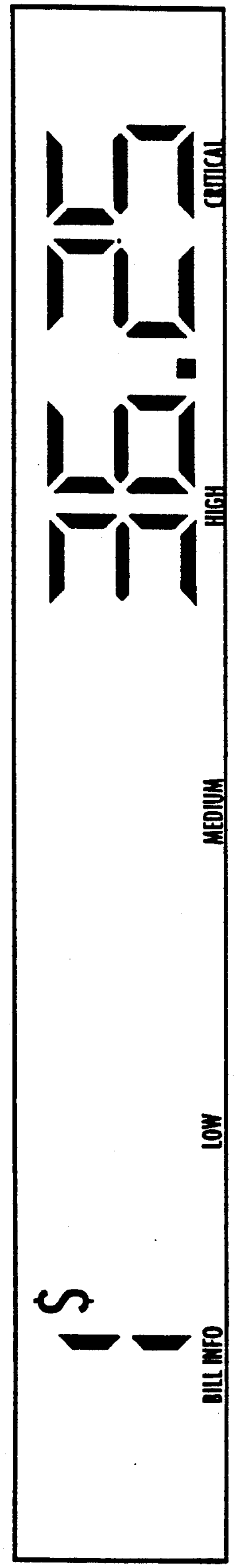
FIGS. 13A–13G illustrate the thermostat digital displays relating to billing information.
Figure 13B:
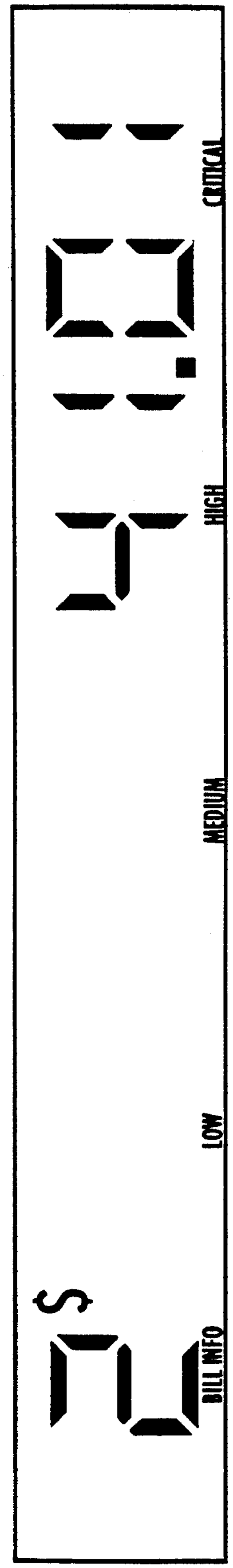
Figure 13C:
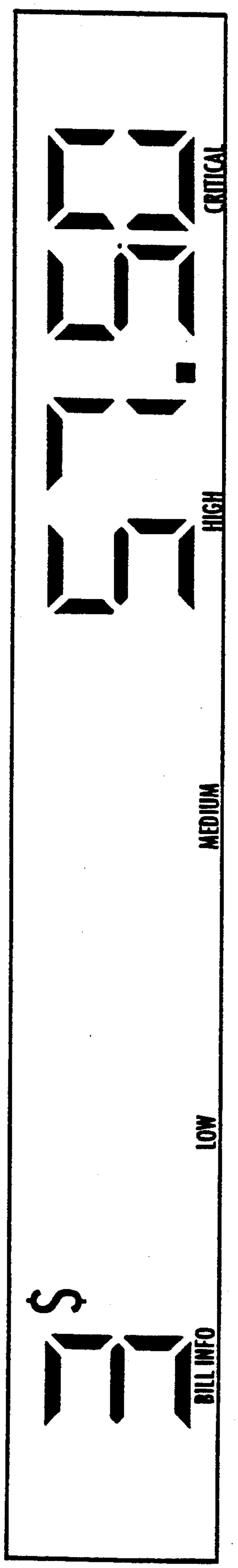
Figure 13D:
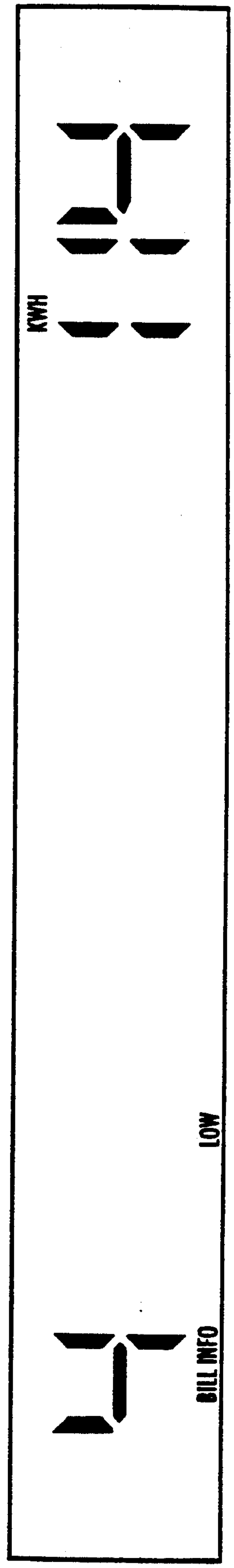
Figure 13E:
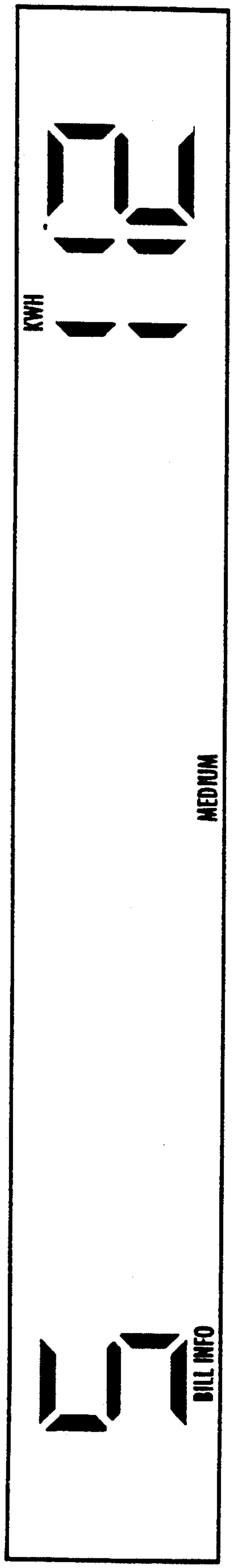
Figure 13F:
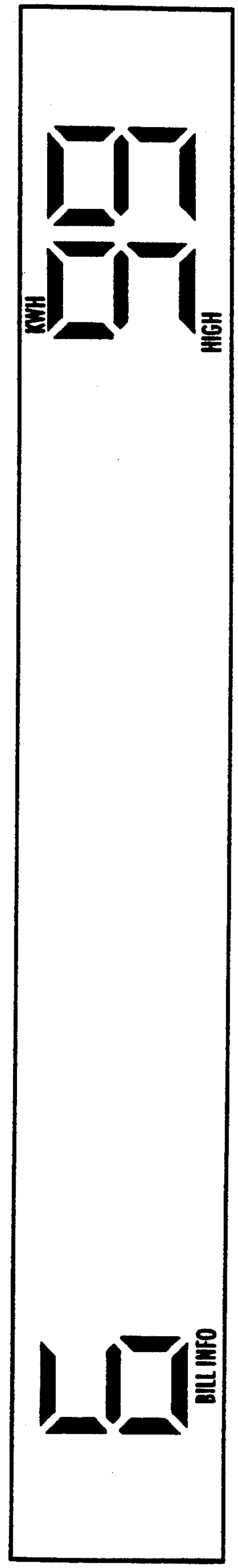
Figure 13G:
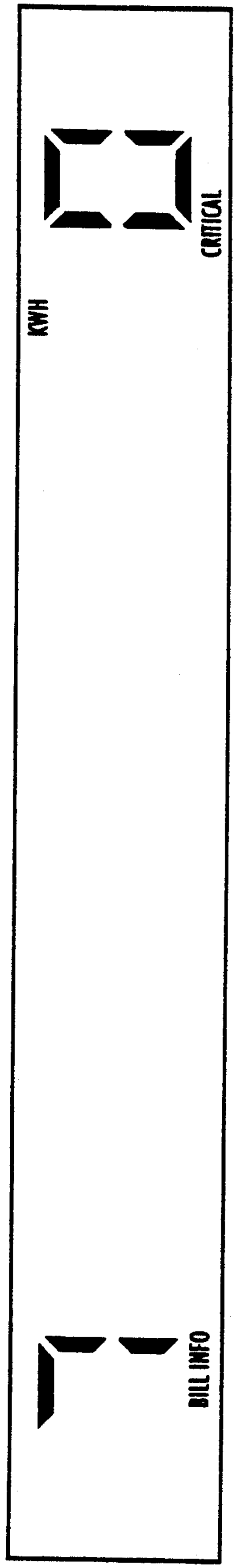

The operator may display billing information by depressing the bill information switch 68. The indicia "bill info" is displayed on the display as indicated in FIG. 13A. A number "1" appears above the "bill info" symbol in FIG. 13A indicating that the display corresponds to code 1 information. There are seven separate codes which may be displayed to provide the operator with various kinds of billing data. The seven codes are indicated in connection with the displays of FIG. 13A-13G. Each code may be displayed sequentially displayed by the operator repetitively depressing the bill information key 68.

Code corresponds to a display of the electric bill to date in dollars. Since this is a current cost indication, it is based on the current rates which have been effective throughout the current month for electricity usage throughout the premise, e.g. the same usage as measured by the premise utility meter 20'. Code 2 displays the electric bill to date based on the old or previous rate. Code 3 displays the forecasted total electric bill (available after the seventh billing day in the cycle). Code 4 displays the "low" price kilowatt hours usage to date. Code 5 displays the "medium" price kilowatt hours usage to date. Code 6 displays the "high" price kilowatt hours usage to date. Finally, Code 7 displays the "critical" price kilowatt hours usage to date. As seen in FIGS. 13D-13G it is desirable to have lower usage as one moves up in the price tier from low to critical. Clearly, it would be equivalent to display the dollar cost of electricity at the various price tiers rather than the kilowatt hours usage.

Changing The Special Control Options

The operator may change one or all of the special control options by displaying and resetting each option individually. When the special option is displayed, the operator may change it or go on to the next one. Thus, the operator can use this function to change any control option setting or just to provide display information of the existing setting. Once the operator accesses the special control options, the system automatically displays each of the following in order:

House code
Fahrenheit or Celsius
Clock
Filter
Weekend

In order to enter the special control options mode to display and/or change any of the special control options, the operator presses the following sequence: move left key 64, hour key 60, move right key 66, minute key 62 and return key 70. The display changes from the normal time/temperature display to the display shown in FIG. 14. The indicia "CON" standing for "Control Options", appears on the left of the display, and the first control option, house code (HCd) is also displayed. To move on to another control option, the operator depresses the move right key 66. To move to a previously displayed control option, the operator depresses the move left key 64. To return to the time/temperature or normal display, the operator depresses the return key 70 or waits for the timeout period to expire.

Changing The House Code

Figure 14:
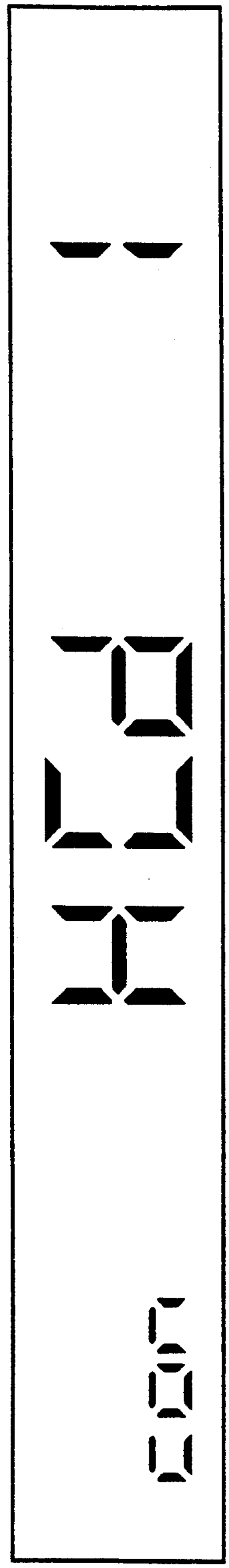
FIG. 14 illustrates the thermostat digital displays for changing the special control options.

To change the house code, the special control options mode is entered for the display house code as indicated in FIG. 14. The operator may then depress the temperature up switch 74 or temperature down switch 76 to increase or decrease the house code respectively.

All of the appliance modules on the premise should have the same house code set to the same value on their thumb-roll dials. Each house code must be the same as the house code setting of the special control options. The operator may set the house code on the appliance modules using the thumb-roll dial. The house code on the appliance module dial is a letter; whereas the house code in the thermostat 2 is a number. The correspondence between the two is shown below:

| | |
|---|---|
| 1 = A | 9 = I |
| 2 = B | 10 = J |
| 3 = C | 11 = K |
| 4 = D | 12 = L |
| 5 = E | 13 = M |
| 6 = F | 14 = N |
| 7 = G | 15 = O |
| 8 = H | 16 = P |

Typically, the operator will not need to change the house code unless one is experiencing interference from a neighbor utilizing the same control system as in the instant invention.

Figure 15:
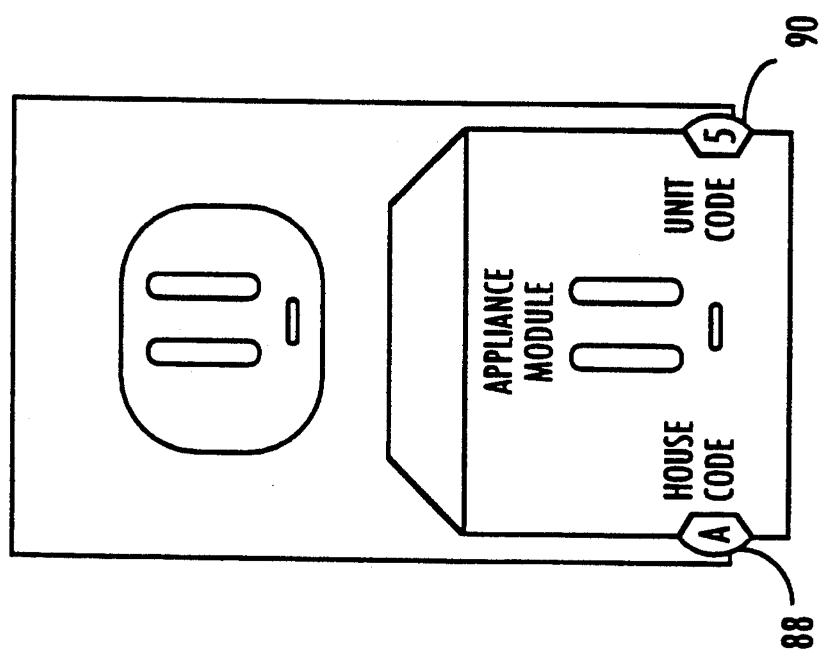
FIG. 15 illustrates an appliance module with thumbroll dials to set the house and unit codes.

A typical appliance module showing a house code A and a unit code 5 is illustrated in FIG. 15. Thumb-roll dial 88 indicates the house code dial, and thumb-roll dial 90 designates the unit code dial.

Selecting Fahrenheit or Celsius

The operator may change the normal display in Fahrenheit to a Celsius scale. To do so, the operator enters the special control options mode by depressing in sequence the move left key 64, hour key 60, move right key 66, minute key 62 and return key 70. The move right key 66 may then be depressed to change the display from the house code display to the Fahrenheit or Celsius display. The temperature switches 74 and 76 are utilized to toggle between the Fahrenheit and Celsius scales.

Choosing Twelve or Twenty-Four Hour Clock

Figure 16:
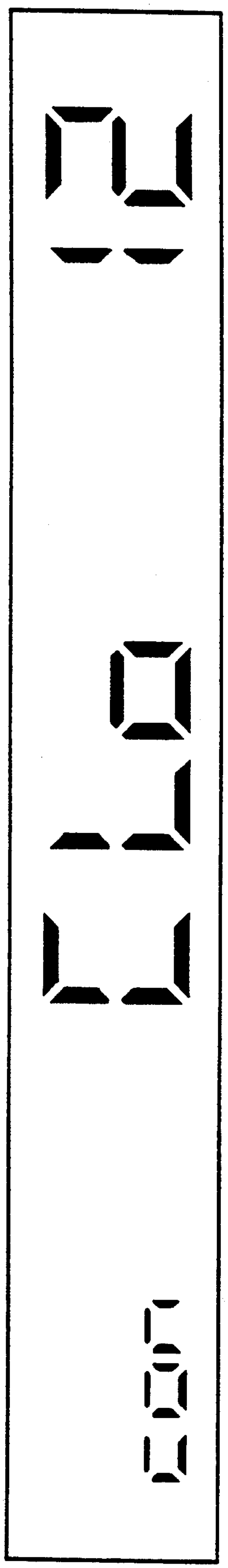
FIG. 16 illustrates the thermostat digital displays for selecting a 12 or 24 hour clock readout.

The operator may change the type of clock displayed from the twelve-hour clock to the twenty-four hour clock. The special control options is entered as in the house code and Fahrenheit or Celsius code selections explained above and the operator depresses the move right key 66 three times so that the display as shown in FIG. 16 appears. The temperature up switch 74 and temperature down switch 76 may then be utilized to toggle between the twelve and twenty-four hour clock.

It is noted that the actual time of day which is shown in the normal display (whether in the twelve or twenty-four hour mode) is controlled by the controller 4 and may not be changed by the operator.

Changing The Filter Hours

Figure 17:
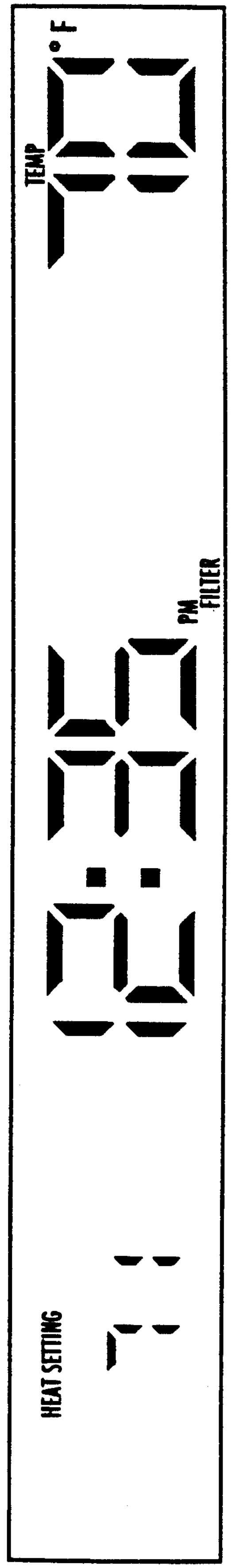
FIG. 17 illustrates the thermostat digital displays for indicating the need to change a filter.

Another special control option is the one permitting the operator to change the number of hours the air conditioner or furnace is running before the display of "filter" appears as indicated in FIG. 17. The above feature is useful since the control system of the instant invention can be utilized to remind the operator when it is time to replace or clean the furnace or air conditioner filter. After the filter has run the set number of hours, the display "filter" is displayed on the normal time/temperature display. 400 hours is a nominal time but may be changed depending upon particular manufactures recommendations. To change the filter, the operator enters the special control mode and utilizes the temperature switches and 76 to increment or decrement the number of hours. The display is changed by increments of 100 hours.

Choosing The Weekend Days

The final user selectable option in the special control options mode is the option to change which days are considered weekend days. It is assumed that Saturday and Sunday are the weekend days for the weekend schedules which the operator desires to utilize. However, if a different schedule is desired, the operator may define a different weekend time period utilizing the following table:

TABLE 1

| If your weekend is | You must specify |
|---|---|
| Saturday and Sunday | 1 |
| Sunday and Monday | 2 |
| Monday and Tuesday | 3 |
| Tuesday and Wednesday | 4 |
| Wednesday and Thursday | 5 |
| Thursday and Friday | 6 |
| Friday and Saturday | 7 |

Figure 18:
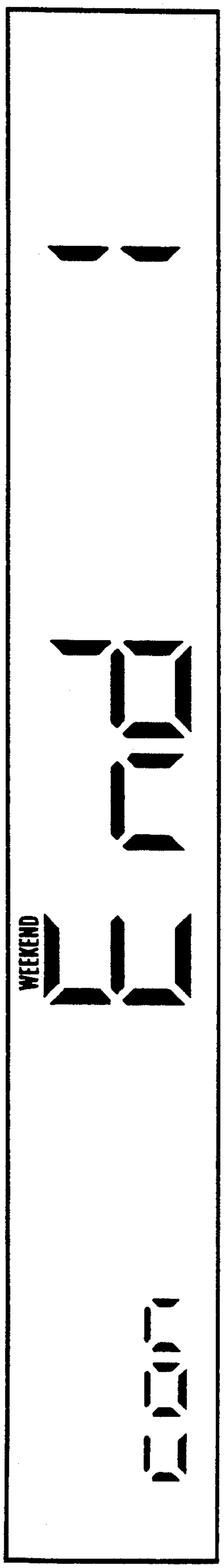
FIG. 18 illustrates the thermostat digital displays for selecting the particular two days of the week that define a weekend for purposes of the invention.

Specifying the number 1 indicates the normal Saturday-Sunday weekend schedule as indicated in FIG. 18. The operator may change the weekend designation by depressing the switches 74 and 76.

Load Control

Figure 19:
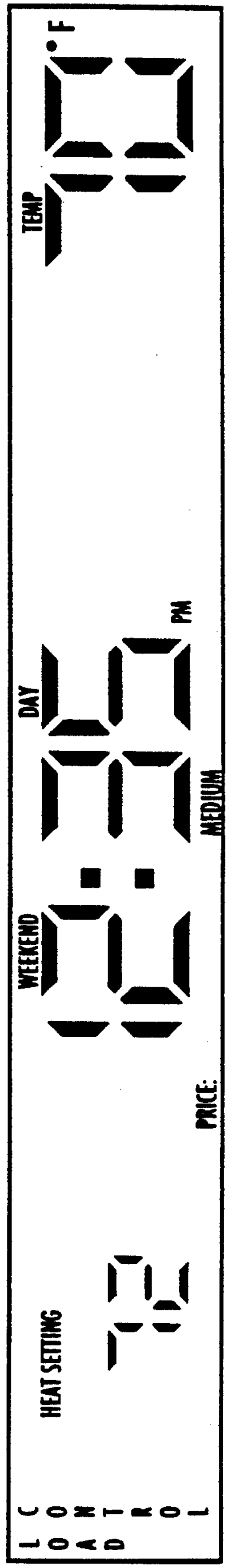
FIG. 19 illustrates the thermostat digital displays shown when utility load control is effective.

During certain critical times of high demand, the utility company may put a load control feature into effect. For example, on very hot afternoons when many people are using their air conditioners, the utility company may actually turn off air conditioning power for certain portions of the hour. When such load control is in effect, the system controller of the instant invention may not be utilized in certain modes. For example, the operator may not override the heating or cooling schedules but these schedules will remain in effect even though load control is being exercised. Further, the water heater option of heating water now, utilizing key 72, is not available. The normal time/temperature display will indicate "load control" as shown in FIG. 19. If the operator attempts to override the water heater schedule while the load control is in effect, the water heater now switch 72 will not beep when it is depressed indicating that it is inoperative. Normally, depression of any of the keys on keypad 34 is followed by a "beep" sound to provide positive feedback to the operator of a successful key entry.

Thermostat Hardware Description

By way of example, and not by way of limitation, a hardware embodiment of the control system suitable for operation in accordance with the instant invention is shown in FIGS. 20-24. FIG. 20A-20E shows an illustrative embodiment of the thermostat 2 whereas FIGS. 21-24 sets forth an illustrative embodiment of the controller 4.

Figure 20C:
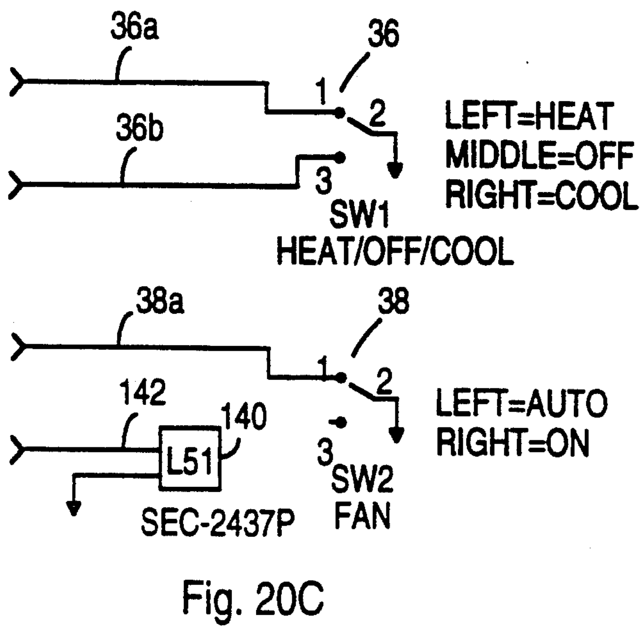

Referring to FIGS. 20A-20E, it should be clear that FIG. 20A and 20B are connected together to form a composite schematic with the right most portion of FIG. 20A connecting to the left most portion of FIG. 20B. The main function of the thermostat 2 is to serve as a human/machine interface and thus to provide an input device or means through which an operator may input desired data, such as schedules, and to further provide a means for measuring the ambient temperature. All operator input data as well as measured temperature data are forwarded to the controller 4 for processing.

In reference in particular to FIGS. 20A-20D, key elements of the thermostat are identified utilizing the same indicia as used in connection with FIG. 2. Thus, the thermostat 2 is provided with the display 32 (FIG. 20B), keyboard 34 (FIG. 20A), selection switch 36, fan/autoswitch 38 (FIG. 20C) and LED's 84 and 86 (FIG. 20B).

The heart of the thermostat 2 comprises a microprocessor 100 which may, for example, comprise the NECμPD75308G, four-bit microcomputer with LCD controller. The main purpose of the microprocessor 100 is to receive the input signals from the various switches and the keypad and to transmit the signals to the controller 4 for further processing. Another important function of the microprocessor 100 is to provide data to the display 32 so as to enable the operator to view schedules, temperature settings, input data and the like. Thus, as may be seen in FIG. 20B and 20C, selection switch 36 is connected to microprocessor 100 via input lines 36*a* and 36*b*, and fan/autoswitch 38 is connected to the microprocessor via input line 38*a*. Input lines 36*a* and 36*b* and input line 38*a* are coupled to pull up resistors 102 which are connected to a regulated five volt power supply (FIG. 20E). Similarly, emergency switch 80 is connected via line 80*a* to an input port of microprocessor 100 via another pull up resistor 102. The LED's 84 and 86 are connected to output ports of the microprocessor and may be energized under software control.

The microprocessor 100 is connected to the LCD display 32 via connecting wires attached to its LCD segment ports S0-S31 and common output LCD ports COM0-COM3. The keyboard 34 is connected to the microprocessor via row lines 104 and column lines 106. The microprocessor 100 polls the matrix defined by the intersection of the row and column lines to determine which of the switches of the keypad 34 have been depressed. Pull-up resistors 102 are also utilized in the row lines 104 connected to the keypad 34.

As indicated above, a prime function of the thermostat 2 is to measure the ambient temperature. For this purpose, a temperature sensor 108 (FIG. 20A) is provided to measure the ambient temperature and provide an analog signal representative thereof to an analog-to-digital (A/D) converter 110. The A/D converter 110 is a serial device which is enabled by the chip select not signal (CS−) from pin $P3_2$ of the microprocessor over line 112. The reference input to the A/D converter 110 is provided by means of a 1.2 volt reference diode 114 connected to the five volt regulated supply. The A/D converter 110 is clocked periodically by the microprocessor 100 at input/output port $P2_0$, along line 116. The output of the A/D converter 110 is provided as a serial bit stream along line 118 to input port $P1_2$ of the microprocessor 100. Input port $P1_2$, also serves as the INT2 interrupt port depending on the microprocessor switch configuration. Thus, the digitized temperature signals are not only representative of the value of the measured temperature but are also utilized to interrupt the microprocessor to initiate a temperature reading cycle.

Figure 20D:
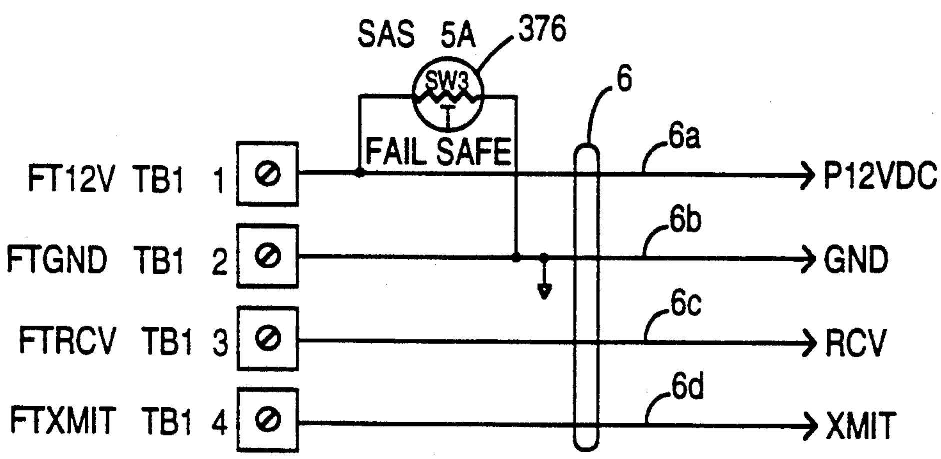
Figure 20E:
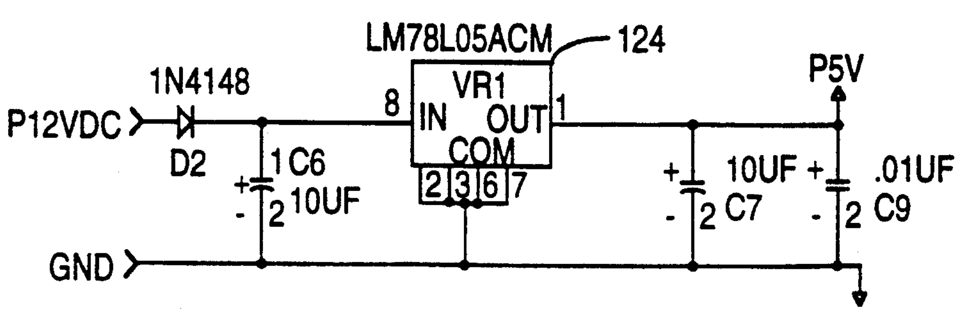

Data communication between the microprocessor 100 and the controller 4 is conducted serially over lines 6c and 6d as indicated in FIGS. 20B and 20D. The receive data from the controller 4 is passed along line 6c to the microprocessor 100 via buffer inverters 120a and 120b and fed to input port $P1_1$ and input port $PO_3$. Input port $P1_1$ also is the INT1 port so that the incoming data serves both to interrupt the microprocessor and to provide the data information to the microprocessor from the controller 4. Microprocessor 100 converts the serial input data stream to parallel form for internal processing. Data received from the controller 4 is stored in internal memory within microprocessor 100. Data output from the microprocessor 100 is fed from the input/output port $PO_2$ in serial fashion through a buffer inverter 120c and drive transistor 122 connected to line 6d.

In is noted that particular microprocessor utilized in the preferred embodiment as microprocessor 100 incorporates a CPU, ROM, RAM, I/O ports, vector interrupt locations, an 8-bit programmable timer/event counter, a watch-dog timer, a basic interval timer, a serial bus interface and an LCD controller/driver. The on-chip LCD controller/driver is capable of driving a variety of LCD displays of duplex, triplexed, quadriplexed and static configurations. It can utilize up to 32 segments and four common drive lines to display data from 128 bits (32×4) of display memory. The device can manipulate data in one, four or eight bit units. A variety of bit manipulation instructions enhance I/O data control. Program memory is configured in 8064×8 bit format and data memory is configured in a 512×4 bit matrix. The microprocessor further has general purpose registers (4 bits×8) and accumulators (1 bit carry flag, 4 bit A register and 8 bit XA register). Details of the operation of the microprocessor may be found in the data sheet for the mPD75308 microprocessor published by NEC Electronics, Inc., Mountain View, Calif.

Power to the thermostat 2 is provided from the controller 4 along lines 6a and 6b (FIG. 20D). A 12-volt DC supply is provided along line 6a and a ground connection along line 6b. FIG. 20E illustrates the power supply regulator which is seen to comprise a 5-volt regulator 124 converting the 12 volt DC supply to a regulated 5-volts.

Detailed schematic diagrams representing a preferred embodiment of the invention are set forth herein with manufacturers model numbers adjacent the various elements utilized. However, as well known by those of skill in the art, the particular model numbers and designated components may readily be interchanged or combined with other elements which perform a similar function. Moreover, various discreet elements may be combined or variously arranged in larger scale integrated circuits to achieve the desired or similar functions as set forth herein.

Referring once again to FIGS. 20A and 20B, the microprocessor 100 is also seen to operate in conjunction with a watch dog timer circuit 126 which monitors a signal from port $P2_1$ of the microprocessor 100 fed in along line 128. Microprocessor 100 outputs a signal along line 128 every, approximately one second. The watch dog timer circuit 126 monitors the signal along line 128, and if the signal is not received within a predetermined time, circuit 126 generates a reset signal along line 130 which is fed to the reset port of microprocessor 100 for resetting same. The watch dog timer circuit 126 comprises an astable, free running oscillator which is kept from oscillation every time a signal is received along line 128 from the microprocessor. The signal along line 128 is capacitively coupled to a gate 132 and utilized to discharge a capacitor 134 through the internal resistance of gate 132. Pull-down resistor 136 provides the proper logic level at the input to gate 132. If the signals from the microprocessor are no longer provided along line 128, the capacitor 134 charges up until it reaches the threshold level of a second gate 138 which is connected to capacitor 134 to form in an astable oscillator. Resetting microprocessor 100 will generally remove the fault which resulted in the interruption of signals along line 128 so that the microprocessor can be reinitialized for normal operations.

In reference to FIG. 20B, there is provided three jumpers W1–W3 and two temperature calibration resistors JW1 and JW2. Jumper W1 is a configuration jumper utilized by the installer to input data into the control system 1 depending upon the particular customer HVAC configuration, e.g., type of heat pump, hot water preheat, heating-cooling cycle time, electric heat option, secondary heat during recovery option, emergency heat action option etc. Jumper W2 is utilized to disable the keyboard when such an action is appropriate as, for example, when the thermostat 2 is placed in a school or classroom where tampering is not desired. Jumper W3 is a clock test jumper which is utilized only for testing at the factory.

Temperature compensation resistors JW1 and JW2 are utilized to provide an offset temperature and are adjusted at the factory. If both resistors are in place there no offset is provided. If resistor JW1 is clipped, a one degree offset is provided; if JW2 is clipped, a two degree offset is provided; and if both JW1 and JW2 are clipped, a three degree offset is provided. All offsets are negative.

FIG. 20B also illustrates the crystal oscillator Y1 utilized to supply the microprocessor with a 4.19 MHz clock signal.

LED 84, also shown in FIG. 20B is operated under software control of the microprocessor 100 to flash when the critical price tier is approaching and is operated to stay continuously energized when the critical price tier is on. LED 86 is energized under control of microprocessor 100 whenever the operator switches on the emergency heat switch 80.

As seen in FIG. 20C, sonic indicator 140 is provided to give an audible indication whenever the operator depresses a key on the keypad 34. Sonic indicator 140 is connected to port $P2_3$ of microprocessor 100 along line 142.

Controller Hardware Description

Overview

Details of the controller 4 hardware are shown in FIGS. 21–24. As an overview, FIG. 21A shows part of the communication interface circuitry between the controller 4 and the thermostat 2 as well as the brick 10 (FIG. 1) and includes as a primary component thereof a UART 200 and a data latch 202. FIG. 21B, which is connected to the bottom of FIG. 21A to form a composite schematic, illustrates the main output drivers and relays for controlling the HVAC system of the home or office. The major components of FIG. 21B include inverters 204, relay driver 206 and relays 208. FIG. 22A and 22B illustrate the main computer and memory devices of the controller 4. The right portion of FIG. 22A joins with the left portion of FIG. 22B. The major components of the microprocessor section include microprocessor 220, latch 222, ROM 224, RAM 226 and non-volatile memory 228.

The power supply circuitry is illustrated in FIG. 23 and includes, as major components thereof, a power supply and regulator circuit 230, a power supervisory circuit 232, and a relay circuit 234. FIG. 24 illustrates a schematic of the X-10 controller and zero crossing circuitry and includes, as major components thereof, an X-10 control circuit 240 and a zero crossing circuit 242.

The I/O Section

Returning now to FIG. 21A and 21B, UART 200 is connected to receive messages from the thermostat 2 over line **6*d* via Schmidt trigger/inverters 250 and 252. Signals from the thermostat 2 are transmitted in eight bit serial format, and UART 200 converts the received data into parallel format and sends it to microprocessor 220 (FIG. 22A) for further processing. UART 200 also transforms parallel data received from the microprocessor into serial format for transmission to the thermostat 2 over lines 6*c*. For this purpose, an additional Schmidt trigger/inverter 254 is provided in order to drive the base of a transistor 256 which is used as a driver for the transmit line 6*c*. Microprocessor 220 communicates with UART 200 by means of address bus 260, control bus 262 and data bus 264. An I/O bus 266 is also provided for microprocessor communication with other circuit elements. Address bus 260 includes address lines A0–A2 which are utilized to address the UART 200 as shown in FIG. 21A. Data bus 262 contains address/data lines, AD0–AD7, utilized to provide data to the UART 200 (from the microprocessor 220) for subsequent transmission to the thermostat 2 and for providing data to the microprocessor 220 (from the thermostat 2) for subsequent processing. A signal CS5N is also provided to the UART 200** as a chip select signal which, together with the address lines A0–A2 enables addressing of the UART by the microprocessor.

Latch 202 serves as a data latch for the microprocessor 220 to monitor various signals within the system. Included among these signals are some to the brick address lines SA0–SA5. Data itself is sent to the brick 10 by means of transmit data TXD line **5*a* and is received from the brick 10 by means of receive data RXD line 5*b*. (See FIG. 21A). Data to and from the brick 10 are fed directly to microprocessor 220 (pins 11 and 10 respectively of FIG. 22A) via the I/O bus 266. Power is also supplied to the brick 10 via the 12 volt and 5 volt power lines from the regulated power supplies of FIG. 23. A ground line connects the brick 10 with the controller 4. Lines AC+ and AC− indicated in the right-hand portion of FIG. 21A are used to provide communication to the application modules 18. Additionally, a reset signal may be supplied from the microprocessor 220 to the brick 10 via the I/O bus 266 through a Schmidt trigger-/inverter 268**.

FIG. 21A also shows a switch identified as SW1 which may be positioned in a first position to connect AC+ and AC− with AC power lines 270, 272 as shown, or in a second position to connect AC+ and AC− with a dedicated pair of wires 274, 276.

When brick communication is achieved via the AC power lines, the brick 10 filters out the 60 Hz and utilizes the 120 KHz carrier for data communication purposes. However, in some environments, the power lines are not clean enough to be utilized for data communication and thus a dedicated pair of wires 274, 276 may be installed and utilized for data communications. In this case, switch SW1 is placed in its second or downward position so that the twisted pair 274, 276 is interconnected to the controller 4 via lines AC+ and AC−. In this later case, it is noted that the house power lines indicated at 12 in FIG. 1 would not be utilized for data communication between the controller 4 and associated brick devices but rather the dedicated pair of wires 274, 276 would be utilized instead.

The HVAC system 30 (FIG. 1) is controlled by means of signals from microprocessor 220 which are generated at the appropriate time depending upon the stored, user-generated schedules and price tier information. To effect control of the HVAC system, the microprocessor provides output signals along the I/O bus 266 to the inverters 204 (FIG. 21B), relay driver 206 and relays 208. Relay driver 206 consists of a plurality of open collector transistors which are utilized to drive the relay coil currents.

The plurality of relays 208 consists of six separate relays **208*a*–208*f*. Relays 208*a*–208*e* are of the normally open contact type whereas relay 208*f* is a form C contact with one contact normally open and heating coil which is present in some heating systems as an aid to the primary heat source. Relays 208*c* and 208*d* are utilized for primary and secondary cooling respectively. Relay 208*e* controls the fan, and relay 208*f*** controls the reversing valve on the heat pump.

As seen in FIG. 21B, a green power on/status indicator 278 is also provided. This LED is caused to blink if multiple resets are received by the microprocessor 220 as generated from the power supervisory circuit 232. Absent multiple reset signals, the status indicator 278 will remain constantly on, indicating that the power is on and the system is functioning properly.

The jumpers W1–W4 shown in FIG. 21A are utilized by the system installer to pull to ground certain ones of the address lines, namely SA0–SA2 and SA5. The effect of grounding selected ones of these address lines is to uniquely identify a particular brick 10 which is associated with a particular controller 4. Such identification is needed, for example, in the control system shown in FIG. 1B wherein multiple controllers and bricks are used within a single residence. It will be appreciated that the meter **20'*a* (FIG. 1B) and its associated brick 28*a* as well as the hot water heater 14*a* and its associated brick 15*a*** are likewise able to send unique communication messages to each controller/brick combination within the system.

The Microprocessor Section

The microprocessor section of the controller is illustrated in more detail in FIGS. 22A and 22B. Microprocessor 220 may comprise, for example, the Intel eight-bit control-oriented microprocessor designated 80C31BH-2. Pins 1–6 of microprocessor 220 are utilized to feed the relays 208 (FIG. 21B) over the I/O bus 266. The program store enable signal PSEN− (the "−" indicating a negative active state) at pin 29 of microprocessor 220 is connected to the output enable OE— terminal pin 22 of ROM 224.

When the microprocessor 220 wishes to address RAM 226 for a read cycle, the RDN signal is generated at pin 17 of microprocessor 220 and fed along the control bus 262 to input pin 22 of RAM 226. The RAM chip select signal CS0N is also generated by a decoder as explained below. If it is desired to access ROM 224, microprocessor 220 generates a PSEN— signal at its pin 29 which is fed to pin 22 of ROM 224 as the output enable (OE) signal.

The microprocessor 220 utilizes multiplex address and data lines. AD0–AD7 designate the eight-bit data lines and the lower order eight bits of the address lines. The higher order address lines are designated A8–A15. During the first part of a machine cycle the lines AD0–AD7 are utilized for address designation, whereas in the latter part of the machine cycle these same lines AD0–AD7 are utilized for data transfer. The address latch enable (ALE) signal at pin 30 of the microprocessor 220 is utilized to indicate that there is a valid address on the lower order address/data lines AD0–AD7.

Inasmuch as the microprocessor 220 utilizes a multiplex address/data technique, latch 222 is provided to capture the lower order bits from address/data lines AD0–AD7. Thus, the ALE signal from microprocessor pin 30 is fed to pin 11 of the data latch 222 to supply a latch enable signal thereto. Latch 222 is utilized to latch the address information which appears on the first part of a machine cycle from the lines AD0–AD7 so that these lines can be utilized to transfer data during the latter half of a machine cycle. It is noted that ROM 224 is provided with address lines A0–A14, the lower order bits of which come from the latch 222.

Non-volatile memory 228 may be fabricated, for example, from the XICOR Model X2804API, electrically erasable PROM. The non-volatile memory 228 is utilized to store configuration parameters and data which is desired to be maintained even during a long-term power failure. In this connection it is pointed out that RAM 226 is also provided with a source of back-up power; however, the RAM back-up power is supplied from a capacitor to permit relatively short term power loss protection on the order of twelve hours to two days.

The configuration data stored in the non-volatile memory 228 may comprise, for example, customer schedules, set up for heating/cooling points, time of day etc. This same data is also stored in RAM 226. Although the non-volatile memory 228 may be read at roughly the same speeds as the RAM 226, data storage time to the non-volatile memory 228 is considerably slower (on the order of 10 ms as compared to 250 ns for the read time). Thus, any changes made by the operator, such as the time of day schedule and the like, will be stored in RAM 226 and later stored under control of microprocessor 220 into the non-volatile memory 228.

Writing into the non-volatile memory 228, as well as certain other devices, is governed by an address decoder 290 shown in FIG. 22A. Address lines A13–A15 from microprocessor 220 are connected as inputs to the address decoder 290 which provides for chip select signals to various devices. CS0N (Chip Select 0 "Not" signal) is fed to pin 20 of RAM 226 along the control bus 262. The second chip select signal, CS2N is fed to the non-volatile memory via a qualifying logic circuit 292. This qualifying logic circuit 292 includes two NOR gates 294 and 296, with NOR gate 296 serving as an inverter. The output of NOR gate 296 is fed to pin 18 of non-volatile memory 228 to serve as the chip enable signal. A conditioned input for the NOR gate 294 is the RST signal generated from the power supervisory circuit 232 of FIG. 23. The reset signal is utilized to prevent any attempts to access the non-volatile memory 228 during a power failure or other power transition condition.

The RAM 226 is a memory units and is configured in an 8K by eight array. RAM 226 is utilized for microprocessor storage of all data and is accessible at all times to the microprocessor.

Read and Write signals, RDN, WRN are provided as pin outputs 17 and 16 respectively from the microprocessor 220 to the non-volatile memory 228 along the control bus 262. These read and write signals are also provided to the RAM 226 along control bus 262.

The third decode from the address decoder 290 is the CS5N signal which is fed along the control bus 262 to pin 18 of UART 200 (FIG. 21A). The last decode is the CS6N signal fed to pin 1 of the latch 202 shown in FIG. 21A. Latch 202 provides a memory mapped I/O function for the microprocessor.

FIG. 22A also shows a crystal oscillator 310 which operates at 11.0592 MHz. This frequency is selected to operate the built-in serial port of the microprocessor 220 at the right frequency for 30 generating a standard 9600 baud rate for transmission to brick 10. The transmission path is via pins 10 and 11 of microprocessor 220, signal lines RXD-A and TXD-A, I/O bus 266 and lines *5a*,*5b*. (See FIG. 21A,B and 22A,B).

As shown in FIG. 22A, crystal oscillator 310 is connected to a transistor 312 which serves as a buffer to drive the baud rate clock, BRCLK, which is fed along a line 314 and control bus 262 to pin of UART 200 (FIG. 21A). The baud rate clock signal, BRCLK, is also fed to the X-10 control circuit 240 shown in FIG. 24 as explained more fully below.

The microprocessor circuitry shown in FIG. 22B also contains a flip-flop 320 and an NOR gate 322. NOR gate 322 provides an interrupt signal INT1N over line 324 and the control bus 262 to pin 13 of microprocessor 220. In response to this interrupt, the microprocessor 220 determines whether the interrupt originated from a zero crossing interrupt signal or from a UART interrupt signal. To do this, the microprocessor examines pin 9 of latch 202 of FIG. 21A which is fed by the ZX_IN signal over I/O bus 266. The ZX_IN signal originates from the Q output, pin 5, of the flip-flop 320 (FIG. 22B). The ZX_IN signal is generated in response to the clock input ZX fed into pin 3 of flip-flop 320 and originating as an output of the zero crossing circuit 242 shown in FIG. 24.

Basically, the ZX and the ZX_IN signals are generated at the zero crossing of the AC power line waveform and serve as a means to maintain the microprocessor clock synchronized to real time as maintained by the meter 20'. Controller 4 will periodically read the real time clock maintained by meter 20' via the bricks 10 and 28 (FIG. 1). Typically, the real time clock will be read once a day. In between these periodic readings, controller 4 will maintain a clock signal for purposes of the thermostat display and controlling the scheduled times by utilizing the zero crossing of the AC waveform. Thus, with each zero crossing signal, the zero crossing circuit 242 will output the ZX signal which is fed as the clock input to flip-flop 320 in FIG. 22B.

There may in fact be no signal ZX_IN on pin 9 of latch 202, and in this case microprocessor 220 identifies the INT1N signal as having been generated from the UART 200. In this connection, it is noted that pin 5 of UART 200 provides a signal, UINT (standing for UART interrupt) along the control bus 262 and line 326 as an input to NOR gate 322. (See FIG. 22B). Receipt of either the zero crossing signal, ZX_IN, or the UART interrupt signal, UINT, causes the microprocessor 220 to jump to the appropriate software subroutine for handling these zero crossing or UART interrupts respectively.

Power Supply Circuitry

FIG. 23 shows the power supply circuitry utilized within the controller 4. Power supply and regulator circuit 230 includes a surge protection device 330, transformer 332, full wave bridge rectifier 334, and voltage regulators 336 and 338. Voltage regulator 336 provides a regulated 5 volt output along line 340, and voltage regulator 338 provides a twelve volt regulated output along line 342. A 12 volt unregulated output is provided at the output of the full wave rectifier 334 along line 344.

The power supervisory circuit 232 includes a voltage monitor 350 (for example Maxim MAX690), a logic gate 352 and storage capacitor 354. The voltage monitor 350 monitors the 12 volt unregulated power to detect an early indication of a power failure. The 12 volt unregulated supply is fed into the power failure input, PFI, at pin 4 of the voltage monitor 350. In response to a dip in the 12 volt unregulated supply, the voltage monitor 350 outputs a power failure output, PFO, signal at pin 5 which is fed as an interrupt signal INT0N to the microprocessor along line 356 and control bus 262. It is pointed out that the interrupt signal INT0N which is generated along line 356 when power failure is detected, is the highest order interrupt signal and takes priority over any other interrupts to the microprocessor 220, e.g., the INT1N interrupt.

Together with the INT0N signal, the voltage monitor 350 provides an output on pin 1, VOUT, which permits discharge of the storage capacitor 354 to provide a 5 volt standby power supply at output line 358. A 5 volt standby power source is provided to feed various circuit components, primarily the RAM 226 shown in FIG. 22B. The 5 volt standby power is fed into the chip enable pin 20 of RAM 226 along line 360. This ensures that RAM data is safely stored away prior to initiating a shut down procedure. Storage capacitor 354 permits standby power to maintain data in the RAM for a period of time ranging from 12 hours to 2 days.

The voltage monitor 350 also provides a power-on-reset signal to reset the microprocessor 220 on power up. The reset signal is generated at pin 7 of voltage monitor 350 and provided as a signal RSTN along the control bus 262 and as an inverted signal RST as an output of logic gate 352. The RST signal is likewise fed along the control bus 262. Some of the logic elements in the control system require a reset signal operate on a positive active signal and others operate on a negative active signal; thus both such signals are generated on the control bus 262. For example, the RST signal is fed as an input to pin 9 of microprocessor 220 whereas the RSTN signal is fed as an input to pin 6 of the address decoder 290.

The voltage monitor 350 also provides a watch-dog timer function by receiving a watch-dog timer reset signal, WDT_RESET, from pin 8 of the microprocessor 220 along the I/O bus 266. The watch-dog timer reset signal is fed to pin 6 of voltage monitor circuit 350 at periodic intervals, e.g., up to one second. If voltage monitor 350 does not detect the watch-dog timer reset signal, its internal watch-dog timer circuit will time out and automatically generate a reset signal at pin 7 to provide both the RSTN and RST signals to reset the microprocessor and other circuits.

The relay circuit 234 shown in FIG. 23 is seen to comprise a relay 370, resistor 372 and diode 374. The 12 volt unregulated supply from the output of full wave rectifier 334 is droped across resistor 372 and fed to the thermostat 2 via line *6a*. Thermostat 2 also receives the ground line *6b* from the power supply and regulator circuit 230. Thermostat 2 contains a thermal switch 376 connected across the power lines *6a* and *6b* as shown in FIG. 20D. The thermal switch 376 is set to close and thus short out the 12 volt power lines *6a* and *6b* whenever the temperature within the premise drops below 40° Fahrenheit; otherwise the switch remains open. It is desired to turn on the heating system to maintain the temperature above 40° F. so as to prevent bursting of pipes and the like. When thermal switch 376 closes, the full 12 volt supply is dropped across resistor 372 which energizes the coil of relay 370, and thus actuates the heating system. The output of relay 370 is connected directly to the primary heating device of the premise and will turn on the heating system regardless of whether or not the heating schedule is actually calling for heat at that time. When the temperature rises above 40° F., the thermal switch 376 opens and permits normal scheduled operation of the heating system via the controller 4. However, the heating cycle with the thermal switch 376 can be repeated indefinitely to control the house temperature so that it doesn't fall below the set-point, for example 40° F.

Application Module and Zero-Crossing Circuitry

Turning now to FIG. 24, the zero crossing circuit 242 comprises an optical coupler 380 and a Schmidt trigger/inverter 382. The zero crossing circuit 242 receives inputs from the AC power lines 270 and 272 and detects the zero crossing of the AC power waveform to provide the ZX signal along line 384 with every zero crossing. The ZX signal is fed to the I/O bus 266 and serves as the clock input to flip-flop 320 in FIG. 22B. As explained above, flip-flop 320 in turn generates the ZX_IN signal which is read by the microprocessor 220 through latch 202 in order to maintain the system real time clock.

The X-10 control circuit 240 of FIG. 24 is utilized by the microprocessor 220 to control the turn on and turn off of the various X-10 units via transmission of control signals over the AC lines 270, 272. The X-10 control circuit 240 is seen to comprise counters 390 and 392, flip-flop 394 and Schmidt trigger/inverter 396. Counters 390 and 392 serve to divide down the baud rate clock, BRCLK received along the control bus 262 and line 400 to clock input pins 2. The output of clock 392 at line 402 is a 240 KHz clock signal which is fed into the clock input of flip-flop 394 which in turn is operated to divide down the clock frequency by a factor of two. The CLR – input of flip-flop 294 is fed by the 5 volt DC source through a pull-up resistor from a line 328 of FIG. 22B.

The preset input at pin 10 of flip-flop 394 is fed along line 404 and through the Schmidt trigger/inverter 396 with the X10_TX signal which originates from pin 7 of microprocessor 220 (FIG. 22A). This signal is provided to the Schmidt trigger/inverter 396 via the I/O bus 266. When pin 10 of the flip-flop 394 is low, the Q— output of flip-flop 394 is low and may not be controlled by the input clock signal at pin 11. However, when the preset signal at pin 10 to flip-flop 394 is high, the 240 KHz clock input at pin 11 to the flip-flop 394 is divided down and generated as a 120 KHz output from the Q— output of flip-flop 394. The 120 KHz signal drives the base of transistor 406 along line 408. Transistor 406 serves to drive transformer 410 to modulate the AC power lines with the 120 KHz signal in accordance with the X10_TX output of the microprocessor. A capacitor 412 and resistor 414 provide a filter to permit coupling of the 120 KHz pulse into the AC line without coupling the 60 Hz back into the logic circuit. Capacitor 416 is a filter capacitor and capacitor 418 is a decoupling capacitor.

Software Description

As previously discussed, the preferred embodiment includes a thermostat 2 and a controller 4. Each of these components is associated with a separate program designed to enable the respective component to carry out its designated task. The preferred embodiment of the software for controlling the thermostat 2 is described with reference to FIGS. 25A-35, the source code listing in appendix A, and the message formats in appendix B. The controller 4 software is described in relation to FIGS. 36 to 73.

Thermostat Software

Figure 25A:
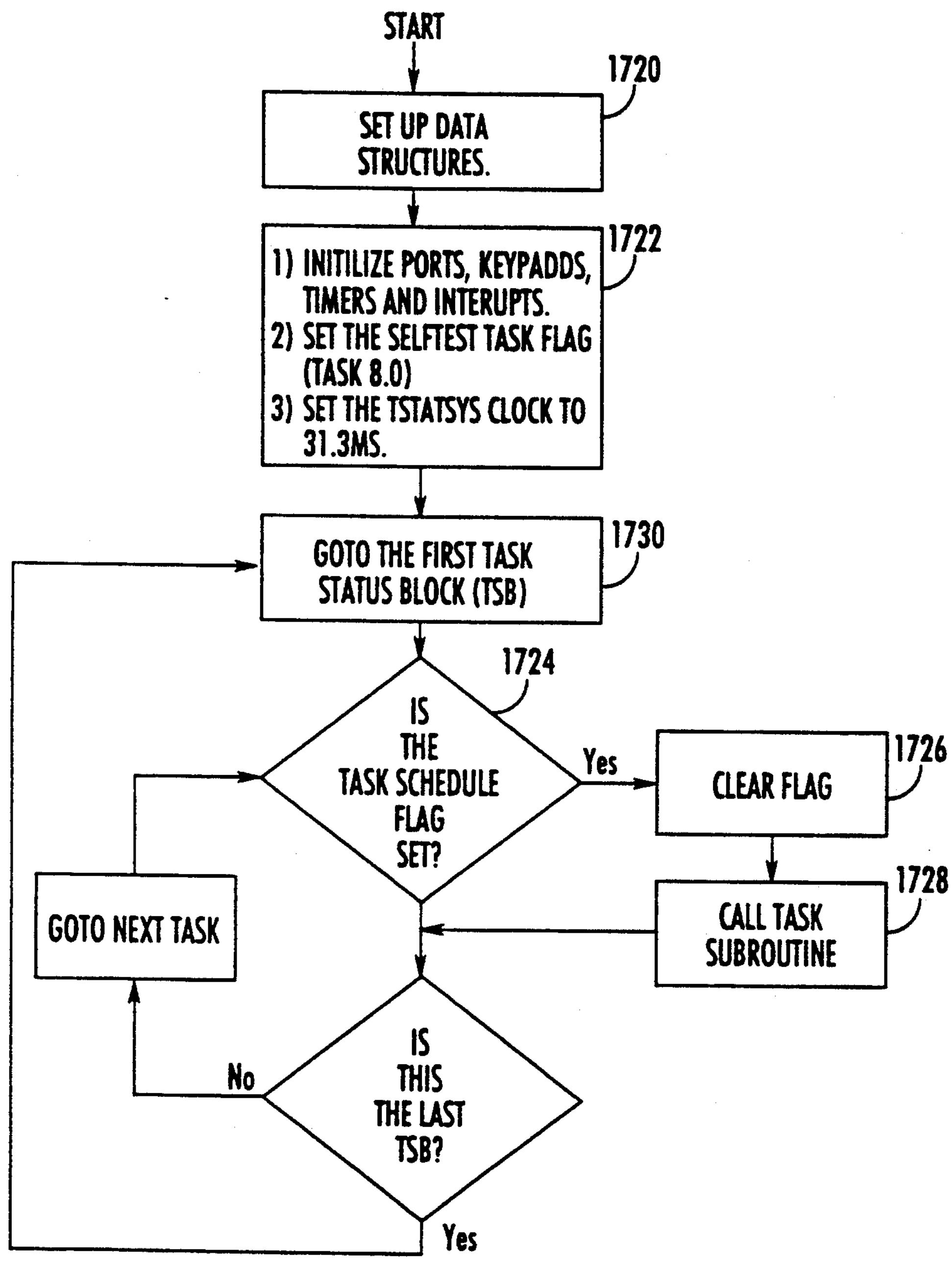
Figure 25B:
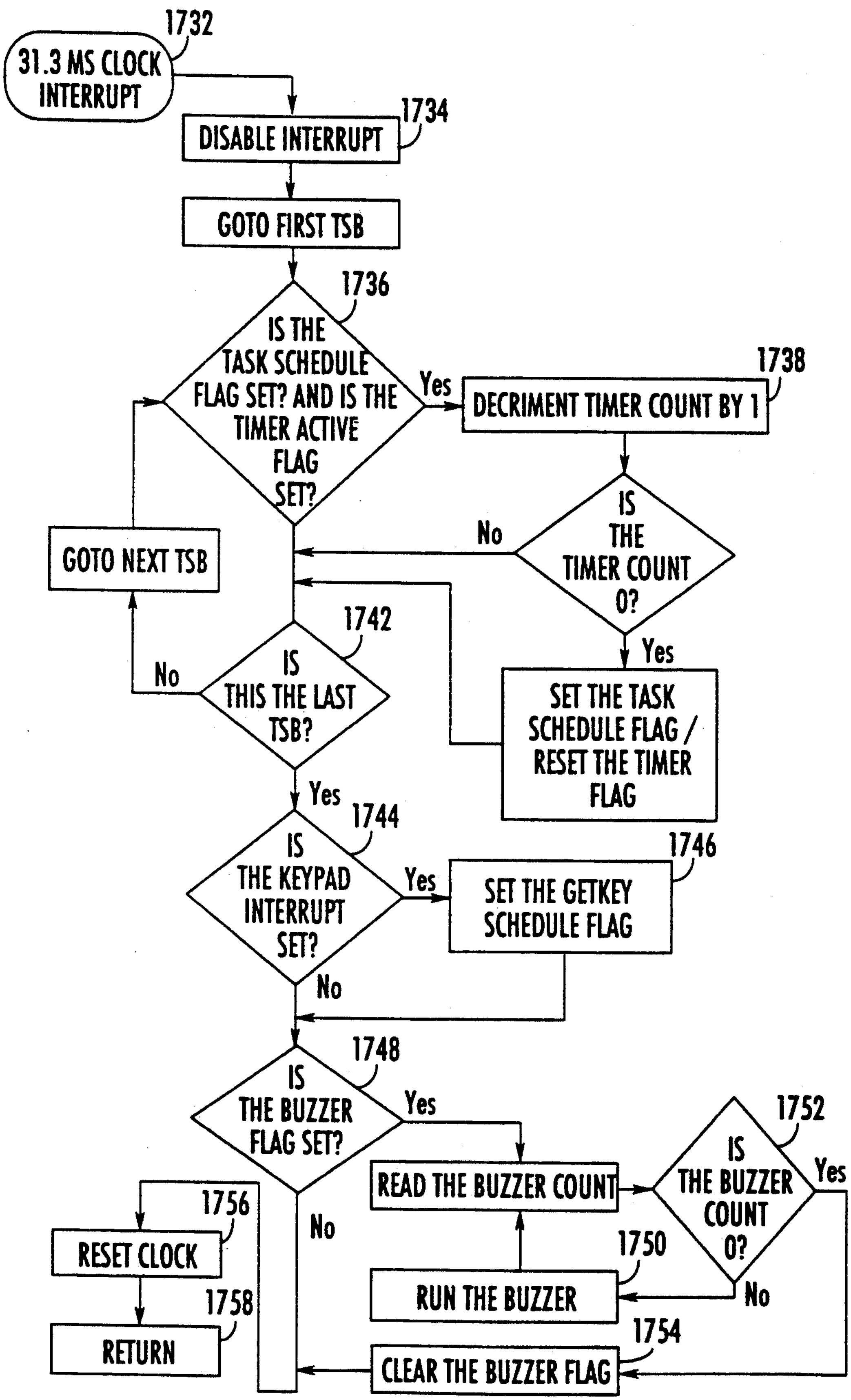
Figure 25C:
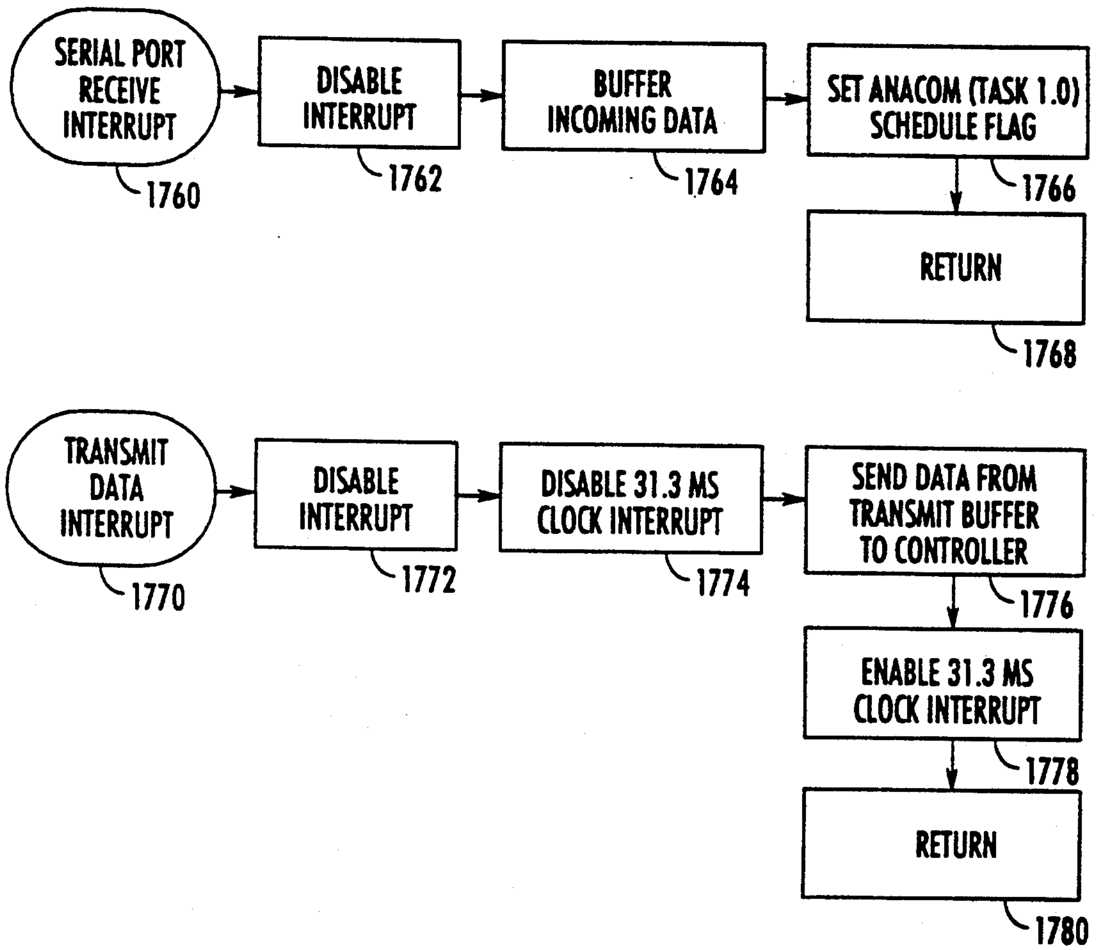

FIG. 25A is the flow diagram for the main routine of the thermostat software which is TSTATSYS. TSTATSYS is subject to four interrupts as illustrated in the flow diagrams illustrated in FIGS. 25*b* and 25*c*. As the main routine, TSTATSYS calls the subroutines which perform the following tasks listed in table 1.

TABLE 1

| SUBROUTINE | FUNCTION (TASK) |
|---|---|
| ANACOM | 1.0 Analyze controller messages; |
| FMCMSG | 2.0 Format messages to controller 4; |
| SNDTMP | 3.0 Send temperature and switch settings to controller 4; |
| GETTMP | 4.0 Get temperature and switch 36, 38 settings; |
| GETKEY | 5.0 Get keypad 34 entries; |
| CONPMI | 6.0 Process configuration and person-machine interface; |
| OUTDIS | 7.0 Output data to LCD display 32 and LEDs 84, 86; and |
| SLFTST | 8.0 Perform self-test and diagnostics. |

The source code for TSTATSYS is found at appendix A; the source code for MAINSUBS, which includes ANACOM 1711, FMCMSG 1712, SNDTMP 1713, GETTMP 1714, GETKEY 1715 and SLFTST 1718, is found at appendix A; the source code for CONPMI 1716 is found at appendix A; and the source code for OUTDIS 1717 is found at appendix A.

FIG. 26 illustrates the manner in which data flows between the main subroutines 1711, 1712, 1713, 1714, 1715, 1716, 1717, 1718. The manner in which data flows between these subroutines is controlled by the main routine TSTATSYS which is not itself illustrated in FIG. 26. As previously discussed, the thermostat 2 and controller 4 are each enabled to perform their designated task with separate software. The functional domain of the software is schematically illustrated in FIG. 26 with dashed boundaries 1720 for the controller, 1722 for the thermostat. The data link 6 between these two programs provides the channel by which the two programs share and transfer data while performing the functions of the integrated control system.

Referring to FIG. 25*a*, the first step performed by TSTATSYS is to define the program data structures. The data structures are set up in two 128 byte banks of memory (step 1720). In the preferred embodiment of TSTATSYS, the data structures are set up in lines 88-241. The first bank of memory includes the following data structures:

TABLE 2

| BRIEF DESCRIPTION OF DATA | SIZE | CODE |
|---|---|---|
| 1. State of CONPMI (0-7) | 1 byte | STATE |
| 2. Status (0) of the: | 4 bits | |
| Weekend bit, LCD | | STO_WE |
| Load control bit, LCD | | STO_LC |
| Peak period pending bit, flash LCD | | STO_PP |
| Emergency heat, LED | | STO_EH |
| 3. Status (1) of the: | 4 bits | |
| Temperature hold on, LCD | | ST1_TH |
| Heat water on, LCD | | ST1_HW |
| Price tiers (0=4, 1=3) | | ST1_PT |
| Filter element on, LCD | | ST1_FL |
| 4. Status (2) of the: | 4 bits | |
| Current tier | 2 bits | ST2_RH |
| (low, medium, high, peak) | | ST2_RL |
| Current time period | 2 bits | ST2_CH |
| (morn, day, eye, night) | | ST2_CH |
| 5. Status (3) of the: | 4 bits | |
| Beep switch | | ST3_BC |
| Clock (1=12 hour, 0=24 hour) | | ST3_CL |
| Temperature format (1=C°., 0=F.°) | | ST3_C |
| Single beep | | ST3_BS |
| 6. Status (4) of the: | 4 bits | |
| ACK PENDING flag for ANACOM and FMCMSG | | ST4_AP |
| Billing information (0=7 schedules, 1=3 schedules) | | ST4_BI |
| Flash temperature flag (temperature error) | | ST4_FT |
| Flash time flag (time error) | | ST4_FC |
| 7. Switch settings for the: | 4 bits | |
| Heat switch | | SW1_HT |
| Cool switch | | SW1_CL |
| Automatic fan switch | | SW1_FA |
| Emergency heat switch | | SW1_EH |
| 8. Hours portion of the time | 1 byte | TIMEHR |
| 9. Minutes portion of the time | 1 byte | TIMEMIN |
| 10. Previously read temperature | 1 byte | OLDTMP |
| 11. Setpoint temperature for the thermostat display | 1 byte | SETPNT |
| 12. Setpoint temperature received from the controller | 1 byte | CNTSET |
| 13. Sensed temperature stored in Centigrade | 1 byte | CTEMP |
| 14. Sensed temperature stored in Fahrenheit | 1 byte | FTEMP |
| 15. Temporary storage for multiplication | 1 byte | MULTA |
| 16. Temporary storage for multiplication | 1 byte | MULTB |
| 17. Temporary storage for division | 2 byte | MULTA |
| 18. Temporary storage for division | 1 byte | MULTB |
| 19. a. Start of task 1 (ANACON) | | TSB1 |
| b. Timer active flag for ANACON | 1 bit | TSB1T |
| c. Schedule flag for ANACON | 1 bit | TSB1S |

TABLE 2-continued

| BRIEF DESCRIPTION OF DATA | SIZE | CODE |
|---|---|---|
| d. Supplemental timer counts for ANACON | 4 bits | TSB1RP |
| e. Primary timer counts for ANACON | 1 byte | TSB1TM |
| f. Parameter read by ANACON for processing | 1 byte | TSB1PA |
| 20. a. Start of task 2 (FMCMSG) | | TSB2 |
| b. Timer active flag for FMCMSG | 1 bit | TSB2T |
| c. Schedule flag for FMCMSG | 1 bit | TSB2S |
| d. Supplemental timer counts for FMCMSG | 4 bits | TSB2RP |
| e. Primary timer counts for FMCMSG | 1 byte | TSB2TM |
| f. Parameter read by FMCMSG for processing | 1 byte | TSB2PA |
| 21. a. Start of task 3 (SNDTMP) | | TSB3 |
| b. Timer active flag for SNDTMP | 1 bit | TSB3T |
| c. Schedule flag for SNDTMP | 1 bit | TSB3S |
| d. Supplemental timer counts for SNDTMP | 4 bits | TSB3RP |
| e. Primary timer counts for SNDTMP | 1 byte | TSB3TM |
| f. Parameter read by SNDTMP for processing | 1 byte | TSB3PA |
| 22. a. Start of task 4 (GETTMP) | | TSB4 |
| b. Timer active flag for GETTMP | 1 bit | TSB4T |
| c. Schedule flag for GETTMP | 1 bit | TSB4S |
| d. Supplemental timer counts for GETTMP | 4 bits | TSB4RP |
| e. Primary timer counts for GETTMP | 1 byte | TSB4TM |
| f. Parameter read by GETTMP for processing | 1 byte | TSB4PA |
| 23. a. Start of task 5 (GETKEY) | | TSB5 |
| b. Timer active flag for GETKEY | 1 bit | TSB5T |
| c. Schedule flag for GETKEY | 1 bit | TSB5S |
| d. Supplemental timer counts for GETKEY | 4 bits | TSB5RP |
| e. Primary timer counts for GETKEY | 1 byte | TSB5TM |
| f. Parameter read by GETKEY for processing | 1 byte | TSB5PA |
| 24. a. Start of task 6 (CONPMI) | | TSB6 |
| b. Timer active flag for CONPMI | 1 bit | TSB6T |
| c. Schedule flag for CONPMI | 1 bit | TSB6S |
| d. Supplemental timer counts for CONPMI | 4 bits | TSB6RP |
| e. Primary timer counts for CONPMI | 1 byte | TSB6TM |
| f. Parameter read by CONPMI for processing | 1 byte | TSB6PA |
| 25. a. Start of task 7 (OUTDIS) | | TSB7 |
| b. Timer active flag for OUTDIS | 1 bit | TSB7T |
| c. Schedule flag for OUTDIS | 1 bit | TSB7S |
| d. Supplemental timer counts for OUTDIS | 4 bits | TSB7RP |
| e. Primary timer counts for OUTDIS | 1 byte | TSB7TM |
| f. Parameter read by OUTDIS for processing | 1 byte | TSB7PA |
| 26. a. Start of task 8 (SLFTST) | | TSB8 |
| b. Timer active flag for SLFTST | 1 bit | TSB8T |
| c. Schedule flag for SLFTST | 1 bit | TSB8S |
| d. Supplemental timer counts for SLFTST | 4 bits | TSB8RP |
| e. Primary timer counts for SLFTST | 1 byte | TSB8TM |
| f. Parameter read by SLFTST for processing | 1 byte | TSB8PA |
| 27. Number of times messages are repeated when sent to the controller by FMCMSG | 1 byte | RP_CNT |
| 28. Number of counts placed in timer of GETTMP | 4 bits | TIMCNT |
| 29. Appliance identification number (1-8) | 4 bits | APPNUM |
| 30. Queue for messages sent by FMCMSG | 8 bytes | FMCQUE |
| 31. Pointer for the data in the receive data buffer | 1 byte | RDATA |
| 32. Transmit data byte | 1 byte | TDATA |
| 33. Status flag for serial I/O port | 4 bits | SIOF |
| 34. Number of counts for a beep | 4 bits | BUZ_CNT |
| 35. Key pad flags | 2 bits | KEY_FG |
| 36. Controller shadow flag for heat water, hold, price tier, and filter | 4 bits | CNT_FG |
| 37. Stores the last key pressed on the keypad | 1 byte | LST_KEY |

The second bank of memory includes the following data structures:

TABLE 3

| BRIEF DESCRIPTION OF DATA | SIZE | CODE |
|---|---|---|
| 1. Data transmission buffer | 32 bytes | TRXMB |
| 2. Data receive buffer | 32 bytes | RCXMB |
| 3. Buffer for information manipulated by CONPMI | 32 bytes | PMIBUF |
| 4. Flash first digit | 1 byte | FLASH1 |
| 5. Flash second digit | 1 byte | FLASH2 |
| 6. Reset first digit | 1 byte | REST1 |
| 7. Reset second digit | 1 byte | REST2 |
| 8. Period counter for CONPMI | 1 byte | PM_PRD |
| 9. Pointer for the data in PMIBUF | 1 byte | PM_PNT |
| 10. Flash colon | 4 bits | LC_CNT |
| 11. Status (5) of the: | 4 bits | |
| Flash Weekday/Weekend bit | | ST5_FW |
| Furnace heat/cool on bit | | ST5_HC |
| Flash load control bit | | ST5_FL |
| Request configuration | | ST5_RC |

The last 16 bytes of memory bank 2 are reserved as display memory. The display is a 128 segment display wherein each segment corresponds to one bit of display memory. The display elements are illustrated in FIG. 35 and listed in appendix C. After the data structures are set up (step 1720), TSTATSYS initialize the interrupts, the microprocessor 100 ports, the keypads 34, and the TSTATSYS clock (step 1722). TSTATSYS sets the schedule flag (TSB8T) for the self test task 8.0, sets the TSTATSYS clock to 31.3 milliseconds, and reads the first task status block (TSB) in the TSB list (lines 322-362).

In the main loop of TSTATSYS, TSTATSYS reads each task schedule flag (TSB1S-TSB8S) (step 1724), clears each schedule flag which is set (step 1726), and calls the task (1.0-8.0) subroutine (step 1728). The final step of TSTATSYS is to return to the first task status block (step 1730).

As previously discussed, TSTATSYS is subject to four interrupts. The diagrams for these interrupts are illustrated in FIGS. **32*b* and 32*c***.

The first interrupt is the timer or clock interrupt which occurs when a 31.3 millisecond clock set up at the beginning of the main loop times out (step 1732). When this interrupt occurs, the interrupt is disabled (step 1734), the task schedule flag and timer active flag (TSB1T-TSB8T) for each task is checked (step 1736), the timer count for each task having an enabled timer active flag and task schedule flag set is decremented by 1 (step 1738) (TSB1TM;TSB1RP-TSB8TM;TSB8RP), and the task schedule flag for the tasks having a timer count of 0 are set (step 1740). After the last TSB is read (step 1742), the keypad interrupt (second interrupt) is checked (step 1744), and the Getkey schedule flag (TSB55) is set (step 1746). Subsequently, the buzzer flag is checked (step 1748), the buzzer is run (step 1750), until the buzzer count is 0 (step 1752), and the buzzer flag is cleared (step 1754). Subsequently, the 31.3 millisecond clock is reset (step 1756), and a return to TSTATSYS occurs (step 1758). For the preferred embodiment of the invention, the tasks which utilize their timers are 2.0, 3.0, 4.0, 6.0 and 7.0. (See lines 380–421 of TSTATSYS.)

The third interrupt is the serial port "in" or receive interrupt which is caused by the first bit of data transferred from the controller 4 to the thermostat 2. When the serial port interrupt occurs (step 1760), the interrupt is disabled (step 1762), the incoming data is stored in a data receive buffer (RCXMB) (step 1764), and the task schedule flag TSB1S is set for the analyze controller message subroutine (ANACOM) (step 1766), the interrupt is cleared, and a return to TSTATSYS occurs (lines 460–481) (step 1768).

The fourth interrupt is the transmit serial port data to controller interrupt which occurs when FMCMSG loads data in the data transmission buffer (TRXMB). When this interrupt occurs (step 1770), the interrupt is disabled (step 1772), the 31.3 ms clock is disabled (step 1774) (discussed above), the data in the data transmission buffer is sent to the controller (step 1776), the 31.3 ms clock is enabled (step 1778), and a return to TSTATSYS occurs (step 1780) (lines 484–497).

FIG. 27 illustrates the data flow diagram for the task of analyzing controller messages. In the presently preferred embodiment of the invention, this task is performed by the ANACOM 1711 subroutine found at lines 92–261 of the MAINSUBS subroutine. ANACOM 1711 cooperates with a subroutine for processing the serial information transferred from the controller to the thermostat over the data link 6. The serial port "in" and transmit serial port data interrupts cooperate in such a way that they function very similar to a UART, and in effect are the software counterpart to a hardware UART.

When a message is sent to the thermostat 2 over the data link 6 from the controller 4, the message provides the serial port "in" interrupt (step 1782) which causes the software UART to store the message in a data receive buffer (RCXMB, see Table 3) (step 1784), and set the ANACOM 1711 schedule flag (TSB1S, see Table 2) in the TSB list e.g. table 2, item 19*c* (step 1786).

When ANACOM 1711 runs, the message is read from the data receive buffer (step 1788), and the validity of the checksum is determined (step 1790). If the checksum is valid, the byte count of the data field is determined, the message type is determined, the address field is determined, the data is read from the data field if the byte count of the data field is not 0 (step 1792), and the ACK PENDING flag (ST4_AP, see Table 2) is reset (step 1798). If the data read is time and day data, the time and day data (TIMEHR, TIMEMIN, STO_WE, see Table 2) in the thermostat 2 are updated (step 1794). For other data, the PMI buffer (PMIBUF, see Table 3) is updated (step 1796).

If the checksum is invalid a return from ANACOM 1711 to the main routine occurs, and, since the ACK PENDING flag was not reset, FMCMSG 1712 sends the appropriate request message required to prompt the controller to resend the required message to the Message type A is a message which is sent from the controller 4 to the thermostat. Table 4 below lists the message types found in appendix B along with a description.

TABLE 4

| MESSAGE TYPE | MESSAGE |
|---|---|
| A | Time message from controller; |
| B | Temperature and switch setting message; |
| C | HVAC schedule from/to the controller; |
| D | Heat water schedule (WEEKDAY/WEEKEND) from/to the controller; |
| E | Appliance schedule from/to the controller; |
| F | Configuration data from/to the controller; |
| G | Request for billing information from the controller; |
| H | Request for an override of the heating, cooling, or hot water schedules in the controller; and |
| I | Miscellaneous messages to the controller. (Example: message concerning the status of the HVAC air filter) (step 1800). |

The first byte of message type A is the byte count of the data field, which in this case is 5. The data in this message includes: one byte for the hour which is in the form of binary coded decimal (BCD); one byte for the minutes which is in the form of binary coded decimal; two bytes for transferring status information; and one byte for transferring the set point temperature. The key for the status byte information is located below the message format display. (For example, a status byte 1 in the form of 1111 1111 would correspond to weekend settings, with direct load control on, with the peak period pending LED flashing, with the emergency heat LED on, with the temperature hold element on, with the heat water element on, with 3 price tiers, and with the filter element on.)

The information from the data field of message type A is read from the data receive buffer (RCXMB) and stored within the data structures as shown in Table 5 below:

TABLE 5

| DATA | LOCATION | SIZE |
|---|---|---|
| The hour | TIMEHR | 1 BYTE |
| The minute | TIMEMIN | 1 BYTE |
| Weekend setting | ST0_WE | 1 BIT |
| Load Control | ST0_LC | 1 BIT |
| Peak Period | ST0_PP | 1 BIT |
| Emergency heat | ST0_EH | 1 BIT |
| Temperature hold | ST1_TH | 1 BIT |
| Heat water | ST1_HW | 1 BIT |
| Price tier | ST1_PT | 1 BIT |
| Filter status | ST1_FL | 1 BIT |

Byte 2 of a message is the message type, and for message type A (a 0 in byte 2) the data is transferred to the data structures as shown above.

A message type J (a #FF in byte 2) causes ANACOM to clear an ACK PENDING flag. The purpose of the ACK PENDING flag will be discussed below in reference to the FMCMSG 1712 subroutine.

Referring again to FIG. 34, message types C, D, E, F, or G (a 2, 3, 4, 5, or 6 in byte 2 respectively) cause the data fields stored in the data receive buffer to be transferred to the CONPMI 1716 data buffer (PMIBUF) (step 1796).

Subsequent to transferring the data fields from the data receive buffer to the appropriate data structure and setting the appropriate schedule flag, ANACOM 1711 clears its schedule flag and returns to TSTATSYS.

The code for the software UART is found at lines 460-564 of TSTATSYS; the code for the get message portion of ANACOM 1711 is found at lines 111-117 of MAINSUBS; the code for the check for valid checksum portion of ANACOM is found at lines 554-620 of the Subroutines; the code for the analyze message type portion of ANACOM 1711 is found at lines 120-139 of MAINSUBS; the code for the update time and weekday/weekend data portion of ANACOM 1711 is found at lines 140-184 of MAINSUBS; the code for the update ACK PENDING flag portion of ANACOM 1711 is found at lines 132-139 and 252-260 of MAINSUBS; and the code for the send info to PMIBUF (6.0) portion of ANACOM 1711 is found at lines 222-251 of MAINSUBS.

FIG. 28 illustrates the data flow diagram for the task of formatting messages sent to the controller. This task is performed by the FMCMSG 1712 subroutine found at lines 295-569 of the MAINSUBS subroutine.

When data is stored by CONPMI 1716 or SNDTMP 1713 for purposes of transferring the data to the controller 4, these subroutines set the schedule flag for the FMCMSG 1712 subroutine (TSB2S, Table 2) and set the parameter word for FMCMSG (TSB2PA, Table 2). Accordingly, when TSTATSYS loops through and reads the schedule flag for FMCMSG, FMCMSG 1712 runs. When called, FMCMSG 1712 reads the parameter word in its TSB list (lines 146-151 of the TSTATSYS subroutine) to determine the type of message which is being sent to the controller 4. The code for the analyze message type function of FMCMSG 1712 is found at lines 327-351 of MAINSUBS.

After FMCMSG 1712 determines the message type, FMCMSG 1712 assembles a message from the data such that the message can be read by the controller 4 (steps 1804-1812), calculates a checksum (step 1814), inserts the checksum into the last byte of the message (step 1814), and stores the message on the data transmission buffer (step 1816) which causes a transmit data interrupt. The transmit data interrupt (FIG. 25C) causes the software UART to send data to the controller.

Message types B-G are transmitted to the controller once without reference to the success of the transmission to the controller. When message types H, I and X are transmitted to the controller, the ACK PENDING flag (ST4_AP) is set and a counter (RP_CNT, Table 2) is set to 15. Message types H, and I are transmitted repeatedly until either the ACK PENDING flag is cleared by ANACOM 1711 or the counter has been decremented to 0. As discussed above, ANACOM 1711 clears the ACK PENDING flag in response to the transmission of a message type J (ACK MESSAGE) from the controller 4 to the thermostat 2 over the data link 6.

When message types H, and I are transmitted, the timer active flag (TSB2T) for FMCMSG 1712 is set and the timer count (TSB2TM) is set to 32. The timer active flag and the timer count are set as long as the ACK PENDING flag is set or as long as RP_CNT is set. FMCMSG 1712 repeats the message every 1 second (32*31.3 ms) as long as the ACK PENDING flag is set or as long as RP_CNT is set, since the 31.3 ms timer interrupt routine loops through the TSB list every 31.3 milliseconds, decrements the timer count by 1 to 0, and sets the schedule flag for FMCMSG 1712 when the timer count is 0.

The checksum calculation is performed at line 497 of MAINSUBS by transferring to lines 513-553 of the subroutines found at appendix A. The send message to controller function is found at lines 489-553 of MAINSUBS. The code for the repeat message to controller function is found at lines 553-569 of MAINSUBS.

The assembly of the message types B-I will now be discussed in reference to appendix B. All of these messages have a common format which includes a byte count, a message type byte, address field byte, a checksum byte and possibly data. The first byte of all messages is the byte count which establishes the number of data bytes; the second byte of all messages is the message type; the third byte of all messages is the address field which establishes the memory location of the information in the controller; and the last byte of all messages is the checksum.

For message type B, FMCMSG 1712 assembles a serial signal including six bytes of information. The following description of this signal is made in reference to appendix B. The byte count for message type B is 2, the message type is 1, and the address field is 0. The fourth and fifth bytes of the signal for message type B are the data fields. In particular, the fourth byte is the temperature reading from the thermostat temperature sensor which is the form of binary coded decimal. The fifth byte is the switch byte, which provides the controller 4 with the state of the thermostat 2, the position of the heating and cooling switch 36, the position of the fan switch 38, and the position of the emergency heat switch 80. One bit of the switch byte provides for the status of the thermostat and switches 36, 38, 80. The switch byte table in appendix B lists the status of the thermostat 2 and switches 36, 38, 80 corresponding to the logic state of each bit.

The code for this signal assembly process is found at lines 374-403 of MAINSUBS.

For message types C-G, FMCMSG 1712 assembles a serial signal including four bytes of information. The following description of this signal is made in reference to appendix B. The byte count for message types C-G is 0. For message types C-G, the message type byte ranges from 2-6 respectively. For message type C, which is a request for the HVAC schedule from the controller, the address field determines which schedule is being requested, i.e. weekday heating schedule (0), weekend heating schedule (1), weekday cooling schedule (2), or weekend cooling schedule (3). For message type D, which requests the heat water schedule from the controller, the address field determines which schedule is being requested, i.e. weekday schedule (0) or weekend schedule (1). For message type E, which requests the appliance schedule from the controller, the address field determines which schedule is being requested. A 0–7 in this byte corresponds to the weekday schedule for one of eight appliances, and a 8–15 in this byte corresponds to the weekend schedule for one of the eight appliances. For message types F and G, which request configuration data and billing information, the address field is 0.

The code for this signal assembly process is found at lines 356–374 of MAINSUBS.

For message type H, FMCMSG 1712 assembles a serial signal including six bytes of information. The byte count for message type H is 2 bytes. The message type for message type H is 7. The address field for message type H is a 0. The fourth byte of the signal is a data field which is the status byte which transfers the status of the temperature override switch and the hot water heater override hold switch. The fifth byte of the signal is a data field which includes the override set point temperature in binary coded decimal.

The code for this signal assembly process is found at lines 404–432 of MAINSUBS.

For message type I, FMCMSG 1712 assembles a serial signal including five bytes of information. The number of bytes in the data field for message I is 1. The message type for message type I is 8. The address field for message type I is a 0. The data field is a status byte which transfers the status of the air filter, the customer service key and the optimizer key.

The code for this signal assembly process is found at lines 435–453 of MAINSUBS.

Referring again to messages C–F and appendix B, these messages are shown as also corresponding to a block of data corresponding to a schedule. This schedule data 1826 is supplied from the controller 4 memory to the CONPMI 1716 data buffer (PMIBUF) 1832 in response to the respective request message C–F. When this data is supplied to PMIBUF 1832, the schedule flag (TSB2S, Table 2) and the appropriate parameter (TSB2PA) are set in the TSB for FMCMSG 1712. While the schedule data is in the CONPMI 1716 data buffer, an operator can manipulate the keypad 34 of the thermostat 2 to modify the schedule data. (The manner the schedule data is manipulated will be discussed below.) Upon the expiration of the 32 second clock in CONPMI 1716 (line 84 of CONPMI) or upon activating the return key of the thermostat 2, control is returned to TSTATSYS which loops through the TSB list and encounters the FMCMSG 1712 schedule flag. FMCMSG 1712 then assembles schedule data into a serial signal (steps 1802–1816) for transmission to the controller 4 so that the controller 4 memory can be updated.

The format of the serial signals for the schedule data include a first byte for the byte count of the data field, a second byte which determines which message type (C–F) the schedule data corresponds to, a third byte for the address field, a plurality of bytes for the schedule data, and a last byte for the checksum. The code for the assembly process of the schedule data is at lines 458–488 of MAINSUBS.

FIG. 29 illustrates the data flow diagram for the task of reading switch 36, 38, 80 settings (step 1834) and scheduling FMCMSG 1712 to send the thermostat 2 temperature and thermostat switch settings to the controller 4 (step 1838). The SNDTMP 1713 subroutine found at lines 609–630 of MAINSUBS performs this task. More specifically, SNDTMP 1713 reads the heat, cool, automatic fan and emergency switch 36, 38 80 settings from the appropriate microprocessor 100 ports (P5.0–P5.3) (step 1834), stores these settings in the appropriate memory locations (SW1_HT, SW1_CL, SW1_FA, SW1_EH, table 2) (step 1836), sets the schedule flag for FMCMSG 1712 (TSB2S, table 2) in the TSB list, sets the parameter word for FMCMSG 1712 (TSB2PA, table 2) to 1 (message type B), resets its timer count, and returns (step 1838). Upon running, FMCMSG 1712 will format and send the temperature and switch setting data as discussed above for message type B.

SNDTMP 1713 operates when its schedule flag (TSB3S, table 2) is set approximately every 1 second (32*0.0313 ms). More specifically, before SNDTMP 1713 returns to TSTATSYS, SNDTMP 1713 enables its timer active flag (TSB3T, table 2), and resets its timer count to 32 (TSB3TM, table 2) after scheduling FMCMSG 1712. When 31.3 ms timer interrupt routine loops through the TSB list every 31.3 milliseconds it decrements the timer count by 1 until the timer count is reduced to 0. When the timer count reaches 0, the schedule flag for SNDTMP 1713 (TSB3S, table 2) is set and SNDTMP 1713 runs upon the next loop of TSTATSYS through the TSB list.

FIG. 30 illustrates the data flow diagram for the task of reading the ambient temperature from the analog temperature sensor 62 in the thermostat 2. This task is performed by the GETTMP 1714 subroutine. The analog temperature sensor 108 is coupled to an analog-to-digital converter 110 which provides a digital signal substantially proportional to the ambient temperature sensed by the sensor 108. The A/D converter provides an eight bit signal which is converted into a serial pulse stream which is read by the microprocessor 100. GETTMP 1714 reads this digital signal along with a data count, and checks the data count to insure that a data transfer error is not present (step 1840). If an error is not present, the signal is converted to degrees Fahrenheit or Celsius (step 1842), calibrated to adjust for any temperature problems, manipulated with a temperature smoothing process (step 1844), stored in a temperature data buffer (CTEMP or FTEMP, table 2), and checked to see if it is less than 99 (step 1846). GETTMP 1714 also sets the flag for OUTDIS 1717 in the TSB list and passes the appropriate parameter to the parameter field of OUTDIS (step 1848). When TSTATSYS transfers control to OUTDIS, the temperature is updated on the display of the thermostat.

GETTMP 1714 reads the A/D converter when its schedule flag (TSB4S) is set approximately every 5 seconds (160*0.0313 ms). More specifically, GETTMP 1714 resets its timer count to 150 (TSBTM, table 2) after scheduling OUTDIS 1717, but before it returns to TSTATSYS. When 31.3 ms timer interrupt routine loops through the TSB list every 31.3 milliseconds it decrements the timer count by 1 until the timer count is reduced to 0. When the timer count reaches 0, the schedule flag for GETTMP 1714 (TSB4S, table 2) is set and GETTMP 1714 runs upon the next loop of TSTATSYS through the TSB list.

The code for GETTMP 1714 is located in MAINSUBS as follows: the code for reading the A/D converter is at lines 681–720 of MAINSUBS (step 1840); the code for checking the data count is at lines 706–713; the code for converting the digital temperature signal to degrees Fahrenheit is found at lines 727–744 of MAINSUBS (step 1842); the code for storing the temperature in the temperature buffer 1828 is found at lines 790–797 of MAINSUBS; and the code for checking to see if the temperature is less than 99 is found at lines 721-723 of MAINSUBS (step 1846).

Referring now to the calibration function, this function involves reading ports 1.0 and 1.3 of the microprocessor 100. When the thermostat is manufactured, ports 1.0 and 1.3 are grounded with jumpers (FIG. 20B, jw1 and jw2). Typically, the temperature sensors 108 read high within 3 degrees, thus the jumpers are removed in such a way that GETTMP reads ports 1.0 and 1.3 reduces the temperature from 0-3 degrees. For example, if the temperature sensor 108 does not need calibration, both jumpers are removed, if the temperature sensor 108 reads 1 degree high one jumper is removed, if the temperature sensor 108 reads 2 degree high the other jumper is removed, and if the temperature sensor 108 reads 3 degree high both jumpers are removed. Accordingly, to calibrate the temperature, GETTMP reads ports 1.0 and 1.3 and biases the digital signal representative of the temperature accordingly (lines 744-755).

Referring now to the temperature smoothing function (step 1844), the code for this function is found at lines 755-789 of MAINSUBS. The smoothing process is performed by maintaining an average temperature which is calculated by taking the average of the present temperature, the preceding temperature, and the preceding average.

FIG. 31*a* illustrates the data flow diagram for the task of retrieving keypad 34 entries. This task is performed by the GETKEY 1715 subroutine found at lines 868-959 of MAINSUBS. GETKEY 1715 works in conjunction with the keyboard interrupt (FIG. 25*b*), which, in response to the depression of a key on the thermostat keypad 34, sets a keypad flag (KEY_FG, table 2), sets the timer active flag (TSB5T, table 2) for GETKEY 1715, and stores the keypad row and column in the parameter byte (TSB5PA, table 2) for GETKEY. Upon running, GETKEY determines the row and column number of the depressed key from the parameter byte (step 1846), sets the schedule flag (TSB6S) for CONPMI 1716 (discussed below) in the TSB list, and stores the keypad row and column information in the parameter byte (TSB6PA, table 2) of CONPMI 1716 and in a keystroke buffer (step 1848) (LST_KEY, table 2).

Before storing the current keystroke information in LST_KEY, GETKEY 1715 checks the current keystroke with the keystroke in LST_KEY. If the keystrokes are the same then GETKEY resets its timer count (TSB5TM, table 2) to 8. If the keystrokes are not the same then GETKEY resets its timer count (TSB5TM, table 2) to 16. The purpose of this is to provide a faster reaction time when the same key is depressed consecutively. Accordingly, when the 31.3 ms timer interrupt routine loops through the TSB list every 31.3 milliseconds and decrements the timer count by 1, the timer count will reach 0 and set the schedule flag for GETKEY 1715 in either 0.25 seconds (8*31.3 ms) or 0.5 seconds (16*31.3 ms).

FIG. 32 illustrates the data flow diagram for the task of retrieving keypad entries. This task is performed by the CONPMI 1716 subroutine found at appendix A. As discussed above, this routine is scheduled by the GETKEY 1715 subroutine. CONPMI 1716 operates as a person machine interface for generating the appropriate thermostat 2 action in response to a keypad 34 entry which occurs while the thermostat 2 is operating in a given state.

In general, when CONPMI 1716 runs it performs the following steps:

1. Resets the CONPMI timer count to 1030 (TSB6TM, TSB6RP, table 2) which causes CONPMI 1716 to time out and set its own schedule flag (TSB6PA, table 2) within about 32 seconds (1030*31.3 ms) (lines 84-87);
2. Checks the state byte for the thermostat (STATE, table 2) (line 91);
3. Calls the subroutine associated with the information in the state byte (state 0-7)(lines 95-125);
4. Inserts the code for the thermostat 2 RETURN key 70 in the parameter byte (TSB6PA, table 2) of CONPMI (lines 128-129); and
5. Returns to TSTATSYS (line 130).

Accordingly, every time a key is pressed the preceding 6 steps are performed (steps 1850, 1852). If the 32 second timer of CONPMI times out before another key is pressed, CONPMI runs as if a RETURN key was pressed and the thermostat 2 returns to state 0 as discussed below.

Table 6 below lists the states along with their function and the keys which are valid while the thermostat is in the respective state. Referring to FIG. 2, the keys will be referred to by their row and column numbers (row; cols.) on the keypad 34, wherein the rows are numbered from top to bottom and the columns are numbered from right to left. (See FIG. 20A.)

TABLE 6

| STATE | VALID KEYS | FUNCTION |
|---|---|---|
| STATE0 | 1;6-1<br>2;4-1<br>3;6,4,1 | Normal display state displaying the heat, setting time, and room temperature. This display appears when you are not actively using the keypad. (See FIG. 2.) |
| STATE | 1;6-3,1<br>2;6,5,1<br>3;6-2 | The state in which the weekday and weekend heating and cooling schedules (FIGS. 6 and 7) are manipulated. |
| STATE2 | 1;6,5,3<br>2;6,5<br>3;6-2 | The state in which the weekday and weekend water heating schedules (not shown) are manipulated. (See FIGS. 10C and 11.) |
| STATE3 | 1;6-4<br>2;6,5 | The state in which the weekday and weekend appliance 3;6-2 schedules are manipulated (See FIGS. 12A-12C.) |
| STATE4 | 2;2<br>3;2 | The state in which billing information is displayed. (See FIGS. 13A-13G.) |
| STATE5 | 1;1<br>2;3,1<br>3;2 | The state in which the programmed temperature is overridden. |
| STATE6 | 3;6,5,3,2 | The configuration state is entered from this state. |
| STATE7 | 1;1<br>2;1<br>3;4-2 | The state in which the house code, temperature scale (F.°, C.°) clock (12 hr, |

TABLE 6-continued

| STATE | VALID KEYS | FUNCTION |
|---|---|---|
| | | 24 hr), filter life, and weekend days are modified. |

The operation of CONPMI 1717, while in each of the eight states (STATE 0-7), will be discussed in reference to Tables 7-14.

In STATE0 (lines 142-317) the key row and column numbers are read; the functions associated with the particular key, as shown in table M, are performed; the state byte (STATE) is revised in accordance with the key depressed; the appropriate schedule flag in the TSB list is set; and TSTATSYS is returned to.

TABLE 7

| KEY | TITLE | FUNCTION |
|---|---|---|
| 1;1 | Temp Up | Check the load control bit 2(ST0_LC, table 3), return without changing the state if the load control bit is set; call a subroutine (M20DOFF) to check if the heat-off-cool switch is set to off and return if the switch is off; or call the UPSTPT (lines 207-278 of DISSUBS) subroutine to increase the thermostat display temperature (SETPNT) by one, and set the state byte (STATE) to 5. |
| 1;2 | Cust Ser | Call a subroutine (OPTIM) which resets the CONPMI 1716 timer count to 24 (TSB6TM, table 2) which causes CONPMI 1716 to time out and set its own schedule flag (TSB6PA, table 2) within about .75 seconds (24*31.3 ms) (lines 305-312 of DISSUBS), counts the number of times OPTIM is called while key 1;2 is depressed, set the buzzer bit (ST3_BS, table 2), and causes FMCMSG 1712 to send a message type I (see appendix B page 10) to the controller after 223 counts. |
| 1;3 | Appliance | Set the buzzer bit (ST3_BS, table 2); and call a subroutine (INTAPP) for clearing the display, displaying appliance number 1, setting the flash weekend/weekday bit (ST5_FW), setting the state to 3, and returning. |
| 1;4 | Heat Wat. | Set the buzzer bit (ST3_BS, table 2), clear the display, set the flash weekend/weekday bit (ST5_FW, table 3), enable the "HEAT WATER SETTING" text 1854 on the display, and set the state to 2. |
| 1;5 | Cool | Set the buzzer bit (ST3_BS, table 2), clear the display, set the flash weekend/weekday bit (ST5_FW, table 3), enable the "COOL SETTING" text 1856 on the display, and set the state to 1. |
| 1;6 | Heat | Set the buzzer bit |

TABLE 7-continued

| KEY | TITLE | FUNCTION |
|---|---|---|
| | | (ST3_BS, table 2), clear the display, set the flash weekend/weekday bit (ST5_FW, table 3), enable the "HEAT SETTING" text 1858 on the display, and set the state to 3. |
| 2;1 | Temp Dn | Check the load control bit (ST0_LC, table 2), return without changing the state if the load control bit is set; call the subroutine (MODOFF) to check if the heat-off-cool switch is set to off and return if the switch is off; or call the DNSTPT (lines 207-278 of DISSUBS) subroutine to decrease the thermostat display temperature (SETPNT) by one, and set the state to state 5. |
| 2;2 | Bill Info | Set the buzzer bit (ST3_BS, table 2), clear the screen, cause FMCMSG 1712 to send a message type G to the controller, enable the "BILL INFO" text 1860 on the display, and set the state to 4. |
| 2;3 | Hold | Check the load control bit (ST0_LC, table 2); call MODOFF to check if the heat-off-cool switch is set to off and return if the switch is off; set the buzzer bit (ST3_BS); cause FMCMSG 1712 to send a message type H to the controller; and toggle the temperature hold bit (ST1_TH, table 2) to inform the controller 4 that the thermostat 2 is in the hold mode. |
| 2;4 | Optimizer | Call the subroutine (OPTIM) which resets the CONPMI timer count to 24 (TSB6TM, table 2) which causes CONPMI 1716 to time out and set its own schedule flag (TSB6PA, table 2) within about .75 seconds (24*31.3 ms) (lines 305-312 of DISSUBS), counts the number of times OPTIM is called while key 1;2 is depressed, set the buzzer bit (ST3_BS, table 2), and causes F.MCMSG 1712 to send a message type I (see appendix B page 10) to the controller after 223 counts. |
| 2;5 | Weekend | Not valid. |
| 2;6 | Weekday | Not valid. |
| 3;1 | Ht Wt Now | Set the buzzer bit (ST3_BS, table 2), check the load control bit (ST0_LC, table 2), return without changing the state if the load control bit is set, or toggle the turn on hot water heater bit (ST1_HW, table 2) to turn the hot water heater on or off by scheduling FMCMSG 1712 to send a message type H to the controller. (See appendix B page 10). |
| 3;2 | Return | Turns off the timer active |

TABLE 7-continued

| KEY | TITLE | FUNCTION |
|---|---|---|
| | | bit (TSB6T, table 2) for CONPMI 1716. |
| 3;3 | Right | Not valid. |
| 3;4 | Left | Set the buzzer bit (ST3_BS, table 2), and set the state to state 6. |
| 3;5 | Min | Not valid. |
| 3;6 | Hour | Check the filter flag (ST1_FL, table 2), if ST1-FL is not set then return, if ST1_FL is set then reset ST1_FL after 4 seconds and cause FMCMSG 1712 to send out message I (See appendix B page 10). |

In state 1 (lines 142-317) the weekend and weekday heating and cooling schedules can be manipulated. In state 1, the key row and column numbers are read; the functions associated with the particular key, as shown in table 8, are performed; the state byte (STATE) is revised in accordance with the key depressed; the TSTATSYS is returned to. As discussed above, state 1 is entered in response to the depression of the heat key 1;6 or the cool key 1;5, and the function of the valid keys will be discussed below in reference to state 1 and its substrates 11-61.

Substate 11 refers to the status of state 1, wherein a schedule has not been requested, and the display is flashing heat weekend/weekday to prompt a choice of heating schedules. Substate 21 refers to the status of state 1, wherein PMIBUF is storing the weekday heating schedule such that this schedule can be manipulated with the keypad. Substate 31 refers to the status of state 1, wherein PMIBUF is storing the weekend heating schedule such that this schedule can be manipulated with the keypad. Substate 41 refers to the status of state 1, wherein a schedule has not been requested, and the display is flashing cool weekend/weekday to prompt a choice of cooling schedules. Substate 51 refers to the status of state 1, wherein PMIBUF is storing the weekday cooling schedule such that this schedule can be manipulated with the keypad. Substate 61 refers to the status of state 1, wherein PMIBUF is storing the weekend cooling schedule such that this schedule can be manipulated with the keypad.

TABLE 8

| KEY | TITLE | FUNCTION |
|---|---|---|
| 1;1 | Temp Up | Check the substate; if in substate 11 or 41 then this key is invalid; if the key is valid a subroutine (TEMPUP) is called to set the set the buzzer bit (ST3_BS, table 2), and manipulate the appropriate temperature data as stored in the information buffer (PMIBUF, table 3) to increase the temperature by 1. |
| 1;2 | Cust Ser | Not valid. |
| 1;3 | Appliance | Check the substates; set the buzzer bit (ST3_BS, table 2); calls a subroutine (INTAPP) for clearing the display 32, displaying appliance number 1, setting the |

TABLE 8-continued

| KEY | TITLE | FUNCTION |
|---|---|---|
| | | flash weekend/weekday bit (ST5_FW, table 3), and setting the state to 3. If not in substates 11 or 41, then before calling INTAPP, FMCMSG 1712 is scheduled to send the information in PMIBUF to the controller 4 as message type C. (See appendix B, page 3.) |
| 1;4 | Heat Wat. | Check the substates; set the buzzer bit (ST3_BS, table 2); if not in substate 11 or 41, then FMCMSG 1712 is scheduled to send the information in PMIBUF to the controller 4 as message type C. (See appendix B, page 3.) If in any substate, change to state 2 (substate 12); clear the display 32, enable the "HEAT WATER SETTING" text 1854 on the display, set the flash weekend/weekday bit (ST5_FW, table 3), and return. |
| 1;5 | Cool | Check the substates; if in substates 41, 51 or 61 then the key is invalid; if in the other substates, set the buzzer bit (ST3_BS, table 2), clear the display 32, schedule FMCMSG 1712 to send the information in PMIBUF to the controller 4 as message type C (see appendix B, page 3), change to substate 41, set the flash weekend/weekday bit (ST5_FW, table 3), and enable the "COOL SETTING" text 1856 on the display. |
| 1;6 | Heat | Check the substates; if in substates 11, 21, or 31 then the key is invalid; if in the other substates, set the buzzer bit (ST3_BS, table 2), clear the display 32, schedule FMCMSG 1712 to send the information in PMIBUF to the controller 4 as message type C (see appendix B, page 3), change to substate 41, set the flash weekend/weekday bit (ST5_FW, table 3), and enable the "HEAT SETTING" text 1858 on the display, and set the state to 3. |
| 2;1 | Temp Dn | Check the substate; if in substate 11 or 41 then this key is invalid; if the key is valid a subroutine (TEMPDN) is called to set the buzzer bit (ST3_BS, table 2), and manipulate the appropriate temperature data as stored in the information buffer (PMIBUF, table 3) to decrease the temperature by 1. |
| 2;2 | Bill Info | Not valid. |
| 2;3 | Hold | Not valid. |
| 2;4 | Optimizer | Not valid. |
| 2;5 | Weekend | Set the buzzer bit |

TABLE 8-continued

| KEY | TITLE | FUNCTION |
|---|---|---|
| | | (ST3_BS, table 2); check the substate; if in substate 11 then change the substate to 31 and schedule FMCMSG 1712 to send a request weekend heat schedule message (message type C), clear the flash weekend/weekday bit (ST5_FW, table 3), enable the "WEEKEND" text 1862 on the display 32, and disable the "WEEKDAY" text 1864 on the display 32; if in substate 41 then change the substate to 61 and schedule FMCMSG 1712 to send a request weekend cool schedule message (message type C), clear the flash weekend/weekday bit (ST5 FW, table 3), enable the "WEEKEND" text 1862 on the display 32, and disable the "WEEKDAY" text 1864 on the display 32; if in substate 31 or 61 then a subroutine (NXTPRD) is called to display the next period information in the information buffer (PMIBUF, table 3). (For example, if the morning period information is being displayed while in substate 31 or 61, depressing the weekend key 54 will display day period information.) If in substates 21 or 51, schedule FMCMSG 1712 to send the information in PMIBUF to the controller as message type C, and schedule FMCMSG 1712 to send a request weekend heat or cool schedule message respectively (message type C). |
| 2;6 | Weekday | Set the buzz bit (ST3_BS, table 2); check the substate; if in substate 11 then change the substate to 21 and schedule FMCMSG 1712 to send a request weekday heat schedule message (message type C); clear the flash weekend/weekday bit (ST5_FW, table 3), enable the "WEEKDAY" g text 1864 on the display 32, and disable the "WEEKEND" text 1862 on the display 32; if in substate 41 then change the substate to 51 and schedule FMCMSG 1712 to send a request weekend cool schedule message (message type C), clear the flash weekend/weekday bit (ST5_FW, table 3), enable the "WEEKDAY" text 1864 on the display 32, and disable the "WEEKEND" text 1862 on the display 32; if in substate 21 or 51 then NXTPRD is called to display the next period information in the information buffer (PMIBUF). (For example, if the morning period information is being displayed while in substate 21 or 51, depressing the weekday key 52 will display day period information.) If in substates 31 or 61, schedule FMCMSG 1712 to send the information in PMIBUF to the controller as message type C, and schedule FMCMSG 1712 to send a request weekday heat or cool schedule message respectively (message type C). |
| 3;1 | Ht Wt Now | Not valid. |
| 3;2 | Return | If in substate 11 or 31 then the state is set to 0. If in the other substates then FMCMSG 1712 is scheduled to send the information in PMIBUF to the controller as message type C. |
| 3;3 | Right | Not valid if in substate 11 or 41. In the other substates a subroutine (MRIGHT) is called which set the buzzer bit (ST3_BS, table 2), causes the next information to the right on the display 32 to flash, and points to the data in PMIBUF which is to be modified and is associated with the flashing information. |
| 3;4 | Left | Not valid if in substate 11 or 41. In the other substates a subroutine (MLEFT) is called which sets the buzzer bit (ST3_BS, table 2), causes the next information to the left on the display 32 to flash, and points to the data in PMIBUF which is to be modified and is associated with the flashing information. |
| 3;5 | Min | Check the substate; if in substate 11 or 41 then this key is invalid; if the key is valid, a subroutine (IMINS) is called to set the buzzer bit (ST3_BS, table 2) and manipulate the appropriate time as stored in the information buffer (PMIBUF) to increase the time by one minute. |
| 3;6 | Hour | Check the substate; if in substate 11 or 41 then this key is invalid; if the key is valid, a subroutine (IHOURS) is called to set the buzzer bit (ST3_BS, table 2) and manipulate the appropriate time as stored in the information buffer (PMIBUF) to increase the time by one hour. |

In state 2 (lines 621-796) the weekend and weekday water heater schedules can be manipulated. In state 2, the key row and column are read; the functions associated with the particular key, as shown in the following table, are performed; the state byte (STATE) is revised in accordance with the key depressed; and TSTATSYS is returned to. As discussed above, state 2 is entered in response to the depression of the heat water key 1;4 (44), and the function of the valid keys will be discussed in reference to of state 2 and its substrates 12-32.

Substrate 12 refers to the states of state 2, wherein a schedule has not been requested, and the display 32 is flashing weekend/weekday to prompt a choice of heat water schedules. Substrate 21 refers to the status of state 2, wherein PMIBUF is storing the weekday heat water schedule such that this schedule can be manipulated with the keypad 34. Substrate 31 refers to the status of state 2, wherein PMIBUF stores the weekend heat water schedule such that this schedule can be manipulated with the keypad 34.

TABLE 9

| KEY | TITLE | FUNCTION |
|---|---|---|
| 1;1 | Temp Up | Not valid. |
| 1;2 | Cust Ser | Not valid. |
| 1;3 | Appliance | Check the substates; set the buzzer bit (ST3_BS, table 2); if in substate 12 then INTAPP is called for clearing the display 34, displaying appliance number 1, setting the flash weekend/weekday bit (ST5_FW, table 3), and setting the state to 3; and if not in substate 12 then before calling INTAPP, FMCMSG 1712 is scheduled to send the information in PMIBUF to the controller as message type D. (See appendix B, page 3.) |
| 1;4 | Heat Wat. | Not valid. |
| 1;5 | Cool | Check the substates; schedule FMCMSG 1712 to send the information in PMIBUF to the controller 4 as message type D if not in substate 12; clear the display 32; change to substate 41; set the buzzer bit (ST3_BS); set the flash weekend/weekday bit (ST5_FW); and enable the "COOL SETTING" text 1856 on the display 32. |
| 1;6 | Heat | Check the substates; schedule FMCMSG 1712 to send the information in PMIBUF to the controller 4 as message type D if not in substate 12; clear the display 32; change to substate 11; set the buzzer bit (ST3_BS, table 2); set the flash weekend/weekday bit (ST5_FW, table 3); and enable the "HEAT SETTING" text 1858 on the display 32. |
| 2;1 | Temp Dn | Not valid. |
| 2;2 | Bill Info | Not valid. |
| 2;3 | Hold | Not valid. |
| 2;4 | Optimizer | Not valid. |
| 2;5 | Weekend | Set the buzz bit (ST3_BS, table 2); check the substate; if in substate 12 then change the substate to 32 and schedule FMCMSG 1712 to send a request weekend heat water schedule message (message type D), clear the flash weekend/weekday bit (ST5_FW, table 3), enable the "WEEKEND" text 1862 on the display 32, and disable the "WEEKDAY" text 1864 on the display 32; if in substate 32 then NXTPRD is called to display the next period information in the information buffer (PMIBUF, table 3). (For example, if the morning period information is being displayed while in substate 32, depressing the weekend key 54 will display day period information.) If in substate 22, also schedule FMCMSG 1712 to send the information in PMIBUF to the controller 4 as message type D, and schedule FMCMSG 1712 to send a request weekend heat water schedule message respectively (message type D). |
| 2;6 | Weekday | Set the buzz bit (ST3_BS, table 2); check the substate; if in substate 12 then change the substate to 22 and schedule FMCMSG 1712 to send a request weekday heat water schedule message (message type D), clear the flash weekend/weekday bit (ST5_FW, table 3), enable the "WEEKDAY" text 1864 on the display 32, and disable the "WEEKEND" text 1862 on the display 32; if in substate 22 then NXTPRD is called to display the next period information in the information buffer (PMIBUF). (For example, if the morning period information is being displayed while in substate 22, depressing the weekday key 52 will display day period information.) If in substate 32, also schedule FMCMSG 1712 to send the information in PMIBUF to the controller 4 as message type D, and schedule FMCMSG to send a request weekday heat water schedule message respectively (message type D). |
| 3;1 | Ht Wt Now | Not valid. |
| 3;2 | Return | If in substate 12 then the state is set to 0. If in the other substates (22,32) then FMCMSG 1712 is scheduled to send the |

TABLE 9-continued

| KEY | TITLE | FUNCTION |
|---|---|---|
| | | information in PMIBUF to the controller 4 as message type D. |
| 3;3 | Right | Not valid if in substate 12. In the other substates MRIGHT is called which set the buzzer bit (ST3_BS, table 2), causes the next information to the right on the display 32 to flash, and points to the data in PMIBUF which is to be modified and is associated with the flashing information. |
| 3;4 | Left | Not valid if in substate 12. In the other substates MLEFT is called which sets the buzzer bit (ST3_BS, table 2), causes the next information to the left on the display 32 to flash, and points to the data in PMIBUF which is to be modified and is associated with the flashing information. |
| 3;5 | Min | Check the substate; if in substate 12 then this key is invalid; if the key is valid IMINS is called to set the buzzer bit (ST3_BS, table 2), and manipulate the time as stored in the information buffer (PMIBUF, table 3) to increase the time by one minute. |
| 3;6 | Hour | Check the substate; if in substate 12 then this key is invalid; if the key is valid IHOURS is called to set the buzzer bit (ST3_BS, table 2), and manipulate the time as stored in the information buffer (PMIBUF) to increase the time by one hour. |

In state 3 (lines 797-1003) the weekend and weekday appliance schedules are manipulated. In state 3, the key row and column are read; the functions associated with the particular key, as shown in table 10, are performed; the state byte (STATE) is revised in accordance with the key depressed; and TSTATSYS is returned to. As discussed above, state 3 is entered in response to the depression of the appliance key 1;5 (46), and the function of valid keys will be discussed in reference to state 3 and its substrates 13-33.

Substate 13 refers to the status of state 3, wherein a schedule has not been requested, and the display 32 is flashing weekend/weekday to prompt a choice of appliance schedules. Substate 21 refers to the status of state 2, wherein PMIBUF is storing the weekday appliance schedule such that this schedule can be manipulated with the keypad.

Substate 31 refers to the status of state 2, wherein PMIBUF is storing the weekend appliance schedule such that this schedule can be manipulated with the keypad 34.

TABLE 10

| KEY | TITLE | FUNCTION |
|---|---|---|
| 1;1 | Temp Up | Not valid. |
| 1;2 | Cust Ser | Not valid. |
| 1;3 | Appliance | Set the buzzer bit (ST3_BS, table 2); if in substate 13 then a subroutine (NXTAPP) is called which changes the appliance number (APPNUM), if in substates 23 or 33 then NXTAPP schedules FMCMSG 1712 to send the current appliance information in PMIBUF to the controller (message type E), and send out a request for the next appliance information (message type E). |
| 1;4 | Heat Wat. | Check the substates; set the buzzer bit (ST3_BS, table 2); if not in substate 13, then FMCMSG 1712 is scheduled to send the information in PMIBUF to the controller as message type E. If in any substate, change to state 2 (substate 12); clear the display 32, enable the "HEAT WATER SETTING" text 1854 on the display 32, set the flash weekend/weekday bit (ST5_FW, table 3), and return. |
| 1;5 | Cool | Check the substates; schedule FMCMSG 1712 to send the information in PMIBUF to the controller as message type E if not in substate 13; clear the display 32; change to substate 41; set the buzzer bit (ST3_BS, table 2), set the flash weekend/weekday bit (ST5_FW, table 3); and enable the "COOL SETTING" text 1856 on the display 32. |
| 1;6 | Heat | Check the substates; schedule FMCMSG 1712 to send the information in PMIBUF to the controller as message type E if not in substate 13; clear the display 32; change to substate 11; set the buzzer bit (ST3_BS, table 2), set the flash weekend/weekday bit (ST5_FW, table 3); and enable the "HEAT SETTING" text 1858 on the display 32. |
| 2;1 | Temp Dn | Not valid. |
| 2;2 | Bill Info | Not valid. |
| 2;3 | Hold | Not valid. |
| 2;4 | Optimizer | Not valid. |
| 2;5 | Weekend | Set the buzz bit (ST3_BS, table 2); check the substate; if in substate 13 then change the substate to 33, and schedule FMCMSG 1712 to send a request appliance weekend schedule message (message type E), clear the flash weekend/weekday bit (ST5_FW, table 3), enable the "WEEKEND" text |

TABLE 10-continued

| KEY | TITLE | FUNCTION |
|---|---|---|
| | | 1862 on the display 32, and disable the "WEEKDAY" text 1864 on the display 32; if in substate 33 then NXTPRD is called to display the next period information in the information buffer (PMIBUF). (For example, if the morning period information is being displayed while in substate 33, depressing the weekend key 54 will display day period information.) If in substate 23, schedule FMCMSG 1712 to send the information in PMIBUF to the controller 4 as message type E, and schedule FMCMSG 1712 to send a request weekend appliance schedule message (message type E). |
| 2;6 | Weekday | Set the buzz bit (ST3_BS, table 2); check the substate; if in substate 13 then change the substate to 23, and schedule FMCMSG 1712 to send a request appliance weekday schedule message (message type E), clear the flash weekend/weekday bit (ST5_FW, table 3), enable the "WEEKDAY" text 1864 on the display 32, and disable the "WEEKEND" text 1862 on the display 32; if in substate 23 then NXTPRD is called to display the next period information in the information buffer (PMIBUF). (For example, if the morning period information is being displayed while in substate 23, depressing the weekday key 52 will display day period information.) If in substate 33, schedule FMCMSG 1712 to send the information in PMIBUF to the controller 4 as message type E, and schedule FMCMSG 1712 to send a request weekday appliance schedule message (message type E). |
| 3;1 | Ht Wt Now | Not valid. |
| 3;2 | Return | If in substate 13 then the state is set to 0. If in the other substates (23,33) then FMCMSG 1712 is scheduled to send the information in PMIBUF to the controller as message type E. |
| 3;3 | Right | Not valid if in substate 13. In the other substates MRIGHT is called which set the buzzer bit (ST3_BS, table 2), causes the next information to the right on the display 32 to flash, and points to the data in PMIBUF which is to be modified and is associated with the flashing information. |
| 3;4 | Left | Not valid if in substate 13. In the other substates MLEFT is called which sets the buzzer bit (ST3_BS, table 2), causes the next information to the left on the display 32 to flash, and points to the data in PMIBUF which is to be modified and is associated with the flashing information. |
| 3;5 | Min | Check the substate; if in substate 13 then this key is invalid; if the key is valid IMINS is called to set the buzzer bit (ST3_BS, table 2), and manipulate the time as stored in the information buffer (PMIBUF, table 3) to increase the time by one minute. |
| 3;6 | Hour | Check the substate; if in substate 13 then this key is invalid; if the key is valid IHOURS is called to set the buzzer bit (ST3_BS, table 2), and manipulate the time as stored in the information buffer (PMIBUF, table 3) to increase the time by one hour. |

In state 4 (line 1004–1078) the billing information from the power company can be reviewed. In state 6, the key row and column are read; the functions associated with the particular key, as shown table 11, are performed; the state byte (STATE) is revised in accordance with the key depressed; and TSTATSYS is returned to. As discussed above, state 4 is entered in response to the depression of the bill info key 2;2. The function of valid keys will be discussed in reference to state 4.

TABLE 11

| KEY | TITLE | FUNCTION |
|---|---|---|
| 1;1 | Temp Up | Not valid. |
| 1;2 | Cust Ser | Not valid. |
| 1;3 | Appliance | Set the buzzer bit (ST3_BS, table 2), call INTAPP for clearing the display, displaying appliance number 1, set the flash weekend/weekday bit (ST5_FW, table 3), and set the state to 3. |
| 1;4 | Heat Wat. | Set the buzzer bit (ST3_BS, table 2), change to state 2 (substate 12), clear the display 32, enable the "HEAT WATER SETTING" text 1854 on the display 32, set the flash weekend/weekday bit (ST5_FW, table 3), and return. |
| 1;5 | Cool | Set the buzzer bit (ST3_BS, table 2), change to state 1 (substate 41), clear the display 32, set the flash weekend/weekday bit (ST5_FW, table 3), and enable the "COOL SETTING" |

TABLE 11-continued

| KEY | TITLE | FUNCTION |
|---|---|---|
| | | text 1856 on the display 32. |
| 1;6 | Heat | Set the buzzer bit (ST3_BS, table 2), change to state 1 (substate 11), clear the display 32, set the flash weekend/weekday bit (ST5_FW, table 3), and enable the "HEAT SETTING" text 1858 on the display 32. |
| 2;1 | Temp Dn | Not valid. |
| 2;2 | Bill Info | Set the buzzer bit (ST3_BS, table 2), and call a subroutine (BILLINFO) which displays the next piece (1-7) of billing information from the information buffer (PMIBUF, table 3). |
| 2;3 | Hold | Not valid. |
| 2;4 | Optimizer | Not valid. |
| 2;5 | Weekend | Not valid. |
| 2;6 | Weekday | Not valid. |
| 3;1 | Ht Wt Now | Not valid. |
| 3;2 | Return | Sets the state to 0. |
| 3;3 | Right | Not valid. |
| 3;4 | Left | Not valid. |
| 3;5 | Min | Not valid. |
| 3;6 | Hour | Not valid. |

In state 5 (lines 1079–1143) the heating and cooling schedules can be overridden. In state 5, the key row and column are read; the functions associated with the particular key, as shown in table 12, are performed; the state byte (STATE) is revised in accordance with the key depressed; and TSTATSYS is returned to. As discussed above, state 5 is entered in response to the depression of the temperature up 74 or temperature down keys 76 (1;1, 2;1). The function of valid keys will be discussed in reference to state 5.

TABLE 12

| KEY | TITLE | FUNCTION |
|---|---|---|
| 1;1 | Temp Up | Call the UPSTPT (lines 207-278 of DISSUBS) subroutine to increase the thermostat 2 display temperature (SETPNT) by one. |
| 1;2 | Cust Ser | Not valid. |
| 1;3 | Appliance | Not valid. |
| 1;4 | Heat Wat. | Not valid. |
| 1;5 | Cool | Not valid |
| 1;6 | Heat | Not valid. |
| 2;1 | Temp Dn | Call the DNSTPT (lines 207-278 of DISSUBS) subroutine to decrease the thermostat 2 display temperature (SETPNT) by one. |
| 2;2 | Bill Info | Not valid. |
| 2;3 | Hold | Reset the state to 0; check the load control bit (ST0_LC, table 2), if set return; if the load control bit is not set, call MODOFF to check if the heat-off-cool switch is set to off and return if the switch is off; schedule FMCMSG 1712 to send a message type H to the controller 4; and toggle the temperature hold bit (ST1_TH, table 2) to inform the controller |

TABLE 12-continued

| KEY | TITLE | FUNCTION |
|---|---|---|
| | | 4 that the thermostat 2 is in the hold mode. |
| 2;4 | Optimizer | Not valid. |
| 2;5 | Weekend | Not valid. |
| 2;6 | Weekday | Not valid. |
| 3;1 | Ht Wt Now | Not valid. |
| 3;2 | Return | Not va id. |
| 3;3 | Right | Not valid. |
| 3;4 | Left | Not valid. |
| 3;5 | Min | Not valid. |
| 3;6 | Hour | Not valid. |

In state 6 (lines 1144–1206), a series of keystrokes is checked such that if the appropriate series of keystrokes is depressed, state 7 is entered. In state 6, the key row and column are read; the functions associated with the particular key, as shown in table 13, are performed; the state byte (STATE) is revised in accordance with the key depressed; and TSTATSYS is returned to. As discussed above, state 6 is entered in response to the depression of the move left key 64 (3;4). The function of valid keys will be discussed in reference to state 6 and its substrates 06–36. Keys 1;1–2;6 are invalid.

Substate 06 is the first substate of state 6, and the key 3;6 must be depressed if the series of keystrokes is to remain valid. Substate 16 is entered due to the depression of key 3;6, and key 3;3 must be depressed in this substate if the series of keystrokes is to remain valid. Substate 26 is entered due to the depression of key 3;3, and key 3;5 must be depressed in this substate if the series of keystrokes is to remain valid. Substate 36 is entered due to the depression of key 3;5, and key 3;2 must be depressed in this substate to enter state 7.

TABLE 13

| KEY | TITLE | FUNCTION |
|---|---|---|
| 3;2 | Return | Check the substate; the return key 70 is valid only in substate 36; and if in substate 36, clear the display 32, schedule FMCMSG 1712 to send a request configuration data (message type F) to the controller 4, and change the state to state 7. |
| 3;3 | Right | Check the substate; the move right key 66 is valid only in substate 16; and if valid, set the buzzer bit (ST3_BS, table 2), and change to substate 26. |
| 3;4 | Left | Not valid. |
| 3;5 | Min | Check the substate; the minute key 62 is valid only in substate 26; and if valid, set the buzzer bit (ST3_BS, table 2), and change to substate 36. |
| 3;6 | Hour | Check the substate; the hour key 60 is valid only in substate 06; and if valid, set the buzzer bit (ST3_BS, table 2), and change to substate 16. |

While in state 6, if any key is determined invalid, the state is reset to 0. The effect of this is to require the proper keystroke sequence to enter state 7 i.e. move left key 64, hour 60 key, move right key 66, minute key 62 and return key 70.

In state 7 (lines 1207-1295) the configuration data for the HOUSE CODE, FAHRENHEIT OR CELSIUS, CLOCK, FILTER, AND WEEKEND can be modified. In state 7, the key row and column are read; the functions associated with the particular key, as shown in table 14, are performed; the state byte (STATE) is revised in accordance with the key depressed; and TSTATSYS is returned to. As discussed above, state 7 is entered in response to the depression of the proper series of key strokes. The function of valid keys will be discussed in reference to state 7. Keys 1;2-1;6, 2;2-3;1, 3;5 and 3;6 are invalid.

TABLE 14

| KEY | TITLE | FUNCTION |
|---|---|---|
| 1;1 | Temp Up | Set the buzzer bit (ST3_BS, table 2); and call a subroutine (UPCON) to increment the configuration choice stored in the information buffer (PMIBUF). |
| 2;1 | Temp Dn | Set the buzzer bit (ST3_BS, table 2); and call a subroutine (DNCON) to decrement the configuration choice stored in the information buffer (PMIBUF). |
| 3;2 | Return | Schedules FMCMSG 1712 to send the information in PMIBUF to the controller 4 (message type F), clears the display 32, changes the state to state 0, and schedules the self test routine (SLFTST) 1718 if the configuration jumper (W1) of the thermostat 2 is enabled. |
| 3;3 | Right | Set the buzzer bit (ST3_BS, table 2), and increments the pointer to PMIBUF which points to the next configuration data, and calls a subroutine (CONFIG) to display the configuration data pointed to and the associated name of the data. (For an example see FIG. 18.) |
| 3;4 | Left | Set the buzzer bit (ST3_BS, table 2), and decrements the pointer to PMIBUF which points to the next configuration data, and calls a subroutine (CONFIG) to display the configuration data pointed to and the associated name of the data. (For an example see FIG. 18.) |

As discussed above, CONPMI 1716 references the MOPOFF, OPTIM, INTAPP, DNSTPT, TEMPUP, INTAPP, TEMPON, NXTPRD, MRIGHT, MLET, IMINS, IHOURS, NXTAPP, BILLINFO, UPSTPT, UPCON, DNCON, and CONFIG subroutines by their name and function. The code for these subroutines is found at Appendix A. (Lines 1-1645 of DISSUBS-.ASM.)

FIG. 33 illustrates the data flow diagram for a task dedicated to providing data to the display 32 and the LEDs 84, 86. OUTDIS 1717 is the subroutine which is dedicated to this task, and is found at appendix A. It should be understood that OUTDIS is not the only routine which outputs data to the display 32 and the LEDs 84, 86. For example, as discussed above, the subroutine CONFIG displays configuration date when the right key (3;3) is depressed in state 7.

OUTDIS 1717 operates in response to the timing out of its timer count (TSB7PA, TSB7TM, table 2). Upon initialization, the timer count (TSB7PA, TSB7TM, table 2) is set to 511, and the timer active flag (TSB7T, table 2) is set. Subsequent to initialization, OUTDIS resets its timer count (TSB7TM, table 2) to 4 every time it runs. Accordingly, the schedule flag (TSB7S, table 2) for OUTDIS 1717 is set approximately 16 (511*31.3 ms timer interrupt) seconds after initialization, and every 0.125 (4*31.3 ms timer interrupt) seconds thereafter.

When OUTDIS 1717 runs upon initialization, it updates the display memory to turn on all segments of the display 32, clears the display memory (the last 16 bytes of memory bank 2), and updates the display memory such that the displayed information corresponds to state 0. Referring to FIG. 2, this is the format of the display 32 which occurs upon the running of OUTDIS 1717 at initialization. This format includes the setpoint temperature, the HEAT or COOL SETTING text 1858, 1856, the WEEKEND or WEEKDAY text 1862, 1864, the time of day, the price tier, and the temperature at the thermostat 2. The data which OUTDIS 1717 reads to set the display 32 will be discussed below with reference to the particular state of TSTATSYS is running in when OUTDIS 1717 is scheduled.

Referring again to FIG. 3, OUTDIS 1717 runs every 0.125 second to update the display 32 (step 1866). OUTDIS 1717 checks the state (0-7), reads the data associated with the particular state, and analyzes the data type (step 1864) which includes the display position of the information, and the information type (BCD or ASCII). Upon reading BCD information and its location, OUTDIS 1717 converts this information into segment data using a BCD segment table (step 1868). This segment data is transferred to the display memory array such that the display memory is updated (step 1870) and the information on the display 32 is updated.

For example, in state 0, when OUTDIS 1717 runs it reads the setpoint temperature stored at SETPNT (1 byte). SETPNT includes the BCD value of the setpoint temperature and the location for this information on the display 32. OUTDIS 1717 determines the display segments needed to display the temperature, (step 1868) and updates the display memory (step 1870) such that the display segments, as determined from the BCD segment table, are turned on.

Upon reading ASCII information, OUTDIS 1717 determines the text segment which is to be enabled using an ASCII segment table (step 1872). For example, when OUTDIS 1717 runs during a weekend in state 0, it reads the weekend bit (STO_WE). For an enabled weekend bit, OUTDIS 1717 updates the display memory (step 1874) such that the text segment WEEKEND is enabled on the display 32. For a disabled weekend bit, OUTDIS 1717 updates the display memory such that the text segment WEEKDAY is enabled on display 32.

Referring again to the general operation of OUTDIS 1717, OUTDIS 1717 updates the display every 0.125 seconds when TSTATSYS is in states 0, 5 and 5, and substrates 11, 21, 31, 41, 51, 61, 12, 22, 32, 13, 23 and 33. The data read by OUTDIS 1717 to update the display memory in each of the states and substrates is shown in the following table.

TABLE 15

| DATA READ BY OUTDIS FOR STATES 0, 5, AND 6 | SIZE | CODE |
|---|---|---|
| 1. State of CONPMI (0-7) | 1 byte | STATE |
| 2. Status (0) of the: | 4 bits | |
| Weekend bit, LCD | | STO_WE |
| Load control bit, LCD | | STO_LC |
| Peak period pending bit, flash LCD | | STO_PP |
| Emergency heat, LED | | STO_EH |
| 3. Status (1) of the: | 4 bits | |
| Temperature hold on, LCD | | ST1_TH |
| Heat water on, LCD | | ST1_HW |
| Price tiers (0 = 4, 1 = 3) | | ST1_PT |
| Filter element on, LCD | | ST1_FL |
| 4. Status (2) of the: | 4 bits | |
| Current tier (low, medium, high, peak) | 2 bits | ST2_RH<br>ST2_RL |
| Current time period (morn, day, eve, night) | 2 bits | ST2_CH |
| 5. Status (3) of the: | 4 bits | |
| Beep switch | | ST3_BC |
| Clock (1 = 12 hour, 0 = 24 hour) | | ST3_CL |
| Temperature format (1 = C.°, 0 = F.°) | | ST3_C |
| Single beep | | ST3_BS |
| 6. Status (4) of the: | 4 bits | |
| ACK PENDING flag for ANACOM and FMCMSG | | ST4_AP<br>ST4_AP |
| Billing information (0 = 7 schedules, 1 = 3 schedules) | | ST4_BI |
| Flash temperature flag (temperature error) | | ST4_FT |
| Flash time flag (time error) | | ST4_FC |
| 7. Switch settings for the: | 4 bits | |
| Heat switch | | SW1_HT |
| Cool switch | | SW_CL |
| Automatic fan switch | | SW1_FA |
| Emergency heat switch | | SW1_EH |
| 8. Hours portion of the time | 1 byte | TIMEHR |
| 9. Minutes portion of the time | 1 byte | TIMEMIN |
| 10. Previously read temperature | 1 byte | OLDTMP |
| 11. Setpoint temperature for the thermostat display | 1 byte | SETPNT |
| 12. Setpoint temperature received from the controller | 1 byte | CNTSET |
| 13. Sensed temperature stored in Centigrade | 1 byte | CTEMP |
| 14. Sensed temperature stored in Fahrenheit | 1 byte | FTEMP |

TABLE 16

| DATA READ BY OUTDIS FOR STATES 11, 41, 12, 13, AND 14 | SIZE | CODE |
|---|---|---|
| 1. Status (5) of the Flash Weekday/Weekend bit | 1 bit | ST5_FW |

TABLE 17

| DATA READ BY OUTDIS FOR STATES 21, 31, 51, 61, 22, 32, 23, AND 33 | SIZE | CODE |
|---|---|---|
| 1. Flash first digit | 1 byte | FLASH1 |
| 2. Flash second digit | 1 byte | FLASH2 |
| 3. Reset first digit | 1 byte | REST1 |
| 4. Reset second digit | 1 byte | REST2 |

TABLE 18

| DATA READ BY OUTDIS TO FLASH THE COLON IN THE TIME OF DAY (Step 1876) | SIZE | CODE |
|---|---|---|
| 1. Flash colon | 4 bits | LC_CNT |

FIG. 34 illustrates the data flow diagram for an initialization an self-test task. In the preferred embodiment of the invention, SLPTST 1718 is the subroutine which is dedicated to this task, and is found at lines 960–1350 of MAINSUBS.

SLPTST 1718 operates in response to the timing out of its timer count (TSB8PA, table 2) is set. Accordingly, the schedule flag (TSB7S, table 2) for SLFTST 1718 is set approximately 10.5 (335*31.3 ms) timer interrupt) seconds after initialization.

Upon running, SLFTST 1718 checks both of the 128 byte memory blocks (step 1878) and set each block of memory to 0 for purposes of initialization. The memory is checked using and alternating 1's and s check on each page of memory. This provides a non-destructive memory test so that reinitialization is not needed after the selftest is done. Upon encountering bad memory, SLFTST 1718 flashes the display 32.

SLFTST 1718 also tests the display segments of the display 32 and the LEDs 84, 86, by turning on the segments and LEDs (step 1880).

Subsequent to testing the memory and display elements, SLFTST 1718 initializest he system variables (step 1882), clears its schedule flag (TSB8S, table 2), clears its timer active flag (TSB8T, table 2), and sends a start-up message to the controller 4 by scheduling FMCMSG 1712. The start-up message is a message type B, thus SLFTST 1718 set the parameter byte (TSB2PA, table 2) of FMCMSG 1712 according to the scheme disclosed at appendix B.

Controller Program

The preferred embodiment of the program for controlling the controller 4 will be described with reference to FIGS. 36–73, and the message formats in appendix B. The controller program is stored within the controller 4 on a read only memory (ROM) 224, and, accordingly, will be referred to as the firmware. The controller is used in conjunction with the thermostat 2, the BRICK 10, X10 devices, the telephone interface with the power company 22, and the power company meter (meter) 20. The controller firmware renders the controller operable with the devices such that the following functions are performed:

1. Monitoring the temperature at the thermostat such that a desired setpoint temperature is maintained.
2. Controlling the heating and cooling system (HVAC).
3. Communicating with other devices via the power line carrier (PLC) over the personal area network (PAN).
4. Controlling up to 8 X-10 (BSR) devices in accordance with their respective schedules.
5. Communicating with the power company via the telephone interface and the meter for purposes of sending and receiving data to and from the power company.

The preferred embodiment of the code for the main controller firmware is written in PLM/51, and the interrupt vector routine is written in assembly language. The preferred embodiment of the code is listed in appendix D.

Turning now to the structure of the controller firmware, the firmware consists of seven primary modules. These modules are: MAINLP, CONTRL, BRICK, TSTAT, BILALG, INTERR, and MISC. With the exception of MISC, these modules contain submodules which will be discussed in combination with the associated primary module.

The MAINLP module of the firmware includes the following submodules: RLTIME (real time and date) and MNLOOP (initialization and the main operating system).

In general, the function of RLTIME is to maintain the current time, date, and day-of-the-week. RLTIME also controls the different timers used in other modules. While power is applied to the controller, MNLOOP calls RLTIME every second to maintain the current time and date.

The N/S diagram for RLTIME is illustrated in FIGS. 36A-36G. Typically, RLTIME runs to increment (step 400) the RLTIME second counter by 1 to 60, increment the BRICK sanity counter by 1 to 2 every second (step 402), decrement the designated subroutine counters by 1 every second (steps 402-412), call the adjust units subroutine (FIG. 67) to increment the minute counter by 1 to 60 (step 413) and decrement the designated subroutine counters by 1 every 60 second (steps 414-428), call the adjust units subroutine (FIG. 67) to increment the hour counter by 1 to 24 every 60 minutes (step 430), increment the day counter by 1 every 24 hours (step 432), increment the month counter by 1 every month period (28-31 days) (step 436), and increment the year counter by 1 every year period (365-366 days)(step 438). When one of the counters reaches 0, RLTIME sets the corresponding flag (steps 440-466).

The fast clock flag is set when the controller 14 requests the time from the power company (meter 20') via the BRICK 10, and the controller time is less than the power company time by more than 2 minutes. When the fast clock flag is set, RLTIME loads 60 seconds into the seconds counter (step 468), checks the second counter against 60 seconds (step 470), and ignores the active counters incremented or decrimented in steps 400, 402, 404, 406, 408, 410, and 412. When the controller time is greater than the power company time, the controller time is updated with the power company time and the fast clock flag is left disable. The purpose of this is to continue incrementing or decrementing the counters manipulated in steps 400, 402, 404, 406, 408, 410, and 412 when the controller is behind time, and ignore the counters when the controller is ahead of time.

MNLOOP contains the routine for initializing the controller upon power-up, the routine for testing the controller RAM upon power-up, and the operating system for the controller 14. The N/S diagrams for these routines are illustrated in FIGS. 37, 38, 39, 39A and 40.

FIG. 40 is a dataflow diagram which represents the flow of data between the main routines of the controller firmware. The main operating loop (MNLOOP) schedules the TSTAT (decode TSTAT messages) routine (step 3906), the BRICK (decode BRICK messages, build brick messages) routine (step 3908, 3910), the BILALG (billing algorithm) routine (step 3912), and the RLTIME (real time maintenance) routine (step 3914). Prior to running the operating system (MNLOOP, step 3916), the system is initalized (step 3902) and the controller RAM 226 is tested (step 3904). The line numbers of the firmware listing in Appendix D which correspond to the steps are as follows:

TABLE 19

| Step | Line Nos. |
|---|---|
| 3902 | 1094-1279 |
| 3904 | 1067-1093 |
| 3906 | 1305-1312 |
| 3908 | 1313-1344 |
| 3910 | 1401-1443 |
| 3912 | 1447-1449 |
| 3914 | 835-1066 |
| 3916 | 1280-1454 |

When power is applied to the controller, all interrupts are disabled (step 472) and all flags are cleared (step 474). Initial parameters are loaded (step 476), and the following steps occur based on the outcome of the checksum for the external RAM 226 (steps 478-479) and the EEPROM 228 (steps 480-481):

TABLE 20

| EXTERNAL RAM | EEPROM | ACTION |
|---|---|---|
| GOOD | GOOD | Memory is not altered (step 490). |
| GOOD | BAD | EEPROM is loaded with parameters from external RAM (step 484). |
| BAD | GOOD | External RAM is tested (RAMTEST) and RAM is loaded with parameters from EEPROM (step 488). |
| BAD | BAD | External RAM is tested (step 487) (ram test) and default parameters are loaded into external RAM and EEPROM (step 486). |

FIG. 38 illustrates the N/S diagram for the RAM test subroutine. This test is performed by loading RAM 226 with 4 different patterns (AA, 55, FF, 00) (steps 496-502) and comparing one-half of the RAM with the other half of the RAM (steps 504-510).

Subsequently, parameters required for entering the operating system are loaded, and a group of subroutines (steps 489, 491, 492, 494) are called before entering the operating system. The subroutines update the tier data in RAM (step 489); checks to determine whether the day is a weekday or a week end, whether it is night or day, and whether the mode is the heating or cooling mode (step 491); determine whether operation is presently in a critical tier or the next hour of operation will be in a critical tier (step 492); and determines whether or not the power company is requiring load control (step 494). (See FIGS. 44, 51, 74, 76.)

The operating system of the controller includes a main loop which continually reads selected flags which are associated with the operation of the controller. Although the flags are tested in a loop, the flags are assigned a priority due to the structure of the code.

FIGS. 39A-39D illustrate the N/S diagram for the main operating loop routine. The highest priority flags tested during the loop are associated with the reception of messages from the thermostat (TSTAT) (steps 512-514) and from the BRICK (steps 516-518). The next level priority flags tested and their corresponding functions are as follows: a "second" flag (step 520) which calls for a time and date update (calls the real time routine, step 522), a timer flag (step 524) to indicate that there has been no thermostat communications within 5 minutes, a flag (step 526) to allow a byte to be written into EEPROM (step 532), a flag (step 528) to schedule HVAC optimization (step 534), a flag (step 530) to schedule water heater optimization (step 536), and a flag (step 538) to check BRICK sanity.

The lowest priority flags tested pertain to the transmission of BRICK messages. The first flag tested is the waiting flag (step 540) which provides a delay time in which a reply message from the BRICK can be accepted. The second flag tested is the ready to transmit flag (step 542) which allows retransmission to begin. The ready to transmit flag is tested if the waiting flag is set. The third flag tested is the flag associated with monitoring the main data timer (step 544) for data sessions. The fourth flag (step 546) tested is associated with a request for tier data. The fifth flag tested (step 548) is associated with the a request for the daily data. The final flag tested (step 550) is associated with the billing algorithm. When final flag is set by a message from the power company via the BRICK, the billing subroutine is called (step 552).

FIGS. 41A–41N illustrate the N/S diagrams for the billing subroutine (BILAG) and thirteen associated step subroutines.

BILAG is the primary module which accesses the submodules which perform billing data calculations required to display the billing data on the thermostat display. These submodules are called by the step subroutines, and are: TEST$FOR$ZERO, MODIFY$FOR$DISPLAY, ADD$TO$TOTAL, SUBTRACTION, MULTIPLICATION, DIVISION, and STEP$ONE through STEP$THIRTEEN. FIGS. 42A–42F are the N/S diagrams for the submodules.

Referring to FIG. 41A, the billing algorithm begins by clearing a group of memory locations used for calculations (steps 568–570). Subsequently, the thermostat billing display data array residing in the controller RAM 226 is cleared (step 571), the setup buffer which buffers billing data converted from BCD to base 100 is cleared (step 572), and the step counter is set to 1 (step 574). The step counter operates to point to one of the call statements for each of the thirteen step subroutines used to manipulate the billing data, and is incremented by 1 by each of the first twelve step subroutine and cleared by step subroutine thirteen.

Referring to FIG. 41B, the step one subroutine (STEP$ONE) converts part of the pricing data from BCD format to binary format using the convert BCD to BIN subroutine (step 576). (See FIG. 69)

Referring to FIG. 41C, the step two subroutine (STEP$TWO) performs the conversion of the remaining pricing data from BCD format to binary format using the convert BCD to BIN subroutine (step 578). (See FIG. 69).

Referring to FIG. 41D, the step three subroutine (STEP$THREE) performs the conversion of the accumulated monthly tier usage data (KWH) and the current day tier usage data from BCD format to binary format using the convert BCD to BIN subroutine (steps 580, 582). (See FIG. 69). Subsequently, the current day tier usage data is subtracted from the accumulated monthly tier usage data using the subtraction subroutine discussed below (steps 584–585).

Referring to FIG. 41E, the step four subroutine (STEP$FOUR) adjusts the individual energy cost ($/KWH) for each tier (low, medium, high, critical) by adding the tier energy cost ($/KWH) to a power company determined fuel cost ($/KWH) using the add to total subroutine discussed below (step 586–587).

Referring to FIG. 41F, the step five subroutine (STEP$FIVE) reads the adjusted energy cost ($/KWH) for each tier (step 588), reads the amount of energy (KWH) used in each tier between the last billing date and the current date (step 590), and calculates the total cost for each tier (adjusted cost for the tier×tier usage) between the last billing date and the current date (usage period) (step 592). The multiplication portion of this calculation is performed by the multiplication for each of the four tiers (low, medium, high, critical). (The multiplication process is discussed below.)

Referring to FIG. 41G, the step six subroutine (STEP$SIX) calculates the total tier usage cost ($) for the usage period by adding each of the total costs ($) for each tier using the add to total subroutine (step 593–594), and multiplying the total tier usage cost by KWH constant established by the power company (steps 595–596). Depending upon the status of the display 32, either the display 32 can be cleared (step 597) or the total tier usage cost can be displayed by calling the modify for display subroutine (step 598) discussed below.

Referring to FIG. 41H, the step seven subroutine (STEP$SEVEN) calculates the total tier usage (KWH) for the usage period by calling the add to total subroutine to add all of the individual tier usages (KWH) for the usage period (steps 599–600).

Referring to FIG. 41I, the step eight subroutine (STEP$EIGHT) updates six standard rate prices based upon energy usage by calling the add to total subroutine to add a fuel cost to each of these six standard rate prices (steps 602–604). The addition function is performed by calling the add to total subroutine.

Referring to FIG. 41J, the total tier usage (KWH) from step seven is read and the total tier usage is broken up into 1–6 usage portions (KWH) as determined from the power company (steps 606–608). This step (STEP$NINE) calls the subtraction routine (FIG. 42D) which subtracts each usage portion from the total tier usage until the remaining total tier usage is less than the next usage portion. For example, if the total tier usage is 1100 KWH, and the power company has set each usage portion at 200 KWH the first five usage portions with be 200 KWH and the sixth usage portion will be the remainder, or 100 KWH. Subsequently, in step ten, one of the six updated standard usage prices from step eight is applied to the associated usage portions.

Referring to FIG. 41K, the step ten subroutine (STEP$TEN) calls the multiplication subroutine (FIG. 42E) to multiply each of the usage portions (KWH) from step nine with the associated updated standard usage price from step eight, and stores each of the products (steps 610–612). The rate counter (1–6) is set in step nine (Step 608) based upon the number of usage portions are present. The routine of step ten loops until the rate counter is decremented to 0.

Referring to FIG. 41L, the step eleven subroutine (STEP$ELEVEN) calls the add subroutine to add the products from step ten (1–6) (steps 614–616), calls the multiplication subroutine to multiply the total of the products by a power company adjustment factor (steps 618–620), and causes this product to be displayed if the power company enables the display for this information (steps 622–624). If the product is displayed, the modify display subroutine (See FIG. 75) is called to provide a decimal point and disable leading zeros (step 617).

Referring to FIG. 41M, the step twelve subroutine (STEP$TWELVE) calculates the forecasted bill for the current billing period. The first step of this task is to convert month to days and the convert BCD to BIN subroutine (FIG. 69), which returns a day number for last day of the last billing period (1-364) in binary form (step 626). The next step of this task is to again convert month to days and the convert BCD to BIN subroutine (FIG. 69), which returns a day number for the current day in the current billing period (1-365) in binary form (step 627). Subsequently, the difference between the current day of the current billing period and the last day of the last billing period is determined (step 628). If this difference is less that 7, the step twelve subroutine is ended. When the difference is 7 or greater, the average energy cost for the first 7 days is calculated by calling the division subroutine (FIG. 42F) and dividing the total tier usage cost to date from step six by the difference. Next, the total number of days in the billing period is determined and the multiplication subroutine is called to multiply the total number of days by the average energy cost per day (steps 628-630).

The estimated period bill is displayed if the power company enables the display for this information (steps 632-634). If the product is displayed, the modify display subroutine (FIG. 75) is called to provide a decimal point and disable leading zeros.

Referring to FIG. 41N, the step thirteen subroutine (STEP$THIRTEEN) modifies the tier usage data so that it is in the proper format for the thermostat display. Since eight digits of information are available for the display and the digits are stored in the form of binary coded decimal, a total of 4 bytes (4 bits for each digit) are required for billing information data. Furthermore, while 4 bytes are used for the billing information data, it is often the case that some of the digits are leading 0s. Accordingly, step thirteen checks to see if the power company has disabled the display of the low tier KWH usage, medium tier KWH usage, high tier KWH usage, and/or the critical tier KWH usage. If a display is disabled, a FFH is inserted in the least significant byte of the appropriate 4 byte billing information data (steps 636-638). The FFH informs the thermostat that no data should be displayed. If the display is not disabled for a tier KWH usage, test for zeros subroutine (FIG. 42A) is called to eliminate leading 0's in the in the billing information data before the data is displayed (640-642).

FIGS. 42A-42F illustrates the N/S diagrams for a group of subroutines used in steps one-thirteen.

Figure 42A:
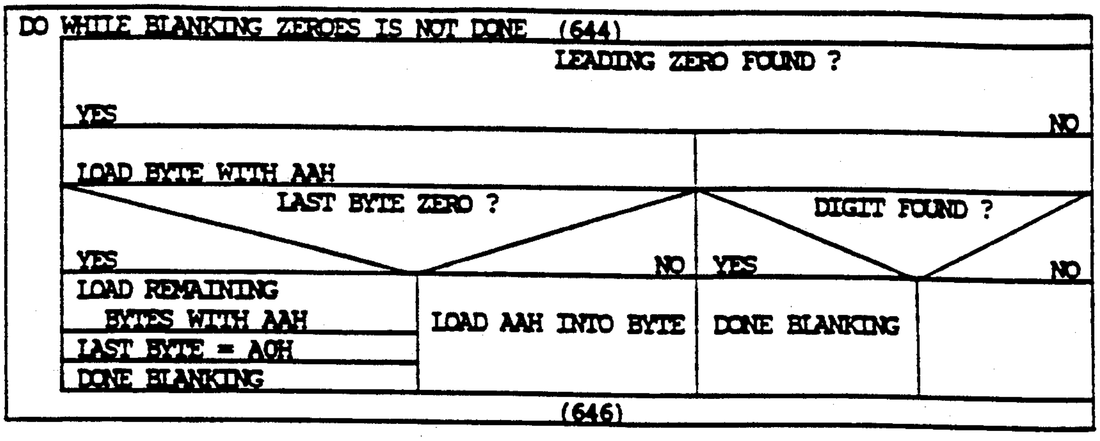

The test for zero subroutine (TEST$FOR$ZERO) illustrated in FIG. 42A, tests BCD data for, and eliminates, leading 0s. The 0s are eliminated by inserting an AH into the corresponding 4 bit portion of the byte in which the leading 0 is found (644-646). An AH is interpreted by the thermostat such that the segments on the thermostat display associated with the digit are not enabled.

Figure 42B:
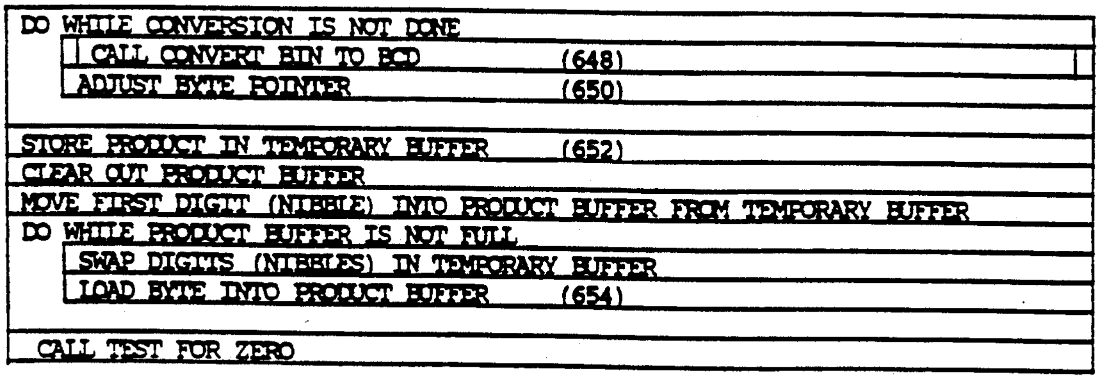

The modify for display routine (MODIFY$FOR$DISPLAY) illustrated in FIG. 42B, calls the convert BIN to BCD subroutine (FIG. 68) to convert data from 1 byte of binary to 2 four bit binary representations of 2 decimal numbers (steps 648-650). Furthermore, this routine provides for a 4 bit shift of information so that a digit can be shifted right by one digit on the display (steps 652-654).

Figure 42C:
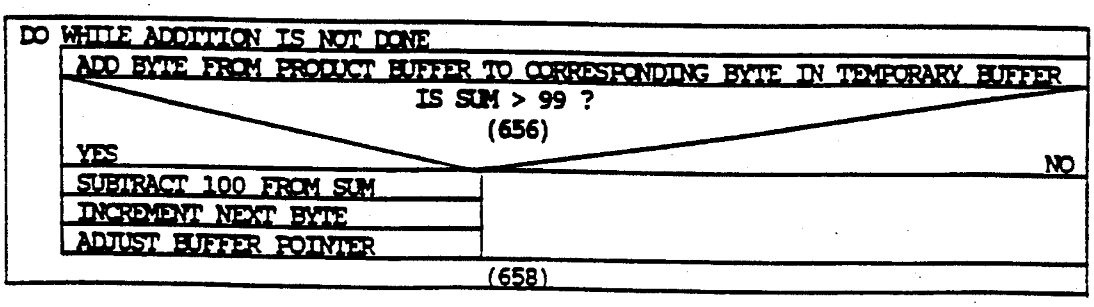

The add to total subroutine (ADD$TO$TOTAL) illustrated in FIG. 42C, performs addition wherein each byte representing the total has a value from 0-99 (steps 656-658). (Base 100 addition.)

Figure 42D:
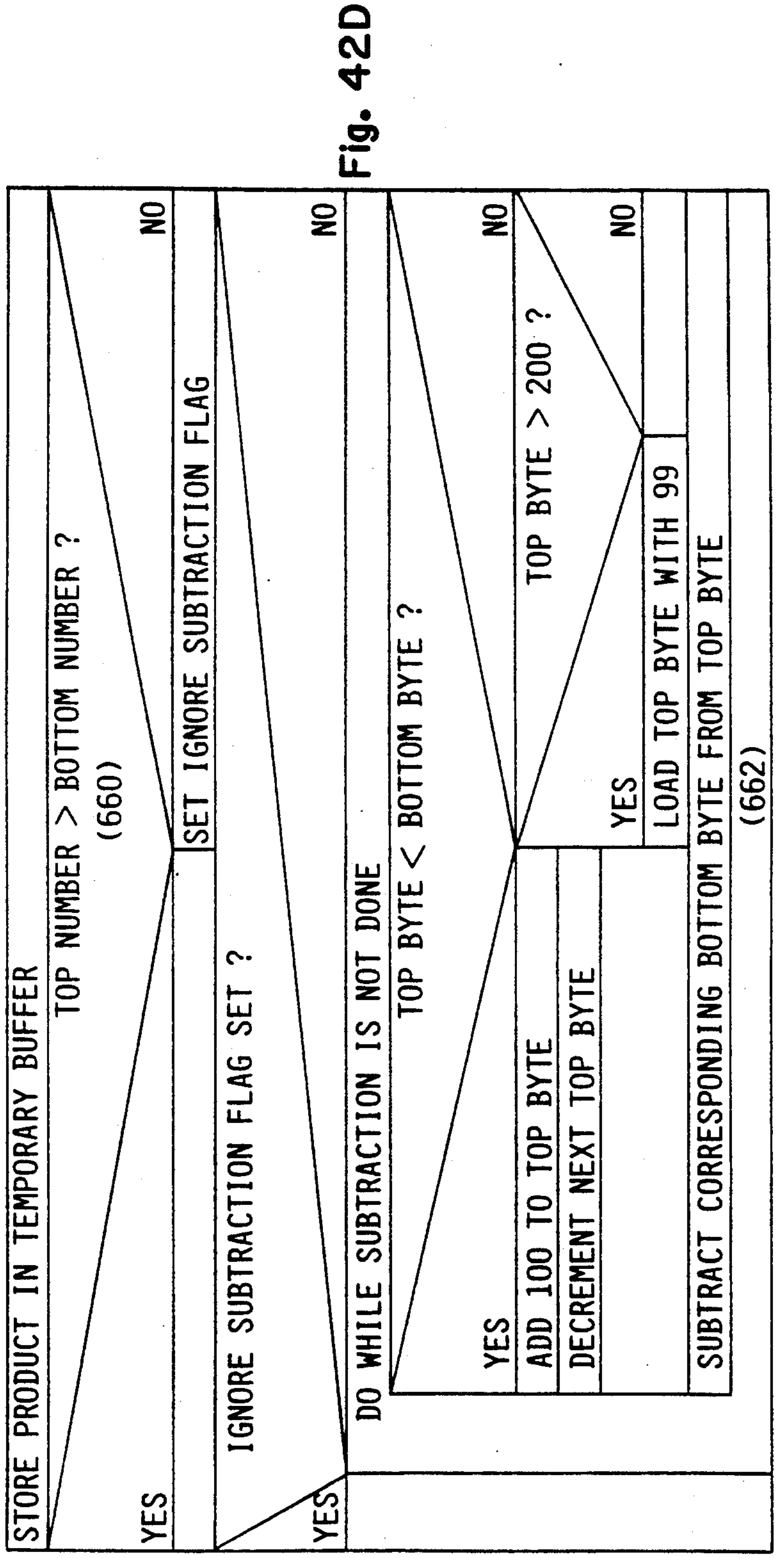

The subtraction subroutine (SUBTRACTION) illustrated in FIG. 42D, checks to ensure that a smaller BCD number is being subtracted from a larger BCD number, and subtracts the numbers while maintaining base 100 (steps 660-662).

Figure 42E:
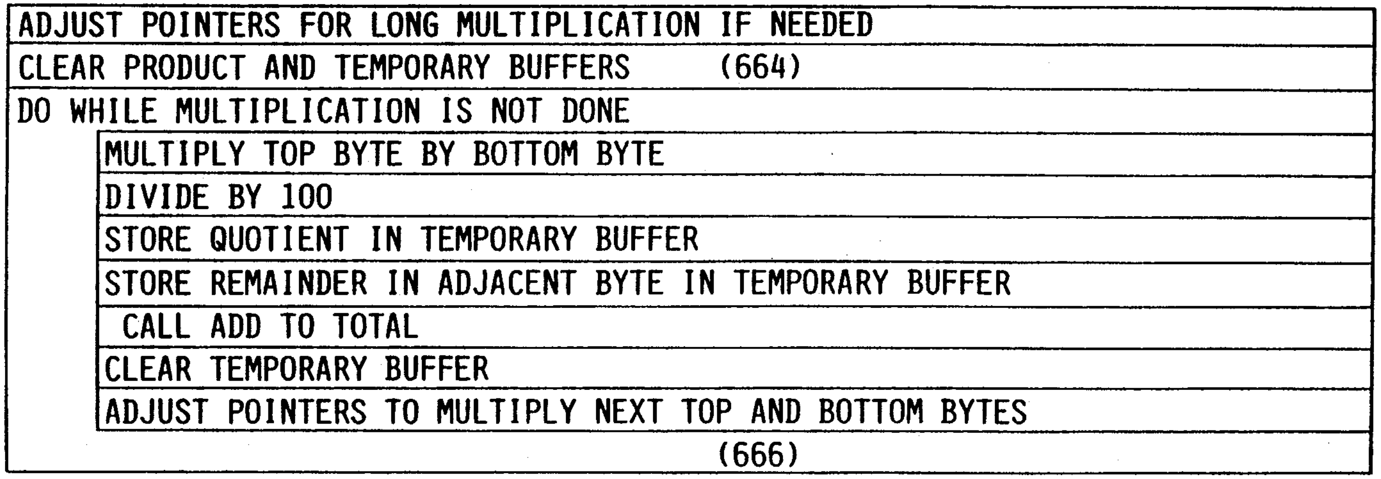

The multiplication subroutine (MULTIPLICATION) illustrated in FIG. 42E performs the multiplication of the byte(s) of a pair of numbers in hexadecimal coded base 100 form. (For example, 0BH,4CH representing a hexadecimal coded base 100 number would convert to 1176 decimal (11*100+76*1).) Before the resulting word(s) from the multiplication are added to arrive at the product, the words are converted back to hexadecimal coded base 100 form. The reason that the words must be converted back to hexadecimal coded base 100 is that the multiplication of two hexadecimal coded base 100 numbers can result in a word value that is in 16 bit form (steps 664-666).

The preferred embodiment of the method for multiplication is discussed below in reference to an example. The method was developed to allow multiplication of BCD numbers on an 8 bit microprocessor. The numbers are formed into digit pairs (two digits per byte, thus, each byte will be in base 100 (0-99)), converted into binary form using hexadecimal coded base 100 form, multiplied, and converted from hexadecimal coded base 100 form to base 100 BCD form.

The following example is the multiplication of 123,456 and 654,321. These two numbers can be set up as three bytes each, represented in BCD form as follows:

12 34 56 and 65 43 21.

Each byte of each number is then converted into binary form, represented in hexadecimal notation:

12 34 56 is converted into 0CH 22H 38H and 65 43 21 is converted into 41H 2BH 15H.

The numbers are multiplied in the same manner as long multiplication as follows:

| | | | | |
|---|---|---|---|---|
| | | 0CH | 22H | 38H |
| | × | 41H | 2BH | 15H |
| | | | | (38H × 15H) |
| | | | (22H × 15H) | |
| | | (0CH × 15H) | | |
| | | | (38H × 2BH) | |
| | | (22H × 2BH) | | |
| | (0CH × 2BH) | | | |
| | | (38H × 41H) | | |
| | (22H × 41H) | | | |
| (0CH × 41H) | | | | |

The result of multiplication of each line is as follows:

| | | | | |
|---|---|---|---|---|
| | | 0CH | 22H | 38H |
| | × | 41H | 2BH | 15H |
| | | | | 0498H |
| | | | 02CAH | |
| | | 00FCH | | |
| | | | 0968H | |
| | | 05B6H | | |
| | 0204H | | | |
| | | 0E38H | | |
| | 08A2H | | | |
| 030CH | | | | |

The multiplication of two hexadecimal base 100 numbers results in word values (2 bytes) which must be converted back into hexadecimal base 100 numbers. This is accomplished by dividing the word value by 64H (100 decimal). The quotient of the division for each word will be the hundreds digit and the remainder will be the tens and ones digits as follows:

| | | | | | | |
|---|---|---|---|---|---|---|
| | | | | 0CH | 22H | 38H |
| | | | × | 41H | 2BH | 15H |
| | | | | | 0BH | 4CH |
| | | | | 07H | 0EH | |
| | | 02H | | 34H | | |
| | | | | 18H | 08H | |
| | | 0EH | | 3EH | | |
| | 05H | 10H | | | | |
| | | 24H | | 28H | | |
| | 16H | 0AH | | | | |
| 07H | 50H | | | | | |

The columns are then added as follows:

| | | | | | |
|---|---|---|---|---|---|
| 07H | 6BH | 4EH | B9H | 21H | 4CH |

Starting with the least significant pairs of digits (4CH), base 100 must be preserved. Thus, any byte greater than 63H (99 decimal) must be converted into base 100 by dividing by 63H. Division is started at the least significant byte, and the quotient of the division added to the next byte. The remainder is the current byte.

| | | | | | |
|---|---|---|---|---|---|
| 08H | 07H | 4FH | 55H | 21H | 4CH |

Subsequent to insuring that base 100 is preserved, the resulting answer is converted back into BCD form:

| | | | | | |
|---|---|---|---|---|---|
| 08 | 07 | 79 | 85 | 33 | 76 |

By way of comparison, straight decimal multiplication of 123,456×654,321 is:

```
      123456
    × 654321
      123456
     246912
    370368
   493824
  617280
 740736
 80779853376
```

The answer to both multiplications of 123,456×654,321 is 80,779,853,376.

Figure 42F:
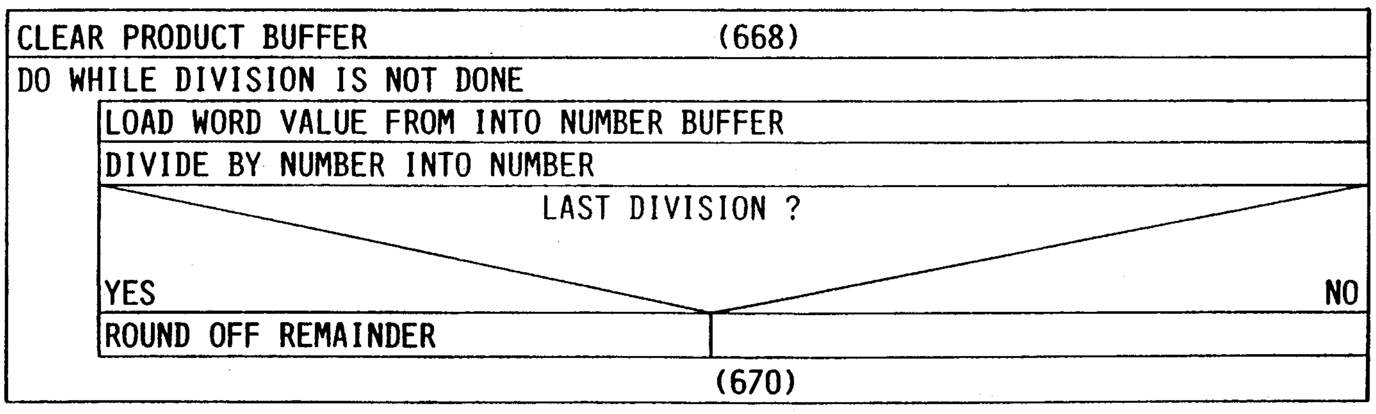

The division subroutine (DIVISION) illustrated in FIG. 42F performs the division of the byte(s) of a pair of numbers in hexadecimal coded base 100 form (steps 668–670). To perform the division of a two digit BCD number into a multi-digit BCD number on an 8 bit microprocessor the following method for division is provided.

In general, multi-digit numbers to be divided are formed into digit pairs (two digits per 8 bit byte, thus, each byte will be in base 100 (0–99)). Subsequently, the numbers are converted into binary form using hexadecimal notation, the numbers are divided, and the quotient is converted from hexadecimal base 100 form to base 100 BCD form.

This method is illustrated in the following example, wherein 34,567,890 is divided by 12. The dividend can be set up as four bytes, represented in BCD form as follows:

34 56 78 90

This BCD number is then converted into hexadecimal base 100 form as follows:

22H, 38H, 4EH, 5AH.

The divisor (12) is represented as 0CH.

Division is performed starting with the most significant byte (22H/0CH), wherein the quotient is 2 with a remainder of 0AH. The remainder is multiplied by 64H (base 100) and added to the next most significant byte as follows:

0AH×64H=3E8H

3E8H+38H=420H.

Next, division is performed on this word and the following bytes following the previous steps as follows:

420H/0CH=58H with a remainder of 0.

4EH/0CH=06H with a remainder of 6.

06H×64H=258H

258H+5AH=2B2H.

2B2H/0CH=39H with a remainder of 6.

The division of 22H, 38H, 4EH, 5AH by 0CH results in an answer of:

02H 58H 06H 39H with a remainder of 6.

Converting this quotient into BCD form results in:

02 88 06 57=2,880,657 (the remainder being truncated).

By way of comparison, performing the division in decimal form renders the same result (34,567,890/12=2,880,657).

The CONTRL module contains the following submodules: PGMCTL (main program control), LDCTRL (load control), BSRMSG (BSR device control), EWHOPT (electric water heater optimization), and HVACOP (HVAC optimization).

Figure 43A:
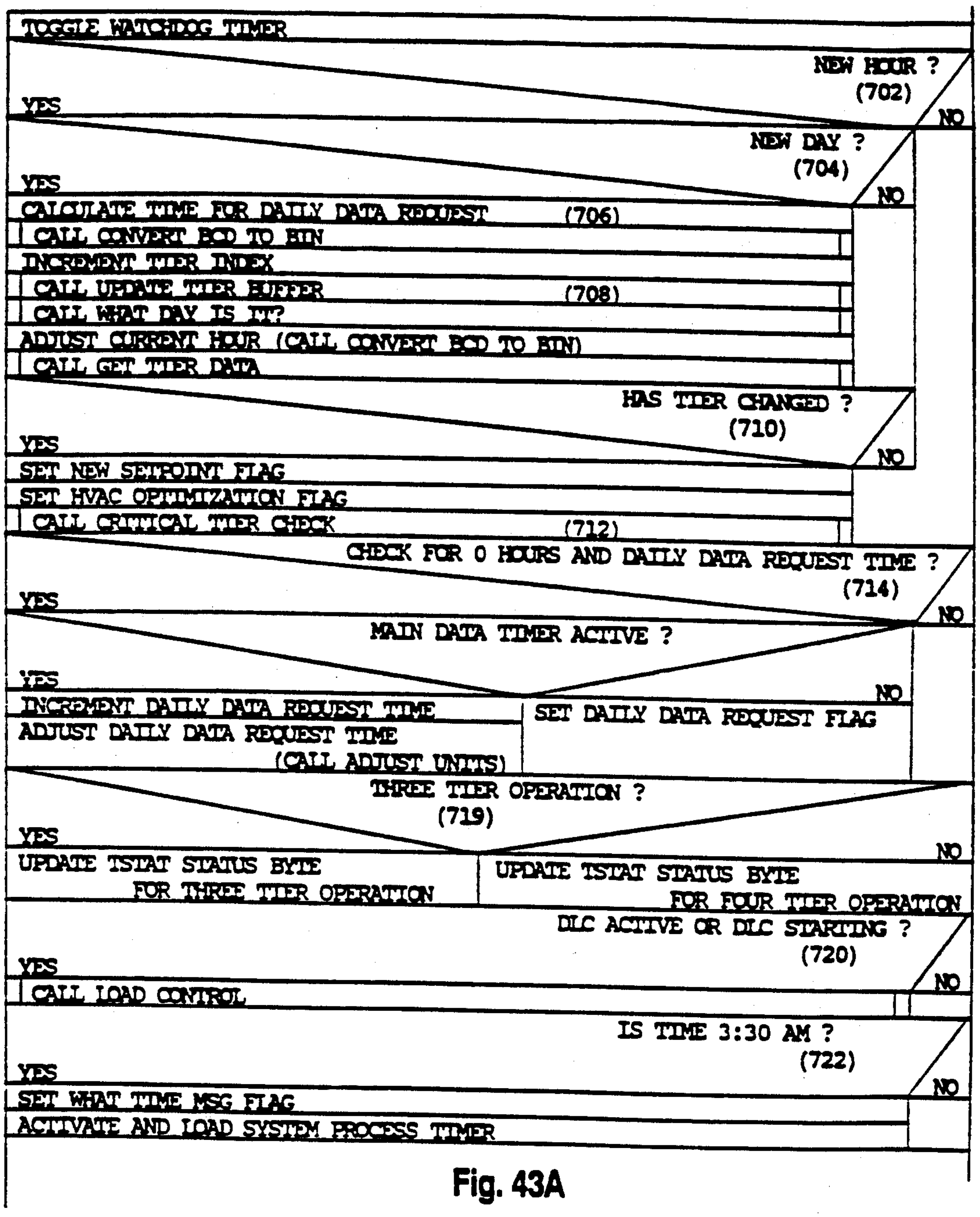
Figure 43B:
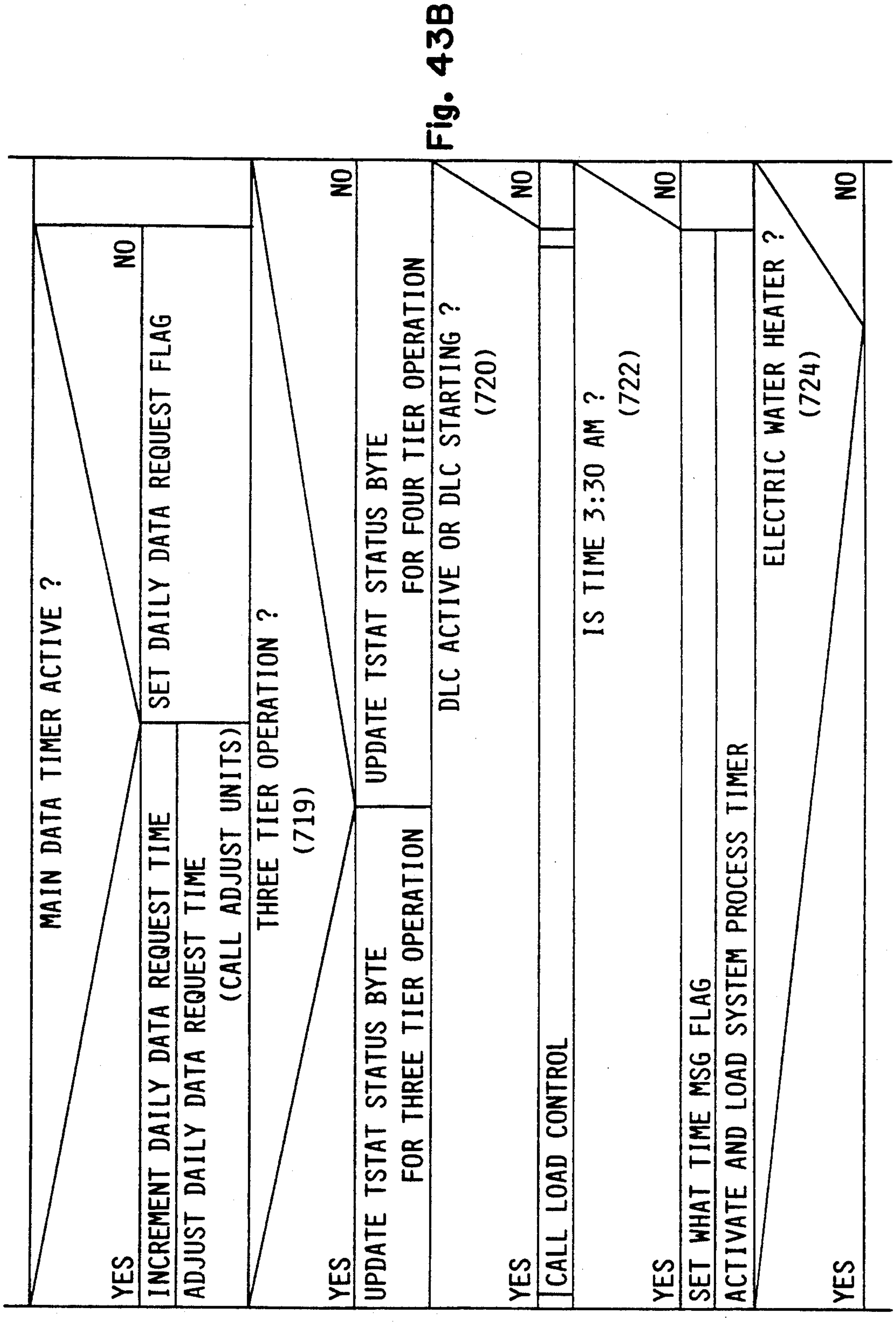
Figure 43C:
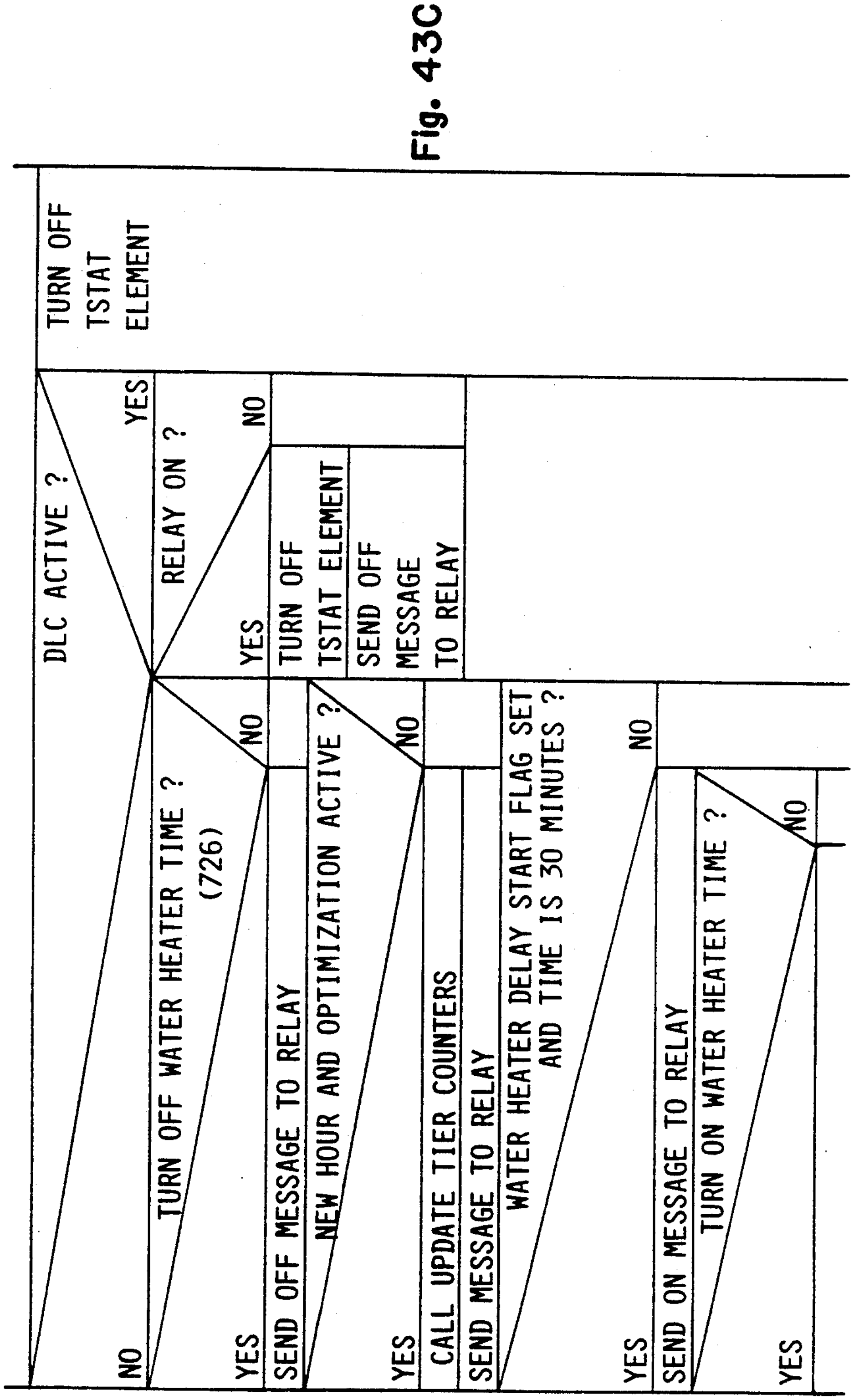
Figure 43D:
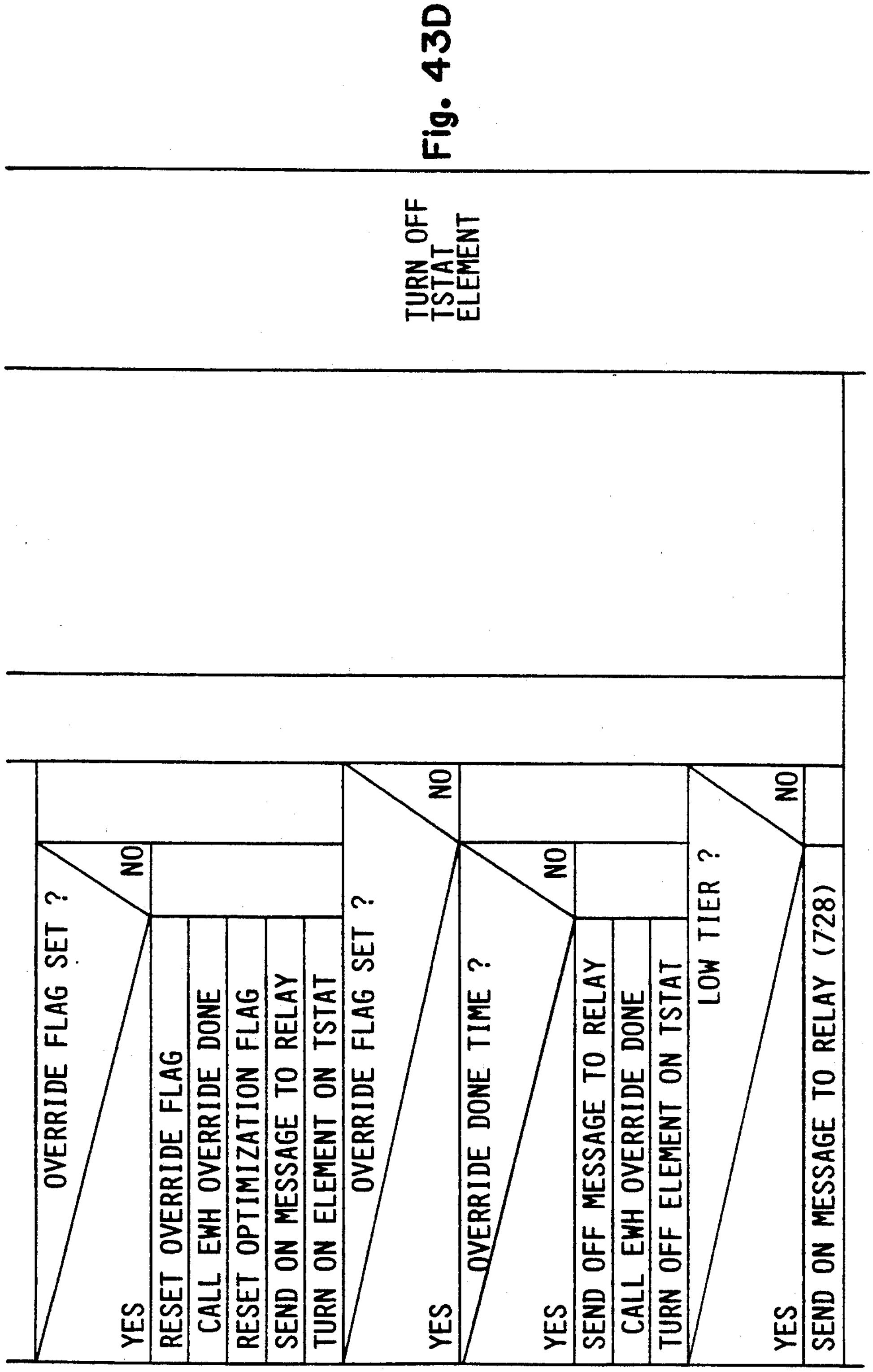
Figure 43E:
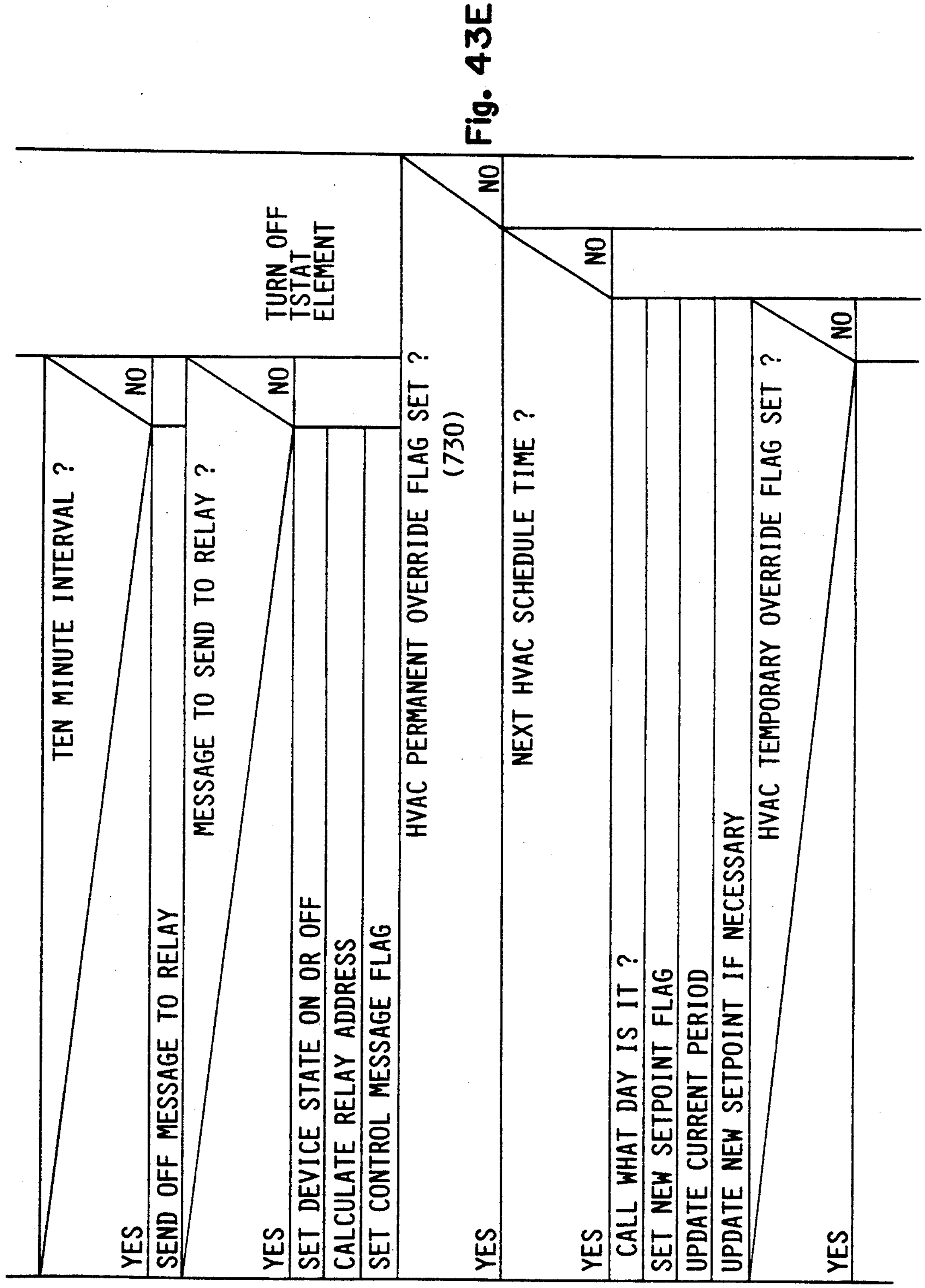
Figure 43F:
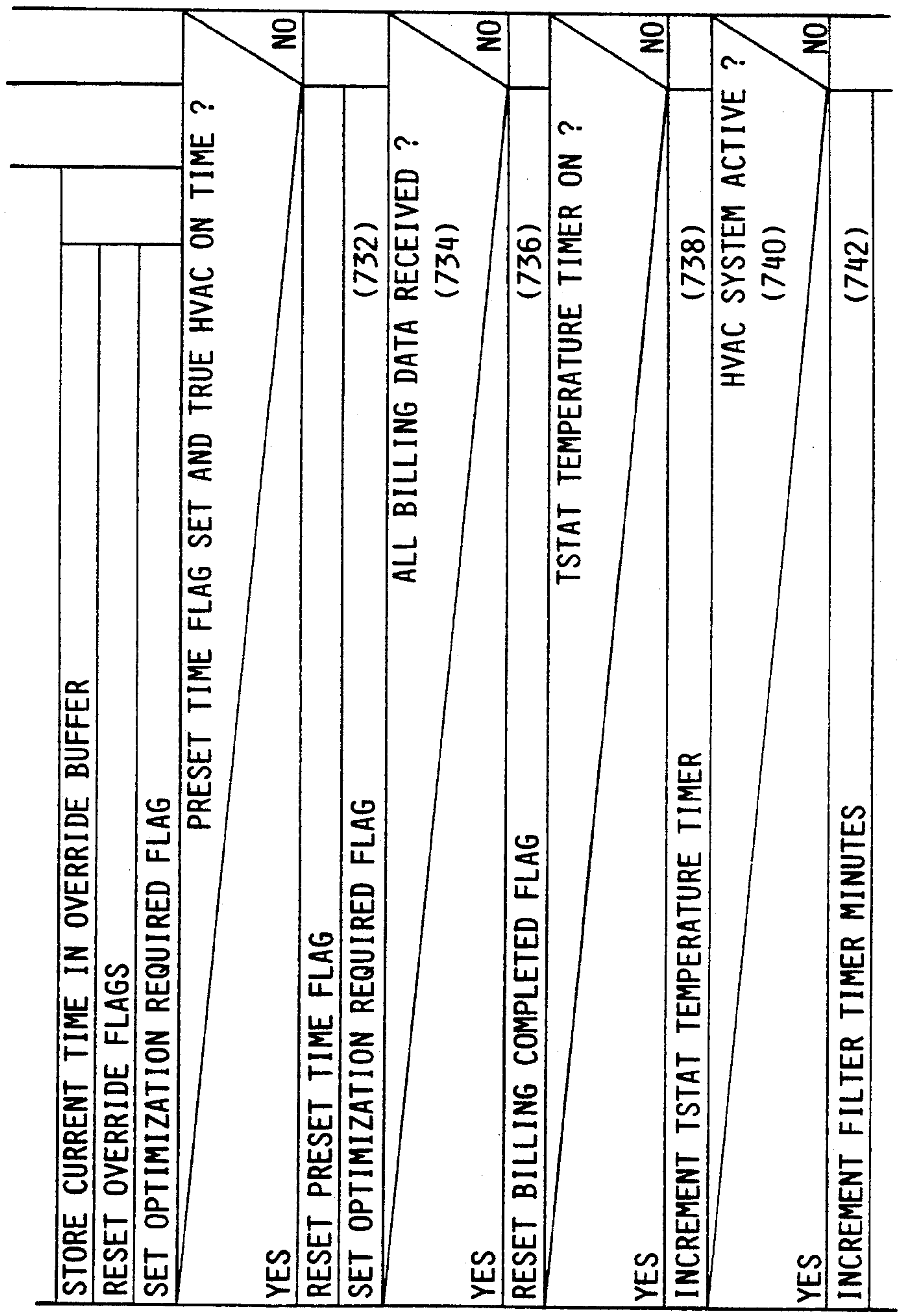
Figure 43G:
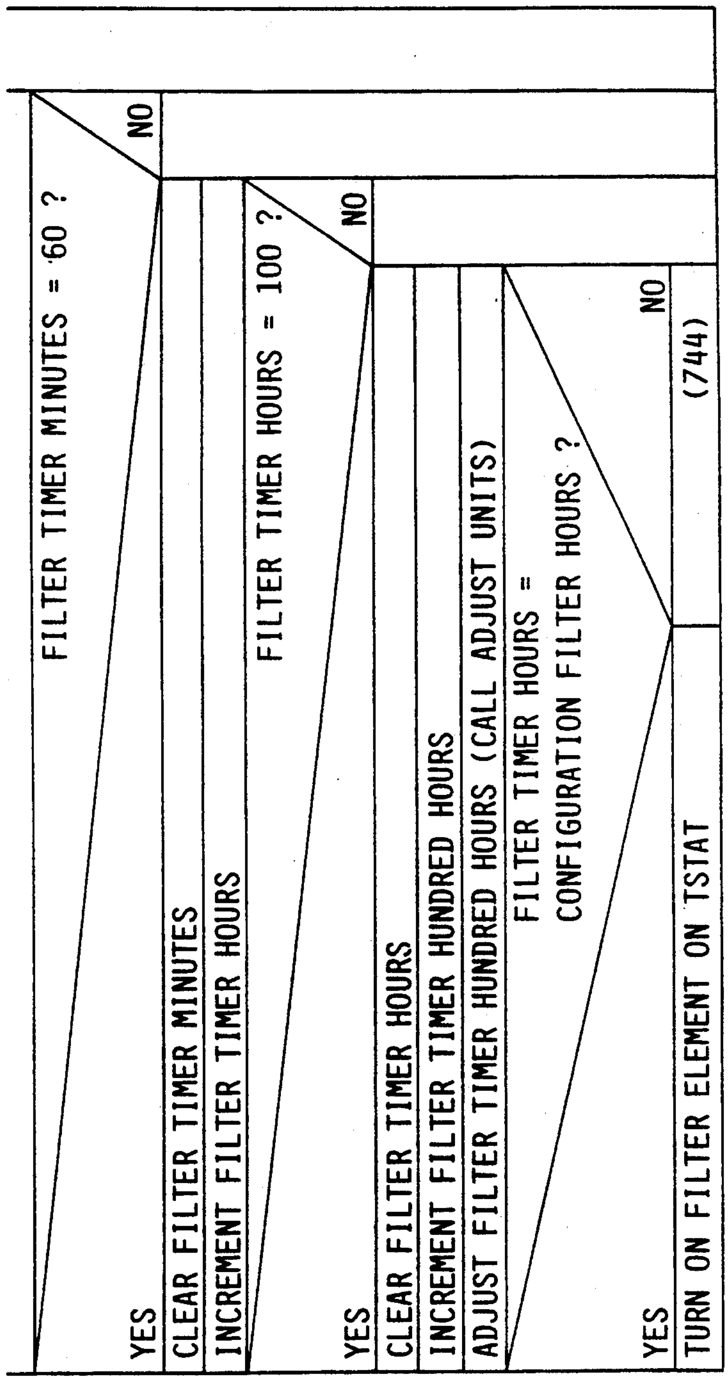

FIGS. 43A–43A illustrate the N/S diagram for the main program control routine (PGMCTL). PGMCTL is the control subroutine for the function of the system, and is called every minute by the real time routine (step 700, FIG. 36C). PCMCTL checks to see if it is midnight (steps 702, 704). At midnight PCMCTL calculates a time (between 12:00am and 1:00am) at which the controller sends out its daily data request message to the power company (step 706).

Subsequently, the tier data pointer is adjusted for the current day's tier data (step 708) every hour, the tier is checked for a tier change (step 710) every hour, and the tier is checked for being critical (step 712) every hour. The time is then checked and the main data timer active flag is checked to determine whether or not the daily data request flag should be set (steps 714–718).

When a new minute occurs, the following steps are performed:

1. Test whether the system is in three or four tier operation (step 719).
2. Call the load control subroutine (LDCTRL, FIG. 44) if the current date is the same as the specified direct load control start date from the power company (step 720).

3. Test the time of day to see if it is 3:30am, and at 3:30am set the time request message schedule flag (step 722).
4. Test to see if an electric hot water heater is present (step 724), and test to determine if the major relay (electric water heater) should be energized or de-energized (steps 726–728).
5. Test to determine if a HVAC schedule is to take effect (steps 730–732).
6. Test to determine if the billing algorithms should be run (steps 734–736).
7. Increment a HVAC timer by 1 minute to keep track of the HVAC run time (steps 738–740).
8. Determine how long the HVAC system has been operating since the last filter change, determine if this is longer than the acceptable filter life (in hundreds of hours), and activate the appropriate thermostat 2 message bit to cause the filter element (ST1_FL) on the thermostat to turn on (steps 742–744). (See the discussion of message type A.)

FIGS. 44A–44C illustrate the N/S diagram for the load control module (LDCTRL). LDCTRL controls the time that the air conditioning portion of the HVAC system (step 750) and the electric water heater (step 752) are turned off. The data which determines the time for this occurrence is downloaded from the power company via the power meter. The data contains the following information: the date that direct load control (DLC) starts and stops, the time of the day that direct load control is active (start time and stop time), the starting minute of each hour when direct load control shuts down the air conditioning portion of the HVAC system and the water heater, and the number of minutes the air conditioning portion of the HVAC system and the water heater are shut down every hour that load control is active.

Referring again to FIGS. 44A–44C, when LDCRTL is called, the DLC start date is checked against the current date and the DLC active flag is set if the dates are the same (step 754). Subsequently, the time of day is checked against the DLC start time (steps 756–758). If these times are equal, the air conditioning portion of the HVAC system and the hot water heater are shut down if necessary (steps 750, 752). If these times are not equal, the DLC timer is set to 0, DLC is terminated, the HVAC optimization flag can be set, and the hot water heater (EWH) can be started (steps 760–762).

At steps 764 and 766, the current time is checked against the DLC stop time, the DLC timer flag can be set, the appropriate bit can be set to turn the load control element on the thermostat 2 off, the DLC timer can be set to 0, and the EWH optimization flag can be set. At steps 768–770, a check is made to determine if the cooling mode is occurring, the HVAC optimization flag can be set, and the current date is checked against the stop date to determine whether or not the DLC active flag should be reset.

FIGS. 45A–45C illustrate the N/S diagram for the BSR (X-10) device control module (BSRMSG). FIG. 45A illustrates the routine for checking the BSR schedules. This routine first checks the main data timer active flag to determine if the controller is in communications with the power meter 20′ or interface 22. When communications are occurring, there is a return to the real time routine (step 772).

In steps 774 to 776, BSRMSG determines if there are appliance schedules. If there are appliance schedules, BSRMSG determines if the day is a weekday or weekend; and determines if the controller is operating during the initialization of the controller. During initialization all devices are shut off by calling the start BSR message subroutine (step 780), which sets up the appropriate message to turn the appliances off (steps 782–783). Subsequent to initialization, there is a search for active appliance schedules (step 784) and the BSR message subroutine is called (step 786) to set up the message which turns the appropriate appliances on (steps 782–783).

In steps 788 and 790, BSRMSG checks to see if any appliances are scheduled to run, and if there are, checks to see if any BSR devices are scheduled to run. When BSR devices are scheduled to run, a decision is made to run one or more of five BSR devices by setting its X-10 flag (steps 792–794). If any one of the devices are scheduled to run, the start BSR message subroutine is calls (steps 796–798).

FIGS. 46A–46B illustrate the N/S diagram for the electric water heater optimization routine (EWHOPT). In general, this routine makes two main decisions; the first (step 800) is whether or not the customer has called for hot water by overriding the programmed hot water schedule by depressing the heat water now key 60 (key 3;1, FIG. 2) if the customer is using an electric hot water heater; and the second is whether the power company will allow the hot water heater to run during either critical and/or the high tier times (steps 801, 802).

If the customer has an electric hot water heater and has not requested an override, then the hot water heater relay is disabled according to the preheat time required, the scheduled hot water heater start/stop times, and the tier time schedule. During a LOW tier the electric water heater relay is never disabled, accordingly the hot water heater will operate as though it was only being controlled by the relay.

The electric water heater preheat time is determined by reading HPr configuration data (step 804). The hot water heater relay start/stop times are determined by determining whether the present time is occurring during a weekday or weekend schedule (step 806), and calling the closest time subroutine (FIG. 47) (step 808) to read each schedule (morning, day, evening and night) for the current day and determine the next scheduled hot water heater relay start/stop time (steps 810–812, FIG. 47).

Subsequently, the start time is checked against the programmed start times and if the start time is programmed the relay is enabled, and the optimization portion of EWHOPT skipped (step 814).

If optimization occurs, the relay start time and the current time are converted from BCD to binary (steps 816, 818) using the BCD to BIN subroutine (FIG. 69), and the difference between these is then calculated (step 820). When the calculated time is less that the preheat time, the relay start flag is set. When the calculated time is greater than the preheat time, the tiers (low, medium, high) occurring during the calculated time are determined, and the relay is enabled during the tiers depending on the amount of preheat time needed (steps 822–824). For example, if 2 hours of preheat time were needed, and two medium tiers and two critical tiers occurred during the calculated time, the relay would be enabled during the two medium tier times.

FIG. 48 illustrates the N/S diagram for the get tier data routine referenced above. The tier data includes 9 bytes of information for each 24 hour period. Three bytes define the date, and the other 6 bytes (2 bits determine the status of hours) define the tier level (low, medium, high, or critical) for each of the 24 hours in a day. This routine determines the tier level within which each hour between the present time and the relay start time (PERIOD) occurs. The routine performs this function by reading the tier data associated with the 24 hour period which encompasses the PERIOD (steps 826, 828), and analyzing each of the six bytes, 2 bits at a time, to determine the tier level for each hour of the period (steps 830, 832).

FIGS. 49A and 49B illustrate the N/S diagram for the HVAC optimization routine (HVACOP). This routine anticipates when the HVAC system should preheat or precool in order to maintain the desired setpoint most efficiently i.e. perform heating or cooling in the lowest cost energy tiers if possible.

This routine initially determines if the hold button on the thermostat has been activated and returns if it has. If the hold button has not been activated, the present day is determined (calls the what day is it routine FIG. 51) (step 834), the present time is determined (step 836), and the tiers which occur in the following 2 hours is determined (steps 838–840). Furthermore, if the current schedule (weekend or weekday cooling or heating) is determined (step 842), and the time at which the period changes is stored (morning, day, evening, night) (step 844).

Subsequently, the routine determines whether or not the HVAC system includes electric heat or air conditioning (step 846) and returns if neither electric heat nor air conditioning are present. If either electric heat or air conditioning is present and heating or cooling is scheduled to occur within the next 2 hours and 59 minutes, then optimization occurs (step 848). If heating or cooling is scheduled to occur in the next one or two hours, the next scheduled setpoint temperature is read and the calculate precondition time subroutine is called to determine the amount of preheat or precool time needed to reach the scheduled setpoint temperature (steps 850–852).

If heating or cooling is scheduled to occur in the current hour and optimization is scheduled for the current hour, the next scheduled setpoint temperature is read and the calculate precondition time subroutine is called to determine the amount of preheat or precool time needed to reach the scheduled setpoint temperature (steps 854–856).

Finally, the flag for the HVAC optimization routine is reset.

FIG. 50 illustrates the N/S diagram for the calculate precondition time subroutine. This subroutine determines whether heating or cooling is scheduled (step 858), determines the difference between the current temperature and the scheduled setpoint temperature (step 860 or 862), and determines the amount of time needed to heat or cool up or down to the next scheduled setpoint temperature (step 864). When this time in minutes is greater than the minutes portion of the next scheduled HVAC ON time and the current tier cost is less than the tier cost starting at the next scheduled HVAC ON time, heating or cooling is scheduled to start (steps 866–868). When the amount of time needed to heat or cool in minutes is less that the minutes portion of the next scheduled HVAC on time, heating or cooling is scheduled to start (steps 870–872). For example if the next scheduled setpoint temperature time is 6:10, the preheat time is 0:20, and the cost of the tier between 5:00 and 6:00 is less than the cost of the tier between 6:00 and 7:00, heating will start at 5:50 and continue until 6:10.

FIG. 51 illustrates the N/S diagram for the what day is it routine. This routine sets the bits for the thermostat 2 which control: the weekend/weekday display segments (STO_WE) (step 874); the morning, day, evening and night segments (ST2_CH, ST2_CL) (step 876); the setpoint temperature segments (SETPNT) (step 878); and the low, medium, high, and critical tier segments (ST2_RH, ST2_RL) (step 880). This routine also determines if the hold button 58 of the thermostat 2 has been depressed or if the temperature setting has been temporarily changed from the scheduled temperature (step 882). In either case the setpoint temperature is maintained (step 884) regardless of the scheduled temperature for the current period. If the hold button 50 is depressed, the setpoint temperature is maintained regardless of a period change.

FIGS. 52A-52D illustrate the N/S diagram for the BRICK message decode subroutine (BRKDEC). This subroutine decodes messages received by the controller which pass through the BRICK interface. These messages are received from the telephone interface 22, a power meter 20', and up to 4 major relays 14, 22 (e.g. hot water heater relay). There are 3 basic types of messages which pass between the BRICK and the controller: system process, device, and data. A low level message passes between the BRICK and the controller for purposes of hand-shaking. The basic format of these messages includes the elements shown in Table 21:

TABLE 21

| | |
|---|---|
| BYTE COUNT | 1 byte (data field byte count) |
| MESSAGE TYPE | 1 byte |
| ADDRESS FIELD | 1 byte |
| PROCESS NUMBERS | 1 byte (first byte of data field) |
| DATA FIELD | 1-15 bytes |
| CHECKSUM | 1 byte. |

There are 10 system process messages: WH TIME (TYPE 1), TIME (TYPE 2), DIAG (TYPE 3), DIAG ACK (TYPE 4), CONFIG (TYPE 5), CONFIG ACK (TYPE 6), ERROR (TYPE 7), ERROR ACK (TYPE 8), DIAGNOSTIC (TYPE 9), and BUSY (TYPE 10(AH)).

Upon reception of the system process messages, controller performs an associated function.

If the controller receives a system process message other than one which it should receive, the controller sends an error message to the telephone interface which communicates this information to the power company (step 885).

When the WH_TIME (TYPE 1) message is received, the controller will build a TIME (TYPE 2) message (step 886) and send it back to the device that initially sent the WH TIME message. The TIME message provides the controller's current time and date.

The controller can also receive a TIME message from the power meter or telephone interface. When a TIME message is received, a comparison is made between the received time (the true power company system time) and the time that is currently stored in the controller (step 888). If the time difference is greater than or less than 2 minutes, the controller sets the flags for: initializing the BSR devices (step 890), electric water heater optimization (step 892), and HVAC optimization (894). The controller also stores the date and time received from the sending device in external RAM (step 896), analyzes the time difference (call Fast Clock subroutine, FIGS. 53A-53C, step 897), checks whether direct load control is active (step 898), and checks if there is a critical tier notification (step 900).

FIGS. 53A-53B illustrate the N/S diagrams for the fast clock subroutine. This subroutine compares the date, time, and day-of-week data from the power company system to that of the controller. If the dates do not correspond and/or the hour difference is greater than two hours, then the fast clock flag will not be enabled. If the difference is less than 2 hours, that difference is converted into minutes, stored in a fast clock counter, and the fast clock flag is enabled. (The fast clock flag is discussed in conjunction with the RLTIME routine.)

The DIAG (TYPE 3) message is sent from the telephone interface to the controller. Upon reception of the DIAG message, the controller prepares a DIAG_ACK message is prepared (step 902) for transmission to the device that sent the DIAG message. Additionally, the time in the DIAG message data field is compared to the controller time (step 904). If the time difference is greater than 5 minutes, the controller will prepare to send a WH TIME message to the power meter.

When a device sends the controller a CONFIG (TYPE 5) message, the controller prepares a CONFIG ACK (TYPE 6) message (step 906) for transmission to the device. The data field of the CONFIG ACK message contains the major and minor version numbers of the firmware that is being used by the controller.

When a ERROR (TYPE 7) message is received by the controller, the ERROR_ACK message is built (step 908) and is prepared to be sent to the device that sent the ERROR message. The controller sends an ERROR ACK (TYPE 8) message when the controller has detected one or more of the following error types:

1. Defective RAM has been found during INITIALIZATION. If this ever occurs, there can be no guarantee that this message will be properly generated and sent.
2. The controller has determined that the BRICK subaddress does not correspond to the controller address.
3. The controller has received a message with the wrong message type in it.
4. The controller has terminated its data session due to no response or an invalid response within a 15 minute period.
5. The CUSTOMER SERVICE key has been depressed on the thermostat keyboard.
6. The controller has had no communication with the thermostat for at least 5 minutes.
7. The current temperature received from the thermostat is not within the proper range (50°-99° F.).

When an ERROR_ACK (TYPE 8) message is received by the controller, ERROR message transmission is ended until another error is detected by the controller (step 910).

The DIAGNOSTIC (TYPE 9) message is only used during manufacturing to run a diagnostic test on the controller board (step 912). When this message is sent to the controller from a simulator and the associated controller input port pin 6 is held high, the DIAGNO routine discussed below is called (914). When the diagnostics hardware is not present, the controller will prepare an ERROR message for transmission to the power company telephone interface.

When the controller receives a BUSY (TYPE 10) message, a 5 minute timer is started so that the controller does not send any system process messages to the device which sent the BUSY message (step There are 3 device messages: CONTROL (TYPE 30), INQUIRE (TYPE 31), and STATUS (TYPE 32).

Only STATUS (TYPE 32) can be received by the controller. When this message is received, a test is performed (step 518) to verify that the device sending the message has the same ON/OFF status as the status stored in the controller for the particular device. If the status is not the same, the controller will prepare and transmit a CONTROL message to the corresponding device (step 920).

There are 4 data messages: REFRESH (TYPE 80), DATA REQUEST (TYPE 81), DATA (TYPE 82), and DATA ACK (TYPE 83).

When a data type message is received, an series of functions are performed. A test (step 922) is performed on the message type to determine whether the message is a DATA_ACK or another type of data message. If the message is not a DATA_ACK message, a main data timer is tested to see if the controller is in a data session (step 924). If the main data timer is not active, then it is set for 15 minutes and is started (926).

When the controller is expecting a new record (step 928), then a test is performed to see if the data session is over (step 930). If the data session is complete, a flag will be set so that the controller will send a DATA_ACK message. If the session is not over, the record data is stored (step 932) and a 30 second data packet timer is activated (step 934). If this message completes the current record data (step 936), the size of the record is checked (step 938). If the size of the data record is correct, then the data integrity flag is set (step 940). Otherwise the data integrity flag is reset (step 942). In either case, the DATA ANALYSIS subroutine (FIGS. 54A-54C) is called (step 944) and the new record flag is set (step 946).

When the DATA ANALYSIS subroutine is called (FIG. 60), the data integrity flag is set (step 948) and the CRC (Cyclic Redundancy Code) is calculated for the last record received (step 950). This CRC is compared to the CRC in the overhead of the record received so that data integrity is maintained (step 952). If the CRC's match, then the record is processed (step 954). If the record is a type 1, the refresh request flag is set (step 956) and the session counter is loaded (step 958). If the record is a type 2, the record length is tested (step 960). If the record is part of a DATA_REQUEST type message, the data timer is activated (step 962) and the data message flag is set (step 964). Otherwise, the refresh request message flag is tested (step 966).

When the request message flag is set and the destination address is the same as the BRICK address (step 968), the data session is terminated and an ERROR message is built and sent (step 970). Otherwise, the data request message flag is set (step 972), the refresh request message flag is reset (step 974), the destination address is loaded (step 976), and the data types to be requested are tested (step 978). If data types are to be requested, those data types will be loaded into a data record type 2 (step 980), otherwise a 0 will be loaded into the record type 2 (step 982). If the data session counter is 0, this counter is loaded to 1 (step 984) and the data message flag and a first time data message flag are set (step 962).

Figure 55A:
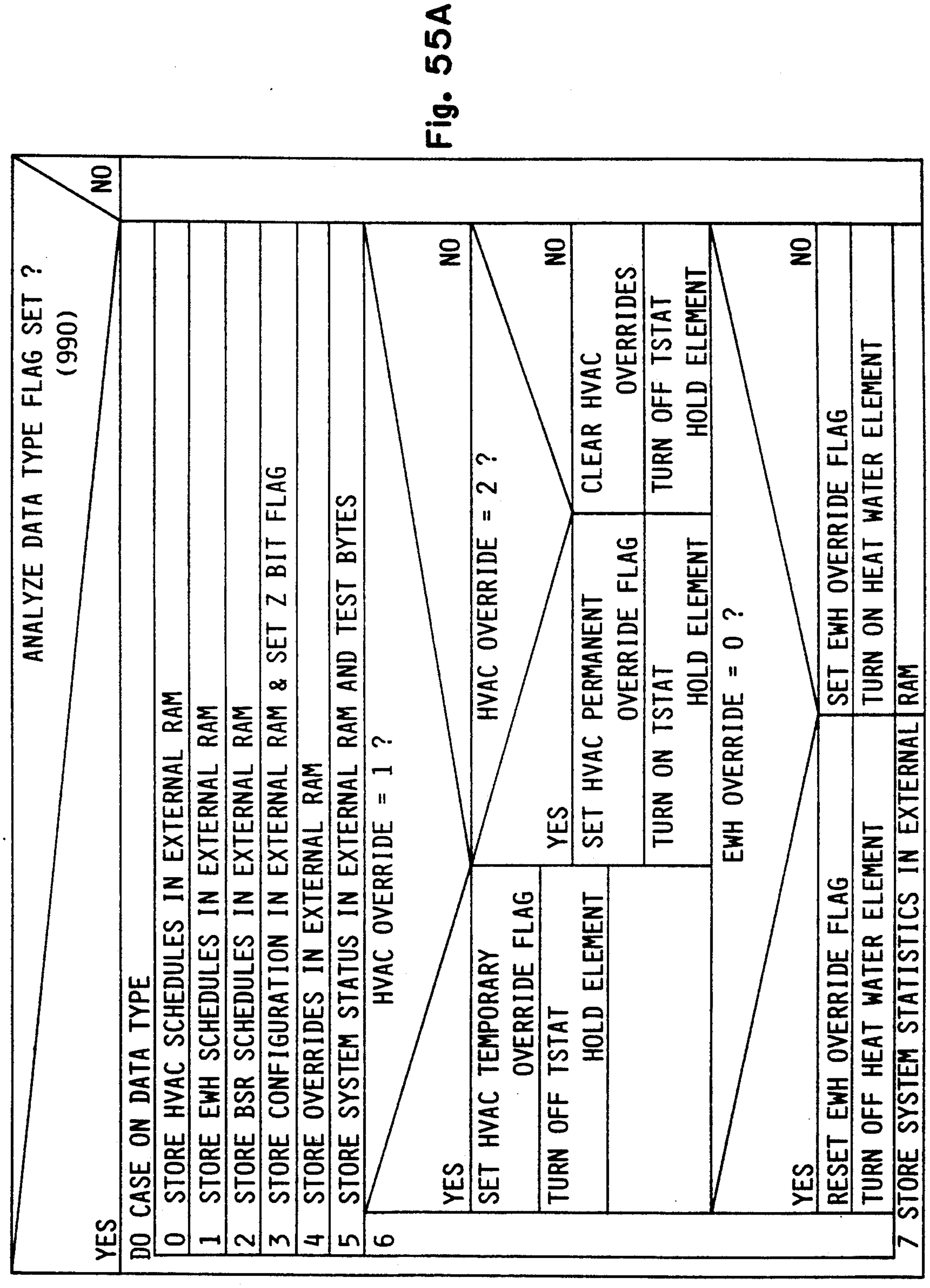
Figure 55B:
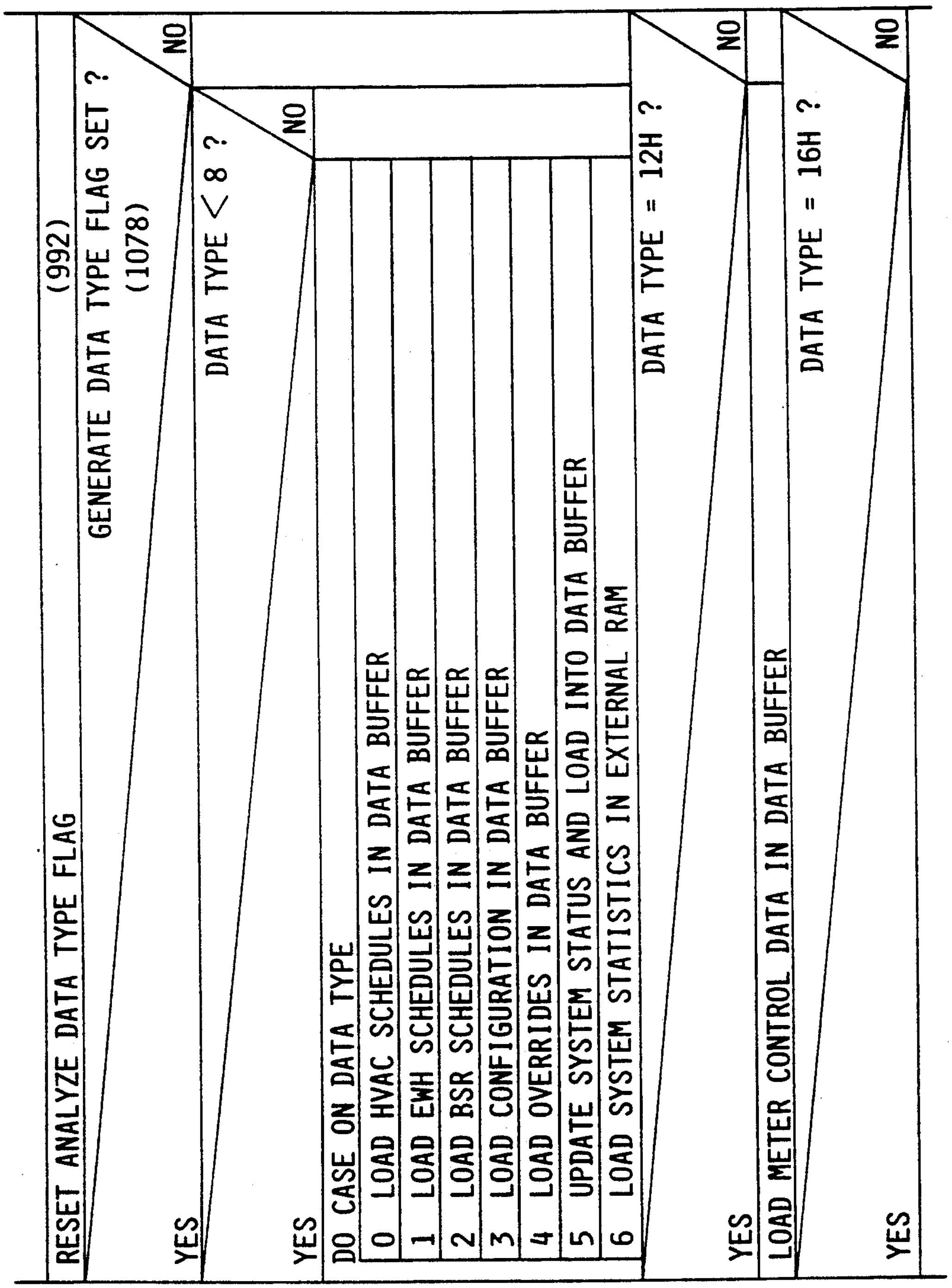
Figure 55C:
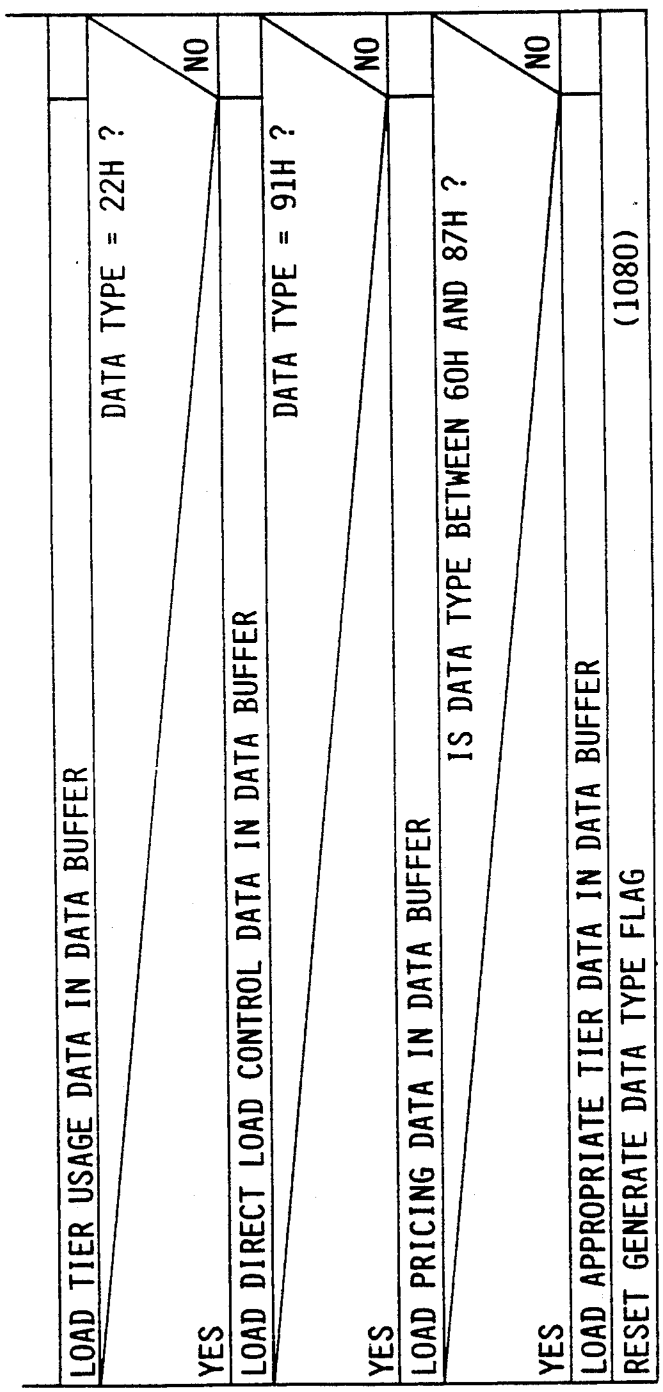
Figure 56A:
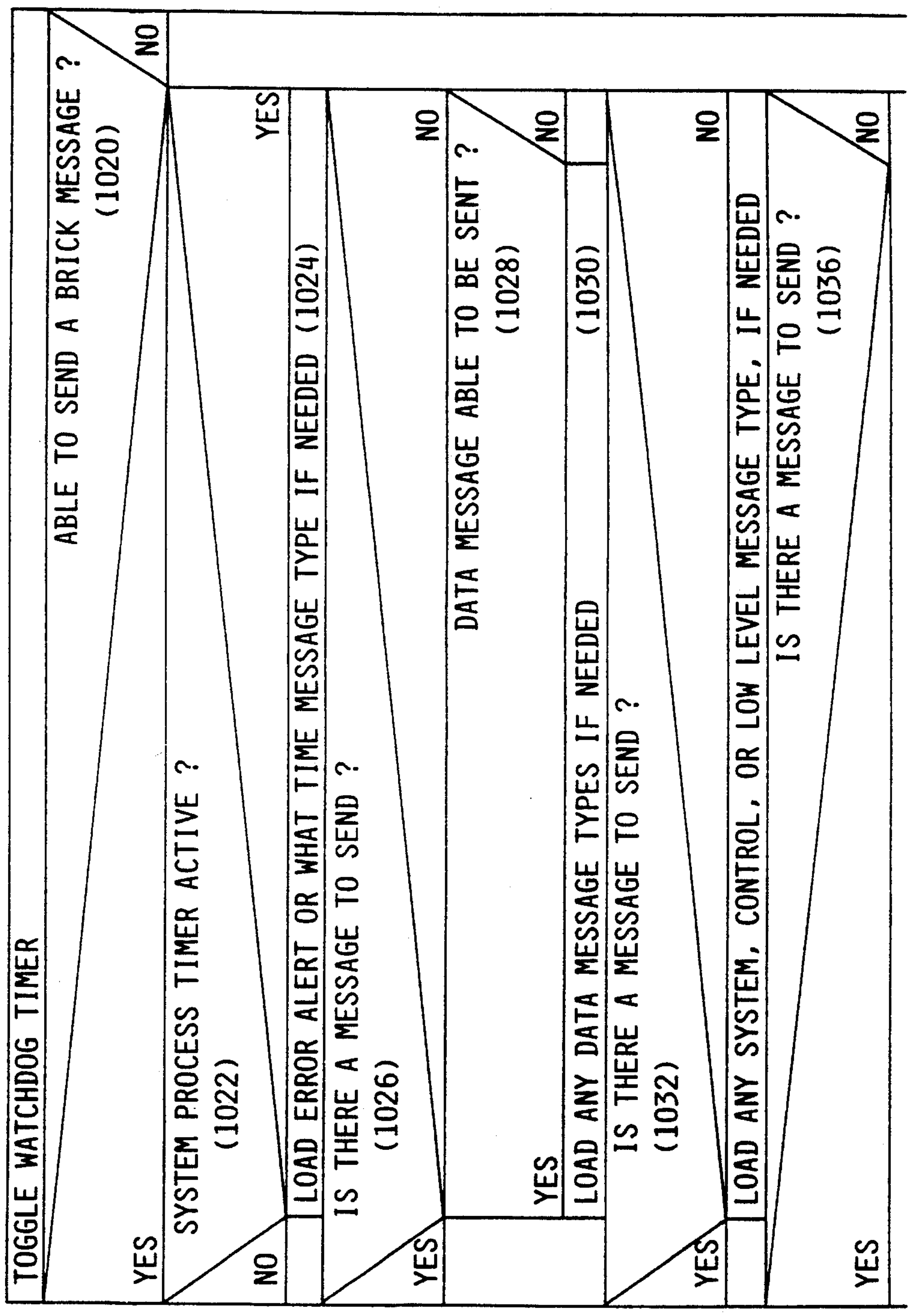
Figure 56B:
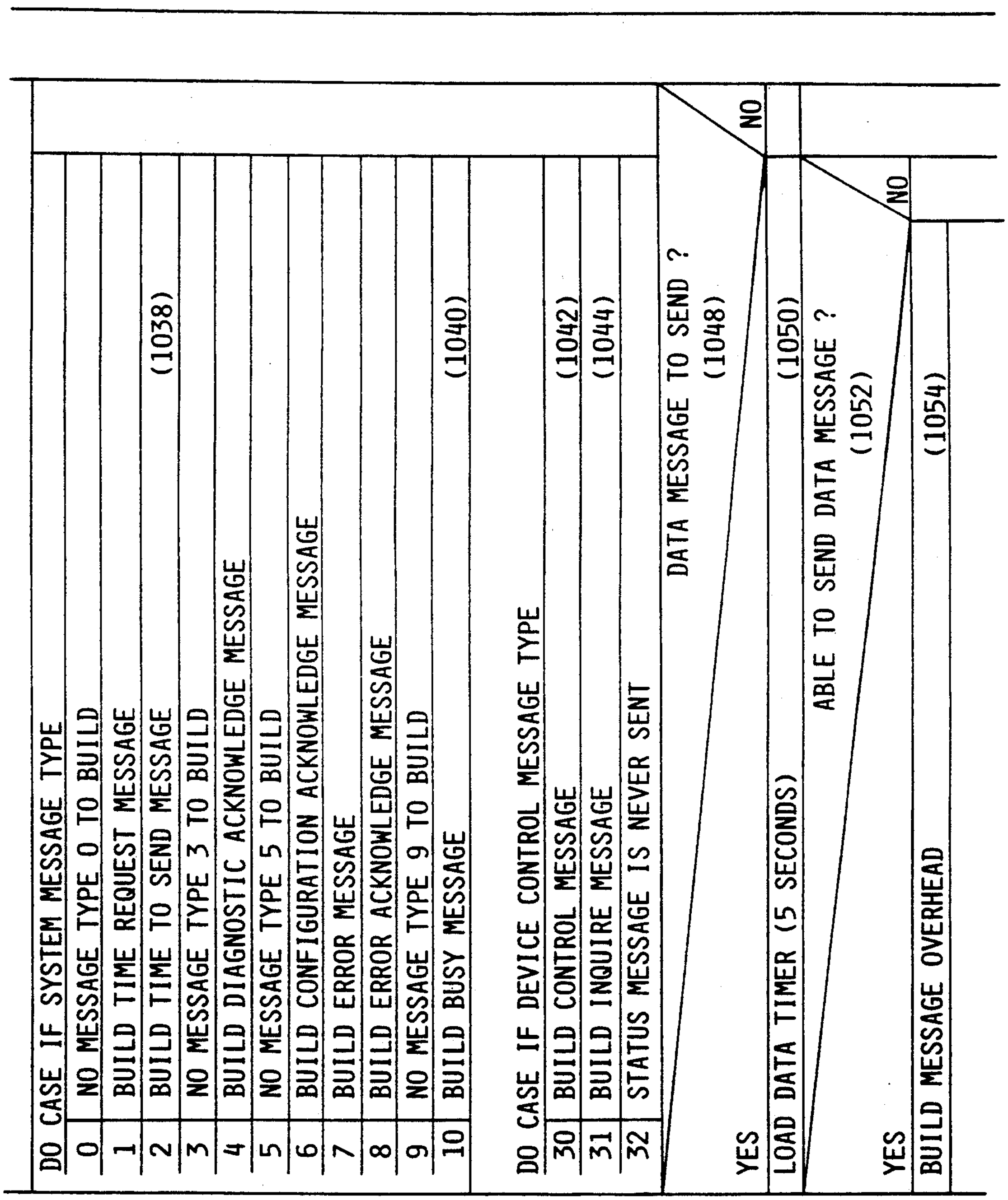
Figure 56C:
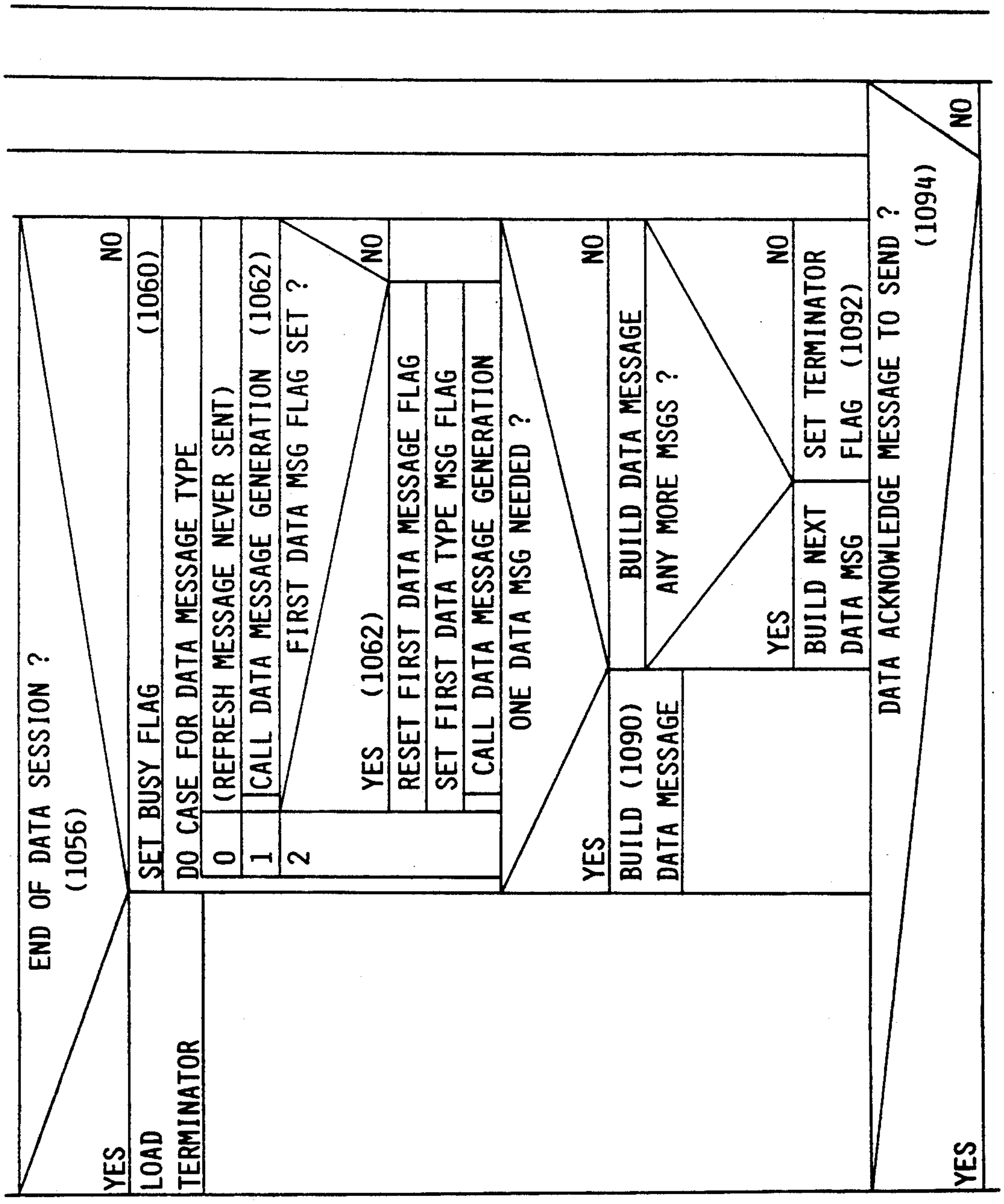
Figure 56D:
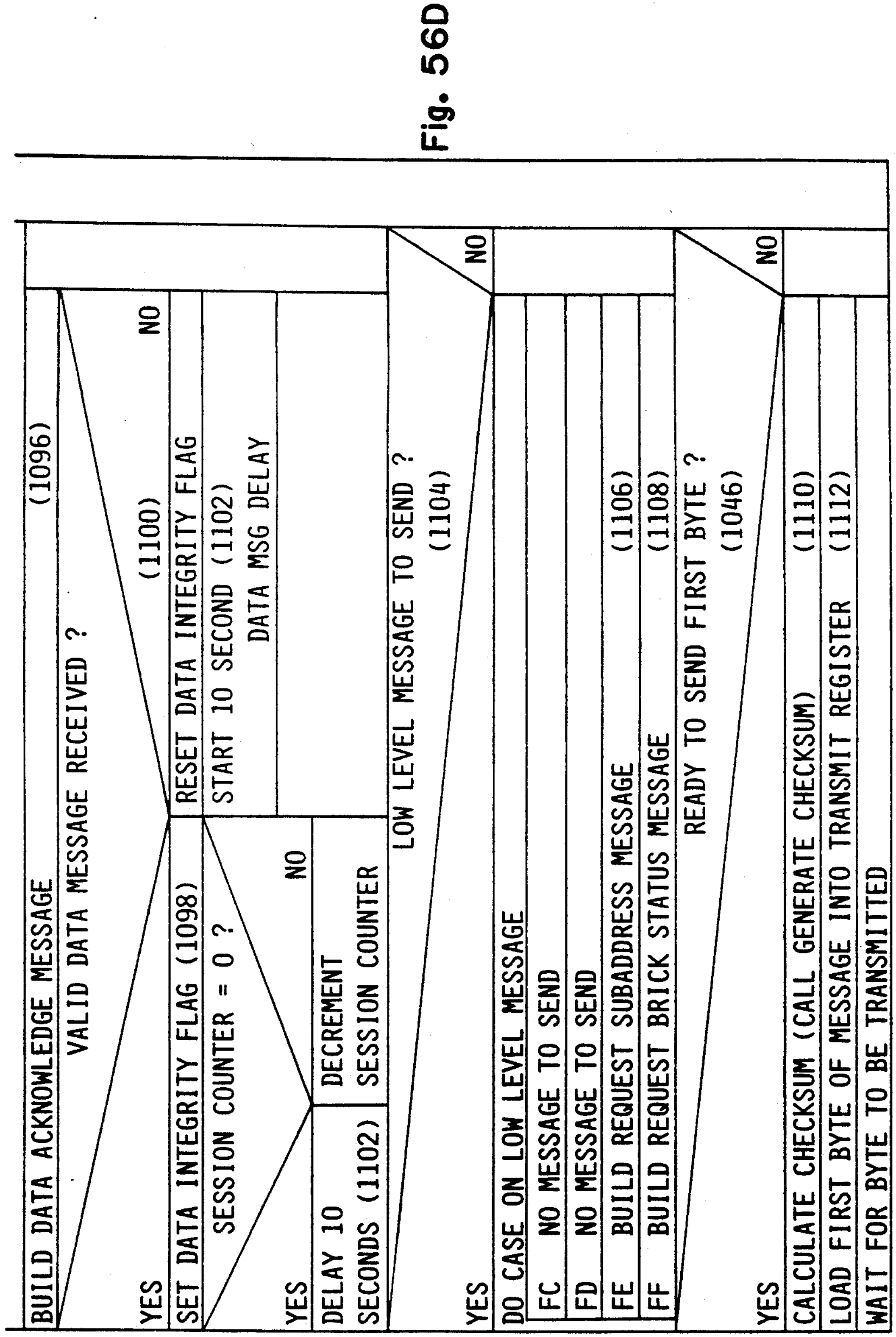

If the record is a 3, the data type number is analyzed and the corresponding data is loaded into external RAM (steps 986 to 988 and steps 990 to 992 in FIG. 55).

Subsequent to the analysis of the data type of the message, the message is processed (steps 994 to 996).

Referring again to FIG. 52B, if the received message is a DATA_ACK message and the data byte in the data field is not 0 (which means a bad data message has been sent), the previous data record will be rebuilt and resent (step 998). If the data byte in the data field is 0, a terminator flag is tested (step 1000). The terminator flag marks the end of a data session. If the terminator flag is cleared, the session counter is decremented (step 1002). If the terminator has already been sent, the session counter is tested for a value of 0 (step 1004). If it is 0, then a 10 second delay is activated so that this data session is completely finished (step 1006).

Steps 1008-1018 represent the testing of the messages between the BRICK and the controller. When a message type FCH is received, a test is performed to see if the previous message must be sent again (step 1010) or if the associated process timer must be reloaded (step 1012). Message type FDH (step 1014) informs the controller that the last message was successfully sent. Message type FEH includes the controller address which is compared to the controller's actual address (step 1016). If the addresses are not equal, an ERROR message is prepared and transmitted to the telephone interface (step 1018).

FIGS. 56A-56D illustrate the N/S diagram for the send BRICK message routine. If a BRICK message can be sent (BUSY message timer is not enabled) (step 1020), the system process timer (used for the WH_TIME and ERROR messages) is tested. If this timer is active and its value is 0 (step 1022), the ERROR message or WH_TIME message is loaded (step 1024) and the message to send flag is enabled.

If there is not a BRICK message to send (step 1026), a check is made to see if there is a data type message to be sent (step 1028). If there is a data type message to send, then the data type message is loaded (step 1030) and the message to send flag is enabled.

If there is still in not a BRICK message to send (step 1032), the other message types are loaded if a message must be sent (step 1034) and the message to send flag will be enabled.

When the message to send flag is enabled (step 1036), the associated system process message (steps 1038 to 1040) or device type message (steps 1042, 1044) is prepared and transmission is initiated (step 1046).

When the message to send is a data type message (step 1048), the data timer is loaded (step 1050). If the associated data message flags are not enabled (data inhibit flag, resend data message flag, and pass through message flag) (step 1052), the BRICK message overhead is built (step 1054) and a test is performed on the data session counter (step 1056).

When the data session is complete, the terminator data (FFH) is loaded into the data field (step 1058). Otherwise, the busy flag is set (step 1060) and the appropriate data type message is generated by calling the data message generation subroutine (step 1062).

FIG. 57 illustrates the N/S diagram for the data message generation routine. When the data request flag is set (which indicates that either a REFRESH message has been received or data is needed for the controller) (step 1064), the data request message is built (1066) and the data session counter is loaded (step 1068). Otherwise, a DATA message is generated. If this is the first portion of a DATA message (step 1070), then an 02 record type is built (step 1072). Otherwise, an 03 record type is built (step 1074) and the process data type routine is called (step 1076).

Referring again to FIGS. 54A-54C, when the analyze data type flag is set, the data corresponding to the thermostat is stored in external RAM (steps 990 to 992). Otherwise, if the generate data type flag is set, the information for the data type is loaded from external RAM into a transmit data buffer (steps 1078-1080).

Referring again to FIG. 57, the CRC for the record type buffer is calculated (step 1082), the size of the buffer is loaded (step 1084) and a flag is set which indicates that a record type has been prepared (step 1086).

Referring again to FIG. 56B, a test is performed to determine if only 1 data message is needed (step 1088) and the subsequent data message is built (steps 1090 to 1092).

When a DATA_ACK message is to be sent by the controller (step 1094), the message is prepared (step 1096) wherein the data field will contain 0 if the data integrity is valid (step 1098) or an FFH if the data integrity is invalid (step 1100). The 10 second data message delay timer is activated (step 1102) when the data session is completed. When a message between the controller and BRICK is sent (step 1104), the appropriate message is built (steps 1106, 1108).

For messages which are prepared and ready to transmit (step 1046), the checksum is calculated by calling the generate checksum subroutine (step 1110) and the first byte of the message is loaded into the transmit buffer (step 1112).

FIG. 58 illustrates the N/S diagram for the send Tstat message routine (XMTTST). The type of message that the controller sent from the controller to the thermostat (Tstat) depends upon the type of message it receives from the thermostat. XMTTST selects the proper message to send to the thermostat (steps 1114-1116).

As discussed in reference to the thermostat software, message types A-J (appendix B) are used to transmit information between the thermostat and the controller. The basic format for these messages are summarized in Table 22:

TABLE 22

| SEGMENT | SIZE |
|---|---|
| BYTE COUNT | 1 byte (data field byte count) |
| MESSAGE TYPE | 1 byte |
| ADDRESS FIELD | 1 byte |
| DATA FIELD | 0-28 bytes |
| CHECKSUM | 1 byte. |

The interaction between the thermostat and the controller is set up such that the thermostat always initiates communication with the controller. The controller firmware is set up to require a message from the thermostat at least every five minutes. If a message is not received, the controller provides an error message to a warning indication device to indicate that there has been a loss of communication between the thermostat and the controller.

The following message types B-I are sent to the controller by the thermostat, and are processed by the controller. (These messages are also discussed above in reference to the thermostat software.) For each message received, the controller sends out an associated message to insure proper protocol. Message types C-I are sent to the controller as a result of thermostat keypad 34 entries prompting CONPMI to schedule FMCMSG. These messages are also discussed above in reference to the thermostat software.

Message type B is sent to the controller every second as a result of SNDTMP scheduling FMCMSG. This allows the controller to constantly monitor the current temperature and switch settings of the thermostat.

Message type C is a request for one of four current HVAC schedules in the EEPROM of the controller. Each of the four schedules has the same format, and the address field designates which schedule is requested:

0—WEEKDAY HEATING;
1—WEEKEND HEATING;
2—WEEKDAY COOLING;
3—WEEKEND COOLING.

Message type D is a request for one of two current electric water heater schedules located in the EEPROM of the controller. Each of the two schedules has the same format, and the address field designates which schedule is requested:

0—WEEKDAY HEATING;
1—WEEKEND HEATING.

Message type E is a request for one of sixteen current appliance schedules located in the EEPROM of the controller. Each of the sixteen schedules has the same format, and the address field designates which schedule is requested:

0-7—APPLIANCES 1-8 WEEKDAY SCHEDULE;
8-15—APPLIANCES 1-8 WEEKEND SCHEDULE.

Message type F is a request for the current configuration data located in the EEPROM of the controller.

Message type G is a request for the current billing information located in the static RAM of the controller.

Message type H is an override request. An ACK message is sent to the thermostat in response to this message. (An ACK message sent to the thermostat causes ANACOM to set the thermostat ACK PENDING flag (ST4_AP).) The data field of the override message includes the following:

Status byte—This data represents the type of override requested (0 temporary HVAC override, 1=permanent HVAC override, 2=electric water heater override); and Setpoint temperature—This data (in BCD format) represents the HVAC override temperature requested by the thermostat.

Message type I is a miscellaneous message used to inform the controller that the air filter bit (ST1_FL) has been reset, the customer service key has been depressed, or the optimize key has been depressed. The controller loads all the default HVAC and electric water heater schedules into static RAM and then into EEPROM in response to an OPTIMIZE request, and clears the runtime filter counter in response to a reset filter request.

The following message types A-J are sent to the thermostat by the controller in response to the reception of one of the above-described message types.

Message type A is sent to the thermostat in response to a message type B from the thermostat requesting current data for the time-of-day, the day-of-week (weekday/weekend), current set point temperature, the current tier, and the current program mode (MORN, DAY, EVE, or NIGHT) being displayed on the thermostat. The function of each status byte bit is discussed below along with thermostat memory location at which the ANACON subroutine stores the status bits.

The WEEKDAY/WEEKEND indication (STATUS$BYTES(0) bit 7) bit represents the current day (weekday or weekend) as specified by the user's configuration. This bit determines the status to the thermostat weekend setting bit (STO_WE) which in turn determines whether the "WEEKDAY" or "WEEKEND" text is presented on the thermostat display.

The DIRECT LOAD CONTROL (STATUS$BYTES(0) bit 6) bit indicates that the controller has turned off the HVAC system and the electric water heater for a period of time specified by the system manager. This bit determines the status of the thermostat load control bit STO_LC which in turn determines whether or not the "LOAD CONTROL" text is presented on the thermostat display.

The CRITICAL period pending (STATUS$BYTES(0) bit 5) bit is set one hour prior to the start of time period when the utility charges its highest rate for energy (Tier #4). This bit determines the status of the thermostat peak period pending bit (STO_PP) which in turn determines whether or not the associated thermostat LED is flashing. While in Tier #4, the STO_PP bit remains set and the associated LED flashes continuously.

The EMERGENCY HEAT indication (STATUS$BYTES(0) bit 4) bit is set when the controller detects insufficient heating from the primary heat source and activates the auxiliary heating source. If the EMERGENCY HEAT switch on the thermostat is in the ON position, the primary heating stage will never be activated. This bit also determines the status of the thermostat emergency heat bit (STO_EH) which in turn determines whether or not the emergency heat LED is on.

The HOLD HEAT/COOL SETTING indication (STATUS$BYTES(0) bit 3) bit is set whenever an HVAC permanent override exists in the controller. This bit determines the status of the thermostat temperature hold bit (ST1_TH).

The HEAT WATER indication (STATUS$BYTES(0) bit 2) bit is set whenever a water heater override exists in the controller or when the water heater is scheduled to be ON. This bit determines the status of the thermostat heat water bit (ST1_HW).

The price tier indication (STATUS$BYTES(0) bit 1) bit determines the status of the thermostat price tier bit (ST1_PT), such that a bit setting of 0 corresponds to a three tier system and a bit setting of 1 corresponds to a four tier system.

The FILTER indication (STATUS$BYTES(0) bit 0) bit is set when the controller has surpassed the number of runtime hours specified by the configuration data and indicates that the filter for the HVAC system should be changed. This bit determines the status of the thermostat filter status bit (ST1_FL).

The HVAC system active (STATUS$BYTES(1) bit 4) bit informs the thermostat that the HVAC system is active (heating or cooling is presently occurring).

The current tier (STATUS$BYTES(1) bits 3 and 2) bits determine the status of the thermostat current tier bits (ST2_RH, ST2_RL). (00=LOW, 01=MEDIUM, 10=HIGH, 11=CRITICAL). For a price tier setting of 0 (3 tiers), 10 (HIGH) is not a possible setting for the tier bits.

The current time period (STATUS$BYTES(1) bits 1 and 0) bits determine the status of the thermostat current time period bits (ST2_CH, ST2_CL). (00=MORN, 01=DAY, 10=EVENING, 11=NIGHT). The time period bits in turn determine which time period text is displayed on the thermostat display.

Message type C is sent in response to a message type C from the thermostat having a byte count of zero. If the received message has a valid byte count, the data in the data field is stored in the static RAM of the controller and an ACK message is sent to the thermostat. The data (in BCD format) contained in the data field will be the four start times and their associated tier temperatures. As previously discussed, the address determines the proper schedule type (0=WEEKDAY HEATING, WEEKEND HEATING, 2=WEEKDAY COOLING, 3=WEEKEND COOLING).

Message type D is sent in response to a message type D from the thermostat having a byte count of zero. If the received message has a valid byte count, the data in the data field is stored in the static RAM of the controller and an ACK message is sent to the thermostat. The data (BCD format) contained in the data field will be the four start times and stop times for water heating, and the address indicates the proper schedule type (0=WEEKDAY, 1=WEEKEND).

Message type E is sent in response to a message type E from the thermostat having a byte count of zero. If the received message has a valid byte count, the data in the data field is stored in the static RAM of the controller and an ACK message is sent to the thermostat. The data (BCD format) contained in the data field consists of the four daily start times and four daily stop times. The address 0–15 determines which appliance the start and stop times are for, and whether or not the start and stop times are for weekend or weekday.

Message type F is sent in response to a message type F from the thermostat having a byte count of zero. If the received message has a valid byte count, the data in the data field is stored in the static RAM of the controller and an ACK message is sent to the thermostat. The data contained in the data field of this message includes the data shown in Table 23:

TABLE 23

| | |
|---|---|
| HCd | (House Code) Establishes the house code (1–16) for the controller (default = 1). |
| FoC | (Fahrenheit or Celsius) Establishes the temperature format (default = Fahrenheit). |
| CLo | (CLock) Establishes the clock format which can be either 12 or 24 hour format (default = 12 hour). |
| FiL | (FiLter replacement required) Establishes the number of hours before the filter needs a replacement (default 300). |
| End | (WeekEnd day) Establishes the last day of the weekend in numerical form (1-Sunday, . . . 7-Saturday) (default = 1). |
| HPr | (Hot water Preheat 1–8) Establishes the total water preheat by ½ hour intervals up to 4 hrs (default = 2, one hour). |
| HCC | (Minimum Heating/Cooling Cycle off time Establishes the minimum off cycle time between 2 and 5 minutes (default = 5 minutes). |
| ELH | (ELectric Heat) Establishes whether or not the heating system is electric (defaults to 1 (electric heating)). |
| SHr | (Secondary Heat during recovery) Establishes whether or not there is secondary heat to assist in recovering |

TABLE 23-continued

| | |
|---|---|
| | from a temperature drop (1 = recovery, 0 no recovery, and the default = 0). Secondary heat recovery occurs when the heating system does not increase the actual temperature within a specified time. If recovery is set, the secondary heat is turned on if it takes more the (average time to increase 1 degree × 2 + 5) minutes. |
| HEF | (High Efficiency Fan) Establishes whether or not the fan runs after heating or cooling has stopped. If the fan runs it can be set to run within a range of 2-5 minutes. A setting of 0 means the fan does not run after heating or cooling. |
| EHA | (Emergency Heat pump Action) Enables or disables emergency heat pump action (defaults = disable). Emergency heat pump action occurs when the heating system does not increase the actual temperature within (average time to increase 1 degree × 2 + 5) minutes. This will cause the second stage heat to be turned on, the first stage heat to turn off, and the associated emergency heat LED to turn on. |

Message type G is sent in response to a message type G from the thermostat having a byte count of zero. The data contained in message type G includes the data shown in Table 23 which is in BCD format:

TABLE 23

| |
|---|
| Current bill to date based upon variable tier rates. This data represents an estimated bill calculated from the end of the last billing period up to the current day. This calculation utilizes the variable tier rates and energy used during those rate periods. |
| Current bill to date based upon standard price rates. This data represents an estimated bill calculated from the end of the last billing period up to the current day. This calculation utilizes the standard price rates for the total energy used. |
| Forecasted bill. This data is the calculated bill estimate for the billing period based upon an average daily use (minimum of 10 days required) times the billing period (30 days). |
| Total critical tier usage. This data is the total amount of energy (KWH) used during all critical tiers occurring between the start date of the billing and the current date. |
| Total high tier usage. This data is the total amount of energy (KWH) used during all high tiers occurring between the start date of the billing and the current date. |
| Total medium tier usage. This data is the total amount of energy (KWH) used during all medium tiers occurring between the start date of the billing and the current date. |
| Total low tier usage. This data is the total amount of energy (KWH) used during all low tiers occurring between the start date of the billing and the current date. |

Message type J is sent to the thermostat in response to a message from the thermostat that does not request data from the controller.

FIG. 59 illustrates the N/S diagram for the process override message routine. The temporary HVAC override (step 1118), the permanent HVAC override (step 1120), and the electric water heater override (step 1122) are part of the override message routine. The electric water heater override stores the time that the override is started and stopped (step 1124), calculates the stop time of the override using the configuration preheat parameter (step 1126), and inhibits electric water heater optimization until the next stop time has occurred (step 1128).

When either of the HVAC overrides are active (step 1130), the start date and time will be stored in external RAM (step 1132), the setpoint temperature will become the override setpoint (step 1134), the new setpoint flag will be set (step 1136), and if the override is to be permanent (step 1138), the tstat HOLD element will be activated (step 1140). Otherwise, the stop date and time will be stored (step 1142) and the HVAC optimization flag will be set (step 1144).

FIGS. 60A-60C illustrate the N/S diagram for the decode tstat message routine. This routine is called whenever the controller receives a valid message from the thermostat. At that time, the controller activates a 5 minute timer (step 1146) (used to monitor communications) and evaluates the message type (step 1148). For message type B (the most common message type used), the direct load control timer is tested (step 1150). If this timer is active (step 1152), then the shutdown HVAC routine is called (FIG. 61). In response to a message type B received from the thermostat, the controller sends out a time message (type A) (step 1242).

FIG. 61 illustrates the N/S diagram for the shutdown HVAC routine. This routine disables the thermostat temperature timer (step 1154) and tests to see if the HVAC system timer is active (step 1156). If it is not active, this timer is activated (step 1158), the timer expired flag is reset (step 1160), all heating and cooling stages are deenergized (step 1162), the emergency heat required flag is reset and the element for the tstat display is turned off (steps 1164, 1166), and test to see if the fan switch is in the AUTO position (step 1168). If the fan switch is in the AUTO position, then the configuration is tested for the high efficiency fan parameter (step 1170). If the high efficiency fan parameter is enabled, the fan timer is activated (step 1172). Otherwise, the fan is turned off (step 1174).

Referring again to FIGS. 60A-60C, if the direct load control timer is not active (step 1150), then the status of the three position switch (HEAT—OFF—COOL) is stored (step 1176), the current temperature and setpoint temperature (from the thermostat) values are converted from BCD format to binary format (steps 1178, 1180), and a test is performed to see if the mode (HEAT/-COOL) has changed (step 1182). If the mode has changed, an evaluation in accordance with the supplement to decode Tstat message is performed (FIG. 62).

FIGS. 62A-62C illustrate the N/S diagram for the supplement for the message type B received from the thermostat (step 1184). If the current temperature stored in the controller is not equal to the temperature received from the thermostat or the new setpoint flag has been set (step 1186), then the new setpoint flag is reset (step 1188) and analysis is performed on the thermostat temperature and the setpoint temperature. If the thermostat temperature is less than the setpoint temperature (step 1190) and the thermostat is in the HEAT mode (step 1192) and the temperature difference is greater than 1 degree (step 1194), then a first level of heating is activated (step 1196) and the thermostat temperature timer is activated (step 1198). If the temperature difference is greater than 2 degrees (step 1200), then a second level of heating is activated (step 1202). If emergency heat is needed (step 1204), then the first level of heating is deactivated and the second level of heating is activated (step 1206) and the emergency heat element on the tstat display is turned on (step 1208).

When the thermostat temperature is greater than the setpoint temperature (step 1210), the thermostat is in the COOL mode (step 1212) and the temperature difference is greater than 1 degree (step 1214), then a first level of cooling is activated (step 1220) and the thermostat temperature timer is started (step 1216). If the temperature difference is greater than 2 degrees (step 1218), then a second level of cooling is activated (step 1220).

When the thermostat temperature is equal to the setpoint temperature (step 1222), then the HVAC system active flag is reset (step 1224), the update average degree time routine is called to store the average degree time (step 1226), and the shutdown HVAC system routine is called to shutdown the HVAC system (step 1228).

When the HVAC system is active (step 1230) and the thermostat temperature timer has reached its limit (step 1232), then the second level of heating or cooling (step 1234) is started and the thermostat temperature timer is reset (step 1236). Subsequently, if the thermostat temperature timer value is greater than 32 minutes (step 1238), then the thermostat temperature timer is stopped (step 1240).

Referring again to FIGS. 60A-60C, when a type C message is received from the thermostat, a test is performed (step 1244) on the contents of the data field. If the data field is empty, the controller will send a type C message to the thermostat (step 1246). This message will include the HVAC schedule associated with the schedule requested in the address field of the message received from the thermostat. If the data field is not empty, an acknowledge message is sent to the thermostat (step 1248), the HVAC schedules from the data field of the message are loaded into external RAM (step 1250), and the optimization required flag is set (step 1252).

When a type D message is received from the thermostat, a test is performed (step 1254) on the contents of the data field. If the data field is empty, the controller will send a type D message to the thermostat (step 1256). This message will include the electric water heater schedules associated with the schedule requested in the data field of the message received from the thermostat. If the data field is not empty, an acknowledge message is sent to the tstat (step 1258), the electric water heater schedules from the data field are loaded into external RAM (step 1259), and the optimization required flag is set (step 1260).

When a type E message is received from the thermostat, a test is performed (step 1262) on the contents of the data field. If the data field is empty, the controller will send a message type E to the thermostat (step 1264). This message will include the BSR schedules associated with the schedule requested in the data field of the message received from the thermostat. If the data field is not empty, an acknowledge message is sent to the tstat (step 1266), and the BSR schedules are loaded into external RAM (step 1268).

When a type F message is received from the thermostat, a test is performed (step 1270) on the contents of the data field. If the data field is empty, the controller will send a message type F to the thermostat (step 1272). This message will include the configuration data If the data field is not empty, an acknowledge message is sent to the tstat (step 1274), the configuration data is loaded into external RAM (step 1276), and the WHAT DAY IS IT subroutine is called (step 1278).

When a type G message is received from the thermostat, the billing information stored and calculated in the controller is sent to the thermostat (step 1280).

When a type H message is received from the thermostat, the controller sends an acknowledge message (step 1282) and then processes the override information received (step 1284).

When a type I message is received from the thermostat, a test of the data field is performed (step 1286). If the data field contains a request for customer service, a BRICK error message is prepared (step 1288). Otherwise, the default programs are loaded into external RAM (step 1290), any active HVAC overrides are terminated (step 1292), and the optimization required flag is set (step 1294).

FIG. 63 illustrates the N/S diagram for a power down interrupt service routine. When a power failure is detected by the controller, the electric water heater override flag is tested (step 1296), the HVAC override flag is tested (step 1302), and the direct load control flag is tested (step 1312). If an electric water heater override is active, a location in external RAM is loaded with FFH (step 1298). Otherwise, that location is loaded with 0 (step 1300).

If the temporary HVAC override flag is set (step 1302), a 1 is loaded into an external RAM location (step 1304). Otherwise the permanent HVAC override flag is tested (step 1306). If this flag is set, a 2 is loaded into the external RAM location (step 1308) and the setpoint temperature is stored. If neither override flag is set, then a 0 is loaded into the external RAM location (step 1310).

If direct load control is active (step 1312), an external RAM location is loaded with FFH (step 1314). After these flags have been tested, the controller goes into a permanent loop (steps 1316 to 1318) until power down is complete or the main controller watchdog timer is reset when there is not a complete power down.

FIGS. 46A–64C illustrate the N/S diagram for the timer routine used for BSR message generation. This routine determines the amount of time the BSR (X.10) transmitter is activated based upon the type of character (0, 1, or START) transmitted. A 0 character will be generated by the first cycle case (steps 1320 to 1322). A 1 character will be generated by the next cycle case (steps 1324 to 1326). A START character will be generated by the last cycle case (steps 1328 to 1330). When each cycle state is complete (step 1332), the next cycle state is loaded (step 1334). (The steps of the cycle cases are shown in reverse order with respect to FIG. 64, since the cycle state is decremented to 0.)

FIGS. 65A–65B illustrate the N/S diagram for the BRICK message handling interrupt routine. This routine is activated whenever a BRICK byte is received by or transmitted from the controller.

When a BRICK byte is received (step 1336), it is removed from the UART receive buffer and stored in the BRICK message receive buffer (step 1338). If this is the first byte of a message (step 1340), it is validated (step 1342), stored in a byte count register, and added to a checksum total (step 1346). Subsequently, the message buffer pointer is adjusted (step 1348). If this byte is not the first byte of a message, then the byte count register is decremented (step 1350) and tested for 0 (step 1352). If it is 0, then the calculated checksum is complemented (step 1354) and compared to the received message checksum (step 1356). If they match, the received BRICK message flag is set (step 1358). Otherwise, the BRICK itself is reset (step 1360). If the byte count is not 0, then the received byte is added to the checksum total (step 1362) and the message buffer pointer is adjusted (step 1364).

Subsequently, the receive byte interrupt is enabled (step 1366) and the transmit interrupt is tested (step 1368). If the last byte of the message has not been transmitted (step 1370), the byte to transmit is loaded into the UART transmit register (step 1372) and the transmit message buffer pointer is adjusted (step 1374). If the byte count is equal to 0 (step 1376), then the byte count register is loaded (step 1378) since this is the start of a message. If the byte count register is not 0, then the byte count register is decremented (step 1380). If, after decrementing the byte count register, the byte count is 0, the transmit message buffer pointer is cleared (step 1382).

FIGS. 66A–66C illustrate the N/S diagram for the tstat/BSR interrupt routine. This routine handles the zero crossing (based upon the power company 60 hz power supply) interrupt used for BSR message initiation, and the thermostat UART interrupt for thermostat communications.

When a zero crossing interrupt is detected (step 1384), a test is performed on the BSR message in progress flag (step 1386). If this flag is set, the next character to transmit is determined. If a 1 or a START is the next character (step 1388), the BSR transmitter is activated (step 1392), the BSR timer is loaded (step 1394), and the BSR interrupt is enabled (step 1396). If the next character is a 0 (step 1390), the BSR transmitter is turned off (step 1400), the BSR timer is loaded with 8.333 ms (step 1402), and the BSR interrupt is enabled (step 1404). If there is no character to transmit, the BSR transmitter is turned off (step 1406) and the BSR interrupt is disabled (step 1408).

Furthermore, when a zero crossing interrupt occurs, the BSR message pointer is then advanced (step 1410) and tested for a value greater than 63 (step 1412). If the value is greater than 63, the BSR message in progress flag is reset (step 1414). Otherwise, the next character type is loaded (step 1416) and prepared for transmission to the BSR device (step 1418).

Subsequently, the zero crossing interrupt is cleared (step 1422) and the thermostat message timer flag is tested (step 1420). If the timer flag is set, the thermostat message timer is incremented (step 1424). The thermostat message timer is then tested for a value of at least three (thermostat messages received) (step 1426). If the timer has value of 3, then the thermostat message timer is reset (step 1428). This timer is used to resynchronize the communications between the thermostat and the controller.

A seconds timer is then incremented (step 1430) and when it reaches 0 (step 1432), the seconds flag is set (step 1434) and the seconds timer is reloaded (step 1436). The UART associated with the thermostat is next tested. If an interrupt has been detected (step 1438), the type of interrupt received is determined.

When a transmit interrupt occurs (type 1), the transmit buffer pointer is tested for a value of 0 (step 1440). If the buffer is 0, the transmit data empty interrupt is disabled (step 1442). Otherwise, the next byte to be transmitted is loaded (step 1444) and the transmit buffer pointer is incremented (step 1446). If the message byte count is 0 which indicates that there is a new message to transmit (step 1448), the byte count is loaded (step 1450). Otherwise, the byte count is decremented (step 1452) and tested again for 0 (step 1454). If the byte count is 0, the transmit buffer pointer is cleared (step 1456).

When a receive interrupt occurs (type 2), the thermostat message timer flag is tested (step 1458). If this flag is reset, the received byte at the UART is stored in the thermostat receive message buffer (step 1460) and the byte count register is tested for 0 (step 1462). If the byte count register is 0, the byte received is tested for a valid value (step 1464) since the byte could be the byte count for a new message. If the value is valid, then the byte count register is loaded (step 1466). Otherwise, a timer for resynchronization is activated (step 1468).

When the byte count register is not zero, the byte count register is decremented (step 1470) and tested again for 0 (step 1472). If the byte count register is not 0, then the received byte value is added to the checksum register (step 1476). Otherwise, the checksum received is compared to the checksum calculated (step 1474). If the checksums match, the valid thermostat message flag is set. Otherwise, a timer for resynchronization is activated (step 1478).

When type 3 interrupt is detected, bad communications between the thermostat and controller has occurred (step 1480).

FIG. 68 illustrates the N/S diagram for the conversion of a binary number to a binary coded decimal (BCD) number. For example, for the decimal number 95, the eight bit binary representation would be 0101 1111 and the BCD representation after the conversion would be 1001 0101. The first nibble represents the tens portion of the number (1001=8+1=9) and the second nibble represents the ones portion (0101=4+1=5).

Initially the tens and ones byte of the BCD number buffer are cleared (steps 1482, 1484). The binary number to be converted is first tested for a value greater than 63H (99 decimal) (step 1486). If the number is greater than 63H, the binary number cannot be converted and the BCD number returned includes a FFH in the tens byte (step 1488) which indicates an invalid number.

If the binary number is valid (less than or equal to 63H), the low nibble is masked off (step 1490), and the decimal equivalent for each bit set in the high nibble are summed in their BCD form (two nibbles each) (step 1492). Next, the high nibble of the sum is masked off (step 1494), and the low nibble of the sum is check to see if it is greater than 9 (step 1496). If the low nibble of the sum is greater than 9, a 0000 1010 (10 decimal in binary form) is subtracted from the sum (step 1498) and a 0001 0000 (10 decimal in BCD form) is added to the sum (step 1500).

Next, the high nibble of the binary number is masked off (step 1502) and the adjust units routine, FIG. 67 is called (step 1503). The adjust units routine checks to see if it is greater than 9, (step 1505). If the low nibble is greater than 9, a 1010 is subtracted from the low nibble (step 1507) and a 0001 0000 is added (step 1509) to the high nibble of the BCD number which corresponds to the manipulation of the high nibble of the original number. Next, the result of subtracting 1010 from the low nibble is added to the low nibble of the 2 nibble BCD number which corresponds to the manipulation of the high nibble to provide an intermediate sum (step 1511).

The low nibble of the intermediate sum is also checked to see if it is greater than 9 (step 1504). If the low nibble is greater than 9, a 1010 is subtracted from the low nibble (step 1506) and a 0001 0000 is added (step 1508) to the high nibble of the intermediate sum to provide the BCD number (step 1510) which corresponds to the original binary number.

The following example illustrates the conversion of 95 decimal represented in binary form to 95 decimal represented in BCD form.

| | | |
|---|---|---|
| | 0101 1111 | Binary representation of 95. |
| (step 1490) | 0101 0000 | Binary representation of 95, wherein the low nibble is masked. |
| (step 1492) | 0110 0100 | Add 64 in BCD form to 16 in |
| | −0001 0110 | BCD form. |
| | 0111 1010 | |
| (step 1498) | 0111 1010 | Since the low byte is 10 |
| | −0000 1010 | decimal, 1010 must be |
| | 0111 0000 | subtracted from the low byte. |
| (step 1500) | '0111 0000 | Since the low byte was |
| | +0001 0000 | greater than 9 and 1010 was |
| | 1000 0000 | subtracted from the low byte, a 0001 0000 is added to the high byte. |
| (step 1502) | 0000 1111 | Binary representation of 95, wherein the high nibble is masked. |
| (step 1506) | 0000 1111 | Since the low byte is 15 |
| | −0000 1010 | decimal, 1010 must be |
| | 0000 0101 | subtracted from the low byte. |
| (step 1508) | 1000 0000 | Since the low byte was |
| | +0001 0000 | greater than 9 and 1010 was |
| | 1001 0000 | subtracted from the low byte, a 0001 0000 is added to the sum from step 1500. |
| (step 1510) | 0000 0101 | The result of step 1506 is |
| | +1001 0000 | added to the sum of step |
| | 1001 0101 | 1508 to produce the BCD representation of 95 decimal. |

FIG. 69 illustrates the N/S diagram for the conversion of a BCD number to a binary number. The ones digit of the number is stored (step 1512) and the bits of the ten nibble are tested. For each set bit, the appropriate binary number is added to the ones digit (step 1514).

FIG. 70 illustrates the N/S diagram for the generation of a checksum. This routine is called when a thermostat or BRICK message has been built and is ready to be transmitted. The checksum is the last byte in the message. The message for transmission is loaded into a buffer (step 1516) and the bytes of the message are totaled (steps 1518 to 1520). Subsequently, 1 is added to the complement of the sum (step 1522), and the checksum is returned to the requesting routine (step 1524).

FIGS. 71A-71B illustrate the N/S diagram for the load program routine. This routine loads the HVAC schedules, electric water heater programs, BSR device programs, and configuration data into the external RAM of the controller. When this data is provided by the thermostat (step 1526), the data is moved into the program buffer (step 1528) and a test is performed to determine what type of programming is being requested.

When the controller has a cold start, a test is performed to determine if the BSR default schedules are to be loaded (step 1532) when the default schedules (message type A) are loaded (step 530). If the flag is set, the BSR schedules are loaded into external RAM (step 1534) and all the schedule data flags are set (steps 1536 to 1538).

When the HVAC schedules are selected (message type C), the HVAC schedules are stored in external RAM (step 1540) and the HVAC data flag is set (step 1542).

When the electric water heater schedules are selected (message type D), the electric water heater schedules are stored in external RAM (step 1544) and the electric water heater data flag is set (step 1546).

When the BSR device schedules are selected (message type E), the BSR device schedules are stored in external RAM (step 1548) and the BSR device data flag is set (step 1550).

When the configuration data is selected (message type F), the configuration data is stored in external RAM (step 1552) and the configuration data flag is set (step 1554).

When any of the data flags are set (step 1556), the data to burn flag is set (step 1558). Otherwise, the data to burn flag is reset (step 1560).

After loading all the appropriate data into RAM, the load programs routine calculates checksum of the data and compares the calculated checksum to the checksum byte of the data (step 1562). The checksum is recalculated to maintain data integrity.

FIGS. 72-72C illustrate the N/S diagram for the write to EEPROM routine. This routine is called whenever the data to burn flag is set. For each flag that is set, a comparison is made between the data in external RAM and the corresponding data in EEPROM. When a difference is found, the byte from external RAM is written into EEPROM. If no difference is found, the data flag will be reset and the next data flag will be tested. When all the data flags are reset, the checksum of the data in the EEPROM will be calculated and stored in EEPROM (step 1582).

When the next byte is to be tested (step 1564), a search is performed on the data flags that were set in the load program routine. When a data flag is set (HVAC, EWH, BSR, or Configuration) (steps 1566-1572), the data in external RAM is compared to the corresponding data in the EEPROM (steps 1574-1580). If the data is the same, the corresponding data flag is reset and the next data flag is tested. If the data does not match, the data to burn flag is set, the find next byte to write flag is reset, and the byte from external RAM is loaded into EEPROM.

FIG. 73 illustrates the N/S diagram for the diagnostic test performed on the controller during manufacturing.

During the test, all HVAC schedule times are modified to be one minute greater than their default times (step 1582). These new schedules are loaded into external RAM and burned in EEPROM (step 1584). The BRICK on the controller is reset (step 1586) and the on-board relays and a BSR device address #1 are cycled on an off at 2 second intervals for two complete cycles (step 1588 to 1590).

At the end of the test, the BRICK OK flag is set (step 1592) and the controller loops until the watchdog timer expires (step 1594). When the watchdog timer expires, the controller begins its normal operation.

While the invention has been described in reference to preferred embodiments, it is apparent that modifications and improvements will occur to those of skill in the art, and the invention is intended to cover such modifications and improvements which fall within the spirit and scope of the appended claims.

APPENDIX A

```
INPUT MODULE LIST :
 SUBS.REL        (SUBS)
 OUTDIS.REL      (OUTDIS)
 COMPMI.REL      (COMPMI)
 DISSUBS.REL     (DISSUBS)
 TSTATSYS.REL    (TSTATSYS)
 MAINSUBS.REL    (MAINSUBS)


LOAD MODULE LIST :
 TSTATSYS.LNK    (SUBS)


SEGMENT LINK MAP FOR TSTATSYS.LNK (SUBS)

MAP OF ROM AREA :

              BASE   LENGTH   MODULE NAME   SEGMENT NAME (TYPE)
              ----   ------   -----------   -------------------------
              0000H   0002H   TSTATSYS                    (ABSOLUTE)
              0002H   0002H   TSTATSYS                    (ABSOLUTE)
              0004H   0002H                 ** GAP **
              0006H   0002H   TSTATSYS                    (ABSOLUTE)
              0008H   0002H   TSTATSYS                    (ABSOLUTE)
              000AH   0002H   TSTATSYS                    (ABSOLUTE)
              000CH   0014H                 ** GAP **
```

| | | | | |
|---|---|---|---|---|
| 0020H | 0024H | TSTATSYS | GTSEG | (IENT) |
| 0044H | 05FBH | MAINSUBS | CMSUBS | (SENT) |
| 063FH | 0231H | SUBS | CSUBS | (INBLOCK) |
| 0870H | 0090H | | ** GAP ** | |
| 0900H | 04A7H | OUTDIS | COUT | (ABSOLUTE) |
| 0DA7H | 0191H | TSTATSYS | COSEG | (INBLOCK) |
| 0F38H | 083EH | DISSUBS | DSUBS | (XBLOCK) |
| 1776H | 06DFH | COMPMI | CPMI | (XBLOCK) |
| 1E55H | 012BH | | ** GAP ** | |

MAP OF RAM AREA :

| TYPE | BASE | LENGTH | MODULE NAME | SEGMENT NAME |
|---|---|---|---|---|
| | 0000H | 0010H | | ** GAP ** |
| DATA | 0010H | 006EH | TSTATSYS | DOSEG |
| | 007EH | 0050H | | ** GAP ** |
| STACK | 00CEH | 0032H | SUBS | SSEG |
| DATA | 0100H | 00CEH | TSTATSYS | D1SEG |
| | 01CEH | 0032H | | ** GAP ** |

PUBLIC SYMBOL LIST FOR TSTATSYS.LN

| TYPE | VALUE | MODULE | SYMBOL NAME |
|---|---|---|---|
| CODE | 0695H | SUBS | ADCDBL |
| CODE | 002EH | TSTATSYS | ADDBYT |
| CODE | 0676H | SUBS | ADDBYTE |
| CODE | 0677H | SUBS | ADDCY |
| CODE | 0684H | SUBS | ADDS_DEX |
| BIT | 00FCH.2 | OUTDIS | AM2 |
| BIT | 00FDH.1 | OUTDIS | AM3 |
| CODE | 0044H | MAINSUBS | AMACOM |
| BIT | 00E4H.0 | OUTDIS | APPL |
| DATA | 0063H | TSTATSYS | APPNUM |
| CODE | 069FH | SUBS | BCD2BIN |
| BIT | 00FEH.0 | OUTDIS | BEGIN |
| CODE | 12BEH | DISSUBS | BILINF |
| BIT | 00E8H.0 | OUTDIS | BILL |
| CODE | 06C3H | SUBS | BIN2BCD |
| CODE | 082CH | SUBS | BUF2C |
| CODE | 084EH | SUBS | BUF2F |
| CODE | 0DA7H | TSTATSYS | COSEG |
| CODE | 07F0H | SUBS | C2F |
| CODE | 002AH | TSTATSYS | CLMBE |
| CODE | 0F90H | DISSUBS | CLN |
| CODE | 0034H | TSTATSYS | CLRSCR |
| CODE | 0F38H | DISSUBS | CLS |
| CODE | 0044H | MAINSUBS | CMSUBS |
| DATA | 0020H | TSTATSYS | CNTSET |
| DATA | 007BH | TSTATSYS | CNT_FG |
| BIT | 007BH.0 | TSTATSYS | CNT_FL |
| BIT | 007BH.2 | TSTATSYS | CNT_HW |
| BIT | 007BH.1 | TSTATSYS | CNT_PT |
| BIT | 007BH.3 | TSTATSYS | CNT_TH |
| BIT | 007AH.1 | TSTATSYS | CNT_ZZ |
| BIT | 00ECH.0 | OUTDIS | COLON1 |

| | | | |
|---|---|---|---|
| BIT | 00FEH.2 | OUTDIS | COLON2 |
| BIT | 00FEH.3 | OUTDIS | COLON3 |
| CODE | 095CH | OUTDIS | CONFIG |
| CODE | 1776H | CONPMI | CONPMI |
| CODE | 0900H | OUTDIS | COUT |
| CODE | 1776H | CONPMI | CPMI |
| BIT | 00F8H.0 | OUTDIS | CRIT |
| BIT | 00E1H.3 | OUTDIS | CSETNG |
| CODE | 063FH | SUBS | CSUBS |
| DATA | 0022H | TSTATSYS | CTEMP |
| DATA | 0010H | TSTATSYS | D0SEG |
| DATA | 0100H | TSTATSYS | D1SEG |
| BIT | 0078H.1 | TSTATSYS | DATAFG |
| BIT | 00E0H.2 | OUTDIS | DAY |
| BIT | 00FDH.2 | OUTDIS | DEGC |
| BIT | 00FDH.3 | OUTDIS | DEGF |
| CODE | 0028H | TSTATSYS | DINCSHL |
| CODE | 064EH | SUBS | DINCS_HL |
| CODE | 0A58H | OUTDIS | DISHRS |
| CODE | 071DH | SUBS | DIV16 |
| DATA | 002AH | TSTATSYS | DIVA |
| DATA | 002EH | TSTATSYS | DIVB |
| CODE | 168FH | DISSUBS | DNCON |
| CODE | 0FF5H | DISSUBS | DNSTPT |
| CODE | 074CH | SUBS | DOCHKSM |
| BIT | 00FCH.0 | OUTDIS | DP2 |
| CODE | 0A3BH | OUTDIS | DSD2SG |
| CODE | 0A24H | OUTDIS | DSP2SG |
| CODE | 091CH | OUTDIS | DSPSEG |
| CODE | 0F38H | DISSUBS | DSUBS |
| BIT | 007AH.2 | TSTATSYS | ERR_TON |
| BIT | 00E0H.3 | OUTDIS | EVE |
| CODE | 07BCH | SUBS | F2C |
| DATA | 01C0H | TSTATSYS | FLASH1 |
| DATA | 01C2H | TSTATSYS | FLASH2 |
| CODE | 012BH | MAINSUBS | FMCMSG |
| DATA | 0064H | TSTATSYS | FMCQUE |
| DATA | 0024H | TSTATSYS | FTEMP |
| CODE | 03DBH | MAINSUBS | GETKEY |
| CODE | 02DFH | MAINSUBS | GETTMP |
| CODE | 0020H | TSTATSYS | GTSEG |
| BIT | 00E1H.2 | OUTDIS | HSETNG |
| BIT | 00E2H.1 | OUTDIS | HTWATER |
| CODE | 1224H | DISSUBS | IHOURS |
| CODE | 126BH | DISSUBS | IMINS |
| CODE | 0026H | TSTATSYS | INCSHL |
| CODE | 0649H | SUBS | INCS_HL |
| CODE | 063FH | SUBS | INITBLK |
| CODE | 14BFH | DISSUBS | INTAPP |
| BIT | 007AH.0 | TSTATSYS | KEY_HLD |
| BIT | 00FAH.0 | OUTDIS | KWH |
| DATA | 01CCH | TSTATSYS | LC_CNT |
| BIT | 00FBH.3 | OUTDIS | LDOLR |
| BIT | 00F6H.0 | OUTDIS | LEND |
| BIT | 00F4H.0 | OUTDIS | LHIGH |
| BIT | 00FBH.0 | OUTDIS | LLOW |
| DATA | 007CH | TSTATSYS | LST_KEY |
| BIT | 00F0H.0 | OUTDIS | MEDIUM |
| CODE | 13FBH | DISSUBS | MLEFT |

| | | | |
|---|---|---|---|
| CODE | 14DAH | DISSUBS | MODOFF |
| BIT | 00E0H.1 | OUTDIS | MORN |
| CODE | 1385H | DISSUBS | MRIGHT |
| CODE | 1171H | DISSUBS | MSGCTR |
| CODE | 06E8H | SUBS | MULT8 |
| DATA | 0026H | TSTATSYS | MULTA |
| DATA | 0028H | TSTATSYS | MULTB |
| CODE | 0038H | TSTATSYS | MUSTXA |
| CODE | 003CH | TSTATSYS | MUXAHL |
| CODE | 0036H | TSTATSYS | MXA@HL |
| CODE | 003EH | TSTATSYS | MXA_00 |
| CODE | 0040H | TSTATSYS | MXA_01 |
| CODE | 0042H | TSTATSYS | MXA_A0 |
| NUMBER | 00E3H | OUTDIS | N1 |
| NUMBER | 00F7H | OUTDIS | N11 |
| NUMBER | 00F9H | OUTDIS | N12 |
| NUMBER | 00E5H | OUTDIS | N2 |
| NUMBER | 00E7H | OUTDIS | N3 |
| NUMBER | 00E9H | OUTDIS | N4 |
| NUMBER | 00EBH | OUTDIS | N5 |
| NUMBER | 00EFH | OUTDIS | N7 |
| NUMBER | 00F3H | OUTDIS | N9 |
| BIT | 00FFH.2 | OUTDIS | NA |
| BIT | 00FFH.3 | OUTDIS | NIGHT |
| BIT | 007AH.3 | TSTATSYS | NO_EHW |
| NUMBER | 0010H | TSTATSYS | NRM_TIM |
| CODE | 14E2H | DISSUBS | NXTAPP |
| CODE | 151BH | DISSUBS | NXTPRD |
| DATA | 001CH | TSTATSYS | OLDTMP |
| CODE | 1030H | DISSUBS | OPTIM |
| NUMBER | 00DFH | TSTATSYS | OPT_CNT |
| CODE | 0AE7H | OUTDIS | OUTDIS |
| BIT | 00FCH.1 | OUTDIS | PM2 |
| BIT | 00FDH.0 | OUTDIS | PM3 |
| DATA | 0180H | TSTATSYS | PMIBUF |
| DATA | 01CAH | TSTATSYS | PM_PNT |
| DATA | 01C8H | TSTATSYS | PM_PRD |
| BIT | 00EAH.0 | OUTDIS | PRICE |
| DATA | 0140H | TSTATSYS | RCXMB |
| DATA | 0074H | TSTATSYS | RDATA |
| DATA | 01C4H | TSTATSYS | REST1 |
| DATA | 01C6H | TSTATSYS | REST2 |
| NUMBER | 0008H | TSTATSYS | RPT_TIM |
| DATA | 0060H | TSTATSYS | RP_CNT |
| CODE | 0F5DH | DISSUBS | SCDREQ |
| CODE | 0032H | TSTATSYS | SCDRST |
| CODE | 0020H | TSTATSYS | SEL0 |
| CODE | 0022H | TSTATSYS | SEL1 |
| CODE | 0024H | TSTATSYS | SEL15 |
| BIT | 00E1H.1 | OUTDIS | SETNG |
| DATA | 001EH | TSTATSYS | SETPNT |
| DATA | 0078H | TSTATSYS | SIOF |
| CODE | 045BH | MAINSUBS | SLFTST |
| CODE | 02A7H | MAINSUBS | SNDTMP |
| BIT | 0012H.0 | TSTATSYS | STO_EH |
| BIT | 0012H.2 | TSTATSYS | STO_LC |
| BIT | 0012H.1 | TSTATSYS | STO_PP |
| BIT | 0012H.3 | TSTATSYS | STO_WE |

| | | | |
|---|---|---|---|
| BIT | 0013H.0 | TSTATSYS | ST1_FL |
| BIT | 0013H.2 | TSTATSYS | ST1_HW |
| BIT | 0013H.1 | TSTATSYS | ST1_PT |
| BIT | 0013H.3 | TSTATSYS | ST1_TH |
| BIT | 0014H.1 | TSTATSYS | ST2_CH |
| BIT | 0014H.0 | TSTATSYS | ST2_CL |
| BIT | 0014H.3 | TSTATSYS | ST2_RH |
| BIT | 0014H.2 | TSTATSYS | ST2_RL |
| BIT | 0015H.3 | TSTATSYS | ST3_BC |
| BIT | 0015H.0 | TSTATSYS | ST3_BS |
| BIT | 0015H.1 | TSTATSYS | ST3_C |
| BIT | 0015H.2 | TSTATSYS | ST3_CL |
| BIT | 0016H.3 | TSTATSYS | ST4_AP |
| BIT | 0016H.2 | TSTATSYS | ST4_BI |
| BIT | 0016H.0 | TSTATSYS | ST4_FC |
| BIT | 0016H.1 | TSTATSYS | ST4_FT |
| BIT | 01CDH.1 | TSTATSYS | ST5_FL |
| BIT | 01CDH.3 | TSTATSYS | ST5_FW |
| BIT | 01CDH.2 | TSTATSYS | ST5_HC |
| BIT | 01CDH.0 | TSTATSYS | ST5_RC |
| DATA | 0100H | | STACK |
| DATA | 0010H | TSTATSYS | STATE |
| DATA | 0012H | TSTATSYS | STATUS0 |
| DATA | 0013H | TSTATSYS | STATUS1 |
| DATA | 0014H | TSTATSYS | STATUS2 |
| CODE | 002CH | TSTATSYS | STMBE |
| BIT | 0078H.3 | TSTATSYS | STOPFG |
| BIT | 0078H.2 | TSTATSYS | STRTFG |
| CODE | 0030H | TSTATSYS | SUBSXD |
| CODE | 0657H | SUBS | SUBS_XAD |
| DATA | 0017H | TSTATSYS | SW1 |
| BIT | 0017H.2 | TSTATSYS | SW1_CL |
| BIT | 0017H.0 | TSTATSYS | SW1_EH |
| BIT | 0017H.1 | TSTATSYS | SW1_FA |
| BIT | 0017H.3 | TSTATSYS | SW1_HT |
| DATA | 0076H | TSTATSYS | TDATA |
| CODE | 10D1H | DISSUBS | TEMPDN |
| CODE | 1064H | DISSUBS | TEMPUP |
| DATA | 0062H | TSTATSYS | TIMCNT |
| BIT | 00E6H.0 | OUTDIS | TIME |
| DATA | 0018H | TSTATSYS | TIMEHR |
| DATA | 001AH | TSTATSYS | TIMEMIN |
| BIT | 00FCH.3 | OUTDIS | TO |
| BIT | 0078H.0 | TSTATSYS | TRFG |
| DATA | 0100H | TSTATSYS | TRXMB |
| DATA | 0030H | TSTATSYS | TSB |
| DATA | 0034H | TSTATSYS | TSB1PA |
| DATA | 0031H | TSTATSYS | TSB1RP |
| BIT | 0030H.2 | TSTATSYS | TSB1S |
| BIT | 0030H.3 | TSTATSYS | TSB1T |
| DATA | 0032H | TSTATSYS | TSB1TM |
| DATA | 003AH | TSTATSYS | TSB2PA |
| DATA | 0037H | TSTATSYS | TSB2RP |
| BIT | 0036H.2 | TSTATSYS | TSB2S |
| BIT | 0036H.3 | TSTATSYS | TSB2T |
| DATA | 0038H | TSTATSYS | TSB2TM |
| DATA | 003DH | TSTATSYS | TSB3RP |
| BIT | 003CH.2 | TSTATSYS | TSB3S |

```
BIT     003CH.3  TSTATSYS  TSB3T
DATA    003EH    TSTATSYS  TSB3TM
DATA    0043H    TSTATSYS  TSB4RP
BIT     0042H.2  TSTATSYS  TSB4S
BIT     0042H.3  TSTATSYS  TSB4T
DATA    0044H    TSTATSYS  TSB4TM
DATA    0049H    TSTATSYS  TSB5RP
BIT     0048H.2  TSTATSYS  TSB5S
BIT     0048H.3  TSTATSYS  TSB5T
DATA    004AH    TSTATSYS  TSB5TM
DATA    0052H    TSTATSYS  TSB6PA
DATA    004FH    TSTATSYS  TSB6RP
BIT     004EH.2  TSTATSYS  TSB6S
BIT     004EH.3  TSTATSYS  TSB6T
DATA    0050H    TSTATSYS  TSB6TM
DATA    0058H    TSTATSYS  TSB7PA
DATA    0055H    TSTATSYS  TSB7RP
BIT     0054H.2  TSTATSYS  TSB7S
BIT     0054H.3  TSTATSYS  TSB7T
DATA    0056H    TSTATSYS  TSB7TM
DATA    005EH    TSTATSYS  TSB8PA
DATA    005BH    TSTATSYS  TSB8RP
BIT     005AH.2  TSTATSYS  TSB8S
BIT     005AH.3  TSTATSYS  TSB8T
DATA    005CH    TSTATSYS  TSB8TM
CODE    15E6H    DISSUBS   UPCON
CODE    0FC2H    DISSUBS   UPSTPT
CODE    077AH    SUBS      VCHKSMS
BIT     00E1H.0  OUTDIS    WEEKDAY
BIT     00E0H.0  OUTDIS    WEEKEND
CODE    003AH    TSTATSYS  XCXADE


SYMBOL LIST FOR TSTATSYS.LNK

TYPE    VALUE    ATTRIBUTE NAME
----    -----    --------- ----

----    -----    MODULE    SUBS
CODE    0695H    PUBLIC    ADCDBL
CODE    0676H    PUBLIC    ADDBYTE
CODE    0677H    PUBLIC    ADDCY
CODE    0684H    PUBLIC    ADDS_DEX
CODE    06ACH    SYMBOL    BCD1
CODE    06B5H    SYMBOL    BCD2
CODE    069FH    PUBLIC    BCD2BIN
CODE    06E4H    SYMBOL    BIEND
CODE    06E2H    SYMBOL    BIERROR
CODE    06CBH    SYMBOL    BILP
CODE    06C3H    PUBLIC    BIN2BCD
CODE    082CH    PUBLIC    BUF2C
CODE    0832H    SYMBOL    BUF2CA
CODE    0834H    SYMBOL    BUF2CL
CODE    084EH    PUBLIC    BUF2F
CODE    0854H    SYMBOL    BUF2FA
CODE    0856H    SYMBOL    BUF2FL
CODE    07F0H    PUBLIC    C2F
CODE    081AH    SYMBOL    C2F1
```

| | | | |
|---|---|---|---|
| CODE | 081DH | SYMBOL | C2F2 |
| CODE | 0820H | SYMBOL | C2FX |
| CODE | 063FH | PUBLIC | CSUBS |
| CODE | 064EH | PUBLIC | DINCS_HL |
| CODE | 071DH | PUBLIC | DIV16 |
| CODE | 073EH | SYMBOL | DIVGO |
| CODE | 073DH | SYMBOL | DIVINC |
| CODE | 072DH | SYMBOL | DIVLP |
| CODE | 0652H | SYMBOL | DNCC1 |
| CODE | 0655H | SYMBOL | DNCCON |
| CODE | 074CH | PUBLIC | DOCHKSM |
| CODE | 075EH | SYMBOL | DOCK1 |
| CODE | 0770H | SYMBOL | DONE1 |
| CODE | 07BCH | PUBLIC | F2C |
| CODE | 07EAH | SYMBOL | F2C1 |
| CODE | 07ECH | SYMBOL | F2CX |
| CODE | 064CH | SYMBOL | INCCON |
| CODE | 0649H | PUBLIC | INCS_HL |
| CODE | 063FH | SYMBOL | INIT1 |
| CODE | 063FH | PUBLIC | INITBLK |
| CODE | 0644H | SYMBOL | INTCON |
| CODE | 070EH | SYMBOL | MNOCY |
| CODE | 0710H | SYMBOL | MNOCY1 |
| CODE | 06F5H | SYMBOL | MULP |
| CODE | 06E8H | PUBLIC | MULT8 |
| CODE | 0669H | SYMBOL | SBRW |
| CODE | 0665H | SYMBOL | SUBCON |
| CODE | 066EH | SYMBOL | SUBRET |
| CODE | 0657H | PUBLIC | SUBS_XAD |
| CODE | 07A8H | SYMBOL | VCHKM |
| CODE | 077AH | PUBLIC | VCHKSMS |
| CODE | 07B5H | SYMBOL | VRET |
| CODE | 07AEH | SYMBOL | VRETS |
| BIT | 0001H.3 | SYMBOL | XNEG |
| ---- | ----- | MODULE | OUTDIS |
| BIT | 00FBH.2 | SYMBOL | AM1 |
| BIT | 00FCH.2 | PUBLIC | AM2 |
| BIT | 00FDH.1 | PUBLIC | AM3 |
| BIT | 00E4H.0 | PUBLIC | APPL |
| BIT | 00FEH.0 | PUBLIC | BEGIN |
| BIT | 00E8H.0 | PUBLIC | BILL |
| CODE | 0900H | SYMBOL | CHRTAB |
| BIT | 00ECH.0 | PUBLIC | COLON1 |
| BIT | 00FEH.2 | PUBLIC | COLON2 |
| BIT | 00FEH.3 | PUBLIC | COLON3 |
| CODE | 09CDH | SYMBOL | CONC1A |
| CODE | 09D4H | SYMBOL | CONC2 |
| CODE | 09E2H | SYMBOL | CONC2A |
| CODE | 09E8H | SYMBOL | CONC3 |
| CODE | 09F9H | SYMBOL | CONC4 |
| CODE | 0A05H | SYMBOL | CONC4A |
| CODE | 0A0FH | SYMBOL | CONC5 |
| CODE | 095CH | PUBLIC | CONFIG |
| CODE | 0997H | SYMBOL | CONGO |
| CODE | 0988H | SYMBOL | CONLD |
| CODE | 0966H | SYMBOL | CONLP |
| CODE | 0980H | SYMBOL | CONLP1 |

| | | | |
|---|---|---|---|
| CODE | 0A15H | SYMBOL | CONOU1 |
| CODE | 0A14H | SYMBOL | CONOUT |
| CODE | 0938H | SYMBOL | CONTAB |
| CODE | 0A1DH | SYMBOL | CONXIT |
| CODE | 0900H | PUBLIC | COUT |
| BIT | 00F8H.0 | PUBLIC | CRIT |
| BIT | 00E1H.3 | PUBLIC | CSETNG |
| BIT | 00E0H.2 | PUBLIC | DAY |
| BIT | 00FDH.2 | PUBLIC | DEGC |
| BIT | 00FDH.3 | PUBLIC | DEGF |
| CODE | 0A58H | PUBLIC | DISHRS |
| BIT | 00FEH.1 | SYMBOL | DP1 |
| BIT | 00FCH.0 | PUBLIC | DP2 |
| CODE | 0A3BH | PUBLIC | DSD2SG |
| CODE | 0A24H | PUBLIC | DSP2SG |
| CODE | 091CH | PUBLIC | DSPSEG |
| CODE | 0B06H | SYMBOL | EH_OFF |
| BIT | 00E0H.3 | PUBLIC | EVE |
| BIT | 00F2H.0 | SYMBOL | FILTER |
| BIT | 00E2H.2 | SYMBOL | HOLD1 |
| BIT | 00E2H.3 | SYMBOL | HOLD2 |
| BIT | 00E1H.2 | PUBLIC | HSETNG |
| BIT | 00E2H.1 | PUBLIC | HTWATER |
| BIT | 00FAH.0 | PUBLIC | KWH |
| BIT | 00E2H.0 | SYMBOL | LDCNTRL |
| BIT | 00FBH.3 | PUBLIC | LDOLR |
| BIT | 00F6H.0 | PUBLIC | LEND |
| BIT | 00F4H.0 | PUBLIC | LHIGH |
| BIT | 00FBH.0 | PUBLIC | LLOW |
| BIT | 00F0H.0 | PUBLIC | MEDIUM |
| BIT | 00E0H.1 | PUBLIC | MORN |
| NUMBER | 00E3H | PUBLIC | N1 |
| NUMBER | 00F5H | SYMBOL | N10 |
| NUMBER | 00F7H | PUBLIC | N11 |
| NUMBER | 00F9H | PUBLIC | N12 |
| NUMBER | 00E5H | PUBLIC | N2 |
| NUMBER | 00E7H | PUBLIC | N3 |
| NUMBER | 00E9H | PUBLIC | N4 |
| NUMBER | 00EBH | PUBLIC | N5 |
| NUMBER | 00EDH | SYMBOL | N6 |
| NUMBER | 00EFH | PUBLIC | N7 |
| NUMBER | 00F1H | SYMBOL | N8 |
| NUMBER | 00F3H | PUBLIC | N9 |
| BIT | 00FFH.2 | PUBLIC | NA |
| BIT | 00FFH.3 | PUBLIC | NIGHT |
| CODE | 0B13H | SYMBOL | ODCK0 |
| CODE | 0B0FH | SYMBOL | ODCK5 |
| CODE | 0BDFH | SYMBOL | ODCL |
| CODE | 0B2DH | SYMBOL | ODCL0 |
| CODE | 0B6CH | SYMBOL | ODDGF |
| CODE | 0C3EH | SYMBOL | ODEV |
| CODE | 0D46H | SYMBOL | ODEXIT |
| CODE | 0B2FH | SYMBOL | ODG0 |
| CODE | 0BD9H | SYMBOL | ODH1F |
| CODE | 0C02H | SYMBOL | ODH2F |
| CODE | 0BB5H | SYMBOL | ODHC |
| CODE | 0C48H | SYMBOL | ODHI |
| CODE | 0B20H | SYMBOL | ODHOP |

| | | | |
|---|---|---|---|
| CODE | 0AFEH | SYMBOL | ODLDFF |
| CODE | 0AFDH | SYMBOL | ODLDON |
| CODE | 0B97H | SYMBOL | ODLF |
| CODE | 0B99H | SYMBOL | ODLF1 |
| CODE | 0C61H | SYMBOL | ODLO |
| CODE | 0C53H | SYMBOL | ODLOM |
| CODE | 0CA7H | SYMBOL | ODMO |
| CODE | 0C99H | SYMBOL | ODMOD |
| CODE | 0BA6H | SYMBOL | ODNFL |
| CODE | 0C08H | SYMBOL | ODNHC |
| CODE | 0CC6H | SYMBOL | ODNHP |
| CODE | 0C2EH | SYMBOL | ODNHW |
| CODE | 0BA9H | SYMBOL | ODNLC |
| CODE | 0CB9H | SYMBOL | ODNOFL |
| CODE | 0AF5H | SYMBOL | ODNTPK |
| CODE | 0B00H | SYMBOL | ODNXT |
| CODE | 0B08H | SYMBOL | ODNXT1 |
| CODE | 0B3AH | SYMBOL | ODNXT2 |
| CODE | 0B4CH | SYMBOL | ODNXT4 |
| CODE | 0CD4H | SYMBOL | ODNZ0 |
| CODE | 0CDFH | SYMBOL | ODNZ1 |
| CODE | 0CF1H | SYMBOL | ODNZ2 |
| CODE | 0CFAH | SYMBOL | ODNZ3 |
| CODE | 0D18H | SYMBOL | ODNZ3A |
| CODE | 0D02H | SYMBOL | ODNZ3B |
| CODE | 0D29H | SYMBOL | ODNZ4 |
| CODE | 0CBEH | SYMBOL | ODNZS |
| CODE | 0C1EH | SYMBOL | ODSET |
| CODE | 0B87H | SYMBOL | ODST1 |
| CODE | 0BACH | SYMBOL | ODST2 |
| CODE | 0C26H | SYMBOL | ODST3 |
| CODE | 0C31H | SYMBOL | ODST4 |
| CODE | 0C6AH | SYMBOL | ODST5 |
| CODE | 0C7BH | SYMBOL | ODST5A |
| CODE | 0CB0H | SYMBOL | ODST6 |
| CODE | 0B79H | SYMBOL | ODSTAT |
| CODE | 0B82H | SYMBOL | ODWD |
| CODE | 0B17H | SYMBOL | ODZS |
| CODE | 0AE7H | PUBLIC | OUTDIS |
| BIT | 00FBH.1 | SYMBOL | PM1 |
| BIT | 00FCH.1 | PUBLIC | PM2 |
| BIT | 00FDH.0 | PUBLIC | PM3 |
| DATA | 0FF3H | SYMBOL | PORT3 |
| BIT | 00EAH.0 | PUBLIC | PRICE |
| NUMBER | 00E0H | SYMBOL | S0 |
| NUMBER | 00E1H | SYMBOL | S1 |
| NUMBER | 00EAH | SYMBOL | S10 |
| NUMBER | 00EBH | SYMBOL | S11 |
| NUMBER | 00ECH | SYMBOL | S12 |
| NUMBER | 00EDH | SYMBOL | S13 |
| NUMBER | 00EEH | SYMBOL | S14 |
| NUMBER | 00EFH | SYMBOL | S15 |
| NUMBER | 00F0H | SYMBOL | S16 |
| NUMBER | 00F1H | SYMBOL | S17 |
| NUMBER | 00F2H | SYMBOL | S18 |
| NUMBER | 00F3H | SYMBOL | S19 |
| NUMBER | 00E2H | SYMBOL | S2 |
| NUMBER | 00F4H | SYMBOL | S20 |

| | | | |
|---|---|---|---|
| NUMBER | 00F5H | SYMBOL | S21 |
| NUMBER | 00F6H | SYMBOL | S22 |
| NUMBER | 00F7H | SYMBOL | S23 |
| NUMBER | 00F8H | SYMBOL | S24 |
| NUMBER | 00F9H | SYMBOL | S25 |
| NUMBER | 00FAH | SYMBOL | S26 |
| NUMBER | 00FBH | SYMBOL | S27 |
| NUMBER | 00FCH | SYMBOL | S28 |
| NUMBER | 00FDH | SYMBOL | S29 |
| NUMBER | 00E3H | SYMBOL | S3 |
| NUMBER | 00FEH | SYMBOL | S30 |
| NUMBER | 00FFH | SYMBOL | S31 |
| NUMBER | 00E4H | SYMBOL | S4 |
| NUMBER | 00E5H | SYMBOL | S5 |
| NUMBER | 00E6H | SYMBOL | S6 |
| NUMBER | 00E7H | SYMBOL | S7 |
| NUMBER | 00E8H | SYMBOL | S8 |
| NUMBER | 00E9H | SYMBOL | S9 |
| BIT | 00E1H.1 | PUBLIC | SETNG |
| BIT | 00FFH.1 | SYMBOL | TEMP |
| BIT | 00E6H.0 | PUBLIC | TIME |
| CODE | 0AC8H | SYMBOL | TIMILT |
| CODE | 0A7FH | SYMBOL | TMAM1 |
| CODE | 0A97H | SYMBOL | TMAP1 |
| CODE | 0A91H | SYMBOL | TMAP2 |
| CODE | 0A9DH | SYMBOL | TMPM |
| CODE | 0AA7H | SYMBOL | TMPM1 |
| CODE | 0AAAH | SYMBOL | TMPM2 |
| CODE | 0ADDH | SYMBOL | TMTIMO |
| CODE | 0AD6H | SYMBOL | TMTIME |
| BIT | 00FCH.3 | PUBLIC | TO |
| CODE | 0AC3H | SYMBOL | TPAP1 |
| CODE | 0ABDH | SYMBOL | TPAP2 |
| BIT | 00E1H.0 | PUBLIC | WEEKDAY |
| BIT | 00E0H.0 | PUBLIC | WEEKEND |
| ---- | ----- | MODULE | CONPMI |
| CODE | 1911H | SYMBOL | APC3S1 |
| CODE | 1BDEH | SYMBOL | APCLNU |
| CODE | 1BDCH | SYMBOL | APCLUD |
| CODE | 1BF3H | SYMBOL | APHTNU |
| CODE | 1BF1H | SYMBOL | APHTUD |
| CODE | 1BC5H | SYMBOL | APHWNU |
| CODE | 1BC3H | SYMBOL | APHWUD |
| CODE | 1915H | SYMBOL | APUPS1 |
| CODE | 1C62H | SYMBOL | APWD2 |
| CODE | 1C69H | SYMBOL | APWD3 |
| CODE | 1C1AH | SYMBOL | APWE2 |
| CODE | 1C3DH | SYMBOL | APWE3 |
| CODE | 17F3H | SYMBOL | C2R1S0 |
| CODE | 184CH | SYMBOL | C2R2S0 |
| CODE | 18A8H | SYMBOL | C2R3S0 |
| CODE | 187CH | SYMBOL | C3HLD |
| CODE | 17FAH | SYMBOL | C3R1S0 |
| CODE | 1906H | SYMBOL | C3R1S1 |
| CODE | 185CH | SYMBOL | C3R2S0 |
| CODE | 1D62H | SYMBOL | C3R2S5 |
| CODE | 1A60H | SYMBOL | C3R3S1 |

| | | | |
|---|---|---|---|
| CODE | 1B69H | SYMBOL | C3R3S2 |
| CODE | 1C9BH | SYMBOL | C3R3S3 |
| CODE | 1E14H | SYMBOL | C3R3S7 |
| CODE | 1803H | SYMBOL | C4R1S0 |
| CODE | 191BH | SYMBOL | C4R1S1 |
| CODE | 1BB2H | SYMBOL | C4R1S3 |
| CODE | 1CF7H | SYMBOL | C4R1S4 |
| CODE | 187FH | SYMBOL | C4R2S0 |
| CODE | 18B4H | SYMBOL | C4R3S0 |
| CODE | 1A6DH | SYMBOL | C4R3S1 |
| CODE | 1B72H | SYMBOL | C4R3S2 |
| CODE | 1CA4H | SYMBOL | C4R3S3 |
| CODE | 1E32H | SYMBOL | C4R3S7 |
| CODE | 1819H | SYMBOL | C5R1S0 |
| CODE | 193BH | SYMBOL | C5R1S1 |
| CODE | 1ABCH | SYMBOL | C5R1S2 |
| CODE | 1BCEH | SYMBOL | C5R1S3 |
| CODE | 1D0DH | SYMBOL | C5R1S4 |
| CODE | 1981H | SYMBOL | C5R2S1 |
| CODE | 1A7AH | SYMBOL | C5R3S1 |
| CODE | 1B7BH | SYMBOL | C5R3S2 |
| CODE | 1CADH | SYMBOL | C5R3S3 |
| CODE | 1828H | SYMBOL | C6R1S0 |
| CODE | 1959H | SYMBOL | C6R1S1 |
| CODE | 1AD3H | SYMBOL | C6R1S2 |
| CODE | 1BE5H | SYMBOL | C6R1S3 |
| CODE | 1D1CH | SYMBOL | C6R1S4 |
| CODE | 19E3H | SYMBOL | C6R2S1 |
| CODE | 1B22H | SYMBOL | C6R2S2 |
| CODE | 1C44H | SYMBOL | C6R2S3 |
| CODE | 18C0H | SYMBOL | C6R3S0 |
| CODE | 1A87H | SYMBOL | C6R3S1 |
| CODE | 1B84H | SYMBOL | C6R3S2 |
| CODE | 1CB6H | SYMBOL | C6R3S3 |
| CODE | 1A94H | SYMBOL | C7R3S1 |
| CODE | 1B8DH | SYMBOL | C7R3S2 |
| CODE | 1CBFH | SYMBOL | C7R3S3 |
| CODE | 1CE4H | SYMBOL | C7R3S4 |
| CODE | 1E4EH | SYMBOL | C7R3S7 |
| CODE | 17DEH | SYMBOL | CCR1S0 |
| CODE | 18F9H | SYMBOL | CCR1S1 |
| CODE | 1AADH | SYMBOL | CCR1S2 |
| CODE | 1BA6H | SYMBOL | CCR1S3 |
| CODE | 1CEEH | SYMBOL | CCR1S4 |
| CODE | 1837H | SYMBOL | CCR2S0 |
| CODE | 1974H | SYMBOL | CCR2S1 |
| CODE | 1AE8H | SYMBOL | CCR2S2 |
| CODE | 1BFAH | SYMBOL | CCR2S3 |
| CODE | 1886H | SYMBOL | CCR3S0 |
| CODE | 1A49H | SYMBOL | CCR3S1 |
| CODE | 1B58H | SYMBOL | CCR3S2 |
| CODE | 1C8AH | SYMBOL | CCR3S3 |
| CODE | 18A5H | SYMBOL | CCRHW |
| CODE | 194EH | SYMBOL | CLCTUD |
| CODE | 1950H | SYMBOL | CLMOUD |
| CODE | 1A5AH | SYMBOL | CLSST1 |
| CODE | 1B63H | SYMBOL | CLSST2 |
| CODE | 1C95H | SYMBOL | CLSST3 |

| | | | |
|---|---|---|---|
| CODE | 1776H | PUBLIC | CONPMI |
| CODE | 17CAH | SYMBOL | CONST0 |
| CODE | 18E7H | SYMBOL | CONST1 |
| CODE | 1A9BH | SYMBOL | CONST2 |
| CODE | 1B94H | SYMBOL | CONST3 |
| CODE | 1CC6H | SYMBOL | CONST4 |
| CODE | 1D2BH | SYMBOL | CONST5 |
| CODE | 1D86H | SYMBOL | CONST6 |
| CODE | 1DDCH | SYMBOL | CONST7 |
| CODE | 1776H | PUBLIC | CPMI |
| CODE | 1947H | SYMBOL | HCCNCL |
| CODE | 19FEH | SYMBOL | HCWD2 |
| CODE | 1A14H | SYMBOL | HCWD3 |
| CODE | 1A18H | SYMBOL | HCWD4 |
| CODE | 1A1FH | SYMBOL | HCWD5 |
| CODE | 1A35H | SYMBOL | HCWD6 |
| CODE | 1A1BH | SYMBOL | HCWDNP |
| CODE | 199EH | SYMBOL | HCWE2 |
| CODE | 19B4H | SYMBOL | HCWE3 |
| CODE | 19B8H | SYMBOL | HCWE4 |
| CODE | 19BFH | SYMBOL | HCWE5 |
| CODE | 19D1H | SYMBOL | HCWE6 |
| CODE | 19BBH | SYMBOL | HCWENP |
| CODE | 1969H | SYMBOL | HTCTUD |
| CODE | 196BH | SYMBOL | HTMOUD |
| CODE | 1AB8H | SYMBOL | HWAPMU |
| CODE | 1AB6H | SYMBOL | HWAPUD |
| CODE | 1929H | SYMBOL | HWC4S1 |
| CODE | 1AC7H | SYMBOL | HWCLNU |
| CODE | 1AC5H | SYMBOL | HWCLUD |
| CODE | 1ADCH | SYMBOL | HWHTNU |
| CODE | 1ADAH | SYMBOL | HWHTUD |
| CODE | 192DH | SYMBOL | HWUPS1 |
| CODE | 1B3DH | SYMBOL | HWWD2 |
| CODE | 1B44H | SYMBOL | HWWD3 |
| CODE | 1B05H | SYMBOL | HWWE2 |
| CODE | 1B1BH | SYMBOL | HWWE3 |
| CODE | 1DD9H | SYMBOL | INVKEY |
| CODE | 18DFH | SYMBOL | LCERR |
| CODE | 192FH | SYMBOL | MHWUS1 |
| CODE | 1917H | SYMBOL | MOAUS1 |
| CODE | 1A54H | SYMBOL | MRETHC |
| CODE | 1A8EH | SYMBOL | MTHRHC |
| CODE | 1A74H | SYMBOL | MTLTHC |
| CODE | 1A81H | SYMBOL | MTMNHC |
| CODE | 1A67H | SYMBOL | MTRTHC |
| CODE | 197BH | SYMBOL | MXTDNT |
| CODE | 1900H | SYMBOL | MXTUPT |
| CODE | 17C5H | SYMBOL | PMIRET |
| DATA | 0FF6H | SYMBOL | PORT6 |
| CODE | 18BFH | SYMBOL | RETST0 |
| CODE | 1A9AH | SYMBOL | RETST1 |
| CODE | 1B93H | SYMBOL | RETST2 |
| CODE | 1CC5H | SYMBOL | RETST3 |
| CODE | 1D2AH | SYMBOL | RETST4 |
| CODE | 1E54H | SYMBOL | RETST7 |
| CODE | 1CEBH | SYMBOL | RW1ST4 |
| CODE | 17D0H | SYMBOL | RW2ST0 |

| | | | |
|---|---|---|---|
| CODE | 18EDH | SYMBOL | RW2ST1 |
| CODE | 1AA1H | SYMBOL | RW2ST2 |
| CODE | 1B9AH | SYMBOL | RW2ST3 |
| CODE | 1D56H | SYMBOL | RW2ST5 |
| CODE | 1DEDH | SYMBOL | RW2ST7 |
| CODE | 17D6H | SYMBOL | RW3ST0 |
| CODE | 18F3H | SYMBOL | RW3ST1 |
| CODE | 1AA7H | SYMBOL | RW3ST2 |
| CODE | 1BA0H | SYMBOL | RW3ST3 |
| CODE | 1CD4H | SYMBOL | RW3ST4 |
| CODE | 1D40H | SYMBOL | RW3ST5 |
| CODE | 1DF9H | SYMBOL | RW3ST7 |
| CODE | 1D83H | SYMBOL | S5HLD |
| CODE | 1D48H | SYMBOL | S5XIT |
| CODE | 1DCAH | SYMBOL | SST0_6 |
| CODE | 1DB5H | SYMBOL | SST1_6 |
| CODE | 1DA0H | SYMBOL | SST2_6 |
| CODE | 1E27H | SYMBOL | ST7GO |
| CODE | 1E2BH | SYMBOL | ST7GO1 |
| CODE | 1E48H | SYMBOL | ST7LF |
| CODE | 1E2AH | SYMBOL | ST7MIC |
| CODE | 1E0FH | SYMBOL | ST7MOC |
| CODE | 1784H | SYMBOL | STATE0 |
| CODE | 178DH | SYMBOL | STATE1 |
| CODE | 1796H | SYMBOL | STATE2 |
| CODE | 179FH | SYMBOL | STATE3 |
| CODE | 17A8H | SYMBOL | STATE4 |
| CODE | 17B1H | SYMBOL | STATE5 |
| CODE | 17B8H | SYMBOL | STATE6 |
| CODE | 17BFH | SYMBOL | STATE7 |
| CODE | 1A58H | SYMBOL | UPDST1 |
| CODE | 1B61H | SYMBOL | UPDST2 |
| CODE | 1C93H | SYMBOL | UPDST3 |
| ---- | ----- | MODULE | DISSUBS |
| CODE | 128EH | PUBLIC | BILINF |
| CODE | 12EEH | SYMBOL | BLD2 |
| CODE | 12F2H | SYMBOL | BLD3 |
| CODE | 1325H | SYMBOL | BLD5 |
| CODE | 132BH | SYMBOL | BLD6 |
| CODE | 1336H | SYMBOL | BLD7 |
| CODE | 130FH | SYMBOL | BLDKWH |
| CODE | 1300H | SYMBOL | BLDL0 |
| CODE | 1303H | SYMBOL | BLDL1 |
| CODE | 133FH | SYMBOL | BLDLP |
| CODE | 12F7H | SYMBOL | BLDLR |
| CODE | 1362H | SYMBOL | BLDO1 |
| CODE | 1338H | SYMBOL | BLDOUT |
| CODE | 12E1H | SYMBOL | BLDSP |
| CODE | 1378H | SYMBOL | BLDXIT |
| CODE | 12D8H | SYMBOL | BLNX1 |
| CODE | 12CCH | SYMBOL | BLNXT |
| CODE | 0F90H | PUBLIC | CLM |
| CODE | 0FB9H | SYMBOL | CLMCOM |
| CODE | 0FB2H | SYMBOL | CLMGO |
| CODE | 0F38H | PUBLIC | CLS |
| CODE | 0FBCH | SYMBOL | CMEXIT |
| CODE | 1754H | SYMBOL | DMC10 |

```
CODE    1764H   SYMBOL   DNC10A
CODE    176DH   SYMBOL   DNC11
CODE    16B4H   SYMBOL   DNC1A
CODE    16BEH   SYMBOL   DNC2
CODE    16E3H   SYMBOL   DNC2A
CODE    16D4H   SYMBOL   DNC20
CODE    16F2H   SYMBOL   DNC3
CODE    1707H   SYMBOL   DNC3A
CODE    1712H   SYMBOL   DNC4
CODE    171DH   SYMBOL   DNC4A
CODE    172CH   SYMBOL   DNC5
CODE    173BH   SYMBOL   DNC6
CODE    1748H   SYMBOL   DNC7
CODE    168FH   PUBLIC   DNCOH
CODE    0FF5H   PUBLIC   DNSTPT
CODE    0F38H   PUBLIC   DSUBS
CODE    125EH   SYMBOL   HRSCST
CODE    124BH   SYMBOL   HRSFL1
CODE    1259H   SYMBOL   HRSIN2
CODE    1250H   SYMBOL   HRSINA
CODE    125DH   SYMBOL   HRSINX
CODE    1268H   SYMBOL   HRSXIT
CODE    1224H   PUBLIC   IHOURS
CODE    126BH   PUBLIC   IMINS
CODE    14BFH   PUBLIC   INTAPP
CODE    12A3H   SYMBOL   MINCST
CODE    1292H   SYMBOL   MINFL1
CODE    1297H   SYMBOL   MININA
CODE    12A2H   SYMBOL   MININX
CODE    12ADH   SYMBOL   MINXIT
CODE    12B7H   SYMBOL   MINXT1
CODE    13FBH   PUBLIC   MLEFT
CODE    1426H   SYMBOL   MLGO
CODE    143DH   SYMBOL   MLSTP1
CODE    1466H   SYMBOL   MLT3TR
CODE    141AH   SYMBOL   MLTMP
CODE    1416H   SYMBOL   MLTRST
CODE    1439H   SYMBOL   MLTWP1
CODE    1458H   SYMBOL   MLTWP2
CODE    14E1H   SYMBOL   MODHC
CODE    14DAH   PUBLIC   MODOFF
CODE    13B0H   SYMBOL   MRGO
CODE    1385H   PUBLIC   MRIGHT
CODE    13C7H   SYMBOL   MRSTP1
CODE    13ECH   SYMBOL   MRT3TR
CODE    13A4H   SYMBOL   MRTMP
CODE    13A0H   SYMBOL   MRTRST
CODE    13C3H   SYMBOL   MRTWP1
CODE    13DEH   SYMBOL   MRTWP2
CODE    1171H   PUBLIC   MSGCTR
CODE    119DH   SYMBOL   MSGGO
CODE    11CBH   SYMBOL   MSGGO1
CODE    11D2H   SYMBOL   MSGGO2
CODE    119AH   SYMBOL   MSGHI
CODE    121CH   SYMBOL   MSGXIT
CODE    11DEH   SYMBOL   MSHWAP
CODE    149FH   SYMBOL   MUTDTM
CODE    1476H   SYMBOL   MUTHWA
```

```
CODE    14B2H   SYMBOL  MUTXIT
CODE    15B6H   SYMBOL  NAHCON
CODE    15A2H   SYMBOL  NAHPD2
CODE    15AAH   SYMBOL  NAHPD3
CODE    15B2H   SYMBOL  NAHPD4
CODE    14F8H   SYMBOL  NANUP
CODE    1500H   SYMBOL  NARES
CODE    1515H   SYMBOL  NASDRQ
CODE    1514H   SYMBOL  NAWE
CODE    1516H   SYMBOL  NAXIT
CODE    1554H   SYMBOL  NHCCON
CODE    157EH   SYMBOL  NHCGO1
CODE    1585H   SYMBOL  NHCGO2
CODE    1540H   SYMBOL  NHCPD2
CODE    1548H   SYMBOL  NHCPD3
CODE    1550H   SYMBOL  NHCPD4
CODE    1590H   SYMBOL  NXHWAP
CODE    14E2H   PUBLIC  NXTAPP
CODE    151BH   PUBLIC  NXTPRD
CODE    15DDH   SYMBOL  NXTXIT
CODE    1047H   SYMBOL  OPTCNT
CODE    1030H   PUBLIC  OPTIN
CODE    1042H   SYMBOL  OPTINC
CODE    1053H   SYMBOL  OPTSND
CODE    1060H   SYMBOL  OPTXIT
CODE    0F72H   SYMBOL  SCDCON
CODE    0F8BH   SYMBOL  SCDEXT
CODE    0F6EH   SYMBOL  SCDGO
CODE    0F7DH   SYMBOL  SCDR1
CODE    0F83H   SYMBOL  SCDR2
CODE    0F5DH   PUBLIC  SCDREQ
CODE    0FEBH   SYMBOL  STPDC
CODE    101EH   SYMBOL  STPDC1
CODE    1023H   SYMBOL  STPDC2
CODE    1018H   SYMBOL  STPDF1
CODE    0FD3H   SYMBOL  STPNB1
CODE    1006H   SYMBOL  STPNB2
CODE    1028H   SYMBOL  STPXIT
CODE    1148H   SYMBOL  T3LFT
CODE    115CH   SYMBOL  T3RCON
CODE    115EH   SYMBOL  T3RGT
CODE    115DH   SYMBOL  T3XIT
CODE    10D1H   PUBLIC  TEMPDN
CODE    1064H   PUBLIC  TEMPUP
CODE    1136H   SYMBOL  TMPOK
CODE    10F8H   SYMBOL  TPD0
CODE    1113H   SYMBOL  TPD1
CODE    1116H   SYMBOL  TPD2
CODE    1101H   SYMBOL  TPDCH3
CODE    1106H   SYMBOL  TPDCL
CODE    10F0H   SYMBOL  TPDDC
CODE    1124H   SYMBOL  TPDNT
CODE    108DH   SYMBOL  TPU0
CODE    10A8H   SYMBOL  TPU1
CODE    10ABH   SYMBOL  TPU2
CODE    1096H   SYMBOL  TPUCH3
CODE    10B9H   SYMBOL  TPUCL
CODE    1085H   SYMBOL  TPUDC
```

| | | | |
|---|---|---|---|
| CODE | 109BH | SYMBOL | TPUHT |
| CODE | 1140H | SYMBOL | TXIT |
| CODE | 1145H | SYMBOL | TXIT1 |
| CODE | 167EH | SYMBOL | UDXIT |
| CODE | 1674H | SYMBOL | UDXIT0 |
| CODE | 1685H | SYMBOL | UDXIT1 |
| CODE | 1688H | SYMBOL | UDXIT2 |
| CODE | 1662H | SYMBOL | UPC10 |
| CODE | 166FH | SYMBOL | UPC10A |
| CODE | 1606H | SYMBOL | UPC1A |
| CODE | 1614H | SYMBOL | UPC2 |
| CODE | 161AH | SYMBOL | UPC3 |
| CODE | 1620H | SYMBOL | UPC4 |
| CODE | 1630H | SYMBOL | UPC4A |
| CODE | 163EH | SYMBOL | UPC5 |
| CODE | 164DH | SYMBOL | UPC6 |
| CODE | 165CH | SYMBOL | UPC7 |
| CODE | 15E6H | PUBLIC | UPCON |
| CODE | 0FC2H | PUBLIC | UPSTPT |
| ---- | ----- | MODULE | TSTATSYS |
| CODE | 002EH | PUBLIC | ADDBYT |
| DATA | 0063H | PUBLIC | APPNUM |
| DATA | 0F85H | SYMBOL | BTM |
| DATA | 0079H | SYMBOL | BUZ_CNT |
| CODE | 0DA7H | PUBLIC | COSEG |
| CODE | 002AH | PUBLIC | CLMBE |
| CODE | 0034H | PUBLIC | CLRSCR |
| DATA | 0020H | PUBLIC | CNTSET |
| DATA | 007BH | PUBLIC | CNT_FG |
| BIT | 007BH.0 | PUBLIC | CNT_FL |
| BIT | 007BH.2 | PUBLIC | CNT_HW |
| BIT | 007BH.1 | PUBLIC | CNT_PT |
| BIT | 007BH.3 | PUBLIC | CNT_TH |
| BIT | 007AH.1 | PUBLIC | CNT_ZZ |
| CODE | 0F02H | SYMBOL | CSEXIT |
| DATA | 0022H | PUBLIC | CTEMP |
| DATA | 0010H | PUBLIC | D0SEG |
| DATA | 0100H | PUBLIC | D1SEG |
| BIT | 0078H.1 | PUBLIC | DATAFG |
| CODE | 0028H | PUBLIC | DINCSHL |
| DATA | 002AH | PUBLIC | DIVA |
| DATA | 002EH | PUBLIC | DIVB |
| BIT | 007AH.2 | PUBLIC | ERR_TON |
| DATA | 01C0H | PUBLIC | FLASH1 |
| DATA | 01C2H | PUBLIC | FLASH2 |
| DATA | 0064H | PUBLIC | FMCQUE |
| DATA | 0024H | PUBLIC | FTEMP |
| CODE | 0EECH | SYMBOL | GO |
| CODE | 0020H | PUBLIC | GTSEG |
| PBIT | 0FBEH.3 | SYMBOL | IE1 |
| PBIT | 0FBFH.1 | SYMBOL | IE2 |
| PBIT | 0FB8H.1 | SYMBOL | IEBT |
| PBIT | 0FBDH.1 | SYMBOL | IECSI |
| PBIT | 0FBCH.1 | SYMBOL | IET0 |
| DATA | 0FB6H | SYMBOL | IM2 |
| CODE | 0E79H | SYMBOL | INBTBZ |
| CODE | 0E3EH | SYMBOL | INBTLP |

| | | | |
|---|---|---|---|
| CODE | 0E54H | SYMBOL | INBTN1 |
| CODE | 0E5AH | SYMBOL | INBTN2 |
| CODE | 0E63H | SYMBOL | INBTNX |
| CODE | 0E5DH | SYMBOL | INBTZ0 |
| CODE | 0E9AH | SYMBOL | INBXIT |
| CODE | 0E8DH | SYMBOL | INBZ1 |
| CODE | 0E98H | SYMBOL | INBZ2 |
| CODE | 0026H | PUBLIC | INCSHL |
| CODE | 0E38H | SYMBOL | INTBT |
| CODE | 0ED4H | SYMBOL | INTCSI |
| CODE | 0EBDH | SYMBOL | INTE1 |
| CODE | 0E9FH | SYMBOL | INTT0 |
| PBIT | 0FBEH.2 | SYMBOL | IRQ1 |
| PBIT | 0FBFH.0 | SYMBOL | IRQ2 |
| PBIT | 0FBCH.0 | SYMBOL | IRQT0 |
| CODE | 0EB1H | SYMBOL | ISTOP |
| DATA | 007AH | SYMBOL | KEY_FG |
| BIT | 007AH.0 | PUBLIC | KEY_HLD |
| DATA | 0F8EH | SYMBOL | LCDC |
| DATA | 0F8CH | SYMBOL | LCDM |
| DATA | 01CCH | PUBLIC | LC_CNT |
| DATA | 007CH | PUBLIC | LST_KEY |
| CODE | 0DA7H | SYMBOL | MAIN |
| PBIT | 0FB0H.1 | SYMBOL | MBE |
| DATA | 0026H | PUBLIC | MULTA |
| DATA | 0028H | PUBLIC | MULTB |
| CODE | 0038H | PUBLIC | MVSTXA |
| CODE | 003CH | PUBLIC | MVXAHL |
| CODE | 0036H | PUBLIC | MXA@HL |
| CODE | 003EH | PUBLIC | MXA_00 |
| CODE | 0040H | PUBLIC | MXA_01 |
| CODE | 0042H | PUBLIC | MXA_A0 |
| BIT | 007AH.3 | PUBLIC | NO_EHW |
| NUMBER | 0010H | PUBLIC | NRM_TIM |
| DATA | 001CH | PUBLIC | OLDTMP |
| NUMBER | 000FH | PUBLIC | OPT_CNT |
| DATA | 0FB3H | SYMBOL | PCC |
| DATA | 0FE8H | SYMBOL | PMGA |
| DATA | 0FECH | SYMBOL | PMGB |
| DATA | 0180H | PUBLIC | PMIBUF |
| DATA | 01CAH | PUBLIC | PM_PNT |
| DATA | 01C8H | PUBLIC | PM_PRD |
| DATA | 0FDCH | SYMBOL | POGA |
| DATA | 0FF2H | SYMBOL | PORT2 |
| DATA | 0FF3H | SYMBOL | PORT3 |
| DATA | 0FF4H | SYMBOL | PORT4 |
| DATA | 0FF6H | SYMBOL | PORT6 |
| PBIT | 0FB0H.0 | SYMBOL | RBE |
| DATA | 0140H | PUBLIC | RCXMB |
| DATA | 0074H | PUBLIC | RDATA |
| DATA | 01C4H | PUBLIC | REST1 |
| DATA | 01C6H | PUBLIC | REST2 |
| NUMBER | 0008H | PUBLIC | RPT_TIM |
| DATA | 0060H | PUBLIC | RP_CNT |
| CODE | 0032H | PUBLIC | SCDRST |
| CODE | 0020H | PUBLIC | SEL0 |
| CODE | 0022H | PUBLIC | SEL1 |
| CODE | 0024H | PUBLIC | SEL15 |

| | | | |
|---|---|---|---|
| DATA | 001EH | PUBLIC | SETPNT |
| DATA | 0FE4H | SYMBOL | SIO |
| DATA | 0073H | PUBLIC | SIOF |
| DATA | 0F80H | SYMBOL | SP |
| BIT | 0012H.0 | PUBLIC | ST0_EH |
| BIT | 0012H.2 | PUBLIC | ST0_LC |
| BIT | 0012H.1 | PUBLIC | ST0_PP |
| BIT | 0012H.3 | PUBLIC | ST0_WE |
| BIT | 0013H.0 | PUBLIC | ST1_FL |
| BIT | 0013H.2 | PUBLIC | ST1_HW |
| BIT | 0013H.1 | PUBLIC | ST1_PT |
| BIT | 0013H.3 | PUBLIC | ST1_TH |
| BIT | 0014H.1 | PUBLIC | ST2_CH |
| BIT | 0014H.0 | PUBLIC | ST2_CL |
| BIT | 0014H.3 | PUBLIC | ST2_RH |
| BIT | 0014H.2 | PUBLIC | ST2_RL |
| BIT | 0015H.3 | PUBLIC | ST3_BC |
| BIT | 0015H.0 | PUBLIC | ST3_BS |
| BIT | 0015H.1 | PUBLIC | ST3_C |
| BIT | 0015H.2 | PUBLIC | ST3_CL |
| BIT | 0016H.3 | PUBLIC | ST4_AP |
| BIT | 0016H.2 | PUBLIC | ST4_BI |
| BIT | 0016H.0 | PUBLIC | ST4_FC |
| BIT | 0016H.1 | PUBLIC | ST4_FT |
| BIT | 01CDH.1 | PUBLIC | ST5_FL |
| BIT | 01CDH.3 | PUBLIC | ST5_FW |
| BIT | 01CDH.2 | PUBLIC | ST5_HC |
| BIT | 01CDH.0 | PUBLIC | ST5_RC |
| DATA | 0010H | PUBLIC | STATE |
| DATA | 0012H | PUBLIC | STATUS0 |
| DATA | 0013H | PUBLIC | STATUS1 |
| DATA | 0014H | PUBLIC | STATUS2 |
| DATA | 0015H | SYMBOL | STATUS3 |
| DATA | 0016H | SYMBOL | STATUS4 |
| DATA | 01CDH | SYMBOL | STATUS5 |
| CODE | 002CH | PUBLIC | STMBE |
| BIT | 0078H.3 | PUBLIC | STOPFG |
| BIT | 0078H.2 | PUBLIC | STRTFG |
| CODE | 0030H | PUBLIC | SUBSXD |
| DATA | 0017H | PUBLIC | SW1 |
| BIT | 0017H.2 | PUBLIC | SW1_CL |
| BIT | 0017H.0 | PUBLIC | SW1_EH |
| BIT | 0017H.1 | PUBLIC | SW1_FA |
| BIT | 0017H.3 | PUBLIC | SW1_HT |
| DATA | 0076H | PUBLIC | TDATA |
| CODE | 0E36H | SYMBOL | TERROR |
| DATA | 0062H | PUBLIC | TIMCNT |
| DATA | 0018H | PUBLIC | TIMEHR |
| DATA | 001AH | PUBLIC | TIMEMIN |
| DATA | 0FA0H | SYMBOL | TMO |
| DATA | 0FA6H | SYMBOL | TMOD0 |
| CODE | 0DE9H | SYMBOL | TNXT1 |
| CODE | 0DF3H | SYMBOL | TNXT2 |
| CODE | 0DFDH | SYMBOL | TNXT3 |
| CODE | 0E07H | SYMBOL | TNXT4 |
| CODE | 0E11H | SYMBOL | TNXT5 |
| CODE | 0E1BH | SYMBOL | TNXT6 |
| CODE | 0E25H | SYMBOL | TNXT7 |

| | | | |
|---|---|---|---|
| CODE | 0E2EH | SYMBOL | TNXT8 |
| CODE | 0DDFH | SYMBOL | TOP |
| CODE | 0F26H | SYMBOL | TRBEG |
| CODE | 0F07H | SYMBOL | TREND |
| BIT | 0078H.0 | PUBLIC | TRFG |
| CODE | 0F20H | SYMBOL | TRSTOP |
| DATA | 0100H | PUBLIC | TRXMB |
| DATA | 0030H | PUBLIC | TSB |
| DATA | 0030H | SYMBOL | TSB1 |
| DATA | 0034H | PUBLIC | TSB1PA |
| DATA | 0031H | PUBLIC | TSB1RP |
| BIT | 0030H.2 | PUBLIC | TSB1S |
| BIT | 0030H.3 | PUBLIC | TSB1T |
| DATA | 0032H | PUBLIC | TSB1TM |
| DATA | 0036H | SYMBOL | TSB2 |
| DATA | 003AH | PUBLIC | TSB2PA |
| DATA | 0037H | PUBLIC | TSB2RP |
| BIT | 0036H.2 | PUBLIC | TSB2S |
| BIT | 0036H.3 | PUBLIC | TSB2T |
| DATA | 0038H | PUBLIC | TSB2TM |
| DATA | 003CH | SYMBOL | TSB3 |
| DATA | 0040H | SYMBOL | TSB3PA |
| DATA | 003DH | PUBLIC | TSB3RP |
| BIT | 003CH.2 | PUBLIC | TSB3S |
| BIT | 003CH.3 | PUBLIC | TSB3T |
| DATA | 003EH | PUBLIC | TSB3TM |
| DATA | 0042H | SYMBOL | TSB4 |
| DATA | 0046H | SYMBOL | TSB4PA |
| DATA | 0043H | PUBLIC | TSB4RP |
| BIT | 0042H.2 | PUBLIC | TSB4S |
| BIT | 0042H.3 | PUBLIC | TSB4T |
| DATA | 0044H | PUBLIC | TSB4TM |
| DATA | 0048H | SYMBOL | TSB5 |
| DATA | 004CH | SYMBOL | TSB5PA |
| DATA | 0049H | PUBLIC | TSB5RP |
| BIT | 0048H.2 | PUBLIC | TSB5S |
| BIT | 0048H.3 | PUBLIC | TSB5T |
| DATA | 004AH | PUBLIC | TSB5TM |
| DATA | 004EH | SYMBOL | TSB6 |
| DATA | 0052H | PUBLIC | TSB6PA |
| DATA | 004FH | PUBLIC | TSB6RP |
| BIT | 004EH.2 | PUBLIC | TSB6S |
| BIT | 004EH.3 | PUBLIC | TSB6T |
| DATA | 0050H | PUBLIC | TSB6TM |
| DATA | 0054H | SYMBOL | TSB7 |
| DATA | 0058H | PUBLIC | TSB7PA |
| DATA | 0055H | PUBLIC | TSB7RP |
| BIT | 0054H.2 | PUBLIC | TSB7S |
| BIT | 0054H.3 | PUBLIC | TSB7T |
| DATA | 0056H | PUBLIC | TSB7TM |
| DATA | 005AH | SYMBOL | TSB8 |
| DATA | 005EH | PUBLIC | TSB8PA |
| DATA | 005BH | PUBLIC | TSB8RP |
| BIT | 005AH.2 | PUBLIC | TSB8S |
| BIT | 005AH.3 | PUBLIC | TSB8T |
| DATA | 005CH | PUBLIC | TSB8TM |
| DATA | 0F93H | SYMBOL | WM |
| CODE | 003AH | PUBLIC | XCXADE |

| ---- | ----- | MODULE | MAINSUBS |
|---|---|---|---|
| CODE | 011DH | SYMBOL | ANAACK |
| CODE | 00F0H | SYMBOL | ANAC2 |
| CODE | 0044H | PUBLIC | ANACOM |
| CODE | 012AH | SYMBOL | ANAERR |
| CODE | 0074H | SYMBOL | ANAG1 |
| CODE | 0051H | SYMBOL | ANAGET |
| CODE | 0100H | SYMBOL | ANALP |
| CODE | 004DH | SYMBOL | ANALV |
| CODE | 0087H | SYMBOL | ANAT0 |
| CODE | 00B7H | SYMBOL | ANAT1 |
| CODE | 00BFH | SYMBOL | ANAT2 |
| CODE | 00CDH | SYMBOL | ANAT20 |
| CODE | 00F9H | SYMBOL | ANAT21 |
| CODE | 0127H | SYMBOL | ANAXIT |
| DATA | 0FC0H | SYMBOL | BSB0 |
| DATA | 0FC2H | SYMBOL | BSB2 |
| CODE | 05E8H | SYMBOL | CDCOPY |
| CODE | 0629H | SYMBOL | CDRES |
| CODE | 0579H | SYMBOL | CHKH |
| CODE | 0575H | SYMBOL | CHKMB |
| CODE | 0553H | SYMBOL | CKCSTA |
| CODE | 0538H | SYMBOL | CKM0 |
| CODE | 052CH | SYMBOL | CKM5 |
| CODE | 0532H | SYMBOL | CKMF |
| CODE | 04A2H | SYMBOL | CKR0 |
| CODE | 0492H | SYMBOL | CKR5 |
| CODE | 049AH | SYMBOL | CKRF |
| CODE | 04CCH | SYMBOL | CKS0 |
| CODE | 04C0H | SYMBOL | CKS5 |
| CODE | 04C6H | SYMBOL | CKSF |
| CODE | 0044H | PUBLIC | CMSUBS |
| DATA | 0FE0H | SYMBOL | CSIM |
| CODE | 0584H | SYMBOL | EMEMT |
| CODE | 05E2H | SYMBOL | ER1LOOP |
| CODE | 0637H | SYMBOL | ER2LOOP |
| CODE | 05C0H | SYMBOL | ERROR |
| CODE | 019AH | SYMBOL | FMC1 |
| CODE | 020CH | SYMBOL | FMC10 |
| CODE | 021AH | SYMBOL | FMC10A |
| CODE | 0173H | SYMBOL | FMC10K |
| CODE | 01BBH | SYMBOL | FMC1A |
| CODE | 01BDH | SYMBOL | FMC1B |
| CODE | 01C4H | SYMBOL | FMC7 |
| CODE | 01EDH | SYMBOL | FMC7A |
| CODE | 0163H | SYMBOL | FMC7CK |
| CODE | 01F2H | SYMBOL | FMC8 |
| CODE | 016AH | SYMBOL | FMC8CK |
| CODE | 016FH | SYMBOL | FMC9CK |
| CODE | 0291H | SYMBOL | FMCACK |
| CODE | 029EH | SYMBOL | FMCCLM |
| CODE | 0237H | SYMBOL | FMCEND |
| CODE | 0178H | SYMBOL | FMCERR |
| CODE | 0143H | SYMBOL | FMCG0 |
| CODE | 014BH | SYMBOL | FMCG1 |
| CODE | 0155H | SYMBOL | FMCGDN |
| CODE | 013CH | SYMBOL | FMCGLP |
| CODE | 0254H | SYMBOL | FMCGO |

| | | | |
|---|---|---|---|
| CODE | 0256H | SYMBOL | FMCGO1 |
| CODE | 0271H | SYMBOL | FMCGP |
| CODE | 0275H | SYMBOL | FMCGP1 |
| CODE | 0221H | SYMBOL | FMCLP |
| CODE | 012BH | PUBLIC | FMCMSG |
| CODE | 017FH | SYMBOL | FMCREQ |
| CODE | 0290H | SYMBOL | FMCXIT |
| CODE | 03DBH | PUBLIC | GETKEY |
| CODE | 02DFH | PUBLIC | GETTMP |
| CODE | 0373H | SYMBOL | GTAV2 |
| CODE | 0375H | SYMBOL | GTAV3 |
| CODE | 0335H | SYMBOL | GTCDG |
| CODE | 0375H | SYMBOL | GTERR |
| CODE | 0320H | SYMBOL | GTFDG |
| CODE | 0314H | SYMBOL | GTHI |
| CODE | 032EH | SYMBOL | GTINC |
| CODE | 0341H | SYMBOL | GTLJS |
| CODE | 031AH | SYMBOL | GTLOW |
| CODE | 02EDH | SYMBOL | GTLP |
| CODE | 0386H | SYMBOL | GTLV |
| CODE | 039EH | SYMBOL | GTLV0 |
| CODE | 03A0H | SYMBOL | GTLV1 |
| CODE | 03CAH | SYMBOL | GTLV1A |
| CODE | 03CFH | SYMBOL | GTLV2 |
| CODE | 03D1H | SYMBOL | GTLV3 |
| CODE | 02EAH | SYMBOL | GTNEXT |
| PBIT | 0FBEH.3 | SYMBOL | IE1 |
| PBIT | 0FBFH.1 | SYMBOL | IE2 |
| PBIT | 0FB8H.1 | SYMBOL | IEBT |
| PBIT | 0FBDH.1 | SYMBOL | IECSI |
| DATA | 0FB5H | SYMBOL | IM1 |
| CODE | 04FDH | SYMBOL | INITA |
| CODE | 050CH | SYMBOL | INTBL1 |
| CODE | 050AH | SYMBOL | INTOBL |
| PBIT | 0FBEH.2 | SYMBOL | IRQ1 |
| PBIT | 0FBFH.0 | SYMBOL | IRQ2 |
| PBIT | 0FB8H.0 | SYMBOL | IRQBT |
| PBIT | 0FBCH.0 | SYMBOL | IRQT0 |
| CODE | 0422H | SYMBOL | KCHA02 |
| CODE | 0400H | SYMBOL | KCHAN2 |
| CODE | 03FDH | SYMBOL | KCHANG |
| CODE | 0424H | SYMBOL | KCHLP |
| CODE | 0434H | SYMBOL | KCSLF |
| CODE | 044AH | SYMBOL | KCXGO |
| CODE | 043BH | SYMBOL | KCXIT |
| CODE | 0448H | SYMBOL | KDIF |
| CODE | 03E0H | SYMBOL | KEY |
| CODE | 03F3H | SYMBOL | KEY2 |
| CODE | 0632H | SYMBOL | LCDRET |
| CODE | 05C2H | SYMBOL | LCDTST |
| CODE | 046DH | SYMBOL | MEMTST |
| DATA | 0FF1H | SYMBOL | PORT1 |
| DATA | 0FF2H | SYMBOL | PORT2 |
| DATA | 0FF3H | SYMBOL | PORT3 |
| DATA | 0FF4H | SYMBOL | PORT4 |
| DATA | 0FF5H | SYMBOL | PORT5 |
| DATA | 0FF6H | SYMBOL | PORT6 |
| CODE | 0558H | SYMBOL | RDOMB |

```
CODE    0482H    SYMBOL    REGCON
CODE    0571H    SYMBOL    RMBCON
CODE    0562H    SYMBOL    RTMBL1
CODE    0568H    SYMBOL    RTMMB
CODE    0560H    SYMBOL    RTMOBL
CODE    04D7H    SYMBOL    SAVMB
CODE    04D5H    SYMBOL    SCONBL
DATA    0FE4H    SYMBOL    SIO
CODE    0463H    SYMBOL    SLFCK2
CODE    045BH    PUBLIC    SLFTST
CODE    04DFH    SYMBOL    SMBCON
CODE    02C4H    SYMBOL    SNDEND
CODE    02A7H    PUBLIC    SNDTMP
CODE    02D1H    SYMBOL    SNDTST
DATA    0F80H    SYMBOL    SP
CODE    04D3H    SYMBOL    STRTMB
CODE    04A6H    SYMBOL    STRTSV
CODE    04CCH    SYMBOL    TINITM
DATA    0FA0H    SYMBOL    TMO
CODE    051DH    SYMBOL    TMBCON
DATA    0FA6H    SYMBOL    TMODO
CODE    04B2H    SYMBOL    TSCON
CODE    0519H    SYMBOL    TSTBL1
CODE    04FEH    SYMBOL    TSTMB
CODE    0517H    SYMBOL    TSTOBL
CODE    0470H    SYMBOL    TSTREG
CODE    04A7H    SYMBOL    TSTSAV


LINK COMPLETE, NO ERROR FOUND

   ** TSTATSYS MAIN ROUTINE-AJB                                  **

COMMAND     :                       (COMMAND FILE :              )
TSTATSYS.ASM MOD=308

 STNO ADRS R OBJECT   IC MAC   SOURCE STATEMENT

                               $      TITLE='TSTATSYS MAIN ROUTINE-AJB'
                               ;(*-------------------------------------------------------------
                               ;(c) Copyright, Johnson Controls Incorporated, 1987.  All rights
                               ;   reserved. The following program is the exclusive property of
                               ;   Johnson Controls, Inc. and its use is restricted by license
                               ;   agreement to the system with which it was furnished.  The
                               ;   program contents are confidential and may not be disclosed
                               ;   or used outside the system without the express written
                               ;   consent of Johnson Controls.  This program is further
                               ;   protected by federal copyright law as an unpublished work
                               ;   and any unauthorized reproduction is prohibited.
                               ; 1. PURPOSE:
                               ;     TSTATSYS is the main module of the thermostat software
                               ;        all other subroutines are called from here.  All data
                               ;        structures are defined here.
                               ;          The Self-test module(SLFTST) is called right after
                               ;        power-up.  It tests all of memory as well as lighting up
                               ;        all of the LCD elements and then shuts them off, also
                               ;        the LED's.(no keypad test has been planned).  As SLFTST
                               ;        finishes
```

```
;
; 2. INPUTS:
;     none
; 3. GLOBAL VARIABLES:
;     None
; 4. OUTPUTS:
;     None
; 5. PROCEDURES CALLED:
;     ANACOM - Analyze controller messages  1
;     FMCMSG - Format messages to controller 2
;     SNDTMP - Send Temperature & Switch setting to controller 3
;     GETTMP - Get Temperature and switch settings 4
;     GETKEY - Get Keypad entries 5
;     CONPMI - Process configuration and PMI information 6
;     OUTDIS - Output data to display(LCD & LED) 7
;     SLFTST - Selftest diagnostics 8
; 6. EXCEPTIONS:
;     None
; 7. UNIQUE FEATURES:
;     None
; 8. HISTORY
;     ORIGINAL - 07/08/87 - Alan J.Bronikowski Rev A000
;     REVISION - 09/21/87 - Alan J.Bronikowski Rev A000
;                           UPDATED CODE AND ADDED SCHEDULER INT
;                           AND WATCHDOG CODE
;     REVISION - 02/03/88 - Alan J.Bronikowski Rev A001
;                           changed LCDM from 038H to 018H to removed
;                           shadowing problem in LCD
;     REVISION - 05/18/88 - Alan J  Bronikowski Ref A003
;                           added NO_EHW flag, NO EL. HOT WATER
;     REVISION - 08/09/88 - Alan J. Bronikowski REV A004
;                           added ST5_RC(Z BIT) REQ.CONFIGURATION
;     REVISION - 08/16/88 - Alan J. Bronikowski REV A004
;                           added 2 GETI's: MOV XA,0 & MOV XA,#0A0H
;---------------------------------------------------------------*)
                NAME   TSTATSYS       ;main routine of thermostat
                EXTRN CODE(ANACOM,FMCMSG,SNDTMP,GETTMP,GETKEY)
                EXTRN CODE(CONPMI,OUTDIS,SLFTST,ADDBYTE,SUBS_XADE)
                EXTRN CODE(DINCS_HL,INCS_HL,ADDS_DEXA,CLS,SCBREQ)
                STKLN  50
0000 R 0000     VENT0  MBE=0, RBE=0, MAIN
0002 R 0091     VENT1  MBE=0, RBE=0, INTBT     ;BASIC TIMER, SCHEDULER
0006 R 0116     VENT3  MBE=0, RBE=0, INTE1     ;SERIAL INPUT START BIT
0008 R 012D     VENT4  MBE=0, RBE=0, INTCSI    ;SERIAL INPUT CHARACTER
000A R 00F8     VENT5  MBE=0, RBE=0, INTT0     ;START/STOP BIT TIMER
----     DOSEG  DSEG   0 AT 10H        ;TRYING WHAT D    ??
                PUBLIC  SEL15,SEL0,SEL1,INCSHL,STMBE,CLMBE,ADDBYT,SUBSXD
                PUBLIC  STATE,STATUS1,STATUS2,TIMEHR,TIMEMIN,SETPNT
                PUBLIC  TSB,TRXMB,RCXMB,PMIBUF,CTEMP,FTEMP,FMCQUE,OLDTMP
                PUBLIC  DATAFG,STOPFG,STRTFG,RDATA,TDATA,TRFG
                PUBLIC  RP_CNT,SW1,SW1_HT,SW1_CL,SW1_FA,SW1_EH
                PUBLIC  STATUS0,ST0_WE,ST0_LC,ST0_PP,ST0_EH
                PUBLIC  ST1_TH,ST1_HW,ST2_RH,ST2_RL,ST1_PT,ST1_FL,ST5_RC
                PUBLIC  ST2_CH,ST2_CL,ST3_BC,ST3_CL,ST3_C,ST3_BS,ERR_TON
                PUBLIC  ST4_AP,ST4_BI,ST4_FT,ST4_FC,ST5_FW,ST5_HC,ST5_FL
                PUBLIC  TSB1T,TSB1S,TSB2T,TSB2S,TSB3T,TSB3S,TSB4T
                PUBLIC  TSB4S,TSB5T,TSB5S,TSB6T,TSB6S,TSB7T,TSB7S
                PUBLIC  TSB8T,TSB8S,MULTA,MULTB,DIVA,DIVB,APPNUM
```

```
                                PUBLIC  TSB1RP,TSB1TM,TSB1PA,TSB2RP,TSB2TM,TSB2PA
                                PUBLIC  TSB3RP,TSB3TM,TSB4RP,TSB4TM,TSB5RP,TSB5TM
                                PUBLIC  TSB6RP,TSB6TM,TSB6PA,TSB7RP,TSB7TM,TSB7PA
                                PUBLIC  TSB8RP,TSB8TM,TSB8PA,SIOF,TIMCNT,LC_CNT,NO_EHW
                                PUBLIC  FLASH1,FLASH2,REST1,REST2,PM_PRD,PM_PNT,CNT_FG
                                PUBLIC  KEY_HLD,CNT_TH,CNT_HW,CNT_ZZ,CNTSET,CNT_PT,CNT_FL
                                PUBLIC  SCDRST,CLRSCR,MXA@HL,MVSTXA,XCXADE,BINCSHL
                                PUBLIC  OPT_CNT,RPT_TIM,MRM_TIM,LST_KEY,MXA_00,MXA_A0
                                PUBLIC  MVXAHL,MXA_01
0010                    STATE   : DS    2          ;CURRENT STATE OF COMPMI TASK
0012                    STATUS0: DS     1               ;when set these are on or true!
        (004B)          ST0_WE    EQU   STATUS0.3       ;WEEKEND BIT, LCD
        (004A)          ST0_LC    EQU   STATUS0.2       ;LOAD CONTROL BIT,LCD
        (0049)          ST0_PP    EQU   STATUS0.1       ;PEAK PERIOD PENDING, FLASH LED
        (0048)          ST0_EH    EQU   STATUS0.0       ;EMERGENCY HEAT LED
                        ;
0013                    STATUS1: DS     1
        (004F)          ST1_TH    EQU   STATUS1.3       ;TEMP. HOLD ON, LCD
        (004E)          ST1_HW    EQU   STATUS1.2       ;HEAT WATER ON, LCD
        (004D)          ST1_PT    EQU   STATUS1.1       ;PRICE TIERS (0-4, 1-3)
        (004C)          ST1_FL    EQU   STATUS1.0       ;FILTER ELEMENT ON, LCD
                        ;
0014                    STATUS2: DS     1
        (0053)          ST2_RH    EQU   STATUS2.3       ;CURRENT TIER ( 00-LOW,
        (0052)          ST2_RL    EQU   STATUS2.2       ; 01-MED, 10-HIGH, 11-PEAK)
        (0051)          ST2_CH    EQU   STATUS2.1       ;CURRENT TIME PERIOD( 00-MORN,
        (0050)          ST2_CL    EQU   STATUS2.0       ; 01-DAY, 10-EVE, 11-NIGHT)
                        ;
0015                    STATUS3: DS     1
        (0057)          ST3_BC    EQU   STATUS3.3       ;BEEP COUNTER
        (0056)          ST3_CL    EQU   STATUS3.2       ;CLOCK 12/24  (0-12, 1-24)
        (0055)          ST3_C     EQU   STATUS3.1       ;F OR C  (0-F, 1-C)
        (0054)          ST3_BS    EQU   STATUS3.0       ;BEEP SINGLE
                        ;
0016                    STATUS4: DS     1
        (005B)          ST4_AP    EQU   STATUS4.3       ;ACK PENDING
        (005A)          ST4_BI    EQU   STATUS4.2       ;BILL INFO  (0-7 SCHEDS, 1-3)
        (0059)          ST4_FT    EQU   STATUS4.1       ;FLASH TEMPERATURE (TEMP ERROR)
        (0058)          ST4_FC    EQU   STATUS4.0       ;FLASH TIME (TIME ERROR)
                        ;
0017                    SW1:      DS    1
        (005F)          SW1_HT    EQU   SW1.3   ;HEATING MODE
        (005E)          SW1_CL    EQU   SW1.2   ;COOLING MODE
        (005D)          SW1_FA    EQU   SW1.1   ;FAN AUTO
        (005C)          SW1_EH    EQU   SW1.0   ;EMERGENCY HEAT ON
                        ;
0018                    TIMEHR  : DS    2
001A                    TIMEMIN: DS     2
001C                    OLDTMP  : DS    2          ;SAVED OLD TEMP  FOR GETTMP
001E                    SETPNT  : DS    2
0020                    CNTSET  : DS    2          ;CONTROLLER SETPOINT
0022                    CTEMP   : DS    2
0024                    FTEMP   : DS    2
0026                    MULTA   : DS    2
0028                    MULTB   : DS    2
002A                    DIVA    . DS    4
002E                    DIVB    : DS    2
                        ;
```

```
                       ; ******* TASK STATUS BLOCKS   8 TASKS 3 BYTES EACH **********
      (0030)           TSB     EQU     $       ;TSB START
0030                   TSB1    : DS    1       ;TASK 1  -ANALYZE CONTROLLER MESSAGES-
      (00C3)           TSB1T   EQU     TSB1.3  ;TIMER ACTIVE FLAG
      (00C2)           TSB1S   EQU     TSB1.2  ;SCHEDULED FLAG
0031                   TSB1RP  : DS    1       ;REPEAT COUNTER FOR TIMER
0032                   TSB1TM  : DS    2       ;TIMER
0034                   TSB1PA  : DS    2       ;PARAMETER
                       ;
0036                   TSB2    : DS    1       ;TASK 2  -FORMAT MESSAGES TO CONTROLLER-
      (00DB)           TSB2T   EQU     TSB2.3  ;TIMER ACTIVE FLAG
      (00DA)           TSB2S   EQU     TSB2.2  ;SCHEDULED FLAG
0037                   TSB2RP  : DS    1       ;REPEAT COUNTER FOR TIMER
0038                   TSB2TM  : DS    2       ;TIMER
003A                   TSB2PA  : DS    2       ;PARAMETER
                       ;
003C                   TSB3    : DS    1       ;TASK 3 -SEND TEMP. & SWITCHES TO CNTLR-
      (00F3)           TSB3T   EQU     TSB3.3  ;TIMER ACTIVE FLAG
      (00F2)           TSB3S   EQU     TSB3.2  ;SCHEDULED FLAG
003D                   TSB3RP  : DS    1       ;REPEAT COUNTER FOR TIMER
003E                   TSB3TM  : DS    2       ;TIMER
0040                   TSB3PA  : DS    2       ;PARAMETER
                       ;
0042                   TSB4    : DS    1       ;TASK 4  -GET TEMP & SWITCH SETTINGS-
      (010B)           TSB4T   EQU     TSB4.3  ;TIMER ACTIVE FLAG
      (010A)           TSB4S   EQU     TSB4.2  ;SCHEDULED FLAG
0043                   TSB4RP  : DS    1       ;REPEAT COUNTER FOR TIMER
0044                   TSB4TM  : DS    2       ;TIMER
0046                   TSB4PA  : DS    2       ;PARAMETER
                       ;
0048                   TSB5    : DS    1       ;TASK 5  -GET KEYPAD ENTRIES-
      (0123)           TSB5T   EQU     TSB5.3  ;TIMER ACTIVE FLAG
      (0122)           TSB5S   EQU     TSB5.2  ;SCHEDULED FLAG
0049                   TSB5RP  : DS    1       ;REPEAT COUNTER FOR TIMER
004A                   TSB5TM  : DS    2       ;TIMER
004C                   TSB5PA  : DS    2       ;PARAMETER
                       ;
004E                   TSB6    : DS    1       ;TASK 6  -PROCESS PERSON/MACHINE INT.-
      (013B)           TSB6T   EQU     TSB6.3  ;TIMER ACTIVE FLAG
      (013A)           TSB6S   EQU     TSB6.2  ;SCHEDULED FLAG
004F                   TSB6RP  : DS    1       ;REPEAT COUNTER FOR TIMER
0050                   TSB6TM  : DS    2       ;TIMER
0052                   TSB6PA  : DS    2       ;PARAMETER
                       ,
0054                   TSB7    : DS    1       ;TASK 7  -OUTPUT DATA TO DISPLAYS-
      (0153)           TSB7T   EQU     TSB7.3  ;TIMER ACTIVE FLAG
      (0152)           TSB7S   EQU     TSB7.2  ;SCHEDULED FLAG
0055                   TSB7RP  : DS    1       ;REPEAT COUNTER FOR TIMER
0056                   TSB7TM  : DS    2       ;TIMER
0058                   TSB7PA  : DS    2       ;PARAMETER
                       ;
005A                   TSB8    : DS    1       ;TASK 8  -SELF TEST DIAGNOSTICS-
      (016B)           TSB8T   EQU     TSB8.3  ;TIMER ACTIVE FLAG
      (016A)           TSB8S   EQU     TSB8.2  ;SCHEDULED FLAG
005B                   TSB8RP  : DS    1       ;REPEAT COUNTER FOR TIMER
005C                   TSB8TM  : DS    2       ;TIMER
005E                   TSB8PA  : DS    2       ;PARAMETER
                       ;
```

```
0060                RP_CNT : DS     2       ;FOR FMCMSG
0062                TIMCNT : DS     1       ;NOW USED FOR TIME COUNT IN GETTMP
0063                APPNUM : DS     1       ;APPLIANCE NUMBER
0064                FMCQUE : DS     16      ;QUE FOR FMCMSGS
0074                RDATA  : DS     2       ;RECEIVE  DATA POINTER
0076                TDATA  : DS     2       ;TRANSMIT DATA BYTE(NOT A POINTER)
0078                SIOF   : DS     1       ;SERIAL STATUS FLAGS
0079                BUZ_CNT: DS     1       ;BUZZ COUNTER FOR BEEPER
007A                KEY_FG : DS     1       ;KEY PAD FLAGS
007B                CNT_FG : DS     1       ;CONTROLLER SHADOW FLAG FOR HW AND HOLD
007C                LST_KEY: DS     2       ;LAST KEY FOR REPEAT CHECK
                    ;
     (01E0)         TRFG    EQU     SIOF.0
     (01E1)         DATAFG  EQU     SIOF.1
     (01E2)         STRTFG  EQU     SIOF.2
     (01E3)         STOPFG  EQU     SIOF.3  ;STOP BIT FLAG FOR RECEIVE
                    ;
     (01EB)         NO_EHW  EQU     KEY_FG.3  ;NO ELECTRIC HOT WATER HEATER FLAG
     (01EA)         ERR_TON EQU     KEY_FG.2  ;USE ERROR TONE WHEN DOING ST3_BZ
     (01E9)         CNT_ZZ  EQU     KEY_FG.1  ;WAIT 15 SECONDS FOR CONTROLLER TO UPDATE
     (01E8)         KEY_HLD EQU     KEY_FG.0  ;WAITING BUFFER NO KEY ENTRY ALLOWED
                    ;                         ;whatever GETTMP timer value is used.
                    ;
     (01EF)         CNT_TH  EQU     CNT_FG.3  ;CONTROLLER TEMP HOLD BIT(ST1_TH SHADOW)
     (01EE)         CNT_HW  EQU     CNT_FG.2  ;CONTROLLER HEAT WATER BIT(ST1_HW SHADOW)
     (01ED)         CNT_PT  EQU     CNT_FG.1  ;CONTROLLER PRICE TIER BIT(ST1_PT SHADOW)
     (01EC)         CNT_FL  EQU     CNT_FG.0  ;CONTROLLER FILTER BIT BIT(ST1_FL SHADOW)
                    ;
                    ;
----                D1SEG   DSEG  1 AT 0    ;MEMORY BANK 1
                    ;
0100                TRXMB  : DS    64       ;32 BYTE BUFFER
0140                RCXMB  : DS    64
0180                PMIBUF : DS    64       ;FOR PMI SCHEDULES
01C0                FLASH1 : DS     2
01C2                FLASH2 : DS     2
01C4                REST1  : DS     2
01C6                REST2  : DS     2
01C8                PM_PRD : DS     2       ;PERIOD COUNTER
01CA                PM_PNT : DS     2       ;POINTER
01CC                LC_CNT : DS     1
01CD                STATUS5: DS     1
     (0737)         ST5_FW   EQU    STATUS5.3       ;FLASH WEEKDAY/WEEKEND
     (0736)         ST5_HC   EQU    STATUS5.2       ;FURNACE HEAT/COOL ON BIT(Q BIT)
     (0735)         ST5_FL   EQU    STATUS5.1       ;FLASH LOAD CONTROL!!!!
     (0734)         ST5_RC   EQU    STATUS5.0       ;REQUEST CONFIGURATION(Z BIT) A004
                    ;
                    ;EQUATES  SPECIAL FOR OPTIMIZER AND CUSTOMER SERVICE TIMERS AND
                    ;           REPEAT KEY TIMER
     (0010)         NRM_TIM  EQU     16             ;.50 SEC, NORMAL TIMER GETKEY
     (0008)         RPT_TIM  EQU     8              ;.25 SEC, repeat timer, GETKEY
     (00BF)         OPT_CNT  EQU     255-(256/RPT_TIM) ;=255 -(8SEC/RPT_TIM*31.3mS)
                    ;
----                GTSEG   CSEG    IENT
                    ; ************************ GETI TABLE ENTRY *******************
0000   9910         SEL0   :SEL     MB0
0002   9911         SEL1   :SEL     MB1
0004   991F         SEL15  :SEL     MB15
```

```
0006 E 4000          INCSHL :TCALL   INCS_HL
0008 E 4000          DINCSHL:TCALL   DINCS_HL
000A   9C90          CLMBE  :CLR1    MBE
000C   9D90          STMBE  :SET1    MBE
000E E 4000          ADDBYT :TCALL   ADDBYTE
0010 E 4000          SUBSXD :TCALL   SUBS_XADE
0012 E 4000          SCDRST :TCALL   SCDREQ
0014 E 4000          CLRSCR :TCALL   CLS
0016   AA18          MXA@HL :MOV     XA,@HL
0018   9210          MVSTXA :MOV     STATE,XA
001A   AA44          XCXADE :XCH     XA,DE
001C   AA5A          MVXAHL :MOV     XA,HL
001E   8900          MXA_00 :MOV     XA,#00H
0020   8901          MXA_01 :MOV     XA,#01H
0022   89A0          MXA_A0 :MOV     XA,#0A0H
                     ;
                     ; *********************** TSTATSYS MAIN ROUTINE ***************
----                 COSEG  CSEG     INBLOCK
                     ;
                     ;*****************************************************************
                     ;   INITIALIZATION ROUTINES
                     ;
0000 R 05            MAIN:   GETI    CLMBE           ;SELECT MBO
0001   73                    MOV     A,#011B         ;SELECT ,95 uS
0002   93B3                  MOV     PCC,A
                     ;
0004 R 0F                    GETI    MXA_00          ;INIT STACK POINTER
0005   9280                  MOV     SP,XA           ;BECOMES OFFH
                     ;   INITIALIZE PORTS
0007   8914                  MOV     XA,#14H         ;PORT 4 OUTPUT,PORT 7 INPUT
0009   92EC                  MOV     PMGB,XA         ;PORT 2 OUTPUT ALSO
000B   890E                  MOV     XA,#0EH         ;PORT 6 INPUT, PORT 33,32,31 OUT
000D   92E8                  MOV     PMGA,XA         ;PORT 5 INPUT, TOO
000F   9DF3                  SET1    PORT3.3         ;TURN THEM OFF, EMERG HEAT
0011   9DD3                  SET1    PORT3.1         ;LED OFF, CRITICAL
0013   9DF2                  SET1    PORT2.3         ;BUZZER OFF
0015   70                    MOV     A,#0
0016   93F4                  OUT     PORT4,A         ;INITIALIZE KEYPAD
                     ;   INITIALIZE LCD
0018   71                    MOV     A,#1
0019   938E                  MOV     LCDC,A
001B   8918                  MOV     XA,#18H         ;changed 2/3/88 LCD fix!!!
001D   928C                  MOV     LCDM,XA
                     ;   INITIALIZE WATCH MODE REGISTER
001F   8984                  MOV     XA,#84H         ;WATCH MODE REGISTER
0021   9298                  MOV     WM,XA           ;BUZZ ENABLED,XT1 LOW,WATCH
                     ;                                OPERATION ENABLED,NORMAL
                     ;                                WATCH MODE,SYS CLOCK
                     ;   INITIALIZE PULL-UP RESISTORS
0023   89CF                  MOV     XA,#0CFH        ;ALL PORTS (0,1,2,3,6,7) HAVE,
0025   92DC                  MOV     POGA,XA         ;PULL UP RESISTORS ENABLED.
                     ;   INITIALIZE KEYBOARD INTERRUPTS (MUST BE POLLED BY TIMER)
0027   72                    MOV     A,#2            ;FALLING EDGE KR2-7
0028   93B6                  MOV     IM2,A
002A   9C8F                  CLR1    IRQ2            ;BE SURE IT IS CLEARED
                     ;   INITIALIZE SCHEDULER TIMER FOR 31.3 mS
002C   7B                    MOV     A,#0BH          ;START TIMER 31.3 mS
002D   9385                  MOV     BTM,A
```

```
0 02F   9DB2              EI                    ;ENABLE INTERRUPTS
0031    9D98              EI      IEBT          ;ENABLE BT INTERRUPT
                   ;
                   ;****************************************************************
                   ; INITIALIZE VARIABLES
                   ;
0033    A55A              SET1    TSB8S         ;SCHEDULE SELFTEST
0035 R  0F                GETI    MXA_00
0036    925E              MOV     TSB8PA,XA     ;INITIALIZE PARM
                   ;
                   ; MAIN LOOP
     R (0038)      TOP    EQU $
0038    A75A              SKT     TSB8S         ;CHECK FOR SELFTEST
003A    07                BR      TNXT1
003B    A45A              CLR1    TSB8S
003D E  AB4000            CALL    !SLFTST
0040 R  508F              BR      TERROR        ;RET COMES HERE
0042    A730       TNXT1: SKT     TSB1S         ;ANACOM
0044    07                BR      TNXT2
0045    A430              CLR1    TSB1S
0047 E  AB4000            CALL    !ANACOM
004A R  508F              BR      TERROR
004C    A736       TNXT2: SKT     TSB2S         ;FMCMSG
004E    07                BR      TNXT3
004F    A436              CLR1    TSB2S
0051 E  AB4000            CALL    !FMCMSG
0054 R  508F              BR      TERROR
0056    A73C       TNXT3: SKT     TSB3S         ;SNDTMP
0058    07                BR      TNXT4
0059    A43C              CLR1    TSB3S
005B E  AB4000            CALL    !SNDTMP
005E R  508F              BR      TERROR        ;RET COMES HERE
0060    A742       TNXT4: SKT     TSB4S         ;GETTMP, RETS
0062    07                BR      TNXT5
0063    A442              CLR1    TSB4S
0065 E  AB4000            CALL    !GETTMP
0068 R  508F              BR      TERROR
006A    A748       TNXT5: SKT     TSB5S         ;GETKEY
006C    07                BR      TNXT6
006D    A448              CLR1    TSB5S
006F E  AB4000            CALL    !GETKEY
0072 R  508F              BR      TERROR
0074    A74E       TNXT6: SKT     TSB6S         ;COMPMI
0076    07                BR      TNXT7
0077    A44E              CLR1    TSB6S
0079 E  AB4000            CALL    !COMPMI
007C R  508F              BR      TERROR        ;RET COMES HERE
007E    A754       TNXT7: SKT     TSB7S         ;OUTDIS, RETS
0080    06                BR      TNXT8
0081    A454              CLR1    TSB7S
0083 E  AB4000            CALL    !OUTDIS
0086    08                BR      TERROR
                   ; WATCHDOG CODE!!!**********************************************
0087    9DD2       TNXT8: SET1    PORT2.1       ;SEND ONE TO HDW. WATCHDOG!
0089    9CD2              CLR1    PORT2.1
008B    9DD2              SET1    PORT2.1       ;SEND OUT SPIKE
008D R  5038              BR      TOP
008F R  5038      TERROR: BR      TOP           ;??
```

```
                        ;***********************************************************
                        ;  THIS INTERRUPT ROUTINE WILL GO THROUGH ALL OF THE
                        ;  TSB'S AND COUNT DOWN THEIR TIMERS.  THE CURRENT TICK
                        ;  VALUE IS 31.3 mS.  !!!
                        ;***********************************************************
                        ;
0091     49             INTBT:  PUSH    XA      ;PUSH ALL REGISTERS ON STACK
0092     4F                     PUSH    BC
0093     4D                     PUSH    DE
0094     4B                     PUSH    HL
0095     8B30                   MOV     HL,#TSB ;BEGINNING OF TSB LIST
0097     E1             INBTLP: MOV     A,@HL   ;GET STATUS NIBBLE
0098     9938                   AND     A,#8    ;CHECK TIMER ACTIVE BIT
009A     9A80                   SKE     A,#8    ;SKIP IF SET
009C R 50BC                     BR      INBTNX  ;GO TO NEXT TSB
                        ;  TIMER IS ACTIVE SO DECREMENT TIMER COUNT
                        ;  WHEN ZERO RESET ACTIVE BIT AND SET SCHEDULE BIT
009E     4B                     PUSH    HL      ;PUT CURRENT TSB ON STACK
009F R 03                       GETI    INCSHL
00A0     E1                     MOV     A,@HL   ;GET HIGHEST NIBBLE
00A1     9977                   MOV     B,A     ;STORE IN B
00A3 R 03                       GETI    INCSHL
00A4 R 0B                       GETI    MXA@HL  ;GET LOW WORD OF TIMER
00A5     8D01                   MOV     DE,#1
00A7 R 08                       GETI    SUBSXD  ;DECREMENT
00A8     04                     BR      INBTN1  ;CONTINUE, NO BORROW
00A9     CF                     DECS    B
00AA     02                     BR      INBTN1  ;CONTINUE, STILL MORE
00AB     4A                     POP     HL      ;GET CURRENT TSB AGAIN ****
00AC     09                     BR      INBTZO
00AD                    INBTN1:
                        ;WRITE THE TIMER BACK OUT
00AD     AA10                   MOV     @HL,XA  ;WRITE OUT TIMER
00AF     DF                     XCH     A,B     ;GET RP IN A
00B0     CA                     DECS    L       ;MOVE BACK
00B1     01                     BR      INBTN2
00B2     CB                     DECS    H       ;IF L WAS 0
00B3     E8             INBTN2: MOV     @HL,A   ;SAVE IT
00B4     4A                     POP     HL      ;GET CURRENT TSB AGAIN ****
00B5     06                     BR      INBTNX          ;GO
                        ; TIME IS BELOW ZERO
00B6     E1             INBTZO: MOV     A,@HL   ;GET STATUS NIBBLE
00B7     9937                   AND     A,#7    ;RESET TIMER BIT
00B9     9944                   OR      A,#4    ;SET SCHEDULE BIT
00BB     E8                     MOV     @HL,A   ;SAVE STATUS NIBBLE
00BC     8D06           INBTNX: MOV     DE,#6   ;SIX NIBBLES TO NEXT TSB
00BE     AA42                   XCH     XA,HL
00C0 R 07                       GETI    ADDBYT
00C1     AA52                   MOV     HL,XA   ;PUT RESULT BACK
00C3     8D5A                   MOV     DE,#TSB8        ;END OF LIST
00C5 R 0D                       GETI    XCXADE          ;SWITCH
00C6 R 08                       GETI    SUBSXD
00C7 R 5097                     BR      INBTLP  ;NEXT TSB
                        ; CHECK FOR KEYPAD INTERRUPT NOW!!
00C9     BEC6                   SKF     PORT6.0         ;KEYBOARD IS DISABLED IF LOW
00CB     9F3F                   SKTCLR  IRQ2
00CD     04                     BR      INBTBZ
00CE     A548                   SET1    TSB5S           ;SCHEDULE ANALYZE KEYPAD ENTRY
```

```
00D0    9C9F                DI      IE2             ,DISABLE IT
                    ;
                    ; CHECK BUZZER
00D2    B615        INBTBZ: SKF     ST3_BC          ;BUZZ COUNTER
00D4 R  50E6                BR      INBZ1           ;BUZZ IN PROGRESS
00D6    8715                SKT     ST3_BS
00D8 R  50F3                BR      INBXIT          ;NO BUZZING
00DA    9CF2                CLR1    PORT2.3
00DC    73                  MOV     A,#3            ;STORE COUNT VALUE, NORMAL BEEP
00DD    A67A                SKF     ERR_TON         ;DONT CHANGE UNLESS ERROR
00DF    7C                  MOV     A,#12           ;VERY LONG FOR ERROR TONE 3/28/88
00E0    9379                MOV     BUZ_CNT,A
00E2    B515                SET1    ST3_BC          ;SET BUZZ  COUNTER
00E4    8415                CLR1    ST3_BS
00E6    A379        INBZ1:  MOV     A,BUZ_CNT
00E8    C8                  DECS    A
00E9    07                  BR      INBZ2
00EA    70                  MOV     A,#0
00EB    9DF2                SET1    PORT2.3
00ED    B415                CLR1    ST3_BC
00EF    A47A                CLR1    ERR_TON         ; 3/28/88
00F1    9379        INBZ2:  MOV     BUZ_CNT,A
                    ; END OF BUZZER!!!!
00F3    4A          INBXIT: POP     HL      ;POP REGS OFF STACK
00F4    4C                  POP     DE
00F5    4E                  POP     BC
00F6    48                  POP     XA
00F7    EF                  RETI
                    ;****************SERIAL I/O & ROUTINES AND INTERRUPTS******
                    ;
                    ;++++++++++++++++++++++++++++++++++++    .
                    ;
                    ;****** INTTO PROCESSING **********************************

00F8                INTTO:                          ;MBE=0,RBE=0
00F8    49                  PUSH    XA
00F9    9C9C                DI      IETO
00FB    B678                SKF     STOPFG          [redacted]
00FD    0C                  BR      ISTOP           ;12/1
00FE    890C                MOV     [redacted]      ; ORIG C        1/4/88
0100    92A6                MOV     TMODO,XA        ;TRANSFER RATE IS
0102    897C                MOV     [redacted]
0104    92A0                MOV     [redacted]      ;START TIMER
0106    9D9D                EI      IECSI
0108    48                  POP     XA
0109    EF                  RETI

010A                ISTOP:
010A    B478                CLR1    STOPFG
010C    8778                SKT     TRFG            ;IF XMIT DON'T ENABLE IE1
010E    9CAE                CLR1    IRQ1
0110    9DBE                EI      IE1             ;SET UP TO GET NEXT START BIT
0112    8478                CLR1    TRFG            ;11/16/87   SHOULD REMOVE 12/4
0114    48                  POP     XA
0115    EF                  RETI

                    ;***************INT1 PROCESSING**************************
0116                INTE1:                          ;MBE=0,RBE=0
```

```
0116    49          PUSH  XA
0117    9CBE        DI    IE1
0119    9C98        DI    IEBT          ;DISABLE 31.3 mS CLOCK!!
011B    8912        MOV   XA,#12H       ;-ORIG C  1.5 bit times 1/4/88
011D    92A6        MOV   TMOD0,XA      ;TRANSFER RATE IS
011F    897C        [redacted]
0121    92A0        MOV   TM0,XA        ;START TIMER
0123    9C8C        CLR1  IRQT0         ;SWITCHED THESE 2 WITH NEXT 2#
0125    9D9C        EI    IET0          ;NEW??
0127    89FF        MOV   XA,#0FFH
0129    92E4        MOV   SIO,XA        ;SIO <-- FFH 12/1
012B    48          POP   XA
012C    EF          RETI
                 ;++++++++++++++++++++++++++++++++++++++++++++++++++++++
                 ;
                 ;                INTCSI PROCESSING

012D                INTCSI:                 ;MBE=0, RBE=0
012D    9C9D        DI    IECSI
012F    49          PUSH  XA
0130    4B          PUSH  HL
0131    9907        PUSH  BS
0133    8678        SKF   TRFG
0135 R  5160        BR    TREND
                                        ;RECEIVE CODE
0137    A274        MOV   XA,RDATA      ;MESSAGE BUFFER POINTER
0139    AA52        MOV   HL,XA
013B    A2E4        MOV   XA,SIO
013D R  06          GETI  STMBE
013E R  01          GETI  SEL1
013F    AA10        MOV   @HL,XA
0141    C2          INCS  L
0142    C2          INCS  L
0143    01          BR    GO
0144    C3          INCS  H
0145 R  0E    GO:   GETI  MVXAHL
0146 R  05          GETI  CLMBE
0147    9274        MOV   RDATA,XA      ;STORE POINTER
0149    9578        SET1  DATAFG
014B    A530        SET1  TSB1S         ;11/16/87 GET ANACOM TO RUN
014D    8907        MOV   XA,#07H       ; ORIG C        ????
014F    92A6        MOV   TMOD0,XA      ;TRANSFER RATE IS
0151    897C        MOV   XA,#01111100B ;7C
0153    92A0        MOV   TM0,XA        ;START TIMER
0155    9C8C        CLR1  IRQT0
0157    B578        SET1  STOPFG
0159    9D9C        EI    IET0
015B    9906  CSEXIT: POP BS
015D    4A          POP   HL
015E    48          POP   XA
015F    EF          RETI
0160    B678  TREND: SKF  STOPFG
0162 R  5179        BR    TRSTOP
0164    A678        SKF   STRTFG
0166 R  517F        BR    TRBEG         ;BEGIN XMIT
0168 R  10          GETI  MXA_01        ; ORIG C
0169    92A6        MOV   TMOD0,XA      ;TRANSFER RATE IS
016B    897C        MOV   XA,#01111100B ;7C
```

```
543 016D    92A0              MOV    TM0,XA           ;START TIMER
544 016F    B578              SET1   STOPFG
545 0171    89FF              MOV    XA,#0FFH         ;STOP BIT FF   12/1
546 0173    92E4              MOV    SIO,XA           ;SIO<-- FF
547 0175    9D9D              EI     IECSI
548 0177 R  515B              BR     CSEXIT
549 0179               TRSTOP:
550 0179    B478              CLR1   STOPFG
551 017B    8478              CLR1   TRFG
552 017D R  515B              BR     CSEXIT
553 017F               TRBEG:
554 017F    890C              MOV    XA,#0CH          ; ORIG C
555 0181    92A6              MOV    TMOD0,XA         ;TRANSFER RATE IS
556 0183    897C              MOV    XA,#01111100B
557 0185    92A0              MOV    TM0,XA           ;START TIMER
558 0187    A276              MOV    XA,TDATA
559 0189    92E4              MOV    SIO,XA           ;XMIT THE DATA
560 018B    9D9D              EI     IECSI            ;WAIT FOR THIS CHAR TO GO
561 018D    A478              CLR1   STRTFG           ;SO WE CAN GO TO STOP CODE 11/16
562 018F R  515B              BR     CSEXIT
563                    ;*************************************************************
564                           END

TARGET CHIP : UPD75308
STACK SIZE = 0032H

ASSEMBLY COMPLETE,  NO ERROR FOUND

   ** MAIN SUBS  FOR TSTAT-AJB                                 **

COMMAND      :                   (COMMAND FILE :              )
MAINSUBS.ASM MOD=308

 STNO ADRS R OBJECT   IC MAC   SOURCE STATEMENT

    1                          $      TITLE='MAIN SUBS  FOR TSTAT-AJB'
    2                          ;(*-----------------------------------------------------------
    3                          ;(c) Copyright, Johnson Controls Incorporated, 1987.  All rights
    4                          ;   reserved. The following program is the exclusive property of
    5                          ;   Johnson Controls, Inc. and its use is restricted by license
    6                          ;   agreement to the system with which it was furnished.  The
    7                          ;   program contents are confidential and may not be disclosed
    8                          ;   or used outside the system without the express written
    9                          ;   consent of Johnson Controls.  This program is further
   10                          ;   protected by federal copyright law as an unpublished work
   11                          ;   and any unauthorized reproduction is prohibited.
   12                          ; 1. PURPOSE:
   13                          ;     MAIN SUBS is a group of routines that are the first level
   14                          ;       modules of the main program.
   15                          ;
   16                          ; 2. INPUTS:
   17                          ;
   18                          ;
   19                          ; 3. GLOBAL VARIABLES:
   20                          ;     None
   21                          ;
   22                          ; 4. OUTPUTS:
   23                          ;
```

```
;
; 5. PROCEDURES CALLED:
;     None
; 6. EXCEPTIONS:
;     None
; 7. UNIQUE FEATURES:
;     None
; 8. HISTORY
;     ORIGINAL - 08/24/87 - Alan J.Bronikowski Rev A000.1
;     REVISION - 10/19/87 - Alan J.Bronikowski Rev A000.2 NEW STUFF
;     REVISION - 11/23/87 - Alan J.Bronikowski Rev A000.3
;                             removed extra pushes and pops
;--------------------------------------------------------------*)
        NAME     MAINSUBS        ;MAIN SUBROUTINES
        EXTRN    CODE(INITBLK,ADDBYT,BCD2BIN,BIN2BCD,DSP2SG,BUF2F)
        EXTRN    CODE(SUBSXD,MULT8,DIV16,INCSHL,DOCHKSM,SCDRST,F2C)
        EXTRN    CODE(SEL0,SEL1,SEL15,ADCDBL,VCHKSMS,DSPSEG,BUF2C)
        EXTRN    CODE(STMBE,CLMBE,MXA@HL,MVSTXA,XCXADE,DINCSHL,C2F)
        EXTRN    CODE(CLRSCR,MXA_00,MXA_A0,MXA_01,MVXAHL)
        EXTRN    DATA(FTEMP,SW1,N1,N2,CNTSET,OLDTMP)
        EXTRN    DATA(CTEMP,MULTA,MULTB,DIVA,DIVB,TRXMB,RCXMB)
        EXTRN    DATA(TIMEMIN,TIMCNT,STATE,RP_CNT)
        EXTRN    DATA(TSB1PA,TSB1RP,TSB1TM,TSB2PA,TSB2RP,TSB2TM)
        EXTRN    DATA(TSB3RP,TSB3TM,TSB4RP,TSB4TM,TSB5RP)
        EXTRN    DATA(TSB5TM,TSB6PA,TSB7RP,TSB7TM,TSB8PA)
        EXTRN    DATA(TSB8RP,TSB8TM,FMCQUE,N7,N4,NRM_TIM,LST_KEY)
        EXTRN    DATA(RDATA,TDATA,SIOF,PMIBUF,TIMEHR,STATUS0)
        EXTRN    DATA(STATUS1,STATUS2,SETPNT,CNT_FG,RPT_TIM)
        EXTRN    BIT(SW1_HT,SW1_CL,SW1_FA,SW1_EH,ST3_BS,ST5_RC)
        EXTRN    BIT(ST4_AP,ST4_FC,ST4_FT,DATAFG,TRFG,STRTFG)
        EXTRN    BIT(TSB1S,TSB1T,TSB2S,TSB2T,TSB3T,TSB4T,TSB4S,TSB7S)
        EXTRN    BIT(TSB5T,TSB5S,TSB6S,TSB7T,TSB8S,TSB8T,KEY_HLD)
        EXTRN    BIT(CNT_HW,CNT_TH,CNT_ZZ,ST3_C,ST3_CL,ST1_TH,ST1_HW)
        EXTRN    BIT(CNT_PT,CNT_FL,ST1_PT,ST1_FL,ST5_HC,NO_EHW)
        PUBLIC   ANACOM,FMCMSG,SNDTMP
        PUBLIC   GETTMP,GETKEY,SLFTST
CMSUBS CSEG  SENT              ;
;
;***********************ANACOM 1.0******************************
;
;  1.  PURPOSE:
;        ANACOM routine reads the serial port and gets
;          the controller messages.  It then determines
;          the disposition of each message.
;
;  2.  INPUTS:
,
;
;  3.  GLOBAL VARIABLES:
;
;
;  4.  OUTPUTS:
;
;  5.  PROCEDURES CALLED:
;
;  6.  EXCEPTIONS:
;
;  7.  UNIQUE FEATURES:
```

```
                                ;
                                ;  8.  HISTORY:
                                ;       ORIGINAL - 10/06/87 - Alan J. Bronikowski Rev A000
                                ;       REVISION - 05/18/88 - Alan J. Bronikowski Rev A003
                                ;                             added code to check for HPR=0 & NO-EHW
                                ;       REVISION - 08/09/88 - Alan J. Bronikowski Rev A004
                                ;                             added code for ST5_RC(Z BIT) it
                                ;                             REQUESTS configuration.
                                ;*****************************************************************
                                ;
0000                            ANACON:
0000 E 00                               GETI    CLMBE
0001 E 8500                             SET1    TSB1S           ;CHECK AGAIN NEXT TIME
0003 E 8700                             SKT     DATAFG
0005   07                               BR      ANAGET
0006 E 8400                             CLR1    DATAFG          ;CLEAR THE DATAFLAG
0008 E 00                               GETI    MXA_00
0009 E 9200                     ANALV:  MOV     TSB1PA,XA
000B R 50E3                             BR      ANAXIT
000D E A200                     ANAGET: MOV     XA,TSB1PA       ;GET COUNTER
000F   C0                               INCS    A
0010   F8                               BR      ANALV
0011   C1                               INCS    X
0012   F6                               BR      ANALV
                                                                ;WILL ONLY GET HERE AFTER MSG IS DONE
0013   9CBE                             DI      IE1             ;SHUT OFF READ INTERRUPTS
                                                                ;GETS RE-ENABLED BY FMC(2.0)
0015   9D98                             EI      IEBT            ;GET TIMER GOING
0017 E 8400                             CLR1    TSB1S           ;NO CHECK AGAIN NEXT TIME
0019 E 00                               GETI    MXA_00
001A E 9200                             MOV     TSB1PA,XA       ;ZERO OUT COUNTER
001C E 8900                             MOV     XA,#RCXMB
001E E 9200                             MOV     RDATA,XA        ;SETUP FOR NEXT TIME
0020 E 00                               GETI    STMBE
0021 E 00                               GETI    SEL1
0022 E 8B00                             MOV     HL,#RCXMB       ;RECV MESSAGE BUFFER
0024 E AB4000                           CALL    !VCHKSMS        ;VERIFY CHECKSUM
0027 R 50E6                             BR      ANAERR          ;LEAVE IF BAD
0029 E 00                               GETI    DINCSHL         ;GET MESSAGE FIELD
002A E 00                               GETI    MXA@HL          ;
002B   9A00                             SKE     A,#0
002D   02                               BR      ANAG1
002E R 5043                             BR      ANAT0
0030                            ANAG1:
0030   71                               MOV     A,#1
0031   A8                               SUBS    A,@HL
0032 R 50E6                             BR      ANAERR          ;IT MUST BE 1,BAD MSG
0034   76                               MOV     A,#6            ;>2
0035   A8                               SUBS    A,@HL
0036 R 507B                             BR      ANAT2           ;2-6 SCHEDULES
                                ; SEVEN OR MORE
0038 E 00                               GETI    MXA@HL          ;CHECK FOR ACK MSG
0039   9AF0                             SKE     A,#0FH
003B R 50E6                             BR      ANAERR          ;ANYTHING ELSE IS ERROR
003D   9AF1                             SKE     X,#0FH
003F R 50E6                             BR      ANAERR          ;ANYTHING ELSE IS ERROR
                                        ;ACK RECEIVED
0041 R 50D9                             BR      ANAACK
```

```
0043                  ANAT0:
                              ;TIME MESSAGE
0043 E 00                     GETI   DINCSHL
0044 E 00                     GETI   DINCSHL        ;4 NIBBLES TO HOURS
0045 E 00                     GETI   MXA@HL         ;GET HOUR
0046 E 00                     GETI   SEL0
0047 E 9200                   MOV    TIMEHR,XA      ;STORE IT
0049 E 00                     GETI   SEL1
004A E 00                     GETI   DINCSHL        ;2 NIBBLES TO MINUTES
004B E 00                     GETI   MXA@HL         ;GET MIN
004C E 00                     GETI   SEL0
004D E 9200                   MOV    TIMEMIN,XA     ;STORE IT
004F E 00                     GETI   SEL1
0050 E 00                     GETI   DINCSHL        ;2 NIBBLES TO STATUS 1
0051 E 00                     GETI   MXA@HL
0052 E 00                     GETI   SEL0
0053 E 9300                   MOV    CNT_FG,A       ;STORE IN CNT_FG TEMP.
0055   D9                     XCH    A,X
0056 E 9300                   MOV    STATUS0,A      ;STORE STATUS 0
0058 E 00                     GETI   SEL1
0059 E 00                     GETI   DINCSHL
005A E 00                     GETI   MXA@HL         ;GET THE BYTE
005B E 00                     GETI   SEL0
005C E 9300                   MOV    STATUS2,A      ;STORE IT
005E E 00                     GETI   SEL1
005F   D9                     XCH    A,X
0060 E 8400                   CLR1   ST5_RC         ;1ST CLEAR IT   A004
0062 E 8500                   SET1   ST5_HC         ;1ST SET IT     A004
0064   98                     RORC   A              ;A004
0065   D7                     SKT    CY             ;Q BIT!!!!          12/22/87
0066 E 8400                   CLR1   ST5_HC         ; IF NOT SET THEN CLEAR IT  A004
0068   98                     RORC   A              ;A004
0069   D7                     SKT    CY             ;Z BIT!!!!       8/09/88   A004
006A   08                     BR     ANAT1          ; IF NOT SET THEN CONTINUE  A004
006B E 8500                   SET1   ST5_RC         ; IF SET THEN SET IT        A004
006D   8950                   MOV    XA,#50H        ;REQUEST CONFIG MESG F      A004
006F E 00                     GETI   SCDRST         ;SCHEDULE IT                A004
0070 E 00                     GETI   SEL0           ;                           A004
0071 E 8400                   CLR1   KEY_HLD        ;NOT DISPLAYED SO CLEAR HOLDA004
0073 E 00             ANAT1:  GETI   SEL1           ,A004 TO BE SURE
0074 E 00                     GETI   DINCSHL        ;NEXT BYTE
0075 E 00                     GETI   MXA@HL         ;GET SETPT
0076 E 00                     GETI   SEL0
0077 E 9200                   MOV    CNTSET,XA      ;STORE IT , IN CNTSET
0079 R 50D9                   BR     ANAACK
007B                  ANAT2:
007B E 00                     GETI   SEL1
007C E 00                     GETI   MXA@HL         ;HL POINTS AT MSG TYPE
007D   9A50                   SKE    A,#5
007F R 50AC                   BR     ANAC2
                              ;TYPE 5, DID I REQUEST CONFIGURATION   A004
0081 E 8600                   SKF    ST5_RC         ;                A004
0083   05                     BR     ANAT20         ;RC IS SET       A004
                              ;TYPE 5, ARE WE IN SELFTEST
0084 E 00                     GETI   SEL0
0085 E 8700                   SKT    TSB8T
0087 R 50B5                   BR     ANAT21         ;NO CONTINUE
                              ;GET F/C AND 12/24 INFO
```

```
0089 E 8B08        ANAT20: MOV    HL,#RCXMB+8
008B E 00                  GETI   SEL1
008C E 8400                CLR1   ST5_RC       ;RESET IT      A004
008E E 00                  GETI   MXA@HL       ;GET F/C INFO
008F E 00                  GETI   SEL0
0090 E 8400                CLR1   ST3_C        ;DEGREES F
0092   9A00                SKE    A,#0
0094 E 8500                SET1   ST3_C        ;A=1 DEG C
0096 E 00                  GETI   DINCSHL      ;GO AFTER 12/24
0097 E 00                  GETI   SEL1
0098 E 00                  GETI   MXA@HL
0099 E 00                  GETI   SEL0
009A E 8400                CLR1   ST3_CL       ;12 HR
009C   9A00                SKE    A,#0
009E E 8500                SET1   ST3_CL       ;24 HR
00A0 E 00                  GETI   DINCSHL      ;   NEW 5/18/88
00A1 E 00                  GETI   DINCSHL
00A2 E 00                  GETI   DINCSHL      ;ADVANCE TO HPR
00A3 E 00                  GETI   SEL1
00A4 E 00                  GETI   MXA@HL       ;GET THE NUMBER
00A5 E 00                  GETI   SEL0
00A6 E 8500                SET1   NO_EHW
00A8   9A00                SKE    A,#0
00AA E 8400                CLR1   NO_EHW       ;NOT 0 SO THERE IS AN EHW!!!  5/18/88
00AC               ANAC2:
00AC   9A20                SKE    A,#2
00AE   06                  BR     ANAT21       ;CONTINUE
00AF E 00                  GETI   SEL0
00B0 E 8600                SKF    ST3_C        ;SKIP IF DEG'S F!!
00B2 E AB4000              CALL   !BUF2C       ;CONVERT BUFFER FROM F TO C
00B5               ANAT21: ;TRANSFER FROM REC BUF TO PMIBUF
00B5 E 00                  GETI   SEL1
00B6   8D3F                MOV    DE,#64-1     ;MOVE 32 BYTES
00B8 E 8F00                MOV    BC,#PMIBUF   ;ADDR OF PMI BUFFER
00BA E 8B00                MOV    HL,#RCXMB    ;ADDR OF REC BUFFER
00BC E 00          ANALP   GETI   MXA@HL       ;GET NIBBLE
00BD   AA46                XCH    XA,BC
00BF   AA42                XCH    XA,HL
00C1   AA46                XCH    XA,BC
00C3   AA10                MOV    @HL,XA       ;REALLY GOES TO BC
00C5 E 00                  GETI   INCSHL
00C6 E 00                  GETI   MVXAHL
00C7   AA46                XCH    XA,BC
00C9   AA42                XCH    XA,HL
00CB E 00                  GETI   INCSHL
00CC   CC                  DECS   E
00CD R 50BC                BR     ANALP
00CF   CD                  DECS   D
00D0 R 50BC                BR     ANALP
                   ; MUST SCHEDULE PMI
00D2 E 00                  GETI   SEL0
00D3 E 8500                SET1   TSB6S
00D5   8937                MOV    XA,#37H      ;BUFFER KEYCODE
00D7 E 9200                MOV    TSB6PA,XA
00D9 E 00          ANAACK: GETI   SEL0
00DA E 8400                CLR1   ST4_AP       ;SCHEDULE FMCMSG SO IT KNOWS
00DC E 8700                SKT    TSB2T        ;ACK HAS BEEN RECEIVED IMMEDIATELY
00DE   04                  BR     ANAXIT
```

```
00DF E 8400                CLR1    TSB2T
00E1 E 8500                SET1    TSB2S
00E3               ANAXIT:
00E3 E 8400                CLR1    ST4_FC          ;NEW 4/21/88
00E5   E0                  RETS
00E6               ANAERR:
                   ; MAY BE SEND AN ERROR NUMBER BACK AT LEAST FOR TESTING ????
00E6   EE                  RET
                   ;
                   ;************************ANACOM  END******************************
                   ;
                   ;***********************FMCMSG 2.0********************************
                   ;
                   ;  1.  PURPOSE:
                   ;        FORMAT MESSAGES TO CONTROLLER
                   ;        THIS TASK GETS PARAMETERS PASSED IN AND THEN
                   ;        BUILDS THE REQUESTED MESSAGE, CALL DOCHECKSUM
                   ;        AND SENDS THE MESSAGE OUT!
                   ;
                   ;  2.  INPUTS:
                   ;
                   ;
                   ;  3.  GLOBAL VARIABLES:
                   ;
                   ;
                   ;  4.  OUTPUTS:
                   ;
                   ;  5.  PROCEDURES CALLED: ADDBYTE, DOCHKSM
                   ;
                   ;  6.  EXCEPTIONS:
                   ;
                   ;  7.  UNIQUE FEATURES:
                   ;
                   ;  8.  HISTORY:
                   ;        ORIGINAL - 10/06/87 - Alan J. Bronikowski Rev A000
                   ;        REVISION - 04/21/88 - Alan J. Bronikowski Rev A003
                   ;                                 changed repeat count to 15 to fix startup
                   ;**********************************************************
                   ;
     R (00E7)      FMCMSG  EQU     $
00E7 E 00                  GETI    STMBE           ;NEED BOTH MEMORY BANKS
00E8 E 00                  GETI    SEL0            ;MEM BANK 0
00E9 E A200                MOV     XA,RP_CNT       ;GET REPEAT COUNT
00EB   9A00                SKE     A,#0            ;IF 0 1ST TIME THRU
00ED R 524D                BR      FMCACK          ;GO TO ACK CHECK
                           ;GET QUE ENTRY
00EF   9A0E                MOV     C,#0
00F1 E 8B00                MOV     HL,#FMCQUE
00F3 E 8D00                MOV     DE,#FMCQUE
00F5 E 00                  GETI    MXA@HL
00F6 E 9200                MOV     TSB2PA,XA
00F8 E 00          FMCGLP: GETI    DINCSHL
00F9 E 00                  GETI    MXA@HL
00FA   EC                  XCH     A,@DE
00FB   D9                  XCH     A,X
00FC   C4                  INCS    E
00FD   01                  BR      FMCGO
00FE   C5                  INCS    D
```

```
0OFF   EC             FMCG0:  XCH    A,@DE
0100   9A00                   SKE    A,#0
0102   04                     BR     FMCG1
0103   9A01                   SKE    X,#0
0105   01                     BR     FMCG1
0106   0A                     BR     FMCGDN       ;DONE
0107 E 00             FMCG1:  GETI   MVXAHL
0108 E 00                     GETI   XCXADE
0109   C6                     INCS   C
010A   9A76                   SKE    C,#7         ; 0-7 GETS 8 12/16/87 AJB
010C R 50F8                   BR     FMCGLP
010E E 00                     GETI   MXA_00
010F   AA10                   MOV    @HL,XA       ;ZERO OUT LAST LOCATION
0111 E 8B01           FMCGDN: MOV    HL,#TSB2PA+1 ;GET MESSAGE TYPE, 1ST NIBBLE??
0113   70                     MOV    A,#0
0114   A8                     SUBS   A,@HL
0115 R 524C                   BR     FMCXIT       ;IT MUST BE 0, NO MESSAGE!!
0117   71                     MOV    A,#1
0118   A8                     SUBS   A,@HL
0119 R 5156                   BR     FMC1         ;IT MUST BE 1
011B   76                     MOV    A,#6         ;>2
011C   A8                     SUBS   A,@HL
011D R 513B                   BR     FMCREQ       ;2-6 REQUESTS
                      ; SEVEN OR MORE
011F E A200           FMC7CK: MOV    XA,TSB2PA    ;GET MESSAGE TYPE
0121   9A71                   SKE    X,#7
0123   02                     BR     FMC8CK
0124 R 5180                   BR     FMC7
0126   9A81           FMC8CK: SKE    X,#8
0128   02                     BR     FMC9CK
0129 R 51AE                   BR     FMC8
012B   9A91           FMC9CK: SKE    X,#9
012D   01                     BR     FMC10K
012E   05                     BR     FMCERR       ;NO ACK'S.ARE SENT OUT
012F   9AA1           FMC10K: SKE    X,#10
0131   02                     BR     FMCERR       ;BAD MESSAGE TYPE ERROR, COULD BE 0!!
0132 R 51C8                   BR     FMC10
0134 E 00             FMCERR: GETI   SEL0
0135 E 8400                   CLR1   ST4_AP       ;CLEAR ACK PEND
0137 E 00                     GETI   MXA_00       ; FOR BYTE COUNT  ERRORS 3/28/88
0138 E A200                   MOV    XA,RP_CNT    ;CLEAR REPEAT COUNTER
013A   EE                     RET                 ; GET OUT
     R (013B)         FMCREQ  EQU    $            ;THESE ARE 2-6 THE REQUESTS
013B E 00                     GETI   SEL1         ;          C-G
013C E 8B00                   MOV    HL,#TRXMB
013E E 00                     GETI   MXA_00       ;0 BYTE DATA FIELD
013F   AA10                   MOV    @HL,XA
0141 E 00                     GETI   DINCSHL
0142 E 00                     GETI   SEL0
0143 E A200                   MOV    XA,TSB2PA
0145   AA54                   MOV    DE,XA        ;SAVE TSB2PA
0147   D9                     XCH    A,X          ;SWITCH POSITIONS
0148   9A09                   MOV    X,#0         ;ZERO OUT HI BYTE
014A E 00                     GETI   SEL1
014B   AA10                   MOV    @HL,XA       ;STORE MESSAGE NUMBER  (C=2)ETC.
014D E 00                     GETI   DINCSHL
014E   AA5C                   MOV    XA,DE        ;RESTORE TSB2PA
0150   9A09                   MOV    X,#0
```

```
0152   AA10              MOV   @HL,XA       ;STORE ADDRESS FIELD
0154 R 51F3              BR    FMCEND       ;SEND IT OUT
                  ; TEMPERATURE AND SWITCH SETTING MESSAGE (B) 1
     R (0156)     FMC1   EQU   $
0156 E 8B00              MOV   HL,#TRXMB    ;GET TRANSMIT BUFFER
0158 E 00                GETI  SEL1         ;MEMORY BANK1
0159   8902              MOV   XA,#2        ;DATA FD BYTE COUNT
015B   AA10              MOV   @HL,XA
015D E 00                GETI  DINCSHL      ;POINT TO NEXT BYTE
015E   C8                DECS  A            ;ONE LESS THAN BC
015F   AA10              MOV   @HL,XA       ;1 FOR MSG TYPE TOO
0161 E 00                GETI  DINCSHL
0162 E 00                GETI  MXA_00
0163   AA10              MOV   @HL,XA       ;ADDR FIELD 0
0165 E 00                GETI  DINCSHL
0166 E 00                GETI  SEL0
0167 E A200              MOV   XA,FTEMP     ;GET TEMP
0169 E 00                GETI  SEL1
016A   AA10              MOV   @HL,XA
016C E 00                GETI  DINCSHL
016D E 00                GETI  SEL0
016E E A200              MOV   XA,STATE       ;?OK
0170   9A00              SKE   A,#0
0172   04                BR    FMC1A
0173   9A01              SKE   X,#0
0175   01                BR    FMC1A
0176   02                BR    FMC1B        ;X IS SET TO 0 STATE
0177   9A19       FMC1A: MOV   X,#1         ;NOT STATE 0
0179 E A300       FMC1B  MOV   A,SW1        ;GET SWITCH ONE SETTINGS
017B E 00                GETI  SEL1
017C   AA10              MOV   @HL,XA
017E R 51F3              BR    FMCEND
                  ;^^^^^^^^^^^^^^^^^^^^^^^^^^^^^^^^^^^^^^^^^^^^^^^^^^^^^^^^^^^^^^^^
     R (0180)     FMC7   EQU   $            ;MESSAGE TYPE 7 (H) OVERRIDE
0180 E 8B00              MOV   HL,#TRXMB    ;GET A MESSAGE BUFFER
0182 E 00                GETI  SEL1
0183   8902              MOV   XA,#2        ;DF BC OF 2
0185   AA10              MOV   @HL,XA
0187 E 00                GETI  DINCSHL
0188   8907              MOV   XA,#7        ;REAL MESSAGE NUMBER
018A   AA10              MOV   @HL,XA
018C E 00                GETI  DINCSHL
018D E 00                GETI  MXA_00
018E   AA10              MOV   @HL,XA
0190 E 00                GETI  DINCSHL
0191 E 00                GETI  SEL0
0192 E A200              MOV   XA,TSB2PA
0194   9A09              MOV   X,#0
0196 E 00                GETI  SEL1
0197   AA10              MOV   @HL,XA
0199 E 00                GETI  DINCSHL
019A E 00                GETI  SEL0
019B E A200              MOV   XA,SETPNT    ;NEW SETPOINT???AJB
019D E 0700              SKT   ST3_C        ;DEG C???
019F   09                BR    FMC7A        ;DEG F
01A0 E AB4000            CALL  !BCD2BIN
01A3 E AB4000            CALL  !C2F         ;YES,CONVERT
01A6 E AB4000            CALL  !BIN2BCD
```

```
01A9 E 00        FMC7A:  GETI    SEL1
01AA   AA10              MOV     @HL,XA
01AC R 51F3              BR      FMCEND
                 ;^^^^^^^^^^^^^^^^^^^^^^^^^^^^^^^^^^^^^^^^^^^^^^^^^^^^^^^^^^^^
                 ;
                 ;^^^^^^^^^^^^^^^^^^^^^^^^^^^^^^^^^^^^^^^^^^^^^^^^^^^^^^^^^^^^
     R (01AE)    FMC8    EQU     $               ;MESSAGE TYPE 8 (I) MISC.
01AE E 8B00              MOV     HL,#TRXMB       ;GET A MESSAGE BUFFER
01B0 E 00                GETI    SEL1
01B1 E 00                GETI    MXA_01          ;DF BC OF 1
01B2   AA10              MOV     @HL,XA
01B4 E 00                GETI    DINCSHL
01B5   8908              MOV     XA,#8           ;REAL MESSAGE NUMBER
01B7   AA10              MOV     @HL,XA
01B9 E 00                GETI    DINCSHL
01BA E 00                GETI    MXA_00
01BB   AA10              MOV     @HL,XA
01BD E 00                GETI    DINCSHL
01BE E 00                GETI    SEL0
01BF E A200              MOV     XA,TSB2PA       ;SUB OP CODE
01C1   9A09              MOV     X,#0
01C3 E 00                GETI    SEL1
01C4   AA10              MOV     @HL,XA
01C6 R 51F3              BR      FMCEND
                 ;^^^^^^^^^^^^^^^^^^^^^^^^^^^^^^^^^^^^^^^^^^^^^^^^^^^^^^^^^^^^
                 ;       NO FMC9 -- DELETED AJB!
                 ;
                 ;^^^^^^^^^^^^^^^^^^^^^^^^^^^^^^^^^^^^^^^^^^^^^^^^^^^^^^^^^^^^
     R (01C8)    FMC10   EQU     $
                         ;CHECK FOR TYPE 2 AND DEG C SO IT CAN BE CONVERTED TO F!!!
01C8 E 00                GETI    SEL1            ;MUST HAVE RIGHT MB 11/24/87
01C9 E 8B02              MOV     HL,#PMIBUF+2    ;GET MSG TYPE
01CB E 00                GETI    MXA@HL
01CC   9A20              SKE     A,#2
01CE   07                BR      FMC10A
                         ;TYPE 2 CHECK FOR DEG C
01CF E 00                GETI    SEL0
01D0 E 8700              SKT     ST3_C
01D2   03                BR      FMC10A          ; DEG F SO GO ON
01D3 E AB4000            CALL    !BUF2F          ;CONVERT BUFFER FROM C TO F
                         ;TRANSFER FROM PMI BUF TO TRXMB
01D6 E 00        FMC10A: GETI    SEL1
01D7   8D1F              MOV     DE,#32-1        ;MOVE 32 BYTES  12/3/87
01D9 E 8F00              MOV     BC,#TRXMB       ;ADDR OF REC BUFFER
01DB E 8B00              MOV     HL,#PMIBUF      ;ADDR OF PMI BUFFER
01DD E 00        FMCLP:  GETI    MXA@HL          ;GET NIBBLE
01DE   AA46              XCH     XA,BC
01E0   AA42              XCH     XA,HL
01E2   AA46              XCH     XA,BC
01E4   AA10              MOV     @HL,XA          ;REALLY GOES TO BC
01E6 E 00                GETI    DINCSHL
01E7 E 00                GETI    MUXAHL
01E8   AA46              XCH     XA,BC
01EA   AA42              XCH     XA,HL
01EC E 00                GETI    DINCSHL
01ED   CC                DECS    E
01EE R 51DD              BR      FMCLP
01F0   CD                DECS    D
```

```
01F1 R 51DD                BR      FMCLP
01F3 E 00          FMCEND: GETI    SEL1
01F4 E 8B00                MOV     HL,#TRXMB         ;POINT BACK TO TOP OF BUFFER
                           ; added code to chk byte count
01F6 E 00                  GETI    MXA@HL
01F7   8D1D                MOV     DE,#1DH           ;1 LARGER THAN MAX BYTES
01F9 E 00                  GETI    SUBSXD
01FA R 5134                BR      FMCERR            ;XA >= 1D ERROR!!!!
                           ; IF SKIPED OK!!!      end of added code
01FC E AB4000              CALL    !DOCHKSM          ;DO CHECK SUM
01FF E 00                  GETI    MXA@HL
0200   8D03                MOV     DE,#3             ;OF BC PLUS ADDRESSES
0202 E 00                  GETI    ADDBYT            ;TOTAL BYTE COUNT
0203   AA54                MOV     DE,XA             ;SAVE BYTE COUNT
0205   9C98                DI      IEBT              ;DISABLE 31.3mS CLOCK
0207   9CBE                DI      IE1               ;DISABLE RECEIVE INTERRUPT
0209 E 00                  GETI    SEL0
020A E A200                MOV     XA,RP_CNT
020C   C0                  INCS    A                 ;INCREMENT RP COUNTER
020D E 9200                MOV     RP_CNT,XA         ;10/12/87
020F E 00                  GETI    SEL1
0210 E 00          FMCGO:  GETI    MXA@HL            ;GET DATA

                   ;       TRSUB
0211 E 00                  GETI    CLMBE
0212 E 8600        FMCGO1: SKF     TRFG              ;TIGHT LOOP
0214   FD                  BR      FMCGO1            ;WAIT TILL LAST CHAR IS OUT
0215 E 9200                MOV     TDATA,XA          ;PUT CHAR IN TDATA ;MOVED 12/2
0217 E 8500                SET1    TRFG
0219 E 8500                SET1    STRTFG            ;START BIT FOR XMIT
021B E 00                  GETI    MXA_01            ; was 0c
021C   92A6                MOV     TMOD0,XA
021E   897C                MOV     XA,#01111100B
0220   92A0                MOV     TM0,XA            ;START TIMER
0222   897F                MOV     XA,#07FH          ;COMPRESSED START BIT??    12/3
0224   92E4                MOV     SIO,XA            ;SIO<-- START BIT
0226   9D9D                EI      IECSI             ;ENABLE INTERRUPT

                   ;
0228 E 00                  GETI    STMBE
0229 E 00                  GETI    DINCSHL
022A   CC                  DECS    E
022B   01                  BR      FMCGP
022C   CD                  DECS    D
022D R 5210        FMCGP:  BR      FMCGO
022F   8DFF                MOV     DE,#0FFH          ;DO A 1 MILLISEC DELAY FOR LAST CHAR
0231   60          FMCGP1: NOP
0232   60                  NOP
0233   60                  NOP                       ;EXTRA TIME 3/23/88
0234   CC                  DECS    E
0235   FB                  BR      FMCGP1
0236   CD                  DECS    D
0237   F9                  BR      FMCGP1            ;THIS SHOULD BE RIGHT
0238   9CAE                CLR1    IRQ1              ;CLEAR IT FIRST  12/3
023A   9DBE                EI      IE1
023C   9C98                CLR1    IRQBT             ; GIVE US TIME  3/23/88
023E   9D98                EI      IEBT              ;RE-ENABLE BOTH
                   ; ALL DONE WITH MESSAGE
```

```
0240 E 00              GETI   SEL0
0241 E 8500            SET1   ST4_AP         ;ACK PEND BIT
0243   8920            MOV    XA,#32         ; 1  SEC  4/21/88
0245 E 9200            MOV    TSB2TM,XA
0247   70              MOV    A,#0
0248 E 9300            MOV    TSB2RP,A
024A E 8500            SET1   TSB2T          ;
024C            FMCXIT:
024C   E0              RETS          ;END OF FMCMSG!!!
     R (024D)   FMCACK EQU    $              ;NON ZERO RP COUNTER
024D E 8700            SKT    ST4_AP         ;ACK PENDING
024F   0A              BR     FMCCLN         ;GO TO CLEAN UP
0250 E 8B00            MOV    HL,#TRXMB      ;
                        ;CHECK REPEAT COUNT
0252   9AF0            SKE    A,#15          ; should help start up ajb 4/21/88
0254 R 51F3            BR     FMCEND         ;SEND IT OUT AGAIN
0256 E 8500            SET1   ST4_FC         ;NEW 4/21/88
0258 E 8400            CLR1   KEY_HLD        ;NEW 3/28 ; ADDED IF NO RESP.!!
025A            FMCCLN:              ;IF >15  OR NO ACK_PEND
                ;      CLEAN UP AND LEAVE; OTHER TASKS SHOULD TIME OUT?????
025A E 00              GETI   MXA_00         ;removed keyhld clear, ajb 1/9/88
025B E 9200            MOV    RP_CNT,XA      ;ZERO OUT REPEAT COUNTER
025D E 9200            MOV    TSB2PA,XA      ;ZERO OUT PARM FIELD
025F E 8500            SET1   TSB2S          ;SCHEDULE IT TO GET NEXT ENTRY
0261 R 524C            BR     FMCXIT
                ;---------------------------------------------------------------
                ;***********************FMCMSG END******************************
                ;
                ;***********************SMDTMP 3.0******************************
                ;
                ;
                ; NOTE: THE HARDWARE SHOWS A 1 WHEN THE SWITCH IS OFF AND A 0
                ;      WHEN ON  BUT!!! THIS CODE WILL REVERSE THAT SO THAT AS
                ;      AS FAR AS THE SOFTWARE IS CONCERNED A 1=ON, 0=OFF!!!
                ;
                ;
                ; 1.  PURPOSE:
                ;      GET THE SWITCH SETTINGS NOW!!!!
                ;            SWITCHES --> SW1 HCFE
                ;
                ;      H - HEATING MODE, C - COOLING MODE, F - FAN AUTO, E - EMG HT
                ;
                ; 2.  INPUTS:
                ;
                ; 3.  GLOBAL VARIABLES:
                ;
                ; 4.  OUTPUTS:
                ;
                ; 5.  PROCEDURES CALLED:
                ;
                ; 6.  EXCEPTIONS:
                ;
                ; 7.  UNIQUE FEATURES:
                ;
                ; 8.  HISTORY:
```

```
                 ;       ORIGINAL - 9/21/87 - Alan J. Bronikowski Rev A000
                 ;       REVISION -10/23/87 - Alan J. Bronikowski Rev A000.1
                 ;                            reversed heat&cool
                 ;       REVISION - 3/17/88 - Alan J. Bronikowski Rev A002
                 ;                            changed timer to every 3.5 seconds
                 ;       REVISION -09/07/88 - Alan J. Bronikowski Rev A005
                 ;                            added code to turn off led's in
                 ;                            response to FAN and EM HEAT switches
                 ;****************************************************************
0263             SNDTMP:
0263 E 00                GETI    CLMBE
                         ; new code for manufacturing diagnostic 9/7/88  A005
0264 E 8600              SKF     TSBBT           ; GO ON IF SLFTST IS NOT GOING
0266 R 528D              BR      SNDTST          ;A005
                 ;GATHER SWITCH INFO
0268 E 8400              CLR1    SW1_HT          ;OFF FIRST
026A   BFE5              SKT     PORT5.2         ;HEAT
026C E 8500              SET1    SW1_HT          ;WAS 0 SO IT IS ON
                 ;
026E E 8400              CLR1    SW1_CL          ;OFF FIRST
0270   BFF5              SKT     PORT5.3         ;COOL
0272 E 8500              SET1    SW1_CL          ;WAS 0 SO IT IS ON
                 ;
0274 E 8400              CLR1    SW1_FA          ;OFF FIRST
0276   BFD5              SKT     PORT5.1         ;FAN AUTO
0278 E 8500              SET1    SW1_FA          ;WAS 0 SO IT IS ON
                 ;
027A E 8400              CLR1    SW1_EH          ;OFF FIRST
027C   BFC5              SKT     PORT5.0         ;EMERGENCY HEAT
027E E 8500              SET1    SW1_EH          ;WAS 0 SO IT IS ON
                 ;
                 ; SCHEDULE FORMAT MESSAGE TO CONTROLLER
0280   8910      SNDEND: MOV     XA,#10H         ;MESSAGE B,TEMP
0282 E 00                GETI    SCDRST          ;SCHEDULE IT
                 ;
                 ; RESCHEDULE YOURSELF!
0283   70                MOV     A,#0            ; HI COUNTER
0284 E 9300              MOV     TSB3RP,A
0286   8920              MOV     XA,#32          ; 32 = 1  SEC (was3.5) 4/22/88
0288 E 9200              MOV     TSB3TM,XA
028A E 8500              SET1    TSB3T           ;TURN TIMER ON
028C   E0                RETS                    ;NORMAL RET IS ERROR
                 ; REST OF MANUFACTURING CODE                    A005
028D   9DD3      SNDTST: SET1    PORT3.1         ;CRIT LED OFF
028F   BFD5              SKT     PORT5.1         ;FAN AUTO
0291   9CD3              CLR1    PORT3.1         ;CRIT LED ON
                 ;
0293   9DF3              SET1    PORT3.3         ;EM HEAT OFF
0295   BFC5              SKT     PORT5.0         ;EMERGENCY HEAT
0297   9CF3              CLR1    PORT3.3         ;EM HEAT ON
0299 R 5280              BR      SNDEND          ; ALL DONE       A005

                 ;***********************SNDTMP END*****************************
                 ;
                 ;**********************GETTMP 4.0******************************
```

```
                        ;
                        ;
                        ; 1.  PURPOSE:
                        ;  GET TEMPERATURE AND CONVERT TO FTEMP AND CTEMP
                        ; MUST RESCHEDULE ITSELF WHEN IT IS DONE!
                        ;
                        ; 2.  INPUTS
                        ;
                        ;
                        ; 3.  GLOBAL VARIABLES:
                        ;
                        ;
                        ; 4.  OUTPUTS:
                        ;
                        ; 5.  PROCEDURES CALLED: ADDBYTE, BIN2BCD, DIV16, DSPSEG,
                        ;                        MULT8,SUBS_XADE
                        ;
                        ; 6.  EXCEPTIONS:
                        ;
                        ; 7.  UNIQUE FEATURES:
                        ;
                        ; 8.  HISTORY:
                        ;     ORIGINAL - 9/21/87 - Alan J. Bronikowski Rev A000
                        ;     REVISION - 3/17/88 - Alan J. Bronikowski Rev A002
                        ;                          changed tiner to 1/5 sec.
                        ;*****************************************************************
029B                    GETTMP:
029B E 00                       GETI    CLMBE           ;POINT TO MB1 AND 15
029C E 00                       GETI    MXA_00
029D   92C0                     MOV     BSB0,XA         ;CLEAR BIT BUFFER 0&1
029F   92C2                     MOV     BSB2,XA         ;CLEAR BIT BUFFER 2&3
02A1   9A8A                     MOV     L,#8            ;MSB -> LSB
02A3   9CE3                     CLR1    PORT3.2         ;SELECT ADC
02A5   60                       NOP                     ;T-SETUP 100 nSec
02A6   9DC2             GTNEXT: SET1    PORT2.0         ;START CLOCK
02A8   7F                       MOV     A,#0FH          ;DELAY LOOP
02A9   C8               GTLP:   DECS    A
02AA   FE                       BR      GTLP
02AB   9CC2                     CLR1    PORT2.0         ;FALLING EDGE
02AD   60                       NOP
02AE   E6                       CLR1    CY
02AF   AEE1                     OR1     CY,PORT1.2
02B1   D6                       NOT1    CY              ;INVERT IT
02B2   D7                       SKT     CY
02B3   9D40                     SET1    BSB0.@L         ;CY WAS TRUE
02B5   D6                       NOT1    CY
02B6   D7                       SKT     CY
02B7   9C40                     CLR1    BSB0.@L         ;CY WAS FALSE
02B9   CA                       DECS    L
02BA R 52A6                     BR      GTNEXT          ;CONTINUE
                        ;
02BC   9DE3                     SET1    PORT3.2         ;DESELECT ADC
02BE   A2C0                     MOV     XA,BSB0         ;RETRIEVE DATA
02C0 E 00                       GETI    XCXADE          ;PUT IN DE
02C1 E 8400                     CLR1    ST4_FT          ;RESET FLASH TEMP EACH TIME
                        ; CHECK FOR LOW COUNT
02C3   8968                     MOV     XA,#104         ;CHECK FOR COUNT <104(50)???????
02C5 E 00                       GETI    SUBSXD
```

```
02C6     0F                         BR      GTLOW
                         ; CHECK FOR HIGH COUNT,
02C7     A2C0                       MOV     XA,BSB0         ;GET DATA AGAIN
02C9     8DCC                       MOV     DE,#204         ;CHECK FOR COUNT >204(99)??????
02CB E 00                           GETI    SUBSXD
02CC     03                         BR      GTHI            ;TOO HIGH
02CD     A2C0                       MOV     XA,BSB0         ;IN RANGE HERE
02CF     0C                         BR      GTFDG           ;CONTINUE
02D0 E 8500              GTHI:      SET1    ST4_FT          ; FLASH TEMP
02D2     8963                       MOV     XA,#99          ;THIS MUST BE 99!!!!?????
02D4 R 5331                         BR      GTERR           ;CONTINUE
02D6 E 8500              GTLOW:     SET1    ST4_FT
02D8     8932                       MOV     XA,#50          ;SET FALSE TEMP
02DA R 5331                         BR      GTERR
                         ;*****************************************************************
                         ; CONVERT TO DEGREES F THEN TO DEGREES C
                         ;
02DC                     GTFDG:
02DC E 9200                         MOV     MULTA,XA        ;PUT COUNT IN MULTA
02DE     897B                       MOV     XA,#123         ;VOLTAGE FOR FULL SCALE
02E0 E 9200                         MOV     MULTB,XA
02E2 E AB4000                       CALL    !MULT8
02E5 E 8B01                         MOV     HL,#MULTB+1     ;MUST DIVIDE BY 256 . 5/17/88 +1 AJB
02E7     77                         MOV     A,#7            ; MULTA HAS RESULT
02E8     A8                         SUBS    A,@HL           ;LOOK FOR ROUND IN MULTB
02E9     07                         BR      GTCDG
02EA E A200              GTINC:     MOV     XA,MULTA        ;8X OR MORE IN MULTB ROUND UP 12/17
02EC     8D01                       MOV     DE,#1
02EE E 00                           GETI    ADDBYT
02EF E 9200                         MOV     MULTA,XA        ;UPDATED
                         ;      DEG'S F HAS BEEN CALCULATED
02F1 E A200              GTCDG:     MOV     XA,MULTA        ;GET IT AGAIN
                                    ;********LARRY STROJNY MEMORIAL x DEGREE SHIFT***********
02F3     8D00                       MOV     DE,#0           ;MINIMUM OF 0
02F5     BEC1                       SKF     PORT1.0         ;SKIP IF NOT SET
02F7     C4                         INCS    E               ;ADD ONE MORE IF SET
02F8     BFF1                       SKT     PORT1.3         ;SKIP IF SET
02FA     02                         BR      GTLJS
02FB     C4                         INCS    E
02FC     C4                         INCS    E
02FD E 00                GTLJS:     GETI    SUBSXD          ;OK 11/30/87
02FE     60                         NOP
                                    ;END LJS
                         ;NEW AVERAGING CODE 4/21/88 AJB!!!!!!
02FF     AA56                       MOV     BC,XA           ;STORE NEW TEMP IN BC FOR LATER4/22
0301 E 00                           GETI    XCXADE          ;STORE NEW TEMP IN DE
0302 E A200                         MOV     XA,FTEMP        ;GET AVG TEMP
0304 E AB4000                       CALL    !BCD2BIN        ;BACK TO BIN
0307 E 00                           GETI    ADDBYT          ;ADD IN NEW TEMP (DE)
0308 E 00                           GETI    XCXADE          ,STORE IN DE
0309 E A200                         MOV     XA,OLDTMP       ; GET OLD TEMP
030B E 00                           GETI    ADDBYT          ;
030C E 9202                         MOV     DIVA+2,XA       ;LOW BYTE
030E     D7                         SKT     CY
030F     8900                       MOV     XA,#00          ;NO CARRY GO ON
0311     8901                       MOV     XA,#01          ;VERTICALLY STORED INST.
0313 E 9200                         MOV     DIVA,XA         ;HI BYTE
0315     8903                       MOV     XA,#3
```

```
0317 E 9200                  MOV    DIVB,XA
0319 E AB4000                CALL   !DIV16
                    ;STORE NEW TEMP AS OLD
031C   AA46                  XCH    XA,BC
031E E 9200                  MOV    OLDTMP,XA       ;OK 4/22/88
0320 E A200                  MOV    XA,DIVA
                    ; CARRY CHECK NOW
0322   AA46                  XCH    XA,BC
0324 E A200                  MOV    XA,DIVB         ;GET REMAINDER
0326   9A20                  SKE    A,#2
0328   06                    BR     GTAV2
0329   AA46                  XCH    XA,BC
032B   C0                    INCS   A
032C   04                    BR     GTAV3
032D   C1                    INCS   X
032E   02                    BR     GTAV3
032F   AA46         GTAV2:   XCH    XA,BC
0331                GTAV3:

0331 E 9200         GTERR:   MOV    MULTA,XA        ;AJB11/10/87
0333 E AB4000                CALL   !BIN2BCD        ;AFTER DIVIDE CONVERT
0336 E 9200                  MOV    FTEMP,XA        ;STORE IT
0338 E A200                  MOV    XA,MULTA        ;GET IT AGAIN
                    ;*****   CONVERT TO C
033A E AB4000                CALL   !F2C            ;XA IS USED FOR XFER
033D E AB4000                CALL   !BIN2BCD        ;AFTER DIVIDE CONVERT
0340 E 9200                  MOV    CTEMP,XA        ;STORE IT
0342                GTLV:
                             ; CHECK IF SETPNT IS ZERO
0342 E A200                  MOV    XA,SETPNT
0344   9A00                  SKE    A,#0
0346 R 535C                  BR     GTLV1
0348   9A01                  SKE    X,#0
034A R 535C                  BR     GTLV1
034C E A200                  MOV    XA,CNTSET
034E E 8700                  SKT    ST3_C
0350   09                    BR     GTLV0           ;DEG F
0351 E AB4000                CALL   !BCD2BIN
0354 E AB4000                CALL   !F2C            ;12/14 ; DEG C
0357 E AB4000                CALL   !BIN2BCD
035A E 9200         GTLV0:   MOV    SETPNT,XA       ;PUT CONTROLLER SETPOINT IN
035C E 8700         GTLV1:   SKT    CNT_ZZ          ;IF SET UPDATE STATUS VARS
035E R 538B                  BR     GTLV2
0360 E 8400                  CLR1   ST1_HW
0362 E 8600                  SKF    CNT_HW
0364 E 8500                  SET1   ST1_HW
0366 E 8400                  CLR1   ST1_TH
0368 E 8600                  SKF    CNT_TH
036A E 8500                  SET1   ST1_TH
036C E 8400                  CLR1   ST1_PT          ;HAD TO DO WHOLE NIBBLE FOR EASE
036E E 8600                  SKF    CNT_PT          ; AJB 12/10/87
0370 E 8500                  SET1   ST1_PT
0372 E 8400                  CLR1   ST1_FL
0374 E 8600                  SKF    CNT_FL
0376 E 8500                  SET1   ST1_FL
0378 E A200                  MOV    XA,CNTSET
037A E 8700                  SKT    ST3_C
037C   09                    BR     GTLV1A          ;DEG F
```

```
0370 E AB4000          CALL    !BCD2BIN
0380 E AB4000          CALL    !F2C          ;12/14 ; DEG C
0383 E AB4000          CALL    !BIN2BCD
0386 E 9200    GTLV1A: MOV     SETPNT,XA
0388 E 8400            CLR1    CNT_ZZ
038A   02              BR      GTLV3
038B E 8500    GTLV2:  SET1    CNT_ZZ
038D   70      GTLV3:  MOV     A,#0          ; HI COUNTER     4/21/88
038E E 9300            MOV     TSB4RP,A
0390   89A0            MOV     XA,#160       ;160 =  5 SEC.   WAS 15 4/21/88
0392 E 9200            MOV     TSB4TM,XA
0394 E 8500            SET1    TSB4T         ;TURN TIMER ON
0396   E0              RETS                  ;RET INDICATES ERROR
               ;
               ;************************GETTMP  END*****************************
               ;
               ;**********************GETKEY 5.0*********************************
               ;
               ;  1.  PURPOSE:
               ;
               ;  2.  INPUTS:
               ;
               ;  3.  GLOBAL VARIABLES:
               ;
               ;  4.  OUTPUTS:
               ;
               ;  5.  PROCEDURES CALLED: ADCDBL, DSP2S6
               ;
               ;  6.  EXCEPTIONS:
               ;
               ;  7.  UNIQUE FEATURES:
               ;
               ;  8.  HISTORY:
               ;      ORIGINAL - 9/21/87 - Alan J. Bronikowski Rev A000
               ;      REVISION - 3/18/88 - Alan J. Bronikowski Rev A002
               ;                                 ADDED RPT_TIM FOR repeat timer
               ;                                 it is defined in TSTATSYS
               ;*****************************************************************
               ;
     R (0397)  GETKEY  EQU     $
0397 E 00              GETI    CLMBE         ;SELECT MBO    ?
0398 E 8600            SKF     KEY_HLD       ;ARE WE WAITING FOR A SCHED?
039A R 53F7            BR      KEXIT         ;YES, LEAVE NOW!!  12/9/87
039C   70      KEY:    MOV     A,#0          ; KEYSCAN- ONLY 3,INVERTED
039D   93F4            OUT     PORT4,A       ;WAS     3 to keep LED off
039F   A2F6            IN      XA,PORT6      ;KEY DATA INPUTS
03A1   995F            NOT     A             ;INVERT A
03A3   993C            AND     A,#0CH        ;ONLY HIRER 2 BITS
03A5   D9              XCH     A,X           ;
03A6   995F            NOT     A             ;INVERT X
03A8   D9              XCH     A,X           ;
03A9   9A00            SKE     A,#0          ;ANY DATA? ON 6
03AB   0D              BR      KCHANG        ;YES
03AC   9A01            SKE     X,#0          ;ANY DATA? ON 7
03AE   0A              BR      KCHANG        ;YES!!
               ;
03AF E 00      KEY2:   GETI    MXA_00        ;
03B0   93F4            OUT     PORT4,A       ;
```

```
03B2 E 9200             MOV     LST_KEY,XA      ;4/22/88
03B4   9C8F             CLR1    IRQ2            ;NO NEW KEYS/FALSE INT!! AJB
03B6   9D9F             EI      IE2             ;CLEAR INT AND RE-ENABLE!!
03B8   EE               RET                     ;KEY ERROR????????????
                ;
                ;  KEY IN DATA COMPARE WITH LAST KBUF DATA
                ;
03B9   9A0B     KCHANG: MOV     H,#0            ;ROW 1
03BB   74               MOV     A,#4            ;SCAN DATA SET
                ;
     R (03BC)   KCHAN2  EQU     $
03BC   C3               INCS    H
03BD   995F             NOT     A               ;??YES!!
03BF   93F4             OUT     PORT4,A         ;SCAN DATA OUTPUT
03C1   9976             MOV     C,A             ;SAVE A
03C3   A2F6             IN      XA,PORT6        ;GET KEY DATA FROM 6&7
03C5   995F             NOT     A               ;INVERT  A
03C7   993C             AND     A,#0CH          ;REMOVE LOWER 2 BITS
03C9   D9               XCH     A,X             ;
03CA   995F             NOT     A               ; INVERT X
03CC   D9               XCH     A,X             ;
03CD   9A00             SKE     A,#0            ;ANY KEY?
03CF   0E               BR      KCHA02          ;YES KEY STORE
03D0   9A01             SKE     X,#0            ;LOOK AT PORT 7
03D2   0B               BR      KCHA02          ;YES KEY STORE
03D3   997E             MOV     A,C             ;RESTORE SCAN DATA
03D5   995F             NOT     A               ;???YES!!!
03D7   E6               CLR1    CY
03D8   98               RORC    A               ;GET NEW SCAN DATA
03D9   D7               SKT     CY              ;SCAN END?
03DA R 53BC             BR      KCHAN2          ;NO - CONTINUE
03DC R 53AF             BR      KEY2            ;SCAN END AND NO KEY
                ;
                ;  KEY FOUND
                ;
                ;
03DE   9A0A     KCHA02: MOV     L,#0

03E0   C2       KCHLP:  INCS    L
03E1   E6               CLR1    CY
03E2 E AB4000           CALL    !ADCDBL
03E5   D7               SKT     CY              ;SKIP WHEN 1ST COLUMN FOUND
03E6   F9               BR      KCHLP           ;KEY DATA STORE
                ; SHOULD HAVE A BCD NUMBER IN HL
03E7 E 00               GETI    MVXAHL          ;PUT IT IN XA
03E8 E 8600             SKF     TSB8T
03EA   05               BR      KCSLF
03EB E 9200             MOV     TSB6PA,XA       ;PUT KEY IN COMPMI
03ED E 8500             SET1    TSB6S           ;WHAT IF IT IS ALREADY SET????
03EF   07               BR      KCXIT
03F0 E 8500     KCSLF:  SET1    ST3_BS
03F2 E 8B00             MOV     HL,#M1          ;CHANGE 3/23/88 AJB
03F4 E AB4000           CALL    !DSP2S6
03F7 E 00       KCXIT:  GETI    XCXADE          ;PUT NEW KEY IN DE
03F8 E A200             MOV     XA,LST_KEY      ;GET LAST KEY
03FA E 00               GETI    SUBSXD
03FB   9A01             SKE     X,#0
03FD   06               BR      KDIF
```

```
03FE   9A00                SKE    A,#0
0400   03                  BR     KDIF
0401 E 8900                MOV    XA,#RPT_TIM      ;REPEAT TIMER  3/28/89
0403   02                  BR     KCXGO
0404 E 8900       KDIF:    MOV    XA,#NRM_TIM      ;NORMAL TIMER
0406 E 9200       KCXGO:   MOV    TSB5TM,XA        ;LOAD THE DELAY
0408 E 8500                SETI   TSB5T
040A E 00                  GETI   XCXADE           ;
040B E 9200                MOV    LST_KEY,XA       ;STORE LAST KEY
040D   9C8F                CLR1   IRQ2             ;CLEAR KEYPAD INT
040F   70                  MOV    A,#0             ;
0410   93F4                OUT    PORT4,A          ;
0412 E 9300                MOV    TSB5RP,A         ;CLEAR TSB RP COUNTER
0414   9D9F                EI     IE2              ;RE-ENABLE IT
0416   E0                  RETS                    ;SAY BYE

                  ;
                  ;**********************GETKEY  END*******************************
                  ;
                  ;***********************SLFTST 8.0*******************************
                  ;
                  ; 1.  PURPOSE:
                  ;       SLFTST routine is set up to test the memory,
                  ;         by writing to a block of memory and then
                  ;         comparing each nibble to a value in the
                  ;         accumulator. The last value written into each
                  ;         block is zero so the memory is also initialized.
                  ;         The LCD and the LEDs are then turned on and off.
                  ;
                  ; 2.  INPUTS:
                  ;
                  ;
                  ; 3.  GLOBAL VARIABLES:
                  ;
                  ;
                  ; 4.  OUTPUTS:
                  ;
                  ; 5.  PROCEDURES CALLED: INITBLK, SCDREQ
                  ;
                  ; 6.  EXCEPTIONS:
                  ;
                  ; 7.  UNIQUE FEATURES:
                  ;
                  ; 8.  HISTORY:
                  ;       ORIGINAL - 09/29/87 - Rick D. Kieferndorf Rev A000
                  ;       REVISION - 10/22/87 - Alan J. Bronikowski Rev A000 CHANGE TIMERS FOR
                  ;                                         10/25/87 PROTO 1'S MUST BE CHANGED BACK
                  ;***************************************************************
                  ;
0417              SLFTST:
0417 E 00                  GETI   STMBE
0418 E 00                  GETI   SEL0
0419 E A200                MOV    XA,TSB8PA        ;IF LOW ORDER PARAMETER
041B   E7                  SET1   CY               ;USE CARRY TO CHECK FOR
041C   9A11                SKE    X,#1             ;(1=SYSTEM RUNNING)
041E   E6                  CLR1   CY               ;(0=POWERUP)
041F   9AC0                SKE    A,#0CH           ;  NIBBLE=C(HEX) THEN
0421   02                  BR     SLFCK2           ; JCI COPYRIGHT 3/23/88
0422 R 55E5                BR     CDRES            ;RESET LCD AND LEDS
```

```
0424   9AD0      SLFCK2: SKE    A,#0DH
0426   02                BR     MEMTST         ;CHECK THE MEMORY
0427 R 55A4              BR     CDCOPY
                 ;^^^^^^^^^^^^^^^MEMORY TEST^^^^^^^^^^^^^^^^^^^^^^^^^^^^^^^^
                 ;
                 ;TEST REGISTERS.......................................
                 ;
0429   7A        MEMTST: MOV    A,#0AH         ;FIRST TEST VALUE
042A   9AAB              MOV    H,#0AH
042C   990B      TSTREG: SKE    A,H            ;IF A=H REGISTERS OK
042E R 557C              BR     ERROR
0430   9972              MOV    L,A            ;TESTS REGISTERS A,H,X,L
0432   990A              SKE    A,L
0434 R 557C              BR     ERROR
0436   9971              MOV    X,A
0438   9909              SKE    A,X
043A R 557C              BR     ERROR
043C   8B04              MOV    HL,#04         ;POINTS TO E
043E   E8        REGCON: MOV    @HL,A          ;TESTS REGISTERS E,D,C,B
043F   80                SKE    A,@HL          ;IF REG@HL=A THEN REGISTER OK
0440 R 557C              BR     ERROR
0442 E 00                GETI   INCSHL         ;POINT TO NEXT REGISTER
0443   9A82              SKE    L,#8           ;LAST REGISTER IS ADDRESS 7
0445   F8                BR     REGCON
                 ;
0446   9AA0              SKE    A,#0AH         ;LOOKUP TABLE FOR SUCCESSIVE
0448   05                BR     CKR5           ;     TEST VALUES
0449   9A5B              MOV    H,#5
044B   75                MOV    A,#5           ;TEST VALUES:1010,0101,1111,0000
044C R 542C              BR     TSTREG
044E   9A50      CKR5:   SKE    A,#5
0450   05                BR     CKRF
0451   9AFB              MOV    H,#0FH
0453   7F                MOV    A,#0FH
0454 R 542C              BR     TSTREG
0456   9AF0      CKRF:   SKE    A,#0FH
0458   05                BR     CKR0
0459   9A0B              MOV    H,#0
045B   70                MOV    A,#0
045C R 542C              BR     TSTREG
045E             CKR0:                         ;REGISTERS OK!!!!!!!
045E   D7                SKT    CY
045F R 5483              BR     TINITM         ;Check for power-up (TSB8PA=0)
0461   60                BR     STRTSV         ;or system running (TSB8PA=1)
                 ;
                 ;TEST TEMPORARY STORAGE AREA.....(ADDRESSES 80-9F)................
                 ;
0462   7A        STRTSV: MOV    A,#0AH
0463   8B30      TSTSAV: MOV    HL,#80H        ;START ADDRESS
0465   8D1F              MOV    DE,#1FH        ;COUNT (32 NIBBLES -1)
0467 E AB4000            CALL   !INITBLK       ;INITIALIZE AREA TO BE TESTED
046A   8F1F              MOV    BC,#1FH        ;REINITIALIZE COUNT
046C   8B80              MOV    HL,#80H
046E   80        TSCON:  SKE    A,@HL          ;IF NIBBLE@HL=A MEMORY OK
046F R 557C              BR     ERROR
0471 E 00                GETI   INCSHL         ;POINT TO NEXT NIBBLE
0472   CE                DECS   C              ;DECREMENT C AND LOOP
0473   FA                BR     TSCON
```

```
0474    CF               DECS   B           ;WHEN C=15 DECREMENT B AND LOOP
0475    F8               BR     TSCON

                ;
0476    9AA0             SKE    A,#0AH      ;LOOKUP TABLE FOR SUCCESSIVE
0478    03               BR     CKS5        ;   TEST VALUES
0479    75               MOU    A,#5
047A R  5463             BR     TSTSAV
047C    9A50    CKS5:    SKE    A,#5
047E    03               BR     CKSF
047F    7F               MOU    A,#0FH
0480 R  5463             BR     TSTSAV
0482    9AF0    CKSF:    SKE    A,#0FH
0484    03               BR     CKS0
0485    70               MOU    A,#0
0486 R  5463             BR     TSTSAV
0488            CKS0:
                ;
                ;TEST MEMORY BANKS....................................
                ;
0488    9A09    TIMITM:  MOU    X,#0        ;INITIALIZE LOOP COUNTER
048A    8B08             MOU    HL,#8       ;TEST MEMORY BLOCK (8H-1FH)
048C    8F17             MOU    BC,#17H     ;COUNT FOR (8H-1FH)
048E    02               BR     SCONBL
048F    8F1F    STRTMB:  MOU    BC,#1FH     ;COUNT FOR REST OF MEMORY BLOCKS
0491    9A3D    SCONBL:  MOU    D,#8
0493    E1      SAUMB:   MOU    A,@HL       ;MOUE DATA FROM MEMORY
0494    ED               XCH    A,@DL       ; BLOCK INTO STORAGE AREA
0495    C2               INCS   L           ;POINT TO NEXT NIBBLE
0496    04               BR     SMBCON
0497    C3               INCS   H           ;
0498    60               NOP                ;INCREMENT WHEN C=0
0499    C5               INCS   D           ;
049A    60               NOP
049B    CE      SMBCON:  DECS   C           ;
049C    F6               BR     SAUMB       ;DECREMENT LOOP COUNTER
049D    CF               DECS   B           ;
049E    F4               BR     SAUMB       ;
                ;
049F    9A11             SKE    X,#1
04A1 R  54B9             BR     INITA       ;IF STACK AREA (E0H-FFH) JUST SAVED
04A3    9A03             SKE    H,#0        ,  THEN
04A5 R  54B9             BR     INITA
04A7 E  00               GETI   CLMBE       ;  FORCE MB15
04A8    9979             MOU    A,X
04AA    9977             MOU    B,A         ;  SAUE X
04AC    A280             MOU    XA,SP
04AE    D9               XCH    A,X         ;  HIGH ORDER NIBBLE OF SP - 5
04AF    6A               ADDS   A,#0AH      ;  POINTS SP TO STORAGE AREA
04B0    60               NOP
04B1    D9               XCH    A,X
04B2    9280             MUV    SP,XA       ;  SP<-- XA
04B4    997F             MOU    A,B
04B6    9971             MOU    X,A
04B8 E  00               GETI   STMBE       ;RESTORE MB
                ;
04B9    7A      INITA:   MOU    A,#0AH
04BA    CB      TSTMB:   DECS   H           ;
04BB    60               NOP                ;DECREMENTS HIGH ORDER ADDRESS POINTER BACK
```

```
04BC   CB                      DECS   H          ;  TO BEGINNING OF CURRENT MEMORY BLOCK
04BD   60                      NOP
04BE   9A01                    SKE    X,#0       ;IF X=0 TEST FIRST MEMORY BLOCK(8H-1FH)
04C0   05                      BR     INTOBL     ;ELSE TEST OTHER MEMORY BLOCKS
04C1   9A8A                    MOV    L,#8
04C3   8D17                    MOV    DE,#17H
04C5   02                      BR     INTBL1
04C6   8D1F           INTOBL:  MOV    DE,#1FH
04C8 E AB4000         INTBL1:  CALL   !INITBLK   ;INITIALIZE MEMORY BLOCK WITH TEST VALUE
04CB   9A01                    SKE    X,#0
04CD   05                      BR     TSTOBL
04CE   8F17                    MOV    BC,#17H
04D0   9A8A                    MOV    L,#8
04D2   02                      BR     TSTBL1
04D3   8F1F           TSTOBL:  MOV    BC,#1FH
04D5   CB             TSTBL1:  DECS   H          ;
04D6   60                      NOP               ;DECREMENTS HIGH ORDER ADDRESS POINTER BACK
04D7   CB                      DECS   H          ;  TO BEGINNING OF CURRENT MEMORY BLOCK
04D8   60                      NOP
04D9   80             TMBCON:  SKE    A,@HL      ;IF NIBBLE@HL=A MEMORY OK
04DA R 557C                    BR     ERROR
04DC E 00                      GETI   INCSHL     ;POINT TO NEXT NIBBLE
04DD   60                      NOP
04DE   CE                      DECS   C          ;DECREMENT C AND LOOP
04DF   F9                      BR     TMBCON
04E0   CF                      DECS   B          ;WHEN C=15 DECREMENT B AND LOOP
04E1   F7                      BR     TMBCON
                      ;
04E2   9AA0                    SKE    A,#0AH     ;LOOKUP TABLE FOR SUCCESSIVE
04E4   03                      BR     CKM5       ;  TEST VALUES
04E5   75                      MOV    A,#5
04E6 R 54BA                    BR     TSTMB
04E8   9A50           CKM5:    SKE    A,#5
04EA   03                      BR     CKMF
04EB   7F                      MOV    A,#0FH
04EC R 54DA                    BR     TSTMB
04EE   9AF0           CKMF:    SKE    A,#0FH
04F0   03                      BR     CKM0
04F1   70                      MOV    A,#0
04F2 R 54BA                    BR     TSTMB
04F4                  CKM0:
04F4   9A11                    SKE    X,#1       ;IF STACK AREA (E0H-FFH) JUST
04F6 R 550F                    BR     CKCSTA     ;  TESTED THEN
04F8   9A03                    SKE    H,#0       ;
04FA R 550F                    BR     CKCSTA
04FC E 00                      GETI   CLMBE      ;  FORCE MB15
04FD   9979                    MOV    A,X
04FF   9977                    MOV    B,A        ;  SAVE X
0501   A280                    MOV    XA,SP
0503   D9                      XCH    A,X        ;  HIGH ORDER NIBBLE OF SP + 6
0504   66                      ADDS   A,#6       ;  POINTS SP BACK TO STACK AREA
0505   60                      NOP
0506   D9                      XCH    A,X
0507   9280                    MOV    SP,XA
0509   997F                    MOV    A,B
050B   9971                    MOV    X,A        ;  RESTORE X
050D E 00                      GETI   STMBE      ;  RESTORE MB
050E   05                      BR     RDOMB      ;  RESTORE STACK FROM STORAGE AREA
```

```
                        ;
     050F               CKCSTA:
     050F E 00                  GETI    STMBE
     0510   D7                  SKT     CY
     0511 R 5531                BR      CHKMB           ;Check for power-up (CY=0)
     0513   60                  BR      RDOMB           ;or system running  (CY=1)
                        ;
     0514   9A01        RDOMB:  SKE     X,#0
     0516   05                  BR      RTNOBL
     0517   9A8A                MOV     L,#8
     0519   8F17                MOV     BC,#17H
     051B   02                  BR      RTNBL1
     051C   8F1F        RTNOBL: MOV     BC,#1FH
     051E   CB          RTNBL1: DECS    H               ;
     051F   60                  NOP                     ;DECREMENTS HIGH ORDER ADDRESS POINTER BACK
     0520   CB                  DECS    H               ;   TO BEGINNING OF CURRENT MEMORY BLOCK
     0521   60                  NOP
     0522   9A8D                MOV     D,#8
     0524   70          RTNMB:  MOV     A,#0            ;RESTORE DATA TO MEMORY BLOCK
     0525   ED                  XCH     A,@DL           ;  FROM STORAGE AREA AND
     0526   E8                  MOV     @HL,A           ;  INIALIZE STORAGE AREA
     0527   C2                  INCS    L
     0528   04                  BR      RMBCON
     0529   C3                  INCS    H
     052A   60                  NOP
     052B   C5                  INCS    D
     052C   60                  NOP
     052D   CE          RMBCON: DECS    C
     052E   F5                  BR      RTNMB
     052F   CF                  DECS    B
     0530   F3                  BR      RTNMB
                        ;
     0531   9A01        CHKMB:  SKE     X,#0
     0533   01                  BR      CHKH
     0534   C1                  INCS    X
     0535   9A03        CHKH:   SKE     H,#0
     0537 R 548F                BR      STRTMB
     0539   9A11                SKE     X,#1
     053B   04                  BR      EMEMT
     053C   C1                  INCS    X
     053D E 00                  GETI    SEL1
     053E R 548F                BR      STRTMB
     0540 E 00          EMEMT:  GETI    SEL0
                        ;
                        ;NOW ALL VARIBLES ARE INITIALIZED
                        ;
                        ;++++++++++++++++++++++++++++++++++++++++++++++++++++++++++++++++
                        ;   NOW GET THE SERIAL PORT TO WORK

                        ;               ASYN8B    --    THIS SETS UP SERIAL PORT
     0541 E 00                  GETI    CLMBE
     0542   71                  MOV     A,#1
     0543   93B5                MOV     IM1,A           ;INT1,FALLING EDGE!NEW
     0545   70                  MOV     A,#0H
     0546 E 9300                MOV     SIOF,A
     0548   890C                MOV     XA,#0CH                             ; THESE 4      =
     054A   92A6                MOV     TMOD0,XA        ;TRANSFER RATE IS   ; COULD        =
     054C   A27C                MOV     XA,07CH         ; 9600 BAUD ~10K    ; BE           =
```

```
054E   92A0            MOV   TMO,XA                             ; REMOVED!!!  =
0550   8985            MOV   XA,#10000101B
0552   92E0            MOV   CSIM,XA
0554 E 00              GETI  MXA_00         ;STOP BITS
0555   92E4            MOV   SIO,XA         ;SIO <-- 00H
0557 E 8900            MOV   XA,#RCXMB
0559 E 9200            MOV   RDATA,XA
055B   9C8C            CLR1  IRQT0          ;new 12/8/87 ajb
055D E 00              GETI  STMBE
                 ;+++++++++++++++++++++++++++++++++++++++++++++++++++++++++++++++
055E   8950            MOV   XA,#50H        ;MSG TYPE F,CONFIG REQ.
0560 E 00              GETI  SCDRST
0561 E 8400            CLR1  KEY_HLD        ;CLEAR IT,CAUSE MSG ISN'T DISPLAYED 1/9/88
                 ;
0563 E 8500            SET1  TSB4S          ;SCHEDULE GETTMP
                 ;
0565   70              MOV   A,#0           ;CLEAR REPEAT COUNTER
0566 E 9300            MOV   TSB3RP,A       ;(ACTUALLY HIGH NIBBLE)
0568   8920            MOV   XA,#32         ;1 SECOND TIME DELAY    A005
056A E 9200            MOV   TSB3TM,XA
056C E 8500            SET1  TSB3T          ;ACTIVATE TIMER ON SEND TEMP
                 ;
056E   71              MOV   A,#1           ;TRY FOR 16 SEC FOR OUTDIS
056F E 9300            MOV   TSB7RP,A       ;(ACTUALLY HIGH NIBBLE)
0571   89FF            MOV   XA,#255        ;8.0 SECOND TIME DELAY * 2
0573 E 9200            MOV   TSB7TM,XA
0575 E 8500            SET1  TSB7T          ;ACTIVATE TIMER ON OUTDIS
0577 E 8400            CLR1  TSB7S          ;CLEAR SCHEDULE FLAG, 3/24/88 PROB.49
                 ;
0579   9A0F            MOV   B,#0
057B   02              BR    LCDTST         ;END MEMORY TEST
057C   8FAF      ERROR: MOV  BC,#0AFH
                 ;
                 ;^^^^^^^TEST LCD SEGMENTS AND LEDS^^^^^^^^^^^^^^^^^^^^^^
                 ;
057E E 00        LCDTST: GETI SEL1
057F   8BE0            MOV   HL,#0E0H       ;ADDRESS OF DISPLAY DATA AREA
0581   8D1F            MOV   DE,#1FH
0583   7F              MOV   A,#0FH         ;INITIALIZE TO ONE'S
0584 E AB4000          CALL  !INITBLK       ;TURN ON ALL LCD SEGMENTS
0587   9CD3            CLR1  PORT3.1        ;TURN ON CRITICAL LED
0589   9CF3            CLR1  PORT3.3        ;TURN ON EMER. HEAT LED
                 ;
058B E 00              GETI  SEL0
058C   71              MOV   A,#1           ;
058D E 9300            MOV   TSB8RP,A       ;RESET REPEAT COUNTER TO 0
058F   8950            MOV   XA,#050H       ;SET DELAY COUNT AT 10.5 SEC.
0591 E 9200            MOV   TSB8TM,XA      ;TIMER<---XA
0593 E 8500            SET1  TSB8T          ;SET TIMER ACTIVE FLAG
0595   7D              MOV   A,#0DH         ;SET PARAMETER SO LCD AND LEDs
0596 E 9300            MOV   TSB8PA,A       ;  TURNED OFF WHEN TIMER RUNS OUT
0598   9AA7            SKE   B,#0AH         ;CHECK FOR MEMORY ERROR
059A R 55EE            BR    LCDRET         ;IF B=0AH THEN INFINITE LOOP
059C   8DFF            MOV   DE,#0FFH
059E   CE        ER1LOOP:DECS C
059F   FE              BR    ER1LOOP
05A0   CC              DECS  E              ;DELAY LOOP IN CASE OF
05A1   FC              BR    ER1LOOP        ;  FATAL ERROR SO THE
05A2   CD              DECS  D              ;  LCD AND LEDs CAN BE
05A3   FA              BR    ER1LOOP        ;  SEEN FLASHING
```

```
                            ;
05A4 E 00          CDCOPY: GETI   CLRSCR
05A5   70                  MOV    A,#0         ;
05A6 E 9300                MOV    TSB8RP,A     ;RESET REPEAT COUNTER TO 0
05A8 E 00                  GETI   MXA_A0       ;SET DELAY COUNT AT    5 SEC.
05A9 E 9200                MOV    TSB8TM,XA    ;TIMER<-- XA
05AB E 8500                SET1   TSB8T        ;SET TIMER ACTIVE FLAG
05AD   7C                  MOV    A,#0CH       ;SET PARAMETER FOR COPY RIGHT
05AE E 9300                MOV    TSB8PA,A     ;  TURNED OFF WHEN TIMER RUNS OUT
05B0 E 8B00                MOV    HL,#N4
05B2   890E                MOV    XA,#14       ;c
05B4 E AB4000              CALL   !DSPSEG
05B7 E 00                  GETI   DINCSHL
05B8   8914                MOV    XA,#20       ;J
05BA E AB4000              CALL   !DSPSEG
05BD E 00                  GETI   DINCSHL
05BE   890D                MOV    XA,#13       ;C
05C0 E AB4000              CALL   !DSPSEG
05C3 E 00                  GETI   DINCSHL
05C4   891A                MOV    XA,#26       ;I
05C6 E AB4000              CALL   !DSPSEG
05C9 E 00                  GETI   DINCSHL
05CA   891B                MOV    XA,#27       ;-
05CC E AB4000              CALL   !DSPSEG
05CF E 00                  GETI   DINCSHL
05D0 E 00                  GETI   MXA_01       ;1
05D1 E AB4000              CALL   !DSPSEG
05D4 E 00                  GETI   DINCSHL
05D5   8909                MOV    XA,#9        ;9
05D7 E AB4000              CALL   !DSPSEG
05DA E 00                  GETI   DINCSHL
05DB   8908                MOV    XA,#8        ;8
05DD E AB4000              CALL   !DSPSEG
05E0 E 00                  GETI   DINCSHL
05E1 E AB4000              CALL   !DSPSEG      ;8 AGAIN
05E4   E0                  RETS                ;LEAVE
05E5 E 00          CDRES:  GETI   SEL0
05E6 E 00                  GETI   MXA_00
05E7 E 9200                MOV    TSB8PA,XA    ;RESET PARAMATER
05E9 E 9200                MOV    STATE,XA     ;BACK TO STATE 0
05EB   9AA7                SKE    B,#0AH       ;CHECK FOR MEMORY ERROR
05ED E 00                  GETI   CLRSCR
05EE   E0          LCDRET: RETS
05EF   9AFE                MOV    C,#0FH
05F1   8DFF                MOV    DE,#0FFH
05F3   CE          ER2LOOP:DECS   C
05F4   FE                  BR     ER2LOOP
05F5   CC                  DECS   E            ;DELAY LOOP IN CASE OF
05F6   FC                  BR     ER2LOOP      ;  FATAL ERROR SO THE
05F7   CD                  DECS   D            ;  LCD AND LEDs CAN BE
05F8   FA                  BR     ER2LOOP      ;  SEEN FLASHING
05F9 R 557E                BR     LCDTST       ;IF MEMORY ERROR

                   ;
                   ;***********************END SLFTST******************************
                   ;
                   END
TARGET CHIP : UPD75308
STACK SIZE = 0000H

ASSEMBLY COMPLETE,  NO ERROR FOUND
```

```
COMMAND     :                   (COMMAND FILE :            )
COMPMI.ASM MOD=308

STMO ADRS R OBJECT   IC MAC   SOURCE STATEMENT

$      TITLE='COMPMI(6.0) -AJB'
;(*-------------------------------------------------------------
;(c) Copyright, Johnson Controls Incorporated, 1987.  All rights
;   reserved. The following program is the exclusive property of
;   Johnson Controls, Inc. and its use is restricted by license
;   agreement to the system with which it was furnished.  The
;   program contents are confidential and may not be disclosed
;   or used outside the system without the express written
;   consent of Johnson Controls.  This program is further
;   protected by federal copyright law as an unpublished work
;   and any unauthorized reproduction is prohibited.
;
;******************************COMPMI(6.0)**********************
;
; 1. PURPOSE:
;     COMPMI - This routine is the main person machine interface
;       which contains the state table to control which subroutines
;       to call and what state to move to when a key is pressed.
;
; 2. INPUTS:
;
;
; 3. GLOBAL VARIABLES:
;     None
;
; 4. OUTPUTS:
;
;
; 5. PROCEDURES CALLED:
;
; 6. EXCEPTIONS:
;     None
;
; 7. UNIQUE FEATURES:
;     None
; 8. HISTORY
;     ORIGINAL - 10/19/87 - Rick Kieferndorf   Rev A000
;     REVISION - 11/23/87 - Alan Bronikowski   Rev A000
;                           removed unneeded pushes and pops
;     REVISION - 03/18/88 - Alan J. Bronikowski Rev A002
;                           added call to OPTIM for telephone key
;     REVISION - 04/20/88 - Alan J. Bronikowski Rev A003
;                           changed timer to 16 sec
;     REVISION - 05/18/88 - Alan J. Bronikowski Rev A003
;                           added code to check for NO_EHW, HW
;                           and HW NOW.
;     REVISION - 08/04/88 - Alan J. Bronikowski Rev A004
;                           added code to check for SW1_HT &
;                           SW1_CL before doing HOLD, STPTUP or
;                           STPTDN.
;     REVISION - 08/08/88 - Alan J. Bronikowski Rev A004
```

```
                        ;                    added code to check CLEAR the CNT_ZZ
                        ;                    flag so that changes to HOLD and HEAT
                        ;                    WATER NOW would not work better.
                        ;   REVISION - 08/16/88 - Alan J. Bronikowski Rev A004
                        ;                    added code to clear LST_KEY when HOLD
                        ;                    or HEAT WATER NOW is pressed
                        ;                    also BILL, WKDAY, WKEND, APPL,
                        ;                    MOVE LEFT and MOVE RIGHT
                        ;-----------------------------------------------------------*)
                              NAME    COMPMI
                              EXTRN CODE(ADDBYT,SUBSXD,INCSHL,SEL0,SEL1,CLMBE,STMBE)
                              EXTRN CODE(BIN2BCD,BCD2BIN,MSGCTR,UPCON,DNCON,DINCSHL)
                              EXTRN CODE(CLRSCR,CLM,BILINF,UPSTPT,SCDRST,MXA@HL,MVXAHL)
                              EXTRN CODE(DNSTPT,OPTIM,CONFIG,DSP2SG,DSPSEG,INTAPP,MXA_01)
                              EXTRN CODE(MXTPRD,IHOURS,IMINS,MLEFT,MVSTXA,MODOFF,MXA_A0)
                              EXTRN CODE(MRIGHT,TEMPUP,TEMPDN,MXTAPP,XCXADE,MXA_00)
                              EXTRN DATA(TSB6RP,TSB6TM,TSB6PA,TSB7RP,TSB7TM,TSB7PA)
                              EXTRN DATA(STATE,TIMEHR,TIMEMIN,REST1,REST2,PM_PRD)
                              EXTRN DATA(CTEMP,FTEMP,SETPNT,FLASH1,FLASH2,PM_PNT)
                              EXTRN DATA(TSB8PA,APPNUM,M1,M12,LST_KEY)
                              EXTRN BIT(SW1_MT,SW1_CL,TSB7T,TSB6T,WEEKDAY,WEEKEND)
                              EXTRN BIT(ST0_PP,ST0_EH,ST0_LC,ST0_WE,ST5_FL,ERR_TON)
                              EXTRN BIT(ST1_TH,ST1_HW,ST1_FL,ST2_CH,ST2_CL,ST3_BS)
                              EXTRN BIT(ST3_CL,ST3_C,ST4_FT,ST4_FC,ST5_FW,TSB8S,CNT_ZZ)
                              EXTRN BIT(APPL,HTWATER,SETMG,CSETMG,HSETMG,BILL,NO_EHW)
                              PUBLIC COMPMI
----                    CPMI  CSEG    XBLOCK          ;
                        ;*****************************************************************
                        ;       STATE TABLE
                        ;
0000                    COMPMI:
0000 E 00                     GETI    CLMBE
0001   74                     MOV     A,#4            ;SET UP TIMER FOR 32 SECONDS,A004
0002 E 9300                   MOV     TSB6RP,A
0004 E 00                     GETI    MXA_00
0005 E 9200                   MOV     TSB6TM,XA
0007 E 8500                   SET1    TSB6T           ;SET THE TIMER BIT FOR TIME OUT
0009 E A200                   MOV     XA,TSB6PA
000B E 00                     GETI    XCXADE          ;STORE KEY CODE IN DE
000C E A200                   MOV     XA,STATE        ;STORE STATE
                              ;
                              ;CHECK STATE------------------------------
                              ;
000E   9A00             STATE0: SKE   A,#0
0010   06                     BR      STATE1
0011 R AB4054                 CALL    !CONST0
0014 R AB004F                 BR      PMIRET
0017   9A10             STATE1: SKE   A,#1
0019   06                     BR      STATE2
001A R AB4171                 CALL    !CONST1
001D R AB004F                 BR      PMIRET
0020   9A20             STATE2: SKE   A,#2
0022   06                     BR      STATE3
0023 R AB4325                 CALL    !CONST2
0026 R AB004F                 BR      PMIRET
0029   9A30             STATE3: SKE   A,#3
002B   06                     BR      STATE4
002C R AB441E                 CALL    !CONST3
```

```
002F R AB004F              BR      PMIRET
0032   9A40       STATE4:  SKE     A,#4
0034   06                  BR      STATE5
0035 R AB4550              CALL    !CONST4
0038 R AB004F              BR      PMIRET
003B   9A50       STATE5:  SKE     A,#5
003D   04                  BR      STATE6
003E R AB45B5              CALL    !CONST5
0041   0D                  BR      PMIRET
0042   9A60       STATE6:  SKE     A,#6
0044   04                  BR      STATE7
0045 R AB4610              CALL    !CONST6
0048   06                  BR      PMIRET
0049   9A70       STATE7:  SKE     A,#7
004B   03                  BR      PMIRET
004C R AB4666              CALL    !CONST7
                           ;
004F              PMIRET:
004F   8932                MOV     XA,#32H          ;PUT A RETURN INTO BUFFER
0051 E 9200                MOV     TSB6PA,XA        ;FOR TIME OUT
0053   E0                  RETS
                           ;
                           ;ROUTINES TO CHECK WHICH KEY WAS PRESSED
                           ;AND IF IT IS VALID OR NOT
                           ;
                  ;*******************************************************************
                  ;                                                                  *
                  ;        CONSTO: STATE 0 - NORMAL DISPLAY STATE                    *
                  ;                                                                  *
                  ;        SUBSTATES: NONE                                           *
                  ;                                                                  *
                  ;*******************************************************************
     R (0054)     CONSTO   EQU     $
0054 E 00                  GETI    STMBE
0055 E 00                  GETI    SELO
                          ;CHECK FOR ROW NUMBER
0056   9A15                SKE     D,#1
0058   01                  BR      RW2STO
0059   0E                  BR      CCR1SO
005A   9A25       RW2STO:  SKE     D,#2
005C   03                  BR      RW3STO
005D R AB00C1              BR      CCR2SO
0060   9A35       RW3STO:  SKE     D,#3
0062 R AB0149              BR      RETSTO
0065 R AB0110              BR      CCR3SO
                           ;NOW CHECK WHICH COLUMN
                           ;                         ROW 1
0068   9A14       CCR1SO:  SKE     E,#1             ;........................
006A R AB007D              BR      C2R1SO
006D E 8600                SKF     STO_LC           ;check for load control
006F R AB0169              BR      LCERR            ;invalid if load control
0072 E AB4000              CALL    !MODOFF          ;A004  IF MODE IS OFF RETURN
0075   EE                  RET                      ;A004    RETURN!!! 8/4/88
0076   8905                MOV     XA,#5            ;>>>>> UPTEMP KEY <<<<<<<<<
0078 E 00                  GETI    MVSTXA
0079 E AB4000              CALL    !UPSTPT          ;BEEP IN SUBROUTINE
007C   EE                  RET                      ;WAS BR RETSTO
007D   9A24       C2R1SO:  SKE     E,#2             ;........................
```

```
007F   04                BR     C3R1S0
0080 E AB4000            CALL   !OPTIM          ;SAME FOR OPTIMIZER KEY
                                                ;>>>> TELEPHONE KEY <<<<<<<
0083   EE                RET                    ;WAS BR RETSTO
0084   9A34     C3R1S0:  SKE    E,#3            ;........................
0086   06                BR     C4R1S0
0087 E 8500              SET1   ST3_BS          ;>>>> APPLIANCE KEY <<<<<<<
0089 E AB4000            CALL   !INTAPP
008C   EE                RET                    ;WAS BR RETSTO
008D   9A44     C4R1S0:  SKE    E,#4            ;........................
008F R AB00A3            BR     C5R1S0
0092 E 8600              SKF    NO_EHW
0094   EE                RET                    ;NO EHW SO SKIP!  5/18/88
0095 E 8500              SET1   ST3_BS
0097   8912              MOV    XA,#12H         ;>>>> HEAT WATER KEY <<<<<<
0099 E 00                GETI   MUSTXA
009A E 00                GETI   CLRSCR            ;CLEAR SCREEN
009B E 00                GETI   SEL1
009C E 8500              SET1   HTWATER         ;TURN ON HEAT WATER INDICATOR
009E E 8500              SET1   SETNG           ;TURN ON SETTING INDICATOR
00A0 E 8500              SET1   ST5_FW          ;FLASH WEEKDAY/WEEKEND
00A2   EE                RET                    ;WAS BR RETSTO
00A3   9A54     C5R1S0:  SKE    E,#5            ;........................
00A5   0C                BR     C6R1S0
00A6 E 8500              SET1   ST3_BS
00A8   8941              MOV    XA,#41H         ;>>>>>> COOL KEY <<<<<<<<<<
00AA E 00                GETI   MUSTXA
00AB E 00                GETI   CLRSCR          ;CLEAR SCREEN
00AC E 00                GETI   SEL1
00AD E 8500              SET1   CSETNG          ;TURN ON COOL SETTING INDICATOR
00AF E 8500              SET1   ST5_FW          ;FLASH WEEKDAY/WEEKEND
00B1   EE                RET                    ;WAS BR RETSTO
00B2   9A64     C6R1S0:  SKE    E,#6            ;........................
00B4   EE                RET                    ;WAS BR RETSTO
00B5 E 8500              SET1   ST3_BS
00B7   8911              MOV    XA,#11H         ;>>>>>>> HEAT KEY <<<<<<<<<
00B9 E 00                GETI   MUSTXA
00BA E 00                GETI   CLRSCR            ;CLEAR SCREEN
00BB E 00                GETI   SEL1
00BC E 8500              SET1   HSETNG          ;TURN ON HEAT SETTING INDICATOR
00BE E 8500              SET1   ST5_FW          ;FLASH WEEKDAY/WEEKEND
00C0   EE                RET                    ;WAS BR RETSTO
                         ;                      ROW2
00C1   9A14     CCR2S0:  SKE    E,#1            ;........................
00C3 R AB00D6            BR     C2R2S0
00C6 E 8600              SKF    ST0_LC          ;check for load control
00C8 R AB0169            BR     LCERR           ;invalid if load control
00CB E AB4000            CALL   !MODOFF         ;A004  IF MODE IS OFF RETURN
00CE   EE                RET                    ;A004    RETURN!!! 8/4/88
00CF   8905              MOV    XA,#5           ;>>> DOWN TEMP KEY <<<<<<<<
00D1 E 00                GETI   MUSTXA
00D2 E AB4000            CALL   !DNSTPT         ;BEEP IN SUBROUTINE
00D5   EE                RET                    ;WAS BR RETSTO
00D6   9A24     C2R2S0:  SKE    E,#2            ;........................
00D8   0D                BR     C3R2S0
00D9 E 8500              SET1   ST3_BS
00DB   8904              MOV    XA,#4           ;>>>> BILL INFO KEY <<<<<<<
00DD E 00                GETI   MUSTXA
```

```
0ODE E 00            GETI  CLRSCR       ;CLEAR SCREEN
00DF   8960          MOV   XA,#60H
00E1 E 00            GETI  SCDRST
00E2 E 00            GETI  SEL1
00E3 E 8500          SET1  BILL         ;TURN ON BILL INFO INDICATOR
00E5   EE            RET                ;WAS BR RETSTO
00E6   9A34  C3R2S0: SKE   E,#3         ;.........................
00E8 R AB0109        BR    C4R2S0
00EB E 8600          SKF   STO_LC       ;check for load control
00ED R AB0169        BR    LCERR        ;invalid if load control
00F0 E AB4000        CALL  !MODOFF      ;A004  IF MODE IS OFF RETURN
00F3   EE            RET                ;A004    RETURN!!! 8/4/88
00F4 E 8500          SET1  ST3_BS
00F6   8971          MOV   XA,#71H      ;>>>>> HOLD TEMP KEY <<<<<<
00F8 E 00            GETI  SCDRST
00F9 E 8400          CLR1  TSB6T        ;TURN OFF TIMER
00FB E 00            GETI  MXA_00       ;A004  NO REPEAT
00FC E 9200          MOV   LST_KEY,XA   ;A004  FOR HOLD
00FE E 8400          CLR1  CNT_ZZ       ;DON'T LET IT UPDATE   A004 8/8/88
0100 E 8700          SKT   ST1_TH
0102   03            BR    C3HLD
0103 E 8400          CLR1  ST1_TH       ;OFF IF IT IS ON NOW!!
0105   EE            RET
0106 E 8500  C3HLD:  SET1  ST1_TH       ;TURN ON HOLD STATUS
0108   EE            RET                ;WAS BR RETSTO
0109   9A44  C4R2S0: SKE   E,#4         ;.........................
010B   EE            RET                ;WAS BR RETSTO
010C E AB4000        CALL  !OPTIM       ;>>>>>> OPTIMIZE KEY <<<<<<
010F   EE            RET                ;WAS BR RETSTO
                     ;                  ROW 3
0110   9A14  CCR3S0: SKE   E,#1         ;.........................
0112 R AB0132        BR    C2R3S0
0115 E 8600          SKF   MO_EHW
0117   EE            RET                ;NO EHW SO SKIP!  5/18/88
0118 E 8600          SKF   STO_LC       ;check for load control
011A R AB0169        BR    LCERR        ;invalid if load control
011D E 8500          SET1  ST3_BS
011F   8972          MOV   XA,#72H      ;>>>> HEAT WATER NOW <<<<<<
0121 E 00            GETI  SCDRST
0122 E 8400          CLR1  TSB6T        ;TURN OFF TIMER
0124 E 00            GETI  MXA_00       ;A004  NO REPEAT
0125 E 9200          MOV   LST_KEY,XA   ;A004  FOR HWN
0127 E 8400          CLR1  CNT_ZZ       ;DON'T LET IT UPDATE   A004 8/8/88
0129 E 8700          SKT   ST1_HW
012B   03            BR    CCRHW
012C E 8400          CLR1  ST1_HW       ;OFF IF IT IS ON NOW!!
012E   EE            RET
012F E 8500  CCRHW:  SET1  ST1_HW       ;TURN ON HW ELEMENT
0131   EE            RET                ;WAS BR RETSTO
0132   9A24  C2R3S0: SKE   E,#2         ;.........................
0134   09            BR    C4R3S0       ;>>>>>>  RETURN <<<<<<<<<<<
0135 E 8400          CLR1  TSB6T        ;TURN OFF TIMER
0137 E 00            GETI  SEL1
0138 E 00            GETI  MXA_00
0139 E 9200          MOV   PM_PRD,XA    ;CLEAR FOR UP/DN STPNT AND OPTIM
013B E 9200          MOV   PM_PNT,XA
013D   EE            RET                ;WAS BR RETSTO - ON A TIME OUT FROM OPTIM
013E   9A44  C4R3S0: SKE   E,#4         ;.........................
```

```
0140   09                BR     C6R3S0
0141 E 8500              SET1   ST3_BS
0143 E 00                GETI   MXA_00        ;A004  NO REPEAT
0144 E 9200              MOV    LST_KEY,XA    ;A004  FOR ML
                                              ;
0146   8906              MOV    XA,#06H       ;>>>>> MOVE LEFT KEY <<<<<<
0148 E 00                GETI   MVSTXA        ;(FIRST KEY IN CONFIG SEQUENCE)
0149            RETST0:                       ;ALL BR'S REMOVED FOR BYTES SAVINGS 12/14
0149   EE                RET
014A   9A64     C6R3S0:  SKE    E,#6          ;>>>>>> HOUR <<<<<<<<<<<<<
014C   EE                RET
014D E 8700              SKT    ST1_FL
014F   EE                RET                  ;IF NOT SET GET LOST!!!
0150   8920              MOV    XA,#32        ; 1 SEC
0152 E 9200              MOV    TSB6TM,XA
0154 E 00                GETI   MXA_00
0155 E 9200              MOV    TSB6RP,XA     ; 0 REPEAT COUNTER
0157 E 00                GETI   SEL1
0158 E A200              MOV    XA,PM_PRD
015A   C0                INCS   A
015B E 9200              MOV    PM_PRD,XA     ;STORE IT
015D   9A80              SKE    A,#8
015F   EE                RET                  ;HOLD HOUR KEY FOR 4 SEC.
0160 E 00                GETI   SEL0
0161 E 8500              SET1   ST3_BS
0163 E 8400              CLR1   ST1_FL        ;CLEAR FILTER
0165   8984              MOV    XA,#84H       ;MESSAGE 8, RESET FILTER!
0167 E 00                GETI   SCDRST
0168   EE                RET
0169 E 8500     LCERR:   SET1   ST3_BS
016B E 8500              SET1   ERR_TON       ;USE ERROR TONE!!!!
016D E 00                GETI   SEL1
016E E 8500              SET1   ST5_FL        ;FLASH LOAD CONTROL
0170   EE                RET
                         ;
                ;******************************************************************
                ;                                                                *
                ;        CONST1: STATE 1 - HEAT AND COOL WD/WE SCHEDULE          *
                ;                                                                *
                ;        SUBSTATES: 11 - HEAT WD/WE FLASHING                     *
                ;                   21 - HEAT WD SCHEDULE                        *
                ;                   31 - HEAT WE SCHEDULE                        *
                ;                   41 - COOL WD/WE FLASNING                     *
                ;                   51 - COOL WD SCHEDULE                        *
                ;                   61 - COOL WE SCHEDULE                        *
                ;                                                                *
                ;******************************************************************
                ;
                         ;
       R (0171) CONST1   EQU    $
0171 E 00                GETI   STMBE
0172 E 00                GETI   SEL0
                        ;CHECK FOR ROW NUMBER
0173   9A15              SKE    D,#1
0175   01                BR     RW2ST1
0176   0C                BR     CCR1S1
0177   9A25     RW2ST1:  SKE    D,#2
0179   03                BR     RW3ST1
```

```
017A R AB01FE                 BR      CCR2S1
017D   9A35         RW3ST1:   SKE     D,#3
017F   EE                     RET                     ;IF NOT ROW 3 THEN ERROR!!!!
0180 R AB02D3                 BR      CCR3S1
                              ;NOW CHECK WHICH COLUMN
                              ;                        ROW 1
0183   9A14         CCR1S1:   SKE     E,#1            ;........................
0185   0A                     BR      C3R1S1
0186   9A11                   SKE     X,#1            ;>>>>> UPTEMP KEY <<<<<<<<<
0188   01                     BR      NXTUPT          ;IF KEY INVALID IN STATE
0189   EE                     RET                     ;THEN RETURN
018A   9A41         NXTUPT:   SKE     X,#4
018C E AB4000                 CALL    !TEMPUP         ;ELSE BEEP INCREMENT TEMP
018F   EE                     RET
0190   9A34         C3R1S1:   SKE     E,#3            ;........................
0192 R AB01A5                 BR      C4R1S1
0195 E 8500                   SET1    ST3_BS          ;>>>> APPLIANCE KEY <<<<<<<
0197   9A11                   SKE     X,#1
0199   01                     BR      APC3S1          ;CHECK IF UPDATE IS NECCESSARY
019A   06                     BR      NOAUS1
019B   9A41         APC3S1:   SKE     X,#4
019D   01                     BR      APUPS1
019E   02                     BR      NOAUS1
019F E 00           APUPS1:   GETI    MXA_A0          ;UPDATE
01A0 E 00                     GETI    SCDRST
01A1 E AB4000       NOAUS1:   CALL    !INTAPP
01A4   EE                     RET
01A5   9A44         C4R1S1:   SKE     E,#4            ;........................
01A7 R AB01C5                 BR      C5R1S1
01AA E 8600                   SKF     NO_EHW          ;A004    AJB
01AC   EE                     RET                     ;NO EHW SO SKIP!  8/04/88
01AD E 8500                   SET1    ST3_BS          ;>>>> HEAT WATER KEY <<<<<<
01AF   9A11                   SKE     X,#1
01B1   01                     BR      HWC4S1
01B2   06                     BR      NHWUS1          ;CHECK TO SEE IF UPDATE IS NECCESSARY
01B3   9A41         HWC4S1:   SKE     X,#4
01B5   01                     BR      HWUPS1
01B6   02                     BR      NHWUS1
01B7 E 00           HWUPS1:   GETI    MXA_A0          ;UPDATE
01B8 E 00                     GETI    SCDRST
01B9   8912         NHWUS1:   MOV     XA,#12H
01BB E 00                     GETI    MUSTXA
01BC E 00                     GETI    CLRSCR           ;CLEAR SCREEN
01BD E 00                     GETI    SEL1
01BE E 8500                   SET1    HTWATER         ;TURN ON HEAT WATER INDICATOR
01C0 E 8500                   SET1    SETNG           ;TURN ON SETTING INDICATOR
01C2 E 8500                   SET1    ST5_FW          ;FLASH WEEKDAY/WEEKEND
01C4   EE                     RET
01C5   9A54         C5R1S1:   SKE     E,#5            ;........................
01C7 R AB01E3                 BR      C6R1S1
01CA E A200                   MOV     XA,STATE        ;>>>>>> COOL KEY <<<<<<<<<<
01CC   D9                     XCH     A,X
01CD   E6                     CLR1    CY
01CE   6C                     ADDS    A,#0CH          ;IF SUBSTATE < 4
01CF   01                     BR      NCCNCL          ;THEN CONTINUE
01D0   EE                     RET                     ;ELSE RETURN
01D1 E 8500         NCCNCL:   SET1    ST3_BS          ;BEEP
01D3 E 00                     GETI    CLRSCR           ;CLEAR  SCREEN
```

```
01D4   9A11         SKE     X,#1        ;CHECK IF UPDATE IS NECCESSARY
01D6   01           BR      CLCTUD
01D7   02           BR      CLNOUD
01D8 E 00   CLCTUD: GETI    NXA_A0      ;UPDATE
01D9 E 00           GETI    SCDRST
01DA   8941 CLNOUD: MOV     XA,#41H
01DC E 00           GETI    MUSTXA
01DD E 00           GETI    SEL1
01DE E 8500         SET1    CSETNG
01E0 E 8500         SET1    ST5_FW      ;FLASH WEEKDAY/WEEKEND
01E2   EE           RET
01E3   9A64 C6R1S1: SKE     E,#6        ;.........................
01E5   EE           RET
01E6 E A200         MOV     XA,STATE    ;>>>>>>> HEAT KEY <<<<<<<<<
01E8   D9           XCH     A,X
01E9   E6           CLR1    CY
01EA   6C           ADDS    A,#0CH      ;IF SUBSTATE(IN A) < 4
01EB   EE           RET                 ;THEN RETURN
01EC E 8500         SET1    ST3_BS      ;ELSE BEEP AND CONTINUE
01EE E 00           GETI    CLRSCR
01EF   9A11         SKE     X,#1        ;CHECK IF UPDATE IS NECCESSARY
01F1   01           BR      HTCTUD
01F2   02           BR      HTNOUD
01F3 E 00   HTCTUD: GETI    NXA_A0      ;UPDATE
01F4 E 00           GETI    SCDRST
01F5   8911 HTNOUD: MOV     XA,#11H
01F7 E 00           GETI    MUSTXA
01F8 E 00           GETI    SEL1
01F9 E 8500         SET1    HSETNG
01FB E 8500         SET1    ST5_FW      ;FLASH WEEKDAY/WEEKEND
01FD   EE           RET
                    ;                   ROW2
01FE   9A14 CCR2S1: SKE     E,#1        ;.........................
0200   0A           BR      C5R2S1
0201   9A11         SKE     X,#1        ;>>> DOWN TEMP KEY <<<<<<<<
0203   01           BR      NXTDNT      ;IF KEY INVALID IN STATE
0204   EE           RET                 ;THEN RETURN
0205   9A41 NXTDNT: SKE     X,#4
0207 E AB4000       CALL    !TEMPDN     ;ELSE BEEP AND DECREMENT TEMP
020A   EE           RET
020B   9A54 C5R2S1: SKE     E,#5        ;.........................
020D R AB026D       BR      C6R2S1
0210 E 8500         SET1    ST3_BS
0212   9A11         SKE     X,#1  ;**   ;>>>>>> WEEKEND KEY <<<<<<<<
0214 R AB0228       BR      HCWE2
0217   9A39         MOV     X,#3
0219 E 00           GETI    MUSTXA
021A   8921         MOV     XA,#21H     ;REQUESTS INFORMATION FOR HEAT WE
021C E 00           GETI    SCDRST
021D E 00           GETI    NXA_00      ;A004  NO REPEAT
021E E 9200         MOV     LST_KEY,XA  ;A004  FOR WKEND
0220 E 00           GETI    SEL1
0221 E 8400         CLR1    ST5_FW      ;CLEAR FLASH WD/WE
0223 E 8400         CLR1    WEEKDAY     ;CLEAR WEEKDAY RDK 11-12-87
0225 E 8500         SET1    WEEKEND
0227   EE           RET
0228   9A41 HCWE2:  SKE     X,#4  ;**
022A R AB023E       BR      HCWE3
```

```
0220   9A69                MOV   X,#6
022F E 00                  GETI  MUSTXA
0230   8923                MOV   XA,#23H         ;REQUESTS INFORMATION FOR COOL WE
0232 E 00                  GETI  SCDRST
0233 E 00                  GETI  MXA_00          ;A004  NO REPEAT
0234 E 9200                MOV   LST_KEY,XA      ;A004  FOR WKEND
0236 E 00                  GETI  SEL1
0237 E 8400                CLR1  ST5_FW          ;CLEAR FLASH WD/WE
0239 E 8400                CLR1  WEEKDAY         ;CLEAR WEEKDAY RDK 11-12-87
023B E 8500                SET1  WEEKEND
023D   EE                  RET
023E   9A31      HCWE3:    SKE   X,#3  ;**
0240   01                  BR    HCWE4
0241   03                  BR    HCWENP
0242   9A61      HCWE4:    SKE   X,#6  ;**
0244   04                  BR    HCWE5
0245 E AB4000    HCWENP:   CALL  !NXTPRD         ;GOES TO NEXT PERIOD
0248   EE                  RET
0249   9A21      HCWE5:    SKE   X,#2  ;**
024B   0F                  BR    HCWE6
024C   9A39                MOV   X,#3
024E E 00                  GETI  MUSTXA
024F E 00                  GETI  MXA_A0          ;UPDATES AND
0250 E 00                  GETI  SCDRST
0251   8921                MOV   XA,#21H         ;REQUESTS INFORMATION FOR HEAT WE
0253 E 00                  GETI  SCDRST
0254 E 00                  GETI  CLRSCR          ;CLEAR SCREEN 11/18 RDK
0255 E 00                  GETI  SEL1
0256 E 8500                SET1  HSETNG          ;TURN HEAT SETTING ON 11/18 RDK
0258 E 8500                SET1  WEEKEND
025A   EE                  RET
025B   9A51      HCWE6:    SKE   X,#5  ;**
025D   EE                  RET
025E   9A69                MOV   X,#6
0260 E 00                  GETI  MUSTXA
0261 E 00                  GETI  MXA_A0          ;UPDATES AND
0262 E 00                  GETI  SCDRST
0263   8923                MOV   XA,#23H         ;REQUESTS INFORMATION FOR COOL WE
0265 E 00                  GETI  SCDRST
0266 E 00                  GETI  CLRSCR          ;CLEAR SCREEN 11/18  RDK
0267 E 00                  GETI  SEL1
0268 E 8500                SET1  CSETNG          ;TURN COOL SETTING ON 11/18 RDK
026A E 8500                SET1  WEEKEND
026C   EE                  RET
026D   9A64      C6R2S1:   SKE   E,#6            ;......................
026F   EE                  RET
0270 E 8500                SET1  ST3_BS          ;TURN ON BEEP
0272   9A11                SKE   X,#1  ;**       ;>>>>> WEEKDAY KEY <<<<<<<<
0274 R AB0288              BR    HCWD2
0277   9A29                MOV   X,#2
0279 E 00                  GETI  MUSTXA
027A   8920                MOV   XA,#20H         ;REQUESTS INFORMATION FOR HEAT WD
027C E 00                  GETI  SCDRST
027D E 00                  GETI  MXA_00          ;A004  NO REPEAT
027E E 9200                MOV   LST_KEY,XA      ;A004  FOR WKDAY
0280 E 00                  GETI  SEL1
0281 E 8400                CLR1  ST5_FW          ;CLEAR FLASH WD/WE
0283 E 8400                CLR1  WEEKEND         ;CLEAR WEEKEND RDK 11-12-87
```

```
0285 E 8500                SET1    WEEKDAY
0287   EE                  RET
0288   9A41      HCWD2:    SKE     X,#4  ;**
028A R AB029E              BR      HCWD3
028D   9A59                MOV     X,#5
028F E 00                  GETI    MVSTXA
0290   8922                MOV     XA,#22H          ;REQUESTS INFORMATION FOR COOL WD
0292 E 00                  GETI    SCDRST
0293 E 00                  GETI    MXA_00           ;A004  NO REPEAT
0294 E 9200                MOV     LST_KEY,XA       ;A004  FOR WKDAY
0296 E 00                  GETI    SEL1
0297 E 8400                CLR1    ST5_FW           ;CLEAR FLASH WD/WE
0299 E 8400                CLR1    WEEKEND          ;CLEAR WEEKEND RDK 11-12-87
029B E 8500                SET1    WEEKDAY
029D   EE                  RET
029E   9A21      HCWD3:    SKE     X,#2  ;**
02A0   01                  BR      HCWD4
02A1   03                  BR      HCWDNP
02A2   9A51      HCWD4:    SKE     X,#5  ;**
02A4   04                  BR      HCWD5            ;DISPLAYS SCHEDULES AND GOES
02A5 E AB4000    HCWDNP:   CALL    !NXTPRD          ; TO NEXT PERIOD
02A8   EE                  RET
02A9   9A31      HCWD5:    SKE     X,#3  ;**
02AB R AB02BF              BR      HCWD6
02AE   9A29                MOV     X,#2
02B0 E 00                  GETI    MVSTXA
02B1 E 00                  GETI    MXA_A0           ;UPDATES AND
02B2 E 00                  GETI    SCDRST
02B3   8920                MOV     XA,#20H          ;REQUESTS INFORMATION FOR HEAT WD
02B5 E 00                  GETI    SCDRST
02B6 E 00                  GETI    CLRSCR           ;3/23/88 AJB FIX PROBLEM
02B7 E 00                  GETI    SEL1
02B8 E 8500                SET1    HSETNG
02BA E 8400                CLR1    WEEKEND          ;CLEAR WEEKEND
02BC E 8500                SET1    WEEKDAY
02BE   EE                  RET
02BF   9A61      HCWD6:    SKE     X,#6  ;**
02C1   EE                  RET
02C2   9A59                MOV     X,#5
02C4 E 00                  GETI    MVSTXA
02C5 E 00                  GETI    MXA_A0           ;UPDATES AND
02C6 E 00                  GETI    SCDRST
02C7   8922                MOV     XA,#22H          ;REQUESTS INFORMATION FOR COOL WD
02C9 E 00                  GETI    SCDRST
02CA E 00                  GETI    CLRSCR
02CB E 00                  GETI    SEL1
02CC E 8500                SET1    CSETNG           ;3/23/88
02CE E 8400                CLR1    WEEKEND          ;CLEAR WEEKEND
02D0 E 8500                SET1    WEEKDAY
02D2   EE                  RET
                           ;                        ROW 3
02D3   9A24      CCR3S1:   SKE     E,#2             ;...........................
02D5 R AB02EA              BR      C3R3S1
02D8 E 8500                SET1    ST3_BS           ;TURN ON BEEP
02DA   9A11                SKE     X,#1             ;>>>>>> RETURN KEY <<<<<<<<
02DC   01                  BR      NRETHC
02DD   06                  BR      CLSST1           ;CHECK TO SEE IF UPDATE
02DE   9A41      NRETHC:   SKE     X,#4             ;IS NECCESSARY
```

```
02E0   01              BR      UPDST1
02E1   02              BR      CLSST1
02E2 E 00     UPDST1:  GETI    MXA_A0       ;UPDATE
02E3 E 00              GETI    SCDRST
02E4 E 00     CLSST1:  GETI    CLRSCR
02E5 E 00              GETI    MXA_00
02E6 E 00              GETI    MVSTXA
02E7 E 8400            CLR1    .TSB6T       ;TURN OFF TIMER
02E9   EE              RET
02EA   9A34   C3R3S1:  SKE     E,#3         ;............................
02EC   0A              BR      C4R3S1
02ED   9A11            SKE     X,#1         ;>>>>> MOVE RIGHT KEY <<<<<
02EF   01              BR      MTRTHC       ;IF KEY INVALID IN STATE
02F0   EE              RET                  ;THEN RETURN
02F1   9A41   MTRTHC:  SKE     X,#4
02F3 E AB4000          CALL    !MRIGHT      ;TURN ON BEEP IN SUBROUTINE
02F6   EE              RET
02F7   9A44   C4R3S1:  SKE     E,#4         ;............................
02F9   0A              BR      C5R3S1
02FA   9A11            SKE     X,#1         ;>>>>> MOVE LEFT KEY <<<<<<
02FC   01              BR      MTLTHC       ;IF KEY INVALID IN STATE
02FD   EE              RET                  ;THEN RETURN
02FE   9A41   MTLTHC:  SKE     X,#4
0300 E AB4000          CALL    !MLEFT       ;TURN ON BEEP IN SUBROUTINE
0303   EE              RET
0304   9A54   C5R3S1:  SKE     E,#5         ;............................
0306   0A              BR      C6R3S1
0307   9A11            SKE     X,#1         ;>>>>>>>>> MIN KEY <<<<<<<<<
0309   01              BR      MTMMHC       ;IF KEY INVALID IN STATE
030A   EE              RET                  ;THEN RETURN
030B   9A41   MTMMHC:  SKE     X,#4
030D E AB4000          CALL    !IMINS
0310   EE              RET
0311   9A64   C6R3S1:  SKE     E,#6         ;............................
0313   0A              BR      C7R3S1
0314   9A11            SKE     X,#1         ;>>>>>>> HOUR KEY <<<<<<<<<
0316   01              BR      MTHRHC       ;IF KEY INVALID IN STATE
0317   EE              RET                  ;THEN RETURN
0318   9A41   MTHRHC:  SKE     X,#4
031A E AB4000          CALL    !IHOURS
031D   EE              RET
031E   9A74   C7R3S1:  SKE     E,#7         ;............................
0320   EE              RET                  ;DATA FROM CONTROLLER IS IN PMI BUFFER
0321 E AB4000          CALL    !MSGCTR      ;DISPLAY SCHEDULE AND RETURN
0324          RETST1:                       ;REMOVED ALL BR RETST1 TO SAVE BYTES
0324   EE              RET
                       ;
              ;*****************************************************************
              ;                                                               *
              ;       CONST2: STATE 2 - HEAT WATER WD/WE SCHEDULE             *
              ;                                                               *
              ;       SUBSTATES: 12 - HEAT WATER WD/WE FLASHING               *
              ;                  22 - HEAT WATER WD SCHEDULE                  *
              ;                  32 - HEAT WATER WE SCHEDULE                  *
              ;                                                               *
              ;*****************************************************************
              ;
     R (0325) CONST2  EQU     $
```

```
0325 E 00                    GETI    STNBE
0326 E 00                    GETI    SELO
                             ;CHECK FOR ROW NUMBER
0327   9A15                  SKE     D,#1
0329   01                    BR      RW2ST2
032A   0C                    BR      CCR1S2
032B   9A25         RW2ST2:  SKE     D,#2
032D   03                    BR      RW3ST2
032E R AB0372                BR      CCR2S2
0331   9A35         RW3ST2:  SKE     D,#3
0333   EE                    RET                     ;IF NOT ROW 3 THEN ERROR!!!!
0334 R AB03E2                BR      CCR3S2
                             ;NOW CHECK WHICH COLUMN
                             ;                        ROW 1
0337   9A34         CCR1S2:  SKE     E,#3            ;.........................
0339   0C                    BR      C5R1S2          ;>>>> APPLIANCE KEY <<<<<<<
033A E 8500                  SET1    ST3_BS          ;TURN ON BEEP
033C   9A11                  SKE     X,#1            ;CHECK IF UPDATE IS NECCESSARY
033E   01                    BR      HWAPUD
033F   02                    BR      HWAPNU
0340 E 00           HWAPUD:  GETI    NXA_A0          ;UPDATE
0341 E 00                    GETI    SCDRST
0342 E AB4000       HWAPNU:  CALL    !INTAPP
0345   EE                    RET
0346   9A54         C5R1S2:  SKE     E,#5            ;.........................
0348 R AB035D                BR      C6R1S2
                                                     ;>>>>>> COOL KEY <<<<<<<<<<
034B   9A11                  SKE     X,#1            ;CHECK IF UPDATE IS NECCESSARY
034D   01                    BR      HWCLUD
034E   02                    BR      HWCLNU
034F E 00           HWCLUD:  GETI    NXA_A0          ;UPDATE
0350 E 00                    GETI    SCDRST
0351 E 00           HWCLNU:  GETI    CLRSCR
0352   8941                  MOV     XA,#41H         ;CHANGE STATE HERE AJB 3/23/88
0354 E 00                    GETI    NVSTXA
0355 E 8500                  SET1    ST3_BS          ;TURN ON BEEP
0357 E 00                    GETI    SEL1
0358 E 8500                  SET1    CSETNG
035A E 8500                  SET1    ST5_FW          ;FLASH WEEKDAY/WEEKEND
035C   EE                    RET
035D   9A64         C6R1S2:  SKE     E,#6            ;.........................
035F   EE                    RET
                                                     ;>>>>>>> HEAT KEY <<<<<<<<<
0360   9A11                  SKE     X,#1            ;CHECK IF UPDATE IS NECCESSARY
0362   01                    BR      HWHTUD
0363   02                    BR      HWHTNU
0364 E 00           HWHTUD:  GETI    NXA_A0          ;UPDATE
0365 E 00                    GETI    SCDRST
0366 E 00           HWHTNU:  GETI    CLRSCR            ;CLEAR SCREEN
0367   8911                  MOV     XA,#11H         ;CHANGE STATE HERE AJB 3/23/88
0369 E 00                    GETI    NVSTXA
036A E 8500                  SET1    ST3_BS          ;TURN ON BEEP
036C E 00                    GETI    SEL1
036D E 8500                  SET1    HSETNG          ;TURN ON HEAT SETTING INDICATOR
036F E 8500                  SET1    ST5_FW          ;FLASH WEEKDAY/WEEKEND
0371   EE                    RET
                             ;                       ROW2
0372   9A54         CCR2S2:  SKE     E,#5            ;.........................
```

```
0374 R AB03AC                  BR     C6R2S2
0377 E 8500                    SET1   ST3_BS         ;TURN ON BEEP
0379   9A11                    SKE    X,#1           ;>>>>> WEEKEND KEY <<<<<<<<
037B R AB038F                  BR     HWWE2
037E   9A39                    MOV    X,#3
0380 E 00                      GETI   MVSTXA
0381   8931                    MOV    XA,#31H        ;REQUESTS HEAT WATER WE SCHEDULES
0383 E 00                      GETI   SCDRST
0384 E 00                      GETI   MXA_00         ;A004  NO REPEAT
0385 E 9200                    MOV    LST_KEY,XA     ;A004  FOR WKEND
0387 E 00                      GETI   SEL1
0388 E 8400                    CLR1   ST5_FW         ;CLEAR FLASH WD/WE
038A E 8400                    CLR1   WEEKDAY        ;CLEAR WEEKDAY RDK 11-12-87
038C E 8500                    SET1   WEEKEND
038E   EE                      RET
038F   9A21           HWWE2:   SKE    X,#2
0391 R AB03A5                  BR     HWWE3
0394   9A39                    MOV    X,#3
0396 E 00                      GETI   MVSTXA
0397 E 00                      GETI   MXA_A0         ;UPDATES AND
0398 E 00                      GETI   SCDRST
0399   8931                    MOV    XA,#31H        ;REQUESTS HEAT WATER WE SCHEDULES
039B E 00                      GETI   SCDRST
039C E 00                      GETI   CLRSCR         ;CLEAR SCREEN 11/18 RDK
039D E 00                      GETI   SEL1
039E E 8500                    SET1   HTWATER        ;TURN ON HEAT WATER 11/18 RDK
03A0 E 8500                    SET1   SETNG
03A2 E 8500                    SET1   WEEKEND
03A4   EE                      RET
03A5   9A31           HWWE3:   SKE    X,#3
03A7   EE                      RET
03A8 E AB4000                  CALL   !NXTPRD        ;GOES TO NEXT PERIOD
03AB   EE                      RET
03AC   9A64           C6R2S2:  SKE    E,#6           ;......................
03AE   EE                      RET
03AF E 8500                    SET1   ST3_BS         ;TURN ON BEEP
03B1   9A11                    SKE    X,#1           ;>>>>> WEEKDAY KEY <<<<<<<<
03B3 R AB03C7                  BR     HWWD2
03B6   9A29                    MOV    X,#2
03B8 E 00                      GETI   MVSTXA
03B9   8930                    MOV    XA,#30H        ;REQUESTS HEAT WATER WD SCHEDULES
03BB E 00                      GETI   SCDRST
03BC E 00                      GETI   MXA_00         ;A004  NO REPEAT
03BD E 9200                    MOV    LST_KEY,XA     ;A004  FOR WKDAY
03BF E 00                      GETI   SEL1
03C0 E 8400                    CLR1   ST5_FW         ;CLEAR FLASH WD/WE
03C2 E 8400                    CLR1   WEEKEND        ;CLEAR WEEKEND RDK 11-12-87
03C4 E 8500                    SET1   WEEKDAY
03C6   EE                      RET
03C7   9A21           HWWD2:   SKE    X,#2
03C9   04                      BR     HWWD3
03CA E AB4000                  CALL   !NXTPRD        ;GOES TO NEXT PERIOD
03CD   EE                      RET
03CE   9A31           HWWD3:   SKE    X,#3
03D0   EE                      RET
03D1   9A29                    MOV    X,#2
03D3 E 00                      GETI   MVSTXA
03D4 E 00                      GETI   MXA_A0         ;UPDATES AND
```

```
0305 E 00          GETI   SCDRST
0306   8930        MOV    XA,#30H       ;REQUESTS HEAT WATER WD SCHEDULES
0308 E 00          GETI   SCDRST
0309 E 00          GETI   CLRSCR        ;CLEAR SCREEN 11/18 RDK
030A E 00          GETI   SEL1
030B E 8500        SET1   HTWATER       ;TURN ON HEAT WATER 11/18 RDK
030D E 8500        SET1   SETNG
030F E 8500        SET1   WEEKDAY
03E1   EE          RET
                   ;                    ROW 3
03E2   9A24     CCR3S2: SKE    E,#2     ;............................
03E4   0E          BR     C3R3S2
03E5 E 8500        SET1   ST3_BS        ;TURN ON BEEP
03E7   9A11        SKE    X,#1          ;>>>>>> RETURN KEY <<<<<<<<
03E9   01          BR     UPDST2        ;CHECK TO SEE IF
03EA   02          BR     CLSST2
03EB E 00       UPDST2: GETI   MXA_A0   ;UPDATE IS NECCESSARY
03EC E 00          GETI   SCDRST
03ED E 00       CLSST2: GETI   CLRSCR
03EE E 00          GETI   MXA_00
03EF E 00          GETI   MUSTXA
03F0 E 8400        CLR1   TSB6T         ;TURN OFF TIMER
03F2   EE          RET
03F3   9A34     C3R3S2: SKE    E,#3     ;............................
03F5   06          BR     C4R3S2
03F6   9A11        SKE    X,#1          ;>>>>> MOVE RIGHT KEY <<<<<
03F8 E AB4000      CALL   !MRIGHT       ;IF KEY INVALID IN STATE
03FB   EE          RET                  ;THEN RETURN
03FC   9A44     C4R3S2: SKE    E,#4     ;............................
03FE   06          BR     C5R3S2
03FF   9A11        SKE    X,#1          ;>>>>> MOVE LEFT KEY <<<<<<
0401 E AB4000      CALL   !MLEFT        ;IF KEY INVALID IN STATE
0404   EE          RET                  ;THEN RETURN
0405   9A54     C5R3S2: SKE    E,#5     ;............................
0407   06          BR     C6R3S2
0408   9A11        SKE    X,#1          ;>>>>>>>>> MIN KEY <<<<<<<<<
040A E AB4000      CALL   !IMINS        ;IF KEY INVALID IN STATE
040D   EE          RET                  ;THEN RETURN
040E   9A64     C6R3S2: SKE    E,#6     ;............................
0410   06          BR     C7R3S2
0411   9A11        SKE    X,#1          ;>>>>>>> HOUR KEY <<<<<<<<<
0413 E AB4000      CALL   !IHOURS       ;IF KEY INVALID IN STATE
0416   EE          RET                  ;THEN RETURN
0417   9A74     C7R3S2: SKE    E,#7     ;..............................
0419   03          BR     RETST2        ;DATA FROM CONTROLLER IS IN PMI BUFFER
041A E AB4000      CALL   !MSGCTR       ;DISPLAY SCHEDULE AND RETURN
041D            RETST2:                 ;REMOVED ALL BR RETST2 TO SAVE BYTES
041D   EE          RET
                   ;
                ;****************************************************************
                ;                                                              *
                ;       CONST3: STATE 3 - APPLIANCE WD/WE SCHEDULE             *
                ;                                                              *
                ;       SUBSTATES: 13 - APPLIANCE WD/WE FLASHING               *
                ;                  23 - APPLIANCE WD SCHEDULE                  *
                ;                  33 - APPLIANCE WE SCHEDULE                  *
                ;                                                              *
                ;****************************************************************
```

```
;
     R (041E)          CONST3  EQU     $
041E E 00                      GETI    STNBE
041F E 00                      GETI    SEL0
                               ;CHECK FOR ROW NUMBER
0420   9A15                    SKE     D,#1
0422   01                      BR      RW2ST3
0423   0C                      BR      CCR1S3
0424   9A25            RW2ST3: SKE     D,#2
0426   03                      BR      RW3ST3
0427 R AB0484                  BR      CCR2S3
042A   9A35            RW3ST3: SKE     D,#3
042C   EE                      RET                     ;IF NOT ROW 3 THEN ERROR!!!!
042D R AB0514                  BR      CCR3S3
                               ;NOW CHECK WHICH COLUMN
                               ;                        ROW 1
0430   9A34            CCR1S3: SKE     E,#3            ;.........................
0432   09                      BR      C4R1S3
0433 E 8500                    SET1    ST3_BS          ;TURN ON BEEP
0435 E AB4000                  CALL    !MXTAPP         ;>>>> APPLIANCE KEY <<<<<<<
0438 E 00                      GETI    MXA_00          ;A004  NO REPEAT
0439 E 9200                    MOV     LST_KEY,XA      ;A004  FOR APPL
043B   EE                      RET
043C   9A44            C4R1S3: SKE     E,#4            ;.........................
043E R AB0458                  BR      C5R1S3
0441 E 8600                    SKF     NO_EHW          ;A004    AJB
0443   EE                      RET                     ;NO EHW SO SKIP!  8/04/88
0444   8912                    MOV     XA,#12H         ;>>>> HEAT WATER KEY <<<<<<
0446 E 00                      GETI    MUSTXA
0447 E 8500                    SET1    ST3_BS          ;TURN ON BEEP
0449   9A11                    SKE     X,#1            ;CHECK IF UPDATE IS NECCESSARY
044B   01                      BR      APHWUD
044C   02                      BR      APHWNU
044D E 00              APHWUD: GETI    MXA_A0          ;UPDATE
044E E 00                      GETI    SCDRST
044F E 00              APHWNU: GETI    CLRSCR            ;CLEAR SCREEN
0450 E 00                      GETI    SEL1
0451 E 8500                    SET1    HTWATER         ;TURN ON HEAT WATER INDICATOR
0453 E 8500                    SET1    SETNG           ;TURN ON SETTING INDICATOR
0455 E 8500                    SET1    ST5_FW          ;FLASH WEEKDAY/WEEKEND
0457   EE                      RET
0458   9A54            C5R1S3: SKE     E,#5            ;.........................
045A R AB046F                  BR      C6R1S3
045D   8941                    MOV     XA,#41H         ;>>>>>> COOL KEY <<<<<<<<<<
045F E 00                      GETI    MUSTXA
0460 E 8500                    SET1    ST3_BS          ;TURN ON BEEP
0462   9A11                    SKE     X,#1            ;CHECK IF UPDATE IS NECCESSARY
0464   01                      BR      APCLUD
0465   02                      BR      APCLNU
0466 E 00              APCLUD: GETI    MXA_A0          ;UPDATE
0467 E 00                      GETI    SCDRST
0468 E 00              APCLNU: GETI    CLRSCR
0469 E 00                      GETI    SEL1
046A E 8500                    SET1    CSETNG
046C E 8500                    SET1    ST5_FW          ;FLASH WEEKDAY/WEEKEND
046E   EE                      RET
046F   9A64            C6R1S3: SKE     E,#6            ;.........................
0471   EE                      RET
```

```
0472   8911                    MOV    XA,#11H           ;>>>>>>> HEAT KEY <<<<<<<<<
0474 E 00                      GETI   MVSTXA
0475 E 8500                    SET1   ST3_BS            ;TURN ON BEEP
0477   9A11                    SKE    X,#1              ;CHECK IF UPDATE IS NECCESSARY
0479   01                      BR     APHTUD
047A   02                      BR     APHTNU
047B E 00             APHTUD:  GETI   MXA_A0            ;UPDATE
047C E 00                      GETI   SCDRST
047D E 00             APHTNU:  GETI   CLRSCR
047E E 00                      GETI   SEL1
047F E 8500                    SET1   HSETNG
0481 E 8500                    SET1   ST5_FW            ;FLASH WEEKDAY/WEEKEND
0483   EE                      RET
                               ;                        ROW2
0484   9A54           CCR2S3:  SKE    E,#5              ;.........................
0486 R AB04CE                  BR     C6R2S3
0489 E 8500                    SET1   ST3_BS            ;TURN ON BEEP
048B   9A11                    SKE    X,#1              ;>>>>>> WEEKEND KEY <<<<<<<<
048D R AB04A4                  BR     APWE2
0490   9A39                    MOV    X,#3
0492 E 00                      GETI   MVSTXA
0493 E A300                    MOV    A,APPNUM
0495   67                      ADDS   A,#7
0496   9A49                    MOV    X,#4              ;REQUESTS APPLIANCE WE SCHEDULES
0498 E 00                      GETI   SCDRST
0499 E 00                      GETI   MXA_00            ;A004  NO REPEAT
049A E 9200                    MOV    LST_KEY,XA        ;A004  FOR WKEND
049C E 00                      GETI   SEL1
049D E 8400                    CLR1   ST5_FW            ;CLEAR FLASH WD/WE
049F E 8400                    CLR1   WEEKDAY           ;CLEAR WEEKDAY RDK 11-12-87
04A1 E 8500                    SET1   WEEKEND
04A3   EE                      RET
04A4   9A21           APWE2:   SKE    X,#2
04A6 R AB04C7                  BR     APWE3
04A9   9A39                    MOV    X,#3
04AB E 00                      GETI   MVSTXA
04AC E 00                      GETI   MXA_A0            ;UPDATES AND
04AD E 00                      GETI   SCDRST
04AE E 00                      GETI   CLRSCR
04AF E A300                    MOV    A,APPNUM          ;REQUESTS APPLIANCE WE SCHEDULES
04B1   67                      ADDS   A,#7
04B2   9A49                    MOV    X,#4
04B4 E 00                      GETI   SCDRST
04B5 E 8B00                    MOV    HL,#N1
04B7   9A09                    MOV    X,#0              ;PUT APPNUM INTO FAR RIGHT LCD SEGMENT
04B9 E A300                    MOV    A,APPNUM
04BB E AB4000                  CALL   !DSPSEG
04BE E 00                      GETI   SEL1
04BF E 00                      GETI   MXA_01            ;INITIALIZE COUNTER
04C0 E 9200                    MOV    PM_PRD,XA
04C2 E 8500                    SET1   APPL              ;SET APPLIANCE INDICATOR 11/18 RDK
04C4 E 8500                    SET1   WEEKEND
04C6   EE                      RET
04C7   9A31           APWE3:   SKE    X,#3
04C9   EE                      RET                      ;DISPLAYS SCHEDULE FOR APPLIANCE
04CA E AB4000                  CALL   !NXTPRD           ;AND GOES TO NEXT PERIOD
04CD   EE                      RET
04CE   9A64           C6R2S3:  SKE    E,#6              ;......................
```

```
04D0    EE              RET
04D1 E 8500             SET1    ST3_BS          ;TURN ON BEEP
04D3    9A11            SKE     X,#1            ;>>>>> WEEKDAY KEY <<<<<<<<
04D5 R AB04EC           BR      APWD2
04D8    9A29            MOV     X,#2
04DA E 00               GETI    MUSTXA
04DB E A300             MOV     A,APPNUM
04DD    C8              DECS    A
04DE    9A49            MOV     X,#4            ;REQUESTS APPLIANCE WD SCHEDULES
04E0 E 00               GETI    SCDRST
04E1 E 00               GETI    MXA_00          ;A004  NO REPEAT
04E2 E 9200             MOV     LST_KEY,XA      ;A004  FOR WKDAY
04E4 E 00               GETI    SEL1
04E5 E 8400             CLR1    ST5_FW          ;CLEAR FLASH WD/WE
04E7 E 8400             CLR1    WEEKEND         ;CLEAR WEEKEND RDK 11-12-87
04E9 E 8500             SET1    WEEKDAY
04EB    EE              RET
04EC    9A21    APWD2:  SKE     X,#2
04EE    04              BR      APWD3           ;DISPLAYS SCHEDULE FOR APPLIANCE
04EF E AB4000           CALL    !NXTPRD         ;AND GOES TO NEXT PERIOD
04F2    EE              RET
04F3    9A31    APWD3:  SKE     X,#3
04F5    EE              RET
04F6    9A29            MOV     X,#2
04F8 E 00               GETI    MUSTXA
04F9 E 00               GETI    MXA_A0
04FA E 00               GETI    SCDRST          ;UPDATES AND
04FB E 00               GETI    CLRSCR
04FC    9A49            MOV     X,#4            ;REQUESTS APPLIANCE WD SCHEDULES
04FE E A300             MOV     A,APPNUM
0500    C8              DECS    A
0501 E 00               GETI    SCDRST
0502 E 8B00             MOV     HL,#N1
0504    9A09            MOV     X,#0            ;PUT APPNUM INTO FAR RIGHT LCD SEGMENT
0506 E A300             MOV     A,APPNUM
0508 E AB4000           CALL    !DSPSEG
050B E 00               GETI    SEL1
050C E 00               GETI    MXA_01          ;INITIALIZE COUNTER
050D E 9200             MOV     PN_PRD,XA
050F E 8500             SET1    APPL            ;SET APPLIANCE INDICATOR 11/18 RDK
0511 E 8500             SET1    WEEKDAY
0513    EE              RET
                        ;                       ROW 3
0514    9A24    CCR3S3: SKE     E,#2            ;............................
0516    0E              BR      C3R3S3
0517 E 8500             SET1    ST3_BS          ;TURN ON BEEP
0519    9A11            SKE     X,#1            ;>>>>>> RETURN KEY <<<<<<<<
051B    01              BR      UPDST3          ;CHECK TO SEE IF UPDATE
051C    02              BR      CLSST3
051D E 00       UPDST3: GETI    MXA_A0          ;IS NECCESSARY
051E E 00               GETI    SCDRST
051F E 00       CLSST3: GETI    CLRSCR
0520 E 00               GETI    MXA_00
0521 E 00               GETI    MUSTXA
0522 E 8400             CLR1    TSB6T           ;TURN OFF TIMER
0524    EE              RET
0525    9A34    C3R3S3: SKE     E,#3            ;............................
0527    06              BR      C4R3S3
```

```
0528   9A11               SKE    X,#1        ;>>>>> MOVE RIGHT KEY <<<<<
052A E AB4000             CALL   !MRIGHT     ;IF KEY INVALID IN STATE
052D   EE                 RET                ;THEN RETURN
052E   9A44      C4R3S3:  SKE    E,#4        ;...........................
0530   06                 BR     C5R3S3
0531   9A11               SKE    X,#1        ;>>>>> MOVE LEFT KEY <<<<<<
0533 E AB4000             CALL   !MLEFT      ;IF KEY INVALID IN STATE
0536   EE                 RET                ;THEN RETURN
0537   9A54      C5R3S3:  SKE    E,#5        ;...........................
0539   06                 BR     C6R3S3
053A   9A11               SKE    X,#1        ;>>>>>>>> MIN KEY <<<<<<<<
053C E AB4000             CALL   !IMINS      ;IF KEY INVALID IN STATE
053F   EE                 RET                ;THEN RETURN
0540   9A64      C6R3S3:  SKE    E,#6        ;...........................
0542   06                 BR     C7R3S3
0543   9A11               SKE    X,#1        ;>>>>>>> HOUR KEY <<<<<<<<
0545 E AB4000             CALL   !IHOURS     ;IF KEY INVALID IN STATE
0548   EE                 RET                ;THEN RETURN
0549   9A74      C7R3S3:  SKE    E,#7        ;............................
054B   EE                 RET                ;DATA FROM CONTROLLER IS IN PMI BUFFER
054C E AB4000             CALL   !MSGCTR     ;DISPLAY SCHEDULE AND RETURN
054F             RETST3:                     ;REMOVED ALL BR RETST3 TO SAVE BYTES
054F   EE                 RET
                          ;
                 ;****************************************************************
                 ;                                                               *
                 ;        CONST4: STATE 4 - BILL INFORMATION                     *
                 ;                                                               *
                 ;        SUBSTATES: NONE                                        *
                 ;                                                               *
                 ;****************************************************************
                 ;
     R (0550)    CONST4   EQU    $
0550 E 00                 GETI   STMBE
0551 E 00                 GETI   SELO
                          ;CHECK FOR ROW NUMBER
0552   9A25               SKE    D,#2        ;...........................
0554   09                 BR     RW3ST4
0555   9A24               SKE    E,#2        ;>>>> BILL INFO KEY <<<<<<<
0557   06                 BR     RW3ST4
0558 E 8500               SET1   ST3_BS      ;TURN ON BEEP
055A E AB4000             CALL   !BILINF
055D   EE                 RET
055E   9A35      RW3ST4:  SKE    D,#3        ;ROW 3
0560 R AB0575             BR     RW1ST4
0563   9A24               SKE    E,#2        ;............................
0565   08                 BR     C7R3S4      ;>>>>>>> RETURN KEY <<<<<<<
0566 E 8500               SET1   ST3_BS      ;TURN ON BEEP
0568 E 00                 GETI   MXA_00
0569 E 00                 GETI   MVSTXA
056A E 00                 GETI   CLRSCR
056B E 8400               CLR1   TSB6T       ;TURN OFF TIMER
056D   EE                 RET
056E   9A74      C7R3S4:  SKE    E,#7        ;............................
0570   EE                 RET                ;DATA FROM CONTROLLER IS IN PMI BUFFER
0571 E AB4000             CALL   !BILINF     ;DISPLAY SCHEDULE AND RETURN
0574   EE                 RET
0575   9A15      RW1ST4:  SKE    D,#1        ;ROW 1
```

```
0577   EE                 RET
0578   9A34       CCR1S4: SKE     E,#3          ;..........................
057A   06                 BR      C4R1S4
057B E 8500               SET1    ST3_BS        ;TURN ON BEEP
057D E AB4000             CALL    !INTAPP       ;>>>>> APPLIANCE KEY <<<<<<
0580   EE                 RET
0581   9A44       C4R1S4: SKE     E,#4          ;..........................
0583 R AB0597             BR      C5R1S4
0586 E 8600               SKF     NO_EHW        ;A004    AJB
0588   EE                 RET                   ;NO EHW SO SKIP!  8/04/88
0589   8912               MOV     XA,#12H       ;>>>> HEAT WATER KEY <<<<<<
058B E 00                 GETI    MUSTXA
058C E 8500               SET1    ST3_BS        ;TURN ON BEEP
058E E 00                 GETI    CLRSCR          ;CLEAR SCREEN
058F E 00                 GETI    SEL1
0590 E 8500               SET1    HTWATER       ;TURN ON HEAT WATER INDICATOR
0592 E 8500               SET1    SETNG         ;TURN ON SETTING INDICATOR
0594 E 8500               SET1    ST5_FW        ;FLASH WEEKDAY/WEEKEND
0596   EE                 RET
0597   9A54       C5R1S4: SKE     E,#5          ;..........................
0599   0C                 BR      C6R1S4
059A   8941               MOV     XA,#41H       ;>>>>>>>> COOL KEY <<<<<<<<<
059C E 00                 GETI    MUSTXA
059D E 8500               SET1    ST3_BS        ;TURN ON BEEP
059F E 00                 GETI    CLRSCR
05A0 E 00                 GETI    SEL1
05A1 E 8500               SET1    CSETNG
05A3 E 8500               SET1    ST5_FW        ;FLASH WEEKDAY/WEEKEND
05A5   EE                 RET
05A6   9A64       C6R1S4: SKE     E,#6          ;..........................
05A8   EE                 RET
05A9   8911               MOV     XA,#11H       ;>>>>>>>> HEAT KEY <<<<<<<<<
05AB E 00                 GETI    MUSTXA
05AC E 8500               SET1    ST3_BS        ;TURN ON BEEP
05AE E 00                 GETI    CLRSCR          ;CLEAR SCREEN
05AF E 00                 GETI    SEL1
05B0 E 8500               SET1    HSETNG        ;TURN ON HEAT SETTING INDICATOR
05B2 E 8500               SET1    ST5_FW        ;FLASH WEEKDAY/WEEKEND
05B4              RETST4:                       ;REMOVED ALL BR RETST4 TO SAVE BYTES
05B4   EE                 RET
                          ;
                  ;*****************************************************************
                  ;                                                               *
                  ;       CONST5: STATE 5 - TEMPORARY OVERRIDE (2 SECOND TIME OUT)*
                  ;                                                               *
                  ;       SUBSTATES: NONE                                         *
                  ;                                                               *
                  ;*****************************************************************
                  ;
     R (05B5)     CONST5  EQU     $
05B5 E 00                 GETI    STMBE
05B6 E 00                 GETI    SEL0
05B7   8920               MOV     XA,#20H       ;SET TIMEOUT TO 1 SECOND
05B9 E 9200               MOV     TSB6TM,XA     ; FOR THIS STATE
05BB   70                 MOV     A,#0
05BC E 9300               MOV     TSB6RP,A
                          ;CHECK FOR ROW NUMBER
05BE   9A15               SKE     D,#1          ;..........................
```

```
05C0   09                    BR     RW3ST5
05C1   9A14                  SKE    E,#1          ;>>>>>> UP TEMP KEY <<<<<<<
05C3 R AB05E0                BR     RW2ST5
05C6 E AB4000                CALL   !UPSTPT       ;TURN ON BEEP IN SUBROUTINE
05C9   EE                    RET
05CA   9A35         RW3ST5:  SKE    D,#3          ;...........................
05CC R AB05E0                BR     RW2ST5
05CF   9A24                  SKE    E,#2          ;NO BEEP (NOT A VALID KEY,ONLY FOR TIMEOUT)
05D1   0E                    BR     RW2ST5        ;>>>>>>> RETURN KEY <<<<<<<
05D2 E 00           S5XIT:   GETI   MXA_00        ;A004 8/8/88
05D3 E 00                    GETI   MVSTXA
05D4 E 00                    GETI   SEL1
05D5 E 9200                  MOV    PM_PNT,XA
05D7 E 9200                  MOV    PM_PRD,XA
05D9   8970                  MOV    XA,#70H       ;SEND OUT TEMP OVERRIDE MSG
05DB E 00                    GETI   SCDRST
05DC E 00                    GETI   SEL0
05DD E 8400                  CLR1   TSB6T         ;TURN OFF TIMER
05DF   EE                    RET
05E0   9A25         RW2ST5:  SKE    D,#2          ;...........................
05E2 R AB05D2                BR     S5XIT         ;IF NOT ROW 2 THEN RETURN!!!A004
05E5   9A14                  SKE    E,#1          ;>>>>>>> DOWN TEMP KEY <<<<<
05E7   04                    BR     C3R2S5
05E8 E AB4000                CALL   !DNSTPT
05EB   EE                    RET
05EC   9A34         C3R2S5:  SKE    E,#3          ;...........................
05EE R AB05D2                BR     S5XIT         ;IF INVALID CLEAN UP A004 8/8/88
05F1 E 00                    GETI   MXA_00        ;>>>>> HOLD TEMP KEY <<<<<<
05F2 E 00                    GETI   SEL0
05F3 E 00                    GETI   MVSTXA
05F4 E 8600                  SKF    ST0_LC        ;check for load control
05F6 R AB0169                BR     LCERR         ;invalid if load control
05F9 E AB4000                CALL   !MODOFF       ;A004  IF MODE IS OFF RETURN
05FC   EE                    RET                  ;A004    RETURN!!! 8/4/88
05FD E 8500                  SET1   ST3_BS        ;TURN ON BEEP
05FF   8971                  MOV    XA,#71H
0601 E 00                    GETI   SCDRST
                    ;        CLR1   TSB6T         ;TURN OFF TIMER
0602 E 00                    GETI   MXA_00        ;A004  NO REPEAT
0603 E 9200                  MOV    LST_KEY,XA    ;A004  FOR HOLD
0605 E 8400                  CLR1   CNT_ZZ        ;DON'T LET IT UPDATE   A004 8/8/88
0607 E 8700                  SKT    ST1_TH
0609   03                    BR     S5HLD
060A E 8400                  CLR1   ST1_TH        ;OFF IF IT IS ON NOW!!
060C   EE                    RET
060D E 8500         S5HLD:   SET1   ST1_TH        ;TURN ON HOLD STATUS
060F   EE                    RET                  ;REMOVED BR RETST5 TO SAVE BYTES
                             ;
                    ;*****************************************************************
                    ;                                                                *
                    ;        CONST6: STATE 6 - CONFIGURE SEQUENCE                    *
                    ;                                                                *
                    ;        IF A KEY IS PUT IN OUT OF SEQUENCE PMI WILL             *
                    ;           RETURN TO THE NORMAL STATE.                          *
                    ;                                                                *
                    ;        SUBSTATES: LEFT(06) -> HOUR(16) ->                      *
                    ;                   RIGHT(26) -> MIN(36) ->                      *
```

```
                       ;                  RETURN(07) -> CONFIGURATION MODE         *
                       ;                                                           *
                       ;                                                           *
                       ;************************************************************
                       ;
          R (0610)     CONST6  EQU    $
     0610 E 00                 GETI   CLMBE
     0611   9A31               SKE    X,#3         ;..........................
     0613 R AB062A             BR     SST2_6
     0616   9A35               SKE    D,#3
     0618 R AB0663             BR     INVKEY
     061B   9A24               SKE    E,#2         ;>>>>>> RETURN KEY <<<<<<<<
     061D R AB0663             BR     INVKEY
     0620 E 8500               SET1   ST3_BS       ;TURN ON BEEP
     0622   8907               MOV    XA,#07H
     0624 E 00                 GETI   MVSTXA
     0625 E 00                 GETI   CLRSCR         ;CLEAR SCREEN RDK 11-12-87
     0626   8950               MOV    XA,#50H
     0628 E 00                 GETI   SCDRST       ;REQUEST CONFIG SCREEN
     0629   EE                 RET
     062A   9A21       SST2_6: SKE    X,#2         ;..........................
     062C R AB063F             BR     SST1_6
     062F   9A35               SKE    D,#3
     0631 R AB0663             BR     INVKEY
     0634   9A54               SKE    E,#5         ;>>>>>>> MIN KEY <<<<<<<<<<
     0636 R AB0663             BR     INVKEY
     0639 E 8500               SET1   ST3_BS       ;TURN ON BEEP
     063B   8936               MOV    XA,#36H
     063D E 00                 GETI   MVSTXA
     063E   EE                 RET
     063F   9A11       SST1_6: SKE    X,#1         ;..........................
     0641 R AB0654             BR     SST0_6
     0644   9A35               SKE    D,#3
     0646 R AB0663             BR     INVKEY
     0649   9A34               SKE    E,#3         ;>>>>> MOVE RIGHT KEY <<<<<
     064B R AB0663             BR     INVKEY
     064E E 8500               SET1   ST3_BS       ;TURN ON BEEP
     0650   8926               MOV    XA,#26H
     0652 E 00                 GETI   MVSTXA
     0653   EE                 RET
     0654   9A01       SST0_6: SKE    X,#0         ;..........................
     0656   0C                 BR     INVKEY
     0657   9A35               SKE    D,#3
     0659   09                 BR     INVKEY
     065A   9A64               SKE    E,#6         ;>>>>>>>>> HOUR KEY <<<<<<<<
     065C   06                 BR     INVKEY
     065D E 8500               SET1   ST3_BS       ;TURN ON BEEP
     065F   8916               MOV    XA,#16H
     0661 E 00                 GETI   MVSTXA
     0662   EE                 RET
     0663 E 00         INVKEY: GETI   MXA_00
     0664 E 00                 GETI   MVSTXA
     0665   EE                 RET
                               ;
                       ;************************************************************
                       ;                                                           *
                       ;       CONST7: STATE 7 - CONFIGURATION MODE                *
                       ;                                                           *
```

```
                          ;      SUBSTATES: NONE                                        *
                          ;                                                             *
                          ;*************************************************************
                          ;
      R (0666)            CONST7  EQU    $
 0666 E 00                        GETI   STMBE
 0667 E 00                        GETI   SEL0
 0668 E 00                        GETI   MXA_00          ;A004  NO REPEAT
 0669 E 9200                      MOV    LST_KEY,XA      ;A004  FOR CONFIG
 066B   9A15                      SKE    D,#1            ;..........................
 066D   09                        BR     RW2ST7
 066E   9A14                      SKE    E,#1            ;IF ROW 1 THEN
 0670   06                        BR     RW2ST7          ;>>>>>> UP TEMP KEY <<<<<<
 0671 E 8500                      SET1   ST3_BS          ;BEEP
 0673 E AB4000                    CALL   !UPCON
 0676   EE                        RET
 0677   9A25              RW2ST7: SKE    D,#2            ;...........................
 0679   09                        BR     RW3ST7
 067A   9A14                      SKE    E,#1            ;>>>>>> DOWN TEMP KEY <<<<<
 067C   06                        BR     RW3ST7
 067D E 8500                      SET1   ST3_BS          ;BEEP
 067F E AB4000                    CALL   !DNCON
 0682   EE                        RET
 0683   9A35              RW3ST7: SKE    D,#3            ;...........................
 0685   EE                        RET
 0686   9A24                      SKE    E,#2
 0688 R AB069E                    BR     C3R3S7
 068B E 8500                      SET1   ST3_BS          ;BEEP
 068D E 00                        GETI   MXA_A0          ;>>>>>> RETURN KEY <<<<<<<<
 068E E 00                        GETI   SCDRST         ;UPDATE AND
 068F E 00                        GETI   CLRSCR            ;CLEAR SCREEN
 0690 E 00                        GETI   CLMBE           ;FORCE MB15 RDK 11-12-87
 0691   BED6                      SKF    PORT6.1         ;IS CONFIG LOW(ENABLED)
 0693   05                        BR     ST7NOC          ;NO
 0694   71                        MOV    A,#1            ;YES, START SELF-TEST
 0695 E 9301                      MOV    TSB8PA+1,A      ;PUT 1 IN HIGH NIBBLE RDK 11-12-87
 0697 E 8500                      SET1   TSB8S           ;SCHEDULE IT
 0699 E 00                ST7NOC: GETI   MXA_00
 069A E 00                        GETI   NUSTXA          ;RETURN TO NORMAL STATE
 069B E 8400                      CLR1   TSB6T           ;TURN OFF TIMER
 069D   EE                        RET
 069E   9A34              C3R3S7: SKE    E,#3            ;............................
 06A0 R AB06BC                    BR     C4R3S7          ;>>>>> MOVE RIGHT KEY <<<<<
                                ;RIGHT CONFIG
 06A3 E 8500                      SET1   ST3_BS          ;BEEP
 06A5 E 00                        GETI   SEL1
 06A6 E A200                      MOV    XA,PM_PNT
 06A8   C0                        INCS   A
 06A9   9A60                      SKE    A,#6            ;PAST 5?
 06AB   05                        BR     ST7G0           ;NO
 06AC E 00                        GETI   CLMBE           ;    FORCE MB15  RDK  11-12-87
 06AD   BFD6                      SKT    PORT6.1         ;YES,CHECK FOR NO INSTALLER CONFIG
 06AF   05                        BR     ST7G01
 06B0   03                        BR     ST7NIC
 06B1   9AC0              ST7G0:  SKE    A,#12           ;PAST 11?
 06B3   01                        BR     ST7G01          ;NO
 06B4 E 00                ST7NIC: GETI   MXA_01          ;YES
 06B5 E 00                ST7G01: GETI   STMBE           ;RESTORE TO MB1 RDK 11-12-87
```

```
1269 06B6 E 9200                 MOV    PM_PNT,XA      ;STOREIT
1270 06B8 E AB4000               CALL   !CONFIG
1271 06BB   EE                   RET
1272 06BC   9A44         C4R3S7: SKE    E,#4           ;............................
1273 06BE R AB06D8               BR     C7R3S7         ;>>>>> MOVE LEFT KEY <<<<<<
1274                           ;LEFT CONFIG
1275 06C1 E 8500                 SET1   ST3_BS         ;BEEP
1276 06C3 E 00                   GETI   SEL1
1277 06C4 E A200                 MOV    XA,PM_PNT
1278 06C6   C8                   DECS   A
1279 06C7   9A00                 SKE    A,#0           ;IS IT 0?
1280 06C9   08                   BR     ST7LF
1281 06CA E 00                   GETI   CLMBE          ;FORCE MB15 RDK 11-12-87
1282 06CB   BFD6                 SKT    PORT6.1        ;NO INSTALLER CONFIG?
1283 06CD   890B                 MOV    XA,#11
1284 06CF   8905                 MOV    XA,#5          ;STRING OR VERTICAL INSTRUCTIONS
1285 06D1 E 00                   GETI   STMBE
1286 06D2 E 9200         ST7LF:  MOV    PM_PNT,XA      ;STORE IT
1287 06D4 E AB4000               CALL   !CONFIG
1288 06D7   EE                   RET
1289 06D8   9A74         C7R3S7: SKE    E,#7           ;..............................
1290 06DA   EE                   RET                   ;DATA FROM CONTROLLER IS IN PMI BUFFER
1291 06DB E AB4000               CALL   !CONFIG        ;DISPLAY SCHEDULE AND RETURN
1292 06DE                RETST7:                       ;CHANGED  BR RETST7 TO RET TO SAVE BYTES
1293 06DE   EE                   RET                   ;THEN RETURN
1294                             ;
1295                             END

TARGET CHIP : UPD75308
STACK SIZE = 0000H

ASSEMBLY COMPLETE,  NO ERROR FOUND

  ** DISSUBS-AJB                                   **

COMMAND     :                    (COMMAND FILE :          )
DISSUBS.ASM MOD=308

 STNO ADRS R OBJECT   IC MAC   SOURCE STATEMENT

   1                           $      TITLE='DISSUBS-AJB'
   2                           ;(*-------------------------------------------------------------
   3                           ;(c) Copyright, Johnson Controls Incorporated, 1987.  All rights
   4                           ;   reserved. The following program is the exclusive property of
   5                           ;   Johnson Controls, Inc. and its use is restricted by license
   6                           ;   agreement to the system with which it was furnished.  The
   7                           ;   program contents are confidential and may not be disclosed
   8                           ;   or used outside the system without the express written
   9                           ;   consent of Johnson Controls.  This program is further
  10                           ;   protected by federal copyright law as an unpublished work
  11                           ;   and any unauthorized reproduction is prohibited.
  12                           ; 1. PURPOSE:
  13                           ;     DISSUBS  is the subroutine module for the COMPMI task.
  14                           ;        It contains the subroutines used in the state table.
  15                           ;
  16                           ; 2. INPUTS:
  17                           ;     none
  18                           ; 3. GLOBAL VARIABLES:
```

```
                ;     None
                ; 4. OUTPUTS:
                ;     None
                ; 5. PROCEDURES CALLED:
                ;
                ; 6. EXCEPTIONS:
                ;     None
                ; 7. UNIQUE FEATURES:
                ;     None
                ; 8. HISTORY
                ;     ORIGINAL - 10/19/87 - Rick D. Kieferndorf Rev A000
                ;     REVISION - 12/10/87 - Alan J. Bronikowski Rev A000.4
                ;     REVISION - 03/24/88 - Alan J. Bronikowski Rev A002
                ;                           added CNT_ZZ to UPSTPT/DNSTPT to
                ;                           fix problem 60
                ;     REVISION - 05/18/88 - Alan J. Bronikowski Rev A003
                ;                           added code in UPCON/DNCON to check
                ;                           for HPR=0 and setting NO_EHW
                ;                           ALSO changed TEMPUP/DN & IHOUR/IMIN
                ;                           for only 1st beep!
                ;     REVISION - 08/04/88 - Alan J. Bronikowski Rev A004
                ;                           added module MODOFF, to check if
                ;                           the HEAT/COOL mode switch is off
                ;                           it does a RET if true;
                ;                           a RETS if false.
                ;     REVISION - 08/05/88 - Alan J. Bronikowski Rev A004
                ;                           MXTPRD set PM_PNT to 1 fix 3 tier prob.
                ;     REVISION - 08/15/88 - Alan J. Bronikowski Rev A004
                ;                           FIXED BILINF for 4 tier problem, #70
                ;-------------------------------------------------------------*)
                        NAME    DISSUBS         ;main routine of thermostat
                        EXTRN CODE(INITBLK,SEL0,SEL1,SEL15,INCSHL,DSPSEG,SUBSXD)
                        EXTRN CODE(DISHRS,DSD2SG,MULT8,ADDBYT,STMBE,CLMBE)
                        EXTRN CODE(MXA@HL,MUSTXA,XCXADE,SCDRST,DINCSHL,CLRSCR)
                        EXTRN CODE(MXA_O0,MXA_A0,MUXAHL,MXA_01)
                        EXTRN DATA(FLASH1,FLASH2,REST1,REST2,SETPNT,PM_PRD,PM_PNT)
                        EXTRN DATA(TSB6TM,TSB6RP,STATE,PMIBUF,MULTA,MULTB,APPNUM)
                        EXTRN DATA(TSB2PA,FMCQUE,M1,M3,M4,M5,M7,M9,M11,M12,OPT_CNT)
                        EXTRN DATA(TSB5TM,RPT_TIM,LST_KEY)
                        EXTRN BIT(MORN,DAY,EVE,NIGHT,PRICE,LLOW,TIME,MEDIUM,WEEKDAY)
                        EXTRN BIT(CRIT,COLON1,LHIGH,BEGIN,LEND,TO,COLON2,COLON3)
                        EXTRN BIT(ST5_FW,TSB2S,TSB2T,ST3_BS,ST1_PT,DP2,LDOLR,KWH)
                        EXTRN BIT(PM2,PM3,AM2,AM3,DEGC,DEGF,APPL,ST3_CL,ST3_C,MA)
                        EXTRN BIT(KEY_HLD,CNT_ZZ,ERR_TON,NO_EHW,SW1_HT,SW1_CL)
                        PUBLIC  CLS,CLM,BILINF,UPSTPT,MXTPRD,INTAPP
                        PUBLIC  DNSTPT,OPTIM,SCDREQ,UPCON,DNCON
                        PUBLIC  IHOURS,IMINS,MLEFT,MSGCTR
                        PUBLIC  MRIGHT,TEMPUP,TEMPDN,MXTAPP,MODOFF
                DSUBS   CSEG    XBLOCK
                ;***************************************************************
                ;                                                              *
                ;   CLS: THIS SUBROUTINE CLEARS THE LCD SCREEN,                *
                ;        THE FLASH FLAGS AND THE CHARACTER BUFFERS             *
                ;                                                              *
                ;***************************************************************
     R (0000)   CLS     EQU     $
0000   49               PUSH    XA
0001   4B               PUSH    HL
```

```
0002   4D                 PUSH   DE
0003   9907               PUSH   BS
0005 E 00                 GETI   STMBE
0006 E 00                 GETI   SELO
               ;REM       CLR1   KEY_HLD        ;12/10
0007 E 00                 GETI   SEL1
0008 E 00                 GETI   MXA_00
0009 E 9200               MOV    PM_PRD,XA      ;RESET VARIABLES
000B E 9200               MOV    PM_PNT,XA
000D E 9200               MOV    FLASH1,XA
000F E 9200               MOV    FLASH2,XA
0011 E 9200               MOV    REST1,XA
0013 E 9200               MOV    REST2,XA
0015 E 8400               CLR1   ST5_FW         ;TURN OFF FLASH WD/WE FLAG
0017   8D20               MOV    DE,#32         ;TURN OFF ALL LCD SEGMENTS
0019   8BE0               MOV    HL,#0E0H
001B   70                 MOV    A,#0
001C E AB4000             CALL   !INITBLK
001F   9906               POP    BS
0021   4C                 POP    DE
0022   4A                 POP    HL
0023   48                 POP    XA
0024   EE                 RET
                          ;
               ;*****************************************************************
               ;                                                                *
               ;    SCDREQ: THIS SUBROUTINE SENDS REQUESTS FOR SCHEDULES        *
               ;            TO THE FMCMSG QUE AND SCHEDULES FMCMSG IF           *
               ;            NECCESSARY.                                         *
               ;                                                                *
               ;        INPUT - XA CONTAINS THE MESSAGE TYPE                    *
               ;                                                                *
               ;        OUTPUT - MESSAGE ON THE FMCQUE                          *
               ;                                                                *
               ;*****************************************************************
     R (0025)  SCDREQ EQU    $
0025   9907               PUSH   BS
0027   4D                 PUSH   DE
0028   4B                 PUSH   HL
0029   49                 PUSH   XA
002A E 00                 GETI   CLMBE
002B   AA44               XCH    XA,DE
002D   8B05               MOV    HL,#05H
002F   71                 MOV    A,#1
0030   A8                 SUBS   A,@HL
0031   04                 BR     SCDGO
0032   76                 MOV    A,#6           ;GREATER THAN 1
0033   A8                 SUBS   A,@HL
0034 E 8500               SET1   KEY_HLD        ;& <7 SET KEY_HLD
0036   9A0C    SCDGO:     MOV    E,#0           ;INITIALIZE COUNTER
0038 E 8B00               MOV    HL,#FMCQUE     ;SET HL TO POINT TO FMCQUE
003A E 00      SCDCON:    GETI   MXA@HL         ;CHECK IF THERE IS ANYTHING
003C   9A01               SKE    X,#0           ;IN QUE
003D   07                 BR     SCDR1
003E   9A00               SKE    A,#0
0040   04                 BR     SCDR1
0041   48                 POP    XA             ;EMPTY BYTE FOUND
0042   AA10               MOV    @HL,XA         ;PUT REQUEST ON STACK
```

```
0044   06                 BR     SCDR2
0045 E 00         SCDR1:  GETI   DINCSHL      ;STACK LOCATION FILLED
                                              ;GO TO NEXT BYTE
0046   C4                 INCS   E            ;INCREMENT COUNTER
0047   9A84               SKE    E,#8         ;IF PAST EIGHTH BYTE THEN STACK FULL
0049   F0                 BR     SCDCON       ;ELSE CHECK IF LOCATION IS FILLED
004A   48                 POP    XA           ;STACK IS FULL SO WHAT!!!
004B E 8600       SCDR2:  SKF    TSB2T        ;IF TIMER IS RUNNING
004D   05                 BR     SCDEXT       ;THEN EXIT
004E E 8600               SKF    TSB2S        ;IF FMCMSG IS SCHEDULED
0050   02                 BR     SCDEXT       ;THEN EXIT
0051 E 8500               SET1   TSB2S        ;ELSE SCHEDULE FMCMSG
0053              SCDEXT:
0053   4A                 POP    HL
0054   4C                 POP    DE
0055   9906               POP    BS
0057   EE                 RET
                          ;
                  ;*******************************************************************
                  ;                                                                  *
                  ;    CLN:THIS SUBROUTINE WILL CLEAR THE NUMBERS                    *
                  ;        FROM THE LCD WHEN THE NEXT PERIOD IS                      *
                  ;        CALLED UP.                                                *
                  ;                                                                  *
                  ;*******************************************************************
     R (0058)     CLN     EQU    $
0058   4B                 PUSH   HL
0059   49                 PUSH   XA
005A   4F                 PUSH   BC
005B   9907               PUSH   BS
005D E 00                 GETI   STMBE
005E E 00                 GETI   SEL1
005F E 8400               CLR1   COLON2
0061 E 8400               CLR1   COLON3
0063 E 8400               CLR1   PM2
0065 E 8400               CLR1   PM3
0067 E 8400               CLR1   AM2
0069 E 8400               CLR1   AM3
006B E 00                 GETI   MXA_00
006C E 9200               MOV    FLASH1,XA    ;RESET VARIABLES 11/18/87 RDK
006E E 9200               MOV    FLASH2,XA
0070 E 9200               MOV    REST1,XA
0072 E 9200               MOV    REST2,XA
0074 E 8B00               MOV    HL,#N1
0076   890A               MOV    XA,#10       ;11/4 AJB
0078   9A1E               MOV    C,#1         ;COUNTER
007A E AB4000     CLNGO:  CALL   !DSPSEG
007D   9AC6               SKE    C,#0CH       ;IF C = 12 THEN DONE
007F   01                 BR     CLNCON
0080   03                 BR     CNEXIT
0081   C6         CLNCON: INCS   C
0082 E 00                 GETI   DINCSHL
0083   F6                 BR     CLNGO
0084   9906       CNEXIT: POP    BS
0086   4E                 POP    BC
0087   48                 POP    XA
0088   4A                 POP    HL
0089   EE                 RET
```

```
                                ;
                                ;*******************************************************************
                                ;                                                                  *
                                ;  UPSTPT:THIS SUBROUTINE INCREMENTS THE SET POINT AND SETS        *
                                ;         UP THE TIMER FOR 1 SECOND TIME OUT.                      *
                                ;                                                                  *
                                ;  DNSTPT:THIS SUBROUTINE DECREMENTS THE SET POINT AND ALSO        *
                                ;         SETS UP THE TIMER FOR 1 SECOND TIME OUT.                 *
                                ;                                                                  *
                                ;       INPUT - SETPNT,PM_PRD                                      *
                                ;                                                                  *
                                ;       OUTPUT - NEW SETPNT                                        *
                                ;                                                                  *
                                ;*******************************************************************
       R (008A)                 UPSTPT  EQU     $
 008A    49                             PUSH    XA
 008B    9907                           PUSH    BS
 008D E  00                             GETI    STMBE
 008E E  00                             GETI    SEL1
 008F E  A200                           MOV     XA,PM_PRD       ;CHECK COUNTER
 0091    9A00                           SKE     A,#0            ;IF A IS ZERO
 0093    07                             BR      STPNB1
 0094 E  00                             GETI    SEL0
 0095 E  8500                           SET1    ST3_BS          ;THEN BEEP FIRST TIME AND
 0097    C0                             INCS    A               ;INCREMENT COUNTER TO ONE
 0098 E  00                             GETI    SEL1
 0099 E  9200                           MOV     PM_PRD,XA       ;SAVE NEW COUNTER VALUE
 009B E  00                     STPNB1: GETI    SEL0
 009C E  A200                           MOV     XA,SETPNT       ;PUT SETPOINT INTO XA
 009E    C0                             INCS    A               ;INCREMENT THE ONES DIGIT
 009F    9AA0                           SKE     A,#0AH          ;IF A AT 10
 00A1 R  AB00F0                         BR      STPXIT
 00A4    70                             MOV     A,#0            ;THEN SET IT TO ZERO
 00A5    C1                             INCS    X               ;AND INCREMENT X
 00A6 E  8600                           SKF     ST3_C
 00A8    0A                             BR      STPDC           ;DEG C
 00A9    9AA1                           SKE     X,#0AH          ;IF SETPOINT AT 99 F
 00AB R  AB00F0                         BR      STPXIT
 00AE    9A59                           MOV     X,#5            ;THEN WRAP AROUND TO 50 F
 00B0 R  AB00F0                         BR      STPXIT
 00B3    9A41                   STPDC:  SKE     X,#4            ;39C =  99F ALMOST
 00B5 R  AB00F0                         BR      STPXIT
 00B8    9A19                           MOV     X,#1            ;10C = 50F
 00BA R  AB00F0                         BR      STPXIT
 00BD                           DNSTPT:
 00BD    49                             PUSH    XA
 00BE    9907                           PUSH    BS
 00C0 E  00                             GETI    STMBE
 00C1 E  00                             GETI    SEL1
 00C2 E  A200                           MOV     XA,PM_PNT       ;NEED SEPARATE COUNTERS
                                                                ;FOR UP&DN 11-16-87 RDK
 00C4    9A00                           SKE     A,#0            ;CHECK COUNTER, IF A IS ZERO
 00C6    07                             BR      STPNB2
 00C7 E  00                             GETI    SEL0
 00C8 E  8500                           SET1    ST3_BS          ;THEN BEEP FIRST TIME AND
 00CA    C0                             INCS    A               ;INCREMENT COUNTER TO ONE
 00CB E  00                             GETI    SEL1
 00CC E  9200                           MOV     PM_PNT,XA       ;SAVE NEW COUNTER VALUE
```

```
0OCE E 00             STPNB2: GETI   SEL0
00CF E A200                   MOV    XA,SETPNT      ;PUT SETPOINT INTO XA
00D1   C8                     DECS   A              ;DECREMENT THE ONES DIGIT
00D2 R AB00F0                 BR     STPXIT         ;IF A SKIPS
00D5   79                     MOV    A,#9           ;THEN SET IT TO 9
00D6   C9                     DECS   X              ;AND DECREMENT X
00D7   60                     NOP
00D8 E 8600                   SKF    ST3_C
00DA   0B                     BR     STPDC1
00DB   9AF1                   SKE    X,#0FH         ;1/9/88  00 SETPT PROBLEM
00DD   02                     BR     STPDF1
00DE   9A49                   MOV    X,#4           ;DO A WRAPAROUND
00E0   9A41           STPDF1: SKE    X,#4           ;IF X IS NOW 4
00E2   0D                     BR     STPXIT
00E3   9A99                   MOV    X,#9           ;THEN WRAPIT AROUND TO 9
00E5   0A                     BR     STPXIT
00E6   9AF1           STPDC1: SKE    X,#0FH         ;1/9/88  00 SETPT PROBLEM
00E8   02                     BR     STPDC2
00E9   9A09                   MOV    X,#0
00EB   9A01           STPDC2: SKE    X,#0
00ED   02                     BR     STPXIT
00EE   9A39                   MOV    X,#3           ;39C = 99F ALMOST
00F0 E 9200           STPXIT: MOV    SETPNT,XA      ;PUT BACK NEW SETPOINT
00F2 E 8400                   CLR1   CNT_ZZ         ;MAKE SURE SETPT NOT UPDATED 3/24/88 60
00F4   9906                   POP    BS
00F6   48                     POP    XA
00F7   EE                     RET
                              ;
                      ;*****************************************************************
                      ;                                                               *
                      ;  OPTIM:SENDS OUT OPTIMIZE MESSAGE TO CONTROLLER IF            *
                      ;        OPTIMIZE KEY IS HELD FOR 8 SECONDS.                    *
                      ;                                                               *
                      ;      INPUT - PM_PRD -USED AS COUNTER                          *
                      ;                                                               *
                      ;*****************************************************************
       R (00F8)       OPTIM   EQU    $
00F8   49                     PUSH   XA
00F9   9907                   PUSH   BS
00FB E 00                     GETI   STMBE
00FC E 00                     GETI   SEL1
00FD E A200                   MOV    XA,PM_PRD      ;PUT COUNTER INTO XA
00FF E 00                     GETI   SEL0
0100   9A00                   SKE    A,#0           ;IF A IS ZERO
0102   07                     BR     OPTINC
0103   9A01                   SKE    X,#0           ;12/10
0105   04                     BR     OPTINC         ;12/10
0106 E 8500                   SET1   ST3_BS         ;THEN BEEP FIRST TIME
0108 E 8900                   MOV    XA,#OPT_CNT    ;DEFINED IN TSTATSYS  3/18/88!!
010A   C0             OPTINC: INCS   A              ;IF A OVERFLOWS
010B   03                     BR     OPTCNT
010C   C1                     INCS   X
010D   01                     BR     OPTCNT
010E   0C                     BR     OPTSND         ;THEN SEND OUT MESSAGE (8 SECONDS)
010F E 00             OPTCNT: GETI   SEL1
0110 E 9200                   MOV    PM_PRD,XA      ;SAVE INCREMENTED COUNTER
0112   8918                   MOV    XA,#18H        ;SET UP TIMER FOR .75 SECOND TIMEOUT
0114 E 00                     GETI   SEL0
```

```
0115 E 9200          MOV    TSB6TM,XA
0117   70            MOV    A,#0
0118 E 9300          MOV    TSB6RP,A
011A   0D            BR     OPTXIT
011B E 8500  OPTSND: SET1   ST3_BS       ;BEEP AFTER 8 SECONDS
011D E 00            GETI   MXA_00
011E E 00            GETI   SEL1
011F E 9200          MOV    PM_PRD,XA    ;ZERO OUT COUNTER
0121   8982          MOV    XA,#82H      ;FOR CUSTOMER SERVICE (TELEPHONE)
0123   9A24          SKE    E,#2         ;YES TELE WAS HIT
0125   8981          MOV    XA,#81H      ;8 SEC SO SEND OPTIM MSG
0127 E 00            GETI   SCDRST
0128   9906  OPTXIT: POP    BS
012A   48            POP    XA
012B   EE            RET
                     ;
             ;*******************************************************************
             ;                                                                  *
             ;   NAME: Tempup/Tempdwn                                           *
             ;                                                                  *
             ;       INPUT - up or down temp key and pmi buffer and REST1       *
             ;                                                                  *
             ;       OUTPUT - updated pmi buffer                                *
             ;                                                                  *
             ;       This module is used to move the temperature up or down     *
             ;       for the heating and cooling schedules.  The error          *
             ;       checking feature has been added to prevent inefficient     *
             ;       schedules from being entered.  The simple algorithm        *
             ;       is listed below:                                           *
             ;                                                                  *
             ;               Heating WE/WD                                      *
             ;        TempUP - Must be less than(<=)the temp to the LEFT        *
             ;        TempDN - Must be greater than(>=)the temp to the RIGHT    *
             ;                                                                  *
             ;               Cooling WE/WD                                      *
             ;        TempUP - Must be less than(<=)the temp to the RIGHT       *
             ;        TempDN - Must be greater than(>=)the temp to the LEFT     *
             ;                                                                  *
             ;*******************************************************************

     R (012C)  TEMPUP  EQU    $
012C   49            PUSH   XA
012D   4D            PUSH   DE
012E   4B            PUSH   HL
012F   4F            PUSH   BC
0130   9907          PUSH   BS
0132 E 00            GETI   STMBE
0133 E 00            GETI   SEL1
0134 E A200          MOV    XA,REST1     ;GET POINTER TO PMI BUFFER    ????
0136   AA52          MOV    HL,XA        ;FOR THE FLASHING ONE
0138 E 00            GETI   MXA@HL
             ; INCREMENT IT
0139   C0            INCS   A
013A   9AA0          SKE    A,#0AH
013C R AB0155        BR     TPU0
013F   70            MOV    A,#0
0140   C1            INCS   X
0141 E 00            GETI   SEL0
```

```
0142 E 8600          SKF    ST3_C
0144   08            BR     TPUDC
0145   9AA1          SKE    X,#0AH
0147   0D            BR     TPU0
0148   8999          MOV    XA,#99H
014A R AB0208        BR     TXIT         ;BR      TPU0    WAS 5/19/88
014D   9A41  TPUDC:  SKE    X,#4         ;DEG C CODE
014F   05            BR     TPU0
0150   8939          MOV    XA,#39H      ; 39C = 99F
0152 R AB0208        BR     TXIT         ;NEW                     5/19/88
0155   AA46  TPU0:   XCH    XA,BC        ;STORE IT
             ;
0157 E 00            GETI   SEL0
0158 E A200          MOV    XA,STATE     ; GET STATE BACK
015A   9A21          SKE    X,#2         ;XA CONTAINS STATE ALREADY
015C   01            BR     TPUCH3
015D   05            BR     TPUHT
015E   9A31  TPUCH3: SKE    X,#3
0160 R AB0181        BR     TPUCL        ;MUST BE COOL?  YES!!
0163         TPUHT:                      ;>>>>>HEAT WD/WE<<<<<<<<<<
0163 E 8D00          MOV    DE,#N5       ;CHECK LEFT UNLESS, N5
0165 E 00            GETI   SEL1
0166 E A200          MOV    XA,FLASH1    ;POINTER TO N SEGMENT
0168 E 00            GETI   XCXADE       ;PUT LARGER ON IN DE TO FORCE BORROW
0169 E 00            GETI   SUBSXD
016A R AB01FE        BR     TMPOK        ;NO SKIP MUST BE AT N5
                                   ;GREATER THAN N5 MUST GET LEFT VALUE
016D   CA            DECS   L
016E   01            BR     TPU1
016F   CB            DECS   H
0170   CA    TPU1:   DECS   L
0171   01            BR     TPU2
0172   CB            DECS   H
0173         TPU2:
0173 R AB4210        CALL   !T3LFT       ;GET LEFT VALUE -3 TIERS
0176   AA5E          MOV    XA,BC        ;GET VALUE BACK
0178 E 00            GETI   XCXADE       ;PUT IN DE
0179 E 00            GETI   MXA@HL       ;GET VALUE TO THE LEFT
017A E 00            GETI   SUBSXD

017B R AB01FE        BR     TMPOK
                     ; TOO BIG!!!!!   DON'T STORE IT
017E R AB0208        BR     TXIT
             ;
0181         TPUCL:                      ; >>>>>COOL WD/WE<<<<<<<<<<
0181 E 8D00          MOV    DE,#N11      ;CHECK RIGHT UNLESS, N12
0183 E 00            GETI   SEL1
0184 E A200          MOV    XA,FLASH1    ;POINTER TO N SEGMENT
0186 E 00            GETI   SUBSXD
0187 R AB01FE        BR     TMPOK        ;NO SKIP MUST BE AT N12
                                   ;LESS THAN N12 MUST GET RIGHT VALUE
018A E 00            GETI   DINCSHL
018B R AB4226        CALL   !T3RGT       ;GET RIGHT VALUE 3-TIER
018E   AA5E          MOV    XA,BC        ;GET VALUE BACK
0190 E 00            GETI   XCXADE       ;PUT IN DE
0191 E 00            GETI   MXA@HL       ;GET VALUE TO THE RIGHT
0192 E 00            GETI   SUBSXD
0193 R AB01FE        BR     TMPOK
```

```
                              ; TOO BIG!!!!!    DON'T STORE IT
 0196 R AB0208                BR      TXIT
                        ;
                        ;################## TEMPDN ###################
      R (0199)          TEMPDN  EQU     $
 0199   49                      PUSH    XA
 019A   4D                      PUSH    DE
 019B   4B                      PUSH    HL
 019C   4F                      PUSH    BC
 019D   9907                    PUSH    BS
 019F E 00                      GETI    STMBE
 01A0 E 00                      GETI    SEL1
 01A1 E A200                    MOV     XA,REST1        ;GET POINTER TO PMI BUFFER    ????
 01A3   AA52                    MOV     HL,XA           ;FOR THE FLASHING ONE
 01A5 E 00                      GETI    MXA@HL
                        ; DECREMENT IT
 01A6   C8                      DECS    A
 01A7 R AB01C0                  BR      TPD0
 01AA   79                      MOV     A,#9
 01AB   C9                      DECS    X
 01AC E 00                      GETI    SEL0
 01AD E 8600                    SKF     ST3_C
 01AF   08                      BR      TPDDC
 01B0   9A41                    SKE     X,#4
 01B2   0D                      BR      TPD0
 01B3   8950                    MOV     XA,#50H
 01B5 R AB0208                  BR      TXIT            ;BR      TPD0    WAS 5/19/88
 01B8   9A01            TPDDC:  SKE     X,#0
 01BA   05                      BR      TPD0
 01BB   8910                    MOV     XA,#10H         ;10C = 50F
 01BD R AB0208                  BR      TXIT            ;NEW                5/19/88
 01C0   AA46            TPD0:   XCH     XA,BC           ;STORE IT
                        ;
 01C2 E 00                      GETI    SEL0
 01C3 E A200                    MOV     XA,STATE        ; GET STATE BACK
 01C5   9A51                    SKE     X,#5            ;XA CONTAINS STATE ALREADY
 01C7   01                      BR      TPDCH3
 01C8   05                      BR      TPDCL
 01C9   9A61            TPDCH3: SKE     X,#6
 01CB R AB01EC                  BR      TPDHT           ;MUST BE HEAT?  YES!!
 01CE                   TPDCL:                          ;>>>>>COOL WD/WE<<<<<<<<<<
 01CE E 8D00                    MOV     DE,#N5          ;CHECK LEFT UNLESS, N5
 01D0 E 00                      GETI    SEL1
 01D1 E A200                    MOV     XA,FLASH1       ;POINTER TO N SEGMENT
 01D3 E 00                      GETI    XCXADE          ;PUT LARGER ON IN DE TO FORCE BORROW
 01D4 E 00                      GETI    SUBSXD
 01D5 R AB01FE                  BR      TMPOK           ;NO SKIP MUST BE AT N5
                                            ;GREATER THAN N5 MUST GET LEFT VALUE
 01D8   CA                      DECS    L
 01D9   01                      BR      TPD1
 01DA   CB                      DECS    H
 01DB   CA              TPD1:   DECS    L
 01DC   01                      BR      TPD2
 01DD   CB                      DECS    H
 01DE                   TPD2:
 01DE R AB4210                  CALL    !T3LFT          ;GET LEFT VALUE 3 TIER
 01E1 E 00                      GETI    MXA@HL          ;GET VALUE TO THE LEFT
 01E2 E 00                      GETI    XCXADE          ;PUT IN DE
```

```
01E3   AA5E              MOV   XA,BC         ;GET VALUE BACK
01E5 E 00                GETI  SUBSXD
01E6 R AB01FE            BR    TMPOK
                         ; TOO SMALL!!!   DON'T STORE IT
01E9 R AB0208            BR    TXIT
                  ;
01EC              TPDHT:                     ; >>>>>HEAT WD/WE<<<<<<<<<
01EC E 8D00              MOV   DE,#N11       ;CHECK RIGHT UNLESS, N12
01EE E 00                GETI  SEL1
01EF E A200              MOV   XA,FLASH1     ;POINTER TO N SEGMENT
01F1 E 00                GETI  SUBSXD
01F2   0B                BR    TMPOK         ;NO SKIP MUST BE AT N12
                                       ;LESS THAN N12 MUST GET RIGHT VALUE
01F3 E 00                GETI  DINCSHL
01F4 R AB4226            CALL  !T3RGT        ;GET RIGHT VALUE 3 TIER
01F7 E 00                GETI  MXA@HL        ;GET VALUE TO THE RIGHT
01F8 E 00                GETI  XCXADE        ;LARGER VALUE IN DE TO FORCE SKIP
01F9   AA5E              MOV   XA,BC         ;GET VALUE BACK
01FB E 00                GETI  SUBSXD
01FC   01                BR    TMPOK
                         ; TOO SMALL!!!   DON'T STORE IT
01FD   0A                BR    TXIT
                  ;
01FE E 00         TMPOK: GETI  SEL1
01FF E A200              MOV   XA,REST1
0201   AA52              MOV   HL,XA
0203   AA5E              MOV   XA,BC         ;RESTORE VALUE .
0205   AA10              MOV   @HL,XA        ;STORE IT
0207   05                BR    TXIT1         ;SKIP ERROR TONE
0208 E 00         TXIT:  GETI  SEL0          ;NEED TWICE FOR SAFETY
0209 E 8500              SET1  ERR_TON       ;3/28/88
020B E 8500              SET1  ST3_BS        ;BEEP,NEEDED FOR ERROR     ;5/18/88
020D R AB0375     TXIT1: BR    MINXIT        ;SAME AS OTHERS        5/18/88

                  ;!!!!!!!!!!!!!!!!!!!!!!!!!!!!!!!!!!!!!!!!!!!!!!!!!!!!!!!!!!!!!!!!
                  ;  T3RGT AND T3LFT
                  ;
                  ;    SPECIAL CODE TO CHECK FOR 3 TIERS
                  ;    AND GET CORRECT LEFT OR RIGHT VALUES!!
                  ;
                  ;  3/24/88 AJB
                  ;!!!!!!!!!!!!!!!!!!!!!!!!!!!!!!!!!!!!!!!!!!!!!!!!!!!!!!!!!!!!!!!!
     R (0210)     T3LFT  EQU   $
0210 E 00                GETI  CLMBE
0211 E 8700              SKT   ST1_PT
0213   EE                RET                 ;4 TIERS GO BACK (BR T3XIT)
0214 E 00                GETI  STMBE
0215 E 00                GETI  SEL1
0216 E 8D00              MOV   DE,#N11
0218 E A200              MOV   XA,FLASH1
021A E 00                GETI  SUBSXD
021B   9A01              SKE   X,#0          ;                 (BR T3XIT)
021D   EE                RET                 ;BORROWED OR NON ZERO SO GO
021E   9A00              SKE   A,#0
0220   EE                RET                 ;NON ZERO SO GO  (BR T3XIT)
0221   CA                DECS  L
0222   01                BR    T3RCON
0223   CB                DECS  H
```

```
0224   CA          T3RCON: DECS   L
0225   EE          T3XIT:  RET
     R (0226)      T3RGT   EQU    $
0226 E 00                  GETI   CLMBE
0227 E 8700                SKT    ST1_PT
0229   EE                  RET                   ;4 TIERS GO BACK (BR T3XIT)
022A E 00                  GETI   STMBE
022B E 00                  GETI   SEL1
022C E 8D00                MOV    DE,#N7
022E E A200                MOV    XA,FLASH1
0230 E 00                  GETI   SUBSXD
0231   9A01                SKE    X,#0           ;                  (BR T3XIT)
0233   EE                  RET                   ;BORROWED OR NON ZERO SO GO
0234   9A00                SKE    A,#0
0236   EE                  RET                   ;NON ZERO SO GO (BR T3XIT)
0237 E 00                  GETI   DINCSHL
0238   EE                  RET
                   ;!!!!!!!!!!!!!!!!!!!!!!!!!!!!!!!!!!!!!!!!!!!!!!!!!!!!!!!!!!!!!!!!!!!!!
                   ;*********************************************************************
                   ;                                                                     *
                   ;    NAME:MSGCTR - PUT MESSAGE FROM CONTROLLER ON                     *
                   ;                  LCD SCREEN.                                        *
                   ;                                                                     *
                   ;       INPUT - PMIBUF                                                *
                   ;                                                                     *
                   ;       OUTPUT - INFO ON LCD DISPLAY                                  *
                   ;                                                                     *
                   ;*********************************************************************

     R (0239)      MSGCTR  EQU    $
0239   49                  PUSH   XA
023A   4B                  PUSH   HL
023B   9907                PUSH   BS
023D E 00                  GETI   STMBE
023E E 00                  GETI   SEL1
023F E 8400                CLR1   DAY
0241 E 8400                CLR1   EVE
0243 E 8400                CLR1   NIGHT          ;ADDED 3/25/88 FIX PROB
0245   9A10                SKE    A,#1
0247 R AB02A6              BR     MSHWAP
                           ; THIS IS STATE 1 FOR HEAT OR COOL SCHEDS
024A E 00                  GETI   MXA_01
024B E 9200                MOV    PM_PRD,XA
024D E 9200                MOV    PM_PNT,XA
024F E 8500                SET1   NORM
0251 E 8500                SET1   PRICE
0253 E 8500                SET1   LLOW
0255 E 8500                SET1   TIME
0257 E 8500                SET1   MEDIUM
0259 E 8500                SET1   CRIT
025B E 8500                SET1   COLON1
025D E 00                  GETI   SEL0
025E E 8700                SKT    ST1_PT         ;IF TRUE ONLY 3 TIERS
0260   01                  BR     MSGHI
0261   03                  BR     MSGGO
0262 E 00          MSGHI:  GETI   SEL1
0263 E 8500                SET1   LHIGH
0265               MSGGO:
```

```
0265 E 00                 GETI    SEL1
0266 E 8B06               MOV     HL,#PMIBUF+6
0268 E 00                 GETI    MXA@HL          ;GET HOURS
0269 E 8D00               MOV     DE,#M1          ;???
026B E AB4000             CALL    !DISHRS
                          ;HOURS ARE MAGICALLY PRINTED OUT
026E E 8B08               MOV     HL,#PMIBUF+8    ;MINUTES
0270 E 00                 GETI    MXA@HL
0271 F 8D00               MOV     DE,#M3
0273 E AB4000             CALL    !DSD2SG         ;USES DE REG FOR SEGMENT
0276 E 8B0A               MOV     HL,#PMIBUF+10   ;LOW TEMP
0278 E 00                 GETI    MXA@HL
0279 E 8D00               MOV     DE,#M5
027B E AB4000             CALL    !DSD2SG
                        ; SET UP FLASH AND REST1
027E E 00                 GETI    XCXADE
027F E 9200               MOV     FLASH1,XA
0281 E 00                 GETI    MVXAHL
0282 E 9200               MOV     REST1,XA
                          ;
0284 E 8B0C               MOV     HL,#PMIBUF+12
0286 E 00                 GETI    MXA@HL
0287 E 8D00               MOV     DE,#M7
0289 E AB4000             CALL    !DSD2SG         ;MED TEMP
028C E 8B0E               MOV     HL,#PMIBUF+14
                          ;CHECK NUMBER OF PRICE TIERS
028E E 00                 GETI    SEL0
028F E 8700               SKT     ST1_PT          ;IF TRUE 3 TIERS
0291   01                 BR      MSGG01
0292   07                 BR      MSGG02
0293 E 00         MSGG01: GETI    SEL1
0294 E 00                 GETI    MXA@HL
0295 E 8D00               MOV     DE,#M9
0297 E AB4000             CALL    !DSD2SG         ;HIGH TEMP
029A E 00         MSGG02: GETI    SEL1
029B E 8B10               MOV     HL,#PMIBUF+16
029D E 00                 GETI    MXA@HL
029E E 8D00               MOV     DE,#M11         ;CRIT TEMP
02A0 E AB4000             CALL    !DSD2SG
02A3 R AB02E4             BR      MSGXIT
                  ;;;;;;;;;;;;;;;;;;;;;;HEAT WATER AND APPLIANCE;;;;;;;;;;;;;;;
02A6 E 00         MSHWAP: GETI    SEL1
02A7 E 00                 GETI    MXA_01
02A8 E 9200               MOV     PM_PRD,XA
02AA E 9200               MOV     PM_PNT,XA
02AC E 8500               SET1    NORM
02AE E 8500               SET1    BEGIN
02B0 E 8500               SET1    LEND
02B2 E 8500               SET1    TO
02B4 E 8500               SET1    COLON2
02B6 E 8500               SET1    COLON3
02B8 E 8B06               MOV     HL,#PMIBUF+6
02BA E 00                 GETI    MXA@HL          ;GET START TIME
02BB E 8D00               MOV     DE,#M5
02BD E AB4000             CALL    !DISHRS
                          ;HOURS ARE MAGICALLY PRINTED OUT
02C0 E 00                 GETI    XCXADE
02C1 E 9200               MOV     FLASH1,XA       ;THIS WILL FLASH
```

```
02C3 E 00              GETI   MUXAHL
02C4 E 9200            MOV    REST1,XA
02C6 E 8B08            MOV    HL,#PMIBUF+8
02C8 E 00              GETI   MXA@HL
02C9 E 8D00            MOV    DE,#N7          ;MINUTES
02CB E AB4000          CALL   !DSD2SG
02CE E 00              GETI   XCXADE
02CF E 9200            MOV    FLASH2,XA       ;MINUTES FLASH TOO
02D1 E 00              GETI   MUXAHL
02D2 E 9200            MOV    REST2,XA
02D4 E 8B0A            MOV    HL,#PMIBUF+10
02D6 E 00              GETI   MXA@HL          ;GET END   TIME
02D7 E 8D00            MOV    DE,#N9
02D9 E AB4000          CALL   !DISHRS
                       ;HOURS ARE MAGICALLY PRINTED OUT
02DC E 8B0C            MOV    HL,#PMIBUF+12
02DE E 00              GETI   MXA@HL
02DF E 8D00            MOV    DE,#N11         ;MINUTES
02E1 E AB4000          CALL   !DSD2SG
02E4            MSGXIT:
02E4 E 00              GETI   SEL0
02E5 E 8400            CLR1   KEY_HLD         ;AJB 3/28/88 !!
02E7   9906            POP    BS
02E9   4A              POP    HL
02EA   48              POP    XA
02EB   EE              RET
                ;*****************************************************************
                ;                                                               *
                ;    NAME:IHOURS - THIS SUBROUTINE INCREMENTS THE HOUR AND       *
                ;                  WRAPS AROUND IF IT GOES PAST 23.              *
                ;                                                               *
                ;       INPUT - PM_PRD,REST1,PMIBUF,XA- PRESENT STATE           *
                ;                                                               *
                ;       OUTPUT - UPDATED HOURS PUT ON LCD SCREEN                *
                ;                                                               *
                ;*****************************************************************
     R (02EC)   IHOURS EQU    $
02EC   49              PUSH   XA
02ED   4D              PUSH   DE
02EE   4B              PUSH   HL
02EF   4F              PUSH   BC
02F0   9907            PUSH   BS
02F2 E 00              GETI   STMBE
02F3 E 00              GETI   SEL1
02F4   AA56            MOV    BC,XA           ;SAVE STATE IN BC
02F6   9A16            SKE    C,#1            ;IF C IS NOT ONE
02F8 R AB0313          BR     HRSFL1          ;THEN IN APP OR HEAT WATER
02FB E A200            MOV    XA,PM_PRD       ;ELSE IN H/C STATE, SO GET PERIOD
02FD   C8              DECS   A
02FE E 00              GETI   SEL0            ;SUBTRACT 1 FROM PERIOD POINTER
02FF E 9200            MOV    MULTA,XA        ;AND MULTIPLY BY 12
0301   890C            MOV    XA,#12          ;TO CALCULATE ADDRESS OFFSET
0303 E 9200            MOV    MULTB,XA        ;OF HRS VALUE IN PMIBUF
0305 E AB4000          CALL   !MULT8
0308 E A200            MOV    XA,MULTB
030A E 00              GETI   XCXADE
030B E 00              GETI   SEL1
030C E 8906            MOV    XA,#PMIBUF+6    ;PUT FIRST HRS VALUE FROM PMIBUF
```

```
030E E 00               GETI   ADDBYT       ;INTO XA AND ADD OFFSET
030F   AA52             MOV    HL,XA
0311 E 00               GETI   MXA@HL       ;GET VALUE
0312   05               BR     HRSINA
0313 E A200     HRSFL1: MOV    XA,REST1     ;IF APP OR HW REST1 POINTS AT VALUE
0315   AA52             MOV    HL,XA
0317 E 00               GETI   MXA@HL       ;GET VALUE
0318   C0       HRSINA: INCS   A            ;INCREMENT VALUE
0319   9A40             SKE    A,#4         ;IF A IS 4
031B   05               BR     HRSIN2
031C   9A21             SKE    X,#2         ;AND X IS 2
031E   07               BR     HRSCST
031F E 00               GETI   MXA_00       ;THEN WRAP AROUND TO 00
0320   05               BR     HRSCST
0321   9AA0     HRSIN2: SKE    A,#0AH       ;IF A IS 10
0323   02               BR     HRSCST
0324   70               MOV    A,#0         ;THEN WRAP TO 0
0325   C1       HRSINX: INCS   X            ;AND INCREMENT X
0326   AA10     HRSCST: MOV    @HL,XA       ;UPDATE PMIBUF
0328   9A16             SKE    C,#1
032A   05               BR     HRSXIT       ;LET OUTDIS HANDLE OUTPUT
032B E 8D00             MOV    DE,#N1       ;POINT TO SEGMENT
032D E AB4000           CALL   !DISHRS      ;CONVERT TO 12 HR TIME
                                            ;AND DISPLAY HOURS
0330 R AB0375   HRSXIT: BR     MINXIT       ; 5/18 SAVES SPACE SAME EXIT
                        ;
                ;*****************************************************************
                ;                                                               *
                ;     NAME:IMINS - THIS SUBROUTINE INCREMENTS THE MINUTES       *
                ;                  AND WRAPS AROUND IF IT GOES PAST 59.         *
                ;                                                               *
                ;        INPUT - PM_PRD,PMIBUF,REST2,XA- PRESENT STATE          *
                ;                                                               *
                ;        OUTPUT - UPDATED MINUTES PUT ON LCD DISPLAY            *
                ;                                                               *
                ;*****************************************************************
     R (0333)   IMINS   EQU    $
0333   49               PUSH   XA
0334   4D               PUSH   DE
0335   4B               PUSH   HL
0336   4F               PUSH   BC
0337   9907             PUSH   BS
0339 E 00               GETI   STMBE
033A E 00               GETI   SEL1
033B   AA56             MOV    BC,XA        ;SAVE STATE IN BC
033D   9A16             SKE    C,#1         ;IF C IS NOT ONE
033F R AB035A           BR     MINFL1       ;THEN IN APP OR HEAT WATER
0342 E A200             MOV    XA,PM_PRD    ;ELSE IN H/C STATE, SO GET PERIOD
0344   C8               DECS   A            ;SUBTRACT 1 FROM PERIOD POINTER
0345 E 00               GETI   SEL0
0346 E 9200             MOV    MULTA,XA     ;AND MULTIPLY BY 12
0348   890C             MOV    XA,#12       ;TO CALCULATE ADDRESS OFFSET
034A E 9200             MOV    MULTB,XA     ;OF MINS VALUE IN PMIBUF
034C E AB4000           CALL   !MULT8
034F E A200             MOV    XA,MULTB
0351 E 00               GETI   XCXADE
0352 E 00               GETI   SEL1
0353 E 8908             MOV    XA,#PMIBUF+8 ;PUT FIRST MINS VALUE FROM PMIBUF
```

```
0355 E 00               GETI    ADDBYT          ;INTO XA AND ADD OFFSET
0356   AA52             MOV     HL,XA
0358 E 00               GETI    MXA@HL          ;GET VALUE
0359   05               BR      MIMINA
035A E A200     MINFL1: MOV     XA,REST2        ;IF APP OR HW REST2 POINTS AT VALUE
035C   AA52             MOV     HL,XA
035E E 00               GETI    MXA@HL          ;GET VALUE
035F   C0       MIMINA: INCS    A               ;INCREMENT VALUE
0360   9AA0             SKE     A,#0AH          ;IF A IS 10
0362   08               BR      MINCST
0363   70               MOV     A,#0            ;THEN WRAP AROUND TO 0
0364   9A51             SKE     X,#5            ;IF X IS NOT 5
0366   03               BR      MIMINX          ;THEN INCREMENT X
0367   9A09             MOV     X,#0            ;ELSE WRAP AROUND TO 0
0369   01               BR      MINCST
036A   C1       MIMINX: INCS    X               ;INCREMENT X
036B   AA10     MINCST: MOV     @HL,XA          ;UPDATE PMIBUF
036D   9A16             SKE     C,#1
036F   05               BR      MINXIT
0370 E 8D00             MOV     DE,#N3          ;POINT TO SEGMENT N3
0372 E AB4000           CALL    !DSD2SG         ;AND DISPLAY MINUTES
0375            MINXIT:
0375 E 00               GETI    SEL0
0376 E A200             MOV     XA,TSB5TM       ;CHECK GETKEY TIMER
0378 E 00               GETI    XCXADE          ;XCHANGE
0379 E 8900             MOV     XA,#RPT_TIM     ;GET REPEAT TIMER
037B E 00               GETI    SUBSXD          ;IF TIMER IS GREATER THAN REPEAT VALUE
037C   02               BR      MINXT1          ;SKIP AND DO BEEP
037D E 8500             SET1    ST3_BS          ;THEN BEEP FIRST TIME AND
037F   9906     MINXT1: POP     BS
0381   4E               POP     BC
0382   4A               POP     HL
0383   4C               POP     DE
0384   48               POP     XA
0385   EE               RET
                ;*****************************************************************
                ;                                                               *
                ;   NAME:BILINF - THIS ROUTINE WILL OUTPUT ALL OF THE           *
                ;                 INFORMATION ABOUT BILLING                     *
                ;                                                               *
                ;       INPUT - PMIBUF,PM_PRD,PM_PNT                            *
                ;                                                               *
                ;       OUTPUT - LCD DISPLAY                                    *
                ;                                                               *
                ;*****************************************************************
0386            BILINF:
0386   49               PUSH    XA
0387   4F               PUSH    BC
0388   4D               PUSH    DE
0389   4B               PUSH    HL
038A   9907             PUSH    BS
038C E 00               GETI    STMBE
038D E 00               GETI    SEL1
038E E A200             MOV     XA,PM_PRD
0390   9A00             SKE     A,#0
0392   01               BR      BLMXT
                        ;FIRST TIME
0393   77               MOV     A,#7            ;FORCE IT TO ONE
```

```
0394   C0          BLNXT:  INCS   A
0395   9A80                SKE    A,#8
0397   08                  BR     BLNX1
0398   71                  MOV    A,#1
0399 E 9200                MOV    PM_PRD,XA
039B E 8906                MOV    XA,#PMIBUF+6     ;POINT AT START OF BUFFER
039D E 9200                MOV    PM_PNT,XA        ;STORE IT
039F   09                  BR     BLDSP
03A0 E 9200        BLNX1:  MOV    PM_PRD,XA        ;STORE IT
03A2 E A200                MOV    XA,PM_PNT        ;GET BUFFER POINTER
03A4   8D08                MOV    DE,#8            ;ADD 8 NIBBLES
03A6 E 00                  GETI   ADDBYT
03A7 E 9200                MOV    PM_PNT,XA        ;STORE IT
03A9               BLDSP:
03A9 E A200                MOV    XA,PM_PRD        ;GET COUNTER
03AB E 8B00                MOV    HL,#H4
03AD E AB4000              CALL   !DSPSEG          ;SINGLE SEGMENT
                           ;NOW CHECK FOR $. OR KWH
03B0 E 8400                CLR1   MA               ;ALWAYS BE SURE TO SHUT IT OFF
03B2   9A10                SKE    A,#1
03B4   01                  BR     BLD2
03B5   09                  BR     BLDLR
03B6   9A20        BLD2:   SKE    A,#2
03B8   01                  BR     BLD3
03B9   05                  BR     BLDLR
03BA   9A30        BLD3:   SKE    A,#3
03BC R AB03D7              BR     BLDKWH
03BF               BLDLR:
                        ; FIRST THREE BILL INFO'S
03BF E 8500                SET1   LLOW
03C1 E 8500                SET1   MEDIUM
03C3 E 00                  GETI   SEL0
03C4 E 8700                SKT    ST1_PT           ;PRICE TIER  0 = 4
03C6   01                  BR     BLDL0
03C7   03                  BR     BLDL1
03C8               BLDL0:  ; 4 TIERS
03C8 E 00                  GETI   SEL1
03C9 E 8500                SET1   LHIGH
03CB E 00          BLDL1:  GETI   SEL1
03CC E 8500                SET1   CRIT
03CE E 8500                SET1   DP2
03D0 E 8500                SET1   LDOLR            ;TURN ON $ AND
03D2 E 8400                CLR1   KWH              ;TURN OFF KWH
03D4 R AB0400              BR     BLDOUT
03D7               BLDKWH:
03D7 E 8400                CLR1   LLOW
03D9 E 8400                CLR1   MEDIUM
03DB E 8400                CLR1   LHIGH
03DD E 8400                CLR1   CRIT
03DF E 8400                CLR1   DP2
03E1 E 8400                CLR1   LDOLR
03E3 E 8500                SET1   KWH
03E5   9A40                SKE    A,#4
03E7   05                  BR     BLD5
03E8 E 8500                SET1   LLOW
03EA R AB0400              BR     BLDOUT
03ED   9A50        BLD5:   SKE    A,#5
03EF   03                  BR     BLD6
```

```
03F0 E 8500            SET1   MEDIUM
03F2   0D              BR     BLDOUT
03F3   9A60    BLD6:   SKE    A,#6
03F5   08              BR     BLD7
03F6 E 00              GETI   SEL0            ;A004 8/15/88
03F7 E 8600            SKF    ST1_PT
03F9   06              BR     BLDOUT
03FA E 00              GETI   SEL1            ;A004 8/15/88
03FB E 8500            SET1   LHIGH
03FD   02              BR     BLDOUT
03FE E 8500    BLD7:   SET1   CRIT
                              ;
0400 E 00      BLDOUT: GETI   SEL1            ;A004 8/15/88
0401 E A200            MOV    XA,PM_PNT
0403   AA42            XCH    XA,HL
                       ;HL    CONTAINS THE PMI BUF POINTER
0405 E 8D00            MOV    DE,#N5          ;
0407 E 00      BLDLP:  GETI   MXA@HL          ;GET NUMBER
0408   9AF1            SKE    X,#0FH          ;FIRST DIGITS WILL BE F'S
040A R AB042A          BR     BLD01           ; IF N/A
040D E 8500            SET1   NA
040F E 8400            CLR1   LLOW            ;CLEAR EVERYTHING ELSE
0411 E 8400            CLR1   MEDIUM
0413 E 8400            CLR1   LHIGH
0415 E 8400            CLR1   CRIT
0417 E 8400            CLR1   DP2
0419 E 8400            CLR1   LDOLR
041B E 8400            CLR1   KWH
041D R AB4058          CALL   !CLN            ; CLEAR THE NUMBERS
0420 E A200            MOV    XA,PM_PRD       ;GET COUNTER
0422 E 8B00            MOV    HL,#N4          ;CORRECTION 5/18/88 AJB!!!!
0424 E AB4000          CALL   !DSPSEG         ;SINGLE SEGMENT
0427 R AB0440          BR     BLDXIT
               ;       SKE    X,#0
               ;       BR     BLD01  **********************************
               ;       MOV    X,#10  *BLANKING OF LEADING ZEROES WILL *
               ;       SKE    A,#0   *BE HANDLED BY THE CONTROLLER!!!!*
               ;       BR     BLD01  **********************************
               ;       MOV    A,#10
042A E AB4000  BLD01:  CALL   !DSD2SG
042D   8904            MOV    XA,#4
042F E 00              GETI   ADDBYT
0430   AA46            XCH    XA,BC           ;STORE TEMP
0432 E 00              GETI   DINCSHL         ;JUST 2
                       ; CHECK FOR LAST ONE
0433 E 8901            MOV    XA,#N12+1
0435 E 00              GETI   XCXADE
0436   AA5E            MOV    XA,BC           ;GET NEW DE VALUE
0438 E 00              GETI   SUBSXD
0439   06              BR     BLDXIT          ;ALL DONE
043A   AA5E            MOV    XA,BC
043C E 00              GETI   XCXADE          ;RESTORE DE
043D R AB0407          BR     BLDLP
0440           BLDXIT:
0440 E 00              GETI   SEL0
0441 E 8400            CLR1   KEY_HLD
0443 E 00              GETI   MXA_00          ;A004  NO REPEAT
0444 E 9200            MOV    LST_KEY,XA      ;A004  FOR BILINF
```

```
0446   9906                   POP    BS
0448   4A                     POP    HL
0449   4C                     POP    DE
044A   4E                     POP    BC
044B   48                     POP    XA
044C   EE                     RET
                              ;
                      ;*****************************************************************
                      ;                                                               *
                      ;   NAME:MRIGHT - THIS SUBROUTINE WILL MOVE THE CURSOR          *
                      ;                 ONE BOX TO THE RIGHT AND WRAPS AROUND         *
                      ;                 WHEN IT COMES TO THE END OF THE LINE.         *
                      ;                                                               *
                      ;   NAME:MLEFT - THIS SUBROUTINE WILL MOVE THE CURSOR           *
                      ;                ONE BOX TO THE LEFT AND WRAPS AROUND           *
                      ;                WHEN IT COMES TO THE BEGINNING OF              *
                      ;                THE LINE.                                      *
                      ;                                                               *
                      ;     INPUT - XA CONTAINING STATE, PM_PNT,                      *
                      ;             FLASH1, REST1, PASH2, REST2                       *
                      ;                                                               *
                      ;     OUTPUT - FLASHING "CURSOR" MOVED TO RIGHT OR LEFT         *
                      ;                                                               *
                      ;*****************************************************************
     R (044D)         MRIGHT  EQU    $
044D   49                     PUSH   XA
044E   4D                     PUSH   DE
044F   4B                     PUSH   HL
0450   4F                     PUSH   BC
0451   9907                   PUSH   BS
0453 E 00                     GETI   STMBE
0454 E 00                     GETI   SEL1
0455   AA56                   MOV    BC,XA          ;SAVE STATE
0457 E A200                   MOV    XA,FLASH1      ;PUT FLASH1 (M1-M12) INTO DE
0459   AA54                   MOV    DE,XA
045B E A200                   MOV    XA,REST1       ;PUT REST1 POINTER INTO HL
045D   AA52                   MOV    HL,XA
045F E 00                     GETI   MXA@HL         ;PUT DATA FROM PMIBUF INTO XA
0460   9A16                   SKE    C,#1           ;CHECK FOR STATE 1
0462   09                     BR     MRTMP
0463   9A01                   SKE    X,#0           ;CHECK FOR LEADING ZEROS
0465   02                     BR     MRTRST         ;11/19/87 RDK
0466   9AA9                   MOV    X,#0AH
0468 E AB4000         MRTRST: CALL   !DSD2SG        ;RESTORES FLASHING TIME OR TEMP
046B   0C                     BR     MRGO
046C E AB4000         MRTMP.  CALL   !DISHRS        ;OUTPUT HOURS
046F E A200                   MOV    XA,FLASH2
0471   AA54                   MOV    DE,XA
0473 E 00                     GETI   DINCSHL
0474 E 00                     GETI   MXA@HL
0475 E AB4000                 CALL   !DSD2SG        ;RESTORES MINUTES
0478 E A200           MRGO:   MOV    XA,PM_PNT
047A   C0                     INCS   A              ;INCREMENT POINTER
047B   9A16                   SKE    C,#1           ;CHECK FOR STATE 1 (HEAT/COOL)
047D R AB053E                 BR     MVTHWA
                              ;--------- IN HVAC STATE -------------------------
0480 E 00                     GETI   SEL0
0481 E 8700                   SKT    ST1_PT         ;CHECK FOR 3 TIER PRICING
```

```
0483   07                       BR     MRTWP1
0484   9A30                     SKE    A,#3            ;IS IT ON 3 NOW ?
0486   04                       BR     MRTWP1
0487   74                       MOV    A,#4            ;IF IT IS CHANGE IT TO 4
0488 R AB04B4                   BR     MRT3TR
048B   9A50            MRTWP1:  SKE    A,#5            ;IF IT IS POINTING TO 5
048D   01                       BR     MRSTP1
048E   71                       MOV    A,#1            ;THEN WRAP IT AROUND TO 1
048F E 00              MRSTP1:  GETI   SEL1
0490 E 9200                     MOV    PM_PNT,XA       ;SAVE NEW COUNTER VALUE
0492 E 00                       GETI   DINCSHL         ;INCREMENT PMI POINTER (REST1)
0493 E 00                       GETI   MUXAHL
0494 E 9200                     MOV    REST1,XA
0496 E 8D00                     MOV    DE,#N11         ;CHECK IF FLASH1 IS AT FAR RIGHT
0498 E A200                     MOV    XA,FLASH1       ;TEMPERATURE
049A E 00                       GETI   SUBSXD
049B   0A                       BR     MRTWP2
049C E A200                     MOV    XA,FLASH1       ;IF NOT THEN PUT NEXT TEMP
049E   8D04                     MOV    DE,#4           ;INTO FLASH,  ADD 4, RDK 11-16-87
04A0 E 00                       GETI   ADDBYT
04A1 E 9200                     MOV    FLASH1,XA
04A3 R AB057A                   BR     MUTXIT          ;EXIT
04A6 E 8900            MRTWP2:  MOV    XA,#N5          ;IF FLASH1 IS AT FAR RIGHT TEMP
04A8 E 9200                     MOV    FLASH1,XA       ;THEN WRAP IT AROUND TO FAR LEFT TEMP
04AA E A200                     MOV    XA,REST1
04AC   8D08                     MOV    DE,#8           ;MOVE REST1 BACK TO FIRST TIER
04AE E 00                       GETI   SUBSXD          ;TEMPERATURE IN PRESENT PERIOD
04AF E 9200                     MOV    REST1,XA        ;SETTING
04B1 R AB057A                   BR     MUTXIT          ;EXIT
04B4 E 00              MRT3TR:  GETI   SEL1
04B5 E 9200                     MOV    PM_PNT,XA       ;SAVE NEW COUNTER VALUE
04B7 E 00                       GETI   DINCSHL
04B8 E 00                       GETI   DINCSHL         ;MOVE FROM 2ND TO 4TH TIER
04B9 E 00                       GETI   MUXAHL          ;FOR 3 TIER FORMAT
04BA E 9200                     MOV    REST1,XA
04BC E 8900                     MOV    XA,#N11
04BE E 9200                     MOV    FLASH1,XA
04C0 R AB057A                   BR     MUTXIT          ;EXIT
                       ;
                       ;************ MLEFT ******************************************
                       ;
       R (04C3)        MLEFT    EQU    $
04C3   49                       PUSH   XA
04C4   4D                       PUSH   DE
04C5   4B                       PUSH   HL
04C6   4F                       PUSH   BC
04C7   9907                     PUSH   BS
04C9 E 00                       GETI   STMBE
04CA E 00                       GETI   SEL1
04CB   AA56                     MOV    BC,XA           ;SAVE STATE
04CD E A200                     MOV    XA,FLASH1       ;PUT FLASH1 (N1-N12) INTO DE
04CF   AA54                     MOV    DE,XA
04D1 E A200                     MOV    XA,REST1        ;PUT REST1 POINTER INTO HL
04D3   AA52                     MOV    HL,XA
04D5 E 00                       GETI   MXA@HL          ;PUT DATA FROM PMIBUF INTO XA
04D6   9A16                     SKE    C,#1            ;CHECK FOR STATE 1
04D8   09                       BR     MLTMP
04D9   9A01                     SKE    X,#0            ;CHECK FOR LEADING ZEROS
```

```
04DB   02                 BR     MLTRST        ;11/19/87 RDK
04DC   9AA9               MOV    X,#0AH
04DE E AB4000    MLTRST: CALL   !DSD2SG       ;RESTORES FLASHING TEMP
04E1   0C                 BR     MLGO
04E2 E AB4000    MLTMP:  CALL   !DISHRS       ;OUTPUT HOURS
04E5 E A200               MOV    XA,FLASH2
04E7   AA54               MOV    DE,XA
04E9 E 00                 GETI   DINCSHL
04EA E 00                 GETI   MXA@HL
04EB E AB4000             CALL   !DSD2SG       ;RESTORES MINUTES
04EE E A200      MLGO:   MOV    XA,PM_PNT
04F0   C8                 DECS   A             ;DECREMENT POINTER
04F1   9A16               SKE    C,#1          ;CHECK FOR STATE 1 (HEAT/COOL)
04F3 R AB053E             BR     MUTHWA
                          ;--------- IN HVAC STATE -------------------------
04F6 E 00                 GETI   SEL0
04F7 E 8700               SKT    ST1_PT        ;CHECK FOR 3 TIER PRICING
04F9   07                 BR     MLTWP1
04FA   9A30               SKE    A,#3          ;IS IT ON 3 NOW ?
04FC   04                 BR     MLTWP1
04FD   72                 MOV    A,#2          ;IF IT IS CHANGE IT TO 2
04FE R AB052E             BR     MLT3TR
0501   9A00      MLTWP1: SKE    A,#0          ;IF IT IS POINTING TO 0
0503   01                 BR     MLSTP1
0504   74                 MOV    A,#4          ;THEN WRAP IT AROUND TO 4
0505 E 00        MLSTP1: GETI   SEL1
0506 E 9200               MOV    PM_PNT,XA     ;SAVE NEW COUNTER VALUE
0508 E 00                 GETI   MUXAHL        ;REST1 IS IN HL,MOVE IT INTO XA
0509   8D02               MOV    DE,#2
050B E 00                 GETI   SUBSXD        ;SUBTRACT TWO FROM PMI POINTER (REST1)
050C E 9200               MOV    REST1,XA
050E E A200               MOV    XA,FLASH1
0510   AA54               MOV    DE,XA         ;CHECK IF FLASH1 IS AT FAR LEFT
0512 E 8900               MOV    XA,#N5        ;TEMPERATURE
0514 E 00                 GETI   SUBSXD
0515   0A                 BR     MLTWP2
0516 E A200               MOV    XA,FLASH1     ;IF NOT THEN PUT NEXT TEMP
0518   8D04               MOV    DE,#4         ;INTO FLASH, SUBTRACT 4, RDK 11-16-87
051A E 00                 GETI   SUBSXD
051B E 9200               MOV    FLASH1,XA
051D R AB057A             BR     MUTXIT        ;EXIT
0520 E 8900      MLTWP2: MOV    XA,#N11       ;FLASH1 IS AT FAR LEFT TEMP
0522 E 9200               MOV    FLASH1,XA     ;THEN WRAP IT AROUND TO FAR RIGHT TEMP
0524 E A200               MOV    XA,REST1
0526   8D08               MOV    DE,#8         ;MOVE REST1 TO LAST TIER
0528 E 00                 GETI   ADDBYT        ;TEMPERATURE IN PRESENT PERIOD
0529 E 9200               MOV    REST1,XA      ;SETTING
052B R AB057A             BR     MUTXIT        ;EXIT
052E E 00        MLT3TR: GETI   SEL1
052F E 9200               MOV    PM_PNT,XA     ;SAVE NEW COUNTER VALUE
0531 E 00                 GETI   MUXAHL
0532   8D04               MOV    DE,#4         ;MOVE FROM 4ND TO 2TH TIER
0534 E 00                 GETI   SUBSXD        ;FOR 3 TIER FORMAT
0535 E 9200               MOV    REST1,XA
0537 E 8900               MOV    XA,#N7
0539 E 9200               MOV    FLASH1,XA
053B R AB057A             BR     MUTXIT        ;EXIT
                          ;****** MLEFT AND MRIGHT COMMON CODE *******************
```

```
                                  ;----------- IN APPLIANCE OR HEAT WATER STATE -----------
053E E A200          MVTHWA: MOV      XA,FLASH2
0540   AA54                  MOV      DE,XA         ;PUT FLASH2 INTO DE
0542 E A200                  MOV      XA,REST2
0544   AA52                  MOV      HL,XA
0546 E 00                    GETI     MXA@HL        ;PUT DATA FROM PMIBUF INTO XA
0547 E AB4000                CALL     !DSD2SG       ;RESTORES FLASHING TIME
054A E 00                    GETI     XCXADE        ;PUT FLASH2 INTO XA
054B E 8D00                  MOV      DE,#N11
054D E 00                    GETI     SUBSXD
054E R AB0567                BR       MVTDTM
0551 E 8900                  MOV      XA,#N11       ;AT LEFT HAND TIME
0553 E 9200                  MOV      FLASH2,XA     ;SO MOVE FLASH2 AND
0555 E 8900                  MOV      XA,#N9        ;FLASH1 TO RIGHT
0557 E 9200                  MOV      FLASH1,XA
0559 E 00                    GETI     MVXAHL
055A   8D04                  MOV      DE,#4         ;MOVE REST1 AND REST2 TWO
055C E 00                    GETI     ADDBYT        ;BYTES AHEAD IN THE PMIBUF
055D E 9200                  MOV      REST2,XA
055F E A200                  MOV      XA,REST1
0561 E 00                    GETI     ADDBYT
0562 E 9200                  MOV      REST1,XA
0564 R AB057A                BR       MVTXIT        ;EXIT
0567 E 8900          MVTDTM: MOV      XA,#N7        ;AT RIGHT HAND TIME
0569 E 9200                  MOV      FLASH2,XA     ;SO MOVE FLASH2 AND
056B E 8900                  MOV      XA,#N5        ;FLASH1 TO LEFT
056D E 9200                  MOV      FLASH1,XA
056F E 00                    GETI     MVXAHL
0570   8D04                  MOV      DE,#4         ;MOVE REST1 AND REST2 TWO
0572 E 00                    GETI     SUBSXD        ;BYTES BACK IN THE PMIBUF
0573 E 9200                  MOV      REST2,XA
0575 E A200                  MOV      XA,REST1
0577 E 00                    GETI     SUBSXD
0578 E 9200                  MOV      REST1,XA
057A E 00            MVTXIT: GETI     SEL0
057B E 8500                  SET1     ST3_BS        ;BEEP
057D E 00                    GETI     MXA_00        ;A004  NO REPEAT
057E E 9200                  MOV      LST_KEY,XA    ;A004  FOR ML/MR
0580   9906                  POP      BS
0582   4E                    POP      BC
0583   4A                    POP      HL
0584   4C                    POP      DE
0585   48                    POP      XA
0586   EE                    RET
                             ;
                     ;*****************************************************************
                     ;                                                               *
                     ;    INTAPP: THIS SUBROUTINE INITIALIZES THE APPLIANCE          *
                     ;            STATE FOR THE NEXT KEY PRESSED                     *
                     ;                                                               *
                     ;*****************************************************************
                             ;
       R (0587)      INTAPP  EQU      $
0587 E 00                    GETI     STMBE
0588 E 00                    GETI     SEL0          ;A004
0589 E 00                    GETI     MXA_00        ;A004  NO REPEAT
058A E 9200                  MOV      LST_KEY,XA    ;A004  FOR APPL
058C   8913                  MOV      XA,#13H
```

```
058E E 00                   GETI    MUSTXA
058F E 00                   GETI    CLRSCR          ;CLEAR SCREEN
0590   71                   MOV     A,#1            ;INIALIZE APPLIANCE NUMBER
0591 E 9300                 MOV     APPNUM,A
0593 E 00                   GETI    SEL1
0594 E 8500                 SET1    APPL            ;TURN ON APPLIANCE INDICATOR
0596 E 8B00                 MOV     HL,#N1
0598 E 00                   GETI    MXA_01          ;PUT "1" INTO FAR RIGHT LCD SEGMENT
0599 E AB4000               CALL    !DSPSEG
059C E 00                   GETI    MXA_01          ;INITIALIZE COUNTER
059D E 9200                 MOV     PM_PRD,XA
059F E 8500                 SET1    ST5_FW          ;FLASH WEEKDAY/WEEKEND
05A1   EE                   RET
                            ;
                   ;*****************************************************************
                   ;                                                                *
                   ;    MODOFF: THIS SUBROUTINE does a RET if MODE switch is       *
                   ;            OFF and a RETS if it is in HEAT or COOL             *
                   ;                    A004 8/4/88 AJB                             *
                   ;*****************************************************************
                     ;
     R (05A2)      MODOFF  EQU     $
05A2 E 00                  GETI    CLMBE
05A3 E 8600                SKF     SW1_HT          ;A004
05A5   03                  BR      MODHC           ;A004  IF MODE IS OFF
05A6 E 8700                SKT     SW1_CL          ;A004    RETURN!!! 8/4/88
05A8   EE                  RET                     ;A004        AJB
05A9   E0          MODHC:  RETS                    ;A004
                     ;
                   ;*****************************************************************
                   ;                                                                *
                   ;    NAME:NXTAPP - THIS SUBROUTINE WILL SEND OUT THE REQUEST     *
                   ;                  FOR THE NEXT APPLIANCE, CLEAR THE SCREEN,     *
                   ;                  AND PUT UP THE NUMBER FOR THE NEXT            *
                   ;                  APPLIANCE.                                    *
                   ;                                                                *
                   ;       INPUT - APPNUM - APPLIANCE NUMBER                        *
                   ;                                                                *
                   ;       OUTPUT - REQUEST FOR NEXT APPLIANCE SENT OUT             *
                   ;                                                                *
                   ;*****************************************************************
     R (05AA)      NXTAPP  EQU     $
05AA   9907                PUSH    BS
05AC   4B                  PUSH    HL
05AD   49                  PUSH    XA
05AE R AB4058              CALL    !CLN
05B1 E 00                  GETI    STMBE
05B2 E 00                  GETI    SEL1
05B3 E 8400                CLR1    MORN
05B5 E 8400                CLR1    DAY
05B7 E 8400                CLR1    EVE
05B9 E 8400                CLR1    NIGHT           ;1/9/88 CLEAR MORN,DAY... FIX PROB
05BB E 8600                SKF     ST5_FW          ;SEE IF UPDATE IS NECCESSARY 11/18 RDK
05BD   02                  BR      MANUP
05BE E 00                  GETI    MXA_A0          ;UPDATE PRESENT APPLIANCE 11/18 RDK
05BF E 00                  GETI    SCDRST          ; OA TO OAOH  AJB 3/22/88
05C0 E 00          MANUP:  GETI    SEL0
05C1 E A300                MOV     A,APPNUM
```

```
05C3   C0                     INCS   A
05C4   9A90                   SKE    A,#9
05C6   01                     BR     MARES
05C7   71                     MOV    A,#1
05C8 E 9300           MARES:  MOV    APPNUM,A
05CA E 00                     GETI   SEL1
05CB   9A09                   MOV    X,#0
05CD E 8B00                   MOV    HL,#M1
05CF E AB4000                 CALL   !DSPSEG
05D2 E 8600                   SKF    ST5_FW
05D4   09                     BR     MAXIT
05D5   9A49                   MOV    X,#4          ;MESSAGE # FOR APPLIANCE
05D7 E 8700                   SKT    WEEKDAY       ;IF NOT WEEKDAY
05D9   02                     BR     MAWE          ;THEN ADD 7 TO APPNUM
05DA   C8                     DECS   A             ;ELSE SUBTRACT 1 FROM APPNUM
05DB   01                     BR     MASDRQ
05DC   67             MAWE:   ADDS   A,#7
05DD E 00             MASDRQ: GETI   SCDRST
05DE   48             MAXIT:  POP    XA
05DF   4A                     POP    HL
05E0   9906                   POP    BS
05E2   EE                     RET
                              ;
                      ;*****************************************************************
                      ;                                                               *
                      ;    NAME:NXTPRD - THIS SUBROUTINE WILL DISPLAY THE NEXT        *
                      ;                  PERIOD FOR HEAT/COOL,APPLIANCE, HEAT WATER   *
                      ;                                                               *
                      ;        INPUT - PMIBUF,PM_PRD,XA -STATE                        *
                      ;                                                               *
                      ;        OUTPUT - INFO ON LCD DISPLAY                           *
                      ;                                                               *
                      ;*****************************************************************

     R (05E3)         NXTPRD  EQU    $
05E3   49                     PUSH   XA
05E4   4B                     PUSH   HL
05E5   9907                   PUSH   BS
05E7 E 00                     GETI   STMBE
05E8 E 00                     GETI   SEL1
05E9 E 8400                   CLR1   MORN          ;AJB 3/25/88 FIX A PROBLEM
05EB E 8400                   CLR1   DAY
05ED E 8400                   CLR1   EVE
05EF E 8400                   CLR1   NIGHT
05F1   9A10                   SKE    A,#1
05F3 R AB0658                 BR     NXHWAP
                              ; THIS IS STATE 1 FOR HEAT OR COOL SCHEDS
05F6 E A200                   MOV    XA,PM_PRD
05F8   C0                     INCS   A
05F9 E 9200                   MOV    PM_PRD,XA     ;SAVE NEW PERIOD
05FB   9A50                   SKE    A,#5
05FD   0A                     BR     NHCPD2
05FE   71                     MOV    A,#1
05FF E 9200                   MOV    PM_PRD,XA     ;SAVE NEW PERIOD
0601 E 8500                   SET1   MORN
0603 E 8B06                   MOV    HL,#PMIBUF+6
0605 R AB061C                 BR     NHCCON
0608   9A20           NHCPD2: SKE    A,#2
```

```
060A   05                        BR      NHCPD3
060B E 8500                      SET1    DAY
060D E 8B12                      MOV     HL,#PMIBUF+18
060F   0C                        BR      NHCCON
0610   9A30             NHCPD3:  SKE     A,#3
0612   05                        BR      NHCPD4
0613 E 8500                      SET1    EVE
0615 E 8B1E                      MOV     HL,#PMIBUF+30
0617   04                        BR      NHCCON
0618                    NHCPD4:
0618 E 8500                      SET1    NIGHT
061A E 8B2A                      MOV     HL,#PMIBUF+42
061C E 00               NHCCON:  GETI    MXA@HL          ;GET HOURS
061D E 8D00                      MOV     DE,#N1
061F E AB4000                    CALL    !DISHRS
                                 ;HOURS ARE MAGICALLY PRINTED OUT
0622 E 00                        GETI    DINCSHL         ;MINUTES
0623 E 00                        GETI    MXA@HL
0624 E 8D00                      MOV     DE,#N3
0626 E AB4000                    CALL    !DSD2SG         ;USES DE REG FOR SEGMENT
0629 E 00                        GETI    DINCSHL         ;LOW TEMP
062A E 00                        GETI    MXA@HL
062B E 8D00                      MOV     DE,#N5
062D E AB4000                    CALL    !DSD2SG
                               ; SET UP FLASH AND REST1
0630 E 00                        GETI    XCXADE
0631 E 9200                      MOV     FLASH1,XA
0633 E 00                        GETI    MUXAHL
0634 E 9200                      MOV     REST1,XA
                                 ;
0636 E 00                        GETI    MXA_01          ;A004   AJB 8/5/88
0637 E 9200                      MOV     PM_PNT,XA       ;A004   ONE IN PM_PNT
                                 ;
0639 E 00                        GETI    DINCSHL
063A E 00                        GETI    MXA@HL
063B E 8D00                      MOV     DE,#N7
063D E AB4000                    CALL    !DSD2SG         ;MED TEMP
0640 E 00                        GETI    DINCSHL
                                 ;CHECK NUMBER OF PRICE TIERS
0641 E 00                        GETI    SEL0
0642 E 8700                      SKT     ST1_PT          ;IF TRUE 3 TIERS
0644   01                        BR      NHCG01
0645   07                        BR      NHCG02
0646 E 00               NHCG01:  GETI    SEL1
0647 E 00                        GETI    MXA@HL
0648 E 8D00                      MOV     DE,#N9
064A E AB4000                    CALL    !DSD2SG         ;HIGH TEMP
064D E 00               NHCG02:  GETI    SEL1
064E E 00                        GETI    DINCSHL
064F E 00                        GETI    MXA@HL
0650 E 8D00                      MOV     DE,#N11         ;CRIT TEMP
0652 E AB4000                    CALL    !DSD2SG
0655 R AB06A5                    BR      MXTXIT
                                 ;---------------- HEAT WATER AND APPLIANCE ------------------
0658 E A200             MXHWAP:  MOV     XA,PM_PRD
065A   C0                        INCS    A
065B E 9200                      MOV     PM_PRD,XA       ;SAVE NEW PERIOD 11/18 RDK
065D   9A50                      SKE     A,#5
```

```
065F   0A                  BR      MAHPD2
0660   71                  MOV     A,#1
0661 E 9200                MOV     PM_PRD,XA       ;SAVE NEW PERIOD
0663 E 8500                SET1    MORN
0665 E 8B06                MOV     HL,#PMIBUF+6
0667 R AB067E              BR      MAHCON
066A   9A20       MAHPD2:  SKE     A,#2
066C   05                  BR      MAHPD3
066D E 8500                SET1    DAY
066F E 8B0E                MOV     HL,#PMIBUF+14
0671   0C                  BR      MAHCON
0672   9A30       MAHPD3:  SKE     A,#3
0674   05                  BR      MAHPD4
0675 E 8500                SET1    EVE
0677 E 8B16                MOV     HL,#PMIBUF+22
0679   04                  BR      MAHCON
067A              MAHPD4:
067A E 8500                SET1    NIGHT
067C E 8B1E                MOV     HL,#PMIBUF+30
067E E 00         MAHCON:  GETI    MXA@HL          ;GET START TIME
067F E 8D00                MOV     DE,#N5
0681 E AB4000              CALL    !DISHRS
                           ;HOURS ARE MAGICALLY PRINTED OUT
0684 E 00                  GETI    XCXADE
0685 E 9200                MOV     FLASH1,XA       ;THIS WILL FLASH
0687 E 00                  GETI    MVXAHL
0688 E 9200                MOV     REST1,XA
068A E 00                  GETI    DINCSHL
068B E 00                  GETI    MXA@HL
068C E 8D00                MOV     DE,#N7          ;MINUTES
068E E AB4000              CALL    !DSD2SG
0691 E 00                  GETI    XCXADE
0692 E 9200                MOV     FLASH2,XA       ;MINUTES FLASH TOO
0694 E 00                  GETI    MVXAHL
0695 E 9200                MOV     REST2,XA
0697 E 00                  GETI    DINCSHL
0698 E 00                  GETI    MXA@HL          ;GET END   TIME
0699 E 8D00                MOV     DE,#N9
069B E AB4000              CALL    !DISHRS
                           ;HOURS ARE MAGICALLY PRINTED OUT
069E E 00                  GETI    DINCSHL
069F E 00                  GETI    MXA@HL
06A0 E 8D00                MOV     DE,#N11         ;MINUTES
06A2 E AB4000              CALL    !DSD2SG
06A5 E 00         MXTXIT:  GETI    SEL0            ;A004
06A6 E 00                  GETI    MXA_00          ;A004  NO REPEAT
06A7 E 9200                MOV     LST_KEY,XA      ;A004  FOR MXTPRD
06A9   9906                POP     BS
06AB   4A                  POP     HL
06AC   48                  POP     XA
06AD   EE                  RET
                           ;
                  ;******************************************************************
                  ;                                                                 *
                  ;    NAME:UPCON  - THESE SUBROUTINES INCREMENTS AND DECREMENT     *
                  ;         DNCON    THE CONFIGURATION VALUES                       *
                  ;                                                                 *
                  ;       INPUT - PM_PNT, PM_PRD, PMIBUF                            *
```

```
                                ;                                                               *
                                ;       OUTPUT - INFO ON LCD DISPLAY                            *
                                ;                                                               *
                                ;****************************************************************
       R (06AE)                 UPCON   EQU     $
06AE     49                             PUSH    XA
06AF     4F                             PUSH    BC
06B0     4D                             PUSH    DE
06B1     4B                             PUSH    HL
06B2     9907                           PUSH    BS
06B4 E 00                               GETI    STMBE
06B5 E 00                               GETI    SEL1
06B6 E A200                             MOV     XA,PM_PNT
06B8 E 00                               GETI    XCXADE          ;POINTER IN DE
06B9 E A200                             MOV     XA,PM_PRD
06BB     AA52                           MOV     HL,XA
06BD E 00                               GETI    MXA@HL          ;GET VALUE
06BE     9A14                           SKE     E,#1
06C0 R AB06DC                           BR      UPC2
06C3 E 8D00                             MOV     DE,#N11         ;LOCATION
06C5     C0                             INCS    A
06C6     9AA0                           SKE     A,#0AH
06C8     05                             BR      UPC1A
06C9     8910                           MOV     XA,#10H
06CB R AB0746                           BR      UDXIT           ;OUTPUT AND STORE AND EXIT
06CE     9A70                   UPC1A:  SKE     A,#07H
06D0 R AB0746                           BR      UDXIT
06D3     9A11                           SKE     X,#1
06D5 R AB0746                           BR      UDXIT
06D8 E 00                               GETI    MXA_01
06D9 R AB0746                           BR      UDXIT
06DC     9A24                   UPC2:   SKE     E,#2
06DE     03                             BR      UPC3
06DF R AB0786                           BR      DNC2            ;UP/DOWN THE SAME
06E2     9A34                   UPC3:   SKE     E,#3
06E4     03                             BR      UPC4
06E5 R AB07DA                           BR      DNC3
06E8     9A44                   UPC4:   SKE     E,#4
06EA R AB0706                           BR      UPC5
06ED E 8D00                             MOV     DE,#N9
06EF     C0                             INCS    A
06F0     9AA0                           SKE     A,#0AH
06F2     05                             BR      UPC4A
06F3     70                             MOV     A,#0
06F4     C1                             INCS    X
06F5 R AB0746                           BR      UDXIT
06F8     9A10                   UPC4A:  SKE     A,#1
06FA R AB0746                           BR      UDXIT
06FD     9A21                           SKE     X,#2
06FF R AB0746                           BR      UDXIT
0702 E 00                               GETI    MXA_01
0703 R AB0746                           BR      UDXIT
0706     9A54                   UPC5:   SKE     E,#5
0708     0C                             BR      UPC6
0709 E 8D00                             MOV     DE,#N12
070B     C0                             INCS    A
070C     9A80                           SKE     A,#8
070E R AB073C                           BR      UDXIT0
```

```
0711    71                      MOV     A,#1
0712 R AB073C                   BR      UDXIT0
0715    9A64          UPC6:     SKE     E,#6
0717    0C                      BR      UPC7
0718 E 8D00                     MOV     DE,#N12
071A    C0                      INCS    A
071B    9A90                    SKE     A,#9
071D R AB073C                   BR      UDXIT0
0720    70                      MOV     A,#0
0721 R AB073C                   BR      UDXIT0

0724    9A74          UPC7:     SKE     E,#7            ;3/17/88
0726    03                      BR      UPC10
0727 R AB0810                   BR      DNC7
072A    9AA4          UPC10:    SKE     E,#10
072C R AB0835                   BR      DNC11           ;8,9 OR 11 UP/DN SAME
072F E 8D00                     MOV     DE,#N12
0731    C0                      INCS    A
0732    9A60                    SKE     A,#6
0734    02                      BR      UPC10A
0735    70                      MOV     A,#0            ;1/9/88 PROB FIX 0,2-5!!
0736    05                      BR      UDXIT0
0737    9A10          UPC10A:   SKE     A,#1
0739    02                      BR      UDXIT0          ;3/15/88 FIX MORE
073A    72                      MOV     A,#2
073B    60                      BR      UDXIT0
                      ;
                      ;
073C    AA10          UDXIT0:   MOV     @HL,XA          ;STORE THE VALUE
073E E 00                       GETI    XCXADE          ;Nx IN POSTION
073F    AA42                    XCH     XA,HL
0741 E 00                       GETI    XCXADE          ;GET VALUE BACK
0742 E AB4000                   CALL    !DSPSEG         ;DISPLAY IT
0745    0A                      BR      UDXIT2
     R (0746)         UDXIT     EQU     $
0746    AA10                    MOV     @HL,XA          ;STORE THE VALUE
0748    9A01                    SKE     X,#0
074A    02                      BR      UDXIT1
074B    9AA9                    MOV     X,#10           ;BLANK CHAR
074D E AB4000         UDXIT1:   CALL    !DSD2SG
0750    9906          UDXIT2:   POP     BS
0752    4A                      POP     HL
0753    4C                      POP     DE
0754    4E                      POP     BC
0755    48                      POP     XA
0756    EE                      RET
                      ;
     R (0757)         DNCON     EQU     $
0757    49                      PUSH    XA
0758    4F                      PUSH    BC
0759    4D                      PUSH    DE
075A    4B                      PUSH    HL
075B    9907                    PUSH    BS
075D E 00                       GETI    STMBE
075E E 00                       GETI    SEL1
075F E A200                     MOV     XA,PM_PNT
0761 E 00                       GETI    XCXADE
0762 E A200                     MOV     XA,PM_PRD
```

```
0764   AA52            MOV    HL,XA
0766 E 00              GETI   MXA@HL
0767   9A14            SKE    E,#1
0769 R AB0786          BR     DNC2
076C E 8D00            MOV    DE,#M11
076E   C8              DECS   A
076F   9A00            SKE    A,#0
0771   0A              BR     DNC1A
0772   9A01            SKE    X,#0          ;BOTH ZERO
0774 R AB0746          BR     UDXIT
0777   8916            MOV    XA,#16H
0779 R AB0746          BR     UDXIT
077C   9AF0    DNC1A:  SKE    A,#0FH
077E R AB0746          BR     UDXIT
0781   8909            MOV    XA,#09
0783 R AB0746          BR     UDXIT
0786   9A24    DNC2:   SKE    E,#2
0788 R AB07BA          BR     DNC3
078B   9A00            SKE    A,#0
078D R AB07AB          BR     DNC2A
0790 E 00              GETI   MXA_01
0791   AA10            MOV    @HL,XA
0793   890D            MOV    XA,#13        ;C
0795 E 8500            SET1   DEGC
0797 E 8400            CLR1   DEGF
0799 E 00              GETI   SEL0
079A E 8500            SET1   ST3_C         ;12/10
079C E 8B00    DNC20:  MOV    HL,#M12
079E E AB4000          CALL   !DSPSEG
07A1   AA46            XCH    XA,BC
07A3 E 00              GETI   MXA_00
07A4 E 9200            MOV    SETPNT,XA     ;CLEAR SETPOINT FOR CONVERSION
07A6   AA46            XCH    XA,BC         ;RESTORE XA
07A8 R AB0750          BR     UDXIT2
07AB E 00      DNC2A:  GETI   MXA_00
07AC   AA10            MOV    @HL,XA
07AE   8911            MOV    XA,#17        ;F
07B0 E 8400            CLR1   DEGC
07B2 E 8500            SET1   DEGF
07B4 E 00              GETI   SEL0
07B5 E 8400            CLR1   ST3_C         ;12/10
07B7 R AB079C          BR     DNC20
07BA   9A34    DNC3:   SKE    E,#3
07BC R AB07DA          BR     DNC4
07BF E 8D00            MOV    DE,#M11
07C1   9A00            SKE    A,#0
07C3   0B              BR     DNC3A
07C4 E 00              GETI   MXA_01
07C5   AA10            MOV    @HL,XA
07C7   8924            MOV    XA,#24H       ;24
07C9 E 00              GETI   SEL0
07CA E 8500            SET1   ST3_CL        ;12/10
07CC R AB074D          BR     UDXIT1
07CF E 00      DNC3A:  GETI   MXA_00
07D0   AA10            MOV    @HL,XA
07D2   8912            MOV    XA,#12H       ;12
07D4 E 00              GETI   SEL0
07D5 E 8400            CLR1   ST3_CL        ;12/10
```

```
07D7 R AB074D            BR      UDXIT1
07DA   9A44      DNC4:   SKE     E,#4
07DC R AB07F4            BR      DNC5
07DF E 8D00              MOV     DE,#N9
07E1   C8                DECS    A
07E2   02                BR      DNC4A
07E3   79                MOV     A,#9
07E4   C9                DECS    X               ;FILTER
07E5   9A00      DNC4A:  SKE     A,#0
07E7 R AB0746            BR      UDXIT
07EA   9A01              SKE     X,#0
07EC R AB0746            BR      UDXIT
07EF   8920              MOV     XA,#20H
07F1 R AB0746            BR      UDXIT

07F4   9A54      DNC5:   SKE     E,#5
07F6   0C                BR      DNC6
07F7 E 8D00              MOV     DE,#N12
07F9   C8                DECS    A
07FA   9A00              SKE     A,#0
07FC R AB073C            BR      UDXIT0
07FF   77                MOV     A,#7
0800 R AB073C            BR      UDXIT0

0803   9A64      DNC6:   SKE     E,#6
0805   0A                BR      DNC7
0806 E 8D00              MOV     DE,#N12
0808   C8                DECS    A
0809 R AB073C            BR      UDXIT0
080C   78                MOV     A,#8
080D R AB073C            BR      UDXIT0

0810   9A74      DNC7:   SKE     E,#7
0812   09                BR      DNC10
0813 E 8D00              MOV     DE,#N12
0815   9A50              SKE     A,#5
0817   75                MOV     A,#5
0818   72                MOV     A,#2
0819 R AB073C            BR      UDXIT0

081C   9AA4      DNC10:  SKE     E,#10
081E R AB0835            BR      DNC11
0821 E 8D00              MOV     DE,#N12
0823   C8                DECS    A
0824   60                NOP                     ;1/9/88 PROBLEM FIX
0825   9A10              SKE     A,#1
0827   04                BR      DNC10A          ;1/9/88
0828   70                MOV     A,#0            ;0, 2-5
0829 R AB073C            BR      UDXIT0
082C   9AF0      DNC10A: SKE     A,#0FH
082E R AB073C            BR      UDXIT0          ; 3/17/88
0831   75                MOV     A,#5
0832 R AB073C            BR      UDXIT0

0835             DNC11:                          ,11 OR 8 OR 9
0835 E 8D00              MOV     DE,#N12
0837   9A10              SKE     A,#1
0839   71                MOV     A,#1
```

```
1643 083A   70                  MOV     A,#0
1644 083B R AB073C              BR      UDXITO
1645                            END

TARGET CHIP : UPD75308
STACK SIZE = 0000H

ASSEMBLY COMPLETE,  NO ERROR FOUND


   ** OUTDIS(7.0) -AJB                                        **

COMMAND     :                   (COMMAND FILE :              )
OUTDIS.ASM MOD=308

 STNO ADRS R OBJECT   IC MAC   SOURCE STATEMENT

    1                          $      TITLE='OUTDIS(7.0) -AJB'
    2                          ;(*------------------------------------------------------------
    3                          ;(c) Copyright, Johnson Controls Incorporated, 1987.  All rights
    4                          ;   reserved. The following program is the exclusive property of
    5                          ;   Johnson Controls, Inc. and its use is restricted by license
    6                          ;   agreement to the system with which it was furnished.  The
    7                          ;   program contents are confidential and may not be disclosed
    8                          ;   or used outside the system without the express written
    9                          ;   consent of Johnson Controls.  This program is further
   10                          ;   protected by federal copyright law as an unpublished work
   11                          ;   and any unauthorized reproduction is prohibited.
   12                          ;
   13                          ;******************************OUTDIS 7.0************************
   14                          ;
   15                          ; 1. PURPOSE:
   16                          ;     OUTDIS - This routine handles the outputting of the time
   17                          ;       and temperature when CONPMI is in the Normal state.  It
   18                          ;       also handles the flashing of the colon and of the time
   19                          ;       and temperature when there is an error condition.
   20                          ;
   21                          ; 2. INPUTS:
   22                          ;
   23                          ;
   24                          ; 3. GLOBAL VARIABLES:
   25                          ;     None
   26                          ;
   27                          ; 4. OUTPUTS:
   28                          ;
   29                          ;
   30                          ; 5. PROCEDURES CALLED:
   31                          ;     DSPSEG - display segment is a subroutine that gets
   32                          ;       a character index and a segment position then puts
   33                          ;       that character out on the display.
   34                          ;
   35                          ;     DISHRS - this subroutine determines if the time is in
   36                          ;       24 hour or 12 hour time and converts if neccessary
   37                          ;       then it displays the hours in the proper place on the
   38                          ;       LCD screen.
   39                          ;
   40                          ; 6. EXCEPTIONS:
   41                          ;     None
```

```
                ; 7. UNIQUE FEATURES:
                ;     None
                ; 8. HISTORY
                ;     ORIGINAL - 08/21/87 - Alan J.Bronikowski Rev A000
                ;     REVISION - 10/13/87 - Alan J.Bronikowski Rev A000 -added
                ;                           code for OUTDIS
                ;     REVISION - -2/24/88 - Alan J. Bronikowski Rev A001 - made
                ;                           changes for new LCD!!!
                ;     REVISION - 03/25/88 - Alan J. Bronikowski Rev A002 -added
                ;                           code to flash LOAD CONTROL if overide
                ;                           is attempted by user.
                ;-------------------------------------------------------------*)
                ;   RESET START ADDRESS
                ;*************************************************************
                ;
                        NAME    OUTDIS
                        EXTRN CODE(ADDBYT,SUBSXD,INCSHL,SEL0,SEL1,STMBE,CLMBE)
                        EXTRN CODE(BIN2BCD,BCD2BIN,MSGCTR,MXA@HL,MVSTXA,DINCSHL)
                        EXTRN CODE(CLRSCR,CLN,BILINF,UPSTPT,SCDRST,XCXADE)
                        EXTRN CODE(DNSTPT,OPTIM,MULT8,MXA_00,MXA_A0)
                        EXTRN CODE(IHOURS,IMINS,MLEFT,MXTPRD,MVXAHL)
                        EXTRN CODE(MRIGHT,TEMPUP,TEMPDN,MXTAPP)
                        EXTRN DATA(TSB6RP,TSB6TM,TSB6PA,TSB7RP,TSB7TM,TSB7PA)
                        EXTRN DATA(STATE,TIMEHR,TIMEMIN,REST1,REST2,PM_PRD)
                        EXTRN DATA(CTEMP,FTEMP,SETPNT,FLASH1,FLASH2,PM_PNT)
                        EXTRN DATA(MULTA,MULTB,PMIBUF,LC_CNT,OLDTMP)
                        EXTRN BIT(SW1_HT,SW1_CL,TSB7T,TSB6T,KEY_HLD)
                        EXTRN BIT(ST0_PP,ST0_EH,ST0_LC,ST0_WE,ST2_RH,ST2_RL)
                        EXTRN BIT(ST1_TH,ST1_HW,ST1_FL,ST2_CH,ST2_CL,ST3_BS)
                        EXTRN BIT(ST3_CL,ST3_C,ST4_FT,ST4_FC,ST5_FW,ST5_HC,ST5_FL)
                        PUBLIC OUTDIS,DSPSEG,DSP2SG,M1,M2,M7,DSD2SG,CONFIG
                        PUBLIC DISHRS,M3,M5,M9,M11,M12,MORN,DAY,EVE,NIGHT,PRICE
                        PUBLIC LLOW,TIME,MEDIUM,CRIT,COLON1,LHIGH,BEGIN,LEND,TO
                        PUBLIC COLON2,COLON3,APPL,HTWATER,SETNG,CSETNG,HSETNG
                        PUBLIC WEEKEND,WEEKDAY,DP2,KWH,LDOLR,M4,BILL,DEGF,DEGC
                        PUBLIC PM2,PM3,AM2,AM3,MA
                ;   LCD PLACEMENT MAP  8/21/87
(00E0)          S0      EQU     0E0H    ;THESE ARE IN MB1 SO 1E0H IS REAL NUMBER
(00E1)          S1      EQU     0E1H
(00E2)          S2      EQU     0E2H
(00E3)          S3      EQU     0E3H
(00E4)          S4      EQU     0E4H
(00E5)          S5      EQU     0E5H
(00E6)          S6      EQU     0E6H
(00E7)          S7      EQU     0E7H
(00E8)          S8      EQU     0E8H
(00E9)          S9      EQU     0E9H
(00EA)          S10     EQU     0EAH
(00EB)          S11     EQU     0EBH
(00EC)          S12     EQU     0ECH
(00ED)          S13     EQU     0EDH
(00EE)          S14     EQU     0EEH
(00EF)          S15     EQU     0EFH
(00F0)          S16     EQU     0F0H
(00F1)          S17     EQU     0F1H
(00F2)          S18     EQU     0F2H
(00F3)          S19     EQU     0F3H
(00F4)          S20     EQU     0F4H
```

```
(00F5)    S21     EQU   0F5H
(00F6)    S22     EQU   0F6H
(00F7)    S23     EQU   0F7H
(00F8)    S24     EQU   0F8H
(00F9)    S25     EQU   0F9H
(00FA)    S26     EQU   0FAH
(00FB)    S27     EQU   0FBH
(00FC)    S28     EQU   0FCH
(00FD)    S29     EQU   0FDH
(00FE)    S30     EQU   0FEH
(00FF)    S31     EQU   0FFH
          ;
(00E3)    N1      EQU   S3
(00E5)    N2      EQU   S5
(00E7)    N3      EQU   S7
(00E9)    N4      EQU   S9
(00EB)    N5      EQU   S11    ;WHERE THE NUMBERS START!
(00ED)    N6      EQU   S13
(00EF)    N7      EQU   S15
(00F1)    N8      EQU   S17
(00F3)    N9      EQU   S19
(00F5)    N10     EQU   S21
(00F7)    N11     EQU   S23
(00F9)    N12     EQU   S25
          ;
(0383)    EVE     EQU   S0.3
(0382)    DAY     EQU   S0.2
(0381)    MORN    EQU   S0.1
(0380)    WEEKEND EQU   S0.0
(0385)    SETNG   EQU   S1.1   ;2/24/88
(0387)    CSETNG  EQU   S1.3   ;2/24/88
(0386)    HSETNG  EQU   S1.2   ;2/24/88
(0384)    WEEKDAY EQU   S1.0
(0389)    HTWATER EQU   S2.1   ;2/24/88
(038B)    HOLD2   EQU   S2.3   ;2/24/88
(038A)    HOLD1   EQU   S2.2   ;2/24/88
(0388)    LDCNTRL EQU   S2.0
(0390)    APPL    EQU   S4.0
(0398)    TIME    EQU   S6.0
(03A0)    BILL    EQU   S8.0
(03A8)    PRICE   EQU   S10.0
(03B0)    COLON1  EQU   S12.0
(03C0)    MEDIUM  EQU   S16.0
(03C8)    FILTER  EQU   S18.0
(03D0)    LHIGH   EQU   S20.0  ; HIGH
(03D8)    LEND    EQU   S22.0  ; END
(03E0)    CRIT    EQU   S24.0
(03E8)    KWH     EQU   S26.0
(03EF)    LDOLR   EQU   S27.3  ;  $
(03EE)    AM1     EQU   S27.2
(03ED)    PM1     EQU   S27.1
(03EC)    LLOW    EQU   S27.0  ; LOW
(03F3)    TO      EQU   S28.3
(03F2)    AM2     EQU   S28.2
(03F1)    PM2     EQU   S28.1
(03F0)    DP2     EQU   S28.0  ; DECIMAL PT 2
(03F7)    DEGF    EQU   S29.3  ; F
(03F6)    DEGC    EQU   S29.2  ; C
```

```
        (03F5)        AM3     EQU     S29.1
        (03F4)        PM3     EQU     S29.0
        (03FB)        COLON3  EQU     S30.3
        (03FA)        COLON2  EQU     S30.2
        (03F9)        DP1     EQU     S30.1   ; DECIMAL PT 1
        (03F8)        BEGIN   EQU     S30.0
        (03FF)        NIGHT   EQU     S31.3
        (03FE)        NA      EQU     S31.2   ;WAS ACTUAL, NOW N/A- 2/24/88
        (03FD)        TEMP    EQU     S31.1
                      ; SETPT WAS DELETED 2/24/88
                      ;****************************************************************
                      ;
                      ;****************************DSPSEG****************************
                      ;
                      ; 1. PURPOSE:
                      ;     DSP_SEG - This routine will recieve a character index and
                      ;       segment position. It will then display that character on
                      ;       the LCD screen
                      ;
                      ; 2. INPUTS:
                      ;          HL - contains the segment address(ie. #N1)
                      ;          XA - contains the number/character index
                      ;
                      ; 3. GLOBAL VARIABLES:
                      ;     None
                      ;
                      ; 4. OUTPUTS:
                      ;
                      ;
                      ; 5. PROCEDURES CALLED:
                      ;                                   ADDBYTE
                      ; 6. EXCEPTIONS:
                      ;     None
                      ; 7. UNIQUE FEATURES:
                      ;     None
                      ; 8. HISTORY
                      ;     ORIGINAL - 08/21/87 - Alan J.Bronikowski Rev A000
                      ;     REVISION - 10/13/87 - Alan J.Bronikowski Rev A000 -added
                      ;                              code for OUTDIS
                      ;-----------------------------------------------------------*)
----                  COUT    CSEG    AT 0900H       ;
0900    FA            CHRTAB: DB      0FAH           ; 0     0
0901    0A                    DB      00AH           ; 1     1
0902    BC                    DB      0BCH           ; 2     2
0903    9E                    DB      09EH           ; 3     3
0904    4E                    DB      04EH           ; 4     4
0905    D6                    DB      0D6H           ; 5     5
0906    F6                    DB      0F6H           ; 6     6
0907    8A                    DB      08AH           ; 7     7
0908    FE                    DB      0FEH           ; 8     8
0909    DE                    DB      0DEH           ; 9     9
090A    00                    DB      000H           ;10     " "
090B    EE                    DB      0EEH           ;11     "A"
090C    76                    DB      076H           ;12     "b"
090D    F0                    DB      0F0H           ;13     "C"
090E    34                    DB      034H           ;14     "c"
090F    3E                    DB      03EH           ;15     "d"
```

```
0910  F4          DB    0F4H           ;16   "E"
0911  E4          DB    0E4H           ;17   "F"
0912  6E          DB    06EH           ;18   "H"
0913  20          DB    020H           ;19   "i" left
0914  3A          DB    03AH           ;20   "J"
0915  70          DB    070H           ;21   "L"
0916  26          DB    026H           ;22   "n"
0917  36          DB    036H           ;23   "o" lower 1/2
0918  EC          DB    0ECH           ;24   "P"
0919  24          DB    024H           ;25   "r"
091A  60          DB    060H           ;26   "I" LEFT
091B  04          DB    004H           ;27   "-"
                ;
091C  49        DSPSEG: PUSH  XA
091D  4D          PUSH  DE
091E  4B          PUSH  HL
091F  9907        PUSH  BS
0921 E 00         GETI  STMBE
0922 E 00         GETI  SEL1           ;MB1!!!!!
0923  8D00        MOV   DE,#CHRTAB     ;
0925 E 00         GETI  ADDBYT         ;XA HAS INDEX
0926 E 00         GETI  XCXADE         ;PUT RESULT IN DE
0927  D4          MOVT  XA,@PCDE       ;GET SEGMENT CODE
0928  D9          XCH   A,X            ;TEMP STORE
0929  E8          MOV   @HL,A          ;1ST NIBBLE
092A E 00         GETI  INCSHL         ;NEXT ADDR
092B  E1          MOV   A,@HL          ;GET NEXT NIBBLE
092C  98          RORC  A              ;GET LSB USED FOR ELEMENT
092D  D9          XCH   A,X            ;OTHER NIBBLE
092E  D6          NOT1  CY             ;
092F  D7          SKT   CY             ;
0930  C0          INCS  A              ;BIT WAS SET
0931  E8          MOV   @HL,A          ;WRITE IT OUT
0932  9906        POP   BS
0934  4A          POP   HL
0935  4C          POP   DE
0936  48          POP   XA
0937  EE          RET                  ;STANDARD RET
                ;
                ;******************************CONFIG*****************************
                ;
                ; 1. PURPOSE:
                ;     CONFIG - This routine outputs the different screen displays
                ;       for user and installer configuration.  A special key
                ;       sequence must be input(MOVE LEFT, HOUR, MOVE RIGHT, MIN,
                ;       RETURN).  The user configuration items are done first
                ;       numbers one to five then if the configuration jumper is
                ;       installed(PORT6.1) the installer items(6-11) are done.
                ;
                ; 2. INPUTS:    PM_PNT & PM_PRD
                ;
                ;
                ; 3. GLOBAL VARIABLES:
                ;     None
                ;
                ; 4. OUTPUTS:
                ;           LCD DISPLAY
                ;
```

```
                        ; 5. PROCEDURES CALLED:
                        ;
                        ; 6. EXCEPTIONS:
                        ;     None
                        ; 7. UNIQUE FEATURES:
                        ;     None
                        ; 8. HISTORY
                        ;     ORIGINAL - 11/04/87 - Alan J.Bronikowski Rev A000
                        ;     REVISION - 03/03/88 - Alan J.Bronikowski Rev A002
                        ;                               change HPE to HPC
                        ;     REVISION - 03/17/88 - Alan J. Bronikowski Rev A002
                        ;                          removed FAS and made it ELH(electric
                        ;                          heat)
                        ;---------------------------------------------------------*)
                        ;                                              PM_PNT
0938    0E              CONTAB:        DB      14,23,22        ;con    0
0939    17
093A    16
093B    12                             DB      18,13,15        ;HCd    1
093C    0D
093D    0F
093E    11                             DB      17,23,13        ;FoC    2
093F    17
0940    0D
0941    0D                             DB      13,21,23        ;CLo    3
0942    15
0943    17
0944    11                             DB      17,19,21        ;FiL    4
0945    13
0946    15
0947    10                             DB      16,22,15        ;End    5
0948    16
0949    0F
094A    12                             DB      18,24,25        ;HPr    6
094B    18
094C    19
094D    12                             DB      18,13,13        ;HCC    7
094E    0D
094F    0D
0950    10                             DB      16,21,18        ;ELH    8
0951    15
0952    12
0953    05                             DB       5,18,25        ;SHr    9
0954    12
0955    19
0956    12                             DB      18,16,17        ;HEF    10
0957    10
0958    11
0959    10                             DB      16,18,11        ;EHA    11
095A    12
095B    0B
                        ;
        (095C)          CONFIG  EQU    $
095C    49                      PUSH   XA
095D    4F                      PUSH   BC
095E    4D                      PUSH   DE
095F    4B                      PUSH   HL
0960    9907                    PUSH   BS
```

```
0962 E 00                   GETI    STMBE
0963 E 00                   GETI    SEL1
0964 E A200                 MOV     XA,PM_PNT
0966   9A00        CONLP:   SKE     A,#0
0968   8BED                 MOV     HL,#N6          ;WHEN M IS > 0
096A   8BE5                 MOV     HL,#N2          ;FOR 'CON'
096C E 00                   GETI    SEL0
096D E 8400                 CLR1    KEY_HLD         ;3/28/88 AJB NEW!!!
096F E 9200                 MOV     MULTA,XA
0971   8903                 MOV     XA,#3           ;TIMES 3
0973 E 9200                 MOV     MULTB,XA
0975 E AB4000               CALL    !MULT8          ;MULTIPLY
0978 E A200                 MOV     XA,MULTB
097A   8D38                 MOV     DE,#CONTAB      ;
097C E 00                   GETI    ADDBYT          ;XA HAS INDEX
097D E 00                   GETI    XCXADE          ;PUT RESULT IN DE
097E   9A0E                 MOV     C,#0            ;INIT COUNTER
0980   D4          CONLP1:  MOVT    XA,@PCDE        ;GET SEGMENT CODE
0981   AB491C               CALL    !DSPSEG         ;OUTPUT CHAR
0984 E 00                   GETI    DINCSHL
0985   C4                   INCS    E
0986   01                   BR      CONLD
0987   C5                   INCS    D
0988   C6          CONLD:   INCS    C
0989   9A36                 SKE     C,#3            ;UNTIL 3 ARE OUT
098B   F4                   BR      CONLP1
098C E 00                   GETI    SEL1
098D E A200                 MOV     XA,PM_PNT
098F   9A00                 SKE     A,#0
0991   05                   BR      CONGO
0992   C0                   INCS    A
0993 E 9200                 MOV     PM_PNT,XA       ;STORE IT
0995   5966                 BR      CONLP
0997               CONGO:   ;CLEAR ALL NUMBERS 9-12
0997   89AA                 MOV     XA,#0AAH
0999   8BF3                 MOV     HL,#N9
099B   AB4A24               CALL    !DSP2SG
099E   8BF7                 MOV     HL,#N11
09A0   AB4A24               CALL    !DSP2SG
09A3   B4FD                 CLR1    DEGF
09A5   A4FD                 CLR1    DEGC
09A7   84E0                 CLR1    WEEKEND         ;ONLY TURNED ON FOR 5
09A9 E 8D06                 MOV     DE,#PMIBUF+6
09AB E A200                 MOV     XA,PM_PNT       ;MISTAKE 11/19/87
09AD   C8                   DECS    A
09AE E 00                   GETI    SEL0
09AF E 9200                 MOV     MULTA,XA
09B1   8902                 MOV     XA,#2
09B3 E 9200                 MOV     MULTB,XA
09B5 E AB4000               CALL    !MULT8          ;2 * (PM_PNT-1)
09B8 E A200                 MOV     XA,MULTB
09BA E 00                   GETI    ADDBYT          ;OFFSET + PMIBUF+6
09BB E 00                   GETI    SEL1
09BC E 9200                 MOV     PM_PRD,XA       ;STORE POINTER FOR UP/DN-CON !!!
09BE   AA42                 XCH     XA,HL           ;PUT IN HL
09C0 E A200                 MOV     XA,PM_PNT
09C2   8DF9                 MOV     DE,#N12         ;MOST START HERE
09C4   9A10                 SKE     A,#1            ;HCD IN BCD
```

```
09C6      0D                  BR      CONC2
09C7 E    00                  GETI    MXA@HL
09C8      9A01                SKE     X,#0
09CA      02                  BR      CONC1A
09CB      9AA9                MOV     X,#10          ;BLANK CHAR
09CD      8DF7       CONC1A:  MOV     DE,#N11
09CF      AB4A3B              CALL    !DSD2SG        ;SEND OUT
09D2      5A1D                BR      CONXIT
09D4      9A20       CONC2:   SKE     A,#2
09D6      59E8                BR      CONC3
09D8 E    00                  GETI    MXA@HL
09D9      9A00                SKE     A,#0
09DB      06                  BR      CONC2A
09DC      8911                MOV     XA,#17         ; F
09DE      B5FD                SET1    DEGF
09E0      5A15                BR      CONOU1
09E2      890D       CONC2A:  MOV     XA,#13         ; C
09E4      A5FD                SET1    DEGC
09E6      5A15                BR      CONOU1
09E8      9A30       CONC3:   SKE     A,#3
09EA      0E                  BR      CONC4
09EB E    00                  GETI    MXA@HL
09EC      9A00                SKE     A,#0
09EE      8924                MOV     XA,#24H        ; 24 HOUR  VERTICAL INST.
09F0      8912                MOV     XA,#12H        ; 12 HOUR
09F2      8DF7                MOV     DE,#N11
09F4      AB4A3B              CALL    !DSD2SG
09F7      5A1D                BR      CONXIT
09F9      9A40       CONC4:   SKE     A,#4
09FB      5A0F                BR      CONC5
09FD E    00                  GETI    MXA@HL         ;GET THE BCD FILTER
09FE      8DF3                MOV     DE,#N9
0A00      9A01                SKE     X,#0           ;IS 1ST DIGIT 0
0A02      02                  BR      CONC4A
0A03      9AA9                MOV     X,#10          ;BLANK CHAR
0A05      AB4A3B     CONC4A:  CALL    !DSD2SG
0A08 E    00                  GETI    MXA_00
0A09      8DF7                MOV     DE,#N11
0A0B      AB4A3B              CALL    !DSD2SG        ;PUT OUT 2 ZEROES
0A0E      0E                  BR      CONXIT
0A0F                 CONC5:           ;NOW CHECK FOR 5 FOR WEEKEND
0A0F      9A50                SKE     A,#5
0A11      02                  BR      CONOUT
0A12      85E0                SET1    WEEKEND
0A14 E    00         CONOUT:  GETI    MXA@HL         ;GET NUMBER
0A15      AA42       CONOU1:  XCH     XA,HL
0A17 E    00                  GETI    XCXADE
0A18      AA42                XCH     XA,HL
0A1A      AB491C              CALL    !DSPSEG
                              ;
0A1D      9906       CONXIT:  POP     BS
0A1F      4A                  POP     HL
0A20      4C                  POP     DE
0A21      4E                  POP     BC
0A22      48                  POP     XA
0A23      EE                  RET
                     ;
                     ;*****************************************************************
```

```
                        ;***********************************************************
                        ;
                        ;       NAME:DSP2SG -
                        ;
                        ;       INPUT:
                        ;  XA - CONTAINS 2 NUMBERS
                        ;  HL - CONTAINS ADDRESS OF 1ST OF 2 CONSECUTIVE SEGMENTS
                        ;
                        ;***********************************************************
0A24    49              DSP2SG: PUSH    XA
0A25    4F                      PUSH    BC
0A26    4B                      PUSH    HL
0A27    AA56                    MOV     BC,XA           ;STORE COPY
0A29    D9                      XCH     A,X
0A2A    9A09                    MOV     X,#0
0A2C    AB491C                  CALL    !DSPSEG
0A2F E  00                      GETI    DINCSHL
0A30    AA46                    XCH     XA,BC           ;RESTORE XA
0A32    9A09                    MOV     X,#0
0A34    AB491C                  CALL    !DSPSEG
0A37    4A                      POP     HL
0A38    4E                      POP     BC
0A39    48                      POP     XA
0A3A    EE                      RET
                        ;***********************************************************
                        ;***********************************************************
                        ;
                        ;       NAME:DSD2SG -
                        ;
                        ;       INPUT:
                        ;  XA - CONTAINS 2 NUMBERS
                        ;  DE - CONTAINS ADDRESS OF 1ST OF 2 CONSECUTIVE SEGMENTS
                        ;
                        ;***********************************************************
0A3B    49              DSD2SG: PUSH    XA
0A3C    4F                      PUSH    BC
0A3D    4B                      PUSH    HL
0A3E    AA56                    MOV     BC,XA           ;STORE COPY
0A40    AA5C                    MOV     XA,DE
0A42    AA52                    MOV     HL,XA           ;PUTS DE IN HL
0A44    AA5E                    MOV     XA,BC           ;GET COPY BACK
0A46    D9                      XCH     A,X
0A47    9A09                    MOV     X,#0
0A49    AB491C                  CALL    !DSPSEG
0A4C E  00                      GETI    DINCSHL
0A4D    AA46                    XCH     XA,BC           ;RESTORE XA
0A4F    9A09                    MOV     X,#0
0A51    AB491C                  CALL    !DSPSEG
0A54    4A                      POP     HL
0A55    4E                      POP     BC
0A56    48                      POP     XA
0A57    EE                      RET
                        ;***********************************************************
                        ;***********************************************************
                        ;
                        ;       NAME:DISHRS -
                        ;
                        ;       INPUT:
```

```
                        ;       XA - CONTAINS THE BCD HOURS
                        ;       DE - CONTAINS THE Nx SEGMENT FOR START OF HRS
                        ;
                        ;      IT MAY BE DIFFICULT TO FIGURE OUT WHICH AM/PM TO USE?
                        ;
                        ;**************************************************************
        (0A58)          DISHRS  EQU     $
0A58    49                      PUSH    XA
0A59    4F                      PUSH    BC
0A5A    4D                      PUSH    DE
0A5B    4B                      PUSH    HL
0A5C    9907                    PUSH    BS
0A5E E  00                      GETI    STNBE
0A5F E  00                      GETI    SEL0
0A60    AA46                    XCH     XA,BC
0A62 E  00                      GETI    XCXADE
0A63    AA42                    XCH     XA,HL           ;HL HAS SEGMENT ADDR FROM DE
0A65    AA5E                    MOV     XA,BC           ;COPY STAYS IN BC
0A67 E  8600                    SKF     ST3_CL
0A69    5AC8                    BR      TIMILT          ;24 HOUR TIME
                         ; 12 HR CLOCK
0A6B E  AB4000                  CALL    !BCD2BIN        ;XA TO BIN
0A6E    8D0C                    MOV     DE,#12
0A70 E  00                      GETI    SUBSXD
0A71    5A9D                    BR      TMPM
0A73    AA5E                    MOV     XA,BC           ;GET HOURS BACK IF AM
0A75    9A00                    SKE     A,#0
0A77    07                      BR      TMAM1
0A78    9A01                    SKE     X,#0
0A7A    04                      BR      TMAM1
0A7B    8912                    MOV     XA,#12H         ;12 MIDNIGHT
0A7D    AA56                    MOV     BC,XA
0A7F E  00              TMAM1:  GETI    SEL1
0A80 E  00                      GETI    MVXAHL
0A81 E  00                      GETI    XCXADE
0A82    89E3                    MOV     XA,#N1
0A84 E  00                      GETI    SUBSXD
0A85    5A97                    BR      TMAP1
0A87    89EB                    MOV     XA,#N5
0A89 E  00                      GETI    SUBSXD
0A8A    06                      BR      TMAP2
0A8B    95FD                    SET1    AM3             ;TMAP3
0A8D    84FD                    CLR1    PM3
0A8F    5AD6                    BR      TMTIME
0A91    A5FC            TMAP2:  SET1    AM2
0A93    94FC                    CLR1    PM2
0A95    5AD6                    BR      TMTIME
0A97    A5FB            TMAP1:  SET1    AM1
0A99    94FB                    CLR1    PM1
0A9B    5AD6                    BR      TMTIME
0A9D E  00              TMPM:   GETI    SEL1
0A9E    9A00                    SKE     A,#0
0AA0    06                      BR      TMPM1
0AA1    9A01                    SKE     X,#0
0AA3    03                      BR      TMPM1
0AA4    8912                    MOV     XA,#12H         ;WAS 12 NOON
0AA6    03                      BR      TMPM2
0AA7                    TMPM1:
```

```
0AA7 E AB4000           CALL    !BIN2BCD        ;CONVERT XA FOR PM
0AAA   AA56     TMPM2:  MOV     BC,XA           ;STORE IT
0AAC E 00               GETI    MVXAHL
0AAD E 00               GETI    XCXADE
0AAE   89E3             MOV     XA,#M1
0AB0 E 00               GETI    SUBSXD
0AB1   5AC3             BR      TPAP1
0AB3   89ED             MOV     XA,#M5
0AB5 E 00               GETI    SUBSXD
0AB6   06               BR      TPAP2
0AB7   85FD             SET1    PM3             ;TPAP3
0AB9   94FD             CLR1    AM3
0ABB   5AD6             BR      TMTIME
0ABD   95FC     TPAP2:  SET1    PM2
0ABF   A4FC             CLR1    AM2
0AC1   5AD6             BR      TMTIME
0AC3   95FB     TPAP1:  SET1    PM1
0AC5   A4FB             CLR1    AM1
0AC7   0E               BR      TMTIME
0AC8 E 00       TIMILT: GETI    SEL1
0AC9   A4FC             CLR1    AM2
0ACB   94FC             CLR1    PM2             ;NO AM OR PM
0ACD   A4FB             CLR1    AM1
0ACF   94FB             CLR1    PM1
0AD1   94FD             CLR1    AM3
0AD3   84FD             CLR1    PM3             ;ALL FOR GOOD MEASURE
0AD5   07               BR      TMTIMO
0AD6   AA5E     TMTIME: MOV     XA,BC           ;RESTORE TIME
0AD8   9A01             SKE     X,#0
0ADA   02               BR      TMTIMO
0ADB   9AA9             MOV     X,#10
0ADD   AB4A24   TMTIMO: CALL    !DSP2SG         ;AJB 11/4
0AE0   9906             POP     BS
0AE2   4A               POP     HL
0AE3   4C               POP     DE
0AE4   4E               POP     BC
0AE5   48               POP     XA
0AE6   EE               RET
                ;-----------------------------------------------
                ;*****************************************************************
                ;
                ;******************** START OF OUTDIS ***********************
                ;
       (0AE7)   OUTDIS  EQU     $
0AE7 E 00               GETI    CLMBE
                        ;SET UP TIMER
0AE8   70               MOV     A,#0
0AE9 E 9300             MOV     TSB7RP,A
0AEB   8904             MOV     XA,#4
0AED E 9200             MOV     TSB7TM,XA       ;125mSEC
                ; CHECK CURRENT TIER
0AEF E 8700             SKT     ST2_RH
0AF1   03               BR      ODMTPK
0AF2 E 8600             SKF     ST2_RL          ;CRITICAL LED CODE
0AF4   06               BR      ODLDON
0AF5 E 8700     ODMTPK: SKT     ST0_PP
0AF7   06               BR      ODLDFF
0AF8   BFD3             SKT     PORT3.1         ;OFF NOW
```

```
0AFA    03              BR      ODLOFF
0AFB    9CD3    ODLDON: CLR1    PORT3.1         ;TURN IT ON
0AFD    02              BR      ODNXT
0AFE    9DD3    ODLOFF: SET1    PORT3.1         ;TURN IT OFF
0B00 E  8700    ODNXT:  SKT     STO_EH
0B02    03              BR      EH_OFF
0B03    9CF3            CLR1    PORT3.3
0B05    02              BR      ODNXT1
0B06    9DF3    EH_OFF: SET1    PORT3.3
0B08 E  A200    ODNXT1: MOV     XA,STATE
0B0A E  00              GETI    STMBE           ;11/10/87
0B0B    9A60            SKE     A,#6
0B0D    01              BR      ODCK5
0B0E    08              BR      ODZS            ;TREAT 6 LIKE 0!! 11/10/87
0B0F    9A50    ODCK5:  SKE     A,#5
0B11    01              BR      ODCK0
0B12    04              BR      ODZS            ;TREAT 5 LIKE 0!! 11/11/87
0B13    9A00    ODCK0:  SKE     A,#0
0B15    5CBE            BR      ODNZS           ;NON ZERO STATE,CHARGE!!
                ; STATE IS 0!!!!!
0B17 E  00      ODZS:   GETI    STMBE
0B18 E  00              GETI    SEL0
                ; FLASH COLON   ,COLON2
0B19 E  A200            MOV     XA,TSB7PA
0B1B    C0              INCS    A
0B1C    9A20            SKE     A,#2
0B1E    01              BR      ODNOP
0B1F    70              MOV     A,#0
0B20 E  9200    ODNOP:  MOV     TSB7PA,XA
0B22    9A00            SKE     A,#0
0B24    5B4C            BR      ODNXT4
0B26 E  00              GETI    SEL1            ;MB1 !!
0B27    A7FE            SKT     COLON2
0B29    03              BR      ODCL0
0B2A    A4FE            CLR1    COLON2
0B2C    02              BR      ODGO
0B2D    A5FE    ODCL0:  SET1    COLON2          ;TURN IT ON
0B2F E  00      ODGO:   GETI    SEL0
0B30 E  8700            SKT     ST4_FT          ;FLASH TEMP
0B32    07              BR      ODNXT2
                        ;CLEAR TEMP
0B33    89AA            MOV     XA,#0AAH        ;BLANK INDEX
0B35    8BF7            MOV     HL,#N11         ;1ST TEMP DIGIT
0B37    AB4A24          CALL    !DSP2SG         ;AJB 11/4
0B3A            ODNXT2:                 ;CHECK FOR FLASHING TIME
0B3A E  8700            SKT     ST4_FC
0B3C    5D46            BR      ODEXIT
                        ;CLEAR TIME N5-8
0B3E    89AA            MOV     XA,#0AAH        ;BLANK INDEX
0B40    8BED            MOV     HL,#N5
0B42    AB4A24          CALL    !DSP2SG
0B45    8BEF            MOV     HL,#N7
0B47    AB4A24          CALL    !DSP2SG         ;AJB 11/4
0B4A    5D46            BR      ODEXIT
0B4C            ODNXT4:         ;DISPLAY TIME TEMP AND STATUSES
0B4C E  00              GETI    SEL0
0B4D E  A200            MOV     XA,TIMEHR
0B4F    8DEB            MOV     DE,#N5          ;TIME OUTPUT HERE
```

```
0B51   AB4A58          CALL   !DISHRS        ;OUTPUTS HOURS
                                             ;MINUTES NEXT
0B54 E A200            MOV    XA,TIMEMIN
0B56   8BEF            MOV    HL,#N7         ;MOVE TO MINUTES PLACE
0B58   AB4A24          CALL   !DSP2SG

                ; CHECK FOR CTEMP OR FTEMP!!!!!!
0B5B E 8700            SKT    ST3_C
0B5D   0E              BR     ODDGF
                ; DEG C
0B5E E 00              GETI   SEL1
0B5F   A5FD            SET1   DEGC
0B61   B4FD            CLR1   DEGF
0B63 E 00              GETI   SEL0
0B64 E A200            MOV    XA,CTEMP
0B66   8BF7            MOV    HL,#N11
0B68   AB4A24          CALL   !DSP2SG
0B6B   0D              BR     ODSTAT

                ; DEG F
0B6C E 00       ODDGF: GETI   SEL1
0B6D   B5FD            SET1   DEGF
0B6F   A4FD            CLR1   DEGC
0B71 E 00              GETI   SEL0
                ;SPECIAL DELETE ME CODE ??????????????????????
                ;      MOV    XA,OLDTMP
                ;      CALL   !BIN2BCD
                ;      MOV    HL,#N9      DISPLAYS ACTUAL TEMP FOR TESTING AJB 5/18/88
                ;      CALL   !DSP2SG
                ;SPECIAL DELETE ME CODE ??????????????????????
0B72 E A200            MOV    XA,FTEMP
0B74   8BF7            MOV    HL,#N11
0B76   AB4A24          CALL   !DSP2SG
0B79            ODSTAT:              ;OUTPUT STATUS ELEMENTS
0B79 E 8700            SKT    ST0_WE         ;WEEKEND
0B7B   06              BR     ODWD
                       ;WEEKEND
0B7C E 00              GETI   SEL1
0B7D   84E1            CLR1   WEEKDAY
0B7F   85E0            SET1   WEEKEND
0B81   05              BR     ODST1
0B82 E 00       ODWD:  GETI   SEL1
0B83   84E0            CLR1   WEEKEND
0B85   85E1            SET1   WEEKDAY
0B87            ODST1:               ;LOAD CONTROL
0B87 E 00              GETI   SEL0
0B88 E 8700            SKT    ST0_LC
0B8A   5BA9            BR     ODNLC
0B8C E 00              GETI   SEL1
0B8D E 8700            SKT    ST5_FL  ;LOAD CONTROL,SKIP IF  FLASHING
0B8F   5BA6            BR     ODNFL   ;FLASH LOAD CONTROL
0B91   87E2            SKT    LDCNTRL
0B93   03              BR     ODLF
0B94   84E2            CLR1   LDCNTRL
0B96   02              BR     ODLF1
0B97   85E2     ODLF:  SET1   LDCNTRL
0B99 E A300     ODLF1: MOV    A,LC_CNT
0B9B   C0              INCS   A
0B9C E 9300            MOV    LC_CNT,A       ;STORE IT
```

```
0B9E   9A90                 SKE    A,#9
0BA0   0B                   BR     ODST2
0BA1 E 8400                 CLR1   ST5_FL
0BA3   70                   MOV    A,#0
0BA4 E 9300                 MOV    LC_CNT,A       ;ZERO IT OUT
0BA6   85E2         ODMFL:  SET1   LDCNTRL
0BA8   03                   BR     ODST2
0BA9 E 00           ODMLC:  GETI   SEL1
0BAA   84E2                 CLR1   LDCNTRL
0BAC                ODST2:                ;TEMPERATURE HOLD
0BAC E 00                   GETI   SEL0
0BAD E 8600                 SKF    ST1_TH
0BAF   05                   BR     ODHC
0BB0 E 00                   GETI   SEL1
0BB1   A4E2                 CLR1   HOLD1
0BB3   B4E2                 CLR1   HOLD2
                    ; CHECK FOR HEATING OR COOLING
0BB5 E 00           ODHC:   GETI   SEL0
0BB6 E 8700                 SKT    SW1_HT
0BB8   5BDF                 BR     ODCL
0BBA E 00                   GETI   SEL1
0BBB   A5E1                 SET1   HSETNG
0BBD   B4E1                 CLR1   CSETNG
0BBF   8BE3                 MOV    HL,#N1         ; POSITION
0BC1 E 8700                 SKT    ST5_HC
0BC3   890A                 MOV    XA,#0AH        ; BLANK
0BC5   8912                 MOV    XA,#18         ; H
0BC7   AB491C               CALL   !DSPSEG
0BCA E 00                   GETI   SEL0
0BCB E 8700                 SKT    ST1_TH
0BCD   5C1E                 BR     ODSET
0BCF E 00                   GETI   SEL1
0BD0   A7E2                 SKT    HOLD1
0BD2   06                   BR     ODH1F
0BD3   A4E2                 CLR1   HOLD1
0BD5   B4E2                 CLR1   HOLD2
0BD7   5C1E                 BR     ODSET
0BD9   A5E2         ODH1F:  SET1   HOLD1
0BDB   B4E2                 CLR1   HOLD2
0BDD   5C1E                 BR     ODSET
0BDF E 8700         ODCL:   SKT    SW1_CL
0BE1   5C08                 BR     ODNHC
0BE3 E 00                   GETI   SEL1
0BE4   B5E1                 SET1   CSETNG
0BE6   A4E1                 CLR1   HSETNG
0BE8   8BE3                 MOV    HL,#N1
0BEA E 8700                 SKT    ST5_HC
0BEC   890A                 MOV    XA,#0AH        ; BLANK
0BEE   890D                 MOV    XA,#13         ; C
0BF0   AB491C               CALL   !DSPSEG        ;WRITE IT OUT
0BF3 E 00                   GETI   SEL0
0BF4 E 8700                 SKT    ST1_TH
0BF6   5C1E                 BR     ODSET
0BF8 E 00                   GETI   SEL1
0BF9   B7E2                 SKT    HOLD2
0BFB   06                   BR     ODH2F
0BFC   B4E2                 CLR1   HOLD2
0BFE   A4E2                 CLR1   HOLD1
```

```
0C00   5C1E                BR     ODSET
0C02   B5E2       ODH2F:   SET1   HOLD2
0C04   A4E2                CLR1   HOLD1
0C06   5C1E                BR     ODSET
0C08 E 00         ODHHC:   GETI   SEL1
0C09   A4E1                CLR1   HSETNG
0C0B   B4E1                CLR1   CSETNG
0C0D   A4E2                CLR1   HOLD1
0C0F   B4E2                CLR1   HOLD2          ;JUST FOR GOOD MEASURE
0C11   89AA                MOV    XA,#0AAH       ;BLANK
0C13   8BE7                MOV    HL,#N3
0C15   AB4A24              CALL   !DSP2SG
0C18   8BE3                MOV    HL,#N1
0C1A   AB4A24              CALL   !DSP2SG
0C1D   08                  BR     ODST3
0C1E E 00         ODSET:   GETI   SEL0           ;SET POINT
0C1F E A200                MOV    XA,SETPNT
0C21   8BE7                MOV    HL,#N3
0C23   AB4A24              CALL   !DSP2SG        ;DISPLAY 2 SEGMENTS
0C26 E 00         ODST3:   GETI   SEL0           ;HEAT WATER
0C27 E 8700                SKT    ST1_HW
0C29   04                  BR     ODNHW
0C2A E 00                  GETI   SEL1
0C2B   95E2                SET1   HTWATER
0C2D   03                  BR     ODST4
0C2E E 00         ODNHW:   GETI   SEL1
0C2F   94E2                CLR1   HTWATER
0C31              ODST4:                         ;CURRENT TIER
0C31   85EA                SET1   PRICE
0C33   95FF                SET1   TEMP           ; FOR TEMPERATURE!!!!
0C35 E 00                  GETI   SEL0           ;NO ACTUAL-AJB11/4/87
0C36 E 8700                SKT    ST2_RH
0C38   5C53                BR     ODLOM          ;BLANK OUT H OR C
0C3A E 8700                SKT    ST2_RL
0C3C   0B                  BR     ODHI
                           ;PEAK
0C3D E 00                  GETI   SEL1
0C3E   84F4                CLR1   LHIGH
0C40   84FB                CLR1   LLOW
0C42   84F0                CLR1   MEDIUM
0C44   85F8                SET1   CRIT
0C46   5C6A                BR     ODST5
0C48 E 00         ODHI:    GETI   SEL1
0C49   84FB                CLR1   LLOW
0C4B   84F0                CLR1   MEDIUM
0C4D   84F8                CLR1   CRIT
0C4F   85F4                SET1   LHIGH
0C51   5C6A                BR     ODST5
0C53 E 00         ODLOM:   GETI   SEL0
0C54 E 8700                SKT    ST2_RL
0C56   0A                  BR     ODLO
                           ;MEDIUM
0C57 E 00                  GETI   SEL1
0C58   84F4                CLR1   LHIGH
0C5A   84FB                CLR1   LLOW
0C5C   84F8                CLR1   CRIT
0C5E   85F0                SET1   MEDIUM
0C60   09                  BR     ODST5
```

```
0C61 E 00          ODIO:    GETI   SEL1
0C62   84F4                 CLR1   LHIGH
0C64   84F8                 CLR1   CRIT
0C66   84F0                 CLR1   MEDIUM
0C68   85FB                 SET1   LLOW
0C6A               ODST5:          ; TIME PERIOD
0C6A E 00                   GETI   SEL0
0C6B E 8700                 SKT    SW1_HT        ;TURN OFF DAY PERIOD IF SW1 IS OFF!!!!
0C6D E 8600                 SKF    SW1_CL
0C6F   0B                   BR     ODST5A
0C70 E 00                   GETI   SEL1
0C71   94E0                 CLR1   MORN
0C73   A4E0                 CLR1   DAY
0C75   B4E0                 CLR1   EVE
0C77   B4FF                 CLR1   NIGHT
0C79   5CB0                 BR     ODST6
0C7B E 00          ODST5A:  GETI   SEL0
0C7C E 8700                 SKT    ST2_CH
0C7E   5C99                 BR     ODMOD
0C80 E 8700                 SKT    ST2_CL
0C82   0B                   BR     ODEV
                            ;NIGHT
0C83 E 00                   GETI   SEL1
0C84   94E0                 CLR1   MORN
0C86   A4E0                 CLR1   DAY
0C88   B4E0                 CLR1   EVE
0C8A   B5FF                 SET1   NIGHT
0C8C   5CB0                 BR     ODST6
0C8E E 00          ODEV:    GETI   SEL1
0C8F   94E0                 CLR1   MORN
0C91   A4E0                 CLR1   DAY
0C93   B4FF                 CLR1   NIGHT
0C95   B5E0                 SET1   EVE
0C97   5CB0                 BR     ODST6
0C99 E 00          ODMOD:   GETI   SEL0
0C9A E 8700                 SKT    ST2_CL
0C9C   0A                   BR     ODMO
                            ;DAY
0C9D E 00                   GETI   SEL1
0C9E   94E0                 CLR1   MORN
0CA0   B4E0                 CLR1   EVE
0CA2   B4FF                 CLR1   NIGHT
0CA4   A5E0                 SET1   DAY
0CA6   09                   BR     ODST6
0CA7 E 00          ODMO:    GETI   SEL1
0CA8   B4E0                 CLR1   EVE
0CAA   B4FF                 CLR1   NIGHT
0CAC   A4E0                 CLR1   DAY
0CAE   95E0                 SET1   MORN
0CB0 E 00          ODST6:   GETI   SEL0   ;FILTER ELEMENT
0CB1 E 8700                 SKT    ST1_FL
0CB3   05                   BR     ODNOFL
0CB4 E 00                   GETI   SEL1
0CB5   85F2                 SET1   FILTER
0CB7   5D46                 BR     ODEXIT
0CB9 E 00          ODNOFL:  GETI   SEL1
0CBA   84F2                 CLR1   FILTER
0CBC   5D46                 BR     ODEXIT
```

```
                                 ; NON ZERO STATES!!!!!!!!!!!!!!!!EXCEPT 6 !!!!!!!!
OCBE E 00             ODNZS:  GETI    SEL0            ;11/10/87
OCBF E A200                   MOV     XA,TSB7PA
OCC1   C0                     INCS    A
OCC2   9A20                   SKE     A,#2
OCC4   01                     BR      ODNHP
OCC5   70                     MOV     A,#0
OCC6 E 9200           ODNHP:  MOV     TSB7PA,XA
OCC8   9A00                   SKE     A,#0
OCCA   5CFA                   BR      ODNZ3           ; RESTORE SECTION
OCCC E 00                     GETI    SEL1            ; BLANKING SECTION
OCCD E 8700                   SKT     ST5_FW          ;CHECK FOR FLASH WD/WE
OCCF   04                     BR      ODNZ0
OCD0   84E1                   CLR1    WEEKDAY
OCD2   85E0                   SET1    WEEKEND
OCD4 E 8B00           ODNZ0:  MOV     HL,#FLASH1
OCD6 E 00                     GETI    MXA@HL
OCD7   9A01                   SKE     X,#0
OCD9   05                     BR      ODNZ1
OCDA   9A00                   SKE     A,#0
OCDC   02                     BR      ODNZ1
OCDD   5D46                   BR      ODEXIT          ;IF NO FLASH 1 THEN NO FLASH 2, LEAVE
                              ; VALID FLASH1
OCDF   AA42           ODNZ1:  XCH     XA,HL           ;MOVE Nx INTO HL
OCE1   89AA                   MOV     XA,#OAAH
OCE3   AB4A24                 CALL    !DSP2SG
                              ; NOW CHECK FLASH 2
OCE6 E 8B00                   MOV     HL,#FLASH2
OCE8 E 00                     GETI    MXA@HL
OCE9   9A01                   SKE     X,#0
OCEB   05                     BR      ODNZ2
OCEC   9A00                   SKE     A,#0
OCEE   02                     BR      ODNZ2
OCEF   5D46                   BR      ODEXIT          ; NO FLASH 2, LEAVE
                              ; VALID FLASH2
OCF1   AA42           ODNZ2:  XCH     XA,HL           ;MOVE Nx INTO HL
OCF3   89AA                   MOV     XA,#OAAH
OCF5   AB4A24                 CALL    !DSP2SG
OCF8   5D46                   BR      ODEXIT
                              ;
OCFA                  ODNZ3:                  ;RESTORE SECTION!!!
OCFA E 00                     GETI    SEL1
OCFB E 8700                   SKT     ST5_FW          ;CHECK FOR FLASH WD/WE
OCFD   04                     BR      ODNZ3B
OCFE   85E1                   SET1    WEEKDAY
OD00   84E0                   CLR1    WEEKEND
OD02 E 8B00           ODNZ3B: MOV     HL,#REST2
OD04 E 00                     GETI    MXA@HL          ;GET VALUE OF REST2 POINTER
OD05   9A01                   SKE     X,#0
OD07   5D29                   BR      ODNZ4
OD09   9A00                   SKE     A,#0
OD0B   5D29                   BR      ODNZ4
                              ;NO RESTORE 2 SO REST1 MUST BE A TEMP, IF IT EXISTS
OD0D E 8B00                   MOV     HL,#REST1
OD0F E 00                     GETI    MXA@HL          ;GET VALUE OF REST1,POINTER
OD10   9A01                   SKE     X,#0
OD12   05                     BR      ODNZ3A
OD13   9A00                   SKE     A,#0
```

```
0D15   02                    BR     ODNZ3A
0D16   5D46                  BR     ODEXIT          ;NO REST1
0D18   AA42          ODNZ3A: XCH    XA,HL           ;PUT POINTER IN HL
0D1A E 00                    GETI   MXA@HL          ;GET VALUE FROM PMIBUF
0D1B   AA46                  XCH    XA,BC
0D1D E 8B00                  MOV    HL,#FLASH1      ;GET POSITION
0D1F E 00                    GETI   MXA@HL
0D20   AA42                  XCH    XA,HL           ;PUT Nx IN HL
0D22   AA46                  XCH    XA,BC           ;RECOVER VALUE
0D24   AB4A24                CALL   !DSP2SG         ;OUT IT GOES
0D27   5D46                  BR     ODEXIT          ;
0D29                 ODNZ4:  ; VALID RESTORE 2! THEREFORE IT MUST BE A TIME!!!
0D29   AA42                  XCH    XA,HL           ;POINTER INTO HL
0D2B E 00                    GETI   MXA@HL          ;GET MINUTES
0D2C   AA46                  XCH    XA,BC           ;STORE IT
0D2E E 8B00                  MOV    HL,#FLASH2      ;GET POSITION
0D30 E 00                    GETI   MXA@HL          ;GET Mx
0D31   AA42                  XCH    XA,HL           ;PUT IN HL
0D33   AA46                  XCH    XA,BC           ;RESTORE VALUE
0D35   AB4A24                CALL   !DSP2SG
0D38 E 8B00                  MOV    HL,#REST1       ;MUST BE A REST1 IF REST2
0D3A E 00                    GETI   MXA@HL
0D3B   AA42                  XCH    XA,HL           ;POINTER INTO HL
0D3D E 00                    GETI   MXA@HL          ;GET VALUE
0D3E E 00                    GETI   XCXADE          ;SAVE IT
0D3F E 8B00                  MOV    HL,#FLASH1
0D41 E 00                    GETI   MXA@HL
0D42 E 00                    GETI   XCXADE          ;PUT IN DE,AND RESTORE VALUE
0D43   AB4A58                CALL   !DISHRS
                             ;MAGIC 12 HOUR
0D46 E 00            ODEXIT: GETI   SEL0            ;standard mainsub exit
0D47 E 8500                  SET1   TSB7T           ;START TIMER
0D49   E0                    RETS
                     ;****************************OUTDIS END**************************
                     ;
0D4A   434F5059              DB   'COPYRIGHT (C) JOHNSON CONTROLS, INC. 1987, 1988.'
0D4E   52494748
0D52   54202843
0D56   29204A4F
0D5A   484E534F
0D5E   4E20434F
0D62   4E54524F
0D66   4C532C20
0D6A   494E432E
0D6E   20313938
0D72   372C2031
0D76   3938382E
0D7A   414C4C20              DB   'ALL RIGHTS RESERVED.'
0D7E   52494748
0D82   54532052
0D86   45534552
0D8A   5645442E
0D8E   416C616E              DB   'Alan J. Bronikowski, P.E.'
0D92   204A2E20
0D96   42726F6E
0D9A   696B6F77
0D9E   736B692C
0DA2   20502E45
```

```
    0DA6   2E
                                END

TARGET CHIP : UPD75308
STACK SIZE = 0000H

ASSEMBLY COMPLETE,  NO ERROR FOUND


   ** SUBROUTINES FOR TSTAT-AJB                                **

COMMAND     :                   (COMMAND FILE :            )
SUBS.ASM MOD=308

 STNO ADRS R OBJECT   IC MAC   SOURCE STATEMENT

                               $      TITLE='SUBROUTINES FOR TSTAT-AJB'
                               ;(*------------------------------------------------------------
                               ;(c) Copyright, Johnson Controls Incorporated, 1987.  All rights
                               ;   reserved. The following program is the exclusive property of
                               ;   Johnson Controls, Inc. and its use is restricted by license
                               ;   agreement to the system with which it was furnished.  The
                               ;   program contents are confidential and may not be disclosed
                               ;   or used outside the system without the express written
                               ;   consent of Johnson Controls.  This program is further
                               ;   protected by federal copyright law as an unpublished work
                               ;   and any unauthorized reproduction is prohibited.
                               ; 1. PURPOSE:
                               ;     SUBROUTINES for the tstat contains a number of subroutines
                               ;       which will help speed the development of code on the
                               ;       TSTAT.
                               ;         The two routines which are now present are called
                               ;       INITBLK and ADDBYTE.  The first one initializes a block
                               ;       of data and the second will add two bytes together and
                               ;       return the sum in register pair XA.
                               ;
                               ;
                               ; 2. INPUTS:
                               ;     INITBLK   - XA = VALUE TO INITIALIZE
                               ;                 HL = POINTER TO DATA AREA
                               ;                 DE = NUMBER OF BYTES TO INITIALIZE
                               ;
                               ;     INCS_HL   - HL = REGISTER PAIR TO BE INCREMENTED
                               ;
                               ;     SUBS_XADE - XA = MINUEND(SUBTRACTEE)
                               ;                 DE = SUBTRAHEND(SUBTRACTOR)
                               ;
                               ;     ADDBYTE   - XA = ADDEND
                               ;                 DE = 2ND ADDEND
                               ;
                               ;     BCD2BIN   - XA = BCD NUMBER
                               ;
                               ;     BIN2BCD   - XA = BINARY NUMBER
                               ;
                               ;     MULT8     - MULTA = MULTIPLICAND
                               ;                 MULTB = MULTIPLIER
                               ;
                               ;     DIV16     - DIVA  = 16 BIT DIVIDEND
```

```
;                   DIVB  =  8 BIT DIVISOR
;
;     DOCHKSM   - HL = POINTER TO BUFFER AREA(1ST BYTE MUST
;                      HAVE BYTE COUNT OF DATA FIELD)
;
;     VCHKSMS   - HL = POINTER TO BUFFER AREA(1ST BYTE MUST
;                    HAVE BYTE COUNT OF DATA FIELD, IF BAD
;                    CHECKSUM IT does NEXT INSTRUCTION. IF
;                    valid IT skips!!! NEXT INSTRUCTION!)
;
; 3. GLOBAL VARIABLES:
;     None
; 4. OUTPUTS:
;     ADDBYTE - XA = SUM OF XA + DE
;
;     BCD2BIN - XA = BINARY RESULT
;
;     BIN2BCD - XA = BCD RESULT
;
;     MULT8   - MULTA = HIGH-ORDER 8 BITS OF RESULT
;               MULTB = LOW-ORDER 8 BITS OF RESULT
;
;     DIV16   - DIVA  = 16 BIT QUOTIENT
;               DIVB  =  8 BIT REMAINDER
;
;     DOCHKSM - PUTS CHECKSUM IN MESSAGE
;
;     VCHKSMS - SKIPS IF MESSAGE HAS VALID CHECKSUM!
;
; 5. PROCEDURES CALLED:
;     None
; 6. EXCEPTIONS:
;     None
; 7. UNIQUE FEATURES:
;     None
; 8. HISTORY
;     ORIGINAL - 07/16/87 - Alan J.Bronikowski Rev A000
;     REVISION - 08/18/87 - Alan J.Bronikowski Rev A000-added
;                           to BCD conversion
;     REVISION - 08/26/87 - Alan J.Bronikowski Rev A000-
;                           added MULT8 AND DIV16
;     REVISION - 03/23/88 - Alan J. Bronikowski Rev A002
;                           added code to VCHKSM to check for
;                           valid byte counts!!!!
;-------------------------------------------------------------*)
        NAME    SUBS            ;COLLECTION OF SUBROUTINES
CSUBS   CSEG    INBLOCK         ;SET UP AS SUBROUTINE ENTRIES
        PUBLIC  INITBLK
        PUBLIC  INCS_HL
        PUBLIC  DINCS_HL
        PUBLIC  ADDBYTE
        PUBLIC  ADDCY           ;SECONDARY ENTRY PT. OF ADDBYTE
        PUBLIC  ADCDBL
        PUBLIC  ADDS_DEXA
        PUBLIC  SUBS_XADE
        PUBLIC  BCD2BIN
        PUBLIC  BIN2BCD
        PUBLIC  MULT8
```

```
                        PUBLIC  DIV16
                        PUBLIC  DOCHKSM
                        PUBLIC  VCHKSMS
                        PUBLIC  F2C
                        PUBLIC  C2F
                        PUBLIC  BUF2C
                        PUBLIC  BUF2F
                        EXTRN   CODE(INCSHL,DINCSHL,STMBE,CLMBE,SUBSXD,ADDBYT)
                        EXTRN   CODE(MXA@HL,MVSTXA,XCXADE,SEL1,MVXAHL)
                        EXTRN   DATA(MULTA,MULTB,DIVA,DIVB,PMIBUF,RCXMB)
                  ;*********************INITBLK*************************************
                  ;                                                               *
                  ;    INPUTS:                                                    *
                  ;     INITBLK - XA = VALUE TO INITIALIZE                        *
                  ;               HL = POINTER TO DATA AREA                       *
                  ;               DE = NUMBER OF BYTES TO INITIALIZE              *
                  ;    OUTPUTS:                                                   *
                  ;           DATA AREA IS INITIALIZED                            *
                  ;                                                               *
                  ;****************************************************************
      R (0000)    INITBLK EQU     $               ;CAN'T PUSH HL BECAUSE IT IS
 0000  E8         INIT1:  MOV     @HL,A           ;PUT THE VALUE FROM A
 0001  C2                 INCS    L               ;FOR BYTE ADDRESSS
 0002  02                 BR      INTCON
 0003  C3                 INCS    H               ;L IS 0 IF YOU GET HERE
 0004  60                 NOP                     ;IN CASE H IS F
 0005  CC         INTCON: DECS    E
 0006  F9                 BR      INIT1
 0007  CD                 DECS    D               ;7/22 THIS IS THE WAY
 0008  F7                 BR      INIT1
 0009  EE                 RET                     ; ONLY EXIT HERE!  OK-AJB7/22
                  ;          REMOVED MOV E,#OFH BECAUSE IT WAS UNNECCESSARY
                  ;****************************************************************
                  ;
                  ;*********************INCS_HL*************************************
                  ;                                                               *
                  ;    INPUTS:                                                    *
                  ;                                                               *
                  ;     INCS_HL - HL REGISTER PAIR                                *
                  ;                                                               *
                  ;    OUTPUTS:                                                   *
                  ;                                                               *
                  ;     INCS_HL - HL INCREMENTED REGISTER PAIR, SKIPS NEXT INST.  *
                  ;               IF HL=0                                         *
                  ;                                                               *
                  ;****************************************************************
      R (000A)    INCS_HL EQU     $
 000A  C2                 INCS    L
 000B  01                 BR      INCCON
 000C  C3                 INCS    H               ;L IS 0 IF YOU GET HERE
 000D  EE         INCCON: RET                     ;NORMAL RETURN
 000E  E0                 RETS                    ;RETURN AND SKIP BOTH ZERO!
                  ;********************DINCS_HL*************************************
                  ;                                                               *
                  ;    INPUTS:                                                    *
                  ;                                                               *
                  ;    DINCS_HL - HL REGISTER PAIR                                *
                  ;                                                               *
                  ;    OUTPUTS:                                                   *
```

```
                      ;                                                              *
                      ;    DINCS_HL - HL INCREMENTED TWICE , SKIPS NEXT INSTRUCTION  *
                      ;                 IF HL=0                                      *
                      ;                                                              *
                      ;***************************************************************
     R (000F)         DINCS_HL EQU    $
0000F  C2                     INCS    L
0010   02                     BR      DNCC1
0011   C3                     INCS    H               ;L IS 0 IF YOU GET HERE
0012   60                     NOP
0013   C2             DNCC1:  INCS    L
0014   01                     BR      DNCCON
0015   C3                     INCS    H               ;L IS 0 IF YOU GET HERE
0016   EE             DNCCON: RET                     ;NORMAL RETURN
0017   E0                     RETS                    ;RETURN AND SKIP BOTH ZERO!
                      ;***************************************************************
                      ;
                      ;*********************SUBS_XADE*********************************
                      ;                                                              *
                      ;    INPUTS:                                                   *
                      ;                                                              *
                      ;     SUBS_XADE - XA = MINUEND(SUBTRACTEE)                     *
                      ;                 DE = SUBTRAHEND(SUBTRACTOR)                  *
                      ;                                                              *
                      ;    OUTPUTS:                                                  *
                      ;                                                              *
                      ;     SUBS_XADE - XA = RESULT OF XA - DE                       *
                      ;                      IF A BORROW IS NEEDED (DE>XA)           *
                      ;                      THE NEXT INSTRUCTION IS SKIPPED         *
                      ;***************************************************************
     R (0018)         SUBS_XADE EQU   $
0018   4F                     PUSH    BC
0019   4D                     PUSH    DE
001A   4B                     PUSH    HL
001B E 00                     GETI    CLMBE           ;FORCE MBO
001C   9A0E                   MOV     C,#0            ;CLEAR C FOR BORROW FLAG 9/17/87
001E   8B04                   MOV     HL,#04H         ;LOCATION OF DE
0020   A8                     SUBS    A,@HL
0021   04                     BR      SUBCON
0022   C9                     DECS    X               ;
0023   02                     BR      SUBCON          ;IF X WAS 0  9/15/87
0024   9A1E                   MOV     C,#1            ;SET C BORROW NEEDED 9/17/87
0026   C2             SUBCON: INCS    L               ;POINT TO D
0027   D9                     XCH     A,X
0028   A8                     SUBS    A,@HL
0029   05                     BR      SUBRET
002A   D9             SBRW:   XCH     A,X             ;SWITCH THEM BACK
002B   4A                     POP     HL
002C   4C                     POP     DE
002D   4E                     POP     BC
002E   E0                     RETS                    ;RETURN AND SKIP BORROW NEEDED!
002F   9A06           SUBRET: SKE     C,#0            ;9/17/87
0031   F8                     BR      SBRW            ;BORROW NEEDED SO DO RETS 9/17/87
0032   D9                     XCH     A,X
0033   4A                     POP     HL
```

APPENDIX B

MESSAGE TYPE A:
Time Message from Controller
(Reply to Temperature Message (B))

```
+----+----+
|      5   |      Byte Count (of Data Field)
|----+-----|
|   A=0    |      Message Type
|----+-----|
|      0   |      Address Field
|----+-----|
|  1 | 3   |      Hours (BCD)                      -|
|----+-----|                                        |
|  5 | 7   |      Minutes (BCD)                     |
|----+-----|                                        |   Data Field
|WDPE|THCF |      Status Byte 1                     |
|----+-----|                                        |
|xxZQ|RRMM |      Status Byte 2                     |
|----+-----|                                        |
|  7 | 0   |      Set Point Temperature (BCD)      -|
|----+-----|
|          |      Check Sum (  2's complement)
+----+-----+
```

Status Bytes:

BYTE 1
W - WeekEND bit (1=Weekend, 0=Weekday)
D - Direct Load Control bit (1=Yes, 0=No)
P - Peak Period Pending (flash peak LED)
E - Emergency Heat LED on (1=Yes, 0=No)
T - Temperature Hold element on (1=Yes, 0=No)
H - Heat Water Element on (1=Yes, 0=No)
C - Price Tier (0=4, 1=3)
F - Filter element on (1=Yes, 0=No)

BYTE 2
Z - Request Configuration (1=Yes, 0=No)
Q - HVAC unit is on (1=Yes, 0=No)
R - Current Tier (00=Low; 01=Medium; 10=High; 11=Peak)
M - Current Time Period (00=Morn; 01=Day; 10=Eve; 11=Night)
x - unused

MESSAGE TYPE B:
Temperature and Switch Setting Message to Controller

```
+----+-----+
|      2   |      Byte Count (of Data Field)
|----+-----|
|   B=1    |      Message Type
|----+-----|
|      0   |      Address Field
|----+-----|
|  6 | 8   |      Temperature (BCD)                -|
|----+-----|                                        |   Data Field
|xxxS|HCFE |      Switch Byte                      -|
|----+-----|
|          |      Check Sum  (  2's complement)
+----+-----+
```

Switch Byte:

S - State zero (S=0 when tstat in normal state)
H - Heating position
C - Cooling position (OFF if both H&C are reset)
F - Fan Auto position (OFF if reset)
E - Emergency Heat switch on
x - unused MESSAGE TYPE C:
HVAC Schedule to/from controller
a data field of 0 is a schedule request from tstat.
The address field is used to differentiate between Heat/Cool and Weekday/Weekend.

| Address | Schedule |
|---|---|
| 0 | Heat Weekday |
| 1 | Heat Weekend |
| 2 | Cool Weekday |
| 3 | Cool Weekend |

REQUEST

| | |
|---|---|
| 0 | Byte Count (of Data field) |
| C=2 | Message Type |
| N | Address Field (0-3, see Address definition above) |
| | Check Sum ( 2's complement) |

SCHEDULE

| | | |
|---|---|---|
| 24 | Byte Count (of Data Field) | |
| C=2 | Message Type | |
| N | Address Field (0-3, see Address definition above) | |
| 0 \| 6 | Start Time #1 | Data Field |
| 0 \| 0 | (MORN) (BCD) | |
| 7 \| 0 | Low Price Temperature (BCD) | |
| 6 \| 8 | Medium Price Temp. (BCD) | |
| 6 \| 6 | High Price Temp. (BCD) | |
| 6 \| 4 | Peak Price Temp. (BCD) | |
| 0 \| 8 | Start Time #2 | |
| 0 \| 0 | (DAY) (BCD) | |
| 6 \| 2 | Low Price Temperature (BCD) | |
| 6 \| 0 | Medium Price Temp. (BCD) | |
| 5 \| 8 | High Price Temp. (BCD) | |
| 5 \| 6 | Peak Price Temp. (BCD) | |
| 1 \| 7 | Start Time #3 | |
| 0 \| 0 | (EVEN) (BCD) | |
| 7 \| 0 | Low Price Temperature (BCD) | |
| 6 \| 8 | Medium Price Temp. (BCD) | |
| 6 \| 6 | High Price Temp. (BCD) | |
| 6 \| 4 | Peak Price Temp. (BCD) | |
| 2 \| 2 | Start Time #4 | |
| 0 \| 0 | (NIGHT) (BCD) | Data Field |

| | | |
|---|---|---|
| 6 \| 7 | Low Price Temperature (BCD) | |
| 6 \| 4 | Medium Price Temp. (BCD) | |
| 6 \| 1 | High Price Temp. (BCD) | |
| 5 \| 9 | Peak Price Temp. (BCD) | |
| | Check Sum ( 2's complement) | |

MESSAGE TYPE D:
Heat Water Schedule WEEKDAY/WEEKEND to/from controller
a data field of 0 is a schedule request from tstat.
The Address field is used to differentiate between Weekday and Weekend.

REQUEST

| | |
|---|---|
| 0 | Byte Count (of Data Field) |
| D=3 | Message Type |
| N | Address Field (0=Weekday, 1=Weekend) |
| | Check Sum ( 2's complement) |

SCHEDULE

| | | |
|---|---|---|
| 16 | Byte Count (of Data Field) | |
| D=3 | Message Type | |
| N | Address Field (0=Weekday, 1=Weekend) | |
| 0 \| 6 | Start Time #1 | Data Field |
| 0 \| 0 | (MORN) (BCD) | Data Field |
| 0 \| 8 | Stop Time #1 | Data Field |
| 0 \| 0 | (MORN) (BCD) | Data Field |
| 1 \| 0 | Start Time #2 | Data Field |
| 0 \| 0 | (DAY) (BCD) | Data Field |
| 1 \| 2 | Stop Time #2 | Data Field |
| 3 \| 0 | (DAY) (BCD) | Data Field |
| 1 \| 7 | Start Time #3 | Data Field |
| 0 \| 0 | (EVEN) (BCD) | Data Field |
| 1 \| 8 | Stop Time #3 | Data Field |
| 0 \| 0 | (EVEN) (BCD) | Data Field |
| 2 \| 0 | Start Time #4 | Data Field |
| 0 \| 0 | (NIGHT) (BCD) | Data Field |
| 2 \| 2 | Stop Time #4 | Data Field |
| 0 \| 0 | (NIGHT) (BCD) | Data Field |
| | Check Sum ( 2's complement) | |

MESSAGE TYPE E
Appliance Schedule to/from controller
a data field of 0 is a schedule request from tstat.

```
REQUEST
+----+----+
|       0 |     Byte Count (of Data Field)
|----+----|
|    E=4  |     Message Type
|----+----|
|       N |     Address Field (N=0-7 Appliances 1-8 weekday)
|----+----|                   (N=8-15 Appliances 1-8 weekend)
|         |     Check Sum ( 2's complement)
+----+----+

SCHEDULE
+----+----+
|      16 |     Byte Count (of Data field)
|----+----|
|    E=4  |     Message Type
|----+----|
|       N |     Address Field (N=0-7 Appliances 1-8 weekday)
|----+----|                   (N=8-15 Appliances 1-8 weekend)
|  0 | 1  |     Start Time #1                 --|
|----+----|                                     |
|  0 | 0  |     (MORN)  (BCD)                   |
|----+----|                                     |
|  0 | 1  |     Stop Time #1                    |
|----+----|                                     |
|  0 | 0  |     (MORN)  (BCD)                   |
|----+----|                                     |
|  0 | 1  |     Stop Time #2                    |
|----+----|                                     |
|  0 | 0  |     (DAY)  (BCD)                    |
|----+----|                                     |
|  0 | 1  |     Stop Time #2                    |
|----+----|                                     |
|  0 | 0  |     (DAY)  (BCD)                    |   Data Field
|----+----|                                     |
|  0 | 1  |     Stop Time #3                    |
|----+----|                                     |
|  0 | 0  |     (EVEN)  (BCD)                   |
|----+----|                                     |
|  0 | 1  |     Stop Time #3                    |
|----+----|                                     |
|  0 | 0  |     (EVEN)  (BCD)                   |
|----+----|                                     |
|  0 | 1  |     Start Time #4                   |
|----+----|                                     |
|  0 | 0  |     (NIGHT)  (BCD)                  |
|----+----|                                     |   Data Field
|  0 | 1  |     Stop Time #4                    |

|----+----|                                     |
|  0 | 0  |     (NIGHT)  (BCD)                --|
|----+----|
|         |     Check Sum ( 2's complement)
+----+----+
```

MESSAGE TYPE F:
Configuration data to/from controller
a data field of 0 is a schedule request from tstat.

```
REQUEST
+----+----+
|       0 |     Byte Count (of Data Field)
|----+----|
|    F=5  |     Message Type
|----+----|
|       0 |     Address Field
|----+----|
|         |     Check Sum ( 2's complement)
+----+----+
```

```
DATA
+----+----+
|      11 |   Byte Count (of Data Field)
 ----+----
|    F=5  |   Message Type
 ----+----
|       0 |   Address Field
 ----+----
|       1 |   HCd (House code 1-16) (BCD)        -|
 ----+----                                        |
|       0 |   FoC (Degrees F or C (0 or 1)        |
 ----+----                                        |
|       0 |   CLo (12/24 hr clock (0 or 1)        |
 ----+----                                        |
|       2 |   FiL (Filter int. (1 to 20)          |
 ----+----      (BCD in hundreds of hours)        |   Data Field
|       1 |   End (Weekend day (1-7))             |
 ----+----                                        |
|       2 |   HPR (0-8 in 1/2 hr. int.)           |
 ----+----                                        |
|       5 |   HCC (2 or 5)                        |
 ----+----                                        |
|       0 |   ELH (Electric heat)                 |
 ----+----                                        |
|       0 |   SHr (0 or 1)                        |
 ----+----                                        |
|       0 |   HEF (0,2,3,4,5)                     |
 ----+----                                        |
|       0 |   EHA (0 or 1)                       -|
 ----+----
|         |   Check Sum ( 2's complement)
+----+----+
```

MESSAGE TYPE G:
Bill Info Message from Controller
a data field of 0 is a schedule request from tstat.

```
REQUEST
+----+----+
|       0 |   Byte Count (of Data Field)
 ----+----
|    G=6  |   Message Type
 ----+----
|       0 |   Address Field
 ----+----
|         |   Check Sum ( 2's complement)
+----+----+
```

```
DATA
+----+----+
|      28 |   Byte Count (of Data Field)
 ----+----
|    G=6  |   Message Type
 ----+----
|       0 |   Address Field
 ----+----
|  A | A  |   Current Bill (Tier Method)          -|
 ----+----                                         |
|  A | 1  |   (BCD) ($) (A's indicate              |
 ----+----              leading blanks)            |
|  4 | 9  |   (BCD) ($)                            |
 ----+----                                         |
|  6 | 9  |   (BCD) (cents)                       -|
 ----+----                                         |
|  A | A  |   Current Bill (old Method)            |
 ----+----             or forecast bill)           |
|  A | 2  |   (BCD) ($)                            |
 ----+----                                         |
|  1 | 7  |   (BCD) ($)                            |
 ----+----                                         |
|  8 | 4  |   (BCD) (cents)                        |
 ----+----                                         |
```

| | | | |
|---|---|---|---|
| A | A | Forecasted Bill (this month) | Data Field |
| A | 2 | (BCD) ($) | |
| 1 | 1 | (BCD) ($) | |
| 7 | 0 | (BCD) (cents) | |
| A | A | Low Tier Kilowatt Hours | Data Field |
| A | A | (BCD) (A's indicate leading blanks) | |
| A | 4 | (BCD) | |
| 8 | 6 | (BCD) (kwh) | |
| A | A | Medium Tier Kilowatt Hours | |
| A | A | (BCD) | |
| A | 1 | (BCD) | |
| 3 | 4 | (BCD) (kwh) | |
| A | A | High Tier Kilowatt Hours | |
| A | A | (BCD) | |
| A | 5 | (BCD) | |
| 3 | 4 | (BCD) (kwh) | |
| A | A | High Tier Kilowatt Hours | |
| A | A | (BCD) | |
| A | A | (BCD) | |
| 9 | 0 | (BCD) (kwh) | |
| | | Check Sum ( 2's complement) | |

MESSAGE TYPE H:
Override (heat, cool or hot water) Message TO Controller

| | | | |
|---|---|---|---|
| | 2 | Byte Count (of Data Field) | |
| H=7 | | Message Type | |
| | 0 | Address Field | |
| xxxx | xxWH | Status Byte | Data Field |
| 7 | 0 | Set Point Temperature (BCD) | |
| | | Check Sum ( 2's complement) | |

Status Byte:

W - Heat Water Now Key has been hit
H - Hold key has been hit
The Temperature set point is always sent.

MESSAGE TYPE I:
Miscellaneous Message TO Controller

```
+----+----+
|       1 |   Byte Count (of Data Field)
|----+----|
|   I=8   |   Message Type
|----+----|
|       0 |   Address Field
|----+----|
|xxxx|xFTO|   Status Byte *                 --  Data Field
|----+----|
|         |   Check Sum ( 2's complement)
+----+----+
```

Status Byte:

F - Filter bit has been re-set
T - Customer Service Key has been hit
O - Optimize Key has been hit
x - unused MESSAGE TYPE J:
Ack Message from Controller

```
+----+----+
|       0 |   Byte Count (of Data Field)
|----+----|
|   J=#FF |   Message Type
|----+----|
|      0  |   Address Field
|----+----|
|         |   Check Sum ( 2's complement)
+----+----+
```

APPENDIX C

Display Layout: Display Elements List

Controllable Elements

| | |
|---|---|
| 1 - 56 | Large Number Segments (Quantity = 8 x 7 segments) |
| 57 - 78 | Small Number Segment (Quantity = 3 x 7 segments) |
| 79 | Small Number "1" Segment |
| 80 | LOAD CONTROL |
| 81 | HOLD |
| 82 | HEAT SETTING |
| 83 | HOLD |
| 84 | COOL SETTING |
| 85 | HEAT WATER |
| 86 | SETTING |
| 87 | APPLIANCE |
| 88 | TIME |
| 89 | BILL INFO |
| 90 | PRICE: |
| 91 | LOW |
| 92 | BEGIN |
| 93 | MEDIUM |
| 94 | FILTER |
| 95 | HIGH |
| 96 | END |
| 97 | CRITICAL |
| 98 | kWh |
| 99 - 101 | AM (Quantity = 3) |
| 102 - 104 | PM (Quantity = 3) |
| 105 - 107 | : (Quantity = 3) |
| 108 - 109 | . (Quantity = 2) |
| 110 | TO |
| 111 | $ |
| 112 | WEEKDAY |
| 113 | WEEKEND |
| 114 | MORN |
| 115 | DAY |
| 116 | EVE |
| 117 | NIGHT |
| 118 | N/A |
| 119 | TEMP |
| 120 | °F |
| 121 | °C |

APPENDIX D

```
DOS 3.30 (038-N) PL/M-51 V1.2
COMPILER INVOKED BY:  C:\INTEL\PLM51.EXE MAINLP.PTH PW(80)PL(60)DB NOINTVECTOR O
>> T(3)ROM(LARGE)
```

07/452285

07/452285

```
   1    1         MAIN$PROG: DO;

                  /**************************************************/
                  /*                                                */
                  /*    MM      MM        AA        II   NN     N   */
                  /*    M M    M M       A  A       II   N N    N   */
                  /*    M  M M  M       A    A      II   N  N   N   */
                  /*    M   M   M      AAAAAAAA     II   N   N  N   */
                  /*    M       M     A        A    II   N    N N   */
                  /*    M       M    A          A   II   N     NN   */
                  /*                                                */
                  /**************************************************/

                  /************************************************************
                  (c) Copyright, Johnson Controls Incorporated, 1988.  All rights
                      reserved. The following program is the exclusive property of
                      Johnson Controls, Inc. and its use is restricted by license
                      agreement to the system with which it was furnished.  The
                      program contents are confidential and may not be disclosed
                      or used outside the system without the express written
                      consent of Johnson Controls.  This program is further
                      protected by federal copyright law as an unpublished work
                      and any unauthorized reproduction is prohibited.
                  ************************************************************/

                  $NOLIST
                  $TITLE ('DECLARATIONS AND STRUCTURES ')
                  $INCLUDE (DECICS.DTH)
             =
             =    /**************************************************************
             =         P U B L I C   S T R U C T U R E   D E C L A R A T I O N S
             =    **************************************************************/
             =
 455    1    =    DECLARE  EEPROM$ARRAY              (512) BYTE  PUBLIC
             =                                             AT (4000H)  AUXILIARY;
             =
 456    1    =    DECLARE  EEPROM$DATA  STRUCTURE (
             =        HVAC                      (96) BYTE,
             =        EWH                       (32) BYTE,
             =        BSRDEV                   (256) BYTE,
             =        VERSION                   (15) BYTE,
             =        EXTRA                    (111) BYTE,
             =        CHECKSUM                       BYTE,
             =        TEST$BYTE                      BYTE)
             =                                     AT  (.EEPROM$ARRAY(0))  AUXILIARY;
             =
 457    1    =    DECLARE  SEND$ERROR$MSG  STRUCTURE (
             =        BYTE$COUNT                     BYTE,
             =        MSG$TYPE                       BYTE,
             =        DESTINATION$ADDRESS            BYTE,
             =        PROCESS$NUMBERS                BYTE,
             =        ERROR$TYPE                (15) BYTE)  PUBLIC  AUXILIARY;
             =
             =    /*************************************************************/
             =
 458    1    =    DECLARE  TIME$AND$DATE  STRUCTURE (
             =        YEAR                           BYTE,
             =        MONTH                          BYTE,
             =        DAY                            BYTE,
             =        HOUR                           BYTE,
             =        MINUTE                         BYTE,
             =        DAY$OF$WEEK                    BYTE)  PUBLIC  AUXILIARY;
             =
             =    /*************************************************************/
             =
 459    1    =    DECLARE  STATUS$BYTES                (2) BYTE  PUBLIC  AUXILIARY;
             =
```

```
460   1  =   DECLARE  SCHEDULES                    (399) BYTE  PUBLIC  AUXILIARY;
         =
461   1  =   DECLARE  HVAC  (4)  STRUCTURE (
         =        START$MORN              (2) BYTE,
         =        TEMP$1$MORN                 BYTE,
         =        TEMP$2$MORN                 BYTE,
         =        TEMP$3$MORN                 BYTE,
         =        TEMP$4$MORN                 BYTE,
         =        START$DAY               (2) BYTE,
         =        TEMP$1$DAY                  BYTE,
         =        TEMP$2$DAY                  BYTE,
         =        TEMP$3$DAY                  BYTE,
         =        TEMP$4$DAY                  BYTE,
         =        START$EVE               (2) BYTE,
         =        TEMP$1$EVE                  BYTE,
         =        TEMP$2$EVE                  BYTE,
         =        TEMP$3$EVE                  BYTE,
         =        TEMP$4$EVE                  BYTE,
         =        START$NITE              (2) BYTE,
         =        TEMP$1$NITE                 BYTE,
         =        TEMP$2$NITE                 BYTE,
         =        TEMP$3$NITE                 BYTE,
         =        TEMP$4$NITE                 BYTE)  AT (.SCHEDULES(0))
         =                                                         AUXILIARY;
         =
462   1  =   DECLARE  HVAC$ARRAY                    (96) BYTE  AT (.SCHEDULES(0))
         =                                                         AUXILIARY;
         =
         =   /****************************************************************/
         =
463   1  =   DECLARE  EWH  (2)  STRUCTURE (
         =        START$MORN              (2) BYTE,
         =        STOP$MORN               (2) BYTE,
         =        START$DAY               (2) BYTE,
         =        STOP$DAY                (2) BYTE,
         =        START$EVE               (2) BYTE,
         =        STOP$EVE                (2) BYTE,
         =        START$NITE              (2) BYTE,
         =        STOP$NITE               (2) BYTE)  AT (.SCHEDULES(96))
         =                                                         AUXILIARY;
         =
464   1  =   DECLARE  EWH$ARRAY                     (32) BYTE  AT (.SCHEDULES(96))
         =                                                         AUXILIARY;
         =
         =   /****************************************************************/
         =
465   1  =   DECLARE  BSRDEV$WEEKDAY  (8)  STRUCTURE (
         =        START$MORN              (2) BYTE,
         =        STOP$MORN               (2) BYTE,
         =        START$DAY               (2) BYTE,
         =        STOP$DAY                (2) BYTE,
         =        START$EVE               (2) BYTE,
         =        STOP$EVE                (2) BYTE,
         =        START$NITE              (2) BYTE,
         =        STOP$NITE               (2) BYTE)  AT (.SCHEDULES(128))
         =                                                         AUXILIARY;
         =
466   1  =   DECLARE  BSRDEV$WEEKEND  (8)  STRUCTURE (
         =        START$MORN              (2) BYTE,
         =        STOP$MORN               (2) BYTE,
         =        START$DAY               (2) BYTE,
         =        STOP$DAY                (2) BYTE,
         =        START$EVE               (2) BYTE,
         =        STOP$EVE                (2) BYTE,
         =        START$NITE              (2) BYTE,
         =        STOP$NITE               (2) BYTE)  AT (.SCHEDULES(256))
         =                                                         AUXILIARY;
         =
467   1  =   DECLARE  BSRDEV$ARRAY                 (256) BYTE  AT (.SCHEDULES(128))
         =                                                         AUXILIARY;
         =
         =   /****************************************************************/
         =
468   1  =   DECLARE  CONFIG$DATA    STRUCTURE (
         =        HOUSE$CODE                  BYTE,
         =        F_C$DEGREE                  BYTE,
         =        CLOCK$FORMAT                BYTE,
         =        FILTER$RUNTIME              BYTE,
```

```
                =       WEEKEND$DAY                     BYTE,
                =       HIGH$TEMP$SPAN                  BYTE,
                =       LOW$TEMP$SPAN                   BYTE,
                =       EWH$PREHEAT                     BYTE,
                =       H_P$CYCLE$TIME                  BYTE,
                =       ELECTRIC$HEAT                   BYTE,
                =       SECONDARY$HEAT$RECOVERY         BYTE,
                =       HIGH$EFFIC$FAN                  BYTE,
                =       EMERG$H_P$ACTION                BYTE,
                =       VERSION$NUMBERS             (2) BYTE)  AT (.SCHEDULES(384))
                =                                                        AUXILIARY;
                =
 469    1       =   DECLARE  CONFIG$ARRAY               (15) BYTE  AT (.SCHEDULES(384))
                =                                                        AUXILIARY;
                =
                =   /*************************************************************
                =     E X T E R N A L   S T R U C T U R E   D E C L A R A T I O N S
                =   *************************************************************/
                =
 470    1       =   DECLARE  BSR$DATA          /*AJB*/   (3) BYTE  EXTERNAL  AUXILIARY;
                =
                =   /*************************************************************/
                =
 471    1       =   DECLARE  SYSTEM$STATUS  STRUCTURE (
                =       CURRENT$TEMPERATURE             BYTE,
                =       SETPOINT$TEMPERATURE            BYTE,
                =       CURRENT$TIER                    BYTE,
                =       CURRENT$PERIOD                  BYTE,
                =       CURRENT$MODE                    BYTE,
                =       FAN$MODE                        BYTE,
                =       EMERGENCY$HEAT                  BYTE,
                =       HVAC$ACTIVE                     BYTE,
                =       HVAC$OVERRIDE                   BYTE,
                =       EWH$ACTIVE                      BYTE,
                =       EWH$OVERRIDE                    BYTE,
                =       WD_WE                           BYTE,
                =       OPT$ACTIVE                      BYTE,
                =       RUNTIME$TOTAL$HTG           (2) BYTE)  EXTERNAL  AUXILIARY;
                =
 472    1       =   DECLARE  SYSTEM$STATISTICS  STRUCTURE (
                =       CONTROLLER$COMM            (32) BYTE,
                =       TSTAT$COMM                 (32) BYTE)  EXTERNAL  AUXILIARY;
                =
 473    1       =   DECLARE  RECV$BRICK$MESSAGE         (20) BYTE  EXTERNAL  AUXILIARY;
                =
 474    1       =   DECLARE  RECV$BRICK$MSG  STRUCTURE (
                =       BYTE$COUNT                      BYTE,
                =       MSG$TYPE                        BYTE,
                =       SOURCE$ADDRESS                  BYTE,
                =       PROCESS$NUMBERS                 BYTE, /* UPPER NYBBLE SOURCE
                =                                             LOWER NYBBLE DESTINATION */
                =       DATA$FIELD                 (15) BYTE,
                =       CHECKSUM                        BYTE)  AT (.RECV$BRICK$MESSAGE)
                =                                                        AUXILIARY;
                =
 475    1       =   DECLARE  RECV$TSTAT$MESSAGE         (32) BYTE  EXTERNAL  AUXILIARY;
                =
 476    1       =   DECLARE  TRANS$BRICK$MESSAGE        (40) BYTE  EXTERNAL  AUXILIARY;
                =
 477    1       =   DECLARE  TRANS$BRICK$MSG  STRUCTURE (
                =       BYTE$COUNT                      BYTF,
                =       MSG$TYPE                        BYTE,
                =       DESTINATION$ADDRESS             BYTE,
                =       PROCESS$NUMBERS                 BYTE, /* UPPER NYBBLE SOURCE
                =                                             LOWER NYBBLE DESTINATION */
                =       DATA$FIELD                 (15) BYTE,
                =       CHECKSUM                        BYTE)  AT (.TRANS$BRICK$MESSAGE)
                =                                                        AUXILIARY;
                =
 478    1       =   DECLARE  TIER$DATA (40)  STRUCTURE (
                =       DATE                        (3) BYTE,
                =       TIER                        (6) BYTE)  EXTERNAL  AUXILIARY;
                =
 479    1       =   DECLARE  DATA$BUFFER               (263) BYTE  EXTERNAL  AUXILIARY;
                =
 480    1       =   DECLARE  RECORD$OVERHEAD  STRUCTURE (
                =       RECORD$TYPE                     BYTE,
                =       DATA$LENGTH                     BYTE,
```

```
          =      RECORD$CRC                      WORD)
          =                                      AT (.DATA$BUFFER (0))  AUXILIARY;
          =
481   1   =   DECLARE  DEVICE$RECORD  STRUCTURE (
          =      PLC$ADDRESS                     BYTE,
          =      PROCESS                         BYTE,
          =      NUMBER$DATA$TYPES               BYTE,
          =      DATA$TYPES                (256) BYTE)
          =                                      AT (.DATA$BUFFER (4))  AUXILIARY;
          =
482   1   =   DECLARE  DATA$RECORD  STRUCTURE (
          =      DATA$TYPE                       BYTE,
          =      MSG$DATA                  (256) BYTE)
          =                                      AT (.DATA$BUFFER (4))  AUXILIARY,
          =
483   1   =   DECLARE  HEADER$RECORD  STRUCTURE (
          =      CPE$ID                      (5) BYTE,
          =      DATE                        (3) BYTE,
          =      TIME                        (2) BYTE,
          =      PHONE$DIGITS                    BYTE,
          =      PHONE$NUMBER               (12) BYTE)
          =                                      AT (.DATA$BUFFER (4))  AUXILIARY;
          =
484   1   =   DECLARE  SEND$BUSY$MSG  STRUCTURE (
          =      BYTE$COUNT                      BYTE,
          =      MSG$TYPE                        BYTE,
          =      DESTINATION$ADDRESS             BYTE,
          =      PROCESS$NUMBERS                 BYTE)  EXTERNAL  AUXILIARY;
          =
485   1   =   DECLARE  PRICING$DATA  STRUCTURE (
          =      TSTAT$DISPLAY                   BYTE,
          =      XFMR$KWH$CONSTANT           (3) BYTE,
          =      XFMR$KW$CONSTANT            (3) BYTE,
          =      PRICE$TIER$1                (3) BYTE,
          =      PRICE$TIER$2                (3) BYTE,
          =      PRICE$TIER$3                (3) BYTE,
          =      PRICE$TIER$4                (3) BYTE,
          =      FUEL                        (3) BYTE,
          =      STD$RATE$STEP1$KWH          (3) BYTE,
          =      STD$RATE$STEP1$PRICE        (3) BYTE,
          =      STD$RATE$STEP2$KWH          (3) BYTE,
          =      STD$RATE$STEP2$PRICE        (3) BYTE,
          =      STD$RATE$STEP3$KWH          (3) BYTE,
          =      STD$RATE$STEP3$PRICE        (3) BYTE,
          =      STD$RATE$STEP4$KWH          (3) BYTE,
          =      STD$RATE$STEP4$PRICE        (3) BYTE,
          =      STD$RATE$STEP5$KWH          (3) BYTE,
          =      STD$RATE$STEP5$PRICE        (3) BYTE,
          =      STD$RATE$STEP6$KWH          (3) BYTE,
          =      STD$RATE$STEP6$PRICE        (3) BYTE,
          =      EWH$OPTION                      BYTE,
          =      NOT$USED                    (7) BYTE)  EXTERNAL  AUXILIARY;
          =
          =   /*****************************************************************
          =         A R R A Y / S T R U C T U R E   D E C L A R A T I O N S
          =   *****************************************************************/
          =
486   1   =   DECLARE  TSTAT$MESSAGE                (32) BYTE  AUXILIARY;
          =
487   1   =   DECLARE  TSTAT$MSG  STRUCTURE (
          =      BYTE$COUNT                      BYTE,
          =      MSG$TYPE                        BYTE,
          =      DEVICE$ADDRESS                  BYTE,
          =      DATA$FIELD                 (28) BYTE,
          =      CHECKSUM                        BYTE)  AT (.TSTAT$MESSAGE)
          =                                                     AUXILIARY;
          =
488   1   =   DECLARE  XRAM                          BYTE  AT  (0) AUXILIARY;
          =
489   1   =   DECLARE  HALF$XRAM                     BYTE
          =                                           AT  (0FFFH)  AUXILIARY;
          =
          =   /*****************************************************************
          =          P U B L I C   W O R D   D E C L A R A T I O N S
          =   *****************************************************************/
          =
490   1   =   DECLARE  MISC$WORD                     WORD  PUBLIC;
          =
```

```
          =    /*****************************************************************
          =         E X T E R N A L   W O R D   D E C L A R A T I O N
          =    *****************************************************************/
          =
491   1   =    DECLARE  AMOUNT                          WORD  EXTERNAL  AUXILIARY;
          =
          =    /*****************************************************************
          =                   W O R D   D E C L A R A T I O N
          =    *****************************************************************/
          =
492   1   =    DECLARE  FAILSAFE$COUNTER                WORD  AUXILIARY;
          =
          =    /*****************************************************************
          =            P U B L I C   B Y T E   D E C L A R A T I O N S
          =    *****************************************************************/
          =
493   1   =    DECLARE  BRICK$MESSAGE$TIMER               BYTE  PUBLIC  AUXILIARY;
494   1   =    DECLARE  CONTROLLER$ADDRESS                BYTE  PUBLIC  AUXILIARY;
495   1   =    DECLARE  DATA$NAKKED$TWICE$COUNTER         BYTE  PUBLIC  AUXILIARY;
496   1   =    DECLARE  DATA$PACKET$TIMER                 BYTE  PUBLIC  AUXILIARY;
497   1   =    DECLARE  DATA$SESSION$TIMER                BYTE  PUBLIC  AUXILIARY;
498   1   =    DECLARE  DLC$ACTIVE$STORAGE                BYTE  PUBLIC  AUXILIARY;
499   1   =    DECLARE  ERROR$INDEX                       BYTE  PUBLIC  AUXILIARY;
500   1   =    DECLARE  EWH$OVERRIDE$STORAGE              BYTE  PUBLIC  AUXILIARY;
501   1   =    DECLARE  FAN$TIMER                         BYTE  PUBLIC  AUXILIARY;
502   1   =    DECLARE  HVAC$OVERRIDE$STORAGE             BYTE  PUBLIC  AUXILIARY;
503   1   =    DECLARE  INITIATED$DATA$SESSION            BYTE  PUBLIC  AUXILIARY;
504   1   =    DECLARE  MAIN$DATA$TIMER                   BYTE  PUBLIC  AUXILIARY;
505   1   =    DECLARE  MISC_LOCATION                     BYTE  PUBLIC
          =                                                 AT (0C000H)  AUXILIARY;
506   1   =    DECLARE  PLC$ADDR                          BYTE  PUBLIC  AUXILIARY;
507   1   =    DECLARE  UART$IER                          BYTE  PUBLIC
          =                                                 AT (0A001H)  AUXILIARY;
508   1   =    DECLARE  UART$LCR                          BYTE  PUBLIC
          =                                                 AT (0A003H)  AUXILIARY;
          =
          =    /*****************************************************************
          =         E X T E R N A L   B Y T E   D E C L A R A T I O N S
          =    *****************************************************************/
          =
509   1   =    DECLARE  ACTIVE$TIER                     BYTE  EXTERNAL  AUXILIARY;
510   1   =    DECLARE  BRICK$DELAY$TIMER               BYTE  EXTERNAL  AUXILIARY;
511   1   =    DECLARE  BUFFER$INDEX                    BYTE  EXTERNAL  AUXILIARY;
512   1   =    DECLARE  BUSY$DEVICE                     BYTE  EXTERNAL  AUXILIARY;
513   1   =    DECLARE  BUSY$MSG$TIMER                  BYTE  EXTERNAL  AUXILIARY;
514   1   =    DECLARE  CURRENT$DEVICE                  BYTE  EXTERNAL  AUXILIARY;
515   1   =    DECLARE  CURRENT$PROCESS                 BYTE  EXTERNAL  AUXILIARY;
516   1   =    DECLARE  DATA$DESTINATION                BYTE  EXTERNAL  AUXILIARY;
517   1   =    DECLARE  DATA$MESSAGE$TIMER              BYTE  EXTERNAL  AUXILIARY;
518   1   =    DECLARE  DATA$PROCESS                    BYTE  EXTERNAL  AUXILIARY;
519   1   =    DECLARE  DATA$TIMER                      BYTE  EXTERNAL  AUXILIARY;
520   1   =    DECLARE  DELTA$INDEX                     BYTE  EXTERNAL  AUXILIARY;
521   1   =    DECLARE  DELTA$DEGREE                (3) BYTE  EXTERNAL  AUXILIARY,
522   1   =    DECLARE  DEV$ADDRESS                     BYTE  EXTERNAL  AUXILIARY;
523   1   =    DECLARE  DLC$TIMER                       BYTE  EXTERNAL  AUXILIARY;
524   1   =    DECLARE  FAST$CLOCK$COUNTER              BYTE  EXTERNAL  AUXILIARY;
525   1   =    DECLARE  HVAC$SYSTEM$TIMER               BYTE  EXTERNAL  AUXILIARY;
526   1   =    DECLARE  MESSAGE$PROCESS                 BYTE  EXTERNAL  AUXILIARY;
527   1   =    DECLARE  NEEDED$HOUR                     BYTE  EXTERNAL  AUXILIARY;
528   1   =    DECLARE  PER$SAV             /*AJB*/     BYTE  EXTERNAL  AUXILIARY;
529   1   =    DECLARE  RAM$CHECKSUM                    BYTE  EXTERNAL  AUXILIARY;
530   1   =    DECLARE  RECV$BYTE$COUNT$REGISTER        BYTE  EXTERNAL  AUXILIARY;
531   1   =    DECLARE  RECV$TSTAT$BYTE$COUNT$REGISTER  BYTE  EXTERNAL  AUXILIARY;
532   1   =    DECLARE  RECV$BRINDEX                    BYTE  EXTERNAL  AUXILIARY;
533   1   =    DECLARE  S$P$TIMER                       BYTE  EXTERNAL  AUXILIARY;
534   1   =    DECLARE  SAVE$BSR            /*AJB*/     BYTE  EXTERNAL  AUXILIARY;
535   1   =    DECLARE  SAVED$SETPOINT                  BYTE  EXTERNAL  AUXILIARY;
536   1   =    DECLARE  SECOND$TIMER                    BYTE  EXTERNAL  AUXILIARY;
537   1   =    DECLARE  SESSION$COUNTER                 BYTE  EXTERNAL  AUXILIARY;
538   1   =    DECLARE  STEP$COUNTER                    BYTE  EXTERNAL  AUXILIARY;
539   1   =    DECLARE  T_R$TSTAT$BYTE                  BYTE  EXTERNAL  AUXILIARY;
540   1   =    DECLARE  TENS$NUMBER                     BYTE  EXTERNAL  AUXILIARY,
541   1   =    DECLARE  TIER$BUFFER$INDEX               BYTE  EXTERNAL  AUXILIARY;
542   1   =    DECLARE  TIER$DOWNLOAD$REQUEST$TIMER     BYTE  EXTERNAL  AUXILIARY;
543   1   =    DECLARE  TIER$INDEX                      BYTE  EXTERNAL  AUXILIARY;
544   1   =    DECLARE  TRANS$BRINDEX                   BYTE  EXTERNAL  AUXILIARY;
545   1   =    DECLARE  TRANS$TINDEX                    BYTE  EXTERNAL  AUXILIARY;
546   1   =    DECLARE  TSTAT$TIMER                     BYTE  EXTERNAL  AUXILIARY;
547   1   =    DECLARE  UNITS$NUMBER                    BYTE  EXTERNAL  AUXILIARY;
```

```
548   1  =   DECLARE  VALID$TSTAT$MSG$TIMER           BYTE  EXTERNAL  AUXILIARY.
         =
         =   /*****************************************************************
         =                    B Y T E   D E C L A R A T I O N
         =   *****************************************************************/
         =
549   1  =   DECLARE  BRICK$RESET$TIMER               BYTE  AUXILIARY;
550   1  =   DECLARE  CHARACTERS$CHECKED              BYTE  AUXILIARY;
551   1  =   DECLARE  DATA$REQUEST$TYPE               BYTE  AUXILIARY;
552   1  =   DECLARE  LEAP$YEAR                       BYTE  AUXILIARY;
553   1  =   DECLARE  MINDEX                          BYTE  AUXILIARY;
554   1  =   DECLARE  RECORD$INDEX                    BYTE  AUXILIARY;
555   1  =   DECLARE  RETURNED$CHECKSUM               BYTE  AUXILIARY;
556   1  =   DECLARE  SECONDS                         BYTE  AUXILIARY;
557   1  =   DECLARE  STORED$SECONDS                  BYTE  AUXILIARY;
558   1  =   DECLARE  TEST$CHARACTER                  BYTE  AUXILIARY;
559   1  =   DECLARE  TOTAL$CHARACTERS                BYTE  AUXILIARY;
560   1  =   DECLARE  TSTAT$MESSAGE$DELAY$TIMER       BYTE  AUXILIARY;
         =
         =   /*****************************************************************
         =   ********************** DEFAULT VALUES **************************
         =   *****************************************************************/
         =
561   1  =   DECLARE  TIME$DEFAULT. (6) BYTE CONSTANT
         =
         =      (89H,08H,31H,00H,00H,05H);
         =
562   1  =   DECLARE  TIER$REQUEST$TYPES        (40) BYTE  CONSTANT (
         =            60H,61H,62H,63H,64H,65H,66H,67H,68H,69H,
         =            6AH,6BH,6CH,6DH,6EH,6FH,70H,71H,72H,73H,
         =            74H,75H,76H,77H,78H,79H,7AH,7BH,7CH,7DH,
         =            7EH,7FH,80H,81H,82H,83H,84H,85H,86H,87H);
         =
563   1  =   DECLARE  CONFIG$DEFAULTS  (15)  BYTE CONSTANT (
         =
         =        1H, /* HOUSE CODE */
         =        0H, /* FAHRENHEIT */
         =        0H, /* 12 HR FORMAT */
         =        3H, /* FILTER HOURS (* 100) */
         =        1H, /* WEEKEND DAY SUN (AND SAT) */
         =        0H, /* HIGH TEMP SPAN - TO BE USED LATER */
         =        0H, /* LOW TEMP SPAN - TO BE USED LATER */
         =        2H, /* 1 HOUR EWH PREHEAT */
         =        5H, /* HEAT PUMP CYCLE TIME (5 MINUTES) */
         =        1H, /* ELECTRIC HEAT ENABLED */
         =        0H, /* SECONDARY HEAT RECOVERY (0=NO) */
         =        0H, /* NO HIGH EFFICIENCY FAN */
         =        0H, /* NO EMERGENCY HEAT ACTION */
         =        1H, /* MAJOR VERSION */
         =        4H);/* MINOR VERSION */
         =
         =   /*****************************************************************
         =        P U B L I C   B I T   M A P P E D   D E C L A R A T I O N S
         =   *****************************************************************/
         =
564   1  =   DECLARE  DATA$MSG                        BIT  PUBLIC;
565   1  =   DECLARE  DATA$NAKKED$TWICE               BIT  PUBLIC;
566   1  =   DECLARE  DATA$PACKET$TIMER$ACTIVE        BIT  PUBLIC;
567   1  =   DECLARE  DATA$SESSION$TIMER$ACTIVE       BIT  PUBLIC;
568   1  =   DECLARE  ERROR$ALERT                     BIT  PUBLIC;
569   1  =   DECLARE  FAN$TIMER$ACTIVE                BIT  PUBLIC;
570   1  =   DECLARE  INITIALIZATION$FLAG             BIT  PUBLIC;
571   1  =   DECLARE  READY$TO$TRANSMIT$FLAG          BIT  PUBLIC;
572   1  =   DECLARE  TSTAT$MSG$TIMER                 BIT  PUBLIC;
573   1  =   DECLARE  TSTAT$TIMER$FLAG                BIT  PUBLIC;
574   1  =   DECLARE  WAITING                         BIT  PUBLIC;
575   1  =   DECLARE  ZONE$ONE$FLAG                   BIT  PUBLIC;
         =
         =   /*****************************************************************
         =    E X T E R N A L   B I T   M A P P E D   D E C L A R A T I O N S
         =   *****************************************************************/
         =
576   1  =   DECLARE  ANALYZE$DATA$TYPE               BIT  EXTERNAL;
577   1  =   DECLARE  BILLING$COMPLETED               BIT  EXTERNAL;
578   1  =   DECLARE  BRICK$DELAY$TIMER$ACTIVE        BIT  EXTERNAL;
579   1  =   DECLARE  BSR$INIT           /*AJB*/      BIT  EXTERNAL;
580   1  =   DECLARE  BSR$MIP$FLAG                    BIT  EXTERNAL;
581   1  =   DECLARE  BSRDEV$DATA$FLAG                BIT  EXTERNAL;
```

```
582   1  =  DECLARE  BUSY$FLAG                          BIT  EXTERNAL;
583   1  =  DECLARE  BUSY$MSG                           BIT  EXTERNAL;
584   1  =  DECLARE  BUSY$MSG$TIMER$ACTIVE              BIT  EXTERNAL;
585   1  =  DECLARE  CONFIG$ACK$MSG                     BIT  EXTERNAL;
586   1  =  DECLARE  CONFIG$DATA$FLAG                   BIT  EXTERNAL;
587   1  =  DECLARE  CONTROL$MSG                        BIT  EXTERNAL;
588   1  =  DECLARE  DAILY$DATA$REQUEST                 BIT  EXTERNAL;
589   1  =  DECLARE  DATA$ACK$MSG                       BIT  EXTERNAL;
590   1  =  DECLARE  DATA$INTEGRITY                     BIT  EXTERNAL;
591   1  =  DECLARE  DATA$MESSAGE$BUILT                 BIT  EXTERNAL;
592   1  =  DECLARE  DATA$MESSAGE$INHIBIT               BIT  EXTERNAL;
593   1  =  DECLARE  DATA$REQUEST$MSG                   BIT  EXTERNAL;
594   1  =  DECLARE  DATA$TIMER$ACTIVE                  BIT  EXTERNAL;
595   1  =  DECLARE  DATA$TO$BURN                       BIT  EXTERNAL;
596   1  =  DECLARE  DIAG$ACK$MSG                       BIT  EXTERNAL;
597   1  =  DECLARE  DLC$ACTIVE$FLAG                    BIT  EXTERNAL;
598   1  =  DECLARE  DLC$DATA$NEEDED                    BIT  EXTERNAL;
599   1  =  DECLARE  DLC$TIMER$FLAG                     BIT  EXTERNAL;
600   1  =  DECLARE  ERROR$ACK$MSG                      BIT  EXTERNAL;
601   1  =  DECLARE  ERROR$MSG                          BIT  EXTERNAL;
602   1  =  DECLARE  EWH$DATA$FLAG                      BIT  EXTERNAL;
603   1  =  DECLARE  EWH$OPTIMIZATION$REQUIRED          BIT  EXTERNAL;
604   1  =  DECLARE  EWH$OVERRIDE$FLAG                  BIT  EXTERNAL;
605   1  =  DECLARE  FAST$CLOCK$FLAG                    BIT  EXTERNAL;
606   1  =  DECLARE  GENERATE$DATA$TYPE                 BIT  EXTERNAL;
607   1  =  DECLARE  GET$ALL$TIER$DATA                  BIT  EXTERNAL;
608   1  =  DECLARE  HVAC$DATA$FLAG                     BIT  EXTERNAL;
609   1  =  DECLARE  HVAC$OPT$ACTIVE                    BIT  EXTERNAL;
610   1  =  DECLARE  HVAC$OPTIMIZATION$REQUIRED         BIT  EXTERNAL;
611   1  =  DECLARE  HVAC$PERMANENT$OVERRIDE            BIT  EXTERNAL;
612   1  =  DECLARE  HVAC$SYSTEM$ACTIVE                 BIT  EXTERNAL;
613   1  =  DECLARE  HVAC$SYSTEM$TIMER$ACTIVE           BIT  EXTERNAL;
614   1  =  DECLARE  HVAC$SYSTEM$TIMER$EXPIRED          BIT  EXTERNAL;
615   1  =  DECLARE  HVAC$TEMPORARY$OVERRIDE            BIT  EXTERNAL;
616   1  =  DECLARE  INQUIRE$MSG                        BIT  EXTERNAL;
617   1  =  DECLARE  LOAD$BSR$DEFAULTS                  BIT  EXTERNAL;
618   1  =  DECLARE  MAIN$DATA$TIMER$ACTIVE             BIT  EXTERNAL;
619   1  =  DECLARE  MODE$CHANGED                       BIT  EXTERNAL;
620   1  =  DECLARE  NEW$RECORD                         BIT  EXTERNAL;
621   1  =  DECLARE  NEW$SETPOINT                       BIT  EXTERNAL;
622   1  =  DECLARE  OPTIMIZATION$REQUIRED              BIT  EXTERNAL;
623   1  =  DECLARE  PASS$THRU$MESSAGE                  BIT  EXTERNAL;
624   1  =  DECLARE  PRESET$TIME                        BIT  EXTERNAL;
625   1  =  DECLARE  PRICE$DATA$RECEIVED                BIT  EXTERNAL;
626   1  =  DECLARE  READY$TO$RESPOND                   BIT  EXTERNAL;
627   1  =  DECLARE  READY$TO$SEND$TERMINATOR           BIT  EXTERNAL;
628   1  =  DECLARE  RECEIVED$BRICK$MESSAGE             BIT  EXTERNAL;
629   1  =  DECLARE  RECEIVED$TSTAT$BYTE                BIT  EXTERNAL;
630   1  =  DECLARE  REFRESH$REQUEST$MESSAGE            BIT  EXTERNAL;
631   1  =  DECLARE  REQ$STATUS$MSG                     BIT  EXTERNAL;
632   1  =  DECLARE  REQ$SUBADDRESS$MSG                 BIT  EXTERNAL;
633   1  =  DECLARE  RESPND$DATA$MESSAGE                BIT  EXTERNAL;
634   1  =  DECLARE  ROLLOVER$DATA$RECEIVED             BIT  EXTERNAL;
635   1  =  DECLARE  S$P$TIMER$ACTIVE                   BIT  EXTERNAL;
636   1  =  DECLARE  SECOND$FLAG                        BIT  EXTERNAL;
637   1  =  DECLARE  SENT$ONCE$FLAG                     BIT  EXTERNAL;
638   1  =  DECLARE  STATUS$MSG                         BIT  EXTERNAL;
639   1  =  DECLARE  TERMINATOR$FLAG                    BIT  EXTERNAL;
640   1  =  DECLARE  TERMINATOR$RECEIVED                BIT  EXTERNAL;
641   1  =  DECLARE  TIER$DOWNLOAD$REQUEST              BIT  EXTERNAL;
642   1  =  DECLARE  TIME$MSG                           BIT  EXTERNAL;
643   1  =  DECLARE  TSTAT$MESSAGE$RECEIVED             BIT  EXTERNAL;
644   1  =  DECLARE  USAGE$DATA$RECEIVED                BIT  EXTERNAL;
645   1  =  DECLARE  VALID$TSTAT$MSG$RECEIVED           BIT  EXTERNAL;
646   1  =  DECLARE  WAITING$FOR$DATA$ACK$FLAG          BIT  EXTERNAL;
647   1  =  DECLARE  WHAT$TIME$MSG                      BIT  EXTERNAL;
648   1  =  DECLARE  Z$BIT$SET                          BIT  EXTERNAL;
         =
         =  /*****************************************************************
         =            B I T   M A P P E D   D E C L A R A T I O N S
         =  *****************************************************************/
         =
649   1  =  DECLARE  BAD$CHARACTER                      BIT;
650   1  =  DECLARE  TSTAT$MESSAGE$DELAY                BIT;
651   1  =  DECLARE  VALID$RAM$DATA$FLAG                BIT;
         =
652   1  =  DECLARE  HEAT$STAGE$1                       BIT  AT (90H)  REG;
653   1  =  DECLARE  HEAT$STAGE$2                       BIT  AT (91H)  REG;
```

```
654   1  =   DECLARE  COOL$STAGE$1                    BIT  AT (92H)  REG;
655   1  =   DECLARE  COOL$STAGE$2                    BIT  AT (93H)  REG;
656   1  =   DECLARE  FAN                             BIT  AT (94H)  REG;
657   1  =   DECLARE  REV$VALVE                       BIT  AT (95H)  REG;
658   1  =   DECLARE  X10$TRANSMIT$OFF                BIT  AT (96H)  REG;
659   1  =   DECLARE  WATCHDOG$TIMER                  BIT  AT (97H)  REG;
660   1  =   DECLARE  BRICK$OK                        BIT  AT (0B4H) REG;
         =
         =   /*****************************************************************
         =                L I T E R A L   D E C L A R A T I O N S
         =   *****************************************************************/
         =
661   1  =   DECLARE  ALPHA$ALPHA                     LITERALLY      '0AAH';
662   1  =   DECLARE  BAD$RAM                         LITERALLY      '0F0H';
663   1  =   DECLARE  BILLING$INFO                    LITERALLY       '12H';
664   1  =   DECLARE  COMSET_B$PROCESS                LITERALLY         '8';
665   1  =   DECLARE  CONFIG$SIZE                     LITERALLY        '15';
666   1  =   DECLARE  CURRENT                         LITERALLY      '0FFH';
667   1  =   DECLARE  CURRENT$SCHEDULES               LITERALLY       '01H';
668   1  =   DECLARE  DAILY$DATA$TYPES                LITERALLY         '3';
669   1  =   DECLARE  DATA$FIELD$SIZE                 LITERALLY        '15';
670   1  =   DECLARE  DEENERGIZE                      LITERALLY         '1';
671   1  =   DECLARE  DEFAULT                         LITERALLY         '0';
672   1  =   DECLARE  EEPROM$LENGTH                   LITERALLY       '399';
673   1  =   DECLARE  ENERGIZE                        LITERALLY         '0';
674   1  =   DECLARE  ERROR$BYTES$SIZE                LITERALLY         '4';
675   1  =   DECLARE  FALSE                           LITERALLY       '00H';
676   1  =   DECLARE  FATAL                           LITERALLY      '0FFH';
677   1  =   DECLARE  FIVE$FIVE                       LITERALLY       '55H';
678   1  =   DECLARE  FOX$FOX                         LITERALLY      '0FFH';
679   1  =   DECLARE  MID$RAM                         LITERALLY     '0FFFH';
680   1  =   DECLARE  MIN$BRICK$MESSAGE$TYPE          LITERALLY      '0FCH';
681   1  =   DECLARE  MSG$OVERHEAD                    LITERALLY         '3';
682   1  =   DECLARE  NO                              LITERALLY         '0';
683   1  =   DECLARE  NON$FATAL                       LITERALLY       '00H';
684   1  =   DECLARE  OFF                             LITERALLY       '00H';
685   1  =   DECLARE  ON                              LITERALLY      '0FFH',
686   1  =   DECLARE  ONE                             LITERALLY         '1';
687   1  =   DECLARE  PRICING$INFO                    LITERALLY       '91H';
688   1  =   DECLARE  RAM$END                         LITERALLY     '1FFFH';
689   1  =   DECLARE  RAM$SCHEDULES                   LITERALLY       '128';
690   1  =   DECLARE  RAM$START                       LITERALLY         '0';
691   1  =   DECLARE  RECORD$TERMINATOR               LITERALLY      '0FFH',
692   1  =   DECLARE  RESET                           LITERALLY       '00H';
693   1  =   DECLARE  REST$OF$OVERHEAD                LITERALLY         '3';
694   1  =   DECLARE  SCHEDULES$SIZE                  LITERALLY       '399';
695   1  =   DECLARE  SECOND$TIMER$INIT               LITERALLY      '0C4H';
696   1  =   DECLARE  SET                             LITERALLY      '0FFH';
697   1  =   DECLARE  SYSTEM$PROCESS                  LITERALLY         '0';
698   1  =   DECLARE  TIER$USAGE$INFO                 LITERALLY       '16H';
699   1  =   DECLARE  TIME$STAMP                      LITERALLY         '0';
700   1  =   DECLARE  TRUE                            LITERALLY      '0FFH';
701   1  =   DECLARE  UART$BAH                        LITERALLY         '0';
702   1  =   DECLARE  YAHOO                           LITERALLY    '0FFFFH';
703   1  =   DECLARE  YES                             LITERALLY         '1';
         =
         =   /********************  CONTROLLER ERROR CODES ********************/
704   1  =   DECLARE  DEFECTIVE$RAM                   LITERALLY      '01H';
705   1  =   DECLARE  INVALID$BRICK$SUBADDRESS        LITERALLY      '02H',
706   1  =   DECLARE  INVALID$MESSAGE$TYPE            LITERALLY      '03H';
707   1  =   DECLARE  CUSTOMER$SERVICE$REQUIRED       LITERALLY      '04H';
708   1  =   DECLARE  NO$TSTAT$COMM                   LITERALLY      '05H';
709   1  =   DECLARE  TEMP$OUT$OF$RANGE               LITERALLY      '06H';
710   1  =   DECLARE  BAD$DLC$DATA                    LITERALLY      '07H',
         =
711   1  =   DECLARE  BAD$METER$DATA$SESSION          LITERALLY      '10H';
712   1  =   DECLARE  BAD$COMSET$2000$DATA$SESSION    LITERALLY      '11H';
713   1  =   DECLARE  BAD$COMSET_B$DATA$SESSION       LITERALLY      '12H';
714   1  =   DECLARE  BAD$DESTINATION$ADDRESS         LITERALLY      '13H';
         =
715   1  =   DECLARE  ERROR$BUFFER$OVERFLOW           LITERALLY      '99H';
         =
         =   /******************* TSTAT STATISTIC CODES ********************/
         =
716   1  =   DECLARE  WRONG$MESSAGE$TYPE              LITERALLY      '01H';
         =
         =   /****************** CONFIGURATION STATUS **********************/
```

```
717   1   =   DECLARE  HEAT$MODE                          LITERALLY         '1';
718   1   =   DECLARE  COOL$MODE                          LITERALLY         '2';
719   1   =   DECLARE  OFF$MODE                           LITERALLY         '3';
720   1   =   DECLARE  TSTAT$NO$COMM                      LITERALLY         '4';
721   1   =   DECLARE  TSTAT$BAD$COMM                     LITERALLY         '8';
722   1   =   DECLARE  EMERG$HEAT                         LITERALLY       '10H';
723   1   =   DECLARE  TEMP$OVER$99                       LITERALLY       '20H';
724   1   =   DECLARE  TEMP$UNDER$50                      LITERALLY       '40H';
725   1   =   DECLARE  KBD$DISABLED                       LITERALLY       '80H';
          =
          =   /***************** INITIALIZATION PARAMETERS *******************/
          =
726   1   =   DECLARE  INIT$PCON                          LITERALLY '00000000B';
727   1   =   DECLARE  INIT$SCON                          LITERALLY '01010000B';
728   1   =   DECLARE  INIT$TCON                          LITERALLY '01000000B';
729   1   =   DECLARE  INIT$TMOD            /*AJB*/       LITERALLY '00100001B';
730   1   =   DECLARE  INIT$IE                            LITERALLY '10010101B';
          =
731   1   =   DECLARE  INIT$SP                            LITERALLY       '4FH';
732   1   =   DECLARE  INIT$TL0                           LITERALLY         '0';
733   1   =   DECLARE  INIT$TH0                           LITERALLY      '0EEH';
734   1   =   DECLARE  INIT$TH1                           LITERALLY      '0FDH';
          =
735   1   =   DECLARE  UART$INTERRUPT$ENABLE              LITERALLY '00000111B';
736   1   =   DECLARE  UART$LINE$CONTROL                  LITERALLY '00000011B';
737   1   =   DECLARE  UART$TIMER$SET                     LITERALLY '10000011B';
          =
          =   /***************** BRICK MESSAGE TYPES *************************/
          =
738   1   =   DECLARE  WH_1IME                            LITERALLY       '01H';
739   1   =   DECLARE  TIME                               LITERALLY       '02H';
740   1   =   DECLARE  DIAG                               LITERALLY       '03H';
741   1   =   DECLARE  DIAG_ACK                           LITERALLY       '04H';
742   1   =   DECLARE  CONFIG                             LITERALLY       '05H';
743   1   =   DECLARE  CONFIG_ACK                         LITERALLY       '06H';
744   1   =   DECLARE  ERROR                              LITERALLY       '07H';
745   1   =   DECLARE  ERROR_ACK                          LITERALLY       '08H';
746   1   =   DECLARE  BUSY                               LITERALLY       '0AH';
          =   /***************************************************************/
747   1   =   DECLARE  CONTROL                            LITERALLY       '30H';
748   1   =   DECLARE  INQUIRE                            LITERALLY       '31H';
749   1   =   DECLARE  STATE                              LITERALLY       '32H';
          =   /***************************************************************/
750   1   =   DECLARE  REFRESH                            LITERALLY       '80H';
751   1   =   DECLARE  DATA_RQ                            LITERALLY       '81H';
752   1   =   DECLARE  DATA                               LITERALLY       '82H';
753   1   =   DECLARE  DATA_ACK                           LITERALLY       '83H';
          =   /***************************************************************/
754   1   =   DECLARE  NAK                                LITERALLY      '0FCH';
755   1   =   DECLARE  ACK                                LITERALLY      '0FDH';
756   1   =   DECLARE  RQ_SUB                             LITERALLY      '0FEH';
757   1   =   DECLARE  STATUS                             LITERALLY      '0FFH';
          =
          =   /****************** PLC BUS ADDRESSES **************************/
          =
758   1   =   DECLARE  BROADCAST                          LITERALLY       '00H';
759   1   =   DECLARE  COMSET$2000                        LITERALLY       '01H';
760   1   =   DECLARE  METER                              LITERALLY       '02H';
          =
761   1   =   DECLARE  TSTAT$0                            LITERALLY       '08H';
762   1   =   DECLARE  TSTAT$1                            LITERALLY       '09H';
763   1   =   DECLARE  TSTAT$2                            LITERALLY       '0AH';
764   1   =   DECLARE  TSTAT$3                            LITERALLY       '0BH';
765   1   =   DECLARE  TSTAT$4                            LITERALLY       '0CH';
766   1   =   DECLARE  TSTAT$5                            LITERALLY       '0DH';
767   1   =   DECLARE  TSTAT$6                            LITERALLY       '0EH';
768   1   =   DECLARE  TSTAT$7                            LITERALLY       '0FH';
          =
769   1   =   DECLARE  WATER$HTR$1                        LITERALLY       '18H';
770   1   =   DECLARE  WATER$HTR$2                        LITERALLY       '19H';
771   1   =   DECLARE  WATER$HTR$3                        LITERALLY       '1AH';
772   1   =   DECLARE  WATER$HTR$4                        LITERALLY       '1BH';
          =
773   1   =   DECLARE  OFF_PEAK_HIGH_CNTRL_MED            LITERALLY       '3BH';
774   1   =   DECLARE  OFF_PEAK_CNTRL_HIGH                LITERALLY       '3CH';
775   1   =   DECLARE  OFF_PEAK_HIGH_MED                  LITERALLY       '3DH';
776   1   =   DECLARE  OFF_PEAK_HIGH                      LITERALLY       '3EH';
```

```
777   1  =   DECLARE  OFF_PEAK                          LITERALLY       '3FH';
         =
         =   /*****************************************************************
         =        E X T E R N A L   M O D U L E S   D E C L A R A T I O N
         =   *****************************************************************/
         =
778   2  =   ADJUST$UNITS:  PROCEDURE   EXTERNAL;
779   1  =   END ADJUST$UNITS;
         =
780   2  =   BCD$TO$BIN$CONVERT:  PROCEDURE  (BCD$NUMBER)  BYTE  EXTERNAL;
781   2  =   DECLARE  BCD$NUMBER                        BYTE;
782   1  =   END BCD$TO$BIN$CONVERT;
         =
783   2  =   BIN$TO$BCD$CONVERT:  PROCEDURE  (NUMBER)  BYTE  EXTERNAL;
784   2  =   DECLARE  NUMBER                            BYTE;
785   1  =   END BIN$TO$BCD$CONVERT;
         =
786   2  =   BILLING$ALGORITHMS:  PROCEDURE  EXTERNAL;
787   1  =   END BILLING$ALGORITHMS;
         =
788   2  =   BRICK$MSG$DECODE:  PROCEDURE  EXTERNAL;
789   1  =   END BRICK$MSG$DECODE;
         =
790   2  =   CHECK$BSR$SCHED:  PROCEDURE  EXTERNAL;
791   1  =   END CHECK$BSR$SCHED:
         =
792   2  =   CRITICAL$TIER$CHECK:  PROCEDURE  EXTERNAL;
793   1  =   END CRITICAL$TIER$CHECK;
         =
794   2  =   DECODE$TSTAT$MSG.  PROCEDURE  EXTERNAL;
795   1  =   END DECODE$TSTAT$MSG,
         =
796   2  =   DEVICE$CONDITION:  PROCEDURE  EXTERNAL;
797   1  =   END DEVICE$CONDITION;
         =
798   2  =   ELECTRIC$WATER$HEATER$OPTIMIZATION:  PROCEDURE  EXTERNAL;
799   1  =   END ELECTRIC$WATER$HEATER$OPTIMIZATION;
         =
800   2  =   GENERATE$CHECKSUM  PROCEDURE (REQUESTOR) WORD EXTERNAL;
801   2  =   DECLARE  REQUESTOR                         WORD;
802   1  =   END GENERATE$CHECKSUM;
         =
803   2  =   GET$TIER$DATA:  PROCEDURE  EXTERNAL;
804   1  =   END GET$TIER$DATA;
         =
805   2  =   HVAC$OPTIMIZATION:  PROCEDURE  EXTERNAL;
806   1  =   END HVAC$OPTIMIZATION;
         =
807   2  =   IS$IT$DLC$TIME:  PROCEDURE  EXTERNAL;
808   1  =   END IS$IT$DLC$TIME;
         =
809   2  =   LOAD$PROGRAMS:  PROCEDURE (PROGRAMS)  EXTERNAL;
810   2  =   DECLARE  PROGRAMS                          BYTE;
811   1  =   END LOAD$PROGRAMS,
         =
812   2  =   PROCESS$RECEIVED$BRICK$BYTE:  PROCEDURE  EXTERNAL;
813   1  =   END PROCESS$RECEIVED$BRICK$BYTE;
         =
814   2  =   PROCESS$RECEIVED$TSTAT$BYTE:  PROCEDURE  EXTERNAL;
815   1  =   END PROCESS$RECEIVED$TSTAT$BYTE;
         =
816   2  =   MAIN$PROGRAM$CONTROL:  PROCEDURE  EXTERNAL;
817   1  =   END MAIN$PROGRAM$CONTROL;
         =
818   2  =   RESEND$BRICK$MESSAGE:  PROCEDURE  EXTERNAL;
819   1  =   END RESEND$BRICK$MESSAGE,
         =
820   2  =   SEND$BRICK$MSG:  PROCEDURE  EXTERNAL;
821   1  =   END SEND$BRICK$MSG;
         =
822   2  =   SEND$TSTAT$MSG  PROCEDURE (TSTAT$MSG$TYPE)  EXTERNAL;
823   2  =   DECLARE  TSTAT$MSG$TYPE                    BYTE;
824   1  =   END SEND$TSTAT$MSG;
         =
825   2  =   SHUT$DOWN$HVAC:  PROCEDURE  EXTERNAL;
826   1  =   END SHUT$DOWN$HVAC;
```

```
              =
827    2   =    TERMINATE$DATA$SESSION:  PROCEDURE  EXTERNAL;
828    1   =    END TERMINATE$DATA$SESSION;
           =
829    2   =    UPDATE$TIER$BUFFER:  PROCEDURE  EXTERNAL;
830    1   =    END UPDATE$TIER$BUFFER;
           =
831    2   =    WHAT$DAY$IS$IT:  PROCEDURE  EXTERNAL;
832    1   =    END WHAT$DAY$IS$IT;
           =
833    2   =    WRITE$TO$EEPROM:  PROCEDURE  EXTERNAL;
834    1   =    END WRITE$TO$EEPROM;
                $TITLE ('DATE AND TIME MAINTENANCE')
                $INCLUDE (RLTIME.STH)
           =
           =    /**************************************************************/
           =
835    2   =    REAL$TIME:  PROCEDURE;
           =
836    2   =    WATCHDOG$TIMER = YES;                   /* TOGGLE WATCHDOG TIMER */
837    2   =    WATCHDOG$TIMER = NO;                       /* TO MAINTAIN SANITY */
           =
838    2   =    IF FAST$CLOCK$FLAG = NO  THEN
839    3   =    DO;
840    3   =      SECONDS = SECONDS + 1;                   /* INCREMENT SECONDS */
           =
841    3   =      IF BRICK$MESSAGE$TIMER <> 0  THEN
842    4   =      DO;                                          /* SECOND TIMER */
843    4   =        BRICK$MESSAGE$TIMER = BRICK$MESSAGE$TIMER - 1;
844    4   =        IF BRICK$MESSAGE$TIMER = 0  THEN
845    4   =           READY$TO$TRANSMIT$FLAG = YES;
846    4   =      END;
           =
847    3   =      IF BRICK$DELAY$TIMER$ACTIVE = YES  THEN
848    4   =      DO;
           =       /* ALLOW TRANSMISSION OF BRICK BUFFER AT END OF DATA SESSION */
849    4   =        BRICK$DELAY$TIMER = BRICK$DELAY$TIMER - 1;
850    4   =        IF BRICK$DELAY$TIMER = 0  THEN
851    5   =        DO;
852    5   =          BRICK$DELAY$TIMER$ACTIVE = NO;
853    5   =          MAIN$DATA$TIMER$ACTIVE = NO;
           =        /*********************** ADDED 4/12/89 ********************/
854    5   =          BUSY$FLAG = NO,
855    5   =          DATA$SESSION$TIMER$ACTIVE = NO;
856    5   =          DATA$PACKET$TIMER$ACTIVE = NO;
857    5   =          BUSY$MSG$TIMER$ACTIVE = NO;               /* ADDED 3/16/89 */
858    5   =          DATA$MESSAGE$BUILT = NO;
859    5   =          DATA$MESSAGE$INHIBIT = NO;
860    5   =          DATA$MSG = NO;
861    5   =          DATA$REQUEST$MSG = NO;
862    5   =          DATA$TIMER$ACTIVE = NO;
863    5   =          NEW$RECORD = YES;
864    5   =          READY$TO$RESPOND = NO;
865    5   =          READY$TO$SEND$TERMINATOR = NO;
866    5   =          REFRESH$REQUEST$MESSAGE = NO;             /* ADDED 3/16/89 */
867    5   =          TERMINATOR$FLAG = NO;
868    5   =          TERMINATOR$RECEIVED = NO;
869    5   =          WAITING$FOR$DATA$ACK$FLAG = NO;
           =
870    5   =          CURRENT$DEVICE = 0;
871    5   =          CURRENT$PROCESS = 0;
872    5   =          DATA$PROCESS = 0;
873    5   =          DATA$DESTINATION = 0;
874    5   =          DATA$TIMER = 0;
875    5   =          MESSAGE$PROCESS = 0;
876    5   =          SESSION$COUNTER = 0; /* ADDED 3/16/89 AS INSURANCE AGAINST
           =                    POSSIBLE PROBLEM WITH COMSET 2000 COMMUNICATION */
           =        /*********************** ADDED 4/12/89 ********************/
877    5   =        END;
878    4   =      END;
           =
879    3   =      IF BRICK$OK = NO  THEN
880    4   =      DO;
881    4   =        BRICK$RESET$TIMER = BRICK$RESET$TIMER + 1;
882    4   =        IF BRICK$RESET$TIMER = 2  THEN
883    5   =        DO;
884    5   =          BRICK$RESET$TIMER = 0;
885    5   =          BRICK$OK = YES;
```

```
886   5  =            REQ$SUBADDRESS$MSG = YES;
887   5  =          END;
888   4  =        END;
         =
889   3  =        IF ((SAVE$BSR <> 0 OR PER$SAV <> 0) AND (SECONDS MOD 2 = 0))
         =              THEN CALL CHECK$BSR$SCHED;
         =                                                          /*AJB NEW!!!*/
891   3  =        IF DATA$MESSAGE$INHIBIT = YES  THEN
892   4  =        DO;
893   4  =          IF DATA$MESSAGE$TIMER > 20  THEN
894   4  =            DATA$MESSAGE$TIMER = 10;
         =
895   4  =          DATA$MESSAGE$TIMER = DATA$MESSAGE$TIMER - 1;
896   4  =          IF DATA$MESSAGE$TIMER = 0  THEN
897   4  =            DATA$MESSAGE$INHIBIT = NO;
898   4  =        END;
         =
         =      /***** THE FOLLOWING TIMER ARE ADDED TO ENHANCE THE
         =                    HANDLING OF POTENTIAL DATA SESSIONS PROBLEMS. *****/
         =
899   3  =        IF DATA$TIMER$ACTIVE = YES  THEN
900   4  =        DO;
901   4  =          IF DATA$TIMER > 20 THEN
902   4  =            DATA$TIMER = 5;
903   4  =          DATA$TIMER = DATA$TIMER - 1;
904   4  =        END;
         =
905   3  =        IF DATA$SESSION$TIMER$ACTIVE = YES  THEN
906   4  =        DO;               /* 2 MINUTE TIMER TO RESTART DATA SESSION */
907   4  =          DATA$SESSION$TIMER = DATA$SESSION$TIMER - 1;
908   4  =          IF DATA$SESSION$TIMER = 0  THEN
909   5  =          DO;
910   5  =            DATA$SESSION$TIMER$ACTIVE = NO;
         =
911   5  =            IF INITIATED$DATA$SESSION = 1  THEN
912   5  =              TIER$DOWNLOAD$REQUEST = YES;
913   5  =            ELSE
         =            IF INITIATED$DATA$SESSION = 2  THEN
914   5  =              DAILY$DATA$REQUEST = YES;
915   5  =          END;
916   4  =        END,
         =
917   3  =        IF DATA$PACKET$TIMER$ACTIVE = YES  THEN
918   4  =        DO;
919   4  =          DATA$PACKET$TIMER = DATA$PACKET$TIMER - 1;
920   4  =          IF DATA$PACKET$TIMER = 0  THEN
921   5  =          DO;
922   5  =            DATA$PACKET$TIMER$ACTIVE = NO;
923   5  =            DATA$ACK$MSG = YES;
924   5  =            DATA$INTEGRITY = NO;
925   5  =          END;
926   4  =        END;
         =
         =      /************* END OF TIMER ADDITIONS 10/21/88 *******************/
         =      /*** added 8/21/89 to correct flaw in tstat firmware ***/
927   3  =        IF TSTAT$MESSAGE$DELAY = YES  THEN
928   4  =        DO;
929   4  =          IF TSTAT$MESSAGE$DELAY$TIMER > 20  THEN
930   4  =            TSTAT$MESSAGE$DELAY$TIMER = 20;
931   4  =          ELSE
         =          DO;
932   5  =            TSTAT$MESSAGE$DELAY$TIMER = TSTAT$MESSAGE$DELAY$TIMER - 1;
933   5  =            IF TSTAT$MESSAGE$DELAY$TIMER = 0  THEN
934   6  =            DO;
935   6  =              TSTAT$MESSAGE$DELAY = NO;
936   6  =              Z$BIT$SET = YES;         /* SEND OUT CONFIGURATION DATA */
937   6  =            END;
938   5  =          END;
939   4  =        END;
         =      /*******************************************************/
         =
940   3  =        IF SECONDS = 30  THEN
941   3  =          CALL CHECK$BSR$SCHED;                      /*NEW AJB 2/29/88 */
942   3  =      END;
         =
943   2  =      ELSE
         =        SECONDS = 60;
         =
```

```
 944   2  =    IF SECONDS = 60  THEN
 945   3  =    DO;
 946   3  =      SECONDS = 0;                              /* RESET SECONDS COUNTER */
 947   3  =      TIME$AND$DATE.MINUTE = TIME$AND$DATE.MINUTE + 1;
 948   3  =      UNITS$NUMBER = TIME$AND$DATE.MINUTE;
 949   3  =      CALL ADJUST$UNITS;
 950   3  =      TIME$AND$DATE.MINUTE = UNITS$NUMBER;
          =
 951   3  =      IF FAST$CLOCK$FLAG = NO  THEN
 952   4  =      DO;
 953   4  =        IF TSTAT$TIMER$FLAG = YES  THEN
 954   4  =          TSTAT$TIMER = TSTAT$TIMER - 1;      /* UPDATE TSTAT TIMER */
          =
 955   4  =        IF S$P$TIMER$ACTIVE = YES  THEN
 956   5  =        DO;
 957   5  =          IF S$P$TIMER > 5  THEN
 958   5  =            S$P$TIMER = 1;
 959   5  =          S$P$TIMER = S$P$TIMER - 1;        /* SYSTEM PROCESS TIMER */
 960   5  =        END;
          =
 961   4  =        IF DLC$TIMER$FLAG = YES  THEN
 962   5  =        DO;
 963   5  =          IF DLC$TIMER > 30 THEN
 964   5  =            DLC$TIMER = 15;
 965   5  =          DLC$TIMER = DLC$TIMER - 1;
 966   5  =        END;
          =
 967   4  =        IF BUSY$MSG$TIMER$ACTIVE = YES  THEN
 968   5  =        DO;
 969   5  =          BUSY$MSG$TIMER = BUSY$MSG$TIMER - 1;
 970   5  =          IF BUSY$MSG$TIMER = 0  THEN
 971   5  =            BUSY$MSG$TIMER$ACTIVE = NO;
 972   5  =        END;
          =
 973   4  =        IF MAIN$DATA$TIMER$ACTIVE = YES  THEN
 974   4  =          MAIN$DATA$TIMER = MAIN$DATA$TIMER - 1;
          =                                            /* DATA SESSION TIMER */
          =
 975   4  =        IF HVAC$SYSTEM$TIMER$ACTIVE = YES  THEN
 976   5  =        DO;                      /* MINIMUM ON/OFF HVAC SYSTEM TIMER */
 977   5  =          IF HVAC$SYSTEM$TIMER > 6  THEN
 978   5  =            HVAC$SYSTEM$TIMER = CONFIG$DATA.H_P$CYCLE$TIME;
 979   5  =          HVAC$SYSTEM$TIMER = HVAC$SYSTEM$TIMER - 1;
 980   5  =          IF HVAC$SYSTEM$TIMER = 0  THEN
 981   6  =          DO;
 982   6  =            HVAC$SYSTEM$TIMER$ACTIVE = NO;
 983   6  =            HVAC$SYSTEM$TIMER$EXPIRED = YES;
 984   6  =            NEW$SETPOINT = YES;
 985   6  =          END;
 986   5  =        END;
          =
 987   4  =        IF FAN$TIMER$ACTIVE = YES  THEN
 988   5  =        DO;
 989   5  =          IF FAN$TIMER > 6  THEN
 990   5  =            FAN$TIMER = CONFIG$DATA.HIGH$EFFIC$FAN;
 991   5  =          ELSE
          =            FAN$TIMER = FAN$TIMER - 1;
 992   5  =          IF FAN$TIMER = 0  THEN
 993   5  =            FAN$TIMER$ACTIVE = NO;
 994   5  =        END;
          =
 995   4  =        IF TIER$DOWNLOAD$REQUEST$TIMER <> 0  THEN
 996   5  =        DO;          /* TIMER TO DELAY TIER DATA REQUEST ON STARTUP */
 997   5  =          TIER$DOWNLOAD$REQUEST$TIMER =
          =                              TIER$DOWNLOAD$REQUEST$TIMER - 1;
 998   5  =          IF TIER$DOWNLOAD$REQUEST$TIMER = 0  THEN
 999   5  =            TIER$DOWNLOAD$REQUEST = YES;
1000   5  =        END;
1001   4  =      END;
          =
1002   3  =      IF UNITS$NUMBER = 60H  THEN               /* 60 HEX IS 60 BCD */
1003   4  =      DO;
1004   4  =        TIME$AND$DATE.MINUTE = 0;                         /* NEW HOUR */
1005   4  =        TIME$AND$DATE.HOUR = TIME$AND$DATE.HOUR + 1;
1006   4  =        UNITS$NUMBER = TIME$AND$DATE.HOUR;
1007   4  =        CALL ADJUST$UNITS;
1008   4  =        TIME$AND$DATE.HOUR = UNITS$NUMBER;
          =
```

```
1009   4  =          IF UNITS$NUMBER = 24H  THEN
1010   5  =          DO;
1011   5  =            TIME$AND$DATE.HOUR = 0;                          /* NEW DAY */
1012   5  =            TIME$AND$DATE.DAY$OF$WEEK = TIME$AND$DATE.DAY$OF$WEEK + 1;
          =
1013   5  =            IF TIME$AND$DATE.DAY$OF$WEEK = 8  THEN           /* SUNDAY */
1014   5  =              TIME$AND$DATE.DAY$OF$WEEK = 1;
          =
1015   5  =            TIME$AND$DATE.DAY = TIME$AND$DATE.DAY + 1;
1016   5  =            UNITS$NUMBER = TIME$AND$DATE.DAY;
1017   5  =            CALL ADJUST$UNITS;
1018   5  =            TIME$AND$DATE.DAY = UNITS$NUMBER;
          =
1019   5  =            IF (TIME$AND$DATE.MONTH = 2) AND
          =              ((TIME$AND$DATE.DAY = 29H) OR
          =               (TIME$AND$DATE.DAY = 30H))  THEN
1020   6  =            DO;
1021   6  =              IF (TIME$AND$DATE.DAY = 29H) AND
          =                  (TIME$AND$DATE.YEAR <> 0) THEN
1022   7  =              DO;
1023   7  =                LEAP$YEAR = (TIME$AND$DATE.YEAR) MOD 4;
          =
1024   7  =                IF LEAP$YEAR <> 0 THEN
1025   8  =                DO;                       /* THIS IS NO A LEAP YEAR */
1026   8  =                  TIME$AND$DATE.DAY = 1;
1027   8  =                  TIME$AND$DATE.MONTH = 3;
1028   8  =                END;
1029   7  =              END;
          =
1030   6  =              ELSE
          =              DO;  /* YEAR 2000 IS NOT A LEAP YEAR (DIVISIBLE BY 400) */
1031   7  =                TIME$AND$DATE.DAY = 1;
1032   7  =                TIME$AND$DATE.MONTH = 3;
1033   7  =              END;
1034   6  =            END;
          =
1035   5  =            ELSE IF (TIME$AND$DATE.DAY = 31H) AND
          =                   ((TIME$AND$DATE.MONTH = 4) OR
          =                    (TIME$AND$DATE.MONTH = 6) OR
          =                    (TIME$AND$DATE.MONTH = 9) OR
          =                    (TIME$AND$DATE.MONTH = 11H))  THEN
1036   6  =            DO;
1037   6  =              TIME$AND$DATE.DAY = 1;
1038   6  =              TIME$AND$DATE.MONTH = TIME$AND$DATE.MONTH + 1;
1039   6  =              UNITS$NUMBER = TIME$AND$DATE.MONTH;
1040   6  =              CALL ADJUST$UNITS;
1041   6  =              TIME$AND$DATE.MONTH = UNITS$NUMBER;
1042   6  =            END;
          =
1043   5  =            ELSE IF TIME$AND$DATE.DAY = 32H  THEN
1044   6  =            DO;
1045   6  =              TIME$AND$DATE.DAY = 1;
1046   6  =              TIME$AND$DATE.MONTH = TIME$AND$DATE.MONTH + 1;
          =
1047   6  =              IF TIME$AND$DATE.MONTH = 13H  THEN
1048   7  =              DO;
1049   7  =                TIME$AND$DATE.MONTH = 1;
1050   7  =                TIME$AND$DATE.YEAR = TIME$AND$DATE.YEAR + 1;
          =                                          /*** HAPPY NEW YEAR !!!!!!! ***/
1051   7  =                UNITS$NUMBER = TIME$AND$DATE.YEAR;
1052   7  =                CALL ADJUST$UNITS;
1053   7  =                IF UNITS$NUMBER = 0A0H  THEN
1054   7  =                  UNITS$NUMBER = 0;
1055   7  =                TIME$AND$DATE.YEAR = UNITS$NUMBER;
1056   7  =              END;
1057   6  =            END;
1058   5  =          END;
1059   4  =        END;
          =
1060   3  =        ELSE
          =        IF (TIME$AND$DATE.MINUTE > 60H) OR
          =           (TIME$AND$DATE.HOUR > 24H)  THEN
1061   4  =        DO WHILE 1;
1062   4  =          CALL SETRXO (.SCHEDULES, 0, 10);
1063   4  =        END;
          =
1064   3  =        CALL MAIN$PROGRAM$CONTROL;
1065   3  =      END;
          =
1066   1  =      END REAL$TIME;
```

```
        $TITLE ('INITIALIZATION AND MAIN PROGRAM')
        $INCLUDE (MNLOOP STH)
      = /**************************************************************/
      =
1067 2 = RAM$TEST:  PROCEDURE;
      =
1068 2 = CALL SETBX0 (.XRAM, ALPHA$ALPHA, RAM$END);
1069 2 = WATCHDOG$TIMER = YES;                  /* TOGGLE WATCHDOG TIMER */
1070 2 = WATCHDOG$TIMER = NO;                     /* TO MAINTAIN SANITY */
1071 2 = MISC$WORD = CMPXX0 (.XRAM, .HALF$XRAM, MID$RAM);
1072 2 = IF MISC$WORD = YAHOO  THEN
1073 3 = DO;
1074 3 =   CALL SETBX0 (.XRAM, FIVE$FIVE, RAM$END);
1075 3 =   WATCHDOG$TIMER = YES;                /* TOGGLE WATCHDOG TIMER */
1076 3 =   WATCHDOG$TIMER = NO;                   /* TO MAINTAIN SANITY */
1077 3 =   MISC$WORD = CMPXX0 (.XRAM, .HALF$XRAM, MID$RAM);
1078 3 =   IF MISC$WORD = YAHOO  THEN
1079 4 =   DO;
1080 4 =     CALL SETBX0 (.XRAM, FOX$FOX, RAM$END);
1081 4 =     WATCHDOG$TIMER = YES,              /* TOGGLE WATCHDOG TIMER */
1082 4 =     WATCHDOG$TIMER = NO;                 /* TO MAINTAIN SANITY */
1083 4 =     MISC$WORD = CMPXX0 (.XRAM, .HALF$XRAM, MID$RAM);
1084 4 =     IF MISC$WORD = YAHOO  THEN
1085 5 =     DO;
1086 5 =       CALL SETBX0 (.XRAM, 0, RAM$END);
1087 5 =       WATCHDOG$TIMER = YES;            /* TOGGLE WATCHDOG TIMER */
1088 5 =       WATCHDOG$TIMER = NO;               /* TO MAINTAIN SANITY */
1089 5 =       MISC$WORD = CMPXX0 (.XRAM, .HALF$XRAM, MID$RAM);
1090 5 =     END;
1091 4 =   END;
1092 3 = END;
      =
1093 1 = END RAM$TEST;
      =
      = /**************************************************************/
      =
1094 2 = INIT_AND_MAIN_PROGRAM:  PROCEDURE PUBLIC;
      =
1095 2 = IE = 0;                                /* DISABLE ALL INTERRUPTS */
      =
      = /**************** CLEAR BIT MAPPED ADDRESS SPACE ****************/
      =
1096 2 = CALL SETBD0 (20H, 0, 0FH);
      =
      = /******************* CLEAR MESSAGE BUFFERS *********************/
      =
1097 2 = CALL SETBX0 (.RECV$BRICK$MESSAGE, 0, 20);
      =
1098 2 = CALL SETBX0 (.RECV$TSTAT$MESSAGE, 0, 32);
      =
      = /************** INITIALIZE THE REQUIRED PARAMETERS **************/
      =
1099 2 = INITIALIZATION$FLAG = YES;          /* START OF INITIALIZATION */
1100 2 = WATCHDOG$TIMER = YES;                 /* TOGGLE WATCHDOG TIMER */
1101 2 = WATCHDOG$TIMER = NO;                    /* TO MAINTAIN SANITY */
1102 2 = X10$TRANSMIT$OFF = YES;           /* TURN OFF X.10 TRANSMITTER */
1103 2 = BRICK$OK = NO;                         /* RESET THE PAN BRICK */
      =
1104 2 = BSR$INIT = YES;          /*AJB 1ST TIME THRU FOR X-10 DEVICES!!  */
1105 2 = BILLING$COMPLETED = YES;
1106 2 = EWH$OPTIMIZATION$REQUIRED = YES;   /* OPTIMIZE TO UPDATE TSTAT */
1107 2 = HVAC$OPTIMIZATION$REQUIRED = YES;  /* OPTIMIZE TO UPDATE TSTAT */
1108 2 = HVAC$SYSTEM$TIMER$EXPIRED = YES;
1109 2 = NEW$RECORD = YES;
1110 2 = NEW$SETPOINT = YES;
1111 2 = TSTAT$TIMER$FLAG = YES;                    /* NO TSTAT COMM YET */
1112 2 = SP = INIT$SP;
1113 2 = IP = 0;
      =
      = /**************************************************************/
      =
1114 2 = IF SCHEDULES(3) <> 0  THEN
1115 3 = DO;
1116 3 =   AMOUNT = SCHEDULES$SIZE;
1117 3 =   RETURNED$CHECKSUM = GENERATE$CHECKSUM (.SCHEDULES);
1118 3 = END;
```

```
              =
1119    2     =    STATUS$BYTES(0) = 0;                  /* PRELIMINARY SYSTEM STATUS */
              =
1120    2     =    IF (RAM$CHECKSUM <> RETURNED$CHECKSUM)
              =                      OR
              =           (SCHEDULES(3) = 0)  THEN
1121    3     =    DO;                                          /* COLD OR COOL START */
1122    3     =      VALID$RAM$DATA$FLAG = NO;
1123    3     =      GET$ALL$TIER$DATA = YES;     /* TIER DATA NEEDED (TCH 1/24/89) */
1124    3     =      CALL RAM$TEST;                             /* TEST EXTERNAL RAM */
1125    3     =      IF MISC$WORD <> YAHOO  THEN
1126    4     =      DO;                                         /* RAM TEST FAILURE */
1127    4     =        SEND$ERROR$MSG.PROCESS$NUMBERS = SYSTEM$PROCESS;
1128    4     =        SEND$ERROR$MSG.ERROR$TYPE(ERROR$INDEX) = DEFECTIVE$RAM;
              =
1129    4     =        IF ERROR$INDEX > 13 THEN
1130    4     =          SEND$ERROR$MSG.ERROR$TYPE(ERROR$INDEX) =
              =                             ERROR$BUFFER$OVERFLOW; /* ADDED 3/16/89 */
1131    4     =        ELSE
              =          ERROR$INDEX = ERROR$INDEX + 1;
              =
1132    4     =        ERROR$ALERT = YES;
1133    4     =      END;
              =
1134    3     =      ELSE
              =      DO;
1135    4     =        CALL MOVCX0 (.TIME$DEFAULT, .TIME$AND$DATE.YEAR, 6);
              =                            /*** LOAD TIME AND DATE DEFAULT VALUES ***/
              =
1136    4     =        PRICING$DATA.TSTAT$DISPLAY = PRICING$DATA.TSTAT$DISPLAY OR 8;
              =                                  /*** FORCE FOUR TIER DEFAULT VALUE ***/
1137    4     =      END;
              =
1138    3     =      CALL SETEX0 (.DELTA$DEGREE, 5, 3);       /* PRESET ANTICIPATOR */
1139    3     =    END;
              =
1140    2     =    ELSE
              =    DO;
1141    3     =      VALID$RAM$DATA$FLAG = YES;
1142    3     =      IF EWH$OVERRIDE$STORAGE = 0FFH  THEN
1143    4     =      DO;
1144    4     =        EWH$OVERRIDE$FLAG = YES;
1145    4     =        STATUS$BYTES(0) = STATUS$BYTES(0) OR 4;
              =                                     /* TURN ON WATER HEATER ELEMENT */
1146    4     =        EWH$OVERRIDE$STORAGE = 0;
1147    4     =      END;
              =
1148    3     =      IF HVAC$OVERRIDE$STORAGE = 1  THEN
1149    4     =      DO;
1150    4     =        HVAC$TEMPORARY$OVERRIDE = YES;
1151    4     =        SYSTEM$STATUS.SETPOINT$TEMPERATURE = SAVED$SETPOINT;
1152    4     =      END;
              =
1153    3     =      ELSE
              =      IF HVAC$OVERRIDE$STORAGE = 2  THEN
1154    4     =      DO;
1155    4     =        HVAC$PERMANENT$OVERRIDE = YES;
1156    4     =        SYSTEM$STATUS.SETPOINT$TEMPERATURE = SAVED$SETPOINT;
1157    4     =        STATUS$BYTES(0) = STATUS$BYTES(0) OR 8;
              =                               /* TURN ON TEMPERATURE HOLD ELEMENT */
1158    4     =      END;
              =
1159    3     =      HVAC$OVERRIDE$STORAGE = 0;
1160    3     =      SAVED$SETPOINT = 0;
              =
1161    3     =      IF DLC$ACTIVE$STORAGE = 0FFH  THEN
1162    3     =        DLC$ACTIVE$FLAG = YES;
1163    3     =    END;
              =
1164    2     =    WATCHDOG$TIMER = YES;                    /* TOGGLE WATCHDOG TIMER */
1165    2     =    WATCHDOG$TIMER = NO;                        /* TO MAINTAIN SANITY */
              =
              =    /*****************************************************************/
              =
1166    2     =    BRICK$RESET$TIMER = 0;                /* CLEAR BRICK TIMER COUNTER */
1167    2     =    BUFFER$INDEX = 0;
```

```
1168   2  =   BUSY$DEVICE = 0;
1169   2  =   DATA$MESSAGE$TIMER = 0;
1170   2  =   DELTA$INDEX = 0;
1171   2  =   ERROR$INDEX = 0;
1172   2  =   HVAC$SYSTEM$TIMER = 0;
1173   2  =   INITIATED$DATA$SESSION = 0;
1174   2  =   RECV$BRINDEX = 0;
1175   2  =   RECV$BYTE$COUNT$REGISTER = 0;
1176   2  =   RECV$TSTAT$BYTE$COUNT$REGISTER = 0;
1177   2  =   PER$SAV = 0;              /*AJB FOR MULTIPLE X-10 PROGRAMS   !!   */
1178   2  =   SAVE$BSR = 0,                 /* FOR MULTIPLE X-10 STARTS OR STOPS*/
1179   2  =   SESSION$COUNTER = 0;
1180   2  =   STATUS$BYTES(1) = 0;                  /* PRELIMINARY SYSTEM STATUS */
1181   2  =   STEP$COUNTER = 0;
1182   2  =   TSTAT$TIMER = 5;                /* PRESET TIMEOUT FOR TSTAT COMM. */
1183   2  =   TRANS$BRINDEX = 0;
1184   2  =   UART$LCR = UART$TIMER$SET;                /* SET UP TSTAT BAUD RATE */
1185   2  =   UART$IER = UART$BAH;          /* USED TO LOAD HIGH BYTE OF TIMER */
1186   2  =   T_R$TSTAT$BYTE = 7;                  /*AJB-LOAD UART TIMER COUNT */
1187   2  =   UART$LCR = UART$LINE$CONTROL;
1188   2  =   UART$IER = UART$INTERRUPT$ENABLE;     /* ENABLE TSTAT INTERRUPTS */
1189   2  =   VALID$TSTAT$MSG$TIMER = 0;
          =
1190   2  =   CALL SETBX0 ( SEND$ERROR$MSG.ERROR$TYPE, 0, 15);
          =                                             /* CLEAR OUT ERROR BUFFER */
          =
1191   2  =   CALL SHUT$DOWN$HVAC;                      /* TURN OFF HVAC SYSTEM */
          =
          =   /*****************************************************************/
          =
1192   2  =   SECOND$TIMER = SECOND$TIMER$INIT;      /* PRELOAD SECOND COUNTER */
1193   2  =   SECONDS = 0;
          =                                     /*** INITIALIZE 80C31 REGISTERS ***/
1194   2  =   PCON = INIT$PCON;
1195   2  =   SCON = INIT$SCON;
1196   2  =   TMOD = INIT$TMOD.
1197   2  =   TCON = INIT$TCON;
          =
1198   2  =   TL0 = INIT$TL0;
1199   2  =   TH0 = INIT$TH0;
1200   2  =   TH1 = INIT$TH1;
          =
1201   2  =   IE = INIT$IE,
          =
          =   /*****************************************************************/
          =
1202   2  =   IF ERROR$ALERT = NO  THEN
1203   3  =   DO;      /* CHECK CONFIGURATOR DATA IN EEPROM FOR VALID NUMBERS */
1204   3  =     BAD$CHARACTER = NO;
1205   3  =     CHARACTERS$CHECKED = 0;
1206   3  =     TOTAL$CHARACTERS = 15;      /* CONFIG.DATA ONLY - UNITS & TENS */
          =
1207   4  =     DO WHILE (BAD$CHARACTER = NO) AND
          =                         (CHARACTERS$CHECKED <> TOTAL$CHARACTERS);
          =                                       /* TEST UNITS NUMBER FOR BCD */
1208   4  =       TEST$CHARACTER =
          =                 EEPROM$DATA.VERSION(CHARACTERS$CHECKED) AND 0FH;
1209   4  =       IF TEST$CHARACTER > 9  THEN
1210   4  =         BAD$CHARACTER = YES;
          =                                        /* TEST TENS NUMBER FOR BCD */
1211   4  =       TEST$CHARACTER =
          =                EEPROM$DATA.VERSION(CHARACTERS$CHECKED) AND 0F0H;
1212   4  =       IF TEST$CHARACTER > 20H  THEN
1213   4  =         BAD$CHARACTER = YES;
          =
1214   4  =       CHARACTERS$CHECKED = CHARACTERS$CHECKED + 1;
1215   4  =     END,
          =
1216   3  =     IF EEPROM$DATA.HVAC(3) <> 0  THEN
1217   4  =     DO;                  /* FIND CHECKSUM FOR CURRENT EEPROM DATA */
1218   4  =       AMOUNT = EEPROM$LENGTH;
1219   4  =       RETURNED$CHECKSUM = GENERATE$CHECKSUM (.EEPROM$DATA);
1220   4  =     END;
          =
1221   3  =     IF (EEPROM$DATA.CHECKSUM <> RETURNED$CHECKSUM)
          =                         OR
```

```
            =          (EEPROM$DATA.HVAC(3) = 0)
            =                   OR
            =            (BAD$CHARACTER = YES)  THEN
            =
1222   4    =     DO;          /* BAD EEPROM DATA OR EEPROM DATA IS ALL ZEROES */
1223   4    =       IF VALID$RAM$DATA$FLAG = NO  THEN
1224   5    =       DO;
1225   5    =         LOAD$BSR$DEFAULTS = YES;
1226   5    =         CALL LOAD$PROGRAMS (DEFAULT);
1227   5    =         CALL MOVCX0 (.CONFIG$DEFAULTS, .CONFIG$DATA, CONFIG$SIZE);
            =                       /* LOAD DEFAULT CONIFGURATION DATA INTO RAM */
            =
1228   5    =         AMOUNT = SCHEDULES$SIZE;
1229   5    =         RAM$CHECKSUM = GENERATE$CHECKSUM (.SCHEDULES);
            =                            /* MAINTAINS DATA INTEGRITY ON STARTUP */
1230   5    =       END;
            =
1231   4    =       ELSE
            =       DO;
1232   5    =         HVAC$DATA$FLAG = YES;
1233   5    =         EWH$DATA$FLAG = YES;
1234   5    =         BSRDEV$DATA$FLAG = YES;
1235   5    =         CONFIG$DATA$FLAG = YES;
1236   5    =       END;
            =
1237   4    =       DATA$TO$BURN = YES;
1238   4    =       EEPROM$DATA.TEST$BYTE = 0;
            =
1239   4    =     END;
            =
1240   3    =     ELSE
            =     DO;
1241   4    =       IF VALID$RAM$DATA$FLAG = NO  THEN
1242   5    =       DO;
1243   5    =         CALL MOVXX0 (.EEPROM$DATA, .SCHEDULES, EEPROM$LENGTH);
            =                               /* LOAD EEPROM DATA INTO STATIC RAM */
            =
1244   5    =         AMOUNT = SCHEDULES$SIZE;
1245   5    =         RAM$CHECKSUM = GENERATE$CHECKSUM (.SCHEDULES);
            =                            /* MAINTAINS DATA INTEGRITY ON STARTUP */
1246   5    =       END;
            =
1247   4    =       ELSE
            =       DO;
1248   5    =         IF RAM$CHECKSUM <> RETURNED$CHECKSUM  THEN
1249   6    =         DO,
1250   6    =           HVAC$DATA$FLAG = YES;
1251   6    =           EWH$DATA$FLAG = YES;
1252   6    =           BSRDEV$DATA$FLAG = YES;
1253   6    =           CONFIG$DATA$FLAG = YES;
            =
1254   6    =           CALL WRITE$TO$EEPROM;
1255   6    =         END;
1256   5    =       END;
1257   4    =     END;
            =                    /* SET FLAGS TO START TIMER FOR BRICK MESSAGES */
            =
1258   3    =     WHAT$TIME$MSG = YES;              /* ACTIVATES 5 MINUTE TIMER */
1259   3    =     S$P$TIMER = 5;
1260   3    =     S$P$TIMER$ACTIVE = YES;
            =
1261   3    =   END;
            =
1262   2    =   ELSE
            =     TRANS$BRICK$MSG.PROCESS$NUMBERS = SYSTEM$PROCESS;
            =
1263   2    =   IF CONFIG$DATA.EWH$PREHEAT <> 0  THEN
1264   2    =     EWH$OPTIMIZATION$REQUIRED = YES;  /* OPTIMIZE TO UPDATE TSTAT */
            =
1265   2    =   CONTROLLER$ADDRESS = MISC_LOCATION AND 03H;
            =
            =   /**************************************************************/
            =
1266   2    =   TIER$INDEX = 0;
            =
1267   2    =   CALL UPDATE$TIER$BUFFER;
```

```
              =
1268   2   =   NEEDED$HOUR = TIME$AND$DATE.HOUR;
1269   2   =   NEEDED$HOUR = BCD$TO$BIN$CONVERT (NEEDED$HOUR);
           =
1270   2   =   CALL WHAT$DAY$IS$IT;
           =             /* UPDATE CONTROLLER UNTIL TIME MESSAGE IS RECEIVED */
           =
1271   2   =   CALL CRITICAL$TIER$CHECK;                    /* LOOKS AT NEXT HOUR */
           =
1272   2   =   DLC$DATA$NEEDED = NO;
1273   2   =   CALL IS$IT$DLC$TIME;
           =                 /* DETERMINE IF DIRECT LOAD CONTROL IS ACTIVE */
           =
           =   /*** added 8/21/89 to correct flaw in tstat firmware ***/
1274   2   =   TSTAT$MESSAGE$DELAY = YES;              /* ACTIVATE DELAY TIMER */
1275   2   =   TSTAT$MESSAGE$DELAY$TIMER = 20;             /* LOAD DELAY TIMER */
           =   /*******************************************************/
           =
1276   2   =   STORED$SECONDS = SECONDS;               /* STORE CURRENT SECOND */
1277   2   =   FAILSAFE$COUNTER = 8000H;          /* LOAD COUNTER FOR FAILSAFE */
           =
1278   2   =   WATCHDOG$TIMER = YES;                  /* TOGGLE WATCHDOG TIMER */
1279   2   =   WATCHDOG$TIMER = NO;                      /* TO MAINTAIN SANITY */
           =
           =
           =   /**************************************************************
           =                         M A I N   P R O G R A M
           =   **************************************************************/
           =
1280   3   =   DO WHILE 1;
           =
           =   /*** ADDED 8/8/89 ***/
1281   3   =     IF SYSTEM$STATUS.CURRENT$MODE = COOL$MODE  THEN
1282   4   =     DO;
1283   4   =       REV$VALVE = ENERGIZE;
1284   4   =       HEAT$STAGE$1 = DEENERGIZE;
1285   4   =       HEAT$STAGE$2 = DEENERGIZE;
1286   4   =     END;
           =   /*** TO INSURE THAT HTG AND CLG ARE NOT ON AT THE SAME TIME ***/
           =
           =   /*** ADDED 8/8/89 ***/
1287   3   =     IF SYSTEM$STATUS.CURRENT$MODE = HEAT$MODE  THEN
1288   4   =     DO;
1289   4   =       REV$VALVE = DEENERGIZE;
1290   4   =       COOL$STAGE$1 = DEENERGIZE;
1291   4   =       COOL$STAGE$2 = DEENERGIZE;
1292   4   =     END;
           =   /*** TO INSURE THAT HTG AND CLG ARE NOT ON AT THE SAME TIME ***/
           =
1293   3   =     IF SECONDS = STORED$SECONDS  THEN
1294   4   =     DO;
1295   4   =       FAILSAFE$COUNTER = FAILSAFE$COUNTER + 1;
1296   4   =       IF FAILSAFE$COUNTER = 0  THEN
1297   5   =       DO WHILE 1;     /* CONTROLLER HUNG UP - WAIT FOR WATCHDOG */
1298   5   =         FAILSAFE$COUNTER = 0;
1299   5   =       END;
1300   4   =     END;
           =
1301   3   =     ELSE
           =     DO;
1302   4   =       FAILSAFE$COUNTER = 8000H;      /* LOAD COUNTER FOR FAILSAFE */
1303   4   =       STORED$SECONDS = SECONDS;          /* STORE CURRENT SECOND */
1304   4   =     END;
           =
1305   3   =     IF TSTAT$MESSAGE$RECEIVED = YES  THEN
1306   4   =     DO;                               /*** DECODE TSTAT MESSAGE ***/
1307   4   =       IF (VALID$TSTAT$MSG$RECEIVED = YES) AND
           =                                (TSTAT$MESSAGE$DELAY = NO)  THEN
           =   /*** TSTAT$MESSAGE$DELAY added 8/21/89 ***/
1308   4   =         CALL DECODE$TSTAT$MSG;
           =
1309   4   =       VALID$TSTAT$MSG$RECEIVED = NO;
1310   4   =       TSTAT$MESSAGE$RECEIVED = NO;
1311   4   =       CALL SETBX0 (.RECV$TSTAT$MESSAGE, 0, 20H);
1312   4   =     END;
           =
```

```
1313   3  =      IF RECEIVED$BRICK$MESSAGE = YES  THEN
1314   4  =      DO;                                   /*** DECODE BRICK MESSAGE ***/
1315   4  =        RECEIVED$BRICK$MESSAGE = NO;
1316   4  =        IF BRICK$OK = NO  THEN
1317   5  =        DO;
1318   5  =          CALL SETBX0 (.RECV$BRICK$MESSAGE,0,40);
          =               /* CLEAR OUT ENTIRE RECEIVE BRICK MESSAGE BUFFER */
1319   5  =          RECV$BRINDEX = 0;
1320   5  =        END;
          =
1321   4  =        ELSE
          =        DO;
1322   5  =          IF BUSY$FLAG = NO THEN
1323   6  =          DO,
1324   6  =            IF RECV$BRICK$MESSAGE(1) < 0FCH  THEN
1325   7  =            DO;
1326   7  =              CURRENT$DEVICE = RECV$BRICK$MESSAGE(2);
1327   7  =              CURRENT$PROCESS = RECV$BRICK$MESSAGE(3);
1328   7  =            END;
          =
1329   6  =            CALL BRICK$MSG$DECODE;
1330   6  =          END;
          =
1331   5  =          ELSE
          =          DO;
1332   6  =            IF (RECV$BRICK$MESSAGE(1) < MIN$BRICK$MESSAGE$TYPE)
          =                                       AND
          =              ((RECV$BRICK$MESSAGE(2) <> CURRENT$DEVICE) AND
          =               (RECV$BRICK$MESSAGE(3) = CURRENT$PROCESS))  THEN
1333   7  =            DO;
1334   7  =              SEND$BUSY$MSG.DESTINATION$ADDRESS =
          =                                                 RECV$BRICK$MESSAGE(2);
1335   7  =              SEND$BUSY$MSG.PROCESS$NUMBERS = RECV$BRICK$MESSAGE (3);
          =
1336   7  =              BUSY$MSG = YES;
1337   7  =            END;
          =
1338   6  =            ELSE
          =              CALL BRICK$MSG$DECODE;
1339   6  =          END,
          =
1340   5  =          IE = IE AND 7FH,           /* DISABLE INTERRUPTS TO PRELOAD
          =                                        RECEIVE BRICK MESSAGE BUFFER */
1341   5  =          RECV$BRICK$MESSAGE(0) = 0FFH;
1342   5  =          IE = IE OR 80H;                  /* REENABLE ALL INTERRUPTS */
1343   5  =        END;
1344   4  =      END;
          =
1345   3  =      ELSE
          =      DO;
1346   4  =        IF SECOND$FLAG = YES  THEN
1347   5  =        DO;                                     /*** REAL TIME UPDATE ***/
1348   5  =          SECOND$FLAG = NO;
1349   5  =          CALL REAL$TIME;
1350   5  =        END;
          =
1351   4  =        ELSE
          =
          =        IF (TSTAT$TIMER = 0) AND (TSTAT$TIMER$FLAG = YES)  THEN
1352   5  =        DO;
1353   5  =          TSTAT$TIMER$FLAG = NO;
          =                   /* NO TSTAT COMMUNICATIONS WITHIN 5 MINUTES */
1354   5  =          ERROR$ALERT = YES;
1355   5  =          SEND$ERROR$MSG.PROCESS$NUMBERS = SYSTEM$PROCESS;
1356   5  =          SEND$ERROR$MSG.ERROR$TYPE(ERROR$INDEX) = NO$TSTAT$COMM;
          =
1357   5  =          IF ERROR$INDEX > 13 THEN
1358   5  =            SEND$ERROR$MSG.ERROR$TYPE(ERROR$INDEX) =
          =                           ERROR$BUFFER$OVERFLOW, /* ADDED 3/16/89 */
1359   5  =          ELSE
          =            ERROR$INDEX = ERROR$INDEX + 1;
          =                                     /*** RE-INITIALIZE TSTAT UART ***/
1360   5  =          UART$IER = 0;                 /* DISABLE TSTAT INTERRUPTS */
1361   5  =          UART$LCR = UART$TIMER$SET;       /* SET UP TSTAT BAUD RATE */
1362   5  =          UART$IER = UART$BAH;   /* USED TO LOAD HIGH BYTE OF TIMER */
1363   5  =          T_R$TSTAT$BYTE = 7;            /*AJB-LOAD UART TIMER COUNT */
```

```
1364   5  =          UART$LCR = UART$LINE$CONTROL;
1365   5  =          UART$IER = UART$INTERRUPT$ENABLE;
          =                                               /* ENABLE TSTAT INTERRUPTS */
1366   5  =          CALL SHUT$DOWN$HVAC;                        /* RESTART HVAC SYSTEM */
1367   5  =        END;
          =
1368   4  =        ELSE
          =        IF DATA$TO$BURN = YES  THEN
1369   4  =          CALL WRITE$TO$EEPROM;
          =
          =              /*** TEST FOR HVAC OPTIMIZATION TIME/CALCULATION ***/
1370   4  =        ELSE
          =        IF HVAC$OPTIMIZATION$REQUIRED = YES  THEN
1371   4  =          CALL HVAC$OPTIMIZATION;
          =
1372   4  =        ELSE
          =        IF EWH$OPTIMIZATION$REQUIRED = YES  THEN
1373   4  =          CALL ELECTRIC$WATER$HEATER$OPTIMIZATION;
          =
1374   4  =        ELSE
          =        IF BRICK$OK = YES  THEN
1375   5  =        DO;
1376   5  =          IF WAITING = YES  THEN       /* WAITING FOR BRICK RESPONSE */
1377   6  =          DO;
1378   6  =            IF READY$TO$TRANSMIT$FLAG = YES  THEN
          =                       /* BRICK HAS RESPONDED OR TIMER TIMED OUT */
1379   6  =            CALL RESEND$BRICK$MESSAGE;
1380   6  =          END;
          =
1381   5  =          ELSE
          =          IF WAITING = NO  THEN
1382   5  =            CALL SEND$BRICK$MSG;
          =
1383   5  =          IF FAST$CLOCK$FLAG = YES  THEN
1384   6  =          DO;
1385   6  =            IF FAST$CLOCK$COUNTER = 0  THEN
1386   7  =            DO;
1387   7  =              FAST$CLOCK$FLAG = NO;
1388   7  =              SECOND$FLAG = YES;
1389   7  =            END;
          =
1390   6  =            ELSE
          =            DO;
1391   7  =              FAST$CLOCK$COUNTER = FAST$CLOCK$COUNTER - 1;
1392   7  =              CALL REAL$TIME;
1393   7  =            END;
1394   6  =          END;
          =
1395   5  =          IF MAIN$DATA$TIMER$ACTIVE = YES  THEN
1396   6  =          DO;
1397   6  =            IF MAIN$DATA$TIMER = 0  THEN
1398   6  =              CALL TERMINATE$DATA$SESSION;
1399   6  =          END.
          =
1400   5  =          ELSE
          =          DO;
1401   6  =            IF TIER$DOWNLOAD$REQUEST = YES  THEN
1402   7  =            DO;
1403   7  =              RECORD$OVERHEAD.DATA$LENGTH = 43;
          =                           /* CONTROLLER ADDRESS + PROCESS TYPE +
          =                                NUMBER OF DATA TYPES + DATA TYPES */
          =
1404   7  =              DEVICE$RECORD.NUMBER$DATA$TYPES = 40;       /* 40 DAYS */
          =
1405   7  =              CALL MOVCX0 (.TIER$REQUEST$TYPES,
          =                           .DEVICE$RECORD.DATA$TYPES,
          =                           40);
1406   7  =              TIER$DOWNLOAD$REQUEST = NO;
1407   7  =              INITIATED$DATA$SESSION = 1;
1408   7  =              GET$ALL$TIER$DATA = YES;
1409   7  =              DATA$REQUEST$MSG = YES;
1410   7  =              SESSION$COUNTER = 1;
1411   7  =              DATA$TIMER$ACTIVE = YES;
1412   7  =              DATA$TIMER = 0;
1413   7  =              MAIN$DATA$TIMER$ACTIVE = YES;
```

```
1414   7  =              MAIN$DATA$TIMER = 15;
1415   7  =              READY$TO$RESPOND = YES;
1416   7  =              BUSY$FLAG = YES;
1417   7  =              DATA$DESTINATION = METER;
1418   7  =              CURRENT$PROCESS = 11H;
1419   7  =              MESSAGE$PROCESS = 11H;.
1420   7  =              DATA$PROCESS = 11H;
1421   7  =            END;
          =
1422   6  =            ELSE
          =            IF DAILY$DATA$REQUEST = YES  THEN
1423   7  =            DO;
1424   7  =              DAILY$DATA$REQUEST = NO;
          =
1425   7  =              RECORD$OVERHEAD.DATA$LENGTH = 6;
1426   7  =              DEVICE$RECORD.NUMBER$DATATYPES = DAILY$DATA$TYPES;
1427   7  =              DEVICE$RECORD.DATA$TYPES(0) = BILLING$INFO;
1428   7  =              DEVICE$RECORD.DATA$TYPES(1) = TIER$USAGE$INFO;
1429   7  =              DEVICE$RECORD.DATA$TYPES(2) = PRICING$INFO;
          =
1430   7  =              INITIATED$DATA$SESSION = 2;
1431   7  =              DATA$REQUEST$MSG = YES;
1432   7  =              SESSION$COUNTER = 1;
1433   7  =              DATA$TIMER$ACTIVE = YES;
1434   7  =              DATA$TIMER = 0;
1435   7  =              MAIN$DATA$TIMER$ACTIVE = YES;
1436   7  =              MAIN$DATA$TIMER = 15;
1437   7  =              READY$TO$RESPOND = YES;
1438   7  =              BUSY$FLAG = YES;
1439   7  =              DATA$DESTINATION = METER;
1440   7  =              CURRENT$PROCESS = 11H;
1441   7  =              MESSAGE$PROCESS = 11H;
1442   7  =              DATA$PROCESS = 11H;
1443   7  =            END;
          =
1444   6  =            ELSE
          =            IF INITIALIZATION$FLAG = YES  THEN
1445   6  =              INITIALIZATION$FLAG = NO;   /* INITIALIZATION IS DONE */
1446   6  =            ELSE
          =            DO;
1447   7  =              IF BILLING$COMPLETED = NO  THEN
1448   7  =                CALL BILLING$ALGORITHMS;
1449   7  =            END;
1450   6  =          END,
1451   5  =        END;
1452   4  =      END;
1453   3  =    END;                                        /*** END OF DO-WHILE ***/
          =
1454   1  =    END INIT_AND_MAIN_PROGRAM;  /*** END OF INITIALIZATION
          =                                           AND MAIN PROGRAM MODULE ***/

1455   1       END MAIN$PROG;




MODULE INFORMATION:                  (STATIC+OVERLAYABLE)
    CODE SIZE                        = 0B37H       2871D
    CONSTANT SIZE                    = 003DH         61D
    DIRECT VARIABLE SIZE             =   02H+00H      2D+  0D
    INDIRECT VARIABLE SIZE           =   00H+00H      0D+  0D
    BIT SIZE                         =   0FH+00H     15D+  0D
    BIT-ADDRESSABLE SIZE             =   00H+00H      0D+  0D
    AUXILIARY VARIABLE SIZE          = 01E5H        485D
    MAXIMUM STACK SIZE               = 0004H          4D
    REGISTER-BANK(S) USED:             0
    2479 LINES READ
    0 PROGRAM ERROR(S)
END OF PL/M-51 COMPILATION


DOS 3.30 (038-N) PL/M-51 V1.2
COMPILER INVOKED BY:  C:\INTEL\PLM51.EXE TSTAT.PTH PW(80)PL(60)DB NOINTVECTOR OT
>> (3)ROM(LARGE)
```

```
1    1        TSTAT$MSG: DO;

              /*****************************************************/
              /*                                                   */
              /* TTTTTTT    SSSSS   TTTTTTT       A       TTTTTTT  */
              /*    T      S           T         A A         T     */
              /*    T      S           T        A   A        T     */
              /*    T       SSSS       T       AAAAAAA       T     */
              /*    T           S      T      A       A      T     */
              /*    T           S      T     A         A     T     */
              /*    T      SSSSS       T    A           A    T     */
              /*                                                   */
              /*****************************************************/

              /**************************************************************
              (c) Copyright, Johnson Controls Incorporated, 1988.  All rights
                  reserved. The following program is the exclusive property of
                  Johnson Controls, Inc. and its use is restricted by license
                  agreement to the system with which it was furnished.  The
                  program contents are confidential and may not be disclosed
                  or used outside the system without the express written
                  consent of Johnson Controls.  This program is further
                  protected by federal copyright law as an unpublished work
                  and any unauthorized reproduction is prohibited.
              **************************************************************/

              $NOLIST
              $TITLE ('TSTAT DECLARATIONS')
              $INCLUDE (TSTDCL.DTH)
           =
           =  /****************************************************************
           =       P U B L I C   S T R U C T U R E   D E C L A R A T I O N S
           =  ****************************************************************/
           =
455  1     =  DECLARE  RECV$TSTAT$MESSAGE        (32) BYTE  PUBLIC  AUXILIARY;
           =
456  1     =  DECLARE  RECV$TSTAT$MSG  STRUCTURE (
           =      BYTE$COUNT                        BYTE,
           =      MSG$TYPE                          BYTE,
           =      DEVICE$ADDRESS                    BYTE,
           =      DATA$FIELD                   (28) BYTE,
           =      CHECKSUM                          BYTE)  AT (.RECV$TSTAT$MESSAGE)
           =                                                            AUXILIARY;
           =
457  1     =  DECLARE  TRANS$TSTAT$MESSAGE       (32) BYTE  PUBLIC  AUXILIARY;
           =
458  1     =  DECLARE  TRANS$TSTAT$MSG  STRUCTURE (
           =      BYTE$COUNT                        BYTE,
           =      MSG$TYPE                          BYTE,
           =      DEVICE$ADDRESS                    BYTE,
           =      DATA$FIELD                   (28) BYTE,
           =      CHECKSUM                          BYTE)  AT (.TRANS$TSTAT$MESSAGE)
           =                                                            AUXILIARY;
           =
459  1     =  DECLARE  SYSTEM$STATUS  STRUCTURE (
           =      CURRENT$TEMPERATURE               BYTE,
           =      SETPOINT$TEMPERATURE              BYTE,
           =      CURRENT$TIER                      BYTE,
           =      CURRENT$PERIOD                    BYTE,
           =      CURRENT$MODE                      BYTE,
           =      FAN$MODE                          BYTE,
           =      EMERGENCY$HEAT                    BYTE,
           =      HVAC$ACTIVE                       BYTE,
           =      HVAC$OVERRIDE                     BYTE,
           =      EWH$ACTIVE                        BYTE,
           =      EWH$OVERRIDE                      BYTE,
           =      WD_WE                             BYTE,
           =      OPT$ACTIVE                        BYTE,
           =      RUNTIME$TOTAL$HTG             (2) BYTE)  PUBLIC  AUXILIARY;
           =
460  1     =  DECLARE  OVERRIDES                (168) BYTE  PUBLIC  AUXILIARY;
           =
461  1     =  DECLARE  HVAC$OVERRIDE (8) STRUCTURE  (
           =      START                         (5) BYTE,
           =      STOP                          (5) BYTE,
           =      TEMPERATURE                       BYTE)  AT  (.OVERRIDES (0))
           =                                                            AUXILIARY;
           =
           =
```

```
462   1  =   DECLARE  EWH$OVERRIDE (8)  STRUCTURE  (
         =       START                    (5) BYTE,
         =       STOP                     (5) BYTE)  AT  (.OVERRIDES (88))
         =                                                        AUXILIARY;
463   1  =   DECLARE  TSTAT$BILLING$INFO$ARRAY  (36) BYTE  PUBLIC  AUXILIARY;
         =
464   1  =   DECLARE  TSTAT$BILLING$INFO  STRUCTURE (
         =       CURRENT$BILL$NEW         (4) BYTE,
         =       CURRENT$BILL$OLD         (4) BYTE,
         =       FORECASTED$BILL          (4) BYTE,
         =       LOW$KWH                  (4) BYTE,
         =       MEDIUM$KWH               (4) BYTE,
         =       HIGH$KWH                 (4) BYTE,
         =       CRITICAL$KWH             (4) BYTE,
         =       TOTAL$KWH                (4) BYTE,
         =       LAST$BILL                (4) BYTE)
         =                            AT (.TSTAT$BILLING$INFO$ARRAY)  AUXILIARY;
         =
         =   /*****************************************************************
         =     E X T E R N A L   S T R U C T U R E   D E C L A R A T I O N S
         =   *****************************************************************/
         =
465   1  =   DECLARE  STATUS$BYTES                (2) BYTE  EXTERNAL  AUXILIARY;
         =
466   1  =   DECLARE  SCHEDULES                 (399) BYTE  EXTERNAL  AUXILIARY;
         =
467   1  =   DECLARE  HVAC  (4)  STRUCTURE (
         =       START$MORN               (2) BYTE,
         =       TEMP$1$MORN                  BYTE,
         =       TEMP$2$MORN                  BYTE,
         =       TEMP$3$MORN                  BYTE,
         =       TEMP$4$MORN                  BYTE,
         =       START$DAY                (2) BYTE,
         =       TEMP$1$DAY                   BYTE,
         =       TEMP$2$DAY                   BYTE,
         =       TEMP$3$DAY                   BYTE,
         =       TEMP$4$DAY                   BYTE,
         =       START$EVE                (2) BYTE,
         =       TEMP$1$EVE                   BYTE,
         =       TEMP$2$EVE                   BYTE,
         =       TEMP$3$EVE                   BYTE,
         =       TEMP$4$EVE                   BYTE,
         =       START$NITE               (2) BYTE,
         =       TEMP$1$NITE                  BYTE,
         =       TEMP$2$NITE                  BYTE,
         =       TEMP$3$NITE                  BYTE,
         =       TEMP$4$NITE                  BYTE)  AT (.SCHEDULES(0))
         =                                                        AUXILIARY;
         =
468   1  =   DECLARE  HVAC$ARRAY                 (96) BYTE  AT (.SCHEDULES(0))
         =                                                        AUXILIARY;
         =
         =   /*****************************************************************/
         =
469   1  =   DECLARE  EWH$STATUS                      BYTE  EXTERNAL  AUXILIARY;
         =
470   1  =   DECLARE  EWH  (2)  STRUCTURE (
         =       START$MORN               (2) BYTE,
         =       STOP$MORN                (2) BYTE,
         =       START$DAY                (2) BYTE,
         =       STOP$DAY                 (2) BYTE,
         =       START$EVE                (2) BYTE,
         =       STOP$EVE                 (2) BYTE,
         =       START$NITE               (2) BYTE,
         =       STOP$NITE                (2) BYTE)  AT (.SCHEDULES(96))
         =                                                        AUXILIARY;
         =
471   1  =   DECLARE  EWH$ARRAY                  (32) BYTE  AT (.SCHEDULES(96))
         =                                                        AUXILIARY;
         =
         =   /*****************************************************************/
         =
472   1  =   DECLARE  BSRDEV  (16)  STRUCTURE (
         =       START$MORN               (2) BYTE,
         =       STOP$MORN                (2) BYTE,
         =       START$DAY                (2) BYTE,
         =       STOP$DAY                 (2) BYTE,
         =       START$EVE                (2) BYTE,
```

```
            =       STOP$EVE                      (2) BYTE,
            =       START$NITE                    (2) BYTE,
            =       STOP$NITE                     (2) BYTE)  AT (.SCHEDULES(128))
            =                                                          AUXILIARY;
            =
 473    1   =   DECLARE  BSRDEV$ARRAY               (256) BYTE  AT (.SCHEDULES(128))
            =                                                          AUXILIARY;
            =
 474    1   =   DECLARE  BSR$DATA  STRUCTURE (
            =       HOUSE$CODE                        BYTE,
            =       NUMBER$CODE                       BYTE,
            =       FUNCTION$CODE                     BYTE)  EXTERNAL  AUXILIARY;
            =
            =   /*****************************************************************/
            =
 475    1   =   DECLARE  CONFIG$DATA    STRUCTURE (
            =       HOUSE$CODE                        BYTE,
            =       F_C$DEGREE                        BYTE,
            =       CLOCK$FORMAT                      BYTE,
            =       FILTER$RUNTIME                    BYTE,
            =       WEEKEND$DAY                       BYTE,
            =       HIGH$TEMP$SPAN                    BYTE,
            =       LOW$TEMP$SPAN                     BYTE,
            =       EWH$PREHEAT                       BYTE,
            =       H_P$CYCLE$TIME                    BYTE,
            =       ELECTRIC$HEAT                     BYTE,
            =       SECONDARY$HEAT$RECOVERY           BYTE,
            =       HIGH$EFFIC$FAN                    BYTE,
            =       EMERG$H_P$ACTION                  BYTE,
            =       VERSION$NUMBERS               (2) BYTE)  AT (.SCHEDULES(384))
            =                                                          AUXILIARY,
            =
 476    1   =   DECLARE  CONFIG$ARRAY               (15) BYTE  AT (.SCHEDULES(384))
            =                                                          AUXILIARY;
            =
 477    1   =   DECLARE  SEND$ERROR$MSG  STRUCTURE (
            =       BYTE$COUNT                        BYTE,
            =       MSG$TYPE                          BYTE,
            =       DESTINATION$ADDRESS               BYTE,
            =       PROCESS$NUMBERS                   BYTE,
            =       ERROR$TYPE                   (15) BYTE)  EXTERNAL  AUXILIARY;
            =
 478    1   =   DECLARE  SYSTEM$STATISTICS  STRUCTURE (
            =       CONTROLLER$COMM              (32) BYTE,
            =       TSTAT$COMM                   (32) BYTE)  EXTERNAL  AUXILIARY;
            =
            =   /*****************************************************************/
            =
 479    1   =   DECLARE  TIME$AND$DATE  STRUCTURE (
            =       YEAR                              BYTE,
            =       MONTH                             BYTE,
            =       DAY                               BYTE,
            =       HOUR                              BYTE,
            =       MINUTE                            BYTE,
            =       DAY$OF$WEEK                       BYTE)  EXTERNAL  AUXILIARY;
            =
 480    1   =   DECLARE  CURRENT$DATE  STRUCTURE (
            =       YEAR                              BYTE,
            =       MONTH                             BYTE,
            =       DAY                               BYTE,
            =       HOUR                              BYTE,
            =       MINUTE                            BYTE,
            =       DAY$OF$WEEK                       BYTE)  EXTERNAL  AUXILIARY;
            =
            =   /*****************************************************************
            =          E X T E R N A L   W O R D   D E C L A R A T I O N
            =   *****************************************************************/
            =
 481    1   =   DECLARE  AMOUNT                               WORD  EXTERNAL  AUXILIARY;
            =
            =   /*****************************************************************
            =          P U B L I C   B Y T E   D E C L A R A T I O N S
            =   *****************************************************************/
            =
 482    1   =   DECLARE  AVERAGE$DEGREE$TIME                  BYTE  PUBLIC  AUXILIARY;
 483    1   =   DECLARE  DELTA$INDEX                          BYTE  PUBLIC  AUXILIARY;
 484    1   =   DECLARE  DELTA$DEGREE                     (3) BYTE  PUBLIC  AUXILIARY;
 485    1   =   DECLARE  EWH$OVERRIDE$INDEX                   BYTE  PUBLIC  AUXILIARY;
```

```
486   1   =   DECLARE  EWH$OVERRIDE$STOP$HOUR             BYTE  PUBLIC  AUXILIARY;
487   1   =   DECLARE  EWH$OVERRIDE$STOP$MINUTES          BYTE  PUBLIC  AUXILIARY;
488   1   =   DECLARE  FAN$STATUS                         BYTE  PUBLIC  AUXILIARY;
489   1   =   DECLARE  HVAC$OVERRIDE$INDEX                BYTE  PUBLIC  AUXILIARY;
490   1   =   DECLARE  HVAC$SYSTEM$TIMER                  BYTE  PUBLIC  AUXILIARY;
491   1   =   DECLARE  RECV$TINDEX                        BYTE  PUBLIC  AUXILIARY;
492   1   =   DECLARE  RECV$TSTAT$CHECKSUM$REGISTER       BYTE  PUBLIC  AUXILIARY;
493   1   =   DECLARE  T_R$TSTAT$BYTE                     BYTE  PUBLIC
          =                                                 AT (0A000H)  AUXILIARY;
494   1   =   DECLARE  TRANS$TINDEX                       BYTE  PUBLIC  AUXILIARY;
495   1   =   DECLARE  TRANS$TSTAT$BYTE$COUNT$REGISTER    BYTE  PUBLIC  AUXILIARY;
496   1   =   DECLARE  TRANS$TSTAT$CHECKSUM$REGISTER      BYTE  PUBLIC  AUXILIARY;
497   1   =   DECLARE  TSTAT$TEMPERATURE$TIMER            BYTE  PUBLIC  AUXILIARY;
498   1   =   DECLARE  TSTAT$TIMER                        BYTE  PUBLIC  AUXILIARY;
499   1   =   DECLARE  VALID$TSTAT$MSG$TIMER              BYTE  PUBLIC  AUXILIARY;
          =
          =   /**************************************************************
          =        E X T E R N A L   B Y T E   D E C L A R A T I O N S
          =   **************************************************************/
          =
500   1   =   DECLARE  CONTROLLER$ADDRESS               BYTE  EXTERNAL  AUXILIARY;
501   1   =   DECLARE  DEV$ADDRESS                      BYTE  EXTERNAL  AUXILIARY;
502   1   =   DECLARE  DEV$STATE                        BYTE  EXTERNAL  AUXILIARY;
503   1   =   DECLARE  ERROR$INDEX                      BYTE  EXTERNAL  AUXILIARY;
504   1   =   DECLARE  FAN$TIMER                        BYTE  EXTERNAL  AUXILIARY;
505   1   =   DECLARE  FILTER$COUNT$HOURS               BYTE  EXTERNAL  AUXILIARY;
506   1   =   DECLARE  FILTER$COUNT$HRS$HUNDRED         BYTE  EXTERNAL  AUXILIARY;
507   1   =   DECLARE  SECOND$TIMER                     BYTE  EXTERNAL  AUXILIARY;
508   1   =   DECLARE  UART$IER                         BYTE  EXTERNAL  AUXILIARY;
509   1   =   DECLARE  UNITS$NUMBER                     BYTE  EXTERNAL  AUXILIARY;
          =
          =   /**************************************************************
          =                  B Y T E   D E C L A R A T I O N
          =   **************************************************************/
          =
510   1   =   DECLARE  ADJUSTED$CURRENT$TIER            BYTE  AUXILIARY;
511   1   =   DECLARE  CONVERTED$CURRENT                BYTE  AUXILIARY;
512   1   =   DECLARE  CONVERTED$SETPOINT               BYTE  AUXILIARY;
513   1   =   DECLARE  CONVERTED$TEMPERATURE            BYTE  AUXILIARY;
514   1   =   DECLARE  SWITCH$BYTE                      BYTE  AUXILIARY;
515   1   =   DECLARE  TOTAL$DEGREE                     BYTE  AUXILIARY;
516   1   =   DECLARE  TSTAT$INDEX                      BYTE  AUXILIARY;
          =
          =   /**************************************************************
          =      P U B L I C   B I T   M A P P E D   D E C L A R A T I O N S
          =   **************************************************************/
          =
517   1   =   DECLARE  CUSTOMER$SERVICE$REQUESTED       BIT  PUBLIC;
518   1   =   DECLARE  EMERG$HEAT$REQUIRED              BIT  PUBLIC;
519   1   =   DECLARE  EWH$OVERRIDE$FLAG                BIT  PUBLIC;
520   1   =   DECLARE  HVAC$OVERRIDE$ACTIVE             BIT  PUBLIC;
521   1   =   DECLARE  HVAC$PERMANENT$OVERRIDE          BIT  PUBLIC;
522   1   =   DECLARE  HVAC$SYSTEM$ACTIVE               BIT  PUBLIC;
523   1   =   DECLARE  HVAC$SYSTEM$TIMER$ACTIVE         BIT  PUBLIC;
524   1   =   DECLARE  HVAC$SYSTEM$TIMER$EXPIRED        BIT  PUBLIC;
525   1   =   DECLARE  HVAC$TEMPORARY$OVERRIDE          BIT  PUBLIC;
526   1   =   DECLARE  LOAD$BSR$DEFAULTS                BIT  PUBLIC;
527   1   =   DECLARE  MODE$CHANGED                     BIT  PUBLIC;
528   1   =   DECLARE  TSTAT$PROGRAM$FLAG               BIT  PUBLIC;
          =
          =   /**************************************************************
          =    E X T E R N A L   B I T   M A P P E D   D E C L A R A T I O N S
          =   **************************************************************/
          =
529   1   =   DECLARE  BSR$INIT                         BIT  EXTERNAL;
530   1   =   DECLARE  DLC$TIMER$FLAG                   BIT  EXTERNAL;
531   1   =   DECLARE  ERROR$ALERT                      BIT  EXTERNAL;
532   1   =   DECLARE  EWH$OPT$ACTIVE                   BIT  EXTERNAL;
533   1   =   DECLARE  EWH$OPTIMIZATION$REQUIRED        BIT  EXTERNAL;
534   1   =   DECLARE  EWH$RELAY$ON                     BIT  EXTERNAL;
535   1   =   DECLARE  FAN$TIMER$ACTIVE                 BIT  EXTERNAL;
536   1   =   DECLARE  FAST$CLOCK$FLAG                  BIT  EXTERNAL;
537   1   =   DECLARE  HVAC$OPT$ACTIVE                  BIT  EXTERNAL;
538   1   =   DECLARE  HVAC$OPTIMIZATION$REQUIRED       BIT  EXTERNAL;
539   1   =   DECLARE  INITIALIZATION$FLAG              BIT  EXTERNAL;
540   1   =   DECLARE  NEW$SETPOINT                     BIT  EXTERNAL;
541   1   =   DECLARE  SEND$RELAY$MESSAGE               BIT  EXTERNAL;
542   1   =   DECLARE  S$P$TIMER$ACTIVE                 BIT  EXTERNAL;
```

```
543  1  =  DECLARE  TSTAT$MSG$TIMER                    BIT  EXTERNAL;
544  1  =  DECLARE  TSTAT$TIMER$FLAG                   BIT  EXTEPNAL;
545  1  =  DECLARE  Z$BIT$SET                          BIT  EXTERNAL;
            =
            =  /*************************************************************
            =           B I T   M A P P E D   D E C L A R A T I O N S
            =  *************************************************************/
            =
546  1  =  DECLARE  HEAT$STAGE$1                       BIT  AT (90H) REG;
547  1  =  DECLARE  HEAT$STAGE$2                       BIT  AT (91H) REG;
548  1  =  DECLARE  COOL$STAGE$1                       BIT  AT (92H) REG,
549  1  =  DECLARE  COOL$STAGE$2                       BIT  AT (93H) REG;
550  1  =  DECLARE  FAN                                BIT  AT (94H) REG;
551  1  =  DECLARE  REV$VALVE                          BIT  AT (95H) REG,
552  1  =  DECLARE  WATCHDOG$TIMER                     BIT  AT (97H) REG;
            =
            =  /*************************************************************
            =            L I T E R A L   D E C L A R A T I O N S
            =  *************************************************************/
            =
553  1  =  DECLARE  CLG$SWITCH                         LITERALLY      '4';
554  1  =  DECLARE  COMSET$2000                        LITERALLY      '1';
555  1  =  DECLARE  CONTROL                            LITERALLY    '30H';
556  1  =  DECLARE  COOLING$MODE                       LITERALLY      '2';
557  1  =  DECLARE  DEENERGIZE                         LITERALLY      '1';
558  1  =  DECLARE  DEFAULT                            LITERALLY      '0';
559  1  =  DECLARE  EMERG$HEAT$SWITCH                  LITERALLY      '1';
560  1  =  DECLARE  ENERGIZE                           LITERALLY      '0';
561  1  =  DECLARE  FAN$SWITCH                         LITERALLY      '2';
562  1  =  DECLARE  FILTER$RESET                       LITERALLY      '4';
563  1  =  DECLARE  HEATING$MODE                       LITERALLY      '1';
564  1  =  DECLARE  HTG$SWITCH                         LITERALLY      '8';
565  1  =  DECLARE  IDLE$MODE                          LITERALLY      '3';
566  1  =  DECLARE  INIT$TSTAT$TIMER                   LITERALLY      '5';
567  1  =  DECLARE  MSG$OVERHEAD                       LITERALLY      '3';
568  1  =  DECLARE  NO                                 LITERALLY      '0';
569  1  =  DECLARE  OFF                                LITERALLY      '0';
570  1  =  DECLARE  ON                                 LITERALLY   '0FFH';
571  1  =  DECLARE  OPTIMIZE$KEY                       LITERALLY      '1';
572  1  =  DECLARE  PHONE$IN                           LITERALLY      '2';
573  1  =  DECLARE  REST$OF$OVERHEAD                   LITERALLY      '2';
574  1  =  DECLARE  SYSTEM$PROCESS                     LITERALLY      '0';
575  1  =  DECLARE  TSTAT$STATE                        LITERALLY    '10H',
576  1  =  DECLARE  YES                                LITERALLY      '1';
            =
            =  /******************** TSTAT MESSAGE TYPES ********************/
            =
577  1  =  DECLARE  TSTAT$TIME                         LITERALLY      '0';
578  1  =  DECLARE  TSTAT$TEMP                         LITERALLY      '1';
579  1  =  DECLARE  HVAC$SCHEDULE                      LITERALLY      '2';
580  1  =  DECLARE  EWH$SCHEDULE                       LITERALLY      '3';
581  1  =  DECLARE  DEVICE$SCHEDULE                    LITERALLY      '4';
582  1  =  DECLARE  CONFIGURATION$DATA                 LITERALLY      '5',
583  1  =  DECLARE  BILLING$INFO                       LITERALLY      '6';
584  1  =  DECLARE  OVERRIDE                           LITERALLY      '7';
585  1  =  DECLARE  SPECIAL                            LITERALLY      '8';
586  1  =  DECLARE  TSTAT$ACK                          LITERALLY   '0FFH';
            =
            =  /******************** CONTROLLER ERROR CODES ******************/
            =
587  1  =  DECLARE  DEFECTIVE$RAM                      LITERALLY    '01H';
588  1  =  DECLARE  INVALID$BRICK$SUBADDRESS           LITERALLY    '02H';
589  1  =  DECLARE  INVALID$MESSAGE$TYPE               LITERALLY    '03H';
590  1  =  DECLARE  CUSTOMER$SERVICE$REQUIRED          LITERALLY    '04H';
591  1  =  DECLARE  NO$TSTAT$COMM                      LITERALLY    '05H';
592  1  =  DECLARE  TEMP$OUT$OF$RANGE                  LITERALLY    '06H';
593  1  =  DECLARE  BAD$DLC$DATA                       LITERALLY    '07H';
            =
594  1  =  DECLARE  BAD$METER$DATA$SESSION             LITERALLY    '10H',
595  1  =  DECLARE  BAD$COMSET$2000$DATA$SESSION       LITERALLY    '11H';
596  1  =  DECLARE  BAD$COMSET_B$DATA$SESSION          LITERALLY    '12H';
597  1  =  DECLARE  BAD$DESTINATION$ADDRESS            LITERALLY    '13H';
            =
598  1  =  DECLARE  ERROR$BUFFER$OVERFLOW              LITERALLY    '99H';
            =
            =  /******************** TSTAT STATISTIC CODES *******************/
            =
```

```
599   1  =   DECLARE  WRONG$MESSAGE$TYPE              LITERALLY      '01H';
         =
         =   /****************** CONFIGURATION STATUS **********************/
         =
600   1  =   DECLARE  HEAT$MODE                       LITERALLY        '1';
601   1  =   DECLARE  COOL$MODE                       LITERALLY        '2';
602   1  =   DECLARE  OFF$MODE                        LITERALLY        '3';
603   1  =   DECLARE  TSTAT$NO$COMM                   LITERALLY        '4';
604   1  =   DECLARE  TSTAT$BAD$COMM                  LITERALLY        '8';
605   1  =   DECLARE  EMERG$HEAT                      LITERALLY      '10H';
606   1  =   DECLARE  TEMP$OVER$99                    LITERALLY      '20H';
607   1  =   DECLARE  TEMP$UNDER$50                   LITERALLY      '40H';
608   1  =   DECLARE  KBD$DISABLED                    LITERALLY      '80H';
         =
         =   /****************************************************************
         =        E X T E R N A L   M O D U L E S   D E C L A R A T I O N
         =   ****************************************************************/
         =
609   2  =   ADJUST$UNITS:  PROCEDURE  EXTERNAL;
610   1  =   END ADJUST$UNITS;
         =
611   2  =   BCD$TO$BIN$CONVERT:  PROCEDURE (NUMBER) BYTE  EXTERNAL;
612   2  =   DECLARE  NUMBER                          BYTE;
613   1  =   END BCD$TO$BIN$CONVERT;
         =
614   2  =   CUSTOMER$SERVICE:  PROCEDURE  EXTERNAL;
615   1  =   END CUSTOMER$SERVICE;
         =
616   2  =   GENERATE$CHECKSUM: PROCEDURE (REQUESTOR) WORD EXTERNAL;
617   2  =   DECLARE  REQUESTOR                       WORD;
618   1  =   END GENERATE$CHECKSUM;
         =
619   2  =   LOAD$PROGRAMS:  PROCEDURE  (PROGRAMS) EXTERNAL;
620   2  =   DECLARE  PROGRAMS                        BYTE;
621   1  =   END LOAD$PROGRAMS;
         =
622   2  =   SEND$BRICK$MSG:  PROCEDURE  (BRICK$MSG$TYPE)  EXTERNAL;
623   2  =   DECLARE  BRICK$MSG$TYPE                  BYTE;
624   1  =   END SEND$BRICK$MSG;
         =
625   2  =   WHAT$DAY$IS$IT:  PROCEDURE  EXTERNAL;
626   1  =   END WHAT$DAY$IS$IT;
             $TITLE ('TRANSMIT MESSAGE TO T/STAT')
             $INCLUDE (XMTTST.STH)
         =
         =   /****************************************************************/
         =
627   2  =   SEND$TSTAT$MSG:  PROCEDURE (TSTAT$MSG)  PUBLIC;
         =
628   2  =   DECLARE  TSTAT$MSG                       BYTE;
         =
629   2  =   WATCHDOG$TIMER = YES;                  /* TOGGLE WATCHDOG TIMER */
630   2  =   WATCHDOG$TIMER = NO;                      /* TO MAINTAIN SANITY */
         =
631   2  =   TRANS$TSTAT$MSG.MSG$TYPE = TSTAT$MSG;
632   2  =   TRANS$TSTAT$MSG.DEVICE$ADDRESS = RECV$TSTAT$MSG.DEVICE$ADDRESS;
         =
633   2  =   IF TSTAT$MSG <= BILLING$INFO  THEN
         =
634   3  =   DO CASE  TSTAT$MSG;
         =
635   4  =     DO;                                      /*** TIME MESSAGE ***/
636   4  =       ADJUSTED$CURRENT$TIER = SHL (SYSTEM$STATUS.CURRENT$TIER, 2);
         =        /* THIS PUTS THE CURRENT TIER IN PROPER FORM FOR THE TSTAT */
         =
637   4  =       STATUS$BYTES(1) = 0;
         =        /* THIS CLEARS OUT THE HVAC SYSTEM STATUS, CURRENT PERIOD
         =                AND TIER, AND NEW CONFIGURATION TO ALLOW AN UPDATE */
         =
638   4  =       STATUS$BYTES(1) = STATUS$BYTES(1) OR ADJUSTED$CURRENT$TIER;
         =
639   4  =       STATUS$BYTES(1) = STATUS$BYTES(1) OR
         =                        ((SYSTEM$STATUS.CURRENT$PERIOD - 2) / 6);
         =      /* THIS PUTS THE CURRENT PERIOD IN PROPER FORM FOR THE TSTAT */
         =
640   4  =       IF HVAC$SYSTEM$ACTIVE = YES  THEN
641   4  =         STATUS$BYTES(1) = STATUS$BYTES(1) OR 10H;
         =                   /* THIS DISPLAYS THE STATUS OF THE HVAC SYSTEM */
```

```
              =
642     4     =        IF Z$BIT$SET = YES  THEN
              =                  /* THIS INFORMS THE TSTAT OF NEW CONFIGURATION */
643     4     =          STATUS$BYTES(1) = STATUS$BYTES(1) OR 20H;
              =
644     4     =        IF FAST$CLOCK$FLAG = YES  THEN
645     5     =        DO;                          /* LOAD NEW TIME FROM PAN NETWORK */
646     5     =          TRANS$TSTAT$MSG.DATA$FIELD(0) = CURRENT$DATE.HOUR;
647     5     =          TRANS$TSTAT$MSG.DATA$FIELD(1) = CURRENT$DATE.MINUTE;
648     5     =        END;
              =
649     4     =        ELSE
              =        DO;                            /* LOAD CURRENT CONTROLLER TIME */
650     5     =          TRANS$TSTAT$MSG.DATA$FIELD(0) = TIME$AND$DATE.HOUR;
651     5     =          TRANS$TSTAT$MSG.DATA$FIELD(1) = TIME$AND$DATE.MINUTE;
652     5     =        END;
              =
653     4     =        TRANS$TSTAT$MSG.BYTE$COUNT = 5;
654     4     =        TRANS$TSTAT$MSG.DATA$FIELD(2) = STATUS$BYTES(0);
655     4     =        TRANS$TSTAT$MSG.DATA$FIELD(3) = STATUS$BYTES(1);
656     4     =        TRANS$TSTAT$MSG.DATA$FIELD(4) =
              =                                      SYSTEM$STATUS.SETPOINT$TEMPERATURE;
657     4     =      END;
              =
658     3     =      ;             /*** TEMPERATURE MESSAGE - NEVER SENT TO TSTAT ***/
              =
              =                                    /*** SEND SELECTED HVAC SCHEDULE ***/
659     4     =      DO;
660     4     =        TRANS$TSTAT$MSG.BYTE$COUNT = 24;
661     4     =        CALL MOVXX0 ( HVAC(TSTAT$INDEX),
              =                      .TRANS$TSTAT$MSG.DATA$FIELD,
              =                       TRANS$TSTAT$MSG.BYTE$COUNT);
662     4     =      END;
              =
              =                           /*** SEND SELECTED WATER HEATER SCHEDULE ***/
663     4     =      DO;
664     4     =        TRANS$TSTAT$MSG.BYTE$COUNT = 16;
665     4     =        CALL MOVXX0 (.EWH(TSTAT$INDEX),
              =                      .TRANS$TSTAT$MSG.DATA$FIELD,
              =                       TRANS$TSTAT$MSG.BYTE$COUNT);
666     4     =      END;
              =
              =                                  /*** SEND SELECTED DEVICE SCHEDULE ***/
667     4     =      DO;
668     4     =        TRANS$TSTAT$MSG.BYTE$COUNT = 16;
669     4     =        CALL MOVXX0 (.BSRDEV(TSTAT$INDEX),
              =                      .TRANS$TSTAT$MSG.DATA$FIELD,
              =                       TRANS$TSTAT$MSG.BYTE$COUNT);
670     4     =      END;
              =
              =                                    /*** SEND CONFIGURATION DATA ***/
671     4     =      DO;
672     4     =        TRANS$TSTAT$MSG.BYTE$COUNT = 11;
673     4     =        CALL MOVXX0 (.CONFIG$DATA HOUSE$CODE,
              =                      .TRANS$TSTAT$MSG.DATA$FIELD,
              =                       5);
              =             /***     THIS IS SPLIT UP UNTIL
              =                      HIGH AND LOW TEMP SPAN ARE ADDED AT PHASE II ***/
674     4     =        CALL MOVXX0 (.CONFIG$DATA.EWH$PREHEAT,
              =                      .TRANS$TSTAT$MSG.DATA$FIELD(5),
              =                       6);
              =
675     4     =      END;
              =
              =                                    /*** SEND BILLING INFORMATION ***/
676     4     =      DO;
677     4     =        TRANS$TSTAT$MSG.BYTE$COUNT = 28;
678     4     =        CALL MOVXX0 (.TSTAT$BILLING$INFO.CURRENT$BILL$NEW,
              =                      .TRANS$TSTAT$MSG.DATA$FIELD,
              =                       TRANS$TSTAT$MSG.BYTE$COUNT);
679     4     =      END;
680     3     =    END;                  /* END OF DO CASE FOR SENDING TSTAT MESSAGE */
              =
681     2     =    ELSE
              =
              =      TRANS$TSTAT$MSG.BYTE$COUNT = 0;
              =
682     2     =    AMOUNT = TRANS$TSTAT$MSG.BYTE$COUNT + MSG$OVERHEAD;
```

```
683    2  =   TRANS$TSTAT$MESSAGE (TRANS$TSTAT$MSG.BYTE$COUNT + MSG$OVERHEAD) =
          =                                  GENERATE$CHECKSUM (.TRANS$TSTAT$MSG);
          =                           /* CALCULATE CHECKSUM FOR BRICK MESSAGE */
          =
684    2  =   T_R$TSTAT$BYTE = TRANS$TSTAT$MSG.BYTE$COUNT;
685    2  =   TRANS$TINDEX = 1; /* SET UP TRANSMIT BUFFER POINTER */
686    2  =   UART$IER = UART$IER OR 2;       /* ENABLE TxDATA EMPTY INTERRUPT */
          =
687    1  =   END SEND$TSTAT$MSG;
              $TITLE ('PROCESS OVERRIDE TYPES')
              $INCLUDE (OVERRD.STH)
          =
          =   /*****************************************************************/
          =
688    2  =   EWH$OVERRIDE$DONE:  PROCEDURE  PUBLIC;
          =
689    2  =   EWH$OVERRIDE$FLAG = NO;
690    2  =   STATUS$BYTES(0) = STATUS$BYTES(0) AND 0FBH;
          =                               /* TURN OFF WATER HEATER ELEMENT */
691    2  =   CALL MOVXX0 (.TIME$AND$DATE.YEAR,
          =                .EWH$OVERRIDE(EWH$OVERRIDE$INDEX).STOP, 5);
          =                      /* STORE STOP DATE OF WATER HEATER OVERRIDE */
          =
692    2  =   EWH$OVERRIDE$INDEX = EWH$OVERRIDE$INDEX + 1;
693    2  =   EWH$OPTIMIZATION$REQUIRED = YES;
          =
694    1  =   END EWH$OVERRIDE$DONE;
          =
          =   /*****************************************************************/
          =
695    2  =   PROCESS$OVERRIDE$MSG:  PROCEDURE  PUBLIC;
          =
696    2  =   IF RECV$TSTAT$MSG.DATA$FIELD(0) < 3  THEN
          =
697    3  =   DO CASE  RECV$TSTAT$MSG.DATA$FIELD(0);
          =
698    4  =     DO;                                     /* TEMPORARY OVERRIDE */
699    4  =       IF HVAC$PERMANENT$OVERRIDE = YES  THEN
700    4  =         HVAC$TEMPORARY$OVERRIDE = NO;
701    4  =       ELSE
          =         HVAC$TEMPORARY$OVERRIDE = YES;
702    4  =     END;
          =
703    4  =     DO;                                     /* PERMANENT OVERRIDE */
704    4  =       IF HVAC$PERMANENT$OVERRIDE = YES  THEN
705    4  =         HVAC$PERMANENT$OVERRIDE = NO;
706    4  =       ELSE
          =         HVAC$PERMANENT$OVERRIDE = YES;
          =
707    4  =       HVAC$TEMPORARY$OVERRIDE = NO;
708    4  =     END;
          =
709    4  =     DO,
710    4  =       IF (DLC$TIMER$FLAG = NO) AND
          =          (CONFIG$DATA.EWH$PREHEAT <> 0)  THEN
711    5  =       DO;
712    5  =         IF EWH$OVERRIDE$INDEX > 7  THEN
713    5  =           EWH$OVERRIDE$INDEX = 0;
          =                         /* ROLLOVER OF EWH OVERRIDE BUFFER */
714    5  =         IF EWH$OVERRIDE$FLAG = YES  THEN
715    5  =           CALL EWH$OVERRIDE$DONE;
          =
716    5  =         ELSE
          =         DO;
717    6  =           EWH$OVERRIDE$FLAG = YES;
718    6  =           STATUS$BYTES(0) = STATUS$BYTES(0) OR 4;
          =                               /* TURN ON WATER HEATER ELEMENT */
          =
719    6  =           CALL MOVXX0 (.TIME$AND$DATE.YEAR,
          =                   .EWH$OVERRIDE(EWH$OVERRIDE$INDEX).START, 5);
          =                   /* STORE START DATE OF WATER HEATER OVERRIDE */
720    6  =           EWH$RELAY$ON = YES;
721    6  =           SEND$RELAY$MESSAGE = YES;
          =
          =         /*** DETERMINE WHEN THE OVERRIDE SHOULD END
          =                              (CURRENT TIME + PREHEAT TIME). ***/
          =
```

```
722   6  =            EWH$OVERRIDE$STOP$HOUR = CONFIG$DATA.EWH$PREHEAT / 2;
723   6  =            EWH$OVERRIDE$STOP$HOUR = EWH$OVERRIDE$STOP$HOUR +
         =                                              TIME$AND$DATE.HOUR;
724   6  =            IF (CONFIG$DATA.EWH$PREHEAT MOD 2) <> 0  THEN
725   7  =            DO;
726   7  =              IF TIME$AND$DATE.MINUTE < 30H  THEN
727   7  =                EWH$OVERRIDE$STOP$MINUTES =
         =                                        TIME$AND$DATE.MINUTE + 30H;
728   7  =              ELSE
         =              DO;
729   8  =                EWH$OVERRIDE$STOP$MINUTES =
         =                                        TIME$AND$DATE.MINUTE - 30H;
730   8  =                EWH$OVERRIDE$STOP$HOUR = EWH$OVERRIDE$STOP$HOUR + 1;
731   8  =              END;
732   7  =            END;
733   6  =            UNITS$NUMBER = EWH$OVERRIDE$STOP$HOUR;
734   6  =            CALL ADJUST$UNITS;          /* MODIFY TO BCD IF NECESSARY */
735   6  =            EWH$OVERRIDE$STOP$HOUR = UNITS$NUMBER;
736   6  =          END;
737   5  =          EWH$OPT$ACTIVE = NO;
         =       /* NO OPTIMIZATION UNTIL AFTER THE NEXT STOP TIME IS REACHED */
738   5  =        END;
739   4  =      END;
740   3  =    END;                                         /* END OF DO CASE */
         =
741   2  =    IF RECV$TSTAT$MSG.DATA$FIELD(0) < 2  THEN
742   3  =    DO;
743   3  =      IF (HVAC$TEMPORARY$OVERRIDE = YES) OR
         =         (HVAC$PERMANENT$OVERRIDE = YES)  THEN
744   4  =      DO;
745   4  =        IF HVAC$OVERRIDE$INDEX > 7  THEN
746   4  =          HVAC$OVERRIDE$INDEX = 0;
         =                             /* ROLLOVER OF HVAC OVERRIDE BUFFER */
747   4  =        IF HVAC$OVERRIDE$ACTIVE = NO  THEN
748   5  =        DO;
749   5  =          HVAC$OVERRIDE$ACTIVE = YES;
750   5  =          CALL MOVXX0 (.TIME$AND$DATE.YEAR,
         =                       .HVAC$OVERRIDE(HVAC$OVERRIDE$INDEX).START, 5);
         =                             /* STORE START TIME OF HVAC OVERRIDE */
751   5  =        END;
         =
752   4  =        HVAC$OVERRIDE(HVAC$OVERRIDE$INDEX).TEMPERATURE =
         =                                     RECV$TSTAT$MSG.DATA$FIELD(1);
753   4  =        SYSTEM$STATUS.SETPOINT$TEMPERATURE =
         =                                     RECV$TSTAT$MSG.DATA$FIELD(1);
754   4  =        IF HVAC$PERMANENT$OVERRIDE = YES  THEN
755   4  =          STATUS$BYTES(0) = STATUS$BYTES(0) OR 8;
         =                             /* TURN ON TEMPERATURE HOLD ELEMENT */
756   4  =        NEW$SETPOINT = YES;
757   4  =        HVAC$OPTIMIZATION$REQUIRED = NO;
758   4  =        HVAC$OPT$ACTIVE = NO;
759   4  =      END;
         =
760   3  =      ELSE
         =      DO;
761   4  =        CALL MOVXX0 (.TIME$AND$DATE.YEAR,
         =                     .HVAC$OVERRIDE(HVAC$OVERRIDE$INDEX).STOP, 5);
         =                             /* STORE STOP TIME OF HVAC OVERRIDE */
762   4  =        STATUS$BYTES(0) = STATUS$BYTES(0) AND 0F7H;
         =                             /* TURN OFF TEMPERATURE HOLD ELEMENT */
763   4  =        HVAC$OPTIMIZATION$REQUIRED = YES;
764   4  =        HVAC$OVERRIDE$ACTIVE = NO;       /* READY FOR NEXT OVERRIDE */
765   4  =        HVAC$OVERRIDE$INDEX = HVAC$OVERRIDE$INDEX + 1;
766   4  =      END;
767   3  =    END;
         =
768   1  =    END PROCESS$OVERRIDE$MSG;
              $TITLE ('DECODE T/STAT MESSAGE')
              $INCLUDE (TSTDEC.STH)
         =
         =    /*****************************************************************/
         =
769   2  =    SHUT$DOWN$HVAC:  PROCEDURE  PUBLIC;
         =
770   2  =    IF HVAC$SYSTEM$TIMER$ACTIVE = NO  THEN
771   3  =    DO;
772   3  =      HVAC$SYSTEM$TIMER$ACTIVE = YES;
```

```
773   3  =    HVAC$SYSTEM$TIMER$EXPIRED = NO;
774   3  =    HVAC$SYSTEM$TIMER = CONFIG$DATA.H_P$CYCLE$TIME + 1;
         =                     /* INSURES MINIMUM TIME OFF OF 5 MINUTES */
775   3  =    HEAT$STAGE$1 = DEENERGIZE;
776   3  =    HEAT$STAGE$2 = DEENERGIZE;
777   3  =    COOL$STAGE$1 = DEENERGIZE;
778   3  =    COOL$STAGE$2 = DEENERGIZE;
         =
779   3  =    IF (SWITCH$BYTE AND FAN$SWITCH) = 0  THEN
780   4  =    DO;                          /* FAN SWITCH IN AUTO POSITION */
781   4  =      IF CONFIG$DATA.HIGH$EFFIC$FAN = 0  THEN
782   4  =        FAN = DEENERGIZE;                          /* TURN OFF FAN */
783   4  =      ELSE
         =      DO;
784   5  =        FAN$TIMER$ACTIVE = YES;
785   5  =        FAN$TIMER = CONFIG$DATA.HIGH$EFFIC$FAN + 1;
786   5  =      END; /* FAN IS ON A MINIMUM OF SPECIFIED CONFIGURATION TIME */
787   4  =    END;
         =
788   3  =    ELSE
         =    DO;
789   4  =      IF DLC$TIMER$FLAG = YES  THEN
790   4  =        FAN = DEENERGIZE;
791   4  =    END;
         =
792   3  =    EMERG$HEAT$REQUIRED = NO;
793   3  =    STATUS$BYTES(0) = STATUS$BYTES(0) AND 0EFH;
         =                           /* TURN OFF EMERGENCY HEAT ELEMENT */
         =
         =
794   3  =    HVAC$SYSTEM$ACTIVE = NO;
         =            /* TEST FOR INITIALIZATION OR POSSIBLE LOAD CONTROL */
795   3  =  END;
         =
796   2  =  TSTAT$TEMPERATURE$TIMER = 0FFH;
         =
797   1  =  END SHUT$DOWN$HVAC;
         =
         =  /**************************************************************/
         =
798   2  =  UPDATE$AVERAGE$DEGREE$TIME:  PROCEDURE;
         =                                /* UPDATE AVERAGE DEGREE TIME */
799   2  =  TOTAL$DEGREE = TOTAL$DEGREE - DELTA$DEGREE(DELTA$INDEX);
800   2  =  TOTAL$DEGREE = TOTAL$DEGREE + TSTAT$TEMPERATURE$TIMER;
         =
801   2  =  IF TOTAL$DEGREE > 30  THEN
802   2  =    TOTAL$DEGREE = 15;              /* INSURES A POSITIVE NUMBER */
803   2  =  DELTA$DEGREE(DELTA$INDEX) = TSTAT$TEMPERATURE$TIMER;
804   2  =  DELTA$INDEX = DELTA$INDEX + 1;
805   2  =  IF DELTA$INDEX > 2  THEN
806   2  =    DELTA$INDEX = 0;                        /* ROUND-ROBIN BUFFER */
         =
807   2  =  AVERAGE$DEGREE$TIME = TOTAL$DEGREE / 3;
         =
808   2  =  TSTAT$TEMPERATURE$TIMER = 0;                /* RESET TSTAT TIMER */
         =
809   1  =  END UPDATE$AVERAGE$DEGREE$TIME;
         =
         =  /**************************************************************/
         =
810   2  =  PRESET$TSTAT:  PROCEDURE;
         =
811   2  =  MODE$CHANGED = YES;                              /* CHANGE MODES */
812   2  =  NEW$SETPOINT = YES;
813   2  =  CALL SETBX0 (.DELTA$DEGREE, 5, 3);        /* PRESET ANTICIPATOR */
814   2  =  DELTA$INDEX = 0;
815   2  =  TOTAL$DEGREE = 0FH;                /* AVERAGE 5 MINUTES/DEGREE */
816   2  =  HVAC$TEMPORARY$OVERRIDE = NO;
817   2  =  HVAC$PERMANENT$OVERRIDE = NO;
818   2  =  CALL WHAT$DAY$IS$IT;         /* TO UPDATE SETPOINT TEMPERATURE */
819   2  =  HVAC$OPTIMIZATION$REQUIRED = YES;
820   2  =  STATUS$BYTES(0) = STATUS$BYTES(0) AND 0E7H;
         =                /* TURN OFF EMERGENCY HEAT AND HOLD ELEMENTS */
821   1  =  END PRESET$TSTAT;
         =
         =  /**************************************************************/
         =
822   2  =  DECODE$TSTAT$MSG:  PROCEDURE  PUBLIC;
```

```
                =
823     2       =     WATCHDOG$TIMER = YES;                     /* TOGGLE WATCHDOG TIMER */
824     2       =     WATCHDOG$TIMER = NO,                         /* TO MAINTAIN SANITY */
                =
825     2       =     IF TSTAT$TIMER$FLAG = NO  THEN
826     2       =       TSTAT$TIMER$FLAG = YES;  /* RECEIVED A MESSAGE FROM THE TSTAT */
                =
827     2       =     TSTAT$TIMER = INIT$TSTAT$TIMER;/* START/RESTART 30 SECOND TIMER */
                =
828     2       =     IF RECV$TSTAT$MSG.MSG$TYPE <= SPECIAL  THEN
                =
829     3       =     DO CASE  RECV$TSTAT$MSG.MSG$TYPE;
                =
                =                   /*** TIME MESSAGE - ONLY SENT BY THE CONTROLLER ***/
830     4       =       DO;
                =     /*    ERROR$BYTES ERROR$TYPE(ERROR$INDEX) = TSTAT$MSG$TYPE$ERROR;
                =
                =         IF ERROR$INDEX > 13  THEN
                =           SEND$ERROR$MSG.ERROR$TYPE(ERROR$INDEX) =
                =                             ERROR$BUFFER$OVERFLOW, \* ADDED 3/16/89 *\
                =         ELSE
                =           ERROR$INDEX = ERROR$INDEX + 1;
                =
                =         ERROR$ALERT = YES;*/
831     4       =       END;
                =                     /*** TEMPERATURE MESSAGE - SEND CURRENT TIME ***/
                =
832     4       =       DO;             /* TEST FOR DIRECT LOAD CONTROL OR HEATING MODE */
833     4       =         IF (DLC$TIMER$FLAG = NO) OR
                =            (SYSTEM$STATUS.CURRENT$MODE = HEATING$MODE)  THEN
                =
834     5       =           DO;             /******* TEST SWITCH POSITIONS FIRST *******/
                =
835     5       =           SWITCH$BYTE = RECV$TSTAT$MSG.DATA$FIELD(1);
                =
836     5       =           IF (SWITCH$BYTE AND EMERG$HEAT$SWITCH) <> 0  THEN
837     6       =           DO:
838     6       =             IF CONFIG$DATA.EMERG$H_P$ACTION <> 0 THEN
839     7       =             DO;  /* EMERGENCY HEAT ACTIVE ONLY IF PARAMETER ENABLED */
840     7       =               EMERG$HEAT$REQUIRED = YES; /* ACTIVATE EMERGENCY HEAT */
841     7       =               HEAT$STAGE$1 = DEENERGIZE;
842     7       =             END;
                =
843     6       =             ELSE
                =               EMERG$HEAT$REQUIRED = NO;
844     6       =           END;
                =
845     5       =           IF (SWITCH$BYTE AND FAN$SWITCH) <> 0  THEN
846     6       =           DO,
847     6       =             FAN = ENERGIZE;                              /* TURN ON FAN */
848     6       =             FAN$STATUS = 1;
849     6       =           END;
                =
850     5       =           ELSE
                =           DO.
851     6       =             FAN$STATUS = 0;
852     6       =             IF (HVAC$SYSTEM$ACTIVE = NO) AND
                =                                   (FAN$TIMER$ACTIVE = NO)  THEN
853     6       =               FAN = DEENERGIZE;                         /* TURN OFF FAN */
854     6       =           END;
                =
855     5       =           IF (SWITCH$BYTE AND CLG$SWITCH) <> 0  THEN
856     6       =           DO,
857     6       =             IF SYSTEM$STATUS.CURRENT$MODE = HEATING$MODE  THEN
858     7       =             DO;
859     7       =               CALL SHUT$DOWN$HVAC;
860     7       =               SYSTEM$STATUS.CURRENT$MODE = COOLING$MODE;
                =                                                       /* COOLING MODE */
861     7       =               CALL PRESET$TSTAT;     /* LOAD PRELIMINARY PARAMETERS */
862     7       =             END;
                =
863     6       =             ELSE
                =             IF SYSTEM$STATUS.CURRENT$MODE = IDLE$MODE  THEN
864     7       =             DO,
865     7       =               SYSTEM$STATUS.CURRENT$MODE = COOLING$MODE;
                =                                                       /* COOLING MODE */
866     7       =               CALL PRESET$TSTAT;     /* LOAD PRELIMINARY PARAMETERS */
867     7       =             END;
                =
```

```
868   6   =            ELSE
          =              SYSTEM$STATUS.CURRENT$MODE = COOLING$MODE;
          =
869   6   =            REV$VALVE = ENERGIZE;
870   6   =          END;
          =
871   5   =          ELSE
          =          IF (SWITCH$BYTE AND HTG$SWITCH) <> 0  THEN
872   6   =          DO;
873   6   =            IF SYSTEM$STATUS.CURRENT$MODE = COOLING$MODE  THEN
874   7   =            DO;
875   7   =              CALL SHUT$DOWN$HVAC;
876   7   =              SYSTEM$STATUS.CURRENT$MODE = HEATING$MODE;
          =                                                    /* HEATING MODE */
877   7   =              CALL PRESET$TSTAT;     /* LOAD PRELIMINARY PARAMETERS */
878   7   =            END;
          =
879   6   =            ELSE
          =            IF SYSTEM$STATUS.CURRENT$MODE = IDLE$MODE  THEN
880   7   =            DO;
881   7   =              SYSTEM$STATUS.CURRENT$MODE = HEATING$MODE;
          =                                                    /* HEATING MODE */
882   7   =              CALL PRESET$TSTAT;     /* LOAD PRELIMINARY PARAMETERS */
883   7   =            END;
          =
884   6   =            ELSE
          =              SYSTEM$STATUS.CURRENT$MODE = HEATING$MODE;
          =
885   6   =            REV$VALVE = DEENERGIZE;
886   6   =          END;
          =
887   5   =          ELSE
          =          DO;
888   6   =            IF (SYSTEM$STATUS.CURRENT$MODE <> IDLE$MODE)  AND
          =                        ((RECV$TSTAT$MSG.DATA$FIELD(0) < 0A0H) AND
          =                         (RECV$TSTAT$MSG.DATA$FIELD(0) > 40H))  THEN
          =    /* TEST FOR TEMPERATURE ADDED FOR PERMANENT OVERRIDE DROPOUT
          =                        ON STARTUP FROM POWER FAILURE - TCH 1/25/89 */
889   7   =            DO;
890   7   =              CALL SHUT$DOWN$HVAC;                  /* SYSTEM IS OFF */
891   7   =              SYSTEM$STATUS.CURRENT$MODE = IDLE$MODE;
892   7   =            END;
893   6   =          END;
          =
          =       /******* NOW EVALUATE THE TEMPERATURE FROM THE TSTAT ********/
          =
894   5   =          CONVERTED$SETPOINT =
          =               BCD$TO$BIN$CONVERT(SYSTEM$STATUS.SETPOINT$TEMPERATURE);
895   5   =          IF (CONVERTED$SETPOINT > 99) OR
          =             (CONVERTED$SETPOINT < 50)  THEN
896   6   =          DO;
897   6   =            CALL WHAT$DAY$IS$IT;
898   6   =            MODE$CHANGED = YES;
899   6   =          END;
          =
900   5   =          ELSE
          =          DO;
901   6   =            CONVERTED$TEMPERATURE =
          =                    BCD$TO$BIN$CONVERT(RECV$TSTAT$MSG.DATA$FIELD(0));
          =
902   6   =            CONVERTED$CURRENT =
          =                BCD$TO$BIN$CONVERT(SYSTEM$STATUS.CURRENT$TEMPERATURE);
903   6   =          END;
          =
904   5   =          IF (MODE$CHANGED = NO) AND
          =                        ((RECV$TSTAT$MSG.DATA$FIELD(0) < 0A0H) AND
          =                         (RECV$TSTAT$MSG.DATA$FIELD(0) > 40H))  THEN
          =          /* MODE HAS NOT CHANGED AND WIDE RANGE (ADDED 1/25/89)
          =               TEMPERATURE OK (TCH 01/11/89) - EVALUATE TEMPERATURE */
905   6   =          DO;
906   6   =            IF (CONVERTED$TEMPERATURE > 99) OR
          =               (CONVERTED$TEMPERATURE < 50)  THEN
907   7   =            DO;
908   7   =              ERROR$ALERT = YES;
909   7   =              SEND$ERROR$MSG.PROCESS$NUMBERS = SYSTEM$PROCESS;
910   7   =              SEND$ERROR$MSG.ERROR$TYPE(ERROR$INDEX) =
          =                                                    TEMP$OUT$OF$RANGE;
```

```
911    7  =            IF ERROR$INDEX > 13  THEN
912    7  =              SEND$ERROR$MSG.ERROR$TYPE(ERROR$INDEX) =
          =                         ERROR$BUFFER$OVERFLOW; /* ADDED 3/16/89 */
913    7  =            ELSE
          =              ERROR$INDEX = ERROR$INDEX + 1;
          =
914    7  =          END;
          =
915    6  =          IF (CONVERTED$TEMPERATURE <> CONVERTED$CURRENT) OR
          =             (NEW$SETPOINT = YES)  THEN
          =
916    7  =          DO; /***** THIS BLOCK COMPARES THE TSTAT TEMPERATURE
          =                              WITH THE SETPOINT TEMPERATURE *****/
917    7  =            NEW$SETPOINT = NO;
918    7  =            IF CONVERTED$TEMPERATURE < CONVERTED$SETPOINT   THEN
919    8  =            DO;
920    8  =              IF (HVAC$SYSTEM$ACTIVE = NO) AND
          =                             (HVAC$SYSTEM$TIMER$EXPIRED = YES)  THEN
921    9  =              DO;
922    9  =                IF SYSTEM$STATUS.CURRENT$MODE = HEATING$MODE  THEN
923   10  =                DO;            /* TEST FOR TWO DEGREE DIFFERENTIAL */
924   10  =                  IF (CONVERTED$SETPOINT -
          =                                  CONVERTED$TEMPERATURE) > 1  THEN
925   11  =                  DO;
926   11  =                    REV$VALVE = DEENERGIZE;
          =
          =         /*** THIS SCENARIO COVERS MAINTAINING CURRENT SETPOINT ***/
          =
927   11  =                    HVAC$SYSTEM$ACTIVE = YES;
          =                                              /* START FILTER TIMER */
928   11  =                    HEAT$STAGE$1 = ENERGIZE;
          =                                       /*** TEST FOR TWO STAGE HEATING ***/
929   11  =                    IF (CONVERTED$SETPOINT -
          =                                  CONVERTED$TEMPERATURE) > 2  THEN
930   11  =                      HEAT$STAGE$2 = ENERGIZE;
931   11  =                    ELSE
          =                      TSTAT$TEMPERATURE$TIMER = 0;
          =                                               /* START TSTAT TIMER */
932   11  =                    IF CONFIG$DATA.ELECTRIC$HEAT = 1  THEN
933   12  =                    DO;
934   12  =                      FAN = ENERGIZE;               /* TURN ON FAN */
935   12  =                      TSTAT$TEMPERATURE$TIMER = 0;
          =                                               /* START TSTAT TIMER */
936   12  =                    END;
937   11  =                    IF EMERG$HEAT$REQUIRED = YES  THEN
938   12  =                    DO;
939   12  =                      HEAT$STAGE$1 = DEENERGIZE;
          =                                         /* TURN OFF STAGE 1 HEAT */
940   12  =                      HEAT$STAGE$2 = ENERGIZE;
          =                                 /* TURN ON STAGE 2 HEAT IF REQUIRED */
941   12  =                      STATUS$BYTES(0) = STATUS$BYTES(0) OR 10H;
          =                                   /* TURN ON EMERGENCY HEAT ELEMENT */
942   12  =                      TSTAT$TEMPERATURE$TIMER = 0;
          =                                               /* START TSTAT TIMER */
943   12  =                    END;
          =  /*** ADDED 7/31/89 ***/
944   11  =                    COOL$STAGE$1 = DEENERGIZE;
945   11  =                    COOL$STAGE$2 = DEENERGIZE;
          =  /*** TO INSURE THAT HTG AND CLG ARE NOT ON AT THE SAME TIME ***/
946   11  =                  END;
947   10  =                END;
948    9  =              END;
          =
949    8  =              ELSE
          =              IF HVAC$SYSTEM$ACTIVE = YES  THEN
950    9  =              DO;
951    9  =                IF SYSTEM$STATUS.CURRENT$MODE = HEATING$MODE  THEN
952   10  =                DO;            /* HVAC SYTEM IS ACTIVE - HEATING */
953   10  =                  REV$VALVE = DEENERGIZE;
954   10  =                  IF (CONVERTED$SETPOINT -
          =                                  CONVERTED$TEMPERATURE) > 2  THEN
955   10  =                    HEAT$STAGE$2 = ENERGIZE;
956   10  =                  ELSE
          =                  DO;
957   11  =                    IF (CONVERTED$SETPOINT -
          =                                  CONVERTED$TEMPERATURE) < 2  THEN
958   12  =                    DO;
```

```
 959  12  =                       IF EMERG$HEAT$REQUIRED = NO  THEN
 960  13  =                       DO;
 961  13  =                         HEAT$STAGE$2 = DEENERGIZE;
 962  13  =                         STATUS$BYTES(0) = STATUS$BYTES(0) AND 0EFH;
          =                 /* TURN OFF EMERGENCY HEAT ELEMENT IF NECESSARY */
          =
 963  13  =                         IF TSTAT$TEMPERATURE$TIMER = 0FFH  THEN
 964  13  =                           TSTAT$TEMPERATURE$TIMER = 0;
 965  13  =                       END;
 966  12  =                     END;
 967  11  =                     IF CONVERTED$TEMPERATURE >
          =                                             CONVERTED$CURRENT  THEN
          =
 968  11  =                       CALL UPDATE$AVERAGE$DEGREE$TIME;
 969  11  =                   END;
          =   /*** ADDED 7/31/89 ***/
 970  10  =                   COOL$STAGE$1 = DEENERGIZE;
 971  10  =                   COOL$STAGE$2 = DEENERGIZE;
          =   /*** TO INSURE THAT HTG AND CLG ARE NOT ON AT THE SAME TIME ***/
          =
 972  10  =                 END;
          =
 973   9  =                 ELSE
          =                 IF SYSTEM$STATUS.CURRENT$MODE = COOLING$MODE  THEN
 974  10  =                 DO;
 975  10  =                   REV$VALVE = ENERGIZE;
 976  10  =                   CALL SHUT$DOWN$HVAC;
 977  10  =                 END;
 978   9  =               END;
 979   8  =             END;
          =
 980   7  =             ELSE
          =             IF CONVERTED$TEMPERATURE > CONVERTED$SETPOINT   THEN
 981   8  =             DO;
 982   8  =               IF (HVAC$SYSTEM$ACTIVE = NO) AND
          =                             (HVAC$SYSTEM$TIMER$EXPIRED = YES)  THEN
 983   9  =               DO;
 984   9  =                 IF SYSTEM$STATUS.CURRENT$MODE = COOLING$MODE  THEN
 985  10  =                 DO;             /* TEST FOR TWO DEGREE DIFFERENTIAL */
 986  10  =                   IF (CONVERTED$TEMPERATURE -
          =                                         CONVERTED$SETPOINT) > 1  THEN
 987  11  =                   DO;
          =         /*** THIS SCENARIO COVERS MAINTAINING CURRENT SETPOINT ***/
 988  11  =                     HVAC$SYSTEM$ACTIVE = YES;
          =                                               /* START FILTER TIMER */
 989  11  =                     REV$VALVE = ENERGIZE;
 990  11  =                     COOL$STAGE$1 = ENERGIZE;
          =                                 /*** TEST FOR TWO STAGE COOLING ***/
 991  11  =                     IF (CONVERTED$TEMPERATURE -
          =                                         CONVERTED$SETPOINT) > 2  THEN
 992  11  =                       COOL$STAGE$2 = ENERGIZE;
 993  11  =                     ELSE
          =                       TSTAT$TEMPERATURE$TIMER = 0;
          =                                               /* START TSTAT TIMER */
 994  11  =                     FAN = ENERGIZE;                /* TURN ON FAN */
          =   /*** ADDED 7/31/89 ***/
 995  11  =                     HEAT$STAGE$1 = DEENERGIZE;
 996  11  =                     HEAT$STAGE$2 = DEENERGIZE;
          =   /*** TO INSURE THAT HTG AND CLG ARE NOT ON AT THE SAME TIME ***/
 997  11  =                   END;
 998  10  =                 END;
 999   9  =               END;
          =
1000   8  =               ELSE
          =               IF HVAC$SYSTEM$ACTIVE = YES  THEN
1001   9  =               DO;
1002   9  =                 IF SYSTEM$STATUS.CURRENT$MODE = COOLING$MODE  THEN
1003  10  =                 DO;             /* HVAC SYTEM IS ACTIVE - COOLING */
1004  10  =                   REV$VALVE = ENERGIZE;
1005  10  =                   IF (CONVERTED$TEMPERATURE -
          =                                         CONVERTED$SETPOINT) > 2  THEN
1006  10  =                     COOL$STAGE$2 = ENERGIZE;
1007  10  =                   ELSE
          =                   DO;
1008  11  =                     IF (CONVERTED$TEMPERATURE -
          =                                         CONVERTED$SETPOINT) < 2  THEN
1009  12  =                     DO;
1010  12  =                       COOL$STAGE$2 = DEENERGIZE;
```

```
12  =                      IF TSTAT$TEMPERATURE$TIMER = 0FFH  THEN
12  =                        TSTAT$TEMPERATURE$TIMER = 0;
12  =                    END;
    =
11  =                    IF CONVERTED$TEMPERATURE <
    =                                                 CONVERTED$CURRENT  THEN
    =
11  =                    CALL UPDATE$AVERAGE$DEGREE$TIME;
11  =                  END;
    =  /*** ADDED 7/31/89 ***/
10  =                  HEAT$STAGE$1 = DEENERGIZE;
10  =                  HEAT$STAGE$2 = DEENERGIZE;
    =  /*** TO INSURE THAT HTG AND CLG ARE NOT ON AT THE SAME TIME ***/
10  =                END;
    =
 9  =                ELSE
    =                IF SYSTEM$STATUS.CURRENT$MODE = HEATING$MODE  THEN
10  =                DO;
10  =                  REV$VALVE = DEENERGIZE;
10  =                  CALL SHUT$DOWN$HVAC;
10  =                END;
 9  =              END;
 8  =            END;
    =
 7  =            ELSE
    =            DO;                        /* TSTAT AND SETPOINT ARE EQUAL */
 8  =              IF HVAC$SYSTEM$ACTIVE = YES  THEN
 9  =              DO;  /* TURN OFF HEATING AND COOLING STAGES 1 AND 2 */
    =
 9  =                CALL UPDATE$AVERAGE$DEGREE$TIME;
 9  =                CALL SHUT$DOWN$HVAC;
    =
 9  =                STATUS$BYTES(0) = STATUS$BYTES(0) AND 0EFH;
    =                               /* TURN OFF EMERGENCY HEAT ELEMENT */
 9  =              END;
 8  =            END;
    =                                 /*** UPDATE CURRENT TEMPERATURE ***/
 7  =            SYSTEM$STATUS.CURRENT$TEMPERATURE =
    =                                          RECV$TSTAT$MSG.DATA$FIELD(0);
 7  =          END;
    =
 6  =          IF (HVAC$SYSTEM$ACTIVE = YES)  THEN
 7  =          DO;
 7  =            IF TSTAT$TEMPERATURE$TIMER >
    =                               ((AVERAGE$DEGREE$TIME * 2) + 5)  THEN
 8  =            DO;
 8  =              IF SYSTEM$STATUS.CURRENT$MODE = HEATING$MODE  THEN
 9  =              DO;
 9  =                IF (CONFIG$DATA.SECONDARY$HEAT$RECOVERY <> 0) OR
    =                   (CONFIG$DATA.EMERG$H_P$ACTION <> 0)  THEN
10  =                DO;
10  =                  HEAT$STAGE$2 = ENERGIZE;
    =                         /* TURN ON STAGE 2 HEAT - STAGE 1 FAILED */
10  =                  IF CONFIG$DATA.EMERG$H_P$ACTION <> 0  THEN
10  =                    STATUS$BYTES(0) = STATUS$BYTES(0) OR 10H;
    =                               /* TURN ON EMERGENCY HEAT ELEMENT */
    =  /*** ADDED 7/31/89 ***/
10  =                  COOL$STAGE$1 = DEENERGIZE;
10  =                  COOL$STAGE$2 = DEENERGIZE;
    =  /*** TO INSURE THAT HTG AND CLG ARE NOT ON AT THE SAME TIME ***/
10  =                END;
 9  =              END;
    =
 8  =              ELSE
    =              IF SYSTEM$STATUS.CURRENT$MODE = COOLING$MODE  THEN
 9  =              DO;
 9  =                COOL$STAGE$2 = ENERGIZE;
    =                         /* TURN ON STAGE 2 COOL - STAGE 1 FAILED */
    =  /*** ADDED 7/31/89 ***/
 9  =                HEAT$STAGE$1 = DEENERGIZE;
 9  =                HEAT$STAGE$2 = DEENERGIZE;
    =  /*** TO INSURE THAT HTG AND CLG ARE NOT ON AT THE SAME TIME ***/
 9  =              END;
 8  =              TSTAT$TEMPERATURE$TIMER = 0;     /* RESET THE TIMER */
 8  =            END;
 7  =          END;
    =
```

```
1061   6  =            ELSE
          =            DO;
1062   7  =              IF TSTAT$TEMPERATURE$TIMER > 32  THEN
1063   7  =                TSTAT$TEMPERATURE$TIMER = 0FFH;   /* TURN OFF TIMER */
1064   7  =            END;
1065   6  =          END;
          =
1066   5  =          ELSE
          =            MODE$CHANGED = NO;
          =                               /* EVALUATE TEMPERTURE NEXT TIME AROUND */
1067   5  =        END;
          =
1068   4  =        ELSE
          =          CALL SHUT$DOWN$HVAC;   /* DLC IS ACTIVE - TURN SYSTEM OFF */
          =
1069   4  =        CALL SEND$TSTAT$MSG (TSTAT$TIME);
1070   4  =      END;
          =
          =                     /*** HVAC SCHEDULES - REQUESTED OR STORED ***/
1071   4  =      DO;
1072   4  =        TSTAT$INDEX = RECV$TSTAT$MSG.DEVICE$ADDRESS;
          =
1073   4  =        IF RECV$TSTAT$MSG.BYTE$COUNT = 0  THEN
          =                                        /* REQUESTING HVAC SCHEDULES */
1074   4  =          CALL SEND$TSTAT$MSG (HVAC$SCHEDULE);
          =
1075   4  =        ELSE                             /* STORE HVAC SCHEDULES IN RAM */
          =        DO;
1076   5  =          TSTAT$PROGRAM$FLAG = YES;
1077   5  =          CALL SEND$TSTAT$MSG (TSTAT$ACK);
1078   5  =          CALL LOAD$PROGRAMS (HVAC$SCHEDULE);
1079   5  =          HVAC$OPTIMIZATION$REQUIRED = YES;
1080   5  =        END;
1081   4  =      END;
          =
          =                /*** WATER HEATER SCHEDULES - REQUESTED OR STORED ***/
1082   4  =      DO;
1083   4  =        TSTAT$INDEX = RECV$TSTAT$MSG.DEVICE$ADDRESS;
          =
1084   4  =        IF (RECV$TSTAT$MSG.BYTE$COUNT = 0)
          =                      AND
          =           (CONFIG$DATA.EWH$PREHEAT <> 0)   THEN
          =                                /* REQUESTING WATER HEATER SCHEDULES */
1085   4  =          CALL SEND$TSTAT$MSG (EWH$SCHEDULE);
          =
1086   4  =        ELSE                 /* STORE WATER HEATER SCHEDULES IN RAM */
          =        DO;
1087   5  =          IF CONFIG$DATA.EWH$PREHEAT <> 0   THEN
1088   6  =          DO;
1089   6  =            TSTAT$PROGRAM$FLAG = YES;
1090   6  =            CALL SEND$TSTAT$MSG (TSTAT$ACK);
1091   6  =            CALL LOAD$PROGRAMS (EWH$SCHEDULE);
1092   6  =            EWH$OPTIMIZATION$REQUIRED = YES;
1093   6  =          END;
1094   5  =        END;
1095   4  =      END;
          =
          =                      /*** DEVICE SCHEDULES - REQUESTED OR STORED ***/
1096   4  =      DO;
1097   4  =        TSTAT$INDEX = RECV$TSTAT$MSG.DEVICE$ADDRESS;
          =
1098   4  =        IF RECV$TSTAT$MSG.BYTE$COUNT = 0  THEN
          =                                     /* REQUESTING DEVICE SCHEDULES */
1099   4  =          CALL SEND$TSTAT$MSG (DEVICE$SCHEDULE);
          =
1100   4  =        ELSE                        /* STORE DEVICE SCHEDULES IN RAM */
          =        DO;
1101   5  =          TSTAT$PROGRAM$FLAG = YES;
1102   5  =          CALL SEND$TSTAT$MSG (TSTAT$ACK);
1103   5  =          CALL LOAD$PROGRAMS (DEVICE$SCHEDULE);
1104   5  =        END;
1105   4  =      END;
          =
          =                  /*** CONFIGURATION DATA - REQUESTED OR STORED ***/
1106   4  =      DO;
          =
1107   4  =        IF RECV$TSTAT$MSG.BYTE$COUNT = 0  THEN
1108   5  =        DO;                       /* REQUESTING CONFIGURATION DATA */
```

```
1109   5  =         CALL SEND$TSTAT$MSG (CONFIGURATION$DATA);
          =    /*** ADDED 8/8/89 ***/
1110   5  =         STATUS$BYTES(1) = STATUS$BYTES(1) AND 0DFH;
          =    /*** CLEARS "Z" BIT IN STATUS BYTES ***/
1111   5  =         Z$BIT$SET = NO;                          /* CLEAR Z BIT FLAG */
1112   5  =       END;
          =
1113   4  =       ELSE                        /* STORE CONFIGURATION DATA IN RAM */
          =       DO;
1114   5  =         TSTAT$PROGRAM$FLAG = YES;
1115   5  =         CALL SEND$TSTAT$MSG (TSTAT$ACK);
1116   5  =         CALL LOAD$PROGRAMS (CONFIGURATION$DATA);
          =                    /* COMMENT OUT HERE AJB*/
          =    /*  IF (CONFIG$DATA.ELECTRIC$HEAT = 1) AND
          =          (CONFIG$DATA.SECONDARY$HEAT$RECOVERY = 1) THEN
          =          DO;
          =          TIME$AND$DATE.HOUR = BSRDEV$ARRAY(0);
          =          TIME$AND$DATE.MINUTE = BSRDEV$ARRAY(1);
          =
          =          IF (CONFIG$DATA.EWH$PREHEAT <> 0) OR
          =             (CONFIG$DATA.EWH$PREHEAT <> 8)  THEN
          =             DO;
          =             TIME$AND$DATE.DAY$OF$WEEK = CONFIG$DATA.EWH$PREHEAT;
          =             END;
          =          END;   */
          =                    /* COMMENT OUT HERE  AJB */
1117   5  =         CALL WHAT$DAY$IS$IT;
1118   5  =       END;
1119   4  =     END;
          =
          =                                     /*** SEND BILLING INFORMAITON ***/
          =
1120   3  =     CALL SEND$TSTAT$MSG (BILLING$INFO);
          =
          =                /*** OVERRIDE INFORMATION - ENABLED OR DISABLED ***/
1121   4  =     DO;
1122   4  =       CALL SEND$TSTAT$MSG (TSTAT$ACK);
1123   4  =       CALL PROCESS$OVERRIDE$MSG;
1124   4  =     END;
          =
          =         /*** REQUEST CUSTOMER SERVICE OR OPTIMIZATION (DEFAULT) ***/
1125   4  =     DO;
1126   4  =       IF (RECV$TSTAT$MSG.DATA$FIELD(0) AND OPTIMIZE$KEY) <> 0  THEN
1127   5  =       DO;
1128   5  =         LOAD$BSR$DEFAULTS = NO;
1129   5  =         CALL LOAD$PROGRAMS (DEFAULT);
1130.  5  =         IF (HVAC$TEMPORARY$OVERRIDE = YES) OR
          =            (HVAC$PERMANENT$OVERRIDE = YES)  THEN
1131   6  =         DO;
1132   6  =           CALL MOVXX0 (.TIME$AND$DATE.YEAR,
          =                   .HVAC$OVERRIDE(HVAC$OVERRIDE$INDEX).STOP, 5);
          =                             /* STORE STOP TIME OF HVAC OVERRIDE */
1133   6  =           STATUS$BYTES(0) = STATUS$BYTES(0) AND 0F7H;
          =                            /* TURN OFF TEMPERATURE HOLD ELEMENT */
1134   6  =           HVAC$OPTIMIZATION$REQUIRED = YES;
1135   6  =           HVAC$OVERRIDE$ACTIVE = NO;   /* READY FOR NEXT OVERRIDE */
1136   6  =           HVAC$OVERRIDE$INDEX = HVAC$OVERRIDE$INDEX + 1;
1137   6  =           HVAC$TEMPORARY$OVERRIDE = NO;
1138   6  =           HVAC$PERMANENT$OVERRIDE = NO;
1139   6  =         END;
1140   5  =       END;
          =
1141   4  =       IF (RECV$TSTAT$MSG.DATA$FIELD(0) AND PHONE$IN) <> 0  THEN
1142   5  =       DO;
1143   5  =         ERROR$ALERT = YES;
1144   5  =         SEND$ERROR$MSG.PROCESS$NUMBERS = SYSTEM$PROCESS;
1145   5  =         SEND$ERROR$MSG.ERROR$TYPE(ERROR$INDEX) =
          =                                         CUSTOMER$SERVICE$REQUIRED;
1146   5  =         IF ERROR$INDEX > 13  THEN
1147   5  =           SEND$ERROR$MSG.ERROR$TYPE(ERROR$INDEX) =
          =                          ERROR$BUFFER$OVERFLOW; /* ADDED 3/16/89 */
1148   5  =         ELSE
          =           ERROR$INDEX = ERROR$INDEX + 1;
          =
1149   5  =         S$P$TIMER$ACTIVE = YES;
1150   5  =       END;
          =
1151   4  =       IF (RECV$TSTAT$MSG.DATA$FIELD(0) AND FILTER$RESET) <> 0  THEN
```

```
1152   5  =        DO;
1153   5  =          STATUS$BYTES(0) = STATUS$BYTES(0) AND 0FEH;
          =                                       /* TURN OFF FILTER ELEMENT */
1154   5  =          FILTER$COUNT$HRS$HUNDRED = 0;     /* CLEAR RUNTIME COUNTER */
1155   5  =          FILTER$COUNT$HOURS = 0;
1156   5  =       END;
          =
1157   4  =        CALL SEND$TSTAT$MSG (TSTAT$ACK);
1158   4  =      END;
1159   3  =    END;                        /* END OF DO CASE FOR TSTAT MESSAGES */
          =
1160   2  =    ELSE
          =    DO;
          =    /*  ERROR$BYTES.ERROR$TYPE(ERROR$INDEX) = TSTAT$MSG$TYPE$ERROR;
          =
          =      IF ERROR$INDEX > 13 THEN
          =        SEND$ERROR$MSG.ERROR$TYPE(ERROR$INDEX) =
          =                          ERROR$BUFFER$OVERFLOW; \* ADDED 3/16/89 *\
          =      ELSE
          =        ERROR$INDEX = ERROR$INDEX + 1;
          =
          =      ERROR$ALERT = YES;*/
1161   3  =    END;
          =
1162   2  =    IF HVAC$SYSTEM$ACTIVE = YES THEN SYSTEM$STATUS.HVAC$ACTIVE = 1;
1164   2  =    ELSE SYSTEM$STATUS.HVAC$ACTIVE = 0;
          =
1165   1  =    END DECODE$TSTAT$MSG;

               /*
               $TITLE ('RECEIVE/TRANSMIT T/STAT BYTE')
               $INCLUDE (TSTBYT.STH)
               */
1166   1       END TSTAT$MSG;



MODULE INFORMATION:                   (STATIC+OVERLAYABLE)
    CODE SIZE                         = 0ACEH       2766D
    CONSTANT SIZE                     = 0000H         0D
    DIRECT VARIABLE SIZE              =   00H+01H     0D+  1D
    INDIRECT VARIABLE SIZE            =   00H+00H     0D+  0D
    BIT SIZE                          =   0CH+00H    12D+  0D
    BIT-ADDRESSABLE SIZE              =   00H+00H     0D+  0D
    AUXILIARY VARIABLE SIZE           = 0135H        309D
    MAXIMUM STACK SIZE                = 0006H          6D
    REGISTER-BANK(S) USED:              0
    2175 LINES READ
    0 PROGRAM ERROR(S)

END OF PL/M-51 COMPILATION


DOS 3.30 (038-N) PL/M-51 V1.2
COMPILER INVOKED BY:  C:\INTEL\PLM51.EXE MISC.PTH PW(80)PL(60)DB NOINTVECTOR OT(
)) 3)ROM(LARGE)


   1   1       MISC$FILES: DO;

               /**********************************************/
               /*                                            */
               /*    MM      MM    II    SSSSS     CCCCCC    */
               /*    M M    M M    II   S         C          */
               /*    M  M M  M     II   S         C          */
               /*    M   M   M     II    SSSSS    C          */
               /*    M       M     II         S   C          */
               /*    M       M     II         S   C          */
               /*    M       M     II    SSSSS     CCCCCC    */
               /*                                            */
               /**********************************************/
```

```
/*****************************************************************
(c) Copyright, Johnson Controls Incorporated, 1988.  All rights
    reserved. The following program is the exclusive property of
    Johnson Controls, Inc. and its use is restricted by license
    agreement to the system with which it was furnished.  The
    program contents are confidential and may not be disclosed
    or used outside the system without the express written
    consent of Johnson Controls.  This program is further
    protected by federal copyright law as an unpublished work
    and any unauthorized reproduction is prohibited.
*****************************************************************/

$TITLE ('MISC  DECLARATIONS')
$NOLIST
/*****************************************************************
***** The following is a list of files that are used by     *****
***** several modules in the system:                         *****
*****      BINBCD.STH        CHKSUM.STH        LDPROG.STH    *****
*****      WREEPR.STH                                        *****
*****************************************************************/
$INCLUDE (MSCDCL.DTH)
          =
          =   /*****************************************************************
          =       P U B L I C   S T R U C T U R E   D E C L A R A T I O N S
          =   *****************************************************************/
          =
455   1   =   DECLARE  PROGRAM$BUFFER  STRUCTURE (
          =       BYTE$COUNT                       BYTE,
          =       MISC                             BYTE,
          =       POINTER                          BYTE,
          =       DATA$FIELD                  (28) BYTE,
          =       EOS                              BYTE)  PUBLIC  AUXILIARY;
          =
          =   /*****************************************************************
          =     E X T E R N A L   S T R U C T U R E   D E C L A R A T I O N S
          =   *****************************************************************/
          =
456   1   =   DECLARE  BRICK$MIP                   (20) BYTE  EXTERNAL  AUXILIARY;
          =
457   1   =   DECLARE  EEPROM$ARRAY               (512) BYTE  EXTERNAL  AUXILIARY;
          =
458   1   =   DECLARE  EEPROM$DATA  STRUCTURE (
          =       HVAC                        (96) BYTE,
          =       EWH                         (32) BYTE,
          =       BSRDEV                     (256) BYTE,
          =       VERSION                     (15) BYTE,
          =       EXTRA                      (111) BYTE,
          =       CHECKSUM                         BYTE,
          =       TEST$BYTE                        BYTE)  AT
          =                                          (.EEPROM$ARRAY(0))  AUXILIARY;
          =
459   1   =   DECLARE  SCHEDULES                  (399) BYTE  EXTERNAL  AUXILIARY;
          =
460   1   =   DECLARE  HVAC$ARRAY                  (96) BYTE  AT (.SCHEDULES(0))
          =                                                            AUXILIARY;
461   1   =   DECLARE  HVAC  (4)  STRUCTURE (
          =       START$MORN                   (2) BYTE,
          =       TEMP$1$MORN                      BYTE,
          =       TEMP$2$MORN                      BYTE,
          =       TEMP$3$MORN                      BYTE,
          =       TEMP$4$MORN                      BYTE,
          =       START$DAY                    (2) BYTE,
          =       TEMP$1$DAY                       BYTE,
          =       TEMP$2$DAY                       BYTE,
          =       TEMP$3$DAY                       BYTE,
          =       TEMP$4$DAY                       BYTE,
          =       START$EVE                    (2) BYTE,
          =       TEMP$1$EVE                       BYTE,
          =       TEMP$2$EVE                       BYTE,
          =       TEMP$3$EVE                       BYTE,
          =       TEMP$4$EVE                       BYTE,
          =       START$NITE                   (2) BYTE,
          =       TEMP$1$NITE                      BYTE,
          =       TEMP$2$NITE                      BYTE,
          =       TEMP$3$NITE                      BYTE,
```

```
           =      TEMP$4$NITE                   BYTE)  AT (.SCHEDULES(0))  .
           =                                                         AUXILIARY;
           =
           =  /*************************************************************/
           =
462    1   =  DECLARE  EWH$ARRAY                    (32) BYTE  AT (.SCHEDULES(96))
           =                                                         AUXILIARY;
463    1   =  DECLARE  EWH  (2)  STRUCTURE (
           =      START$MORN                (2) BYTE,
           =      STOP$MORN                 (2) BYTE,
           =      START$DAY                 (2) BYTE,
           =      STOP$DAY                  (2) BYTE,
           =      START$EVE                 (2) BYTE,
           =      STOP$EVE                  (2) BYTE,
           =      START$NITE                (2) BYTE,
           =      STOP$NITE                 (2) BYTE)  AT (.SCHEDULES(96))
           =                                                         AUXILIARY;
           =
           =  /*************************************************************/
           =
464    1   =  DECLARE  BSRDEV$ARRAY,               (256) BYTE  AT (.SCHEDULES(128))
           =                                                         AUXILIARY;
465    1   =  DECLARE  BSRDEV  (16)  STRUCTURE (
           =      START$MORN                (2) BYTE,
           =      STOP$MORN                 (2) BYTE,
           =      START$DAY                 (2) BYTE,
           =      STOP$DAY                  (2) BYTE,
           =      START$EVE                 (2) BYTE,
           =      STOP$EVE                  (2) BYTE,
           =      START$NITE                (2) BYTE,
           =      STOP$NITE                 (2) BYTE)  AT (.SCHEDULES(128))
           =                                                         AUXILIARY;
           =
466    1   =  DECLARE  BSR$DATA  STRUCTURE  (
           =      HOUSE$CODE                    BYTE,
           =      NUMBER$CODE                   BYTE,
           =      FUNCTION$CODE                 BYTE)  EXTERNAL  AUXILIARY;
           =
467    1   =  DECLARE  CONFIG$ARRAY                 (15) BYTE  AT (.SCHEDULES(384))
           =                                                         AUXILIARY;
           =
468    1   =  DECLARE  CONFIG$DATA   STRUCTURE (
           =      HOUSE$CODE                    BYTE,
           =      F_C$DEGREE                    BYTE,
           =      CLOCK$FORMAT                  BYTE,
           =      FILTER$RUNTIME                BYTE,
           =      WEEKEND$DAY                   BYTE,
           =      HIGH$TEMP$SPAN                BYTE,
           =      LOW$TEMP$SPAN                 BYTE,
           =      EWH$PREHEAT                   BYTE,
           =      H_P$CYCLE$TIME                BYTE,
           =      ELECTRIC$HEAT                 BYTE,
           =      SECONDARY$HEAT$RECOVERY       BYTE,
           =      HIGH$EFFIC$FAN                BYTE,
           =      EMERG$H_P$ACTION              BYTE,
           =      VERSION$NUMBERS           (2) BYTE)  AT (.SCHEDULES(384))
           =                                                      AUXILIARY;
           =
469    1   =  DECLARE  SYSTEM$STATISTICS  STRUCTURE (
           =      CONTROLLER$COMM          (32) BYTE,
           =      TSTAT$COMM               (32) BYTE)  EXTERNAL  AUXILIARY;
           =
470    1   =  DECLARE  RECV$TSTAT$MESSAGE           (32) BYTE  EXTERNAL  AUXILIARY;
           =
471    1   =  DECLARE  RECV$TSTAT$MSG  STRUCTURE (
           =      BYTE$COUNT                    BYTE,
           =      MSG$TYPE                      BYTE,
           =      DEVICE$ADDRESS                BYTE,
           =      DATA$FIELD               (28) BYTE,
           =      CHECKSUM                      BYTE)  AT (.RECV$TSTAT$MESSAGE)
           =                                                         AUXILIARY;
           =
472    1   =  DECLARE  TRANS$BRICK$MESSAGE          (20) BYTE  EXTERNAL  AUXILIARY;
           =
473    1   =  DECLARE  TRANS$BRICK$MSG  STRUCTURE (
           =
```

```
         =        BYTE$COUNT                          BYTE,
         =        MSG$TYPE                            BYTE,
         =        SOURCE$ADDRESS                      BYTE,
         =        PROCESS$NUMBERS                     BYTE, /* UPPER NYBBLE SOURCE
         =                                                  LOWER NYBBLE DESTINATION */
         =        DATA$FIELD                     (15) BYTE,
         =        CHECKSUM                            BYTE)  AT (.TRANS$BRICK$MESSAGE)
         =                                                                AUXILIARY;
         =
         =    /*****************************************************************
         =          A R R A Y / S T R U C T U R E   D E C L A R A T I O N S  -
         =    *****************************************************************/
         =
474    1 =    DECLARE  RELAY                          (12) BYTE AUXILIARY;
         =
475    1 =    DECLARE  WRITE$DATA$BUFFER              (28) BYTE  AUXILIARY;
         =
         =    /*****************************************************************
         =            P U B L I C   W O R D   D E C L A R A T I O N S
         =    *****************************************************************/
         =
476    1 =    DECLARE  AMOUNT                              WORD  PUBLIC  AUXILIARY;
         =
         =    /*****************************************************************
         =           E X T E R N A L   W O R D   D E C L A R A T I O N
         =    *****************************************************************/
         =
477    1 =    DECLARE  MISC$WORD                           WORD  EXTERNAL;
         =
         =    /*****************************************************************
         =                   W O R D   D E C L A R A T I O N
         =    *****************************************************************/
         =
478    1 =    DECLARE  CSINDEX                             WORD  AUXILIARY,
479    1 =    DECLARE  PROGRAM$PTR                         WORD  AUXILIARY;
         =
         =    /*****************************************************************
         =            P U B L I C   B Y T E   D E C L A R A T I O N S
         =    *****************************************************************/
         =
480    1 =    DECLARE  EWH$STATUS                           BYTE  PUBLIC  AUXILIARY;
481    1 =    DECLARE  RAM$CHECKSUM                         BYTE  PUBLIC  AUXILIARY;
482    1 =    DECLARE  TENS$NUMBER                          BYTE  PUBLIC  AUXILIARY;
483    1 =    DECLARE  UNITS$NUMBER                         BYTE  PUBLIC  AUXILIARY;
         =
         =    /*****************************************************************
         =          E X T E R N A L   B Y T E   D E C L A R A T I O N S
         =    *****************************************************************/
         =
484    1 =    DECLARE  CONTROLLER$ADDRESS                 BYTE  EXTERNAL  AUXILIARY;
485    1 =    DECLARE  DEV$ADDRESS                        BYTE  EXTERNAL  AUXILIARY;
486    1 =    DECLARE  DEV$STATE                          BYTE  EXTERNAL  AUXILIARY;
487    1 =    DECLARE  PLC$ADDR                           BYTE  EXTERNAL  AUXILIARY;
         =
         =    /*****************************************************************
         =                   B Y T E   D E C L A R A T I O N
         =    *****************************************************************/
         =
488    1 =    DECLARE  BRICK$MSG$TYPE                     BYTE  AUXILIARY;
489    1 =    DECLARE  BRICK$STATUS                       BYTE  AUXILIARY;
490    1 =    DECLARE  BSR$INDEX                          BYTE  AUXILIARY;
491    1 =    DECLARE  CHECKSUM$BUFFER              (397) BYTE  AUXILIARY;
492    1 =    DECLARE  DIAGNOSTIC$INDEX                   BYTE  AUXILIARY;
493    1 =    DECLARE  DIAGNOSTIC$TIMER                   BYTE  AUXILIARY;
494    1 =    DECLARE  E2$INDEX                           BYTE  AUXILIARY;
495    1 =    DECLARE  GEN$CHECKSUM                       BYTE  AUXILIARY;
496    1 =    DECLARE  MASKED$NUMBER                      BYTE  AUXILIARY;
497    1 =    DECLARE  PROGRAM$INDEX                      BYTE  AUXILIARY;
498    1 =    DECLARE  RELAY$INDEX                        BYTE  AUXILIARY;
         =
         =    /*****************************************************************
         =    **************** SCHEDULE DEFAULT VALUES ************************
         =    *****************************************************************/
         =
499    1 =    DECLARE  SCHEDULE$DEFAULTS  (128) BYTE  CONSTANT (
```

```
          =
          =   /***  HEATING WEEKDAY DEFAULTS  (24) BYTES  ***/
          =
          =        6H,00H,70H,68H,66H,64H,
          =        8H,00H,62H,60H,58H,56H,
          =       17H,00H,70H,68H,66H,64H,
          =       22H,00H,67H,64H,61H,59H,
          =
          =   /***  HEATING WEEKEND DEFAULTS  (24) BYTES  ***/
          =
          =        7H,00H,70H,68H,66H,64H,
          =        9H,00H,66H,64H,62H,60H,
          =       17H,00H,70H,68H,66H,64H,
          =       00H,00H,67H,64H,61H,59H,
          =
          =   /***  COOLING WEEKDAY DEFAULTS  (24) BYTES  ***/
          =
          =        6H,00H,74H,76H,78H,80H,
          =        8H,00H,78H,80H,82H,84H,
          =       17H,00H,74H,76H,78H,80H,
          =       22H,00H,78H,80H,82H,84H,
          =
          =   /***  COOLING WEEKEND DEFAULTS  (24) BYTES  ***/
          =
          =        7H,00H,74H,76H,78H,80H,
          =        9H,00H,76H,78H,80H,82H,
          =       17H,00H,74H,76H,78H,80H,
          =       00H,00H,78H,80H,82H,84H,
          =
          =   /***  ELECTRIC WATER HEATER
          =                   WEEKDAY DEFAULTS  (16) BYTES  ***/
          =
          =        6H,00H, 8H,00H,
          =       10H,00H,12H,30H,
          =       17H,00H,18H,00H,
          =       20H,00H,22H,00H,
          =
          =   /***  ELECTRIC WATERHHEATER
          =                   WEEKEND DEFAULTS  (16) BYTES  ***/
          =
          =        6H,00H, 8H,00H,
          =        9H,00H,15H,00H,
          =       17H,00H,21H,00H,
          =       22H,00H,00H,00H);
          =
500   1   =   DECLARE  BSR$DEV$DEFAULT   (16) BYTE CONSTANT (
          =
          =        1H,00H, 1H,00H,
          =        1H,00H, 1H,00H,
          =        1H,00H, 1H,00H,
          =        1H,00H, 1H,00H);
          =
          =   /**********************************************************************
          =     P U B L I C   B I T   M A P P E D   D E C L A R A T I O N S
          =   **********************************************************************/
          =
501   1   =   DECLARE  BSRDEV$DATA$FLAG                 BIT  PUBLIC;
502   1   =   DECLARE  CONFIG$DATA$FLAG                 BIT  PUBLIC;
503   1   =   DECLARE  DATA$TO$BURN                     BIT  PUBLIC;
504   1   =   DECLARE  EEPROM$LOCKED                    BIT  PUBLIC;
505   1   =   DECLARE  EWH$DATA$FLAG                    BIT  PUBLIC;
506   1   =   DECLARE  HVAC$DATA$FLAG                   BIT  PUBLIC;
507   1   =   DECLARE  TICK$TOCK                        BIT  PUBLIC;
          =
          =   /**********************************************************************
          =    E X T E R N A L   B I T   M A P P E D   D E C L A R A T I O N S
          =   **********************************************************************/
          =
508   1   =   DECLARE  LOAD$BSR$DEFAULTS                BIT  EXTERNAL;
509   1   =   DECLARE  TSTAT$PROGRAM$FLAG               BIT  EXTERNAL;
510   1   =   DECLARE  WAITING                          BIT  EXTERNAL;

          =
          =   /**********************************************************************
          =            B I T   M A P P E D   D E C L A R A T I O N S
          =   **********************************************************************/
```

```
                =
511     1       =   DECLARE   FIND$NEXT$BYTE$TO$WRITE          BIT;
512     1       =   DECLARE   BRICK$OK                         BIT  AT (0B4H) REG;
513     1       =   DECLARE   HEAT$STAGE$1                     BIT  AT (90H) REG;
514     1       =   DECLARE   HEAT$STAGE$2                     BIT  AT (91H) REG;
515     1       =   DECLARE   COOL$STAGE$1                     BIT  AT (92H) REG;
516     1       =   DECLARE   COOL$STAGE$2                     BIT  AT (93H) REG;
517     1       =   DECLARE   FAN                              BIT  AT (94H) REG;
518     1       =   DECLARE   REV$VALVE                        BIT  AT (95H) REG;
519     1       =   DECLARE   WATCHDOG$TIMER                   BIT  AT (97H) REG;
                =
                =   /*****************************************************************
                =                L I T E R A L   D E C L A R A T I O N S
                =   *****************************************************************/
                =
520     1       =   DECLARE   BSR$DEFAULT$SIZE                 LITERALLY         '16';
521     1       =   DECLARE   BSR$OFF                          LITERALLY        '1CH';
522     1       =   DECLARE   BSR$ON                           LITERALLY        '14H';
523     1       =   DECLARE   CONFIG$SIZE                      LITERALLY         '15';
524     1       =   DECLARE   CONTROL                          LITERALLY        '30H';
525     1       =   DECLARE   DEENERGIZE                       LITERALLY         '1H';
526     1       =   DECLARE   EEPROM$LENGTH                    LITERALLY        '399';
527     1       =   DECLARE   EIGHTY                           LITERALLY        '50H';
528     1       =   DECLARE   EIGHTY$MASK                      LITERALLY '10000000B';
529     1       =   DECLARE   ENERGIZE                         LITERALLY         '0H';
530     1       =   DECLARE   FORTY                            LITERALLY        '28H';
531     1       =   DECLARE   FORTY$MASK                       LITERALLY '01000000B';
532     1       =   DECLARE   HI$MASK                          LITERALLY '00001111B';
533     1       =   DECLARE   LO$MASK                          LITERALLY '11110000B';
534     1       =   DECLARE   MSG$OVERHEAD                     LITERALLY          '3';
535     1       =   DECLARE   NO                               LITERALLY          '0';
536     1       =   DECLARE   OFF                              LITERALLY          '0';
537     1       =   DECLARE   ON                               LITERALLY       '0FFH';
538     1       =   DECLARE   RAM$SCHEDULES                    LITERALLY        '128';
539     1       =   DECLARE   SCHEDULES$SIZE                   LITERALLY        '399';
540     1       =   DECLARE   SIXTEEN                          LITERALLY '00010000B';
541     1       =   DECLARE   SIXTY_FOUR                       LITERALLY '01000000B';
542     1       =   DECLARE   SYSTEM$PROCESS                   LITERALLY          '0';
543     1       =   DECLARE   TEN                              LITERALLY        '0AH';
544     1       =   DECLARE   TEN$MASK                         LITERALLY '00010000B';
545     1       =   DECLARE   TENS$ONE                         LITERALLY        '10H';
546     1       =   DECLARE   THIRTY_TWO                       LITERALLY '00100000B';
547     1       =   DECLARE   TWENTY                           LITERALLY        '14H';
548     1       =   DECLARE   TWENTY$MASK                      LITERALLY '00100000B';
549     1       =   DECLARE   TWOS$FIVE                        LITERALLY        '32H';
550     1       =   DECLARE   TWOS$FOUR                        LITERALLY        '16H';
551     1       =   DECLARE   TWOS$SIX                         LITERALLY        '64H';
552     1       =   DECLARE   YAHOO                            LITERALLY     '0FFFFH';
553     1       =   DECLARE   YES                              LITERALLY          '1';
                =
                =   /*****************************************************************
                =        E X T E R N A L   M O D U L E S   D E C L A R A T I O N
                =   *****************************************************************/
                =
554     2       =   START$BSR$MESSAGE:  PROCEDURE  EXTERNAL;
555     1       =   END START$BSR$MESSAGE;
                    $INCLUDE (BINBCD.STH)
                =
                =   $TITLE ('BINARY TO BCD CONVERSION')
                =
                =   /************************************************************/
                =
556     2       =   ADJUST$UNITS:  PROCEDURE  PUBLIC;
                =
557     2       =   MASKED$NUMBER = UNITS$NUMBER AND HI$MASK;
                =
558     2       =   IF (MASKED$NUMBER > 9)  THEN  /* CHECK UNITS VALUE */
559     2       =     UNITS$NUMBER = (UNITS$NUMBER - TEN) + TENS$ONE; /* ADD 10 */
                =
560     1       =   END ADJUST$UNITS;
                =
                =   /************************************************************/
                =
561     2       =   BIN$TO$BCD$CONVERT:  PROCEDURE  (NUMBER)  BYTE  PUBLIC;
                =
```

```
562   2  =  DECLARE  NUMBER                              BYTE;
         =
563   2  =  UNITS$NUMBER = 0;
564   2  =  TENS$NUMBER = 0;
         =
565   2  =  IF NUMBER > 63H  THEN       /* NUMBER CANNOT BE MORE THAN 99 */
566   2  =    TENS$NUMBER = 0FFH;
         =
567   2  =  ELSE
         =  DO;
568   3  =    MASKED$NUMBER = NUMBER AND LO$MASK;    /* TEST HIGH NYBBLE */
         =
569   3  =    IF (MASKED$NUMBER AND SIXTEEN) <> 0  THEN
570   3  =      TENS$NUMBER = TENS$NUMBER + TWOS$FOUR;          /* ADD 16 */
571   3  =    IF (MASKED$NUMBER AND THIRTY_TWO) <> 0  THEN
572   3  =      TENS$NUMBER = TENS$NUMBER + TWOS$FIVE;          /* ADD 32 */
573   3  =    IF (MASKED$NUMBER AND SIXTY_FOUR) <> 0  THEN
574   3  =      TENS$NUMBER = TENS$NUMBER + TWOS$SIX;           /* ADD 64 */
         =
575   3  =    IF ((TENS$NUMBER AND HI$MASK) > 9)  THEN
         =                                           /* CHECK UNITS VALUE */
576   3  =      TENS$NUMBER = (TENS$NUMBER - TEN) + TENS$ONE; /* ADD 10 */
         =
577   3  =    UNITS$NUMBER = NUMBER AND HI$MASK;       /* TEST LOW NYBBLE */
         =
578   3  =    CALL ADJUST$UNITS;
         =
579   3  =    MASKED$NUMBER =
         =         (TENS$NUMBER AND HI$MASK) + (UNITS$NUMBER AND HI$MASK);
580   3  =    IF MASKED$NUMBER > 9  THEN
581   4  =    DO;
582   4  =      UNITS$NUMBER = (UNITS$NUMBER AND LO$MASK) +
         =                                       (MASKED$NUMBER - TEN);
583   4  =      TENS$NUMBER = (TENS$NUMBER AND LO$MASK) + TENS$ONE;
584   4  =    END;
         =
585   3  =    TENS$NUMBER = TENS$NUMBER + UNITS$NUMBER;
586   3  =  END;
         =
587   2  =  RETURN (TENS$NUMBER + 0);
         =
588   1  =  END BIN$TO$BCD$CONVERT;
         =
         =  $TITLE ('BCD TO BINARY CONVERSION')
         =
589   2  =  BCD$TO$BIN$CONVERT:  PROCEDURE  (BCD$NUMBER)  BYTE  PUBLIC;
         =
590   2  =  DECLARE  BCD$NUMBER                           BYTE;
         =
591   2  =  UNITS$NUMBER = BCD$NUMBER AND HI$MASK; /* STORE UNITS DIGIT */
592   2  =  TENS$NUMBER = BCD$NUMBER AND LO$MASK;
         =                                /* START TENS DIGIT CONVERSION */
593   2  =  IF (TENS$NUMBER AND TEN$MASK) <> 0 THEN
594   2  =    UNITS$NUMBER = UNITS$NUMBER + TEN;            /* ADD HEX 10 */
595   2  =  IF (TENS$NUMBER AND TWENTY$MASK) <> 0  THEN
596   2  =    UNITS$NUMBER = UNITS$NUMBER + TWENTY;         /* ADD HEX 14 */
597   2  =  IF (TENS$NUMBER AND FORTY$MASK) <> 0 THEN
598   2  =    UNITS$NUMBER = UNITS$NUMBER + FORTY;          /* ADD HEX 28 */
599   2  =  IF (TENS$NUMBER AND EIGHTY$MASK) <> 0  THEN
600   2  =    UNITS$NUMBER = UNITS$NUMBER + EIGHTY;         /* ADD HEX 50 */
         =
601   2  =  RETURN (UNITS$NUMBER + 0);
         =
602   1  =  END BCD$TO$BIN$CONVERT;
            $INCLUDE (CHKSUM.STH)
         =
         =  $TITLE ('CHECKSUM GENERATION')
         =
         =  /*****************************************************************/
         =
603   2  =  GENERATE$CHECKSUM: PROCEDURE  (REQUESTOR) WORD  PUBLIC;
         =
604   2  =  DECLARE  REQUESTOR                          WORD;
         =
605   2  =  CALL MOVXX0 (REQUESTOR, .CHECKSUM$BUFFER, AMOUNT);
         =
```

```
606   2  =   CSINDEX = 0;
607   2  =   GEN$CHECKSUM = 0;
         =
608   3  =   DO WHILE CSINDEX <> AMOUNT;
609   3  =     GEN$CHECKSUM = GEN$CHECKSUM + CHECKSUM$BUFFER(CSINDEX);
610   3  =     CSINDEX = CSINDEX + 1;
611   3  =   END;
         =
612   2  =   GEN$CHECKSUM = (NOT GEN$CHECKSUM) + 1;       /* 2's COMPLEMENT */
         =
613   2  =   RETURN (GEN$CHECKSUM + 0);
         =
614   1  =   END GENERATE$CHECKSUM;
             $INCLUDE (LDPROG.STH)
         =
         =   $TITLE ('LOAD PROGRAM INTO STATIC RAM')
         =
         =   /****************************************************************/
         =
615   2  =   LOAD$PROGRAMS   PROCEDURE  (PROGRAMS)  PUBLIC;
         =
616   2  =   DECLARE  PROGRAMS                              BYTE;
         =
617   2  =   EEPROM$LOCKED = NO;  /* ADDED 3/16/89 TO MONITOR EEPROM WRITING */
         =
618   2  =   IF TSTAT$PROGRAM$FLAG = YES  THEN
619   3  =   DO;
620   3  =     CALL MOVXX0 (.RECV$TSTAT$MSG.BYTE$COUNT,
         =                  .PROGRAM$BUFFER.BYTE$COUNT,
         =                  (RECV$TSTAT$MSG.BYTE$COUNT + MSG$OVERHEAD));
621   3  =     TSTAT$PROGRAM$FLAG = NO;
622   3  =   END;
         =
623   3  =   DO CASE  PROGRAMS;
624   4  =     DO;
625   4  =       CALL MOVCX0 (.SCHEDULE$DEFAULTS, .SCHEDULES, RAM$SCHEDULES);
         =                              /* LOAD DEFAULT SCHEDULES INTO RAM */
         =
626   4  =       IF LOAD$BSR$DEFAULTS = YES  THEN
627   5  =       DO;
628   5  =         BSR$INDEX = 0;
         =
629   6  =         DO WHILE (BSR$INDEX <> 16);
630   6  =           CALL MOVCX0 ( BSR$DEV$DEFAULT,
         =                         .BSRDEV (BSR$INDEX),
         =                          BSR$DEFAULT$SIZE);
         =                            /* LOAD BSR DEFAULT SCHEDULES INTO RAM */
631   6  =           BSR$INDEX = BSR$INDEX + 1;
632   6  =         END;                                   /* END OF DO WHILE */
633   5  =       END;
         =
634   4  =       HVAC$DATA$FLAG = YES;
635   4  =       EWH$DATA$FLAG = YES;
636   4  =       BSRDEV$DATA$FLAG = YES;
637   4  =     END;
         =
638   3  =     ;             /*** THERE IS NO TYPE 1 USED AT THIS TIME ***/
         =
639   4  =     DO;
640   4  =       CALL MOVXX0 (.PROGRAM$BUFFER.DATA$FIELD,
         =                    .HVAC(PROGRAM$BUFFER.POINTER),
         =                    PROGRAM$BUFFER.BYTE$COUNT);
641   4  =       HVAC$DATA$FLAG = YES;
642   4  =     END;
         =
643   4  =     DO;
644   4  =       CALL MOVXX0 (.PROGRAM$BUFFER.DATA$FIELD,
         =                    .EWH(PROGRAM$BUFFER.POINTER),
         =                    PROGRAM$BUFFER.BYTE$COUNT);
645   4  =       EWH$DATA$FLAG = YES;
646   4  =     END;
         =
647   4  =     DO;
648   4  =       CALL MOVXX0 (.PROGRAM$BUFFER.DATA$FIELD,
         =                    .BSRDEV(PROGRAM$BUFFER.POINTER),
         =                    PROGRAM$BUFFER.BYTE$COUNT);
```

```
649    4  =        BSRDEV$DATA$FLAG = YES;
650    4  =      END;
          =
651    4  =      DO;
652    4  =        CALL MOVXX0 (.PROGRAM$BUFFER.DATA$FIELD,
          =                     .CONFIG$DATA.HOUSE$CODE,
          =                     5);
653    4  =        CALL MOVXX0 (.PROGRAM$BUFFER.DATA$FIELD(5),
          =                     .CONFIG$DATA.EWH$PREHEAT,
          =                     6);
654    4  =        CONFIG$DATA$FLAG = YES;
655    4  =      END;
656    3  =    END;                                         /* END OF DO CASE */
          =
657    2  =    WATCHDOG$TIMER = YES;                /* TOGGLE WATCHDOG TIMER */
658    2  =    WATCHDOG$TIMER = NO;                    /* TO MAINTAIN SANITY */
          =
659    2  =    IF (HVAC$DATA$FLAG = YES) OR
          =       (EWH$DATA$FLAG = YES) OR
          =       (BSRDEV$DATA$FLAG = YES) OR
          =       (CONFIG$DATA$FLAG = YES)  THEN
          =
660    2  =      DATA$TO$BURN = YES;
661    2  =    ELSE
          =    DO;
662    3  =      DATA$TO$BURN = NO;
663    3  =      EEPROM$LOCKED = YES;
          =                        /* ADDED 3/16/89 TO MONITOR EEPROM WRITING */
664    3  =    END;
          =
665    2  =    AMOUNT = SCHEDULES$SIZE;
666    2  =    RAM$CHECKSUM = GENERATE$CHECKSUM (.SCHEDULES);
          =                              /* CALCULATE CHECKSUM FOR NEW DATA */
667    1  =    END LOAD$PROGRAMS;
               $INCLUDE (WREEPR.STH)
          =
          =    $TITLE ('WRITE DATA TO EEPROM')
          =
          =    /*****************************************************************/
          =
668    2  =    WRITE$TO$EEPROM:  PROCEDURE  PUBLIC;
          =
669    2  =    IF (EEPROM$DATA.TEST$BYTE = 0) AND
          =       (EEPROM$LOCKED = NO)  THEN
          =                        /* ADDED 3/16/89 TO MONITOR EEPROM WRITING */
670    3  =    DO;
671    3  =      FIND$NEXT$BYTE$TO$WRITE = YES;
672    4  =      DO WHILE FIND$NEXT$BYTE$TO$WRITE = YES;
673    4  =        DATA$TO$BURN = NO;    /* CLEAR FLAG FOR CHECKSUM CALCULATION */
          =
674    4  =        IF HVAC$DATA$FLAG = YES  THEN
675    5  =        DO;
676    5  =          MISC$WORD = CMPXX0 (.HVAC$ARRAY,
          =                              .EEPROM$DATA.HVAC,
          =                               SIZE (HVAC$ARRAY));
677    5  =          IF MISC$WORD = YAHOO  THEN
678    5  =            HVAC$DATA$FLAG = NO;
679    5  =          ELSE
          =          DO;
680    6  =            DATA$TO$BURN = YES;
681    6  =            FIND$NEXT$BYTE$TO$WRITE = NO;
          =
682    6  =            IF EEPROM$LOCKED = YES  THEN
683    7  =            DO WHILE 1;
684    7  =              EEPROM$LOCKED = YES;     /* THIS WILL GENERATE A RESET */
685    7  =            END;
686    6  =            ELSE
          =              EEPROM$DATA.HVAC(MISC$WORD) = HVAC$ARRAY(MISC$WORD);
687    6  =          END;
688    5  =        END;
          =
689    4  =        ELSE IF EWH$DATA$FLAG = YES  THEN
690    5  =        DO;
691    5  =          MISC$WORD = CMPXX0 (.EWH$ARRAY,
          =                              .EEPROM$DATA.EWH,
          =                               SIZE (EWH$ARRAY));
```

```
692   5  =          IF MISC$WORD = YAHOO  THEN
693   5  =            EWH$DATA$FLAG = NO;
694   5  =          ELSE
         =          DO;
695   6  =            DATA$TO$BURN = YES;
696   6  =            FIND$NEXT$BYTE$TO$WRITE = NO;
         =
697   6  =            IF EEPROM$LOCKED = YES  THEN
698   7  =            DO WHILE 1;
699   7  =              EEPROM$LOCKED = YES;    /* THIS WILL GENERATE A RESET */
700   7  =            END,
701   6  =            ELSE
         =              EEPROM$DATA.EWH(MISC$WORD) = EWH$ARRAY(MISC$WORD);
702   6  =          END;
703   5  =        END;
         =
704   4  =        ELSE IF BSRDEV$DATA$FLAG = YES  THEN
705   5  =        DO;
706   5  =          MISC$WORD = CMPXX0 (.BSRDEV$ARRAY,
         =                              .EEPROM$DATA.BSRDEV,
         =                               SIZE (BSRDEV$ARRAY));
707   5  =          IF MISC$WORD = YAHOO  THEN
708   5  =            BSRDEV$DATA$FLAG = NO;
709   5  =          ELSE
         =          DO;
710   6  =            DATA$TO$BURN = YES;
711   6  =            FIND$NEXT$BYTE$TO$WRITE = NO;
         =
712   6  =            IF EEPROM$LOCKED = YES  THEN
713   7  =            DO WHILE 1;
714   7  =              EEPROM$LOCKED = YES;    /* THIS WILL GENERATE A RESET */
715   7  =            END;
716   6  =            EEPROM$DATA.BSRDEV(MISC$WORD) = BSRDEV$ARRAY(MISC$WORD);
717   6  =          END;
718   5  =        END;
         =
719   4  =        ELSE IF CONFIG$DATA$FLAG = YES  THEN
720   5  =        DO;
721   5  =          MISC$WORD = CMPXX0 (.CONFIG$ARRAY,
         =                              .EEPROM$DATA.VERSION,
         =                               SIZE (CONFIG$ARRAY));
722   5  =          IF MISC$WORD = YAHOO  THEN
723   6  =          DO;
724   6  =            CONFIG$DATA$FLAG = NO;
725   6  =            FIND$NEXT$BYTE$TO$WRITE = NO;
726   6  =          END;
         =
727   5  =          ELSE
         =          DO;
728   6  =            DATA$TO$BURN = YES;
729   6  =            FIND$NEXT$BYTE$TO$WRITE = NO;
         =
730   6  =            IF EEPROM$LOCKED = YES  THEN
731   7  =            DO WHILE 1;
732   7  =              EEPROM$LOCKED = YES;    /* THIS WILL GENERATE A RESET */
733   7  =            END;
734   6  =            ELSE
         =              EEPROM$DATA.VERSION(MISC$WORD) =
         =                                               CONFIG$ARRAY(MISC$WORD);
735   6  =          END;
736   5  =        END;
         =
737   4  =        ELSE
         =          FIND$NEXT$BYTE$TO$WRITE = NO;       /* TO GET OUT OF LOOP */
738   4  =      END;                                      /* END OF DO WHILE */
739   3  =    END,
         =
740   2  =    WATCHDOG$TIMER = YES,                 /* TOGGLE WATCHDOG TIMER */
741   2  =    WATCHDOG$TIMER = NO;                      /* TO MAINTAIN SANITY */
         =
742   2  =    IF DATA$TO$BURN = NO  THEN
743   3  =    DO;
744   3  =      AMOUNT = EEPROM$LENGTH;
745   3  =      EEPROM$DATA.CHECKSUM = GENERATE$CHECKSUM (.EEPROM$DATA);
```

```
              =                              /* CALCULATE CHECKSUM FOR EEPROM */
746     3     =      EEPROM$LOCKED = YES;
              =                       /* ADDED 3/16/89 TO MONITOR EEPROM WRITING */
747     3     =    END;
748     2     =    ELSE
              =    DO;
749     3     =      IF EEPROM$LOCKED = YES  THEN
750     4     =      DO WHILE 1;
751     4     =        EEPROM$LOCKED = YES;         /* THIS WILL GENERATE A RESET */
752     4     =      END;
753     3     =    END;
              =
754     1     =    END WRITE$TO$EEPROM;
                   $INCLUDE (DIAGNO.STH)
              =
              =    $TITLE ('DIAGNOSTIC TESTS')
              =
755     2     =    TURN$US$ON:  PROCEDURE;
              =
756     2     =    HEAT$STAGE$1 = ENERGIZE;
757     2     =    HEAT$STAGE$2 = ENERGIZE;
758     2     =    COOL$STAGE$1 = ENERGIZE;
759     2     =    COOL$STAGE$2 = ENERGIZE;
760     2     =    FAN = ENERGIZE;
761     2     =    REV$VALVE = ENERGIZE;
              =
762     2     =    BSR$DATA.NUMBER$CODE = 1;
763     2     =    BSR$DATA.FUNCTION$CODE = BSR$ON;
764     2     =    CALL START$BSR$MESSAGE;
              =
765     1     =    END TURN$US$ON;
              =
766     2     =    TURN$US$OFF:  PROCEDURE;
              =
767     2     =    HEAT$STAGE$1 = DEENERGIZE;
768     2     =    HEAT$STAGE$2 = DEENERGIZE;
769     2     =    COOL$STAGE$1 = DEENERGIZE;
770     2     =    COOL$STAGE$2 = DEENERGIZE;
771     2     =    FAN = DEENERGIZE;
772     2     =    REV$VALVE = DEENERGIZE;
              =
773     2     =    BSR$DATA.NUMBER$CODE = 1;
774     2     =    BSR$DATA.FUNCTION$CODE = BSR$OFF;
775     2     =    CALL START$BSR$MESSAGE;
              =
776     1     =    END TURN$US$OFF;
              =
              =    /*****************************************************************/
              =
777     2     =    DIAGNOSTICS$TEST:  PROCEDURE  PUBLIC;
              =
778     2     =    WATCHDOG$TIMER = YES;                 /* TOGGLE WATCHDOG TIMER */
779     2     =    WATCHDOG$TIMER = NO;                     /* TO MAINTAIN SANITY */
              =
780     2     =    DIAGNOSTIC$INDEX = 1;
781     3     =    DO WHILE DIAGNOSTIC$INDEX < 96;
782     3     =      HVAC$ARRAY(DIAGNOSTIC$INDEX) = 1;
783     3     =      DIAGNOSTIC$INDEX = DIAGNOSTIC$INDEX + 6;
784     3     =    END;
              =
785     2     =    HVAC$DATA$FLAG = YES;
786     2     =    DATA$TO$BURN = YES;
              =
787     3     =    DO WHILE DATA$TO$BURN;
              =
788     3     =      CALL WRITE$TO$EEPROM;
789     3     =    END;
              =
790     2     =    BRICK$OK = NO;
              =
792     2     =    DIAGNOSTIC$INDEX = 0;
              =
793     3     =    DO WHILE DIAGNOSTIC$INDEX < 4;
              =
794     3     =      WATCHDOG$TIMER = YES;               /* TOGGLE WATCHDOG TIMER */
795     3     =      WATCHDOG$TIMER = NO,                   /* TO MAINTAIN SANITY */
```

```
796   4  =      DO DIAGNOSTIC$TIMER = 1 TO 50;
797   4  =        CALL TIME (100);
798   4  =      END;
         =
799   3  =      DIAGNOSTIC$INDEX = DIAGNOSTIC$INDEX + 1;
800   3  =    END;
         =
801   2  =    CALL TURN$US$ON;
         =
802   2  =    DIAGNOSTIC$INDEX = 0;
         =
803   3  =    DO WHILE DIAGNOSTIC$INDEX < 4;
         =
804   3  =      WATCHDOG$TIMER = YES;              /* TOGGLE WATCHDOG TIMER */
805   3  =      WATCHDOG$TIMER = NO;                  /* TO MAINTAIN SANITY */
         =
806   4  =      DO DIAGNOSTIC$TIMER = 1 TO 50;
807   4  =        CALL TIME (100);
808   4  =      END;
         =
809   3  =      DIAGNOSTIC$INDEX = DIAGNOSTIC$INDEX + 1;
810   3  =    END;
         =
811   2  =    CALL TURN$US$OFF;
         =
812   2  =    DIAGNOSTIC$INDEX = 0;
         =
813   3  =    DO WHILE DIAGNOSTIC$INDEX < 4;
         =
814   3  =      WATCHDOG$TIMER = YES;              /* TOGGLE WATCHDOG TIMER */
815   3  =      WATCHDOG$TIMER = NO;                  /* TO MAINTAIN SANITY */
         =
816   4  =      DO DIAGNOSTIC$TIMER = 1 TO 50;
817   4  =        CALL TIME (100);
818   4  =      END;
         =
819   3  =      DIAGNOSTIC$INDEX = DIAGNOSTIC$INDEX + 1;
820   3  =    END;
         =
821   2  =    CALL TURN$US$ON;
         =
822   2  =    DIAGNOSTIC$INDEX = 0;
         =
823   3  =    DO WHILE DIAGNOSTIC$INDEX < 4;
         =
824   3  =      WATCHDOG$TIMER = YES;              /* TOGGLE WATCHDOG TIMER */
825   3  =      WATCHDOG$TIMER = NO;                  /* TO MAINTAIN SANITY */
         =
826   4  =      DO DIAGNOSTIC$TIMER = 1 TO 50;
827   4  =        CALL TIME (100);
828   4  =      END;
         =
829   3  =      DIAGNOSTIC$INDEX = DIAGNOSTIC$INDEX + 1;
830   3  =    END;
         =
831   2  =    CALL TURN$US$OFF;
         =
832   3  =    DO WHILE 1;
833   3  =      BRICK$OK = YES;
834   3  =    END;
         =
835   1  =    END DIAGNOSTICS$TEST;
836   1       END MISC$FILES;


MODULE INFORMATION:                (STATIC+OVERLAYABLE)
    CODE SIZE                      = 0621H       1569D
    CONSTANT SIZE                  = 0090H        144D
    DIRECT VARIABLE SIZE           =   00H+03H      0D+  3D
    INDIRECT VARIABLE SIZE         =   00H+00H      0D+  0D
    BIT SIZE                       =   08H+00H      8D+  0D
    BIT-ADDRESSABLE SIZE           =   00H+00H      0D+  0D
    AUXILIARY VARIABLE SIZE        = 01E9H        489D
    MAXIMUM STACK SIZE             = 0006H          6D
    REGISTER-BANK(S) USED:           0
    1649 LINES READ
    0 PROGRAM ERROR(S)
END OF PL/M-51 COMPILATION
```

```
DOS 3.30 (038-N) PL/M-51 V1.2
COMPILER INVOKED BY:  C:\INTEL\PLM51.EXE CONTRL.PTH PW(80)PL(60)DB NOINTVECTOR 0
>> T(3)ROM(LARGE)



   1    1       CONTR$OP:  DO;

                /****************************************************/
                /*                                                  */
                /*  CCCCC   OOOOO   N     N  TTTTTTT  RRRRR   L     */
                /* C       O     O  NN    N     T     R    R  L     */
                /* C       O     O  N N   N     T     R    R  L     */
                /* C       O     O  N  N  N     T     RRRRR   L     */
                /* C       O     O  N   N N     T     R   R   L     */
                /* C       O     O  N    NN     T     R    R  L     */
                /*  CCCCC   OOOOO   N     N     T     R    R  LLLLLL */
                /*                                                  */
                /****************************************************/

                /**********************************************************
                (c) Copyright, Johnson Controls Incorporated, 1988.  All rights
                    reserved. The following program is the exclusive property of
                    Johnson Controls, Inc. and its use is restricted by license
                    agreement to the system with which it was furnished.  The
                    program contents are confidential and may not be disclosed
                    or used outside the system without the express written
                    consent of Johnson Controls.  This program is further
                    protected by federal copyright law as an unpublished work
                    and any unauthorized reproduction is prohibited.
                **********************************************************/

                $NOLIST

                $TITLE ('CONTROL DECLARATIONS')
                $INCLUDE (CTLDCL.DTH)
            =
            =   /**************************************************************
            =        P U B L I C   S T R U C T U R E   D E C L A R A T I O N S
            =   **************************************************************/
            =
 455    1   =   DECLARE  TIER$DATA (40)  STRUCTURE (
            =       DATE                      (3) BYTE,
            =       TIER                      (6) BYTE)  PUBLIC  AUXILIARY;
            =
 456    1   =   DECLARE  BSR$DATA  STRUCTURE  (
            =       HOUSE$CODE                       BYTE,
            =       NUMBER$CODE                      BYTE,
            =       FUNCTION$CODE                    BYTE)  PUBLIC  AUXILIARY;
            =                   /*moved AJB 2/4/88 */
            =   /**************************************************************
            =    E X T E R N A L   S T R U C T U R E   D E C L A R A T I O N S
            =   **************************************************************/
            =
 457    1   =   DECLARE  BSR$MESSAGE      /*AJB*/ (56) BYTE  EXTERNAL  AUXILIARY;
            =
 458    1   =   DECLARE  STATUS$BYTES              (2) BYTE  EXTERNAL  AUXILIARY;
            =
 459    1   =   DECLARE  SCHEDULES               (399) BYTE  EXTERNAL  AUXILIARY;
            =
 460    1   =   DECLARE  HVAC  (4)  STRUCTURE (
            =       START$MORN                (2) BYTE,
            =       TEMP$1$MORN                   BYTE,
            =       TEMP$2$MORN                   BYTE,
            =       TEMP$3$MORN                   BYTE,
            =       TEMP$4$MORN                   BYTE,
            =       START$DAY                 (2) BYTE,
            =       TEMP$1$DAY                    BYTE,
            =       TEMP$2$DAY                    BYTE,
            =       TEMP$3$DAY                    BYTE,
            =       TEMP$4$DAY                    BYTE,
            =       START$EVE                 (2) BYTE,
            =       TEMP$1$EVE                    BYTE,
            =       TEMP$2$EVE                    BYTE,
            =       TEMP$3$EVE                    BYTE,
            =       TEMP$4$EVE                    BYTE,
            =       START$NITE                (2) BYTE,
```

```
            =       TEMP$1$NITE                   BYTE,
            =       TEMP$2$NITE                   BYTE,
            =       TEMP$3$NITE                   BYTE,
            =       TEMP$4$NITE                   BYTE)  AT (.SCHEDULES(0))
            =                                                       AUXILIARY;
            =
 461    1   =   DECLARE  HVAC$ARRAY              (96) BYTE  AT (.SCHEDULES(0))
            =                                                       AUXILIARY;
            =
            =   /*****************************************************************/
            =
 462    1   =   DECLARE  EWH$STATUS                    BYTE  EXTERNAL  AUXILIARY;
            =
 463    1   =   DECLARE  EWH  (2)  STRUCTURE (
            =       START$MORN                (2) BYTE,
            =       STOP$MORN                 (2) BYTE,
            =       START$DAY                 (2) BYTE,
            =       STOP$DAY                  (2) BYTE,
            =       START$EVE                 (2) BYTE,
            =       STOP$EVE                  (2) BYTE,
            =       START$NITE                (2) BYTE,
            =       STOP$NITE                 (2) BYTE)  AT (.SCHEDULES(96))
            =                                                       AUXILIARY;
            =
 464    1   =   DECLARE  EWH$ARRAY               (32) BYTE  AT (.SCHEDULES(96))
            =                                                       AUXILIARY;
            =
            =   /*****************************************************************/
            =
 465    1   =   DECLARE  BSRDEV$WEEKDAY  (8)  STRUCTURE (
            =       START$MORN                (2) BYTE,
            =       STOP$MORN                 (2) BYTE,
            =       START$DAY                 (2) BYTE,
            =       STOP$DAY                  (2) BYTE,
            =       START$EVE                 (2) BYTE,
            =       STOP$EVE                  (2) BYTE,
            =       START$NITE                (2) BYTE,
            =       STOP$NITE                 (2) BYTE)  AT (.SCHEDULES(128))
            =                                                       AUXILIARY;
            =
 466    1   =   DECLARE  BSRDEV$WEEKEND  (8)  STRUCTURE (
            =       START$MORN                (2) BYTE,
            =       STOP$MORN                 (2) BYTE,
            =       START$DAY                 (2) BYTE,
            =       STOP$DAY                  (2) BYTE,
            =       START$EVE                 (2) BYTE,
            =       STOP$EVE                  (2) BYTE,
            =       START$NITE                (2) BYTE,
            =       STOP$NITE                 (2) BYTE)  AT (.SCHEDULES(256))
            =                                                       AUXILIARY;
            =
 467    1   =   DECLARE  BSRDEV$ARRAY           (128) BYTE  AT (.SCHEDULES(128))
            =                                                       AUXILIARY;
            =
            =   /*****************************************************************/
            =
 468    1   =   DECLARE  CONFIG$DATA    STRUCTURE (
            =       HOUSE$CODE                    BYTE,
            =       F_C$DEGREE                    BYTE,
            =       CLOCK$FORMAT                  BYTE,
            =       FILTER$RUNTIME                BYTE,
            =       WEEKEND$DAY                   BYTE,
            =       HIGH$TEMP$SPAN                BYTE,
            =       LOW$TEMP$SPAN                 BYTE,
            =       EWH$PREHEAT                   BYTE,
            =       H_P$CYCLE$TIME                BYTE,
            =       ELECTRIC$HEAT                 BYTE,
            =       SECONDARY$HEAT$RECOVERY       BYTE,
            =       HIGH$EFFIC$FAN                BYTE,
            =       EMERG$H_P$ACTION              BYTE,
            =       VERSION$NUMBERS           (2) BYTE)  AT (.SCHEDULES(384))
            =                                                       AUXILIARY;
            =
 469    1   =   DECLARE  CONFIG$ARRAY            (15) BYTE  AT (.SCHEDULES(384))
            =                                                       AUXILIARY;
            =
            =   /*****************************************************************/
            =
```

```
470   1  =   DECLARE  SYSTEM$STATUS  STRUCTURE (
         =        CURRENT$TEMPERATURE             BYTE,
         =        SETPOINT$TEMPERATURE            BYTE,
         =        CURRENT$TIER                    BYTE,
         =        CURRENT$PERIOD                  BYTE,
         =        CURRFNT$MODE                    BYTE,
         =        FAN$MODE                        BYTE,
         =        EMERGENCY$HEAT                  BYTE,
         =        HVAC$ACTIVE                     BYTE,
         =        HVAC$OVERRIDE                   BYTE,
         =        EWH$ACTIVE                      BYTE,
         =        EWH$OVERRIDE                    BYTE,
         =        WD_WE                           BYTE,
         =        OPT$ACTIVE                      BYTE,
         =        RUNTIME$TOTAL$HTG           (2) BYTE)  EXTERNAL  AUXILIARY;
         =
471   1  =   DECLARE  DIRECT$LOAD$CONTROL  STRUCTURE (
         =        START$DATE                  (3) BYTE,
         =        STOP$DATE                   (3) BYTE,
         =        START$TIME                  (2) BYTE,
         =        STOP$TIME                   (2) BYTE,
         =        MINUTES$STOP                    BYTE,
         =        MINUTES$OFF                     BYTE)  EXTERNAL  AUXILIARY;
         =
472   1  =   DECLARE  METER$CONTROL  STRUCTURE(
         =        NOT$USED                        BYTE,
         =        METER$UPLOAD$DATE           (3) BYTE,
         =        METER$UPLOAD$TIME           (2) BYTE,
         =        DAILY$ROLLOVER$DATE         (3) BYTE,
         =        MONTHLY$ROLLOVER$DATE       (3) BYTE,
         =        UNUSED                      (3) BYTE)  EXTERNAL  AUXILIARY;
         =
473   1  =   DECLARE  TIER$USAGE  STRUCTURE (
         =        TODAYS$DATE                 (3) BYTE,
         =        TODAYS$TIER$1               (3) BYTE,
         =        TODAYS$TIER$2               (3) BYTE,
         =        TODAYS$TIER$3               (3) BYTE,
         =        TODAYS$TIER$4               (3) BYTE,
         =        YESTERDAYS$DATE             (3) BYTE,
         =        YESTERDAYS$TIER$1           (3) BYTE,
         =        YESTERDAYS$TIER$2           (3) BYTE,
         =        YESTERDAYS$TIER$3           (3) BYTE,
         =        YESTERDAYS$TIER$4           (3) BYTE,
         =        CURR$MONTHS$TIER$1          (3) BYTE,
         =        CURR$MONTHS$TIER$2          (3) BYTE,
         =        CURR$MONTHS$TIER$3          (3) BYTE,
         =        CURR$MONTHS$TIER$4          (3) BYTE,
         =        LAST$MONTHS$TIER$1          (3) BYTE,
         =        LAST$MONTHS$TIER$2          (3) BYTE,
         =        LAST$MONTHS$TIER$3          (3) BYTE,
         =        LAST$MONTHS$TIER$4          (3) BYTE,
         =        YESTERDAY$READING           (3) BYTE,
         =        TODAY$READING               (3) BYTE,
         =        LAST$MONTH$TOTAL$KWH        (3) BYTE)  EXTERNAL  AUXILIARY;
         =
474   1  =   DECLARE  PRICING$DATA  STRUCTURE (
         =        TSTAT$DISPLAY                   BYTE,
         =        XFMR$KWH$CONSTANT           (3) BYTE,
         =        XFMR$KW$CONSTANT            (3) BYTE,
         =        PRICE$TIER$1                (3) BYTE,
         =        PRICE$TIER$2                (3) BYTE,
         =        PRICE$TIER$3                (3) BYTE,
         =        PRICE$TIER$4                (3) BYTE,
         =        FUEL                        (3) BYTE,
         =        STD$RATE$STEP1$KWH          (3) BYTE,
         =        STD$RATE$STEP1$PRICE        (3) BYTE,
         =        STD$RATE$STEP2$KWH          (3) BYTE,
         =        STD$RATE$STEP2$PRICE        (3) BYTE,
         =        STD$RATE$STEP3$KWH          (3) BYTE,
         =        STD$RATE$STEP3$PRICE        (3) BYTE,
         =        STD$RATE$STEP4$KWH          (3) BYTE,
         =        STD$RATE$STEP4$PRICE        (3) BYTE,
         =        STD$RATE$STEP5$KWH          (3) BYTE,
         =        STD$RATE$STEP5$PRICE        (3) BYTE,
         =        STD$RATE$STEP6$KWH          (3) BYTE,
         =        STD$RATE$STEP6$PRICE        (3) BYTE,
         =        EWH$OPTION                      BYTE,
         =        NOT$USED                    (7) BYTE)  EXTERNAL  AUXILIARY;
         =
```

```
475   1  =   DECLARE  TIME$AND$DATE  STRUCTURE (
         =       YEAR                             BYTE,
         =       MONTH                            BYTE,
         =       DAY                              BYTE,
         =       HOUR                             BYTE,
         =       MINUTE                           BYTE,
         =       DAY$OF$WEEK                      BYTE)  EXTERNAL  AUXILIARY;
         =
476   1  =   DECLARE  TRANS$BRICK$MESSAGE         (20) BYTE  EXTERNAL  AUXILIARY;
         =
477   1  =   DECLARE  TRANS$BRICK$MSG  STRUCTURE (
         =
         =       BYTE$COUNT                       BYTE,
         =       MSG$TYPE                         BYTE,
         =       DESTINATION$ADDRESS              BYTE,
         =       PROCESS$NUMBERS                  BYTE, /* UPPER NYBBLE SOURCE
         =                                                LOWER NYBBLE DESTINATION */
         =       DATA$FIELD                   (15) BYTE,
         =       CHECKSUM                         BYTE)  AT (.TRANS$BRICK$MESSAGE)
         =                                                             AUXILIARY;
         =
478   1  =   DECLARE  OVERRIDES           (168) BYTE  EXTERNAL  AUXILIARY;
         =
479   1  =   DECLARE  HVAC$OVERRIDE (8) STRUCTURE  (
         =       START                         (5) BYTE,
         =       STOP                          (5) BYTE,
         =       TEMPERATURE                       BYTE)  AT  (.OVERRIDES (0))
         =                                                             AUXILIARY;
         =
480   1  =   DECLARE  EWH$OVERRIDE (8)  STRUCTURE  (
         =       START                         (5) BYTE,
         =       STOP                          (5) BYTE)  AT  (.OVERRIDES (88))
         =                                                             AUXILIARY;
         =
         =   /*****************************************************************
         =           P U B L I C   W O R D   D E C L A R A T I O N S
         =   *****************************************************************/
         =
481   1  =   DECLARE  MISC$WORD                           WORD  EXTERNAL;
         =
         =   /*****************************************************************
         =           P U B L I C   B Y T E   D E C L A R A T I O N S
         =   *****************************************************************/
         =
482   1  =   DECLARE  ACTIVE$TIER                         BYTE  PUBLIC  AUXILIARY;
483   1  =   DECLARE  BSR$POINTER            /*AJB*/      BYTE  PUBLIC  AUXILIARY;
484   1  =   DECLARE  CYCLE$TYPE                          BYTE  PUBLIC;
485   1  =   DECLARE  CYCLE$STATE                         BYTE  PUBLIC  AUXILIARY;
486   1  =   DECLARE  DELAY$CYCLE$COUNTER/*MOVEDAJB*/BYTE  PUBLIC  AUXILIARY;
487   1  =   DECLARE  DEV$ADDRESS                         BYTE  PUBLIC  AUXILIARY;
488   1  =   DECLARE  DEV$STATE                           BYTE  PUBLIC  AUXILIARY;
489   1  =   DECLARE  DLC$TIMER                           BYTE  PUBLIC  AUXILIARY;
490   1  =   DECLARE  FILTER$COUNT$HOURS                  BYTE  PUBLIC  AUXILIARY;
491   1  =   DECLARE  FILTER$COUNT$HRS$HUNDRED            BYTE  PUBLIC  AUXILIARY;
492   1  =   DECLARE  HOUSE$BITS$COUNTER /*MOVEDAJB*/  BYTE  PUBLIC  AUXILIARY;
493   1  =   DECLARE  HOUSE$CODE$BIT     /*MOVEDAJB*/  BYTE  PUBLIC  AUXILIARY;
494   1  =   DECLARE  NEEDED$HOUR                         BYTE  PUBLIC  AUXILIARY;
495   1  =   DECLARE  NEXT$CYCLE$TYPE    /*MOVEDAJB*/  BYTE  PUBLIC  AUXILIARY;
496   1  =   DECLARE  NEXT$TIER                           BYTE  PUBLIC  AUXILIARY;
497   1  =   DECLARE  NUMBER$BIT$COUNTER/*MOVEDAJB*/  BYTE  PUBLIC  AUXILIARY;
498   1  =   DECLARE  NUMBER$CODE$BIT    /*MOVEDAJB*/  BYTE  PUBLIC  AUXILIARY;
499   1  =   DECLARE  SAVE$BSR                   /*AJB*/  BYTE  PUBLIC  AUXILIARY;
500   1  =   DECLARE  PER$SAV                    /*AJB*/  BYTE  PUBLIC  AUXILIARY;
501   1  =   DECLARE  TIER$BUFFER$INDEX                   BYTE  PUBLIC  AUXILIARY;
502   1  =   DECLARE  TIER$DOWNLOAD$REQUEST$TIMER         BYTE  PUBLIC  AUXILIARY;
503   1  =   DECLARE  TIER$INDEX                          BYTE  PUBLIC  AUXILIARY;
504   1  =   DECLARE  TIER$INDEX$COUNTER                  BYTE  PUBLIC  AUXILIARY;
         =
         =   /*****************************************************************
         =         E X T E R N A L   B Y T E   D E C L A R A T I O N S
         =   *****************************************************************/
         =
505   1  =   DECLARE  AVERAGE$DEGREE$TIME                 BYTE  EXTERNAL  AUXILIARY;
506   1  =   DECLARE  BSR$MSG$POINTER            /*AJB*/  BYTE  EXTERNAL  AUXILIARY;
507   1  =   DECLARE  CONTROLLER$ADDRESS                  BYTE  EXTERNAL  AUXILIARY;
508   1  =   DECLARE  DATA$TIMER                          BYTE  EXTERNAL  AUXILIARY;
509   1  =   DECLARE  EWH$OVERRIDE$STOP$HOUR              BYTE  EXTERNAL  AUXILIARY;
510   1  =   DECLARE  EWH$OVERRIDE$STOP$MINUTES           BYTE  EXTERNAL  AUXILIARY;
```

```
511   1   =   DECLARE  HVAC$OVERRIDE$INDEX                BYTE  EXTERNAL  AUXILIARY,
512   1   =   DECLARE  PLC$ADDR                           BYTE  EXTERNAL  AUXILIARY,
513   1.  =   DECLARE  S$P$TIMER                          BYTE  EXTERNAL  AUXILIARY,
514   1   =   DECLARE  TSTAT$TEMPERATURE$TIMER            BYTE  EXTERNAL  AUXILIARY,
515   1   =   DECLARE  UNITS$NUMBER                       BYTE  EXTERNAL  AUXILIARY:
          =
          =   /*****************************************************************
          =                   B Y T E   D E C L A R A T I O N
          =   *****************************************************************/
          =
516   1   =   DECLARE  CL$COUNT$ON          /*AJB NEW*/   BYTE  AUXILIARY;
517   1   =   DECLARE  CL$COUNT$OFF         /*AJB NEW*/   BYTE  AUXILIARY;
518   1   =   DECLARE  HT$COUNT$ON          /*AJB NEW*/   BYTE  AUXILIARY;
519   1   =   DECLARE  HT$COUNT$OFF         /*AJB NEW*/   BYTE  AUXILIARY;
520   1   =   DECLARE  ADD$HALF$HOUR                      BYTE  AUXILIARY;
521   1   =   DECLARE  CALCULATED$START$TIME              BYTE  AUXILIARY;
522.  1   =   DECLARE  CRITICAL$TIER$ACT                  BYTE  AUXILIARY;
523   1   =   DECLARE  CRITICAL$TIER$COUNTER              BYTE  AUXILIARY;
524   1   =   DECLARE  CURRENT$DAY                        BYTE  AUXILIARY;
525   1   =   DECLARE  CURRENT$TEMP$OFFSET                BYTE  AUXILIARY;
526   1   =   DECLARE  DATA$REQUEST$TIME                  BYTE  AUXILIARY;
527   1   =   DECLARE  DELTA$TEMP                         BYTE  AUXILIARY;
528   1   =   DECLARE  EWH$DELAY$START                    BYTE  AUXILIARY;
529   1   =   DECLARE  FILTER$COUNT$MINUTES               BYTE  AUXILIARY;
530   1   =   DECLARE  HIGH$TIER$ACT                      BYTE  AUXILIARY;
531   1   =   DECLARE  HIGH$TIER$COUNTER                  BYTE  AUXILIARY;
532   1   =   DECLARE  HOUR$INDEX                         BYTE  AUXILIARY;
533   1   =   DECLARE  HVAC$OFFSET                        BYTE  AUXILIARY;
534   1   =   DECLARE  I                  /*AJB*/         BYTE  AUXILIARY;
535   1   =   DECLARE  J                  /*AJB*/         BYTE  AUXILIARY;
536   1   =   DECLARE  K                  /*AJB*/         BYTE  AUXILIARY;
537   1   =   DECLARE  LAST$PERIOD /*TCH 8/21/89*/        BYTE  AUXILIARY;
538   1   =   DECLARE  LOW$TIER$COUNTER                   BYTE  AUXILIARY;
539   1   =   DECLARE  MEDIUM$TIER$ACT                    BYTE  AUXILIARY;
540   1   =   DECLARE  MEDIUM$TIER$COUNTER                BYTE  AUXILIARY;
541   1   =   DECLARE  NEXT$ACTIVE$TIER                   BYTE  AUXILIARY;
542   1   =   DECLARE  NEXT$DESIRED$SETPOINT              BYTE  AUXILIARY;
543   1   =   DECLARE  NEXT$DESIRED$SETPOINT$TIER         BYTE  AUXILIARY;
544   1   =   DECLARE  NEXT$EWH$OFF$TIME$HOUR             BYTE  AUXILIARY;
545   1   =   DECLARE  NEXT$EWH$OFF$TIME$MINUTES          BYTE  AUXILIARY;
546   1   =   DECLARE  NEXT$EWH$ON$TIME$HOUR              BYTE  AUXILIARY;
547   1   =   DECLARE  NEXT$EWH$ON$TIME$MINUTES           BYTE  AUXILIARY;
548   1   =   DECLARE  NEXT$HVAC$ON$TIME$HOUR             BYTE  AUXILIARY;
549   1   =   DECLARE  NEXT$HVAC$ON$TIME$MINUTES          BYTE  AUXILIARY;
550   1   =   DECLARE  NUMBER$OF$TRIES                    BYTE  AUXILIARY;
551   1   =   DECLARE  OFFSET                             BYTE  AUXILIARY;
552   1   =   DECLARE  PERIOD                             BYTE  AUXILIARY;
553   1   =   DECLARE  PER$OFFSET         /*AJB*/         BYTE  AUXILIARY;
554   1   =   DECLARE  PRECONDITION$TIME                  BYTE  AUXILIARY;
555   1   =   DECLARE  PREVIOUS$DESIRED$SETPOINT          BYTE  AUXILIARY;
556   1   =   DECLARE  PREVIOUS$DESIRED$SETPOINT$TIER BYTE  AUXILIARY;
557   1   =   DECLARE  PSEUDO$ON$TIME                     BYTE  AUXILIARY;
558   1   =   DECLARE  REAL$TIME                          BYTE  AUXILIARY;
559   1   =   DECLARE  REQUESTED$HOUR                     BYTE  AUXILIARY;
560   1   =   DECLARE  REQUESTED$TIER                     BYTE  AUXILIARY;
561   1   =   DECLARE  SECOND$ACTIVE$TIER                 BYTE  AUXILIARY;
562   1   =   DECLARE  SYSTEM$OFFSET                      BYTE  AUXILIARY;
563   1   =   DECLARE  TEMP$OFFSET                        BYTE  AUXILIARY;
564   1   =   DECLARE  TEST$HOUR                          BYTE  AUXILIARY;
565   1   =   DECLARE  TIER                               BYTE  AUXILIARY;
566   1   =   DECLARE  TRUE$HVAC$ON$TIME$HOUR             BYTE  AUXILIARY;
567   1   =   DECLARE  TRUE$HVAC$ON$TIME$MINUTES          BYTE  AUXILIARY;
568   1   =   DECLARE  WATER$PREHEAT$TIME                 BYTE  AUXILIARY;
569   1   =   DECLARE  WEEKENDS                           BYTE  AUXILIARY;
570   1   =   DECLARE  WE$OFFSET          /*AJB*/         BYTE  AUXILIARY;
          =
571   1   =   DECLARE  DAILY$DATA$TYPE$NUMBERS      (3) BYTE  CONSTANT (
          =        12H,  /* METER CONTROL FOR ROLLOVER DATE */
          =        16H,  /* TODAY'S TIER USAGE */
          =        91H): /* PRICING INFORMATION */
          =
          =   /*****************************************************************
          =     P U B L I C   B I T   M A P P E D   D E C L A R A T I O N S
          =   *****************************************************************/
          =
572   1   =   DECLARE  BSR$INIT                           BIT  PUBLIC;   /*AJB*/
573   1   =   DECLARE  DAILY$DATA$REQUEST                 BIT  PUBLIC;
574   1   =   DECLARE  DLC$ACTIVE$FLAG                    BIT  PUBLIC;
```

```
575   1   =   DECLARE  DLC$TIMER$FLAG                 BIT  PUBLIC;
576   1   =   DECLARE  DLC$TOD$FLAG                   BIT  PUBLIC;
577   1   =   DECLARE  EWH$OPT$ACTIVE                 BIT  PUBLIC;
578   1   =   DECLARE  EWH$OPTIMIZATION$REQUIRED      BIT  PUBLIC;
579   1   =   DECLARE  EWH$RELAY$ON                   BIT  PUBLIC;
580   1   =   DECLARE  FIRST$TIME$SENT$FLAG           BIT  PUBLIC;  /*MOVED AJB*/
581   1   =   DECLARE  HVAC$OPT$ACTIVE                BIT  PUBLIC;
582   1   =   DECLARE  HVAC$OPTIMIZATION$REQUIRED     BIT  PUBLIC;
583   1   =   DECLARE  HVAC$OPTIMIZER$ACTIVE          BIT  PUBLIC;
584   1   =   DECLARE  NEW$SETPOINT                   BIT  PUBLIC;
585   1   =   DECLARE  PRESET$TIME                    BIT  PUBLIC;
586   1   =   DECLARE  SECOND$MESSAGE$FLAG            BIT  PUBLIC;  /*MOVED AJB*/
587   1   =   DECLARE  SEND$RELAY$MESSAGE             BIT  PUBLIC;
588   1   =   DECLARE  TIER$DOWNLOAD$REQUEST          BIT  PUBLIC;
              =
              =   /**************************************************************
              =     E X T E R N A L   B I T   M A P P E D   D E C L A R A T I O N S
              =   **************************************************************/
              =
589   1   =   DECLARE  BILLING$COMPLETED              BIT  EXTERNAL;
590   1   =   DECLARE  BSR$MIP$FLAG                   BIT  EXTERNAL;
591   1   =   DECLARE  CONTROL$MSG                    BIT  EXTERNAL;
592   1   =   DECLARE  DATA$MSG                       BIT  EXTERNAL;
593   1   =   DECLARE  DATA$REQUEST$MSG               BIT  EXTERNAL;
594   1   =   DECLARE  EWH$OVERRIDE$FLAG              BIT  EXTERNAL;
595   1   =   DECLARE  HVAC$OVERRIDE$ACTIVE           BIT  EXTERNAL;
596   1   =   DECLARE  HVAC$PERMANENT$OVERRIDE        BIT  EXTERNAL;
597   1   =   DECLARE  HVAC$TEMPORARY$OVERRIDE        BIT  EXTERNAL;
598   1   =   DECLARE  HVAC$SYSTEM$ACTIVE             BIT  EXTERNAL;
599   1   =   DECLARE  MAIN$DATA$TIMER$ACTIVE         BIT  EXTERNAL;
600   1   =   DECLARE  NEXT$CYCLE$NEEDED              BIT  EXTERNAL;
601   1   =   DECLARE  PRICE$DATA$RECEIVED            BIT  EXTERNAL;
602   1   =   DECLARE  ROLLOVER$DATA$RECEIVED         BIT  EXTERNAL;
603   1   =   DECLARE  S$P$TIMER$ACTIVE               BIT  EXTERNAL;
604   1   =   DECLARE  USAGE$DATA$RECEIVED            BIT  EXTERNAL;
605   1   =   DECLARE  WHAT$TIME$MSG                  BIT  EXTERNAL;
606   1   =   DECLARE  XMIT$CYCLE$ONE                 BIT  EXTERNAL;
              =
              =   /**************************************************************
              =             B I T   M A P P E D   D E C L A R A T I O N S
              =   **************************************************************/
              =
607   1   =   DECLARE  CURRENT$DAY$WEEKDAY            BIT;
608   1   =   DECLARE  CURRENT$HOUR$START             BIT;
609   1   =   DECLARE  END$TIME$REACHED               BIT;
610   1   =   DECLARE  EWH$ELEMENT$ON                 BIT;
611   1   =   DECLARE  EWH$PROGRAM$ACTIVE             BIT;
612   1   =   DECLARE  NEXT$DAY$TIER$FLAG             BIT;
613   1   =   DECLARE  START$EWH$OPT$NOW              BIT;
614   1   =   DECLARE  TIME$FOUND                     BIT;
615   1   =   DECLARE  X10$GO$FOR$IT                  BIT;     /*AJB*/
616   1   =   DECLARE  X10$START                      BIT;     /*AJB*/
617   1   =   DECLARE  X10$STOP                       BIT;     /*AJB*/
618   1   =   DECLARE  HEAT$STAGE$1                   BIT  AT (90H) REG;
619   1   =   DECLARE  HEAT$STAGE$2                   BIT  AT (91H) REG,
620   1   =   DECLARE  COOL$STAGE$1                   BIT  AT (92H) REG,
621   1   =   DECLARE  COOL$STAGE$2                   BIT  AT (93H) REG,
622   1   =   DECLARE  FAN                            BIT  AT (94H) REG;
623   1   =   DECLARE  REV$VALVE                      BIT  AT (95H) REG;
624   1   =   DECLARE  WATCHDOG$TIMER                 BIT  AT (97H) REG;
              =
              =   /**************************************************************
              =               L I T E R A L   D E C L A R A T I O N S
              =   **************************************************************/
              =
625   1   =   DECLARE  AEP$OPTION$1                   LITERALLY      '1';
626   1   =   DECLARE  AEP$OPTION$2                   LITERALLY      '2',
627   1   =   DECLARE  BSR$CODE$MASK                  LITERALLY      '1';
628   1   =   DECLARE  BSR$COOLER                     LITERALLY    '0CH';
629   1   =   DECLARE  BSR$HEATER                     LITERALLY    '0DH';
630   1   =   DECLARE  BSR$OFF              /*AJB*/   LITERALLY    '1CH';
631   1   =   DECLARE  BSR$ON               /*AJB*/   LITERALLY    '14H';
632   1   =   DECLARE  COOLING$MODE                   LITERALLY      '2';
633   1   =   DECLARE  CRITICAL$PENDING$MASK          LITERALLY    '20H';
634   1   =   DECLARE  CRITICAL$TIER                  LITERALLY      '3';
635   1   =   DECLARE  DATA$PROCESS                   LITERALLY      '3';
636   1   =   DECLARE  DAYTIME                        LITERALLY      '8';
637   1   =   DECLARE  DEENERGIZE                     LITERALLY      '1';
```

```
638   1  =   DECLARE  DELAY$CYCLE                  LITERALLY     '4';
639   1  =   DECLARE  DLC$OFF$MASK                 LITERALLY     '0BFH';
640   1  =   DECLARE  DLC$ON$MASK                  LITERALLY     '40H';
641   1  =   DECLARE  ENERGIZE                     LITERALLY     '0';
642   1  =   DECLARE  EVENING                      LITERALLY     '14';
643   1  =   DECLARE  FIRST$WEEKDAY$DAY            LITERALLY     '2';
644   1  =   DECLARE  FIRST$WEEKEND$DAY            LITERALLY     '0';
645   1  =   DECLARE  HIGH$TIER                    LITERALLY     '2';
646   1  =   DECLARE  HOUR$ONE$MASK                LITERALLY     '0C0H',
647   1  =   DECLARE  HOUR$TWO$MASK                LITERALLY     '30H';
648   1  =   DECLARE  HOUR$THREE$MASK              LITERALLY     '0CH';
649   1  =   DECLARE  HOUR$FOUR$MASK               LITERALLY     '3';
650   1  =   DECLARE  HOUSE$CODE$MASK              LITERALLY     '0FH';
651   1  =   DECLARE  JUST$A$WEEKDAY               LITERALLY     '3';
652   1  =   DECLARE  LAST$WEEKDAY$DAY             LITERALLY     '0FFH',
653   1  =   DECLARE  LAST$WEEKEND$DAY             LITERALLY     '1',
654   1  =   DECLARE  LOW$TIER                     LITERALLY     '0';
655   1  =   DECLARE  MEDIUM$TIER                  LITERALLY     '1';
656   1  =   DECLARE  MORNING                      LITERALLY     '2';
657   1  =   DECLARE  NIGHT                        LITERALLY     '20';
658   1  =   DECLARE  NO                           LITERALLY     '0';
659   1  =   DECLARE  OFF                          LITERALLY     '0';
660   1  =   DECLARE  ON                           LITERALLY     '0FFH',
661   1  =   DECLARE  ONE$CYCLE                    LITERALLY     '1';
662   1  =   DECLARE  ONE$DELAYS                   LITERALLY     '4';
663   1  =   DECLARE  SHED$CRITICAL$BSR            LITERALLY     '10H';
664   1  =   DECLARE  SHED$HIGH$BSR                LITERALLY     '0FH';
665   1  =   DECLARE  SHED$MEDIUM$BSR              LITERALLY     '0EH';
666   1  =   DECLARE  START$CYCLE                  LITERALLY     '2';
667   1  =   DECLARE  START$DELAYS                 LITERALLY     '10';
668   1  =   DECLARE  SYSTEM$PROCESS               LITERALLY     '1';
669   1  =   DECLARE  YES                          LITERALLY     '1',
670   1  =   DECLARE  ZERO$CYCLE                   LITERALLY     '0';
671   1  =   DECLARE  ZERO$DELAYS                  LITERALLY     '5',
         =
         =   /****************** CONFIGURATION STATUS **********************/
         =
672   1  =   DECLARE  HEAT$MODE                    LITERALLY     '1';
673   1  =   DECLARE  COOL$MODE                    LITERALLY     '2';
674   1  =   DECLARE  OFF$MODE                     LITERALLY     '3',
675   1  =   DECLARE  TSTAT$NO$COMM                LITERALLY     '4';
676   1  =   DECLARE  TSTAT$BAD$COMM               LITERALLY     '8';
677   1  =   DECLARE  EMERG$HEAT                   LITERALLY     '10H';
678   1  =   DECLARE  TEMP$OVER$99                 LITERALLY     '20H';
679   1  =   DECLARE  TEMP$UNDER$50                LITERALLY     '40H';
680   1  =   DECLARE  KBD$DISABLED                 LITERALLY     '80H';
         =
         =   /***************** BRICK MESSAGE TYPES *************************/
         =
681   1  =   DECLARE  WH_TIME                      LITERALLY     '01H';
682   1  =   DECLARE  TIME                         LITERALLY     '02H';
683   1  =   DECLARE  DIAG                         LITERALLY     '03H';
684   1  =   DECLARE  DIAG_ACK                     LITERALLY     '04H';
685   1  =   DECLARE  CONFIG                       LITERALLY     '05H';
686   1  =   DECLARE  CONFIG_ACK                   LITERALLY     '06H',
687   1  =   DECLARE  ERROR                        LITERALLY     '07H',
688   1  =   DECLARE  ERROR_ACK                    LITERALLY     '08H';
689   1  =   DECLARE  BUSY                         LITERALLY     '0AH';
         =   /**************************************************************/
690   1  =   DECLARE  CONTROL                      LITERALLY     '30H';
691   1  =   DECLARE  INQUIRE                      LITERALLY     '31H';
692   1  =   DECLARE  STATE                        LITERALLY     '32H'.
         =   /**************************************************************/
693   1  =   DECLARE  REFRESH                      LITERALLY     '80H';
694   1  =   DECLARE  DATA_RQ                      LITERALLY     '81H';
695   1  =   DECLARE  DATA                         LITERALLY     '82H';
696   1  =   DECLARE  DATA_ACK                     LITERALLY     '83H',
         =   /**************************************************************/
697   1  =   DECLARE  NAK                          LITERALLY     '0FCH',
698   1  =   DECLARE  ACK                          LITERALLY     '0FDH',
699   1  =   DECLARE  RQ_SUB                       LITERALLY     '0FEH',
700   1  =   DECLARE  STATUS                       LITERALLY     '0FFH';
         =
         =   /****************** PLC BUS ADDRESSES *************************/
         =
701   1  =   DECLARE  BROADCAST                    LITERALLY     '00H';
702   1  =   DECLARE  COMSET$2000                  LITERALLY     '01H';
703   1  =   DECLARE. METER                        LITERALLY     '02H';
         =
```

```
704  1  =  DECLARE  TSTAT$0                         LITERALLY       '08H';
705  1  =  DECLARE  TSTAT$1                         LITERALLY       '09H';
706  1  =  DECLARE  TSTAT$2                         LITERALLY       '0AH';
707  1  =  DECLARE  TSTAT$3                         LITERALLY       '0BH';
708  1  =  DECLARE  TSTAT$4                         LITERALLY       '0CH';
709  1  =  DECLARE  TSTAT$5                         LITERALLY       '0DH';
710  1  =  DECLARE  TSTAT$6                         LITERALLY       '0EH';
711  1  =  DECLARE  TSTAT$7                         LITERALLY       '0FH';
        =
712  1  =  DECLARE  WATER$HTR$1                     LITERALLY       '18H';
713  1  =  DECLARE  WATER$HTR$2                     LITERALLY       '19H';
714  1  =  DECLARE  WATER$HTR$3                     LITERALLY       '1AH';
715  1  =  DECLARE  WATER$HTR$4                     LITERALLY       '1BH';
        =
716  1  =  DECLARE  OFF_PEAK_HIGH_CNTRL_MED         LITERALLY       '3BH';
717  1  =  DECLARE  OFF_PEAK_CNTRL_HIGH             LITERALLY       '3CH';
718  1  =  DECLARE  OFF_PEAK_HIGH_MED               LITERALLY       '3DH';
719  1  =  DECLARE  OFF_PEAK_HIGH                   LITERALLY       '3EH';
720  1  =  DECLARE  OFF_PEAK                        LITERALLY       '3FH';
        =
        =  /***************************************************************
        =       E X T E R N A L   M O D U L E S   D E C L A R A T I O N
        =  ***************************************************************/
        =
721  2  =  ADJUST$UNITS:  PROCEDURE  EXTERNAL;
722  1  =  END ADJUST$UNITS;
        =
723  2  =  BCD$TO$BIN$CONVERT:  PROCEDURE  (NUMBER)  BYTE  EXTERNAL;
724  2  =  DECLARE  NUMBER                          BYTE;
725  1  =  END BCD$TO$BIN$CONVERT;
        =
726  2  =  BIN$TO$BCD$CONVERT:  PROCEDURE  (NUMBER)  BYTE  EXTERNAL;
727  2  =  DECLARE  NUMBER                          BYTE;
728  1  =  END BIN$TO$BCD$CONVERT;
        =
729  2  =  IS$IT$DLC$TIME:  PROCEDURE  EXTERNAL;
730  1  =  END IS$IT$DLC$TIME;
        =
731  2  =  EWH$OVERRIDE$DONE:  PROCEDURE  EXTERNAL;
732  1  =  END EWH$OVERRIDE$DONE;

           $TITLE ('LOAD CONTROL')
           $INCLUDE (LDCTRL.STH)
        =
        =  /***************************************************************/
        =
733  2  =  LOAD$CONTROL:  PROCEDURE;
        =
734  2  =  WATCHDOG$TIMER = YES;                 /* TOGGLE WATCHDOG TIMER */
735  2  =  WATCHDOG$TIMER = NO;                     /* TO MAINTAIN SANITY */
        =
736  2  =  IF  MISC$WORD = 0FFFFH  THEN
737  2  =      DLC$ACTIVE$FLAG = YES;     /* DIRECT LOAD CONTROL IS ACTIVE */
        =
738  2  =  IF DLC$TOD$FLAG = NO  THEN
739  3  =  DO;
740  3  =    MISC$WORD = CMPXX0 (.TIME$AND$DATE.HOUR,
        =                        .DIRECT$LOAD$CONTROL.START$TIME,
        =                         2);
        =
741  3  =    IF MISC$WORD = 0FFFFH  THEN
742  3  =      DLC$TOD$FLAG = YES;            /* TIME OF DAY TO START DLC */
743  3  =  END;
        =
744  2  =  IF DLC$TOD$FLAG = YES  THEN
745  3  =  DO;         /* DIRECT LOAD CONTROL IS ACTIVE - TEST TO TURN OFF */
746  3  =    IF (TIME$AND$DATE.MINUTE = DIRECT$LOAD$CONTROL.MINUTES$STOP) AND
        =                      (DIRECT$LOAD$CONTROL.MINUTES$OFF <> 0)  THEN
747  4  =    DO;                                                /* TURN OFF */
748  4  =      STATUS$BYTES(0) = STATUS$BYTES(0) OR DLC$ON$MASK;
749  4  =      DLC$TIMER$FLAG = YES;                          /* TURN OFF HVAC */
750  4  =      DLC$TIMER =
        =           BCD$TO$BIN$CONVERT(DIRECT$LOAD$CONTROL.MINUTES$OFF);
        =                   /* LOAD TIME TO HAVE HVAC AND EWH SHUT DOWN */
751  4  =      STATUS$BYTES(0) = STATUS$BYTES(0) AND 0FBH;
        =                                               /* TURN OFF ELEMENT */
752  4  =      IF CONFIG$DATA.EWH$PREHEAT <> 0  THEN
753  5  =      DO;
```

```
754   5  =          EWH$RELAY$ON = NO;
755   5  =          SEND$RELAY$MESSAGE = YES;          /* TURN OFF WATER HEATER */
756   5  =        END;
757   4  =      END;
         =
758   3  =      ELSE
         =      IF DLC$TIMEP$FLAG = YES  THEN
759   4  =      DO;
760   4  =        IF DLC$TIMER = 0  THEN
761   5  =        DO;                           /* DIRECT LOAD CONTROL IS INACTIVE */
762   5  =          STATUS$BYTES(0) = STATUS$BYTES(0) AND DLC$OFF$MASK;
763   5  =          DLC$TIMER$FLAG = NO,
764   5  =          HVAC$OPTIMIZATION$REQUIRED = YES;
         =
765   5  =          IF EWH$OVERRIDE$FLAG = YES  THEN
766   6  =          DO,               /* OVERRIDE ACTIVE - TURN ON WATER HEATER */
767   6  =            EWH$RELAY$ON = YES;
768   6  =            SEND$RELAY$MESSAGE = YES;
769   6  =            STATUS$BYTES(0) = STATUS$BYTES(0) OR 4;
770   6  =          END;
771   5  =          IF CONFIG$DATA.EWH$PREHEAT <> 0  THEN
772   6  =          DO,
773   6  =            IF (NEXT$EWH$ON$TIME$HOUR < TIME$AND$DATE.HOUR)
         =                                        OR
         =              ((NEXT$EWH$ON$TIME$HOUR = TIME$AND$DATE.HOUR) AND
         =            (NEXT$EWH$ON$TIME$MINUTES <= TIME$AND$DATE.MINUTE))  THEN
774   7  =            DO;
775   7  =              IF (NEXT$EWH$OFF$TIME$HOUR > TIME$AND$DATE.HOUR)
         =                                           OR
         =                ((NEXT$EWH$OFF$TIME$HOUR = TIME$AND$DATE.HOUR) AND
         =              (NEXT$EWH$OFF$TIME$MINUTES > TIME$AND$DATE.MINUTE))
         =                                         THEN
776   8  =              DO;
777   8  =                STATUS$BYTES(0) = STATUS$BYTES(0) OR 4;
778   8  =                EWH$RELAY$ON = YES;
779   8  =                SEND$RELAY$MESSAGE = YES;
780   8  =              END;
781   7  =            END;
782   6  =          END;
783   5  =        END;
784   4  =      END;
         =
785   3  =      MISC$WORD = CMPXX0 (.TIME$AND$DATE.HOUR,
         =                          .DIRECT$LOAD$CONTROL.STOP$TIME,
         =                          2);
         =
786   3  =      IF MISC$WORD = 0FFFFH  THEN
787   4  =      DO;                    /* DLC IS INACTIVE FOR THE REST OF THE DAY */
788   4  =        DLC$TOD$FLAG = NO;
789   4  =        IF  DLC$TIMER$FLAG = YES  THEN
790   5  =        DO;
         =             /* DLC IS INACTIVE - RETURN SYSTEM TO NORMAL OPERATION */
791   5  =          STATUS$BYTES(0) = STATUS$BYTES(0) AND DLC$OFF$MASK,
792   5  =          DLC$TIMER$FLAG = NO;
793   5  =          DLC$TIMER = 0;
794   5  =          EWH$OPTIMIZATION$REQUIRED = YES;
         =
795   5  =          IF SYSTEM$STATUS.CURRENT$MODE = COOLING$MODE  THEN
796   5  =            HVAC$OPTIMIZATION$REQUIRED = YES;
797   5  =        END;
798   4  =      END;
799   3  =    END;
         =
800   2  =    MISC$WORD = CMPXX0 (.TIME$AND$DATE.YEAR,
         =                        .DIRECT$LOAD$CONTROL.STOP$DATE,
         =                        3);
         =
801   2  =    IF MISC$WORD = 0FFFFH  THEN
802   2  =      DLC$ACTIVE$FLAG = NO,             /* DLC IS DONE FOR THE MONTH */
         =
803   1  =    END LOAD$CONTROL;

              $TITLE ('BSR DEVICE CONTROL')
              $INCLUDE (BSRMSG.STH)
         =
         =    /***************************************************************/
         =
804   2  =    BSR$CONVERT:  PROCEDURE(BSR$NUMBER) BYTE ;
```

```
805   2  =      DECLARE BSR$NUMBER BYTE;
         =    /* AJB REPLACE THIS ENTIRE MODULE!!!!!!!!! */
         =    /* THIS MODULE IS CORRECT -
         =                          NUMBERS ARE BACKWARDS BECAUSE WE USE A SHR!!*/
806   3  =    DO CASE BSR$NUMBER;
807   3  =      ; /* 0 CASE IS NULL */
808   3  =      BSR$NUMBER =  6;
809   3  =      BSR$NUMBER =  7;
810   3  =      BSR$NUMBER =  4;
811   3  =      BSR$NUMBER =  5;
812   3  =      BSR$NUMBER =  8;
813   3  =      BSR$NUMBER =  9;
814   3  =      BSR$NUMBER = 0AH;
815   3  =      BSR$NUMBER = 0BH;
816   3  =      BSR$NUMBER = 0EH;
817   3  =      BSR$NUMBER = 0FH;
818   3  =      BSR$NUMBER = 0CH;
819   3  =      BSR$NUMBER = 0DH;
820   3  =      BSR$NUMBER = 0;
821   3  =      BSR$NUMBER = 1;
822   3  =      BSR$NUMBER = 2;
823   3  =      BSR$NUMBER = 3;
824   3  =    END;    /* END OF DO CASE FOR BSR ADDRESS/DEVICE NUMBER CONVEPT */
         =
825   2  =      RETURN(BSR$NUMBER + 0);
         =
826   1  =    END BSR$CONVERT;
         =
         =    /*************************************************************/
         =
827   2  =    START$BSR$MESSAGE:  PROCEDURE  PUBLIC;
         =                 /* AJB REPLACE ALL */
828   2  =    WATCHDOG$TIMER = YES;                    /* TOGGLE WATCHDOG TIMER */
829   2  =    WATCHDOG$TIMER = NO;                        /* TO MAINTAIN SANITY */
         =
830   2  =    HOUSE$BIT$COUNTER = 4;
831   2  =    NUMBER$BIT$COUNTER = 5;
         =
         =    /*************************************************************/
         =
832   3  =    DO J = 0 TO 3 ;                              /*BUILD THE MESSAGE */
833   3  =      BSR$MESSAGE(J * 16) = START$CYCLE;
834   3  =      BSR$MESSAGE(J * 16 + 1) = ONE$CYCLE;           /*THE START BITS*/
         =
835   3  =      HOUSE$CODE$BIT = CONFIG$DATA.HOUSE$CODE;
836   3  =      HOUSE$CODE$BIT = BCD$TO$BIN$CONVERT(HOUSE$CODE$BIT);
         =                                                     /* AJB 2/26/88*/
837   3  =      HOUSE$CODE$BIT =  BSR$CONVERT(HOUSE$CODE$BIT);
         =                                         /*AJB CONVERT HOUSE CODE */
         =
838   4  =      DO  K = 1 TO HOUSE$BIT$COUNTER;            /*BUILD HOUSE CODES */
         =                          /* LOAD NEXT BIT OF HOUSE CODE TO SEND */
839   4  =        IF (HOUSE$CODE$BIT AND BSR$CODE$MASK) = 0 THEN
840   4  =          BSR$MESSAGE(J * 16 + K + 1) = ZERO$CYCLE;
841   4  =        ELSE
         =          BSR$MESSAGE(J * 16 + K + 1) = ONE$CYCLE;
         =
842   4  =        HOUSE$CODE$BIT = SHR (HOUSE$CODE$BIT, 1);
843   4  =      END;
         =
844   3  =      IF J >= 2 THEN
845   3  =        NUMBER$CODE$BIT = BSR$DATA.FUNCTION$CODE;
846   3  =      ELSE
         =      DO;
847   4  =        NUMBER$CODE$BIT = BSR$DATA.NUMBER$CODE;
         =                                        /*AJB CONVERT NUMBER CODE */
848   4  =        NUMBER$CODE$BIT = BSR$CONVERT(NUMBER$CODE$BIT);
849   4  =      END;
         =
850   4  =      DO  K = 1 TO NUMBER$BIT$COUNTER;
         =
851   4  =        IF(NUMBER$CODE$BIT AND BSR$CODE$MASK) = 0  THEN
852   4  =          BSR$MESSAGE(J * 16 + K + 1+ HOUSE$BIT$COUNTER) = ZERO$CYCLE;
853   4  =        ELSE
         =          BSR$MESSAGE(J * 16 + K + 1+ HOUSE$BIT$COUNTER) = ONE$CYCLE;
         =
854   4  =        NUMBER$CODE$BIT = SHR (NUMBER$CODE$BIT, 1);
         =
```

```
855   4  =     END,
         =
856   3  =     BSR$MESSAGE(J * 16 + 11) = DELAY$CYCLE;
857   3  =     BSR$MESSAGE(J * 16 + 12) = DELAY$CYCLE;
858   3  =     BSR$MESSAGE(J * 16 + 13) = DELAY$CYCLE;
859   3  =     BSR$MESSAGE(J * 16 + 14) = DELAY$CYCLE;
860   3  =     BSR$MESSAGE(J * 16 + 15) = DELAY$CYCLE;        /*NEW AJB*/
861   3  =   END;                                       /*BUILD MESSAGE DO */
         =
862   2  =   BSR$MSG$POINTER = 0;
863   2  =   CYCLE$TYPE = BSR$MESSAGE(BSR$MSG$POINTER);        /*GET 1ST ONE */
864   2  =   BSR$MIP$FLAG = YES;
         =
865   1  =   END START$BSR$MESSAGE;
         =
         =   /******************************************************************/
         =
866   2  =   CHECK$BSR$SCHED: PROCEDURE  PUBLIC;
         =
         =       /***AJB !!!!2/4/88 TEST FOR BSR DEVICE PROGRAM ACTIVATION ***/
         =
867   2  =       IF MAIN$DATA$TIMER$ACTIVE  THEN RETURN; /* AJB  MOVED OUT OF L
        -OOP*/
         =                                              /* 7/23/88 AJB      */
         =
869   2  =   IF SAVE$BSR < 8 THEN
870   3  =   DO;                                             /* REGULAR BSR */
         =
871   3  =     IF CURRENT$DAY > 1 THEN
872   3  =       WE$OFFSET = 0;                                   /* WEEKDAY */
873   3  =     ELSE
         =       WE$OFFSET = 128;
         =                   /* IT MUST BE WEEKEND SO USE 2ND HALF OF ARRAY!!*/
         =
874   4  =     DO I = SAVE$BSR TO 7;        /* GO THROUGH APPLIANCE LIST NOW */
         =
875   4  =       IF BSR$INIT = YES  THEN
876   5  =       DO;       /* 1ST TIME THROUGH, TURN ON ALL THAT SHOULD BE ON */
         =
877   5  =         X10$START =NO;                         /*INITIALIZE THESE */
         =   /*    X10$STOP  =YES;
         =                        DEFAULT OFF , DON'T NEED STOP VARIABLE HERE */
         =
878   6  =         DO PER$OFFSET = PER$SAV TO 3;
879   6  =           BSR$POINTER = (I * 16) + (PER$OFFSET * 4) + WE$OFFSET;
         =
880   6  =           IF ((BSRDEV$ARRAY(BSR$POINTER) < TIME$AND$DATE.HOUR)  OR
         =                (BSRDEV$ARRAY(BSR$POINTER) = TIME$AND$DATE.HOUR  AND
         =              BSRDEV$ARRAY(BSR$POINTER + 1) <= TIME$AND$DATE.MINUTE))
         =                                           AND
         =            ((BSRDEV$ARRAY(BSR$POINTER + 2) > TIME$AND$DATE.HOUR)  OR
         =            ( BSRDEV$ARRAY(BSR$POINTER + 2) = TIME$AND$DATE.HOUR  AND
         =             BSRDEV$ARRAY(BSR$POINTER + 3) > TIME$AND$DATE.MINUTE) OR
         =             BSRDEV$ARRAY(BSR$POINTER) >
         =                                   BSRDEV$ARRAY(BSR$POINTER + 2) OR
         =            (BSRDEV$ARRAY(BSR$POINTER) =
         =                                  BSRDEV$ARRAY(BSR$POINTER + 2) AND
         =             BSRDEV$ARRAY(BSR$POINTER + 1) >
         =                               BSRDEV$ARRAY(BSR$POINTER + 3)))  THEN
881   6  =             X10$START = YES;
882   6  =         END;                                /* PER$OFFSET 0 TO 3 */
         =
         =                                          /*START/STOP THE MODULE */
883   5  =         BSR$DATA.NUMBER$CODE = I + 1;
         =                             /* NUMBER & FUNCTION CODES??????? */
884   5  =         IF X10$START  THEN
885   5  =           BSR$DATA.FUNCTION$CODE = BSR$ON;
886   5  =         ELSE
         =           BSR$DATA.FUNCTION$CODE = BSR$OFF;
         =
887   5  =         CALL START$BSR$MESSAGE;
         =
888   5  =         SAVE$BSR = I + 1;
889   5  =         RETURN;              /* JUMP OUT AFTER A MESSAGE IS SENT */
         =
890   5  =       END;                                /* END BSRINIT = YES */
         =
891   4  =       ELSE
```

```
          =          DO;                                          /* NORMAL PROCESSING */
 892   6  =            DO PER$OFFSET = PER$SAV TO 3;
 893   6  =              X10$START =NO;                             /*INITIALIZE THESE */
 894   6  =              X10$STOP  =NO;
 895   6  =              BSR$POINTER = (I * 16) + (PER$OFFSET * 4) + WE$OFFSET;
          =
          =
 896   6  =              IF (BSRDEV$ARRAY(BSR$POINTER) = TIME$AND$DATE.HOUR) AND
          =                ((BSRDEV$ARRAY(BSR$POINTER + 1) <=
          =                                              TIME$AND$DATE.MINUTE) AND
          =                ((BSRDEV$ARRAY(BSR$POINTER + 1) + 1) >=
          =                                              TIME$AND$DATE.MINUTE))  THEN
 897   6  =                X10$START = YES;
          =
 898   6  =              IF (BSRDEV$ARRAY(BSR$POINTER + 2) =
          =                                                TIME$AND$DATE.HOUR)   AND
          =                ((BSRDEV$ARRAY(BSR$POINTER + 3) <=
          =                                                TIME$AND$DATE.MINUTE) AND
          =                ((BSRDEV$ARRAY(BSR$POINTER + 3) + 1) >=
          =                                              TIME$AND$DATE.MINUTE))  THEN
 899   6  =                X10$STOP =  YES;
          =
 900   6  =              SAVE$BSR = I;          /* AJB FOR NEXT PART TO WORK 3/14 */
          =
          =                                              /* DO STARTING OR STOPPING */
 901   6  =              IF X10$START XOR X10$STOP  THEN
 902   7  =              DO;                                  /*START/STOP THE MODULE */
 903   7  =                BSR$DATA.NUMBER$CODE = I + 1;
          =                                         /*NUMBER & FUNCTION CODES???????*/
 904   7  =                IF X10$START  THEN
 905   7  =                  BSR$DATA.FUNCTION$CODE = BSR$ON;
 906   7  =                ELSE
          =                  BSR$DATA.FUNCTION$CODE = BSR$OFF;
          =
 907   7  =                CALL START$BSR$MESSAGE;
          =
 908   7  =                PER$SAV = PER$OFFSET + 1;
 909   7  =                IF PER$SAV <= 4 THEN
 910   7  =                  RETURN;         /* JUMP OUT AFTER A MESSAGE IS SENT */
 911   7  =              END;                      /* DO START/STOP APPLIANCE LOOP */
 912   6  =            END;                                   /* PER$OFFSET 0 TO 3 */
 913   5  =            PER$SAV = 0;
 914   5  =          END;                                     /* NORMAL PROCESSING */
 915   4  =        END;                                                /* DO 0 TO 7 */
 916   3  =        SAVE$BSR = 8;                      /* FORCE IT TO NEXT SECTION.*/
 917   3  =      END;                                                /* REGULAR BSR */
          =
 918   2  =      ELSE
          =      DO;                        /* SPECIAL BSR FOR TIERS AND HEAT/COOL */
          =                                            /* INITIALIZE SOME STUFF-AJB*/
 919   3  =        X10$GO$FOR$IT = NO;
          =
 920   3  =        IF SAVE$BSR <= 9  THEN
 921   3  =          SAVE$BSR = 12;                              /*SKIP OVER 9,10,11 */
          =
 922   4  =        DO CASE SAVE$BSR - 12;
 923   5  =          DO;                                                /* 12 = COOL */
 924   5  =            IF  (SYSTEM$STATUS.HVAC$ACTIVE = 1) AND
          =                (SYSTEM$STATUS.CURRENT$MODE = 2) AND
          =                              (CL$COUNT$ON < 3)  THEN
 925   6  =            DO;
 926   6  =                CL$COUNT$ON = CL$COUNT$ON + 1;
 927   6  =                CL$COUNT$OFF = 0;
 928   6  =                BSR$DATA.FUNCTION$CODE = BSR$ON;
 929   6  =                X10$GO$FOR$IT = YES;
 930   6  =            END;
          =
 931   5  =            ELSE
          =            IF ((SYSTEM$STATUS.CURRENT$MODE = 2) AND
          =                (CL$COUNT$OFF < 3) AND (SYSTEM$STATUS.HVAC$ACTIVE = 0))
          =                                 OR
          =              ((CL$COUNT$OFF < 3) AND (SYSTEM$STATUS.CURRENT$MODE <> 2))
          =                                THEN
 932   6  =            DO;
 933   6  =              CL$COUNT$OFF =  CL$COUNT$OFF + 1;
 934   6  =              CL$COUNT$ON = 0;
 935   6  =              BSR$DATA.FUNCTION$CODE = BSR$OFF;
 936   6  =              X10$GO$FOR$IT = YES;
```

```
937   6  =        END;
         =
938   5  =        IF  (BSR$INIT = YES)  THEN
939   6  =        DO;
940   6  =          CL$COUNT$ON = 0;
941   6  =          CL$COUNT$OFF = 0;
942   6  =        END;
         =
943   5  =        BSR$DATA.NUMBER$CODE = BSR$COOLER;
944   5  =        SAVE$BSR = 13;
945   5  =      END;
         =
946   5  =      DO;                                            /* 13 = HEAT */
947   5  =        IF  (SYSTEM$STATUS.HVAC$ACTIVE = 1) AND
         =           (SYSTEM$STATUS.CURRENT$MODE = 1) AND
         =                          (HT$COUNT$ON < 3)  THEN
948   6  =        DO;
949   6  =          HT$COUNT$ON =  HT$COUNT$ON + 1;
950   6  =          HT$COUNT$OFF =  0;
951   6  =          BSR$DATA.FUNCTION$CODE = BSR$ON;
952   6  =          X10$GO$FOR$IT = YES;
953   6  =        END;
         =
954   5  =        ELSE
         =        IF ((SYSTEM$STATUS.CURRENT$MODE = 1) AND
         =            (HT$COUNT$OFF < 3) AND (SYSTEM$STATUS.HVAC$ACTIVE = 0))
         =                              OR
         =          ((HT$COUNT$OFF < 3) AND (SYSTEM$STATUS.CURRENT$MODE <> 1))
         =                             THEN
955   6  =        DO;
956   6  =          HT$COUNT$OFF = HT$COUNT$OFF + 1;
957   6  =          HT$COUNT$ON = 0;
958   6  =          BSR$DATA FUNCTION$CODE = BSR$OFF;
959   6  =          X10$GO$FOR$IT = YES,
960   6  =        END;
         =
961   5  =        IF (BSR$INIT = YES)  THEN
962   6  =        DO;
963   6  =          HT$COUNT$ON = 0;
964   6  =          HT$COUNT$OFF = 0;
965   6  =        END;
         =
966   5  =        BSR$DATA.NUMBER$CODE = BSR$HEATER;
         =
967   5  =        IF ((TIME$AND$DATE.MINUTE >= 0) AND
         =            (TIME$AND$DATE.MINUTE <= 2)) OR (BSR$INIT = YES)  THEN
968   5  =          SAVE$BSR = 14;
969   5  =        ELSE
         =          SAVE$BSR = 0;                               /* ALL DONE */
970   5  =      END;
         =
971   5  =      DO;                              /* 14 = SHED MEDIUM BSR */
972   5  =        IF SYSTEM$STATUS.CURRENT$TIER = LOW$TIER  THEN
973   5  =          BSR$DATA.FUNCTION$CODE = BSR$ON;
974   5  =        ELSE
         =          BSR$DATA.FUNCTION$CODE = BSR$OFF;
         =
975   5  =        BSR$DATA.NUMBER$CODE = SHED$MEDIUM$BSR;
976   5  =        X10$GO$FOR$IT = YES;
977   5  =        SAVE$BSR = 15;
978   5  =      END;
         =
979   5  =      DO;                                /* 15 = SHED HIGH BSR */
980   5  =        IF (SYSTEM$STATUS.CURRENT$TIER = LOW$TIER) OR
         =           (SYSTEM$STATUS.CURRENT$TIER = MEDIUM$TIER) THEN
981   5  =          BSR$DATA.FUNCTION$CODE = BSR$ON;
982   5  =        ELSE
         =          BSR$DATA.FUNCTION$CODE = BSR$OFF;
         =
983   5  =        BSR$DATA.NUMBER$CODE = SHED$HIGH$BSR;
984   5  =        X10$GO$FOR$IT = YES;
985   5  =        SAVE$BSR = 16;
986   5  =      END;
         =
987   5  =      DO,                              /* 16 = SHED CITICAL BSR */
988   5  =        IF SYSTEM$STATUS.CURRENT$TIER = CRITICAL$TIER  THEN
989   5  =          BSR$DATA.FUNCTION$CODE = BSR$OFF;
990   5  =        ELSE
```

```
              =          BSR$DATA.FUNCTION$CODE = BSR$ON;
              =
 991    5     =        BSR$DATA.NUMBER$CODE = SHED$CRITICAL$BSR;
 992    5     =        X10$GO$FOR$IT = YES;
 993    5     =        SAVE$BSR = 0;
 994    5     =        BSR$INIT = NO;                          /*RESET INIT FLAG */
 995    5     =      END;
 996    4     =    END;                              /* END OF SAVE$BSR CASE STMT */
              =
 997    3     =    IF X10$GO$FOR$IT = YES THEN
 998    3     =      CALL START$BSR$MESSAGE;
 999    3     =  END;                  /* SPECIAL BSR FOR TIERS AND HEAT/COOL */
              =      /***AJB !!!!2/4/88 TEST FOR BSR DEVICE PROGRAM ACTIVATION ***/
              =
              =
              =  /*   T E S T   C O D E
              =            SAVE$BSR = SAVE$BSR+1;
              =            IF SAVE$BSR > 16 THEN
              =              DO;
              =                SAVE$BSR = 0;
              =                IF BSR$DATA.FUNCTION$CODE = BSR$OFF  THEN
              =                  BSR$DATA.FUNCTION$CODE = BSR$ON;
              =                ELSE
              =                  BSR$DATA.FUNCTION$CODE = BSR$OFF;
              =              END;
              =            BSR$DATA.NUMBER$CODE = SAVE$BSR;
              =            CALL START$BSR$MESSAGE;
              =      E N D - T E S T   C O D E  */
              =
1000    1     =  END CHECK$BSR$SCHED;

                 $TITLE ('WATER HEATER OPTIMIZATION')
                 $INCLUDE (EWHOPT.STH)
              =
              =  /****************************************************************/
              =
1001    2     =  GET$TIER$DATA:  PROCEDURE  PUBLIC;
              =
1002    2     =  TIER$BUFFER$INDEX = TIER$INDEX;              /* TEMPORARY INDEX */
              =
1003    2     =  IF NEEDED$HOUR > 23  THEN                   /* ADJUST FOR NEW DAY */
1004    3     =  DO;
1005    3     =    TEST$HOUR = NEEDED$HOUR - 24;
              =
1006    3     =    TIER$INDEX = TIER$INDEX + 1;
              =
1007    3     =    IF TIER$INDEX = 40  THEN
1008    3     =      TIER$INDEX = 0;                         /* ADJUST FOR ROLLOVER */
1009    3     =  END;
              =
1010    2     =  ELSE
              =    TEST$HOUR = NEEDED$HOUR;
              =
1011    2     =  REQUESTED$TIER = TEST$HOUR MOD 4;
              =      /* DETERMINES WHICH TIER IN THE FOUR HOUR BYTE IS REQUESTED */
1012    2     =  HOUR$INDEX = TEST$HOUR / 4;
              =                /* DETERMINES WHICH FOUR HOUR BYTE IS TO BE USED */
              =
1013    3     =  DO CASE  REQUESTED$TIER;
              =
1014    3     =    TIER = SHR(TIER$DATA(TIER$INDEX).TIER(HOUR$INDEX),6);
              =
1015    4     =    DO;
1016    4     =      TIER = TIER$DATA(TIER$INDEX).TIER(HOUR$INDEX) AND
              =                                                     HOUR$TWO$MASK;
1017    4     =      TIER = SHR(TIER,4);
1018    4     =    END;
              =
1019    4     =    DO;
1020    4     =      TIER = TIER$DATA(TIER$INDEX).TIER(HOUR$INDEX) AND
              =                                                   HOUR$THREE$MASK;
1021    4     =      TIER = SHR(TIER,2);
1022    4     =    END;
              =
1023    3     =    TIER = TIER$DATA(TIER$INDEX).TIER(HOUR$INDEX) AND
              =                                                    HOUR$FOUR$MASK,
1024    3     =  END;                             /* END OF TIER TYPE DO CASE */
              =
```

```
1025  3  =  DO CASE TIER;
1026  3  =    ACTIVE$TIER = LOW$TIER;
1027  3  =    ACTIVE$TIER = MEDIUM$TIER;
1028  3  =    ACTIVE$TIER = HIGH$TIER;
1029  3  =    ACTIVE$TIER = CRITICAL$TIER;
1030  3  =  END;
         =
1031  2  =  TIER$INDEX = TIER$BUFFER$INDEX;              /* TEMPORARY INDEX */
         =
1032  1  =  END GET$TIER$DATA;
         =
         =  /***************************************************************/
         =
1033  2  =  UPDATE$TIER$BUFFER:  PROCEDURE  PUBLIC;
         =                        /*** DETERMINE THE CURRENT DAY'S TIER DATA ***/
         =
1034  2  =  IF TIER$INDEX > 39  THEN
1035  2  =    TIER$INDEX = 0;
         =
1036  2  =  TIER$INDEX$COUNTER = 0;
1037  2  =  MISC$WORD = 0;
         =
1038  3  =  DO WHILE (TIER$INDEX$COUNTER < 40) AND (MISC$WORD <> 0FFFFH);
         =
1039  3  =    MISC$WORD = CMPXX0 (.TIER$DATA(TIER$INDEX).DATE,
         =                         .TIME$AND$DATE.YEAR,
         =                          3);
         =
1040  3  =    TIER$INDEX$COUNTER = TIER$INDEX$COUNTER + 1;
1041  3  =    TIER$INDEX = TIER$INDEX + 1;
1042  3  =    IF TIER$INDEX > 39  THEN
1043  3  =      TIER$INDEX = 0;
1044  3  =  END;                      /* END OF DO WHILE TO FIND TIER DATA */
         =
1045  2  =  IF TIER$INDEX$COUNTER = 40  THEN
1046  3  =  DO;              /* NO VALID TIER DATA - REQUEST A DOWNLOAD */
1047  3  =    TIER$INDEX = 0;
1048  3  =    TIER$DOWNLOAD$REQUEST$TIMER = CONFIG$DATA.HOUSE$CODE + 5;
         =                         /*** SET TIMER SO THAT MESSAGE WILL BE BUILT
         =                               WHEN CURRENT DATA MESSAGE IS DONE ***/
1049  3  =  END;
         =
1050  2  =  ELSE
         =  DO;
1051  3  =    IF TIER$INDEX = 0  THEN
1052  3  =      TIER$INDEX = 39;
1053  3  =    ELSE
         =      TIER$INDEX = TIER$INDEX - 1;
1054  3  =  END;
         =
1055  1  =  END UPDATE$TIER$BUFFER;
         =
         =  /***************************************************************/
         =
1056  2  =  WHAT$DAY$IS$IT:  PROCEDURE  PUBLIC;
         =                              /* DETERMINE WHAT TYPE OF DAY IT IS */
1057  2  =  WEEKENDS = CONFIG$DATA.WEEKEND$DAY - 1;    /* FIRST WEEKEND DAY */
1058  2  =  IF WEEKENDS = 0  THEN
1059  2  =    WEEKENDS = 7;
         =
1060  2  =  IF TIME$AND$DATE.DAY$OF$WEEK = (WEEKENDS - 1)  THEN
1061  2  =    CURRENT$DAY = LAST$WEEKDAY$DAY;                  /* EQUALS 0FFH */
1062  2  =  ELSE
         =  IF TIME$AND$DATE.DAY$OF$WEEK = WEEKENDS  THEN
1063  2  =    CURRENT$DAY = FIRST$WEEKEND$DAY;                    /*EQUALS 0 */
1064  2  =  ELSE
         =  IF TIME$AND$DATE.DAY$OF$WEEK = CONFIG$DATA.WEEKEND$DAY  THEN
1065  2  =    CURRENT$DAY = LAST$WEEKEND$DAY;                     /* EQUALS 1 */
1066  2  =  ELSE
         =  IF TIME$AND$DATE.DAY$OF$WEEK = (CONFIG$DATA.WEEKEND$DAY + 1)  THEN
1067  2  =    CURRENT$DAY = FIRST$WEEKDAY$DAY;                    /* EQUALS 2 */
1068  2  =  ELSE
         =    CURRENT$DAY = JUST$A$WEEKDAY;                       /* EQUALS 3 */
         =
1069  2  =  SYSTEM$STATUS.WD_WE = CURRENT$DAY;
         =
1070  2  =  IF CURRENT$DAY < 2 THEN
1071  2  =    STATUS$BYTES(0) = STATUS$BYTES(0) OR 80H;  /* SET WEEKEND BIT */
```

```
1072   2  =   ELSE
          =     STATUS$BYTES(0) = STATUS$BYTES(0) AND 7FH;
          =                                                         /*CLEAR WEEKEND BIT */
          =
1073   2  =   IF SYSTEM$STATUS.CURRENT$MODE = HEAT$MODE  THEN
1074   2  =     HVAC$OFFSET = 0;
1075   2  =   ELSE
          =   IF SYSTEM$STATUS.CURRENT$MODE = COOL$MODE  THEN
1076   2  =     HVAC$OFFSET = 2;
1077   2  =   ELSE
          =   IF SYSTEM$STATUS.CURRENT$MODE = 0  THEN
1078   2  =     HVAC$OFFSET = 0FFH;     /* THIS MAY OCCUR DURING A COLD START */
          =
1079   2  =   IF (PRESET$TIME = NO) AND (HVAC$OFFSET <> 0FFH)  THEN
1080   3  =   DO;
1081   3  =     IF CURRENT$DAY < 2  THEN
1082   3  =       HVAC$OFFSET = HVAC$OFFSET + 1;          /* INDEX FOR WEEKEND */
          =
          =   /**************************************************************
          =   POSSIBLE ADDITION (PHASE II) TO ACTIVATE WEEKEND/WEEKDAY
          =     SCHEDULES DURING THE EVENING PERIOD OF THE LAST WEEKDAY/WEEKEND.
          =
          =     IF SYSTEM$STATUS = EVENING  THEN
          =     DO;
          =       IF (CURRENT$DAY + 1) = 0 THEN       \* TOMORROW IS A WEEKEND *\
          =         HVAC$OFFSET = HVAC$OFFSET - 1;    \* USE WEEKEND SCHEDULES *\
          =       ELSE
          =       IF (CURRENT$DAY + 1) = 2 THEN       \* TOMORROW IS A WEEKDAY *\
          =         HVAC$OFFSET = HVAC$OFFSET - 1;    \* USE WEEKDAY SCHEDULES *\
          =     END;
          =   **************************************************************/
          =
1083   3  =     IF TIME$AND$DATE.HOUR < HVAC(HVAC$OFFSET).START$MORN(0)  THEN
1084   4  =     DO;
          =     /* TIME IS AFTER MIDNIGHT - BEFORE "MORN" SCHEDULE ACTIVATION */
1085   4  =       IF HVAC(HVAC$OFFSET).START$NITE(0) <
          =                                 HVAC(HVAC$OFFSET).START$MORN(0)  THEN
1086   5  =       DO;
1087   5  =         IF TIME$AND$DATE.HOUR >=
          =                                  HVAC(HVAC$OFFSET).START$NITE(0) THEN
1088   6  =         DO;
1089   6  =           IF TIME$AND$DATE.HOUR =
          =                                 HVAC(HVAC$OFFSET).START$NITE(0)  THEN
1090   7  =           DO;
1091   7  =             IF TIME$AND$DATE.MINUTE >=
          =                                 HVAC(HVAC$OFFSET).START$NITE(1)  THEN
1092   7  =               SYSTEM$STATUS.CURRENT$PERIOD = NIGHT;
1093   7  =             ELSE
          =               SYSTEM$STATUS.CURRENT$PERIOD = EVENING;
1094   7  =           END;
1095   6  =           ELSE
          =             SYSTEM$STATUS.CURRENT$PERIOD = NIGHT;
1096   6  =         END;
1097   5  =         ELSE
          =           SYSTEM$STATUS.CURRENT$PERIOD = EVENING;
1098   5  =       END;
1099   4  =       ELSE
          =         SYSTEM$STATUS.CURRENT$PERIOD = NIGHT;
1100   4  =     END;
          =
1101   3  =     ELSE
          =     IF TIME$AND$DATE.HOUR < HVAC(HVAC$OFFSET).START$DAY(0)  THEN
1102   4  =     DO;
1103   4  =       IF TIME$AND$DATE.HOUR >= HVAC(HVAC$OFFSET).START$MORN(0)  THEN
1104   5  =       DO;
1105   5  =         IF TIME$AND$DATE.HOUR = HVAC(HVAC$OFFSET).START$MORN(0) THEN
1106   6  =         DO;
1107   6  =           IF TIME$AND$DATE.MINUTE >=
          =                                 HVAC(HVAC$OFFSET).START$MORN(1)  THEN
1108   6  =             SYSTEM$STATUS.CURRENT$PERIOD = MORNING;
1109   6  =           ELSE
          =             SYSTEM$STATUS.CURRENT$PERIOD = NIGHT;
1110   6  =         END;
1111   5  =         ELSE
          =           SYSTEM$STATUS.CURRENT$PERIOD = MORNING;
```

```
1112   5  =          END;
1113   4  =        END;
          =
1114   3  =        ELSE
          =        IF TIME$AND$DATE.HOUR < HVAC(HVAC$OFFSET).START$EVE(0)  THEN
1115   4  =        DO;
1116   4  =          IF TIME$AND$DATE.HOUR >= HVAC(HVAC$OFFSET).START$DAY(0)  THEN
1117   5  =          DO;
1118   5  =            IF TIME$AND$DATE.HOUR = HVAC(HVAC$OFFSET).START$DAY(0) THEN
1119   6  =            DO;
1120   6  =              IF TIME$AND$DATE.MINUTE >=
          =                                  HVAC(HVAC$OFFSET).START$DAY(1)  THEN
1121   6  =                SYSTEM$STATUS.CURRENT$PERIOD = DAYTIME;
1122   6  =              ELSE
          =                SYSTEM$STATUS.CURRENT$PERIOD = MORNING;
1123   6  =            END;
1124   5  =            ELSE
          =              SYSTEM$STATUS.CURRENT$PERIOD = DAYTIME;
1125   5  =          END;
1126   4  =        END;
          =
1127   3  =        ELSE
          =        IF (TIME$AND$DATE.HOUR < HVAC(HVAC$OFFSET).START$NITE(0)) OR
          =          ((TIME$AND$DATE.HOUR > HVAC(HVAC$OFFSET).START$NITE(0)) AND
          =           (HVAC(HVAC$OFFSET).START$NITE(0) <
          =                                HVAC(HVAC$OFFSET).START$MORN(0)))  THEN
1128   4  =        DO;
1129   4  =          IF TIME$AND$DATE.HOUR >= HVAC(HVAC$OFFSET).START$EVE(0)  THEN
1130   5  =          DO;
1131   5  =            IF TIME$AND$DATE.HOUR = HVAC(HVAC$OFFSET).START$EVE(0) THEN
1132   6  =            DO;
1133   6  =              IF TIME$AND$DATE.MINUTE >=
          =                                  HVAC(HVAC$OFFSET).START$EVE(1)  THEN
1134   6  =                SYSTEM$STATUS.CURRENT$PERIOD = EVENING;
1135   6  =              ELSE
          =                SYSTEM$STATUS.CURRENT$PERIOD = DAYTIME;
1136   6  =            END;
1137   5  =            ELSE
          =              SYSTEM$STATUS.CURRENT$PERIOD = EVENING;
1138   5  =          END;
1139   4  =        END;
          =
1140   3  =        ELSE
          =        DO;
1141   4  =          IF TIME$AND$DATE.HOUR >= HVAC(HVAC$OFFSET).START$NITE(0)  THEN
1142   5  =          DO;
1143   5  =            IF TIME$AND$DATE.HOUR = HVAC(HVAC$OFFSET).START$NITE(0) THEN
1144   6  =            DO;
1145   6  =              IF TIME$AND$DATE.MINUTE >=
          =                                 HVAC(HVAC$OFFSET).START$NITE(1)  THEN
1146   6  =                SYSTEM$STATUS.CURRENT$PERIOD = NIGHT;
1147   6  =              ELSE
          =                SYSTEM$STATUS.CURRENT$PERIOD = EVENING;
1148   6  =            END;
1149   5  =            ELSE
          =            DO;
1150   6  =              IF HVAC(HVAC$OFFSET).START$NITE(0) <
          =                                 HVAC(HVAC$OFFSET).START$MORN(0)  THEN
1151   6  =                SYSTEM$STATUS.CURRENT$PERIOD = EVENING;
          =                                 /* EVENING SCHEDULE AFTER MIDNIGHT */
1152   6  =              ELSE
          =                SYSTEM$STATUS.CURRENT$PERIOD = NIGHT;
1153   6  =            END;
1154   5  =          END;
1155   4  =        END;
1156   3  =      END;
          =
1157   2  =      IF HVAC$OFFSET <> 0FFH  THEN
1158   2  =        CURRENT$TEMP$OFFSET =
          =                      (HVAC$OFFSET * 24) + SYSTEM$STATUS.CURRENT$PERIOD;
          =
1159   2  =      CALL UPDATE$TIER$BUFFER;
          =
1160   2  =      NEEDED$HOUR = TIME$AND$DATE.HOUR;        /* GET THE CURRENT TIER */
1161   2  =      NEEDED$HOUR = BCD$TO$BIN$CONVERT (NEEDED$HOUR);
          =
```

```
1162   2  =   CALL GET$TIER$DATA;
          =
1163   2  =   SYSTEM$STATUS.CURRENT$TIER = ACTIVE$TIER;
          =
1164   2  =   IF (HVAC$TEMPORARY$OVERRIDE = NO)
          =              AND
          =      (HVAC$PERMANENT$OVERRIDE = NO)
          =              AND
          =          (PRESET$TIME = NO)  THEN
1165   3  =   DO;
1166   3  =     IF HVAC$OFFSET = 0FFH  THEN
1167   3  =       SYSTEM$STATUS.SETPOINT$TEMPERATURE =
          =                                SYSTEM$STATUS.CURRENT$TEMPERATURE;
1168   3  =     ELSE
          =       SYSTEM$STATUS.SETPOINT$TEMPERATURE =
          =        HVAC$ARRAY(CURRENT$TEMP$OFFSET + SYSTEM$STATUS.CURRENT$TIER);
          =             /*** THIS GETS THE CURRENT SETPOINT TEMPERATURE ***/
1169   3  =     NEW$SETPOINT = YES;
1170   3  =   END;
          =
1171   1  =   END WHAT$DAY$IS$IT;
          =
          =   /**************************************************************/
          =
1172   2  =   GET$CLOSEST$TIME:  PROCEDURE;
1173   2  =   NUMBER$OF$TRIES = 0;
1174   2  =   TIME$FOUND = NO;
1175   3  =   DO WHILE (NUMBER$OF$TRIES < 4) AND (TIME$FOUND = NO);
          =
1176   3  =     IF (REAL$TIME > SCHEDULES(PERIOD))
          =                   OR
          =       ((REAL$TIME = SCHEDULES(PERIOD)) AND
          =        (TIME$AND$DATE.MINUTE >= SCHEDULES(PERIOD + 1)))  THEN
1177   4  =     DO;
          =   /*** added 8/21/89 to compensate for NIGHT after midnight ***/
1178   4  =       IF NUMBER$OF$TRIES > 2  THEN
1179   5  =       DO;
1180   5  =         IF SCHEDULES(PERIOD) < SCHEDULES(PERIOD - OFFSET)  THEN
1181   5  =           TIME$FOUND = YES;
1182   5  =         ELSE
          =           NUMBER$OF$TRIES = NUMBER$OF$TRIES + 1;
1183   5  =       END;
          =
1184   4  =       ELSE
          =       DO;
1185   5  =         PERIOD = PERIOD + OFFSET;            /* LOOK AT NEXT TIME */
1186   5  =         NUMBER$OF$TRIES = NUMBER$OF$TRIES + 1;
1187   5  =       END;
1188   4  =     END;
          =
1189   3  =     ELSE
          =     DO;
1190   4  =       TIME$FOUND = YES;
          =   /*** added 8/21/89 to compensate for NIGHT after midnight ***/
1191   4  =       IF NUMBER$OF$TRIES = 0  THEN
1192   5  =       DO;                       /* TEST FOR "NIGHT" AFTER MIDNIGHT */
1193   5  =         LAST$PERIOD = OFFSET * 3;    /* POINT TO "NIGHT" SCHEDULE */
1194   5  =         IF SCHEDULES(PERIOD) > SCHEDULES(PERIOD + LAST$PERIOD)  THEN
1195   6  =         DO;                  /* "NIGHT" SCHEDULE IS AFTER MIDNIGHT */
1196   6  =           IF (REAL$TIME < SCHEDULES(PERIOD + LAST$PERIOD))
          =                                OR
          =             ((REAL$TIME = SCHEDULES(PERIOD + LAST$PERIOD)) AND
          =              (TIME$AND$DATE.MINUTE <
          =                           SCHEDULES(PERIOD + LAST$PERIOD + 1)))  THEN
1197   6  =             PERIOD = PERIOD + LAST$PERIOD;
1198   6  =         END;
1199   5  =       END;
1200   4  =     END;
          =   /**********************************************************/
1201   3  =   END;
1202   1  =   END GET$CLOSEST$TIME;
          =
          =   /**************************************************************/
          =
1203   2  =   ELECTRIC$WATER$HEATER$OPTIMIZATION:  PROCEDURE  PUBLIC;
          =
```

```
1204   2  =   WATCHDOG$TIMER = YES;                      /* TOGGLE WATCHDOG TIMER */
1205   2  =   WATCHDOG$TIMER = NO;                          /* TO MAINTAIN SANITY */
          =
          =
1206   2  =   IF (EWH$OVERRIDE$FLAG = NO) AND
          =      (CONFIG$DATA.EWH$PREHEAT <> 0)  THEN
1207   3  =   DO;
1208   3  =     WATER$PREHEAT$TIME = CONFIG$DATA.EWH$PREHEAT;
          =
1209   3  =     ADD$HALF$HOUR = WATER$PREHEAT$TIME MOD 2;
          =
          =       /*** CALCULATE THE NUMBER OF HOURS TO THE NEXT START TIME ***/
          =
1210   3  =     IF CURRENT$DAY > 1  THEN
1211   3  =       PERIOD = 96;                                /* INDEX FOR WEEKDAY */
1212   3  =     ELSE
          =       PERIOD = 112;                               /* INDEX FOR WEEKEND */
          =
1213   3  =     OFFSET = 4;                 /* OFFSET FOR WATER HEATER SCHEDULES */
1214   3  =     REAL$TIME = TIME$AND$DATE.HOUR;
          =
1215   3  =     CALL GET$CLOSEST$TIME;
          =
1216   3  =     IF TIME$FOUND = NO  THEN          /* START TIME MUST BE NEXT DAY */
1217   4  =     DO;
1218   4  =       IF (CURRENT$DAY + 1) > 1 THEN
1219   4  =         PERIOD = 96;                          /* NEXT DAY IS WEEKDAY */
1220   4  =       ELSE
          =         PERIOD = 112;                         /* NEXT DAY IS WEEKEND */
1221   4  =     END;
          =
1222   3  =     IF SCHEDULES(PERIOD + 2) = TIME$AND$DATE.HOUR  THEN
1223   4  =     DO;            /* THIS IS THE HOUR OF THE LATEST PROGRAM STOP */
1224   4  =       IF TIME$AND$DATE.MINUTE >= SCHEDULES(PERIOD + 3)  THEN
1225   5  =       DO;
1226   5  =         PERIOD = PERIOD + OFFSET;         /* POINT TO NEXT SCHEDULE */
1227   5  =         IF PERIOD = 112  THEN             /* ADJUST PERIOD IF NEEDED */
1228   5  =           PERIOD = 96;
1229   5  =         ELSE
          =         IF PERIOD = 128  THEN
1230   5  =           PERIOD = 112;
1231   5  =       END;
1232   4  =     END;
          =
1233   3  =     NEXT$EWH$ON$TIME$HOUR = SCHEDULES(PERIOD);
1234   3  =     NEXT$EWH$ON$TIME$MINUTES = SCHEDULES(PERIOD + 1);
1235   3  =     NEXT$EWH$OFF$TIME$HOUR =  SCHEDULES(PERIOD + 2);
1236   3  =     NEXT$EWH$OFF$TIME$MINUTES = SCHEDULES(PERIOD + 3);
          =
1237   3  =     IF END$TIME$REACHED = NO  THEN
1238   4  =     DO;
          =  /*** NOW FIND OUT IF WATER HEATER SHOULD BE ON (INITIALIZATION) */
1239   4  =       SEND$RELAY$MESSAGE = NO;
          =
1240   4  =       IF TIME$FOUND = NO  THEN
1241   5  =       DO;                                 /* CHECK FOR LAST OFF TIME */
1242   5  =         IF CURRENT$DAY > 1  THEN
1243   5  =           PERIOD = 108;                           /* INDEX FOR WEEKDAY */
1244   5  =         ELSE
          =           PERIOD = 124,                           /* INDEX FOR WEEKEND */
1245   5  =       END;
          =
1246   4  =       ELSE
          =       DO,
1247   5  =         IF TIME$AND$DATE.HOUR < NEXT$EWH$ON$TIME$HOUR  THEN
1248   5  =           PERIOD = PERIOD - 4;
1249   5  =       END;
          =
1250   4  =       IF        (SCHEDULES(PERIOD) < TIME$AND$DATE.HOUR)
          =                                   OR
          =               ((SCHEDULES(PERIOD) = TIME$AND$DATE.HOUR) AND
          =           (SCHEDULES(PERIOD + 1) <= TIME$AND$DATE.MINUTE))  THEN
1251   5  =       DO,
1252   5  =         IF (SCHEDULES(PERIOD + 2) > TIME$AND$DATE.HOUR)
          =                                   OR
          =           ((SCHEDULES(PERIOD + 2) = TIME$AND$DATE.HOUR) AND
```

```
              =              (SCHEDULES(PERIOD + 3) > TIME$AND$DATE.MINUTE))  THEN
1253     6    =            DO;
1254     6    =              EWH$PROGRAM$ACTIVE = YES;
1255     6    =              STATUS$BYTES(0) = STATUS$BYTES(0) OR 4;
              =                                  /*** TEST FOR TYPE OF OPTIMIZATION ***/
1256     6    =              IF (PRICING$DATA.EWH$OPTION = AEP$OPTION$2)
              =                                        AND
              =                ((SYSTEM$STATUS.CURRENT$TIER = HIGH$TIER) OR
              =                 (SYSTEM$STATUS.CURRENT$TIER = CRITICAL$TIER))  THEN
              =
1257     6    =                EWH$RELAY$ON = NO;
              =
1258     6    =              ELSE
              =              IF (PRICING$DATA.EWH$OPTION = AEP$OPTION$1)
              =                                        AND
              =                 (SYSTEM$STATUS.CURRENT$TIER = CRITICAL$TIER)  THEN
              =
1259     6    =                EWH$RELAY$ON = NO;
              =
1260     6    =              ELSE
              =                EWH$RELAY$ON = YES;
              =
1261     6    =              SEND$RELAY$MESSAGE = YES;
              =
1262     6    =              NEXT$EWH$ON$TIME$HOUR = SCHEDULES(PERIOD);
1263     6    =              NEXT$EWH$ON$TIME$MINUTES = SCHEDULES(PERIOD + 1);
1264     6    =              NEXT$EWH$OFF$TIME$HOUR =  SCHEDULES(PERIOD + 2);
1265     6    =              NEXT$EWH$OFF$TIME$MINUTES = SCHEDULES(PERIOD + 3);
1266     6    =            END;
1267     5    =            ELSE
              =              EWH$RELAY$ON = NO;
              =            /* ADDED 2/4/89 FOR NEW SCHEDULE WHILE IN AN OLD SCHEDULE */
1268     5    =          END;
1269     4    =          ELSE
              =            EWH$RELAY$ON = NO;
              =            /* ADDED 2/4/89 FOR NEW SCHEDULE WHILE IN AN OLD SCHEDULE */
1270     4    =        END;
              =
1271     3    =        IF SEND$RELAY$MESSAGE = NO  THEN
1272     4    =        DO;
1273     4    =          END$TIME$REACHED = NO;
1274     4    =          CALCULATED$START$TIME =
              =                                BCD$TO$BIN$CONVERT (NEXT$EWH$ON$TIME$HOUR);
              =
1275     4    =          IF NEXT$EWH$ON$TIME$MINUTES > 29H  THEN
1276     4    =            CALCULATED$START$TIME = CALCULATED$START$TIME + 1;
              =          /* GET TIER FOR NEXT ON TIME HOUR FOR POSSIBLE OPTIMIZATION */
              =
1277     4    =          REAL$TIME = BCD$TO$BIN$CONVERT (REAL$TIME);
              =
1278     4    =          CALCULATED$START$TIME = CALCULATED$START$TIME - REAL$TIME;
1279     4    =          IF CALCULATED$START$TIME > 23  THEN
1280     4    =            CALCULATED$START$TIME = CALCULATED$START$TIME + 24;
              =
1281     4    =          IF (CALCULATED$START$TIME = 0) OR
              =             (CALCULATED$START$TIME <= (WATER$PREHEAT$TIME / 2)) THEN
1282     5    =          DO;
1283     5    =            EWH$RELAY$ON = YES;      /* RELAY ON BUT TURN OFF ELEMENT */
1284     5    =            EWH$ELEMENT$ON = NO;
1285     5    =            EWH$OPT$ACTIVE = NO;
1286     5    =            SEND$RELAY$MESSAGE = YES;
1287     5    =            ADD$HALF$HOUR = 0;
1288     5    =          END;
              =
1289     4    =          ELSE
              =          DO;
              =             /* OBTAIN TIERS FOR THOSE HOURS - ARRANGE IN BYTE FORMAT */
              =
1290     5    =            EWH$OPT$ACTIVE = YES;
1291     5    =            LOW$TIER$COUNTER = 0;     /* CLEAR ALL TIER LEVEL COUNTERS */
1292     5    =            MEDIUM$TIER$COUNTER = 0;
1293     5    =            HIGH$TIER$COUNTER = 0;
1294     5    =            CRITICAL$TIER$COUNTER = 0;
              =
              =                                     /* GET TIERS UP TO NEXT START TIME */
```

```
1295  5  =        IF TIME$AND$DATE MINUTE > 30H  THEN
1296  6  =        DO;
1297  6  =          NEEDED$HOUR = REAL$TIME + 1;
1298  6  =          CALCULATED$START$TIME = CALCULATED$STARTTIME - 1;
         =                                            /* START WITH NEXT HOUR */
1299  6  =        END;
         =
1300  5  =        ELSE
         =        DO;
1301  6  =          START$EWH$OPT$NOW = YES;
1302  6  =          NEEDED$HOUR = REAL$TIME;
1303  6  =        END;
         =
1304  5  =        TIER$BUFFER$INDEX = TIER$INDEX;
         =
1305  6  =        DO WHILE CALCULATED$START$TIME <> 0;
         =
1306  6  =          CALL GET$TIER$DATA;
         =
1307  7  =          DO CASE ACTIVE$TIER;
1308  7  =            LOW$TIER$COUNTER = LOW$TIER$COUNTER + 1;
1309  7  =            MEDIUM$TIER$COUNTER = MEDIUM$TIER$COUNTER + 1;
1310  7  =            HIGH$TIER$COUNTER = HIGH$TIER$COUNTER + 1;
1311  7  =            CRITICAL$TIER$COUNTER = CRITICAL$TIER$COUNTER + 1;
1312  7  =          END;
         =              /* END OF DO CASE FOR ACCUMULATING FUTURE TIER DATA */
         =
1313  6  =          NEEDED$HOUR = NEEDED$HOUR + 1;
1314  6  =          CALCULATED$START$TIME = CALCULATED$START$TIME - 1;
1315  6  =        END;                                 /* END OF DO WHILE */
         =
1316  5  =        TIER$INDEX = TIER$BUFFER$INDEX;
         =
         =    /*** CALCULATE THE PROPER TIERS FOR WATER HEATER PREHEATING ***/
         =
1317  5  =        IF WATER$PREHEAT$TIME > (LOW$TIER$COUNTER * 2)  THEN
1318  6  =        DO;
1319  6  =          IF WATER$PREHEAT$TIME > (LOW$TIER$COUNTER * 2)
         =                                  + (MEDIUM$TIER$COUNTER * 2)  THEN
1320  7  =          DO;
1321  7  =            IF WATER$PREHEAT$TIME > (LOW$TIER$COUNTER * 2)
         =                                      + (MEDIUM$TIER$COUNTER * 2)
         =                                      + (HIGH$TIER$COUNTER * 2)  THEN
1322  8  =            DO;
1323  8  =              IF WATER$PREHEAT$TIME > (LOW$TIER$COUNTER * 2)
         =                                    + (MEDIUM$TIER$COUNTER * 2)
         =                                    + (HIGH$TIER$COUNTER * 2)
         =                                    + (CRITICAL$TIER$COUNTER * 2)  THEN
         =
1324  9  =              DO;  /* CALCULATE CLOSEST CRIT. TIERS TO START TIME */
1325  9  =                WATER$PREHEAT$TIME = WATER$PREHEAT$TIME
         =                                       - (LOW$TIER$COUNTER * 2)
         =                                       - (MEDIUM$TIER$COUNTER * 2)
         =                                       - (HIGH$TIER$COUNTER *2);
1326  9  =                CRITICAL$TIER$ACT = WATER$PREHEAT$TIME / 2;
         =                          /* HOW MANY CRITICAL TIERS TO BE ACTIVE */
1327  9  =                IF ADD$HALF$HOUR <> 0  THEN
1328 10  =                DO;
1329 10  =                  CRITICAL$TIER$ACT = CRITICAL$TIER$ACT + 1;
1330 10  =                  IF (ACTIVE$TIER = CRITICAL$TIER)
         =                                 AND
         =                     (NEXT$EWH$ON$TIME$MINUTES > 30H)
         =                                 AND
         =                     (CONFIG$DATA.EWH$PREHEAT = 1)  THEN
1331 10  =                    ADD$HALF$HOUR = 0;      /* HEAT FOR START HOUR */
1332 10  =                END;
         =                  /* UPDATE HIGH AND MEDIUM TIER ACTIVE COUNTERS */
1333  9  =                HIGH$TIER$ACT = HIGH$TIER$COUNTER;
1334  9  =                MEDIUM$TIER$ACT = MEDIUM$TIER$COUNTER;
         =
1335  9  =              END;
         =
1336  8  =              ELSE
         =              DO;
1337  9  =                EWH$RELAY$ON = YES;    /* HEATER ON - ELEMENT OFF */
1338  9  =                EWH$ELEMENT$ON = NO;
```

```
1339  9  =                 SEND$RELAY$MESSAGE = YES;
1340  9  =               END;
1341  8  =             END;
         =
1342  7  =             ELSE
         =             DO;      /* CALCULATE CLOSEST HIGH TIERS TO START TIME */
1343  8  =               CRITICAL$TIER$COUNTER = 0;
         =                                     /* CLEAR CRITICAL TIER COUNTER */
1344  8  =               WATER$PREHEAT$TIME = WATER$PREHEAT$TIME
         =                                       - (LOW$TIER$COUNTER * 2)
         =                                       - (MEDIUM$TIER$COUNTER * 2);
1345  8  =               HIGH$TIER$ACT = WATER$PREHEAT$TIME / 2;
         =                               /* HOW MANY HIGH TIERS TO BE ACTIVE */
1346  8  =               IF ADD$HALF$HOUR <> 0  THEN
1347  9  =               DO;
1348  9  =                 HIGH$TIER$ACT = HIGH$TIER$ACT + 1;
1349  9  =                 IF (ACTIVE$TIER = HIGH$TIER)
         =                                 AND
         =                    (NEXT$EWH$ON$TIME$MINUTES > 30H)
         =                                 AND
         =                    (CONFIG$DATA.EWH$PREHEAT = 1)  THEN
1350  9  =                   ADD$HALF$HOUR = 0;       /* HEAT FOR START HOUR */
1351  9  =               END;
         =                            /* UPDATE MEDIUM TIER ACTIVE COUNTER */
1352  8  =               MEDIUM$TIER$ACT = MEDIUM$TIER$COUNTER;
         =
1353  8  =             END;
1354  7  =           END;
         =
1355  6  =           ELSE
         =           DO;      /* CALCULATE CLOSEST MEDIUM TIERS TO START TIME */
1356  7  =             CRITICAL$TIER$COUNTER = 0;
         =                                     /* CLEAR CRITICAL TIER COUNTER */
1357  7  =             HIGH$TIER$COUNTER = 0;     /* CLEAR HIGH TIER COUNTER */
1358  7  =             WATER$PREHEAT$TIME = WATER$PREHEAT$TIME
         =                                         - (LOW$TIER$COUNTER * 2);
1359  7  =             MEDIUM$TIER$ACT = WATER$PREHEAT$TIME / 2;
         =                             /* HOW MANY MEDIUM TIERS TO BE ACTIVE */
1360  7  =             IF ADD$HALF$HOUR <> 0  THEN
1361  8  =             DO;
1362  8  =               MEDIUM$TIER$ACT = MEDIUM$TIER$ACT + 1;
1363  8  =               IF (ACTIVE$TIER = MEDIUM$TIER)
         =                               AND
         =                  (NEXT$EWH$ON$TIME$MINUTES > 30H)
         =                               AND
         =                  (CONFIG$DATA.EWH$PREHEAT = 1)  THEN
1364  8  =                 ADD$HALF$HOUR = 0;          /* HEAT FOR START HOUR */
1365  8  =             END;
1366  7  =           END;
1367  6  =         END;
         =
1368  5  =         ELSE
         =         DO;             /* NO OPTIMIZATION (ALWAYS ON FOR LOW TIER) */
1369  6  =           CRITICAL$TIER$COUNTER = 0;
         =                                     /* CLEAR CRITICAL TIER COUNTER */
1370  6  =           HIGH$TIER$COUNTER = 0;       /* CLEAR HIGH TIER COUNTER */
1371  6  =           MEDIUM$TIER$COUNTER = 0;   /* CLEAR MEDIUM TIER COUNTER */
1372  6  =           LOW$TIER$COUNTER = 0;          /* CLEAR LOW TIER COUNTER */
1373  6  =         END;
1374  5  =       END;
1375  4  =     END;
1376  3  =   END;
         =
1377  2  =   IF PRICING$DATA.EWH$OPTION = AEP$OPTION$2  THEN
1378  3  =   DO;
1379  3  =     IF (ADD$HALF$HOUR <> 0) AND
         =       ((CRITICAL$TIER$ACT <> 0) OR (HIGH$TIER$ACT <> 0))  THEN
1380  3  =       ADD$HALF$HOUR = 0;
         =
1381  3  =     CRITICAL$TIER$ACT = 0;            /* NO CRITICAL TIER PREHEAT */
1382  3  =     HIGH$TIER$ACT = 0;                    /* NO HIGH TIER PREHEAT */
1383  3  =   END;
         =
1384  2  =   ELSE
         =   IF PRICING$DATA.EWH$OPTION = AEP$OPTION$1  THEN
1385  3  =   DO;
```

```
1386   3  =     IF (ADD$HALF$HOUR <> 0) AND (CRITICAL$TIER$ACT <> 0)  THEN
1387   3  =       ADD$HALF$HOUR = 0,
          =
1388   3  =     CRITICAL$TIER$ACT = 0;              /* NO CRITICAL TIER PREHEAT */
1389   3  =   END;
          =
1390   2  =   SEND$RELAY$MESSAGE = YES;
          =      /* EVERY OPTIMIZATION WILL GENERATE A RELAY MESSAGE (2/4/89) */
1391   2  =   EWH$OPTIMIZATION$REQUIRED = NO;
          =
1392   1  =   END ELECTRIC$WATER$HEATER$OPTIMIZATION;

              $TITLE ('HVAC OPTIMIZATION')
              $INCLUDE (HVACOP.STH)
          =
          =   /**************************************************************/
          =
1393   2  =   CALCULATE$PRECONDITION$TIME:  PROCEDURE;
          =
1394   2  =   HVAC$OPTIMIZER$ACTIVE = YES;
1395   2  =   PRESET$TIME = YES;
          =         /*** CONVERT SETPOINTS FROM BCD FORMAT TO BINARY FORMAT ***/
1396   2  =   NEXT$DESIRED$SETPOINT =
          =                       BCD$TO$BIN$CONVERT (NEXT$DESIRED$SETPOINT);
1397   2  =   PREVIOUS$DESIRED$SETPOINT =
          =                   BCD$TO$BIN$CONVERT (PREVIOUS$DESIRED$SETPOINT);
          =
          =    /* CALCULATE THE TIME REQUIRED FOR THE NEXT TEMPERATURE CHANGE */
1398   2  =   IF SYSTEM$STATUS.CURRENT$MODE = HEAT$MODE  THEN
1399   2  =     DELTA$TEMP = NEXT$DESIRED$SETPOINT - PREVIOUS$DESIRED$SETPOINT;
1400   2  =   ELSE
          =     DELTA$TEMP = PREVIOUS$DESIRED$SETPOINT - NEXT$DESIRED$SETPOINT;
          =
1401   2  =   PRECONDITION$TIME = DELTA$TEMP * AVERAGE$DEGREE$TIME;
          =
          =   /***************************************************************
          =       THIS CODE REPRESENTS DUAL STAGE IMPLEMENTATION IF THE DELTA
          =       DEGREE TEMPERATURE IS GREATER THAN 2 ************************
          =
          =   IF DELTA$TEMP > 1  THEN
          =     PRECONDITION$TIME = PRECONDITION$TIME / 2;
          =
          =       THIS IS ONLY BASED ON THE ASSUMPTION THAT BOTH STAGES ARE OF
          =       EQUAL OUTPUT ***********************************************
          =   **************************************************************/
          =
          =   /*** THIS REPRESENTS THE TEMPERATURE DIFFERENCE MULTIPLIED BY THE
          =        TIME IT TAKES TO CHANGE ONE DEGREE ***/
          =
1402   2  =   NEXT$HVAC$ON$TIME$MINUTES =
          =                   BCD$TO$BIN$CONVERT (NEXT$HVAC$ON$TIME$MINUTES);
1403   2  =   IF NEXT$HVAC$ON$TIME$MINUTES < PRECONDITION$TIME  THEN
1404   3  =   DO;                     /* START SHOULD OCCUR IN THE PREVIOUS HOUR */
1405   3  =     IF CURRENT$HOUR$START = YES  THEN
1406   3  =       NEXT$HVAC$ON$TIME$MINUTES = 0;
1407   3  =     ELSE
          =     DO;
1408   4  =       IF PREVIOUS$DESIRED$SETPOINT$TIER >
          =                                     NEXT$DESIRED$SETPOINT$TIER  THEN
1409   4  =         NEXT$HVAC$ON$TIME$MINUTES = 0;/* START AT TOP OF THE HOUR */
          =
1410   4  =       ELSE
          =       DO;                              /* OPTIMIZE INTO PREVIOUS HOUR */
1411   5  =         NEXT$HVAC$ON$TIME$MINUTES =
          =                60 - (PRECONDITION$TIME - NEXT$HVAC$ON$TIME$MINUTES);
1412   5  =         NEXT$HVAC$ON$TIME$HOUR = NEXT$HVAC$ON$TIME$HOUR - 1;
1413   5  =         IF NEXT$HVAC$ON$TIME$HOUR = 1FH  THEN
1414   5  =           NEXT$HVAC$ON$TIME$HOUR = 19H;
1415   5  =         ELSE
          =         IF NEXT$HVAC$ON$TIME$HOUR = 0FH  THEN
1416   5  =           NEXT$HVAC$ON$TIME$HOUR = 09H;
1417   5  =         ELSE
          =         IF NEXT$HVAC$ON$TIME$HOUR = 0FFH  THEN
1418   5  =           NEXT$HVAC$ON$TIME$HOUR = 23H;
1419   5  =       END;
```

```
1420   4  =     END;
1421   3  =   END;
          =
1422   2  =   ELSE            /* CALCULATE PRECONDITION TIME WITHIN THE HOUR */
          =     NEXT$HVAC$ON$TIME$MINUTES =
          =                       NEXT$HVAC$ON$TIME$MINUTES - PRECONDITION$TIME;
          =
1423   2  =   NEXT$HVAC$ON$TIME$MINUTES =
          =                      BIN$TO$BCD$CONVERT (NEXT$HVAC$ON$TIME$MINUTES);
          =
1424   2  =   CURRENT$HOUR$START = NO;
          =
1425   1  =   END CALCULATE$PRECONDITION$TIME;
          =
          =   /**************************************************************/
          =
1426   2  =   HVAC$OPTIMIZATION:  PROCEDURE  PUBLIC;
          =
1427   2  =   WATCHDOG$TIMER = YES;                    /* TOGGLE WATCHDOG TIMER */
1428   2  =   WATCHDOG$TIMER = NO;                        /* TO MAINTAIN SANITY */
          =
1429   2  =   HVAC$OPTIMIZER$ACTIVE = NO;
          =
          =   /**** GET CURRENT TIME PERIOD AND CORRESPONDING TEMPERATURES ****/
          =
1430   2  =   PRESET$TIME = NO;
1431   2  =   CALL WHAT$DAY$IS$IT;        /* VERIFY THAT IT IS THE PROPER DAY */
          =
          =                        /*** GET THE TIERS FOR THE NEXT TWO HOURS ***/
          =
1432   2  =   NEEDED$HOUR = BCD$TO$BIN$CONVERT (TIME$AND$DATE.HOUR);
1433   2  =   NEEDED$HOUR = NEEDED$HOUR + 1;
          =
1434   2  =   CALL GET$TIER$DATA;
1435   2  =   NEXT$ACTIVE$TIER = ACTIVE$TIER;             /* TIER FOR NEXT HOUR */
          =
1436   2  =   NEEDED$HOUR = NEEDED$HOUR + 1;
          =
1437   2  =   CALL GET$TIER$DATA;
1438   2  =   SECOND$ACTIVE$TIER = ACTIVE$TIER;           /* TIER FOR NEXT HOUR */
          =
          =     /***** AT THIS TIME, THE THREE TIERS THAT ARE TO BE USED ARE
          =            LOCATED IN CURRENT$TIER, NEXT$ACTIVE$TIER, AND
          =            SECOND$ACTIVE$TIER.  NOW, FIND THE CORRESPONDING
          =            SCHEDULES TO FIND OUT WHETHER A START TIME WILL OCCUR
          =            WITHIN THE NEXT TWO TO THREE HOURS. *****/
          =
1439   2  =   IF SYSTEM$STATUS.CURRENT$MODE = HEAT$MODE  THEN
1440   2  =     SYSTEM$OFFSET = 0;
1441   2  =   ELSE
          =     SYSTEM$OFFSET = 48;  /* 48 BYTES SEPARATE HTG & CLG SCHEDULES */
          =
1442   2  =   IF CURRENT$DAY > 1  THEN
1443   2  =     PERIOD = SYSTEM$OFFSET;                    /* INDEX FOR WEEKDAY */
1444   2  =   ELSE
          =     PERIOD = SYSTEM$OFFSET + 24;               /* INDEX FOR WEEKEND */
          =
1445   2  =   OFFSET = 6;                       /* OFFSET FOR HVAC SCHEDULES */
1446   2  =   REAL$TIME = TIME$AND$DATE.HOUR;
          =
1447   2  =   CALL GET$CLOSEST$TIME;
          =
1448   2  =   IF TIME$FOUND = NO  THEN          /* START TIME MUST BE NEXT DAY */
1449   3  =   DO;
1450   3  =     IF CURRENT$DAY > 1  THEN
1451   3  =       PERIOD = 0;                              /* INDEX FOR WEEKDAY */
1452   3  =     ELSE
          =       PERIOD = 24;                             /* INDEX FOR WEEKEND */
1453   3  =   END;
          =
1454   2  =   NEXT$HVAC$ON$TIME$HOUR =  SCHEDULES(PERIOD);
1455   2  =   TRUE$HVAC$ON$TIME$HOUR =  SCHEDULES(PERIOD);
1456   2  =   NEXT$HVAC$ON$TIME$MINUTES = SCHEDULES(PERIOD + 1);
1457   2  =   TRUE$HVAC$ON$TIME$MINUTES = SCHEDULES(PERIOD + 1);
          =
1458   2  =   IF (HVAC$PERMANENT$OVERRIDE = NO)  THEN
```

```
1459   3  =   DO;
1460   3  =     NEXT$DESIRED$SETPOINT = 0;
          =                 /* WILL REMAIN 0 IF NO OPTIMIZATION IS TO BE DONE */
          =
          =     /*** OPTIMIZE, IF NECESSARY,
          =                           FOR ELECTRIC HEAT OR AIR CONDITIONING ***/
          =
1461   3  =     IF (CONFIG$DATA.ELECTRIC$HEAT <> 0) OR
          =        (SYSTEM$STATUS.CURRENT$MODE = COOL$MODE)  THEN
1462   4  =     DO;
1463   4  =       TEMP$OFFSET = PERIOD + 2;         /* POINTER TO FIND TEMPS */
          =
          =     /***** NOW, DETERMINE IF THE NEXT START TIME OCCURS WITHIN THE
          =              NEXT TWO TO THREE HOURS. *****/
          =
1464   4  =       PSEUDO$ON$TIME = BCD$TO$BIN$CONVERT (NEXT$HVAC$ON$TIME$HOUR);
1465   4  =       REAL$TIME = BCD$TO$BIN$CONVERT (TIME$AND$DATE.HOUR);
          =
1466   4  =       IF (PSEUDO$ON$TIME = 0) AND (REAL$TIME > 20)  THEN
1467   4  =         PSEUDO$ON$TIME = 24;            /* ADJUST, IF NECESSARY, */
1468   4  =       ELSE
          =       IF (PSEUDO$ON$TIME = 1) AND (REAL$TIME > 20)  THEN
1469   4  =         PSEUDO$ON$TIME = 25;            /* FOR MIDNIGHT ROLLOVER */
          =
1470   4  =       IF (PSEUDO$ON$TIME - REAL$TIME) = 2  THEN
1471   5  =       DO; /* NEXT START TIME IS WITHIN TWO HOURS - LET'S OPTIMIZE */
          =
1472   5  =         IF (NEXT$ACTIVE$TIER <= SECOND$ACTIVE$TIER)  THEN
1473   6  =         DO;    /* OPTIMIZE, IF NECESSARY, DURING NEXT ACTIVE TIER */
          =
1474   6  =           IF SYSTEM$STATUS.CURRENT$MODE = HEAT$MODE  THEN
1475   7  =           DO;          /* COMPARE CURRENT AND NEXT START SETPOINTS */
          =
1476   7  =             IF (HVAC$ARRAY(CURRENT$TEMP$OFFSET + NEXT$ACTIVE$TIER))
          =                                      <
          =                  (SCHEDULES(TEMP$OFFSET + SECOND$ACTIVE$TIER))  THEN
1477   8  =             DO;
1478   8  =               NEXT$DESIRED$SETPOINT$TIER = SECOND$ACTIVE$TIER;
1479   8  =               NEXT$DESIRED$SETPOINT =
          =                          SCHEDULES(TEMP$OFFSET + SECOND$ACTIVE$TIER);
          =
1480   8  =               PREVIOUS$DESIRED$SETPOINT$TIER = NEXT$ACTIVE$TIER;
1481   8  =               PREVIOUS$DESIRED$SETPOINT =
          =                  HVAC$ARRAY(CURRENT$TEMP$OFFSET + NEXT$ACTIVE$TIER);
          =
1482   8  =               CALL CALCULATE$PRECONDITION$TIME;
          =                                               /* GET ACTIVATE TIME */
1483   8  =             END;
1484   7  =           END;
1485   6  =           ELSE                        /* CURRENT MODE IS COOLING */
          =           DO;          /* COMPARE CURRENT AND NEXT START SETPOINTS */
          =
1486   7  =             IF (HVAC$ARRAY(CURRENT$TEMP$OFFSET + NEXT$ACTIVE$TIER))
          =                                      >
          =                  (SCHEDULES(TEMP$OFFSET + SECOND$ACTIVE$TIER))  THEN
1487   8  =             DO;
1488   8  =               NEXT$DESIRED$SETPOINT$TIER = SECOND$ACTIVE$TIER;
1489   8  =               NEXT$DESIRED$SETPOINT =
          =                          SCHEDULES(TEMP$OFFSET + SECOND$ACTIVE$TIER);
          =
1490   8  =               PREVIOUS$DESIRED$SETPOINT$TIER = NEXT$ACTIVE$TIER;
1491   8  =               PREVIOUS$DESIRED$SETPOINT =
          =                  HVAC$ARRAY(CURRENT$TEMP$OFFSET + NEXT$ACTIVE$TIER);
          =
1492   8  =               CALL CALCULATE$PRECONDITION$TIME;
          =                                               /* GET ACTIVATE TIME */
1493   8  =             END;
1494   7  =           END;
1495   6  =         END;
1496   5  =       END;
1497   4  =       ELSE
          =       IF (PSEUDO$ON$TIME - REAL$TIME) = 1  THEN
1498   5  =       DO; /* NEXT START TIME IS WITHIN TWO HOURS - LET'S OPTIMIZE */
          =
1499   5  =         IF (SYSTEM$STATUS.CURRENT$TIER <= NEXT$ACTIVE$TIER)  THEN
```

```
1500   6  =           DO;         /* OPTIMIZE, IF NECESSARY, DURING CURRENT TIER */
          =
1501   6  =             IF SYSTEM$STATUS.CURRENT$MODE = HEAT$MODE  THEN
1502   7  =             DO;           /* COMPARE CURRENT AND NEXT START SETPOINTS */
          =
1503   7  =               IF (HVAC$ARRAY(CURRENT$TEMP$OFFSET +
          =                                      SYSTEM$STATUS.CURRENT$TIER)) <
          =                  (SCHEDULES(TEMP$OFFSET + NEXT$ACTIVE$TIER))  THEN
1504   8  =               DO;
1505   8  =                 NEXT$DESIRED$SETPOINT$TIER = NEXT$ACTIVE$TIER;
1506   8  =                 NEXT$DESIRED$SETPOINT =
          =                            SCHEDULES(TEMP$OFFSET + NEXT$ACTIVE$TIER);
          =
1507   8  =                 PREVIOUS$DESIRED$SETPOINT$TIER =
          =                                         SYSTEM$STATUS.CURRENT$TIER;
1508   8  =                 PREVIOUS$DESIRED$SETPOINT =
          =                                  SYSTEM$STATUS.CURRENT$TEMPERATURE;
          =
1509   8  =                 CALL CALCULATE$PRECONDITION$TIME;
          =                                                 /* GET ACTIVATE TIME */
1510   8  =               END;
1511   7  =             END;
          =
1512   6  =             ELSE                              /* CURRENT MODE IS COOLING */
          =             DO;           /* COMPARE CURRENT AND NEXT START SETPOINTS */
          =
1513   7  =               IF (HVAC$ARRAY
          =                  (CURRENT$TEMP$OFFSET + SYSTEM$STATUS.CURRENT$TIER)) >
          =                  (SCHEDULES(TEMP$OFFSET + NEXT$ACTIVE$TIER))  THEN
1514   8  =               DO;
1515   8  =                 NEXT$DESIRED$SETPOINT$TIER = NEXT$ACTIVE$TIER;
1516   8  =                 NEXT$DESIRED$SETPOINT =
          =                            SCHEDULES(TEMP$OFFSET + NEXT$ACTIVE$TIER);
          =
1517   8  =                 PREVIOUS$DESIRED$SETPOINT$TIER =
          =                                         SYSTEM$STATUS.CURRENT$TIER;
1518   8  =                 PREVIOUS$DESIRED$SETPOINT =
          =                                  SYSTEM$STATUS.CURRENT$TEMPERATURE;
          =
1519   8  =                 CALL CALCULATE$PRECONDITION$TIME;
          =                                                 /* GET ACTIVATE TIME */
1520   8  =               END;
1521   7  =             END;
1522   6  =           END;
1523   5  =         END;
          =
1524   4  =         ELSE
          =         IF (PSEUDO$ON$TIME - REAL$TIME) = 0  THEN
1525   5  =         DO;                  /* NEXT START TIME IS WITHIN AN HOUR */
1526   5  =           IF SYSTEM$STATUS.CURRENT$MODE = HEAT$MODE  THEN
1527   6  =           DO;         /* COMPARE CURRENT AND NEXT START SET POINTS */
          =
1528   6  =             IF (HVAC$ARRAY
          =            (CURRENT$TEMP$OFFSET + SYSTEM$STATUS.CURRENT$TIER)) <
          =            (SCHEDULES(TEMP$OFFSET + SYSTEM$STATUS.CURRENT$TIER))  THEN
1529   7  =             DO;
          =             /* CURRENT TEMPERATURE LESS THAN NEXT START TEMPERATURE */
1530   7  =               CURRENT$HOUR$START = YES;
1531   7  =               NEXT$DESIRED$SETPOINT = SCHEDULES
          =                        (TEMP$OFFSET + SYSTEM$STATUS.CURRENT$TIER);
          =
1532   7  =               PREVIOUS$DESIRED$SETPOINT =
          =                                  SYSTEM$STATUS.CURRENT$TEMPERATURE;
          =
1533   7  =               CALL CALCULATE$PRECONDITION$TIME;/* GET ACTIVATE TIME */
1534   7  =             END;
1535   6  =           END;
          =
1536   5  =           ELSE                              /* CURRENT MODE IS COOLING */
          =           DO;         /* COMPARE CURRENT AND NEXT START SET POINTS */
          =
1537   6  =             IF (HVAC$ARRAY
          =            (CURRENT$TEMP$OFFSET + SYSTEM$STATUS.CURRENT$TIER)) >
          =            (SCHEDULES(TEMP$OFFSET + SYSTEM$STATUS.CURRENT$TIER))  THEN
1538   7  =             DO;
```

```
1539   7  =              CURRENT$HOUR$START = YES;
1540   7  =              NEXT$DESIRED$SETPOINT = SCHEDULES
          =                          (TEMP$OFFSET + SYSTEM$STATUS.CURRENT$TIER);
          =
1541   7  =              PREVIOUS$DESIRED$SETPOINT =
          =                                   SYSTEM$STATUS.CURRENT$TEMPERATURE;
          =
1542   7  =              CALL CALCULATE$PRECONDITION$TIME;/* GET ACTIVATE TIME */
1543   7  =            END;
1544   6  =          END;
1545   5  =        END;
1546   4  =      END;
1547   3  =      HVAC$OPT$ACTIVE = YES;
1548   3  =    END;
          =
1549   2  =    ELSE
          =      HVAC$OPT$ACTIVE = NO;
          =
1550   2  =    HVAC$OPTIMIZATION$REQUIRED = NO;
          =
1551   1  =    END HVAC$OPTIMIZATION;

           $TITLE ('MAIN CONTROL PROGRAM')
           $INCLUDE (PGMCTL.STH)
          =
          =    /****************************************************************/
          =
1552   2  =    CRITICAL$TIER$CHECK:  PROCEDURE  PUBLIC;
          =            /*** THIS IS A NEW HOUR - TEST NEXT TIER FOR CRITICAL ***/
          =
1553   2  =    NEEDED$HOUR = NEEDED$HOUR + 1;
          =
1554   2  =    CALL GET$TIER$DATA;
          =
1555   2  =    NEXT$TIER = ACTIVE$TIER;
          =
1556   2  =    IF  NEXT$TIER = CRITICAL$TIER  THEN
1557   2  =      STATUS$BYTES(0) = STATUS$BYTES(0) OR CRITICAL$PENDING$MASK;
          =        /* NOTIFY TSTAT THAT CRITICAL TIER WILL BE ACTIVE NEXT HOUR */
          =
1558   2  =    ELSE
          =      STATUS$BYTES(0) = STATUS$BYTES(0) AND
          =                                        (NOT CRITICAL$PENDING$MASK);
1559   1  =    END CRITICAL$TIER$CHECK;
          =
          =    /****************************************************************/
          =
1560   2  =    UPDATE$TIER$COUNTERS:  PROCEDURE (COUNTER1,COUNTER2);
          =
1561   2  =    DECLARE   COUNTER1                                BYTE;
1562   2  =    DECLARE   COUNTER2                                BYTE;
          =
1563   2  =    IF COUNTER1 = COUNTER2  THEN
1564   3  =    DO;
1565   3  =      IF COUNTER2 = 0  THEN
1566   3  =        EWH$RELAY$ON = NO;
1567   3  =      ELSE
          =      DO;
1568   4  =        IF ADD$HALF$HOUR <> 0  THEN
1569   5  =        DO;
1570   5  =          EWH$DELAY$START = 30H;
          =                    /* WAIT 1/2 HOUR BEFORE ACTIVATING WATER HEATER */
1571   5  =          ADD$HALF$HOUR = 0;
1572   5  =        END;
          =
1573   4  =        ELSE
          =          EWH$RELAY$ON = YES;
          =
1574   5  =        DO CASE  SYSTEM$STATUS.CURRENT$TIER;
1575   5  =          ;
1576   6  =          DO;
1577   6  =           MEDIUM$TIER$ACT = MEDIUM$TIER$ACT - 1;
1578   6  =           MEDIUM$TIER$COUNTER = MEDIUM$TIER$COUNTER - 1;
1579   6  =          END;
          =
```

```
1580   6   =           DO;
1581   6   =            HIGH$TIER$ACT = HIGH$TIER$ACT - 1;
1582   6   =            HIGH$TIER$COUNTER = HIGH$TIER$COUNTER - 1;
1583   6   =           END;
           =
1584   6   =           DO;
1585   6   =            CRITICAL$TIER$ACT = CRITICAL$TIER$ACT - 1;
1586   6   =            CRITICAL$TIER$COUNTER = CRITICAL$TIER$COUNTER - 1;
1587   6   =           END;
1588   5   =         END;
1589   4   =       END;
1590   3   =     END;
           =
1591   2   =     ELSE
           =     DO CASE  SYSTEM$STATUS.CURRENT$TIER;
1592   3   =       ;
1593   3   =       MEDIUM$TIER$COUNTER = MEDIUM$TIER$COUNTER - 1;
1594   3   =       HIGH$TIER$COUNTER = HIGH$TIER$COUNTER - 1;
1595   3   =       CRITICAL$TIER$COUNTER = CRITICAL$TIER$COUNTER - 1;
1596   3   =     END;
           =
1597   1   =     END UPDATE$TIER$COUNTERS;
           =
           =     /*****************************************************************/
           =
1598   2   =     MAIN$PROGRAM$CONTROL:  PROCEDURE  PUBLIC;
           =
1599   2   =     WATCHDOG$TIMER = YES;                    /* TOGGLE WATCHDOG TIMER */
1600   2   =     WATCHDOG$TIMER = NO;                       /* TO MAINTAIN SANITY */
           =
1601   2   =     IF TIME$AND$DATE.MINUTE = 0  THEN
1602   3   =     DO;                      /*** THIS IS A NEW HOUR - GET NEW TIER ***/
1603   3   =       IF (TIME$AND$DATE.HOUR = 0)  THEN
1604   4   =       DO;
           =       /*** THIS IS A NEW DAY - CALCULATE TIME FOR DATA_RQ MESSAGE ***/
           =
1605   4   =         DATA$REQUEST$TIME = (PLC$ADDR + CONFIG$DATA.HOUSE$CODE) + 13;
           =
           =         /* THIS IS DONE SO THAT THE PAN DOES NOT GET SWAMPED WITH
           =                MESSAGES FROM THE DIFFERENT HOUSES AT THE SAME TIME */
           =
1606   4   =         DATA$REQUEST$TIME = BIN$TO$BCD$CONVERT (DATA$REQUEST$TIME);
1607   4   =         TIER$INDEX = TIER$INDEX + 1;
           =
1608   4   =         CALL UPDATE$TIER$BUFFER;
1609   4   =       END;
           =
1610   3   =       CALL WHAT$DAY$IS$IT;
           =
1611   3   =       NEW$SETPOINT = YES;                          /* FLAG FOR TSTAT */
1612   3   =       HVAC$OPTIMIZATION$REQUIRED = YES;     /* REOPTIMIZE EVERY HOUR */
           =
           =            /*** THIS IS A NEW HOUR - TEST NEXT TIER FOR CRITICAL ***/
1613   3   =       CALL CRITICAL$TIER$CHECK;
           =
           =     /*** ADDED 7/31/89 ***/
1614   3   =       CALL IS$IT$DLC$TIME;
           =     /*** TO MONITOR PROPER TIME FOR DIRECT LOAD CONTROL ***/
           =
1615   3   =     END;
           =
1616   2   =     IF (TIME$AND$DATE.HOUR = 0) AND
           =        (TIME$AND$DATE.MINUTE = DATA$REQUEST$TIME)  THEN
1617   3   =     DO;        /* LOAD REQUESTED DATA TYPES AND NUMBER OF DATA TYPES */
           =
1618   3   =       IF MAIN$DATA$TIMER$ACTIVE = NO  THEN
1619   3   =         DAILY$DATA$REQUEST = YES;
1620   3   =       ELSE
           =       DO;
1621   4   =         DATA$REQUEST$TIME = DATA$REQUEST$TIME + 1;
           =                                                  /* TRY NEXT MINUTE */
1622   4   =         UNITS$NUMBER = DATA$REQUEST$TIME;
1623   4   =         CALL ADJUST$UNITS;
1624   4   =         DATA$REQUEST$TIME = UNITS$NUMBER;
1625   4   =       END;
```

```
1626   3  =   END;
          =
1627   2  =   IF (PRICING$DATA.TSTAT$DISPLAY AND 8) <> 0  THEN
1628   2  =     STATUS$BYTES(0) = STATUS$BYTES(0) AND 0FDH;
1629   2  =   ELSE                        /* BIT CLEARED FOR 4 TIER OPERATION */
          =     STATUS$BYTES(0) = STATUS$BYTES(0) OR 2;
          =                                 /* BIT SET FOR 3 TIER OPERATION */
          =
          =                         /*** TEST FOR LOAD CONTROL ACTIVATION ***/
          =
1630   2  =   MISC$WORD = CMPXX0 (.TIME$AND$DATE.YEAR,
          =                       .DIRECT$LOAD$CONTROL.START$DATE,
          =                        3);
          =
1631   2  =   IF (MISC$WORD = 0FFFFH) OR (DLC$ACTIVE$FLAG = YES)  THEN
1632   2  =     CALL LOAD$CONTROL;
          =
1633   2  =   IF (TIME$AND$DATE.HOUR = 3) AND (TIME$AND$DATE.MINUTE = 30H)  THEN
1634   3  =   DO; /* ACTIVATES 5 MINUTE TIMER FOR DAILY TIME UPDATE */
1635   3  =     WHAT$TIME$MSG = YES;
1636   3  =     S$P$TIMER = 5;
1637   3  =     S$P$TIMER$ACTIVE = YES;
1638   3  =   END;
          =
1639   2  =   IF CONFIG$DATA.EWH$PREHEAT <> 0  THEN
1640   3  =   DO;
1641   3  =     IF DLC$TIMER$FLAG = NO  THEN
1642   4  =     DO;          /* DIRECT LOAD CONTROL NOT ACTIVE AT THIS TIME */
1643   4  =       IF EWH$OVERRIDE$FLAG = NO  THEN
1644   5  =       DO;
          =        /*** TEST FOR WATER HEATER OPTIMIZATION TIME/CALCULATION ***/
1645   5  =         IF (NEXT$EWH$OFF$TIME$HOUR = TIME$AND$DATE.HOUR) AND
          =            (NEXT$EWH$OFF$TIME$MINUTES = TIME$AND$DATE.MINUTE)  THEN
1646   6  =         DO;
1647   6  =           END$TIME$REACHED = YES;
1648   6  =           EWH$RELAY$ON = NO;  /* WILL TURN ON IF TIME TO OPTIMIZE */
1649   6  =           CALL ELECTRIC$WATER$HEATER$$OPTIMIZATION;
          =                                         /* OPTIMIZATION REQUIRED */
1650   6  =           STATUS$BYTES(0) = STATUS$BYTES(0) AND 0FBH;
          =                                             /* TURN OFF ELEMENT */
1651   6  =           EWH$PROGRAM$ACTIVE = NO;
1652   6  =           SEND$RELAY$MESSAGE = YES;
1653   6  =         END;
          =
1654   5  =         IF (EWH$OPT$ACTIVE = YES) AND
          =            ((TIME$AND$DATE.MINUTE = 0) OR
          =                                  (START$EWH$OPT$NOW = YES)) THEN
1655   6  =         DO;
1656   6  =           START$EWH$OPT$NOW = NO;
1657   6  =           EWH$RELAY$ON = NO;  /* WILL TURN ON IF TIME TO OPTIMIZE */
          =
1658   7  =           DO CASE  SYSTEM$STATUS.CURRENT$TIER;
1659   8  =             DO;
1660   8  =               EWH$RELAY$ON = YES;      /* HEATER ON - ELEMENT OFF */
1661   8  =               EWH$ELEMENT$ON = NO;
1662   8  =             END;
          =
1663   7  =             CALL UPDATE$TIER$COUNTERS
          =                        (MEDIUM$TIER$COUNTER, MEDIUM$TIER$ACT);
          =
1664   7  =             CALL UPDATE$TIER$COUNTERS
          =                            (HIGH$TIER$COUNTER, HIGH$TIER$ACT);
          =
1665   7  =             CALL UPDATE$TIER$COUNTERS
          =                    (CRITICAL$TIER$COUNTER, CRITICAL$TIER$ACT);
          =
1666   7  =           END;               /* END OF DO CASE FOR CURRENT TIER */
          =
1667   6  =           SEND$RELAY$MESSAGE = YES;
1668   6  =         END;
          =
1669   5  =         IF (EWH$DELAY$START = 30H) AND
          =            (TIME$AND$DATE.MINUTE = 30H)  THEN
1670   6  =         DO;
1671   6  =           EWH$DELAY$START = 0;
1672   6  =           EWH$RELAY$ON = YES;
```

```
1673   6  =          SEND$RELAY$MESSAGE = YES;
1674   6  =        END;
          =
1675   5  =        IF (NEXT$EWH$ON$TIME$HOUR = TIME$AND$DATE.HOUR) AND
          =           (NEXT$EWH$ON$TIME$MINUTES = TIME$AND$DATE.MINUTE)  THEN
1676   6  =        DO;
1677   6  =          EWH$OPT$ACTIVE = NO;
          =                                /* NO OPTIMIZATION DURING PROGRAM ON */
1678   6  =          EWH$DELAY$START = 0;
1679   6  =          EWH$PROGRAM$ACTIVE = YES;
1680   6  =          IF PRICING$DATA.EWH$OPTION <> 0  THEN
1681   7  =          DO;
1682   7  =            IF (SYSTEM$STATUS.CURRENT$TIER = CRITICAL$TIER)
          =                                        AND
          =              ((PRICING$DATA.EWH$OPTION = AEP$OPTION$1) OR
          =               (PRICING$DATA.EWH$OPTION = AEP$OPTION$2))  THEN
1683   8  =            DO;
1684   8  =              EWH$RELAY$ON = NO;
1685   8  =              STATUS$BYTES(0) = STATUS$BYTES(0) AND 0FBH;
          =                                                 /* TURN OFF ELEMENT */
1686   8  =            END;
          =
1687   7  =            ELSE
          =            IF (SYSTEM$STATUS.CURRENT$TIER = HIGH$TIER) AND
          =               (PRICING$DATA.EWH$OPTION = AEP$OPTION$2)  THEN
1688   8  =            DO;
1689   8  =              EWH$RELAY$ON = NO;
1690   8  =              STATUS$BYTES(0) = STATUS$BYTES(0) AND 0FBH;
          =                                                 /* TURN OFF ELEMENT */
1691   8  =            END;
          =
1692   7  =            ELSE
          =            DO;
1693   8  =              EWH$RELAY$ON = YES;
1694   8  =              STATUS$BYTES(0) = STATUS$BYTES(0) OR 4;
          =                                                  /* TURN ON ELEMENT */
1695   8  =            END;
1696   7  =          END;
          =
1697   6  =          ELSE
          =          DO;
1698   7  =            EWH$RELAY$ON = YES;
1699   7  =            STATUS$BYTES(0) = STATUS$BYTES(0) OR 4;
          =                                                  /* TURN ON ELEMENT */
1700   7  =          END;
          =
1701   6  =          SEND$RELAY$MESSAGE = YES;
1702   6  =        END;
1703   5  =      END;
          =
1704   4  =      ELSE
          =      DO;
1705   5  =        IF (EWH$OVERRIDE$STOP$HOUR = TIME$AND$DATE.HOUR) AND
          =           (EWH$OVERRIDE$STOP$MINUTES = TIME$AND$DATE.MINUTE)  THEN
1706   6  =        DO;
1707   6  =          CALL EWH$OVERRIDE$DONE;
1708   6  =          EWH$PROGRAM$ACTIVE = NO;
1709   6  =          STATUS$BYTES(0) = STATUS$BYTES(0) AND 0FBH;
          =                                                 /* TURN OFF ELEMENT */
1710   6  =        END;
1711   5  =      END;
          =
1712   4  =      IF SYSTEM$STATUS.CURRENT$TIER = LOW$TIER  THEN
1713   4  =        EWH$RELAY$ON = YES;
          =                         /* WATER HEATER ALWAYS ON DURING LOW TIER */
1714   4  =    END;
          =
1715   3  =    ELSE
          =    DO;
1716   4  =      IF EWH$RELAY$ON = YES  THEN
1717   5  =      DO;
1718   5  =        EWH$RELAY$ON = NO;
1719   5  =        STATUS$BYTES(0) = STATUS$BYTES(0) AND 0FBH;
          =                                                 /* TURN OFF ELEMENT */
1720   5  =        SEND$RELAY$MESSAGE = YES;
1721   5  =      END;
```

```
1722   4  =     END;
          =     /*** A CONTROL MESSAGE WILL BE SENT EVERY TEN MINUTE INTERVAL
          =                        MAINTAIN THE STATUS OF THE WATER HEATER. ***/
          =
1723   3  =     IF (TIME$AND$DATE.MINUTE AND 0FH) = 0  THEN
1724   4  =     DO;
1725   4  =       IF (EWH$PROGRAM$ACTIVE = YES) AND
          =                                          (EWH$OVERRIDE$FLAG = NO)  THEN
1726   5  =       DO;
1727   5  =         IF TIME$AND$DATE.MINUTE = 0  THEN
1728   6  =         DO;
1729   6  =           EWH$RELAY$ON = YES;
1730   6  =           STATUS$BYTES(0) = STATUS$BYTES(0) OR 4;
          =                                                  /* TURN ON ELEMENT */
1731   6  =           SEND$RELAY$MESSAGE = YES;
1732   6  =         END;
          =
1733   5  =         IF (SYSTEM$STATUS.CURRENT$TIER = CRITICAL$TIER)
          =                                     AND
          =           ((PRICING$DATA.EWH$OPTION = AEP$OPTION$1) OR
          =            (PRICING$DATA.EWH$OPTION = AEP$OPTION$2))  THEN
1734   6  =         DO;
1735   6  =           EWH$RELAY$ON = NO;
1736   6  =           STATUS$BYTES(0) = STATUS$BYTES(0) AND 0FBH;
          =                                                 /* TURN OFF ELEMENT */
1737   6  =         END;
          =
1738   5  =         IF (SYSTEM$STATUS.CURRENT$TIER = HIGH$TIER) AND
          =            (PRICING$DATA.EWH$OPTION = AEP$OPTION$2)  THEN
1739   6  =         DO;
1740   6  =           EWH$RELAY$ON = NO;
1741   6  =           STATUS$BYTES(0) = STATUS$BYTES(0) AND 0FBH;
          =                                                 /* TURN OFF ELEMENT */
1742   6  =         END;
1743   5  =       END;
          =
1744   4  =       IF EWH$RELAY$ON = NO  THEN
1745   4  =         SEND$RELAY$MESSAGE = YES;
1746   4  =     END;
          =
1747   3  =     IF SEND$RELAY$MESSAGE = YES  THEN
1748   4  =     DO;
1749   4  =       SEND$RELAY$MESSAGE = NO;
          =
1750   4  =       IF EWH$RELAY$ON = YES  THEN
1751   4  =         DEV$STATE = ON;
1752   4  =       ELSE
          =         DEV$STATE = OFF;
          =
1753   4  =       DEV$ADDRESS = PLC$ADDR + 10H;
1754   4  =       CONTROL$MSG = YES;
1755   4  =     END;
1756   3  =   END;
          =
1757   2  =   ELSE
          =     STATUS$BYTES(0) = STATUS$BYTES(0) AND 0FBH;
          =                                                 /* TURN OFF ELEMENT */
1758   2  =   IF HVAC$TEMPORARY$OVERRIDE = YES  THEN
1759   3  =   DO;
1760   3  =     NEXT$HVAC$ON$TIME$HOUR = TRUE$HVAC$ON$TIME$HOUR;
1761   3  =     NEXT$HVAC$ON$TIME$MINUTES = TRUE$HVAC$ON$TIME$MINUTES;
1762   3  =   END;
          =
1763   2  =   IF (NEXT$HVAC$ON$TIME$HOUR = TIME$AND$DATE.HOUR) AND
          =      (NEXT$HVAC$ON$TIME$MINUTES = TIME$AND$DATE.MINUTE)  THEN
1764   3  =   DO;
1765   3  =     CALL WHAT$DAY$IS$IT;
1766   3  =     IF (NEXT$HVAC$ON$TIME$HOUR <> TRUE$HVAC$ON$TIME$HOUR) OR
          =     (NEXT$HVAC$ON$TIME$MINUTES <> TRUE$HVAC$ON$TIME$MINUTES)  THEN
1767   3  =       SYSTEM$STATUS.CURRENT$PERIOD =
          =                                     SYSTEM$STATUS.CURRENT$PERIOD + 6;
          =
1768   3  =     IF SYSTEM$STATUS.CURRENT$PERIOD > NIGHT  THEN
1769   3  =       SYSTEM$STATUS.CURRENT$PERIOD = MORNING;
          =
```

```
1770   3  =      IF (HVAC$PERMANENT$OVERRIDE = NO)  THEN
1771   4  =      DO;
1772   4  =        NEW$SETPOINT = YES;                          /* FLAG FOR TSTAT */
1773   4  =        IF NEXT$DESIRED$SETPOINT <> 0  THEN
1774   4  =          SYSTEM$STATUS.SETPOINT$TEMPERATURE = NEXT$DESIRED$SETPOINT;
          =
1775   4  =        IF HVAC$TEMPORARY$OVERRIDE = YES  THEN
1776   5  =        DO;
1777   5  =          CALL MOVXX0 (.TIME$AND$DATE.YEAR,
          =                       .HVAC$OVERRIDE(HVAC$OVERRIDE$INDEX).STOP, 5);
          =                                /* STORE STOP TIME OF HVAC OVERRIDE */
          =
1778   5  =          HVAC$OVERRIDE$INDEX = HVAC$OVERRIDE$INDEX + 1;
1779   5  =          HVAC$TEMPORARY$OVERRIDE = NO;
1780   5  =          HVAC$OVERRIDE$ACTIVE = NO;
          =                                    /* CLEAR FLAG FOR NEXT OVERRIDE */
1781   5  =        END;
1782   4  =        HVAC$OPTIMIZATION$REQUIRED = YES;
1783   4  =      END;
1784   3  =    END;
          =
1785   2  =    IF (PRESET$TIME = YES) AND
          =           ((TRUE$HVAC$ON$TIME$HOUR = TIME$AND$DATE.HOUR) AND
          =            (TRUE$HVAC$ON$TIME$MINUTES = TIME$AND$DATE.MINUTE))  THEN
1786   3  =    DO;
1787   3  =      PRESET$TIME = NO;
1788   3  =      HVAC$OPTIMIZATION$REQUIRED = YES;
1789   3  =    END;
          =
1790   2  =    IF (PRICE$DATA$RECEIVED = YES) OR
          =       (ROLLOVER$DATA$RECEIVED = YES) OR
          =       (USAGE$DATA$RECEIVED = YES)  THEN
1791   2  =      BILLING$COMPLETED = NO;    /* ACTIVATE THE BILLING ALGORITHMS */
          =
          =                   /*** TEST TOTAL HVAC HOURS FOR FILTER CHANGE ***/
          =
1792   2  =    IF TSTAT$TEMPERATURE$TIMER <> 0FFH  THEN
1793   2  =      TSTAT$TEMPFRATURE$TIMER = TSTAT$TEMPERATURE$TIMER + 1;
          =                                /*** UPDATE TSTAT TIMER IF ACTIVE ***/
1794   2  =    IF HVAC$SYSTEM$ACTIVE = YES  THEN
1795   3  =    DO;                          /* UPDATE COUNTER FOR FILTER CHANGE */
1796   3  =      FILTER$COUNT$MINUTES = FILTER$COUNT$MINUTES + 1;
1797   3  =      IF FILTER$COUNT$MINUTES = 60  THEN
1798   4  =      DO;
1799   4  =        FILTER$COUNT$MINUTES = 0;
1800   4  =        FILTER$COUNT$HOURS = FILTER$COUNT$HOURS + 1;
          =
1801   4  =        IF FILTER$COUNT$HOURS = 100  THEN
1802   5  =        DO;
1803   5  =          FILTER$COUNT$HOURS = 0;
1804   5  =          FILTER$COUNT$HRS$HUNDRED = FILTER$COUNT$HRS$HUNDRED + 1;
1805   5  =          UNITS$NUMBER = FILTER$COUNT$HRS$HUNDRED;
1806   5  =          CALL ADJUST$UNITS;
1807   5  =          FILTER$COUNT$HRS$HUNDRED = UNITS$NUMBER;
          =
1808   5  =          IF FILTER$COUNT$HRS$HUNDRED =
          =                                  CONFIG$DATA.FILTER$RUNTIME  THEN
1809   5  =            STATUS$BYTES(0) =  STATUS$BYTES(0) OR 1;
          =                                       /* TURN ON FILTER ELEMENT */
1810   5  =        END;
1811   4  =      END;
1812   3  =    END;
          =
1813   1  =    END MAIN$PROGRAM$CONTROL;

1814   1       END CONTR$OP;




MODULE INFORMATION:                    (STATIC+OVERLAYABLE)
    CODE SIZE                          = 20A3H      8355D
    CONSTANT SIZE                      = 0003H         3D
    DIRECT VARIABLE SIZE               =    01H+02H     1D+   2D
```

```
    INDIRECT VARIABLE SIZE          =   00H+00H      0D+  0D
    BIT SIZE                        =   1CH+00H     28D+  0D
    BIT-ADDRESSABLE SIZE            =   00H+00H      0D+  0D
    AUXILIARY VARIABLE SIZE         = 01B8H        440D
    MAXIMUM STACK SIZE              = 0006H          6D
    REGISTER-BANK(S) USED:            0.
    3254 LINES READ
    0 PROGRAM ERROR(S)
END OF PL/M-51 COMPILATION

DOS 3.30 (038-N) PL/M-51 V1.2
COMPILER INVOKED BY:  C:\INTEL\PLM51.EXE BRICK.PTH PW(80)PL(60)DB NOINTVECTOR OT
>> (3)ROM(LARGE)


               BRICK$MSG:

  1    1       DO;

               /**************************************************/
               /*                                                */
               /*  BBBB    RRRRR     II    CCCCC    K   K       */
               /*  B   B   R    R    II   C         K  K        */
               /*  BBBB    RRRRR     II   C         KKK         */
               /*  B   B   R   R     II   C         K  K        */
               /*  B   B   R    R    II   C         K   K       */
               /*  BBBB    R     R   II    CCCCC    K    K      */
               /*                                                */
               /**************************************************/

               /***********************************************************
               (c) Copyright, Johnson Controls Incorporated, 1988.  All rights
                   reserved. The following program is the exclusive property of
                   Johnson Controls, Inc. and its use is restricted by license
                   agreement to the system with which it was furnished.  The
                   program contents are confidential and may not be disclosed
                   or used outside the system without the express written
                   consent of Johnson Controls.  This program is further
                   protected by federal copyright law as an unpublished work
                   and any unauthorized reproduction is prohibited.
               ***********************************************************/

               $NOLIST
               $EJECT
               $TITLE ('BRICK MESSAGE DECLARATIONS')
               $INCLUDE (BRKDCL.DTH)
          =
          =    /**************************************************************
          =         P U B L I C   S T R U C T U R E   D E C L A R A T I O N S
          =    **************************************************************/
          =
 455   1  =    DECLARE  DATA$BUFFER                 (263) BYTE  PUBLIC  AUXILIARY;
          =
 456   1  =    DECLARE  RECORD$OVERHEAD  STRUCTURE  (
          =        RECORD$TYPE                    BYTE,
          =        DATA$LENGTH                    BYTE,
          =        RECORD$CRC                     WORD)
          =                                       AT (.DATA$BUFFER (0))  AUXILIARY;
          =
 457   1  =    DECLARE  DEVICE$RECORD  STRUCTURE (
          =        PLC$ADDRESS                    BYTE,
          =        PROCESS                        BYTE,
          =        NUMBER$DATA$TYPES              BYTE,
          =        DATA$TYPES               (256) BYTE)
          =                                       AT (.DATA$BUFFER (4))  AUXILIARY;
          =
 458   1  =    DECLARE  DATA$RECORD  STRUCTURE (
          =        DATA$TYPE                      BYTE,
          =        MSG$DATA                 (256) BYTE)
          =                                       AT (.DATA$BUFFER (4))  AUXILIARY;
          =
 459   1  =    DECLARE  HEADER$RECORD  STRUCTURE (
          =        CPE$ID                     (5) BYTE,
          =        DATE                       (3) BYTE,
          =        TIME                       (2) BYTE,
          =        PHONE$DIGITS                   BYTE,
```

```
          =        PHONE$NUMBER             (12) BYTE)
          =                                      AT (.DATA$BUFFER (4))  AUXILIARY;
          =
460   1   =    DECLARE  SEND$BUSY$MSG  STRUCTURE (
          =        BYTE$COUNT                    BYTE,
          =        MSG$TYPE                      BYTE,
          =        DESTINATION$ADDRESS           BYTE,
          =        PROCESS$NUMBERS               BYTE)  PUBLIC  AUXILIARY;
          =
461   1   =    DECLARE  BRICK$MIP                  (20) BYTE  PUBLIC  AUXILIARY;
          =
462   1   =    DECLARE  RECV$BRICK$MESSAGE         (40) BYTE  PUBLIC  AUXILIARY;
          =
463   1   =    DECLARE  RECV$BRICK$MSG  STRUCTURE (
          =        BYTE$COUNT                    BYTE,
          =        MSG$TYPE                      BYTE,
          =        SOURCE$ADDRESS                BYTE,
          =        PROCESS$NUMBERS               BYTE, /* UPPER NYBBLE SOURCE
          =                                         LOWER NYBBLE DESTINATION */
          =        DATA$FIELD               (15) BYTE,
          =        CHECKSUM                      BYTE)  AT (.RECV$BRICK$MESSAGE)
          =                                                          AUXILIARY;
          =
464   1   =    DECLARE  TRANS$BRICK$MESSAGE        (20) BYTE  PUBLIC  AUXILIARY;
          =
465   1   =    DECLARE  TRANS$BRICK$MSG  STRUCTURE (
          =        BYTE$COUNT                    BYTE,
          =        MSG$TYPE                      BYTE,
          =        DESTINATION$ADDRESS           BYTE,
          =        PROCESS$NUMBERS               BYTE, /* UPPER NYBBLE SOURCE
          =                                         LOWER NYBBLE DESTINATION */
          =        DATA$FIELD               (15) BYTE,
          =        CHECKSUM                      BYTE)  AT (.TRANS$BRICK$MESSAGE)
          =                                                          AUXILIARY;
          =
466   1   =    DECLARE  SYSTEM$STATISTICS  STRUCTURE (
          =        CONTROLLER$COMM          (32) BYTE,
          =        TSTAT$COMM               (32) BYTE)  PUBLIC  AUXILIARY;
          =
467   1   =    DECLARE  CURRENT$DATE  STRUCTURE (
          =        YEAR                          BYTE,
          =        MONTH                         BYTE,
          =        DAY                           BYTE,
          =        HOUR                          BYTE,
          =        MINUTE                        BYTE,
          =        DAY$OF$WEEK                   BYTE)  PUBLIC  AUXILIARY;
          =
          =    /*****************************************************************/
          =
468   1   =    DECLARE  DIRECT$LOAD$CONTROL  STRUCTURE (
          =        START$DATE                (3) BYTE,
          =        STOP$DATE                 (3) BYTE,
          =        START$TIME                (2) BYTE,
          =        STOP$TIME                 (2) BYTE,
          =        MINUTES$STOP                  BYTE,
          =        MINUTES$OFF                   BYTE)  PUBLIC  AUXILIARY;
          =
469   1   =    DECLARE  METER$CONTROL  STRUCTURE(
          =        NOT$USED                      BYTE,
          =        METER$UPLOAD$DATE         (3) BYTE,
          =        METER$UPLOAD$TIME         (2) BYTE,
          =        DAILY$ROLLOVER$DATE       (3) BYTE,
          =        MONTHLY$ROLLOVER$DATE     (3) BYTE,
          =        UNUSED                    (3) BYTE)  PUBLIC  AUXILIARY;
          =
470   1   =    DECLARE  TIER$USAGE  STRUCTURE (
          =        TODAYS$DATE               (3) BYTE,
          =        TODAYS$TIER$1             (3) BYTE,
          =        TODAYS$TIER$2             (3) BYTE,
          =        TODAYS$TIER$3             (3) BYTE,
          =        TODAYS$TIER$4             (3) BYTE,
          =        YESTERDAYS$DATE           (3) BYTE,
          =        YESTERDAYS$TIER$1         (3) BYTE,
          =        YESTERDAYS$TIER$2         (3) BYTE,
          =        YESTERDAYS$TIER$3         (3) BYTE,
          =        YESTERDAYS$TIER$4         (3) BYTE,
          =        CURR$MONTHS$TIER$1        (3) BYTE,
          =        CURR$MONTHS$TIER$2        (3) BYTE,
```

```
          =       CURR$MONTHS$TIER$3          (3) BYTE,
          =       CURR$MONTHS$TIER$4          (3) BYTE,
          =       LAST$MONTHS$TIER$1          (3) BYTE,
          =       LAST$MONTHS$TIER$2          (3) BYTE,
          =       LAST$MONTHS$TIER$3          (3) BYTE,
          =       LAST$MONTHS$TIER$4          (3) BYTE,
          =       YESTERDAY$READING           (3) BYTE,
          =       TODAY$READING               (3) BYTE,
          =       LAST$MONTH$TOTAL$KWH        (3) BYTE)  PUBLIC  AUXILIARY;
          =
471   1   =   DECLARE  PRICING$DATA  STRUCTURE (
          =       TSTAT$DISPLAY                   BYTE,
          =       XFMR$KWH$CONSTANT           (3) BYTE,
          =       XFMR$KW$CONSTANT            (3) BYTE,
          =       PRICE$TIER$1                (3) BYTE,
          =       PRICE$TIER$2                (3) BYTE,
          =       PRICE$TIER$3                (3) BYTE,
          =       PRICE$TIER$4                (3) BYTE,
          =       FUEL                        (3) BYTE,
          =       STD$RATE$STEP1$KWH          (3) BYTE,
          =       STD$RATE$STEP1$PRICE        (3) BYTE,
          =       STD$RATE$STEP2$KWH          (3) BYTE,
          =       STD$RATE$STEP2$PRICE        (3) BYTE,
          =       STD$RATE$STEP3$KWH          (3) BYTE,
          =       STD$RATE$STEP3$PRICE        (3) BYTE,
          =       STD$RATE$STEP4$KWH          (3) BYTE,
          =       STD$RATE$STEP4$PRICE        (3) BYTE,
          =       STD$RATE$STEP5$KWH          (3) BYTE,
          =       STD$RATE$STEP5$PRICE        (3) BYTE,
          =       STD$RATE$STEP6$KWH          (3) BYTE,
          =       STD$RATE$STEP6$PRICE        (3) BYTE,
          =       EWH$OPTION                      BYTE,
          =       NOT$USED                    (7) BYTE)  PUBLIC  AUXILIARY;
          =
          =   /*****************************************************************
          =     E X T E R N A L   S T R U C T U R E   D E C L A R A T I O N S
          =   *****************************************************************/
          =
472   1   =   DECLARE  TIER$DATA (40)  STRUCTURE (
          =       DATE                        (3) BYTE,
          =       TIER                        (6) BYTE)  EXTERNAL  AUXILIARY;
          =
473   1   =   DECLARE  SCHEDULES                   (399) BYTE  EXTERNAL  AUXILIARY;
          =
474   1   =   DECLARE  HVAC (4)  STRUCTURE (
          =       START$MORN                  (2) BYTE,
          =       TEMP$1$MORN                     BYTE,
          =       TEMP$2$MORN                     BYTE,
          =       TEMP$3$MORN                     BYTE,
          =       TEMP$4$MORN                     BYTE,
          =       START$DAY                   (2) BYTE,
          =       TEMP$1$DAY                      BYTE,
          =       TEMP$2$DAY                      BYTE,
          =       TEMP$3$DAY                      BYTE,
          =       TEMP$4$DAY                      BYTE,
          =       START$EVE                   (2) BYTE,
          =       TEMP$1$EVE                      BYTE,
          =       TEMP$2$EVE                      BYTE,
          =       TEMP$3$EVE                      BYTE,
          =       TEMP$4$EVE                      BYTE,
          =       START$NITE                  (2) BYTE,
          =       TEMP$1$NITE                     BYTE,
          =       TEMP$2$NITE                     BYTE,
          =       TEMP$3$NITE                     BYTE,
          =       TEMP$4$NITE                     BYTE)  AT (.SCHEDULES(0))
          =                                                       AUXILIARY;
          =
475   1   =   DECLARE  HVAC$ARRAY                 (96) BYTE  AT (.SCHEDULES(0))
          =                                                       AUXILIARY;
          =
          =   /*****************************************************************/
          =
476   1   =   DECLARE  EWH$STATUS                        BYTE  EXTERNAL  AUXILIARY;
          =
477   1   =   DECLARE  EWH  (2)  STRUCTURE (
          =       START$MORN                  (2) BYTE,
          =       STOP$MORN                   (2) BYTE,
          =       START$DAY                   (2) BYTE,
```

```
          =     STOP$DAY                  (2) BYTE,
          =     START$EVE                 (2) BYTE,
          =     STOP$EVE                  (2) BYTE,
          =     START$NITE                (2) BYTE,
          =     STOP$NITE                 (2) BYTE)  AT (.SCHEDULES(96))
          =                                                    AUXILIARY;
          =
478   1   =   DECLARE  EWH$ARRAY                 (32) BYTE  AT (.SCHEDULES(96))
          =                                                    AUXILIARY;
          =
          =   /**************************************************************/
          =
479   1   =   DECLARE  BSRDEV$WEEKDAY  (8)  STRUCTURE (
          =       START$MORN              (2) BYTE,
          =       STOP$MORN               (2) BYTE,
          =       START$DAY               (2) BYTE,
          =       STOP$DAY                (2) BYTE,
          =       START$EVE               (2) BYTE,
          =       STOP$EVE                (2) BYTE,
          =       START$NITE              (2) BYTE,
          =       STOP$NITE               (2) BYTE)  AT (.SCHEDULES(128))
          =                                                    AUXILIARY;
480   1   =   DECLARE  BSRDEV$WEEKEND  (8)  STRUCTURE (
          =       START$MORN              (2) BYTE,
          =       STOP$MORN               (2) BYTE.
          =       START$DAY               (2) BYTE,
          =       STOP$DAY                (2) BYTE,
          =       START$EVE               (2) BYTE,
          =       STOP$EVE                (2) BYTE,
          =       START$NITE              (2) BYTE,
          =       STOP$NITE               (2) BYTE)  AT (.SCHEDULES(256))
          =                                                    AUXILIARY;
          =
481   1   =   DECLARE  BSRDEV$ARRAY             (128) BYTE  AT (.SCHEDULES(128))
          =                                                    AUXILIARY;
          =
          =   /**************************************************************/
          =
482   1   =   DECLARE  CONFIG$DATA    STRUCTURE (
          =       HOUSE$CODE                  BYTE,
          =       F_C$DEGREE                  BYTE,
          =       CLOCK$FORMAT                BYTE,
          =       FILTER$RUNTIME              BYTE,
          =       WEEKEND$DAY                 BYTE,
          =       HIGH$TEMP$SPAN              BYTE,
          =       LOW$TEMP$SPAN               BYTE,
          =       EWH$PREHEAT                 BYTE,
          =       H_P$CYCLE$TIME              BYTE,
          =       ELECTRIC$HEAT               BYTE,
          =       SECONDARY$HEAT$RECOVERY     BYTE,
          =       HIGH$EFFIC$FAN              BYTE,
          =       EMERG$H_P$ACTION            BYTE,
          =       VERSION$NUMBERS         (2) BYTE)  AT (.SCHEDULES(384))
          =                                                    AUXILIARY;
          =
483   1   =   DECLARE  CONFIG$ARRAY              (15) BYTE  AT (.SCHEDULES(384))
          =                                                    AUXILIARY;
          =
          =   /**************************************************************/
          =
484   1   =   DECLARE  OVERRIDES          (168) BYTE  EXTERNAL  AUXILIARY;
          =
485   1   =   DECLARE  HVAC$OVERRIDE (8) STRUCTURE  (
          =       START                   (5) BYTE,
          =       STOP                    (5) BYTE,
          =       TEMPERATURE                 BYTE)  AT  (.OVERRIDES (0))
          =                                                    AUXILIARY;
          =
486   1   =   DECLARE  EWH$OVERRIDE (8)  STRUCTURE  (
          =       START                   (5) BYTE,
          =       STOP                    (5) BYTE)  AT  (.OVERRIDES (88))
          =                                                    AUXILIARY;
          =
487   1   =   DECLARE  TIME$AND$DATE  STRUCTURE (
          =       YEAR                        BYTE,
          =       MONTH                       BYTE,
          =       DAY                         BYTE,
          =       HOUR                        BYTE,
```

```
        =       MINUTE                          BYTE,
        =       DAY$OF$WEEK                     BYTE)  EXTERNAL  AUXILIARY;
        =
488  1  =   DECLARE  SEND$ERROR$MSG  STRUCTURE (
        =       BYTE$COUNT                      BYTE,
        =       MSG$TYPE                        BYTE,
        =       DESTINATION$ADDRESS             BYTE,
        =       PROCESS$NUMBERS                 BYTE,
        =       ERROR$TYPE                 (15) BYTE)  EXTERNAL  AUXILIARY;
        =
489  1  =   DECLARE  SYSTEM$STATUS  STRUCTURE (
        =       CURRENT$TEMPERATURE             BYTE,
        =       SETPOINT$TEMPERATURE            BYTE,
        =       CURRENT$TIER                    BYTE,
        =       CURRENT$PERIOD                  BYTE,
        =       CURRENT$MODE                    BYTE,
        =       FAN$MODE                        BYTE,
        =       EMERGENCY$HEAT                  BYTE,
        =       HVAC$ACTIVE                     BYTE,
        =       HVAC$OVERRIDE                   BYTE,
        =       EWH$ACTIVE                      BYTE,
        =       EWH$OVERRIDE                    BYTE,
        =       WD_WE                           BYTE,
        =       OPT$ACTIVE                      BYTE,
        =       RUNTIME$TOTAL$HTG           (2) BYTE)  EXTERNAL  AUXILIARY;
        =
        =   /****************************************************************
        =         A R R A Y / S T R U C T U R E   D E C L A R A T I O N S
        =   ****************************************************************/
        =
490  1  =   DECLARE  SEND$TIME$MSG  STRUCTURE (
        =       BYTE$COUNT                      BYTE,
        =       MSG$TYPE                        BYTE,
        =       DESTINATION$ADDRESS             BYTE,
        =       PROCESS$NUMBERS                 BYTE,
        =       DATA$FIELD                  (6) BYTE)  AUXILIARY;
        =
491  1  =   DECLARE  SEND$DIAG$ACK$MSG  STRUCTURE (
        =       BYTE$COUNT                      BYTE,
        =       MSG$TYPE                        BYTE,
        =       DESTINATION$ADDRESS             BYTE,
        =       PROCESS$NUMBERS                 BYTE,
        =       STATUS$BYTE                     BYTE)  AUXILIARY;
        =
492  1  =   DECLARE  SEND$DEVICE$MSG  STRUCTURE (
        =       BYTE$COUNT                      BYTE,
        =       MSG$TYPE                        BYTE,
        =       DESTINATION$ADDRESS             BYTE,
        =       PROCESS$NUMBERS                 BYTE,
        =       DEVICE$STATE                    BYTE)  AUXILIARY;
        =
493  1  =   DECLARE  SEND$CONFIG$ACK$MSG  STRUCTURE (
        =       BYTE$COUNT                      BYTE,
        =       MSG$TYPE                        BYTE,
        =       DESTINATION$ADDRESS             BYTE,
        =       PROCESS$NUMBERS                 BYTE,
        =       MAJOR$VERSION                   BYTE,
        =       MINOR$VERSION                   BYTE)  AUXILIARY;
        =
494  1  =   DECLARE  SEND$ERROR$ACK$MSG  STRUCTURE (
        =       BYTE$COUNT                      BYTE,
        =       MSG$TYPE                        BYTE,
        =       DESTINATION$ADDRESS             BYTE,
        =       PROCESS$NUMBERS                 BYTE)  AUXILIARY;
        =
        =   /****************************************************************
        =          E X T E R N A L   W O R D   D E C L A R A T I O N
        =   ****************************************************************/
        =
495  1  =   DECLARE  AMOUNT                          WORD  EXTERNAL  AUXILIARY;
496  1  =   DECLARE  MISC$WORD                       WORD  EXTERNAL;
        =
        =   /****************************************************************
        =                  W O R D   D E C L A R A T I O N
        =   ****************************************************************/
        =
497  1  =   DECLARE  CRC$WORD                        WORD  AUXILIARY;
498  1  =   DECLARE  PRESENT$DAY                     WORD  AUXILIARY;
```

```
499  1  =  DECLARE  NEW$DAY                                WORD  AUXILIARY;
500  1  =  DECLARE  NEW$MONTH                              WORD  AUXILIARY;
501  1  =  DECLARE  OLD$DAY                                WORD  AUXILIARY;
502  1  =  DECLARE  OLD$MONTH                              WORD  AUXILIARY;
503  1  =  DECLARE  START$DAY                              WORD  AUXILIARY;
504  1  =  DECLARE  STOP$DAY                               WORD  AUXILIARY;
        =
        =  /***************************************************************
        =          P U B L I C   B Y T E   D E C L A R A T I O N S
        =  ***************************************************************/
        =
505  1  =  DECLARE  BRICK$DELAY$TIMER                      BYTE  PUBLIC  AUXILIARY;
506  1  =  DECLARE  BUFFER$INDEX                           BYTE  PUBLIC  AUXILIARY;
507  1  =  DECLARE  BUSY$DEVICE                            BYTE  PUBLIC  AUXILIARY;
508  1  =  DECLARE  BUSY$MSG$TIMER                         BYTE  PUBLIC  AUXILIARY;
509  1  =  DECLARE  CURRENT$DEVICE                         BYTE  PUBLIC  AUXILIARY;
510  1  =  DECLARE  CURRENT$PROCESS                        BYTE  PUBLIC  AUXILIARY;
511  1  =  DECLARE  DATA$DESTINATION                       BYTE  PUBLIC  AUXILIARY;
512  1  =  DECLARE  DATA$MESSAGE$TIMER                     BYTE  PUBLIC  AUXILIARY;
513  1  =  DECLARE  DATA$PROCESS                           BYTE  PUBLIC  AUXILIARY;
514  1  =  DECLARE  DATA$TIMER                             BYTE  PUBLIC  AUXILIARY;
515  1  =  DECLARE  FAST$CLOCK$COUNTER                     BYTE  PUBLIC  AUXILIARY;
516  1  =  DECLARE  MESSAGE$PROCESS                        BYTE  PUBLIC  AUXILIARY;
517  1  =  DECLARE  RECV$BRICK$INDEX                       BYTE  PUBLIC  AUXILIARY;
518  1  =  DECLARE  RECV$BRINDEX                           BYTE  PUBLIC  AUXILIARY;
519  1  =  DECLARE  S$P$TIMER                              BYTE  PUBLIC  AUXILIARY;
520  1  =  DECLARE  SESSION$COUNTER                        BYTE  PUBLIC  AUXILIARY;
521  1  =  DECLARE  TRANS$BRINDEX                          BYTE  PUBLIC  AUXILIARY;
        =
        =  /***************************************************************
        =        E X T E R N A L   B Y T E   D E C L A R A T I O N S
        =  ***************************************************************/
        =
522  1  =  DECLARE  BRICK$MESSAGE$TIMER                    BYTE  EXTERNAL  AUXILIARY;
523  1  =  DECLARE  CONTROLLER$ADDRESS                     BYTE  EXTERNAL  AUXILIARY;
524  1  =  DECLARE  DATA$NAKKED$TWICE$COUNTER              BYTE  EXTERNAL  AUXILIARY;
525  1  =  DECLARE  DATA$PACKET$TIMER                      BYTE  EXTERNAL  AUXILIARY;
526  1  =  DECLARE  DATA$SESSION$TIMER                     BYTE  EXTERNAL  AUXILIARY;
527  1  =  DECLARE  DLC$TIMER                              BYTE  EXTERNAL  AUXILIARY;
528  1  =  DECLARE  DEV$ADDRESS                            BYTE  EXTERNAL  AUXILIARY;
529  1  =  DECLARE  DEV$STATE                              BYTE  EXTERNAL  AUXILIARY;
530  1  =  DECLARE  ERROR$INDEX                            BYTE  EXTERNAL  AUXILIARY;
531  1  =  DECLARE  FAN$STATUS                             BYTE  EXTERNAL  AUXILIARY;
532  1  =  DECLARE  FILTER$COUNT$HOURS                     BYTE  EXTERNAL  AUXILIARY;
533  1  =  DECLARE  FILTER$COUNT$HRS$HUNDRED               BYTE  EXTERNAL  AUXILIARY;
534  1  =  DECLARE  INITIATED$DATA$SESSION                 BYTE  EXTERNAL  AUXILIARY;
535  1  =  DECLARE  MAIN$DATA$TIMER                        BYTE  EXTERNAL  AUXILIARY;
536  1  =  DECLARE  MISC_LOCATION                          BYTE  EXTERNAL  AUXILIARY;
537  1  =  DECLARE  NEEDED$HOUR                            BYTE  EXTERNAL  AUXILIARY;
538  1  =  DECLARE  PLC$ADDR                               BYTE  EXTERNAL  AUXILIARY;
539  1  =  DECLARE  RAM$CHECKSUM                           BYTE  EXTERNAL  AUXILIARY;
540  1  =  DECLARE  STATUS$BYTES                       (2) BYTE  EXTERNAL  AUXILIARY;
541  1  =  DECLARE  TIER$BUFFER$INDEX                      BYTE  EXTERNAL  AUXILIARY;
542  1  =  DECLARE  TIER$DOWNLOAD$REQUEST$TIMER            BYTE  EXTERNAL  AUXILIARY;
543  1  =  DECLARE  TIER$INDEX                             BYTE  EXTERNAL  AUXILIARY;
544  1  =  DECLARE  TIER$INDEX$COUNTER                     BYTE  EXTERNAL  AUXILIARY;
        =
        =  /***************************************************************
        =                  B Y T E   D E C L A R A T I O N
        =  ***************************************************************/
        =
545  1  =  DECLARE  BRICK$STATUS                           BYTE  AUXILIARY;
546  1  =  DECLARE  BUSY$MESSAGE$TIMER                     BYTE  AUXILIARY;
547  1  =  DECLARE  CHANGED$HOURS                          BYTE  AUXILIARY;
548  1  =  DECLARE  CONTROLLER$MINUTE                      BYTE  AUXILIARY;
549  1  =  DECLARE  CURRENT$YEAR                           BYTE  AUXILIARY;
550  1  =  DECLARE  DATA$SAVED$BUFFER                 (20) BYTE  AUXILIARY;
551  1  =  DECLARE  DATA$SIZE                              BYTE  AUXILIARY;
552  1  =  DECLARE  DATA$TERMINATOR                        BYTE  AUXILIARY;
553  1  =  DECLARE  DATA$TYPES$INDEX                       BYTE  AUXILIARY;
554  1  =  DECLARE  DATA$TYPES$TO$SEND                     BYTE  AUXILIARY;
555  1  =  DECLARE  DLC$CURRENT$DAY                        BYTE  AUXILIARY;
556  1  =  DECLARE  DLC$START$DAY                          BYTE  AUXILIARY;
557  1  =  DECLARE  DLC$STOP$DAY                           BYTE  AUXILIARY;
558  1  =  DECLARE  DLC$START$YEAR                         BYTE  AUXILIARY;
559  1  =  DECLARE  DLC$STOP$YEAR                          BYTE  AUXILIARY;
560  1  =  DECLARE  DTINDEX                                BYTE  AUXILIARY;
561  1  =  DECLARE  METER$MINUTE                           BYTE  AUXILIARY;
```

```
562   1  =    DECLARE  MSG$TO$XMIT                          BYTE  AUXILIARY;
563   1  =    DECLARE  NEEDED$DATA$TYPES                    BYTE  AUXILIARY;
564   1  =    DECLARE  NEW$HOURS                            BYTE  AUXILIARY;
565   1  =    DECLARE  NEW$MINUTES                          BYTE  AUXILIARY;
566   1  =    DECLARE  OLD$HOURS                            BYTE  AUXILIARY;
567   1  =    DECLARE  OLD$MINUTES                          BYTE  AUXILIARY;
568   1  =    DECLARE  RECORD$INDEX                         BYTE  AUXILIARY;
569   1  =    DECLARE  RECORD$SIZE                          BYTE  AUXILIARY;
570   1  =    DECLARE  REQUESTED$DATA$TYPES           (257) BYTE  AUXILIARY;
571   1  =    DECLARE  RETURNED$DEV$STATE                   BYTE  AUXILIARY;
572   1  =    DECLARE  TEST$DATA$TYPE                       BYTE  AUXILIARY;
573   1  =    DECLARE  TRANS$BRICK$CHECKSUM$REGISTER        BYTE  AUXILIARY;
         =
574   1  =    DECLARE  VERSION$MAJOR                        BYTE  CONSTANT (1);
575   1  =    DECLARE  VERSION$MINOR                        BYTE  CONSTANT (4);
         =
         =    /*****************************************************************
         =       P U B L I C   B I T   M A P P E D   D E C L A R A T I O N S
         =    *****************************************************************/
         =
576   1  =    DECLARE  ANALYZE$DATA$TYPE                    BIT  PUBLIC;
577   1  =    DECLARE  BRICK$DELAY$TIMER$ACTIVE             BIT  PUBLIC;
578   1  =    DECLARE  BUSY$FLAG                            BIT  PUBLIC;
579   1  =    DECLARE  BUSY$MSG                             BIT  PUBLIC;
580   1  =    DECLARE  BUSY$MSG$TIMER$ACTIVE                BIT  PUBLIC;
581   1  =    DECLARE  CONFIG$ACK$MSG                       BIT  PUBLIC;
582   1  =    DECLARE  CONTROL$MSG                          BIT  PUBLIC;
583   1  =    DECLARE  DATA$ACK$MSG                         BIT  PUBLIC;
584   1  =    DECLARE  DATA$INTEGRITY                       BIT  PUBLIC;
585   1  =    DECLARE  DATA$MESSAGE$BUILT                   BIT  PUBLIC;
586   1  =    DECLARE  DATA$MESSAGE$INHIBIT                 BIT  PUBLIC;
587   1  =    DECLARE  DATA$REQUEST$MSG                     BIT  PUBLIC;
588   1  =    DECLARE  DATA$TIMER$ACTIVE                    BIT  PUBLIC;
589   1  =    DECLARE  DIAG$ACK$MSG                         BIT  PUBLIC;
590   1  =    DECLARE  DLC$DATA$NEEDED                      BIT  PUBLIC;
591   1  =    DECLARE  ERROR$ACK$MSG                        BIT  PUBLIC;
592   1  =    DECLARE  ERROR$MSG                            BIT  PUBLIC;
593   1  =    DECLARE  FAST$CLOCK$FLAG                      BIT  PUBLIC;
594   1  =    DECLARE  GENERATE$DATA$TYPE                   BIT  PUBLIC;
595   1  =    DECLARE  GET$ALL$TIER$DATA                    BIT  PUBLIC;
596   1  =    DECLARE  ROLLOVER$DATA$RECEIVED               BIT  PUBLIC;
597   1  =    DECLARE  INQUIRE$MSG                          BIT  PUBLIC;
598   1  =    DECLARE  MAIN$DATA$TIMER$ACTIVE               BIT  PUBLIC;
599   1  =    DECLARE  NEW$RECORD                           BIT  PUBLIC;
600   1  =    DECLARE  OPTIMIZATION$REQUIRED                BIT  PUBLIC;
601   1  =    DECLARE  PASS$THRU$MESSAGE                    BIT  PUBLIC;
602   1  =    DECLARE  PRICE$DATA$RECEIVED                  BIT  PUBLIC;
603   1  =    DECLARE  READY$TO$RESPOND                     BIT  PUBLIC;
604   1  =    DECLARE  READY$TO$SEND$TERMINATOR             BIT  PUBLIC;
605   1  =    DECLARE  REFRESH$REQUEST$MESSAGE              BIT  PUBLIC;
606   1  =    DECLARE  REQ$STATUS$MSG                       BIT  PUBLIC;
607   1  =    DECLARE  REQ$SUBADDRESS$MSG                   BIT  PUBLIC;
608   1  =    DECLARE  RESEND$DATA$MESSAGE                  BIT  PUBLIC;
609   1  =    DECLARE  S$P$TIMER$ACTIVE                     BIT  PUBLIC;
610   1  =    DECLARE  SENT$ONCE$FLAG                       BIT  PUBLIC;
611   1  =    DECLARE  STATUS$MSG                           BIT  PUBLIC;
612   1  =    DECLARE  TERMINATOR$FLAG                      BIT  PUBLIC;
613   1  =    DECLARE  TERMINATOR$RECEIVED                  BIT  PUBLIC;
614   1  =    DECLARE  TIME$MSG                             BIT  PUBLIC;
615   1  =    DECLARE  USAGE$DATA$RECEIVED                  BIT  PUBLIC;
616   1  =    DECLARE  WAITING$FOR$DATA$ACK$FLAG            BIT  PUBLIC;
617   1  =    DECLARE  WHAT$TIME$MSG                        BIT  PUBLIC;
618   1  =    DECLARE  Z$BIT$SET                            BIT  PUBLIC;
         =
         =    /*****************************************************************
         =     E X T E R N A L   B I T   M A P P E D   D E C L A R A T I O N S
         =    *****************************************************************/
         =
619   1  =    DECLARE  BSR$INIT                             BIT  EXTERNAL;
620   1  =    DECLARE  BSRDEV$DATA$FLAG                     BIT  EXTERNAL;
621   1  =    DECLARE  CONFIG$DATA$FLAG                     BIT  EXTERNAL;
622   1  =    DECLARE  CUSTOMER$SERVICE$REQUESTED           BIT  EXTERNAL;
623   1  =    DECLARE  DATA$MSG                             BIT  EXTERNAL;
624   1  =    DECLARE  DATA$NAKKED$TWICE                    BIT  EXTERNAL;
625   1  =    DECLARE  DATA$PACKET$TIMER$ACTIVE             BIT  EXTERNAL;
626   1  =    DECLARE  DATA$SESSION$TIMER$ACTIVE            BIT  EXTERNAL;
627   1  =    DECLARE  DATA$TO$BURN                         BIT  EXTERNAL;
628   1  =    DECLARE  DLC$ACTIVE$FLAG                      BIT  EXTERNAL;
```

```
629   1  =   DECLARE  DLC$TIMER$FLAG                       BIT  EXTERNAL;
630   1  =   DECLARE  DLC$TOD$FLAG                         BIT  EXTERNAL;
631   1  =   DECLARE  EEPROM$LOCKED                        BIT  EXTERNAL;
632   1  =   DECLARE  EMERG$HEAT$REQUIRED                  BIT  EXTERNAL;
633   1  =   DECLARE  ERROR$ALERT                          BIT  EXTERNAL;
634   1  =   DECLARE  EWH$DATA$FLAG                        BIT  EXTERNAL;
635   1  =   DECLARE  EWH$OPTIMIZATION$REQUIRED            BIT  EXTERNAL;
636   1  =   DECLARE  EWH$OVERRIDE$FLAG                    BIT  EXTERNAL;
637   1  =   DECLARE  EWH$RELAY$ON                         BIT  EXTERNAL;
638   1  =   DECLARE  HVAC$DATA$FLAG                       BIT  EXTERNAL;
639   1  =   DECLARE  HVAC$OPTIMIZATION$REQUIRED           BIT  EXTERNAL;
640   1  =   DECLARE  HVAC$OPTIMIZER$ACTIVE                BIT  EXTERNAL;
641   1  =   DECLARE  HVAC$PERMANENT$OVERRIDE              BIT  EXTERNAL;
642   1  =   DECLARE  HVAC$SYSTEM$ACTIVE                   BIT  EXTERNAL;
643   1  =   DECLARE  HVAC$TEMPORARY$OVERRIDE              BIT  EXTERNAL;
644   1  =   DECLARE  READY$TO$TRANSMIT$FLAG               BIT  EXTERNAL;
645   1  =   DECLARE  SEND$RELAY$MESSAGE                   BIT  EXTERNAL;
646   1  =   DECLARE  TIER$DOWNLOAD$REQUEST                BIT  EXTERNAL;
647   1  =   DECLARE  WAITING                              BIT  EXTERNAL;
         =
         =   /****************************************************************
         =              B I T   M A P P E D   D E C L A R A T I O N S
         =   ****************************************************************/
         =
648   1  =   DECLARE  BRICK$OK                             BIT  AT (0B4H) REG;
649   1  =   DECLARE  BUSY$MESSAGE$FLAG                    BIT;
650   1  =   DECLARE  DATA$MESSAGE$REQUIRED$FLAG           BIT;
651   1  =   DECLARE  FIRST$DATA$TYPE$MESSAGE$FLAG         BIT;
652   1  =   DECLARE  FIRST$TIME$DATA$MESSAGE              BIT;
653   1  =   DECLARE  MATCH$FOUND                          BIT;
654   1  =   DECLARE  START$DATE$FLAG                      BIT;
655   1  =   DECLARE  WATCHDOG$TIMER                       BIT  AT (97H) REG;
         =
         =   /****************************************************************
         =                L I T E R A L   D E C L A R A T I O N S
         =   ****************************************************************/
         =
656   1  =   DECLARE  BSRDEV$SIZE                          LITERALLY      '128';
657   1  =   DECLARE  COMSET_B$PROCESS                     LITERALLY        '8';
658   1  =   DECLARE  CONFIGURATION$DATA                   LITERALLY        '5';
659   1  =   DECLARE  DATA$FIELD$SIZE                      LITERALLY       '15';
660   1  =   DECLARE  DEVICE$SCHEDULE                      LITERALLY        '4';
661   1  =   DECLARE  DEVICE$STATE$BYTE                    LITERALLY        '1';
662   1  =   DECLARE  DIAG$STATUS                          LITERALLY        '1';
663   1  =   DECLARE  DIRECT$LOAD$CONTROL$SIZE             LITERALLY       '15';
664   1  =   DECLARE  DLC$ON$MASK                          LITERALLY      '40H';
665   1  =   DECLARE  EWH$SCHEDULE                         LITERALLY        '3';
666   1  =   DECLARE  FATAL                                LITERALLY     '0FFH';
667   1  =   DECLARE  HVAC$SCHEDULE                        LITERALLY        '2';
668   1  =   DECLARE  HVAC$SIZE                            LITERALLY       '96';
669   1  =   DECLARE  MAX$BRICK$MESSAGE$TYPE               LITERALLY     '0FFH';
670   1  =   DECLARE  MAX$BRICK$STATUS$BYTE                LITERALLY      '11H';
671   1  =   DECLARE  MAX$DATA$MESSAGE$TYPE                LITERALLY      '84H';
672   1  =   DECLARE  MAX$DEVICE$MESSAGE$TYPE              LITERALLY      '32H';
673   1  =   DECLARE  MAX$SYSTEM$MESSAGE$TYPE              LITERALLY      '0AH';
674   1  =   DECLARE  MIN$BRICK$MESSAGE$TYPE               LITERALLY     '0FCH';
675   1  =   DECLARE  MIN$DATA$MESSAGE$TYPE                LITERALLY      '80H';
676   1  =   DECLARE  MIN$DEVICE$MESSAGE$TYPE              LITERALLY      '30H';
677   1  =   DECLARE  MSG$OVERHEAD                         LITERALLY        '3';
678   1  =   DECLARE  NO                                   LITERALLY        '0';
679   1  =   DECLARE  NON$FATAL                            LITERALLY      '00H';
680   1  =   DECLARE  NUMBER$OF$VERSIONS                   LITERALLY        '2';
681   1  =   DECLARE  OFF                                  LITERALLY      '00H';
682   1  =   DECLARE  ON                                   LITERALLY     '0FFH';
683   1  =   DECLARE  ONE                                  LITERALLY        '1';
684   1  =   DECLARE  OVERRIDE$SIZE                        LITERALLY      '168';
685   1  =   DECLARE  PRICING$DATA$SIZE                    LITERALLY       '52';
686   1  =   DECLARE  PROCESS$BYTE                         LITERALLY        '1';
687   1  =   DECLARE  RECORD$TERMINATOR                    LITERALLY     '0FFH';
688   1  =   DECLARE  REST$OF$OVERHEAD                     LITERALLY        '2';
689   1  =   DECLARE  SCHEDULES$SIZE                       LITERALLY      '399';
690   1  =   DECLARE  SYSTEM$PROCESS                       LITERALLY        '0';
691   1  =   DECLARE  TIER$DATA$SIZE                       LITERALLY        '9';
692   1  =   DECLARE  TIER$USAGE$SIZE                      LITERALLY       '63';
693   1  =   DECLARE  TIME$DATA$SIZE                       LITERALLY        '6';
694   1  =   DECLARE  YAHOO                                LITERALLY   '0FFFFH';
695   1  =   DECLARE  YES                                  LITERALLY        '1';
         =
```

```
               =    /********************  CONTROLLER ERROR CODES ******************/
               =
696     1      =    DECLARE  DEFECTIVE$RAM                    LITERALLY        '01H';
697     1      =    DECLARE  INVALID$BRICK$SUBADDRESS         LITERALLY        '02H';
698     1      =    DECLARE  INVALID$MESSAGE$TYPE             LITERALLY        '03H';
699     1      =    DECLARE  CUSTOMER$SERVICE$REQUIRED        LITERALLY        '04H';
700     1      =    DECLARE  NO$TSTAT$COMM                    LITERALLY        '05H';
701     1      =    DECLARE  TEMP$OUT$OF$RANGE                LITERALLY        '06H';
702     1      =    DECLARE  BAD$DLC$DATA                     LITERALLY        '07H';
               =
703     1      =    DECLARE  BAD$METER$DATA$SESSION           LITERALLY        '10H';
704     1      =    DECLARE  BAD$COMSET$2000$DATA$SESSION     LITERALLY        '11H';
705     1      =    DECLARE  BAD$COMSET_B$DATA$SESSION        LITERALLY        '12H';
706     1      =    DECLARE  BAD$DESTINATION$ADDRESS          LITERALLY        '13H';
707     1      =    DECLARE  UNDEFINED$DEVICE$ERROR           LITERALLY       '0EEH';
               =
708     1      =    DECLARE  ERROR$BUFFER$OVERFLOW            LITERALLY        '99H';
               =
               =    /******************** TSTAT STATISTIC CODES ********************/
               =
709     1      =    DECLARE  WRONG$MESSAGE$TYPE               LITERALLY        '01H';
               =
               =    /********************* BRICK MESSAGE TYPES *********************/
               =
710     1      =    DECLARE  WHAT_TIME                        LITERALLY        '01H';
711     1      =    DECLARE  TIME                             LITERALLY        '02H';
712     1      =    DECLARE  DIAG                             LITERALLY        '03H';
713     1      =    DECLARE  DIAG_ACK                         LITERALLY        '04H';
714     1      =    DECLARE  CONFIG                           LITERALLY        '05H';
715     1      =    DECLARE  CONFIG_ACK                       LITERALLY        '06H';
716     1      =    DECLARE  ERROR                            LITERALLY        '07H';
717     1      =    DECLARE  ERROR_ACK                        LITERALLY        '08H';
718     1      =    DECLARE  BUSY                             LITERALLY        '0AH';
               =    /**************************************************************/
719     1      =    DECLARE  CONTROL                          LITERALLY        '30H';
720     1      =    DECLARE  INQUIRE                          LITERALLY        '31H';
721     1      =    DECLARE  STATE                            LITERALLY        '32H';
               =    /**************************************************************/
722     1      =    DECLARE  REFRESH                          LITERALLY        '80H';
723     1      =    DECLARE  DATA_RQ                          LITERALLY        '81H';
724     1      =    DECLARE  DATA                             LITERALLY        '82H';
725     1      =    DECLARE  DATA_ACK                         LITERALLY        '83H';
               =    /**************************************************************/
726     1      =    DECLARE  NAK                              LITERALLY       '0FCH';
727     1      =    DECLARE  ACK                              LITERALLY       '0FDH';
728     1      =    DECLARE  RQ_SUB                           LITERALLY       '0FEH';
729     1      =    DECLARE  STATUS                           LITERALLY       '0FFH';
               =
               =    /****************** PLC BUS ADDRESSES ***************************/
730     1      =    DECLARE  BROADCAST                        LITERALLY        '00H';
731     1      =    DECLARE  COMSET$2000                      LITERALLY        '01H';
732     1      =    DECLARE  METER                            LITERALLY        '02H';
               =
733     1      =    DECLARE  TSTAT$0                          LITERALLY        '08H';
734     1      =    DECLARE  TSTAT$1                          LITERALLY        '09H';
735     1      =    DECLARE  TSTAT$2                          LITERALLY        '0AH';
736     1      =    DECLARE  TSTAT$3                          LITERALLY        '0BH';
737     1      =    DECLARE  TSTAT$4                          LITERALLY        '0CH';
738     1      =    DECLARE  TSTAT$5                          LITERALLY        '0DH';
739     1      =    DECLARE  TSTAT$6                          LITERALLY        '0EH';
740     1      =    DECLARE  TSTAT$7                          LITERALLY        '0FH';
               =
741     1      =    DECLARE  WATER$HTR$1                      LITERALLY        '18H';
742     1      =    DECLARE  WATER$HTR$2                      LITERALLY        '19H';
743     1      =    DECLARE  WATER$HTR$3                      LITERALLY        '1AH';
744     1      =    DECLARE  WATER$HTR$4                      LITERALLY        '1BH';
               =
745     1      =    DECLARE  OFF_PEAK_HIGH_CNTRL_MED          LITERALLY        '3BH';
746     1      =    DECLARE  OFF_PEAK_CNTRL_HIGH              LITERALLY        '3CH';
747     1      =    DECLARE  OFF_PEAK_HIGH_MED                LITERALLY        '3DH';
748     1      =    DECLARE  OFF_PEAK_HIGH                    LITERALLY        '3EH';
749     1      =    DECLARE  OFF_PEAK                         LITERALLY        '3FH';
               =
               =    /*****************************************************************
               =         E X T E R N A L   M O D U L E S   D E C L A R A T I O N
               =    *****************************************************************/
               =
750     2      =    BCD$TO$BIN$CONVERT:  PROCEDURE  (NUMBER)  BYTE  EXTERNAL;
```

```
751   2  =   DECLARE  NUMBER                           BYTE;
752   1  =   END BCD$TO$BIN$CONVERT;
         =
753   2  =   CRITICAL$TIER$CHECK:  PROCEDURE  EXTERNAL;
754   1  =   END CRITICAL$TIER$CHECK;
         =
755   2  =   DEVICE$CONDITION:  PROCEDURE  EXTERNAL;
756   1  =   END DEVICE$CONDITION;
         =
757   2  =   DIAGNOSTICS$TEST:  PROCEDURE  EXTERNAL;
758   1  =   END DIAGNOSTICS$TEST;
         =
759   2  =   ERROR$ACKED:  PROCEDURE  EXTERNAL;
760   1  =   END ERROR$ACKED;
         =
761   2  =   GENERATE$CHECKSUM: PROCEDURE (REQUESTOR) WORD EXTERNAL;
762   2  =   DECLARE  REQUESTOR                        WORD;
763   1  =   END GENERATE$CHECKSUM;
         =
764   2  =   LOAD$PROGRAMS:  PROCEDURE (PROGRAMS)  EXTERNAL;
765   2  =   DECLARE  PROGRAMS                         BYTE;
766   1  =   END LOAD$PROGRAMS;
         =
767   2  =   WHAT$DAY$IS$IT:  PROCEDURE  EXTERNAL;
768   1  =   END WHAT$DAY$IS$IT;
         =
769   1  =   DECLARE  STATEMENT (*) BYTE  CONSTANT
         =   ('Copyright, Johnson Controls Incorporated, 1989. REV. 1.04.
         =     All rights reserved.  Thomas C. Holdorf, August 31, 1989.');
             $NOLIST
             $INCLUDE (DATGEN.STH)
         =
         =   /*****************************************************************/
         =
787   2  =   PROCESS$DATA$TYPE:  PROCEDURE;
         =
788   2  =   IF ANALYZE$DATA$TYPE = YES  THEN
         =
789   3  =   DO CASE TEST$DATA$TYPE;
790   4  =     DO;                                   /* SYSTEM HVAC SCHEDULES */
791   4  =       CALL MOVXX0 (.DATA$RECORD.MSG$DATA,
         =                    .HVAC(0),
         =                    SIZE (HVAC$ARRAY));
         =     /* ADDED 4/21/89 SO THAT HVAC SCHEDULES
         =                         WILL BE LOADED INTO EEPROM FROM THE COMSET */
792   4  =       HVAC$DATA$FLAG = YES;
793   4  =       EEPROM$LOCKED = NO;
794   4  =       DATA$TO$BURN = YES;
         =
795   4  =       AMOUNT = SCHEDULES$SIZE;
796   4  =       RAM$CHECKSUM = GENERATE$CHECKSUM (.SCHEDULES);
         =                               /* CALCULATE CHECKSUM FOR NEW DATA */
797   4  =     END;
         =
798   4  =     DO;                                   /* SYSTEM EWH SCHEDULES */
799   4  =       CALL MOVXX0 (.DATA$RECORD.MSG$DATA,
         =                    .EWH(0),
         =                    SIZE (EWH$ARRAY));
         =     /* ADDED 4/21/89 SO THAT EWH SCHEDULES
         =                         WILL BE LOADED INTO EEPROM FROM THE COMSET */
800   4  =       EWH$DATA$FLAG = YES;
801   4  =       EEPROM$LOCKED = NO;
802   4  =       DATA$TO$BURN = YES;
         =
803   4  =       AMOUNT = SCHEDULES$SIZE;
804   4  =       RAM$CHECKSUM = GENERATE$CHECKSUM (.SCHEDULES);
         =                               /* CALCULATE CHECKSUM FOR NEW DATA */
805   4  =     END;
         =
806   4  =     DO;                                   /* SYSTEM BSR SCHEDULES */
807   4  =       CALL MOVXX0 (.DATA$RECORD.MSG$DATA,
         =                    .BSRDEV$WEEKDAY,
         =                    BSRDEV$SIZE);
         =     /* ADDED 4/21/89 SO THAT BSR WEEKDAY SCHEDULES
         =                         WILL BE LOADED INTO EEPROM FROM THE COMSET */
808   4  =       BSRDEV$DATA$FLAG = YES;
809   4  =       EEPROM$LOCKED = NO;
810   4  =       DATA$TO$BURN = YES;
         =
```

```
811   4  =       AMOUNT = SCHEDULES$SIZE;
812   4  =       RAM$CHECKSUM = GENERATE$CHECKSUM (.SCHEDULES);
         =                                   /* CALCULATE CHECKSUM FOR NEW DATA */
813   4  =     END;
         =
814   4  =     DO;                                        /* SYSTEM BSR SCHEDULES */
815   4  =       CALL MOVXX0 (.DATA$RECORD.MSG$DATA,
         =                    .BSRDEV$WEEKEND,
         =                     BSRDEV$SIZE);
         =     /* ADDED 4/21/89 SO THAT BSR WEEKEND SCHEDULES
         =                        WILL BE LOADED INTO EEPROM FROM THE COMSET */
816   4  =       BSRDEV$DATA$FLAG = YES;
817   4  =       EEPROM$LOCKED = NO;
818   4  =       DATA$TO$BURN = YES;
         =
819   4  =       AMOUNT = SCHEDULES$SIZE;
820   4  =       RAM$CHECKSUM = GENERATE$CHECKSUM (.SCHEDULES);
         =                                   /* CALCULATE CHECKSUM FOR NEW DATA */
821   4  =     END;
         =
822   4  =     DO;                                       /* SYSTEM CONFIGURATION */
823   4  =       CALL MOVXX0 (.DATA$RECORD.MSG$DATA,
         =                    .CONFIG$DATA,
         =                     SIZE (CONFIG$ARRAY));
         =     /* ADDED 4/21/89 SO THAT CONFIGURATION DATA
         =                        WILL BE LOADED INTO EEPROM FROM THE COMSET */
824   4  =       CONFIG$DATA$FLAG = YES;
825   4  =       EEPROM$LOCKED = NO;
826   4  =       DATA$TO$BURN = YES;
827   4  =       Z$BIT$SET = YES;                   /* NEW CONFIGURATION FOR TSTAT */
         =
828   4  =       AMOUNT = SCHEDULES$SIZE;
829   4  =       RAM$CHECKSUM = GENERATE$CHECKSUM (.SCHEDULES);
         =                                   /* CALCULATE CHECKSUM FOR NEW DATA */
830   4  =     END;
         =                                                /* SYSTEM OVERRIDES */
831   3  =     CALL MOVXX0 (.DATA$RECORD.MSG$DATA,
         =                  .OVERRIDES(0),
         =                   SIZE (OVERRIDES));
         =
832   4  =     DO;                                               /* SYSTEM STATUS */
833   4  =       CALL MOVXX0 (.DATA$RECORD.MSG$DATA,
         =                    .SYSTEM$STATUS,
         =                     SIZE (SYSTEM$STATUS));
         =
834   4  =       IF SYSTEM$STATUS.HVAC$OVERRIDE = 1  THEN
835   5  =       DO;
836   5  =         HVAC$TEMPORARY$OVERRIDE = YES;
837   5  =         HVAC$PERMANENT$OVERRIDE = NO;
838   5  =         STATUS$BYTES(0) = STATUS$BYTES(0) AND 0F7H;
         =                                         /* TURN OFF HOLD ELEMENT */
839   5  =       END;
840   4  =       ELSE
         =       IF SYSTEM$STATUS.HVAC$OVERRIDE = 2  THEN
841   5  =       DO;
842   5  =         HVAC$TEMPORARY$OVERRIDE = NO;
843   5  =         HVAC$PERMANENT$OVERRIDE = YES;
844   5  =         STATUS$BYTES(0) = STATUS$BYTES(0) OR 8;
         =                                          /* TURN ON HOLD ELEMENT */
845   5  =       END;
846   4  =       ELSE
         =       DO;
847   5  =         HVAC$TEMPORARY$OVERRIDE = NO;
848   5  =         HVAC$PERMANENT$OVERRIDE = NO;
849   5  =         STATUS$BYTES(0) = STATUS$BYTES(0) AND 0F7H;
         =                                         /* TURN OFF HOLD ELEMENT */
850   5  =       END;
         =
851   4  =       IF SYSTEM$STATUS.EWH$OVERRIDE <> 0  THEN
852   5  =       DO;
853   5  =         EWH$OVERRIDE$FLAG = YES;
854   5  =         EWH$RELAY$ON = YES;
855   5  =         STATUS$BYTES(0) = STATUS$BYTES(0) OR 4;
         =                                    /* TURN ON HEAT WATER ELEMENT */
856   5  =       END;
857   4  =       ELSE
         =       DO;
858   5  =         EWH$OVERRIDE$FLAG = NO;
```

```
859   5  =           STATUS$BYTES(0) = STATUS$BYTES(0) AND 0FBH;
         =                                      /* TURN OFF HEAT WATER ELEMENT */
860   5  =         END;
861   4  =       END;
         =                                                  /* SYSTEM STATISTICS */
862   3  =       CALL MOVXX0 (.DATA$RECORD.MSG$DATA,
         =                    .SYSTEM$STATISTICS,
         =                     SIZE (SYSTEM$STATISTICS));
863   3  =     END;                                          /* END OF DO CASE */
         =
864   2  =     ANALYZE$DATA$TYPE = NO;
         =
865   2  =     IF GENERATE$DATA$TYPE = YES  THEN
866   3  =     DO;
867   3  =       IF TEST$DATA$TYPE < 8  THEN
868   4  =       DO CASE TEST$DATA$TYPE;
869   5  =         DO;                                 /* SYSTEM HVAC SCHEDULES */
870   5  =           CALL MOVXX0 (.HVAC(0),
         =                        .DATA$RECORD.MSG$DATA,
         =                         SIZE (HVAC$ARRAY));
871   5  =           RECORD$OVERHEAD.DATA$LENGTH = SIZE (HVAC$ARRAY) + 1;
872   5  =         END;
         =
873   5  =         DO;                                  /* SYSTEM EWH SCHEDULES */
874   5  =           CALL MOVXX0 (.EWH(0),
         =                        .DATA$RECORD.MSG$DATA,
         =                         SIZE (EWH$ARRAY));
875   5  =           RECORD$OVERHEAD.DATA$LENGTH = SIZE (EWH$ARRAY) + 1;
876   5  =         END;
         =
877   5  =         DO;                           /* SYSTEM BSR WEEKDAY SCHEDULES */
878   5  =           CALL MOVXX0 (.BSRDEV$WEEKDAY,
         =                        .DATA$RECORD.MSG$DATA,
         =                         BSRDEV$SIZE);
879   5  =           RECORD$OVERHEAD.DATA$LENGTH = BSRDEV$SIZE + 1;
880   5  =         END;
         =
881   5  =         DO;                           /* SYSTEM BSR WEEKEND SCHEDULES */
882   5  =           CALL MOVXX0 (.BSRDEV$WEEKEND,
         =                        .DATA$RECORD.MSG$DATA,
         =                         BSRDEV$SIZE);
883   5  =           RECORD$OVERHEAD.DATA$LENGTH = BSRDEV$SIZE + 1;
884   5  =         END;
         =
885   5  =         DO;                                  /* SYSTEM CONFIGURATION */
886   5  =           CALL MOVXX0 (.CONFIG$DATA,
         =                        .DATA$RECORD.MSG$DATA,
         =                         SIZE (CONFIG$ARRAY));
887   5  =           RECORD$OVERHEAD.DATA$LENGTH = SIZE (CONFIG$ARRAY) + 1;
888   5  =         END;
         =
889   5  =         DO.                                      /* SYSTEM OVERRIDES */
890   5  =           CALL MOVXX0 (.OVERRIDES(0),
         =                        .DATA$RECORD.MSG$DATA,
         =                         SIZE (OVERRIDES));
891   5  =           RECORD$OVERHEAD.DATA$LENGTH = SIZE (OVERRIDES) + 1,
892   5  =         END;
         =
893   5  =         DO;                                          /* SYSTEM STATUS */
894   5  =           IF FAN$STATUS = 0  THEN
895   5  =             SYSTEM$STATUS.FAN$MODE = 0;
896   5  =           ELSE
         =             SYSTEM$STATUS.FAN$MODE = 1;
         =
897   5  =           IF EMERG$HEAT$REQUIRED = YES  THEN
898   5  =             SYSTEM$STATUS.EMERGENCY$HEAT = 1;
899   5  =           ELSE
         =             SYSTEM$STATUS.EMERGENCY$HEAT = 0;
         =
900   5  =           IF HVAC$SYSTEM$ACTIVE = YES  THEN
901   5  =             SYSTEM$STATUS.HVAC$ACTIVE = 1;
902   5  =           ELSE
         =             SYSTEM$STATUS.HVAC$ACTIVE = 0;
         =
903   5  =           IF HVAC$TEMPORARY$OVERRIDE = YES  THEN
904   5  =             SYSTEM$STATUS.HVAC$OVERRIDE = 1;
905   5  =           ELSE
         =           IF HVAC$PERMANENT$OVERRIDE = YES  THEN
```

```
906   5  =              SYSTEM$STATUS.HVAC$OVERRIDE = 2;
907   5  =            ELSE
         =              SYSTEM$STATUS.HVAC$OVERRIDE = 0;
         =
908   5  =            IF EWH$RELAY$ON = YES  THEN
909   5  =              SYSTEM$STATUS.EWH$ACTIVE = 1;
910   5  =            ELSE
         =              SYSTEM$STATUS.EWH$ACTIVE = 0;
         =
911   5  =            IF EWH$OVERRIDE$FLAG = YES  THEN
912   5  =              SYSTEM$STATUS.EWH$OVERRIDE = 1;
913   5  =            ELSE
         =              SYSTEM$STATUS.EWH$OVERRIDE = 0;
         =
914   5  =            IF HVAC$OPTIMIZER$ACTIVE = YES  THEN
915   5  =              SYSTEM$STATUS.OPT$ACTIVE = 1;
916   5  =            ELSE
         =              SYSTEM$STATUS.OPT$ACTIVE = 0;
         =
917   5  =            SYSTEM$STATUS.RUNTIME$TOTAL$HTG(0) =
         =                                       FILTER$COUNT$HRS$HUNDRED;
918   5  =            SYSTEM$STATUS.RUNTIME$TOTAL$HTG(1) = FILTER$COUNT$HOURS;
         =
919   5  =            CALL MOVXX0 (.SYSTEM$STATUS,
         =                         .DATA$RECORD.MSG$DATA,
         =                          SIZE (SYSTEM$STATUS));
920   5  =            RECORD$OVERHEAD.DATA$LENGTH = SIZE (SYSTEM$STATUS) + 1;
921   5  =          END;
         =
922   5  =          DO;                                   /* SYSTEM STATISTICS */
923   5  =            CALL MOVXX0 (.SYSTEM$STATISTICS,
         =                         .DATA$RECORD.MSG$DATA,
         =                          SIZE (SYSTEM$STATISTICS));
924   5  =            RECORD$OVERHEAD.DATA$LENGTH = SIZE (SYSTEM$STATISTICS) + 1;
925   5  =          END;
926   4  =        END;                                      /* END OF DO CASE */
         =
927   3  =        ELSE
         =        IF TEST$DATA$TYPE = 12H THEN
928   4  =        DO;
929   4  =          CALL MOVXX0 (.METER$CONTROL.NOT$USED,
         =                       .DATA$RECORD.MSG$DATA,
         =                        SIZE (METER$CONTROL));
930   4  =          RECORD$OVERHEAD.DATA$LENGTH = SIZE (METER$CONTROL) + 1;
931   4  =        END;
         =
932   3  =        ELSE
         =        IF TEST$DATA$TYPE = 16H THEN
933   4  =        DO;
934   4  =          CALL MOVXX0 (.TIER$USAGE.TODAYS$DATE,
         =                       .DATA$RECORD.MSG$DATA,
         =                        SIZE (TIER$USAGE));
935   4  =          RECORD$OVERHEAD.DATA$LENGTH = SIZE (TIER$USAGE) + 1;
936   4  =        END;
         =
937   3  =        ELSE
         =        IF TEST$DATA$TYPE = 22H THEN
938   4  =        DO;
939   4  =          CALL MOVXX0 (.DIRECT$LOAD$CONTROL.START$DATE,
         =                       .DATA$RECORD.MSG$DATA,
         =                        SIZE (DIRECT$LOAD$CONTROL));
940   4  =          RECORD$OVERHEAD.DATA$LENGTH = SIZE (DIRECT$LOAD$CONTROL) + 1;
941   4  =        END;
         =
942   3  =        ELSE
         =        IF TEST$DATA$TYPE = 91H THEN
943   4  =        DO;
944   4  =          CALL MOVXX0 (.PRICING$DATA.TSTAT$DISPLAY,
         =                       .DATA$RECORD.MSG$DATA,
         =                        SIZE (PRICING$DATA));
945   4  =          RECORD$OVERHEAD.DATA$LENGTH = SIZE (PRICING$DATA) + 1;
946   4  =        END;
         =
947   3  =        ELSE
         =        IF (TEST$DATA$TYPE > 5FH) AND (TEST$DATA$TYPE < 88H)  THEN
948   4  =        DO;
949   4  =          TEST$DATA$TYPE = (TEST$DATA$TYPE - 60H) + TIER$INDEX;
950   4  =          IF TEST$DATA$TYPE > 39  THEN
```

```
951   4  =          TEST$DATA$TYPE = TEST$DATA$TYPE - 40;
         =
952   4  =        CALL MOVXX0 (.TIER$DATA(TEST$DATA$TYPE).DATE(0),
         =                     .DATA$RECORD.MSG$DATA,
         =                      TIER$DATA$SIZE);
         =
953   4  =        RECORD$OVERHEAD.DATA$LENGTH = TIER$DATA$SIZE + 1;
954   4  =      END;
955   3  =    END;
         =
956   2  =    GENERATE$DATA$TYPE = NO;
         =
957   1  =    END PROCESS$DATA$TYPE;
         =
         =    /*****************************************************************/
         =
958   2  =    DATA$MESSAGE$GENERATION:  PROCEDURE  PUBLIC;
         =
959   2  =    IF DATA$REQUEST$MSG = YES  THEN
960   3  =    DO;                                 /* BUILD DATA REQUEST MESSAGE */
961   3  =      RECORD$OVERHEAD.RECORD$TYPE = 2;
962   3  =      RECORD$OVERHEAD.DATA$LENGTH =
         =                                 DEVICE$RECORD.NUMBER$DATA$TYPES + 3;
963   3  =      DEVICE$RECORD.PLC$ADDRESS = DATA$DESTINATION;
         =                                   /* DEVICE ADDRESS WHICH HAS DATA */
964   3  =      DEVICE$RECORD.PROCESS = DATA$PROCESS;
965   3  =      IF REQUESTED$DATA$TYPES(0) <> 0  THEN
966   3  =        SESSION$COUNTER = 1;
967   3  =      ELSE
         =        SESSION$COUNTER = 0;             /* NO DATA TYPES REQUESTED */
968   3  =    END;
         =
969   2  =    ELSE
         =    DO;                                          /* BUILD DATA MESSAGE */
970   3  =      IF FIRST$DATA$TYPE$MESSAGE$FLAG = YES  THEN
971   4  =      DO;
972   4  =        RECORD$OVERHEAD.RECORD$TYPE = 2;
973   4  =        RECORD$OVERHEAD.DATA$LENGTH = 2;
974   4  =        DEVICE$RECORD.PLC$ADDRESS = PLC$ADDR;
         =                                              /* DATA FROM CONTROLLER */
975   4  =        DEVICE$RECORD.PROCESS = DATA$PROCESS;
976   4  =        FIRST$DATA$TYPE$MESSAGE$FLAG = NO;
         =
977   4  =        IF DEVICE$RECORD.NUMBER$DATA$TYPES = 0  THEN
978   4  =          SESSION$COUNTER = 0;
979   4  =        ELSE
         =          DATA$TYPE$INDEX = 1;
980   4  =      END;
         =
981   3  =      ELSE
         =      DO;
982   4  =        RECORD$OVERHEAD.RECORD$TYPE = 3;
983   4  =        DATA$RECORD.DATA$TYPE = REQUESTED$DATA$TYPES(DATA$TYPE$INDEX);
984   4  =        TEST$DATA$TYPE = REQUESTED$DATA$TYPES(DATA$TYPE$INDEX);
         =
985   4  =        GENERATE$DATA$TYPE = YES;
         =
986   4  =        IF TEST$DATA$TYPE > 9FH  THEN
987   5  =        DO CASE CONTROLLER$ADDRESS;
         =
988   5  =          TEST$DATA$TYPE = DATA$RECORD.DATA$TYPE - 0A0H;
         =
989   5  =          TEST$DATA$TYPE = DATA$RECORD.DATA$TYPE - 0A8H;
         =
990   5  =          TEST$DATA$TYPE = DATA$RECORD.DATA$TYPE - 0B0H;
         =
991   5  =          TEST$DATA$TYPE = DATA$RECORD.DATA$TYPE - 0B8H;
         =
992   5  =        END,               /* END OF DO CASE FOR CONTROLLER ADDRESS */
         =
993   4  =        CALL PROCESS$DATA$TYPE;
         =
994   4  =        GENERATE$DATA$TYPE = NO;
995   4  =        DATA$TYPE$INDEX = DATA$TYPE$INDEX + 1;
996   4  =        REQUESTED$DATA$TYPES(0) = REQUESTED$DATA$TYPES(0) - 1;
997   4  =      END;
998   3  =    END;
         =
```

```
 999   2  =   MISC$WORD = 0;
1000   2  =   CRC$WORD =
          =           calculate_crc (.DATA$BUFFER(4),
          =                          RECORD$OVERHEAD.DATA$LENGTH,
          =                          MISC$WORD);
          =
1001   2  =   RECORD$OVERHEAD.RECORD$CRC = CRC$WORD;
          =                      /* MOVE RECORD OVERHEAD INTO TRANSMIT BUFFER */
          =
1002   2  =   DATA$SIZE = RECORD$OVERHEAD.DATA$LENGTH + 4;
1003   2  =   BUFFER$INDEX = 0;
          =
1004   2  =   DATA$MESSAGE$BUILT = YES;
          =
1005   1  =   END DATA$MESSAGE$GENERATION;

              $TITLE ('TRANSMIT BRICK MESSAGE')
              $INCLUDE (XMTBRK.STH)
          =
          =   /*************************************************************/
          =
1006   2  =   TERMINATE$DATA$SESSION:  PROCEDURE  PUBLIC;
          =
1007   2  =   IF (MAIN$DATA$TIMER = 0) OR (INITIATED$DATA$SESSION = 0)  THEN
1008   3  =   DO;              /* GENERATE ERROR MESSAGE FOR BAD DATA SESSION */
1009   3  =     ERROR$ALERT = YES;
1010   3  =     S$P$TIMER$ACTIVE$ = YES;
          =   /*** MODIFY ERROR BYTES TO INDICATE DATA SESSION
          =                  TERMINATED AND CLEAR DATA TIMERS & MSG FLAGS ***/
1011   3  =     SEND$ERROR$MSG.PROCESS$NUMBERS = SYSTEM$PROCESS,
          =
1012   3  =     IF CURRENT$DEVICE = METER  THEN
1013   3  =       SEND$ERROR$MSG.ERROR$TYPE(ERROR$INDEX) =
          =                                             BAD$METER$DATA$SESSION;
1014   3  =     ELSE
          =     IF CURRENT$DEVICE = COMSET$2000  THEN
1015   4  =     DO;
1016   4  =       IF (CURRENT$PROCESS AND 88H) = 0  THEN
1017   4  =         SEND$ERROR$MSG.ERROR$TYPE(ERROR$INDEX) =
          =                                       BAD$COMSET$2000$DATA$SESSION;
1018   4  =       ELSE
          =         SEND$ERROR$MSG.ERROR$TYPE(ERROR$INDEX) =
          =                                          BAD$COMSET_B$DATA$SESSION;
1019   4  =     END;
          =
1020   3  =     ELSE
          =       SEND$ERROR$MSG.ERROR$TYPE(ERROR$INDEX) =
          =                                             UNDEFINED$DEVICE$ERROR;
          =
1021   3  =     IF DATA$DESTINATION = PLC$ADDR  THEN
1022   3  =       SEND$ERROR$MSG.ERROR$TYPE(ERROR$INDEX) =
          =                                            BAD$DESTINATION$ADDRESS,
1023   3  =     IF ERROR$INDEX > 13 THEN
1024   3  =       SEND$ERROR$MSG.ERROR$TYPE(ERROR$INDEX) =
          =                          ERROR$BUFFER$OVERFLOW; /* ADDED 3/16/89 */
          =
          =   /*** ADDED 8/4/89 ***/
1025   3  =     ELSE
          =       ERROR$INDEX = ERROR$INDEX + 1;
          =   /*** FOR PROPER DATA FIELD MANAGEMENT ***/
          =
1026   3  =     BUSY$FLAG = NO;
1027   3  =     MAIN$DATA$TIMER$ACTIVE = NO,
1028   3  =     DATA$SESSION$TIMER$ACTIVE = NO;
1029   3  =     DATA$PACKET$TIMER$ACTIVE = NO;
          =
1030   3  =   END;
          =
1031   2  =   ELSE
          =   DO;
1032   3  =     DATA$SESSION$TIMER$ACTIVE = YES,   /* ACTIVATE 2 MINUTE TIMER */
1033   3  =     DATA$SESSION$TIMER = 120;
1034   3  =   END;
          =
1035   2  =   BUSY$MSG$TIMER$ACTIVE = NO;                     /* ADDED 3/16/89 */
1036   2  =   DATA$MESSAGE$BUILT = NO;
1037   2  =   DATA$MESSAGE$INHIBIT = NO;
```

```
1038   2  =   DATA$MSG = NO;
1039   2  =   DATA$REQUEST$MSG = NO;
1040   2  =   DATA$TIMER$ACTIVE = NO;
1041   2  =   NEW$RECORD = YES;
1042   2  =   READY$TO$RESPOND = NO;
1043   2  =   READY$TO$SEND$TERMINATOR = NO;
1044   2  =   REFRESH$REQUEST$MESSAGE = NO;                       /* ADDED 3/16/89 */
1045   2  =   TERMINATOR$FLAG = NO;
1046   2  =   TERMINATOR$RECEIVED = NO;
1047   2  =   WAITING$FOR$DATA$ACK$FLAG = NO;
          =
1048   2  =   CURRENT$DEVICE = 0;
1049   2  =   CURRENT$PROCESS = 0;
1050   2  =   DATA$PROCESS = 0;
1051   2  =   DATA$DESTINATION = 0;
1052   2  =   DATA$TIMER = 0;
1053   2  =   MESSAGE$PROCESS = 0;
1054   2  =   SESSION$COUNTER = 0;
          =
1055   1  =   END TERMINATE$DATA$SESSION;
          =
          =   /*****************************************************************/
          =
1056   2  =   SEND$BRICK$MSG: PROCEDURE  PUBLIC;
          =
1057   2  =   WATCHDOG$TIMER = YES;                    /* TOGGLE WATCHDOG TIMER */
1058   2  =   WATCHDOG$TIMER = NO;                        /* TO MAINTAIN SANITY */
          =
1059   2  =   IF BUSY$MSG$TIMER$ACTIVE = NO  THEN
          =                                      /* TEST FOR NO "BUSY" TIME DELAY */
1060   3  =   DO;
          =                    /* READY TO TRANSMIT A BRICK MESSGAE IF NECESSARY */
1061   3  =     IF (SENT$ONCE$FLAG = NO) AND (RESEND$DATA$MESSAGE = NO)  THEN
1062   4  =     DO;
1063   4  =       MSG$TO$XMIT = 0;                      /* INITIALIZED FOR TESTING */
          =
1064   4  =       IF (S$P$TIMER$ACTIVE = YES) AND (S$P$TIMER) = 0  THEN
1065   5  =       DO;   /* TEST FOR ANY TIMED SYSTEM PROCESS MESSAGES TO SEND */
1066   5  =         IF ERROR$ALERT = YES  THEN
1067   5  =           MSG$TO$XMIT = ERROR;
          =
1068   5  =         ELSE
          =         IF WHAT$TIME$MSG = YES  THEN
1069   5  =           MSG$TO$XMIT = WHAT_TIME;
          =
1070   5  =         ELSE
          =         DO;
1071   6  =           S$P$TIMER$ACTIVE = NO;
1072   6  =           S$P$TIMER = 0;
1073   6  =         END;
1074   5  =       END;
          =
1075   4  =       IF MSG$TO$XMIT = 0  THEN
1076   5  =       DO;                          /*TEST FOR ANY DATA MESSAGES TO SEND */
1077   5  =         IF (DATA$TIMER$ACTIVE = YES) AND (DATA$TIMER = 0)  THEN
1078   6  =         DO;
1079   6  =           IF PASS$THRU$MESSAGE = YES  THEN
1080   7  =           DO;
1081   7  =             CALL MOVXX0 (.DATA$SAVED$BUFFER,
          =                          .TRANS$BRICK$MESSAGE,
          =                          SIZE (TRANS$BRICK$MESSAGE));
1082   7  =             MSG$TO$XMIT = TRANS$BRICK$MESSAGE(1);
1083   7  =           END;
          =
1084   6  =           ELSE
          =           DO;
1085   7  =             IF READY$TO$RESPOND = NO  THEN /* TERMINATOR DETECTED */
1086   8  =             DO;
1087   8  =               IF DATA$ACK$MSG = YES  THEN
1088   8  =                 MSG$TO$XMIT = DATA_ACK;
1089   8  =             END;
          =
1090   7  =             ELSE
          =             DO;
1091   8  =               IF WAITING$FOR$DATA$ACK$FLAG = NO  THEN
1092   9  =               DO;
1093   9  =                 IF DATA$REQUEST$MSG = YES  THEN
1094   9  =                   MSG$TO$XMIT = DATA_RQ;
          =
```

```
1095   9  =              ELSE
          =              IF DATA$MSG = YES  THEN
1096   9  =                MSG$TO$XMIT = DATA;
          =
1097   9  =              ELSE
          =                DATA$TIMER$ACTIVE = NO;
1098   9  =            END;
1099   8  =          END;
1100   7  =        END;
1101   6  =      END;
1102   5  =    END;
          =
1103   4  =    IF MSG$TO$XMIT = 0  THEN
1104   5  =    DO;                   /* TEST FOR ANY OTHER MESSAGES TO SEND */
1105   5  =      IF TIME$MSG = YES  THEN
1106   5  =        MSG$TO$XMIT = TIME;
          =
1107   5  =      ELSE
          =      IF DIAG$ACK$MSG = YES  THEN
1108   5  =        MSG$TO$XMIT = DIAG_ACK;
          =
1109   5  =      ELSE
          =      IF CONFIG$ACK$MSG = YES  THEN
1110   5  =        MSG$TO$XMIT = CONFIG_ACK;
          =
1111   5  =      ELSE
          =      IF ERROR$ACK$MSG = YES  THEN
1112   5  =        MSG$TO$XMIT = ERROR_ACK;
          =
1113   5  =      ELSE
          =      IF BUSY$MSG = YES  THEN
1114   5  =        MSG$TO$XMIT = BUSY;
          =
1115   5  =      ELSE
          =      IF CONTROL$MSG = YES  THEN
1116   5  =        MSG$TO$XMIT = CONTROL;
          =
1117   5  =      ELSE
          =      IF INQUIRE$MSG = YES  THEN
1118   5  =        MSG$TO$XMIT = INQUIRE;
          =
1119   5  =      ELSE
          =      IF REQ$SUBADDRESS$MSG = YES  THEN
1120   5  =        MSG$TO$XMIT = RQ_SUB;
          =
1121   5  =      ELSE
          =      IF REQ$STATUS$MSG = YES  THEN
1122   5  =        MSG$TO$XMIT = STATUS;
1123   5  =    END;
1124   4  =  END;
          =
1125   3  =  ELSE
          =    MSG$TO$XMIT = TRANS$BRICK$MSG.MSG$TYPE;
          =
1126   3  =  IF ((TRANS$BRINDEX = 0) OR (TRANS$BRINDEX > 20))
          =                    AND
          =          (MSG$TO$XMIT <> 0)  THEN
1127   4  =  DO;
1128   4  =    IF MSG$TO$XMIT <= MAX$SYSTEM$MESSAGE$TYPE  THEN
1129   5  =    DO CASE  MSG$TO$XMIT;
1130   5  =      ;                          /*** NO MESSAGE TYPE 0 ***/
          =
          =                      /*** TYPE 1 - REQUEST FOR TIME ***/
1131   6  =      DO;
1132   6  =        TRANS$BRICK$MSG.BYTE$COUNT = 1;        /* PROCESS BYTE */
1133   6  =        TRANS$BRICK$MSG.MSG$TYPE = MSG$TO$XMIT;
1134   6  =        TRANS$BRICK$MSG.DESTINATION$ADDRESS = METER;
1135   6  =        TRANS$BRICK$MSG.PROCESS$NUMBERS = SYSTEM$PROCESS;
          =
1136   6  =        S$P$TIMER = 2;              /* ACTIVATE 2 MINUTE TIMER */
1137   6  =      END;
          =
          =                      /*** TYPE 2 - SEND CURRENT TIME ***/
1138   6  =      DO;
1139   6  =        SEND$TIME$MSG.MSG$TYPE = MSG$TO$XMIT;
1140   6  =        CALL MOVXX0 (.TIME$AND$DATE.YEAR,
          =                     .SEND$TIME$MSG.DATA$FIELD,
          =                      TIME$DATA$SIZE);
          =
```

```
1141   6  =        CALL MOVXX0 (.SENDSTIME$MSG,
          =                     .TRANS$BRICK$MSG,
          =                      SIZE (SEND$TIME$MSG));
1142   6  =      END;
          =
1143   5  =      ;                    /*** TYPE 3 - MESSAGE IS NEVER SENT ***/
          =
          =            /*** TYPE 4 - SEND DIAGNOSTIC STATUS INFORMATION ***/
1144   6  =      DO;
1145   6  =        SEND$DIAG$ACK$MSG.MSG$TYPE = MSG$TO$XMIT;
1146   6  =        CALL MOVXX0 (.SEND$DIAG$ACK$MSG,
          =                     .TRANS$BRICK$MSG,
          =                      SIZE (SEND$DIAG$ACK$MSG));
1147   6  =      END;
          =
1148   5  =      ;                    /*** TYPE 5 - MESSAGE IS NEVER SENT ***/
          =
          =            /*** TYPE 6 - SEND CONFIGURATION VERSION NUMBERS ***/
1149   6  =      DO;
1150   6  =        SEND$CONFIG$ACK$MSG.MSG$TYPE = MSG$TO$XMIT;
1151   6  =        CALL MOVXX0 ( SEND$CONFIG$ACK$MSG,
          =                     .TRANS$BRICK$MSG,
          =                      SIZE (SEND$CONFIG$ACK$MSG));
1152   6  =      END,
          =
          =                          /*** TYPE 7 - SEND ERROR MESSAGE ***/
1153   6  =      DO;
1154   6  =        SEND$ERROR$MSG.BYTE$COUNT = ERROR$INDEX + 1;
          =                          /* (ERROR BYTES - 1) + PROCESS BYTE */
1155   6  =        SEND$ERROR$MSG.MSG$TYPE = MSG$TO$XMIT;
1156   6  =        SEND$ERROR$MSG.DESTINATION$ADDRESS = COMSET$2000;
          =
1157   6  =        CALL MOVXX0 (.SEND$ERROR$MSG,
          =                     .TRANS$BRICK$MSG,
          =                     (ERROR$INDEX + 4));
1158   6  =        S$P$TIMER = 2;                 /* ACTIVATE 2 MINUTE TIMER */
1159   6  =      END,
          =
          =                /*** TYPE 8 - SEND ERROR ACKNOWLEDGE MESSAGE ***/
1160   6  =      DO;
1161   6  =        SEND$ERROR$ACK$MSG.MSG$TYPE = MSG$TO$XMIT;
1162   6  =        CALL MOVXX0 (.SEND$ERROR$ACK$MSG,
          =                     .TRANS$BRICK$MSG,
          =                      SIZE (SEND$ERROR$ACK$MSG));
1163   6  =      END;
          =
1164   5  =      ;                    /*** TYPE 9 - MESSAGE IS NEVER SENT ***/
          =
          =                          /*** TYPE 10 - SEND BUSY MESSAGE ***/
1165   6  =      DO;
1166   6  =        SEND$BUSY$MSG.BYTE$COUNT = 1;          /* PROCESS BYTE */
1167   6  =        SEND$BUSY$MSG.MSG$TYPE = MSG$TO$XMIT;
1168   6  =        CALL MOVXX0 (.SEND$BUSY$MSG,
          =                     .TRANS$BRICK$MSG,
          =                      SIZE (SEND$BUSY$MSG));
1169   6  =      END;
1170   5  =    END;              /*** END OF SYSTEM TYPE MESSAGE DO CASE ***/
          =
1171   4  =    ELSE
          =    IF (MSG$TO$XMIT >= MIN$DEVICE$MESSAGE$TYPE) AND
          =       (MSG$TO$XMIT <= MAX$DEVICE$MESSAGE$TYPE)  THEN
1172   5  =    DO;
1173   5  =      SEND$DEVICE$MSG.DESTINATION$ADDRESS = DEV$ADDRESS;
1174   5  =      SEND$DEVICE$MSG.MSG$TYPE = MSG$TO$XMIT;
1175   5  =      SEND$DEVICE$MSG.PROCESS$NUMBERS = SYSTEM$PROCESS;
          =
1176   6  =      DO CASE  (MSG$TO$XMIT - MIN$DEVICE$MESSAGE$TYPE);
          =
1177   7  =        DO;   /* MESSAGE TYPE 30 - CONTROL (COMMAND) THE DEVICE */
1178   7  =          SEND$DEVICE$MSG.BYTE$COUNT = 2;
          =                          /* DEVICE STATE BYTE + PROCESS BYTE */
1179   7  =          SEND$DEVICE$MSG.DEVICE$STATE = DEV$STATE;
1180   7  =        END;
          =
          =                /* MESSAGE TYPE 31 - INQUIRE (STATE OF) DEVICE */
1181   6  =        SEND$DEVICE$MSG.BYTE$COUNT = 1;         /* PROCESS BYTE */
          =
1182   6  =        ;            /* THIS MESSAGE TYPE (STATUS) IS NEVER SENT */
          =
```

```
1183   6  =          END;            /*** END OF DEVICE TYPE MESSAGE DO CASE ***/
          =
1184   5  =          CALL MOVXX0 (.SEND$DEVICE$MSG,
          =                       .TRANS$BRICK$MSG,
          =                       (SEND$DEVICE$MSG.BYTE$COUNT + MSG$OVERHEAD));
1185   5  =        END;
          =
1186   4  =        ELSE
          =        IF (MSG$TO$XMIT >= MIN$DATA$MESSAGE$TYPE)  AND
          =           (MSG$TO$XMIT < DATA_ACK)  THEN
1187   5  =        DO;
1188   5  =          DATA$TIMER = 5;          /* LOAD RESPONSE TIME (5 SECONDS ) */
          =
1189   5  =          IF DATA$MESSAGE$INHIBIT = NO  THEN
1190   6  =          DO;
1191   6  =            IF (RESEND$DATA$MESSAGE = NO) AND
          =                                      (PASS$THRU$MESSAGE = NO)  THEN
1192   7  =            DO;
1193   7  =              TRANS$BRICK$MSG.MSG$TYPE = MSG$TO$XMIT;
1194   7  =              TRANS$BRICK$MSG.DESTINATION$ADDRESS = DATA$DESTINATION;
1195   7  =              CURRENT$DEVICE = DATA$DESTINATION;
1196   7  =              TRANS$BRICK$MSG.PROCESS$NUMBERS = MESSAGE$PROCESS OR 1;
          =
1197   7  =              IF READY$TO$SEND$TERMINATOR = YES  THEN
1198   8  =              DO;
1199   8  =                READY$TO$SEND$TERMINATOR = NO;
1200   8  =                TERMINATOR$FLAG = YES;
1201   8  =                TRANS$BRICK$MSG.DATA$FIELD(0) = 0FFH;
          =                                               /* TERMINATION BYTE */
1202   8  =                TRANS$BRICK$MSG.BYTE$COUNT = 2;
1203   8  =                WAITING$FOR$DATA$ACK$FLAG = YES;
1204   8  =                DATA$MESSAGE$BUILT = NO;
1205   8  =                BUFFER$INDEX = 0;
1206   8  =              END;
          =
1207   7  =              ELSE
          =              DO;
1208   8  =                BUSY$FLAG = YES;         /* DATA SESSION IN PROGRESS */
1209   8  =                IF DATA$MESSAGE$BUILT = NO  THEN
          =
1210   9  =                DO CASE  (MSG$TO$XMIT - MIN$DATA$MESSAGE$TYPE);
          =
1211   9  =                  ;         /* REFRESH MESSAGE NOT USED BY CONTROLLER */
          =
          =                        /* PREPARE TO TRANSMIT DATA REQUEST MESSAGE */
          =
1212   9  =                  CALL DATA$MESSAGE$GENERATION;
          =                                         /* BUILD DATA_RQ MESSAGE */
          =
1213  10  =                  DO;           /* PREPARE TO TRANSMIT DATA MESSAGE */
1214  10  =                    IF FIRST$TIME$DATA$MESSAGE = YES  THEN
1215  11  =                    DO;              /* BUILD DEVICE RECORD MESSAGE */
1216  11  =                      FIRST$DATA$TYPE$MESSAGE$FLAG = YES;
1217  11  =                      FIRST$TIME$DATA$MESSAGE = NO;
1218  11  =                    END;
          =
1219  10  =                    CALL DATA$MESSAGE$GENERATION;
          =                                            /* BUILD DATA MESSAGE */
1220  10  =                  END;
1221   9  =                END;       /* END OF DO CASE FOR DATA TYPE MESSAGES */
          =
1222   8  =                IF DATA$SIZE <= DATA$FIELD$SIZE  THEN
1223   9  =                DO;
1224   9  =                  TRANS$BRICK$MSG.BYTE$COUNT = DATA$SIZE + 1;
1225   9  =                  WAITING$FOR$DATA$ACK$FLAG = YES;
1226   9  =                  CALL MOVXX0 (.DATA$BUFFER(BUFFER$INDEX),
          =                               .TRANS$BRICK$MSG.DATA$FIELD,
          =                                DATA$SIZE);
1227   9  =                  IF MSG$TO$XMIT = DATA  THEN
1228  10  =                  DO; /** TEST FOR ANY MORE DATA MESSAGES TO BUILD **/
1229  10  =                    IF REQUESTED$DATA$TYPES(0) <> 0 THEN
1230  10  =                      DATA$MESSAGE$BUILT = NO;
          =                                     /* BUILD ANOTHER DATA MESSAGE */
1231  10  =                    ELSE
          =                    DO;
1232  11  =                      DATA$MESSAGE$BUILT = YES;
1233  11  =                      READY$TO$SEND$TERMINATOR = YES;
1234  11  =                    END;
```

```
1235  10  =                  END;
          =
1236   9  =                  ELSE
          =                  DO;
1237  10  =                    DATA$MESSAGE$BUILT = YES;
1238  10  =                    READY$TO$SEND$TERMINATOR = YES;
1239  10  =                  END;
1240   9  =                END;
          =
1241   8  =                ELSE
          =                DO;
1242   9  =                  TRANS$BRICK$MSG.BYTE$COUNT = DATA$FIELD$SIZE + 1;
1243   9  =                  CALL MOVXX0 (.DATA$BUFFER(BUFFER$INDEX),
          =                         .TRANS$BRICK$MSG.DATA$FIELD,
          =                          DATA$FIELD$SIZE);
1244   9  =                  DATA$SIZE = DATA$SIZE - DATA$FIELD$SIZE;
          =                                       /* DATA LEFT TO TRANSMIT */
1245   9  =                  BUFFER$INDEX = BUFFER$INDEX + DATA$FIELD$SIZE;
          =                /* ADJUST DATA BUFFER POINTER FOR NEXT DATA MESSAGE */
1246   9  =                END;
1247   8  =              END;
1248   7  =            END;
1249   6  =          END;
1250   5  =        END;
          =
1251   4  =        ELSE
          =        IF MSG$TO$XMIT = DATA_ACK  THEN
1252   5  =        DO;                   /* BUILD DATA ACKNOWLEDGE MESSAGE */
1253   5  =          DATA$TIMER = 5;
1254   5  =          TRANS$BRICK$MSG.BYTE$COUNT = 2;   /* PROCESS NUMBER + ACK */
1255   5  =          TRANS$BRICK$MSG.MSG$TYPE = MSG$TO$XMIT;
1256   5  =          TRANS$BRICK$MSG.DESTINATION$ADDRESS = CURRENT$DEVICE;
1257   5  =          TRANS$BRICK$MSG.PROCESS$NUMBERS = MESSAGE$PROCESS OR 1;
1258   5  =          NEW$RECORD = YES;
          =
1259   5  =          IF DATA$INTEGRITY = YES  THEN
1260   6  =          DO;
1261   6  =            TRANS$BRICK$MSG.DATA$FIELD(0) = 0;
1262   6  =            IF TERMINATOR$RECEIVED = YES  THEN
1263   7  =            DO;
1264   7  =              IF SESSION$COUNTER = 0  THEN
1265   8  =              DO;
1266   8  =                BRICK$DELAY$TIMER$ACTIVE = YES;
1267   8  =                BRICK$DELAY$TIMER = 20;/* 20 SECOND DELAY FOR BRICK */
1268   8  =                DATA$TIMER$ACTIVE = NO;
1269   8  =                CURRENT$DEVICE = 0;
1270   8  =                CURRENT$PROCESS = 0;
1271   8  =                BUSY$FLAG = NO;
1272   8  =              END;
          =
1273   7  =              ELSE
          =                SESSION$COUNTER = SESSION$COUNTER - 1;
          =
1274   7  =              TERMINATOR$RECEIVED = NO;
1275   7  =              READY$TO$RESPOND = YES;
1276   7  =              DATA$TIMER = 0;
1277   7  =            END;
1278   6  =          END;
          =
1279   5  =          ELSE
          =          DO;
1280   6  =            TRANS$BRICK$MSG.DATA$FIELD(0) = 0FFH;
1281   6  =            DATA$TIMER = 10;            /* RELOAD DATA TIMER VALUE */
1282   6  =            DATA$MESSAGE$TIMER = 10;      /* START 10 SECOND DELAY */

1283   6  =            DATA$MESSAGE$INHIBIT = YES;
          =                                 /* INHIBIT DATA TYPE MESSAGES */
1284   6  =          END;
1285   5  =        END;
          =
1286   4  =        ELSE
          =        IF (MSG$TO$XMIT >=MIN$BRICK$MESSAGE$TYPE) AND
          =           (MSG$TO$XMIT <=MAX$BRICK$MESSAGE$TYPE)  THEN
1287   5  =        DO;
1288   5  =          TRANS$BRICK$MSG.MSG$TYPE = MSG$TO$XMIT;
          =
1289   6  =          DO CASE  (MSG$TO$XMIT - MIN$BRICK$MESSAGE$TYPE);
          =
```

```
1290  6  =             ;                 /* THIS MESSAGE IS ONLY SENT BY THE BRICK */
         =
1291  6  =             ,                 /* THIS MESSAGE IS ONLY SENT BY THE BRICK */
         =
1292  7  =             DO;  /* MESSAGE TYPE FE - REQUESTS SUB-ADDRESS OF BRICK */
1293  7  =               TRANS$BRICK$MSG.BYTE$COUNT = 0;
1294  7  =               TRANS$BRICK$MSG.DESTINATION$ADDRESS = 0FFH;
1295  7  =             END;
         =
1296  7  =             DO;   /* MESSAGE TYPE FF - REQUESTS THE STATUS OF BRICK */
1297  7  =               TRANS$BRICK$MSG.BYTE$COUNT = 0;
1298  7  =               TRANS$BRICK$MSG.DESTINATION$ADDRESS = PLC$ADDR;
1299  7  =             END;
         =
1300  6  =           END;              /*** END OF BRICK TYPE MESSAGE DO CASE ***/
1301  5  =         END;
         =
1302  4  =         IF TRANS$BRICK$MSG.DESTINATION$ADDRESS <> BUSY$DEVICE  THEN
1303  5  =         DO;
1304  5  =           IF (DATA$MESSAGE$INHIBIT = NO) OR
         =                                               ((DATA$MESSAGE$INHIBIT = YES)
         =                                                              AND
         =                                               ((MSG$TO$XMIT <> DATA_RQ) AND
         =                                                (MSG$TO$XMIT <> DATA)))  THEN
1305  6  =           DO;
         =
         =   /***** THIS BLOCK TRANSMIT THE FIRST BYTE OF THE MESSAGE
         =                    AND SETS THE PARAMETERS FOR BRICK RESPONSE *****/
         =
1306  6  =             AMOUNT = TRANS$BRICK$MSG.BYTE$COUNT + MSG$OVERHEAD;
1307  6  =             TRANS$BRICK$MESSAGE
         =                       (TRANS$BRICK$MSG.BYTE$COUNT + MSG$OVERHEAD) =
         =                                   GENERATE$CHECKSUM (.TRANS$BRICK$MSG);
         =                           /* CALCULATE CHECKSUM FOR TSTAT MESSAGE */
         =
1308  6  =             SBUF = TRANS$BRICK$MESSAGE(0);    /* STARTS TRANSMISSION */
1309  6  =             TRANS$BRINDEX = 1;      /* POINT TO NEXT BYTE IN MESSAGE */
         =
1310  6  =             WAITING = YES;                  /* FOR RESPONSE FROM BRICK */
1311  6  =             READY$TO$TRANSMIT$FLAG = NO;
1312  6  =             BRICK$MESSAGE$TIMER = 10;                /* TEN SECOND DELAY */
         =
1313  6  =           END;
1314  5  =         END;
1315  4  =       END;
1316  3  =     END;
         =
1317  1  =     END SEND$BRICK$MSG;

               $TITLE ('DATA MESSAGE ANALYSIS')
               $INCLUDE (DATANA.STH)
         =
         =     /**************************************************************/
         =
1318  2  =     MONTH$TO$DAYS$CONVERT:  PROCEDURE (CONVERT$MONTH) WORD  PUBLIC;
         =
1319  2  =     DECLARE  CONVERT$MONTH                    WORD;
         =
1320  2  =     IF CONVERT$MONTH < 10  THEN
1321  3  =     DO CASE CONVERT$MONTH;
1322  3  =       ;
1323  3  =       CONVERT$MONTH =   0;
1324  3  =       CONVERT$MONTH =  31;
1325  3  =       CONVERT$MONTH =  59;
1326  3  =       CONVERT$MONTH =  90;
1327  3  =       CONVERT$MONTH = 120;
1328  3  =       CONVERT$MONTH = 151;
1329  3  =       CONVERT$MONTH = 181;
1330  3  =       CONVERT$MONTH = 212,
1331  3  =       CONVERT$MONTH = 243;
1332  3  =     END;
         =
1333  2  =     ELSE IF ( (CONVERT$MONTH < 13H) and (CONVERT$MONTH > 0FH) )  THEN
         =     /*** ADDED 8/1/89 TO TEST FOR HEX VALUES 0AH TO 0FH ***/
1334  3  =     DO CASE (CONVERT$MONTH - 10H);
1335  3  =       CONVERT$MONTH = 273;
1336  3  =       CONVERT$MONTH = 304;
```

```
1337   3  =      CONVERT$MONTH = 334;
1338   3  =    END;
          =
1339   2  =    ELSE
          =    DO;
1340   3  =      DLC$DATA$NEEDED = YES;
1341   3  =      SEND$ERROR$MSG.ERROR$TYPE(ERROR$INDEX) = BAD$DLC$DATA;
1342   3  =      IF ERROR$INDEX > 13 THEN
1343   3  =        SEND$ERROR$MSG.ERROR$TYPE(ERROR$INDEX) =
          =                           ERROR$BUFFER$OVERFLOW; /* ADDED 3/16/89 */
1344   3  =      ELSE
          =        ERROR$INDEX = ERROR$INDEX + 1;
          =
1345   3  =      ERROR$ALERT = YES;
1346   3  =    END;
          =
1347   2  =    RETURN (CONVERT$MONTH + 0);
          =
1348   1  =    END MONTH$TO$DAYS$CONVERT;
          =
          =    /*************************************************************/
          =
1349   2  =    IS$IT$DLC$TIME:  PROCEDURE  PUBLIC;
          =
          =           /* TEST TO SEE IF THE LOAD CONTROL PERIOD IS IN PROGRESS */
          =
1350   2  =    DLC$START$DAY = BCD$TO$BIN$CONVERT
          =                               (DIRECT$LOAD$CONTROL.START$DATE(2));
1351   2  =    DLC$STOP$DAY = BCD$TO$BIN$CONVERT
          =                               (DIRECT$LOAD$CONTROL.STOP$DATE(2));
1352   2  =    DLC$CURRENT$DAY = BCD$TO$BIN$CONVERT (TIME$AND$DATE.DAY);
          =
          =                                  /*CONVERT START MONTH TO DAYS */
1353   2  =    START$DAY = MONTH$TO$DAYS$CONVERT
          =                               (DIRECT$LOAD$CONTROL.START$DATE(1));
1354   2  =    START$DAY = START$DAY + DLC$START$DAY;
          =
          =                                  /* CONVERT STOP MONTH TO DAYS */
1355   2  =    STOP$DAY = MONTH$TO$DAYS$CONVERT
          =                               (DIRECT$LOAD$CONTROL.STOP$DATE(1));
1356   2  =    STOP$DAY = STOP$DAY + DLC$STOP$DAY;
          =
          =                               /* CONVERT CURRENT MONTH TO DAYS */
1357   2  =    PRESENT$DAY = MONTH$TO$DAYS$CONVERT (TIME$AND$DATE.MONTH);
1358   2  =    PRESENT$DAY = PRESENT$DAY + DLC$CURRENT$DAY;
          =
1359   2  =    IF DLC$DATA$NEEDED = NO  THEN
1360   3  =    DO;
          =    /*** ADDED 8/15/89 TO SET UP FOR YEARS TESTING ***/
1361   3  =      IF (DIRECT$LOAD$CONTROL.START$DATE(0) < 5) OR
          =         (DIRECT$LOAD$CONTROL.STOP$DATE(0) < 5) OR
          =         (TIME$AND$DATE.YEAR < 5)  THEN
1362   4  =      DO;
          =    /*** 99H = 153 DECIMAL : 154 WILL INDICATE NEW CENTURY ***/
1363   4  =        IF DIRECT$LOAD$CONTROL.START$DATE(0) < 80H  THEN
1364   4  =          DLC$START$YEAR = DIRECT$LOAD$CONTROL.START$DATE(0) + 154;
1365   4  =        ELSE
          =          DLC$START$YEAR = DIRECT$LOAD$CONTROL.START$DATE(0);
          =
1366   4  =        IF DIRECT$LOAD$CONTROL.STOP$DATE(0) < 80H  THEN
1367   4  =          DLC$STOP$YEAR = DIRECT$LOAD$CONTROL.STOP$DATE(0) + 154;
1368   4  =        ELSE
          =          DLC$STOP$YEAR = DIRECT$LOAD$CONTROL.STOP$DATE(0);
          =
1369   4  =        IF TIME$AND$DATE.YEAR < 80H  THEN
1370   4  =          CURRENT$YEAR = TIME$AND$DATE.YEAR + 154;
1371   4  =        ELSE
          =          CURRENT$YEAR = TIME$AND$DATE.YEAR;
1372   4  =      END;
          =
1373   3  =      ELSE
          =      DO;
1374   4  =        DLC$START$YEAR = DIRECT$LOAD$CONTROL.START$DATE(0);
1375   4  =        DLC$STOP$YEAR = DIRECT$LOAD$CONTROL.STOP$DATE(0);
1376   4  =        CURRENT$YEAR = TIME$AND$DATE.YEAR;
1377   4  =      END;
          =
          =    /*** ADDED 8/10/89 - TEST FOR ZERO OR OLD DATA ***/
```

```
1378   3  =      IF (DLC$START$YEAR > CURRENT$YEAR) OR
          =                              (DLC$STOP$YEAR < CURRENT$YEAR)  THEN
1379   3  =        DLC$ACTIVE$FLAG = NO;
1380   3  =      ELSE
          =      DO;
1381   4  =        IF DLC$START$YEAR = CURRENT$YEAR  THEN
1382   5  =        DO;
1383   5  =          IF START$DAY <= PRESENT$DAY  THEN
1384   5  =            START$DATE$FLAG = YES;
1385   5  =          ELSE
          =            START$DATE$FLAG = NO;
1386   5  =        END;
          =
1387   4  =        ELSE
          =          START$DATE$FLAG = YES;
          =
1388   4  =        IF START$DATE$FLAG = YES  THEN
1389   5  =        DO;
1390   5  =          IF (DLC$STOP$YEAR > CURRENT$YEAR)
          =                        OR
          =            ( (DLC$STOP$YEAR = CURRENT$YEAR) AND
          =                  (STOP$DAY >= PRESENT$DAY) )  THEN
1391   5  =            DLC$ACTIVE$FLAG = YES;
1392   5  =          ELSE
          =            DLC$ACTIVE$FLAG = NO;
1393   5  =        END;
          =
1394   4  =        ELSE
          =          DLC$ACTIVE$FLAG = NO;
1395   4  =      END;
          =
1396   3  =      IF DLC$ACTIVE$FLAG = YES  THEN
1397   4  =      DO;
1398   4  =        IF (DIRECT$LOAD$CONTROL.START$TIME(0) < TIME$AND$DATE.HOUR)
          =                                                  OR
          =          ((DIRECT$LOAD$CONTROL.START$TIME(0) = TIME$AND$DATE.HOUR)
          =                                                  AND
          =          (DIRECT$LOAD$CONTROL.START$TIME(1) <= TIME$AND$DATE.MINUTE))
          =                                                 THEN
1399   5  =        DO;
1400   5  =          IF (DIRECT$LOAD$CONTROL.STOP$TIME(0) > TIME$AND$DATE.HOUR)
          =                                                  OR
          =            ((DIRECT$LOAD$CONTROL.STOP$TIME(0) = TIME$AND$DATE.HOUR)
          =                                                  AND
          =            (DIRECT$LOAD$CONTROL.STOP$TIME(1) > TIME$AND$DATE.MINUTE))
          =                                                  THEN
1401   6  =          DO;
1402   6  =            DLC$TOD$FLAG = YES;
1403   6  =            IF (TIME$AND$DATE.MINUTE >=
          =                                     DIRECT$LOAD$CONTROL.MINUTE$STOP)
          =                                    AND
          =               (TIME$AND$DATE.MINUTE <
          =                              (DIRECT$LOAD$CONTROL.MINUTE$STOP +
          =                               DIRECT$LOAD$CONTROL.MINUTES$OFF))  THEN
1404   7  =            DO;
1405   7  =              STATUS$BYTES(0) = STATUS$BYTES(0) OR DLC$ON$MASK;
1406   7  =              DLC$TIMER$FLAG = YES;              /* TURN OFF HVAC */
1407   7  =              IF (DLC$TIMER > DIRECT$LOAD$CONTROL.MINUTES$OFF)
          =                                        OR
          =                             (DLC$TIMER = 0)  THEN
1408   7  =                DLC$TIMER =
          =                  BCD$TO$BIN$CONVERT(DIRECT$LOAD$CONTROL.MINUTES$OFF).
          =                         /* LOAD TIME TO HAVE HVAC AND EWH SHUT DOWN */

          =
1409   7  =              STATUS$BYTES(0) = STATUS$BYTES(0) AND 0FBH;
          =                                                /* TURN OFF ELEMENT */
1410   7  =              EWH$RELAY$ON = NO;
1411   7  =              SEND$RELAY$MESSAGE = YES;  /* TURN OFF WATER HEATER */
1412   7  =            END;
1413   6  =          END;
          =
1414   5  =          ELSE
          =            DLC$TOD$FLAG = NO;
1415   5  =        END;
          =
1416   4  =        ELSE
          =          DLC$TOD$FLAG = NO;
```

```
1417   4  =      END;
1418   3  =    END;
1419   1  =    END IS$IT$DLC$TIME;
          =
          =    /***************************************************************/
          =
1420   2  =    FIND$MATCH:  PROCEDURE;
          =
1421   2  =    MATCH$FOUND = NO;
          =
1422   2  =    IF TEST$DATA$TYPE = 12H  THEN
1423   2  =      MATCH$FOUND = YES;
1424   2  =    ELSE
          =    IF TEST$DATA$TYPE = 16H  THEN
1425   2  =      MATCH$FOUND = YES;
1426   2  =    ELSE
          =    IF TEST$DATA$TYPE = 22H  THEN
1427   2  =      MATCH$FOUND = YES;
1428   2  =    ELSE
          =    IF TEST$DATA$TYPE = 91H  THEN
1429   2  =      MATCH$FOUND = YES;
1430   2  =    ELSE
          =    IF (TEST$DATA$TYPE >= 60H) AND (TEST$DATA$TYPE <= 87H)  THEN
1431   2  =      MATCH$FOUND = YES;
1432   2  =    ELSE
          =    DO CASE CONTROLLER$ADDRESS;
1433   3  =      IF (TEST$DATA$TYPE >=0A0H) AND (TEST$DATA$TYPE <= 0A7H)  THEN
1434   3  =        MATCH$FOUND = YES;
1435   3  =      IF (TEST$DATA$TYPE >=0A8H) AND (TEST$DATA$TYPE <= 0AFH)  THEN
1436   3  =        MATCH$FOUND = YES;
1437   3  =      IF (TEST$DATA$TYPE >=0B0H) AND (TEST$DATA$TYPE <= 0B7H)  THEN
1438   3  =        MATCH$FOUND = YES,
1439   3  =      IF (TEST$DATA$TYPE >=0B8H) AND (TEST$DATA$TYPE <= 0BFH)  THEN
1440   3  =        MATCH$FOUND = YES;
1441   3  =    END.                                         /* END OF DO CASE */
          =
1442   2  =    IF MATCH$FOUND = YES  THEN
1443   3  =    DO;
1444   3  =      REQUESTED$DATA$TYPES(0) = REQUESTED$DATA$TYPES(0) + 1;
1445   3  =      REQUESTED$DATA$TYPES(REQUESTED$DATA$TYPES(0)) = TEST$DATA$TYPE;
1446   3  =    END;
          =
1447   1  =    END FIND$MATCH;
          =
          =    /***************************************************************/
          =
1448   2  =    DATA$ANALYSIS:  PROCEDURE  PUBLIC;
          =    /* DATA$PACKET$TIMER$ACTIVE = NO;      * STOP WAITING FOR PACKET */
          =                                              /* VERIFY RECORD CRC */
1449   2  =    DATA$INTEGRITY = YES;
          =
1450   2  =    CRC$WORD = calculate_crc (.DATA$BUFFER(4),
          =                              RECORD$OVERHEAD.DATA$LENGTH,
          =                              0);
          =
1451   2  =    IF CRC$WORD = RECORD$OVERHEAD.RECORD$CRC  THEN
1452   3  =    DO;
1453   3  =      BUFFER$INDEX = 0;               /* POINT TO TOP OF DATA BUFFER */
1454   3  =      IF RECORD$OVERHEAD.RECORD$TYPE < 4 THEN
          =
1455   4  =      DO CASE RECORD$OVERHEAD RECORD$TYPE;
          =
1456   4  =        DATA$INTEGRITY = NO;            /* THERE IS NO RECORD TYPE 0 */
          =
1457   5  =        DO;
1458   5  =          REFRESH$REQUEST$MESSAGE = YES;
          =                /* RECORD TYPE 1 - NO VALUABLE INFO AT THIS TIME */
1459   5  =          SESSION$COUNTER = 2;
1460   5  =        END,
          =
1461   5  =        DO;                          /* RECORD TYPE 2 - DEVICE RECORD */
1462   5  =          IF RECORD$OVERHEAD.DATA$LENGTH > 2  THEN
1463   6  =          DO,
1464   6  =            IF REFRESH$REQUEST$MESSAGE = YES  THEN
1465   7  =            DO;
1466   7  =              IF DEVICE$RECORD.PLC$ADDRESS = PLC$ADDR  THEN
1467   7  =                CALL TERMINATE$DATA$SESSION;
1468   7  =              ELSE
```

```
               =              DO;
1469     8     =                DATA$DESTINATION = DEVICE$RECORD.PLC$ADDRESS;
1470     8     =                CURRENT$DEVICE = DATA$DESTINATION;
1471     8     =                REFRESH$REQUEST$MESSAGE = NO;
1472     8     =                DATA$REQUEST$MSG = YES;
1473     8     =              END;
1474     7     =            END;
               =
1475     6     =            ELSE           /* SEND DATA MESSAGE TO REQUESTING DEVICE */
               =              DATA$DESTINATION = CURRENT$DEVICE;
               =
1476     6     =            REQUESTED$DATA$TYPES(0) = 0;
1477     6     =            NEEDED$DATA$TYPES = DEVICE$RECORD.NUMBER$DATA$TYPES;
1478     6     =            DTINDEX = 0;
1479     7     =            DO WHILE NEEDED$DATA$TYPES <> 0;
1480     7     =              TEST$DATA$TYPE = DEVICE$RECORD.DATA$TYPES(DTINDEX);
1481     7     =              CALL FIND$MATCH;
1482     7     =              NEEDED$DATA$TYPES = NEEDED$DATA$TYPES - 1;
1483     7     =              DTINDEX = DTINDEX + 1;
1484     7     =            END;
               =
1485     6     =            IF REQUESTED$DATA$TYPES(0) <> 0  THEN
1486     6     =              CALL MOVXX0 (.REQUESTED$DATA$TYPES(0),
               =                          .DEVICE$RECORD.NUMBER$DATA$TYPES,
               =                          (REQUESTED$DATA$TYPES(0) + 1));
1487     6     =            ELSE                            /* NO DATA TYPES NEEDED */
               =              DEVICE$RECORD.NUMBER$DATA$TYPES = 0;
               =
1488     6     =            IF SESSION$COUNTER = 0  THEN
1489     7     =            DO;                   /* THIS IS A DATA REQUEST MESSAGE */
1490     7     =              SESSION$COUNTER = 1;
1491     7     =              DATA$MSG = YES;
1492     7     =              FIRST$TIME$DATA$MESSAGE = YES;
1493     7     =            END;
1494     6     =          END;
               =
1495     5     =          ELSE
               =            DATA$MSG = YES;
               =
1496     5     =          DATA$TIMER$ACTIVE = YES;
1497     5     =        END;
               =
               =    /*** EVALUATE DATA TYPES TO SEE IF A DATA REQUEST
               =                                 MESSAGE SHOULD BE TRANSMITTED ***/
1498     5     =        DO;
1499     5     =          IF DATA$RECORD.DATA$TYPE = 12H  THEN
1500     6     =          DO;
1501     6     =            CALL MOVXX0 (.DATA$RECORD.MSG$DATA,
               =                         .METER$CONTROL.NOT$USED,
               =                          SIZE (METER$CONTROL));
1502     6     =            ROLLOVER$DATA$RECEIVED = YES;
1503     6     =          END;
               =
1504     5     =          ELSE
               =          IF DATA$RECORD.DATA$TYPE = 16H  THEN
1505     6     =          DO;
1506     6     =            CALL MOVXX0 (.DATA$RECORD.MSG$DATA,
               =                         .TIER$USAGE.TODAYS$DATE,
               =                          SIZE (TIER$USAGE));
1507     6     =            USAGE$DATA$RECEIVED = YES;
1508     6     =          END;
               =
1509     5     =          ELSE
               =          IF DATA$RECORD.DATA$TYPE = 22H  THEN
1510     6     =          DO;
1511     6     =            CALL MOVXX0 (.DATA$RECORD.MSG$DATA,
               =                         .DIRECT$LOAD$CONTROL.START$DATE,
               =                          SIZE (DIRECT$LOAD$CONTROL));
1512     6     =            DLC$DATA$NEEDED = NO;
1513     6     =            CALL WHAT$DAY$IS$IT;
1514     6     =            CALL IS$IT$DLC$TIME;
1515     6     =          END;
               =
1516     5     =          ELSE
               =          IF DATA$RECORD.DATA$TYPE = 91H  THEN
1517     6     =          DO;
1518     6     =            CALL MOVXX0 (.DATA$RECORD.MSG$DATA,
               =                         .PRICING$DATA.TSTAT$DISPLAY,
```

```
            =            SIZE (PRICING$DATA));
1519   6    =     PRICE$DATA$RECEIVED = YES;
            =
1520   6    =    IF (PRICING$DATA.TSTAT$DISPLAY AND 8) <> 0  THEN
1521   6    =      STATUS$BYTES(0) = STATUS$BYTES(0) OR 2;      /* 3 TIER */
1522   6    =    ELSE
            =      STATUS$BYTES(0) = STATUS$BYTES(0) AND 0FDH;  /* 4 TIER */
1523   6    =   END;
            =
1524   5    =   ELSE
            =   IF (DATA$RECORD.DATA$TYPE >= 60H) AND
            =                            (DATA$RECORD.DATA$TYPE <= 87H)  THEN
1525   6    =   DO;
1526   6    =     IF GET$ALL$TIER$DATA = NO  THEN
1527   7    =     DO;                  /* THIS IS NOT A COMPLETE DOWNLOAD */
1528   7    =       TIER$BUFFER$INDEX = TIER$INDEX;     /* LOAD TIER INDEX */
            =
1529   7    =       IF TIER$BUFFER$INDEX > 39  THEN
1530   7    =         TIER$BUFFER$INDEX = 0;
            =
1531   7    =       TIER$INDEX$COUNTER = 0;
1532   7    =       MISC$WORD = 0;
            =
1533   7    =       DO WHILE
            =           (TIER$INDEX$COUNTER < 40) AND (MISC$WORD <> 0FFFFH);
            =
1534   8    =         MISC$WORD = CMPXX0(.TIER$DATA(TIER$BUFFER$INDEX).DATE,
            =                             .DATA$RECORD.MSG$DATA,
            =                              3);
            =
1535   8    =         TIER$INDEX$COUNTER = TIER$INDEX$COUNTER + 1;
1536   8    =         TIER$BUFFER$INDEX = TIER$BUFFER$INDEX + 1;
1537   8    =         IF TIER$BUFFER$INDEX > 39  THEN
1538   8    =           TIER$BUFFER$INDEX = 0;
1539   8    =       END;             /* END OF DO WHILE TO FIND TIER DATA */
            =
1540   7    =       IF MISC$WORD = 0FFFFH  THEN
1541   8    =       DO;          /* MATCH FOUND - LOAD INTO PROPER LOCATION */
1542   8    =         IF TIER$BUFFER$INDEX = 0  THEN
1543   8    =           TIER$BUFFER$INDEX = 39;
1544   8    =         ELSE
            =           TIER$BUFFER$INDEX = TIER$BUFFER$INDEX - 1;
            =                   /* READJUST POINTER INTO TIER DATA BASE */
            =
            =     /*** TEST TO SEE IF TODAY'S TIER DATA IS BEING LOADED ***/
            =
1545   8    =         MISC$WORD = CMPXX0(.TIME$AND$DATE.YEAR,
            =                             .DATA$RECORD.MSG$DATA,
            =                              3);
1546   8    =         IF MISC$WORD = 0FFFFH  THEN
1547   9    =         DO;                   /* CHECK FOR NEW DATA FOR TODAY */
1548   9    =           MISC$WORD = CMPXX0(.TIER$DATA(TIER$BUFFER$INDEX),
            =                               .DATA$RECORD.MSG$DATA,
            =                                9);
1549   9    =           IF MISC$WORD <> 0FFFFH  THEN
1550  10    =           DO;
1551  10    =             OPTIMIZATION$REQUIRED = YES;
1552  10    =             BSR$INIT = YES;
1553  10    =           END;
1554   9    =         END;
            =
1555   8    =         CALL MOVXX0 (.DATA$RECORD.MSG$DATA,
            =                      .TIER$DATA(TIER$BUFFER$INDEX).DATE,
            =                       TIER$DATA$SIZE);
1556   8    =       END;
            =
1557   7    =       ELSE       /* MATCH NOT FOUND - REQUEST ALL TIER DATA */
            =         TIER$DOWNLOAD$REQUEST$TIMER =
            =                                   CONFIG$DATA.HOUSE$CODE + 5;
1558   7    =     END;
            =
1559   6    =     ELSE
            =     DO;                                /* LOAD NEW TIER DATA */
1560   7    =       CALL MOVXX0(.DATA$RECORD.MSG$DATA,
            =                   .TIER$DATA(DATA$RECORD.DATA$TYPE - 60H).DATE,
            =                    TIER$DATA$SIZE);
1561   7    =       IF DATA$RECORD.DATA$TYPE = 87H  THEN
1562   8    =       DO;
```

```
1563   8  =                 GET$ALL$TIER$DATA = NO;
1564   8  =                 OPTIMIZATION$REQUIRED = YES;
1565   8  =                 BSR$INIT = YES;
1566   8  =               END;
1567   7  =             END;
1568   6  =           END;
          =
1569   5  =           ELSE
          =           IF (DATA$RECORD.DATA$TYPE >= 0A0H) AND
          =                                  (DATA$RECORD.DATA$TYPE <= 0BFH)  THEN
1570   6  =           DO;
1571   6  =             ANALYZE$DATA$TYPE = YES;
1572   7  =             DO CASE CONTROLLER$ADDRESS;
          =
1573   7  =               TEST$DATA$TYPE = DATA$RECORD.DATA$TYPE - 0A0H;
          =
1574   7  =               TEST$DATA$TYPE = DATA$RECORD.DATA$TYPE - 0A8H;
          =
1575   7  =               TEST$DATA$TYPE = DATA$RECORD.DATA$TYPE - 0B0H;
          =
1576   7  =               TEST$DATA$TYPE = DATA$RECORD.DATA$TYPE - 0B8H;
          =
1577   7  =             END;            /* END OF DO CASE FOR CONTROLLER ADDRESS */
          =
1578   6  =             CALL PROCESS$DATA$TYPE;
1579   6  =             ANALYZE$DATA$TYPE = NO;
1580   6  =             CALL WHAT$DAY$IS$IT;  /* TO UPDATE FOR ANY CHANGES MADE
          =                            BY COMSET B OR COMSET 2000 (TCH 1/26/89) */
1581   6  =           END;
1582   5  =         END;
1583   4  =       END;                           /* END OF RECORD TYPE DO CASE */
1584   3  =     END;
          =
1585   2  =     ELSE
          =       DATA$INTEGRITY = NO;
          =
1586   2  =     TRANS$BRICK$MSG.DESTINATION$ADDRESS = BRICK$MIP(2);
1587   2  =     TRANS$BRICK$MSG.PROCESS$NUMBERS = MESSAGE$PROCESS OR 1;
1588   2  =     DATA$ACK$MSG = YES;
1589   2  =     DATA$TIMER$ACTIVE = YES;
          =
1590   2  =     BUSY$MESSAGE$FLAG = NO;
          =
1591   1  =     END DATA$ANALYSIS;
                $TITLE ('FAST CLOCK / SETBACK')
                $INCLUDE (TIMCHK.STH)
          =
          =     /****************************************************************/
          =
1592   2  =     HOURS$CHANGED:  PROCEDURE;
          =
1593   2  =     FAST$CLOCK$FLAG = YES;          /* FAST CLOCK IS TO BE PERFORMED */
          =
          =                         /* DETERMINE MINUTES NEEDED TO BE ADVANCED */
          =
1594   2  =     FAST$CLOCK$COUNTER = (60 * (CHANGED$HOURS - 1))
          =                         + NEW$MINUTES + (60 - OLD$MINUTES);
          =
1595   1  =     END HOURS$CHANGED;
          =
          =     /****************************************************************/
          =
1596   2  =     DAY$CHANGED:  PROCEDURE;
          =                                   /* CONVERT TIME TO BINARY FORMAT */
1597   2  =     OLD$MONTH = BCD$TO$BIN$CONVERT (TIME$AND$DATE.MONTH);
1598   2  =     OLD$DAY = BCD$TO$BIN$CONVERT (TIME$AND$DATE.DAY);
1599   2  =     NEW$MONTH = BCD$TO$BIN$CONVERT (BRICK$MIP(5));
1600   2  =     NEW$DAY = BCD$TO$BIN$CONVERT (BRICK$MIP(6));
          =                                      /* CONVERT DATE TO DAYS ONLY */
1601   2  =     OLD$MONTH = MONTH$TO$DAYS$CONVERT (OLD$MONTH);
1602   2  =     OLD$DAY = OLD$MONTH + OLD$DAY;
1603   2  =     NEW$MONTH = MONTH$TO$DAYS$CONVERT (NEW$MONTH);
1604   2  =     NEW$DAY = NEW$DAY + NEW$MONTH;
          =
1605   2  =     IF ((NEW$DAY - OLD$DAY) = 1) OR
          =              ((TIME$AND$DATE.MONTH = 12) AND (BRICK$MIP(5) = 1))  THEN
1606   3  =     DO;
1607   3  =       NEW$HOURS = NEW$HOURS + 24;
```

```
1608   3   =     CHANGED$HOURS = NEW$HOURS - OLD$HOURS;
1609   3   =     IF CHANGED$HOURS < 3  THEN
1610   3   =       CALL HOURS$CHANGED;     /* TIME DIFFERENCE - 2 HOURS MAXIMUM */
1611   3   =   END;
           =
1612   1   =   END DAY$CHANGED;
           =
           =   /*****************************************************************/
           =
1613   2   =   TIME$CHECK:  PROCEDURE;
           =                                           /*** SET UP GLOBAL PARAMETERS ***/
1614   2   =   FAST$CLOCK$FLAG = NO;
1615   2   =   FAST$CLOCK$COUNTER = 0;
           =                                          /* CONVERT TIME TO BINARY FORMAT */
1616   2   =   NEW$HOURS = BCD$TO$BIN$CONVERT (BRICK$MIP(7));
1617   2   =   OLD$HOURS = BCD$TO$BIN$CONVERT (TIME$AND$DATE.HOUR);
1618   2   =   NEW$MINUTES = BCD$TO$BIN$CONVERT (BRICK$MIP(8));
1619   2   =   OLD$MINUTES = BCD$TO$BIN$CONVERT (TIME$AND$DATE.MINUTE);
           =
           =   /*** DETERMINE WHETHER TIME IS SET BACK
           =                                             OR FAST CLOCK IS NEEDED ***/
1620   3   =   DO CASE MISC$WORD;
           =
1621   3   =     CALL DAY$CHANGED;                                /* HAPPY NEW YEAR */
           =
1622   3   =     CALL DAY$CHANGED;                                     /* NEW MONTH */
           =
1623   3   =     CALL DAY$CHANGED;                                       /* NEW DAY */
           =
1624   4   =     DO;                                                    /* NEW HOUR */
1625   4   =       CHANGED$HOURS = NEW$HOURS - OLD$HOURS;
1626   4   =       IF CHANGED$HOURS < 3  THEN
1627   4   =         CALL HOURS$CHANGED;  /* TIME DIFFERENCE - 2 HOURS MAXIMUM */
1628   4   =     END;
           =
1629   3   =     IF NEW$MINUTES > OLD$MINUTES  THEN
1630   4   =     DO;
1631   4   =       FAST$CLOCK$FLAG = YES;
1632   4   =       FAST$CLOCK$COUNTER = NEW$MINUTES - OLD$MINUTES;
1633   4   =     END;
           =
1634   3   =   END;                                               /* END OF DO CASE */
           =
1635   2   =   WATCHDOG$TIMER = YES;                         /* TOGGLE WATCHDOG TIMER */
1636   2   =   WATCHDOG$TIMER = NO;                            /* TO MAINTAIN SANITY */
           =
1637   1   =   END TIME$CHECK;
               $TITLE ('DECODE BRICK MESSAGE')
               $INCLUDE (BRKDEC.STH)
           =
           =   /*****************************************************************/
           =
1638   2   =   CHECK$TIMER:  PROCEDURE;
           =
1639   2   =   IF (WHAT$TIME$MSG = NO) AND
           =      (ERROR$ALERT = NO)  THEN
1640   3   =   DO;
1641   3   =     S$P$TIMER$ACTIVE = NO;
1642   3   =     S$P$TIMER = 0;
1643   3   =   END;
           =
1644   1   =   END CHECK$TIMER;
           =
           =   /*****************************************************************/
           =
1645   2   =   ERROR$MESSAGE:  PROCEDURE;
           =
1646   2   =   SEND$ERROR$MSG.ERROR$TYPE(ERROR$INDEX) = INVALID$MESSAGE$TYPE;
           =
1647   2   =   IF ERROR$INDEX > 13 THEN
1648   2   =     SEND$ERROR$MSG.ERROR$TYPE(ERROR$INDEX) =
           =                              ERROR$BUFFER$OVERFLOW; /* ADDED 3/16/89 */
1649   2   =   ELSE
           =     ERROR$INDEX = ERROR$INDEX + 1;
           =
1650   2   =   SEND$ERROR$MSG.PROCESS$NUMBERS = 0;
           =
1651   2   =   ERROR$ALERT = YES;
```

```
1652   2  =   S$P$TIMER$ACTIVE = YES;          /* START SYSTEM PROCESS TIMER */
          =
1653   1  =   END ERROR$MESSAGE;
          =
          =   /*************************************************************/
          =
1654   2  =   CLEAR$MESSAGE:  PROCEDURE;
          =
1655   2  =   SENT$ONCE$FLAG = NO;
1656   2  =   WAITING = NO;
          =
1657   2  =   IF TRANS$BRICK$MESSAGE(1) <= BUSY  THEN
1658   3  =   DO CASE TRANS$BRICK$MESSAGE(1);
1659   3  =     ;
1660   3  =     ;
1661   3  =     TIME$MSG = NO;
1662   3  =     ;
1663   3  =     DIAG$ACK$MSG = NO;
1664   3  =     ;
1665   3  =     CONFIG$ACK$MSG = NO;
1666   3  =     ;
1667   3  =     ERROR$ACK$MSG = NO;
1668   3  =     ;
1669   3  =     BUSY$MSG = NO;
1670   3  =   END;                                         /* END OF DO CASE */
          =
1671   2  =   ELSE
          =   IF TRANS$BRICK$MESSAGE(1) = CONTROL  THEN
1672   2  =     CONTROL$MSG = NO;
1673   2  =   ELSE
          =   IF TRANS$BRICK$MESSAGE(1) = STATUS  THEN
1674   2  =     INQUIRE$MSG = NO;
1675   2  =   ELSE
          =   IF TRANS$BRICK$MESSAGE(1) = DATA_ACK  THEN
1676   2  =     DATA$ACK$MSG = NO;
          =
1677   1  =   END CLEAR$MESSAGE;
          =
          =   /*************************************************************/
          =
1678   2  =   RESEND$BRICK$MESSAGE:  PROCEDURE  PUBLIC;
          =
1679   2  =   IF SENT$ONCE$FLAG = YES THEN
1680   3  =   DO;
1681   3  =     CALL CLEAR$MESSAGE;
1682   3  =     BRICK$OK = NO;
1683   3  =   END;
          =
1684   2  =   ELSE
          =   DO;
1685   3  =     SENT$ONCE$FLAG = YES;         /* SEND MESSAGE ONE MORE TIME */
1686   3  =     CALL SEND$BRICK$MSG;
1687   3  =   END;
          =
1688   1  =   END RESEND$BRICK$MESSAGE;
          =
          =   /*************************************************************/
          =
1689   2  =   BRICK$MSG$DECODE:  PROCEDURE  PUBLIC;
          =
1690   2  =   IF RECV$BRICK$MESSAGE(0) = 0FFH  THEN
1691   2  =     CALL MOVXX0 (.RECV$BRICK$MESSAGE(20), .BRICK$MIP, 20);
1692   2  =   ELSE
          =     CALL MOVXX0 (.RECV$BRICK$MESSAGE, .BRICK$MIP, 20);
          =
          =   /*CALL SETBX0 (.RECV$BRICK$MESSAGE, 0, 20);*/
          =
1693   2  =   WATCHDOG$TIMER = YES;                 /* TOGGLE WATCHDOG TIMER */
1694   2  =   WATCHDOG$TIMER = NO;                     /* TO MAINTAIN SANITY */
          =
1695   2  =   IF BRICK$MIP(1) < MIN$BRICK$MESSAGE$TYPE  THEN
1696   3  =   DO;                         /* TO INSURE PROPER PROCESS NUMBERS */
1697   3  =     DATA$PROCESS = BRICK$MIP(3);
1698   3  =     MESSAGE$PROCESS = SHL (DATA$PROCESS, 4);
1699   3  =   END;                     /* SETS UP PROCESS BYTE TO BE RETURNED */
          =
1700   2  =   IF (BRICK$MIP(1) > 0) AND
          =      (BRICK$MIP(1) <= MAX$SYSTEM$MESSAGE$TYPE)  THEN
```

```
               =
1701    3      =    DO CASE (BRICK$MIP(1));                /* DO CASE ON MESSAGE TYPE */
               =
1702    3      =      CALL ERROR$MESSAGE;                 /* INVALID MESSAGE (TYPE 0) */
1703    4      =      DO;
1704    4      =        SEND$TIME$MSG.BYTE$COUNT = 7;
1705    4      =        SEND$TIME$MSG.DESTINATION$ADDRESS = BRICK$MIP(2);
1706    4      =        SEND$TIME$MSG PROCESS$NUMBERS = MESSAGE$PROCESS;
1707    4      =        TIME$MSG = YES;              /* TIME REQUEST MESSAGE (TYPE 1) */
1708    4      =      END;
               =
1709    4      =      DO;                            /* CURRENT TIME MESSAGE (TYPE 2) */
1710    4      =        IF BRICK$MIP(5) <> 0  THEN                /* LOAD CURRENT TIME */
1711    5      =        DO:
1712    5      =          MISC$WORD = CMPXX0 (.TIME$AND$DATE.YEAR, .BRICK$MIP(4), 6);
1713    5      =          IF MISC$WORD <> YAHOO THEN
1714    6      =          DO;
1715    6      =            IF MISC$WORD = 4  THEN
1716    7      =            DO,
1717    7      =              CONTROLLER$MINUTE =
               =                            BCD$TO$BIN$CONVERT (TIME$AND$DATE.MINUTE);
1718    7      =              METER$MINUTE = BCD$TO$BIN$CONVERT (BRICK$MIP(8));
1719    7      =              IF ((METER$MINUTE + 2) < CONTROLLER$MINUTE)
               =                                      OR
               =                 ((METER$MINUTE - 2) > CONTROLLER$MINUTE)  THEN
1720    8      =              DO;
1721    8      =                BSR$INIT = YES;                 /* UPDATE BSR DEVICES */
1722    8      =                EWH$OPTIMIZATION$REQUIRED = YES;
1723    8      =                HVAC$OPTIMIZATION$REQUIRED = YES;
1724    8      =              END;
1725    7      =            END;
               =
1726    6      =            ELSE
               =            DO;
1727    7      =              BSR$INIT = YES;                   /* UPDATE BSR DEVICES */
1728    7      =              EWH$OPTIMIZATION$REQUIRED = YES;
1729    7      =              HVAC$OPTIMIZATION$REQUIRED = YES;
1730    7      =            END;
               =
1731    6      =            CALL TIME$CHECK; /* SEE IF TIME IS ADVANCED OR SET BACK */
               =
1732    6      =            IF FAST$CLOCK$FLAG = YES  THEN
1733    6      =              CALL MOVXX0 (.BRICK$MIP(4), .CURRENT$DATE.YEAR, 6);
1734    6      =            ELSE
               =            DO;
1735    7      =              CALL MOVXX0 (.BRICK$MIP(4), .TIME$AND$DATE.YEAR, 6);
1736    7      =              CALL WHAT$DAY$IS$IT; /* UPDATE TO CURRENT TIME & DATE */
1737    7      =            END;
1738    6      =          END;
1739    5      =        END:
               =                    /* RECEIVED A RESPONSE TO A WHAT_TIME MESSAGE */
1740    4      =        WHAT$TIME$MSG = NO;
1741    4      =        CALL CHECK$TIMER;
1742    4      =        CALL IS$IT$DLC$TIME;
1743    4      =        NEEDED$HOUR = TIME$AND$DATE.HOUR;
1744    4      =        NEEDED$HOUR = BCD$TO$BIN$CONVERT(NEEDED$HOUR);
1745    4      =        CALL CRITICAL$TIER$CHECK,
1746    4      =      END;
               =
1747    4      =      DO;
1748    4      =        SEND$DIAG$ACK$MSG.BYTE$COUNT = 2;
               =                                    /* STATUS BYTE + PROCESS BYTE */
1749    4      =        SEND$DIAG$ACK$MSG.DESTINATION$ADDRESS = BRICK$MIP(2);
1750    4      =        SEND$DIAG$ACK$MSG.PROCESS$NUMBERS = MESSAGE$PROCESS;
1751    4      =        DIAG$ACK$MSG = YES,               /* STATUS MESSAGE (TYPE 3) */
1752    4      =        MISC$WORD = CMPXX0 (.TIME$AND$DATE.YEAR, .BRICK$MIP(4), 6);
1753    4      =        IF MISC$WORD <> YAHOO THEN
1754    5      =        DO;
1755    5      =          IF MISC$WORD = 4  THEN
1756    6      =          DO;
1757    6      =            CONTROLLER$MINUTE =
               =                            BCD$TO$BIN$CONVERT (TIME$AND$DATE.MINUTE),
1758    6      =            METER$MINUTE = BCD$TO$BIN$CONVERT (BRICK$MIP(8));
1759    6      =            IF ((METER$MINUTE + 5) < CONTROLLER$MINUTE)
               =                                    OR
               =               ((METER$MINUTE - 5) > CONTROLLER$MINUTE)  THEN
1760    6      =              WHAT$TIME$MSG = YES;
1761    6      =          END;
```

```
                =
1762    5   =           ELSE
            =             WHAT$TIME$MSG = YES;
1763    5   =         END;
1764    4   =       END;
            =
1765    3   =       CALL ERROR$MESSAGE;    /* MSG TYPE 4 SHOULD NEVER BE RECEIVED */
            =
1766    4   =       DO;
1767    4   =         SEND$CONFIG$ACK$MSG.BYTE$COUNT = 3;
            =                              /* STATUS BYTE + PROCESS BYTE */
1768    4   =         SEND$CONFIG$ACK$MSG.DESTINATION$ADDRESS = BRICK$MIP(2);
1769    4   =         SEND$CONFIG$ACK$MSG.PROCESS$NUMBERS = MESSAGE$PROCESS;
1770    4   =         SEND$CONFIG$ACK$MSG.MAJOR$VERSION = VERSION$MAJOR;
1771    4   =         SEND$CONFIG$ACK$MSG.MINOR$VERSION = VERSION$MINOR;
1772    4   =         CONFIG$ACK$MSG = YES;
            =                    /* CONFIGURATION (VERSION) MESSAGE (TYPE 5) */
1773    4   =       END;
            =
1774    3   =       CALL ERROR$MESSAGE;    /* MSG TYPE 6 SHOULD NEVER BE RECEIVED */
            =
1775    4   =       DO;
1776    4   =         SEND$ERROR$ACK$MSG.BYTE$COUNT = 1;          /* PROCESS BYTE */
1777    4   =         SEND$ERROR$ACK$MSG.PROCESS$NUMBERS = MESSAGE$PROCESS;
1778    4   =         ERROR$ACK$MSG = YES;  /* ACKNOWLEDGE ERROR MESSAGE (TYPE 7) */
            =     /*** MOVE DATA FIELD INTO BUFFER AND CALL FOR ERROR ANALYSIS ***/
1779    4   =       END;
            =
1780    4   =       DO;
1781    4   =         ERROR$ALERT = NO;     /* STOP SENDING ERROR MESSAGE (TYPE 8) */
1782    4   =         ERROR$INDEX = 0;
1783    4   =         CALL CHECK$TIMER;
1784    4   =       END;
            =
1785    4   =       DO;                 /*** TEST FOR DIAGNOSTIC TO BE PERFORMED ***/
1786    4   =         IF (MISC_LOCATION AND 40H) <> 0  THEN
1787    4   =           CALL DIAGNOSTICS$TEST;
1788    4   =         ELSE
            =           CALL ERROR$MESSAGE;     /* MESSAGE TYPE 9 NO LONGER EXISTS */
1789    4   =       END;
            =
1790    4   =       DO;
1791    4   =         BUSY$MSG$TIMER$ACTIVE = YES;
1792    4   =         BUSY$MSG$TIMER = 5;  /* BUSY MESSAGE (TYPE 10)
            =                                               DELAY FIVE MINUTES */
1793    4   =         BUSY$DEVICE = BRICK$MIP(2);
1794    4   =       END;
1795    3   =     END;                                         /* END OF DO CASE */
            =
1796    2   =     ELSE
            =     IF (BRICK$MIP(1) <= MAX$DEVICE$MESSAGE$TYPE) AND
            =        (BRICK$MIP(1) >= MIN$DEVICE$MESSAGE$TYPE)  THEN
            =
1797    3   =     DO CASE (BRICK$MIP(1) - MIN$DEVICE$MESSAGE$TYPE);
            =                               /* DO CASE ON DEVICE MESSAGE TYPES */
1798    3   =       CALL ERROR$MESSAGE;       /* MESSAGE TYPE 30
            =                                           SHOULD NOT BE RECEIVED */
1799    3   =       CALL ERROR$MESSAGE;       /* MESSAGE TYPE 31
            =                                           SHOULD NOT BE RECEIVED */
1800    4   =       DO;
1801    4   =         RETURNED$DEV$STATE = BRICK$MIP(3);
1802    4   =         IF RETURNED$DEV$STATE <> DEV$STATE  THEN
1803    4   =           SEND$RELAY$MESSAGE = YES;
1804    4   =       END;
1805    3   =     END;                        /* END DO CASE FOR DEVICE MESSAGES */
            =
1806    2   =     ELSE
            =     IF (BRICK$MIP(1) < DATA_ACK) AND
            =        (BRICK$MIP(1) >= MIN$DATA$MESSAGE$TYPE)  THEN
1807    3   =     DO;
1808    3   =       IF DATA$MESSAGE$INHIBIT = NO  THEN
1809    4   =       DO;
1810    4   =         DATA$TIMER = 0;
1811    4   =         READY$TO$RESPOND = NO;
1812    4   =         TERMINATOR$RECEIVED = NO;
1813    4   =         DATA$SIZE = BRICK$MIP(0) - 1;
            =
1814    4   =         IF (MAIN$DATA$TIMER$ACTIVE = NO) OR
```

```
              =          (BRICK$DELAY$TIMER$ACTIVE = YES)  THEN
1815    5     =        DO;
1816    5     =          MAIN$DATA$TIMER$ACTIVE = YES;
1817    5     =          MAIN$DATA$TIMER = 15;
              =                    /* START 15 MINUTE TIMER FOR DATA SESSION */
1818    5     =          BUSY$FLAG = YES;
              =         /***** ADDED 4/22/89 *****
              =                  TO PREVENT A DATA SESSION,
              =                   THAT HAS STARTED WITHIN 20 SECONDS
              =                    OF A PREVIOUS DATA SESSION, FROM TIMING OUT. *****/
1819    5     =          BRICK$DELAY$TIMER$ACTIVE = NO;
              =
1820    5     =        END;
              =
1821    4     =        IF NEW$RECORD = YES  THEN      /* START OF DATA TYPE MESSAGE */
1822    5     =        DO;
1823    5     =          IF BRICK$MIP(4) = 0FFH  THEN
1824    6     =          DO;            /* TERMINATION OF DATA TYPE MESSAGE */
1825    6     =            DATA$INTEGRITY = YES;
1826    6     =            TERMINATOR$RECEIVED = YES;
              =
1827    6     =            INITIATED$DATA$SESSION = 0;
              =                  /* ADDED 3/16/89 TO PREVENT DATA_RQ MESSAGE
              =                                  OCCURRING MORE THAN ONCE PER DAY */

1828    6     =            TRANS$BRICK$MSG.DESTINATION$ADDRESS = CURRENT$DEVICE;
1829    6     =            TRANS$BRICK$MSG.PROCESS$NUMBERS = MESSAGE$PROCESS OR 1;
1830    6     =            DATA$ACK$MSG = YES;              /* DATA MSG TERMINATOR */
1831    6     =            BUFFER$INDEX = 0;            /* POINT TO TOP OF BUFFER */
1832    6     =            DATA$PACKET$TIMER$ACTIVE = NO;
1833    6     =            DATA$MESSAGE$BUILT = NO;
              =
1834    6     =            IF OPTIMIZATION$REQUIRED = YES  THEN
1835    7     =            DO;
1836    7     =              OPTIMIZATION$REQUIRED = NO;
1837    7     =              EWH$OPTIMIZATION$REQUIRED = YES;
1838    7     =              HVAC$OPTIMIZATION$REQUIRED = YES;
1839    7     =              TIER$DOWNLOAD$REQUEST = NO;
1840    7     =            END;
1841    6     =          END;
              =
1842    5     =          ELSE
              =          DO;
1843    6     =            DATA$PACKET$TIMER$ACTIVE = YES;
1844    6     =            DATA$PACKET$TIMER = 30;
              =              /* START 30 SECOND DELAY TO WAIT FOR NEXT DATA PACKET */
              =
1845    6     =            BUFFER$INDEX = 0;            /* POINT TO TOP OF BUFFER */
1846    6     =            CALL MOVXX0 (.BRICK$MIP(4),
              =                          .DATA$BUFFER(BUFFER$INDEX),
              =                          DATA$SIZE);           /* STORE DATA MESSAGE */
1847    6     =            BUFFER$INDEX = BUFFER$INDEX + DATA$SIZE;
              =
1848    6     =            IF BRICK$MIP(5) < (DATA$SIZE - 4)  THEN
1849    7     =            DO;
1850    7     =              CALL DATA$ANALYSIS;
1851    7     =              DATA$INTEGRITY = NO;            /* BAD DATA INDICATOR */
1852    7     =            END;
              =
1853    6     =            ELSE
              =            DO;
1854    7     =              RECORD$SIZE = BRICK$MIP(5) - (DATA$SIZE - 4);
1855    7     =              IF RECORD$SIZE <> 0  THEN
1856    7     =                NEW$RECORD = NO;        /* MORE RECORD DATA COMING */
1857    7     =              ELSE
              =                CALL DATA$ANALYSIS;
1858    7     =            END;
1859    6     =          END;
1860    5     =        END;
              =
1861    4     =        ELSE
              =        DO;
1862    5     =          DATA$PACKET$TIMER = 30;       /* RELOAD DATA PACKET TIMER */
              =
1863    5     =          CALL MOVXX0 (.BRICK$MIP(4),
              =                        .DATA$BUFFER(BUFFER$INDEX),
              =                        DATA$SIZE);            /* STORE DATA MESSAGE */
1864    5     =          BUFFER$INDEX = BUFFER$INDEX + DATA$SIZE;
```

```
                =
1865   5   =          IF RECORD$SIZE <> DATA$SIZE  THEN
1866   6   =          DO;
1867   6   =            IF RECORD$SIZE < DATA$SIZE  THEN      /* BAD DATA RECORD */
1868   7   =            DO;
1869   7   =              CALL DATA$ANALYSIS;
1870   7   =              DATA$INTEGRITY = NO;             /* BAD DATA INDICATOR */
1871   7   =            END;
               =
1872   6   =            ELSE
               =              RECORD$SIZE = RECORD$SIZE - DATA$SIZE;
1873   6   =          END;
               =
1874   5   =          ELSE
               =          DO;
1875   6   =            NEW$RECORD = YES;                /* DONE WITH THIS RECORD */
1876   6   =            CALL DATA$ANALYSIS;
1877   6   =          END;
1878   5   =        END;
1879   4   =      END;
1880   3   =    END;
               =
1881   2   =    ELSE
               =    IF BRICK$MIP(1) = DATA_ACK  THEN
1882   3   =    DO;
1883   3   =      DATA$TIMER = 0;
1884   3   =      WAITING$FOR$DATA$ACK$FLAG = NO;
               =
1885   3   =      IF (BRICK$MIP(4) = 0FFH) AND
               =                          (MAIN$DATA$TIMER$ACTIVE = YES)  THEN
               =                      /* ADDED 3/16/89 TO HANDLE DATA_NAK
               =                         MESSAGE WHEN NOT IN A DATA SESSION */
1886   4   =      DO;          /* REBUILD AND SEND PREVIOUS DATA/DEVICE RECORD */
1887   4   =        DATA$TIMER$ACTIVE = YES;
1888   4   =        READY$TO$SEND$TERMINATOR = NO;
1889   4   =        DATA$MESSAGE$BUILT = NO;
               =
1890   4   =        IF RECORD$OVERHEAD.RECORD$TYPE = 2  THEN
1891   5   =        DO;
1892   5   =          IF RECORD$OVERHEAD.DATA$LENGTH > 2 THEN
1893   5   =            DATA$REQUEST$MSG = YES;
               =
1894   5   =          ELSE
               =          DO;
1895   6   =            FIRST$DATA$TYPE$MESSAGE$FLAG = YES;
1896   6   =            DATA$MSG = YES;
1897   6   =          END;
1898   5   =        END;
               =
1899   4   =        ELSE
               =        DO;                                  /* DATA PACKET MESSAGE */
1900   5   =          DATA$MSG = YES;
1901   5   =          REQUESTED$DATA$TYPES(0) = REQUESTED$DATA$TYPES(0) + 1;
1902   5   =          DATA$TYPE$INDEX = DATA$TYPE$INDEX - 1;
1903   5   =          DEVICE$RECORD.NUMBER$DATA$TYPES =
               =                              DEVICE$RECORD.NUMBER$DATA$TYPES + 1;
1904   5   =        END;
               =
1905   4   =        DATA$TIMER = 20;
1906   4   =        DATA$MESSAGE$TIMER = 20;
1907   4   =        DATA$MESSAGE$INHIBIT = YES;
               =                      /* INHIBIT DATA MESSAGE FOR 20 SECONDS */
1908   4   =      END;
               =
1909   3   =      ELSE
               =      DO;
1910   4   =        IF TERMINATOR$FLAG = YES  THEN
1911   5   =        DO;
1912   5   =          TERMINATOR$FLAG = NO;
1913   5   =          DATA$REQUEST$MSG = NO;
1914   5   =          DATA$MSG = NO;
               =
1915   5   =          IF SESSION$COUNTER = 0  THEN
1916   6   =          DO;
1917   6   =            DATA$TIMER$ACTIVE = NO;
1918   6   =            BRICK$DELAY$TIMER$ACTIVE = YES;
1919   6   =            BRICK$DELAY$TIMER = 20;    /* 20 SECOND DELAY FOR BRICK */
1920   6   =            CURRENT$DEVICE = 0;
```

```
1921   6   =             CURRENT$PROCESS = 0;
1922   6   =             BUSY$FLAG = NO;
1923   6   =           END;
           =
1924   5   =           ELSE
           =           DO;
1925   6   =             SESSION$COUNTER = SESSION$COUNTER - 1;
1926   6   =             DATA$TIMER = 0;
1927   6   =           END;
1928   5   =         END;
1929   4   =       END;
1930   3   =     END;
           =
1931   2   =     ELSE
           =     IF (BRICK$MIP(1) <= MAX$BRICK$MESSAGE$TYPE) AND
           =        (BRICK$MIP(1) >= MIN$BRICK$MESSAGE$TYPE)  THEN
1932   3   =     DO;
1933   3   =       WAITING = NO;
1934   3   =       BRICK$MESSAGE$TIMER = 0;            /* STOP MESSAGE TIMEOUT */
1935   3   =       READY$TO$TRANSMIT$FLAG = YES;
           =
1936   4   =       DO CASE (BRICK$MIP(1) - MIN$BRICK$MESSAGE$TYPE);
           =                                     /* DO CASE ON BRICK MESSAGF TYPES */
           =
           =                        /* MESSAGE TYPE FC - NO ACK - RESEND MESSAGE */
1937   5   =         DO;
1938   5   =           IF SENT$ONCE$FLAG = NO  THEN
1939   6   =           DO;
1940   6   =             IF TRANS$BRICK$MESSAGE(1) >= 80H  THEN
1941   6   =               RESEND$DATA$MESSAGE = YES;
           =
1942   6   =             CALL RESEND$BRICK$MESSAGE;
1943   6   =           END;
1944   5   =           ELSE
           =           DO;
1945   6   =             SENT$ONCE$FLAG = NO;
1946   6   =             RESEND$DATA$MESSAGE = NO;
1947   6   =             IF (TRANS$BRICK$MESSAGE(1) = WHAT_TIME)
           =                                 OR
           =                (TRANS$BRICK$MESSAGE(1) = ERROR)  THEN
1948   6   =               S$P$TIMER = 2;
1949   6   =             ELSE
           =             IF (TRANS$BRICK$MESSAGE(1) = DATA_ACK)
           =                                 OR
           =                (TRANS$BRICK$MESSAGE(1) = DATA_RQ)
           =                                 OR
           =                (TRANS$BRICK$MESSAGE(1) = DATA)  THEN
1950   7   =             DO;
1951   7   =               DATA$TIMER = 5;        /* TIMER FOR RETRIES OF MESSAGE */
           =
1952   7   =               CALL MOVXX0(.TRANS$BRICK$MESSAGE,
           =                           .DATA$SAVED$BUFFER,
           =                            SIZE (TRANS$BRICK$MESSAGE));
           =
1953   7   =               IF DATA$NAKKED$TWICE = NO  THEN
1954   8   =               DO;
1955   8   =                 DATA$NAKKED$TWICE = YES;
1956   8   =                 DATA$NAKKED$TWICE$COUNTER = 5;   /* TRY FOR 30 SEC. */
1957   8   =                 PASS$THRU$MESSAGE = YES;
1958   8   =               END;
           =
1959   7   =               ELSE
           =               DO;
1960   8   =                 DATA$NAKKED$TWICE$COUNTER =
           =                                      DATA$NAKKED$TWICE$COUNTER - 1;
1961   8   =                 IF DATA$NAKKED$TWICE$COUNTER = 0  THEN
1962   9   =                 DO;
1963   9   =                   DATA$NAKKED$TWICE = NO;
           =                   /* GET OUT OF DATA SESSION AND SEND ERROR MESSAGE */
1964   9   =                   CALL TERMINATE$DATA$SESSION;
1965   9   =                   PASS$THRU$MESSAGE = NO;
1966   9   =                 END;
1967   8   =                 ELSE
           =                   PASS$THRU$MESSAGE = YES;
1968   8   =               END;
1969   7   =             END;
           =
1970   6   =             ELSE
```

```
               =              CALL CLEAR$MESSAGE;
1971    6      =            END;
1972    5      =          END;
               =                         /* MESSAGE TYPE FD - ACK - MESSAGE SENT OUT */
1973    5      =          DO;
1974    5      =            IF (TRANS$BRICK$MESSAGE(1) = DATA_ACK)  THEN
1975    6      =            DO;
1976    6      =              DATA$ACK$MSG = NO;
1977    6      =              RESEND$DATA$MESSAGE = NO;
1978    6      =              PASS$THRU$MESSAGE = NO;
1979    6      =              DATA$NAKKED$TWICE = NO;
1980    6      =            END;
               =
1981    5      =            ELSE
               =            IF (TRANS$BRICK$MESSAGE(1) = DATA_RQ)
               =                                OR
               =              (TRANS$BRICK$MESSAGE(1) = DATA)  THEN
1982    6      =            DO;
1983    6      =              DATA$TIMER = 0;
1984    6      =              RESEND$DATA$MESSAGE = NO;
1985    6      =              PASS$THRU$MESSAGE = NO;
1986    6      =              DATA$NAKKED$TWICE = NO;
1987    6      =            END;
               =
1988    5      =            ELSE
               =              CALL CLEAR$MESSAGE;
               =
1989    5      =            SENT$ONCE$FLAG = NO;
1990    5      =          END;
               =
1991    5      =          DO;                /* MESSAGE TYPE FE - SUB-ADDRESS OF BRICK */
1992    5      =            SENT$ONCE$FLAG = NO;
1993    5      =            PLC$ADDR = BRICK$MIP(2);
               =
1994    5      =            IF (PLC$ADDR AND 7) <> CONTROLLER$ADDRESS  THEN
1995    6      =            DO;
1996    6      =              ERROR$ALERT = YES;
1997    6      =              S$P$TIMER$ACTIVE = YES;
1998    6      =              SEND$ERROR$MSG.PROCESS$NUMBERS = MESSAGE$PROCESS;
1999    6      =              SEND$ERROR$MSG.ERROR$TYPE(ERROR$INDEX) =
               =                                              INVALID$BRICK$SUBADDRESS;
2000    6      =              IF ERROR$INDEX > 13 THEN
2001    6      =                SEND$ERROR$MSG.ERROR$TYPE(ERROR$INDEX) =
               =                              ERROR$BUFFER$OVERFLOW; /* ADDED 3/16/89 */
2002    6      =              ELSE
               =                ERROR$INDEX = ERROR$INDEX + 1;
               =                   /* BRICK ADDRESS DOES NOT MATCH CONTROLLER ADDRESS */
2003    6      =            END;
2004    5      =            REQ$SUBADDRESS$MSG = NO;
2005    5      =          END;
               =
2006    5      =          DO;                       /* MESSAGE TYPE FF - STATUS OF BRICK */
2007    5      =            BRICK$STATUS = BRICK$MIP(3);
2008    5      =            REQ$STATUS$MSG = NO;
2009    5      =            IF BRICK$STATUS <= MAX$BRICK$STATUS$BYTE THEN
2010    6      =            DO CASE BRICK$STATUS;
2011    6      =              ;                                  /* STATUS 0 - IDLE STATE */
2012    6      =              ;                    /* STATUS 1 - ENCAPSULATING PROTOCOL */
2013    6      =              ;                         /* STATUS 2 - TRANSMITTING PACKET */
2014    6      =              ;                 /* STATUS 3 - RECEIVING ACKNOWLEDGEMENT */
2015    6      =              ;                 /* STATUS 4 - TRANSMITTING PACKET RETRY */
2016    6      =              ;                        /* STATUS 5 - RECEIVING RETRY ACK. */
2017    6      =              ;                              /* STATUS 6 - RECEIVING PACKET */
2018    6      =              ;                            /* STATUS 7 - TRANSMITTING ACK. */
2019    6      =              ;           /* STATUS 8 - HIGH UNQUEUED - WAITING TO XMIT */
2020    6      =              ;             /* STATUS 9 - HIGH QUEUED - WAITING TO XMIT */
2021    6      =              ;            /* STATUS A - LOW UNQUEUED - WAITING TO XMIT */
2022    6      =              ;              /* STATUS B - LOW QUEUED - WAITING TO XMIT */
2023    6      =              ;       /* STATUS C - DEFERRED UNQUEUED - WAITING TO XMIT */
2024    6      =              ;         /* STATUS D - DEFERRED QUEUED - WAITING TO XMIT */
2025    6      =              ;                     /* STATUS E - DOUBLE BUFFER OVERFLOW */
2026    6      =              ;  /* STATUS F - UNABLE ACCESS TO PAN NETWORK (2 TRIES) */
2027    6      =              ;                     /* STATUS 10 - BAD CHECKSUM FROM PAN */
2028    6      =              ;             /* STATUS 11 - BAD CHECKSUM FROM APPLICATION */
               =
2029    6      =            END;                   /* END OF DO CASE ON BRICK STATUS */
2030    5      =          END;
2031    4      =        END;
```

```
2032    3  =    END;                          /* END DO CASE FOR BRICK MESSAGE TYPES */
           =
2033    2  =    ELSE
           =      CALL ERROR$MESSAGE,          /* INVALID MESSAGE TYPE RECEIVED */
           =
           =    /*CALL SETBX0 (.BRICK$MIP, 0, 20);*/
           =
2034    1  =    END BRICK$MSG$DECODE;
                /****************************************
                $TITLE ('RECEIVE/TRANSMIT ONE BRICK BYTE')
                $INCLUDE (BRKBYT.STH)
                ****************************************/
2035    1       END BRICK$MSG;


MODULE INFORMATION:                    (STATIC+OVERLAYABLE)
    CODE SIZE                          = 1DF3H       7667D
    CONSTANT SIZE                      = 0279H        633D
    DIRECT VARIABLE SIZE               =   00H+07H      0D+   7D
    INDIRECT VARIABLE SIZE             =   00H+00H      0D+   0D
    BIT SIZE                           =   31H+00H     49D+   0D
    BIT-ADDRESSABLE SIZE               =   00H+00H      0D+   0D
    AUXILIARY VARIABLE SIZE            = 03ACH        940D
    MAXIMUM STACK SIZE                 = 000AH         10D
    REGISTER-BANK(S) USED:               0
    3775 LINES READ
    0 PROGRAM ERROR(S)
END OF PL/M-51 COMPILATION


DOS 3.30 (038-N) PL/M-51 V1.2
COMPILER INVOKED BY:  C:\INTEL\PLM51.EXE BILALG.PTH PW(80)PL(60)DB NOINTVECTOR O
>> T(3)ROM(LARGE)


   1    1       BILLING:  DO;

                /************************************************************/
                /*                                                          */
                /* BBBBB     I   L             A          L          GGGGG  */
                /* B    B    I   L            A A         L         G     G */
                /* B    B    I   L           A   A        L         G       */
                /* BBBBB     I   L          A     A       L         G  GGG  */
                /* B    B    I   L          AAAAAAAAA     L         G     G */
                /* B    B    I   L          A       A     L         G     G */
                /* BBBBB     I   LLLLLL     A       A     LLLLLL     GGGGG  */
                /*                                                          */
                /************************************************************/

                /*************************************************************
                (c) Copyright, Johnson Controls Incorporated, 1988.  All rights
                    reserved. The following program is the exclusive property of
                    Johnson Controls, Inc. and its use is restricted by license
                    agreement to the system with which it was furnished.  The
                    program contents are confidential and may not be disclosed
                    or used outside the system without the express written
                    consent of Johnson Controls.  This program is further
                    protected by federal copyright law as an unpublished work
                    and any unauthorized reproduction is prohibited.
                *************************************************************/

                $NOLIST
                $TITLE ('BILLING DECLARATIONS')
                $INCLUDE (BILDCL.DTH)
           =
           =    /*************************************************************
           =      E X T E R N A L   S T R U C T U R E   D E C L A R A T I O N S
           =    *************************************************************/
           =
 455    1  =    DECLARE  TSTAT$BILLING$INFO$ARRAY  (36) BYTE  EXTERNAL  AUXILIARY;
           =
 456    1  =    DECLARE  TSTAT$BILLING$INFO  STRUCTURE (
           =        CURRENT$BILL$NEW           (4) BYTE,
           =        CURRENT$BILL$OLD           (4) BYTE,
```

```
        =       FORECASTED$BILL          (4) BYTE,
        =       LOW$KWH                  (4) BYTE,
        =       MEDIUM$KWH               (4) BYTE,
        =       HIGH$KWH                 (4) BYTE,
        =       CRITICAL$KWH             (4) BYTE,
        =       TOTAL$KWH                (4) BYTE,
        =       LAST$BILL                (4) BYTE)
        =                          AT (.TSTAT$BILLING$INFO$ARRAY)  AUXILIARY;
        =
457  1  =   DECLARE  STATUS$BYTES              (2) BYTE  EXTERNAL  AUXILIARY;
        =
        =   /*************************************************************/
        =
458  1  =   DECLARE  SCHEDULES                 (399) BYTE  EXTERNAL  AUXILIARY;
        =
459  1  =   DECLARE  CONFIG$DATA    STRUCTURE (
        =       HOUSE$CODE                    BYTE,
        =       F_C$DEGREE                    BYTE,
        =       CLOCK$FORMAT                  BYTE,
        =       FILTER$RUNTIME                BYTE,
        =       WEEKEND$DAY                   BYTE,
        =       HIGH$TEMP$SPAN                BYTE,
        =       LOW$TEMP$SPAN                 BYTE,
        =       EWH$PREHEAT                   BYTE,
        =       H_P$CYCLE$TIME                BYTE,
        =       ELECTRIC$HEAT                 BYTE,
        =       SECONDARY$HEAT$RECOVERY       BYTE,
        =       HIGH$EFFIC$FAN                BYTE,
        =       EMERG$H_P$ACTION              BYTE,
        =       VERSION$NUMBERS           (2) BYTE)  AT (.SCHEDULES(384))
        =                                                        AUXILIARY;
        =
460  1  =   DECLARE  CONFIG$ARRAY              (15) BYTE  AT (.SCHEDULES(384))
        =                                                        AUXILIARY;
        =
        =   /*************************************************************/
        =
461  1  =   DECLARE  SYSTEM$STATUS  STRUCTURE (
        =       CURRENT$TEMPERATURE           BYTE,
        =       SETPOINT$TEMPERATURE          BYTE,
        =       CURRENT$TIER                  BYTE,
        =       CURRENT$PERIOD                BYTE,
        =       CURRENT$MODE                  BYTE,
        =       FAN$MODE                      BYTE,
        =       EMERGENCY$HEAT                BYTE,
        =       HVAC$ACTIVE                   BYTE,
        =       HVAC$OVERRIDE                 BYTE,
        =       EWH$ACTIVE                    BYTE,
        =       EWH$OVERRIDE                  BYTE,
        =       WD_WE                         BYTE,
        =       OPT$ACTIVE                    BYTE,
        =       RUNTIME$TOTAL$HTG         (2) BYTE)  EXTERNAL  AUXILIARY;
        =
462  1  =   DECLARE  METER$CONTROL  STRUCTURE(
        =       NOT$USED                      BYTE,
        =       METER$UPLOAD$DATE         (3) BYTE,
        =       METER$UPLOAD$TIME         (2) BYTE,
        =       DAILY$ROLLOVER$DATE       (3) BYTE,
        =       MONTHLY$ROLLOVER$DATE     (3) BYTE,
        =       UNUSED                    (3) BYTE)  EXTERNAL  AUXILIARY;
        =
463  1  =   DECLARE  TIER$USAGE  STRUCTURE (
        =       TODAYS$DATE               (3) BYTE,
        =       TODAYS$TIER$1             (3) BYTE,
        =       TODAYS$TIER$2             (3) BYTE,
        =       TODAYS$TIER$3             (3) BYTE,
        =       TODAYS$TIER$4             (3) BYTE,
        =       YESTERDAYS$DATE           (3) BYTE,
        =       YESTERDAYS$TIER$1         (3) BYTE,
        =       YESTERDAYS$TIER$2         (3) BYTE,
        =       YESTERDAYS$TIER$3         (3) BYTE,
        =       YESTERDAYS$TIER$4         (3) BYTE,
        =       CURR$MONTHS$TIER$1        (3) BYTE,
        =       CURR$MONTHS$TIER$2        (3) BYTE,
        =       CURR$MONTHS$TIER$3        (3) BYTE,
        =       CURR$MONTHS$TIER$4        (3) BYTE,
        =       LAST$MONTHS$TIER$1        (3) BYTE,
        =       LAST$MONTHS$TIER$2        (3) BYTE,
```

```
          =      LAST$MONTHS$TIER$3          (3) BYTE,
          =      LAST$MONTHS$TIER$4          (3) BYTE,
          =      YESTERDAY$READING           (3) BYTE,
          =      TODAY$READING               (3) BYTE,
          =      LAST$MONTH$TOTAL$KWH        (3) BYTE)  EXTERNAL  AUXILIARY;
          =
464   1   =   DECLARE  TIER$USAGE$ARRAY      (63) BYTE
          =                                       AT (.TIER$USAGE)  AUXILIARY;
465   1   =   DECLARE  PRICING$DATA  STRUCTURE (
          =      TSTAT$DISPLAY                   BYTE,
          =      XFMR$KWH$CONSTANT           (3) BYTE,
          =      XFMR$KW$CONSTANT            (3) BYTE,
          =      PRICE$TIER$1                (3) BYTE,
          =      PRICE$TIER$2                (3) BYTE,
          =      PRICE$TIER$3                (3) BYTE,
          =      PRICE$TIER$4                (3) BYTE,
          =      FUEL                        (3) BYTE,
          =      STD$RATE$STEP1$KWH          (3) BYTE,
          =      STD$RATE$STEP1$PRICE        (3) BYTE,
          =      STD$RATE$STEP2$KWH          (3) BYTE,
          =      STD$RATE$STEP2$PRICE        (3) BYTE,
          =      STD$RATE$STEP3$KWH          (3) BYTE,
          =      STD$RATE$STEP3$PRICE        (3) BYTE,
          =      STD$RATE$STEP4$KWH          (3) BYTE,
          =      STD$RATE$STEP4$PRICE        (3) BYTE,
          =      STD$RATE$STEP5$KWH          (3) BYTE,
          =      STD$RATE$STEP5$PRICE        (3) BYTE,
          =      STD$RATE$STEP6$KWH          (3) BYTE,
          =      STD$RATE$STEP6$PRICE        (3) BYTE,
          =      EWH$OPTION                      BYTE,
          =      NOT$USED                    (7) BYTE)  EXTERNAL  AUXILIARY;
          =
466   1   =   DECLARE  PRICING$DATA$ARRAY  (66) BYTE
          =                                    AT (.PRICING$DATA)  AUXILIARY;
          =
467   1   =   DECLARE  TIME$AND$DATE  STRUCTURE (
          =      YEAR                            BYTE,
          =      MONTH                           BYTE,
          =      DAY                             BYTE,
          =      HOUR                            BYTE,
          =      MINUTE                          BYTE,
          =      DAY$OF$WEEK                     BYTE)  EXTERNAL  AUXILIARY;
          =
          =
          =   /****************************************************************
          =         A R R A Y / S T R U C T U R E   D E C L A R A T I O N S
          =   ****************************************************************/
          =
468   1   =   DECLARE  BINARY$DATA  STRUCTURE (
          =      KWH$CONSTANT                (6) BYTE,
          =      PRICES                     (12) BYTE,
          =      FUEL                        (3) BYTE,
          =      STANDARD                   (36) BYTE,
          =      USAGE                      (12) BYTE,
          =      TIER$COST                  (12) BYTE,
          =      USAGE$COST                 (24) BYTE,
          =      TIER$TOTAL$COST            (24) BYTE,
          =      TOTAL$TIER$USAGE            (3) BYTE,
          =      STEP$USAGE                 (36) BYTE,
          =      TODAYS$USAGE               (12) BYTE)  AUXILIARY;
          =
469   1   =   DECLARE  BINARY$DATA$ARRAY  (180) BYTE
          =                                    AT  (.BINARY$DATA)  AUXILIARY;
          =
          =   /****************************************************************
          =           P U B L I C   W O R D   D E C L A R A T I O N S
          =   ****************************************************************/
          =
470   1   =   DECLARE  MISC$WORD                             WORD  EXTERNAL;
          =
          =   /****************************************************************
          =                   W O R D   D E C L A R A T I O N
          =   ****************************************************************/
          =
471   1   =   DECLARE  CURRENT$BILLING                       WORD  AUXILIARY;
472   1   =   DECLARE  LAST$BILLING                          WORD  AUXILIARY;
          =
```

```
          =   /*****************************************************************
          =          P U B L I C   B Y T E   D E C L A R A T I O N S
          =   *****************************************************************/
          =                           D-183
473   1   =   DECLARE  STEP$COUNTER                   BYTE  PUBLIC  AUXILIARY;
          =
          =   /*****************************************************************
          =       E X T E R N A L   B Y T E   D E C L A R A T I O N S
          =   *****************************************************************/
          =
474   1   =   DECLARE  UNITS$NUMBER                   BYTE  EXTERNAL  AUXILIARY;
          =
          =   /*****************************************************************
          =                  B Y T E   D E C L A R A T I O N
          =   *****************************************************************/
          =
475   1   =   DECLARE  ADD$INDEX                      BYTE  AUXILIARY;
476   1   =   DECLARE  BINARY$INDEX                   BYTE  AUXILIARY;
477   1   =   DECLARE  BOTTOM$NUMBER              (3) BYTE  AUXILIARY;
478   1   =   DECLARE  BOTTOM$NUMBER$INDEX            BYTE  AUXILIARY;
479   1   =   DECLARE  BY$NUMBER                      BYTE  AUXILIARY;
480   1   =   DECLARE  BYTE$ONE                       BYTE  AUXILIARY;
481   1   =   DECLARE  BYTE$TWO                       BYTE  AUXILIARY;
482   1   =   DECLARE  CONVERT$INDEX                  BYTE  AUXILIARY;
483   1   =   DECLARE  INTO$NUMBER                (9) BYTE  AUXILIARY;
484   1   =   DECLARE  INTO$NUMBER$INDEX              BYTE  AUXILIARY;
485   1   =   DECLARE  MISC$INDEX                     BYTE  AUXILIARY;
486   1   =   DECLARE  NUMBER$MASKED                  BYTE  AUXILIARY;
487   1   =   DECLARE  PRODUCT                    (9) BYTE  AUXILIARY;
488   1   =   DECLARE  PRODUCT$INDEX                  BYTE  AUXILIARY;
489   1   =   DECLARE  REMAINDER$NUMBER               BYTE  AUXILIARY;
490   1   =   DECLARE  RATE$COUNTER                   BYTE  AUXILIARY;
491   1   =   DECLARE  REVERSED$NUMBER                BYTE  AUXILIARY;
492   1   =   DECLARE  TEMP$PRODUCT               (9) BYTE  AUXILIARY;
493   1   =   DECLARE  TOP$NUMBER                 (6) BYTE  AUXILIARY;
494   1   =   DECLARE  TOP$NUMBER$INDEX               BYTE  AUXILIARY;
          =
          =   /*****************************************************************
          =     P U B L I C   B I T   M A P P E D   D E C L A R A T I O N S
          =   *****************************************************************/
          =
495   1   =   DECLARE  BILLING$COMPLETED              BIT  PUBLIC;
          =
          =   /*****************************************************************
          =   E X T E R N A L   B I T   M A P P E D   D E C L A R A T I O N S
          =   *****************************************************************/
          =
496   1   =   DECLARE  ROLLOVER$DATA$RECEIVED         BIT  EXTERNAL;
497   1   =   DECLARE  PRICE$DATA$RECEIVED            BIT  EXTERNAL;
498   1   =   DECLARE  USAGE$DATA$RECEIVED            BIT  EXTERNAL;
          =
          =   /*****************************************************************
          =            B I T   M A P P E D   D E C L A R A T I O N S
          =   *****************************************************************/
          =
499   1   =   DECLARE  IGNORE$SUBTRACTION             BIT;
500   1   =   DECLARE  LONG$MULTIPLICATION            BIT;
501   1   =   DECLARE  NUMBER$FOUND                   BIT;
502   1   =   DECLARE  WATCHDOG$TIMER                 BIT  AT (97H) REG;
          =
          =   /*****************************************************************
          =              L I T E R A L   D E C L A R A T I O N S
          =   *****************************************************************/
          =
503   1   =   DECLARE  NO                             LITERALLY        '0';
504   1   =   DECLARE  OFF                            LITERALLY        '0';
505   1   =   DECLARE  ON                             LITERALLY     '0FFH';
506   1   =   DECLARE  YES                            LITERALLY        '1';
          =
          =   /*****************************************************************
          =     E X T E R N A L   M O D U L E S   D E C L A R A T I O N
          =   *****************************************************************/
          =
507   2   =   ADJUST$UNITS:  PROCEDURE  EXTERNAL;
508   1   =   END ADJUST$UNITS;
          =
509   2   =   BCD$TO$BIN$CONVERT:  PROCEDURE  (NUMBER)  BYTE  EXTERNAL;
510   2   =   DECLARE  NUMBER                         BYTE;
```

```
511   1  =   END BCD$TO$BIN$CONVERT;
         =
512   2  =   BIN$TO$BCD$CONVERT:  PROCEDURE  (NUMBER)  BYTE  EXTERNAL;
513   2  =   DECLARE  NUMBER                           BYTE;
514   1  =   END BIN$TO$BCD$CONVERT;
         =
515   2  =   MONTH$TO$DAYS$CONVERT: PROCEDURE (CONVERT$MONTH) WORD EXTERNAL;
516   2  =   DECLARE  CONVERT$MONTH                     WORD;
517   1  =   END MONTH$TO$DAYS$CONVERT;
             $TITLE ('BILLING ALGORITHMS')
             $INCLUDE (BILALG.STH)
         =
         =   /*********************** TEST FOR ZERO ***********************/
         =
518   2  =   TEST$FOR$ZERO:  PROCEDURE;
         =
519   2  =   CONVERT$INDEX = 3;
         =
520   3  =   DO WHILE  CONVERT$INDEX <> 0FFH;
521   3  =     IF (TSTAT$BILLING$INFO$ARRAY(MISC$INDEX) = 0)  THEN
522   4  =     DO;
523   4  =       TSTAT$BILLING$INFO$ARRAY(MISC$INDEX) = 0AAH;
         =                                         /* TSTAT WILL BLANK A'S */
524   4  =       IF CONVERT$INDEX = 0  THEN
525   4  =         TSTAT$BILLING$INFO$ARRAY(MISC$INDEX) = 0A0H;
         =                                       /* ENTIRE PRODUCT IS ZERO */
526   4  =       ELSE
         =         TSTAT$BILLING$INFO$ARRAY(MISC$INDEX) = 0AAH;
         =                                         /* TSTAT WILL BLANK A'S */
527   4  =       CONVERT$INDEX = CONVERT$INDEX - 1;
528   4  =       MISC$INDEX = MISC$INDEX + 1;
529   4  =     END;
         =
530   3  =     ELSE
         =     DO;
531   4  =       IF (TSTAT$BILLING$INFO$ARRAY(MISC$INDEX) AND 0F0H) = 0 THEN
532   4  =         TSTAT$BILLING$INFO$ARRAY(MISC$INDEX) =
         =                        TSTAT$BILLING$INFO$ARRAY(MISC$INDEX) OR 0A0H;
         =
533   4  =       CONVERT$INDEX = 0FFH;
534   4  =     END;
535   3  =   END;
         =
536   1  =   END TEST$FOR$ZERO;
         =
         =   /*********************** TSTAT DISPLAY FORMAT ******************/
         =
537   2  =   MODIFY$FOR$DISPLAY:  PROCEDURE;
         =
538   2  =   CONVERT$INDEX = 0;
         =                          /* CONVERT PRODUCT FROM BINARY TO BCD */
539   3  =   DO WHILE  CONVERT$INDEX < 9;
540   3  =     PRODUCT(CONVERT$INDEX) =
         =                   BIN$TO$BCD$CONVERT (PRODUCT(CONVERT$INDEX));
541   3  =     CONVERT$INDEX = CONVERT$INDEX + 1;
542   3  =   END;
         =
543   2  =   CALL MOVXX0 (.PRODUCT(1), .TEMP$PRODUCT, 6);
544   2  =   CALL SETBX0 (.PRODUCT, 0, 9);
         =
545   2  =   PRODUCT(5) = SHR (TEMP$PRODUCT(5), 4);
546   2  =   BINARY$INDEX = 5;
         =
547   3  =   DO WHILE BINARY$INDEX <> 0;
         =
548   3  =     REVERSED$NUMBER = ROL (TEMP$PRODUCT(BINARY$INDEX - 1), 4);
         =                                               /* SWAP NYBBLES */
549   3  =     NUMBER$MASKED = REVERSED$NUMBER AND 0F0H;
         =                                         /* MASK OFF LOW NYBBLE */
550   3  =     PRODUCT(BINARY$INDEX) = PRODUCT(BINARY$INDEX) OR NUMBER$MASKED;
         =
551   3  =     NUMBER$MASKED = REVERSED$NUMBER AND 0FH;
         =                                        /* MASK OFF HIGH NYBBLE */
552   3  =     BINARY$INDEX = BINARY$INDEX - 1;
553   3  =     PRODUCT(BINARY$INDEX) = NUMBER$MASKED;
554   3  =   END;
         =
555   2  =   CALL MOVXX0 (.PRODUCT(1),
```

```
          =                 .TSTAT$BILLING$INFO$ARRAY(MISC$INDEX), 4);
          =
 556   2  =   CALL TEST$FOR$ZERO;
          =
 557   1  =   END MODIFY$FOR$DISPLAY;
          =
          =   /*********************** UPDATE PRODUCT ***********************/
          =
 558   2  =   ADD$TO$TOTAL:  PROCEDURE;
          =
 559   2  =   ADD$INDEX = 8;
 560   3  =   DO WHILE ADD$INDEX <> 0FFH;
          =
 561   3  =     PRODUCT(ADD$INDEX) = PRODUCT(ADD$INDEX) +
          =                                          TEMP$PRODUCT(ADD$INDEX);
 562   3  =     IF PRODUCT(ADD$INDEX) > 63H  THEN
 563   4  =     DO;
 564   4  =       PRODUCT(ADD$INDEX) = PRODUCT(ADD$INDEX) - 64H; /* MINUS 100 */
 565   4  =       PRODUCT(ADD$INDEX - 1) = PRODUCT(ADD$INDEX - 1) + 1;
 566   4  =     END;
          =
 567   3  =     ADD$INDEX = ADD$INDEX - 1;
 568   3  =   END;
          =
 569   1  =   END ADD$TO$TOTAL;
          =
          =   /****************** SUBTRACTION OF BCD NUMBERS *****************/
          =
 570   2  =   SUBTRACTION:  PROCEDURE;
          =
 571   2  =   CONVERT$INDEX = 2;
 572   2  =   CALL MOVXX0 (.PRODUCT, .TEMP$PRODUCT, 3);
          =
          =           /* VERIFY THAT TOP NUMBER IS LARGER THAN BOTTOM NUMBER */
 573   2  =   IF TOP$NUMBER(0) >= BOTTOM$NUMBER(0) THEN
 574   3  =   DO;
 575   3  =     IF TOP$NUMBER(0) = BOTTOM$NUMBER(0)  THEN
 576   4  =     DO;
 577   4  =       IF TOP$NUMBER(1) >= BOTTOM$NUMBER(1)  THEN
 578   5  =       DO;
 579   5  =         IF TOP$NUMBER(1) = BOTTOM$NUMBER(1)  THEN
 580   6  =         DO;
 581   6  =           IF TOP$NUMBER(2) >= BOTTOM$NUMBER(2)  THEN
 582   6  =               IGNORE$SUBTRACTION = NO;
          =                                        /* MODIFICATION MADE 4/17/89 */
 583   6  =           ELSE
          =             IGNORE$SUBTRACTION = YES;
 584   6  =         END;
 585   5  =       END;
 586   4  =       ELSE
          =         IGNORE$SUBTRACTION = YES;
 587   4  =     END;
 588   3  =   END;
 589   2  =   ELSE
          =     IGNORE$SUBTRACTION = YES;
          =
 590   2  =   IF IGNORE$SUBTRACTION = NO  THEN
 591   3  =   DO WHILE CONVERT$INDEX <> 0FFH;
 592   3  =     IF TOP$NUMBER(CONVERT$INDEX) <
          =                                    BOTTOM$NUMBER(CONVERT$INDEX)  THEN
 593   4  =     DO;                /* THIS DOES A BORROW FROM THE NEXT BYTE */
 594   4  =       TOP$NUMBER(CONVERT$INDEX) = TOP$NUMBER(CONVERT$INDEX) + 64H;
 595   4  =       TOP$NUMBER(CONVERT$INDEX - 1) =
          =                                    TOP$NUMBER(CONVERT$INDEX - 1) - 1;
 596   4  =     END;
          =
 597   3  =     ELSE
          =     IF (TOP$NUMBER(CONVERT$INDEX) > 200)  THEN
 598   4  =     DO;
 599   4  =       TOP$NUMBER(CONVERT$INDEX) = 63H;         /* VALUE IS 99 BCD */
 600   4  =       TOP$NUMBER(CONVERT$INDEX - 1) =
          =                                    TOP$NUMBER(CONVERT$INDEX - 1) - 1;
          =                              /* THIS ALLOWS FOR BORROWING FROM ZERO */
 601   4  =     END;
          =
 602   3  =     PRODUCT(CONVERT$INDEX) =
          =           TOP$NUMBER(CONVERT$INDEX) - BOTTOM$NUMBER(CONVERT$INDEX)
          =
```

```
603   3  =      CONVERT$INDEX = CONVERT$INDEX - 1;
604   3  =    END;
         =
605   1  =    END SUBTRACTION;
         =
         =    /********************** MULTIPLY MODULE ************************
         =
606   2  =    MULTIPLICATION:  PROCEDURE;
         =     /* START MULTIPLYING BYTE BY BYTE, REMEMBERING PROPER POSITION *
         =
607   2  =    IF LONG$MULTIPLICATION = YES  THEN
608   3  =    DO;
609   3  =      TOP$NUMBER$INDEX = 5;
610   3  =      PRODUCT$INDEX = 8;
611   3  =    END;
612   2  =    ELSE
         =    DO;
613   3  =      TOP$NUMBER$INDEX = 2;
614   3  =      PRODUCT$INDEX = 5;
615   3  =    END;
         =
616   2  =    BOTTOM$NUMBER$INDEX = 2;
617   2  =    CALL SETBX0 (.PRODUCT, 0, 9);
618   2  =    CALL SETBX0 (.TEMP$PRODUCT, 0, 9);
619   3  =    DO WHILE BOTTOM$NUMBER$INDEX <> 0FFH;
620   3  =      MISC$WORD = TOP$NUMBER(TOP$NUMBER$INDEX) *
         =                              BOTTOM$NUMBER(BOTTOM$NUMBER$INDEX);
         =
621   3  =      TEMP$PRODUCT (PRODUCT$INDEX) = MISC$WORD MOD 64H;
622   3  =      TEMP$PRODUCT (PRODUCT$INDEX - 1) = MISC$WORD / 64H;
         =
623   3  =      CALL ADD$TO$TOTAL;            /* UPDATE AND MAINTAIN BCD TOTAL */
         =
624   3  =      CALL SETBX0 (.TEMP$PRODUCT, 0, 9);
         =                            /* CLEAR BYTES FOR NEXT MULTIPLICATION */
         =
625   3  =      IF TOP$NUMBER$INDEX = 0  THEN
626   4  =      DO;                      /* SET UP FOR NEXT MULTIPLICATION */
627   4  =        IF LONG$MULTIPLICATION = YES  THEN
628   5  =        DO;
629   5  =          TOP$NUMBER$INDEX = 5;
630   5  =          PRODUCT$INDEX = PRODUCT$INDEX + 4;
631   5  =        END;
         =
632   4  =        ELSE
         =        DO;
633   5  =          TOP$NUMBER$INDEX = 2;
634   5  =          PRODUCT$INDEX = PRODUCT$INDEX + 1;
635   5  =        END;
         =
636   4  =        BOTTOM$NUMBER$INDEX = BOTTOM$NUMBER$INDEX - 1;
637   4  =      END;
         =
638   3  =      ELSE
         =      DO;
639   4  =        TOP$NUMBER$INDEX = TOP$NUMBER$INDEX - 1;
640   4  =        PRODUCT$INDEX = PRODUCT$INDEX - 1;
641   4  =      END;
642   3  =    END;                                     /* END OF DO WHILE */
         =
643   1  =    END MULTIPLICATION;
         =
         =    /*********************** DIVISION MODULE **********************/
         =
644   2  =    DIVISION:  PROCEDURE;
         =
645   2  =    CALL SETBX0 (.PRODUCT, 0, 9);
646   2  =    INTO$NUMBER$INDEX = 0;
         =
647   2  =    MISC$WORD = INTO$NUMBER(INTO$NUMBER$INDEX);
         =                                  /* PRELOAD MOST SIGNIFICANT BYTE */
648   3  =    DO WHILE INTO$NUMBER$INDEX < 8;
         =
649   3  =      INTO$NUMBER$INDEX = INTO$NUMBER$INDEX + 1;
         =
650   3  =      PRODUCT(INTO$NUMBER$INDEX) = MISC$WORD / BY$NUMBER;
         =                                               /* STORE QUOTIENT */
651   3  =      REMAINDER$NUMBER = MISC$WORD MOD BY$NUMBER;
```

```
652   3  =     IF INTO$NUMBER$INDEX = 8  THEN
653   4  =     DO;
654   4  =       IF (REMAINDER$NUMBER * 2) >= BY$NUMBER  THEN
655   4  =         PRODUCT(INTO$NUMBER$INDEX) = PRODUCT(INTO$NUMBER$INDEX) + 1;
         =              /* ROUND OFF IF EQUAL TO OR GREATER THAN DIVISOR * 2 */
656   4  =     END;
657   3  =     ELSE
         =       MISC$WORD =
         =       (REMAINDER$NUMBER * 64H) + INTO$NUMBER(INTO$NUMBER$INDEX + 1);
658   3  =   END;
         =
659   1  =   END DIVISION;
         =
         =   /******* CONVERT BCD TO BINARY-BCD AND PUT IN PROPER ORDER ******/
         =
660   2  =   STEP$ONE:  PROCEDURE;
         =
661   2  =   MISC$INDEX = 1;
662   2  =   BINARY$INDEX = 0;
         =
663   3  =   DO WHILE MISC$INDEX < 22;
         =
664   3  =     BINARY$DATA$ARRAY(BINARY$INDEX) = BCD$TO$BIN$CONVERT
         =                                  (PRICING$DATA$ARRAY(MISC$INDEX));
665   3  =     MISC$INDEX = MISC$INDEX + 1;
666   3  =     BINARY$INDEX = BINARY$INDEX + 1;
667   3  =   END;                                        /* END OF DO WHILE */
         =
668   2  =   STEP$COUNTER = STEP$COUNTER + 1;
         =
669   1  =   END STEP$ONE;
         =
         =   /**************************************************************/
         =
670   2  =   STEP$TWO:  PROCEDURE;
         =
671   2  =   MISC$INDEX = 22;
672   2  =   BINARY$INDEX = 21;
         =
673   3  =   DO WHILE MISC$INDEX < 58;
674   3  =     BINARY$$DATA$ARRAY(BINARY$INDEX) = BCD$TO$BIN$CONVERT
         =                                  (PRICING$DATA$ARRAY(MISC$INDEX));
675   3  =     MISC$INDEX = MISC$INDEX + 1;
676   3  =     BINARY$INDEX = BINARY$INDEX + 1;
677   3  =   END;                                        /* END OF DO WHILE */
         =
678   2  =   STEP$COUNTER = STEP$COUNTER + 1;
         =
679   1  =   END STEP$TWO;
         =
         =   /**************************************************************/
         =
680   2  =   STEP$THREE:  PROCEDURE;
         =
681   2  =   MISC$INDEX = 0;
682   2  =   BINARY$INDEX = 57;
         =
683   3  =   DO WHILE MISC$INDEX < 12;
684   3  =     BINARY$DATA$ARRAY(BINARY$INDEX) = BCD$TO$BIN$CONVERT
         =                      (TIER$USAGE.CURR$MONTHS$TIER$1(MISC$INDEX));
685   3  =     MISC$INDEX = MISC$INDEX + 1;
686   3  =     BINARY$INDEX = BINARY$INDEX + 1;
687   3  =   END;                                        /* END OF DO WHILE */
         =
688   2  =   MISC$INDEX = 0;
689   2  =   BINARY$INDEX = 168;
         =
690   3  =   DO WHILE MISC$INDEX < 12;
691   3  =     BINARY$DATA$ARRAY(BINARY$INDEX) = BCD$TO$BIN$CONVERT
         =                           (TIER$USAGE.TODAYS$TIER$1(MISC$INDEX));
692   3  =     MISC$INDEX = MISC$INDEX + 1;
693   3  =     BINARY$INDEX = BINARY$INDEX + 1;
694   3  =   END;                                        /* END OF DO WHILE */
         =
695   2  =   MISC$INDEX = 0;
696   3  =   DO WHILE MISC$INDEX < 12;
697   3  =     CALL MOVXX0 (.BINARY$DATA.USAGE(MISC$INDEX), .TOP$NUMBER, 3);
698   3  =     CALL MOVXX0 (.BINARY$DATA.TODAYS$USAGE(MISC$INDEX),
         =                                              .BOTTOM$NUMBER, 3);
```

```
699   3   =       IGNORE$SUBTRACTION = NO;
          =
700   3   =       CALL SUBTRACTION;
          =
701   3   =       IF IGNORE$SUBTRACTION = NO  THEN
702   3   =         CALL MOVXX0 (.PRODUCT, .BINARY$DATA.USAGE(MISC$INDEX), 3);
          =
703   3   =       MISC$INDEX = MISC$INDEX + 3;
704   3   =     END;
          =
705   2   =     STEP$COUNTER = STEP$COUNTER + 1;
          =
706   1   =     END STEP$THREE;
          =
          =     /********************* CALCULATE TIER COST *********************/
          =
707   2   =     STEP$FOUR:  PROCEDURE;
          =
708   2   =     MISC$INDEX = 6;     /* OFFSET INTO BINARY$DATA (PRICE) STRUCTURE */
709   2   =     BINARY$INDEX = 0;          /* OFFSET INTO BINARY$DATA STRUCTURE */
          =
710   3   =     DO WHILE MISC$INDEX < 19;
711   3   =       CALL MOVXX0 (.BINARY$DATA$ARRAY(MISC$INDEX), .TEMP$PRODUCT, 3);
712   3   =       CALL MOVXX0 (.BINARY$DATA.FUEL, .PRODUCT, 3);
713   3   =       CALL ADD$TO$TOTAL;
714   3   =       CALL MOVXX0 (.PRODUCT, .BINARY$DATA.TIER$COST(BINARY$INDEX), 3);
          =
715   3   =       MISC$INDEX = MISC$INDEX + 3;
716   3   =       BINARY$INDEX = BINARY$INDEX + 3;
717   3   =     END;                                    /* END OF DO WHILE LOOP */
          =
718   2   =     STEP$COUNTER = STEP$COUNTER + 1;
          =
719   1   =     END STEP$FOUR;
          =
          =     /****************** CALCULATE TIER USAGE COST *****************/
          =
720   2   =     STEP$FIVE:  PROCEDURE;
          =
721   2   =     IF MISC$INDEX < 57  THEN
722   3   =     DO;
723   3   =       MISC$INDEX = 57; /* OFFSET INTO BINARY$DATA (USAGE) STRUCTURE */
724   3   =       BINARY$INDEX = 0;        /* OFFSET INTO BINARY$DATA STRUCTURE */
725   3   =       CONVERT$INDEX = 0;
726   3   =     END;
          =
727   2   =     LONG$MULTIPLICATION = NO;
          =
728   2   =     CALL MOVXX0 (.BINARY$DATA.TIER$COST(BINARY$INDEX),
          =                                                     .TOP$NUMBER, 3);
729   2   =     CALL MOVXX0 (.BINARY$DATA$ARRAY(MISC$INDEX), .BOTTOM$NUMBER, 3);
          =
730   2   =     CALL MULTIPLICATION;
          =
731   2   =     CALL MOVXX0 (.PRODUCT, .BINARY$DATA.USAGE$COST(CONVERT$INDEX), 6);
          =                                           /* STORE TIER USAGE COST */
732   2   =     MISC$INDEX = MISC$INDEX + 3;
733   2   =     BINARY$INDEX = BINARY$INDEX + 3;
734   2   =     CONVERT$INDEX = CONVERT$INDEX + 6;
          =
735   2   =     IF BINARY$INDEX > 9  THEN
736   3   =     DO;
737   3   =       MISC$INDEX = 0;
738   3   =       BINARY$INDEX = 0;
739   3   =       CONVERT$INDEX = 0;
740   3   =       STEP$COUNTER = STEP$COUNTER + 1;
741   3   =     END;
          =
742   1   =     END STEP$FIVE;
          =
          =     /********************* CALCULATE TOTAL COST ********************/
          =
743   2   =     STEP$SIX:  PROCEDURE;
          =
744   2   =     MISC$INDEX = 0;            /* OFFSET INTO BINARY$DATA STRUCTURE */
745   2   =     BINARY$INDEX = 0;
          =
746   3   =     DO WHILE BINARY$INDEX < 24;
```

```
747   3  =     CALL MOVXX0 (.BINARY$DATA.USAGE$COST(BINARY$INDEX),
         =                    .TEMP$PRODUCT, 6);
748   3  =     CALL ADD$TO$TOTAL;
         =
749   3  =     BINARY$INDEX = BINARY$INDEX + 6;
750   3  =   END;                                        /* END OF DO WHILE LOOP */
         =
751   2  =   LONG$MULTIPLICATION = YES;
         =
752   2  =   CALL MOVXX0 (.PRODUCT, .TOP$NUMBER, 6);
753   2  =   CALL MOVXX0 (.BINARY$DATA.KWH$CONSTANT, .BOTTOM$NUMBER, 3);
         =
754   2  =   CALL MULTIPLICATION;
         =
755   2  =   CALL MOVXX0 (.PRODUCT, .INTO$NUMBER, 9);
         =
756   2  =   MISC$INDEX = 0;
         =
757   2  =   IF (PRICING$DATA.TSTAT$DISPLAY AND 2) <> 0  THEN
758   2  =     CALL MODIFY$FOR$DISPLAY;
759   2  =   ELSE
         =     TSTAT$BILLING$INFO$ARRAY(0) = 0FFH;
         =
760   2  =   STEP$COUNTER = STEP$COUNTER + 1;
         =
761   1  =   END STEP$SIX;
         =
         =   /****************** CALCULATE TOTAL TIER USAGE *****************/
         =
762   2  =   STEP$SEVEN:  PROCEDURE;
         =
763   2  =   BINARY$INDEX = 0;    /* OFFSET INTO BINARY$DATA.USAGE STRUCTURE */
         =
764   3  =   DO WHILE BINARY$INDEX < 12;
765   3  =     CALL MOVXX0 (.BINARY$DATA.USAGE(BINARY$INDEX),
         =                                                .TEMP$PRODUCT, 3);
766   3  =     CALL ADD$TO$TOTAL;
         =
767   3  =     BINARY$INDEX = BINARY$INDEX + 3;
768   3  =   END;                                        /* END OF DO WHILE LOOP */
         =
769   2  =   CALL MOVXX0 (.PRODUCT, .BINARY$DATA.TOTAL$TIER$USAGE, 3);
         =           /* STORE TOTAL TIER USAGE FOR STANDARD RATE CALCULATION */
         =
770   2  =   STEP$COUNTER = STEP$COUNTER + 1;
         =
771   1  =   END STEP$SEVEN;
         =
         =   /********************** UPDATE STANDARD PRICE ******************/
         =
772   2  =   STEP$EIGHT:  PROCEDURE;
         =
773   2  =   BINARY$INDEX = 3;          /* OFFSET INTO BINARY$DATA STRUCTURE */
         =
774   3  =   DO WHILE BINARY$INDEX < 36;
775   3  =     CALL MOVXX0 (.BINARY$DATA.STANDARD(BINARY$INDEX),
         =                                                .TEMP$PRODUCT, 3);
776   3  =     CALL MOVXX0 (.BINARY$DATA.FUEL, .PRODUCT, 3);
777   3  =     CALL ADD$TO$TOTAL;
778   3  =     CALL MOVXX0 (.PRODUCT, .BINARY$DATA.STANDARD(BINARY$INDEX), 3);
         =
779   3  =     BINARY$INDEX = BINARY$INDEX + 6;
780   3  =   END;                                        /* END OF DO WHILE LOOP */
         =
781   2  =   STEP$COUNTER = STEP$COUNTER + 1;
         =
782   1  =   END STEP$EIGHT;
         =
         =   /*************** CALCULATE TIER USAGE FOR EACH STEP *************/
         =
783   2  =   STEP$NINE:  PROCEDURE;
         =
784   2  =   BINARY$INDEX = 0;
         =                 /* OFFSET INTO BINARY$DATA (STANDARD) STRUCTURE */
785   2  =   RATE$COUNTER = 0;
786   2  =   IGNORE$SUBTRACTION = NO;
         =
787   2  =   CALL MOVXX0 (.BINARY$DATA.TOTAL$TIER$USAGE, .TOP$NUMBER, 3);
```

```
              =
788    3      =     DO WHILE RATE$COUNTER < 6;
789    3      =       IF IGNORE$SUBTRACTION = NO THEN
790    4      =       DO;
791    4      =         CALL MOVXX0 (.BINARY$DATA.STANDARD(BINARY$INDEX),
              =                                                     .BOTTOM$NUMBER, 3);
792    4      =         CALL SUBTRACTION;
              =
793    4      =         IF (IGNORE$SUBTRACTION = YES) OR
              =            ( (BINARY$DATA.STANDARD(BINARY$INDEX + 6) = 0) AND
              =              (BINARY$DATA.STANDARD(BINARY$INDEX + 7) = 0) AND
              =              (BINARY$DATA.STANDARD(BINARY$INDEX + 8) = 0) )
              =         THEN
794    5      =         DO;
795    5      =           IGNORE$SUBTRACTION = YES;
796    5      =           CALL MOVXX0 (.TOP$NUMBER,
              =                        .BINARY$DATA.STANDARD(BINARY$INDEX), 3);
797    5      =           BINARY$INDEX = BINARY$INDEX + 6;
798    5      =         END;                              /* STORE TIER USAGE COST */
              =
799    4      =         ELSE
              =         DO;
800    5      =           CALL MOVXX0 (.PRODUCT, .TOP$NUMBER, 3);
801    5      =           BINARY$INDEX = BINARY$INDEX + 6;
802    5      =         END;
803    4      =       END;
              =
804    3      =       ELSE
              =       DO;         /* THIS WILL ZERO OUT REMAINING STEP RATES & COSTS */
805    4      =         CALL SETBX0 (.BINARY$DATA.STANDARD(BINARY$INDEX), 0, 6);
806    4      =         BINARY$INDEX = BINARY$INDEX + 6;
807    4      =       END;
              =
808    3      =       RATE$COUNTER = RATE$COUNTER + 1;
809    3      =     END;
              =
810    2      =     MISC$INDEX = 0;         /* INSURES THAT NEXT STEP IS INITIALIZED */
811    2      =     STEP$COUNTER = STEP$COUNTER + 1;
              =
812    1      =     END STEP$NINE;
              =
              =     /********************* CALCULATE STEP COST *********************/
              =
813    2      =     STEP$TEN:  PROCEDURE;
              =
814    2      =     IF MISC$INDEX < 21  THEN
815    3      =     DO;
816    3      =       BINARY$INDEX = 0;
              =                        /* OFFSET INTO BINARY$DATA.STANDARD STRUCTURE */
817    3      =       MISC$INDEX = 21;  /* OFFSET INTO TSTAT$BILLING$INFO STRUCTURE */
818    3      =     END;
              =
819    2      =     IF RATE$COUNTER <> 0  THEN
820    3      =     DO;
821    3      =       LONG$MULTIPLICATION = NO;
              =
822    3      =       CALL MOVXX0 (.BINARY$DATA$ARRAY(MISC$INDEX), .TOP$NUMBER, 3);
823    3      =       CALL MOVXX0 (.BINARY$DATA$ARRAY(MISC$INDEX + 3),
              =                                                     .BOTTOM$NUMBER, 3);
824    3      =       CALL MULTIPLICATION;
              =
825    3      =       CALL MOVXX0 (.PRODUCT,
              =                        .BINARY$DATA.STEP$USAGE(BINARY$INDEX), 6);
              =                          /* STORE UNCONVERTED STEP USAGE COST */
              =
826    3      =       MISC$INDEX = MISC$INDEX + 6;
827    3      =       BINARY$INDEX = BINARY$INDEX + 6;
828    3      =       RATE$COUNTER = RATE$COUNTER - 1;
829    3      =     END;
              =
830    2      =     ELSE
              =     DO;
831    3      =       MISC$INDEX = 0;
832    3      =       BINARY$INDEX = 0;
833    3      =       STEP$COUNTER = STEP$COUNTER + 1;
834    3      =     END;
              =
835    1      =     END STEP$TEN;
              =
```

```
          =   /****************** CALCULATE TOTAL STEP COST ******************/
          =
836   2   =   STEP$ELEVEN:  PROCEDURE;
          =
837   2   =   BINARY$INDEX = 0;         /* OFFSET INTO BINARY$DATA STRUCTURE */
          =
838   3   =   DO WHILE BINARY$INDEX < 36;
839   3   =     CALL MOVXX0 (.BINARY$DATA.STEP$USAGE(BINARY$INDEX),
          =                  .TEMP$PRODUCT, 6);
840   3   =     CALL ADD$TO$TOTAL;
          =
841   3   =     BINARY$INDEX = BINARY$INDEX + 6;
842   3   =   END;                                       /* END OF DO WHILE LOOP */
          =
843   2   =   LONG$MULTIPLICATION = YES;
          =
844   2   =   CALL MOVXX0 (.PRODUCT, .TOP$NUMBER, 6);
845   2   =   CALL MOVXX0 (.BINARY$DATA.KWH$CONSTANT, .BOTTOM$NUMBER, 3);
          =
846   2   =   CALL MULTIPLICATION;
          =
847   2   =   MISC$INDEX = 4;
          =
848   2   =   IF (PRICING$DATA.TSTAT$DISPLAY AND 80H) <> 0  THEN
849   2   =     CALL MODIFY$FOR$DISPLAY;
850   2   =   ELSE
          =     TSTAT$BILLING$INFO$ARRAY(4) = 0FFH;
          =
851   2   =   STEP$COUNTER = STEP$COUNTER + 1;
          =
852   1   =   END STEP$ELEVEN;
          =
          =   /****************************************************************/
          =
853   2   =   STEP$TWELVE:  PROCEDURE;
          =
854   2   =   LAST$BILLING = MONTH$TO$DAYS$CONVERT
          =                           (METER$CONTROL.MONTHLY$ROLLOVER$DATE(1));
855   2   =   MISC$INDEX = BCD$TO$BIN$CONVERT
          =                           (METER$CONTROL.MONTHLY$ROLLOVER$DATE(2));
856   2   =   LAST$BILLING = LAST$BILLING + MISC$INDEX;
          =
857   2   =   CURRENT$BILLING = MONTH$TO$DAYS$CONVERT (TIME$AND$DATE.MONTH);
858   2   =   MISC$INDEX = BCD$TO$BIN$CONVERT (TIME$AND$DATE.DAY);
859   2   =   CURRENT$BILLING = CURRENT$BILLING + MISC$INDEX;
          =
860   2   =   IF CURRENT$BILLING < LAST$BILLING  THEN
861   2   =     CURRENT$BILLING = CURRENT$BILLING + 365;
          =                                         /* COMPENSATE FOR NEW YEAR */
862   2   =   BY$NUMBER = CURRENT$BILLING - LAST$BILLING;
          =
863   2   =   IF BY$NUMBER > 7  THEN
864   3   =   DO;
865   3   =     CALL DIVISION;
          =
866   3   =     CALL MOVXX0 (.PRODUCT(3), .TOP$NUMBER, 6);
867   3   =     CALL SETBX0 (.BOTTOM$NUMBER, 0, 6);
          =
868   3   =     BOTTOM$NUMBER(2) = 30;
          =
869   3   =     LONG$MULTIPLICATION = YES;
          =
870   3   =     CALL MULTIPLICATION;
          =
871   3   =     MISC$INDEX = 8;
          =
872   3   =     IF (PRICING$DATA.TSTAT$DISPLAY AND 4) <> 0  THEN
873   3   =       CALL MODIFY$FOR$DISPLAY;
874   3   =     ELSE
          =       TSTAT$BILLING$INFO$ARRAY(8) = 0FFH;
875   3   =   END;
          =
876   2   =   ELSE
          =     TSTAT$BILLING$INFO$ARRAY(8) = 0FFH;
          =               /* NOT ENOUGH DAYS TO CALCULATE A FORECASTED BILL */
877   2   =   STEP$COUNTER = STEP$COUNTER + 1;
          =
878   1   =   END STEP$TWELVE;
          =
```

```
          =   /*****************************************************************/
          =
879   2   =   STEP$THIRTEEN:  PROCEDURE;
          =
880   2   =   CALL SETBX0 (.TSTAT$BILLING$INFO.LOW$KWH, 0, 16);
          =                                           /* CLEAR OUT OLD DATA */
          =               /*** CONVERT THIS MONTH'S TIER USAGE BACK TO BCD. ***/
881   2   =   BINARY$INDEX = 57;
882   3   =   DO WHILE (BINARY$INDEX < 69);
883   3   =     BINARY$DATA$ARRAY(BINARY$INDEX) =
          =                BIN$TO$BCD$CONVERT (BINARY$DATA$ARRAY(BINARY$INDEX));
884   3   =     BINARY$INDEX = BINARY$INDEX + 1;
885   3   =   END;
          =
886   2   =   IF (PRICING$DATA.TSTAT$DISPLAY AND 10H) <> 0  THEN
887   3   =   DO;
888   3   =     CALL MOVXX0 (.BINARY$DATA$ARRAY(57),
          =                  .TSTAT$BILLING$INFO.LOW$KWH(1), 3);
889   3   =     MISC$INDEX = 12;
890   3   =     CALL TEST$FOR$ZERO;
891   3   =   END;
          =
892   2   =   ELSE
          =     TSTAT$BILLING$INFO.LOW$KWH(0) = 0FFH;
          =
893   2   =   IF (PRICING$DATA.TSTAT$DISPLAY AND 10H) <> 0  THEN
894   3   =   DO;
895   3   =     CALL MOVXX0 (.BINARY$DATA$ARRAY(60),
          =                  .TSTAT$BILLING$INFO.MEDIUM$KWH(1), 3);
896   3   =     MISC$INDEX = 16;
897   3   =     CALL TEST$FOR$ZERO;
898   3   =   END;
          =
899   2   =   ELSE
          =     TSTAT$BILLING$INFO.MEDIUM$KWH(0) = 0FFH;
          =
900   2   =   IF ((PRICING$DATA.TSTAT$DISPLAY AND 8H) <> 0) AND
          =      ((PRICING$DATA.TSTAT$DISPLAY AND 10H) <> 0)  THEN
901   3   =   DO;
902   3   =     CALL MOVXX0 (.BINARY$DATA$ARRAY(63),
          =                  .TSTAT$BILLING$INFO.HIGH$KWH(1), 3);
903   3   =     MISC$INDEX = 20;
904   3   =     CALL TEST$FOR$ZERO;
905   3   =   END;
          =
906   2   =   ELSE
          =     TSTAT$BILLING$INFO.HIGH$KWH(0) = 0FFH;
          =
907   2   =   IF (PRICING$DATA.TSTAT$DISPLAY AND 10H) <> 0  THEN
908   3   =   DO;
909   3   =     CALL MOVXX0 (.BINARY$DATA$ARRAY(66),
          =                  .TSTAT$BILLING$INFO.CRITICAL$KWH(1), 3);
910   3   =     MISC$INDEX = 24;
911   3   =     CALL TEST$FOR$ZERO;
912   3   =   END;
          =
913   2   =   ELSE
          =     TSTAT$BILLING$INFO.CRITICAL$KWH(0) = 0FFH;
          =
914   2   =   PRICE$DATA$RECEIVED = NO;
915   2   =   ROLLOVER$DATA$RECEIVED = NO;
916   2   =   USAGE$DATA$RECEIVED = NO;
917   2   =   BILLING$COMPLETED = YES;
918   2   =   STEP$COUNTER = 0;
          =
919   1   =   END STEP$THIRTEEN;
          =
          =   /*****************************************************************/
          =
920   2   =   BILLING$ALGORITHMS:  PROCEDURE  PUBLIC;
          =
921   2   =   WATCHDOG$TIMER = YES;                    /* TOGGLE WATCHDOG TIMER */
922   2   =   WATCHDOG$TIMER = NO;                       /* TO MAINTAIN SANITY */
          =
923   2   =   CALL SETBX0 (.PRODUCT, 0, 9);
924   2   =   CALL SETBX0 (.TEMP$PRODUCT, 0, 9);
          =
925   2   =   IF STEP$COUNTER > 13  THEN
```

```
926   2  =     STEP$COUNTER = 0;
         =
927   3  =   DO CASE STEP$COUNTER;
928   4  =     DO;        /* CLEAR OUT ALL OLD CALCULATED DATA FROM YESTERDAY */
929   4  =       CALL SETBX0 (.TSTAT$BILLING$INFO$ARRAY, 0, 36);
930   4  =       CALL SETBX0 (.BINARY$DATA$ARRAY, 0, 168);
         =
931   4  =       STEP$COUNTER = STEP$COUNTER + 1;
932   4  =     END;
         =
933   3  =     CALL STEP$ONE;
934   3  =     CALL STEP$TWO;
935   3  =     CALL STEP$THREE;
936   3  =     CALL STEP$FOUR;
937   3  =     CALL STEP$FIVE;
938   3  =     CALL STEP$SIX;
939   3  =     CALL STEP$SEVEN;
940   3  =     CALL STEP$EIGHT;
941   3  =     CALL STEP$NINE;
942   3  =     CALL STEP$TEN;
943   3  =     CALL STEP$ELEVEN;
944   3  =     CALL STEP$TWELVE;
945   3  =     CALL STEP$THIRTEEN;
946   3  =   END;                                        /* END OF DO CASE */
         =
947   1  =   END BILLING$ALGORITHMS;

948   1      END BILLING;



MODULE INFORMATION:                     (STATIC+OVERLAYABLE)
    CODE SIZE                           = 0EBFH       3775D
    CONSTANT SIZE                       = 0000H          0D
    DIRECT VARIABLE SIZE                =    00H+00H     0D+  0D
    INDIRECT VARIABLE SIZE              =    00H+00H     0D+  0D
    BIT SIZE                            =    04H+00H     4D+  0D
    BIT-ADDRESSABLE SIZE                =    00H+00H     0D+  0D
    AUXILIARY VARIABLE SIZE             = 00ECH        236D
    MAXIMUM STACK SIZE                  = 0008H          8D
    REGISTER-BANK(S) USED:                 0
    1823 LINES READ

    0 PROGRAM ERROR(S)
END OF PL/M-51 COMPILATION


 DS 3 30 (038-N) PL/M-51 V1.2
 OMPILER INVOKED BY:  C:\INTEL\PLM51.EXE INTERR.PTH PW(80)PL(60)DB NOINTVECTOR O
 ) T(3)ROM(LARGE)


   1    1        INTERRUPTS:  DO;

                 /****************************************************/
                 /*                                                  */
                 /*  II  N      N  TTTTTTT  EEFEE   RRRR     RRRR     */
                 /*  II  NN     N     T     E       R   R    R   R    */
                 /*  II  N N    N     T     E       R   R    R   R    */
                 /*  II  N  N   N     T     EEEE    RRRR     RRRR     */
                 /*  II  N   N  N     T     E       R   R    R   R    */
                 /*  II  N     NN     T     E       R    R   R    R   */
                 /*  II  N      N     T     EEEEE   R    R   R    R   */
                 /*                                                  */
                 /****************************************************/
```

```
                 /************************************************************
                 (c) Copyright, Johnson Controls Incorporated, 1988.  All rights
                     reserved. The following program is the exclusive property of
                     Johnson Controls, Inc. and its use is restricted by license
                     agreement to the system with which it was furnished.  The
                     program contents are confidential and may not be disclosed
                     or used outside the system without the express written
                     consent of Johnson Controls.  This program is further
                     protected by federal copyright law as an unpublished work
                     and any unauthorized reproduction is prohibited.
                 ************************************************************/
```

```
          $NOLIST
          $TITLE ('INTERRUPT DECLARATIONS')
          $INCLUDE (INTDCL.DTH)
       =
       =  /**************************************************************
       =       P U B L I C   S T R U C T U R E   D E C L A R A T I O N S
       =  **************************************************************/
       =
 5   1 =  DECLARE  BSR$MESSAGE    /*AJB*/    (64) BYTE  PUBLIC    AUXILIARY;
       =
       =  /**************************************************************
       =    E X T E R N A L   S T R U C T U R E   D E C L A R A T I O N S
       =  **************************************************************/
       =
 6   1 =  DECLARE  RECV$BRICK$MESSAGE        (40) BYTE  EXTERNAL  AUXILIARY;
 7   1 =  DECLARE  RECV$TSTAT$MESSAGE        (32) BYTE  EXTERNAL  AUXILIARY;
 8   1 =  DECLARE  TRANS$BRICK$MESSAGE       (20) BYTE  EXTERNAL  AUXILIARY;
 9   1 =  DECLARE  TRANS$TSTAT$MESSAGE       (32) BYTE  EXTERNAL  AUXILIARY;
       =
10   1 =  DECLARE  BSR$DATA  STRUCTURE  (
       =      HOUSE$CODE                    BYTE,
       =      NUMBER$CODE                   BYTE,
       =      FUNCTION$CODE                 BYTE)  EXTERNAL  AUXILIARY;
       =                /*moved AJB 2/4/88 */
       =
11   1 =  DECLARE  RECV$TSTAT$MSG  STRUCTURE (
       =      BYTE$COUNT                    BYTE,
       =      MSG$TYPE                      BYTE,
       =      DEVICE$ADDRESS                BYTE,
       =      DATA$FIELD               (28) BYTE,
       =      CHECKSUM                      BYTE)  AT (.RECV$TSTAT$MESSAGE)
       =                                                        AUXILIARY;
       =
12   1 =  DECLARE  TRANS$TSTAT$MSG  STRUCTURE (
       =      BYTE$COUNT                    BYTE,
       =      MSG$TYPE                      BYTE,
       =      DEVICE$ADDRESS                BYTE,
       =      DATA$FIELD               (28) BYTE,
       =      CHECKSUM                      BYTE)  AT (.TRANS$TSTAT$MESSAGE)
       =                                                        AUXILIARY;
       =
13   1 =  DECLARE  TRANS$BRICK$MSG  STRUCTURE (
       =      BYTE$COUNT                    BYTE,
       =      MSG$TYPE                      BYTE,
       =      DESTINATION$ADDRESS           BYTE,
       =      PROCESS$NUMBERS               BYTE, /* UPPER NYBBLE SOURCE
       =                                          LOWER NYBBLE DESTINATION */
       =      DATA$FIELD               (15) BYTE,
       =      CHECKSUM                      BYTE)  AT (.TRANS$BRICK$MESSAGE)
       =                                                        AUXILIARY;
       =
14   1 =  DECLARE  SYSTEM$STATUS  STRUCTURE (
       =      CURRENT$TEMPERATURE           BYTE,
       =      SETPOINT$TEMPERATURE          BYTE,
       =      CURRENT$TIER                  BYTE,
       =      CURRENT$PERIOD                BYTE,
       =      CURRENT$MODE                  BYTE,
       =      FAN$MODE                      BYTE,
       =      EMERGENCY$HEAT                BYTE,
       =      HVAC$ACTIVE                   BYTE,
       =      HVAC$OVERRIDE                 BYTE,
       =      EWH$ACTIVE                    BYTE,
       =      EWH$OVERRIDE                  BYTE,
       =      WD_WE                         BYTE,
       =      OPT$ACTIVE                    BYTE,
       =      RUNTIME$TOTAL$HTG         (2) BYTE)  EXTERNAL  AUXILIARY;
       =
15   1 =  DECLARE  SYSTEM$STATISTICS  STRUCTURE (
       =      CONTROLLER$COMM          (32) BYTE,
       =      TSTAT$COMM               (32) BYTE)  EXTERNAL  AUXILIARY;
       =
       =  /**************************************************************
       =          P U B L I C   B Y T E   D E C L A R A T I O N S
       =  **************************************************************/
       =
16   1 =  DECLARE  BSR$MSG$POINTER                   BYTE  PUBLIC  AUXILIARY;
       -  /*AJB*/
17   1 =  DECLARE  SAVED$SETPOINT                    BYTE  PUBLIC  AUXILIARY;
```

```
               -  /*AJB*/
 18    1    =     DECLARE   RECV$BYTE$COUNT$REGISTER          BYTE  PUBLIC  AUXILIARY;
 19    1    =     DECLARE   RECV$TSTAT$BYTE$COUNT$REGISTER    BYTE  PUBLIC  AUXILIARY;
 20    1    =     DECLARE   SECOND$TIMER                      BYTE  PUBLIC  AUXILIARY;
            =
            =     /************************************************************
            =          E X T E R N A L   B Y T E   D E C L A R A T I O N S
            =     ************************************************************/
            =
 21    1    =     DECLARE   CYCLE$STATE                     BYTE  EXTERNAL  AUXILIARY;
 22    1    =     DECLARE   CYCLE$TYPE                      BYTE  EXTERNAL;
 23    1    =     DECLARE   DELAY$CYCLE$COUNTER             BYTE  EXTERNAL  AUXILIARY;
               -  /*AJB*/
 24    1    =     DECLARE   HOUSE$BIT$COUNTER               BYTE  EXTERNAL  AUXILIARY;
               -  /*AJB*/
 25    1    =     DECLARE   HOUSE$CODE$BIT                  BYTE  EXTERNAL  AUXILIARY;
               -  /*AJB*/
 26    1    =     DECLARE   NEXT$CYCLE$TYPE                 BYTE  EXTERNAL  AUXILIARY;
               -  /*AJB*/
 27    1    =     DECLARE   NUMBER$CODE$BIT                 BYTE  EXTERNAL  AUXILIARY;
               -  /*AJB*/
 28    1    =     DECLARE   NUMBER$BIT$COUNTER              BYTE  EXTERNAL  AUXILIARY;
               -  /*AJB*/
 29    1    =     DECLARE   DLC$ACTIVE$STORAGE              BYTE  EXTERNAL  AUXILIARY;
 30    1    =     DECLARE   ERROR$INDEX                     BYTE  EXTERNAL  AUXILIARY;
 31    1    =     DECLARE   EWH$OVERRIDE$STORAGE            BYTE  EXTERNAL  AUXILIARY;
 32    1    =     DECLARE   HVAC$OVERRIDE$STORAGE           BYTE  EXTERNAL  AUXILIARY;
 33    1    =     DECLARE   MISC_LOCATION                   BYTE  EXTERNAL  AUXILIARY;
 34    1    =     DECLARE   RECV$BRICK$INDEX                BYTE  EXTERNAL  AUXILIARY;
 35    1    =     DECLARE   RECV$BRINDEX                    BYTE  EXTERNAL  AUXILIARY;
 36    1    =     DECLARE   RECV$TINDEX                     BYTE  EXTERNAL  AUXILIARY;
 37    1    =     DECLARE   RECV$TSTAT$CHECKSUM$REGISTER    BYTE  EXTERNAL  AUXILIARY;
 38    1    =     DECLARE   T_R$TSTAT$BYTE                  BYTE  EXTERNAL  AUXILIARY;
 39    1    =     DECLARE   TRANS$BRINDEX                   BYTE  EXTERNAL  AUXILIARY;
 40    1    =     DECLARE   TRANS$TINDEX                    BYTE  EXTERNAL  AUXILIARY;
 41    1    =     DECLARE   TRANS$TSTAT$BYTE$COUNT$REGISTER BYTE  EXTERNAL  AUXILIARY;
 42    1    =     DECLARE   TRANS$TSTAT$CHECKSUM$REGISTER   BYTE  EXTERNAL  AUXILIARY;
 43    1    =     DECLARE   UART$IER                        BYTE  EXTERNAL  AUXILIARY;
 44    1    =     DECLARE   UART$LCR                        BYTE  EXTERNAL  AUXILIARY;
 45    1    =     DECLARE   VALID$TSTAT$MSG$TIMER           BYTE  EXTERNAL  AUXILIARY;
            =
            =     /************************************************************
            =                   B Y T E   D E C L A R A T I O N
            =     ************************************************************/
            =
 46    1    =     DECLARE   RECEIVE$INT                     BYTE  AUXILIARY;
 47    1    =     DECLARE   RECV$BRICK$CHECKSUM$REGISTER    BYTE  AUXILIARY;
 48    1    =     DECLARE   RECEIVED$BRINDEX                BYTE  AUXILIARY;
 49    1    =     DECLARE   TM$CYCLE$TYPE                   BYTE  AUXILIARY;  /*AJB*/
 50    1    =     DECLARE   TRANS$BYTE$COUNT$REGISTER       BYTE  AUXILIARY;
 51    1    =     DECLARE   TRANSMIT$INT                    BYTE  AUXILIARY;
 52    1    =     DECLARE   UART$INTERRUPT                  BYTE  AUXILIARY;
 53    1    =     DECLARE   UART$INTERRUPT$ID               BYTE  AT  (0A002H)
            =                                                           AUXILIARY;
 54    1    =     DECLARE   UART$LINE$STATUS$REGISTER       BYTE  AT  (0A005H)
            =                                                           AUXILIARY;
            =
            =     /************************************************************
            =        P U B L I C   B I T   M A P P E D   D E C L A R A T I O N S
            =     ************************************************************/
            =
 55    1    =     DECLARE   BSR$MIP$FLAG                    BIT  PUBLIC;
 56    1    =     DECLARE   NEXT$CYCLE$NEEDED               BIT  PUBLIC;
 57    1    =     DECLARE   RECEIVED$BRICK$MESSAGE          BIT  PUBLIC;
 58    1    =     DECLARE   RECEIVED$TSTAT$BYTE             BIT  PUBLIC;
 59    1    =     DECLARE   SECOND$FLAG                     BIT  PUBLIC;
 60    1    =     DECLARE   TSTAT$MESSAGE$RECEIVED          BIT  PUBLIC;
 61    1    =     DECLARE   VALID$TSTAT$MSG$RECEIVED        BIT  PUBLIC;
 62    1    =     DECLARE   XMIT$CYCLE$ONE                  BIT  PUBLIC;
            =
            =     /************************************************************
            =      E X T E R N A L   B I T   M A P P E D   D E C L A R A T I O N S
            =     ************************************************************/
            =
 63    1    =     DECLARE   DLC$ACTIVE$FLAG                 BIT  EXTERNAL;
 64    1    =     DECLARE   ERROR$ALERT                     BIT  EXTERNAL;
 65    1    =     DECLARE   EWH$OVERRIDE$FLAG               BIT  EXTERNAL;
 66    1    =     DECLARE   FIRST$TIME$SENT$FLAG            BIT  EXTERNAL;  /*AJB*/
```

```
 67   1  =   DECLARE  SECOND$MESSAGE$FLAG          BIT  EXTERNAL;  /*AJB*/
 68   1  =   DECLARE  HVAC$PERMANENT$OVERRIDE      BIT  EXTERNAL;
 69   1  =   DECLARE  HVAC$TEMPORARY$OVERRIDE      BIT  EXTERNAL;
 70   1  =   DECLARE  INITIALIZATION$FLAG          BIT  EXTERNAL;
 71   1  =   DECLARE  TSTAT$MSG$TIMER              BIT  EXTERNAL;
         =
         =   /**************************************************************
         =            B I T   M A P P E D   D E C L A R A T I O N S
         =   **************************************************************/
         =
 72   1  =   DECLARE  BRICK$OK                     BIT  AT (0B4H) REG;
 73   1  =   DECLARE  X10$TRANSMIT$OFF             BIT  AT  (96H) REG;
 74   1  =   DECLARE  ZERO$CROSS$CLEAR             BIT  AT (0B5H) REG;
         =
         =   /**************************************************************
         =              L I T E R A L   D E C L A R A T I O N S
         =   **************************************************************/
         =
 75   1  =   DECLARE  BAD$COMM                     LITERALLY        '2';
 76   1  =   DECLARE  BSR$CODE$MASK     /*AJB*/    LITERALLY        '1';
 77   1  =   DECLARE  CLR$RECV$INT$MASK            LITERALLY '11111110B';
 78   1  =   DECLARE  CLR$TRANS$INT$MASK           LITERALLY '11111101B';
 79   1  =   DECLARE  DELAY$CYCLE       /*AJB*/    LITERALLY        '4';
 80   1  =   DECLARE  FATAL                        LITERALLY      '0FFH';
 81   1  =   DECLARE  HALF$CYCLE$OFF$TIMER$HI      LITERALLY      '0E2H';
 82   1  =   DECLARE  HALF$CYCLE$OFF$TIMER$LO      LITERALLY       '5AH';
 83   1  =   DECLARE  INIT$SECOND$TIMER            LITERALLY      '0C4H';
 84   1  =   DECLARE  MASK$ZERO$CROSSING           LITERALLY       '80H';
 85   1  =   DECLARE  MSG$OVERHEAD                 LITERALLY        '3';
 86   1  =   DECLARE  NO                           LITERALLY        '0';
 87   1  =   DECLARE  NON$FATAL                    LITERALLY        '0';
 88   1  =   DECLARE  ONE$CYCLE                    LITERALLY        '1';
 89   1  =   DECLARE  ONE$DELAYS                   LITERALLY        '4';
 90   1  =   DECLARE  ONE$MS$TIMER$HI              LITERALLY      '0FCH';
 91   1  =   DECLARE  ONE$MS$TIMER$LO   /*AJB NEW!*/ LITERALLY      '9EH';
 92   1  =   DECLARE  ONE$SEVEN$MS$TIMER$HI        LITERALLY      '0F9H';
 93   1  =   DECLARE  ONE$SEVEN$MS$TIMER$LO        LITERALLY      '0C1H';
 94   1  =   DECLARE  RECV$INT$MASK                LITERALLY '00000001B';
 95   1  =   DECLARE  REST$OF$OVERHEAD             LITERALLY        '2';
 96   1  =   DECLARE  START$CYCLE                  LITERALLY        '2';
 97   1  =   DECLARE  START$DELAYS                 LITERALLY       '10';
 98   1  =   DECLARE  TRANS$INT$MASK               LITERALLY '00000010B';
 99   1  =   DECLARE  UART$BAH                     LITERALLY        '0';
100   1  =   DECLARE  UART$INTERRUPT$ENABLE        LITERALLY '00000111B';
101   1  =   DECLARE  UART$LINE$CONTROL            LITERALLY '00000011B';
102   1  =   DECLARE  UART$TIMER$SET               LITERALLY '10000011B';
103   1  =   DECLARE  YES                          LITERALLY        '1';
104   1  =   DECLARE  ZERO$CYCLE                   LITERALLY        '0';
105   1  =   DECLARE  ZERO$DELAYS                  LITERALLY        '5';
         =
         =   /**************************************************************/

             $TITLE ('POWER DOWN SEQUENCE')
             $INCLUDE (DEATH.STH)
         =
         =   /************************************************************/
         =
106   2  =   POWER_DOWN:  PROCEDURE  PUBLIC;
         =
107   2  =   IF EWH$OVERRIDE$FLAG = YES  THEN
108   2  =     EWH$OVERRIDE$STORAGE = 0FFH;
109   2  =   ELSE
         =     EWH$OVERRIDE$STORAGE = 0;
         =
110   2  =   IF HVAC$TEMPORARY$OVERRIDE = YES  THEN
111   3  =   DO;
112   3  =     HVAC$OVERRIDE$STORAGE = 1;
113   3  =     SAVED$SETPOINT = SYSTEM$STATUS.SETPOINT$TEMPERATURE;
114   3  =   END;
         =
115   2  =   ELSE
         =   IF HVAC$PERMANENT$OVERRIDE = YES  THEN
116   3  =   DO;
117   3  =     HVAC$OVERRIDE$STORAGE = 2;
118   3  =     SAVED$SETPOINT = SYSTEM$STATUS.SETPOINT$TEMPERATURE;
119   3  =   END;
         =
120   2  =   ELSE
```

```
          =      HVAC$OVERRIDE$STORAGE = 0;
          =
121   2   =    IF DLC$ACTIVE$FLAG = YES  THEN
122   2   =      DLC$ACTIVE$STORAGE = 0FFH;
          =
123   3   =    DO WHILE 1;
124   3   =      SECOND$TIMER = 0C4H;
125   3   =      SECOND$TIMER = SECOND$TIMER + 1;
126   3   =      SECOND$TIMER = SECOND$TIMER - 1;
127   3   =    END;
          =
128   1   =    END POWER_DOWN;
          =
          =    /***************************************************************/

               $TITLE ('REAL TIME INTERRUPT')
               $INCLUDE (TIMER.STH)
          =
          =    /*****************************************************************/
          =
129   2   =    TIMER:  PROCEDURE  PUBLIC  USING 1;
          =
130   3   =    DO CASE TM$CYCLE$TYPE;         /* TRANSMITTING ZERO, ONE, OR START
            - */
          =
131   4   =      DO CASE CYCLE$STATE;             /* TRANSMITTING A ZERO CYCLE */
          =
132   5   =        DO;
133   5   =          X10$TRANSMIT$OFF = YES;        /* TURN OFF 120 KHZ SIGNAL */
134   5   =          ET0 = NO;                      /* DISABLE TIMER INTERRUPT */
135   5   =          TR0 = NO;                               /* STOP BSR TIMER */
136   5   =        END;
          =
137   5   =        DO;
138   5   =          X10$TRANSMIT$OFF = NO;          /* TURN ON 120 KHZ SIGNAL */
139   5   =          TL0 = ONE$MS$TIMER$LO;                 /* LOAD 1 MS TIMER */
140   5   =          TH0 = ONE$MS$TIMER$HI;
141   5   =        END;
          =
142   5   =        DO;
143   5   =          X10$TRANSMIT$OFF = YES;        /* TURN OFF 120 KHZ SIGNAL */
144   5   =          TL0 = ONE$SEVEN$MS$TIMER$LO;       /* LOAD 1.778 MS TIMER */
145   5   =          TH0 = ONE$SEVEN$MS$TIMER$HI;
146   5   =        END;
          =
147   5   =        DO;
148   5   =          X10$TRANSMIT$OFF = NO;          /* TURN ON 120 KHZ SIGNAL */
149   5   =          TL0 = ONE$MS$TIMER$LO;                 /* LOAD 1 MS TIMER */
150   5   =          TH0 = ONE$MS$TIMER$HI;
151   5   =        END;
          =
152   5   =        DO;
153   5   =          X10$TRANSMIT$OFF = YES;        /* TURN OFF 120 KHZ SIGNAL */
154   5   =          TL0 = ONE$SEVEN$MS$TIMER$LO;       /* LOAD 1.778 MS TIMER */
155   5   =          TH0 = ONE$SEVEN$MS$TIMER$HI;
156   5   =        END;
          =
157   5   =        DO;
158   5   =          X10$TRANSMIT$OFF = NO;          /* TURN ON 120 KHZ SIGNAL */
159   5   =          TL0 = ONE$MS$TIMER$LO;                 /* LOAD 1 MS TIMER */
160   5   =          TH0 = ONE$MS$TIMER$HI;
161   5   =        END;
162   4   =      END;                       /* END OF DO CASE FOR CYCLE STATE */
          =
163   4   =      DO CASE CYCLE$STATE;              /* TRANSMITTING A ONE CYCLE */
          =
164   5   =        DO;
165   5   =          X10$TRANSMIT$OFF = YES;        /* TURN OFF 120 KHZ SIGNAL */
166   5   =          ET0 = NO;                      /* DISABLE TIMER INTERRUPT */
167   5   =          TR0 = NO;                               /* STOP BSR TIMER */
168   5   =        END;
          =
169   5   =        DO;
170   5   =          X10$TRANSMIT$OFF = NO;          /* TURN ON 120 KHZ SIGNAL */
171   5   =          TL0 = ONE$MS$TIMER$LO;                 /* LOAD 1 MS TIMER */
172   5   =          TH0 = ONE$MS$TIMER$HI;
173   5   =        END;
          =
```

```
174   5  =        DO;
175   5  =          X10$TRANSMIT$OFF = YES;          /* TURN OFF 120 KHZ SIGNAL */
176   5  =          TL0 = ONE$SEVEN$MS$TIMER$LO;         /* LOAD 1.778 MS TIMER */
177   5  =          TH0 = ONE$SEVEN$MS$TIMER$HI;
178   5  =        END;
         =
179   5  =        DO;
180   5  =          X10$TRANSMIT$OFF = NO;            /* TURN ON 120 KHZ SIGNAL */
181   5  =          TL0 = ONE$MS$TIMER$LO;                  /* LOAD 1 MS TIMER */
182   5  =          TH0 = ONE$MS$TIMER$HI;
183   5  =        END;
         =
184   5  =        DO;
185   5  =          X10$TRANSMIT$OFF = YES;          /* TURN OFF 120 KHZ SIGNAL */
186   5  =          TL0 = ONE$SEVEN$MS$TIMER$LO;         /* LOAD 1.778 MS TIMER */
187   5  =          TH0 = ONE$SEVEN$MS$TIMER$HI;
188   5  =        END;
189   4  =      END;                         /* END OF DO CASE FOR CYCLE STATE */
         =
190   4  =      DO CASE CYCLE$STATE;               /* TRANSMITTING A START CYCLE */
         =
191   5  =        DO;
192   5  =          X10$TRANSMIT$OFF = YES;          /* TURN OFF 120 KHZ SIGNAL */
193   5  =          ET0 = NO;                        /* DISABLE TIMER INTERRUPT */
194   5  =          TR0 = NO;                                /* STOP BSR TIMER */
195   5  =        END;
         =
196   5  =        DO;
197   5  =          X10$TRANSMIT$OFF = NO;            /* TURN ON 120 KHZ SIGNAL */
198   5  =          TL0 = ONE$MS$TIMER$LO;                  /* LOAD 1 MS TIMER */
199   5  =          TH0 = ONE$MS$TIMER$HI;
200   5  =        END;
         =
201   5  =        DO;
202   5  =          X10$TRANSMIT$OFF = YES;          /* TURN OFF 120 KHZ SIGNAL */
203   5  =          TL0 = ONE$SEVEN$MS$TIMER$LO;         /* LOAD 1.778 MS TIMER */
204   5  =          TH0 = ONE$SEVEN$MS$TIMER$HI;
205   5  =        END;
         =
206   5  =        DO;
207   5  =          X10$TRANSMIT$OFF = NO;            /* TURN ON 120 KHZ SIGNAL */
208   5  =          TL0 = ONE$MS$TIMER$LO;                  /* LOAD 1 MS TIMER */
209   5  =          TH0 = ONE$MS$TIMER$HI;
210   5  =        END;
         =
211   5  =        DO;
212   5  =          X10$TRANSMIT$OFF = YES;          /* TURN OFF 120 KHZ SIGNAL */
213   5  =          TL0 = ONE$SEVEN$MS$TIMER$LO;         /* LOAD 1.778 MS TIMER */
214   5  =          TH0 = ONE$SEVEN$MS$TIMER$HI;
215   5  =        END;
         =
216   5  =        DO;
217   5  =          X10$TRANSMIT$OFF = NO;            /* TURN ON 120 KHZ SIGNAL */
218   5  =          TL0 = ONE$MS$TIMER$LO;                  /* LOAD 1 MS TIMER */
219   5  =          TH0 = ONE$MS$TIMER$HI;
220   5  =        END;
         =
221   5  =        DO;
222   5  =          X10$TRANSMIT$OFF = YES;          /* TURN OFF 120 KHZ SIGNAL */
223   5  =          TL0 = ONE$SEVEN$MS$TIMER$LO;         /* LOAD 1.778 MS TIMER */
224   5  =          TH0 = ONE$SEVEN$MS$TIMER$HI;
225   5  =        END;
         =
226   5  =        DO;
227   5  =          X10$TRANSMIT$OFF = NO;            /* TURN ON 120 KHZ SIGNAL */
228   5  =          TL0 = ONE$MS$TIMER$LO;                  /* LOAD 1 MS TIMER */
229   5  =          TH0 = ONE$MS$TIMER$HI;
230   5  =        END;
         =
231   5  =        DO;
232   5  =          X10$TRANSMIT$OFF = YES;          /* TURN OFF 120 KHZ SIGNAL */
233   5  =          TL0 = ONE$SEVEN$MS$TIMER$LO;         /* LOAD 1.778 MS TIMER */
234   5  =          TH0 = ONE$SEVEN$MS$TIMER$HI;
235   5  =        END;
         =
236   5  =        DO;
237   5  =          X10$TRANSMIT$OFF = NO;            /* TURN ON 120 KHZ SIGNAL */
238   5  =          TL0 = ONE$MS$TIMER$LO;                  /* LOAD 1 MS TIMER */
```

```
239   5  =        TH0 = ONE$MS$TIMER$HI;
240   5  =      END;
         =
241   5  =      DO;
242   5  =        X10$TRANSMIT$OFF = YES;        /* TURN OFF 120 KHZ SIGNAL */
243   5  =        TL0 = ONE$SEVEN$MS$TIMER$LO;       /* LOAD 1.778 MS TIMER */
244   5  =        TH0 = ONE$SEVEN$MS$TIMER$HI;
245   5  =      END;
246   4  =    END;                          /* END OF DO CASE FOR CYCLE STATE */
247   3  =  END;                              /* END OF DO CASE FOR CYCLE TYPE */
         =
248   2  =  IF CYCLE$STATE <> 0  THEN
249   2  =      CYCLE$STATE = CYCLE$STATE - 1;           /* NEXT CYCLE STATE */
         =
250   1  =  END TIMER;
            $TITLE ('BRICK MESSAGE HANDLING')
            $INCLUDE (BRKMSG.STH)
         =
         =  /***************************************************************/
         =
251   2  =  BRICK_MSG_HANDLER: PROCEDURE PUBLIC USING 2;
         =
252   2  =  IF RI = 1  THEN
253   3  =  DO;                                 /* RECEIVE INTERRUPT ACTIVE */
254   3  =    IF RECV$BRINDEX > 40  THEN
255   3  =      RECV$BRINDEX = 0;
         =
256   3  =    RECV$BRICK$MESSAGE(RECV$BRINDEX) = SBUF;
         =
257   3  =    IF RECV$BYTE$COUNT$REGISTER = 0  THEN
258   4  =    DO;                                   /* FIRST BYTE OF MESSAGE */
259   4  =      IF RECV$BRICK$MESSAGE(0) = 0FFH  THEN
260   5  =      DO;
261   5  =        RECV$BRICK$MESSAGE(0) = RECV$BRICK$MESSAGE(RECV$BRINDEX);
         =                              /* MOVE BYTE COUNT TO TOP OF BUFFER */
262   5  =        RECV$BRINDEX = 0;
         =                    /* INDICATES THAT ENTIRE BUFFER IS AVAILABLE */
263   5  =      END;
         =
264   4  =      IF (RECV$BRICK$MESSAGE(RECV$BRINDEX) AND 3FH) < 17  THEN
265   5  =      DO;
266   5  =        RECV$BRICK$CHECKSUM$REGISTER =
         =                              RECV$BRICK$MESSAGE(RECV$BRINDEX);
         =          /* ADJUST BYTE COUNT TO REFLECT TRUE SIZE OF DATA FIELD */
267   5  =        RECV$BRICK$MESSAGE(RECV$BRINDEX) =
         =                      RECV$BRICK$MESSAGE(RECV$BRINDEX) AND 3FH;
268   5  =        RECV$BYTE$COUNT$REGISTER =
         =               RECV$BRICK$MESSAGE(RECV$BRINDEX) + MSG$OVERHEAD;
269   5  =        RECV$BRINDEX = RECV$BRINDEX + 1;
270   5  =      END;
271   4  =    END,
         =
272   3  =    ELSE
         =    DO;
273   4  =      RECV$BYTE$COUNT$REGISTER = RECV$BYTE$COUNT$REGISTER - 1;
274   4  =      IF RECV$BYTE$COUNT$REGISTER <> 0  THEN
275   5  =      DO;                           /* NOT THE END OF THE MESSAGE */
276   5  =        RECV$BRICK$CHECKSUM$REGISTER =
         =                  RECV$BRICK$CHECKSUM$REGISTER +
         =                              RECV$BRICK$MESSAGE(RECV$BRINDEX);
277   5  =        RECV$BRINDEX = RECV$BRINDEX + 1;
278   5  =      END;
         =
279   4  =      ELSE
         =      DO;                                  /* END OF THE MESSAGE */
280   5  =        RECV$BRICK$CHECKSUM$REGISTER =
         =                     (NOT RECV$BRICK$CHECKSUM$REGISTER) + 1;
         =
281   5  =        IF RECV$BRICK$CHECKSUM$REGISTER <>
         =                         RECV$BRICK$MESSAGE(RECV$BRINDEX)  THEN
282   6  =        DO;              /* CHECKSUM ERROR - RESET THE "BRICK" */
         =           /********** ENTER DATA FOR SYSTEM STATISTICS **********/
283   6  =          BRICK$OK = NO;                      /*** RESET BRICK ***/
284   6  =          RECV$BRINDEX = 0;
285   6  =          RECV$BYTE$COUNT$REGISTER = 0;
286   6  =        END;
         =
```

```
287   5  =          ELSE
         =          DO;
288   6  =            RECEIVED$BRICK$MESSAGE = YES;
289   6  =            RECEIVED$BRINDEX = RECV$BRINDEX;
290   6  =          END;
291   5  =        END;
292   4  =      END;
293   3  =      RI = 0;                         /*** ENABLE RECEIVE INTERRUPT ***/
294   3  =    END;
         =    /*****************************************************************/
295   2  =    IF TI = 1  THEN
296   3  =    DO;                                 /* TRANSMIT INTERRUPT ACTIVE */
297   3  =      IF TRANS$BRINDEX <> 0  THEN
298   4  =      DO;
299   4  =        SBUF = TRANS$BRICK$MESSAGE(TRANS$BRINDEX);
300   4  =        TRANS$BRINDEX = TRANS$BRINDEX + 1;
301   4  =        IF TRANS$BYTE$COUNT$REGISTER = 0  THEN
302   5  =        DO;                            /* NEW MESSAGE TO TRANSMIT */
303   5  =          TRANS$BYTE$COUNT$REGISTER = TRANS$BRICK$MESSAGE(0)
         =                                                + REST$OF$OVERHEAD;
         =                                             /* BYTES TO TRANSMIT */
304   5  =        END;
         =
305   4  =        ELSE
         =        DO;                    /* MESSAGE TRANSMISSION IN PROGRESS */
306   5  =          TRANS$BYTE$COUNT$REGISTER = TRANS$BYTE$COUNT$REGISTER - 1;
307   5  =          IF TRANS$BYTE$COUNT$REGISTER = 0  THEN
         =                                  /* LAST BYTE HAS ALREADY BEEN SENT */
308   5  =            TRANS$BRINDEX = 0;
309   5  =        END;
310   4  =      END;
311   3  =      TI = 0;                        /*** ENABLE TRANSMIT INTERRUPT ***/
312   3  =    END;
         =
313   1  =    END BRICK_MSG_HANDLER;
              $TITLE ('BSR INTERRUPT / TSTAT MESSAGE HANDLING')
              $INCLUDE (TSTX10 STH)
         =    /*****************************************************************/
         =
314   2  =    TSTAT_BSR_INTERRUPT:  PROCEDURE  PUBLIC  USING  3;
         =
315   2  =    IF (MISC_LOCATION AND MASK$ZERO$CROSSING) <> 0  THEN
316   3  =    DO;                               /*** ZERO CROSSING INTERRUPT ***/
         =
317   3  =      IF BSR$MIP$FLAG = YES  THEN
318   4  =      DO;
319   4  =        IF (CYCLE$TYPE = START$CYCLE) OR
         =           (CYCLE$TYPE = ONE$CYCLE)  THEN
320   5  =        DO;
321   5  =          X10$TRANSMIT$OFF = NO;           /* TURN ON 120 KHZ SIGNAL */
322   5  =          TL0 = ONE$MS$TIMER$LO;                   /* LOAD 1 MS TIMER */
323   5  =          TH0 = ONE$MS$TIMER$HI;
324   5  =          TR0 = YES;                              /* START BSR TIMER */
325   5  =          ET0 = YES;                          /* ENABLE BSR INTERRUPT */
         =
326   5  =          IF CYCLE$TYPE = ONE$CYCLE  THEN
327   5  =            CYCLE$STATE = ONE$DELAYS;
328   5  =          ELSE
         =            CYCLE$STATE = START$DELAYS;
329   5  =        END;
         =
330   4  =        ELSE
         =        IF CYCLE$TYPE = ZERO$CYCLE  THEN
331   5  =        DO;                                            /*ZERO CASE */
332   5  =          X10$TRANSMIT$OFF = YES;        /* BE SURE IT IS OFF AJB!!*/
333   5  =          CYCLE$STATE = ZERO$DELAYS;
334   5  =          TL0 = HALF$CYCLE$OFF$TIMER$LO;      /* LOAD 8.333 MS TIMER */
335   5  =          TH0 = HALF$CYCLE$OFF$TIMER$HI;
336   5  =          TR0 = YES;                              /* START BSR TIMER */
337   5  =          ET0 = YES;                          /* ENABLE BSR INTERRUPT */
338   5  =        END;
         =
339   4  =        ELSE
         =        DO;                                      /*DELAY CYCLE= 4 */
340   5  =          X10$TRANSMIT$OFF = YES;         /* BE USRE IT IS OFF AJB!!*/
341   5  =          TR0 = NO;                                /* STOP  BSR TIMER */
342   5  =          ET0 = NO;                           /*DISABLE BSR INTERRUPT */
343   5  =        END;                                        /*END NEW AJB!!!!*/
```

```
          =
344   4   =        BSR$MSG$POINTER = BSR$MSG$POINTER +1 ; /* INCREMENT POINTER */
          =
345   4   =        IF BSR$MSG$POINTER > 63 THEN
346   4   =          BSR$MIP$FLAG = NO;                          /*END OF MESSAGE*/
347   4   =        ELSE
          =        DO;
348   5   =          TM$CYCLE$TYPE = CYCLE$TYPE;                 /*FOR THE TIMER*/
349   5   =          CYCLE$TYPE = BSR$MFSSAGE(BSR$MSG$POINTER); /* GET NEXT ONE*/
350   5   =        END;
351   4   =      END;
          =
352   3   =      ZERO$CROSS$CLEAR = NO;
353   3   =      ZERO$CROSS$CLEAR = YES;        /* CLEAR ZERO CROSS FLIP-FLOP */
          =
354   3   =      IF TSTAT$MSG$TIMER = YES  THEN
355   3   =        VALID$TSTAT$MSG$TIMER = VALID$TSTAT$MSG$TIMER + 1;
          =
356   3   =      IF VALID$TSTAT$MSG$TIMER > 3  THEN
357   4   =      DO;
358   4   =        TSTAT$MSG$TIMER = NO;
          =    /*** added 8/23/89 to help improve recovery of tstat comm. ***/
359   4   =        UART$IER = 0;                    /* DISABLE TSTAT INTERRUPTS */
360   4   =        UART$LCR = UART$TIMER$SET;         /* SET UP TSTAT BAUD RATE */
361   4   =        UART$IER = UART$BAH;     /* USED TO LOAD HIGH BYTE OF TIMER */
362   4   =        T_R$TSTAT$BYTE = 7;              /*AJB-LOAD UART TIMER COUNT */
363   4   =        UART$LCR = UART$LINE$CONTROL;
364   4   =        UART$IER = UART$INTERRUPT$ENABLE;
          =                                        /* ENABLE [redacted] INTERRUPTS */
365   4   =      END;
          =    /*****************************************************************/
          =
366   3   =      SECOND$TIMER = SECOND$TIMER + 1;
367   3   =      IF SECOND$TIMER = 0  THEN
368   4   =      DO;
369   4   =        SECOND$FLAG = YES;                /* REAL TIME SECONDS FLAG */
370   4   =        SECOND$TIMER = INIT$SECOND$TIMER;    /* RELOAD SECOND TIMER */
371   4   =      END;
372   3   =    END;
          =
373   2   =    UART$INTERRUPT = UART$INTERRUPT$ID;
374   2   =    IF UART$INTERRUPT <> 0  THEN
375   3   =    DO;
376   3   =      UART$INTERRUPT = SHR (UART$INTERRUPT,1);
377   3   =      UART$INTERRUPT = UART$INTERRUPT AND 3; /* MASK FOR VALID INT. */
378   4   =      DO CASE  UART$INTERRUPT;
379   4   =        ;       /* MODEM INTERRUPT MEANS NOTHING IN THIS APPLICATION */
          =
380   5   =        DO;
381   5   =          IF TRANS$TINDEX <> 0  THEN
382   6   =          DO;
383   6   =            T_R$TSTAT$BYTE = TRANS$TSTAT$MESSAGE (TRANS$TINDEX);
          =                            /* LOAD NEXT BYTE TO TRANSMIT TO TSTAT */
384   6   =            TRANS$TINDEX = TRANS$TINDEX + 1;
          =
385   6   =            IF TRANS$TSTAT$BYTE$COUNT$REGISTER = 0  THEN
          =                                         /* NEW MESSAGE TO TRANSMIT */
386   6   =            TRANS$TSTAT$BYTE$COUNT$REGISTER =
          =                      TRANS$TSTAT$MSG.BYTE$COUNT + REST$OF$OVERHEAD;
          =                                                /* BYTES TO TRANSMIT */
387   6   =            ELSE
          =            DO;                 /* MESSAGE TRANSMISSION IN PROGRESS */
388   7   =              TRANS$TSTAT$BYTE$COUNT$REGISTER =
          =                            TRANS$TSTAT$BYTE$COUNT$REGISTER - 1;
389   7   =              IF TRANS$TSTAT$BYTE$COUNT$REGISTER = 0  THEN
          =                                /* LAST BYTE HAS ALREADY BEEN SENT */
390   7   =                TRANS$TINDEX = 0;
391   7   =            END;
392   6   =          END;
          =
393   5   =          ELSE
          =            UART$IER = UART$IER AND 0FDH;
          =                                 /* DISABLE TxDATA EMPTY INTERRUPT */
394   5   =        END;
          =
395   5   =        DO;
396   5   =          IF TSTAT$MSG$TIMER = NO  THEN
397   6   =          DO;
```

```
                RECV$TSTAT$MESSAGE (RECV$TINDEX) = T_R$TSTAT$BYTE;
                        /* LOAD RECEIVED TSTAT BYTE INTO MESSAGE BUFFER */
                IF RECV$TSTAT$BYTE$COUNT$REGISTER = 0  THEN
                DO;                                /* FIRST BYTE OF MESSAGE */
                  IF RECV$TSTAT$MSG.BYTE$COUNT < 29  THEN
                  DO;
                    RECV$TINDEX = 1;
                    RECV$TSTAT$BYTE$COUNT$REGISTER =
                              RECV$TSTAT$MSG.BYTE$COUNT + MSG$OVERHEAD;
                    RECV$TSTAT$CHECKSUM$REGISTER =
                                              RECV$TSTAT$MSG.BYTE$COUNT;
                  END;

                  ELSE
                  DO;
                    RECV$TINDEX = 0;      /* TO HELP TO GET BACK IN SYNC */
                    TSTAT$MSG$TIMER = YES;
                    VALID$TSTAT$MSG$TIMER = 0;
                          /* THIS TIMER IS USED TO MAINTAIN TSTAT SYNC. */
                    VALID$TSTAT$MSG$RECEIVED = NO;
                  END;
                END;

                ELSE
                DO;
                  RECV$TSTAT$BYTE$COUNT$REGISTER =
                                    RECV$TSTAT$BYTE$COUNT$REGISTER - 1;
                  IF RECV$TSTAT$BYTE$COUNT$REGISTER <> 0  THEN
                  DO;                       /* NOT THE END OF THE MESSAGE */
                    RECV$TSTAT$CHECKSUM$REGISTER =
                                    RECV$TSTAT$CHECKSUM$REGISTER
                                  + RECV$TSTAT$MESSAGE(RECV$TINDEX);
                    RECV$TINDEX = RECV$TINDEX + 1;
                  END;

                  ELSE
                  DO;                                /*END OF THE MESSAGE */
                    RECV$TSTAT$CHECKSUM$REGISTER =
                                (NOT RECV$TSTAT$CHECKSUM$REGISTER) + 1;

                    IF RECV$TSTAT$CHECKSUM$REGISTER =
                                  RECV$TSTAT$MESSAGE(RECV$TINDEX)  THEN
                      VALID$TSTAT$MSG$RECEIVED = YES;

                    ELSE
                    DO;
                      TSTAT$MSG$TIMER = YES;
                      VALID$TSTAT$MSG$TIMER = 0;
                          /* THIS TIMER IS USED TO MAINTAIN TSTAT SYNC. */
                      RECV$TSTAT$BYTE$COUNT$REGISTER = 0;
                      VALID$TSTAT$MSG$RECEIVED = NO;
                    END;

                    TSTAT$MESSAGE$RECEIVED = YES;
                    RECV$TINDEX = 0; /* RESET POINTER FOR TSTAT MESSAGE */
                  END;
                END;
              END;
            END;

            DO;                        /* ERROR IN TRANSMISSION FROM TSTAT */
              UART$INTERRUPT = UART$LINE$STATUS$REGISTER
        /***       ERROR$BYTES.ERROR$TYPE(ERROR$INDEX) = UARTCOMM;

              IF ERROR$INDEX > 13 THEN
                SEND$ERROR$MSG.ERROR$TYPE(ERROR$INDEX) =
                               ERROR$BUFFER$OVERFLOW; \ADDED 3/16/89 *\
              ELSE
                ERROR$INDEX = ERROR$INDEX + 1;***/
            END;
          END;                                     /* END OF DO CASE */
        END;

        END TSTAT_BSR_INTERRUPT;
        END INTERRUPTS;
```

```
ODULE INFORMATION:                    (STATIC+OVERLAYABLE)
   CODE SIZE                          = 0523H       1315D
   CONSTANT SIZE                      = 0000H         0D
   DIRECT VARIABLE SIZE               =    00H+00H    0D+   0D
   INDIRECT VARIABLE SIZE             =    00H+00H    0D+   0D
   BIT SIZE                           =    08H+00H    8D+   0D
   BIT-ADDRESSABLE SIZE               =    00H+00H    0D+   0D
   AUXILIARY VARIABLE SIZE            = 004CH        76D
   MAXIMUM STACK SIZE                 = 0008H         8D
   REGISTER-BANK(S) USED:               0 1 2 3
   803 LINES READ
   0 PROGRAM ERROR(S)
ND
```

What is claimed is:

1. A control system for controlling a climate control device such as an HVAC device at a premise, said climate control device being supplied with electricity via a utility at various price tiers and said utility providing real time price tier data to said control system, said control system comprising:

a) display means for displaying:
   1) time of day data,
   2) price tier identifying data for identifying price tiers representing at least the relative cost of electricity from one price tier to the next price tier, and
   3) set point temperature data corresponding to each of said price tier identifying data,
b) input means for inputting;
   1) said time of day data for defining time intervals,
   2) said set point temperature data corresponding to each price tier identifying data and corresponding to each of said time of day data, said set point temperature data indicative of the desired temperature corresponding to each price tier for each time interval,
c) temperature sensing means for sensing the temperature within said premise and for producing actual temperature data indicative of said sensed temperature;
d) clock means for maintaining a real time clock and for generating real time clock data corresponding thereto, and
e) control means
   1) connected to said input means for receiving said time of day data and said set point temperature data,
   2) connected to said temperature sensing means for receiving said actual temperature data,
   3) connected to said clock means for receiving said real time clock data,
   4) connected to said utility for receiving said real time price tier data, and
   5) connected to said climate control device for controlling said climate control device for regulating the temperature within said premise in accordance with
      (a) said set point temperature data for a corresponding price tier identifying data and a corresponding time of day data and
      (b) said actual temperature data, said real time price tier data and said real time clock data.

2. A control system as recited in claim 1, wherein
said display means further includes means for displaying weekend and weekday identifying data,
said input means further includes means for selecting said weekend or weekday identifying data, and
said control means is further operative to control said climate control device in accordance with said weekend and weekday identifying data.

3. A control system as recited in claim 1, wherein
said display means further includes means for displaying time of day subintervals, such as morning, day, evening and night, and
said input means further includes means for selecting said time of day subintervals.

4. A control system as recited in claim 1 wherein said input means includes means for inputting contiguous time of day data for defining contiguous time intervals.

5. A control system as recited in claim 1 wherein
said control system further includes storing means for storing preset time of day data corresponding to predetermined time intervals, and preset set point temperature data corresponding to said preset time of day data for each of said price tier identifying data, and
wherein said control means is operative for controlling said climate control device for regulating the temperature within said premise in accordance with
   (a) said preset set point temperature data for a corresponding price tier identifying data and a corresponding preset time of day data and
   (b) said actual temperature data, said real time price tier data and said real time clock data.

6. A control system for controlling a climate control device such as an HVAC device at a premise, said climate control device being supplied with electricity via a utility at various price tiers and said utility providing real time price tier data to said control system, and control system comprising:

a) display means for displaying;
   1) time of day data,
   2) price tier identifying data for identifying price tiers representing at least the relative cost of electricity from one price tier to the next price tier, and
   3) set point temperature data corresponding to each of said price tier identifying data,
b) input means for inputting;
   1) said time of day data for defining time intervals,
   2) said set point temperature data corresponding to each price tier identifying data and corresponding to each of said time of day data, said set point temperature data indicative of the desired temperature corresponding to each price tier for each timer interval.
c) temperature sensing means for sensing the temperature within said premise and for producing actual temperature data indicative of said sensed temperature;

d) clock means for maintaining a real time clock and for generating real time clock data corresponding thereto, and e) control means 1) connected to said input means for receiving said time of day data and said set point temperature data, 2) connected to said temperature sensing means for receiving said actual temperature data, 3) connected to said clock means for receiving said real time clock data, 4) connected to said utility for receiving said real time price tier data, and 5) connected to said climate control device for controlling said climate control device for regulating the temperature within said premise in accordance with (a) said set point temperature data for a corresponding price tier identifying data and a corresponding time of day data and (b) said actual temperature data, said real time price tier data and said real time clock data, wherein said control system further includes storing means for storing preset time of day data corresponding to predetermined time intervals, and preset set point temperature data corresponding to said preset time of day data for each of said price tier identifying data, and wherein said control means is operative for controlling said climate control device for regulating the temperature within said premise in accordance with (a) said preset set point temperature data for a corresponding price tier identifying data and a corresponding preset time of day data and (b) said actual temperature data, said real time price tier data and said real time clock data, wherein said storing means further stores said time of day data and said set point temperature data input via said input means, and said control means is operative to control said climate control device in response to said input time of day data and said input set point temperature data in place of said preset time of day data and said preset set point temperature data respectively, and wherein said input means further includes an optimizer switch, said control means responsive to actuation of said optimizer switch to control said climate control device in response to said preset time of day data and said preset set point temperature data in place of said input time of day data and said input set point temperature data respectively.

7. A control system for controlling a climate control device such as an HVAC device at a premise, said climate control device being supplied with electricity via a utility at various price tiers and said utility providing real time price tier data to said control system, said control system comprising:

a) display means for displaying:

1) time of day data, 2) price tier identifying data for identifying price tiers representing at least the relative cost of electricity from one price tier to the next price tier, and 3) set point temperature data corresponding to each of said price tier identifying data, b) input means for inputting;

1) said time of day data for defining time intervals, 2) said set point temperature data corresponding to each price tier identifying data and corresponding to each of said time of day data, said set point temperature data indicative of the desired temperature corresponding to each price tier for each time interval, c) temperature sensing means for sensing the temperature within said premise and for producing actual temperature data indicative of said sensed temperature;

d) clock means for maintaining a real time clock and for generating real time clock data corresponding thereto, and e) control means 1) connected to said input means for receiving said time of day data and said set point temperature data, 2) connected to said temperature sensing means for receiving said actual temperature data, 3) connected to said clock means for receiving said real time clock data, 4) connected to said utility for receiving said real time price tier data, and 5) connected to said climate control device for controlling said climate control device for regulating the temperature within said premise in accordance with (a) said set point temperature data for a corresponding price tier identifying data and a corresponding time of day data and (b) said actual temperature data, said real time price tier data and said real time clock data, wherein said control system further includes storing means for storing preset time of day data corresponding to predetermined time intervals, and preset set point temperature data corresponding to said preset time of day data for each of said price tier identifying data, wherein said control means is operative for controlling said climate control device for regulating the temperature within said premise in accordance with (a) said preset set point temperature data for a corresponding price tier identifying data and a corresponding preset time of day data and (b) said actual temperature data, said real time price tier data and said real time clock data, wherein said climate control device operates in at least a cooling mode for cooling said premise and wherein for use in said cooling mode said storing means stores said preset set point temperature data for each of said price tier identifying data such that any given preset set point temperature data for a given cost of electricity as represented by said price tier identifying data has a value equal to or greater than the preset set point temperature value corresponding to any lower cost of electricity as represented by said price tier identifying data.

8. A control system as recited in claim 4, wherein said climate control device operates in at least a cooling mode for cooling said premise and wherein for use in said cooling mode said storing means stores said preset set point temperature data for each of said price tier identifying data such that any given preset set point temperature data for a given cost of electricity as represented by said price tier identifying data has a value equal to or greater than the preset set point temperature value corresponding to any lower cost of electricity as represented by said price tier identifying data.

9. A control system for controlling a climate control device such as an HVAC device at a premise, said climate control device being supplied with electricity via a utility at various price tiers and said utility providing real time price tier data to said control system, said control system comprising:

a) display means for displaying;
   1) time of day data,
   2) price tier identifying data for identifying price tiers representing at least the relative cost of electricity from one price tier to the next price tier, and
   3) set point temperature data corresponding to each of said price tier identifying data, b) input means for inputting;
   1) said time of day data for defining time intervals,
   2) said set point temperature data corresponding to each price tier identifying data and corresponding to each of said time of day data, said set point temperature data indicative of the desired temperature corresponding to each price tier for each timer interval, c) temperature sensing means for sensing the temperature within said premise and for producing actual temperature data indicative of said sensed temperature;

d) clock means for maintaining a real time clock and for generating real time clock data corresponding thereto, and e) control means
   1) connected to said input means for receiving said time of day data and said set point temperature data,
   2) connected to said temperature sensing means for receiving said actual temperature data,
   3) connected to said clock means for receiving said real time clock data,
   4) connected to said utility for receiving said real time price tier data, and
   5) connected to said climate control device for controlling said climate control device for regulating the temperature within said premise in accordance with
      (a) said set point temperature data for a corresponding price tier identifying data and a corresponding time of day data and
      (b) said actual temperature data, said real time price tier data and said real time clock data, wherein said control system further includes storing means for storing preset time of day data corresponding to predetermined time intervals, and preset set point temperature data corresponding to said preset time of day data for each of said price tier identifying data, wherein said control means is operative for controlling said climate control device for regulating the temperature within said premise in accordance with (a) said preset set point temperature data for a corresponding price tier identifying data and a corresponding preset time of day data and (b) said actual temperature data, said real time price tier data and said real time clock data, wherein said climate control device operates in at least a heating mode for heating said premise and wherein for use in said heating mode said storing means stores said preset set point temperature data for each of said price tier identifying data such that any given preset set point temperature data for a given cost of electricity as represented by said price tier identifying data has a value equal to or less than the preset set point temperature value corresponding to any lower cost of electricity as represented by said price tier identifying data.

10. A control system as recited in claim 6 wherein said climate control device operates in at least a heating mode for heating said premise and wherein for use in said heating mode said storing means stores said preset set point temperature data for each of said price tier identifying data such that any given preset set point temperature data for a given cost of electricity as represented by said price tier identifying data has a value equal to or less than the preset set point temperature value corresponding to any lower cost of electricity as represented by said price tier identifying data.

11. A control system as recited in claim 1 wherein said input means further includes means for selecting an appliance module data indicative of a selected one of a plurality of appliance modules and means for inputting start and stop time data for each selected appliance module, and wherein said control means is further operative in response to said appliance module data and said start and stop time data to activate said appliance during a time period defined by said start and stop time data.

12. A control system as recited in claim 11 wherein said appliance modules are connected to said control means via an AC power line within said premise.

13. A control system as recited in claim 1 wherein said climate control device is connected to said control means via AC power lines within said premise.

14. A control system as recited in claim 1 wherein said climate control device is connected to said control means via dedicated lines within said premise, said dedicated lines separate from any AC power lines within said premise.

15. A control system as recited in claim 1 wherein said control means is connected to said utility via a telephone communication link.

16. A control system as recited in claim 1 wherein:

said control means includes a data processing unit and an analog to digital converter, said analog to digital converter connected to said temperature sensing means for receiving said actual temperature data and providing digital actual temperature data to said data processing unit, said processing unit operative for averaging said digital actual temperature data to provide an average temperature data, and said control means operative for controlling said display means so as to display said average temperature data.

17. A control system as recited in claim 1 wherein said control means is operative for controlling said display means to display said actual temperature data as sensed by said temperature sensing means.

18. A control system as recited in claim 1 wherein said control means further includes means for calculating the cost of electricity over a given time period as utilized at least by said climate control device.

19. A control system as recited in claim 18 wherein said input means includes a bill information switch and said control means is connected to said display means for controlling said display means to display said calculated cost of electricity in response to actuation of said bill information switch.

20. A control system as recited in claim 1 wherein said control means includes means for determining electricity usage data in each of said price tiers, said control means controlling said display means to display said electricity usage data in response to actuation of a given switch on said input means.

21. A control system as recited in claim 20 wherein said given switch is a bill information switch, sequential actuation of said bill information switch causing sequential action by said control means to cause said display means to sequentially display said electricity usage data in each price tier.

22. A control system as recited in claim 1 wherein said control means includes means for determining electricity cost data in each of said price tiers, said control means controlling said display means to display said electricity cost data in response to actuation of a given switch on said input means.

23. A control system as recited in claim 1 further including a hot water heater connected to said control means and wherein said control means further includes means for calculating the cost of electricity over a given time period as utilized by at least said climate control device, said appliance modules, and said hot water heater.

24. A control system as recited in claim 1 further including:

a hot water heater connected to said controller, and wherein said display means further includes means for displaying a start and stop time for displaying the scheduling of the on time of said hot water heater, and wherein said input means further includes means for inputting said start and stop times for scheduling the on time of said hot water heater, said controller being further operative to control said hot water heater in accordance with said scheduled on time and said real time clock data and further in response to said real time price tier data.

25. A control system for controlling a climate control device such as an HVAC device at a premise, said climate control device being supplied with electricity via a utility at various price tiers and said utility providing real time price tier data to said control system, said control system comprising:

a) display means for displaying:
   1) time of day data,
   2) price tier identifying data for identifying price tiers representing at least the relative cost of electricity from one price tier to the next price tier, and
   3) set point temperature data corresponding to each of said price tier identifying data,
b) input means for inputting:
   1) said time of day data for defining time intervals,
   2) said set point temperature data corresponding to each price tier identifying data and corresponding to each of said time of day data, said set point temperature data indicative of the desired temperature corresponding to each price tier for each timer interval,
c) temperature sensing means for sensing the temperature within said premise and for producing actual temperature data indicative of said sensed temperature;
d) clock means for maintaining a real time clock and for generating real time clock data corresponding thereto, and
e) control means
   1) connected to said input means for receiving said time of day data and said set point temperature data,
   2) connected to said temperature sensing means for receiving said actual temperature data,
   3) connected to said clock means for receiving said real time clock data,
   4) connected to said utility for receiving said real time price tier data, and
   5) connected to said climate control device for controlling said climate control device for regulating the temperature within said premise in accordance with
      (a) said set point temperature data for a corresponding price tier identifying data and a corresponding time of day data and
      (b) said actual temperature data, said real time price tier data and said real time clock data, a hot water heater connected to said controller, and wherein said display means further includes means for displaying a start and stop time for displaying the scheduling of the on time of said hot water heater, wherein said input means further includes means for inputting said start and stop times for scheduling the on time of said hot water heater, said controller being further operative to control said hot water heater in accordance with said scheduled on time and said real time clock data and further in response to said real time price tier data, and wherein said controller is operative for turning on said hot water heater in advance of said scheduled on time so as to preheat said hot water heater in a preheat time interval immediately preceding said scheduled on time.

26. A control system as recited in claim 25 wherein said control means includes means for calculating a preheat time interval which produces a lowest utility cost with respect to said real time price tier data and said real time clock data.

27. A control system for controlling a climate control device such as an HVAC device at a premise, said climate control device being supplied with electricity via a utility at various price tiers and said utility providing real time price tier data to said control system, said control system comprising:

a) displaying means for displaying:
   1) time of day data,
   2) price tier identifying data for identifying price tiers representing at least the relative cost of electricity from one price tier to the next price tier, and
   3) set point temperature data corresponding to each of said price tier identifying data,
b) input means for inputting:
   1) said time of day data for defining time intervals,
   2) said set point temperature data corresponding to each price tier identifying data and corresponding to each of said time of day data, said set point temperature data indicative of the desired temperature corresponding to each price tier for each timer interval, c) temperature sensing means for sensing the temperature within said premise and for producing actual temperature data indicative of said sensed temperature;

d) clock means for maintaining a real time clock and for generating real time clock data corresponding thereto, and e) control means 1) connected to said input means for receiving said time of day data and said set point temperature data, 2) connected to said temperature sensing means for receiving said actual temperature data, 3) connected to said clock means for receiving said real time clock data, 4) connected to said utility for receiving said real time price tier data, and 5) connected to said climate control device for controlling said climate control device for regulating the temperature within said premise in accordance with (a) said set point temperature data for a corresponding price tier identifying data and a corresponding time of day data and (b) said actual temperature data, said real time price tier data and said real time clock data, a hot water heater connected to said controller, and wherein said display means further includes means for displaying a start and stop time for displaying the scheduling of the on time of said hot water heater, wherein said input means further includes means for inputting said start and stop times for scheduling the on time of said hot water heater, said controller being further operative to control said hot water heater in accordance with said scheduled on time and said real time clock data and further in response to said real time price tier data, and wherein said control means is operative for inhibiting operation of said hot water heater if said real time price tier data for said scheduled on time corresponds to a highest price tier data.

28. A control system for controlling a climate control device such as an HVAC device at a premise, said climate control device being supplied with electricity via a utility at various price tiers and said utility providing real time price tier data to said control system, said control system comprising:

a) display means for displaying;

1) time of day data, 2) price tier identifying data for identifying price tiers representing at least the relative cost of electricity from one price tier to the next price tier, and 3) set point temperature data corresponding to each of said price tier identifying data, b) input means for inputting:

1) said time of day data for defining time intervals, 2) said set point temperature data corresponding to each price tier identifying data and corresponding to each of said time of day data, said set point temperature data indicative of the desired temperature corresponding to each price tier for each timer interval, c) temperature sensing means for sensing the temperature within said premise and for producing actual temperature data indicative of said sensed temperature;

d) clock means for maintaining a real time clock and for generating real time clock data corresponding thereto, and e) control means 1) connected to said input means for receiving said time of day data and said set point temperature data, 2) connected to said temperature sensing means for receiving said actual temperature data, 3) connected to said clock means for receiving said real time clock data, 4) connected to said utility for receiving said real time price tier data, and 5) connected to said climate control device for controlling said climate control device for regulating the temperature within said premise in accordance with (a) said set point temperature data for a corresponding price tier identifying data and a corresponding time of day data and (b) said actual temperature data, said real time price tier data and said real time clock data, a hot water heater connected to said controller, and wherein said display means further includes means for displaying a start and stop time for displaying the scheduling of the on time of said hot water heater, and wherein said input means further includes means for inputting said start and stop times for scheduling the on time of said hot water heater, said controller being further operative to control said hot water heater in accordance with said scheduled on time and said real time clock data and further in response to said real time price tier data, and wherein said control means is operative for inhibiting operation of said hot water heater if said real time price tier data for said scheduled on time corresponds to either a highest or next to highest price tier data.

29. A control system as recited in claim 1 wherein said means for inputting includes a keypad and said means for displaying included an LCD display.

30. A control system as recited in claim 1 wherein said control means is connected to said utility to receive said real time price tier data and a corresponding utility time schedule data during which said real time price tier data is in effect, said control means being further operative for controlling said climate control device for regulating the temperature within said premise in accordance with (a) said set point temperature data for a corresponding price tier identifying data and a corresponding time of day data and (b) said actual temperature data, said real time price tier data and said corresponding utility time schedule data and said real time clock data.

31. A control system as recited in claim 1 wherein:

said control means includes a data processing unit connected to receive said actual temperature data from said temperature sensing means, said processing unit operative for averaging said actual temperature data to provide an average temperature data, and said control means operative for controlling said climate control means in response to said averaged temperature data.

32. A control system as recited in claim 31 wherein said control means is operative for controlling said display means to display said actual temperature data as sensed by said temperature sensing means.

33. A control system as recited in claim 31 wherein said data processing means averages a current actual temperature data with an immediately preceding actual temperature data and with a past average of said actual temperature data to calculate a current average temperature data and wherein said control means controls said climate control device in response to said current average temperature data.

34. A control system for controlling a climate control device such as an HVAC device at a premise, said climate control device being supplied with electricity via a utility at various price tiers and said utility providing real time price tier data to said control system, said control system comprising:

a) display means for displaying:
   1) time of day data,
   2) price tier identifying data for identifying price tiers representing at least the relative cost of electricity from one price tier to the next price tier, and
   3) set point temperature data corresponding to each of said price tier identifying data,
b) input means for inputting said set point temperature data corresponding to each price tier identifying data and corresponding to each of said time of day data, said set point temperature data indicative of the desired temperature corresponding to each price tier for each time interval,
c) temperature sensing means for sensing the temperature within said premise and for producing actual temperature data indicative of said sensed temperature;
d) clock means for maintaining a real time clock and for generating real time clock data corresponding thereto,
e) control means
2) connected to said input means for receiving said time of day data and said set point temperature data,
   2) connected to said temperature sensing means for receiving said actual temperature data,
   3) connected to said clock means for receiving said real time clock data,
   4) connected to said utility for receiving said real time price tier data, and
   5) connected to said climate control device for controlling said climate control device for regulating the temperature within said premise in accordance with
      (a) said set point temperature data for a corresponding price tier identifying data and a corresponding time of day data and
      (b) said actual temperature data, said real time price tier data and said real time clock data.

35. A method for controlling a climate control device such as an HVAC device at a premise, said climate control device being supplied with electricity via a utility at various price tiers and said utility providing real time price tier data to a control unit within said premise, said method comprising the steps of:

a) displaying to a user of said control unit
   1) time of day data,
   2) price tier identifying data for identifying price tiers representing at least the relative cost of electricity from one price tier to the next price tier, and
   3) set point temperature data corresponding to each of said price tier identifying data,
b) inputting into said control unit
   1) said time of day data for defining time intervals,
   2) said set point temperature data corresponding to each price tier identifying data and corresponding to each of said time of day data, said set point temperature data indicative of the desired temperature corresponding to each price tier for each time interval,
c) sensing the temperature within said premise and producing actual temperature data indicative of said sensed temperature;
d) maintaining a real time clock and generating real time clock data corresponding thereto,
e) receiving in said control unit said time of day data and said set point temperature data,
f) receiving in said control unit said actual temperature data,
g) receiving in said control unit said real time clock data,
h) receiving in said control unit said real time price tier data from said utility, and
i) controlling said climate control device via said control unit for regulating the temperature within said premise in accordance with
   (a) said set point temperature data for a corresponding price tier identifying data and a corresponding time of day data and
   (b) said actual temperature data, said real time price tier data and said real time clock data.

36. A method for controlling a climate control device such as an HVAC device at a premise, said climate control device being supplied with electricity via a utility at various price tiers, said method comprising the steps of:

a) providing real time price tier data from said utility to a control unit which is connected for controlling said climate control device,
b) displaying to a user of said control unit
   1) time of day data,
   2) price tier identifying data for identifying price tiers representing at least the relative cost of electricity from one price tier to the next price tier, and
   3) set point temperature data corresponding to each of said price tier identifying data,
c) inputting into said control unit
   1) said time of day data for defining time intervals,
   2) said set point temperature data corresponding to each price tier identifying data and corresponding to each of said time of day data, said set point temperature data indicative of the desired temperature corresponding to each price tier for each time interval,
d) sensing the temperature within said premise and producing actual temperature data indicative of said sensed temperature;
e) maintaining a real time clock and generating real time clock data corresponding thereto, f) receiving in said control unit said time of day data and said set point temperature data, g) receiving in said control unit said actual temperature data, h) receiving in said control unit said real time clock data, and i) controlling said climate control device via said control unit for regulating the temperature within said premise in accordance with (a) said set point temperature data for a corresponding price tier identifying data and a corresponding time of day data and (b) said actual temperature data, said real time price tier data and said real time clock data.

37. A method for controlling an apparatus having an ON/OFF status using a system including: a thermostat unit including a first means for storing information; and a controller unit including a second means for storing information, the controller unit being a unit separate from and coupled to the thermostat and the apparatus, the method comprising the steps of:

establishing an apparatus schedule including a plurality of ON/OFF statuses associated with apparatus schedule times for the apparatus, wherein the schedule resides in the second means for storing information;

determining the real time;

providing the controller unit with electrical energy cost data associated with power company schedule times;

establishing energy cost limit data associated with each apparatus schedule time;

storing the energy cost limit data in the second means for storing information;

comparing the real time to the power company schedule times and the apparatus schedule times, and determining the electrical energy cost and the energy cost limit for the real time;

comparing the determined electrical energy cost to the determined energy cost limit;

comparing the real time to the apparatus schedule times and determining the scheduled ON/OFF status of the apparatus for the real time; and manipulating the ON/OFF status of the apparatus to correspond with the scheduled ON/OFF status; wherein the status of the apparatus is set to OFF when the electrical energy cost is greater than the energy cost limit.

38. The method of claim 37, wherein the apparatus is an electric hot water heater.

39. The method of claim 37, wherein the apparatus is an appliance.

40. The method of claim 37, wherein the controller unit is provided with peak energy usage times from the power company, the method further comprising the steps of:

comparing the real time to the peak energy usage times; and setting the status of the apparatus to OFF if the real time is equal to a peak energy usage time.

41. A method for controlling an apparatus having an ON/OFF status using a system including:

a thermostat unit including a first means for storing information; and a controller unit including a second means for storing information, the controller unit being a unit separate from and coupled to the thermostat and the apparatus, the method comprising the steps of:

establishing an apparatus schedule including a plurality of ON/OFF statuses associated with apparatus schedule times for the apparatus, wherein the schedule resides in the second means for storing information;

determining the real time;

providing the controller unit with electrical energy cost data associated with power company schedule times;

establishing energy cost limit data associated with each apparatus schedule time;

storing the energy cost limit data in the second means for storing information;

comparing the real time to the power company schedule times and the apparatus schedule times, and determining the electrical energy cost and the energy cost limit for the real time;

comparing the determined electrical energy cost to the determined energy cost limit;

comparing the real time to the apparatus schedule times and determining the scheduled ON/OFF status of the apparatus for the real time; and manipulating the ON/OFF status of the apparatus to correspond with the scheduled ON/OFF status; wherein the status of the apparatus is set to OFF when the electrical energy cost is greater than the energy cost limit;

wherein the thermostat includes a user interface for allowing a user to manipulate an apparatus schedule, and means for displaying the schedule, and the step of manipulating the apparatus schedule including the steps of:

storing the apparatus schedule from the second means for storing information in the first means for storing information;

displaying the apparatus schedule on the means for displaying;

altering the apparatus schedule in the first means for storing information by activating the user interface to provide desired ON/OFF statuses associated with the appropriate times; and storing the altered schedule from the first means for storing information in the second means for storing information.

42. The method of claim 41, wherein the user interface includes a keypad, and the means for displaying includes an LCD display.

43. The method of claim 41, wherein the apparatus is an electric hot water heater.

44. The method of claim 41, wherein the apparatus is an appliance.

45. The method of claim 37, wherein the controller is coupled to a power company data supply with a data link, the method further comprising the steps of:

accessing the data supply over the data link to acquire electrical energy cost data and the associated power company schedule times; and storing the electrical energy cost data and the associated power company schedule times in the second means for storing information.

46. The method of claim 45, wherein the apparatus is an electric hot water heater.

47. The method of claim 40, wherein the controller is coupled to a power company data supply with a data link, the method further comprising the steps of:

accessing the data supply over the data link to acquire peak energy usage times; and storing the peak energy usage times in the second means for storing information.

48. A method for controlling a means for heating and cooling a predetermined air mass with a system including: a thermostat unit including means for sensing the temperature of the air mass and a first means for storing information; and a controller unit including a second means for storing information, the controller unit being a unit separate from and coupled to the thermostat and the means for heating and cooling, the method comprising the steps of:

manipulating a first schedule, said first schedule including a plurality of setpoint temperatures and associated times, wherein the first schedule resides in the first means for storing information;

storing the manipulated first schedule from the first means for storing information in the second means for storing information;

determining the real time;

determining the actual temperature of the air means for the means for sensing;

comparing the real time to the first schedule times and determining the setpoint temperature for the real time;

comparing the setpoint temperature to the actual temperature; and controlling the means for heating and cooling such that the air mass is heated when the setpoint temperature is greater than the actual temperature by a first predetermined differential, and the air mass is cooled when the setpoint temperature is less than the actual temperature by a second predetermined differential;

wherein the step of determining the actual temperature of the air mass from the mass for sensing includes the steps of:

reading a temperature value from the means for sensing each time the real time determination is made;

averaging the temperature values read from the means for sensing corresponding to the real time determination made prior to the real time determination made immediately preceding the current real time determination to provide a past average;

storing the past average in the first means for storing information;

storing the temperature value associated with the real time determination made immediately preceding the current real time determination;

determining a current temperature value from the means for sensing associated with the current real time; and averaging the past average, the temperature value associated with the real time determination made immediately preceding the current real time, and the current temperature to provide the actual temperature of the air.

49. A method for controlling a means for heating and cooling a predetermined air mass with a system including: a thermostat unit including means for sensing the temperature of the air mass and a first means for storing information; and a controller unit including a second means for storing information, the controller unit being a unit separate from and coupled to the thermostat and the means for heating and cooling wherein the controller unit is provided with electrical energy cost data associated with power company schedule times, the method comprising the steps of:

manipulating a first schedule, said first schedule including a plurality of setpoint temperatures and associated times, wherein the first schedule resides in the first means for storing information;

storing the manipulated first schedule from the first means for storing information in the second means for storing information;

determining the real time;

determining the actual temperature of the air mass from the means for sensing;

comparing the real time to the first schedule times and determining the setpoint temperature for the real time;

comparing the setpoint temperature to the actual temperature;

controlling the means for heating and cooling such that the air mass is heated when the setpoint temperature is greater than the actual temperature by a first predetermined differential, and the air mass is cooled when the setpoint temperature is less than the actual temperature by a second predetermined differential;

establishing energy cost limit data associated with each first schedule time;

storing the energy cost limit data in the second means for storing information;

comparing the real time to the power company schedule times and the first schedule times, and determining the electrical energy cost and the energy cost limit for the real time;

comparing the determined electrical energy cost to the determined energy cost limit; and disabling the means for heating and cooling when the electrical energy cost is greater than the energy cost limit.

50. A method for controlling a means for heating and cooling a predetermined air mass with a system including: a thermostat unit including means for sensing the temperature of the air mass and a first means for storing information; and a controller unit including a second means for storing information, the controller unit being a unit separate from and coupled to the thermostat and the means for heating and cooling wherein the controller unit is coupled to a power company data supply with a data link, the method comprising the steps of:

manipulating a first schedule, said first schedule including a plurality of setpoint temperatures and associated times, whereby the first schedule resides in the first means for storing information;

storing the manipulated first schedule from the first means for storing information in the second means for storing information;

.etermining the real time;

letermining the actual temperature of the air mass from the means for sensing;

comparing the real time to the first schedule times and determining the setpoint temperature for the real time;

comparing the setpoint temperature to the actual temperature;

controlling the means for heating and cooling such that the air mass is heated when the setpoint temperature is greater than the actual temperature by a first predetermined differential, and the air mass is cooled when the setpoint temperature is less than the actual temperature by a second predetermined differential;

accessing the data supply over the data link to acquire electrical energy cost data and associated power company schedule times; and storing the electrical energy cost data and associated power company schedule times in the second means for storing information.

51. The method of claim 49, wherein the means for heating and cooling comprises a heat pump.

52. The method of claim 49, wherein the means for heating and cooling comprises at least one resistive heating element and an air conditioner.

53. The method of claim 49, wherein the thermostat includes a user interface for allowing a user to manipulate the first schedule and means for displaying the first schedule, the step of establishing the first schedule including the steps of:

displaying the first schedule on the means for displaying; and altering the first schedule by activating the user interface to provide desired setpoint temperatures and associated times.

54. The method of claim 49, wherein the user interface includes a keypad and the means for displaying includes an LCD display.

55. A method for controlling an electric hot water heater with a system including: a device for controlling the electric hot water heater having an ON/OFF status coupled to the electric hot water heater, a thermostat unit including a first means for storing information; and a controller unit including a second means for storing information, the controller unit being a unit separate from and coupled to the thermostat and the device, the method comprising the steps of:

establishing a hot water schedule including a plurality of ON/OFF statuses for the device associated with times, wherein the hot water schedule resides in the second means for storing information;

determining the real time;

determining the actual ON/OFF status of the device;

comparing the real time to the hot water schedule times and determining the scheduled ON/OFF status of the device;

providing the controller unit with electrical energy cost data including energy costs associated with power company time periods;

comparing the real time to the hot water schedule times and determining scheduled ON/OFF status of the device for a subsequent hot water schedule time greater than the real time;

comparing the real time to the company time periods and determining a first energy cost for the real time;

comparing the subsequent hot water schedule time to the company time periods to determine a second energy cost for the subsequent hot water schedule time;

comparing the first energy cost with the second energy cost; and changing the status of the device to ON for a predetermined amount of time when the first energy cost is less than the second energy cost.

56. The method of claim 55, wherein the controller unit is coupled to a power company data supply with a data link, the method further comprising the steps of:

accessing the data supply over the data link to acquire the energy cost data and associated power company time periods; and storing the energy cost data and the associated power company time periods in the second means for storing information.

57. The method of claim 55, wherein the thermostat unit includes a user interface for allowing a user to manipulate a hot water hot water schedule and means for displaying the hot water schedule, the step of manipulating the hot water schedule including the steps of:

storing the hot water schedule from the second means for storing information in the first means for storing information;

displaying hot water schedule on the means for displaying;

altering the hot water schedule data in the first means for storing information by activating the user interface to provide desired setpoint temperatures at associated times; and storing the altered hot water schedule from the first means for storing information in the second means for storing information.

58. The method of claim 57, wherein the user interface includes a keypad and the means for displaying includes an LCD display.

* * * * *